US007778439B2

(12) United States Patent
Kondo et al.

(10) Patent No.: US 7,778,439 B2
(45) Date of Patent: Aug. 17, 2010

(54) IMAGE PROCESSING DEVICE AND METHOD, RECORDING MEDIUM, AND PROGRAM

(75) Inventors: Tetsujiro Kondo, Tokyo (JP); Takahiro Nagano, Kanagawa (JP); Junichi Ishibashi, Saitama (JP); Takashi Sawao, Tokyo (JP); Naoki Fujiwara, Tokyo (JP); Seiji Wada, Kanagawa (JP); Toru Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 867 days.

(21) Appl. No.: 11/670,734

(22) Filed: Feb. 2, 2007

(65) Prior Publication Data

US 2007/0120854 A1 May 31, 2007

Related U.S. Application Data

(63) Continuation of application No. 10/545,081, filed as application No. PCT/JP2004/001579 on Feb. 13, 2004, now Pat. No. 7,561,188.

(30) Foreign Application Priority Data

Feb. 28, 2003 (JP) ............................ 2003-052272

(51) Int. Cl.
*G06K 9/00* (2006.01)

(52) U.S. Cl. ........................ 382/100; 382/282; 382/275

(58) Field of Classification Search ................. 382/100, 382/103, 155–159, 282–283, 254, 260, 264, 382/266–269, 274–275; 348/222.1, 312; 706/22, 44–48

See application file for complete search history.

(56) References Cited

U.S. PATENT DOCUMENTS

| | | | | |
|---|---|---|---|---|
| 5,907,358 | A * | 5/1999 | Tatsumi | 348/312 |
| 6,678,405 | B1 | 1/2004 | Kondo et al. | |
| 7,391,919 | B2 * | 6/2008 | Hirai | 382/266 |
| 7,499,895 | B2 * | 3/2009 | Kondo et al. | 706/45 |
| 7,512,267 | B2 * | 3/2009 | Kondo et al. | 382/165 |

(Continued)

FOREIGN PATENT DOCUMENTS

EP 1061473 12/2000

(Continued)

OTHER PUBLICATIONS

U.S Appl. No. 10/543,839, filed Jul. 29, 2005, Kondo et al.

(Continued)

*Primary Examiner*—Sherali Ishrat
(74) *Attorney, Agent, or Firm*—Oblon, Spivak, McClelland, Maier & Neustadt, L.L.P.

(57) ABSTRACT

An image processing device, method, recording medium, and program and a learning device, where the learning device includes a computer configured to compute image data corresponding to light signals when the light signals corresponding to second image data pass through an optical low-pass filter and to output computed image data as first image data, a first tap extractor configured to extract a plurality of pixels corresponding to pixels of interest within the second image data from the first image data, and a learning unit configured to teach a predictor configured to predict pixel values of the pixels of interest from the pixel values of the plurality of pixels extracted by the first tap extractor.

8 Claims, 403 Drawing Sheets

U.S. PATENT DOCUMENTS

| | | | | |
|---|---|---|---|---|
| 7,595,819 | B2 * | 9/2009 | Kondo | 348/222.1 |
| 2006/0140497 | A1 * | 6/2006 | Kondo et al. | 382/254 |
| 2006/0146198 | A1 | 7/2006 | Kondo et al. | |
| 2006/0147128 | A1 | 7/2006 | Kondo et al. | |
| 2006/0159368 | A1 | 7/2006 | Kondo et al. | |
| 2006/0233460 | A1 | 10/2006 | Kondo et al. | |

FOREIGN PATENT DOCUMENTS

| | | |
|---|---|---|
| EP | 1164545 | 12/2001 |
| JP | 2000-201283 | 7/2000 |
| JP | 2001-84368 | 3/2001 |
| JP | 2001-250119 | 9/2001 |
| JP | 2002-152761 | 5/2002 |
| JP | 2002-288652 | 10/2002 |
| JP | 2003/52051 | 2/2003 |

OTHER PUBLICATIONS

U.S Appl. No. 11/670,478, filed Feb. 2, 2007, Kondo et al.
U.S Appl. No. 11/670,486, filed Feb. 2, 2007, Kondo et al.
U.S Appl. No. 11/626,662, filed Jan. 24, 2007, Kondo et al.
U.S. Appl. No. 11/627,155, filed Jan. 25, 2007, Kondo et al.
U.S Appl. No. 11/627,195, filed Jan. 25, 2007, Kondo et al.
U.S Appl. No. 11/627,230, filed Jan. 25, 2007, Kondo et al.
U.S Appl. No. 11/627,243, filed Jan. 25, 2007, Kondo et al.
U.S Appl. No. 11/670,754, filed Feb. 2, 2007, Kondo et al.
U.S Appl. No. 11/670,732, filed Feb. 2, 2007, Kondo et al.
U.S Appl. No. 11/670,785, filed Feb. 2, 2007, Kondo et al.
U.S Appl. No. 11/670,763, filed Feb. 2, 2007, Kondo et al.
U.S Appl. No. 11/670,776, filed Feb. 2, 2007, Kondo et al.

* cited by examiner

FIG. 84

| RANGE OF CALCULATION | NUMBER OF ROWS | NUMBER OF PIXELS IN EACH ROW | SELECTION RANGE OF PIXELS |
|---|---|---|---|
| RANGE A (45° TO 63.4°) | 5 | 5 | 5 TO 9 |
| RANGE B (63.4° TO 71.6°) | 4 | 7 | 8 TO 11 |
| RANGE C (71.6° TO 76.0°) | 3 | 9 | 9 TO 11 |
| RANGE D (76.0° TO 87.7°) | 2 | 11 | 8 TO 50 |

FIG. 101

| $\theta$ | REFERENCE BLOCKS WITH SMALLEST DISTANCE |
|---|---|
| 0.0 TO 18.4 | A AND A' |
| 18.4 TO 33.7 | B AND B' |
| 33.7 TO 56.3 | C AND C' |
| 56.3 TO 71.6 | D AND D' |
| 71.6 TO 108.4 | E AND E' |
| 108.4 TO 123.7 | F AND F' |
| 123.7 TO 146.3 | G AND G' |
| 146.3 TO 161.6 | H AND H' |
| 161.6 TO 180.0 | A AND A' |

FIG. 346

| | MEASUREMENT | SIMULATION | | |
|---|---|---|---|---|
| OLPF MOVEMENT | 3.35 | 2 | 4 | 6 |
| PIXEL PITCH | 6.45 | 4 | 8 | 11 |
| RELATIVE RATIO | 1.93 | 2.0 | 2.0 | 1.83 |

FIG. 398

| REGION | | DESCRIPTION |
|---|---|---|
| BACKGROUND REGION | | STILL PORTION |
| FOREGROUND REGION | | MOVING PORTION |
| MIXED REGION | COVERED BACKGROUND REGION | PORTION CHANGING FROM BACKGROUND TO FOREGROUND |
| | UNCOVERED BACKGROUND REGION | PORTION CHANGING FROM FOREGROUND TO BACKGROUND |

A

B

IMAGE PROCESSING DEVICE AND METHOD, RECORDING MEDIUM, AND PROGRAM

CROSS REFERENCE TO RELATED APPLICATIONS

This application is a continuation of U.S. application Ser. No. 10/545,081, filed on Aug. 9, 2005, now U.S. Pat. No. 7,561,188 and is based upon and claims the benefit of priority to International Application No. PCT/JP04/01579, filed on Feb. 13, 2004 and from the prior Japanese Patent Application No. 2003-052272 filed on Feb. 28, 2003. The entire contents of each of these documents are incorporated herein by reference.

TECHNICAL FIELD

The present invention relates to an image processing device and method, a recording medium, and a program, and particularly relates to an image processing device and method, recording medium, and program, taking into consideration the real world where data has been acquired.

BACKGROUND ART

Technology for detecting phenomena in the actual world (real world) with sensor and processing sampling data output from the sensors is widely used. For example, image processing technology wherein the actual world is imaged with an imaging sensor and sampling data which is the image data is processed, is widely employed.

Also, Japanese Unexamined Patent Application Publication No. 2001-250119 discloses having second dimensions with fewer dimensions than first dimensions obtained by detecting with sensors first signals, which are signals of the real world having first dimensions, obtaining second signals including distortion as to the first signals, and performing signal processing based on the second signals, thereby generating third signals with alleviated distortion as compared to the second signals.

However, signal processing for estimating the first signals from the second signals had not been thought of to take into consideration the fact that the second signals for the second dimensions with fewer dimensions than first dimensions wherein a part of the continuity of the real world signals is lost, obtained by first signals which are signals of the real world which has the first dimensions, have the continuity of the data corresponding to the stability of the signals of the real world which has been lost.

DISCLOSURE OF INVENTION

The present invention has been made in light of such a situation, and it is an object thereof to take into consideration the real world where data was acquired, and to obtain processing results which are more accurate and more precise as to phenomena in the real world.

The image processing device according to the present invention includes: first angle detecting means for detecting an angle corresponding to the reference axis of continuity of image data in image data made up of a plurality of pixels acquired by real world light signals being cast upon a plurality of detecting elements each having spatio-temporal integration effects, of which a part of continuity of said real world light signals have been lost, using matching processing; second angle detecting means for detecting the angle using statistical processing based on the image data within a predetermined region corresponding to the angle detected by the first angle detecting means; and actual world estimating means for estimating the light signals by estimating the lost continuity of the real world light signals based on the angle detected by the second angle detecting means.

The first angle detecting means may include: pixel detecting means for detecting an image block centered on a plurality of pixels adjacent to the straight line of each angle on the basis of a pixel of interest within the image data; and correlation detecting means for detecting correlation of image blocks detected by the pixel detecting means; wherein the angle as to the reference axis of continuity of the image data is detected according to the value of correlation of the image blocks detected by the correlation detecting means.

The second angle detecting means may further include: a plurality of statistical processing means; wherein the angle may be detected using one statistical processing means of the plurality of statistical processing means according to the angle detected by the first angle detecting means.

One statistical processing means of the plurality of statistical processing means may further include: dynamic range detecting means for detecting a dynamic range, which is difference between the maximum value and the minimum value of the pixel values of the pixels within the predetermined region; difference value detecting means for detecting the difference value between adjacent pixels in the direction according to activity within the predetermined region; and statistical angle detecting means for statistically detecting an angle as to the reference axis of continuity of image data corresponding to the lost continuity of the real world light signals, according to the dynamic range and the difference value.

One statistical processing means of the plurality of statistical processing means may include: score detecting means for taking the number of pixels of which the correlation value as to the pixel value of another pixel within the predetermined region is equal to or greater than a threshold value as a score corresponding to the pixel of interest; and statistical angle detecting means for statistically detecting an angle as to the reference axis of continuity of the image data by detecting a regression line based on the score of each pixel of interest detected by the score detecting means.

The image processing method according to the present invention includes: a first angle detecting step for detecting an angle corresponding to the reference axis of continuity of image data in image data made up of a plurality of pixels acquired by real world light signals being cast upon a plurality of detecting elements each having spatio-temporal integration effects, of which a part of continuity of the real world light signals have been lost, using matching processing; a second angle detecting step for detecting the angle using statistical processing based on the image data within a predetermined region corresponding to the angle detected in the first angle detecting step; and an actual world estimating step for estimating the light signals by estimating the lost continuity of the real world light signals based on the angle detected in the second angle detecting step.

The program of the recording medium according to the present invention is a program that can be read by a computer which executes processing including: a first angle detecting step for detecting an angle corresponding to the reference axis of continuity of image data in image data made up of a plurality of pixels acquired by real world light signals being cast upon a plurality of detecting elements each having spatio-temporal integration effects, of which a part of continuity of the real world light signals have been lost, using matching processing; a second angle detecting step for detecting the angle using statistical processing based on the image data within a predetermined region corresponding to the angle detected in the first angle detecting step; and an actual world estimating step for estimating the light signals by estimating the lost continuity of the real world light signals based on the angle detected in the second angle detecting step.

The program according to the present invention causes a computer to execute processing including: a first angle detecting step for detecting an angle corresponding to the reference axis of continuity of image data in image data made up of a plurality of pixels acquired by real world light signals being cast upon a plurality of detecting elements each having spatio-temporal integration effects, of which a part of continuity of the real world light signals have been lost, using matching processing; a second angle detecting step for detecting the angle using statistical processing based on the image data within a predetermined region corresponding to the angle detected in the first angle detecting step; and an actual world estimating step for estimating the light signals by estimating the lost continuity of the real world light signals based on the angle detected in the second angle detecting step.

With the image processing device and method, and program, according to the present invention, an angle corresponding to the reference axis of continuity of image data in image data made up of a plurality of pixels acquired by real world light signals being cast upon a plurality of detecting elements each having spatio-temporal integration effects, of which a part of continuity of said real world light signals have been lost, is detected with matching processing, an angle is detected with statistical processing based on the image data within a predetermined region corresponding to the detected angle, the light signals are estimated by estimating the lost continuity of the real world light signals based on the angle detected with the statistical processing.

BRIEF DESCRIPTION OF THE DRAWINGS

FIG. 84 is a diagram describing the range of angle of the set straight lines, the number of pixel sets, and the number of pixels per pixel set.

FIG. 101 is a diagram illustrating reference block wherein the distance as to a straight line which passes through the pixel of interest and has an angle of θ as to the axis of the spatial direction X, is minimal.

FIG. 120 is a flowchart for describing other processing for detection of data continuity with the data continuity detecting unit 101 of which the configuration is illustrated in FIG. 115.

FIG. 121 is a block diagram illustrating the configuration of the data continuity detecting unit for detecting the angle of a fine line or a two-valued edge, as data continuity information, to which the present invention has been applied.

FIG. 122 is a diagram for describing a detection method for data continuity information.

FIG. 123 is a diagram for describing a detection method for data continuity information.

FIG. 124 is a diagram illustrating a further detailed configuration of the data continuity detecting unit.

FIG. 125 is a diagram for describing horizontal/vertical determination processing.

FIG. 126 is a diagram for describing horizontal/vertical determination processing.

FIG. 127A is a diagram for describing the relationship between a fine line in the real world and a fine line imaged by a sensor.

FIG. 127B is a diagram for describing the relationship between a fine line in the real world and a fine line imaged by a sensor.

FIG. 127C is a diagram for describing the relationship between a fine line in the real world and a fine line imaged by a sensor.

FIG. 128A is a diagram for describing the relationship between a fine line in the real world and the background.

FIG. 128B is a diagram for describing the relationship between a fine line in the real world and the background.

Figure 129A:
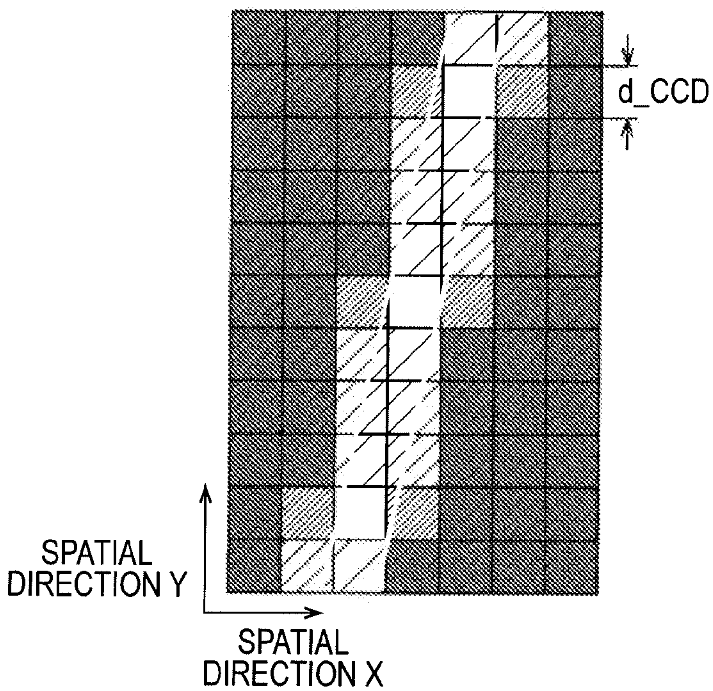

FIG. 129A is a diagram for describing the relationship between a fine line in an image imaged by a sensor and the background.

Figure 129B:
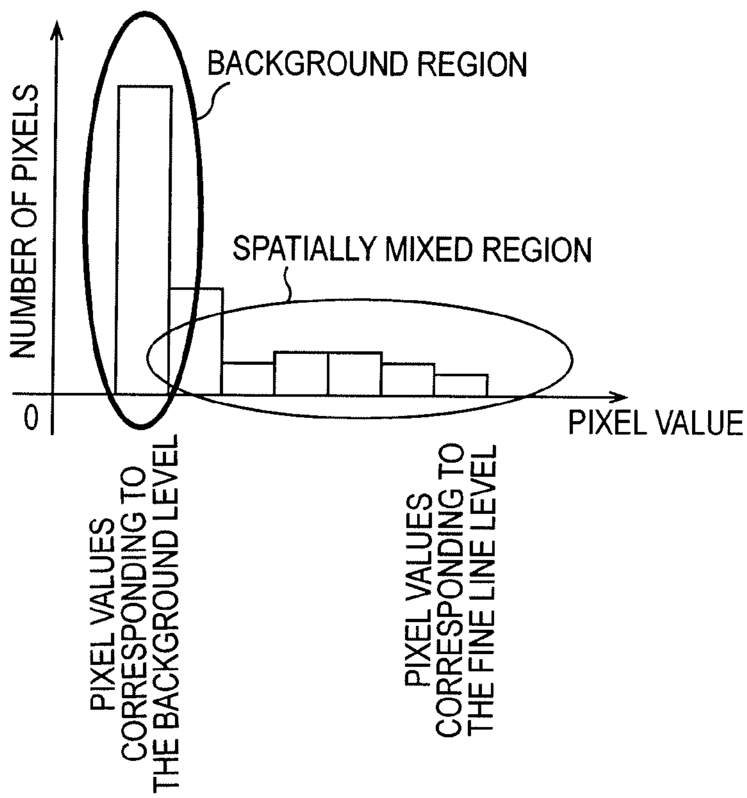

FIG. 129B is a diagram for describing the relationship between a fine line in an image imaged by a sensor and the background.

Figure 130A:
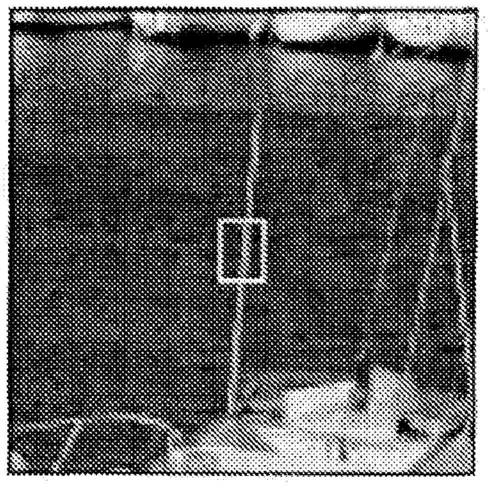

FIG. 130A is a diagram for describing an example of the relationship between a fine line in an image imaged by a sensor and the background.

Figure 130B:
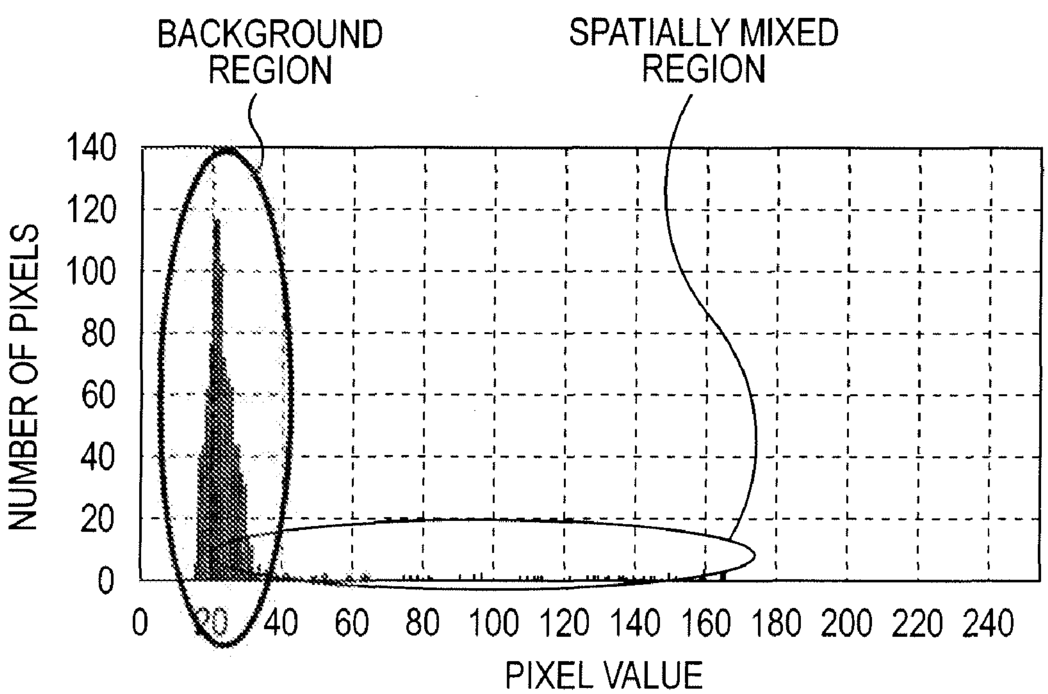

FIG. 130B is a diagram for describing an example of the relationship between a fine line in an image imaged by a sensor and the background.

Figure 131A:
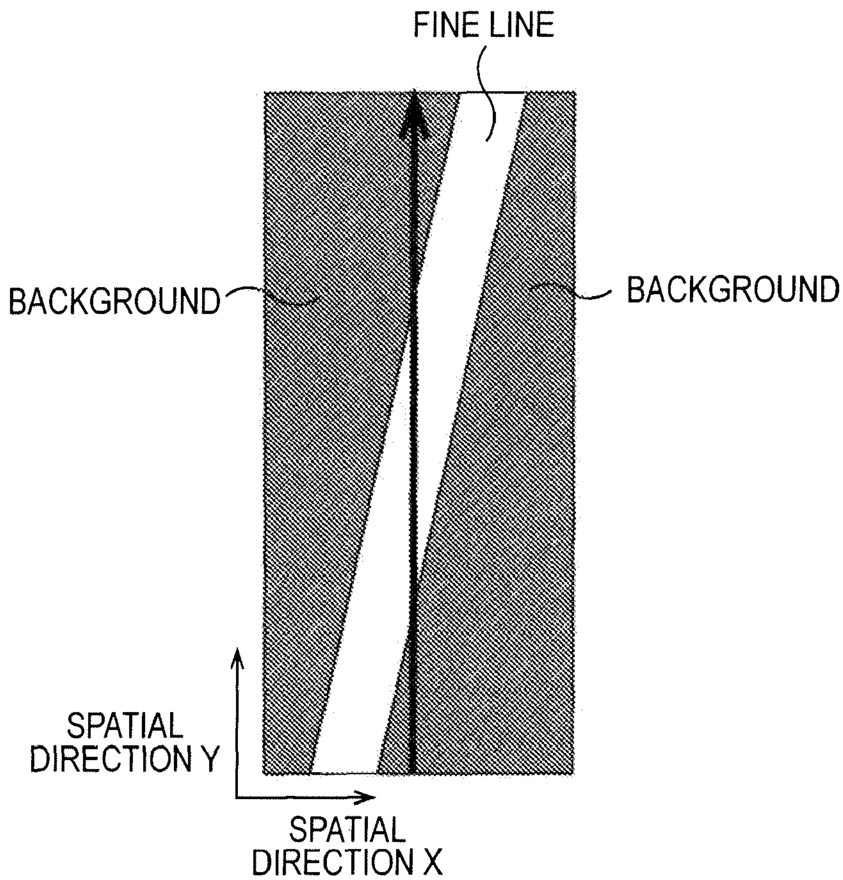

FIG. 131A is a diagram for describing the relationship between a fine line in an image in the real world and the background.

Figure 131B:
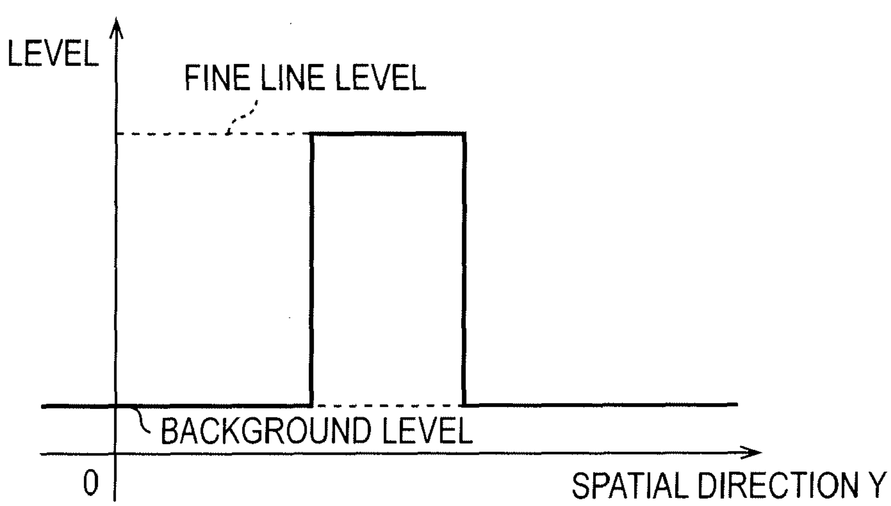

FIG. 131B is a diagram for describing the relationship between a fine line in an image in the real world and the background.

Figure 132A:
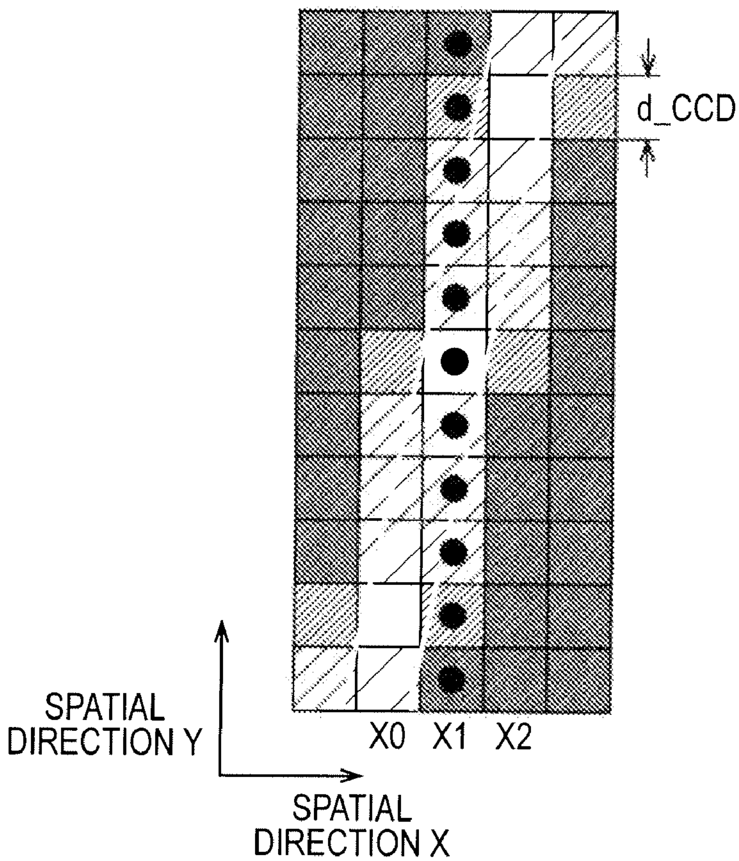

FIG. 132A is a diagram for describing the relationship between a fine line in an image imaged by a sensor and the background.

Figure 132B:
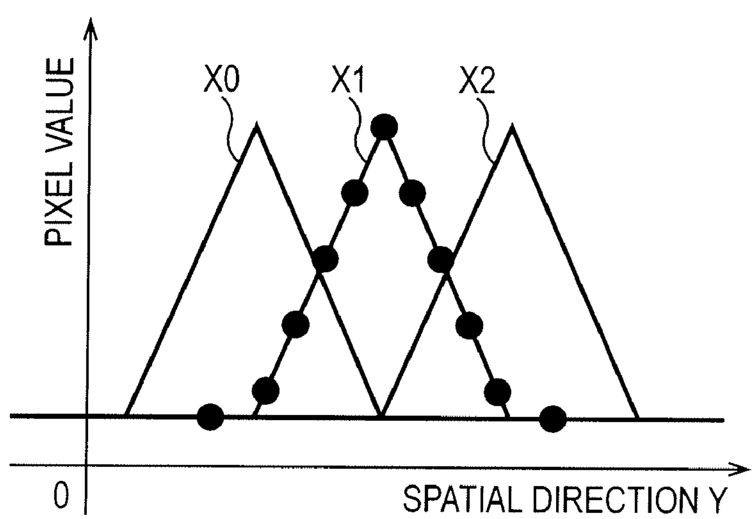

FIG. 132B is a diagram for describing the relationship between a fine line in an image imaged by a sensor and the background.

Figure 133A:
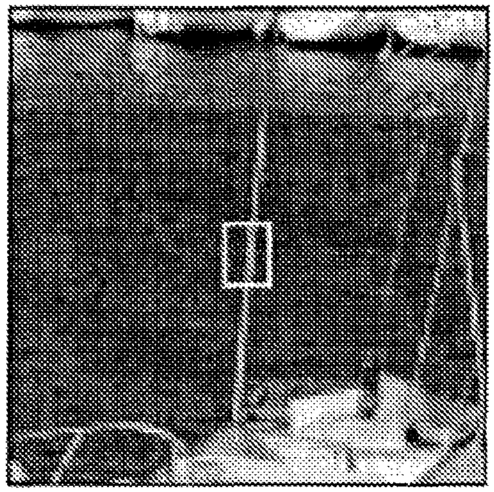

FIG. 133A is a diagram for describing an example of the relationship between a fine line in an image imaged by a sensor and the background.

Figure 133B:
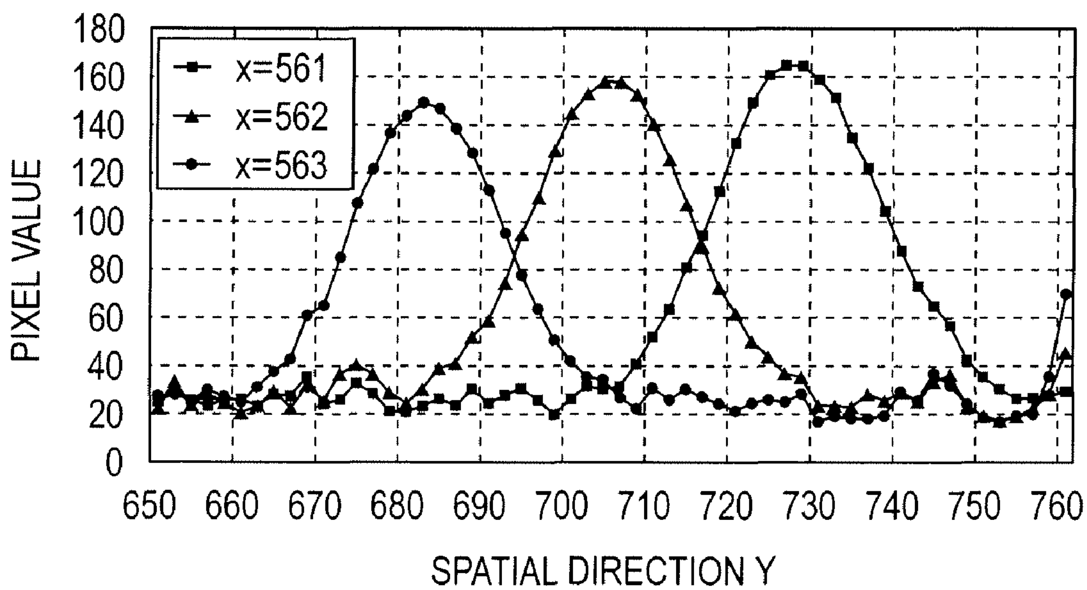

FIG. 133B is a diagram for describing an example of the relationship between a fine line in an image imaged by a sensor and the background.

Figure 134:
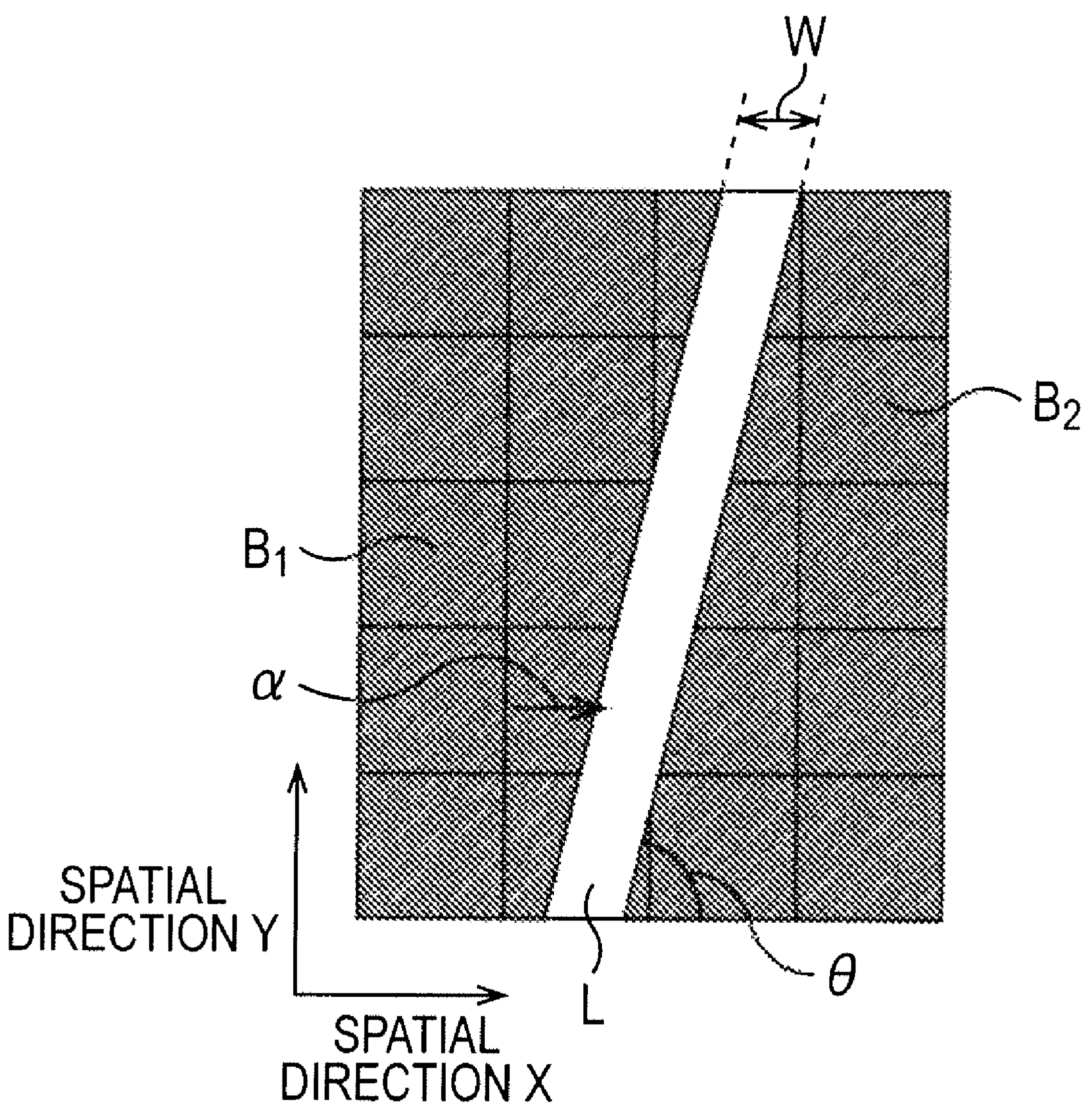

FIG. 134 is a diagram illustrating a model for obtaining the angle of a fine line.

Figure 135:
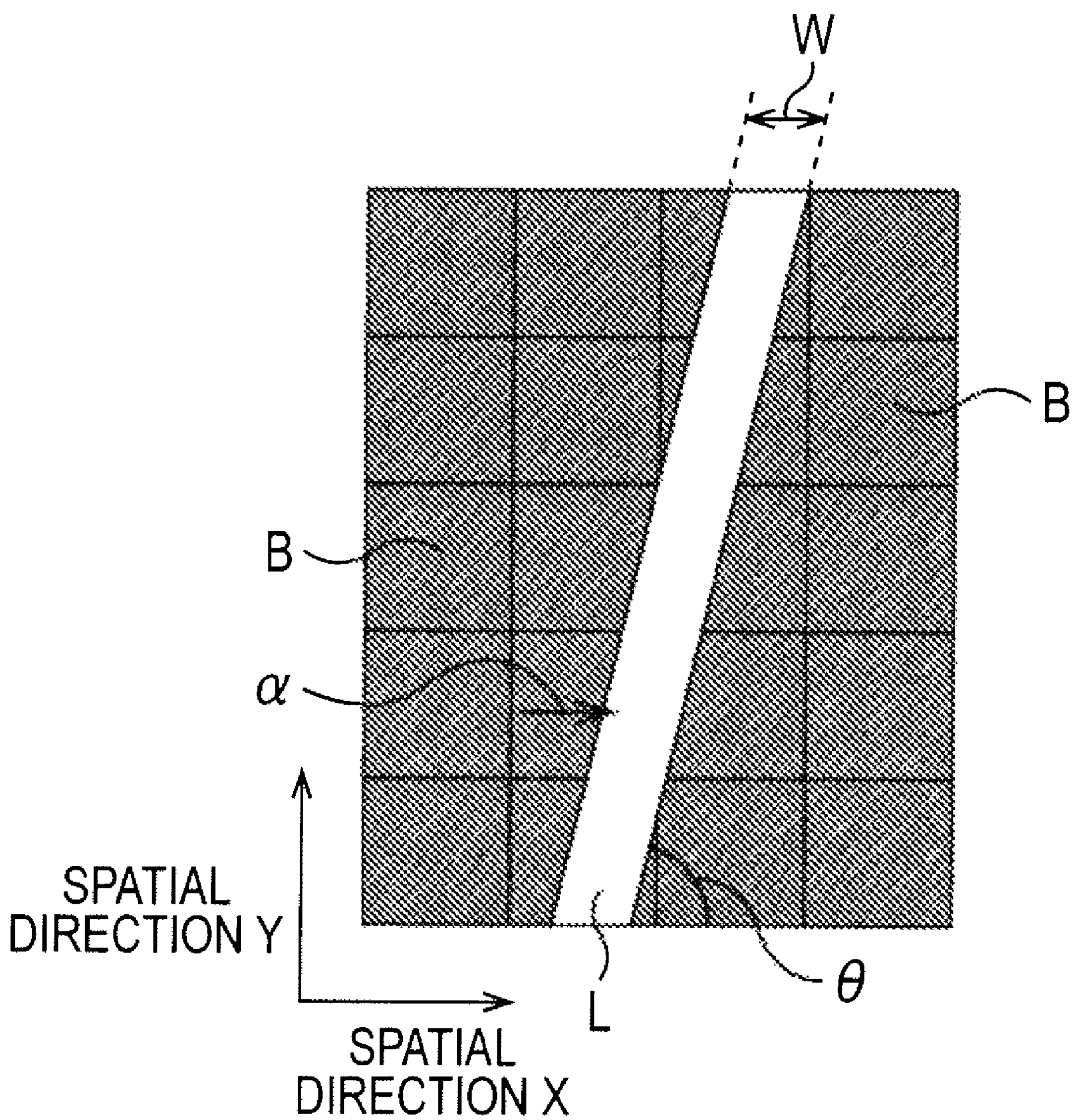

FIG. 135 is a diagram illustrating a model for obtaining the angle of a fine line.

Figure 136A:
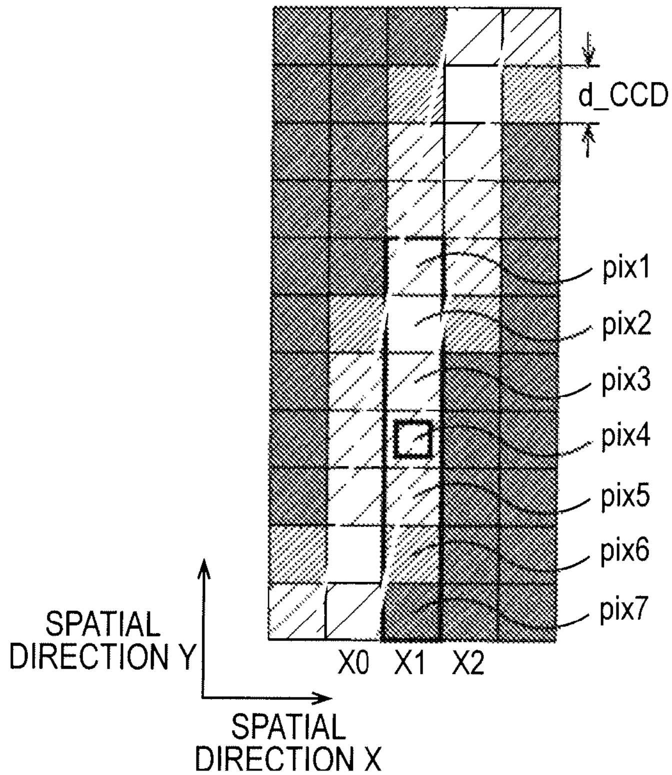

FIG. 136A is a diagram for describing the maximum value and minimum value of pixel values in a dynamic range block corresponding to a pixel of interest.

Figure 136B:
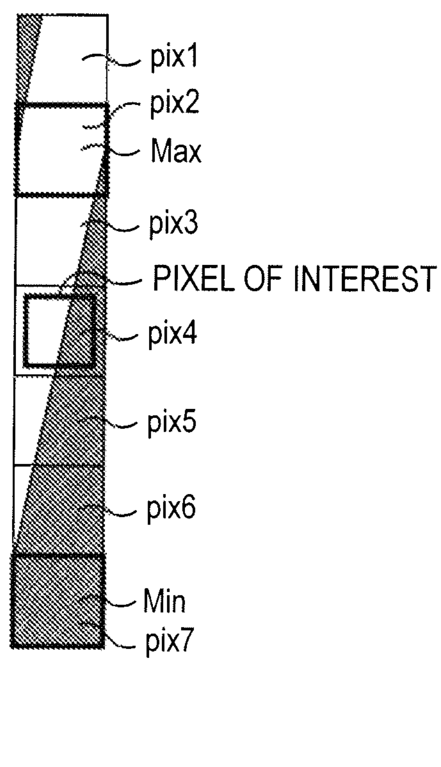

FIG. 136B is a diagram for describing the maximum value and minimum value of pixel values in a dynamic range block corresponding to a pixel of interest.

Figure 137A:
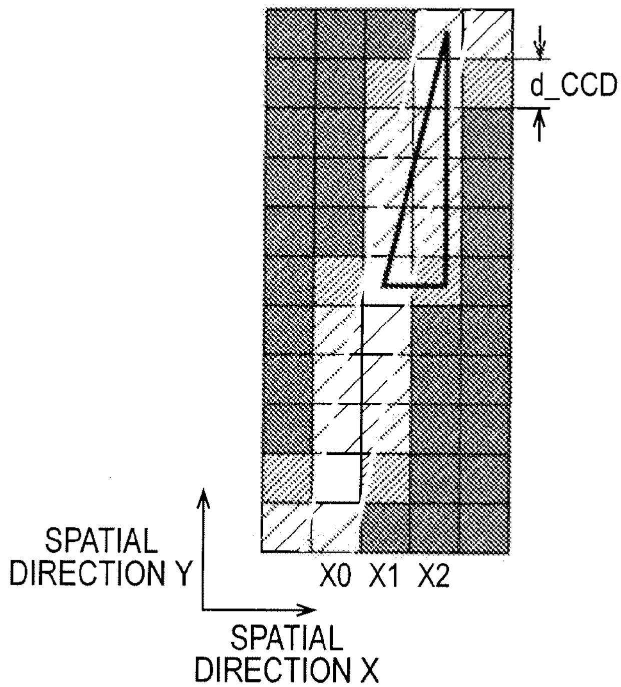

FIG. 137A is a diagram for describing how to obtain the angle of a fine line.

Figure 137B:
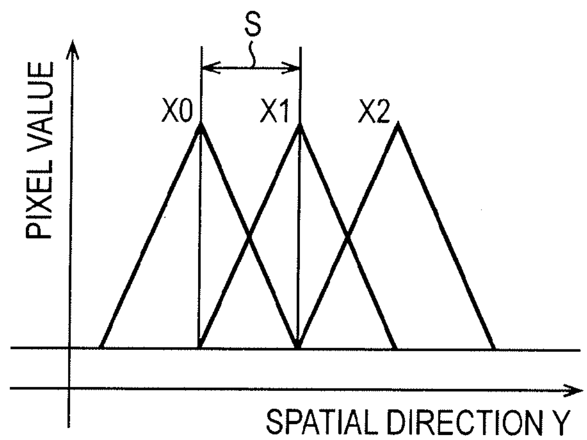

FIG. 137B is a diagram for describing how to obtain the angle of a fine line.

Figure 137C:
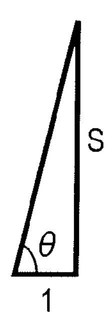

FIG. 137C is a diagram for describing how to obtain the angle of a fine line.

Figure 138:
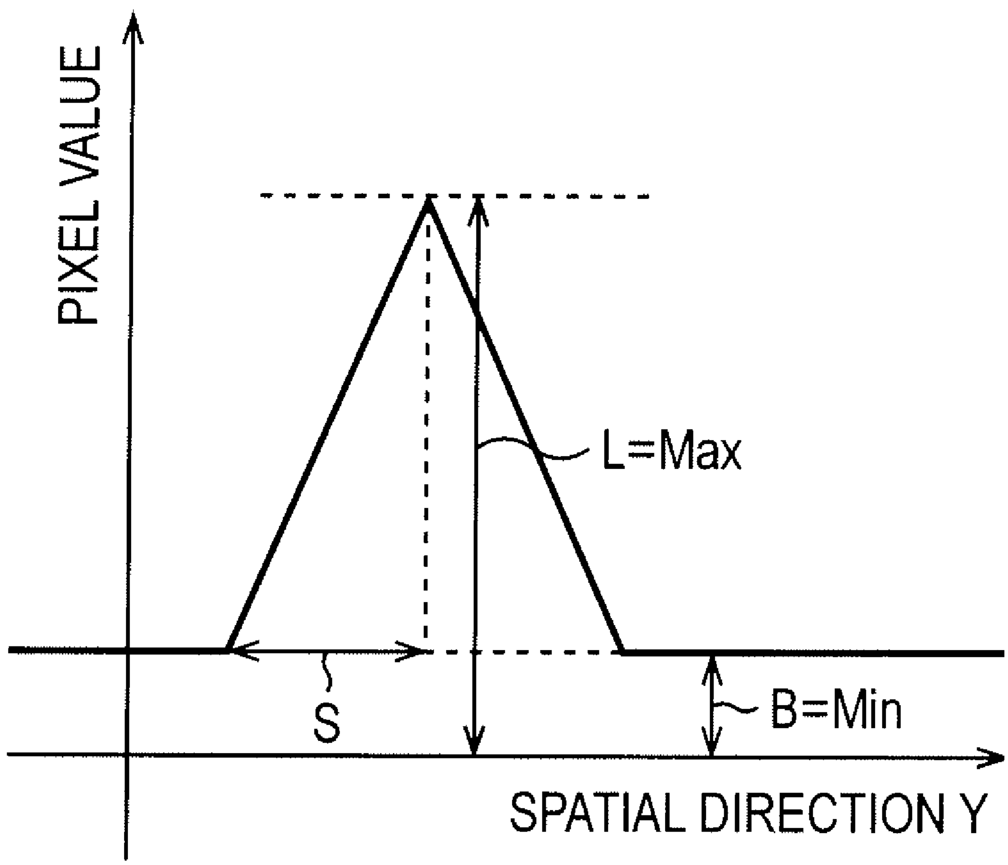

FIG. 138 is a diagram for describing how to obtain the angle of a fine line.

Figure 139:
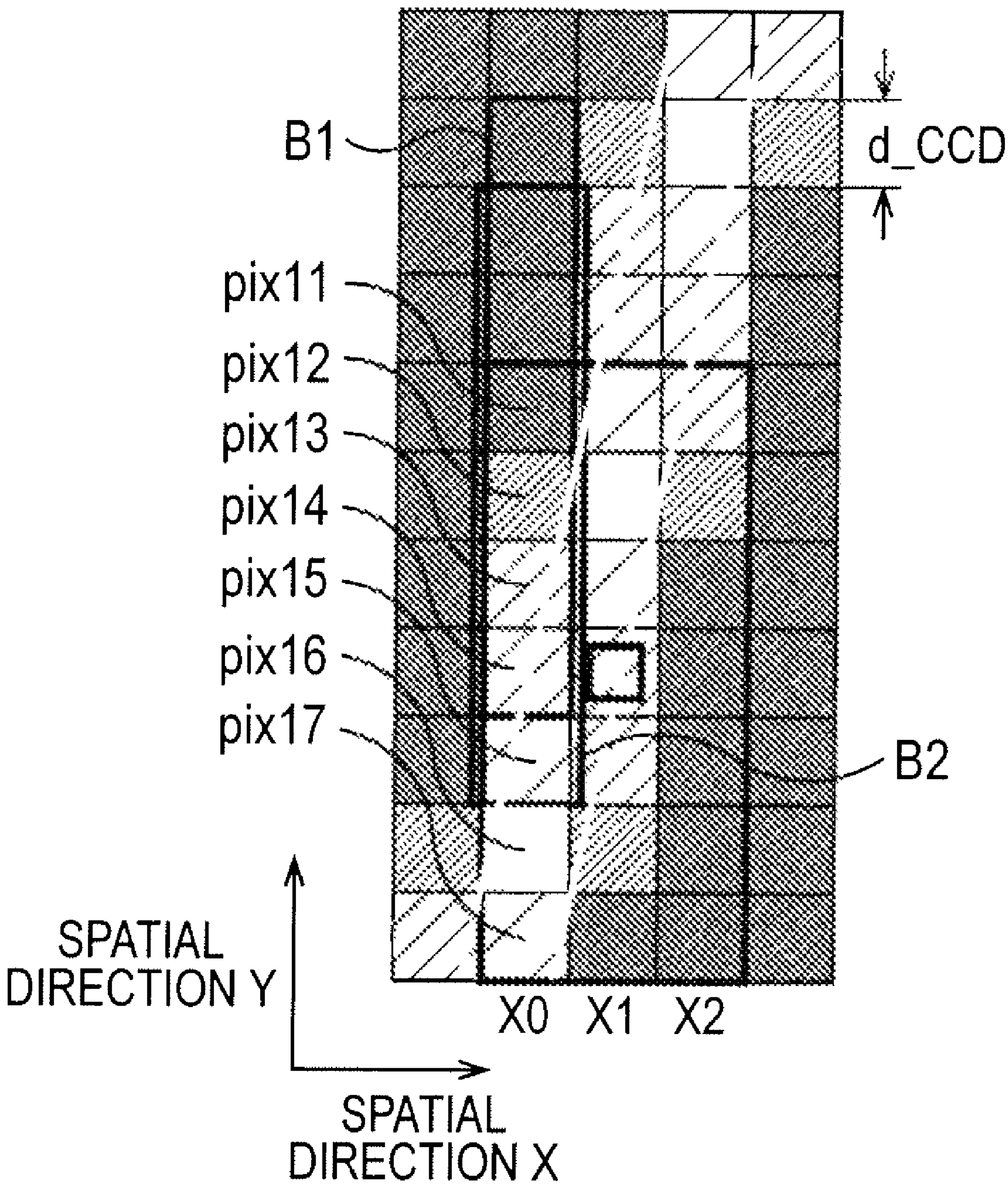

FIG. 139 is a diagram for describing an extracted block and dynamic range block.

Figure 140:
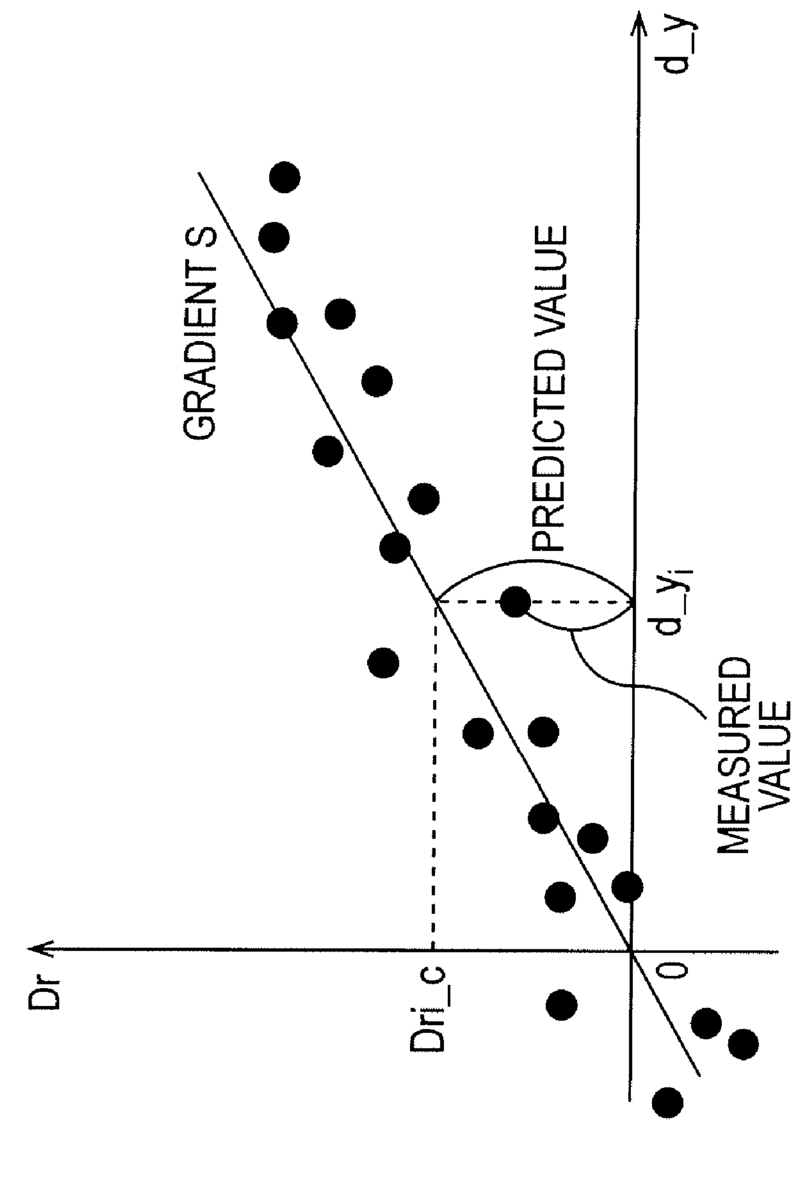

FIG. 140 is a diagram for describing a least-square solution.

Figure 141:
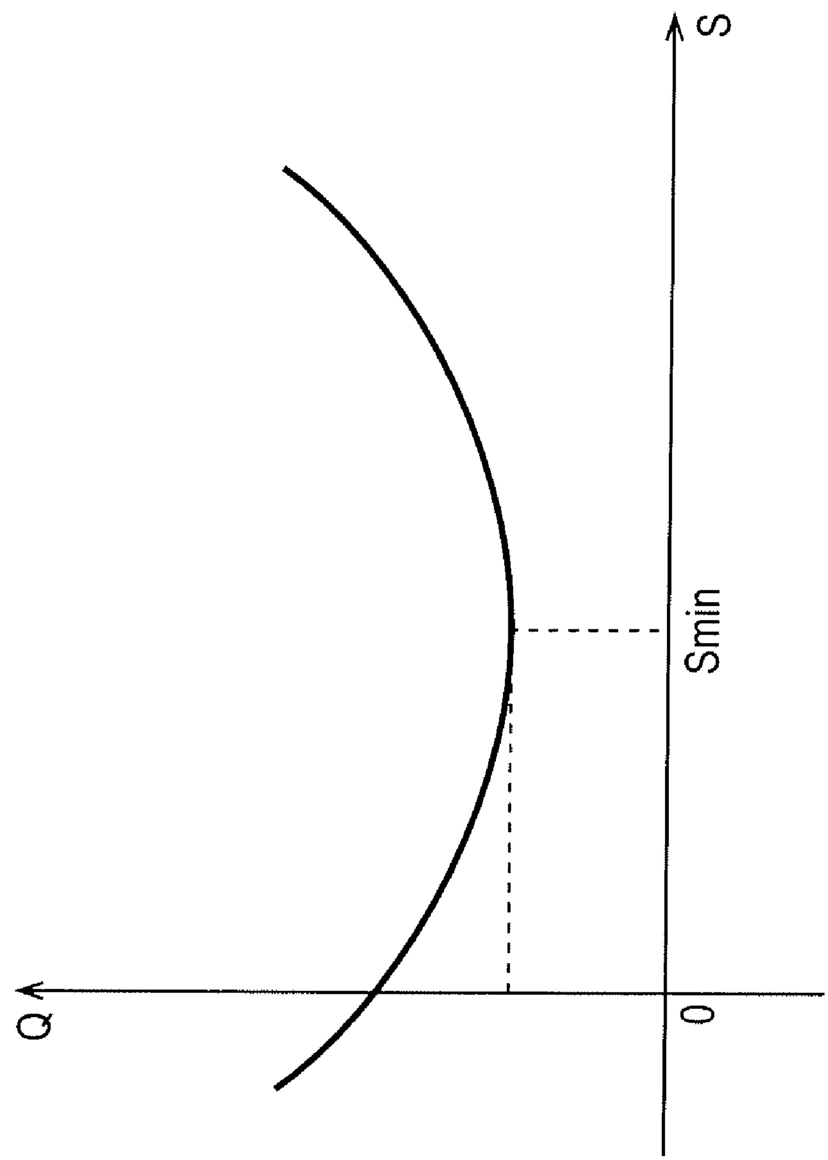

FIG. 141 is a diagram for describing a least-square solution.

Figure 142A:
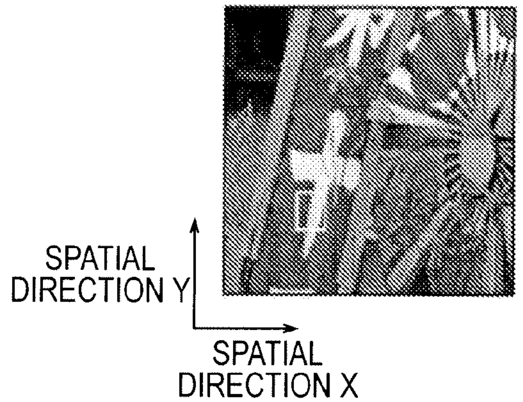

FIG. 142A is a diagram for describing a two-valued edge.

Figure 142B:
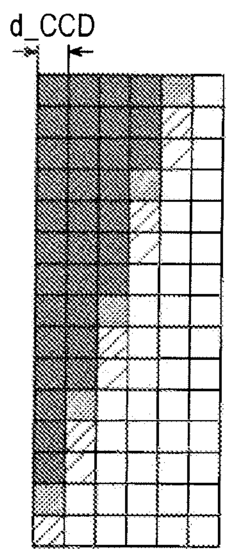

FIG. 142B is a diagram for describing a two-valued edge.

Figure 142C:
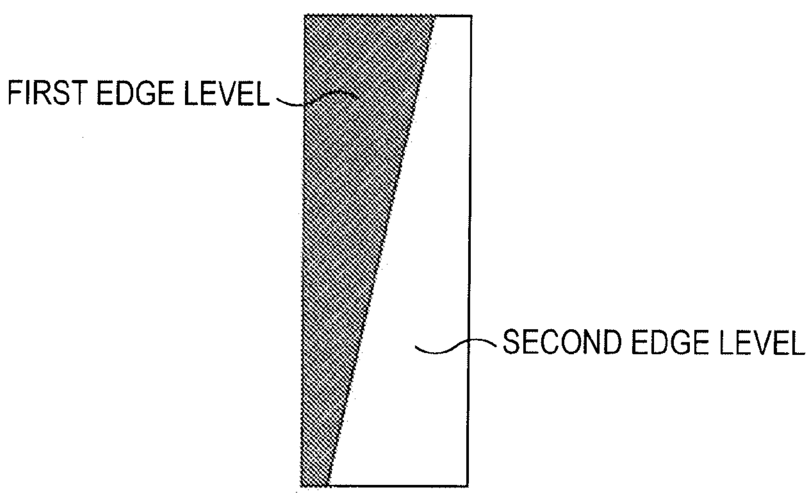

FIG. 142C is a diagram for describing a two-valued edge.

Figure 143A:
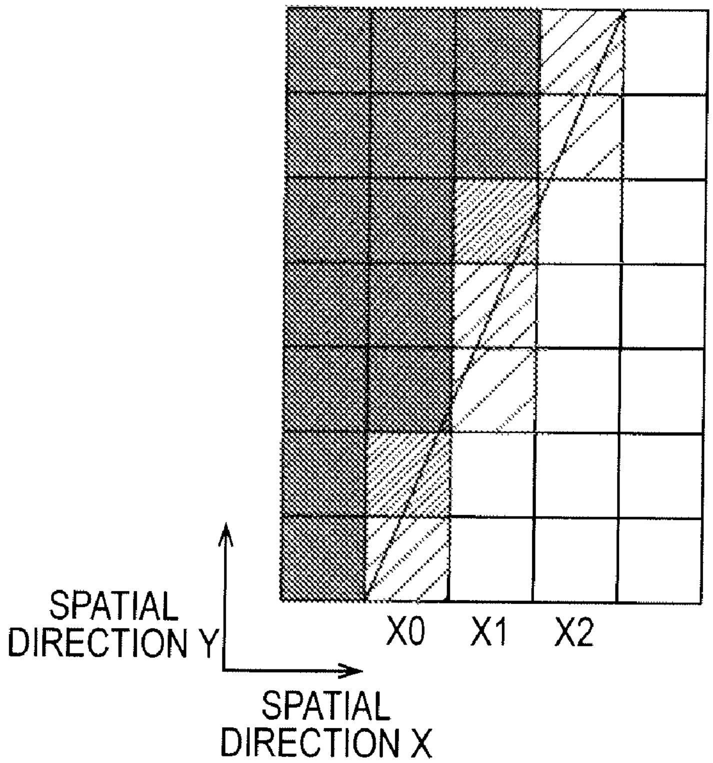

FIG. 143A is a diagram for describing a two-valued edge of an image imaged by a sensor.

Figure 143B:
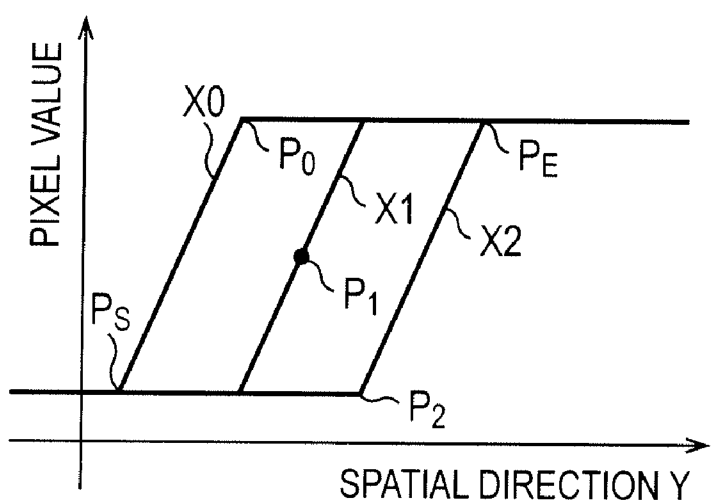

FIG. 143B is a diagram for describing a two-valued edge of an image imaged by a sensor.

Figure 144A:
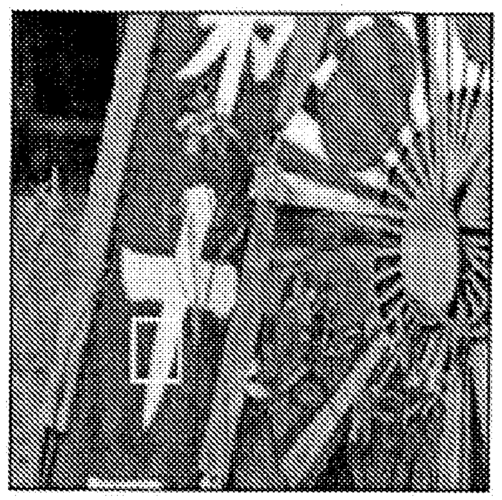

FIG. 144A is a diagram for describing an example of a two-valued edge of an image imaged by a sensor.

Figure 144B:
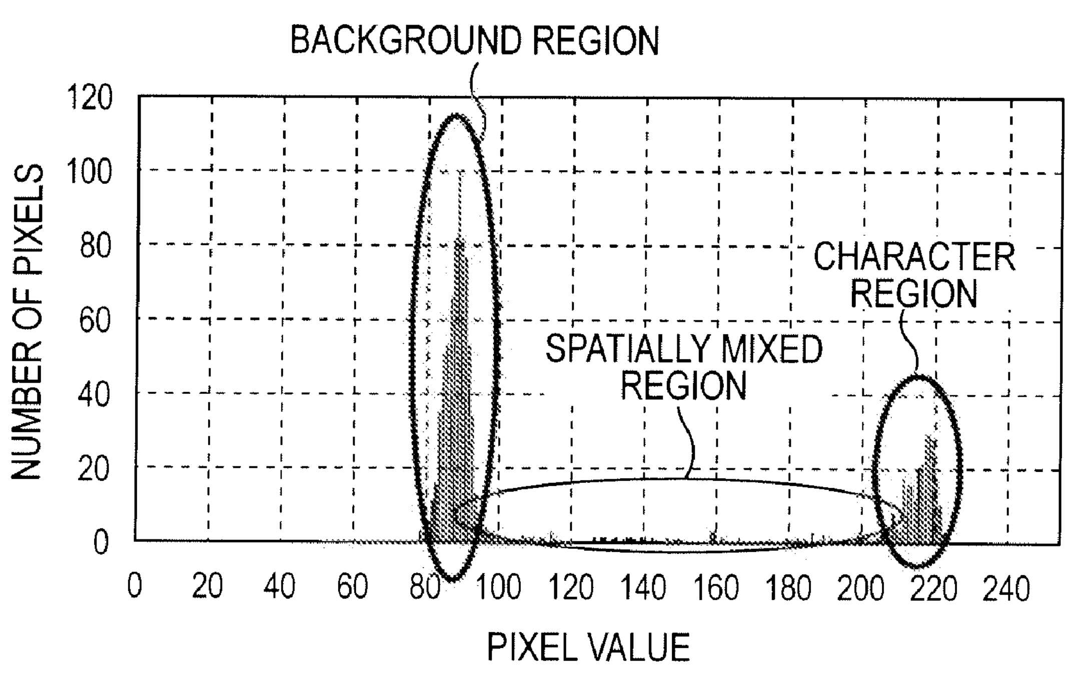

FIG. 144B is a diagram for describing an example of a two-valued edge of an image imaged by a sensor.

Figure 145A:
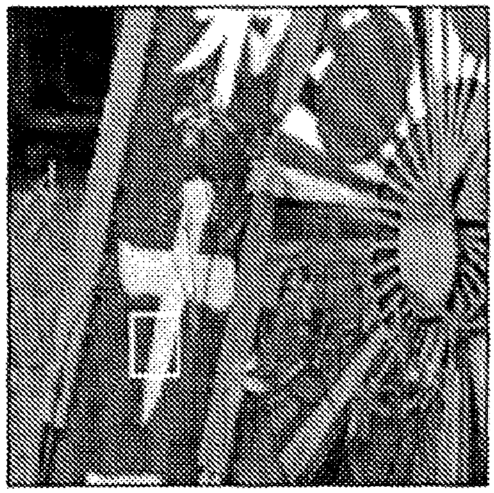

FIG. 145A is a diagram for describing a two-valued edge of an image imaged by a sensor.

Figure 145B:
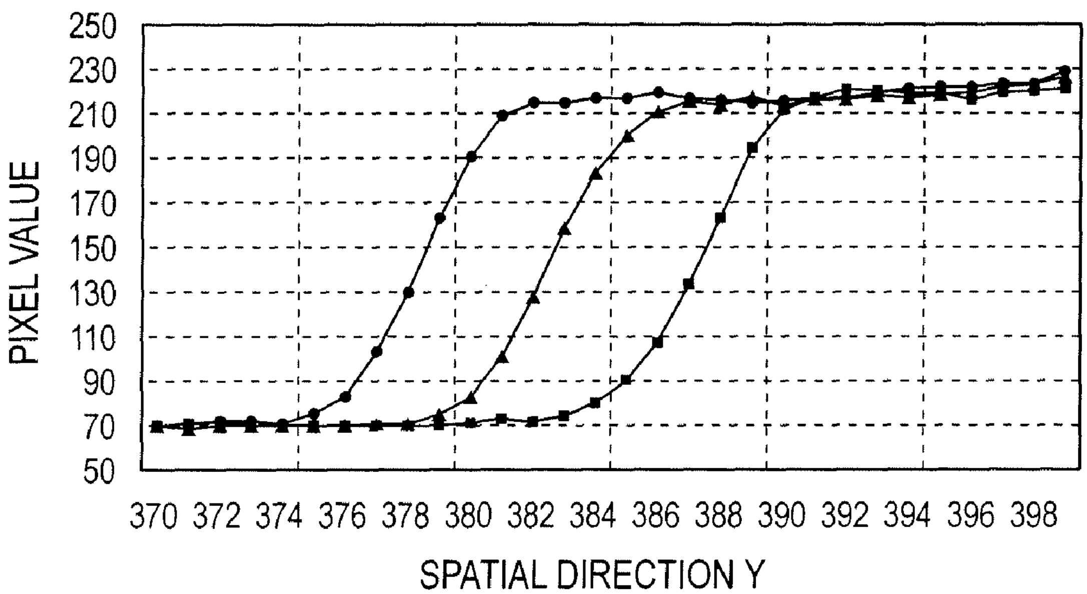

FIG. 145B is a diagram for describing a two-valued edge of an image imaged by a sensor.

Figure 146:
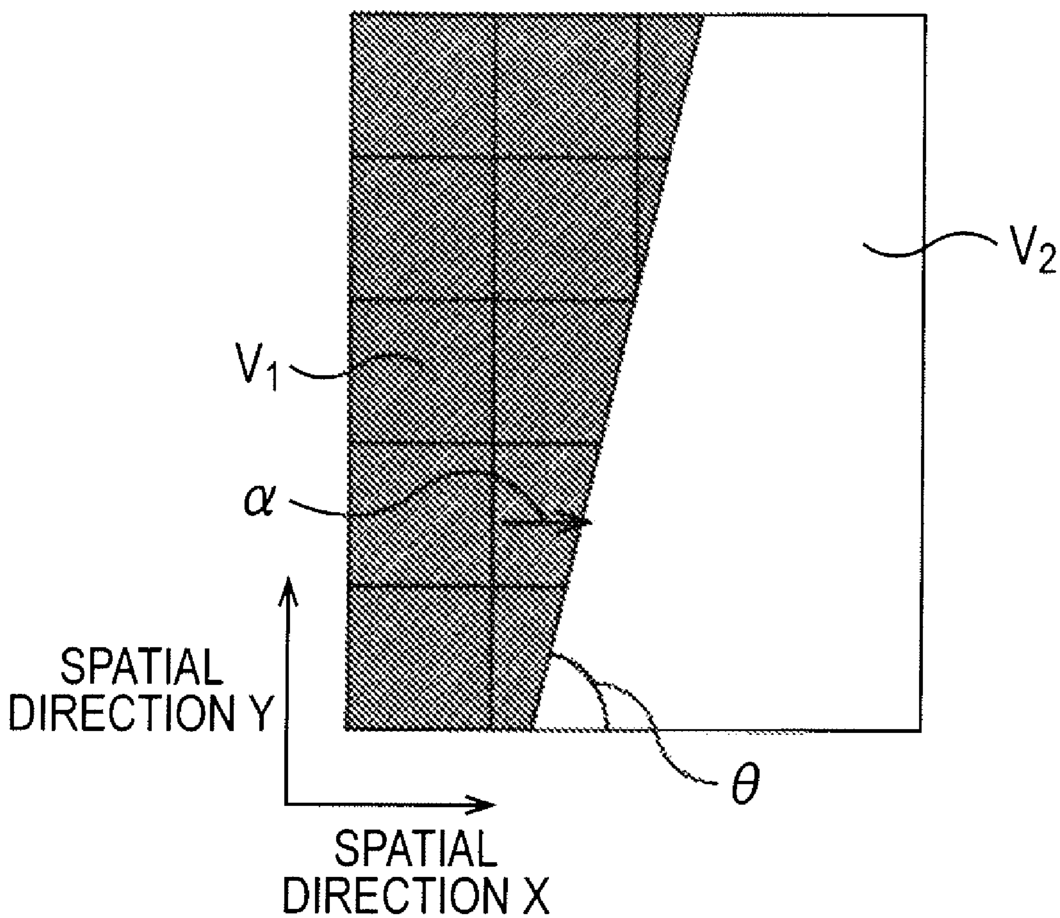

FIG. 146 is a diagram illustrating a model for obtaining the angle of a two-valued edge.

Figure 147A:
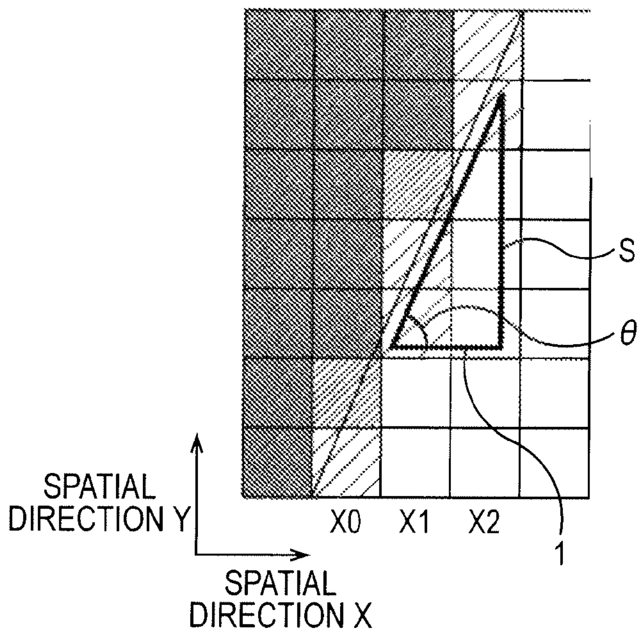

FIG. 147A is a diagram illustrating a method for obtaining the angle of a two-valued edge.

Figure 147B:
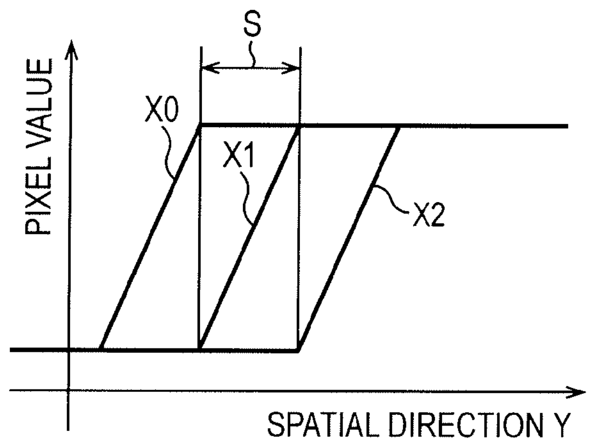

FIG. 147B is a diagram illustrating a method for obtaining the angle of a two-valued edge.

Figure 147C:
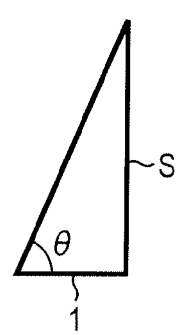

FIG. 147C is a diagram illustrating a method for obtaining the angle of a two-valued edge.

Figure 148:
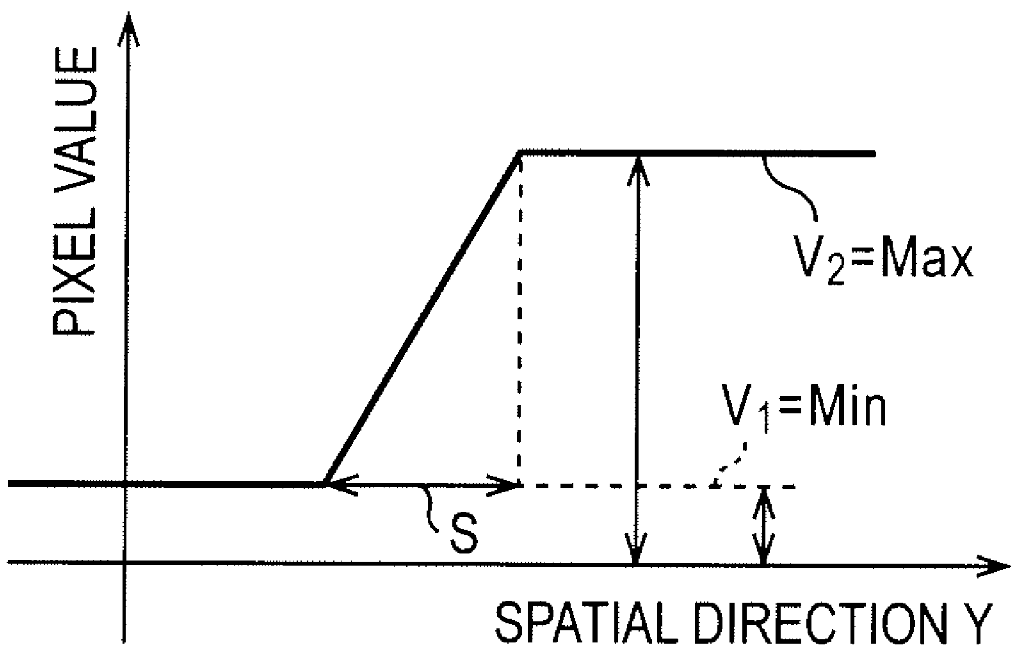

FIG. 148 is a diagram illustrating a method for obtaining the angle of a two-valued edge.

Figure 149:
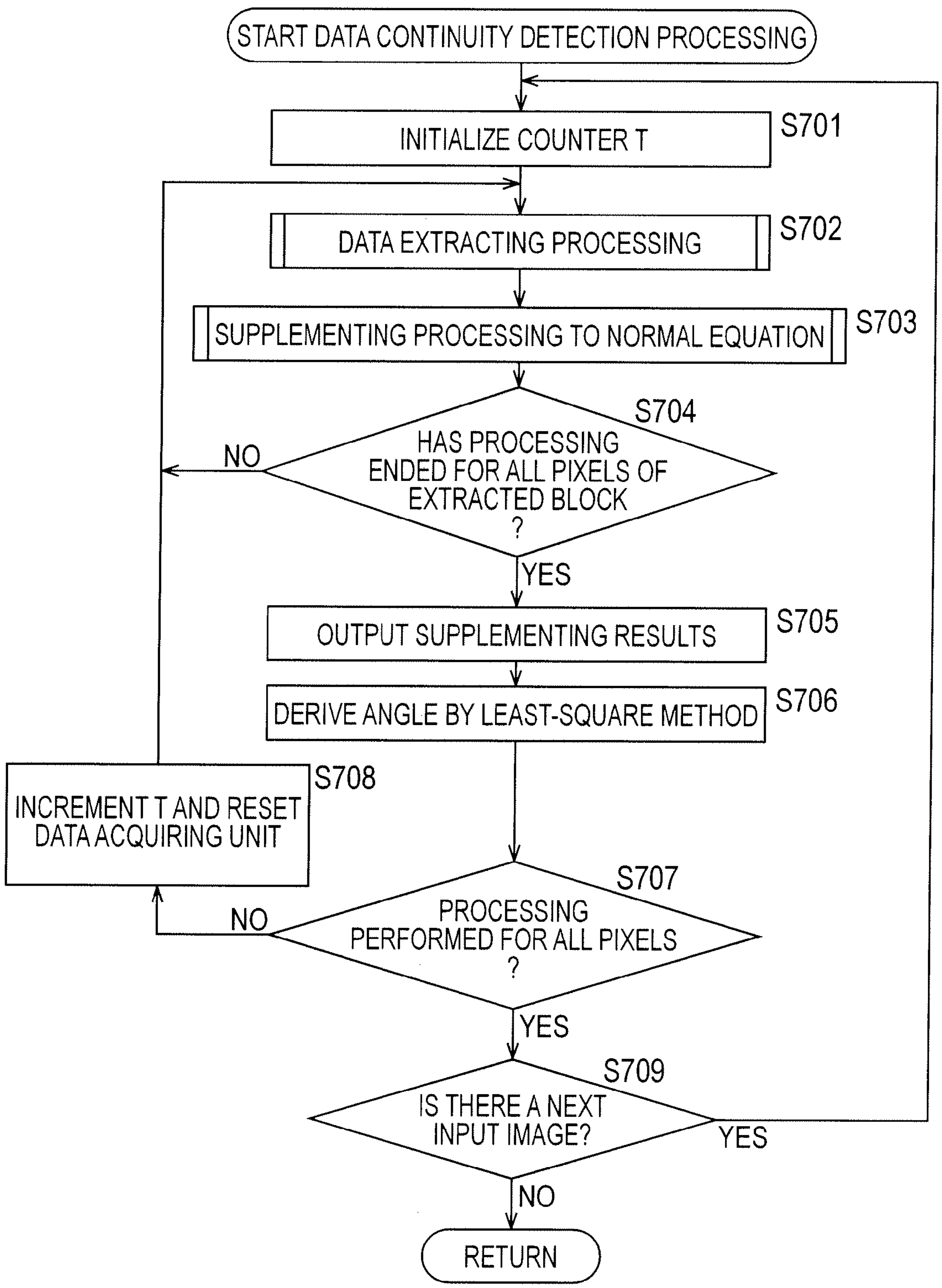

FIG. 149 is a flowchart for describing the processing for detecting the angle of a fine line or a two-valued edge along with data continuity.

Figure 150:
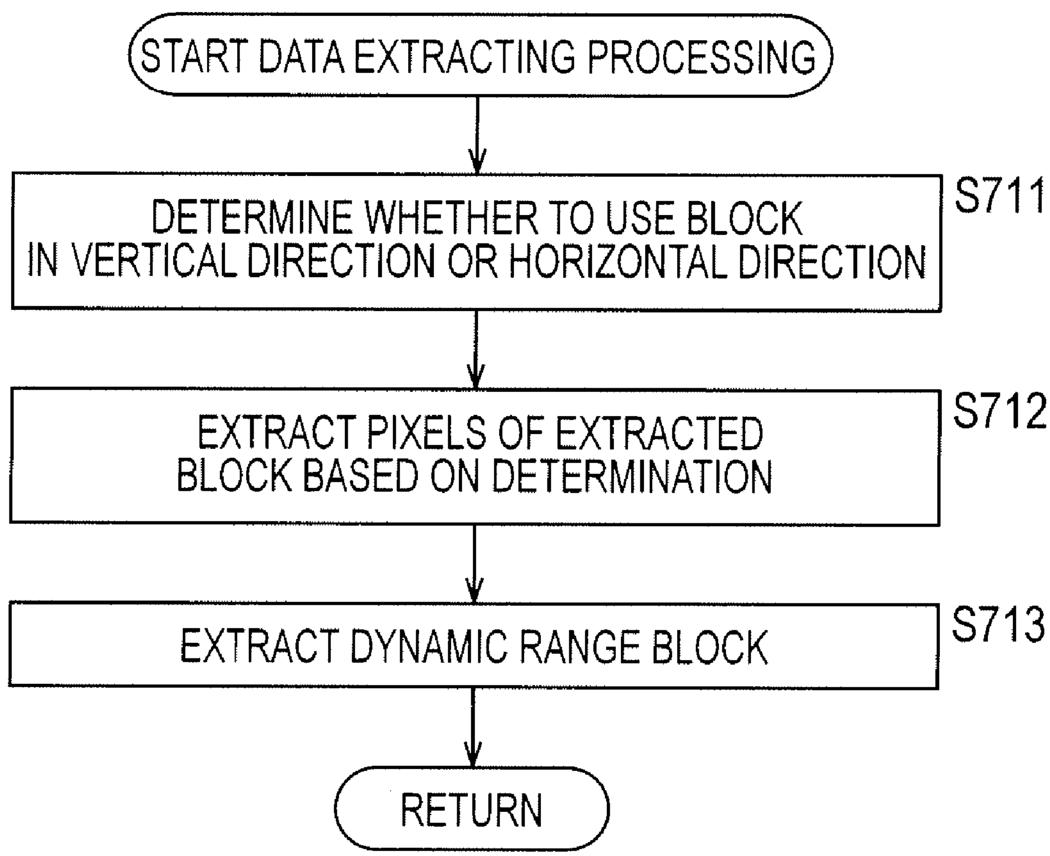

FIG. 150 is a flowchart for describing data extracting processing.

Figure 151:
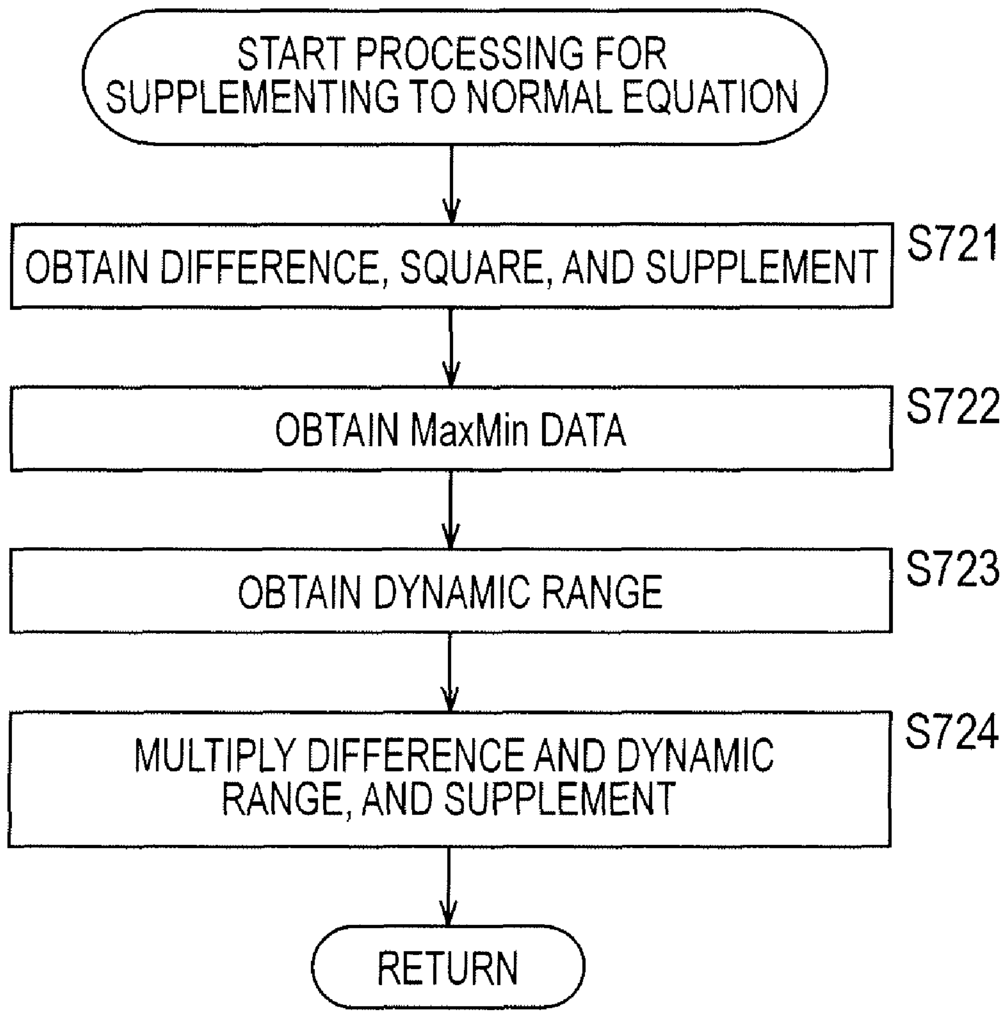

FIG. 151 is a flowchart for describing addition processing to a normal equation.

Figure 152A:
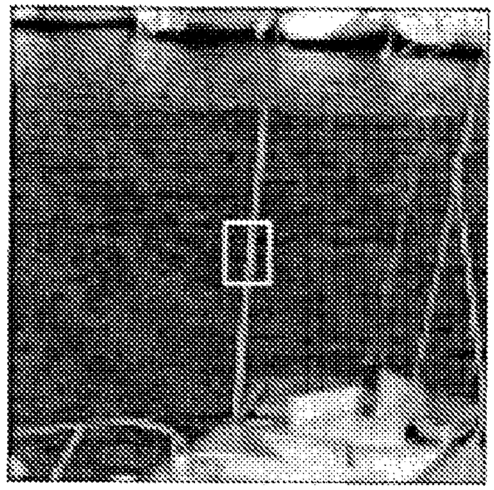

FIG. 152A is a diagram for comparing the gradient of a fine line obtained by application of the present invention, and the angle of a fine line obtained using correlation.

Figure 152B:
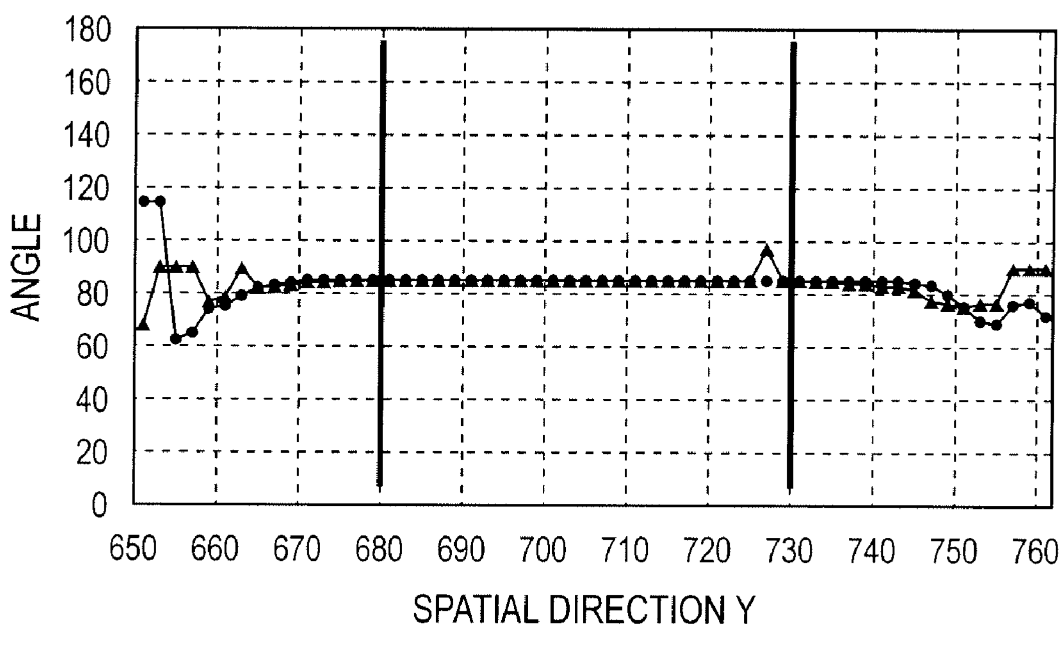

FIG. 152B is a diagram for comparing the gradient of a fine line obtained by application of the present invention, and the angle of a fine line obtained using correlation.

Figure 153A:
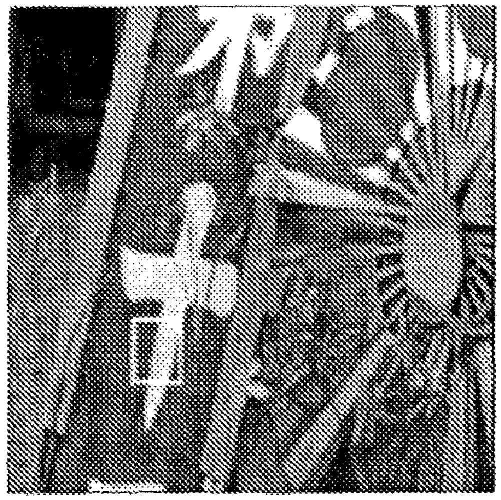

FIG. 153A is a diagram for comparing the gradient of a two-valued edge obtained by application of the present invention, and the angle of a fine line obtained using correlation.

Figure 153B:
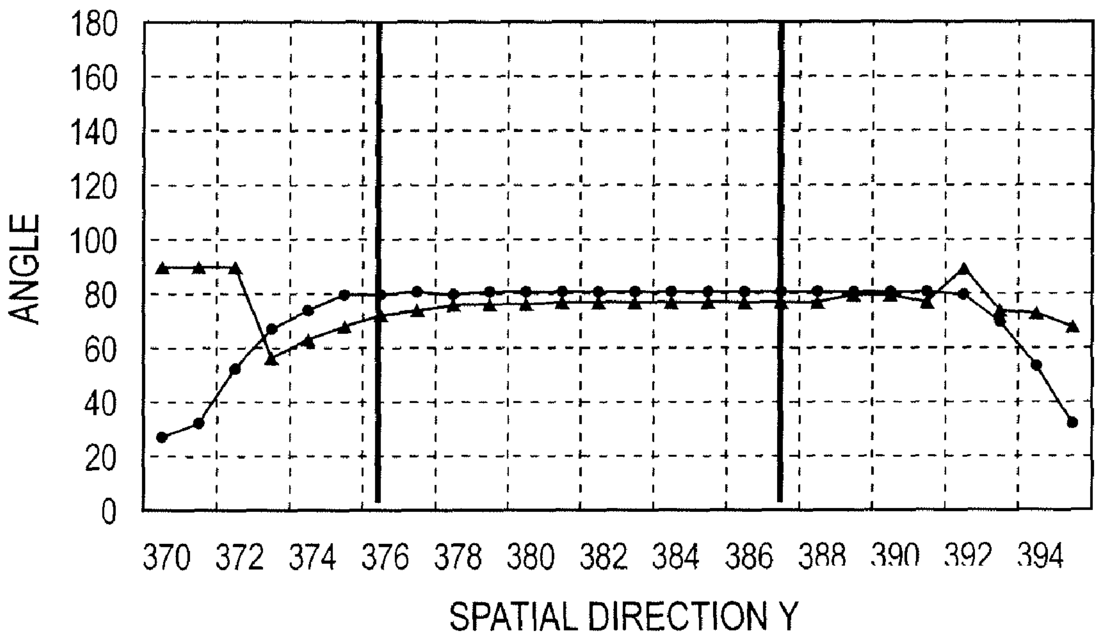

FIG. 153B is a diagram for comparing the gradient of a two-valued edge obtained by application of the present invention, and the angle of a fine line obtained using correlation.

Figure 154:
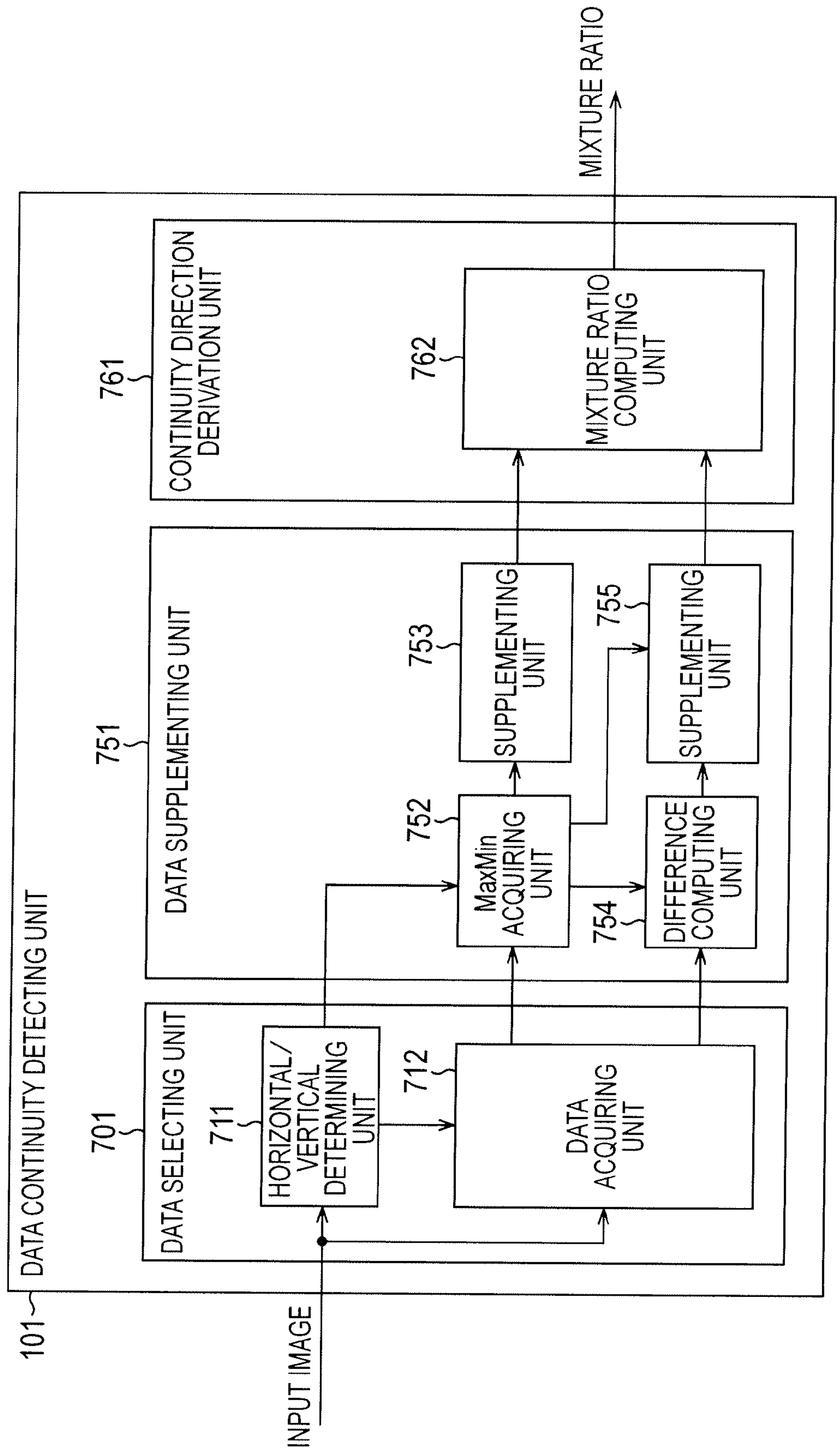

FIG. 154 is a block diagram illustrating the configuration of the data continuity detecting unit for detecting a mixture ratio under application of the present invention as data continuity information.

Figure 155A:
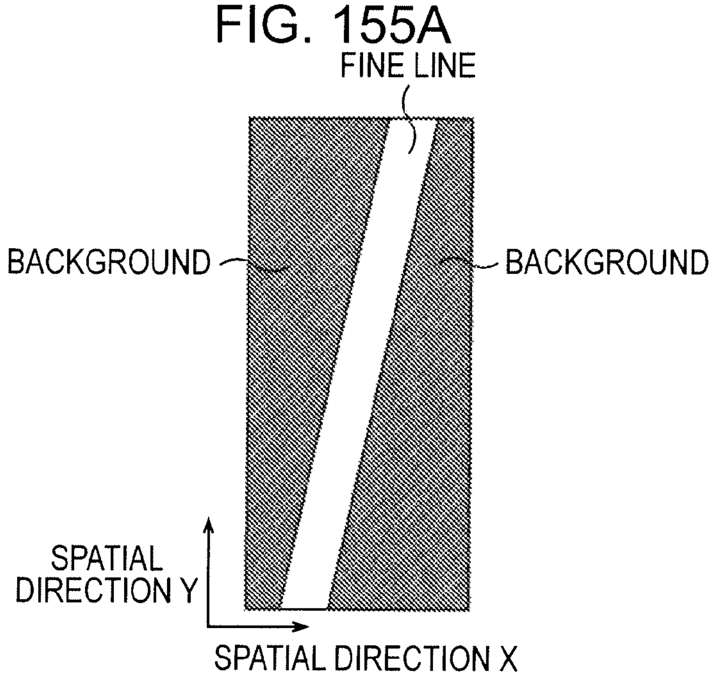

FIG. 155A is a diagram for describing how to obtain the mixture ratio.

Figure 155B:
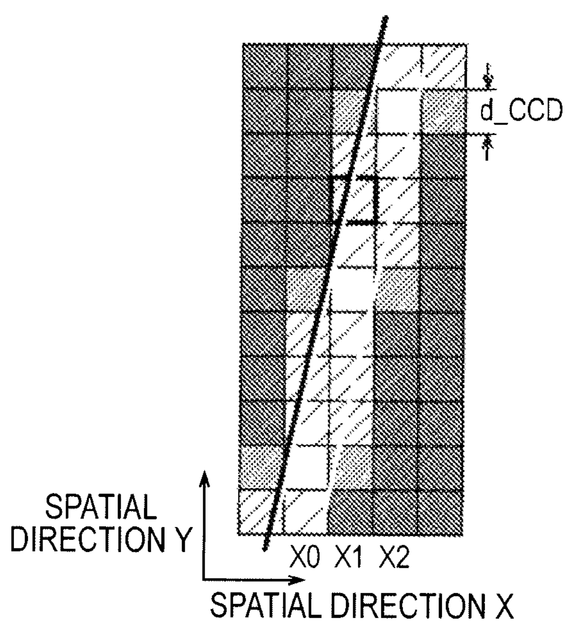

FIG. 155B is a diagram for describing how to obtain the mixture ratio.

Figure 155C:
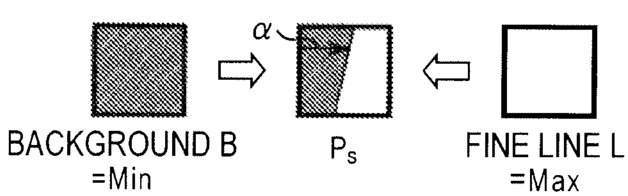

FIG. 155C is a diagram for describing how to obtain the mixture ratio.

Figure 156:
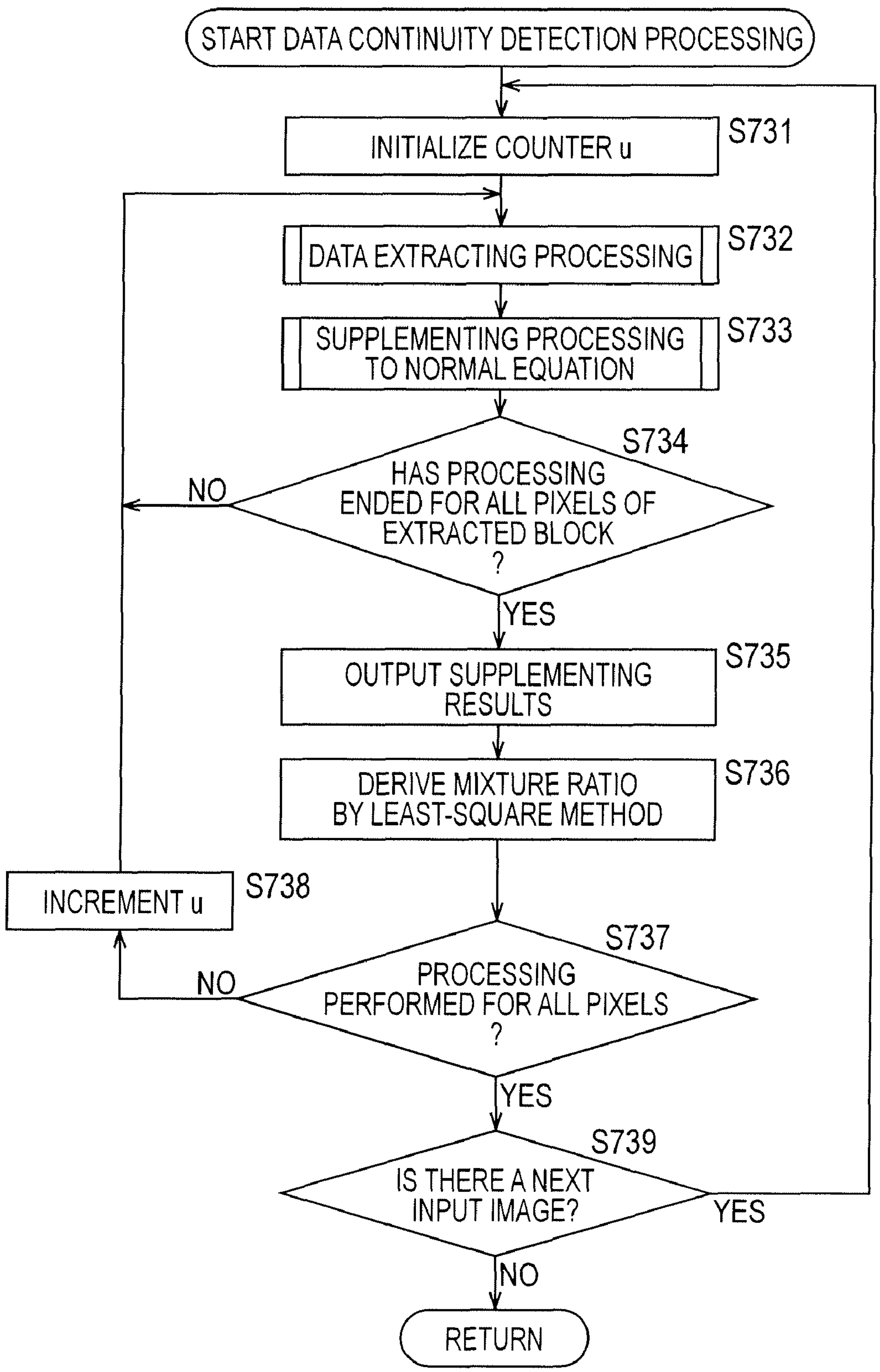

FIG. 156 is a flowchart for describing processing for detecting the mixture ratio along with data continuity.

Figure 157:
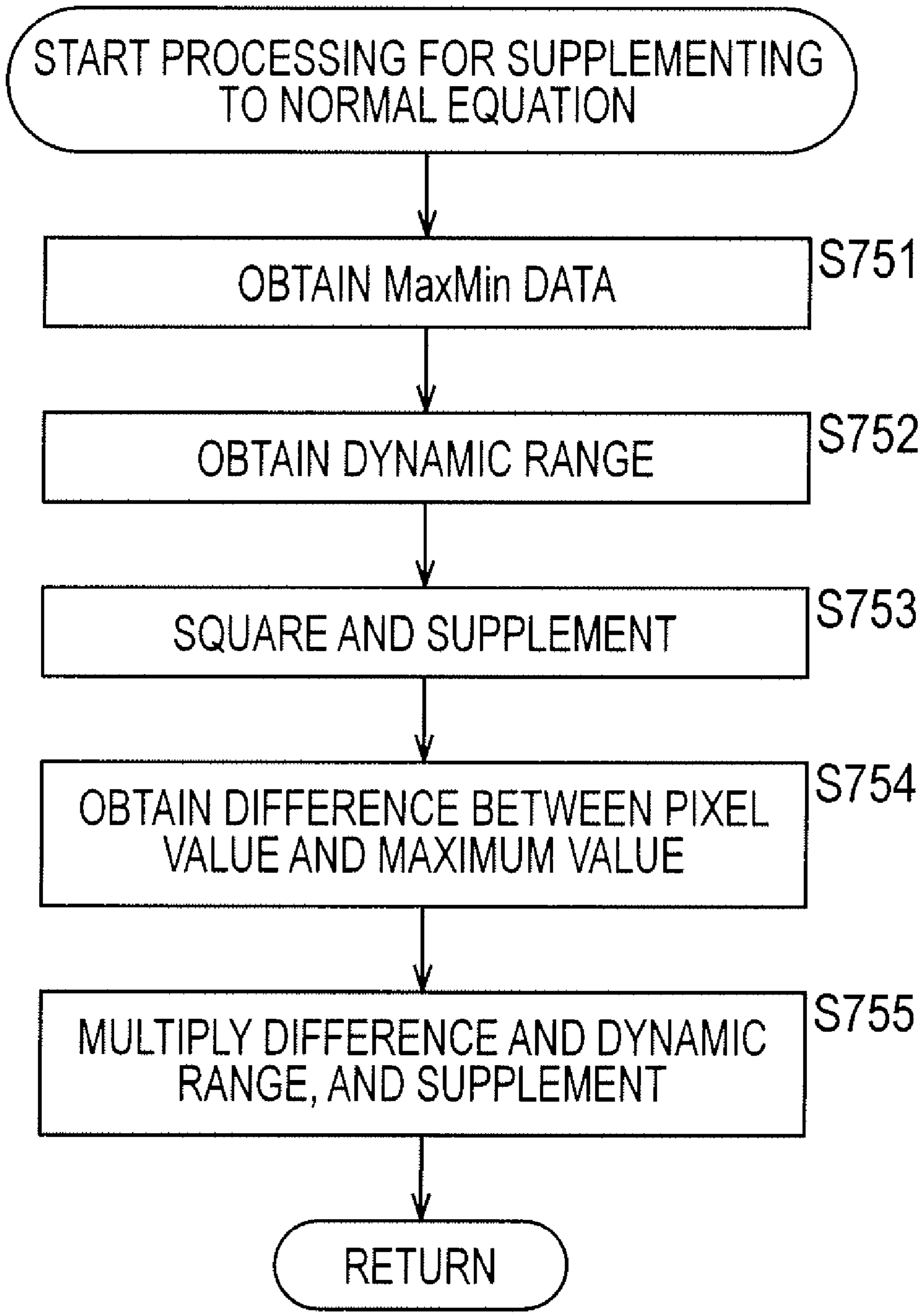

FIG. 157 is a flowchart for describing addition processing to a normal equation.

Figure 158A:
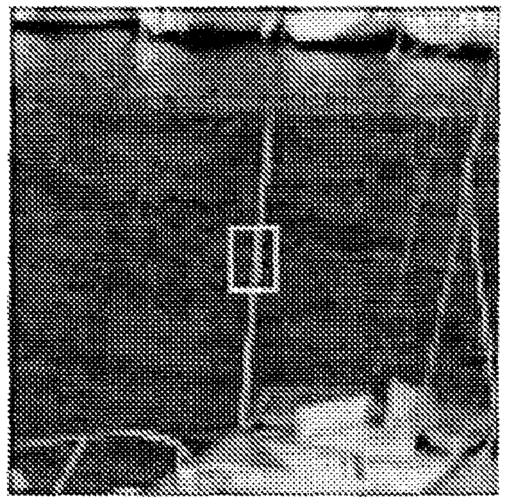

FIG. 158A is a diagram illustrating an example of distribution of the mixture ratio of a fine line.

Figure 158B:
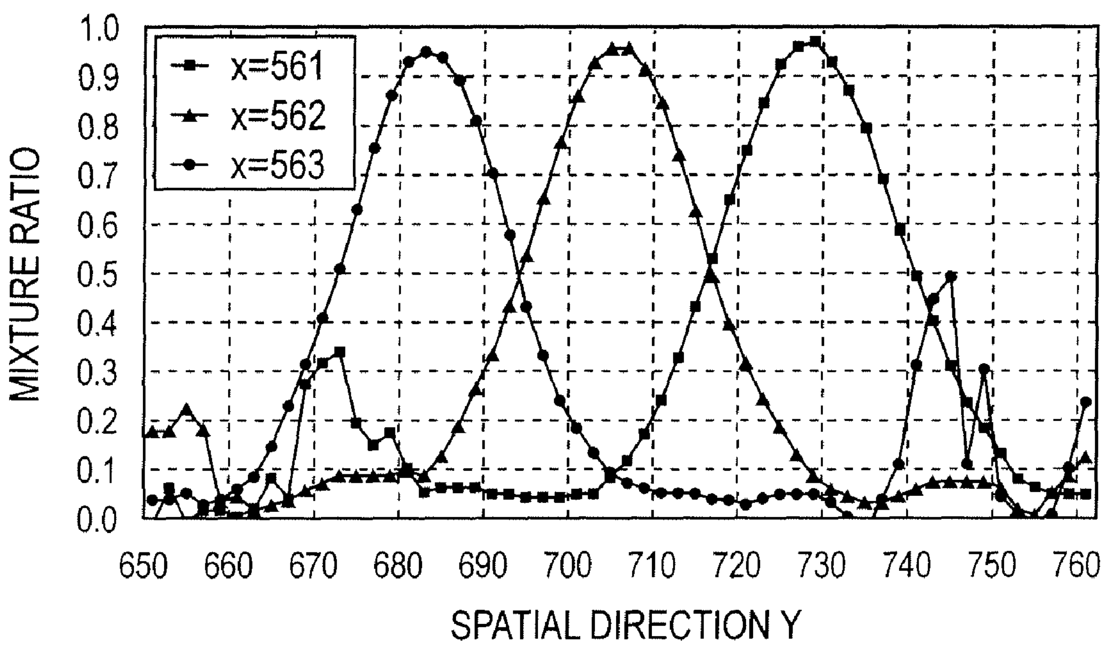

FIG. 158B is a diagram illustrating an example of distribution of the mixture ratio of a fine line.

Figure 159A:
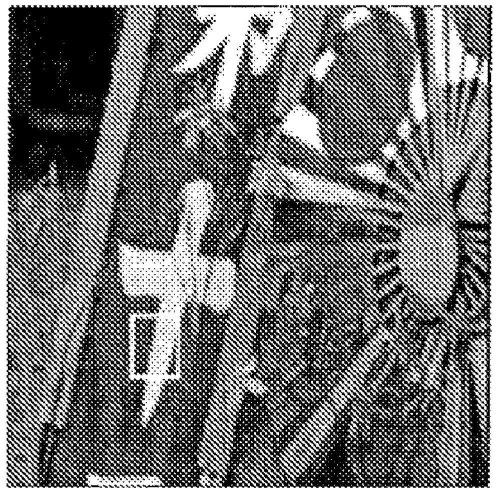

FIG. 159A is a diagram illustrating an example of distribution of the mixture ratio of a two-valued edge.

Figure 159B:
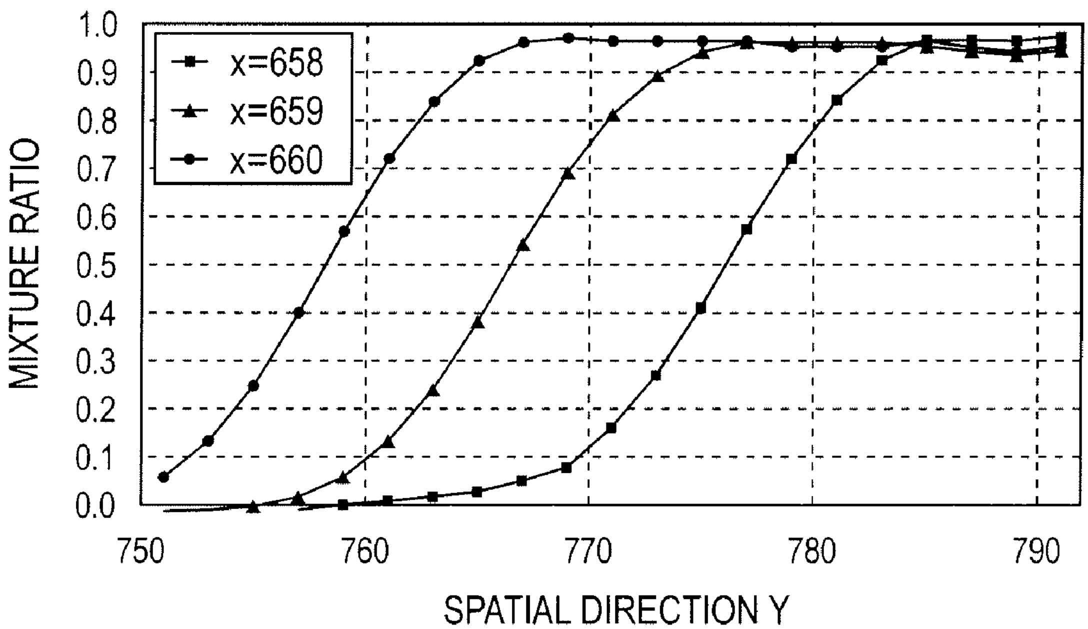

FIG. 159B is a diagram illustrating an example of distribution of the mixture ratio of a two-valued edge.

Figure 160:
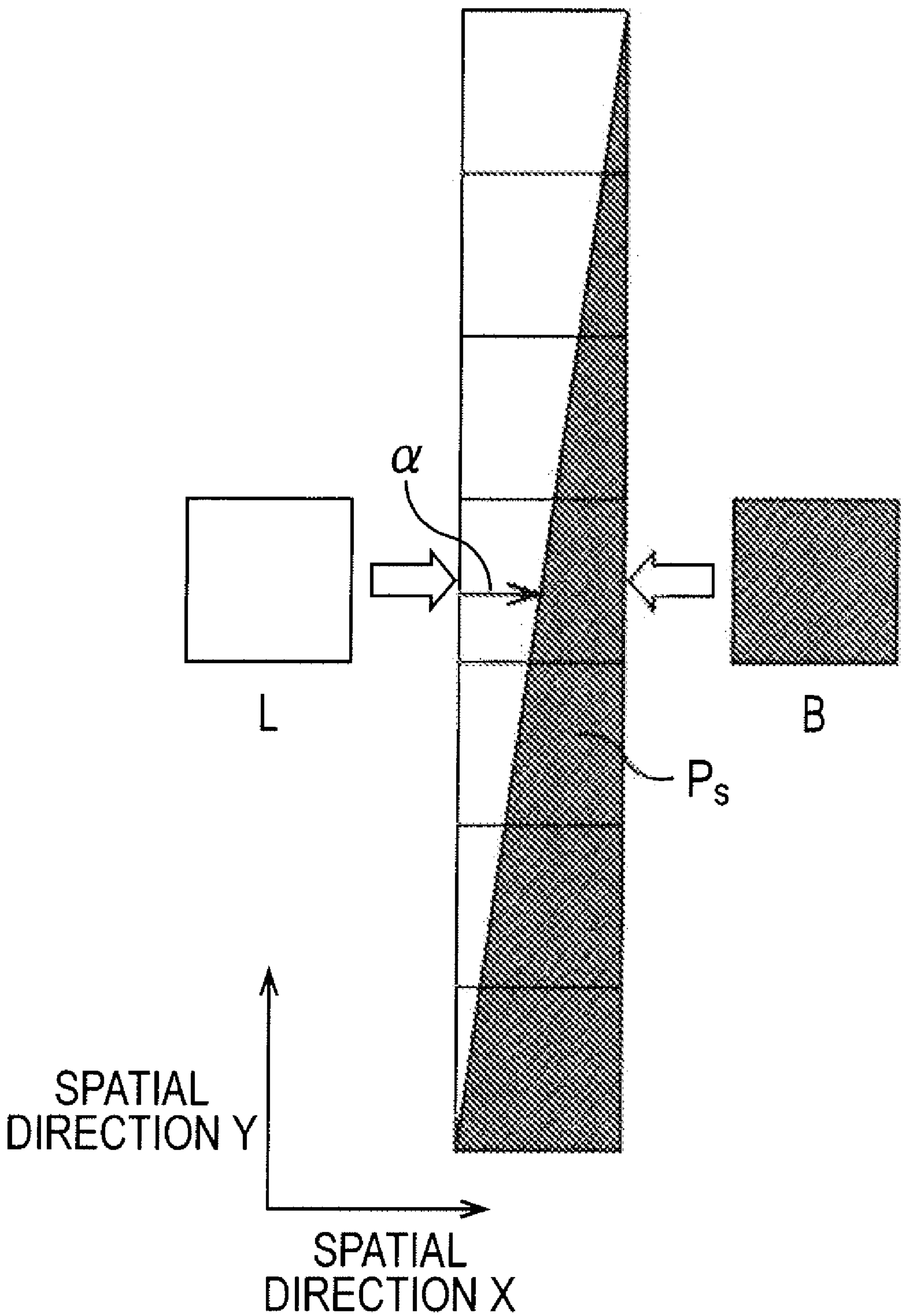

FIG. 160 is a diagram for describing linear approximation of the mixture ratio.

Figure 161A:
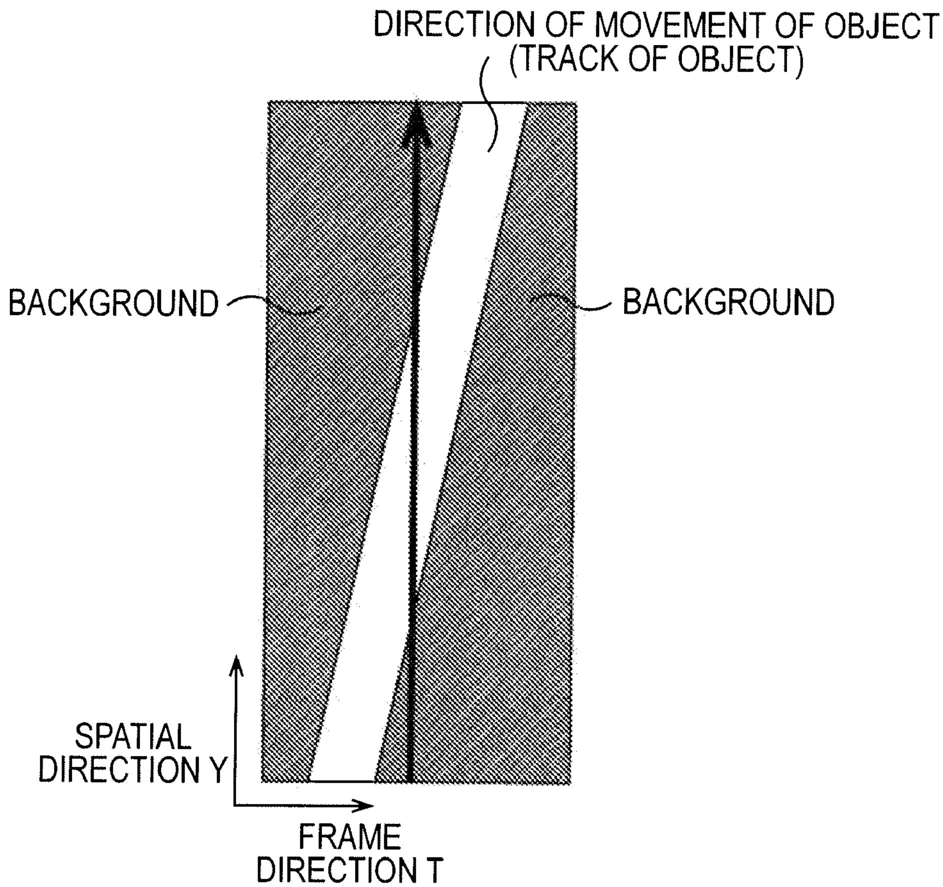

FIG. 161A is a diagram for describing a method for obtaining movement of an object as data continuity information.

Figure 161B:
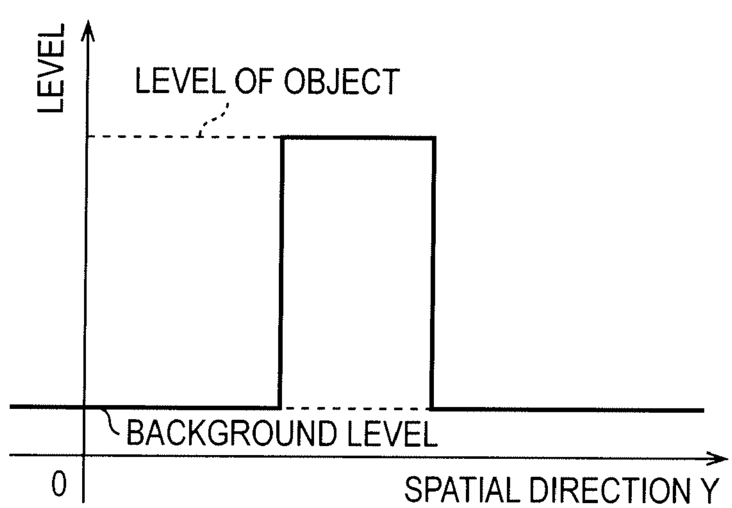

FIG. 161B is a diagram for describing a method for obtaining movement of an object as data continuity information.

Figure 162A:
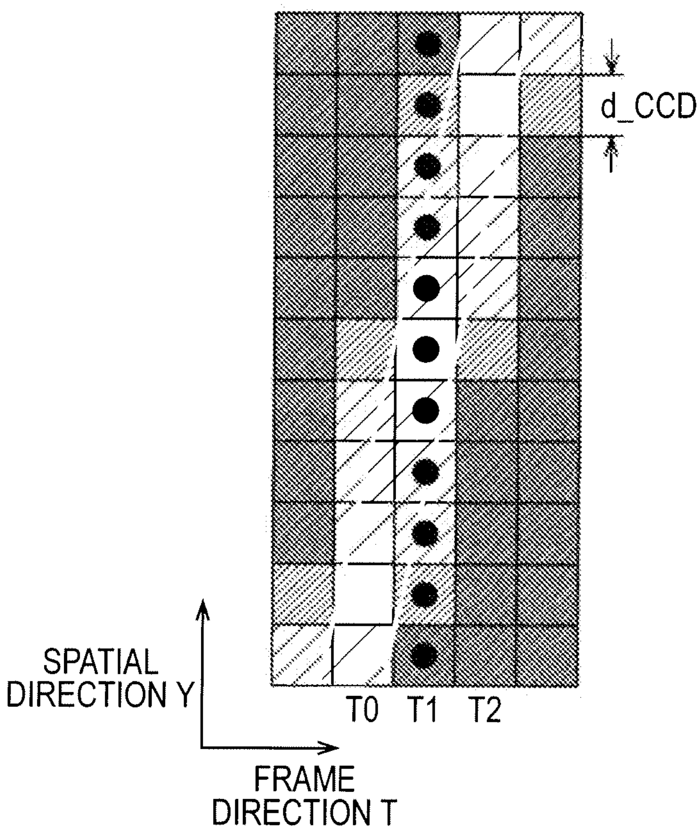

FIG. 162A is a diagram for describing a method for obtaining movement of an object as data continuity information.

Figure 162B:
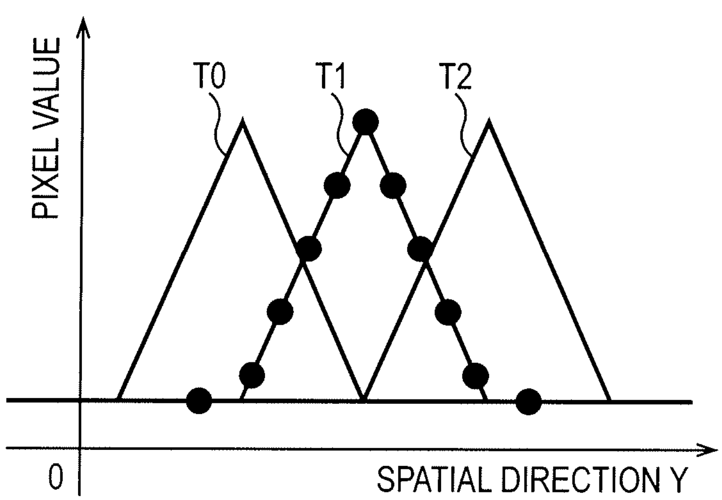

FIG. 162B is a diagram for describing a method for obtaining movement of an object as data continuity information.

Figure 163A:
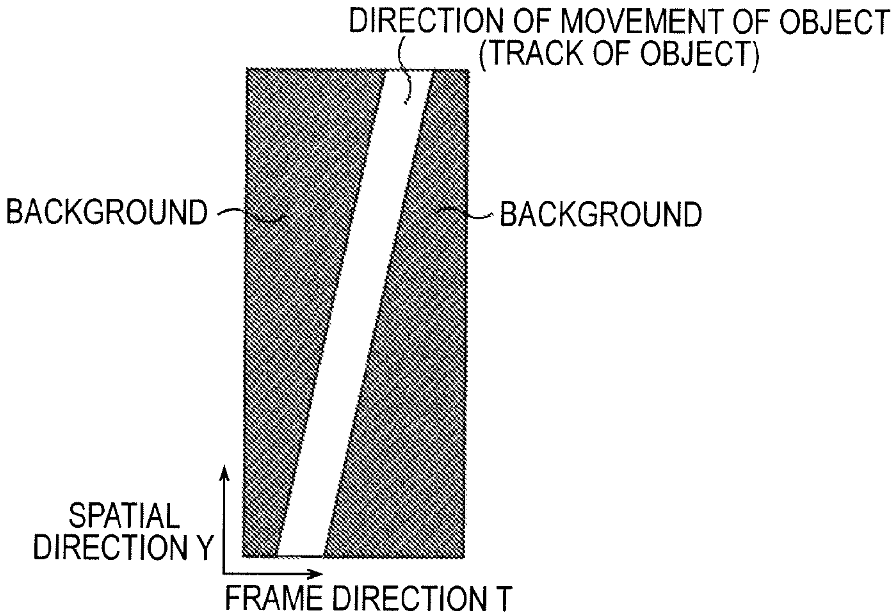

FIG. 163A is a diagram for describing a method for obtaining a mixture ratio according to movement of an object as data continuity information.

Figure 163B:
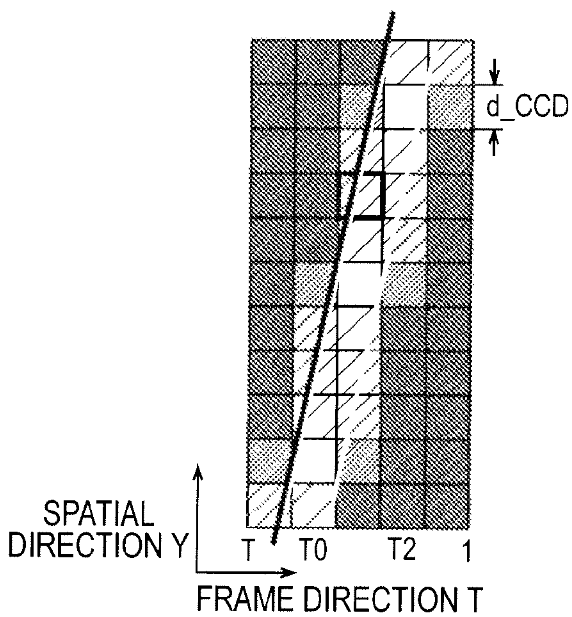

FIG. 163B is a diagram for describing a method for obtaining a mixture ratio according to movement of an object as data continuity information.

Figure 163C:
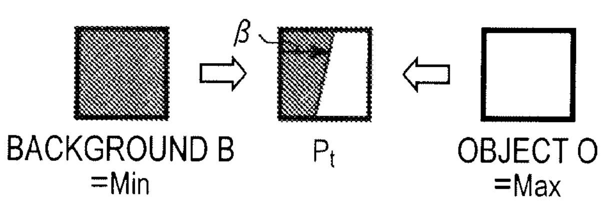

FIG. 163C is a diagram for describing a method for obtaining a mixture ratio according to movement of an object as data continuity information.

Figure 164:
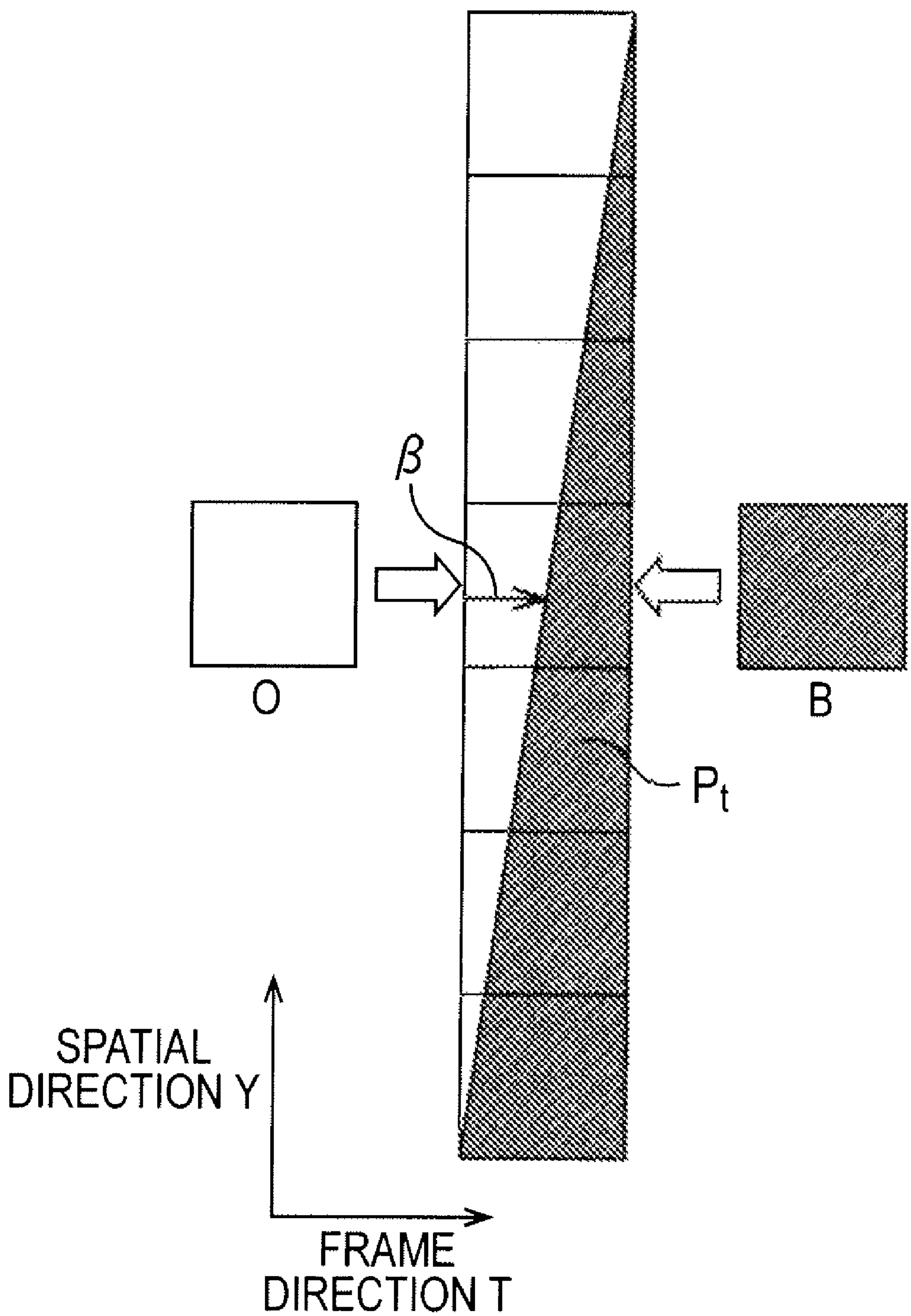

FIG. 164 is a diagram for describing linear approximation of the mixture ratio at the time of obtaining the mixture ratio according to movement of the object as data continuity information.

Figure 165:
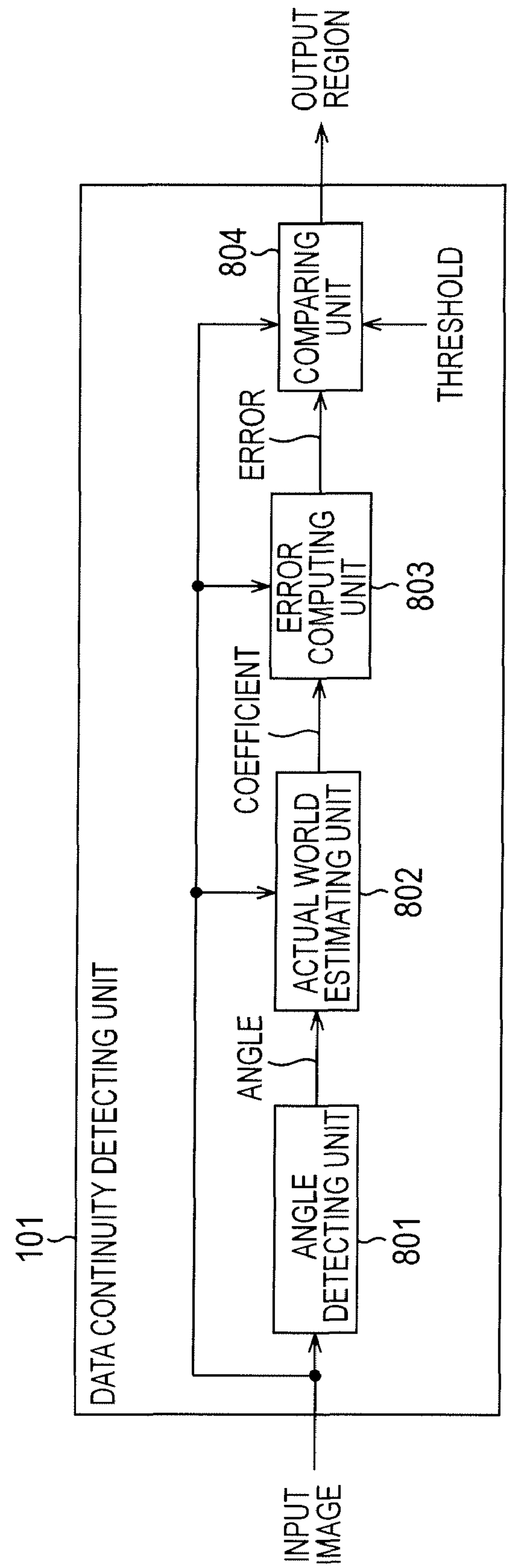

FIG. 165 is a block diagram illustrating the configuration of the data continuity detecting unit for detecting the processing region under application of the present invention, as data continuity information.

Figure 166:
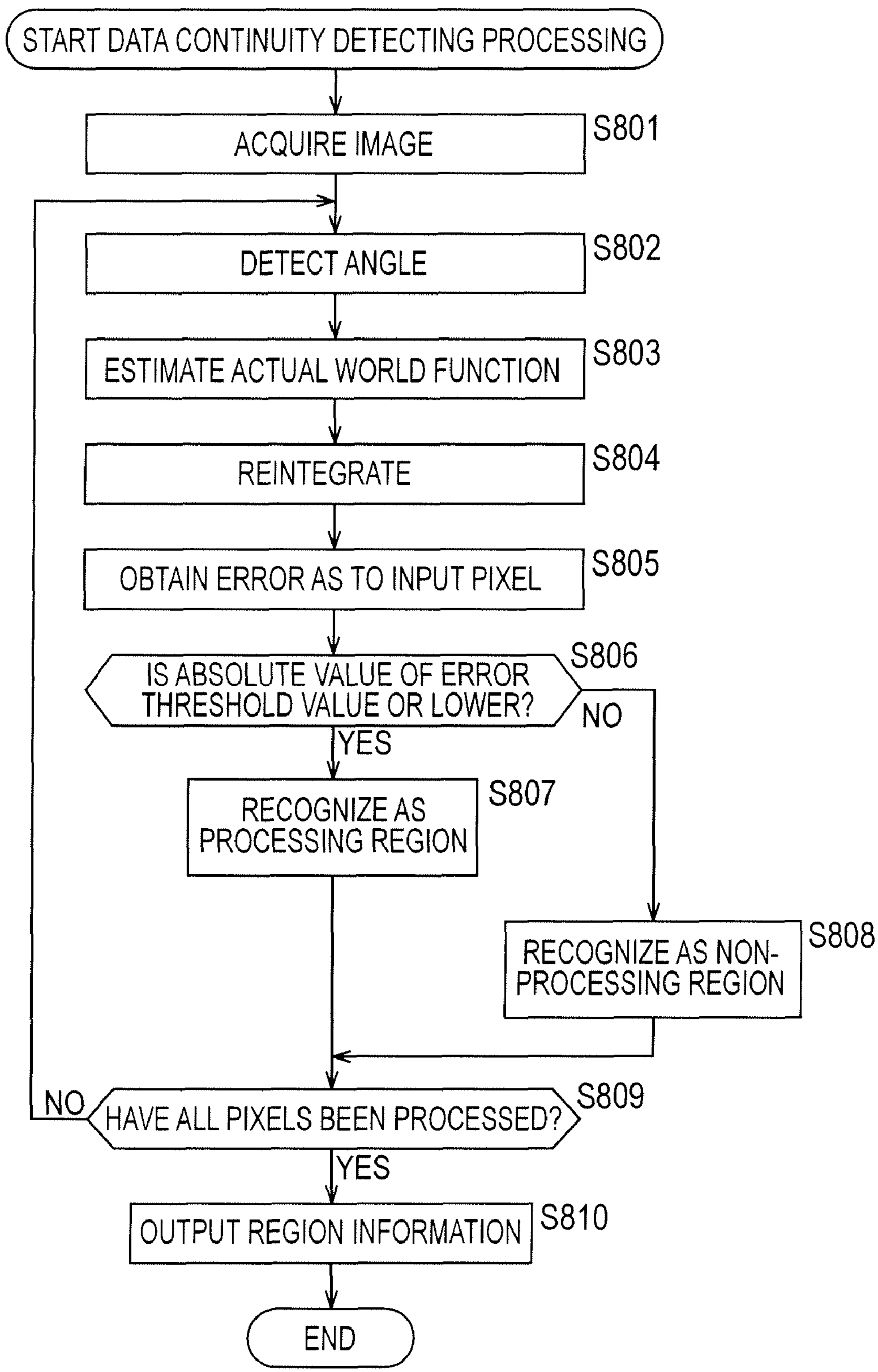

FIG. 166 is a flowchart for describing the processing for detection of continuity with the data continuity detecting unit shown in FIG. 165.

Figure 167:
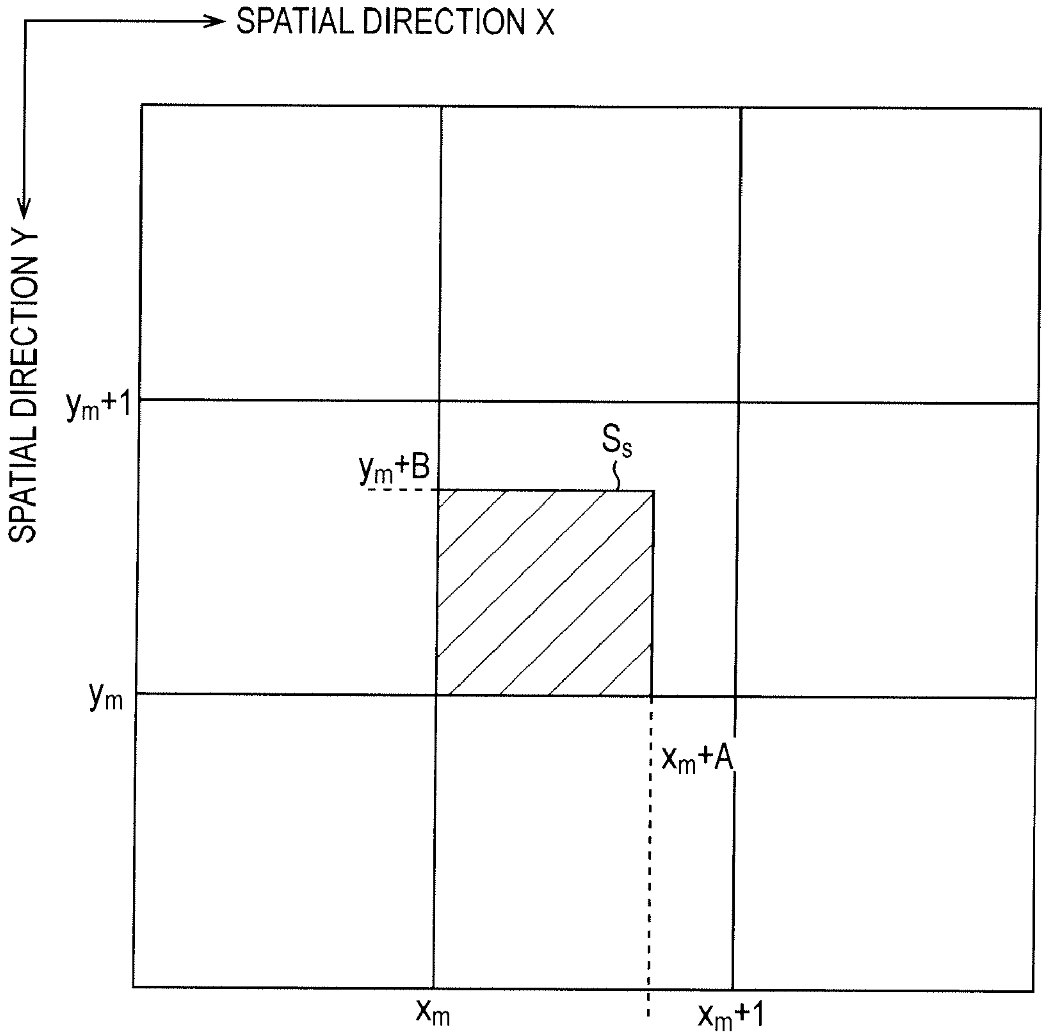

FIG. 167 is a diagram for describing the integration range of processing for detection of continuity with the data continuity detecting unit shown in FIG. 165.

Figure 168:
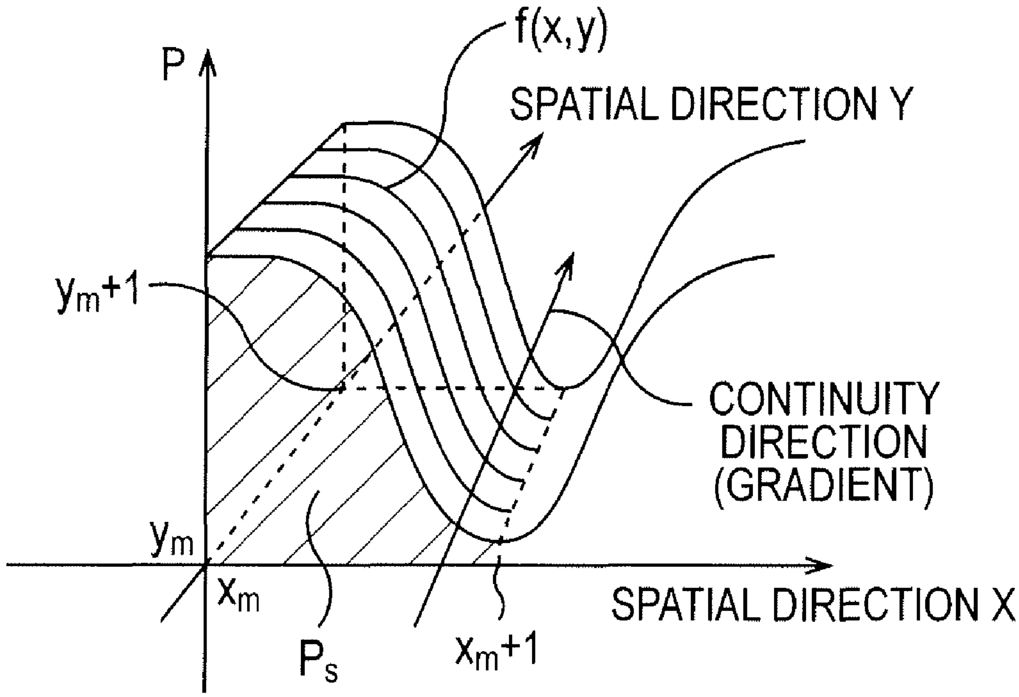

FIG. 168 is a diagram for describing the integration range of processing for detection of continuity with the data continuity detecting unit shown in FIG. 165.

Figure 169:
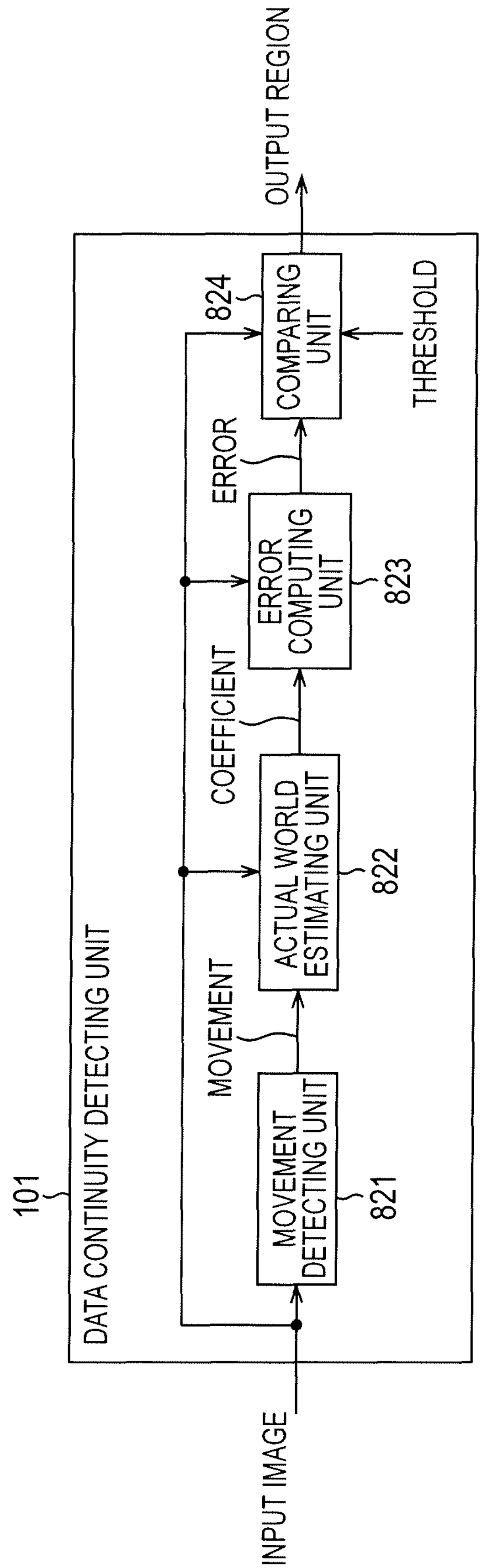

FIG. 169 is a block diagram illustrating another configuration of the data continuity detecting unit for detecting a processing region to which the present invention has been applied as data continuity information.

Figure 170:
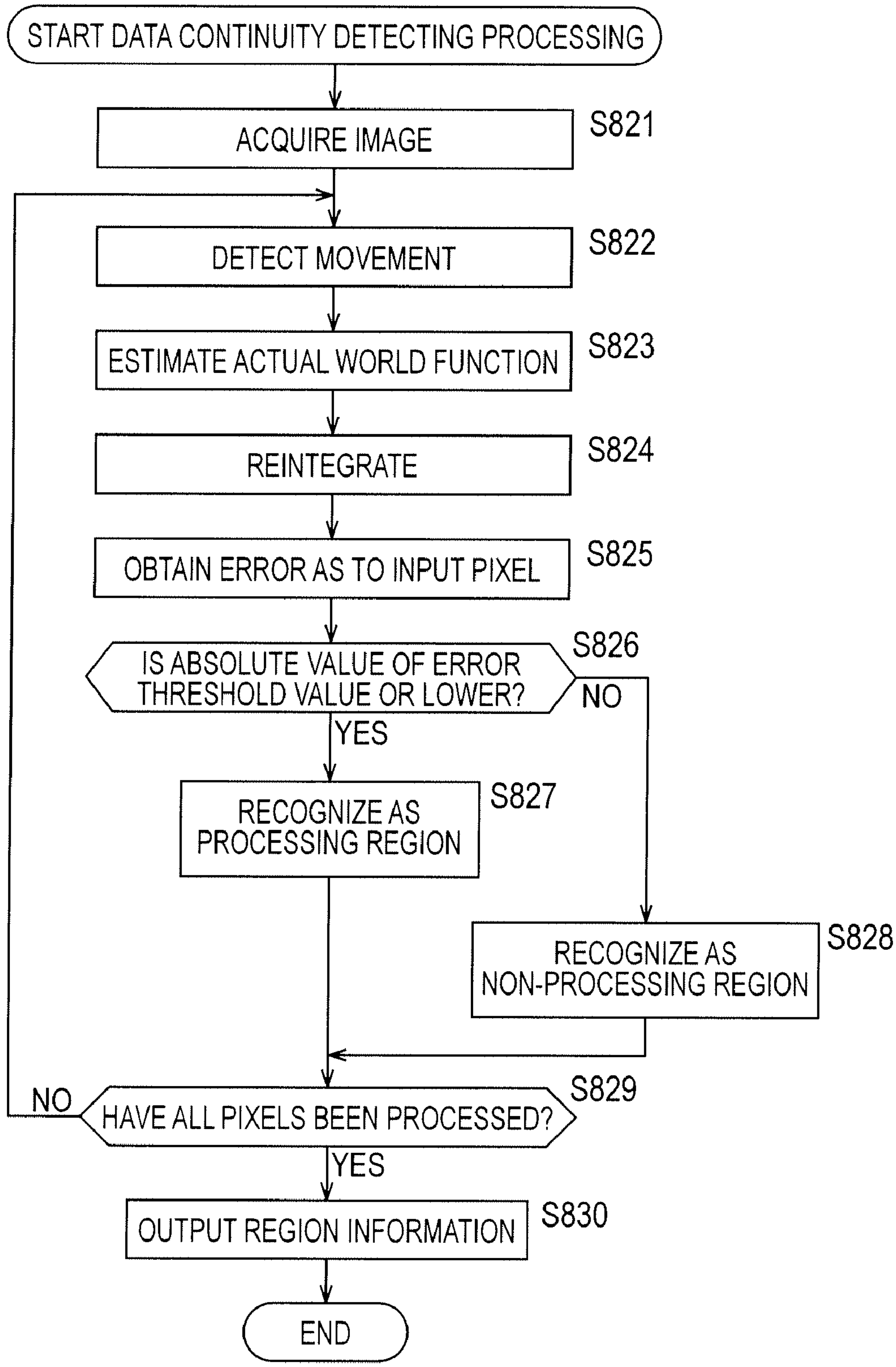

FIG. 170 is a flowchart for describing the processing for detecting continuity with the data continuity detecting unit shown in FIG. 169.

Figure 171:
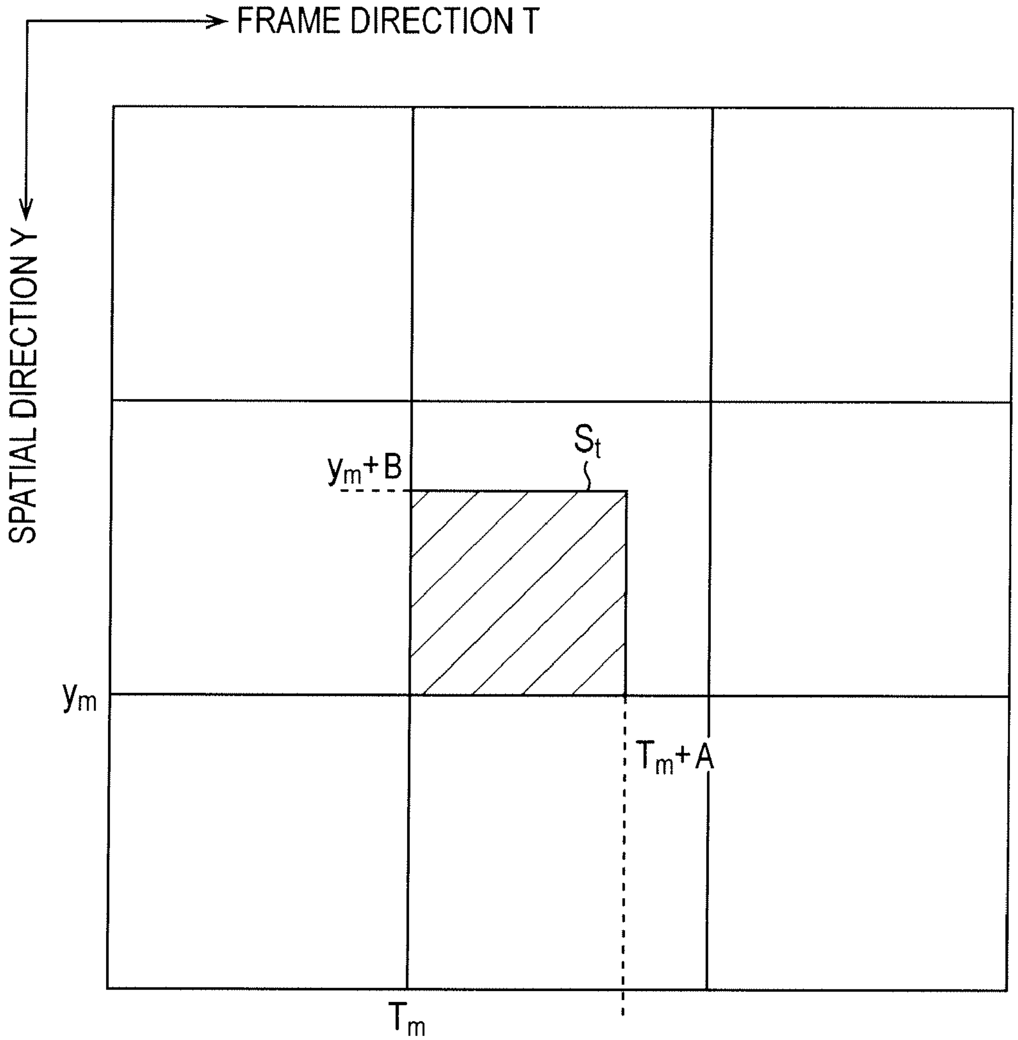

FIG. 171 is a diagram for describing the integration range of processing for detecting continuity with the data continuity detecting unit shown in FIG. 169.

Figure 172:
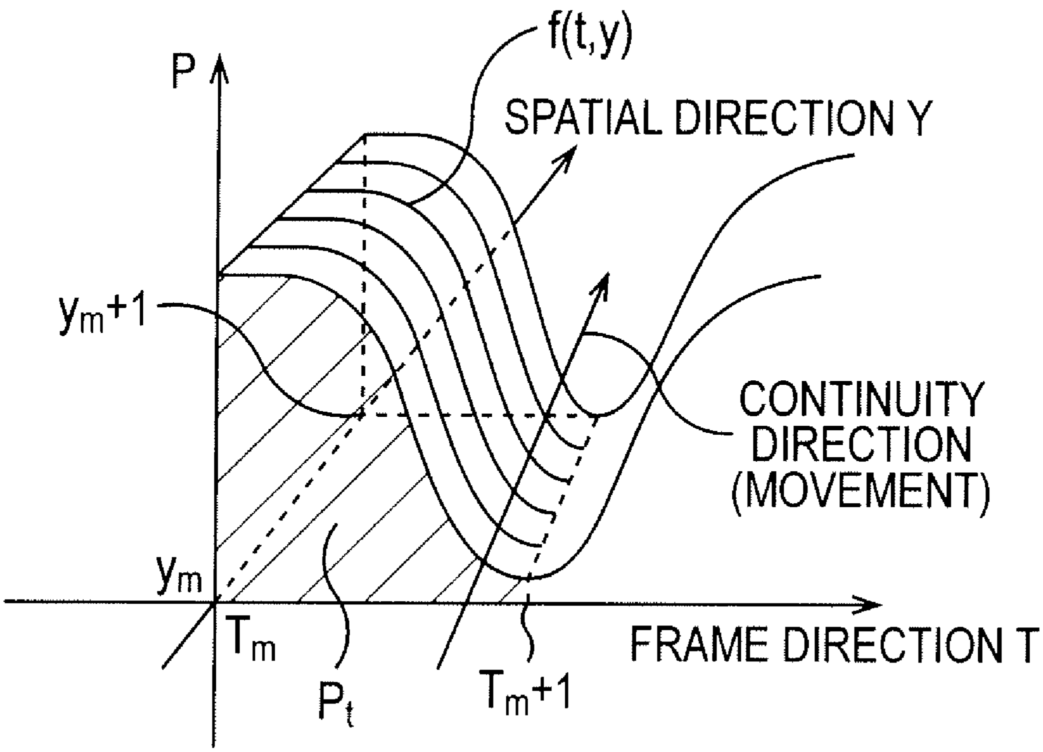

FIG. 172 is a diagram for describing the integration range of processing for detecting continuity with the data continuity detecting unit shown in FIG. 169.

Figure 173:
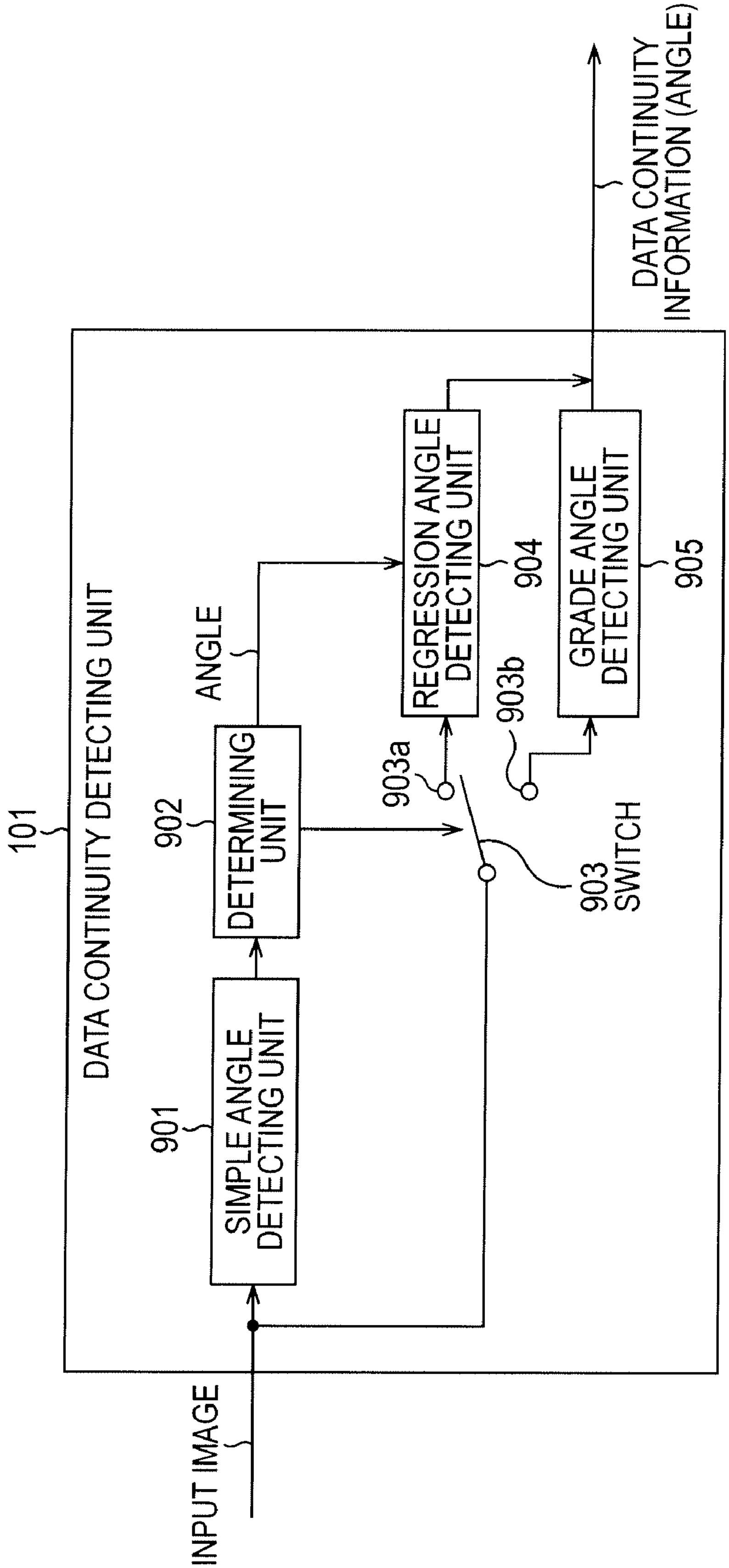

FIG. 173 is a block diagram illustrating the configuration of another embodiment of the data continuity detecting unit.

Figure 174:
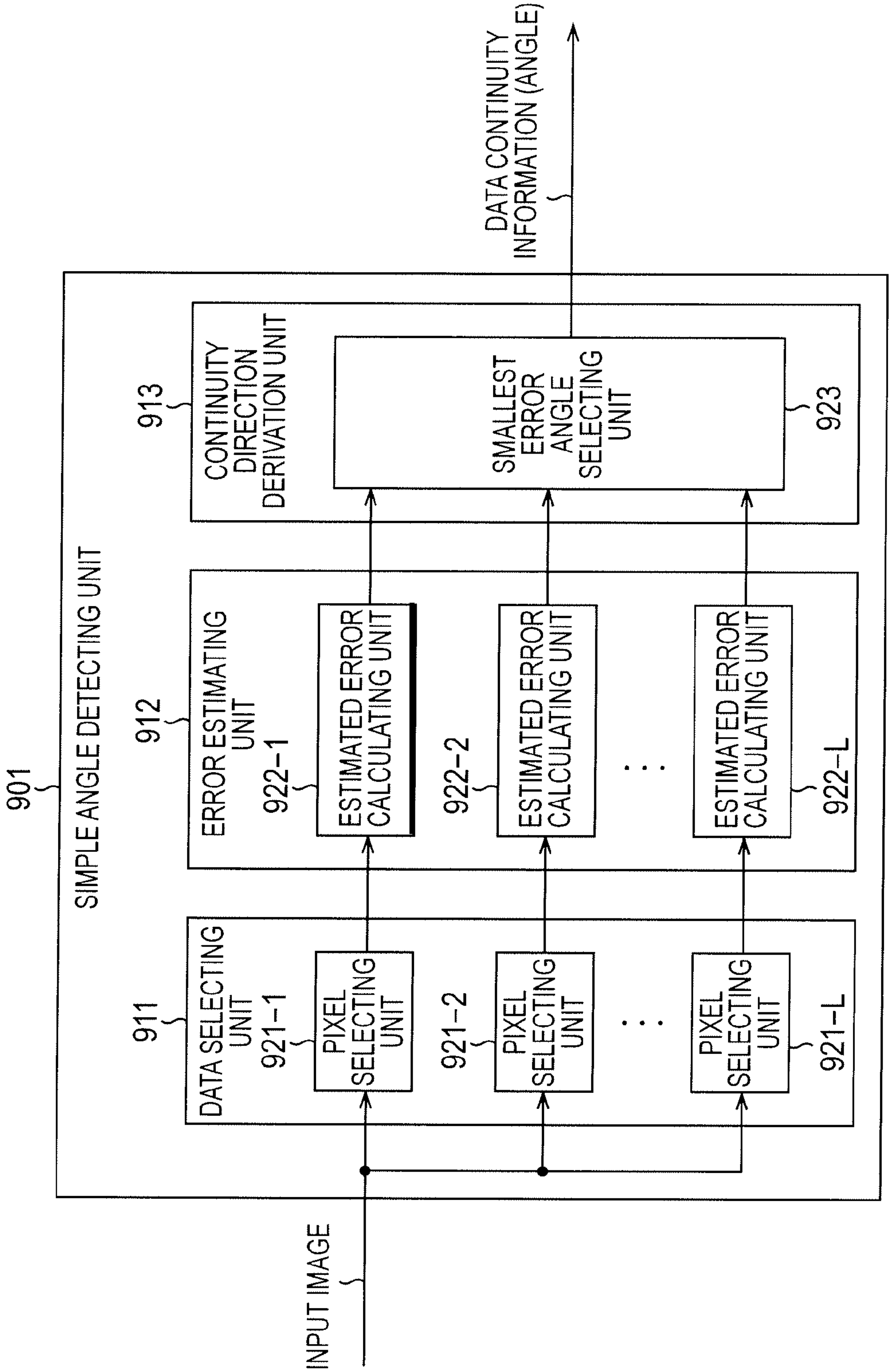

FIG. 174 is a block diagram illustrating an example of a configuration of a simple-type angle detecting unit of the data continuity detecting unit shown in FIG. 173.

Figure 175:
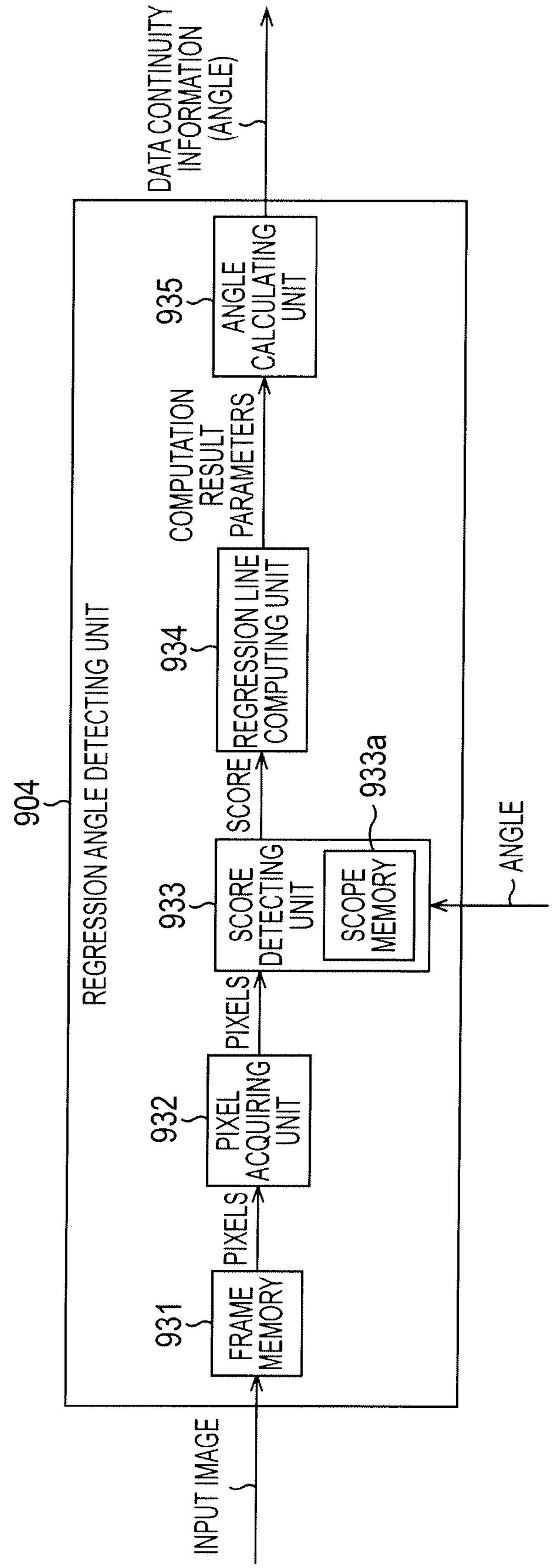

FIG. 175 is a block diagram illustrating an example of a configuration of a regression-type angle detecting unit of the data continuity detecting unit shown in FIG. 173.

Figure 176:
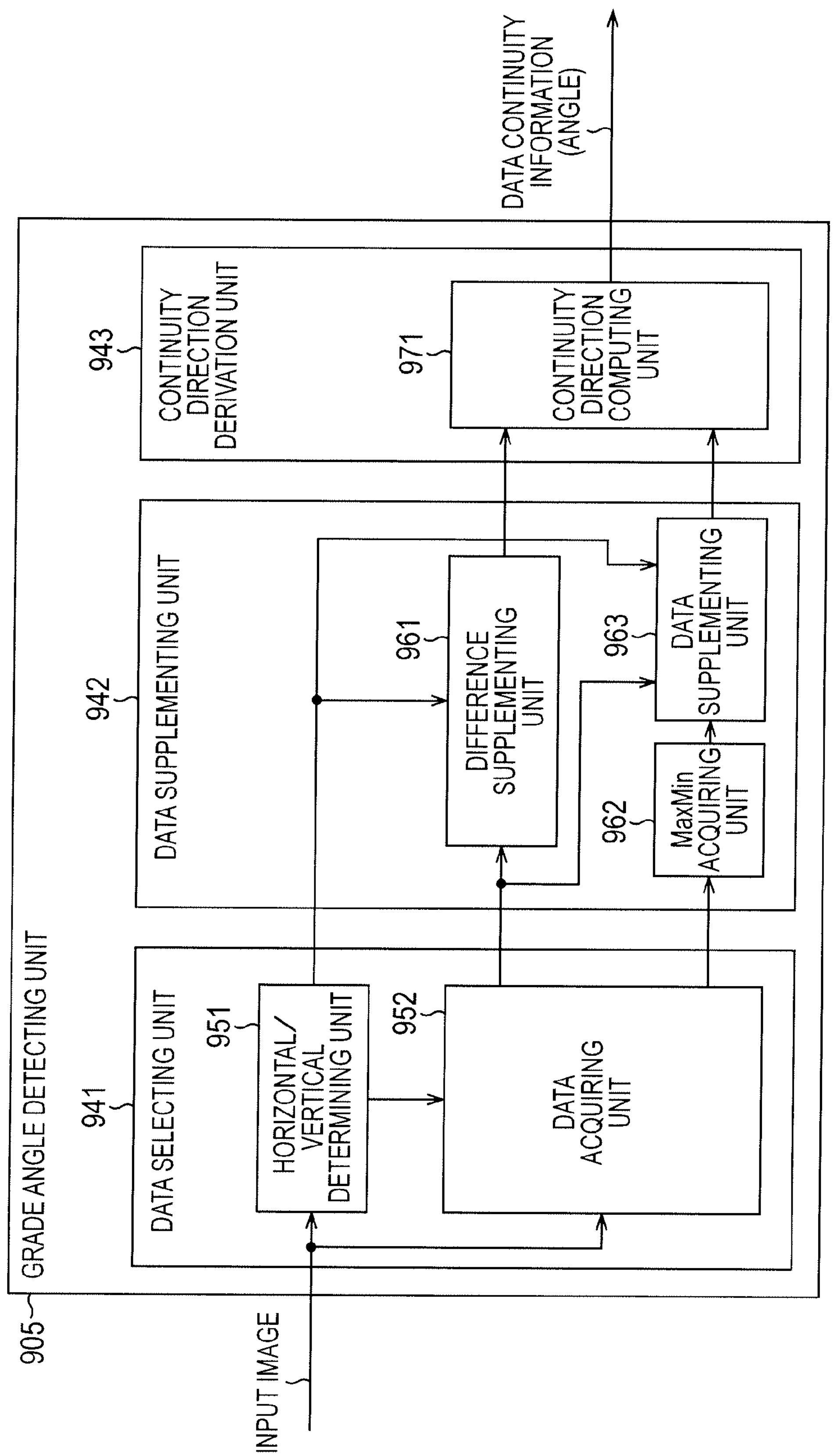

FIG. 176 is a block diagram illustrating an example of a configuration of a gradient-type angle detecting unit of the data continuity detecting unit shown in FIG. 173.

Figure 177:
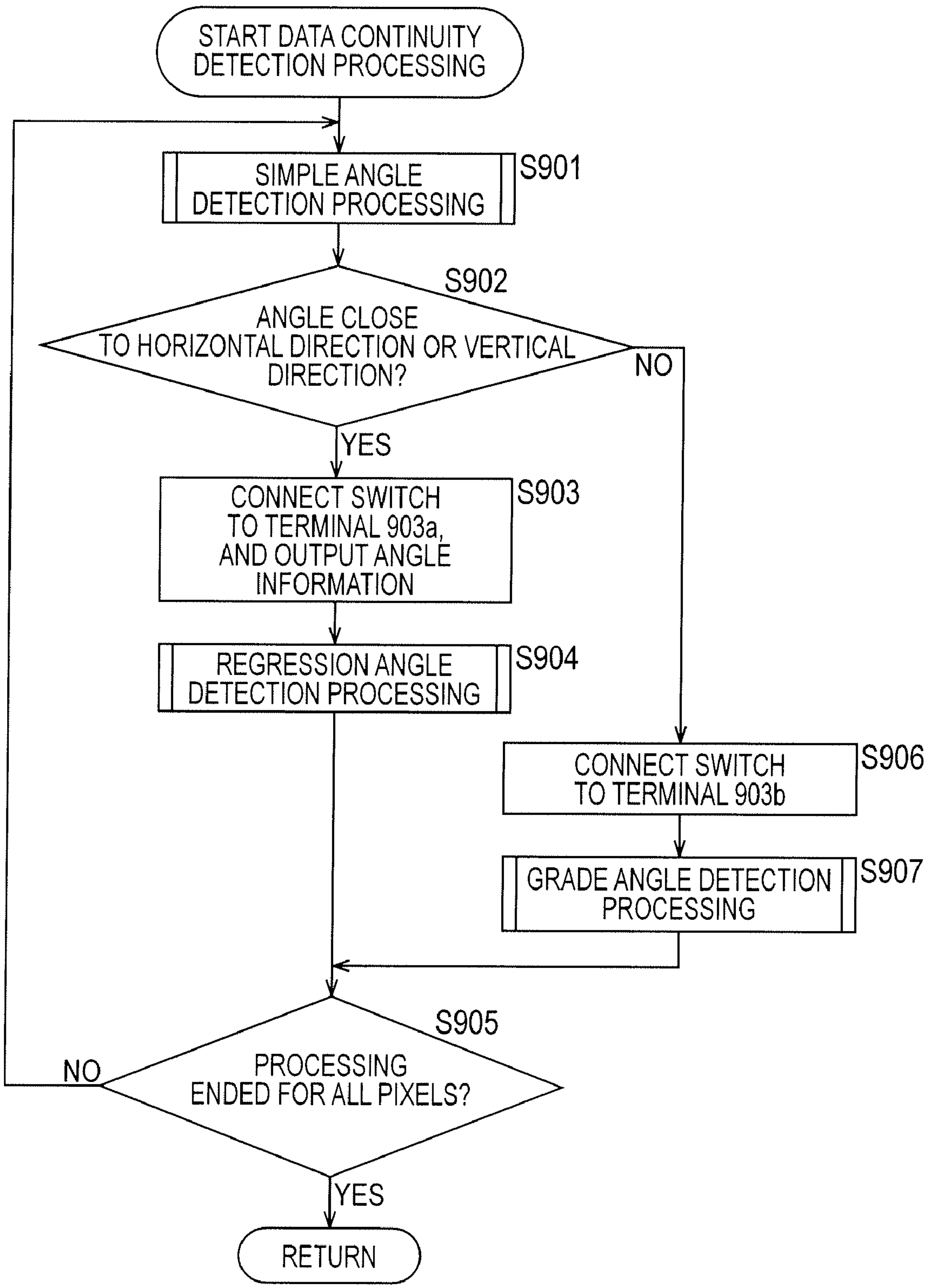

FIG. 177 is a flowchart for describing the processing for detecting continuity of data with the data continuity detecting unit shown in FIG. 173.

Figure 178:
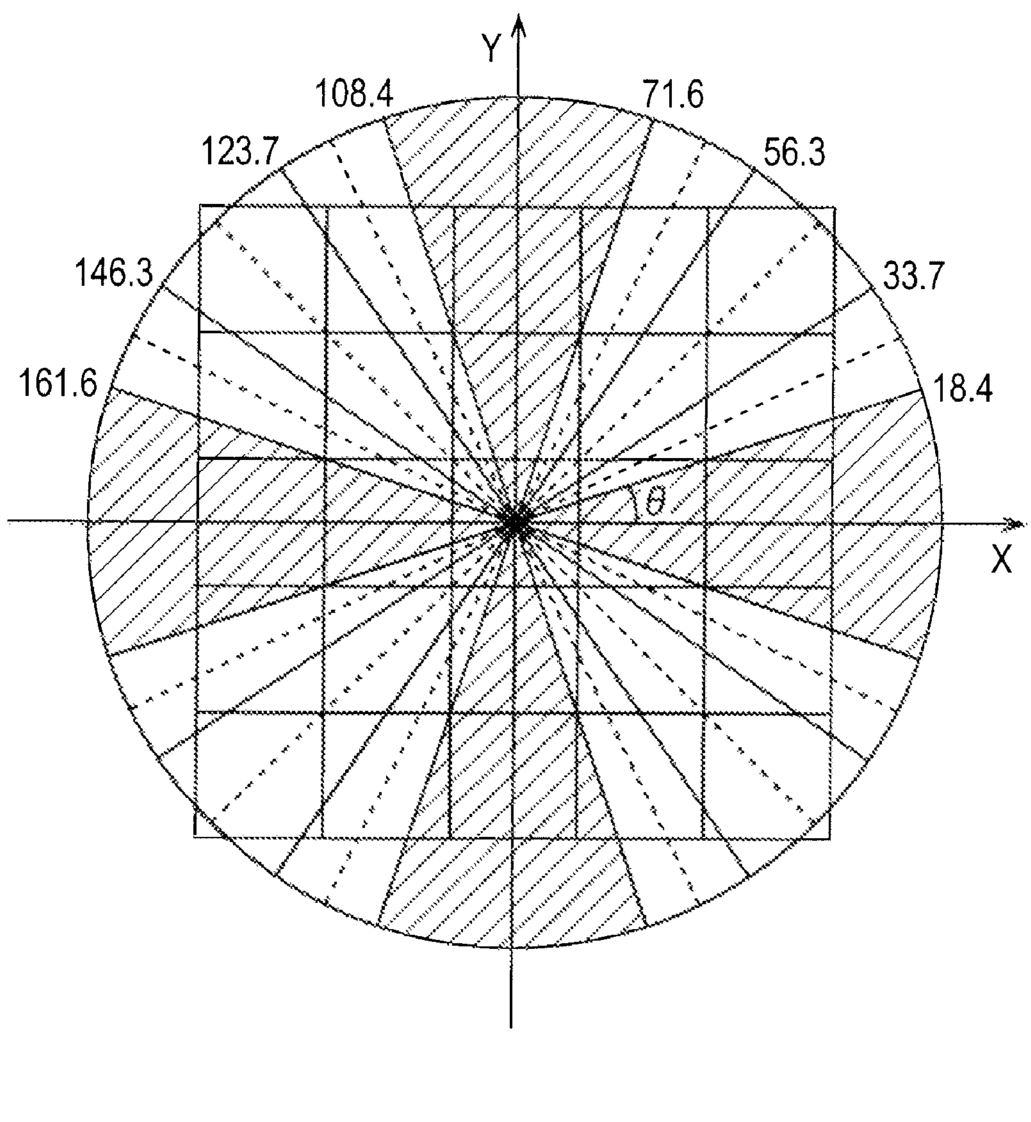

FIG. 178 is a diagram for describing a method for detecting an angle corresponding to the angle detected by the simple-type angle detecting unit.

Figure 179:
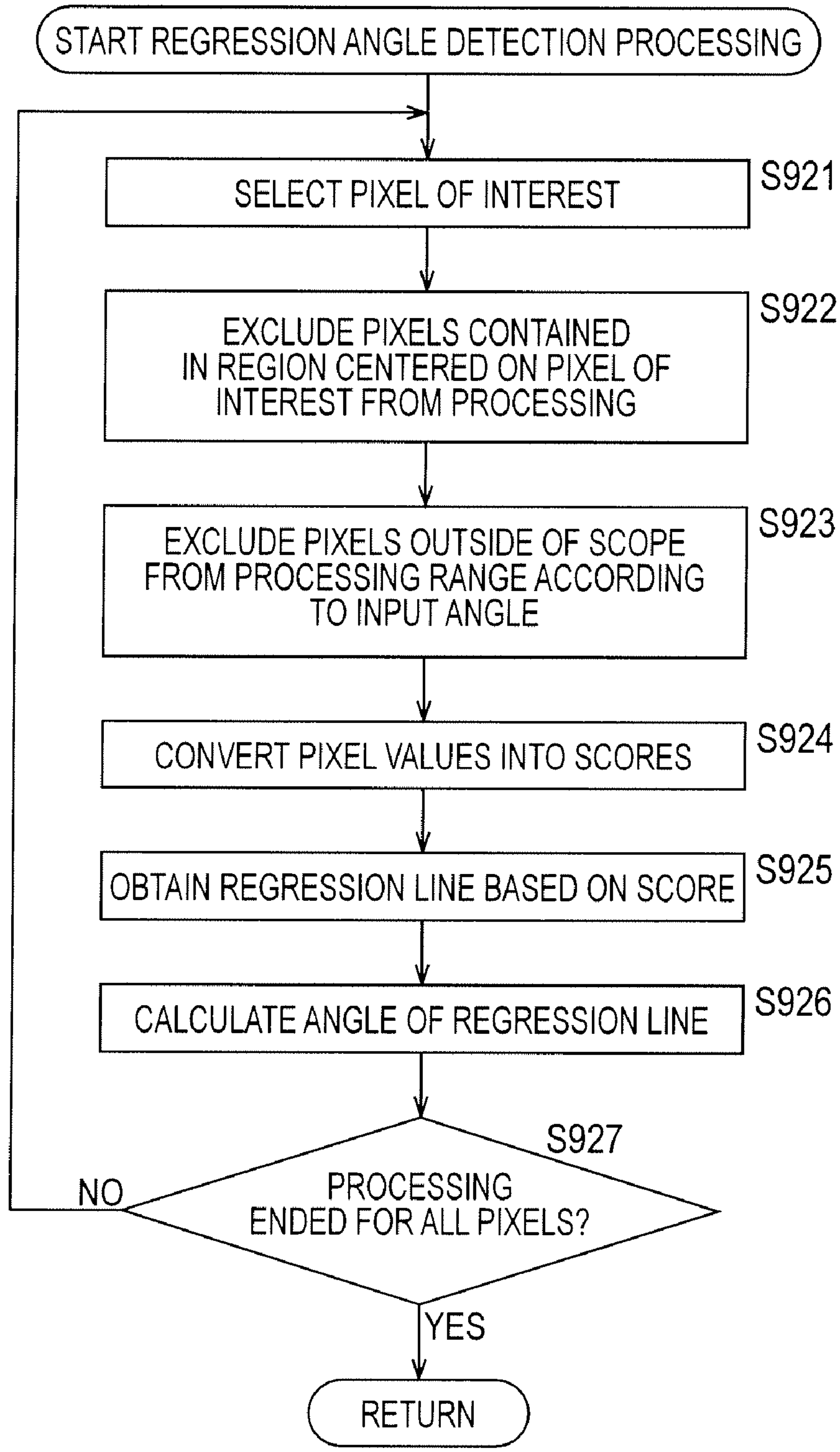

FIG. 179 is a flowchart for describing the regression-type angle detecting processing, which is the processing in step S904 in the flowchart shown in FIG. 177.

Figure 180:
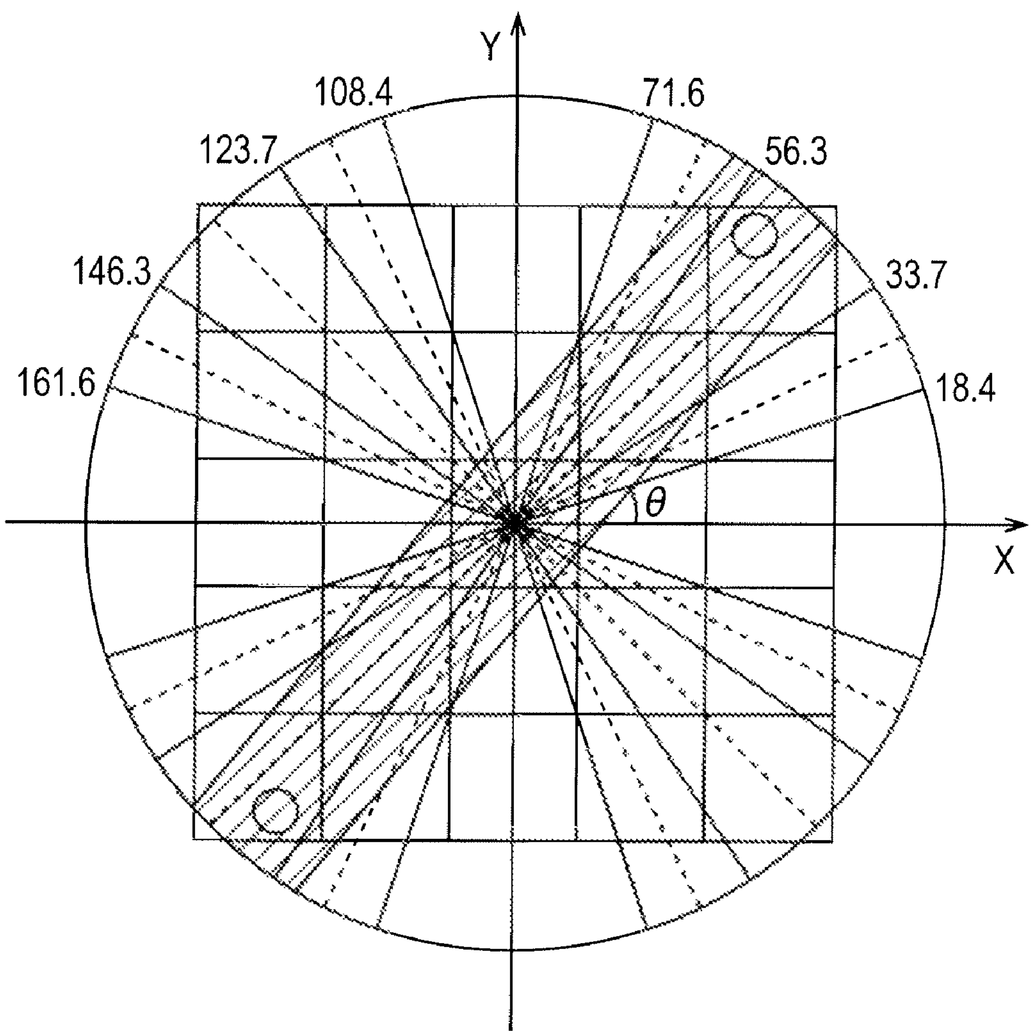

FIG. 180 is a diagram for describing pixels serving as a scope range where the score conversion processing is performed.

Figure 181:
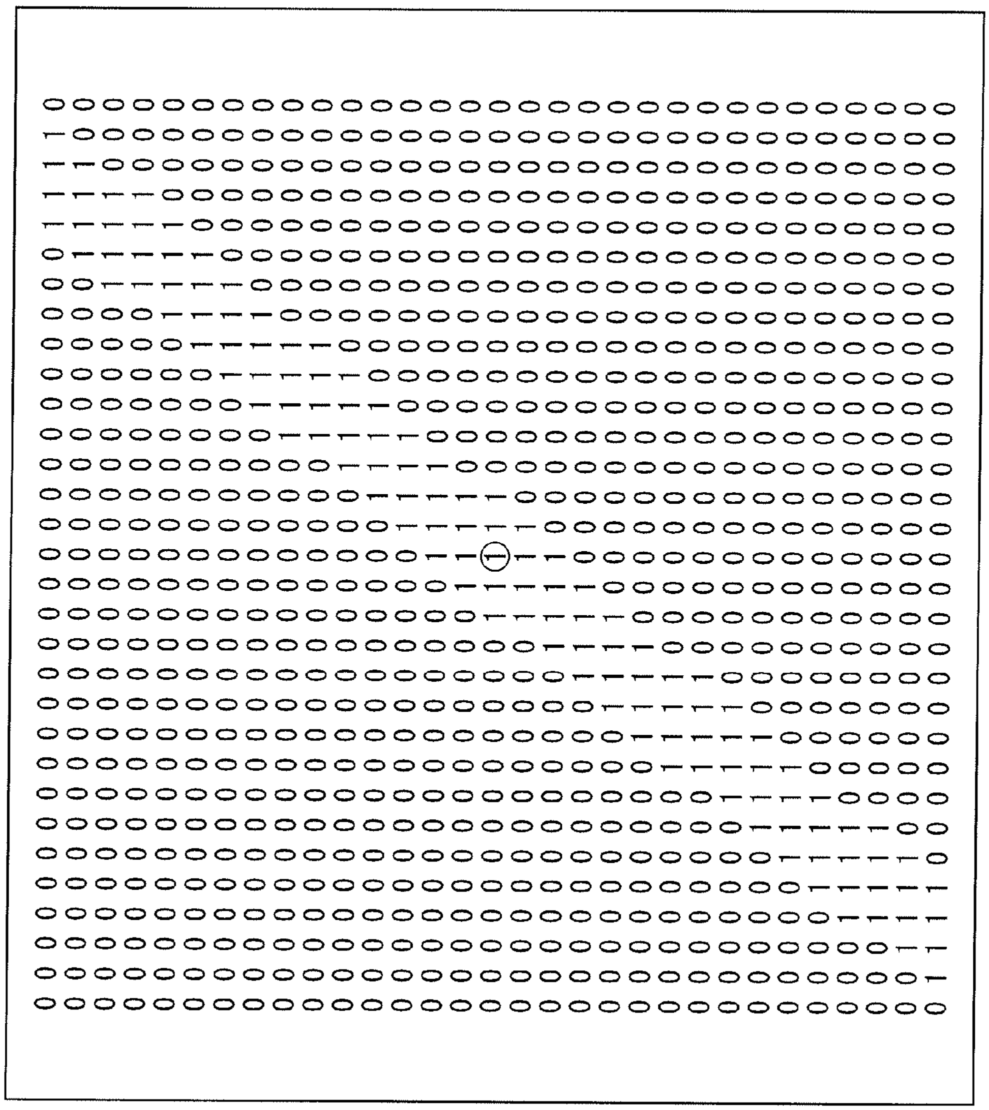

FIG. 181 is a diagram for describing pixels serving as a scope range where the score conversion processing is performed.

Figure 182:
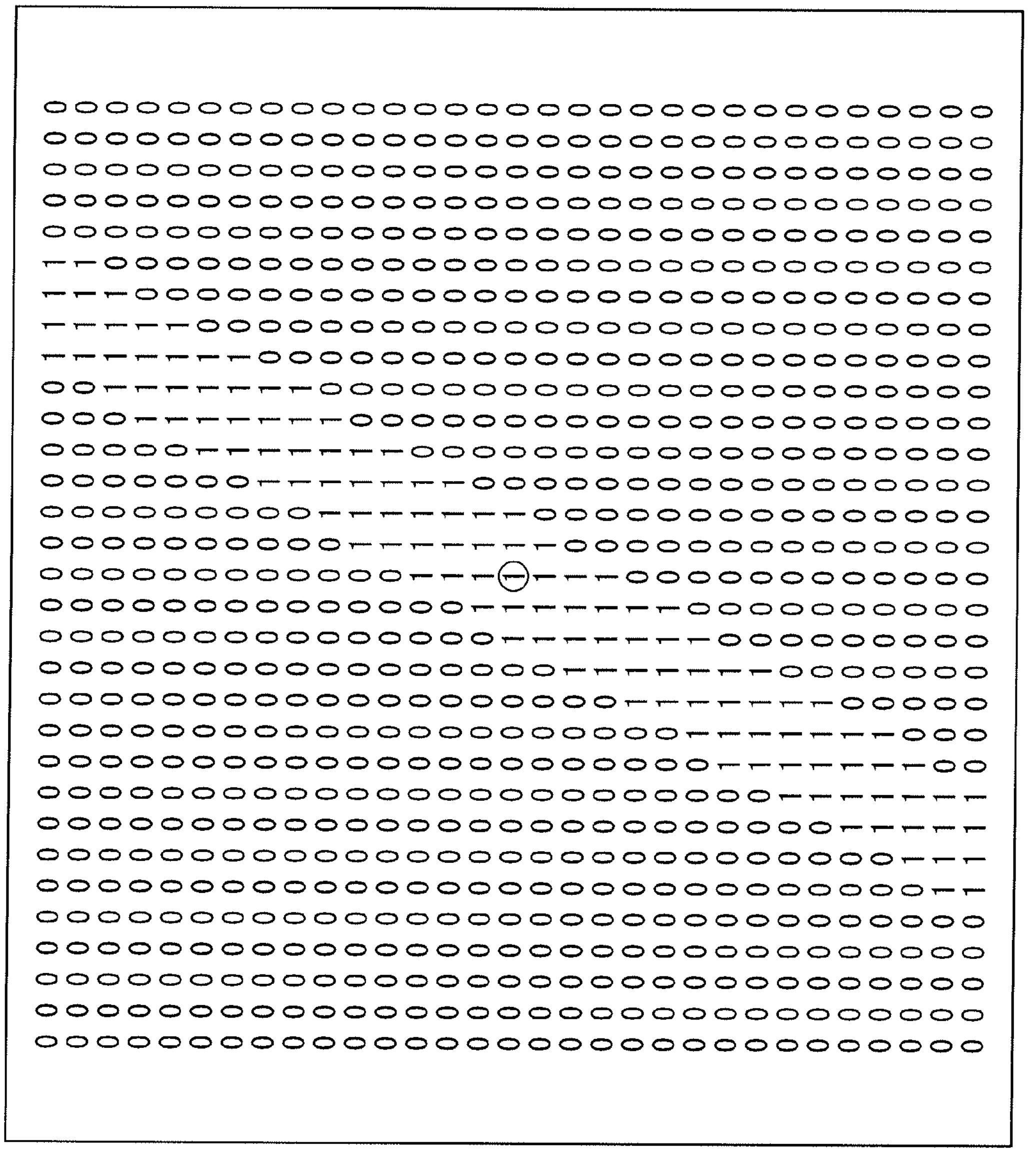

FIG. 182 is a diagram for describing pixels serving as a scope range where the score conversion processing is performed.

Figure 183:
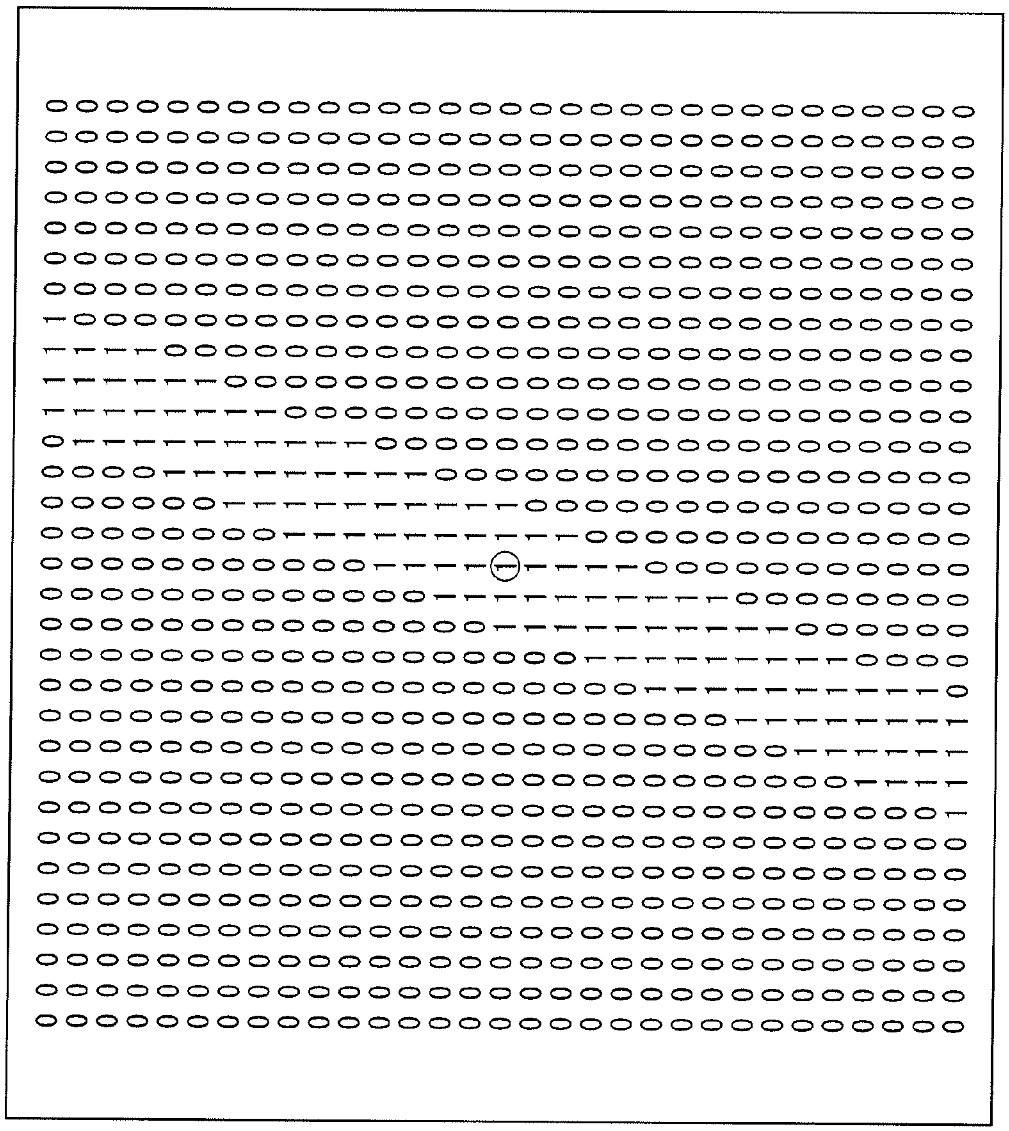

FIG. 183 is a diagram for describing pixels serving as a scope range where the score conversion processing is performed.

Figure 184:
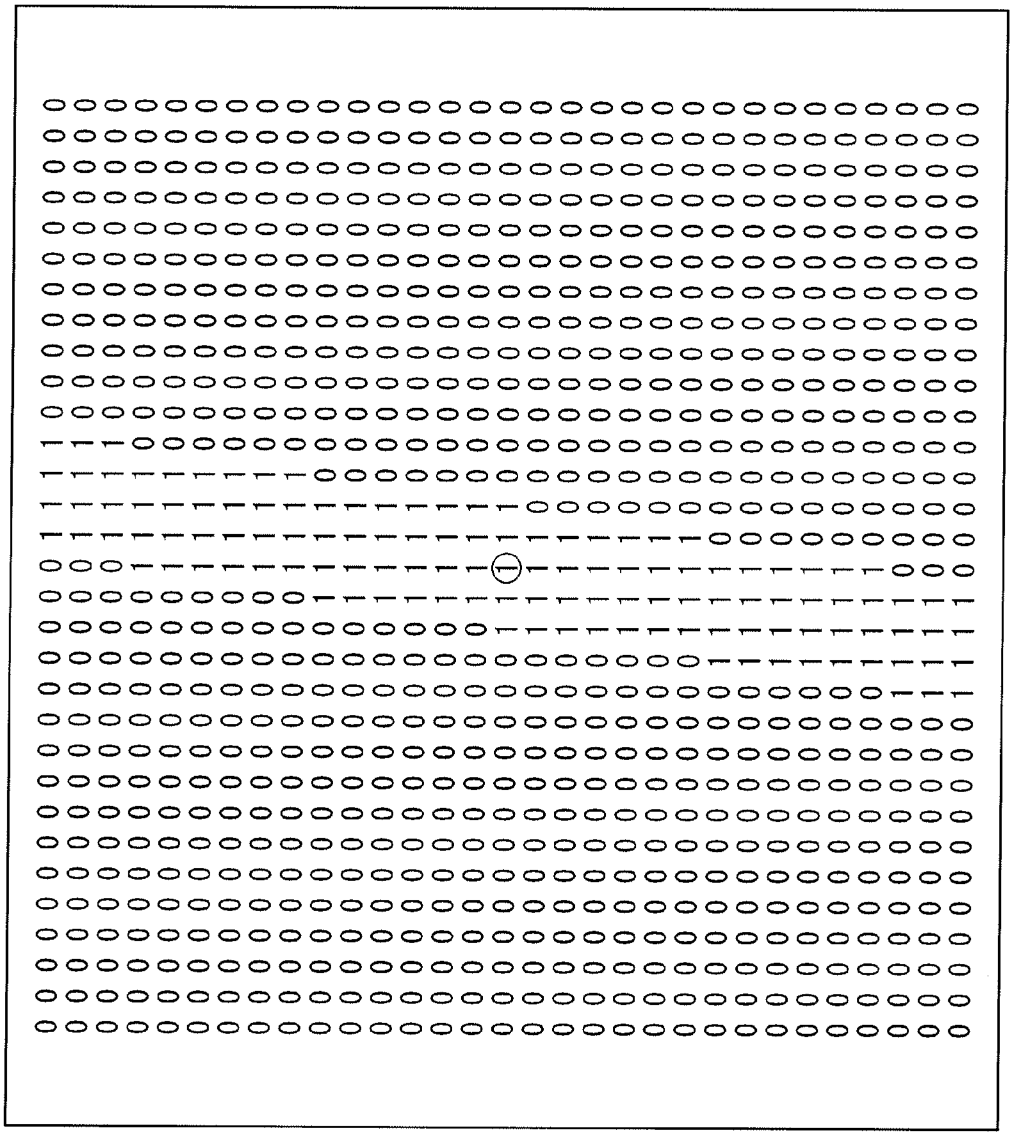

FIG. 184 is a diagram for describing pixels serving as a scope range where the score conversion processing is performed.

Figure 185:
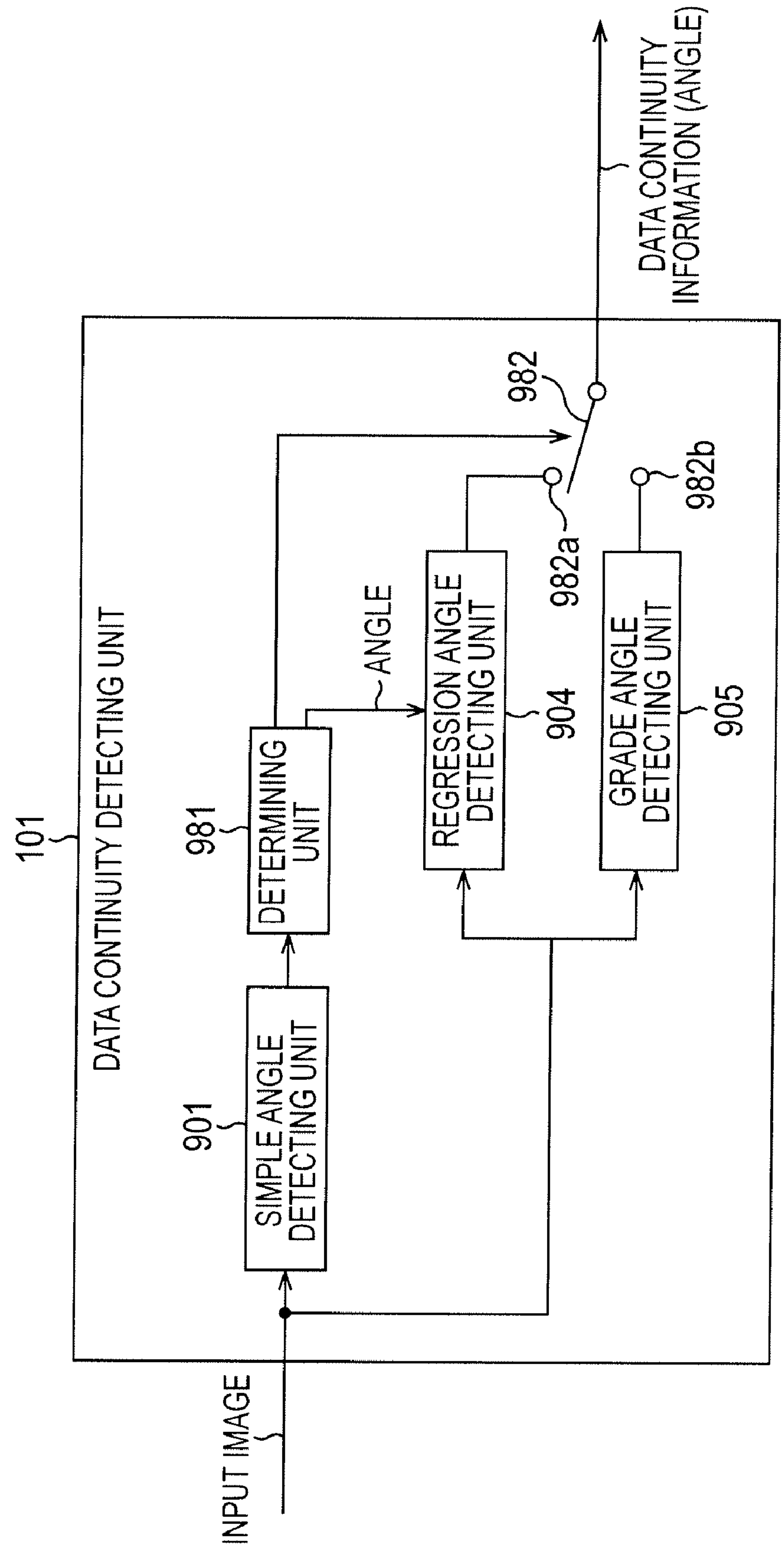

FIG. 185 is a block diagram illustrating the configuration of another embodiment of the data continuity detecting unit.

Figure 186:
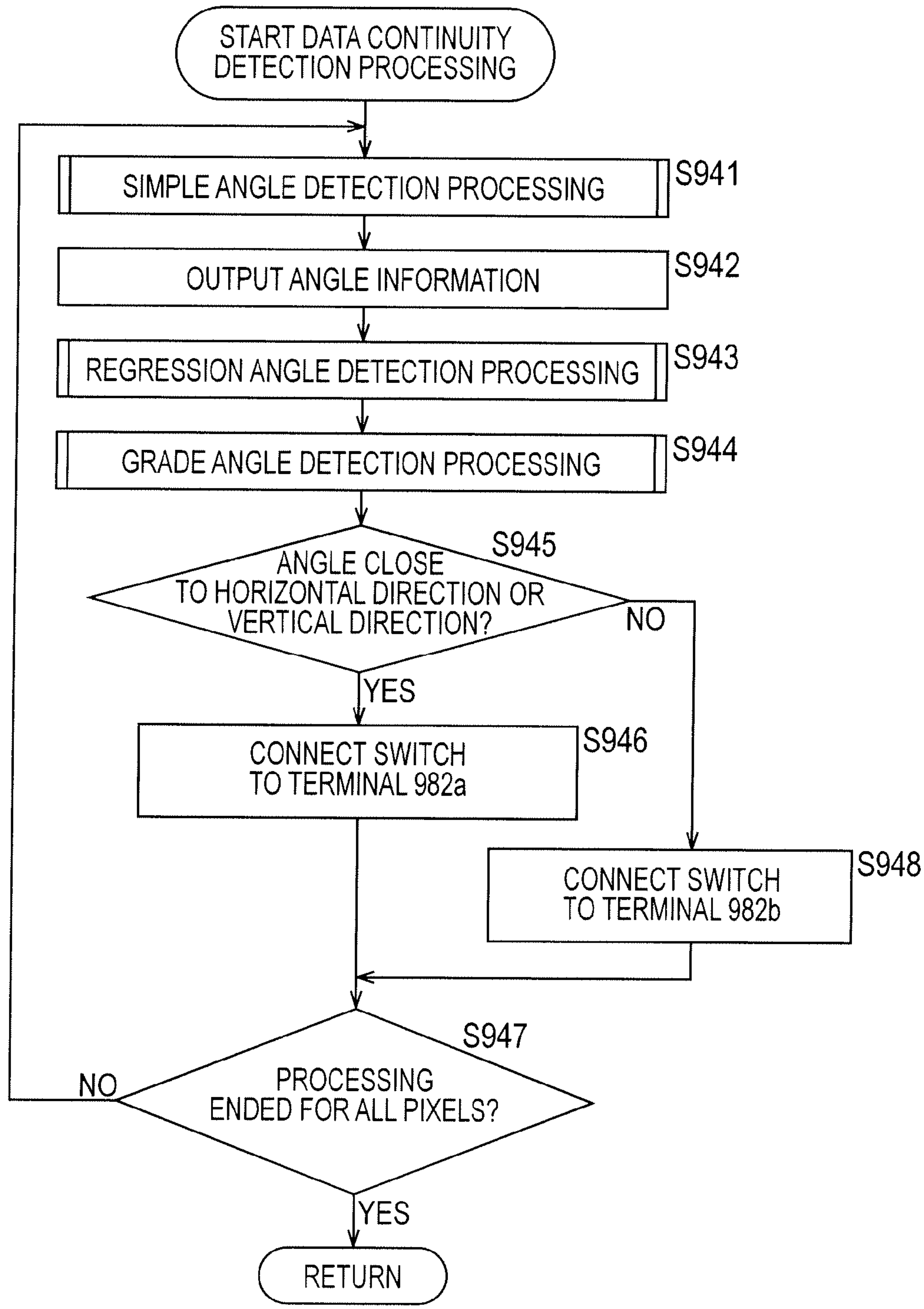

FIG. 186 is a flowchart for describing the processing for detecting continuity of data with the data continuity detecting unit shown in FIG. 185.

Figure 187:
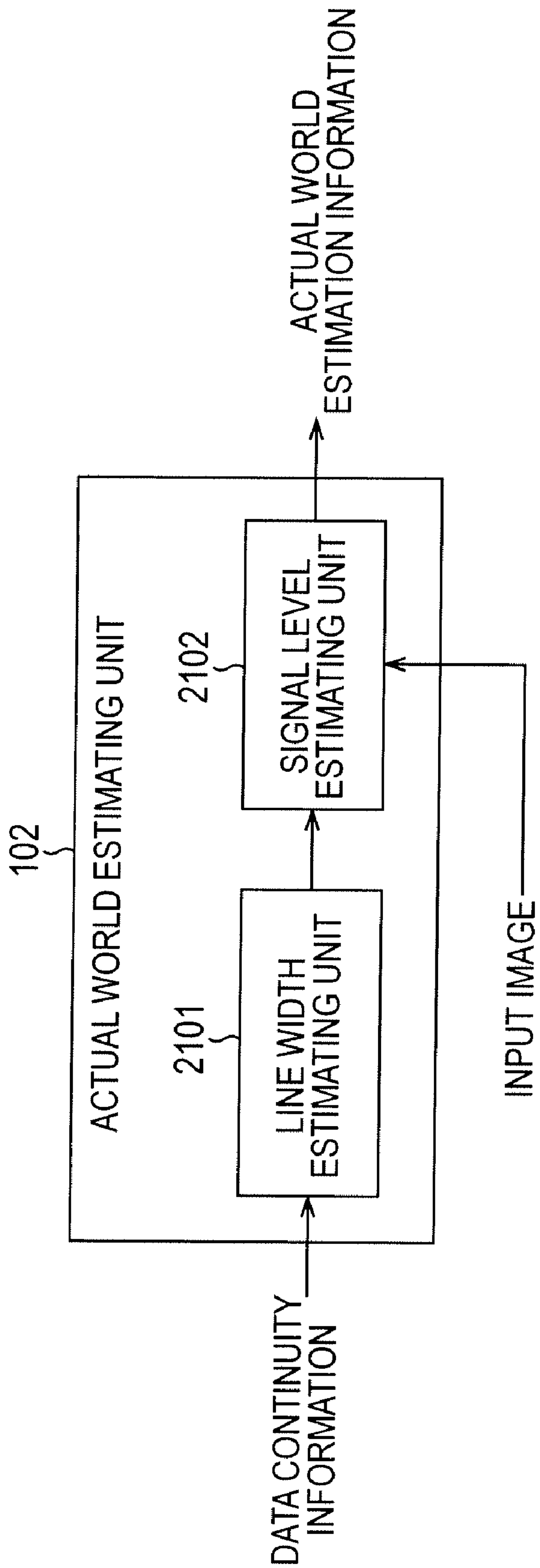

FIG. 187 is a block diagram illustrating the configuration of an actual world estimating unit 102.

Figure 188:
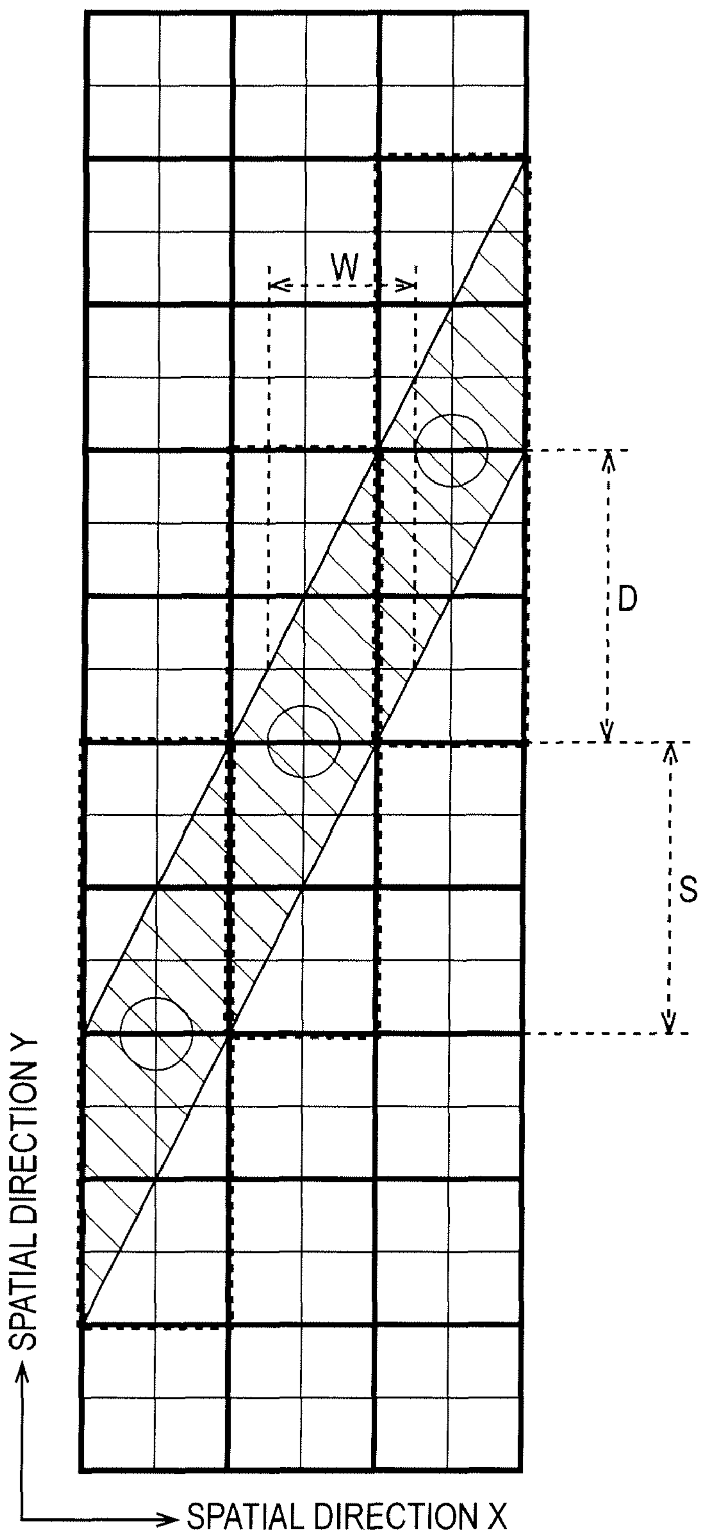

FIG. 188 is a diagram for describing the processing for detecting the width of a fine line in actual world 1 signals.

Figure 189:
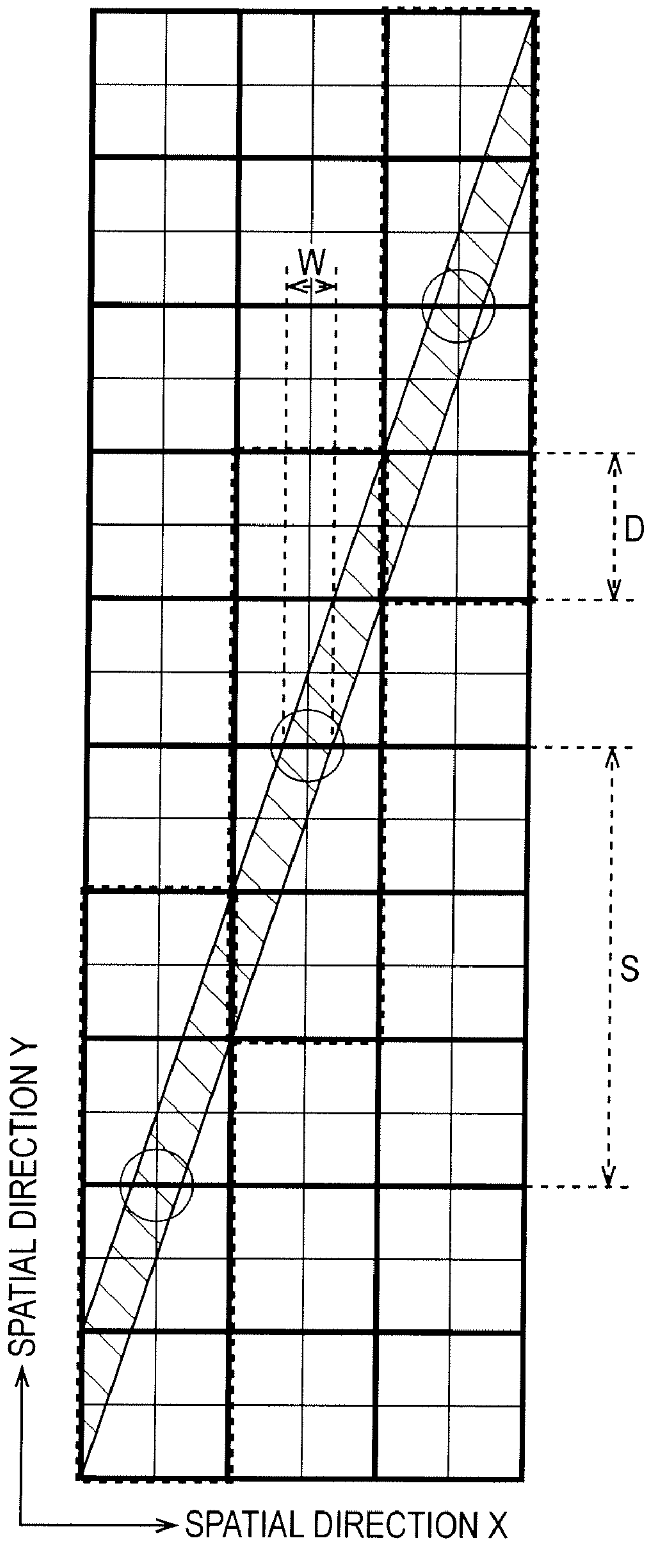

FIG. 189 is a diagram for describing the processing for detecting the width of a fine line in actual world 1 signals.

Figure 190:
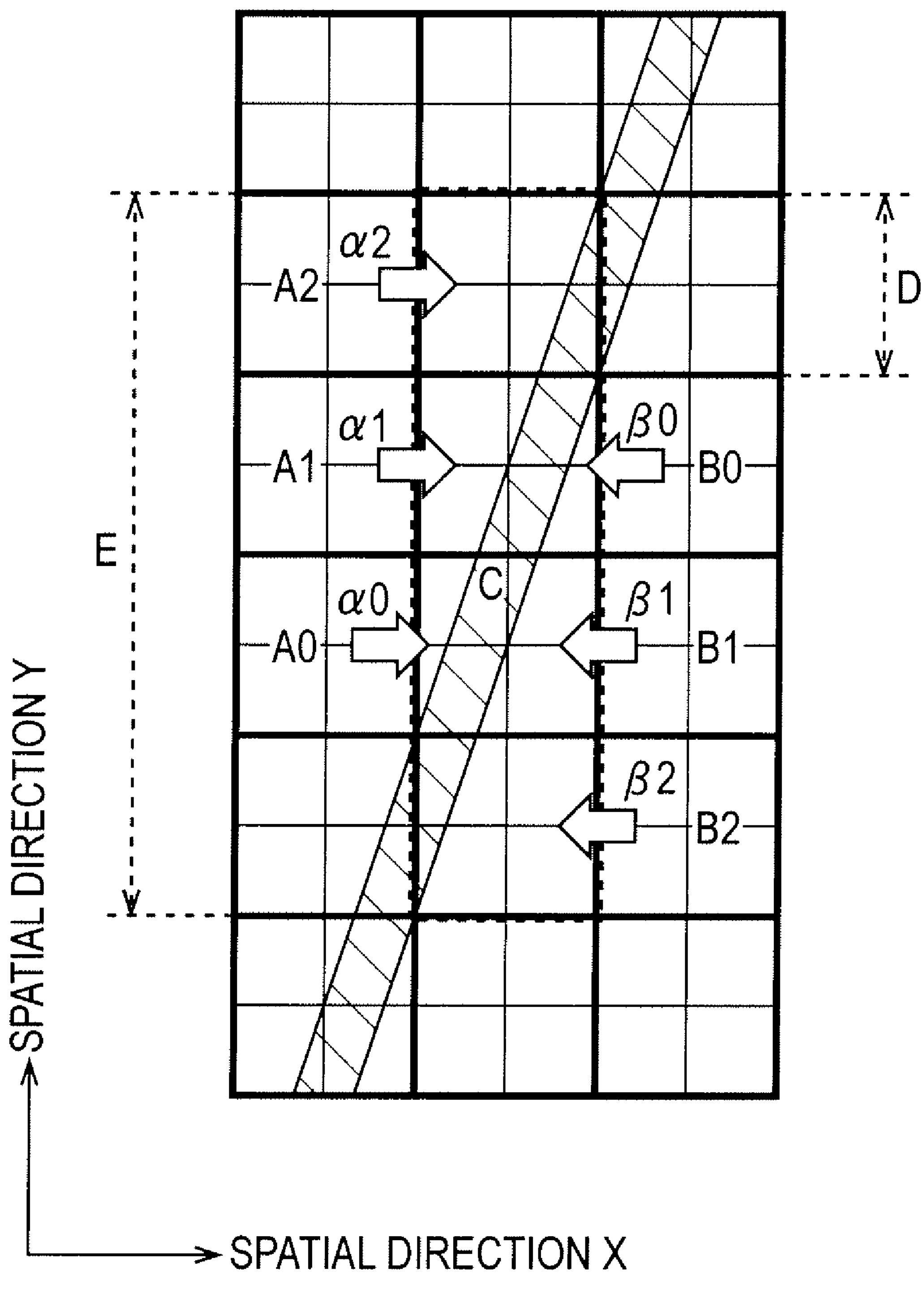

FIG. 190 is a diagram for describing the processing for estimating the level of a fine line signal in actual world 1 signals.

Figure 191:
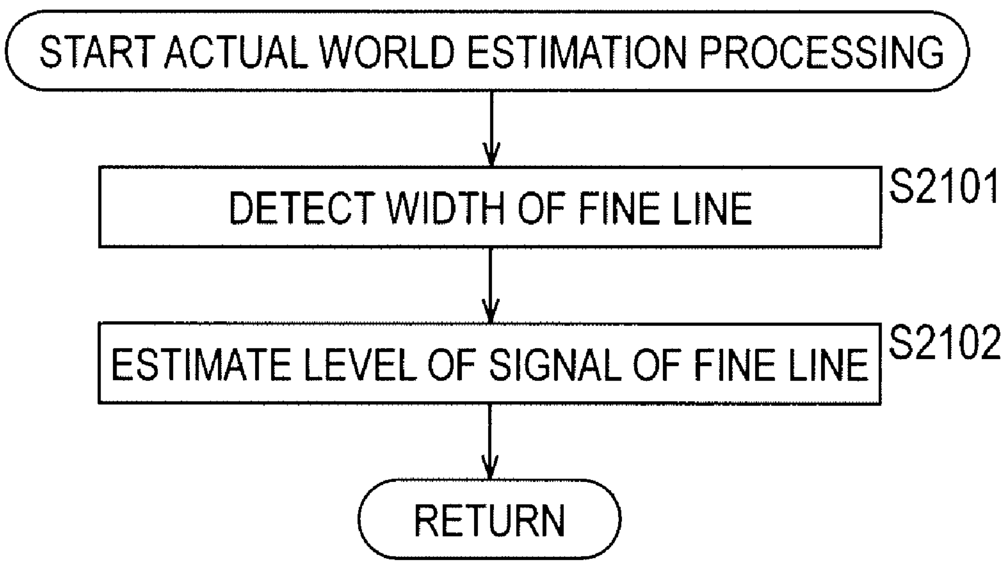

FIG. 191 is a flowchart for describing processing for estimating the actual world.

Figure 192:
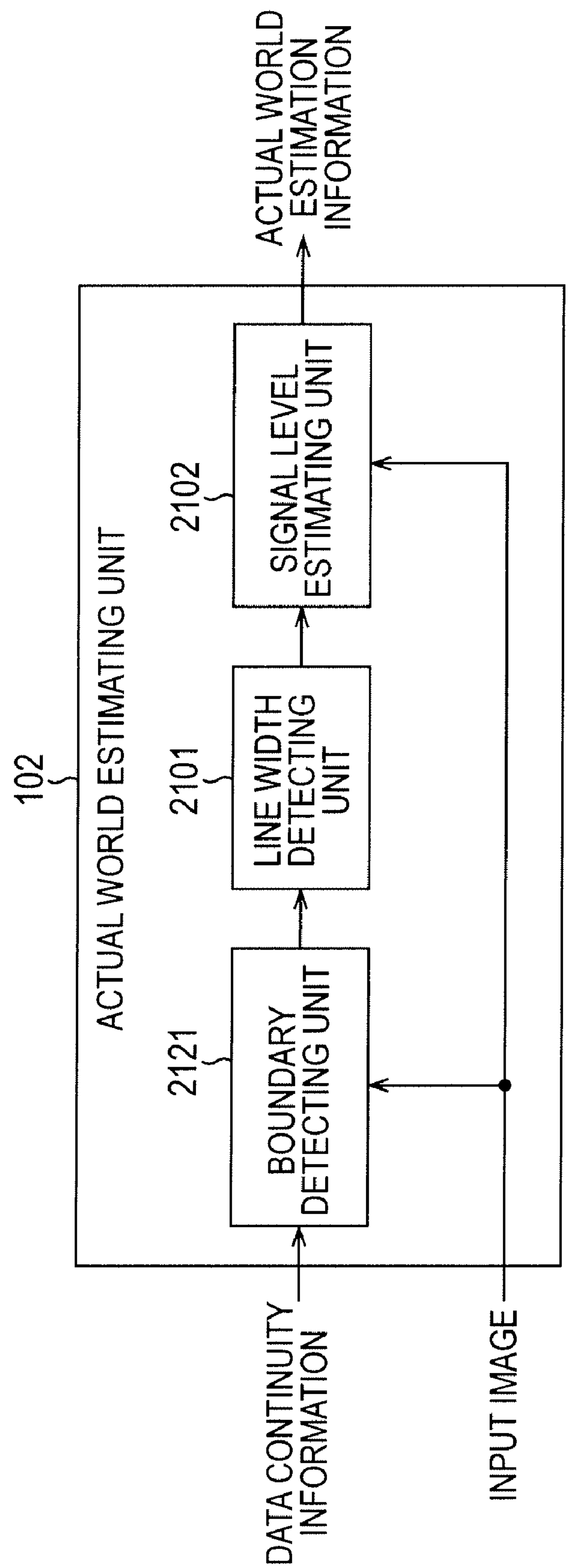

FIG. 192 is a block diagram illustrating another configuration of the actual world estimating unit 102.

Figure 193:
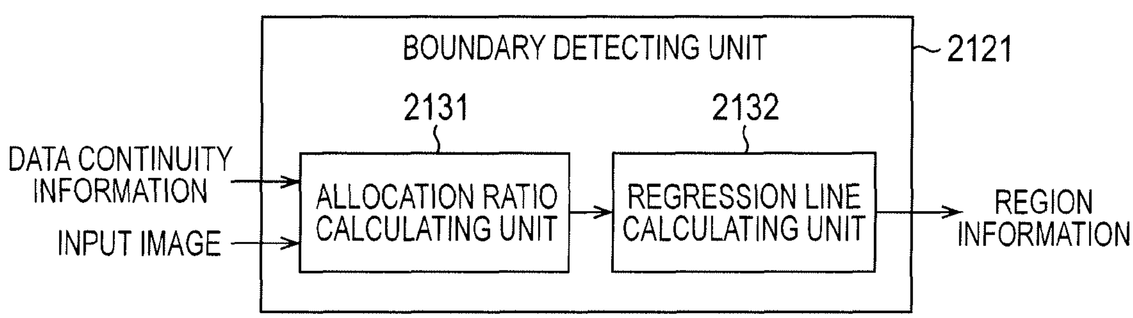

FIG. 193 is a block diagram illustrating the configuration of a boundary detecting unit 2121.

Figure 194:
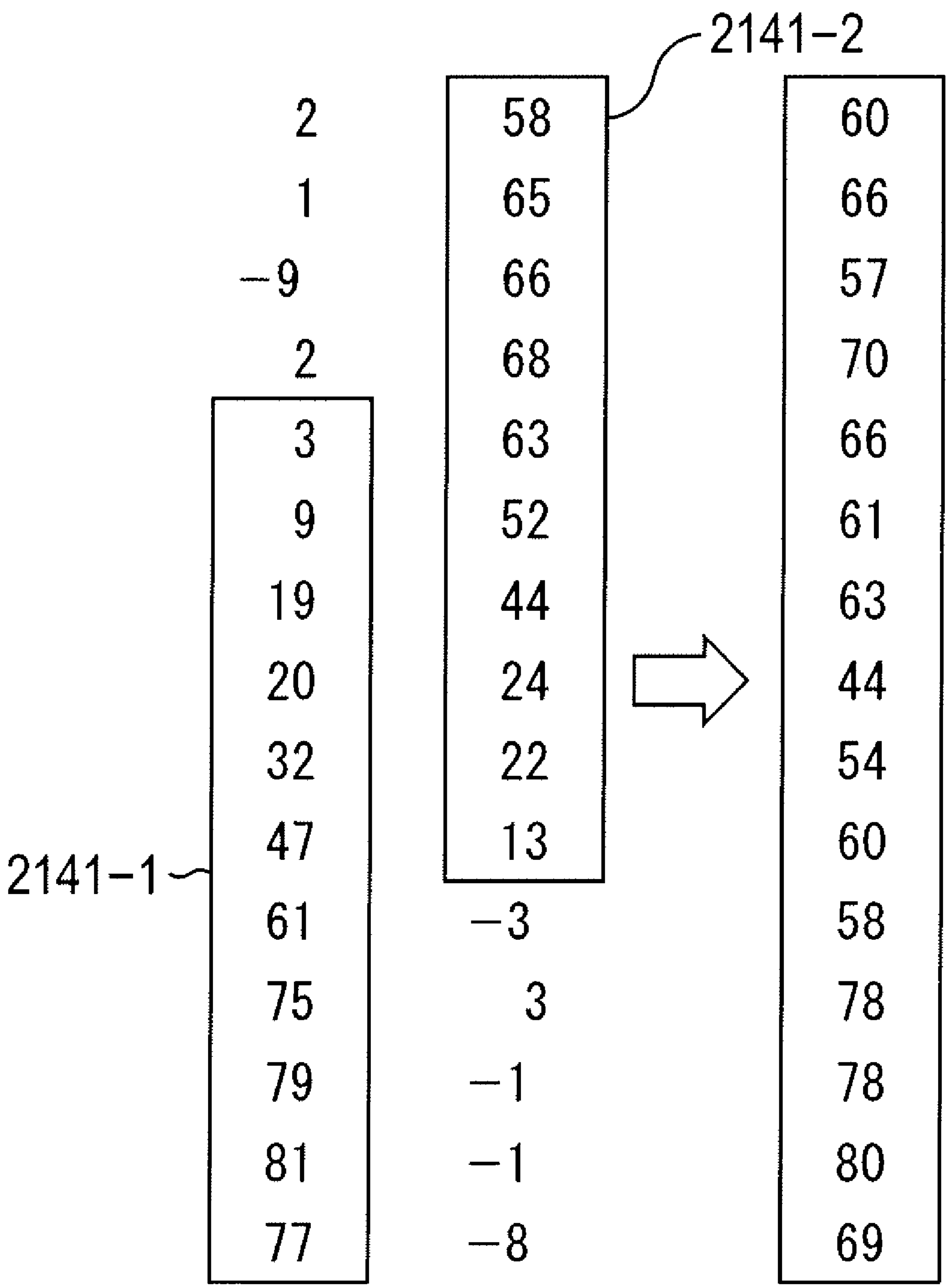

FIG. 194 is a diagram for describing the processing for calculating allocation ratio.

Figure 195:
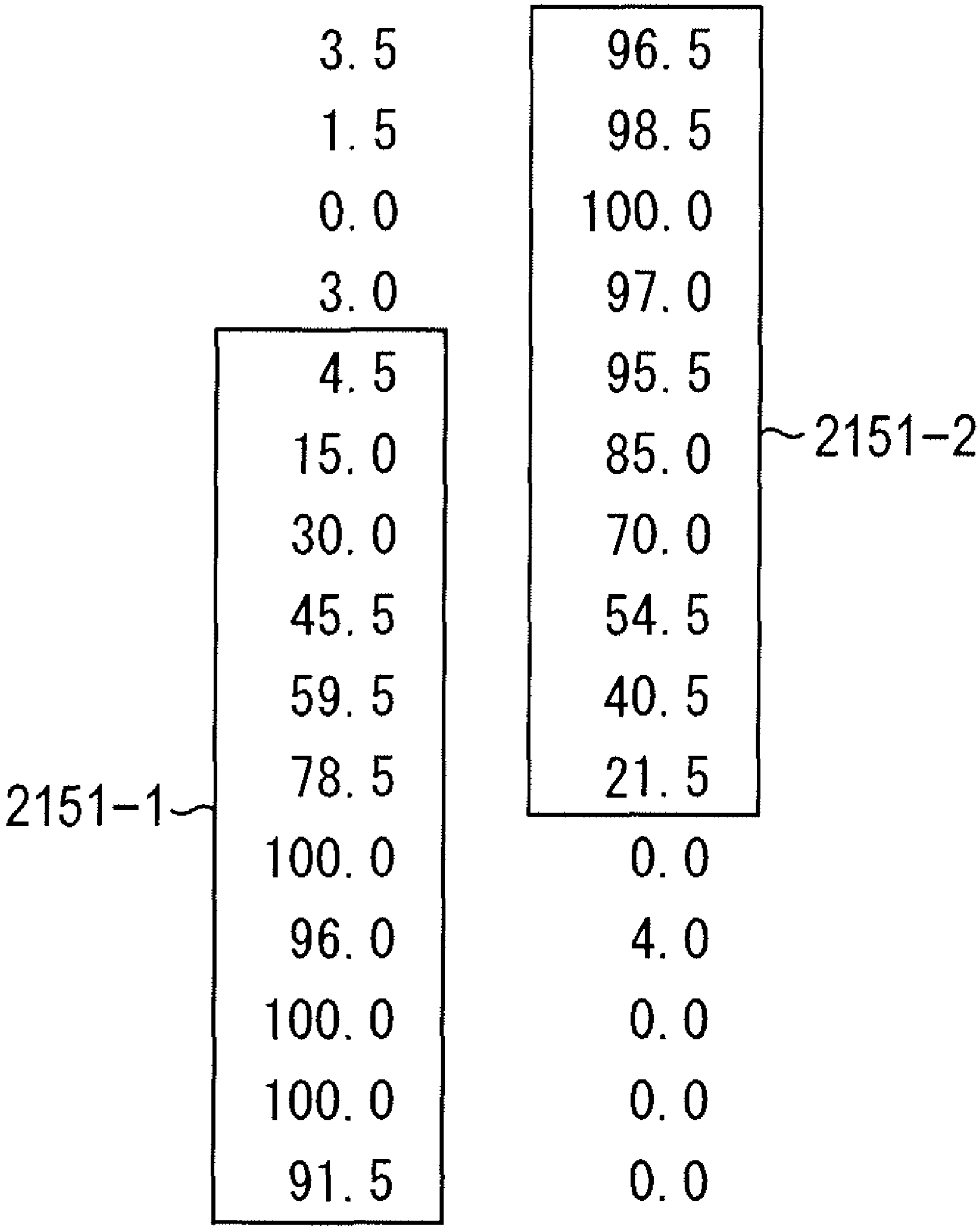

FIG. 195 is a diagram for describing the processing for calculating allocation ratio.

Figure 196:
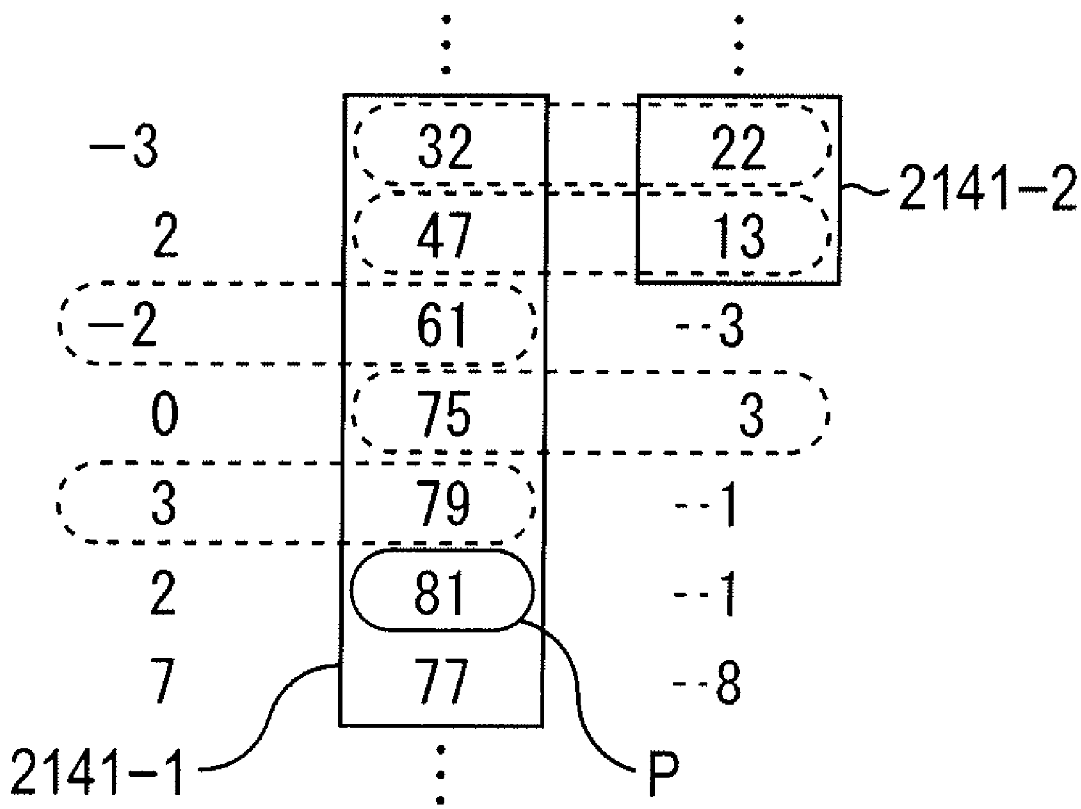

FIG. 196 is a diagram for describing the processing for calculating allocation ratio.

Figure 197:
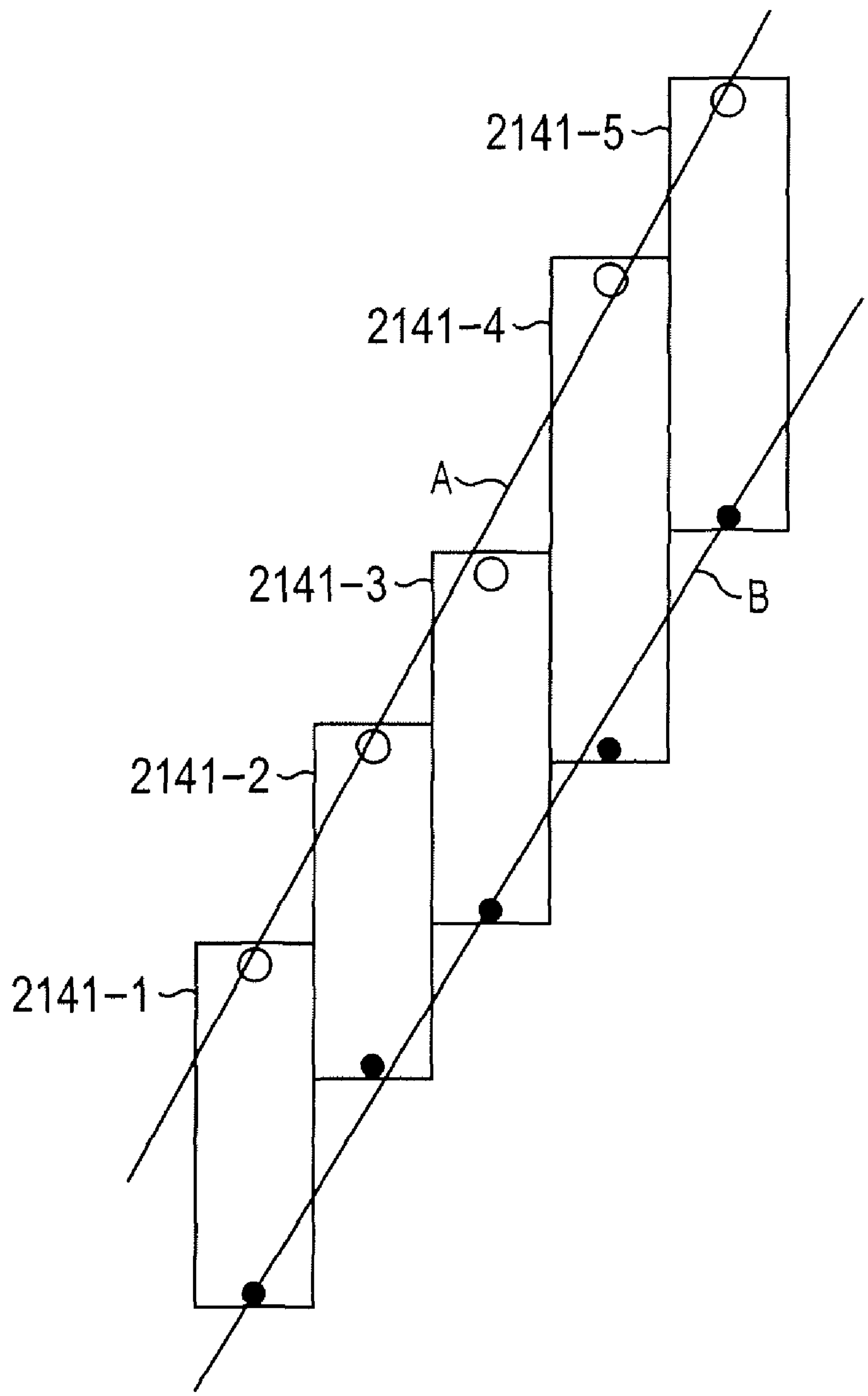

FIG. 197 is a diagram for describing the process for calculating a regression line indicating the boundary of monotonous increase/decrease regions.

Figure 198:
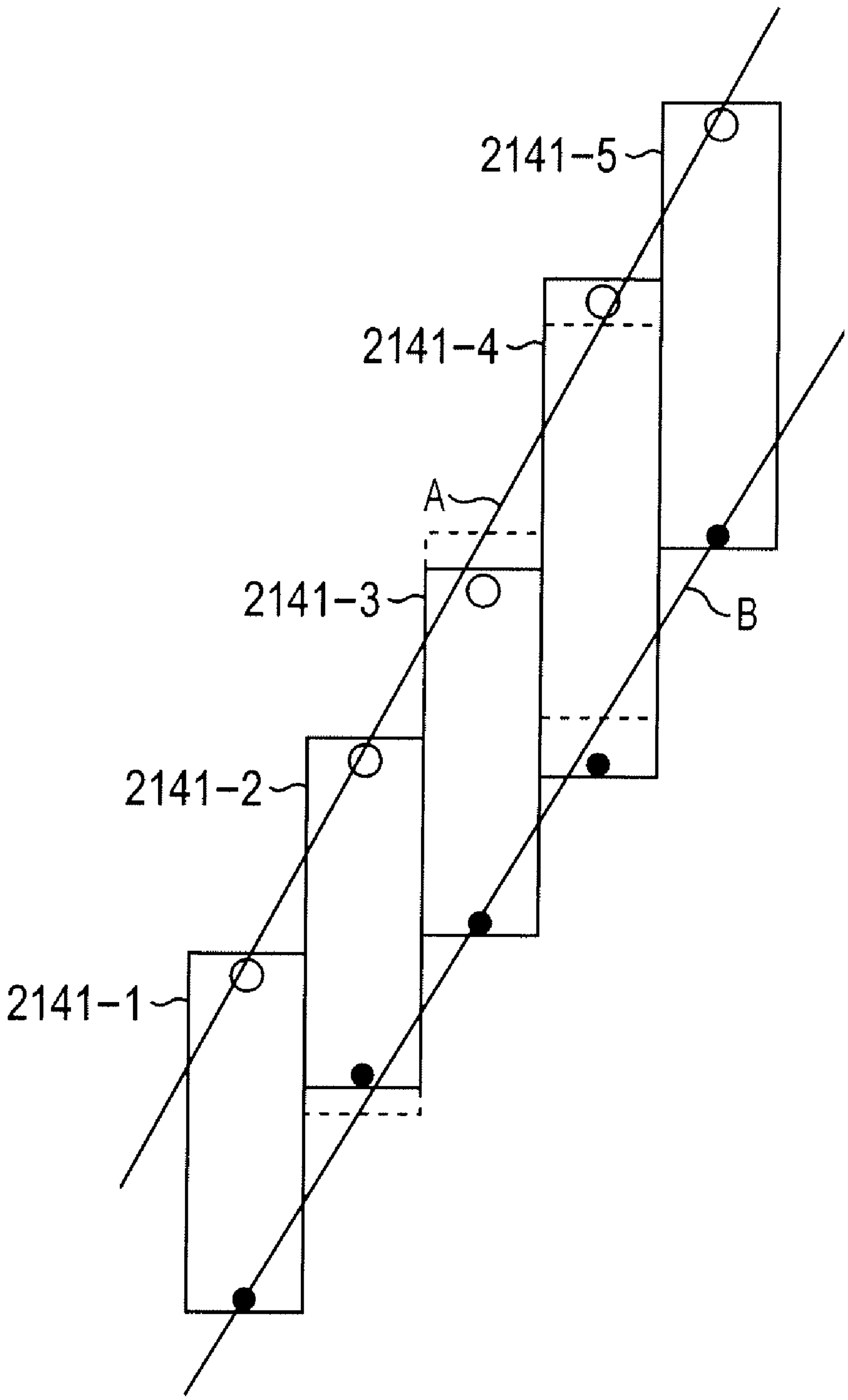

FIG. 198 is a diagram for describing the process for calculating a regression line indicating the boundary of monotonous increase/decrease regions.

Figure 199:
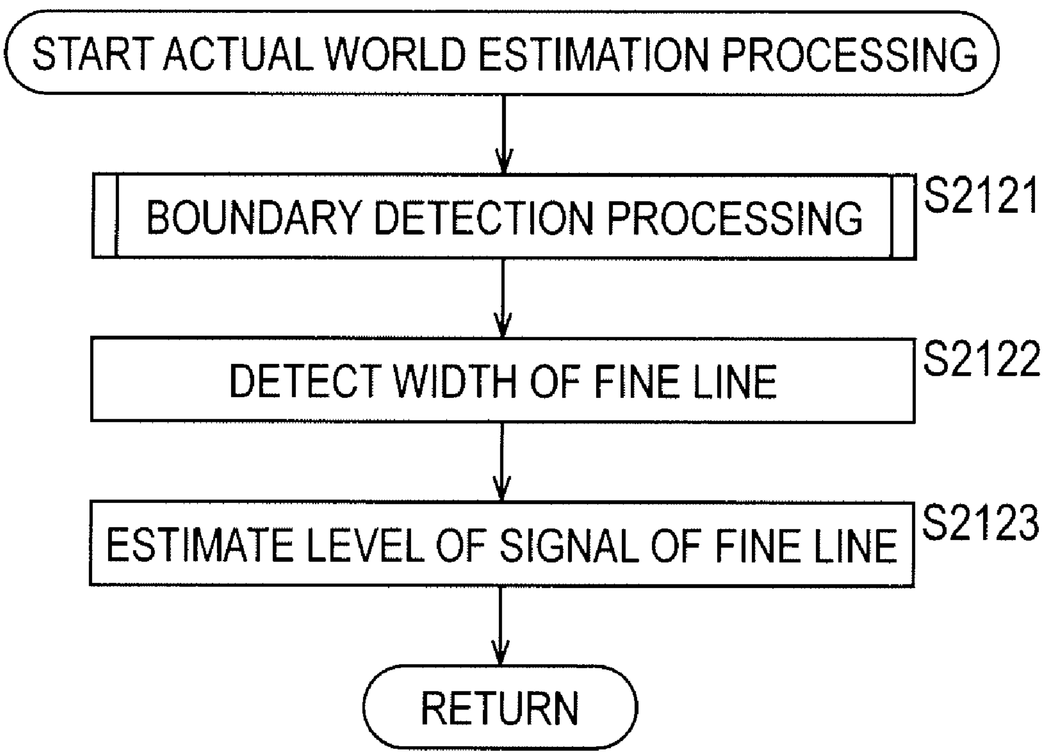

FIG. 199 is a flowchart for describing processing for estimating the actual world.

Figure 200:
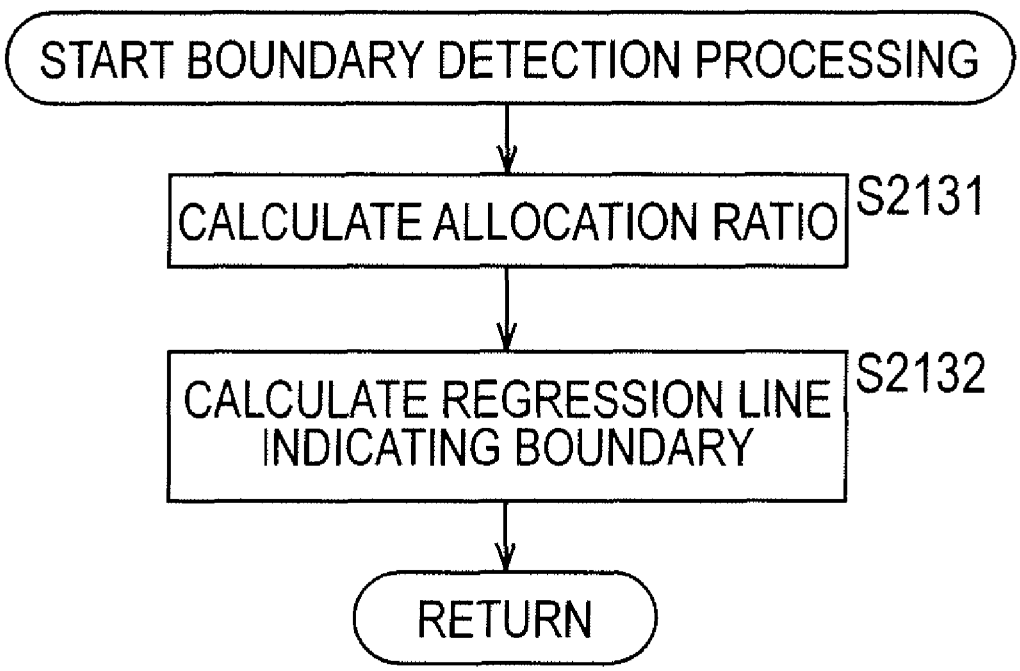

FIG. 200 is a flowchart for describing the processing for boundary detection.

Figure 201:
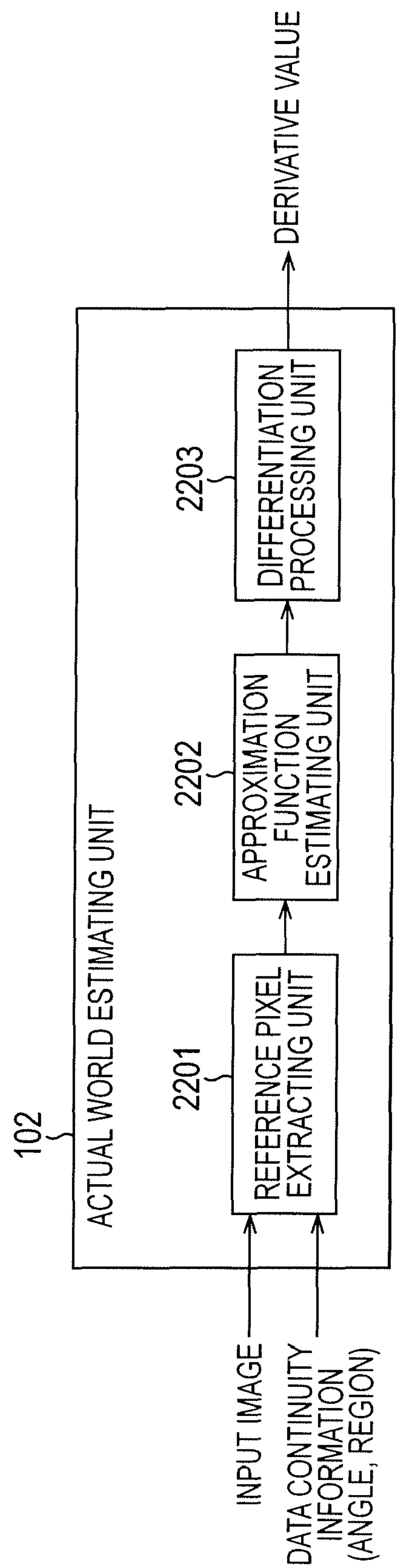

FIG. 201 is a block diagram illustrating the configuration of the actual world estimating unit which estimates the derivative value in the spatial direction as actual world estimating information.

Figure 202:
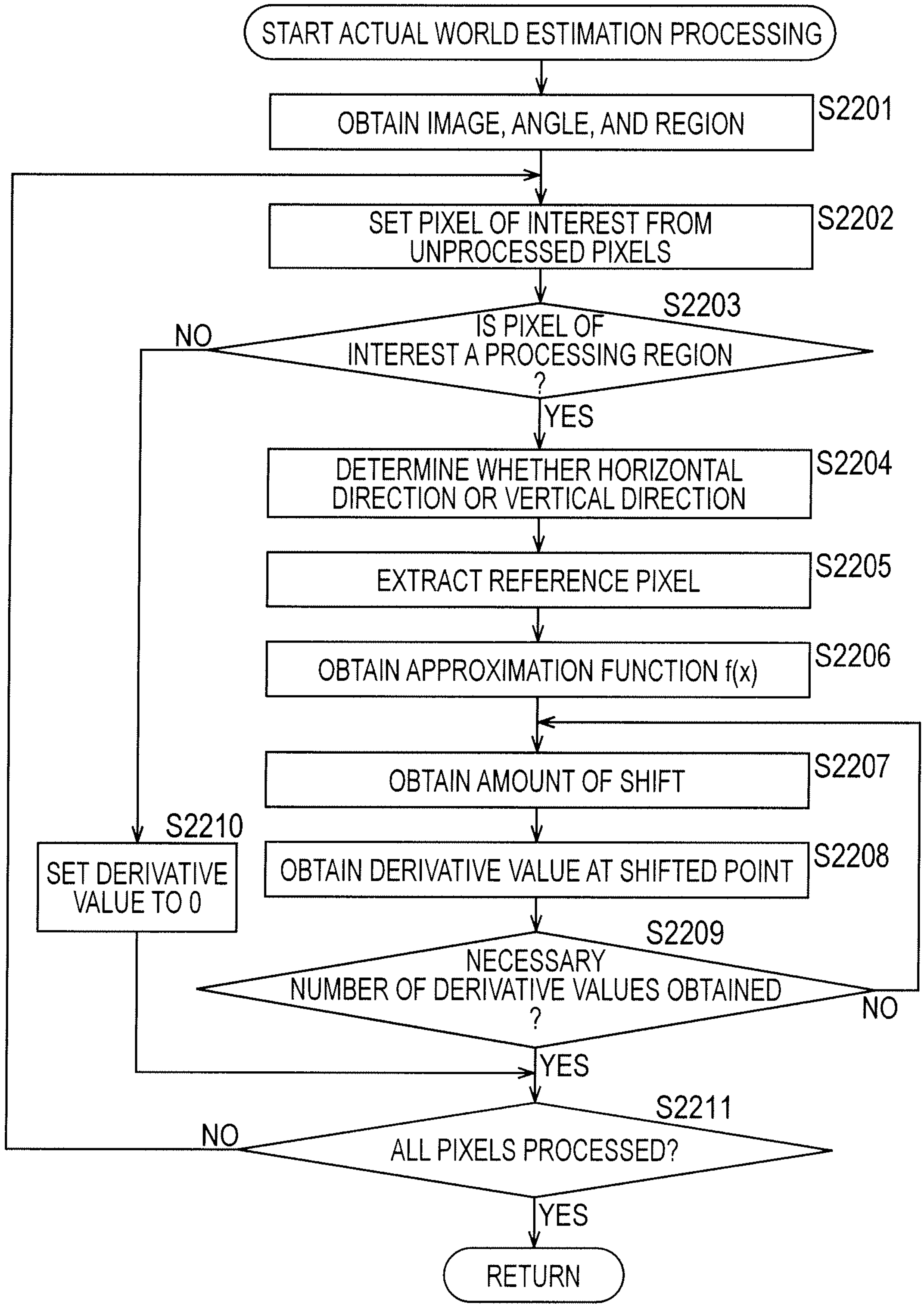

FIG. 202 is a flowchart for describing the processing of actual world estimation with the actual world estimating unit shown in FIG. 201.

Figure 203:
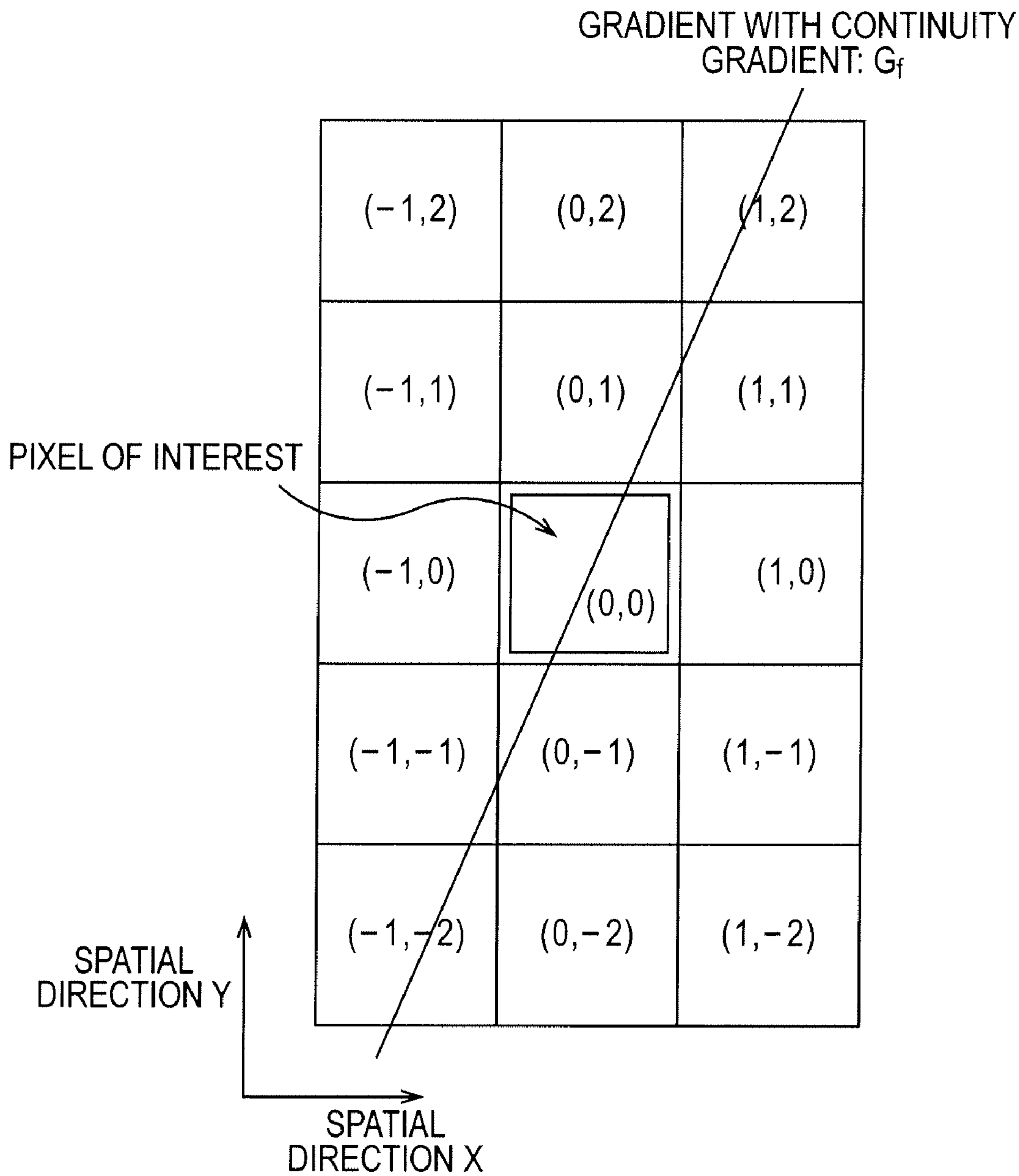

FIG. 203 is a diagram for describing a reference pixel.

Figure 204:
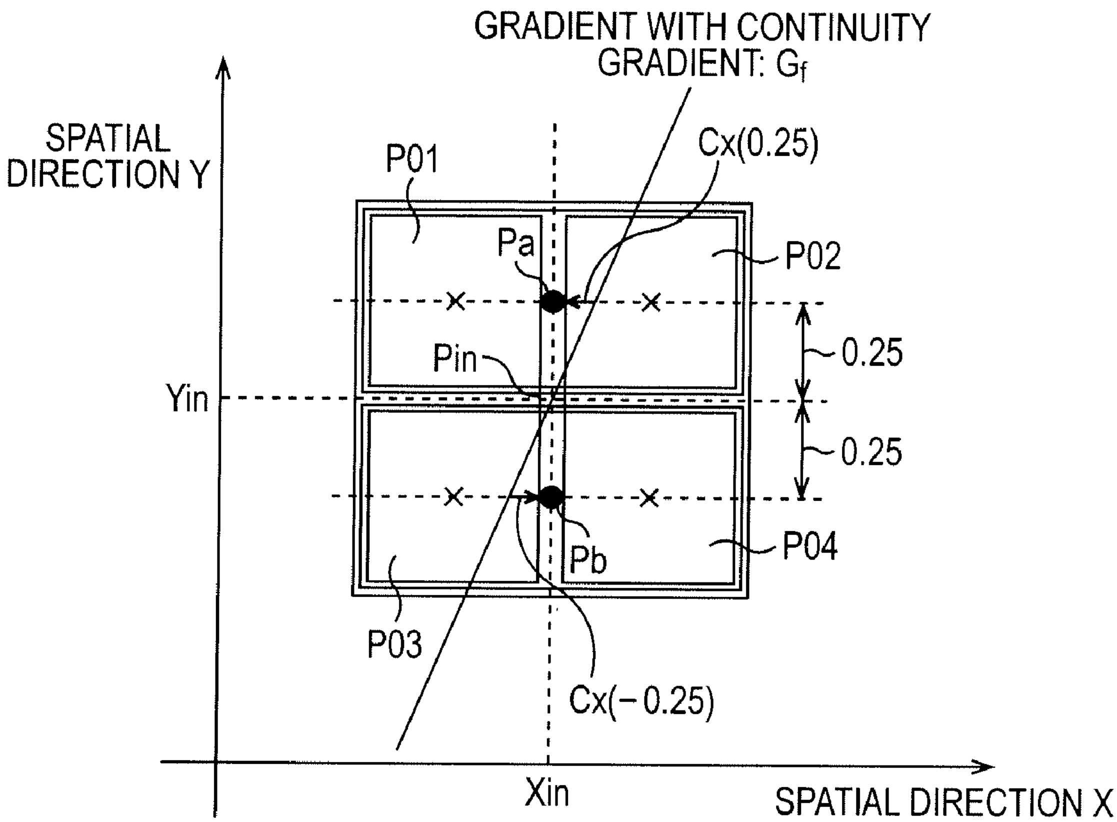

FIG. 204 is a diagram for describing the position for obtaining the derivative value in the spatial direction.

Figure 205:
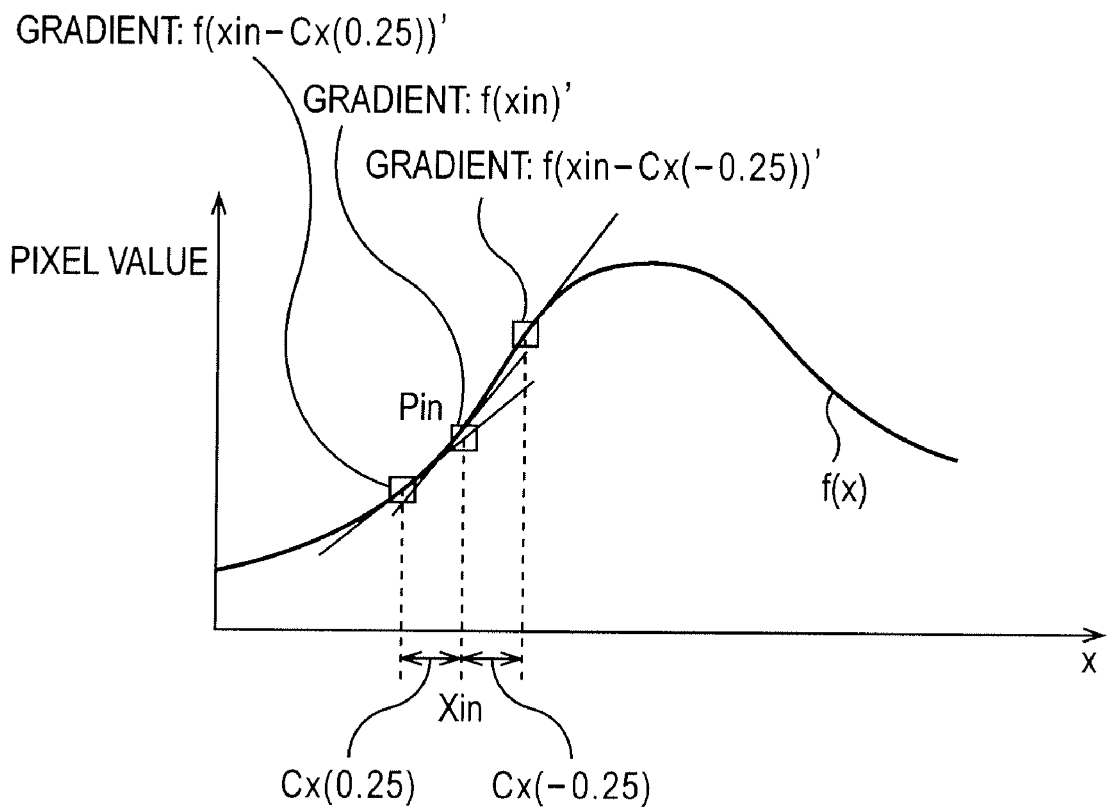

FIG. 205 is a diagram for describing the relationship between the derivative value in the spatial direction and the amount of shift.

Figure 206:
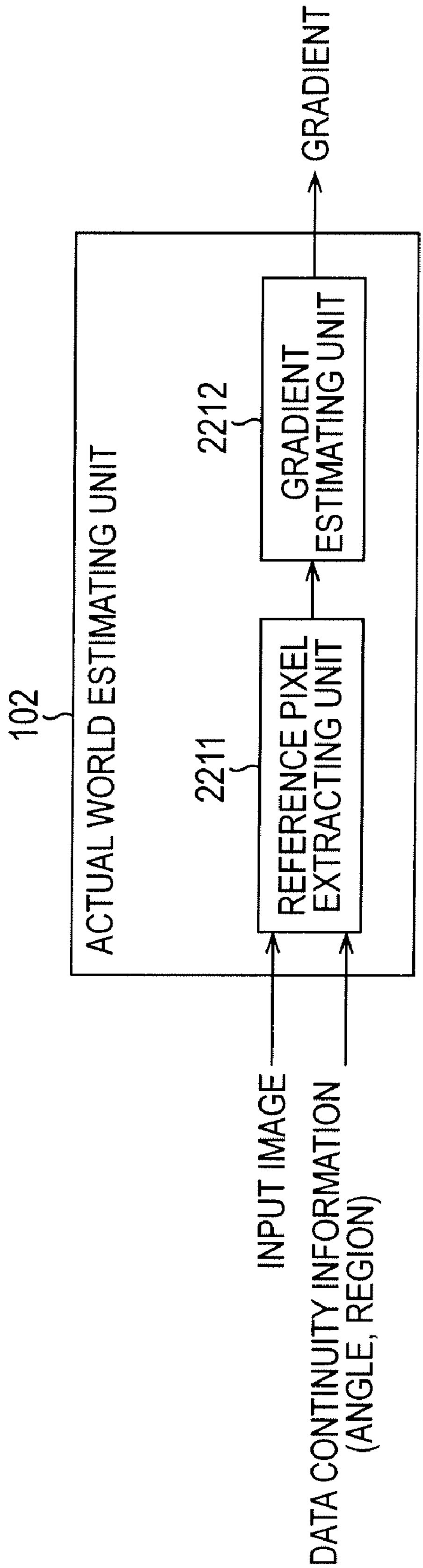

FIG. 206 is a block diagram illustrating the configuration of the actual world estimating unit which estimates the gradient in the spatial direction as actual world estimating information.

Figure 207:
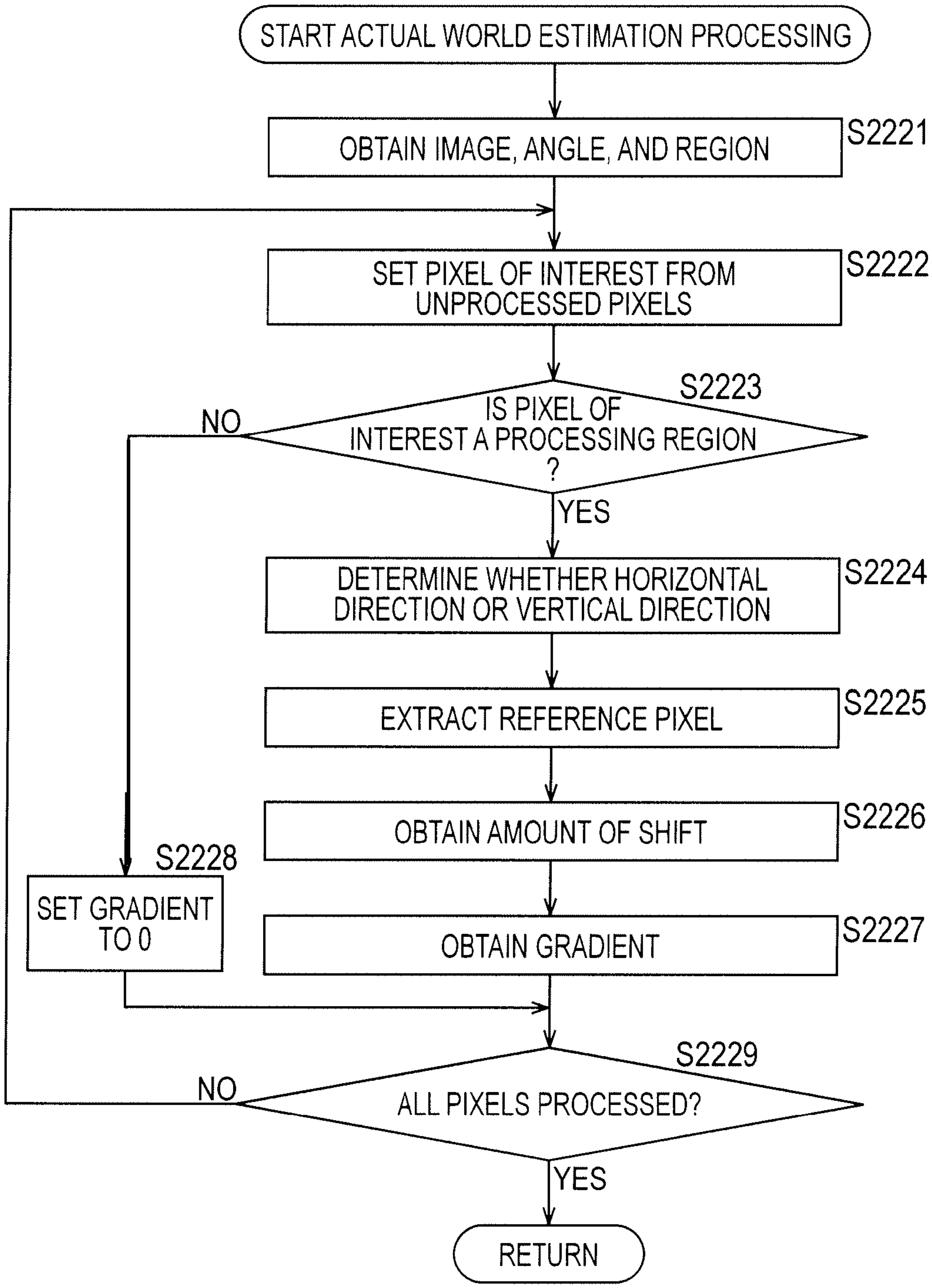

FIG. 207 is a flowchart for describing the processing of actual world estimation with the actual world estimating unit shown in FIG. 206.

Figure 208:
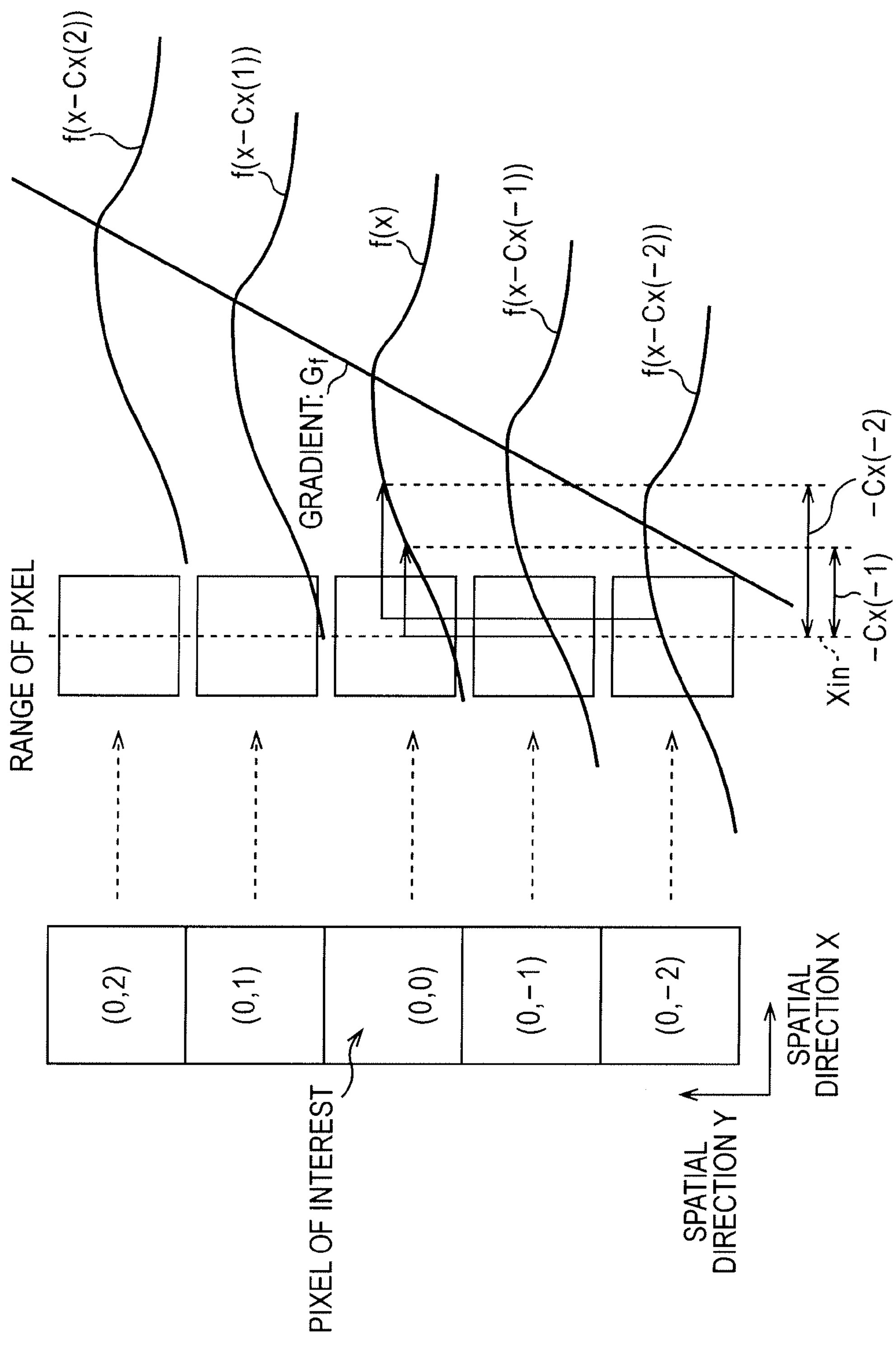

FIG. 208 is a diagram for describing processing for obtaining the gradient in the spatial direction.

Figure 209:
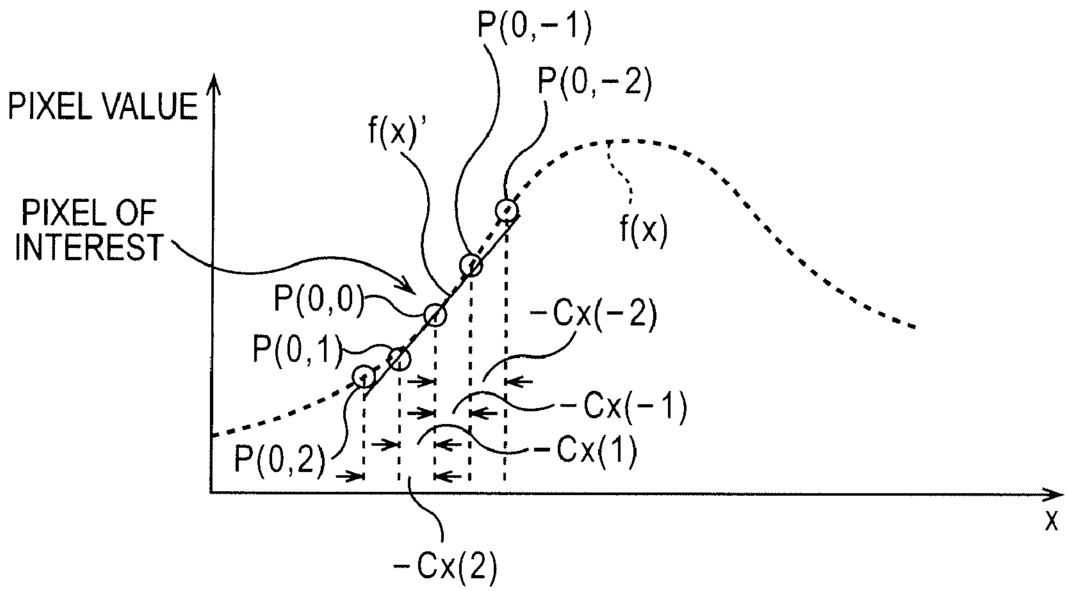

FIG. 209 is a diagram for describing processing for obtaining the gradient in the spatial direction.

Figure 210:
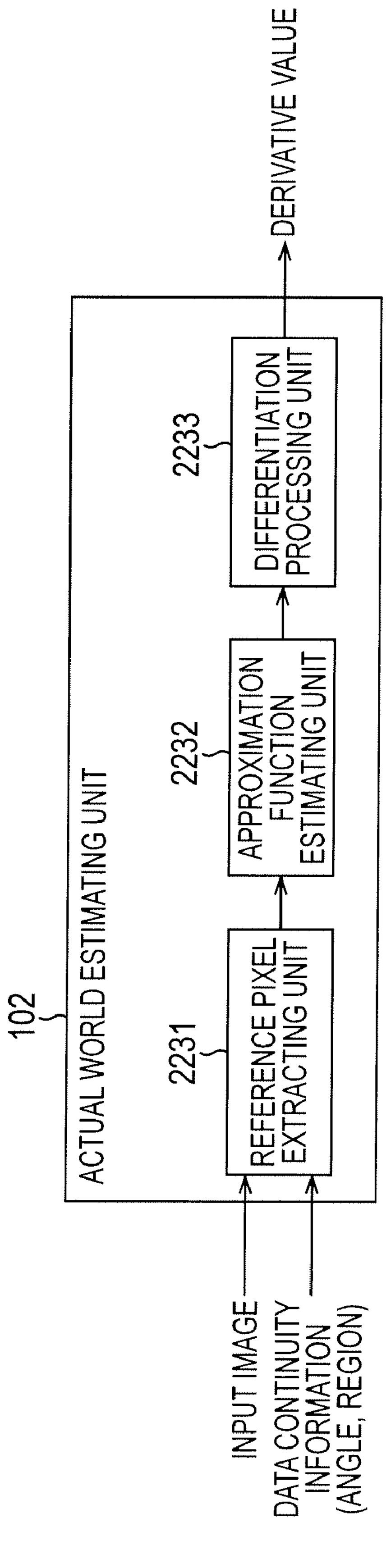

FIG. 210 is a block diagram illustrating the configuration of the actual world estimating unit for estimating the derivative value in the frame direction as actual world estimating information.

Figure 211:
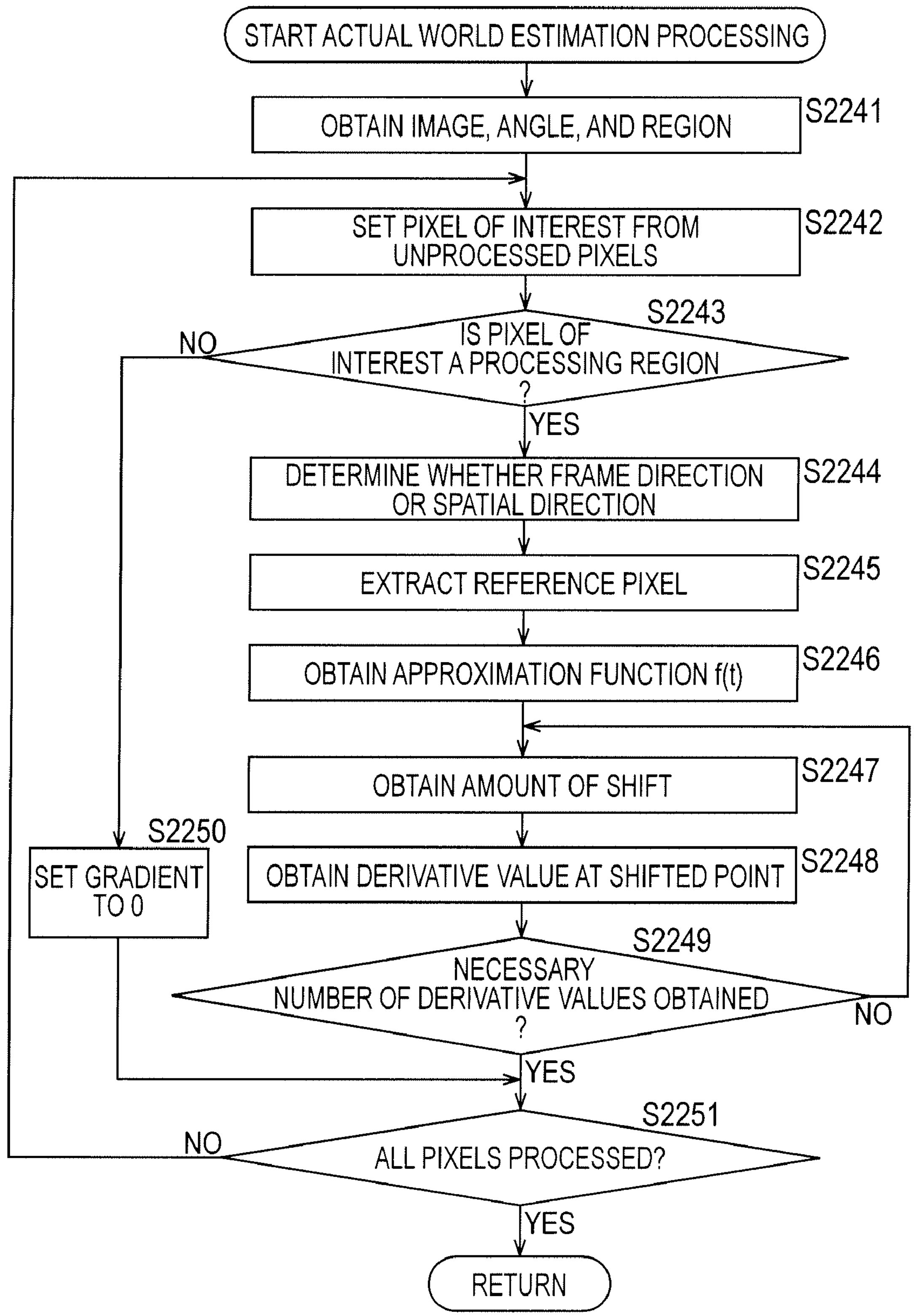

FIG. 211 is a flowchart for describing the processing of actual world estimation with the actual world estimating unit shown in FIG. 210.

Figure 212:
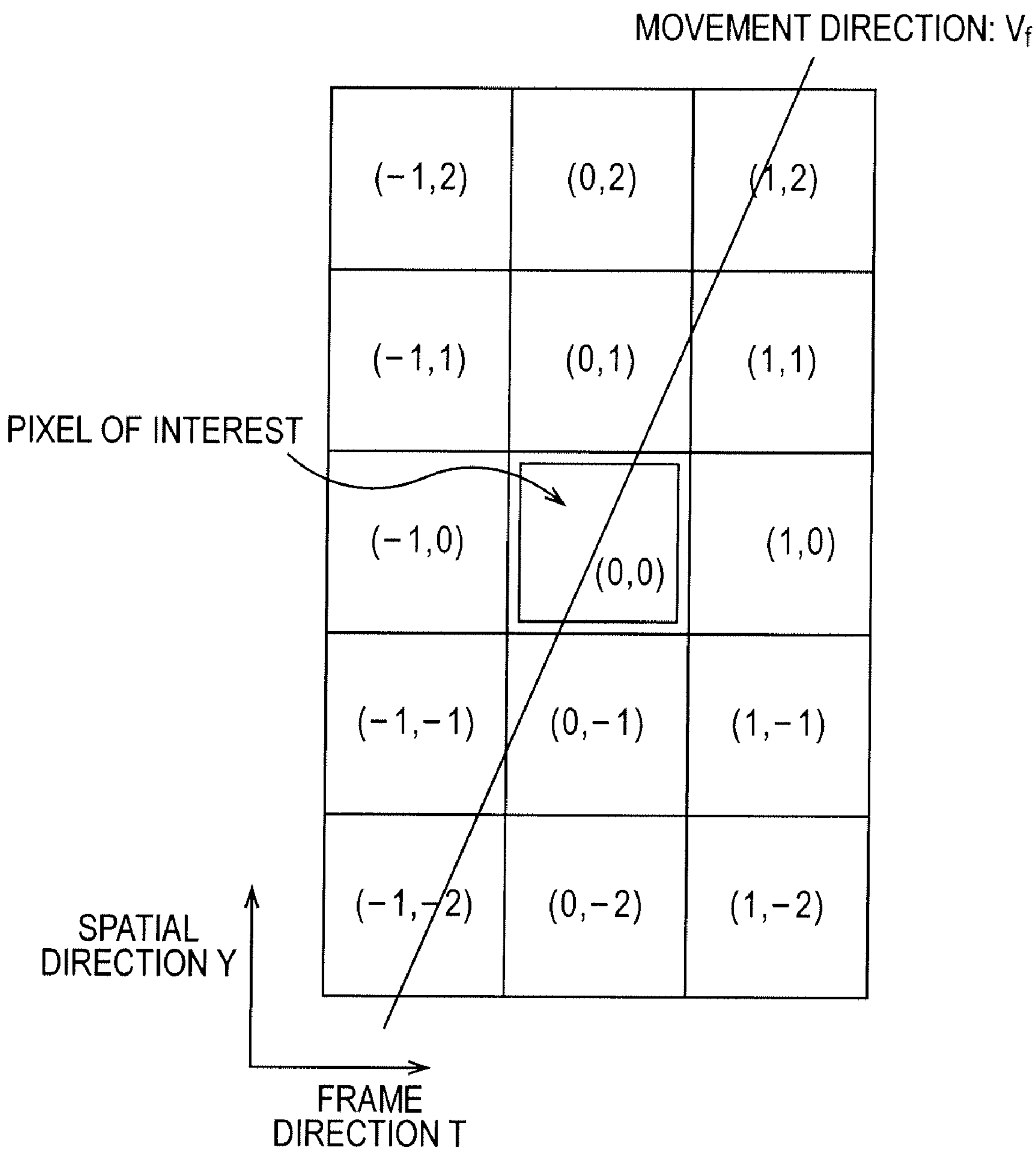

FIG. 212 is a diagram for describing a reference pixel.

Figure 213:
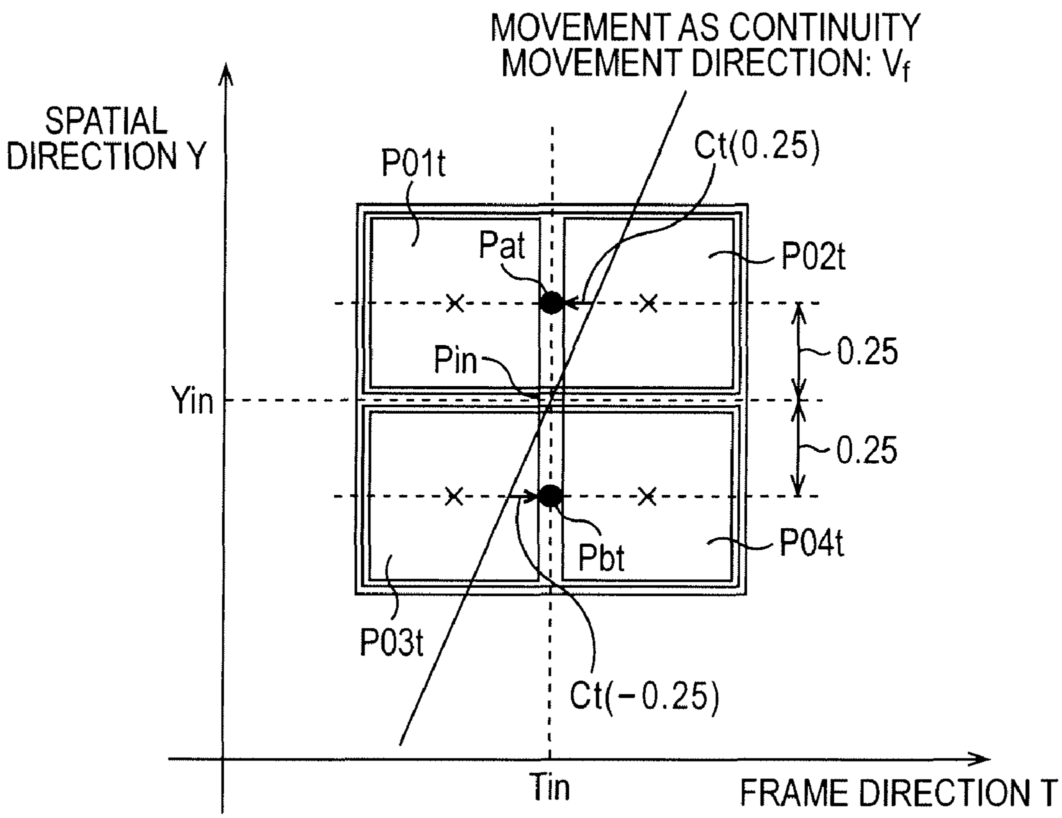

FIG. 213 is a diagram for describing the position for obtaining the derivative value in the frame direction.

Figure 214:
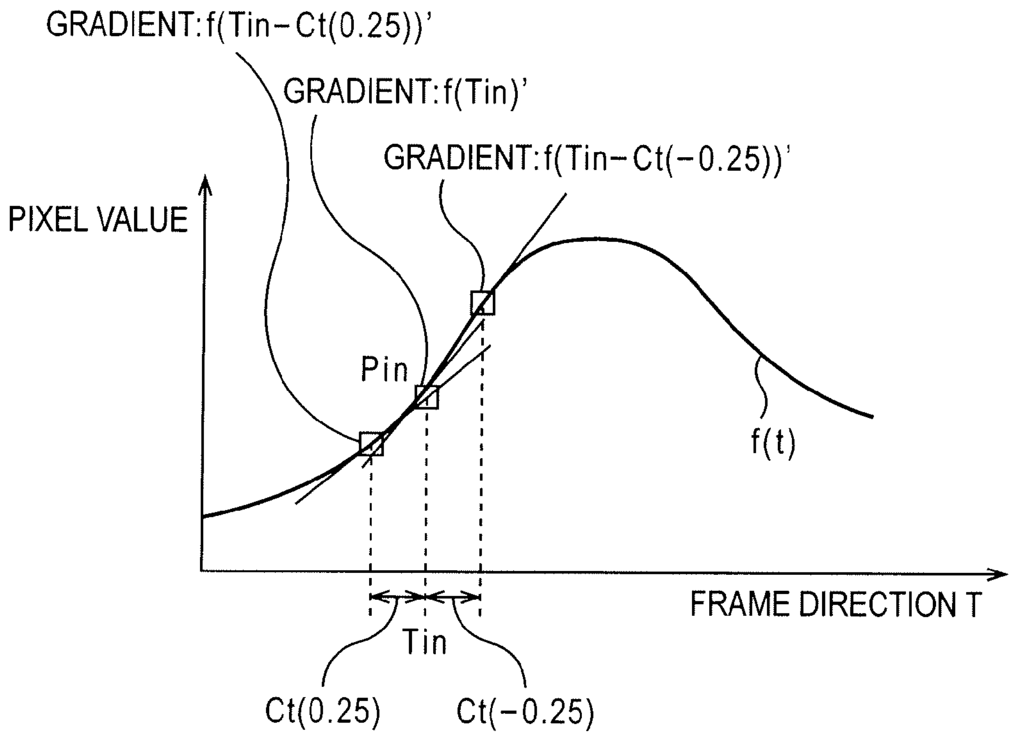

FIG. 214 is a diagram for describing the relationship between the derivative value in the frame direction and the amount of shift.

Figure 215:
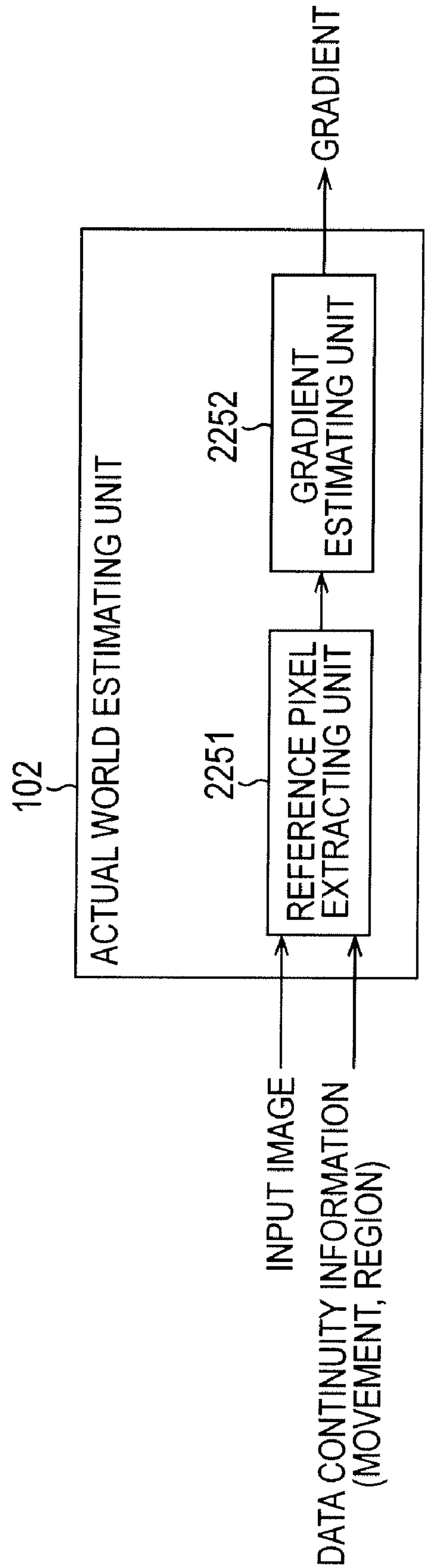

FIG. 215 is a block diagram illustrating the configuration of the actual world estimating unit which estimates the gradient in the frame direction as actual world estimating information.

Figure 216:
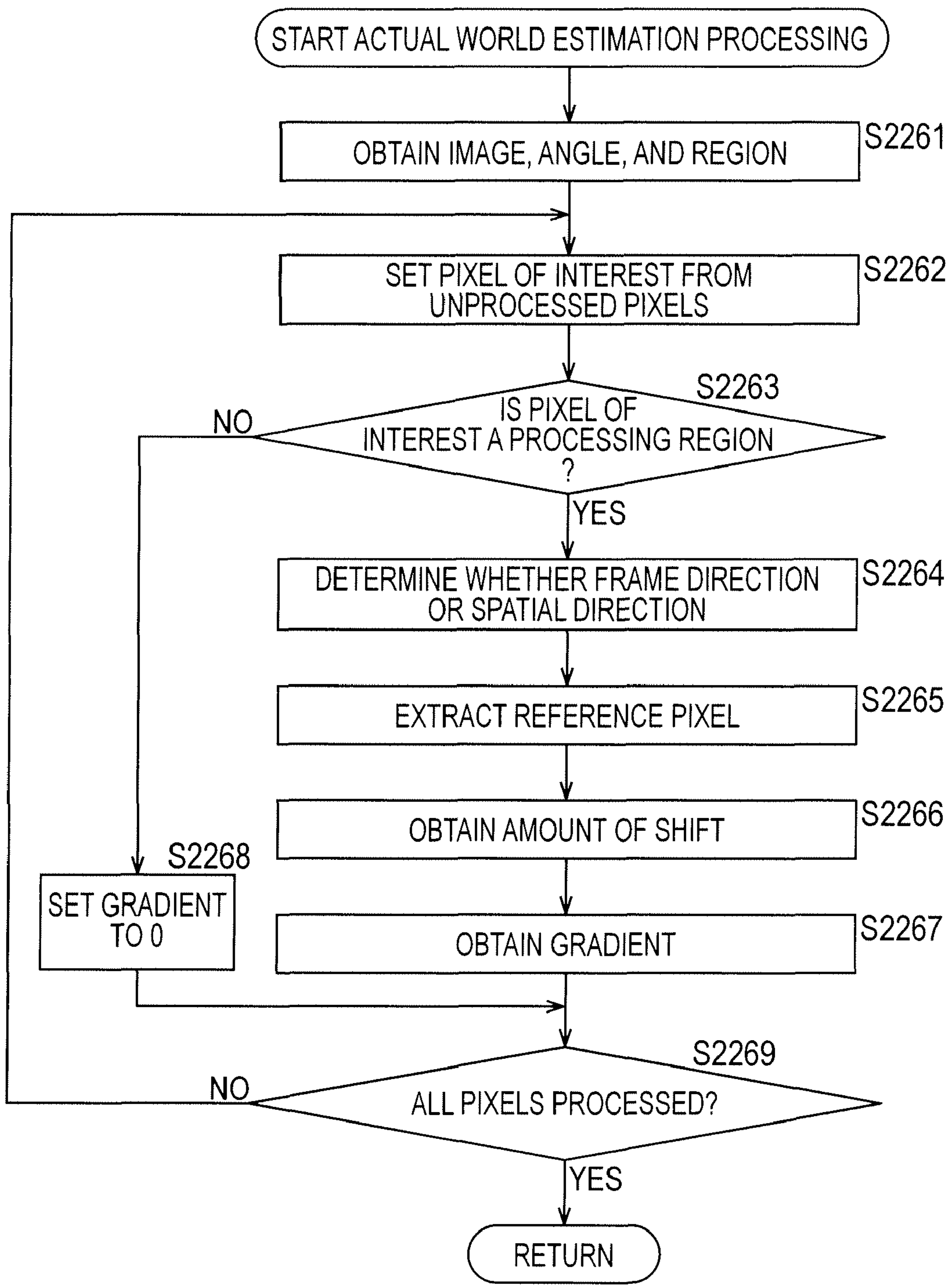

FIG. 216 is a flowchart for describing the processing of actual world estimation with the actual world estimating unit shown in FIG. 215.

Figure 217:
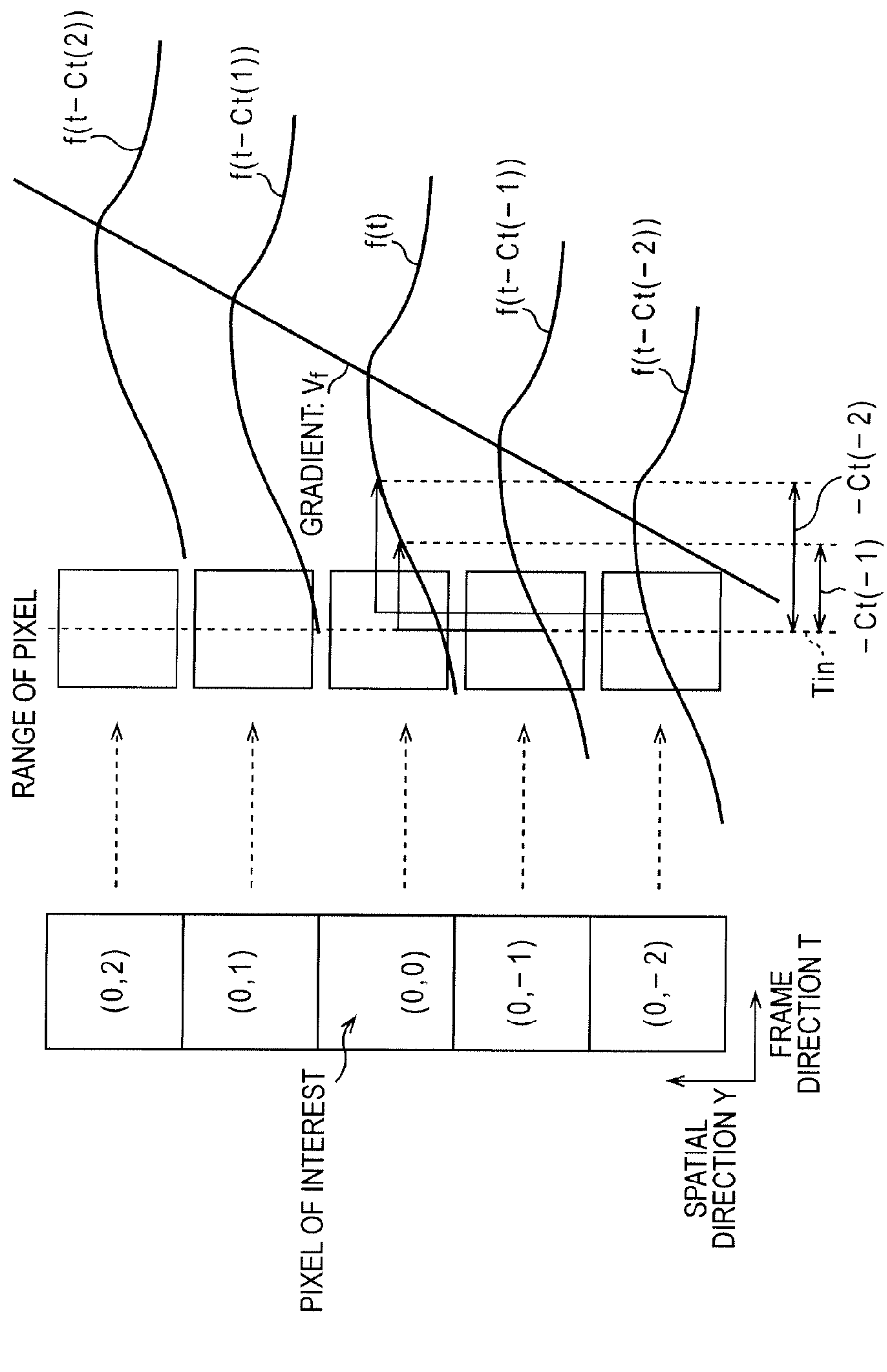

FIG. 217 is a diagram for describing processing for obtaining the gradient in the frame direction.

Figure 218:
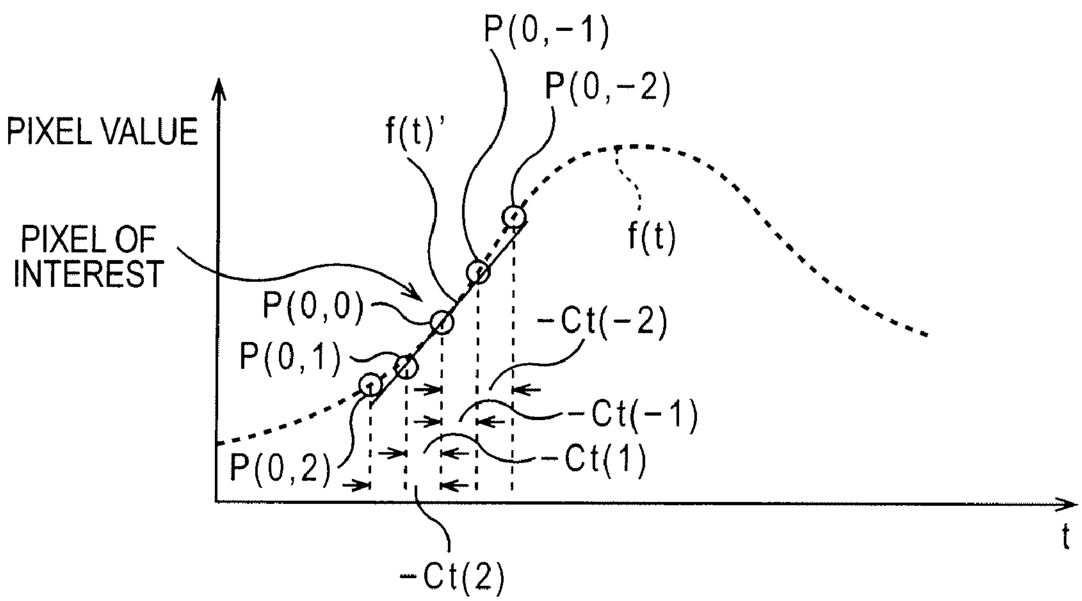

FIG. 218 is a diagram for describing processing for obtaining the gradient in the frame direction.

Figure 3:
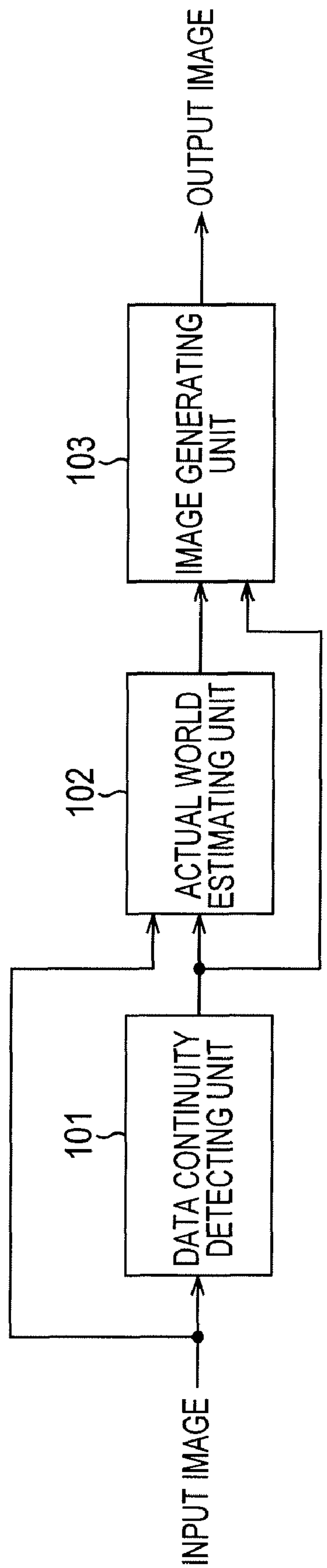
FIG. 3 is a block diagram illustrating a signal processing device 4.
Figure 219:
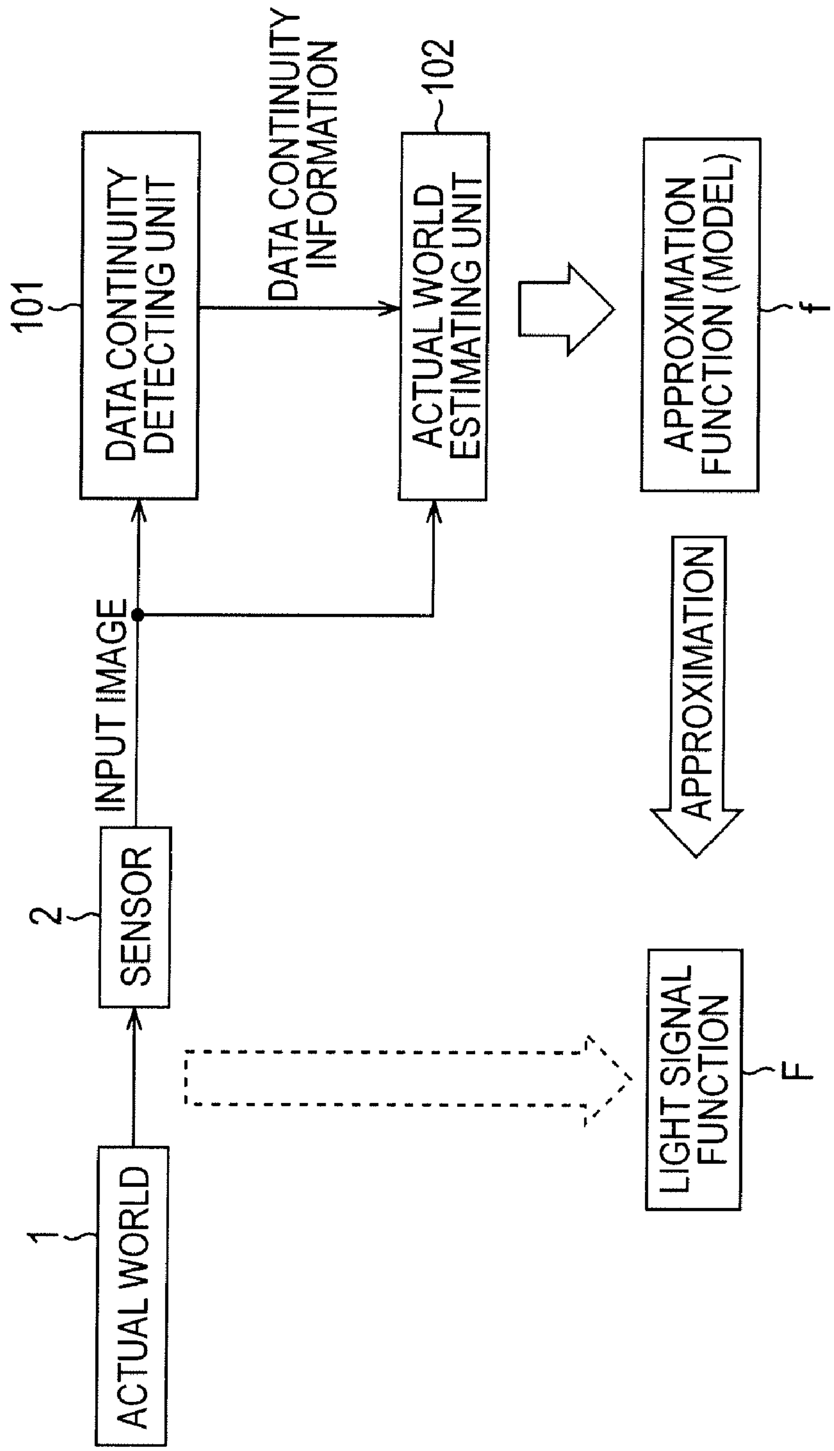

FIG. 219 is a diagram for describing the principle of function approximation, which is an example of an embodiment of the actual world estimating unit shown in FIG. 3.

Figure 220:
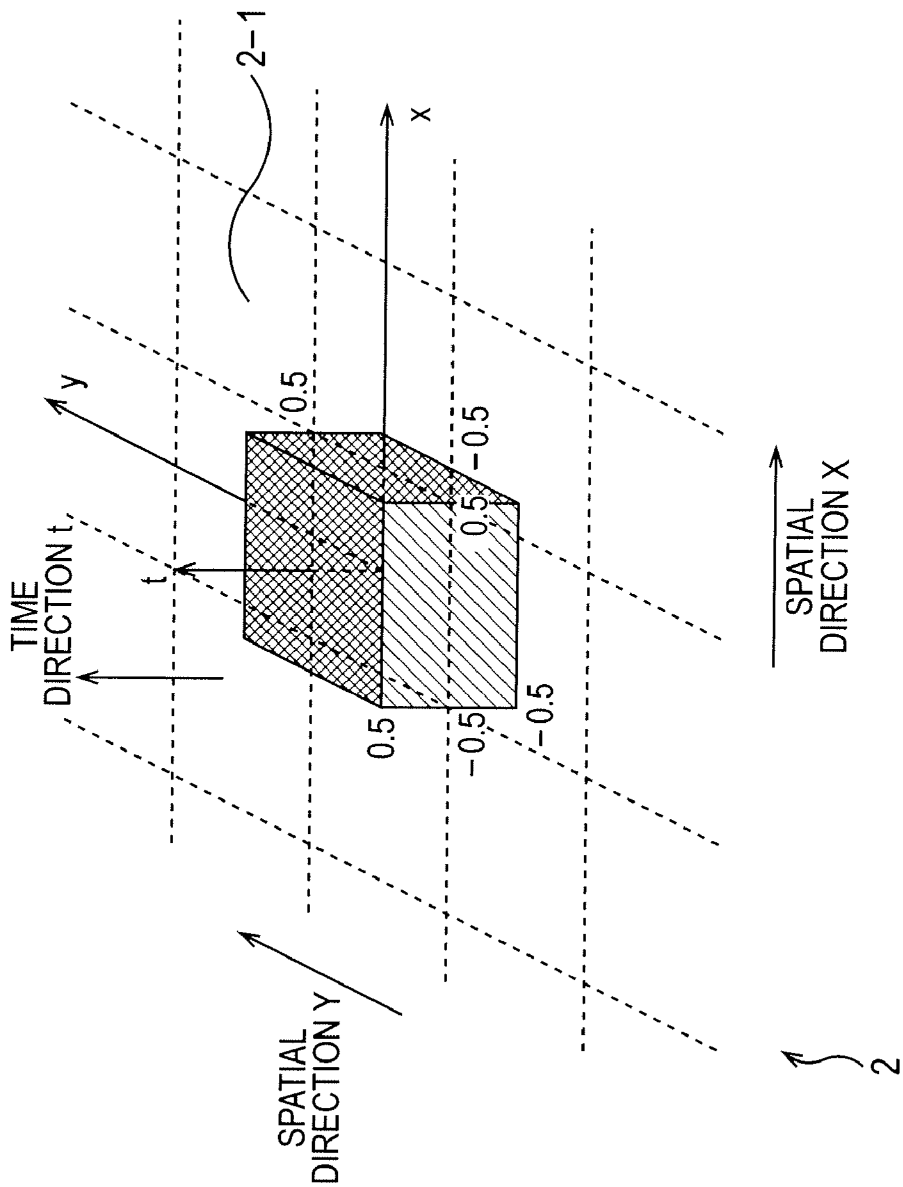

FIG. 220 is a diagram for describing integration effects in the event that the sensor is a CCD.

Figure 221:
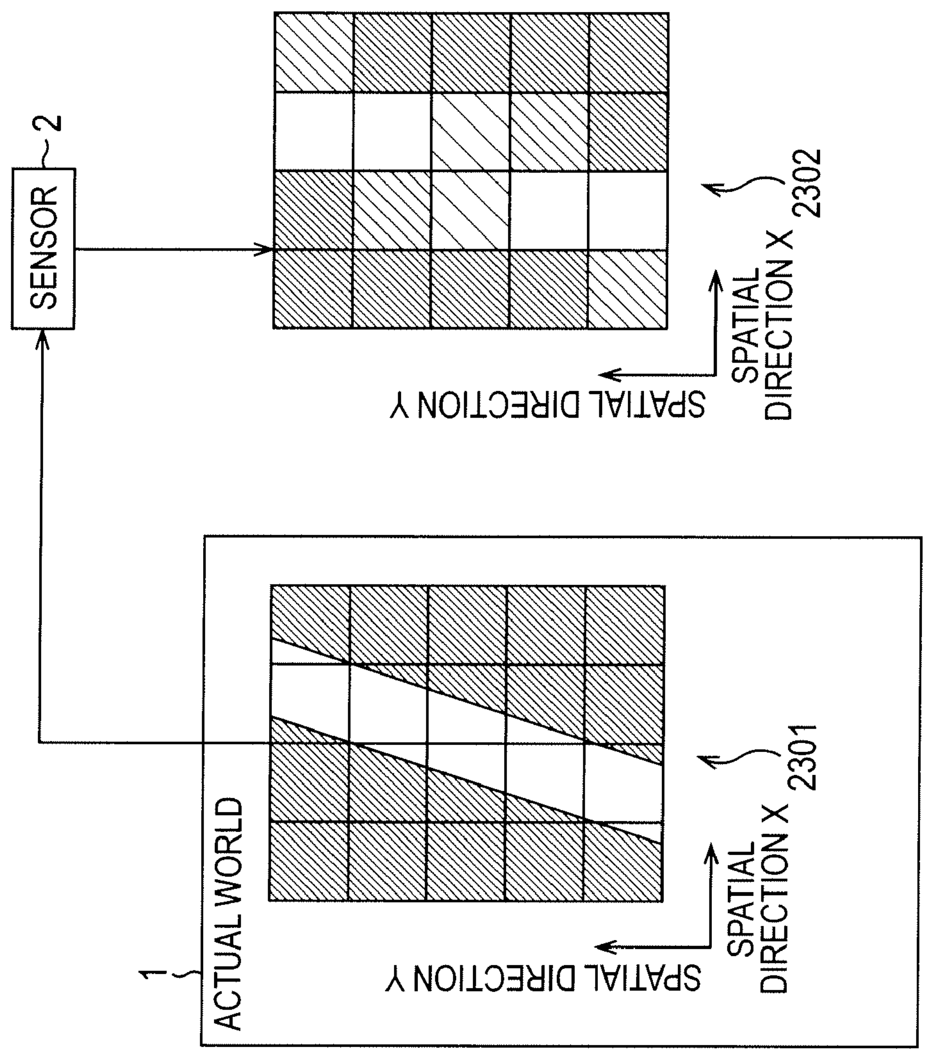

FIG. 221 is a diagram for describing a specific example of the integration effects of the sensor shown in FIG. 220.

Figure 222:
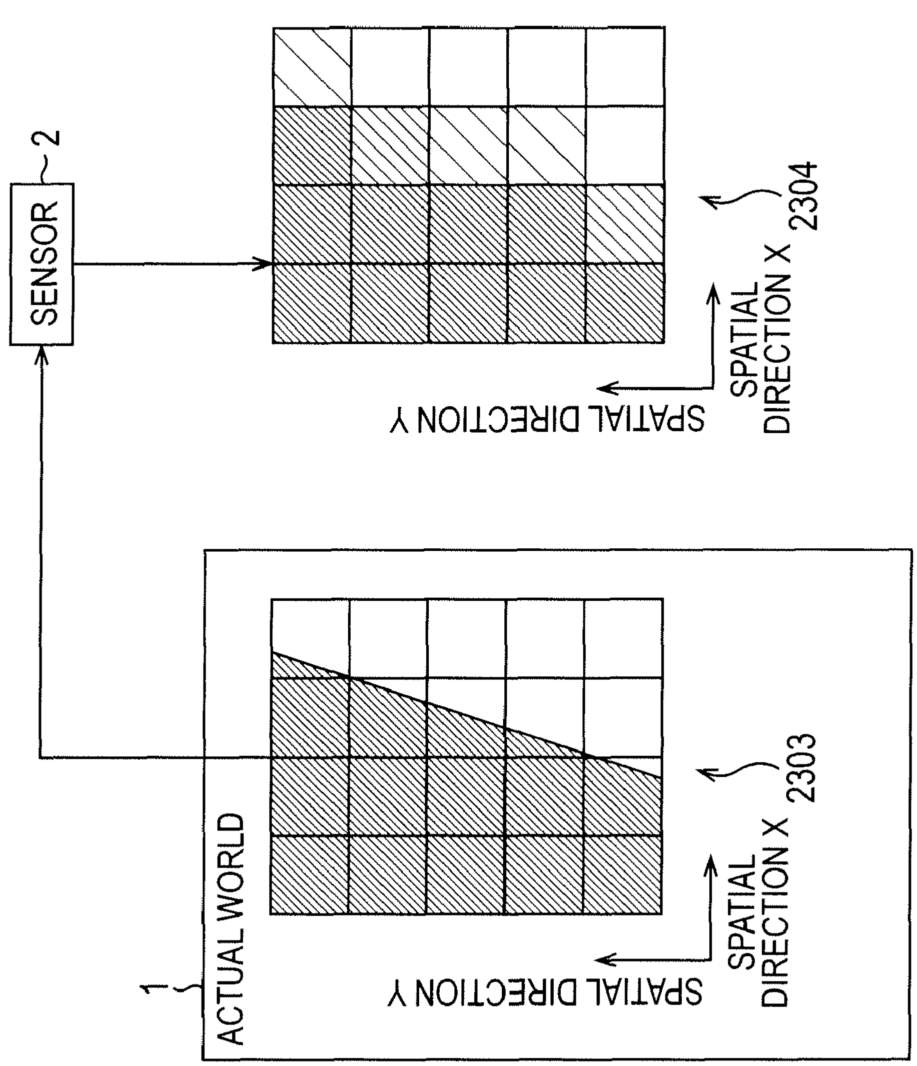

FIG. 222 is a diagram for describing a specific example of the integration effects of the sensor shown in FIG. 220.

Figure 223:
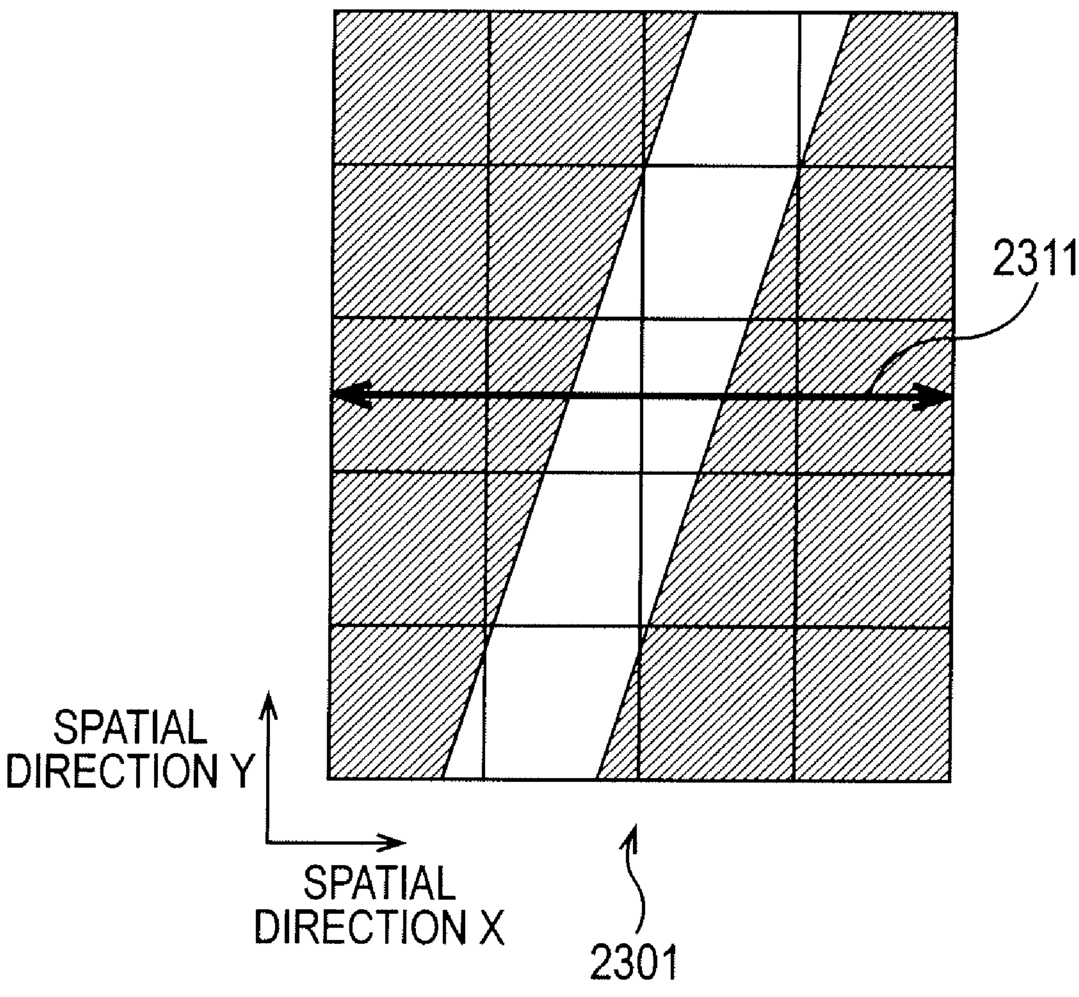

FIG. 223 is a diagram representing a fine-line-inclusive actual world region shown in FIG. 221.

Figure 224:
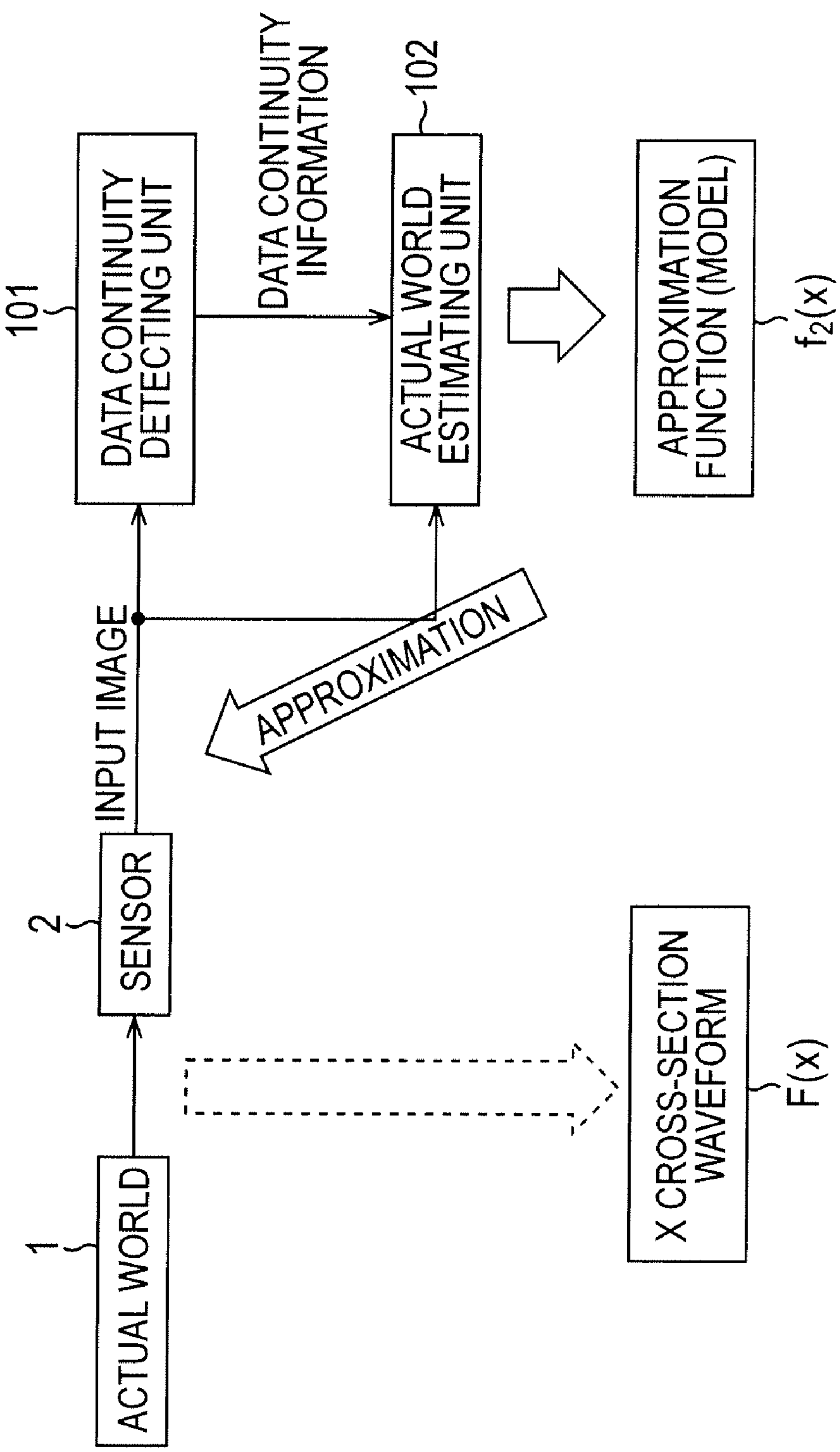

FIG. 224 is a diagram for describing the principle of an example of an embodiment of the actual world estimating unit shown in FIG. 3, in comparison with the example shown in FIG. 219.

Figure 225:
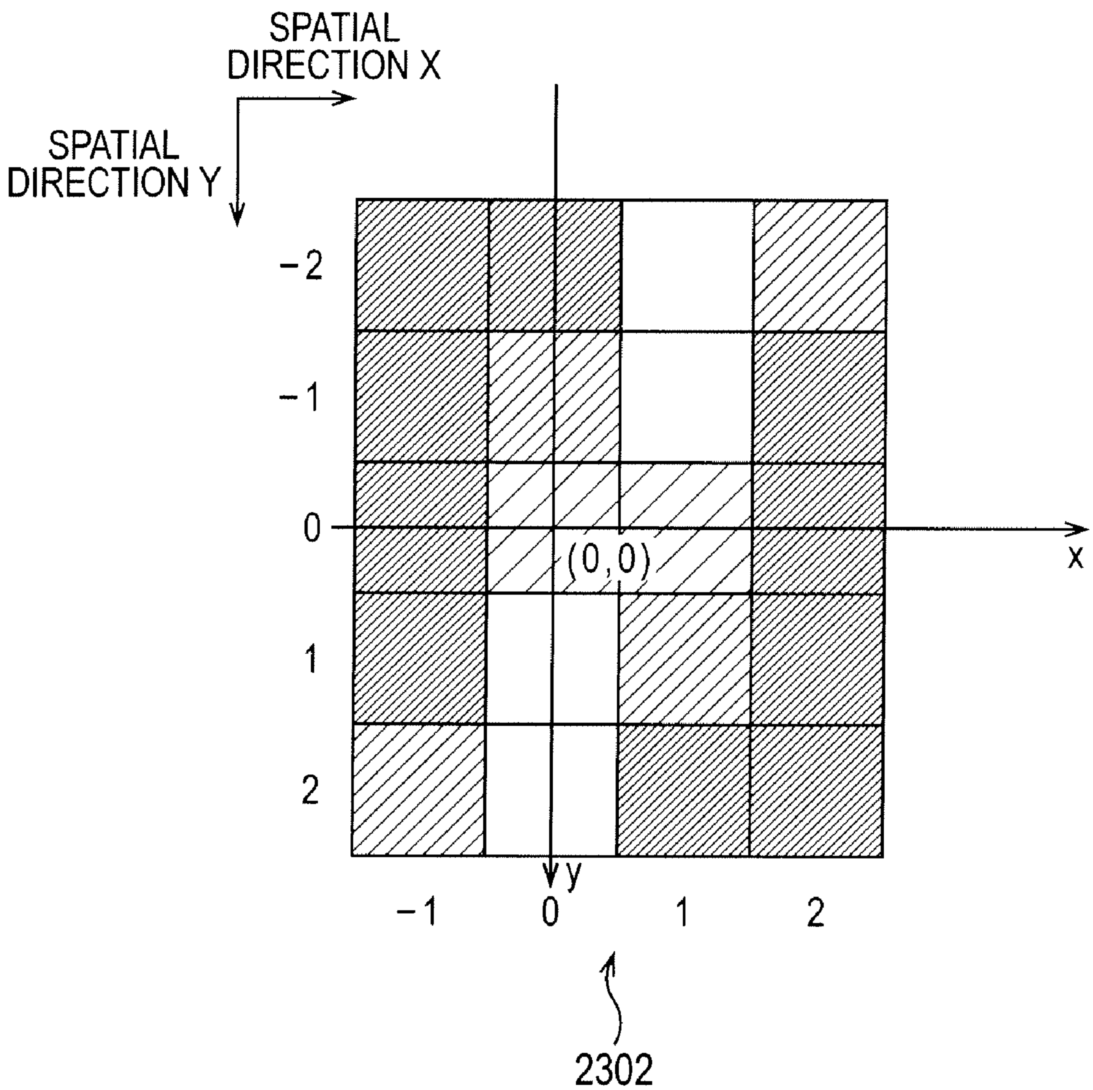

FIG. 225 is a diagram representing the fine-line-inclusive data region shown in FIG. 221.

Figure 226:
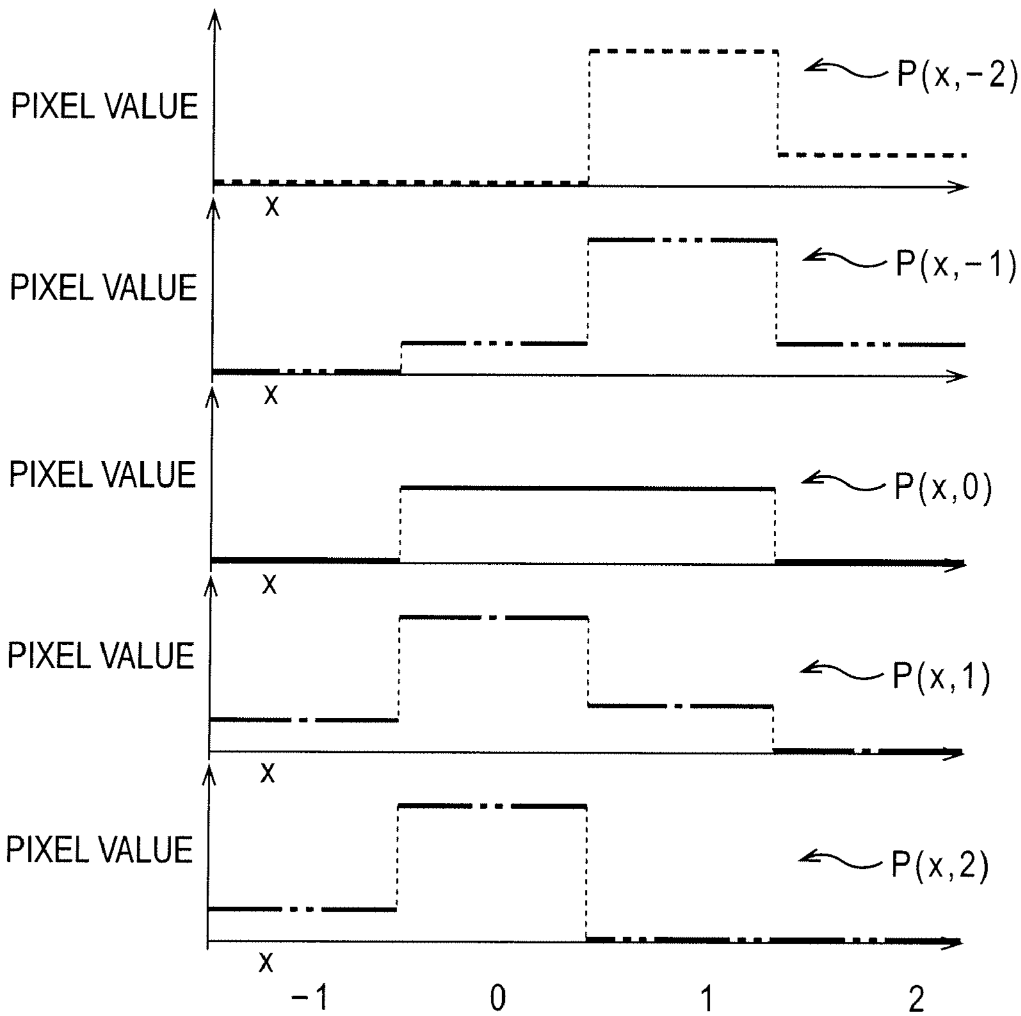

FIG. 226 is a diagram wherein each of the pixel values contained in the fine-line-inclusive data region shown in FIG. 225 are plotted on a graph.

Figure 227:
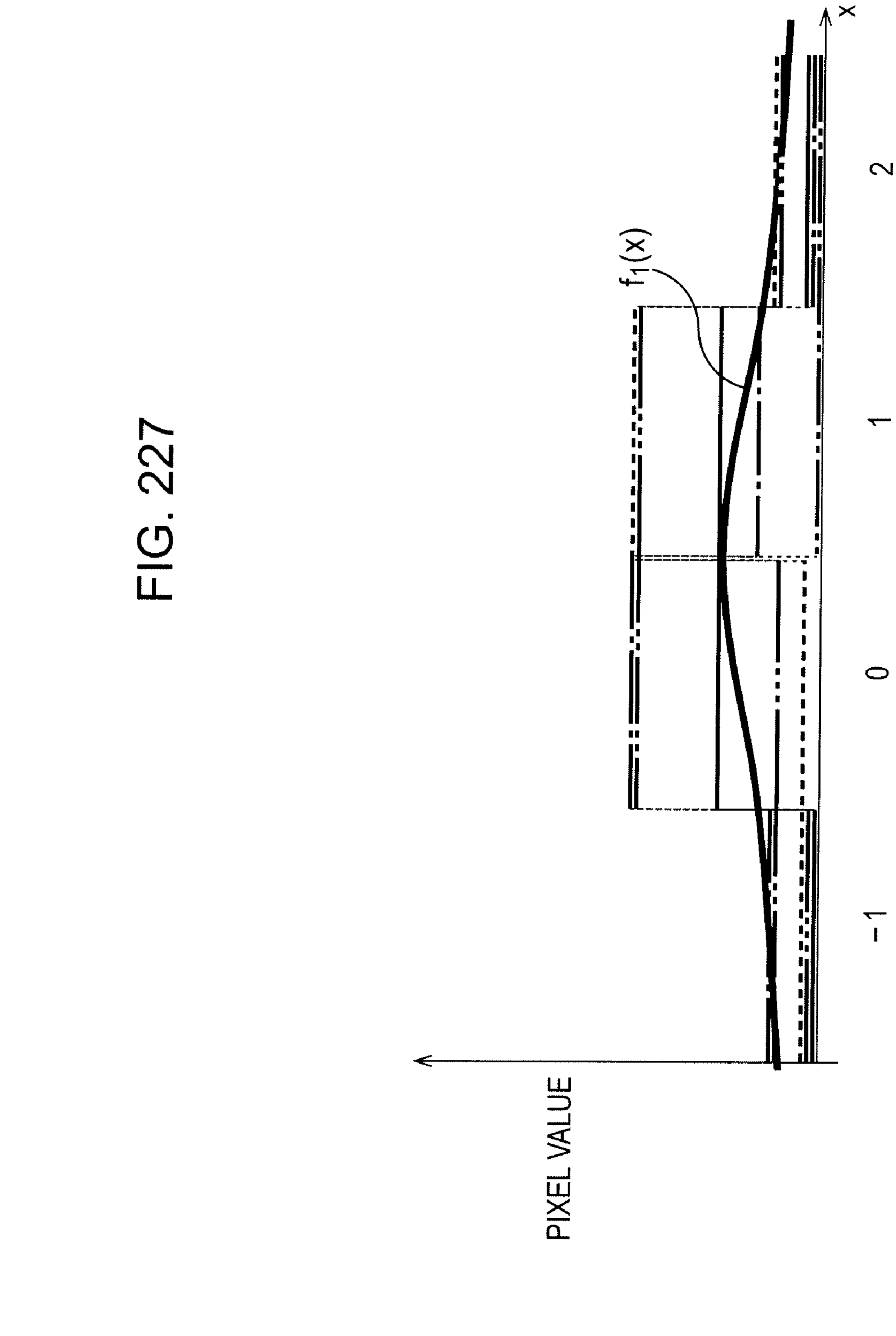

FIG. 227 is a diagram wherein an approximation function, approximating the pixel values contained in the fine-line-inclusive data region shown in FIG. 226, is plotted on a graph.

Figure 228:
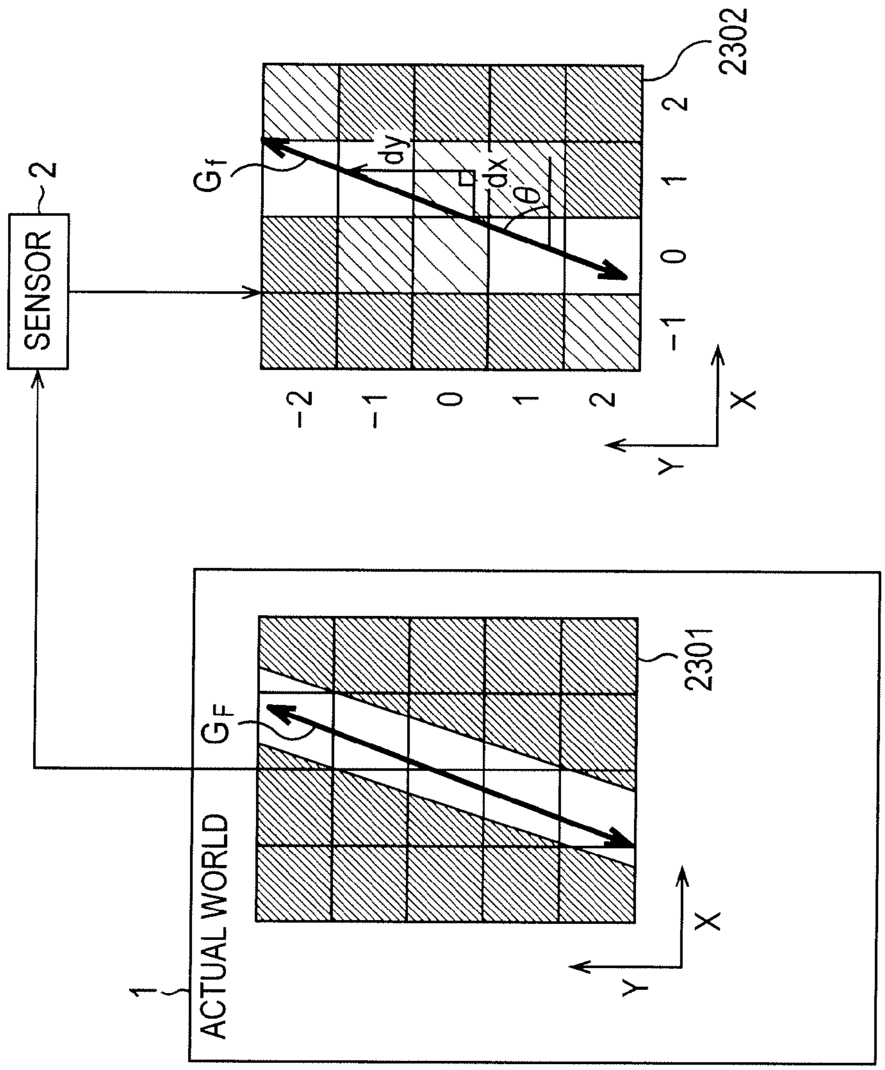

FIG. 228 is a diagram for describing the continuity in the spatial direction which the fine-line-inclusive actual world region shown in FIG. 221 has.

Figure 229:
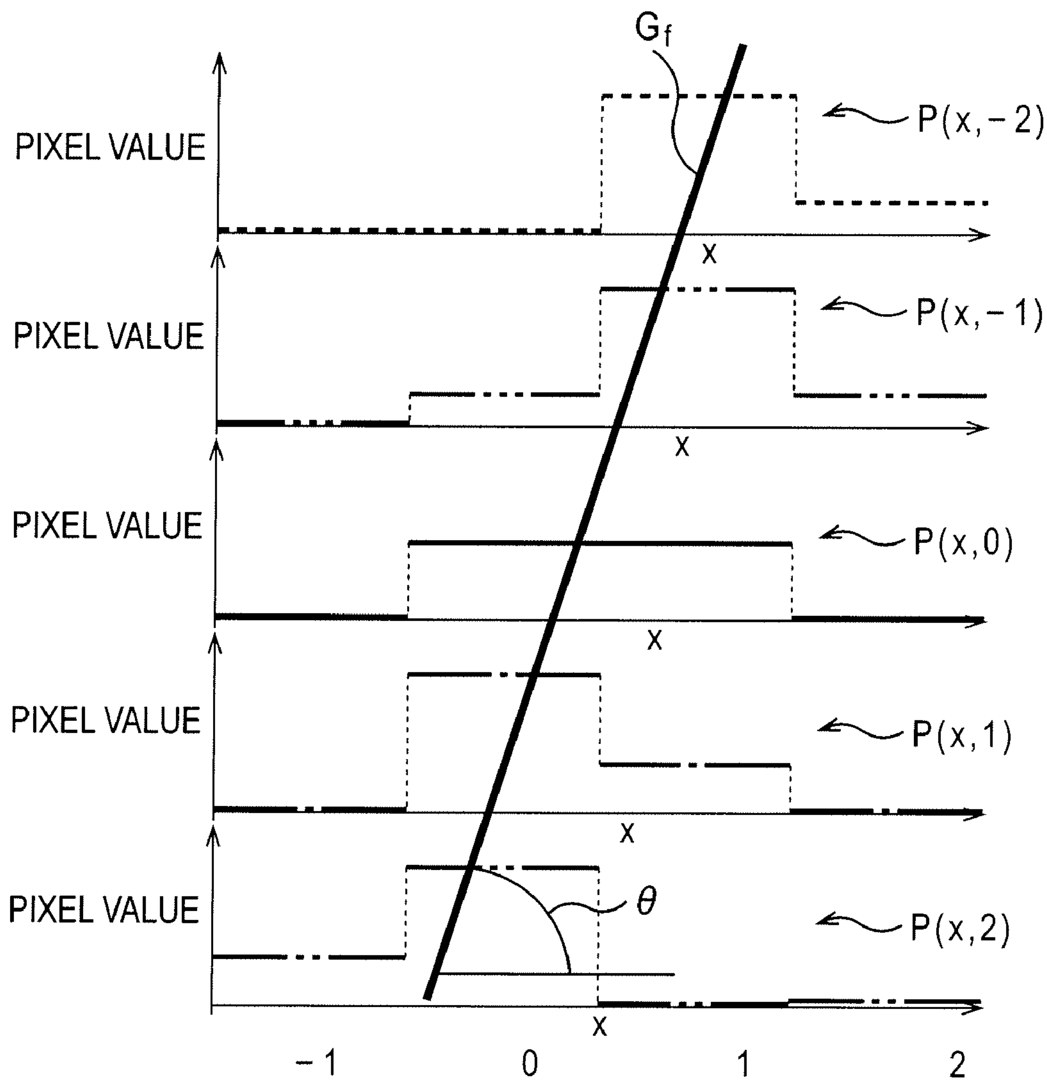

FIG. 229 is a diagram wherein each of the pixel values contained in the fine-line-inclusive data region shown in FIG. 225 are plotted on a graph.

Figure 230:
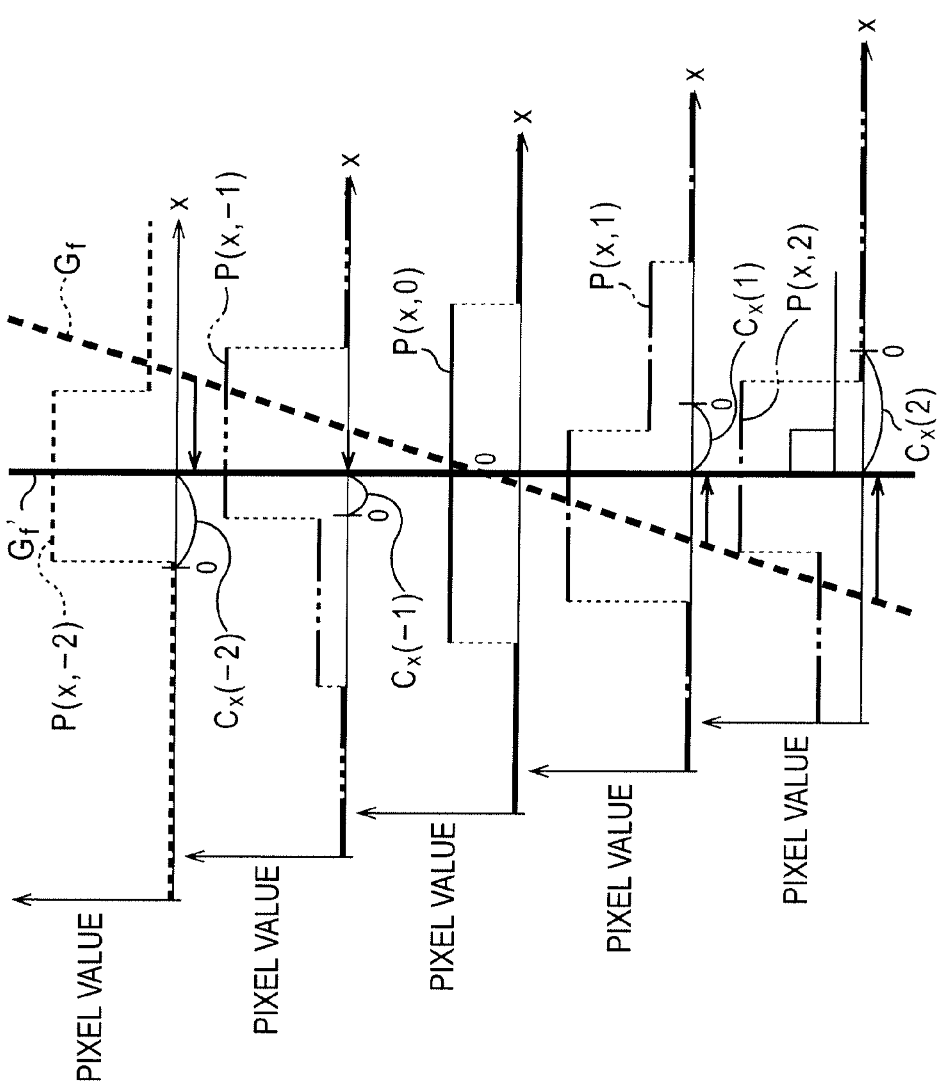

FIG. 230 is a diagram for describing a state wherein each of the input pixel values indicated in FIG. 229 are shifted by a predetermined shift amount.

Figure 231:
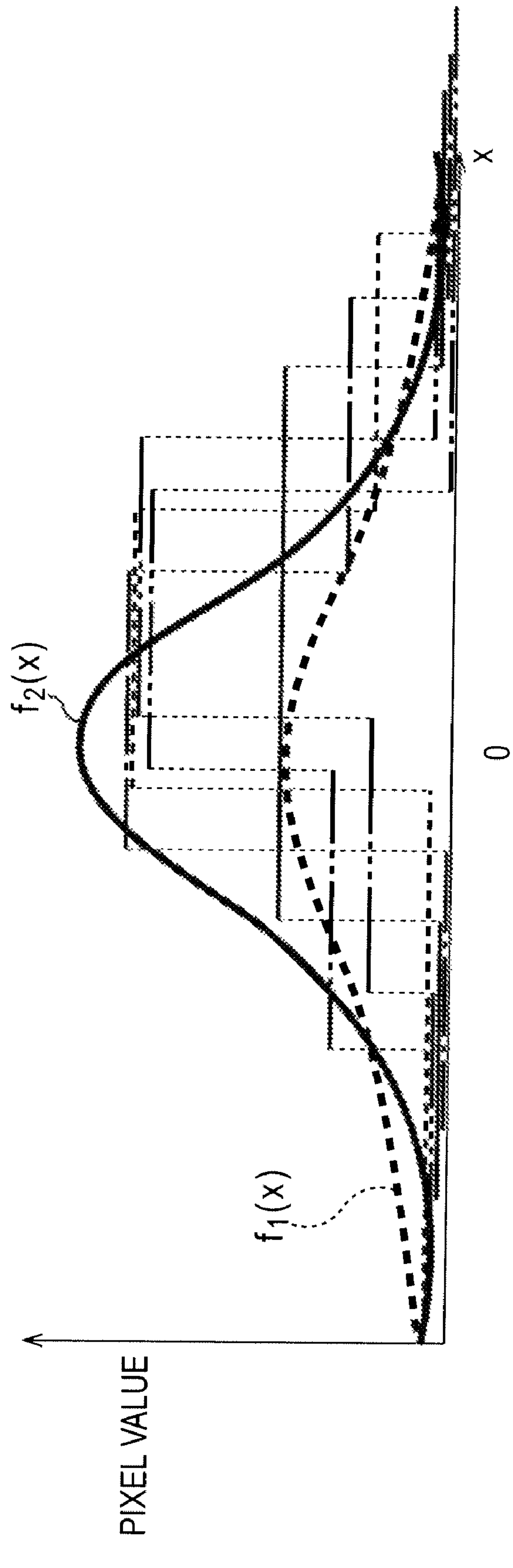

FIG. 231 is a diagram wherein an approximation function, approximating the pixel values contained in the fine-line-inclusive data region shown in FIG. 226, is plotted on a graph, taking into consideration the spatial-direction continuity.

Figure 232:
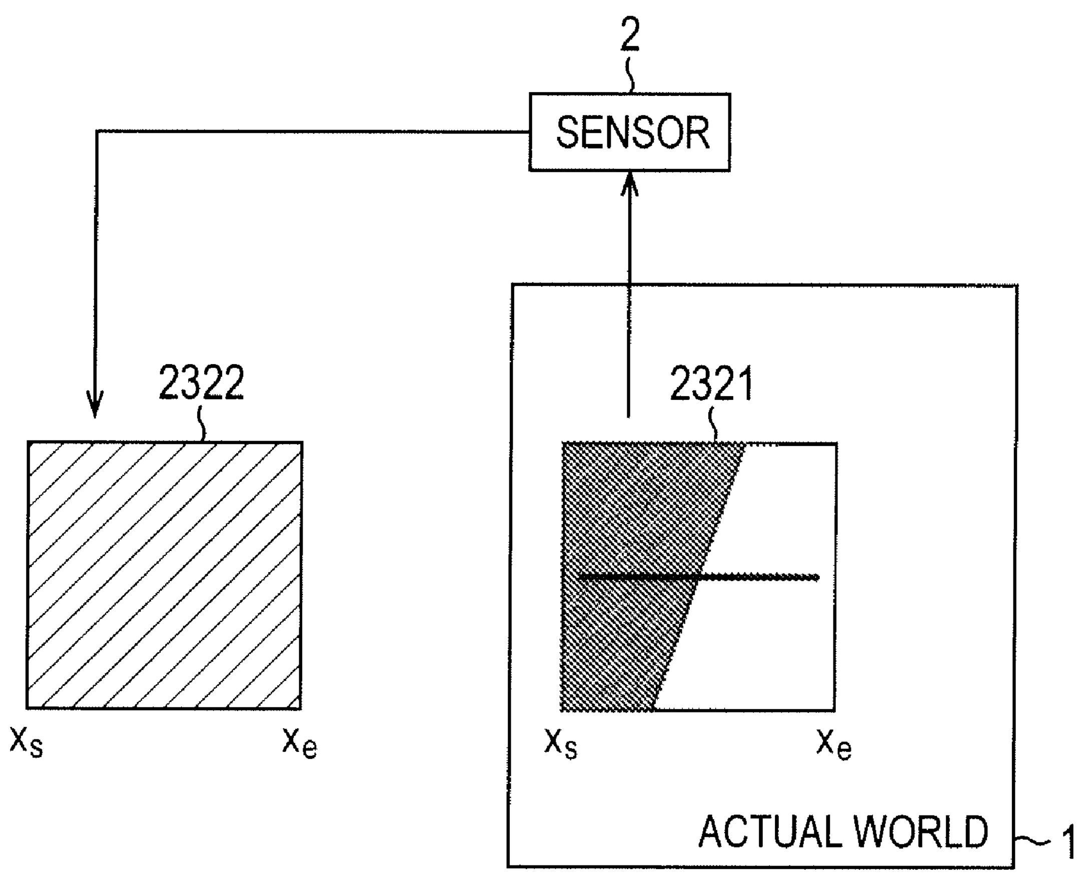

FIG. 232 is a diagram for describing space-mixed region.

Figure 233:
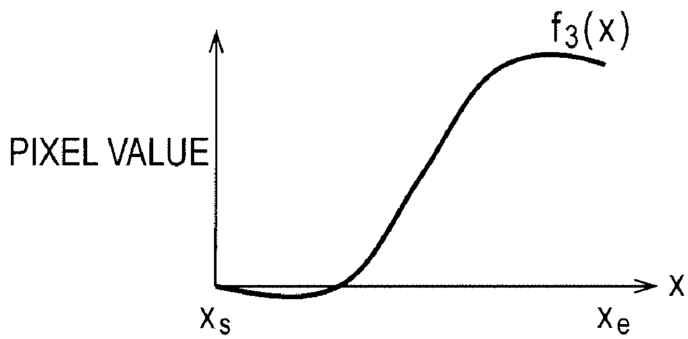

FIG. 233 is a diagram for describing an approximation function approximating actual-world signals in a space-mixed region.

Figure 234:
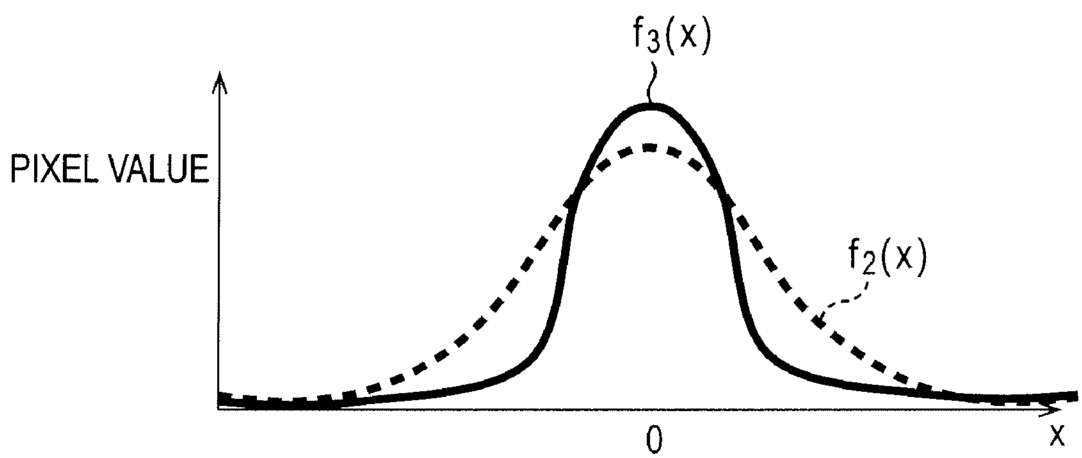

FIG. 234 is a diagram wherein an approximation function, approximating the actual world signals corresponding to the fine-line-inclusive data region shown in FIG. 226, is plotted on a graph, taking into consideration both the sensor integration properties and the spatial-direction continuity.

Figure 235:
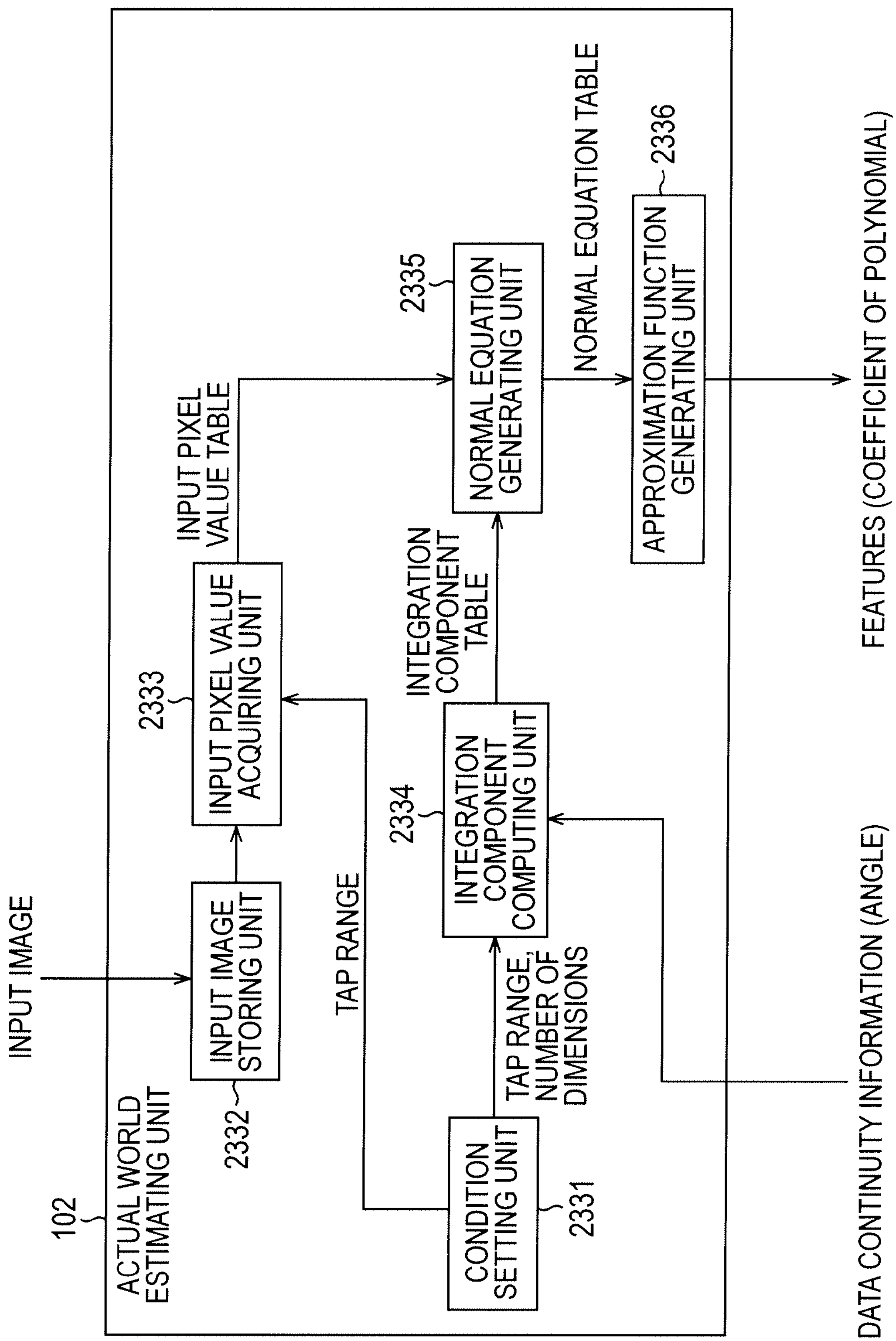

FIG. 235 is a block diagram for describing a configuration example of the actual world estimating unit using, of function approximation techniques having the principle shown in FIG. 219, primary polynomial approximation.

Figure 236:
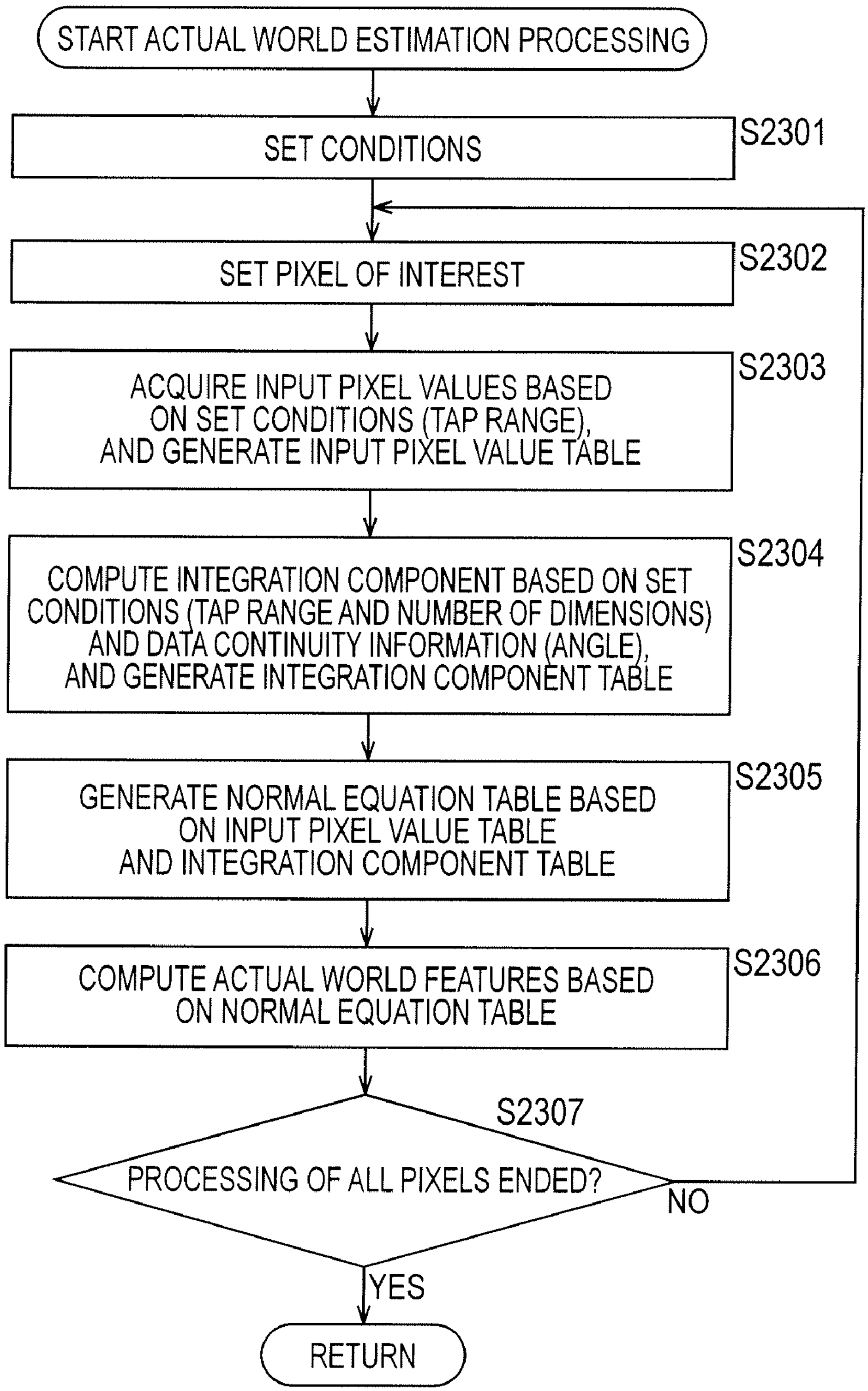

FIG. 236 is a flowchart for describing actual world estimation processing which the actual world estimating unit of the configuration shown in FIG. 235 executes.

Figure 237:
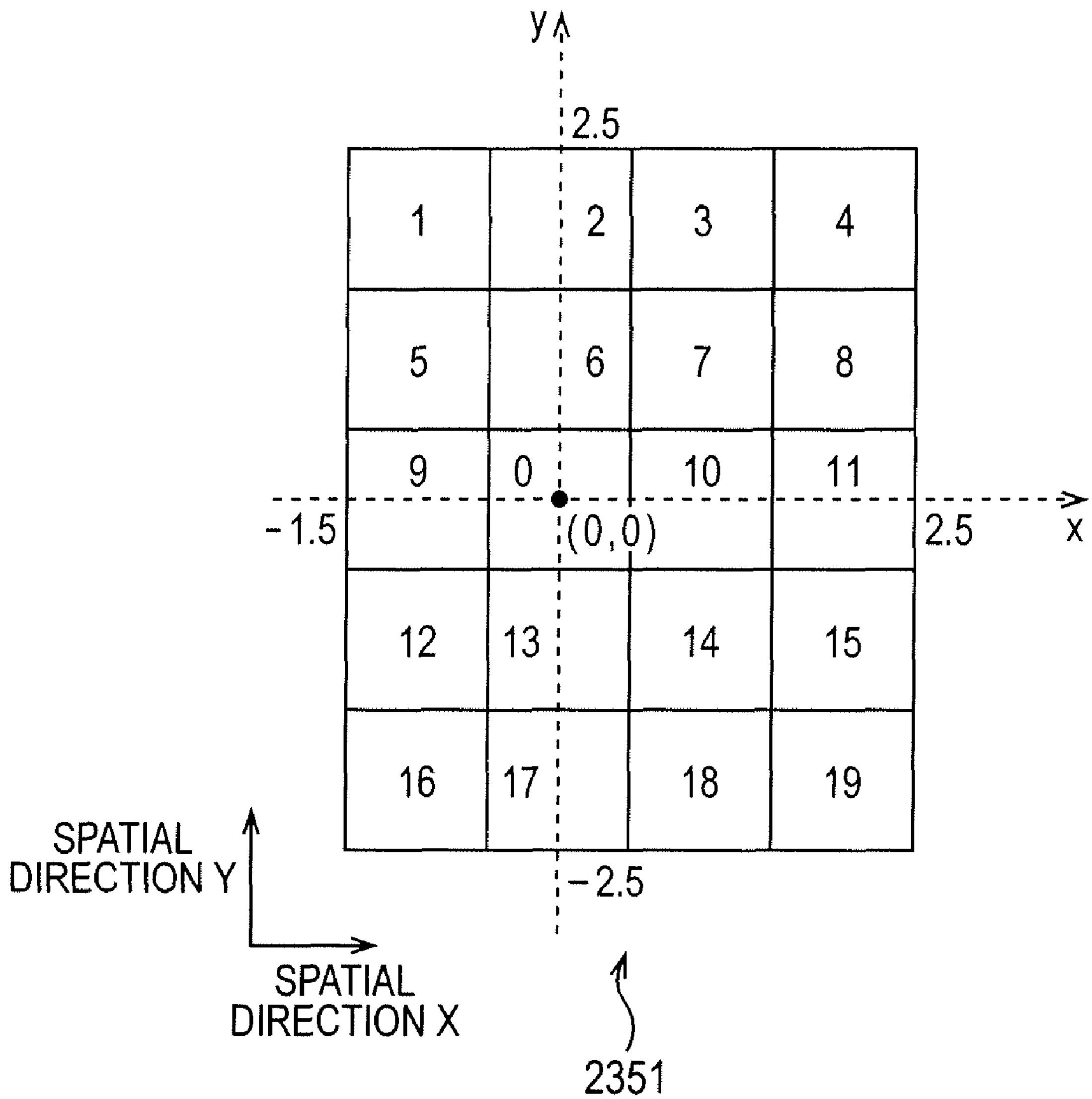

FIG. 237 is a diagram for describing a tap range.

Figure 238:
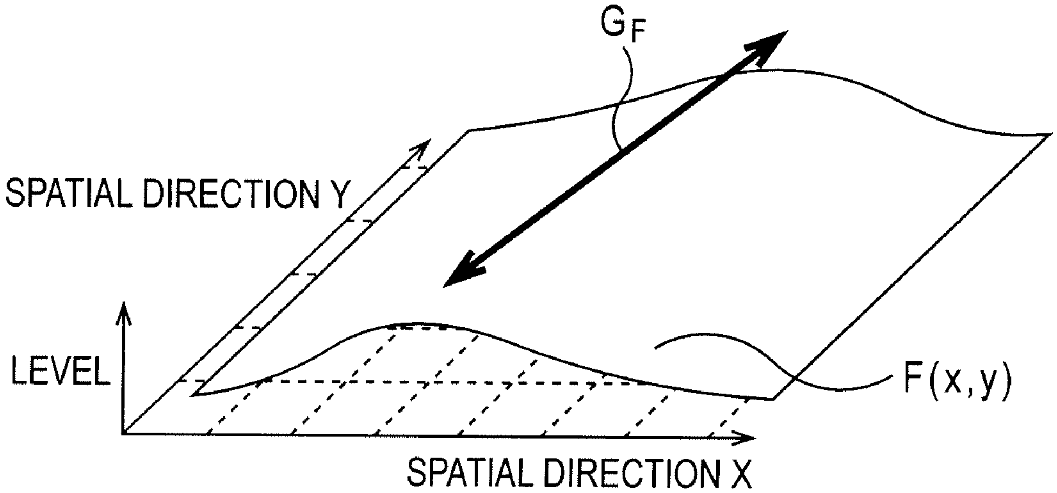

FIG. 238 is a diagram for describing actual world signals having continuity in the spatial direction.

Figure 239:
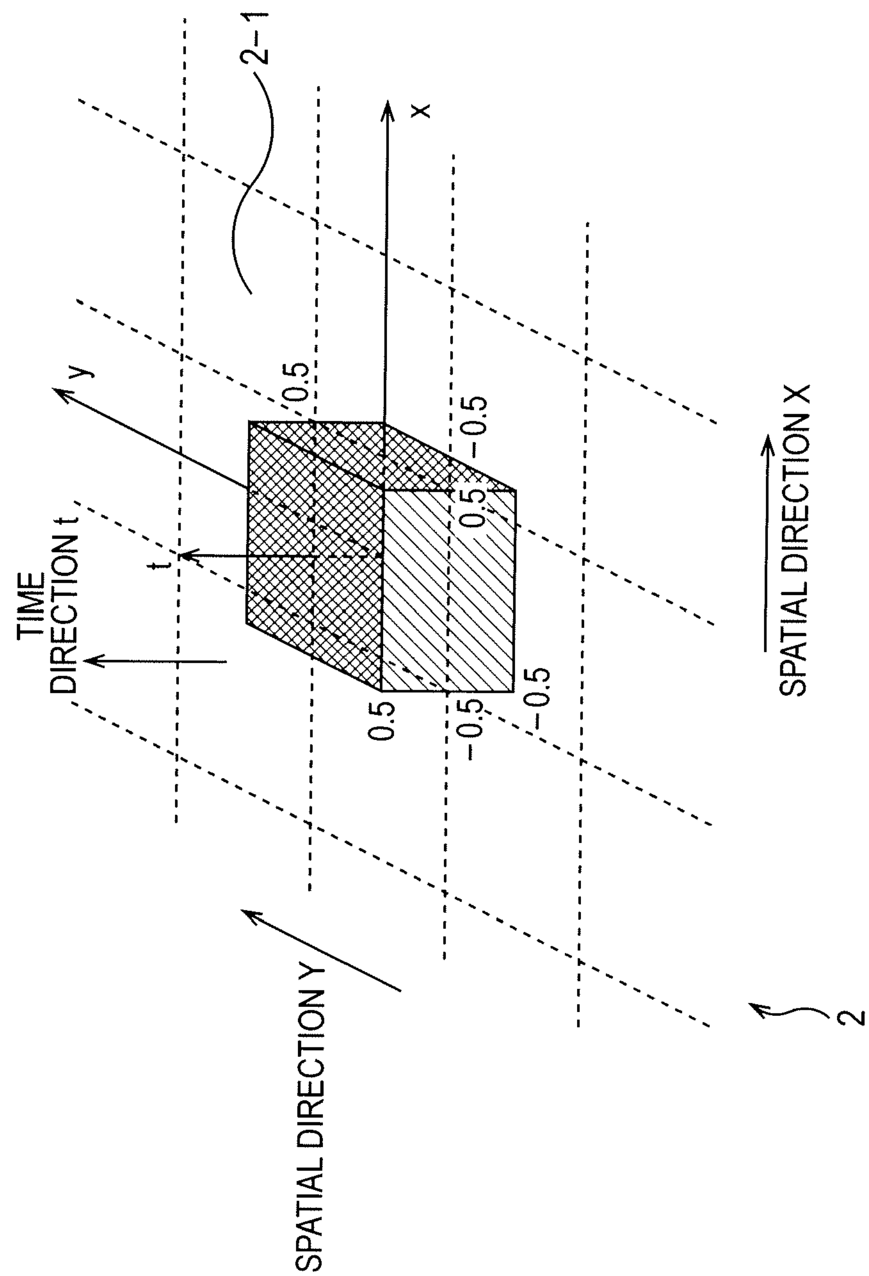

FIG. 239 is a diagram for describing integration effects in the event that the sensor is a CCD.

Figure 240:
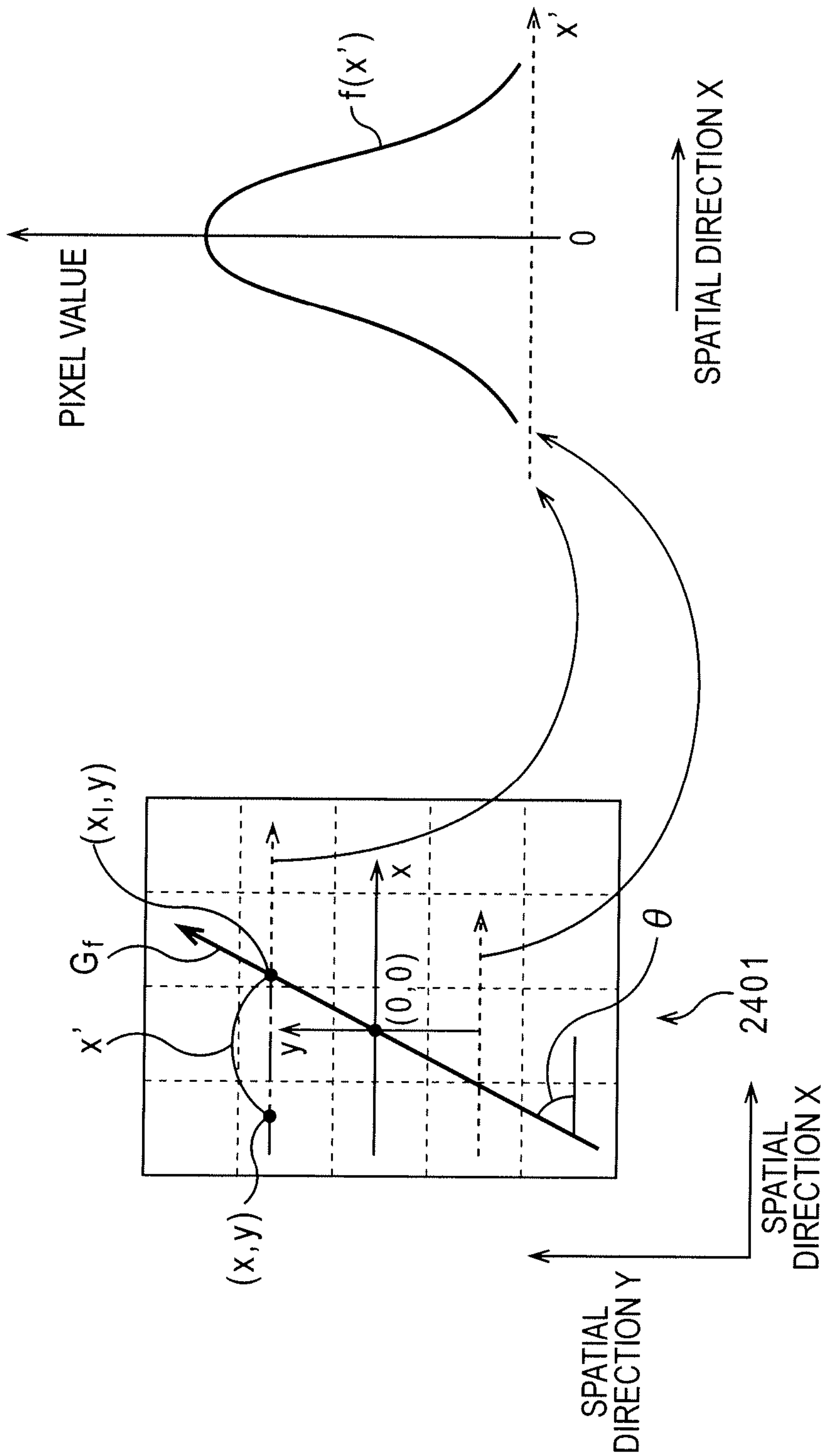

FIG. 240 is a diagram for describing distance in the cross-sectional direction.

Figure 241:
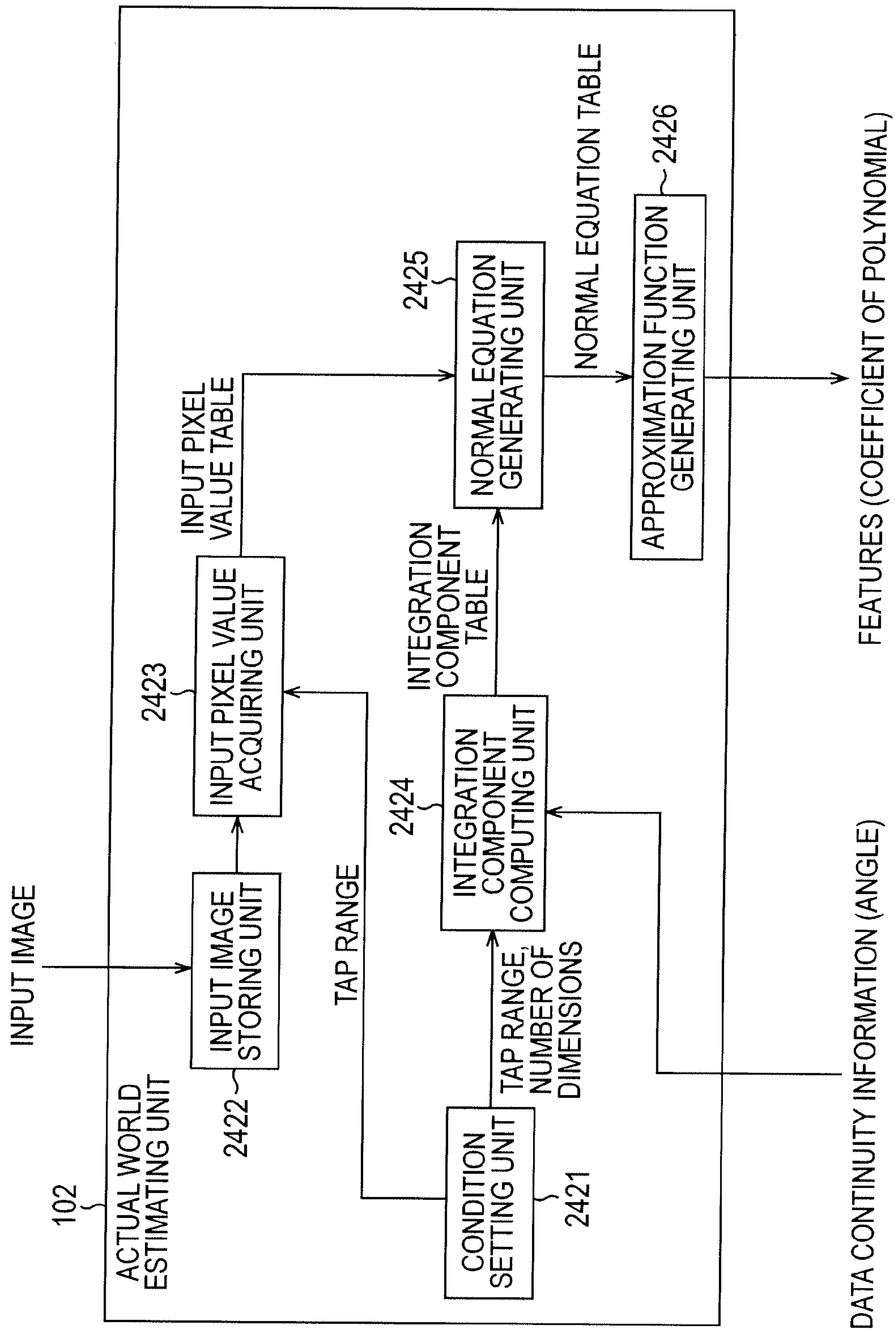

FIG. 241 is a block diagram for describing a configuration example of the actual world estimating unit using, of function approximation techniques having the principle shown in FIG. 219, quadratic polynomial approximation.

Figure 242:
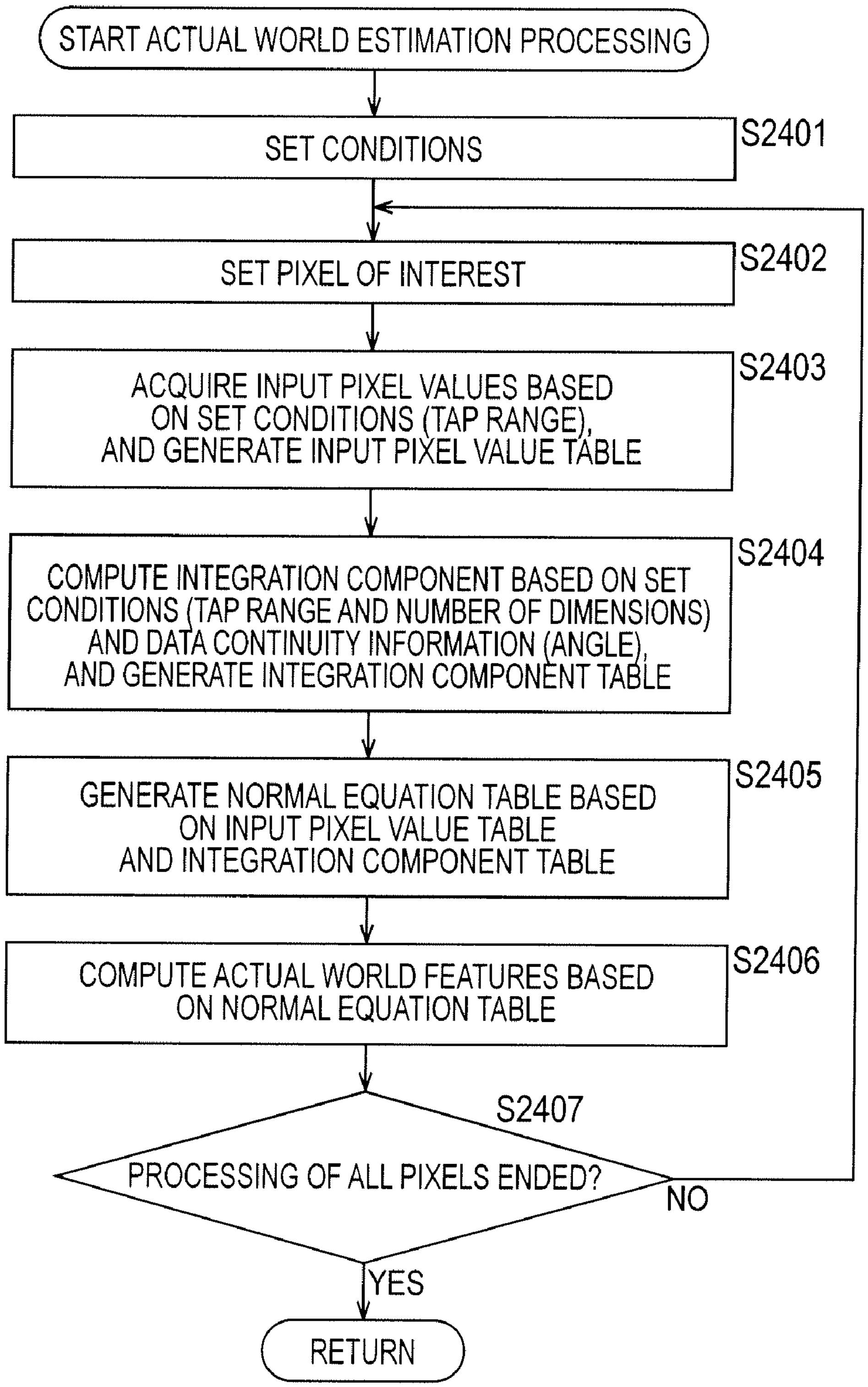

FIG. 242 is a flowchart for describing actual world estimation processing which the actual world estimating unit of the configuration shown in FIG. 241 executes.

Figure 243:
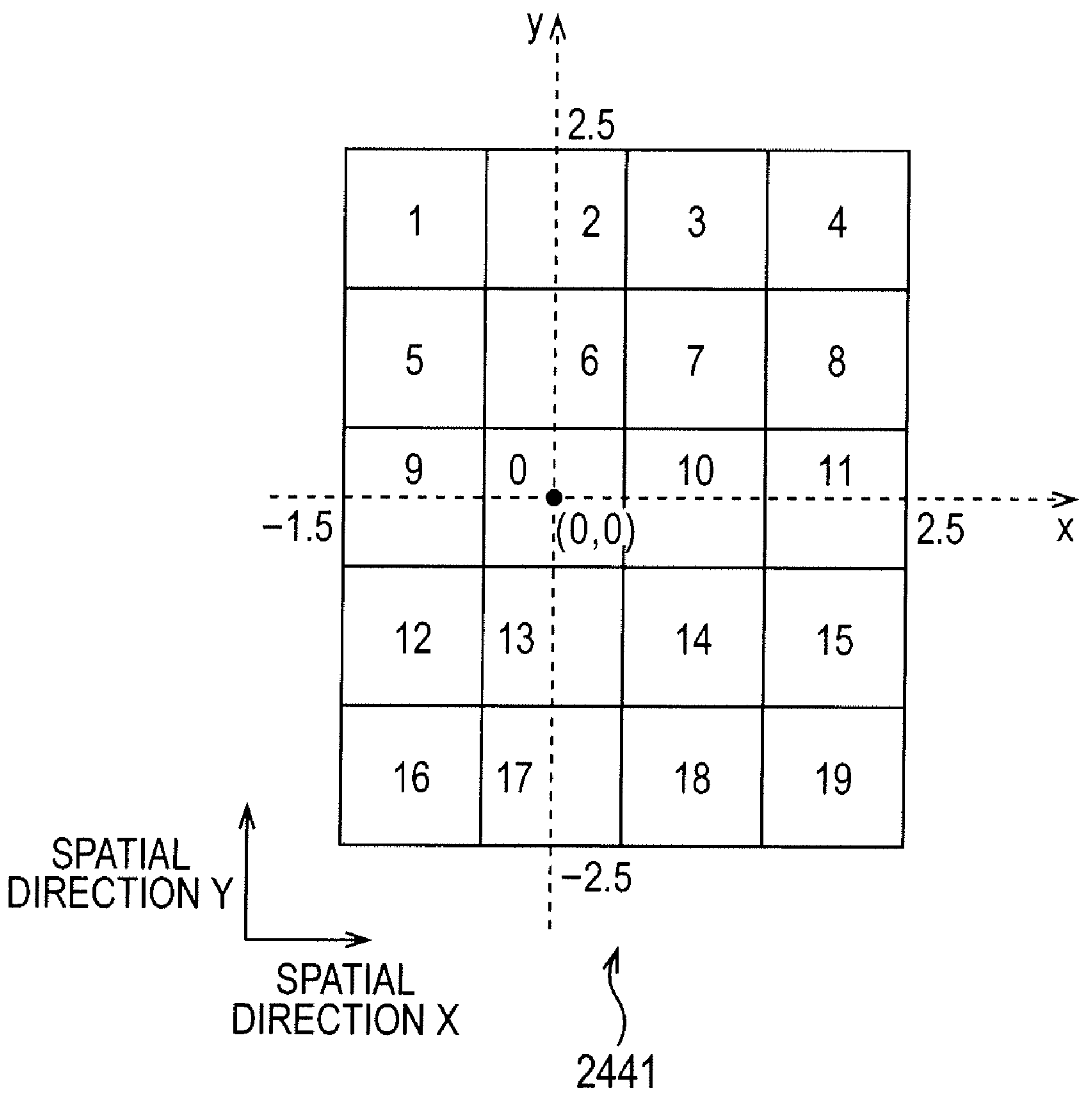

FIG. 243 is a diagram for describing a tap range.

Figure 244:
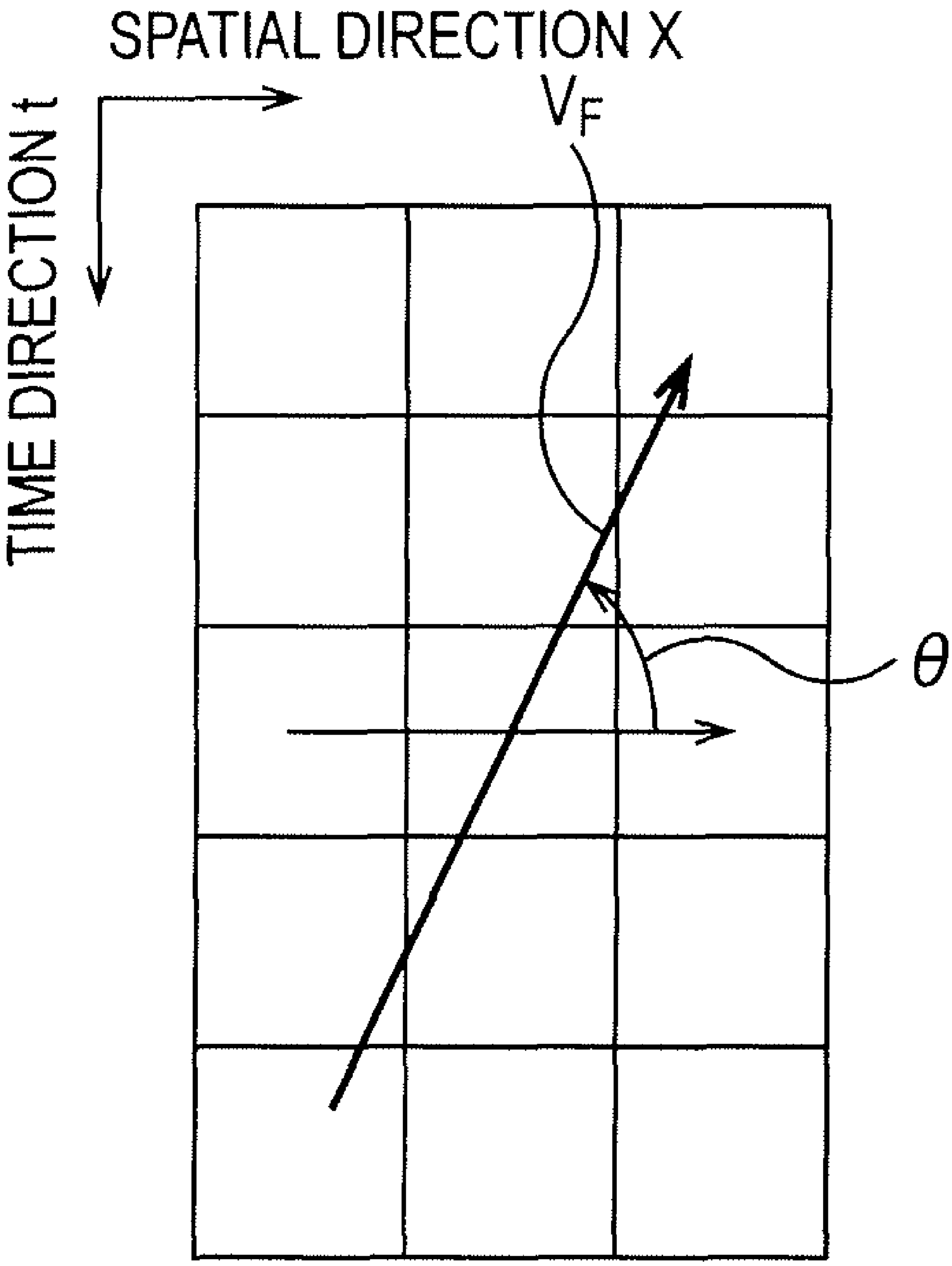

FIG. 244 is a diagram for describing direction of continuity in the time-spatial direction.

Figure 245:
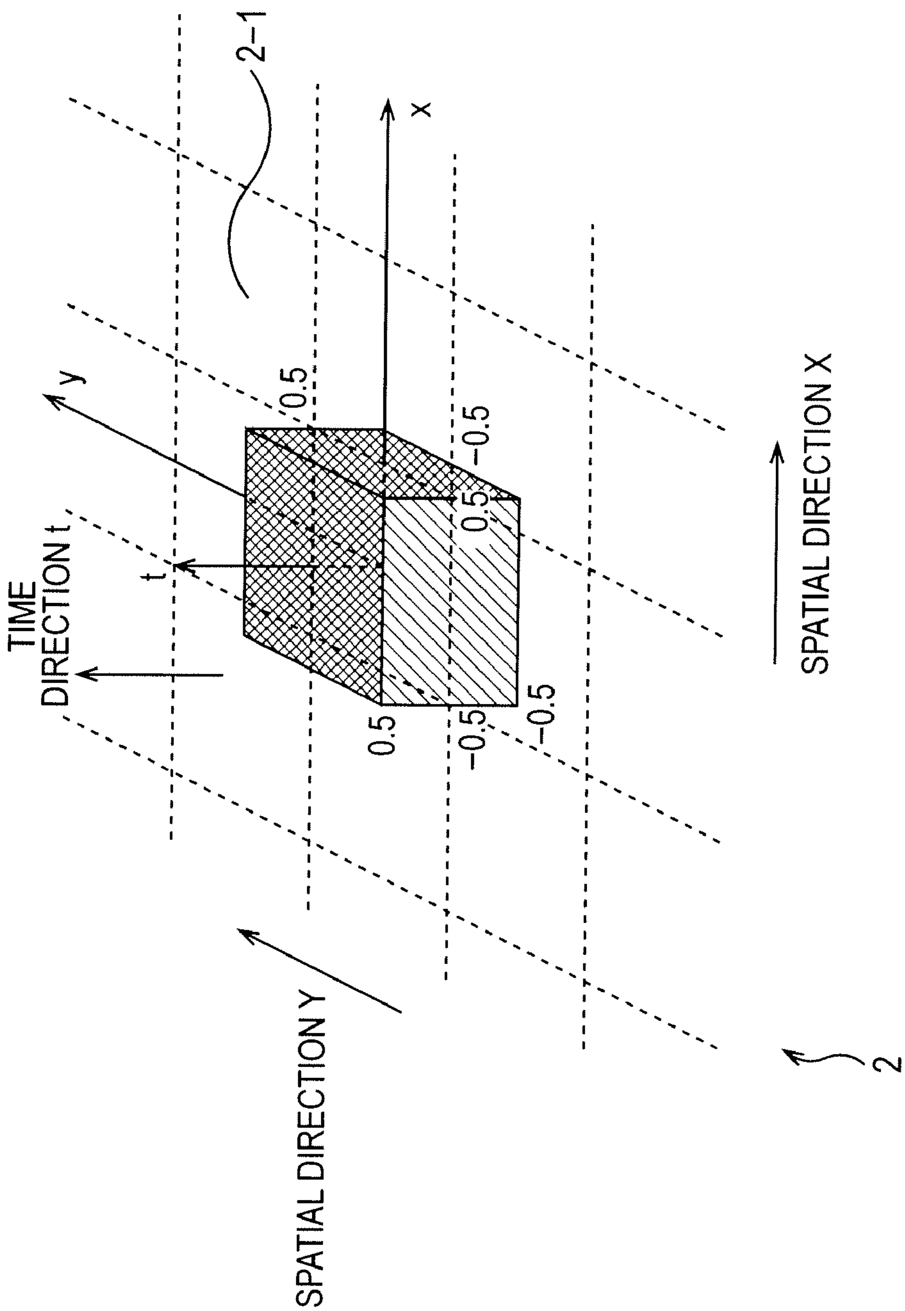

FIG. 245 is a diagram for describing integration effects in the event that the sensor is a CCD.

Figure 246:
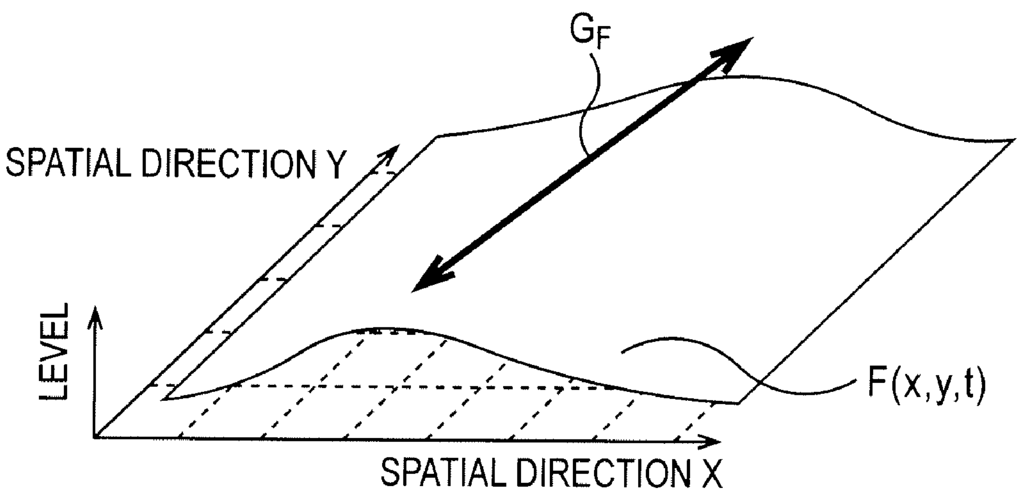

FIG. 246 is a diagram for describing actual world signals having continuity in the spatial direction.

Figure 247:
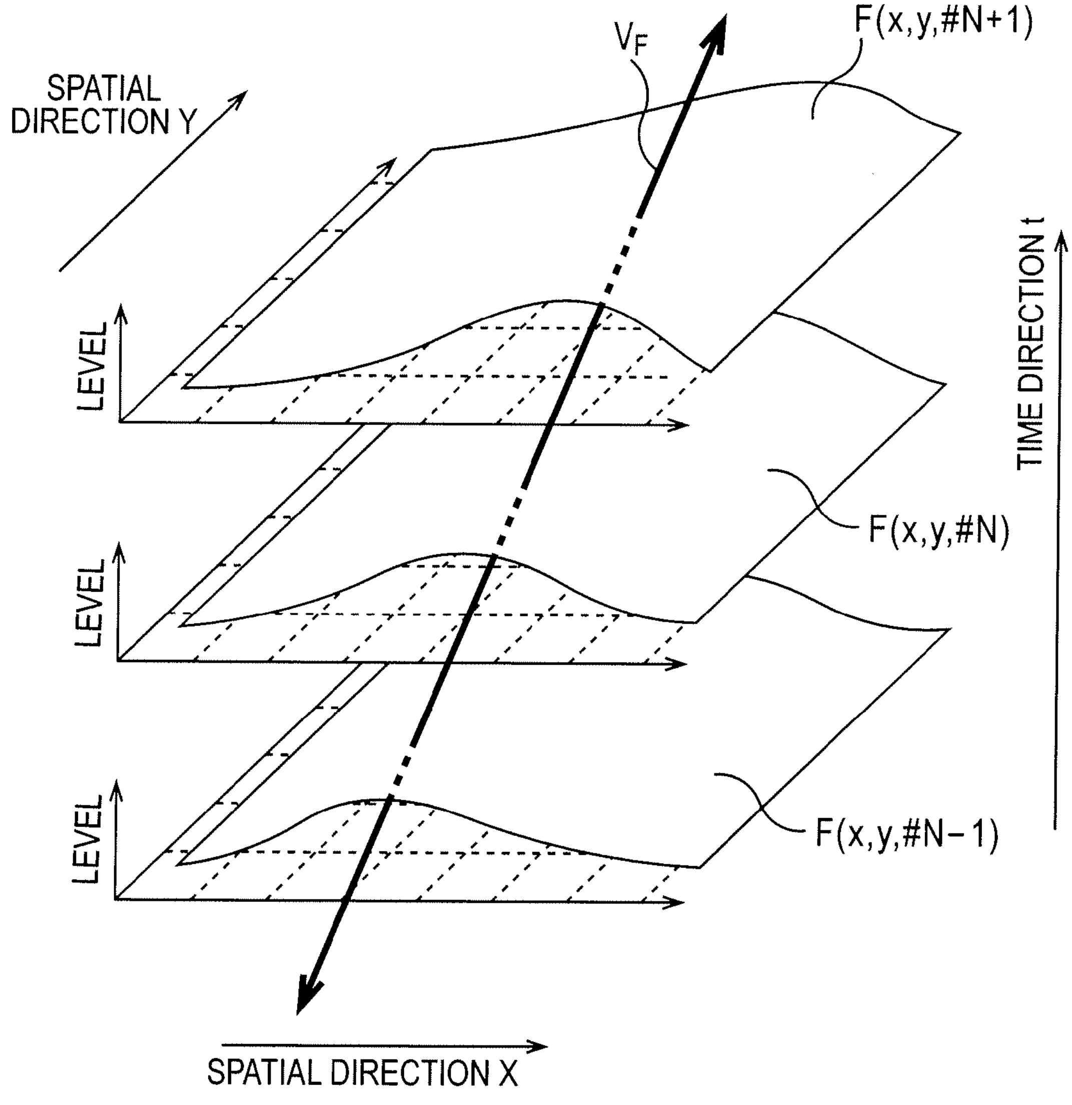

FIG. 247 is a diagram for describing actual world signals having continuity in the space-time directions.

Figure 248:
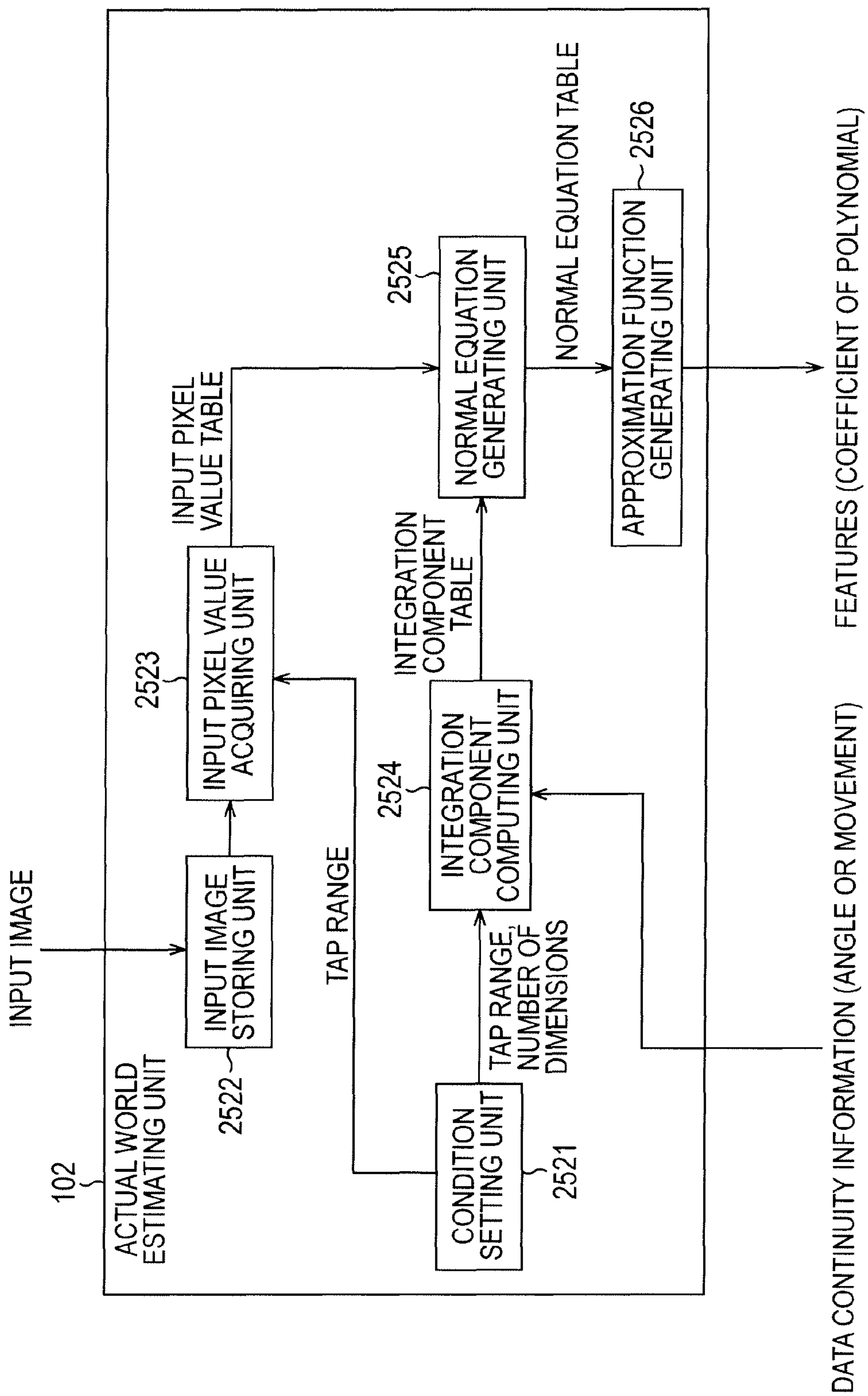

FIG. 248 is a block diagram for describing a configuration example of the actual world estimating unit using, of function approximation techniques having the principle shown in FIG. 219, cubic polynomial approximation.

Figure 249:
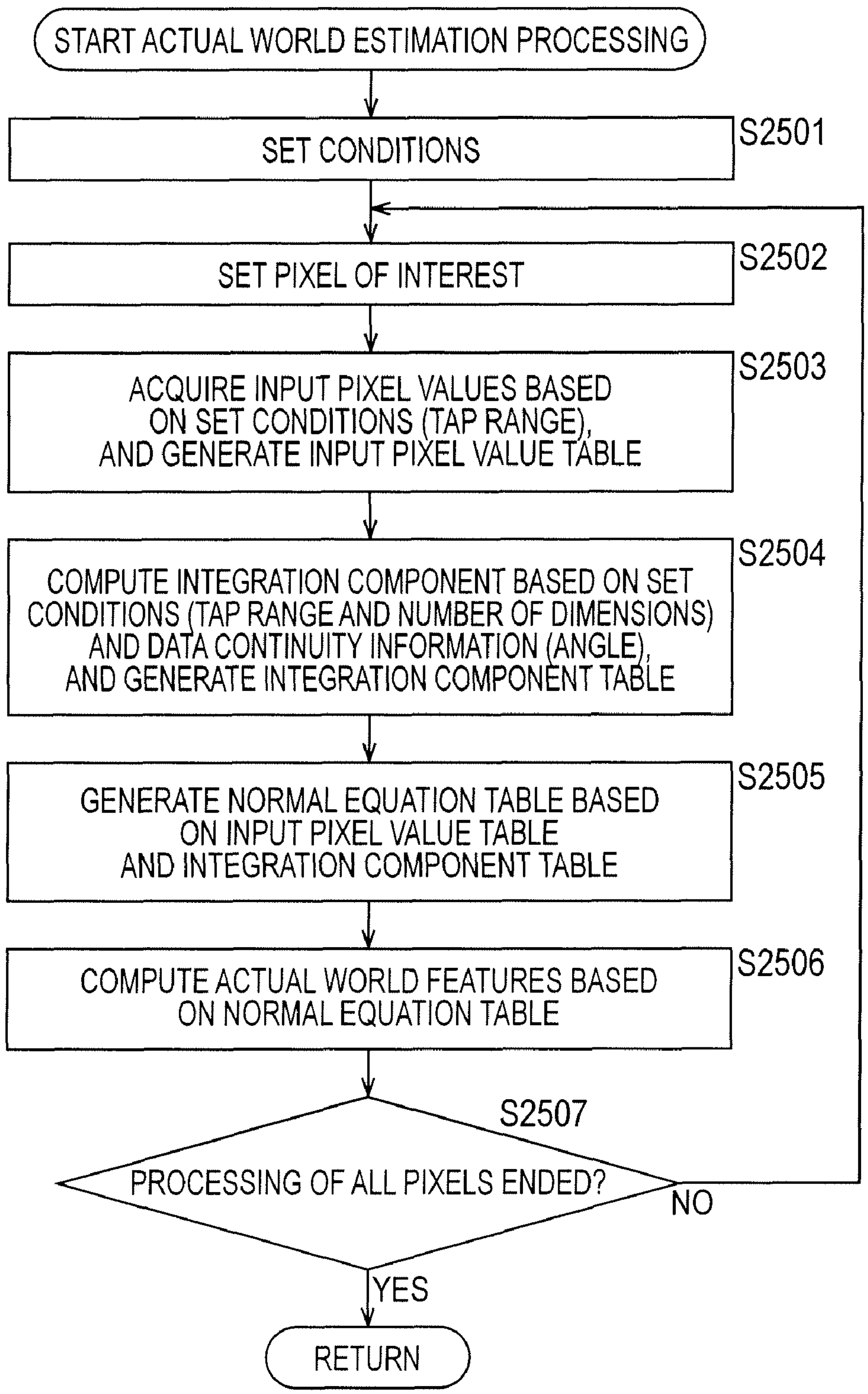

FIG. 249 is a flowchart for describing actual world estimation processing which the actual world estimating unit of the configuration shown in FIG. 248 executes.

Figure 250:
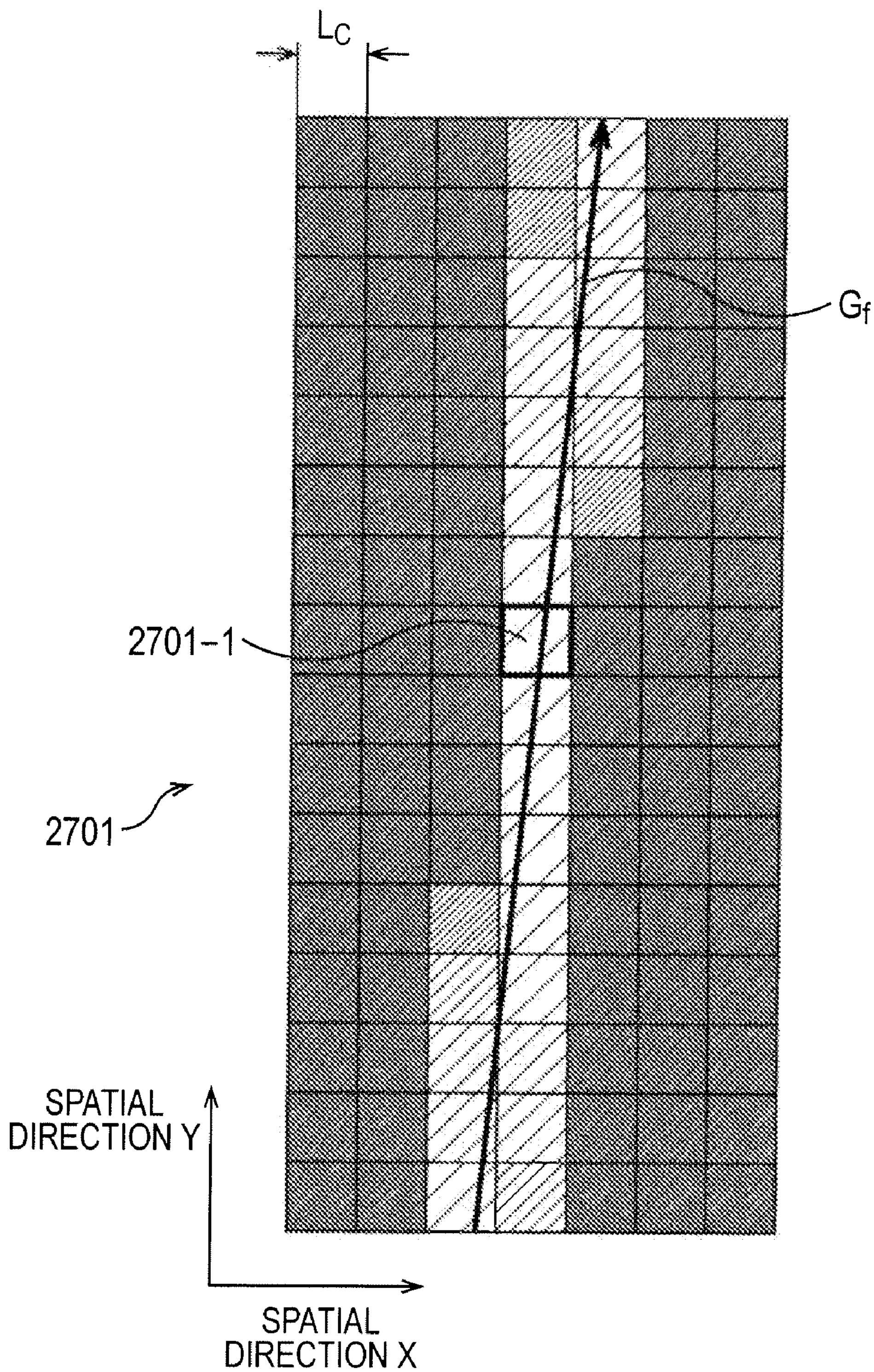

FIG. 250 is a diagram illustrating an example of an input image to be input in the actual world estimating unit shown in FIG. 3.

Figure 251:
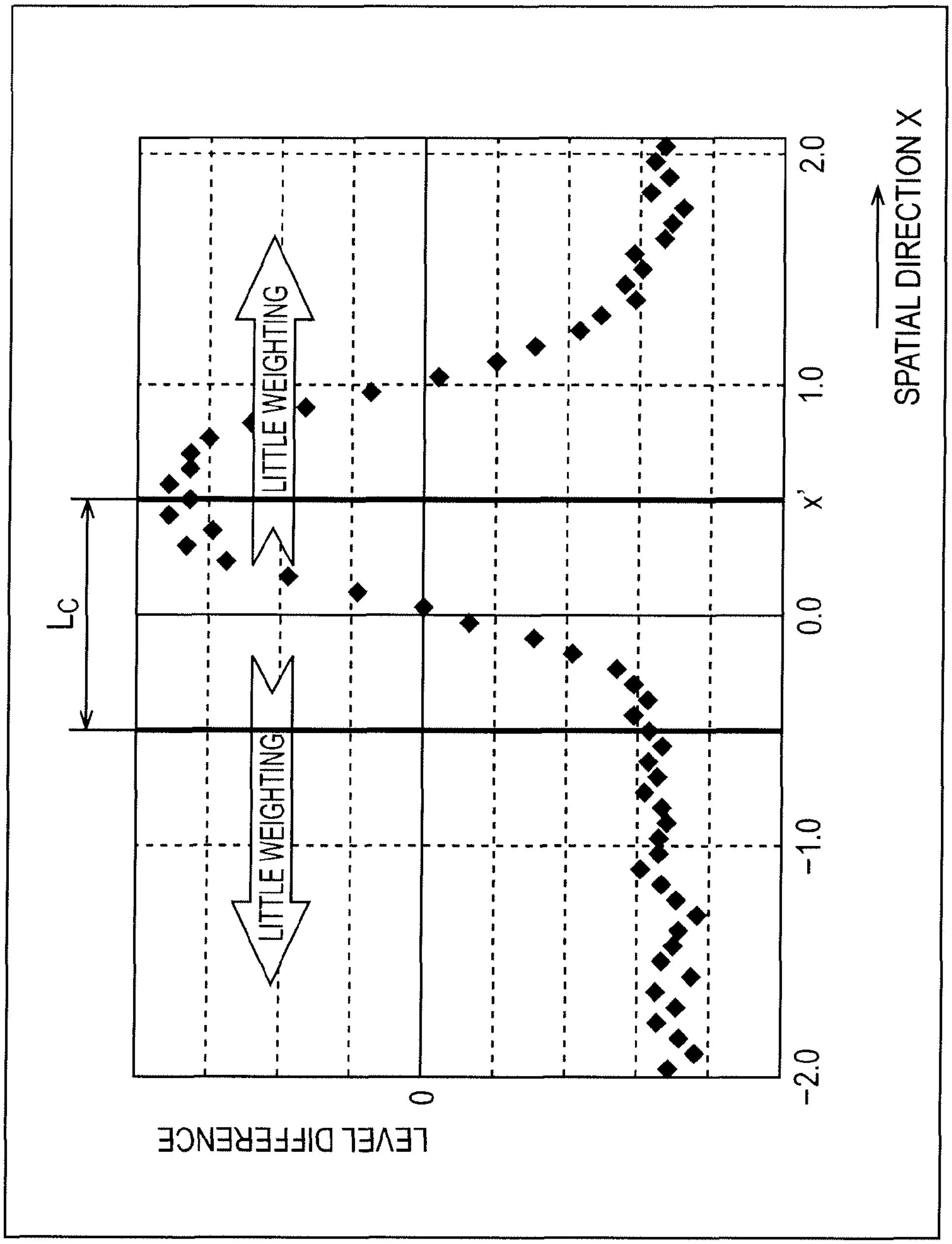

FIG. 251 is a diagram illustrating the difference between the actual world light signal level in the center of the pixel of interest shown in FIG. 250 and the actual world light signal level in the cross-sectional direction distance x'.

Figure 252:
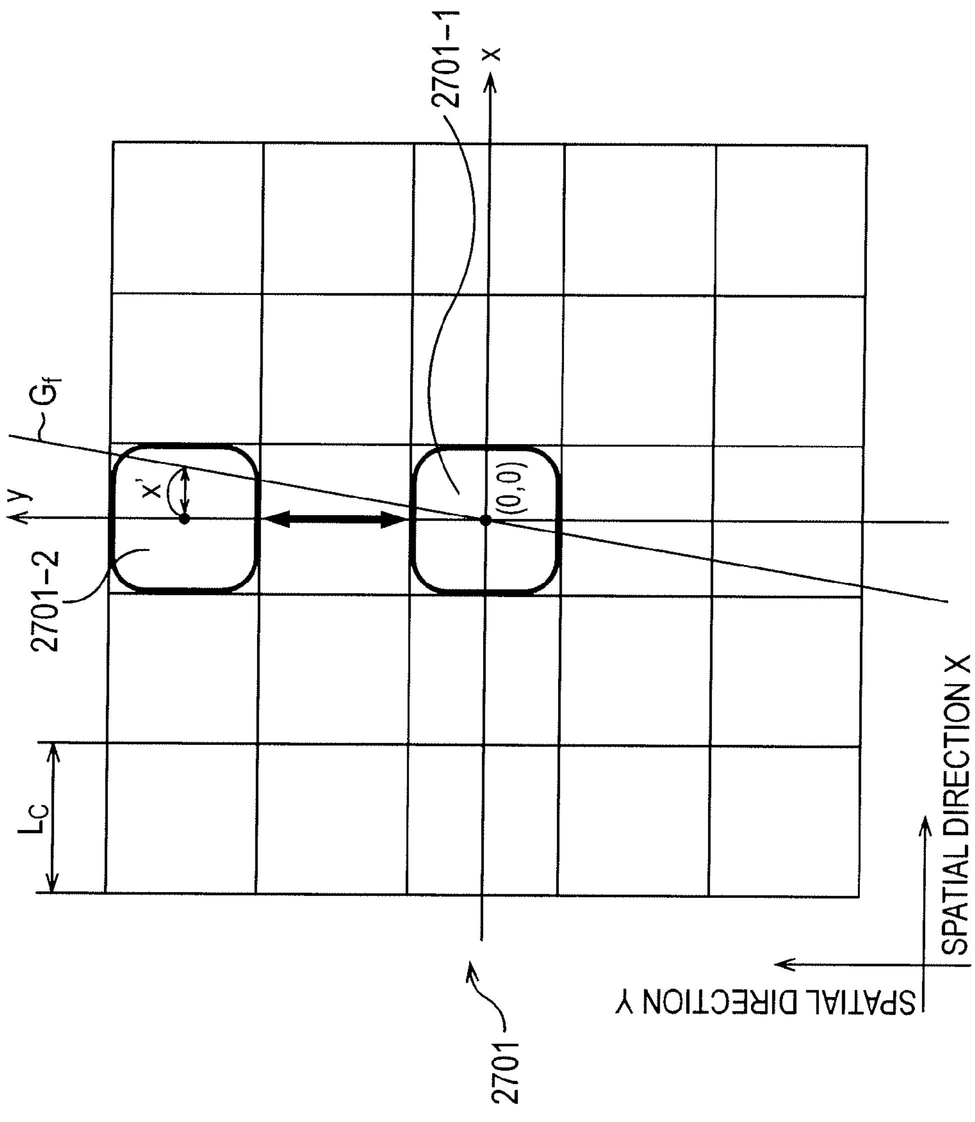

FIG. 252 is a diagram for describing the cross-sectional direction distance x'.

Figure 253:
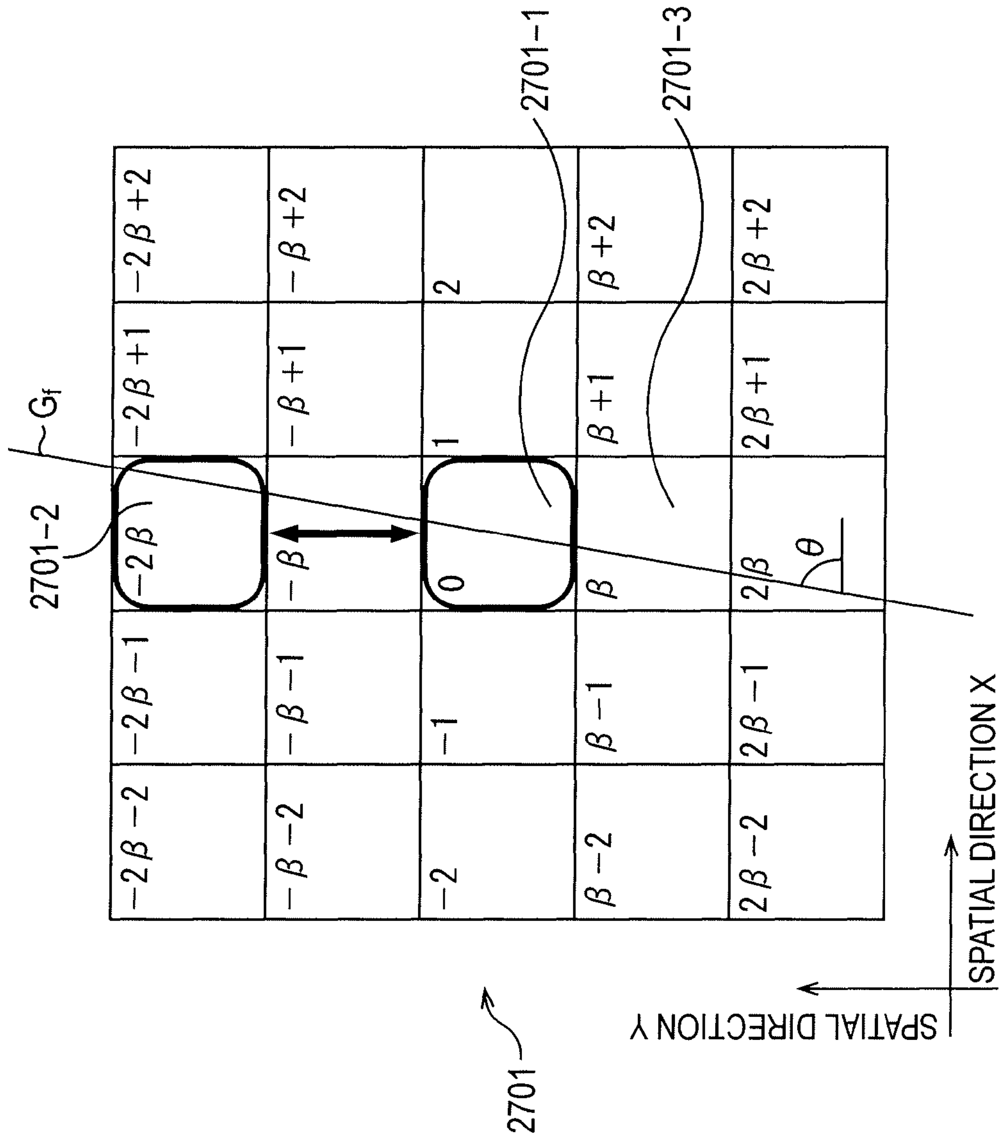

FIG. 253 is a diagram for describing the cross-sectional direction distance x'.

Figure 254:
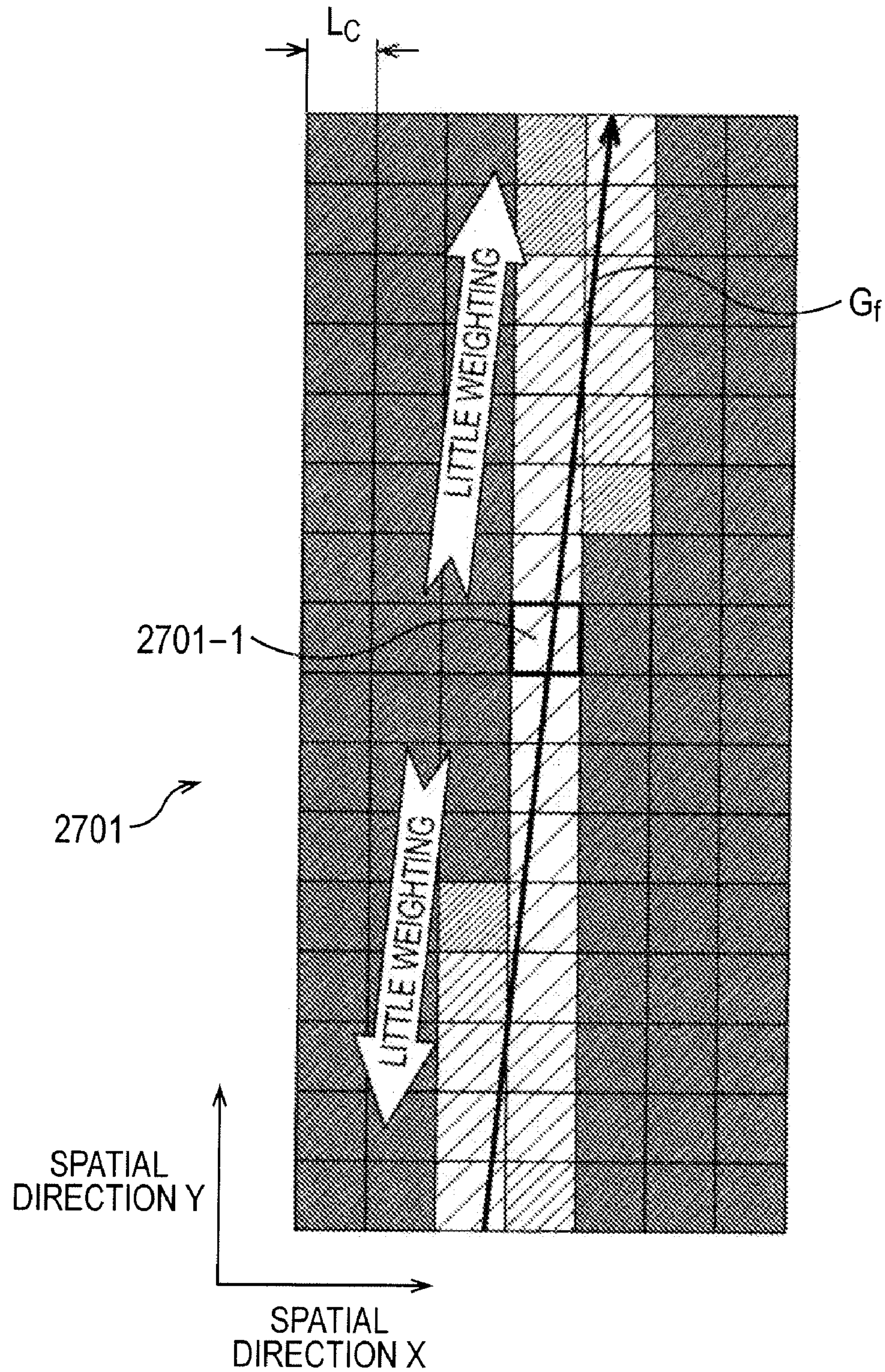

FIG. 254 is a diagram illustrating the cross-sectional direction distance of each pixel within a block.

Figure 255:
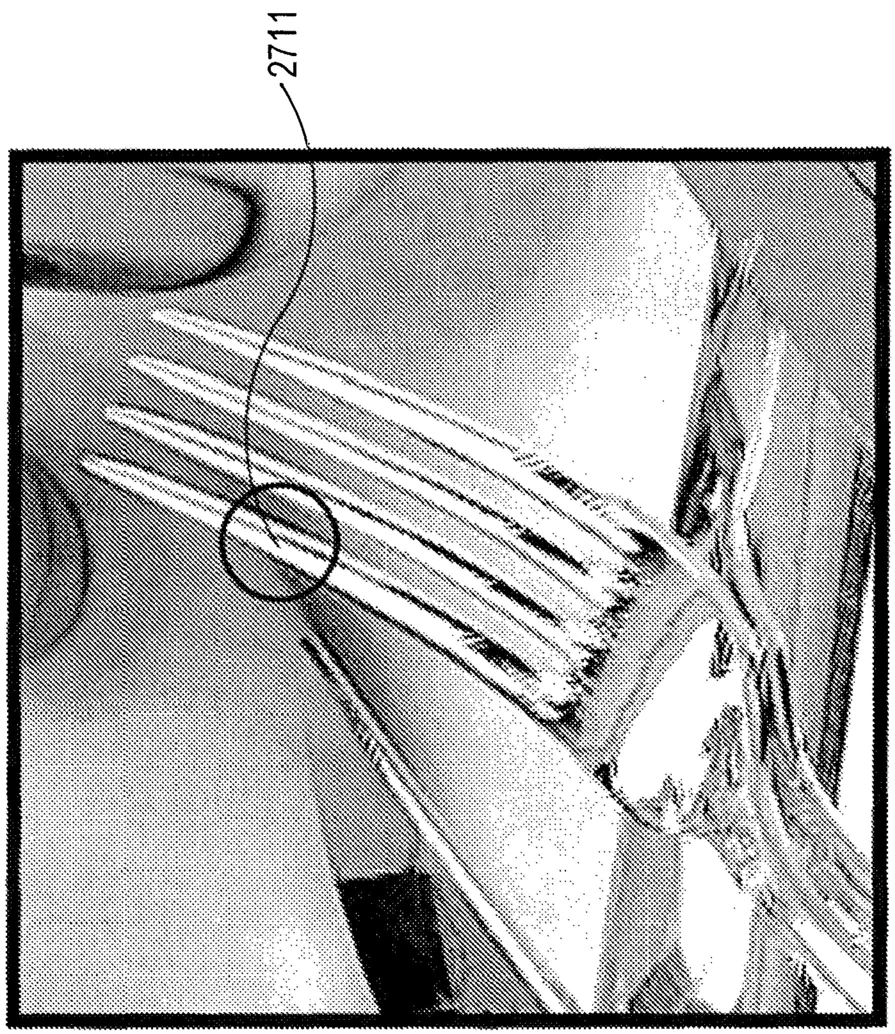

FIG. 255 is a diagram illustrating the result of processing without taking into consideration weight in a normal equation.

Figure 256:
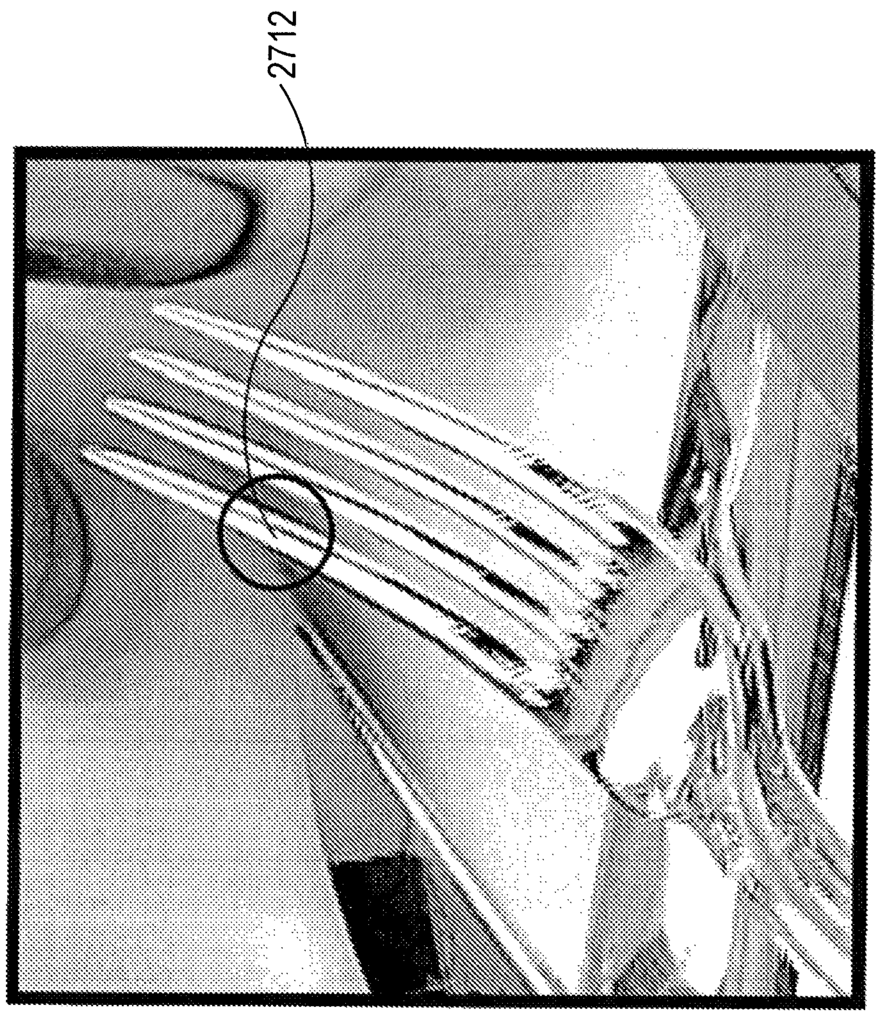

FIG. 256 is a diagram illustrating the result of processing with taking into consideration weight in a normal equation.

Figure 257:
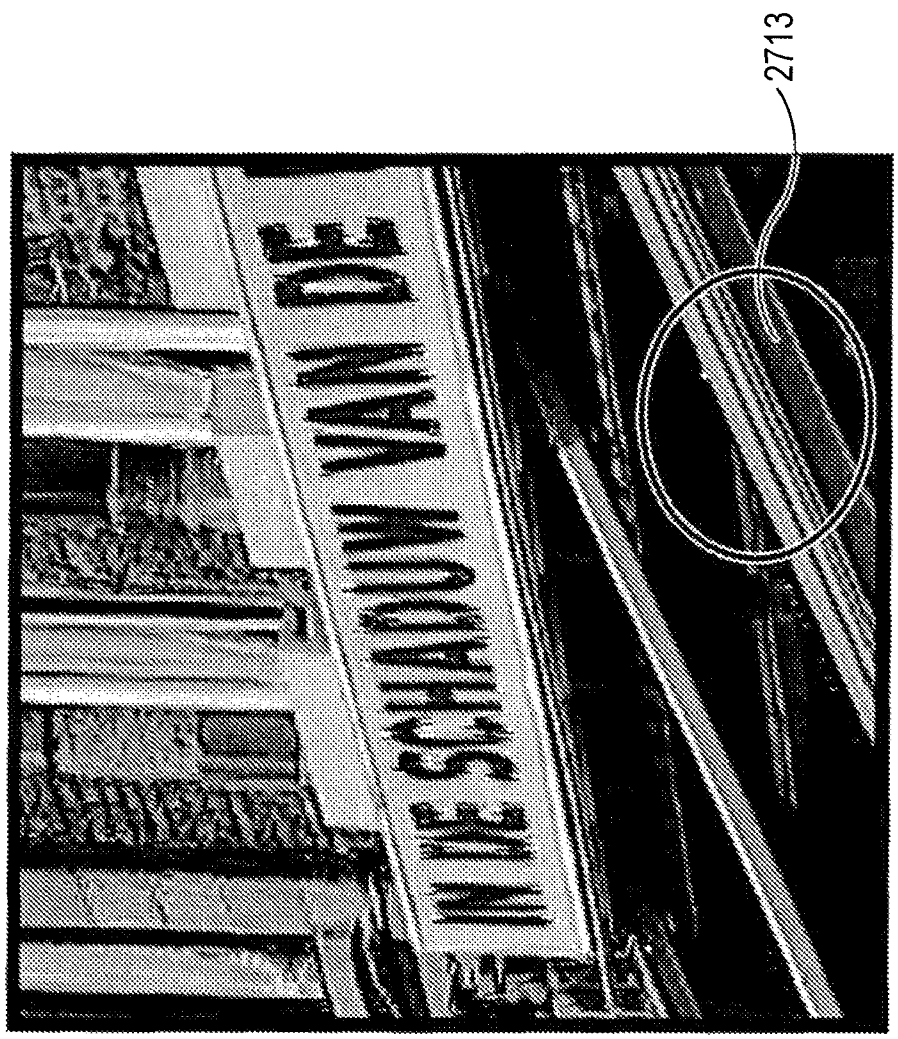

FIG. 257 is a diagram illustrating the result of processing without taking into consideration weight in a normal equation.

Figure 258:

FIG. 258 is a diagram illustrating the result of processing with taking into consideration weight in a normal equation.

Figure 259:
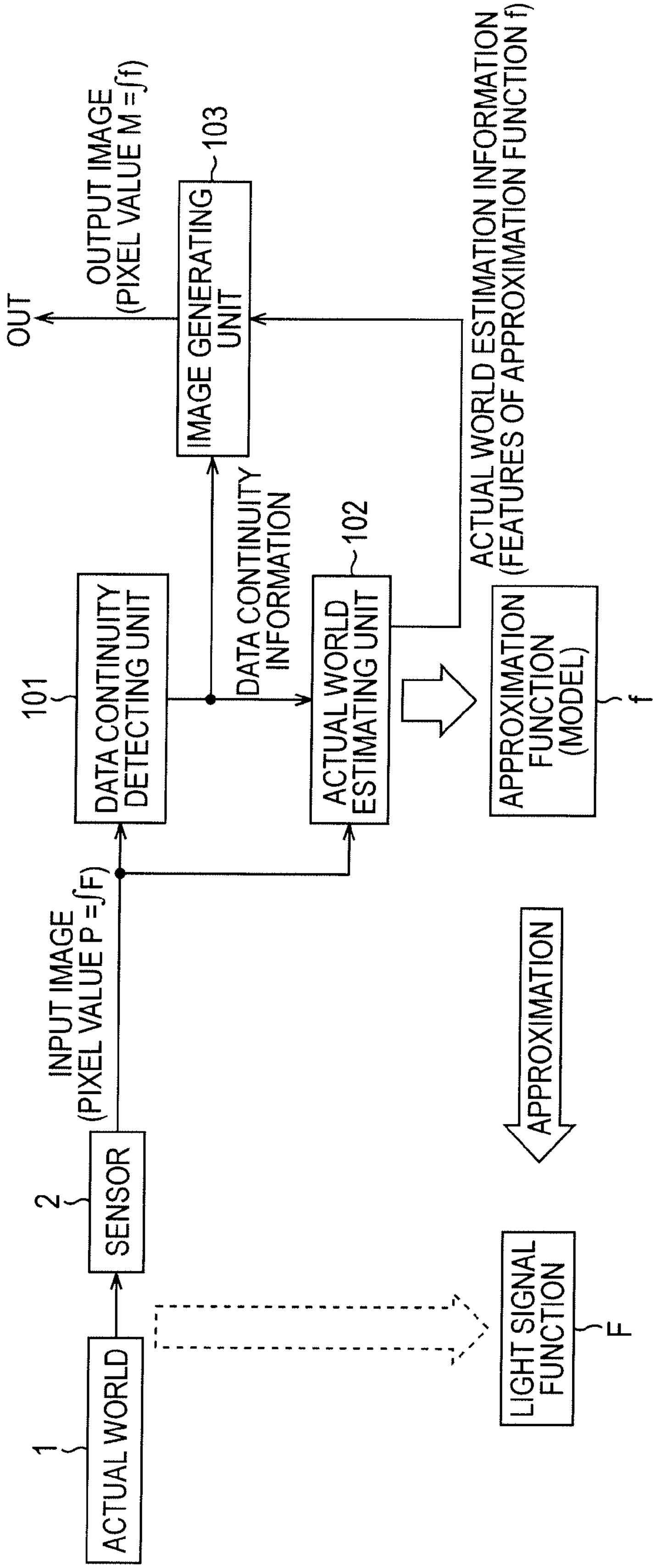

FIG. 259 is a diagram for describing the principle of re-integration, which is an example of an embodiment of the image generating unit shown in FIG. 3.

Figure 260:
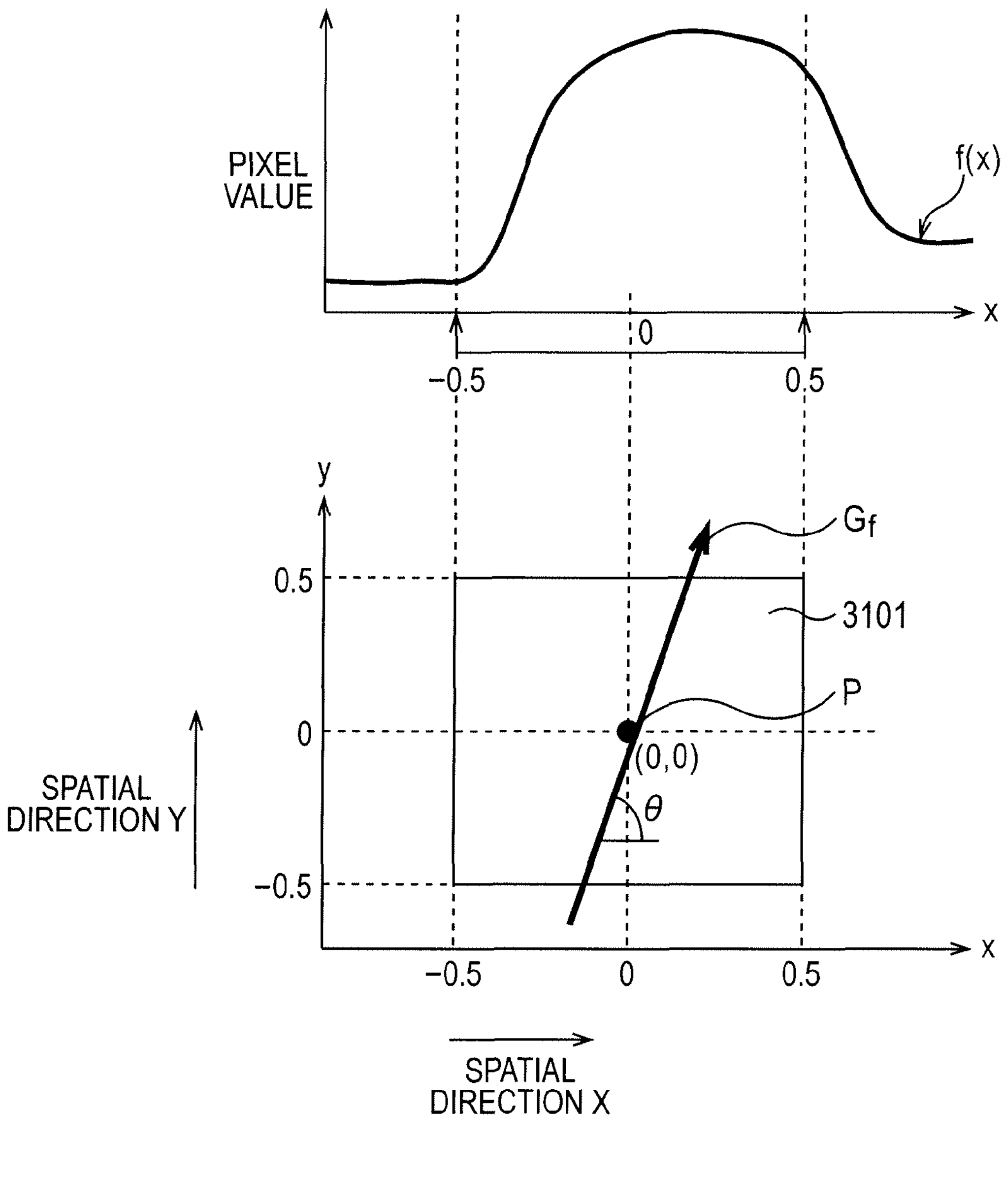

FIG. 260 is a diagram for describing an example of an input pixel and an approximation function for approximation of an actual world signal corresponding to the input pixel.

Figure 261:
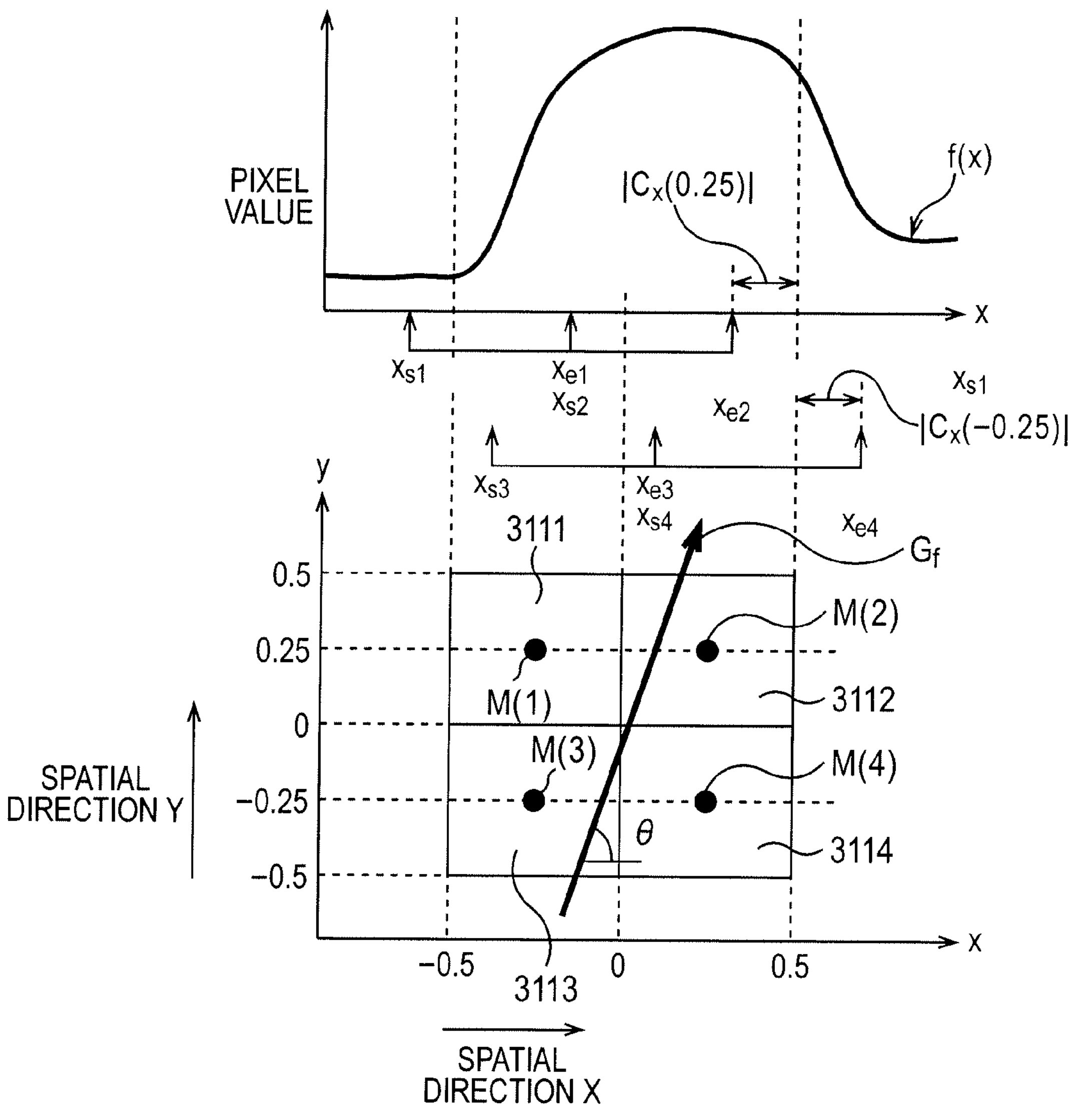

FIG. 261 is a diagram for describing an example of creating four high-resolution pixels in the one input pixel shown in FIG. 260, from the approximation function shown in FIG. 260.

Figure 262:
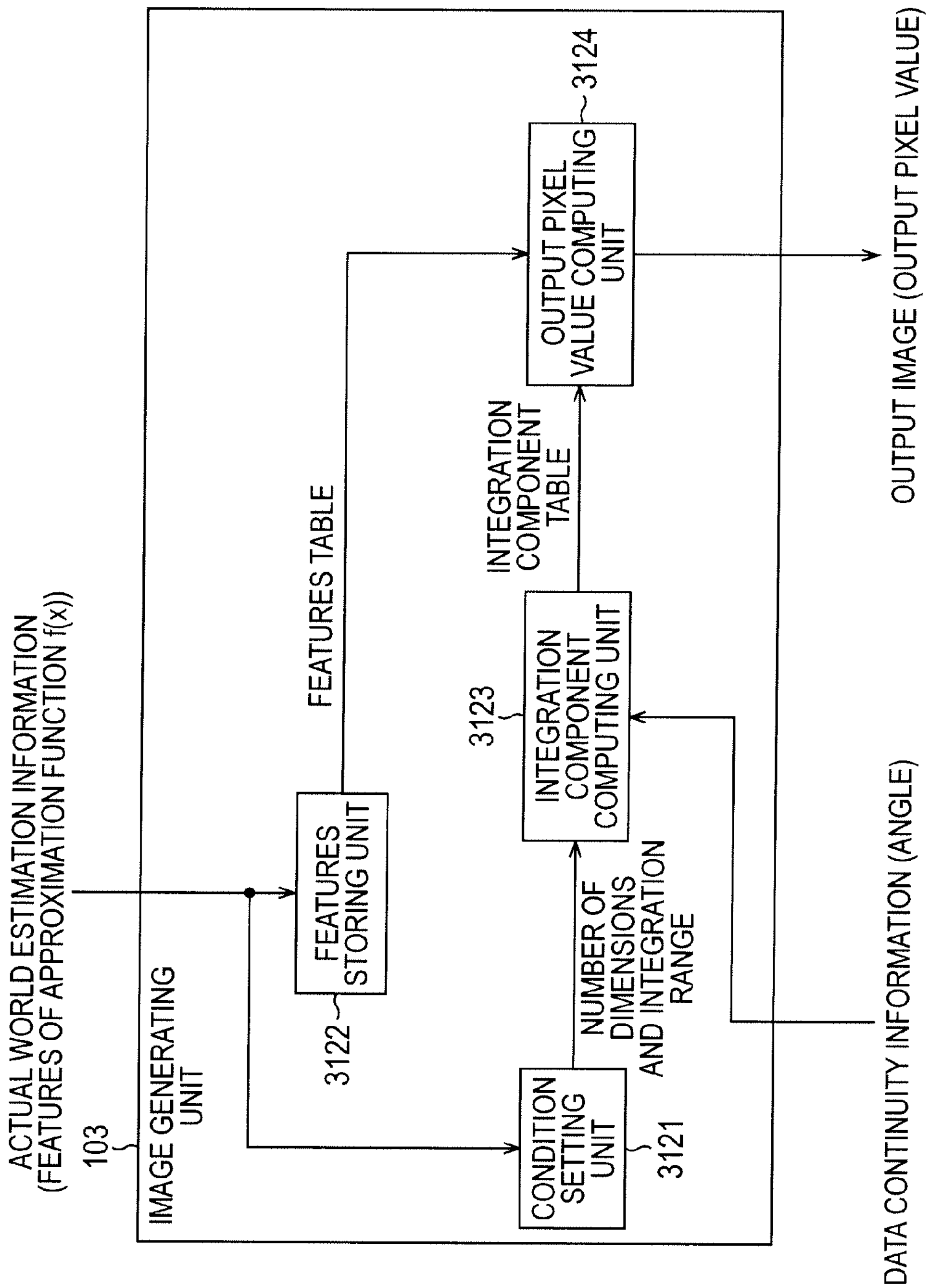

FIG. 262 is a block diagram for describing a configuration example of an image generating unit using, of re-integration techniques having the principle shown in FIG. 259, one-dimensional re-integration technique.

Figure 263:
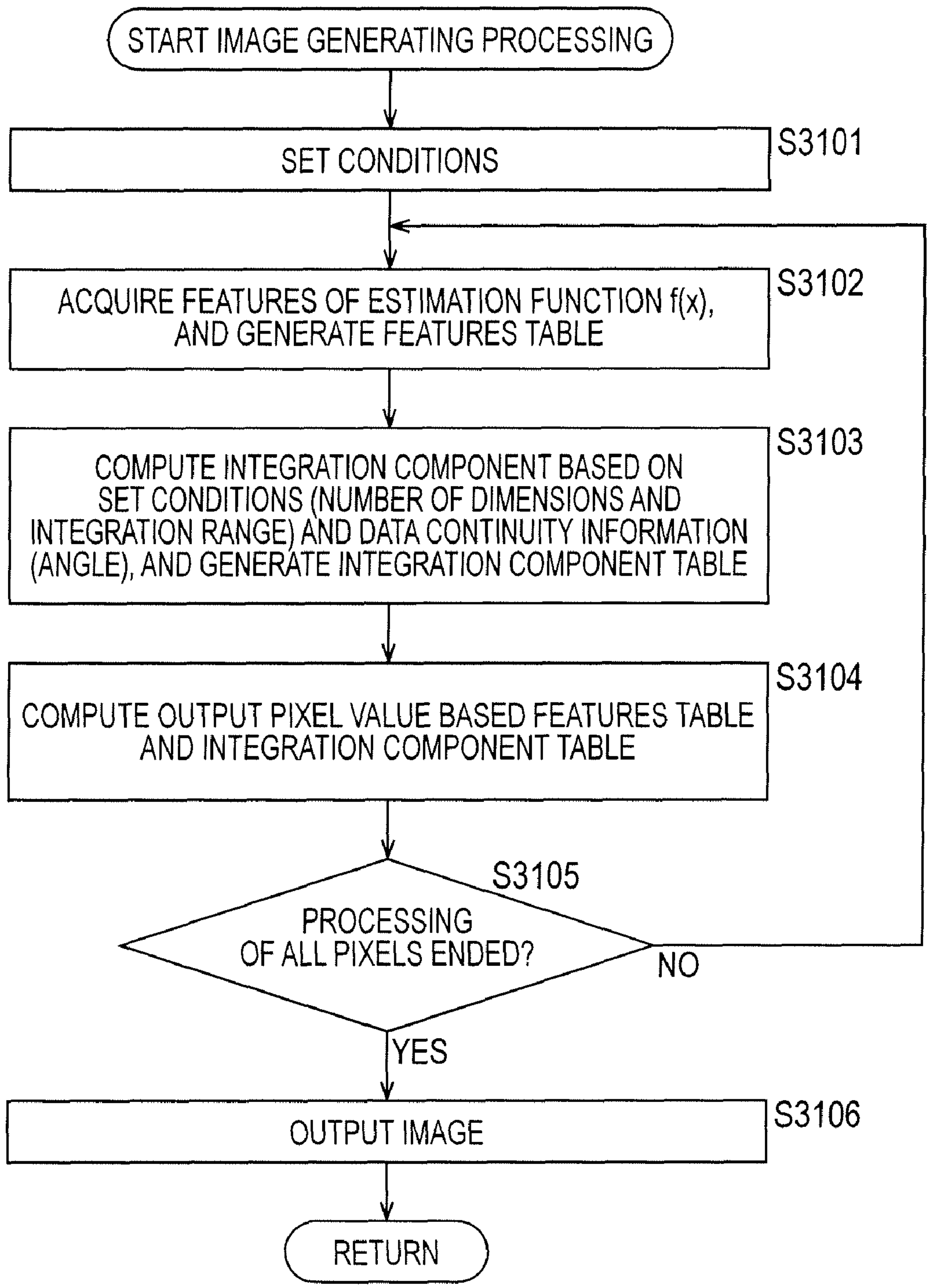

FIG. 263 is a flowchart for describing the image generating processing which the image generating unit of the configuration shown in FIG. 262 executes.

Figure 264:
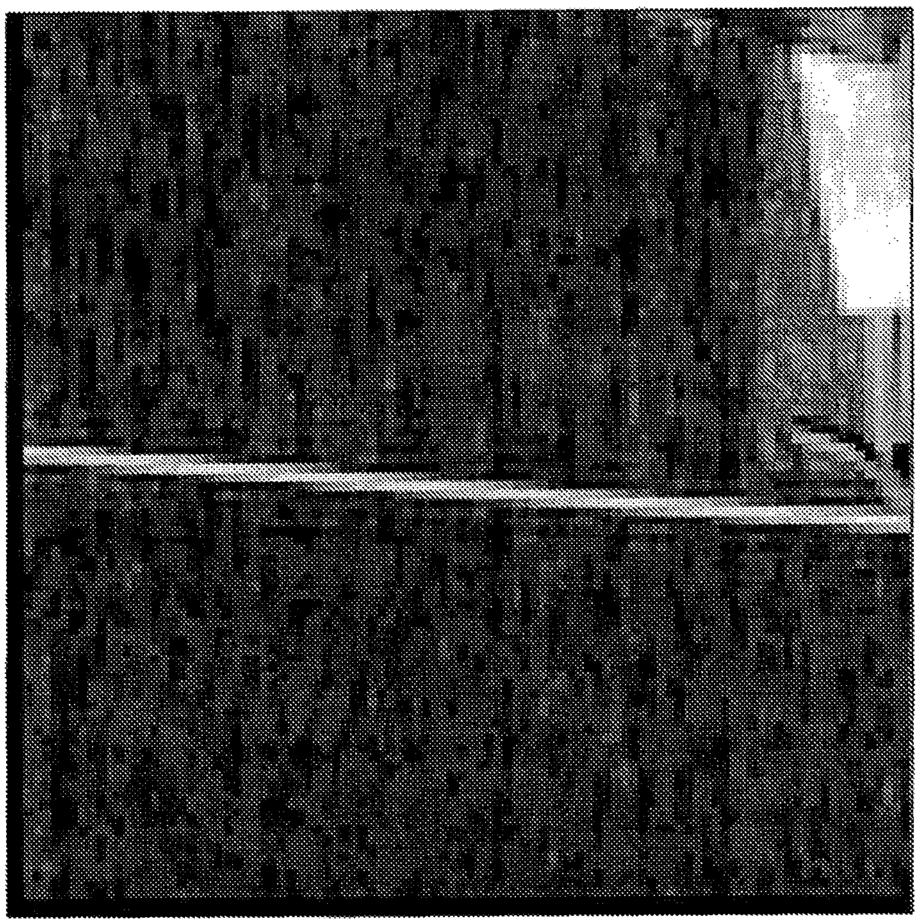

FIG. 264 is a diagram illustrating an example of the original image of the input image.

Figure 265:
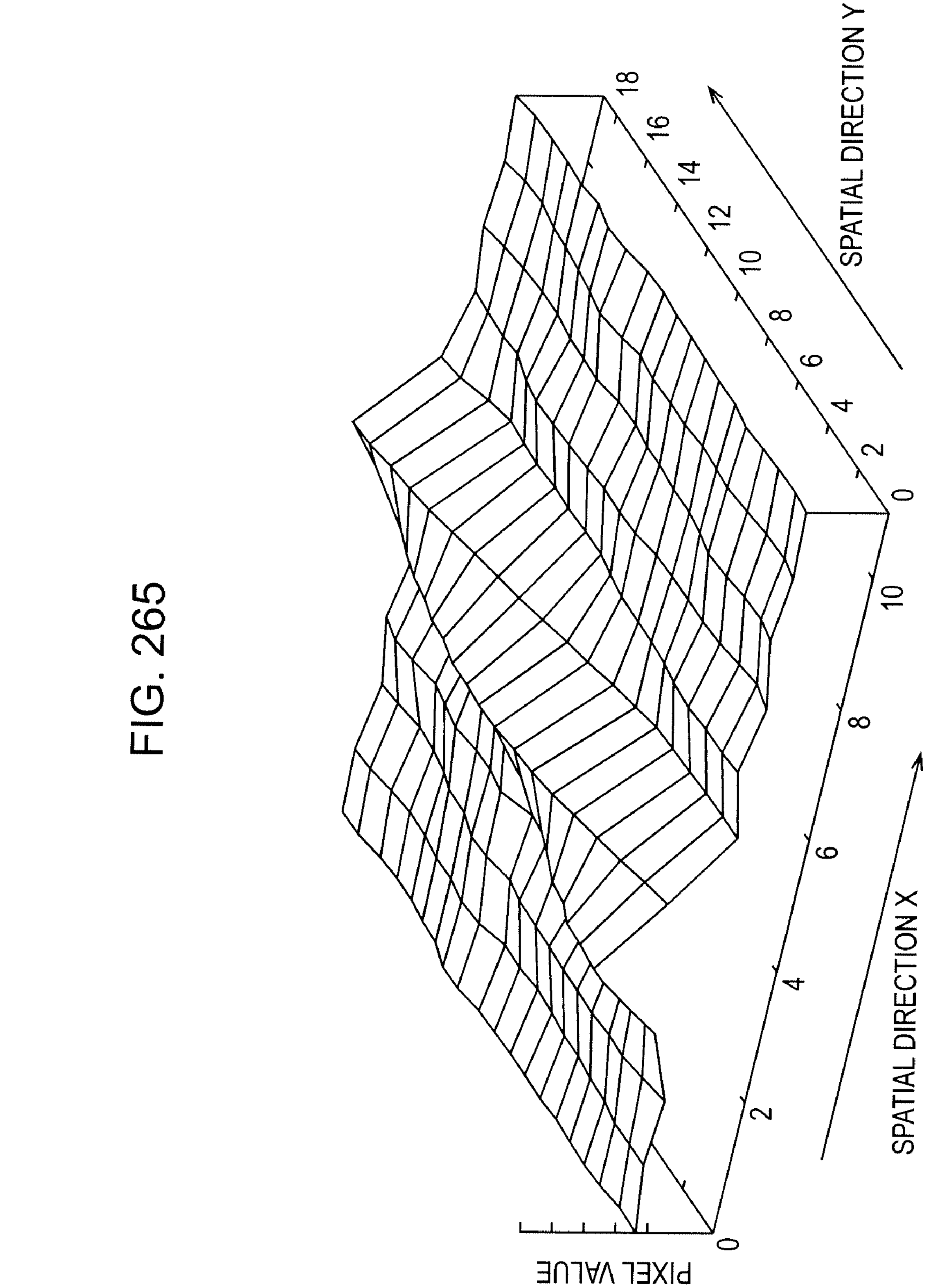

FIG. 265 is a diagram illustrating an example of image data corresponding to the image shown in FIG. 264.

Figure 266:
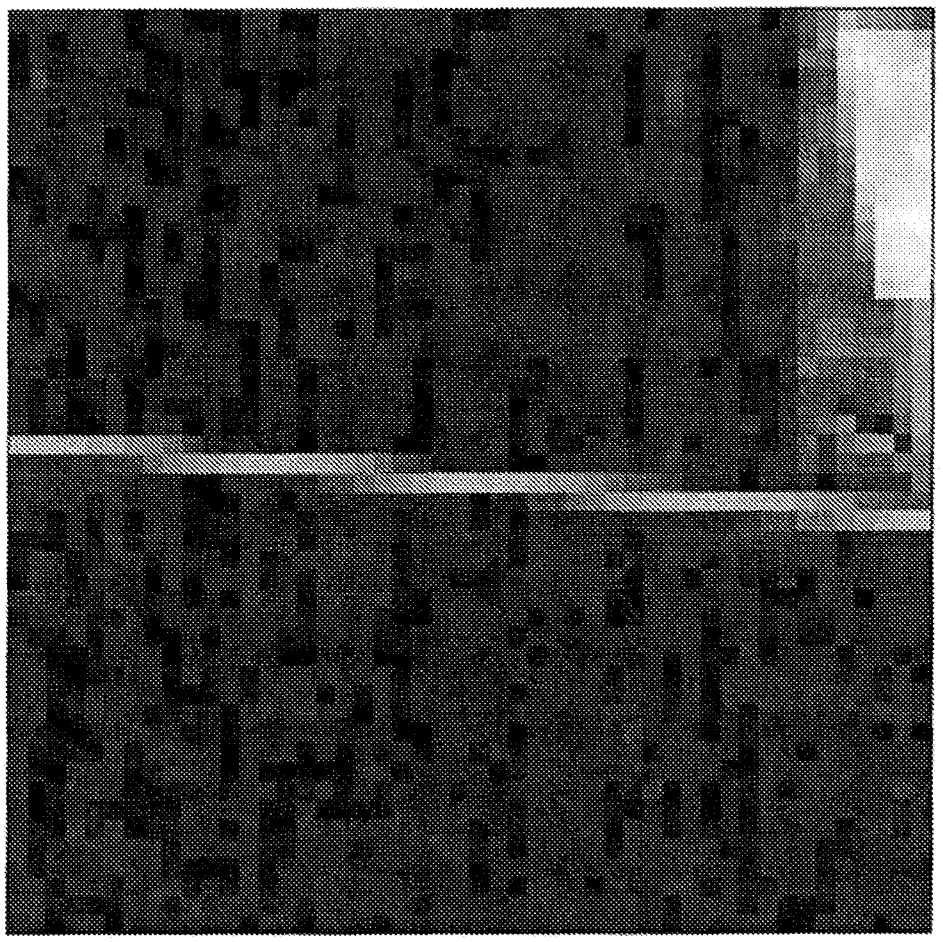

FIG. 266 is a diagram illustrating an example of an input image.

Figure 267:
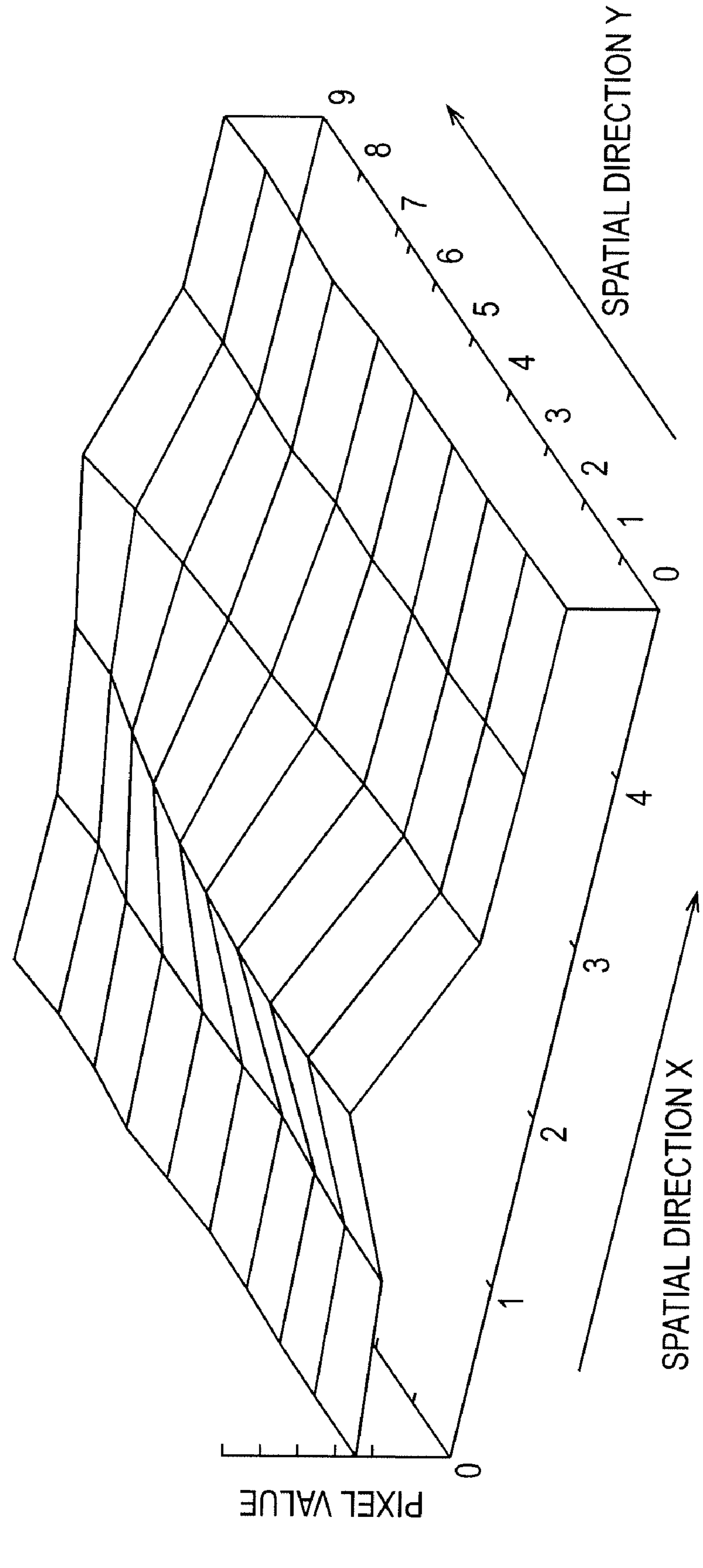

FIG. 267 is a diagram representing an example of image data corresponding to the image shown in FIG. 266.

Figure 268:
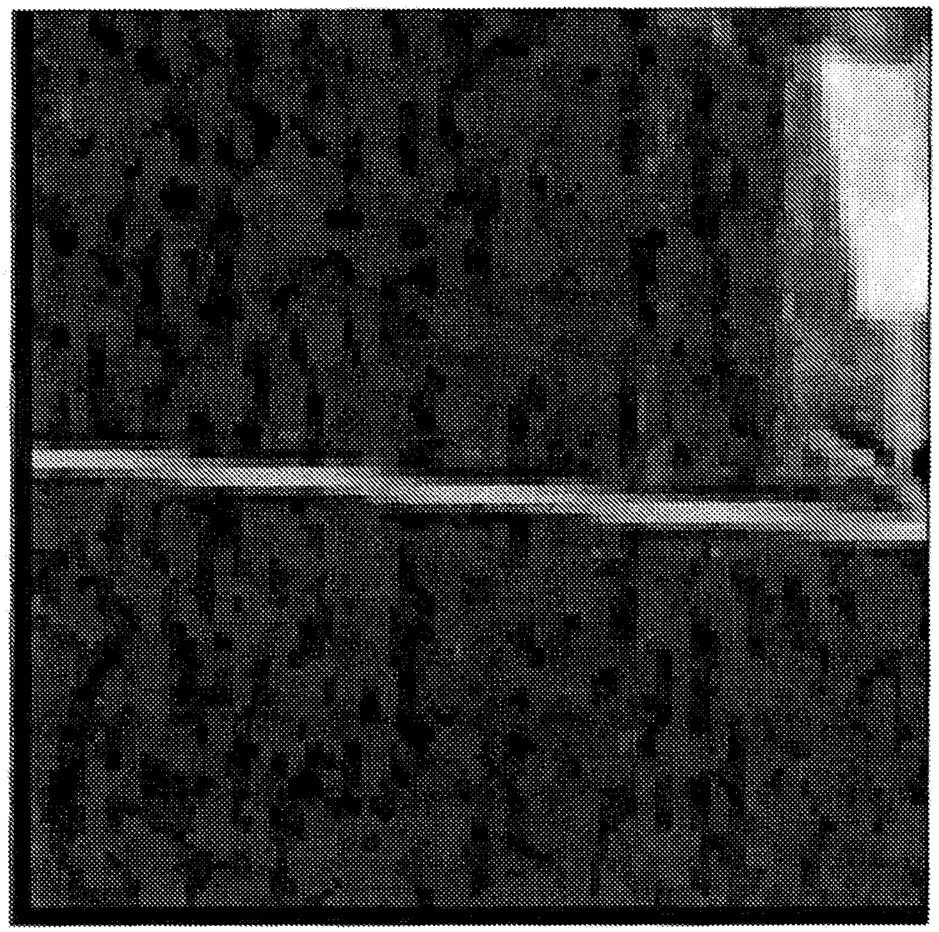

FIG. 268 is a diagram illustrating an example of an image obtained by subjecting an input image to conventional class classification adaptation processing.

Figure 269:
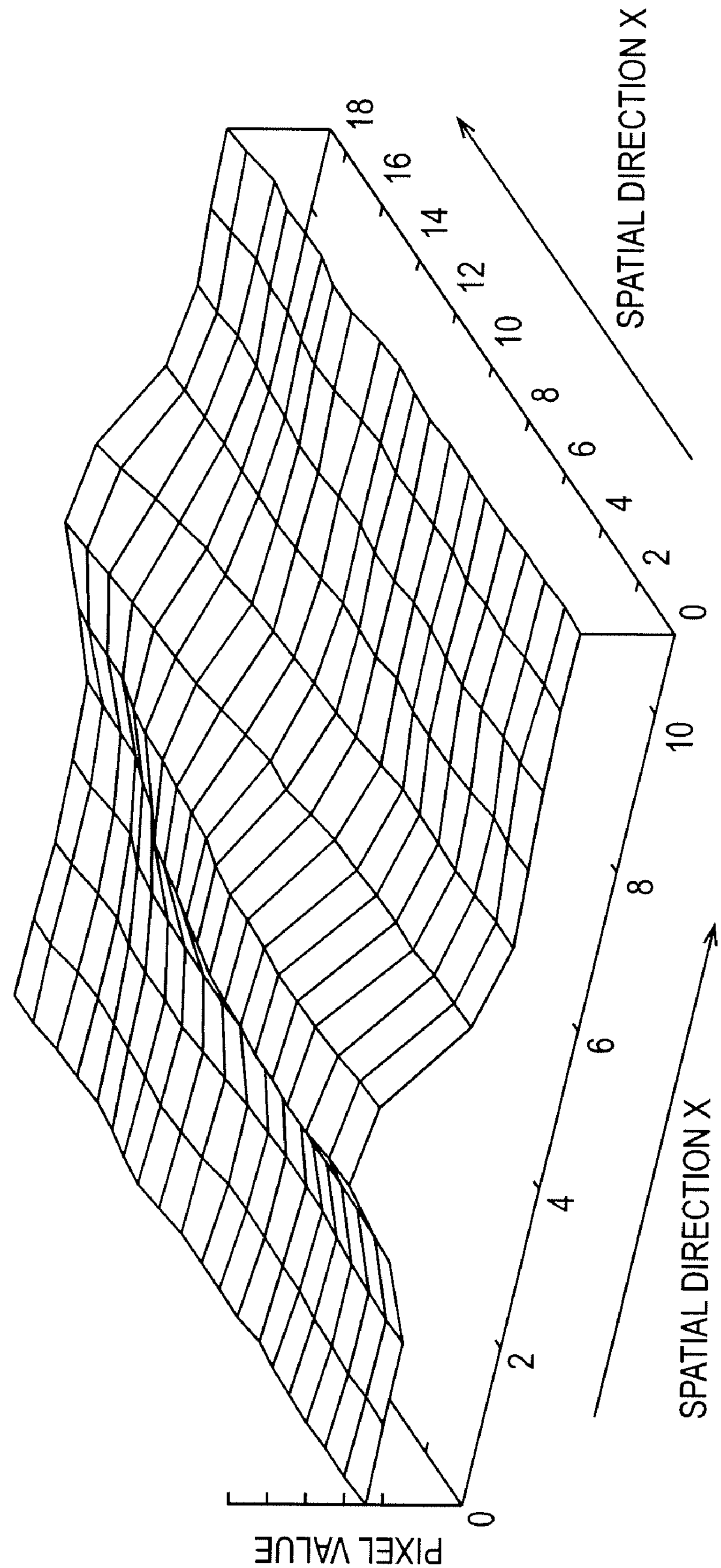

FIG. 269 is a diagram representing an example of image data corresponding to the image shown in FIG. 268.

Figure 270:
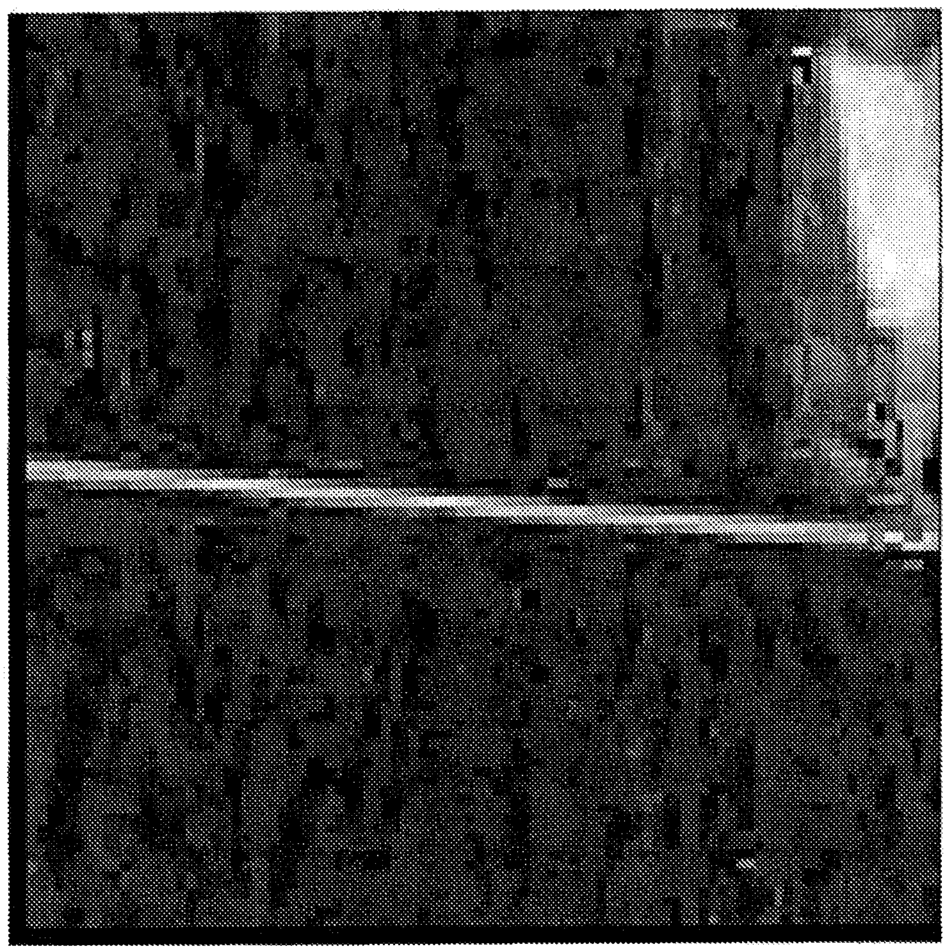

FIG. 270 is a diagram illustrating an example of an image obtained by subjecting an input image to the one-dimensional re-integration technique according to the present invention.

Figure 271:
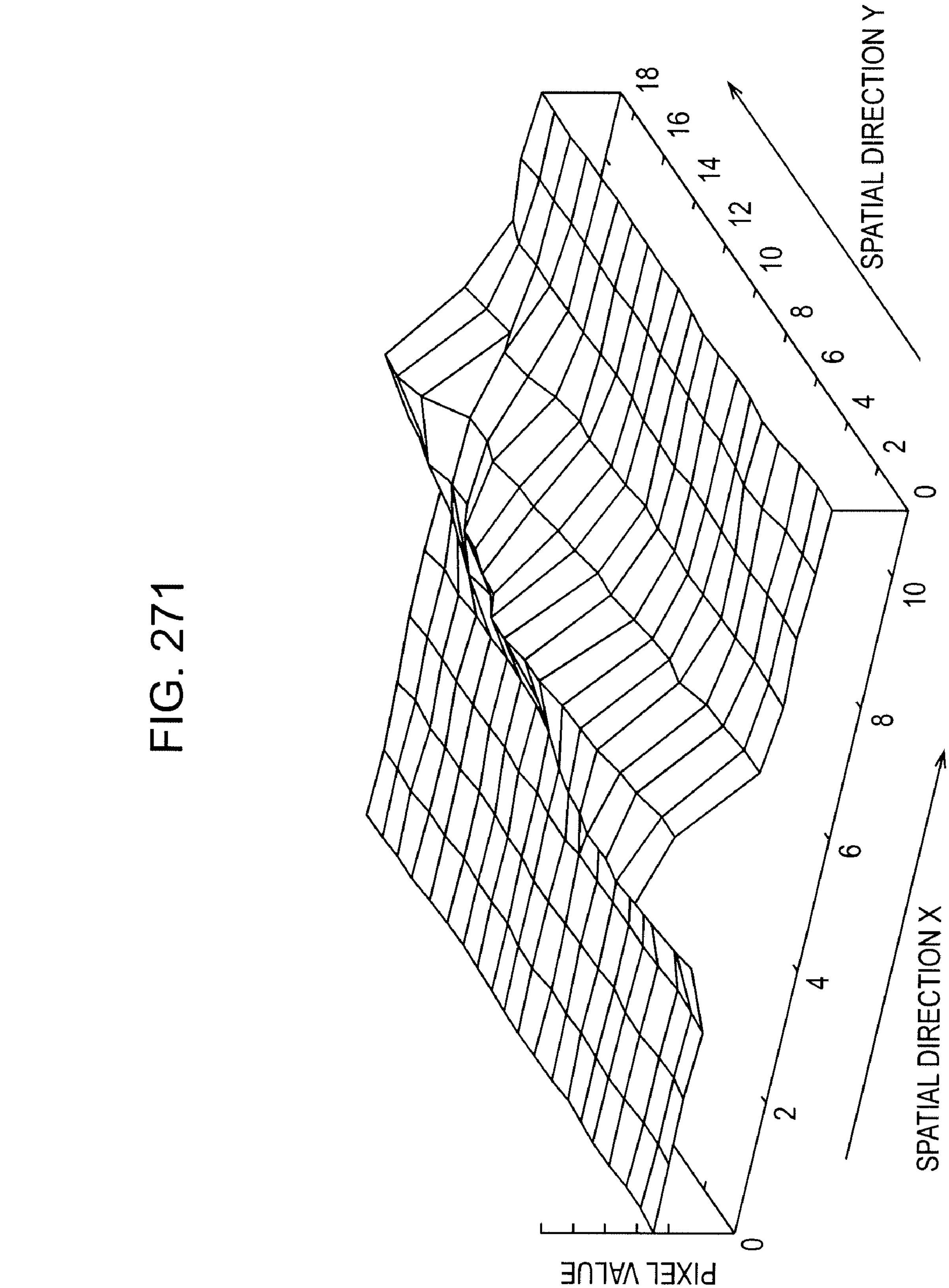

FIG. 271 is a diagram illustrating an example of image data corresponding to the image shown in FIG. 270.

Figure 272:
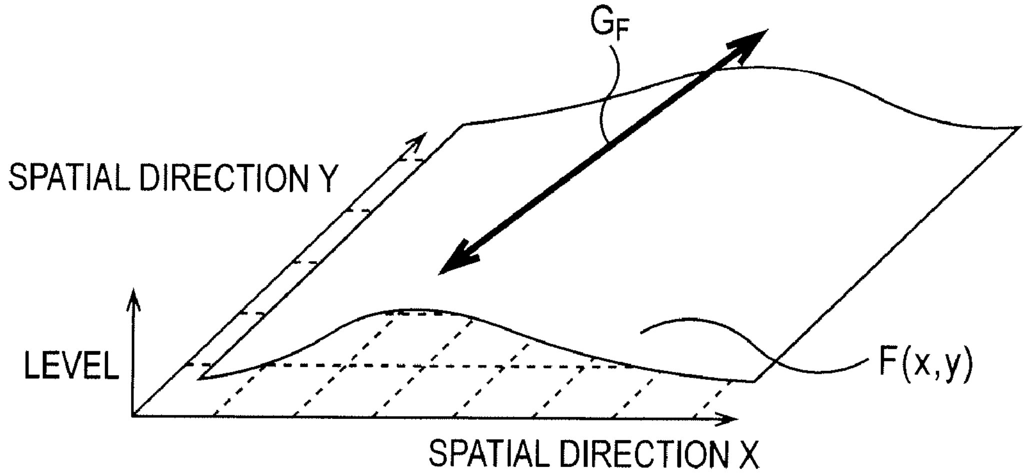

FIG. 272 is a diagram for describing actual-world signals having continuity in the spatial direction.

Figure 273:
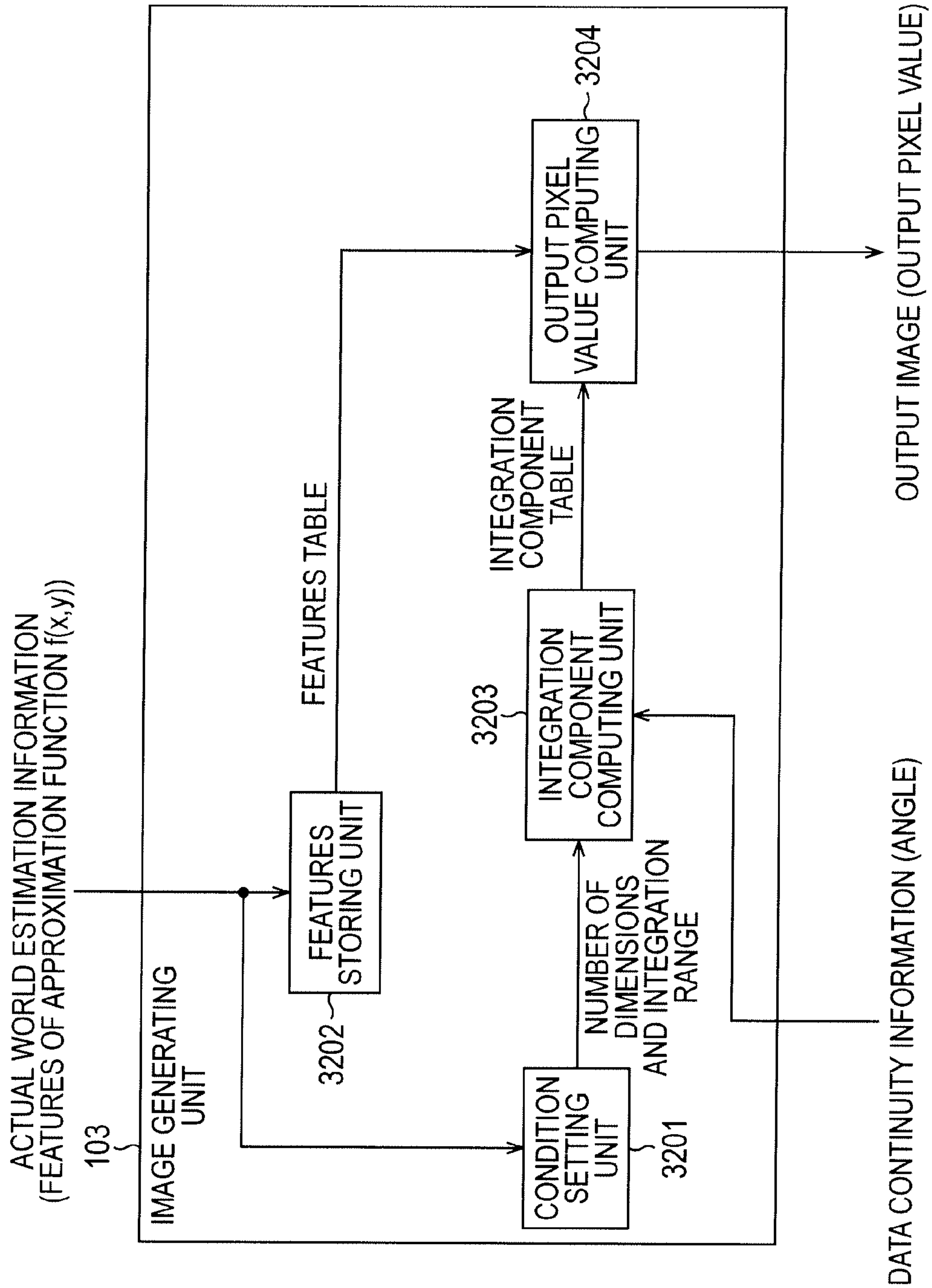

FIG. 273 is a block diagram for describing a configuration example of an image generating unit which uses, of the re-integration techniques having the principle shown in FIG. 259, a two-dimensional re-integration technique.

Figure 274:
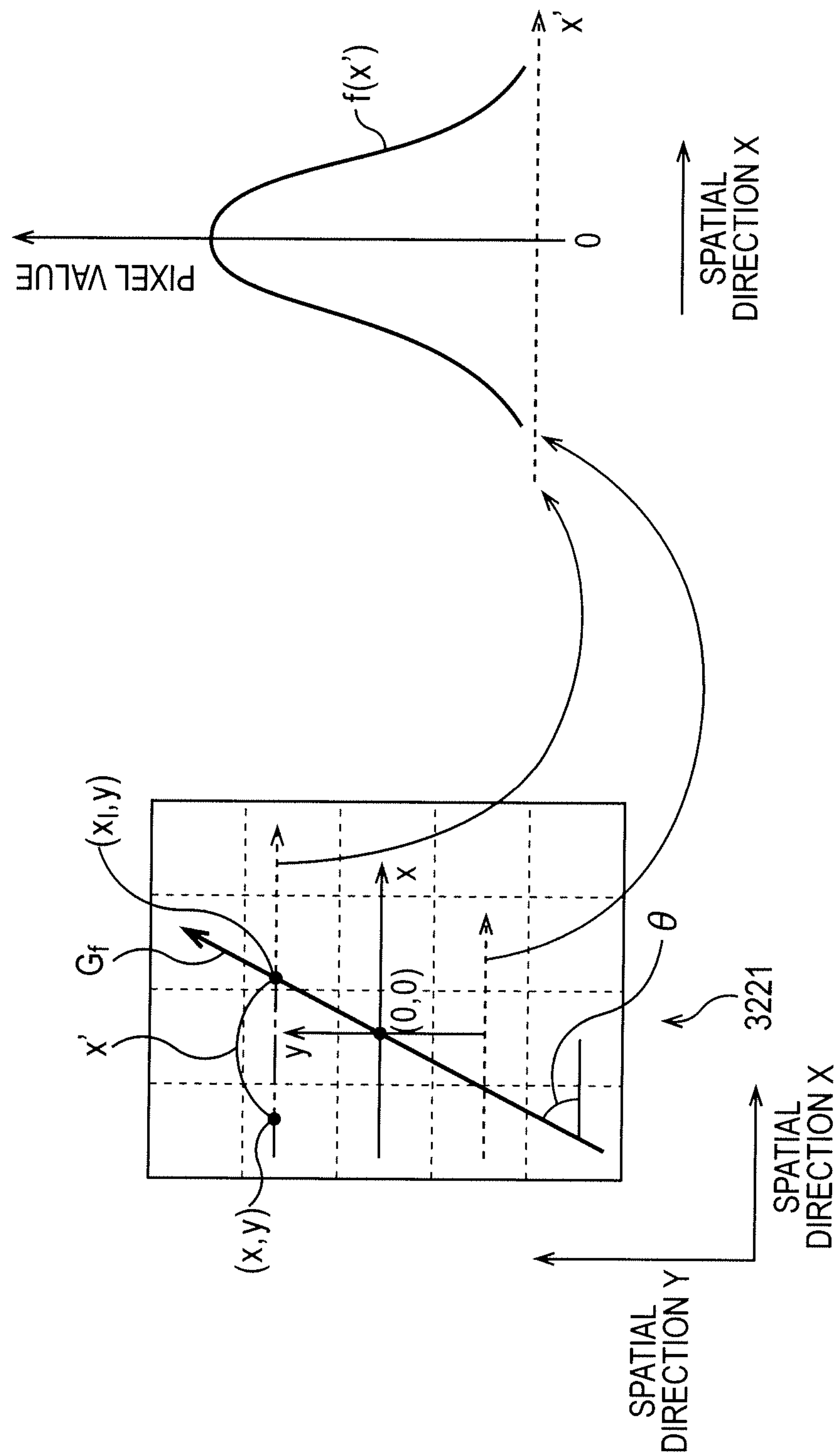

FIG. 274 is a diagram for describing distance in the cross-sectional direction.

Figure 275:
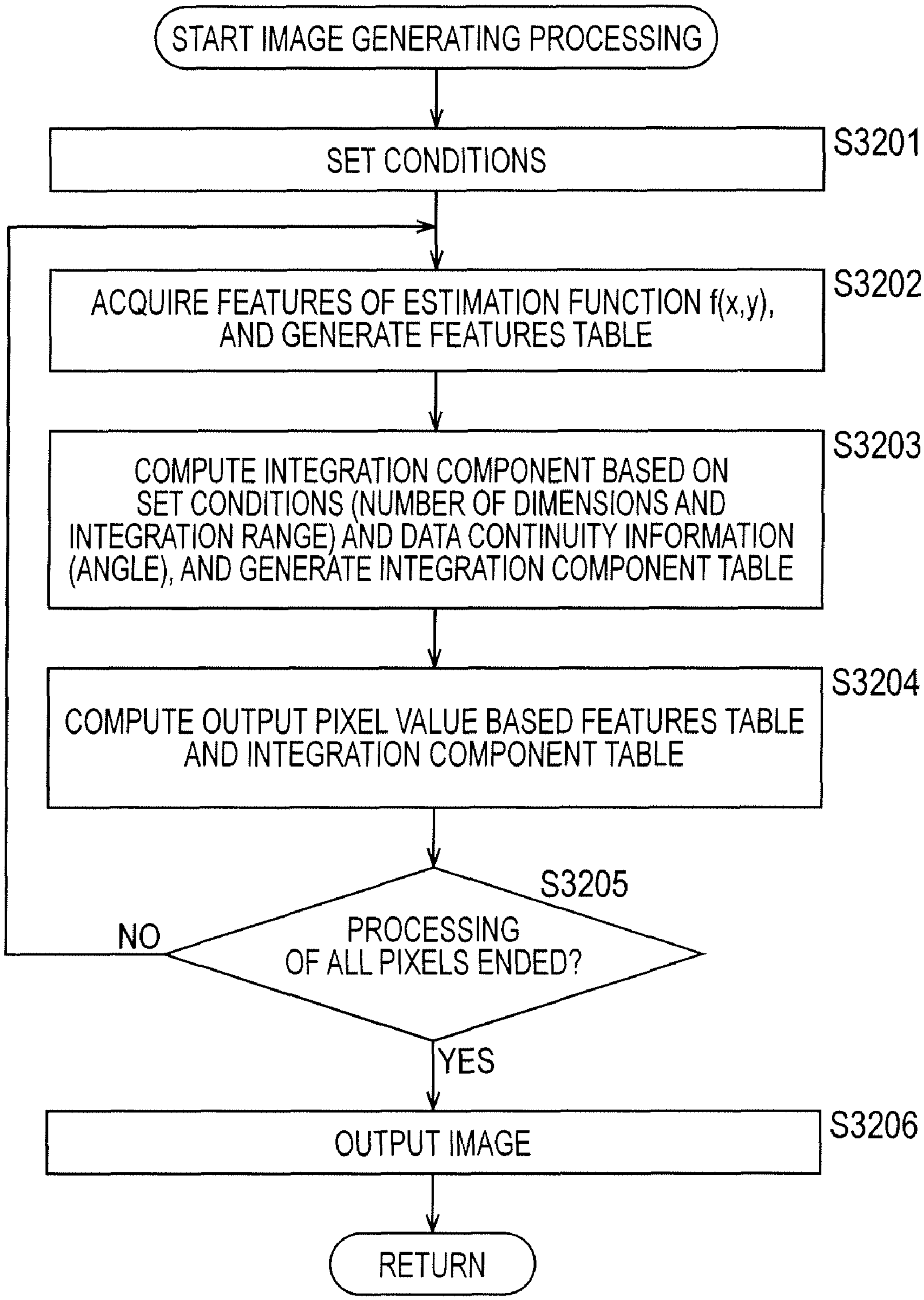

FIG. 275 is a flowchart for describing the image generating processing which the image generating unit of the configuration shown in FIG. 273 executes.

Figure 276:
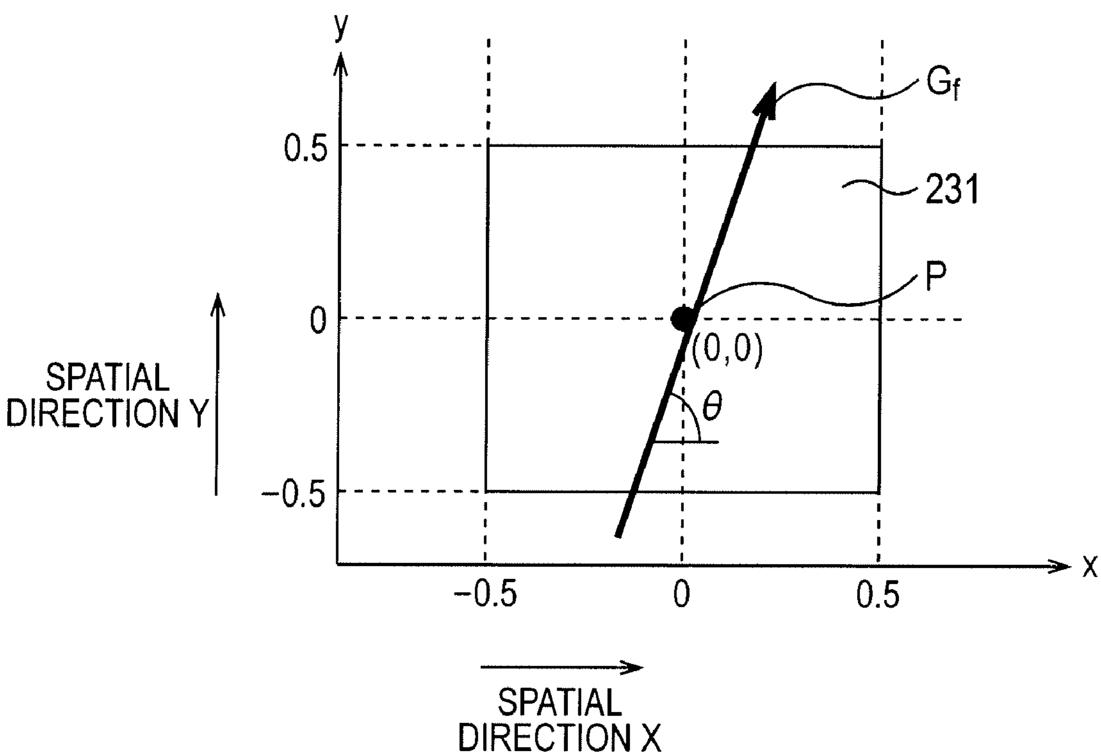

FIG. 276 is a diagram for describing an example of an input pixel.

Figure 277:
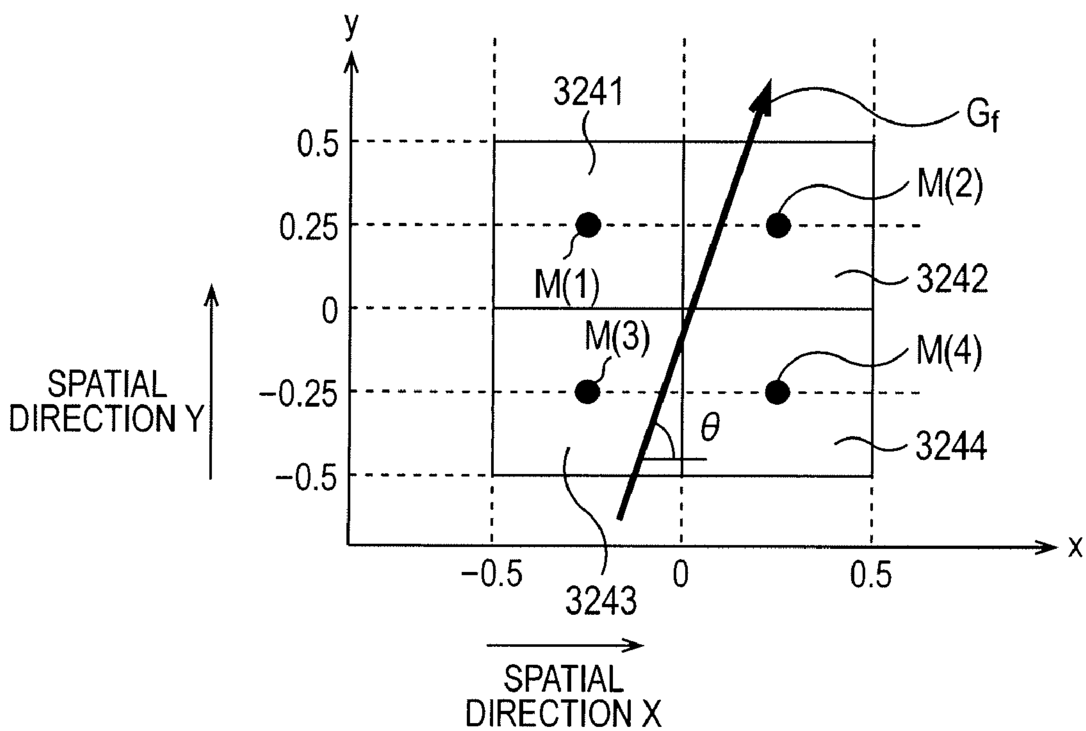

FIG. 277 is a diagram for describing an example of creating four high-resolution pixels in the one input pixel shown in FIG. 276, with the two-dimensional re-integration technique.

Figure 278:
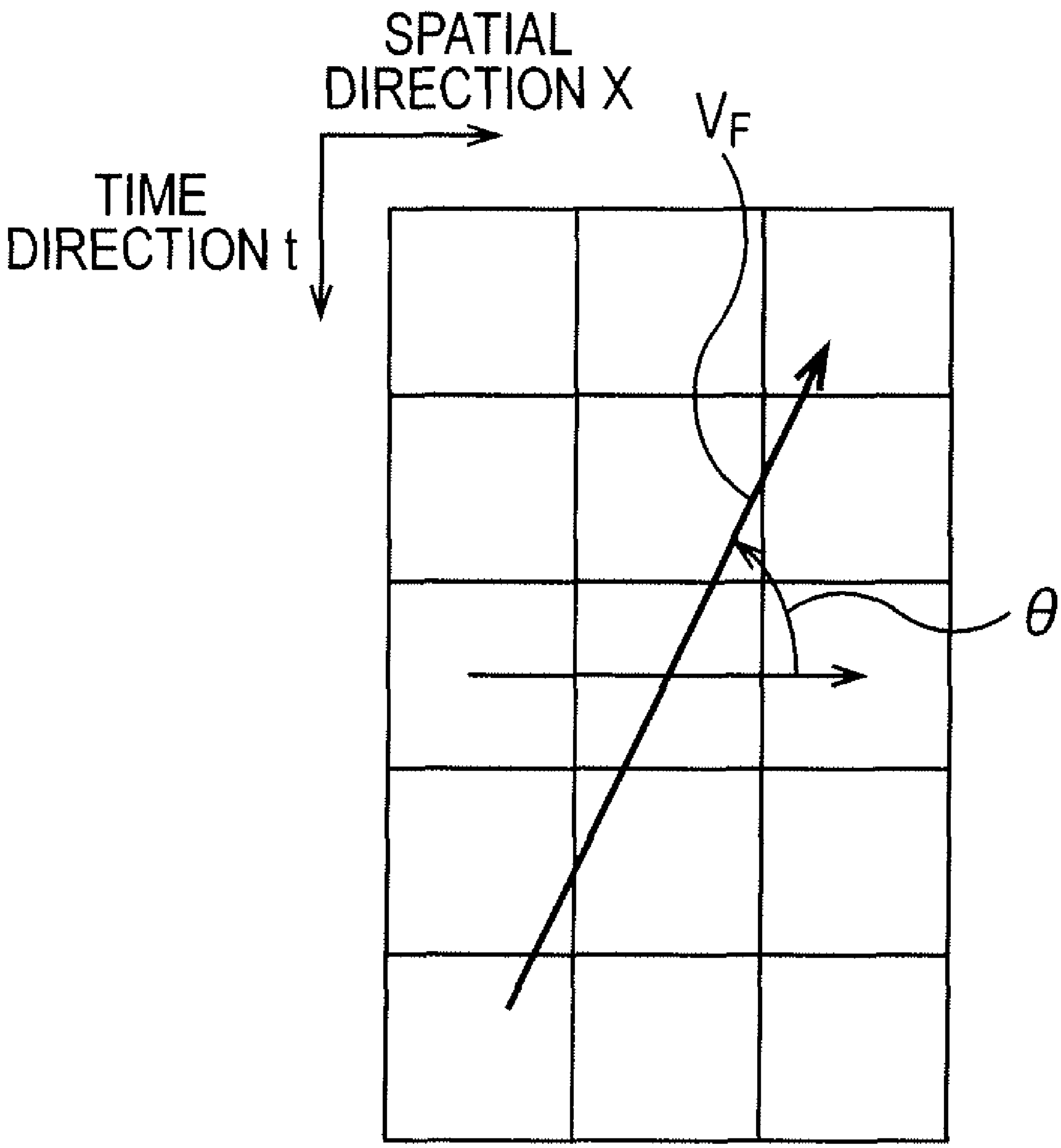

FIG. 278 is a diagram for describing the direction of continuity in the space-time directions.

Figure 279:
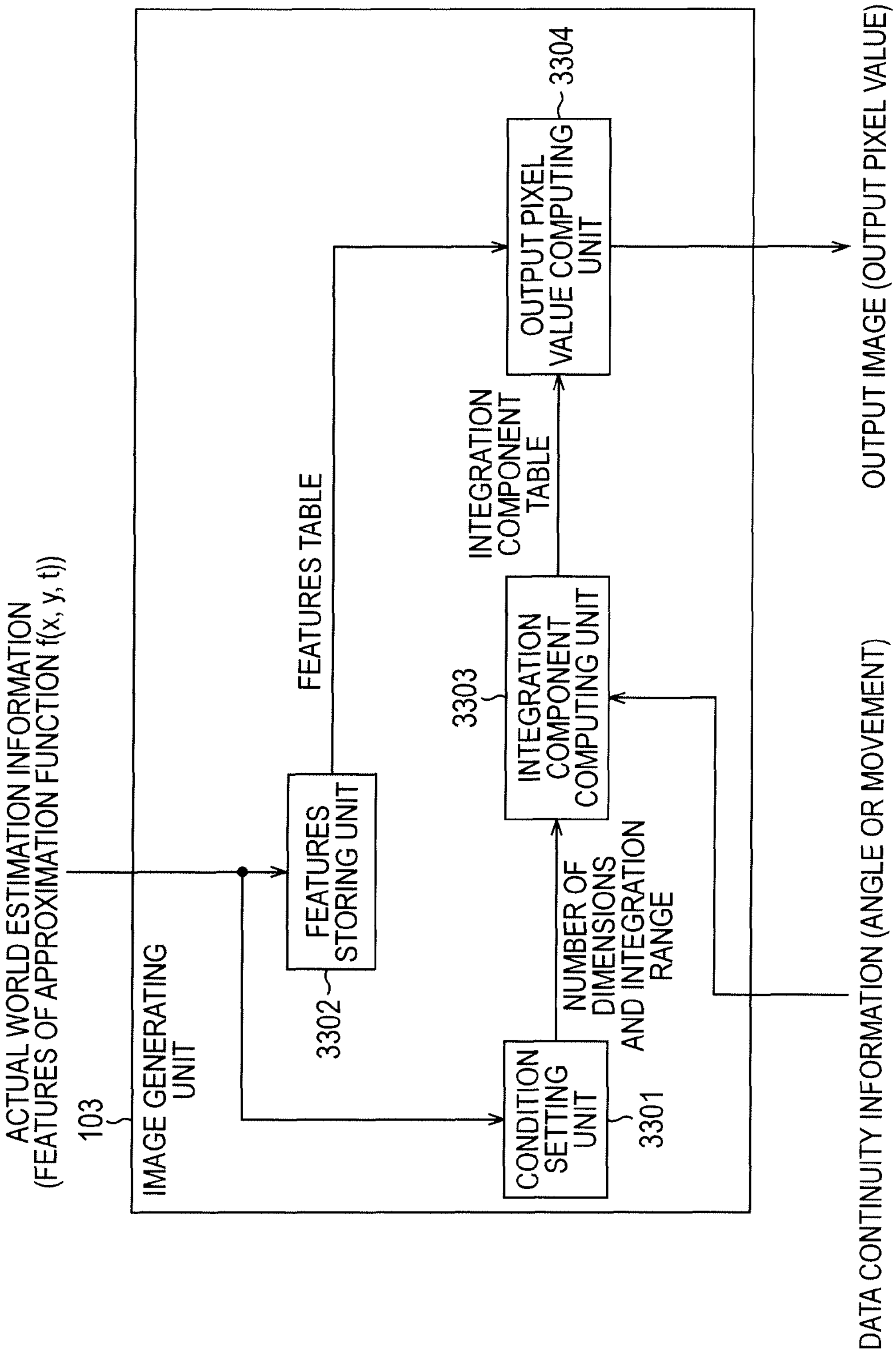

FIG. 279 is a block diagram for describing a configuration example of the image generating unit which uses, of the re-integration techniques having the principle shown in FIG. 259, a three-dimensional re-integration technique.

Figure 280:
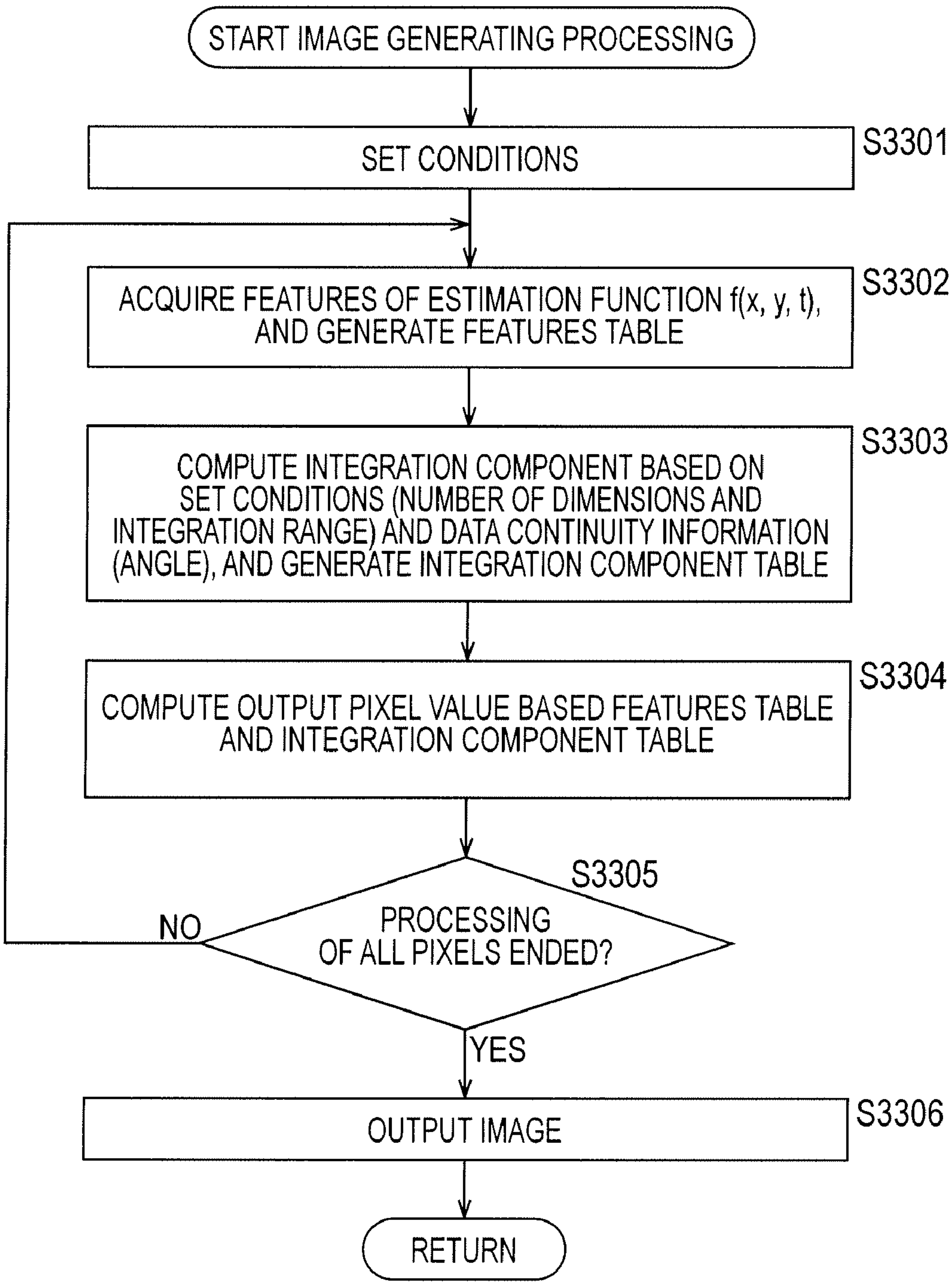

FIG. 280 is a flowchart for describing the image generating processing which the image generating unit of the configuration shown in FIG. 279 executes.

Figure 281:
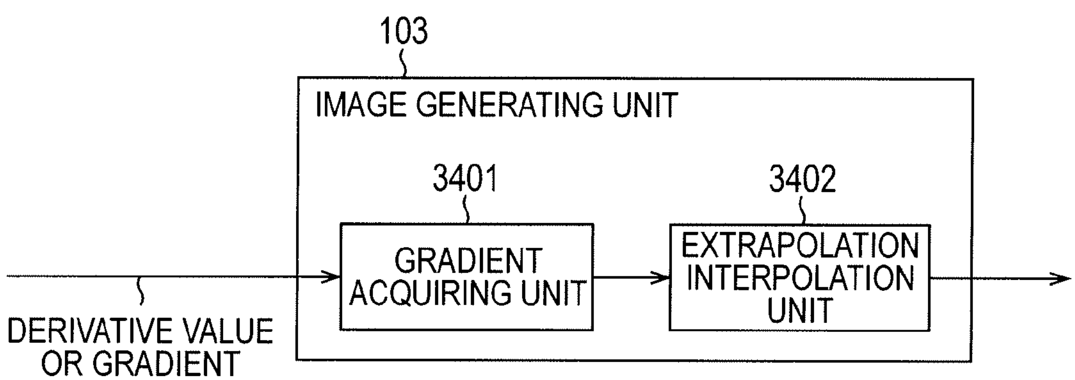

FIG. 281 is a block diagram illustrating another configuration of the image generating unit to which the present invention is applied.

Figure 282:
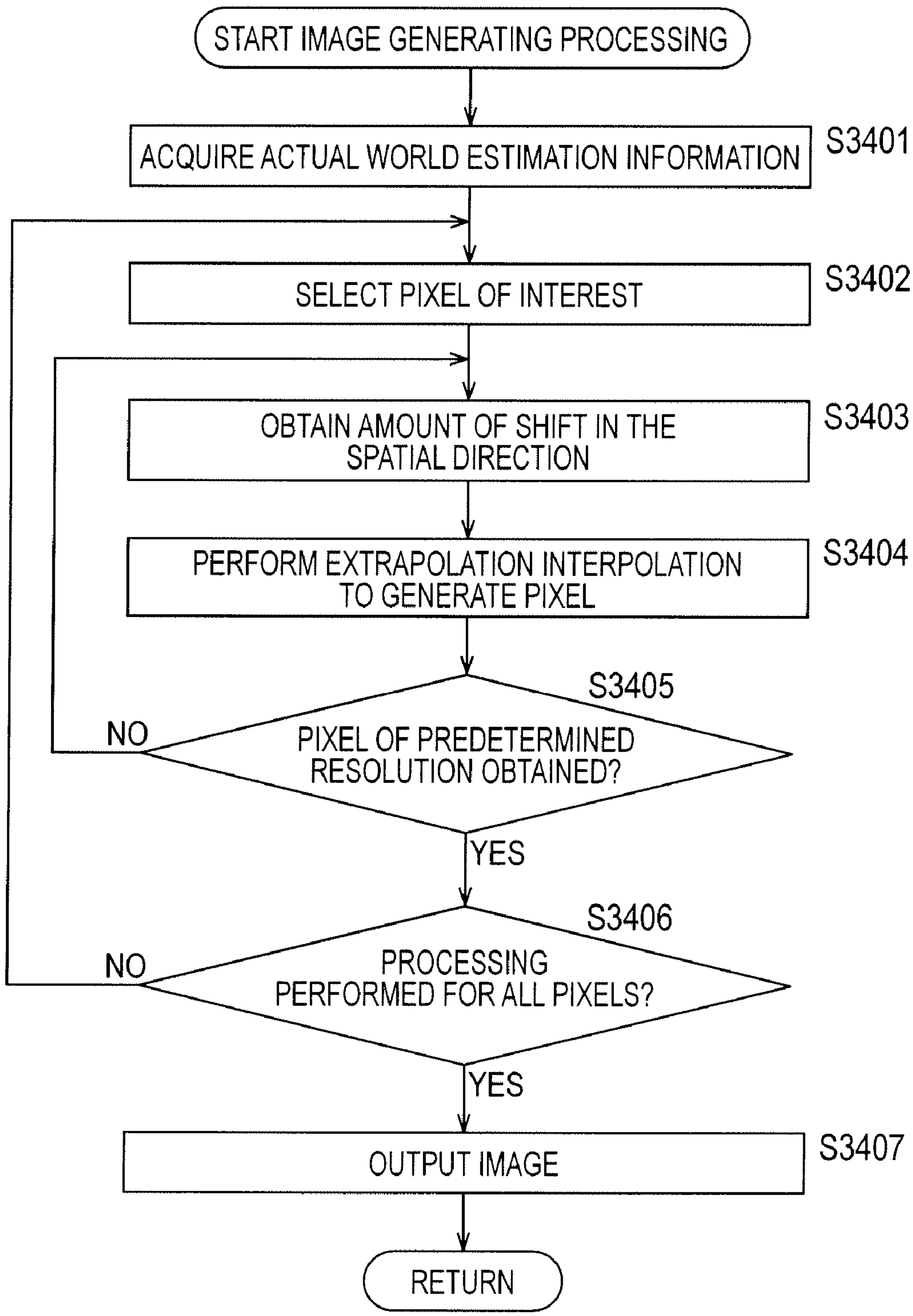

FIG. 282 is a flowchart for describing the processing for image generating with the image generating unit shown in FIG. 281.

Figure 283:
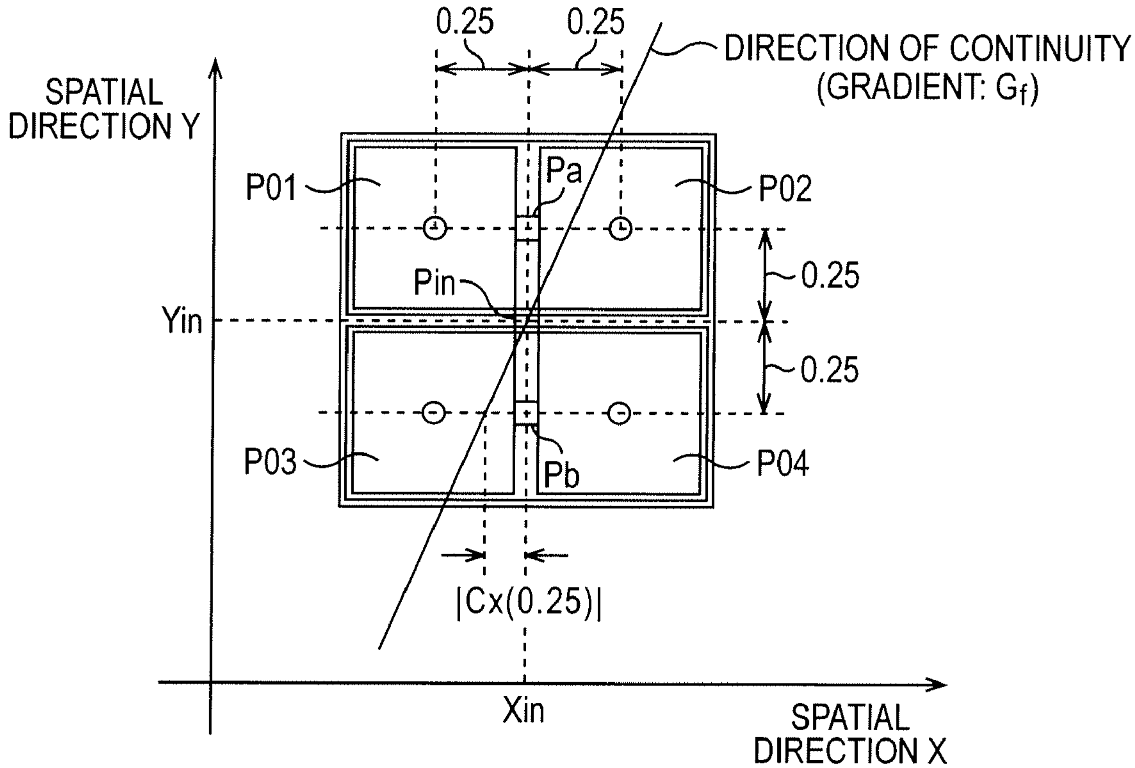

FIG. 283 is a diagram for describing processing of creating a quadruple density pixel from an input pixel.

Figure 284:
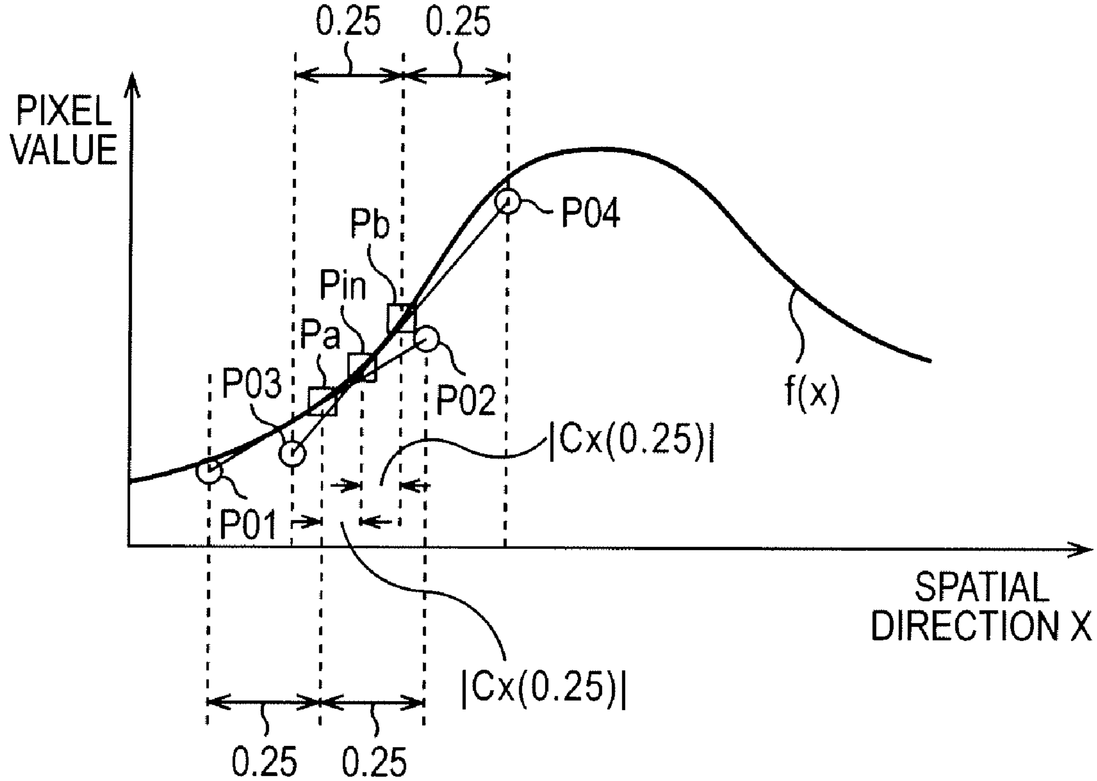

FIG. 284 is a diagram for describing the relationship between an approximation function indicating the pixel value and the amount of shift.

Figure 285:
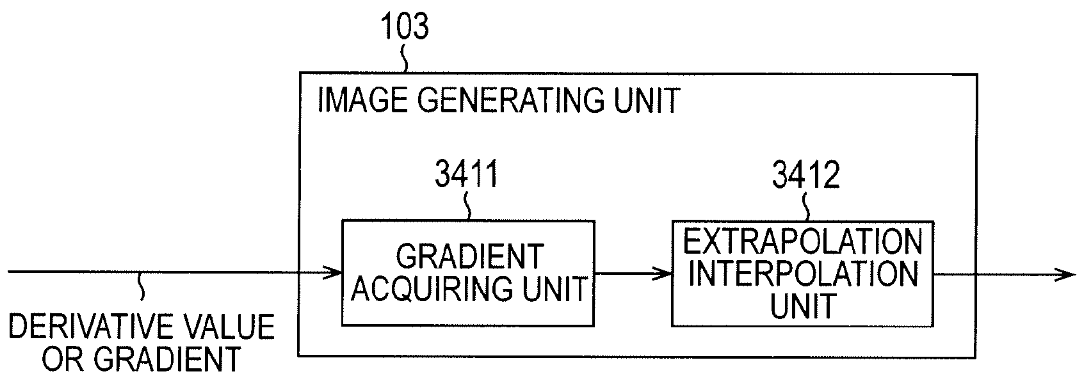

FIG. 285 is a block diagram illustrating another configuration of the image generating unit to which the present invention has been applied.

Figure 286:
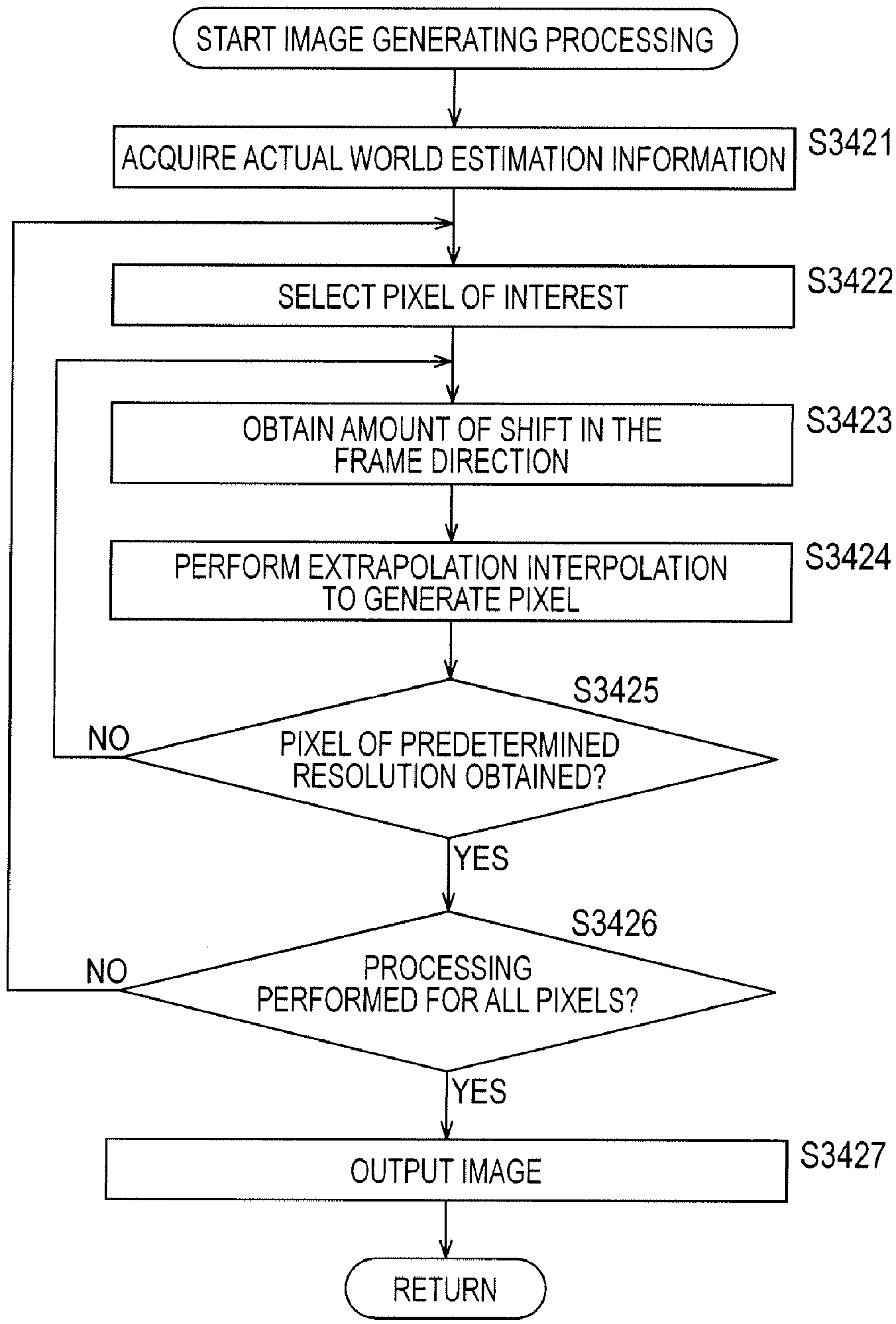

FIG. 286 is a flowchart for describing the image generating processing with the image generating unit shown in FIG. 285.

Figure 287:
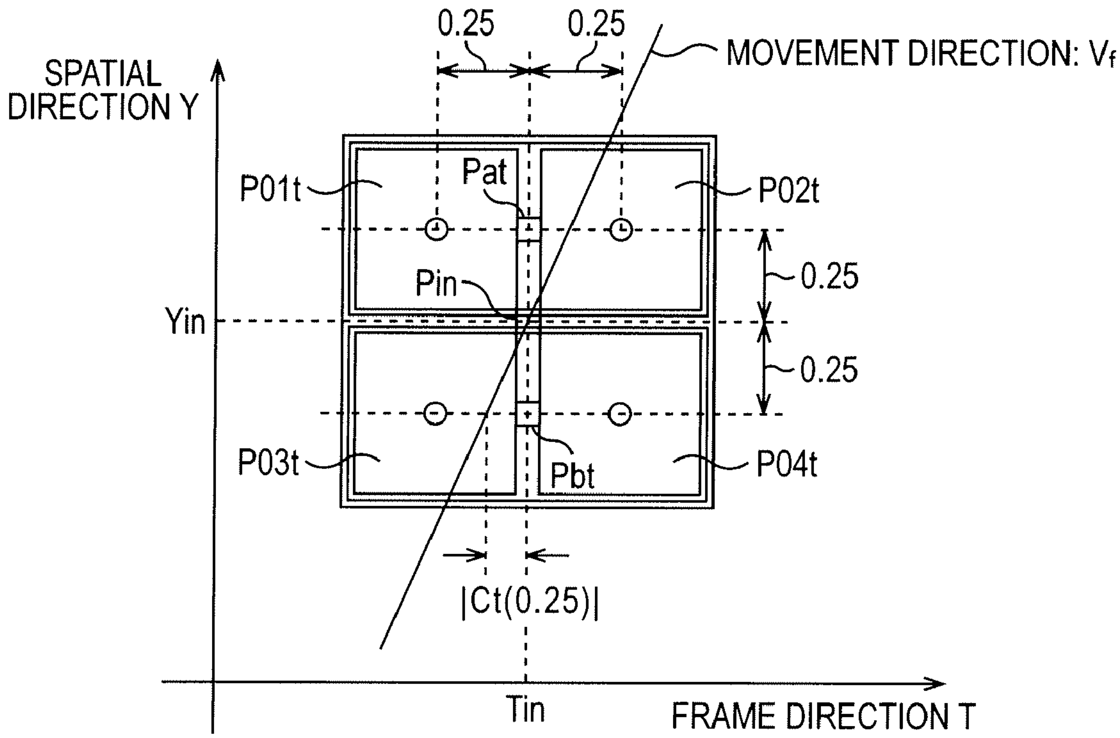

FIG. 287 is a diagram for describing processing of creating a quadruple density pixel from an input pixel.

Figure 288:
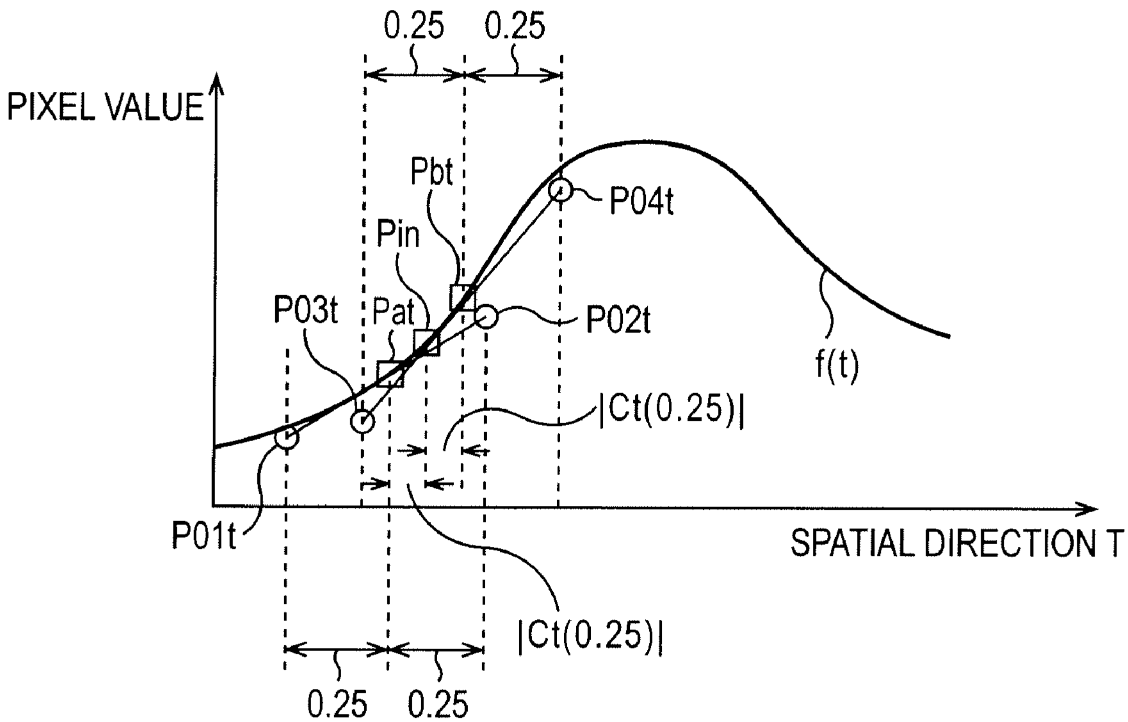

FIG. 288 is a diagram for describing the relationship between an approximation function indicating the pixel value and the amount of shift.

Figure 289:
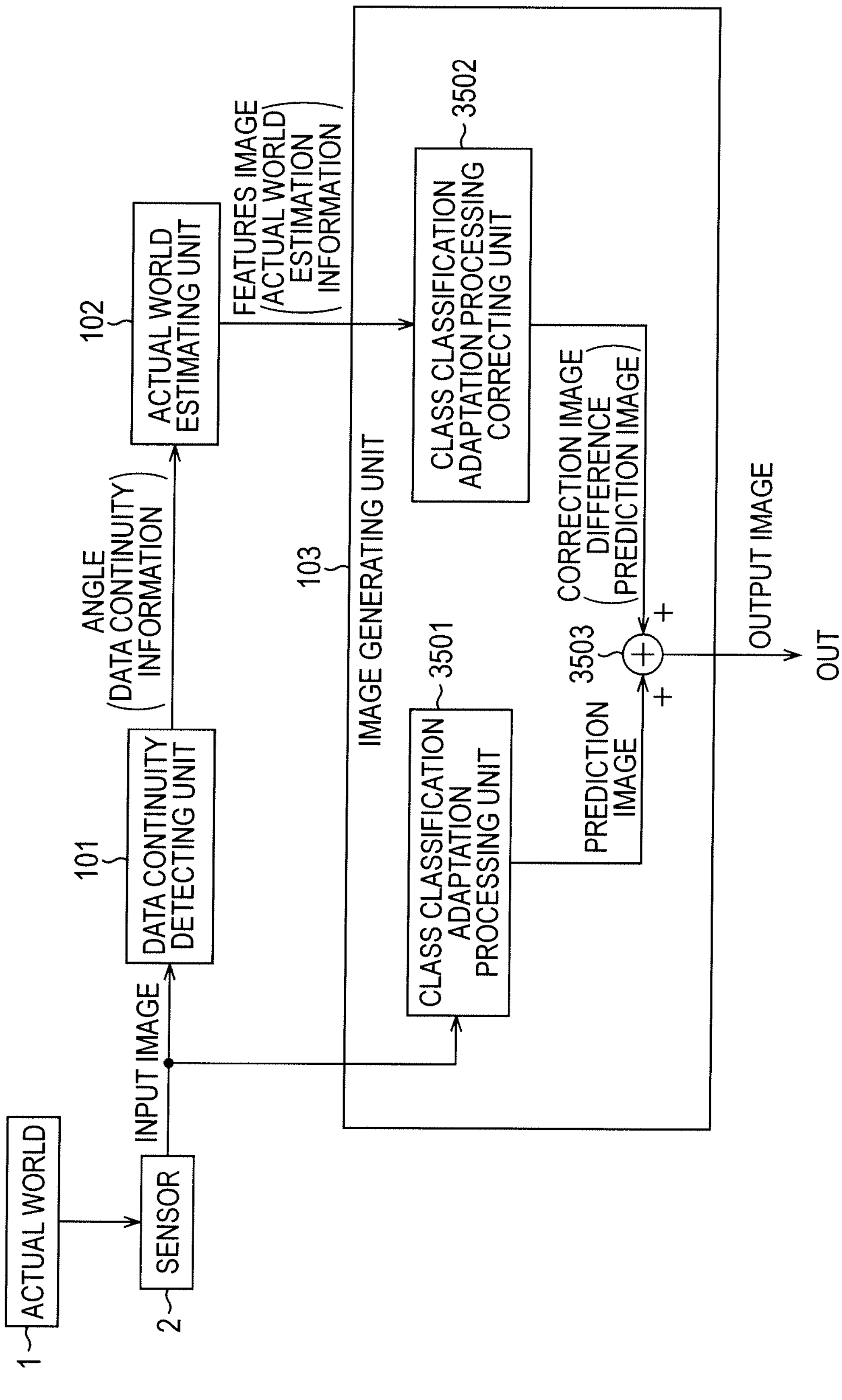

FIG. 289 is a block diagram for describing a configuration example of the image generating unit which uses the one-dimensional re-integration technique in the class classification adaptation process correction technique, which is an example of an embodiment of the image generating unit shown in FIG. 3.

Figure 290:
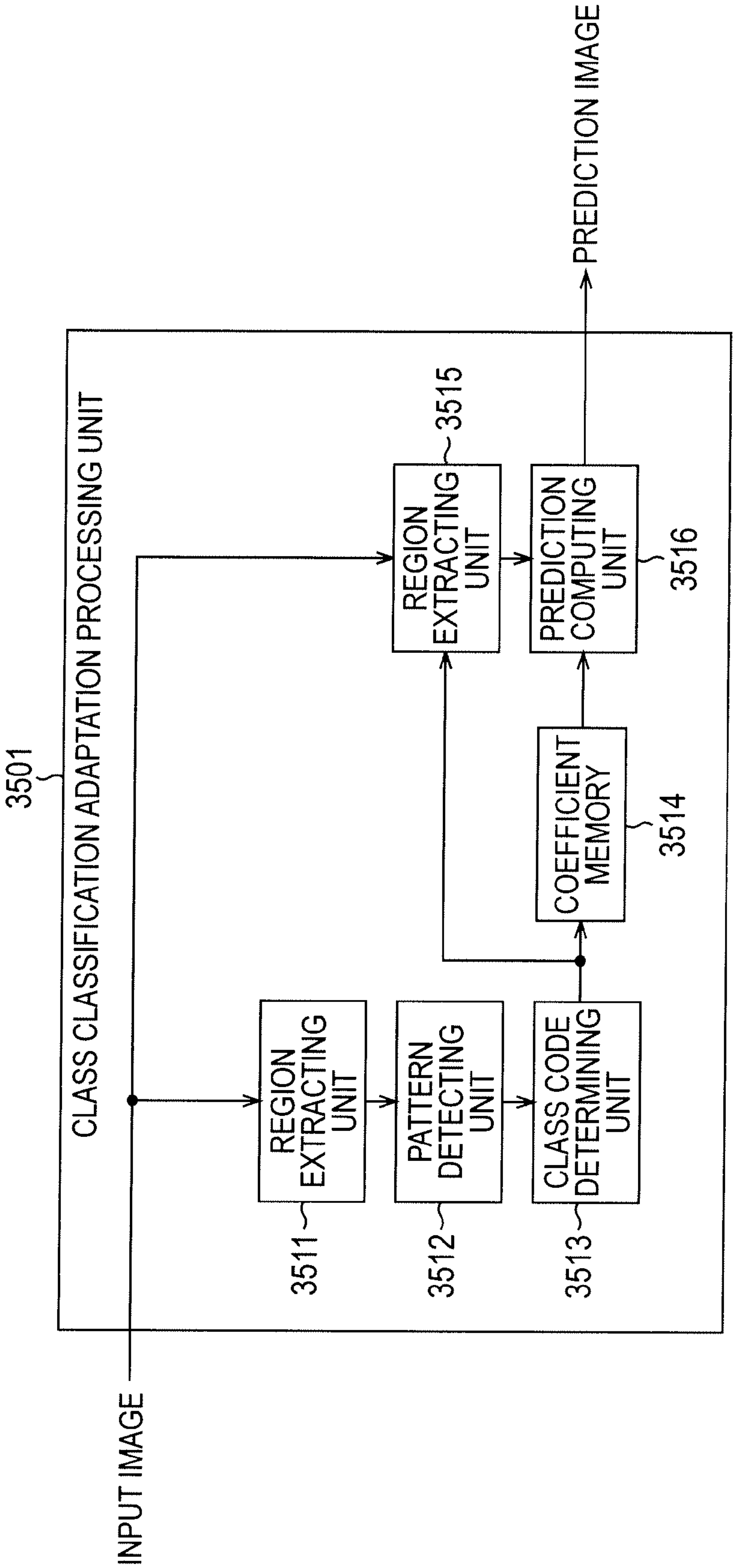

FIG. 290 is a block diagram describing a configuration example of the class classification adaptation processing unit of the image generating unit shown in FIG. 289.

Figure 291:
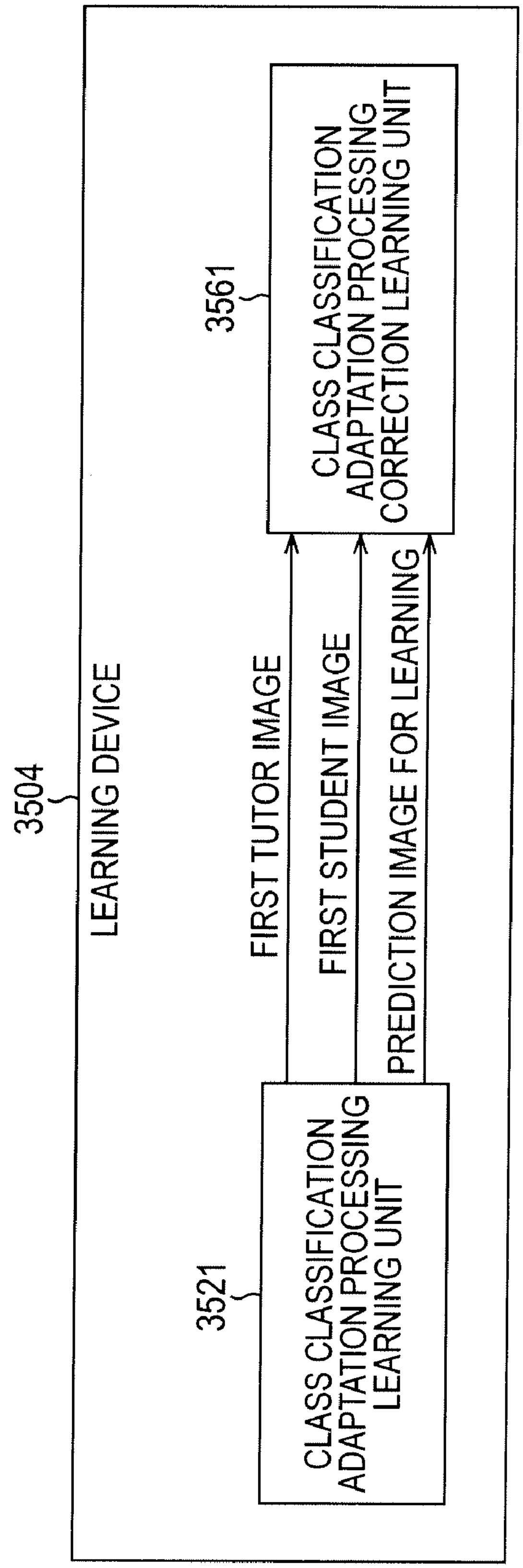

FIG. 291 is a block diagram illustrating a configuration example of the class classification adaptation processing unit shown in FIG. 289, and a learning device for determining a coefficient for the class classification adaptation processing correction unit to use by way of learning.

Figure 292:
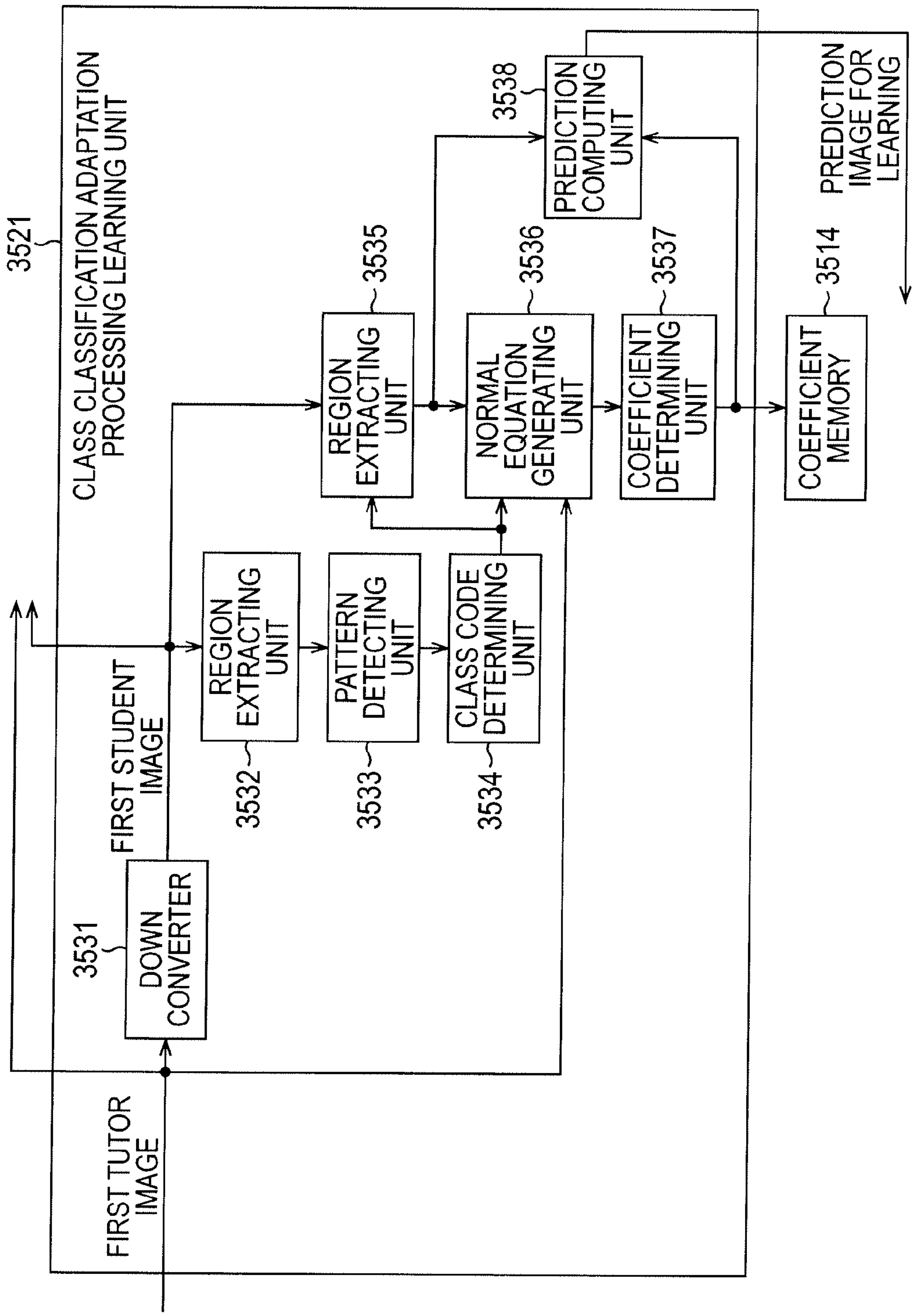

FIG. 292 is a block diagram for describing a detailed configuration example of the learning unit for the class classification adaptation processing, shown in FIG. 291.

Figure 293:
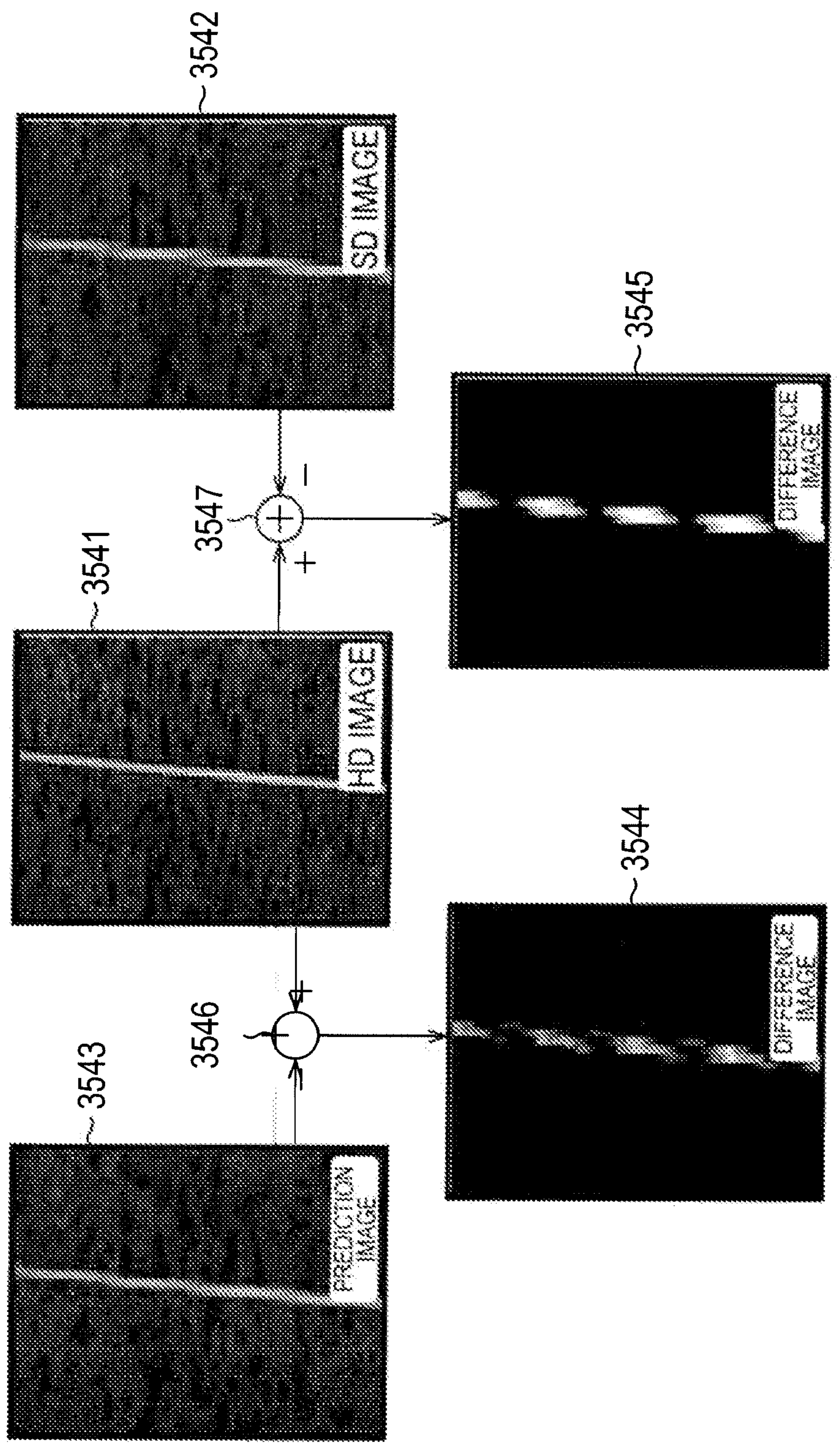

FIG. 293 is a diagram illustrating an example of processing results of the class classification adaptation processing unit shown in FIG. 290.

Figure 294:
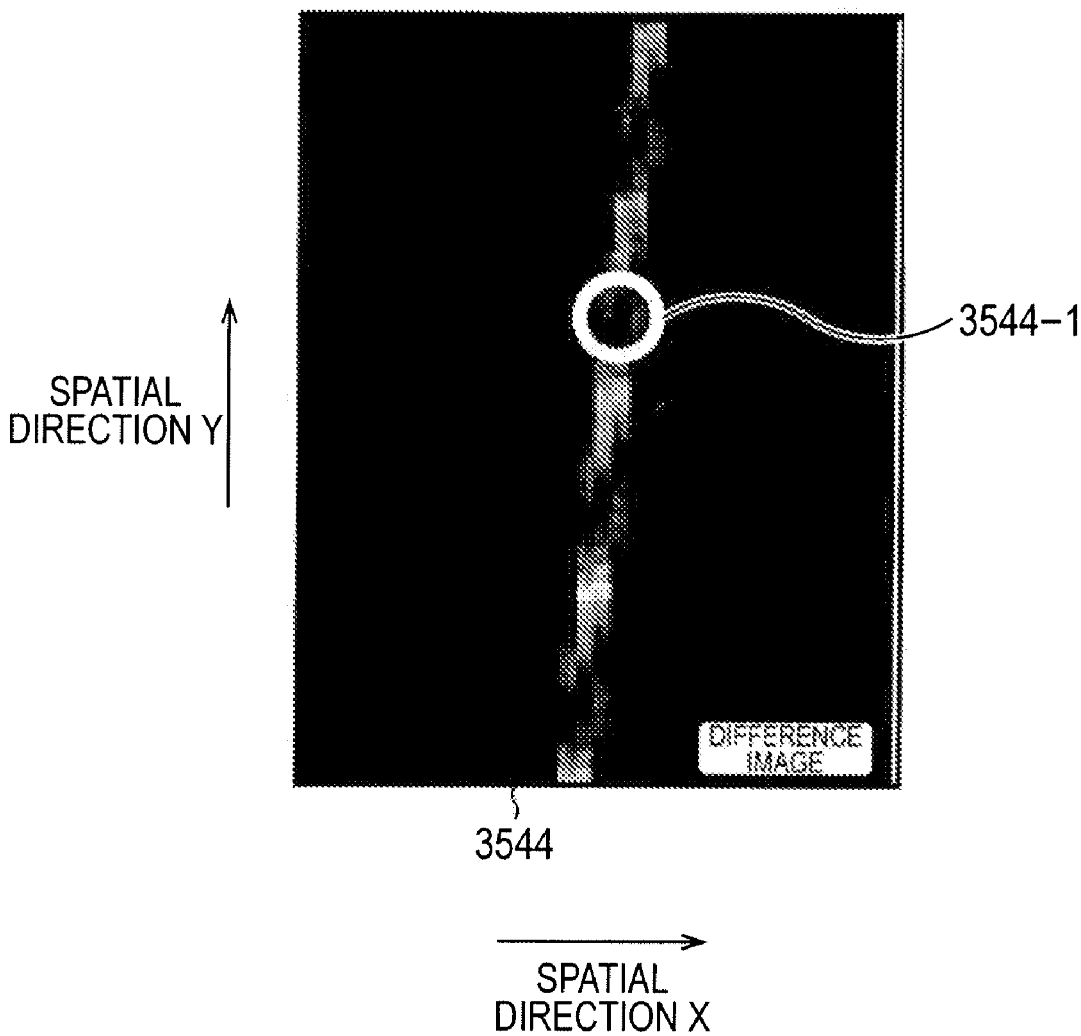

FIG. 294 is a diagram illustrating a difference image between the prediction image shown in FIG. 293 and an HD image.

Figure 295:
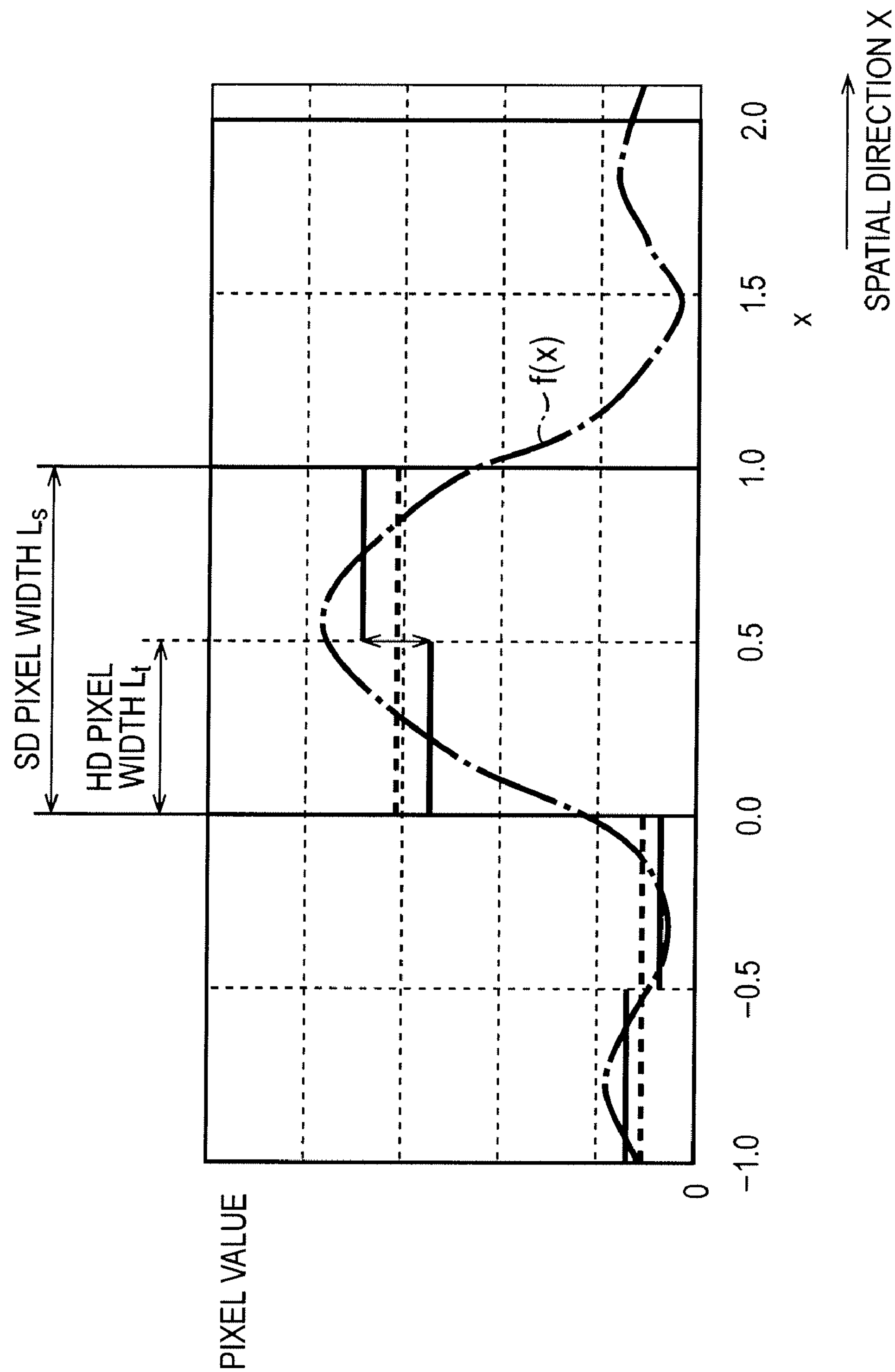

FIG. 295 is a diagram plotting each of specific pixel values of the HD image in FIG. 293, specific pixel values of the SD image, and actual waveform (actual world signals), corresponding to the four HD pixels from the left of the six continuous HD pixels in the X direction contained in the region shown in FIG. 294.

Figure 296:
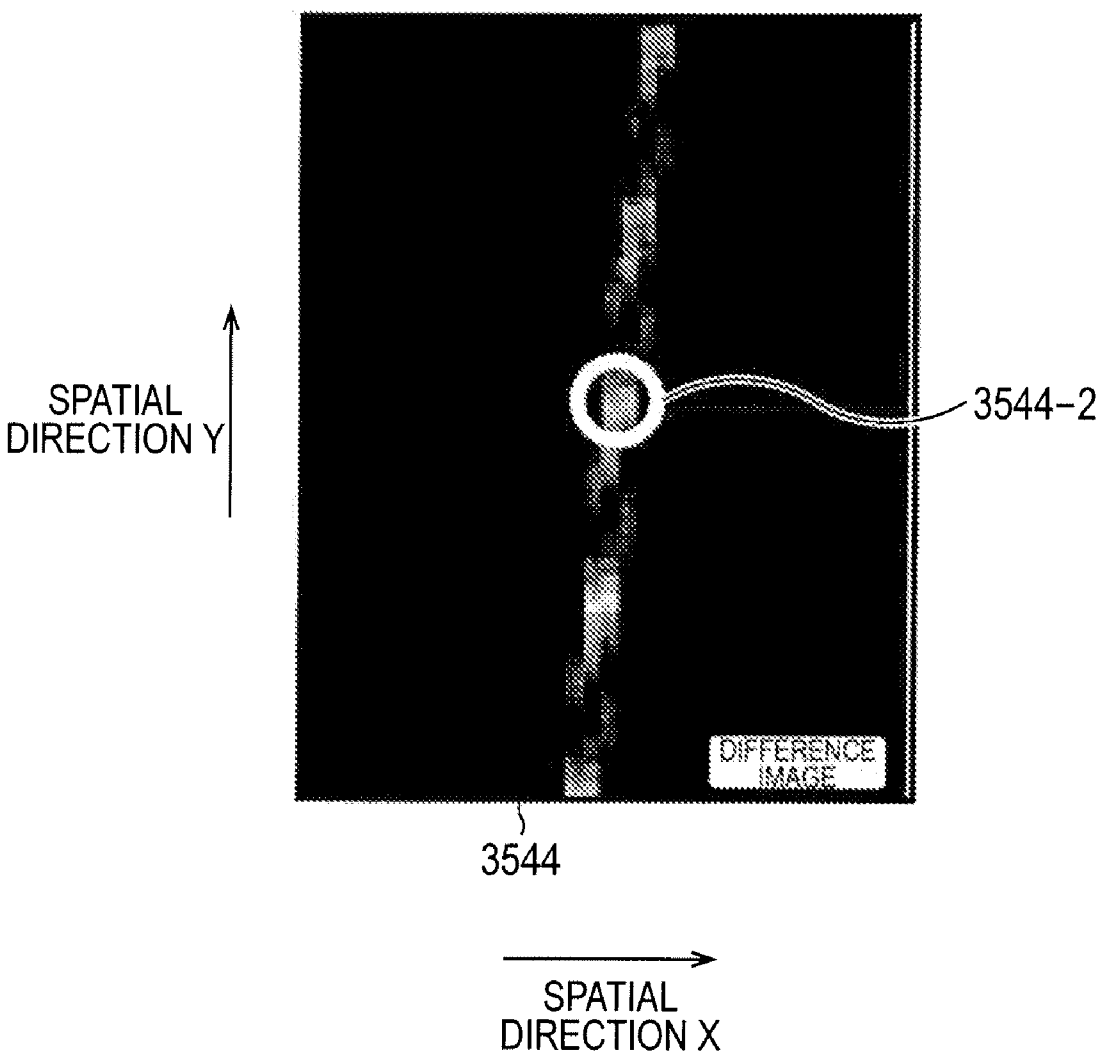

FIG. 296 is a diagram illustrating a difference image of the prediction image in FIG. 293 and an HD image.

Figure 297:
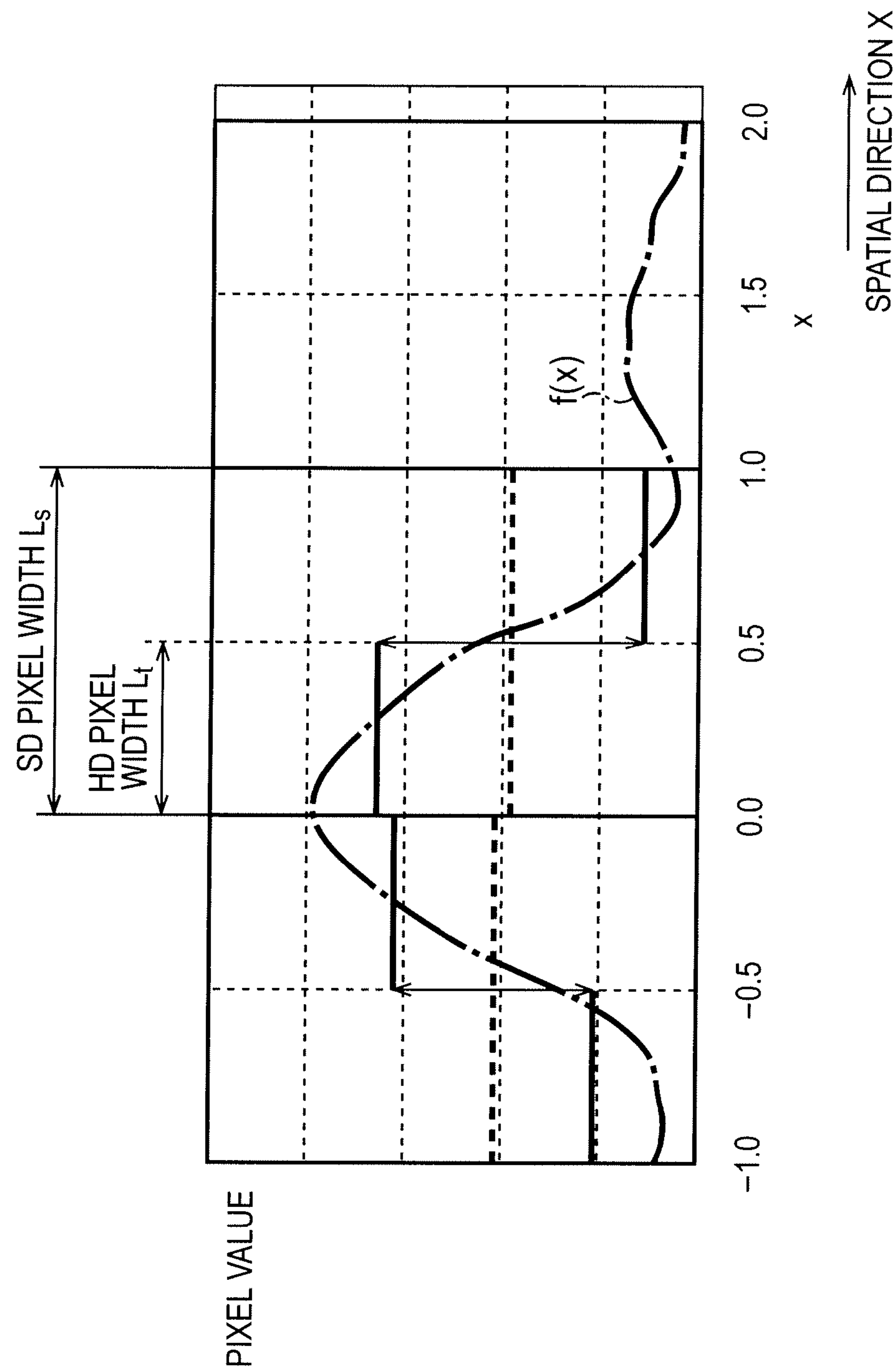

FIG. 297 is a diagram plotting each of specific pixel values of the HD image in FIG. 293, specific pixel values of the SD image, and actual waveform (actual world signals), corresponding to the four HD pixels from the left of the six continuous HD pixels in the X direction contained in the region shown in FIG. 296.

Figure 298:
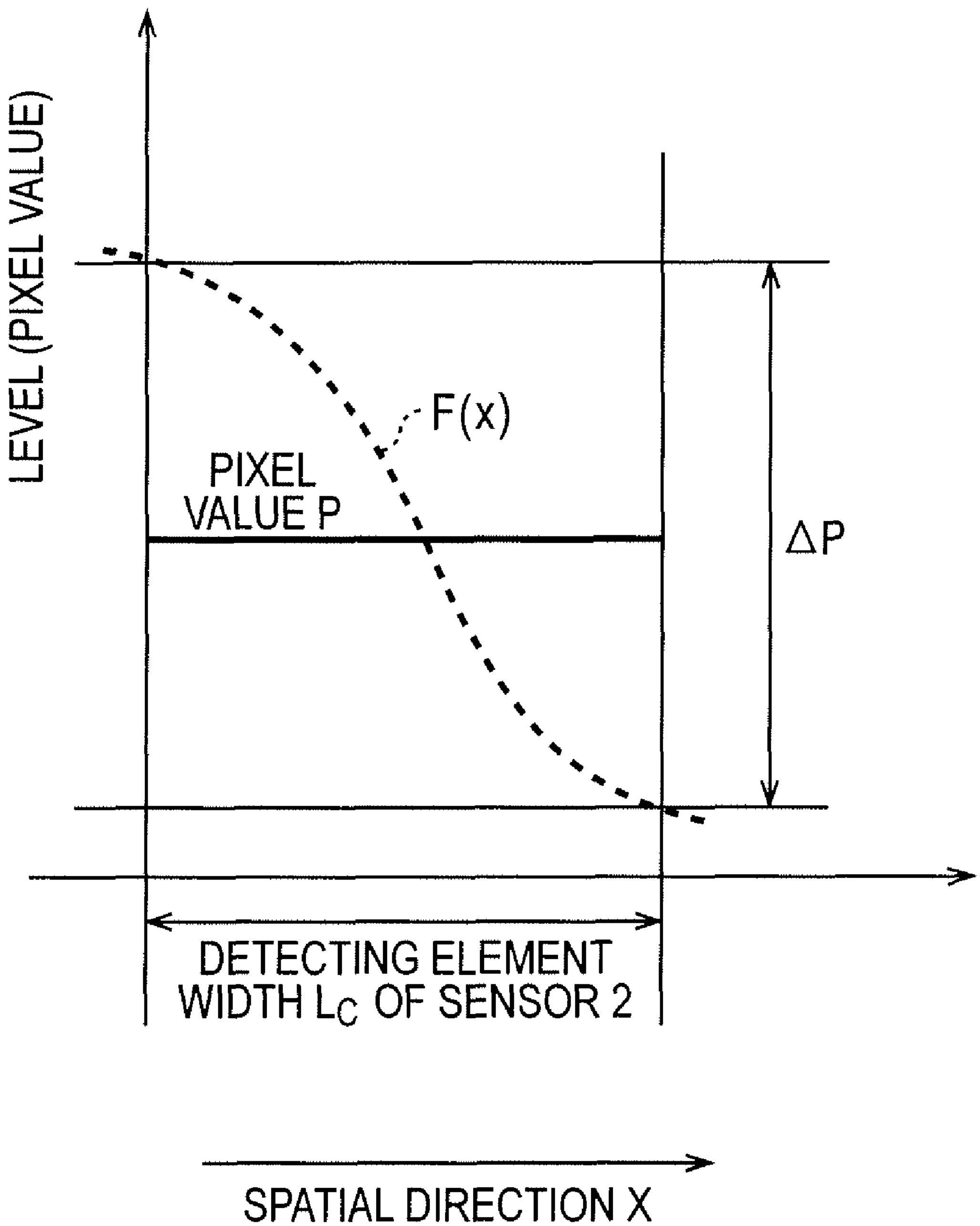

FIG. 298 is a diagram for describing understanding obtained based on the contents shown in FIG. 295 through FIG. 297.

Figure 299:
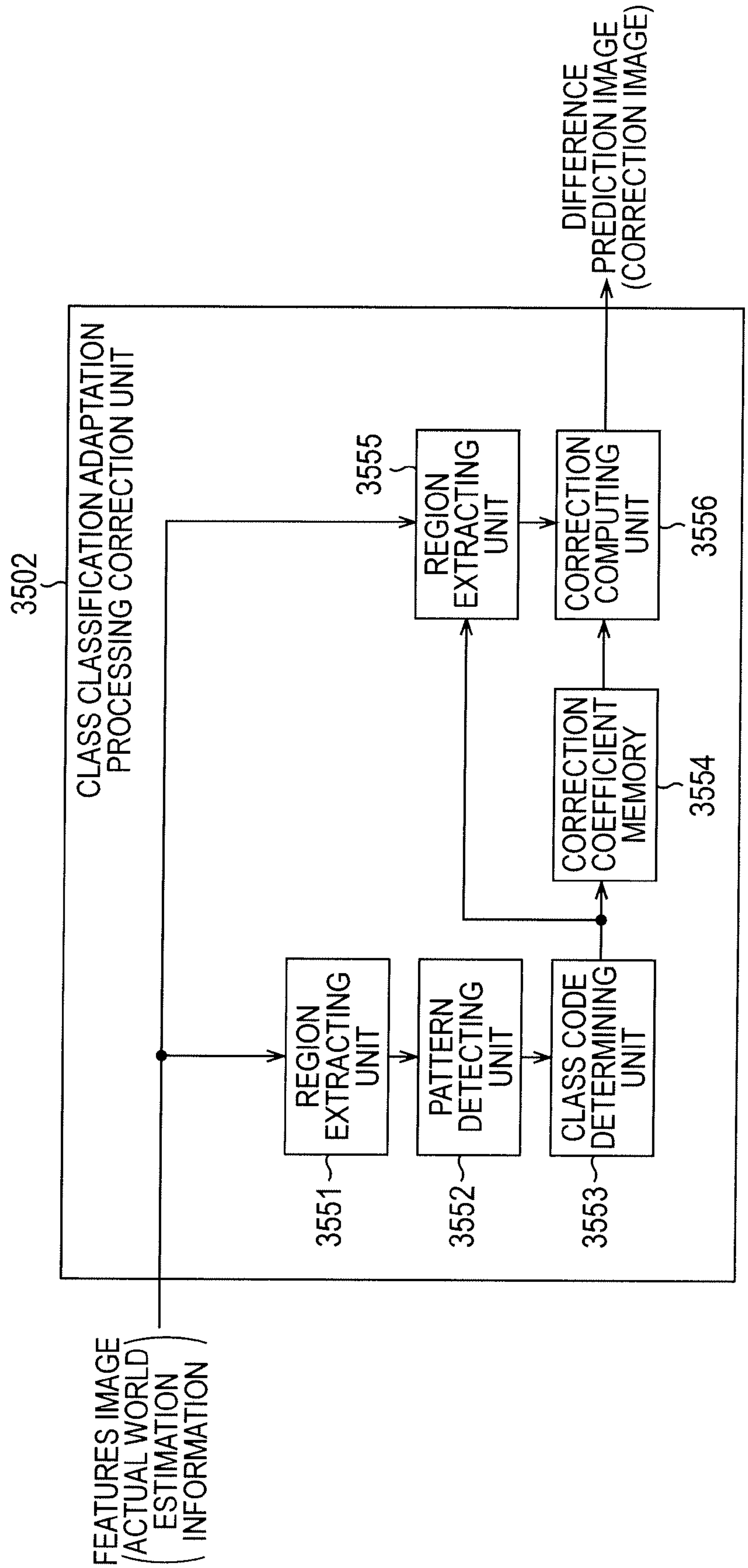

FIG. 299 is a block diagram for describing a configuration example of the class classification adaptation processing correction unit of the image generating unit shown in FIG. 289.

Figure 300:
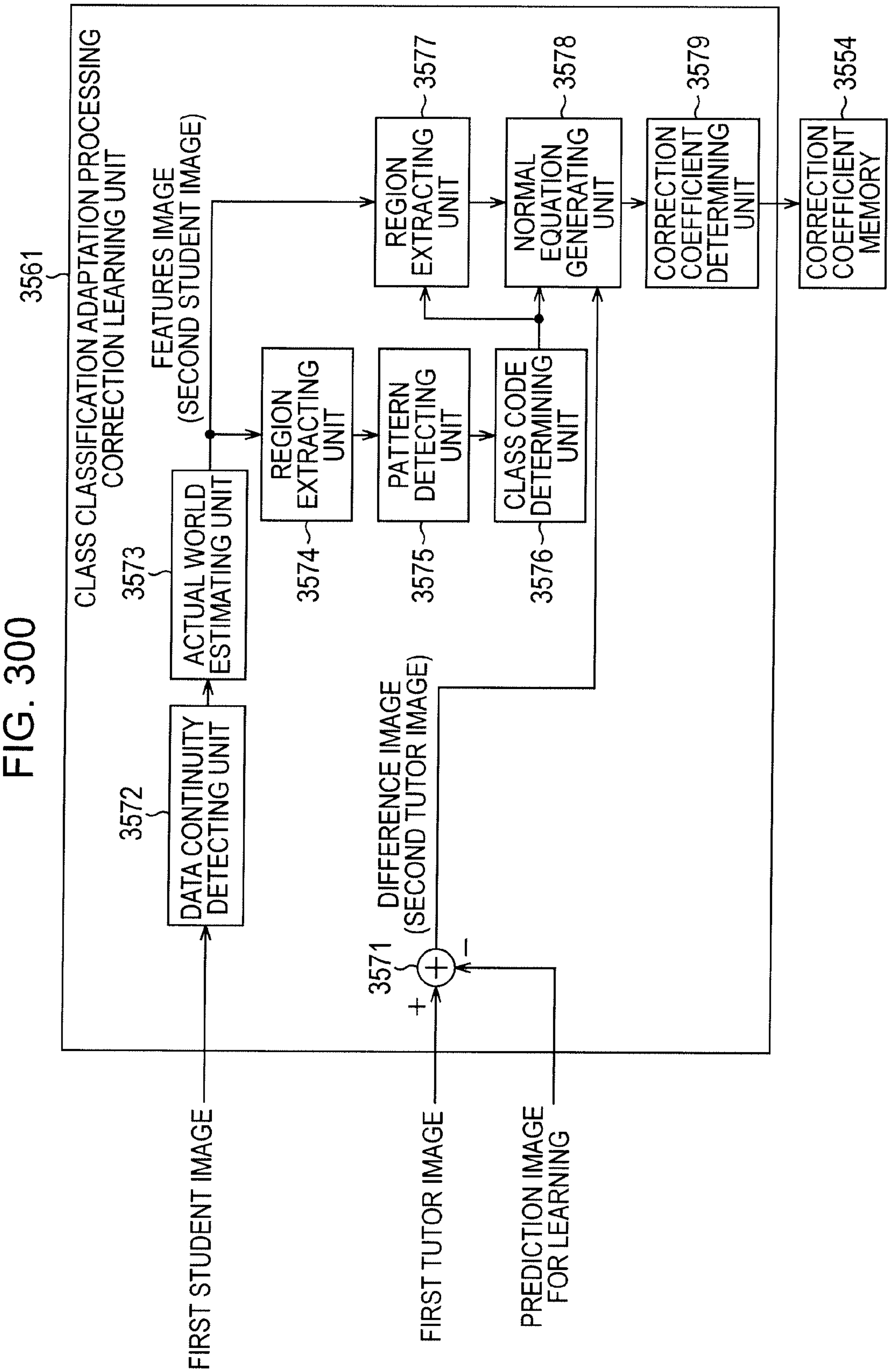

FIG. 300 is a block diagram for describing a detailed configuration example of the learning unit for the class classification adaptation processing correction shown in FIG. 291.

Figure 301:
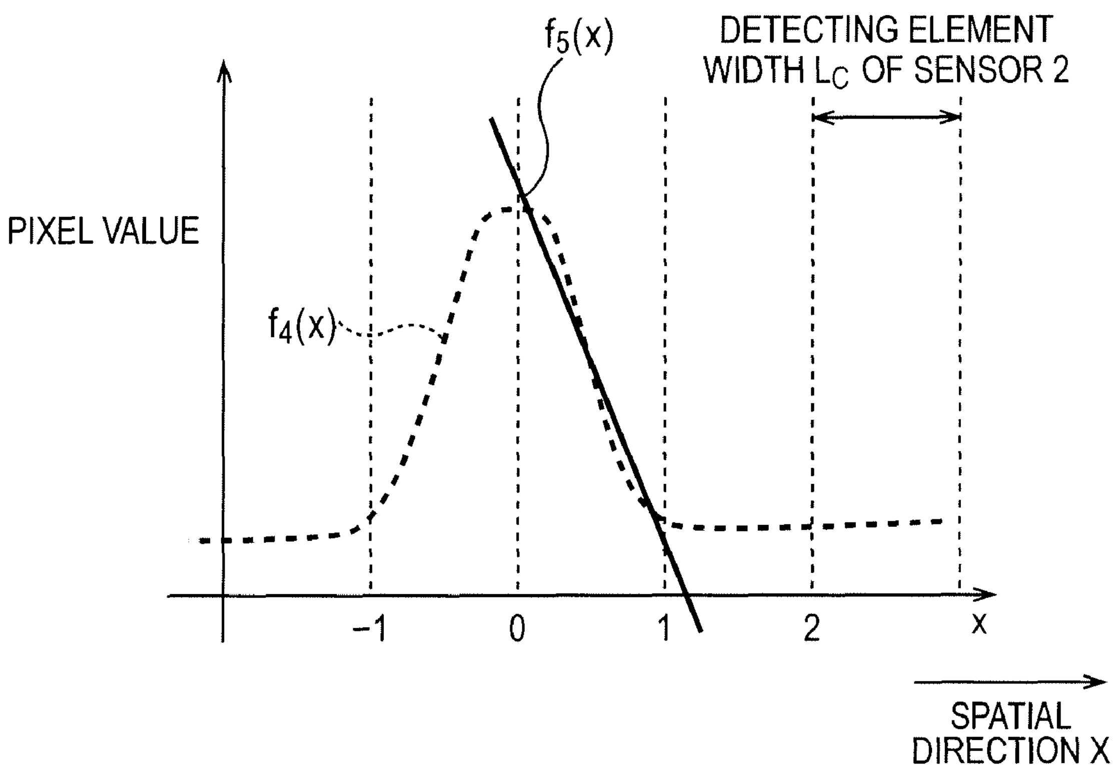

FIG. 301 is a diagram for describing in-pixel gradient.

Figure 302:
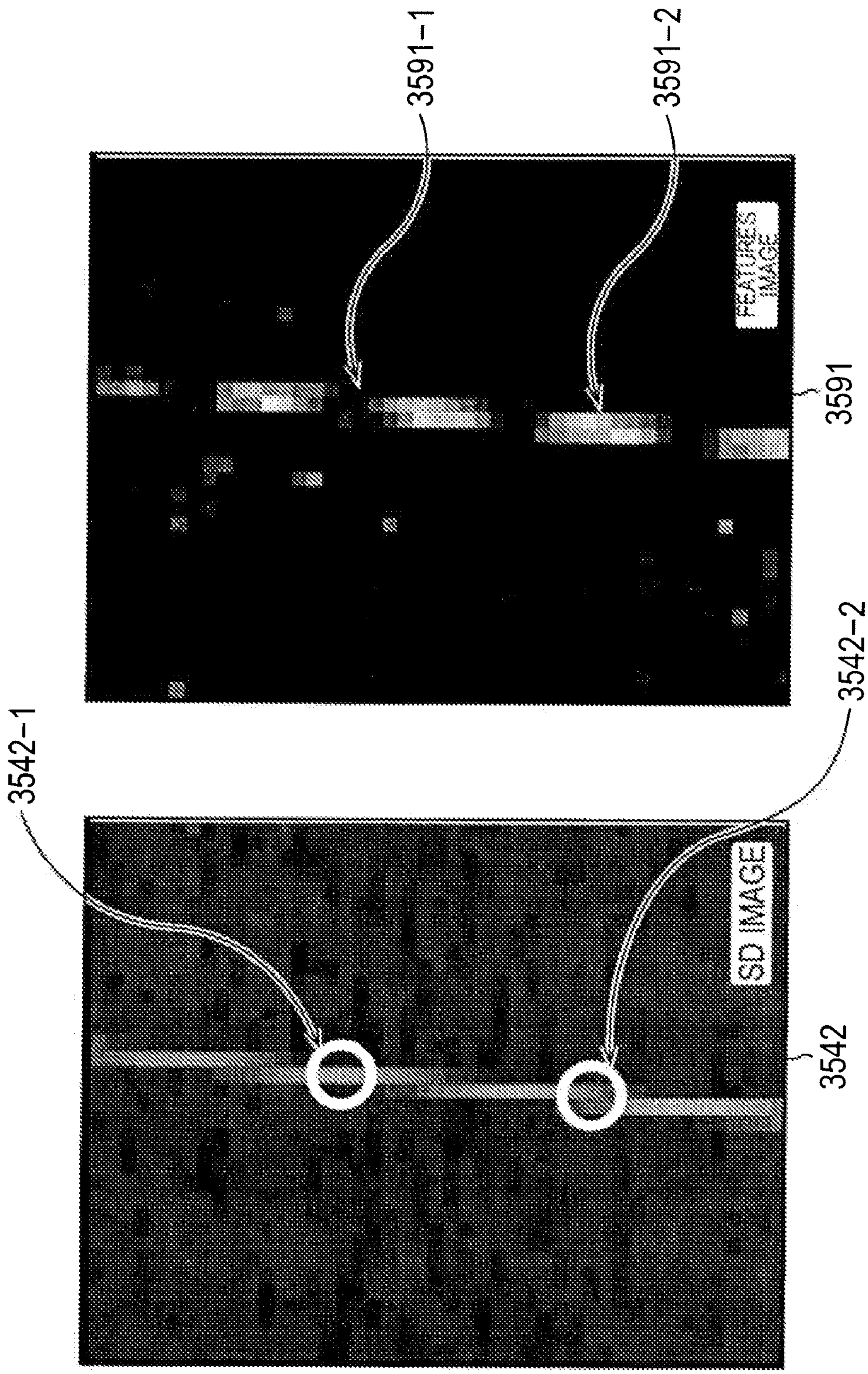

FIG. 302 is a diagram illustrating the SD image shown in FIG. 293, and a features image having as the pixel value thereof the in-pixel gradient of each of the pixels of the SD image.

Figure 303:
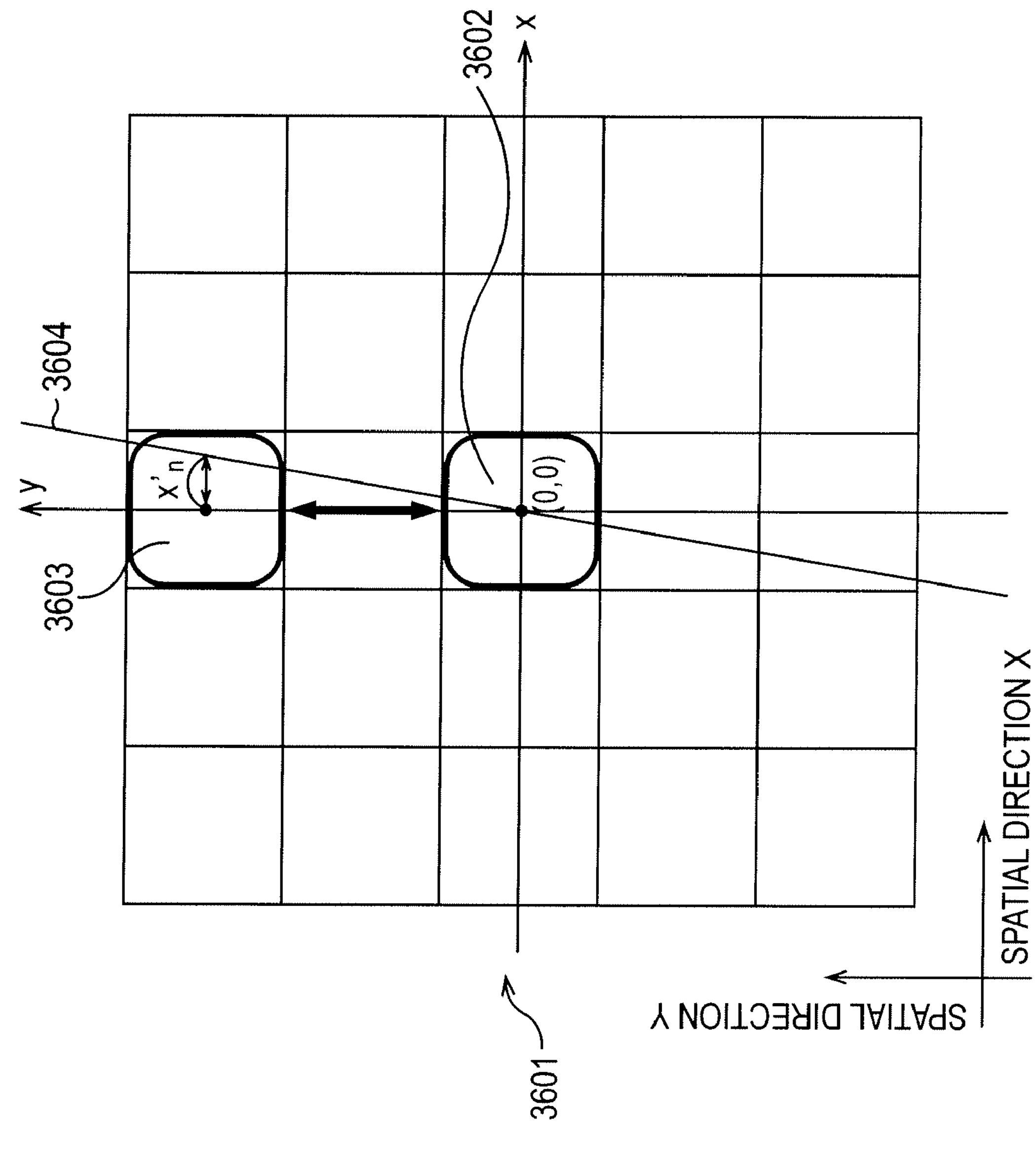

FIG. 303 is a diagram for describing an in-pixel gradient calculation method.

Figure 304:
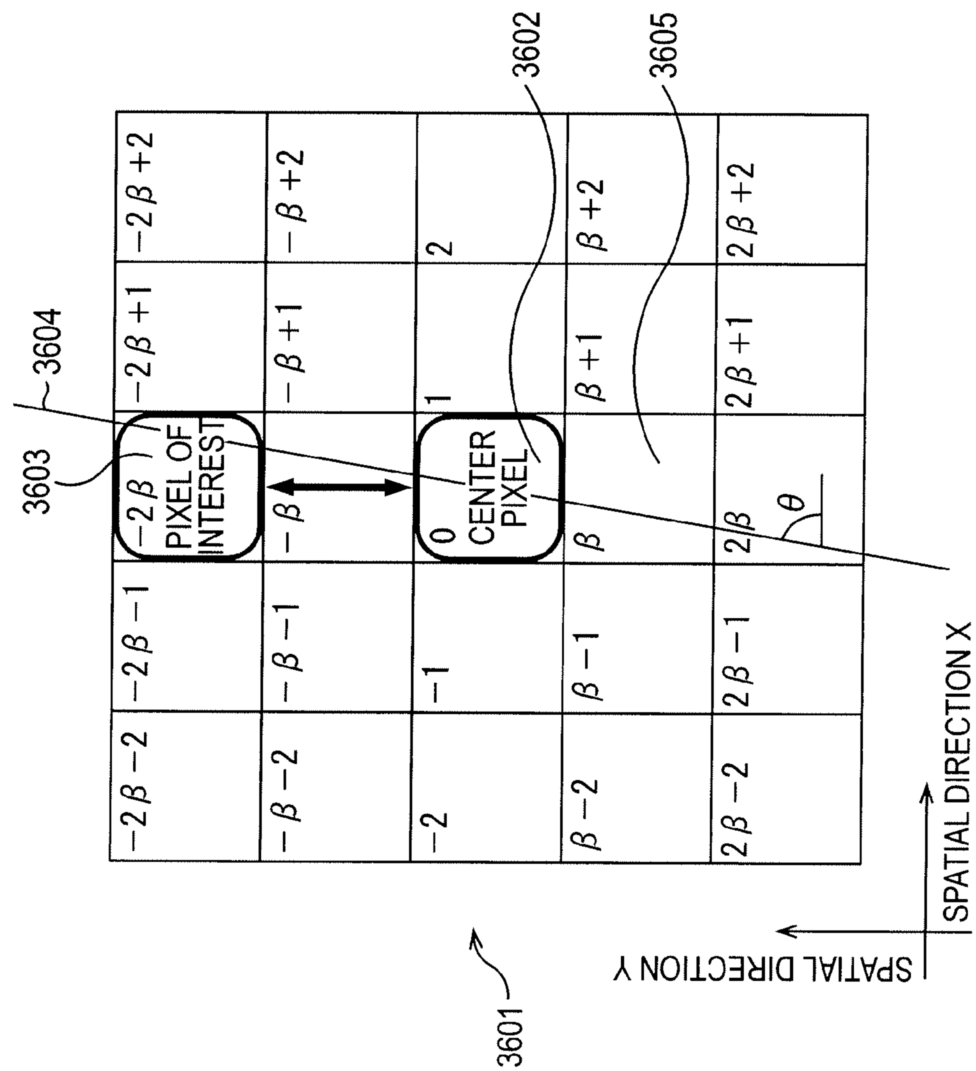

FIG. 304 is a diagram for describing an in-pixel gradient calculation method.

Figure 305:
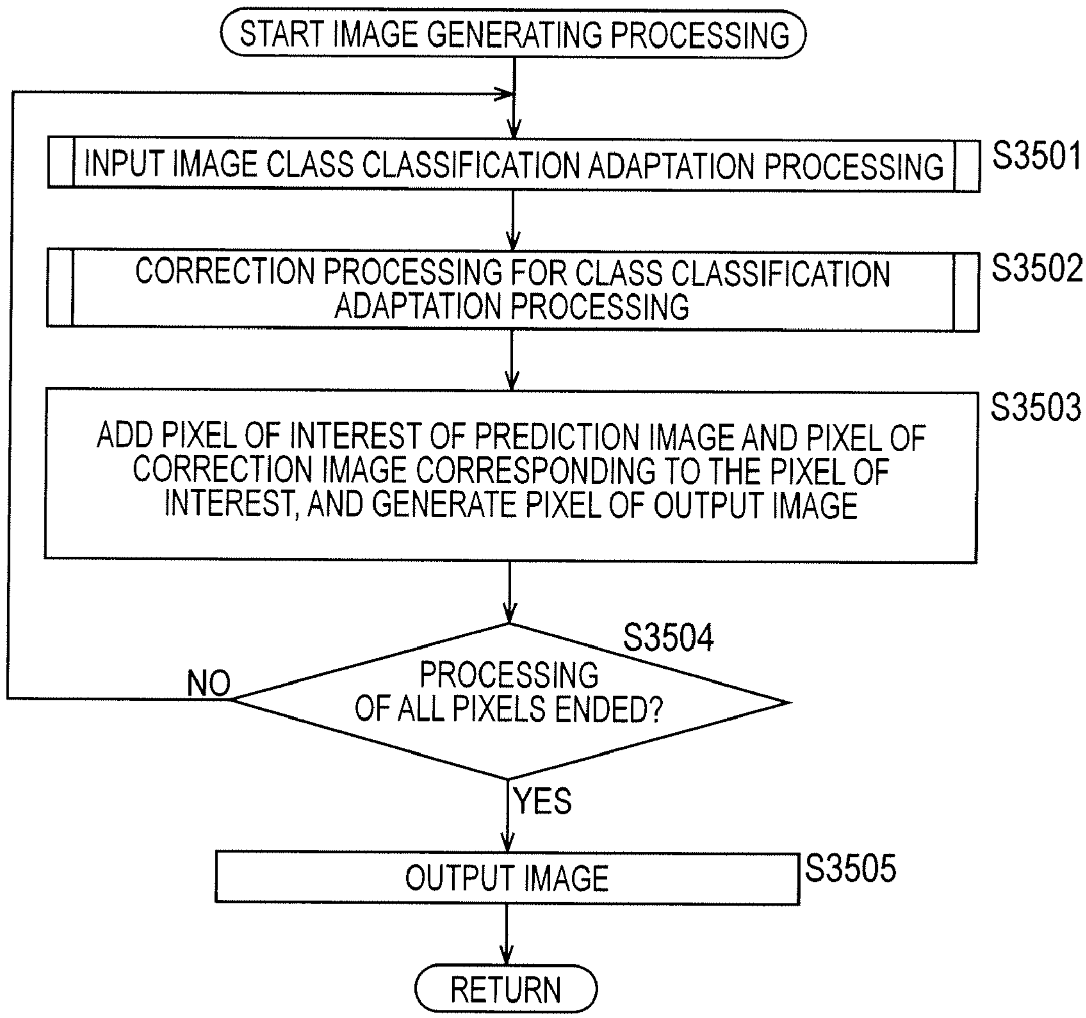

FIG. 305 is a flowchart for describing the image generating processing which the image generating unit of the configuration shown in FIG. 289 executes.

Figure 306:
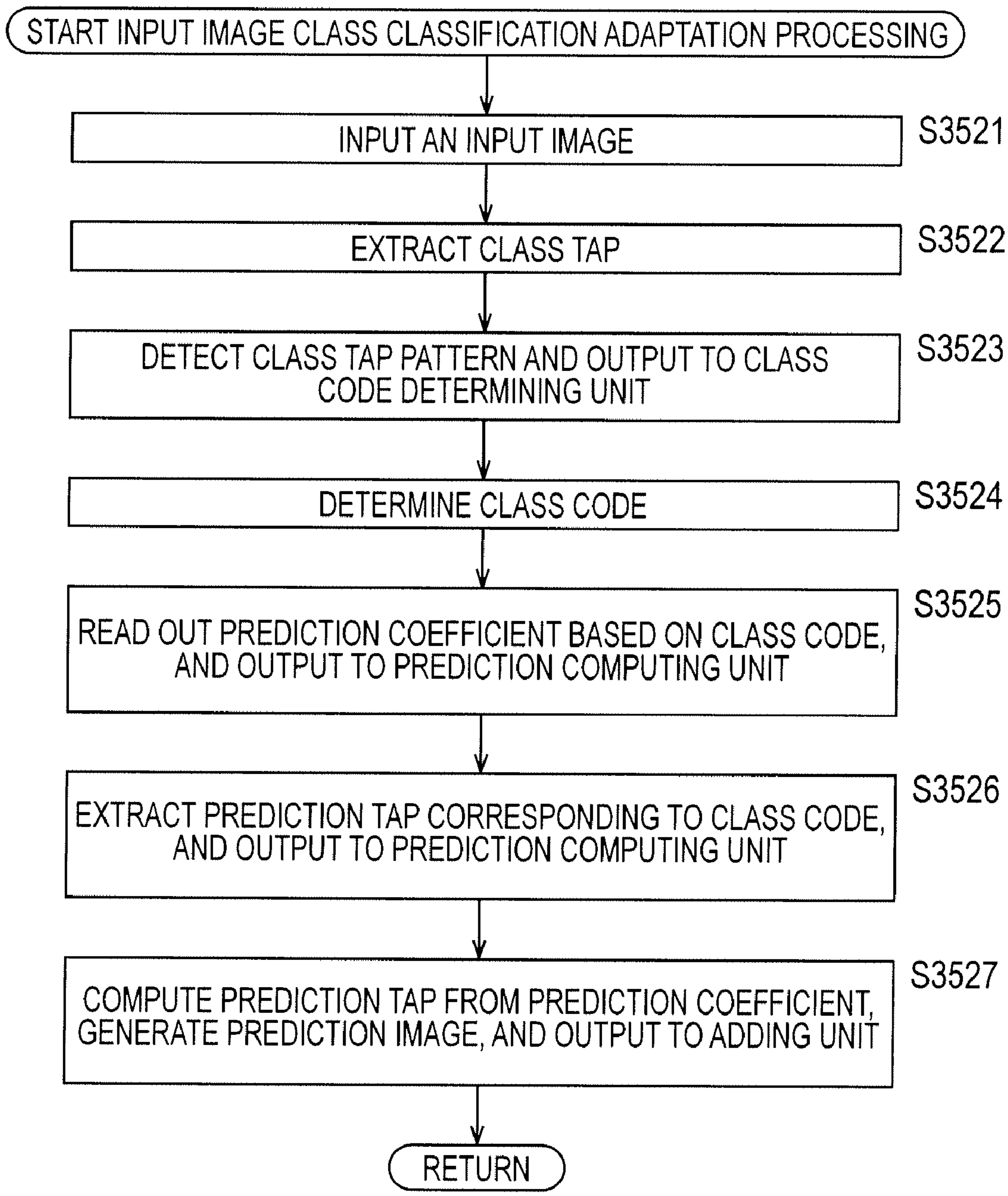

FIG. 306 is a flowchart describing detailed input image class classification adaptation processing in the image generating processing in FIG. 305.

Figure 307:
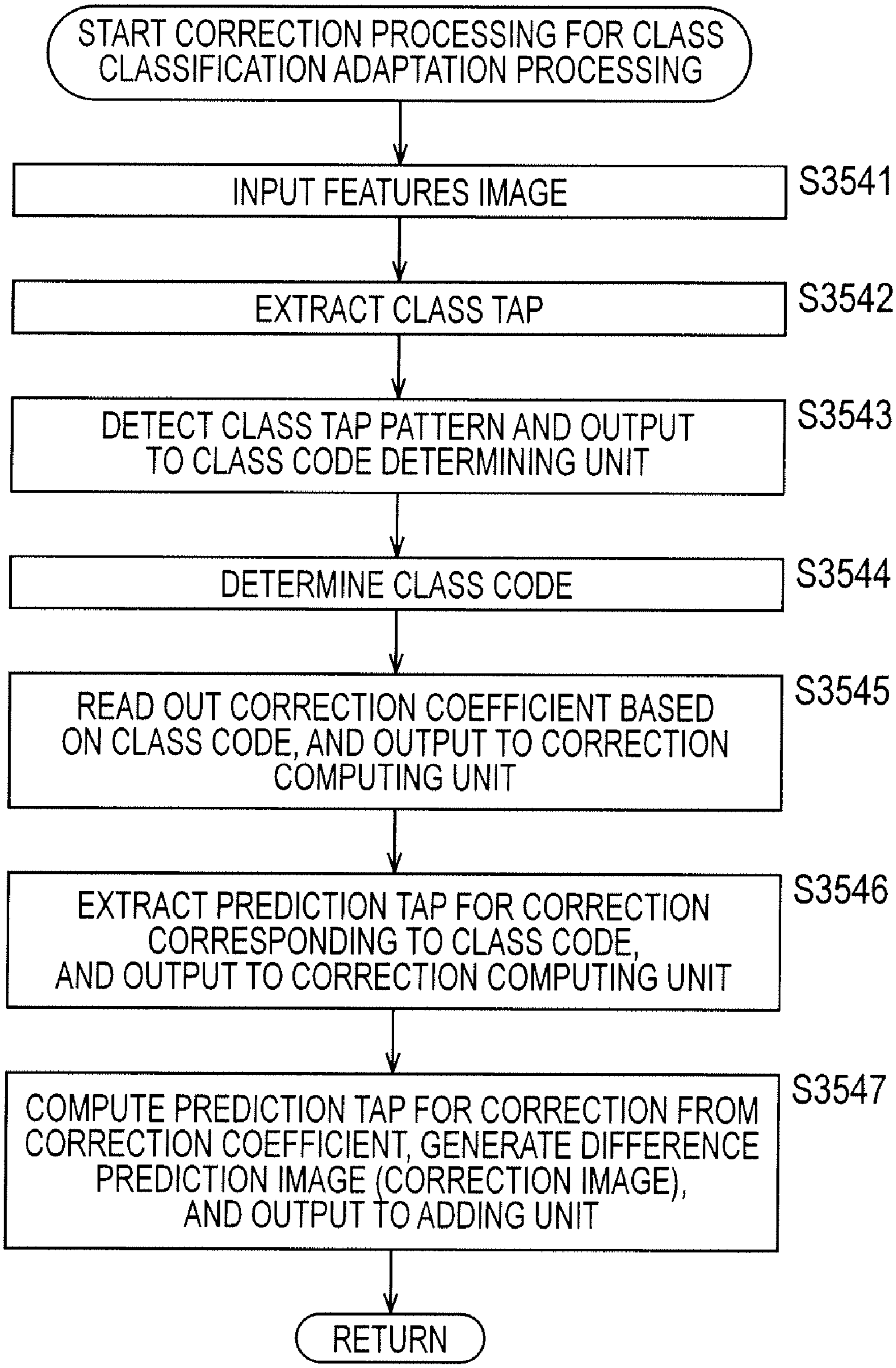

FIG. 307 is a flowchart for describing detailed correction processing of the class classification adaptation processing in the image generating processing in FIG. 305.

Figure 308:
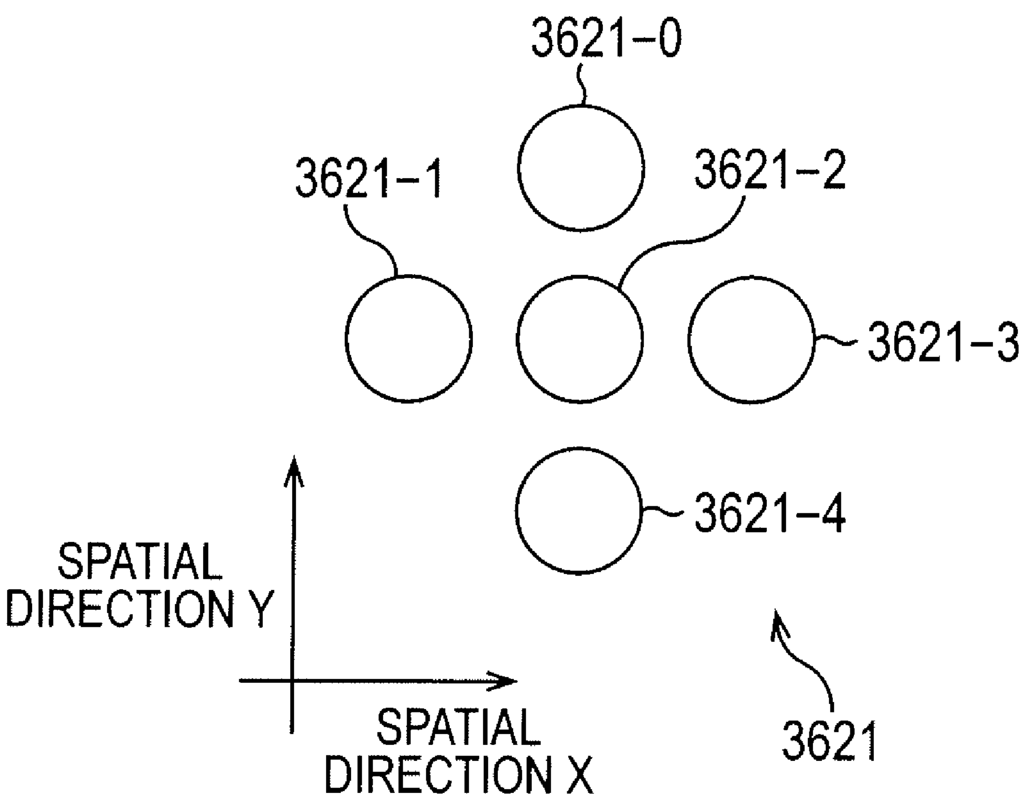

FIG. 308 is a diagram for describing an example of a class tap array.

Figure 309:
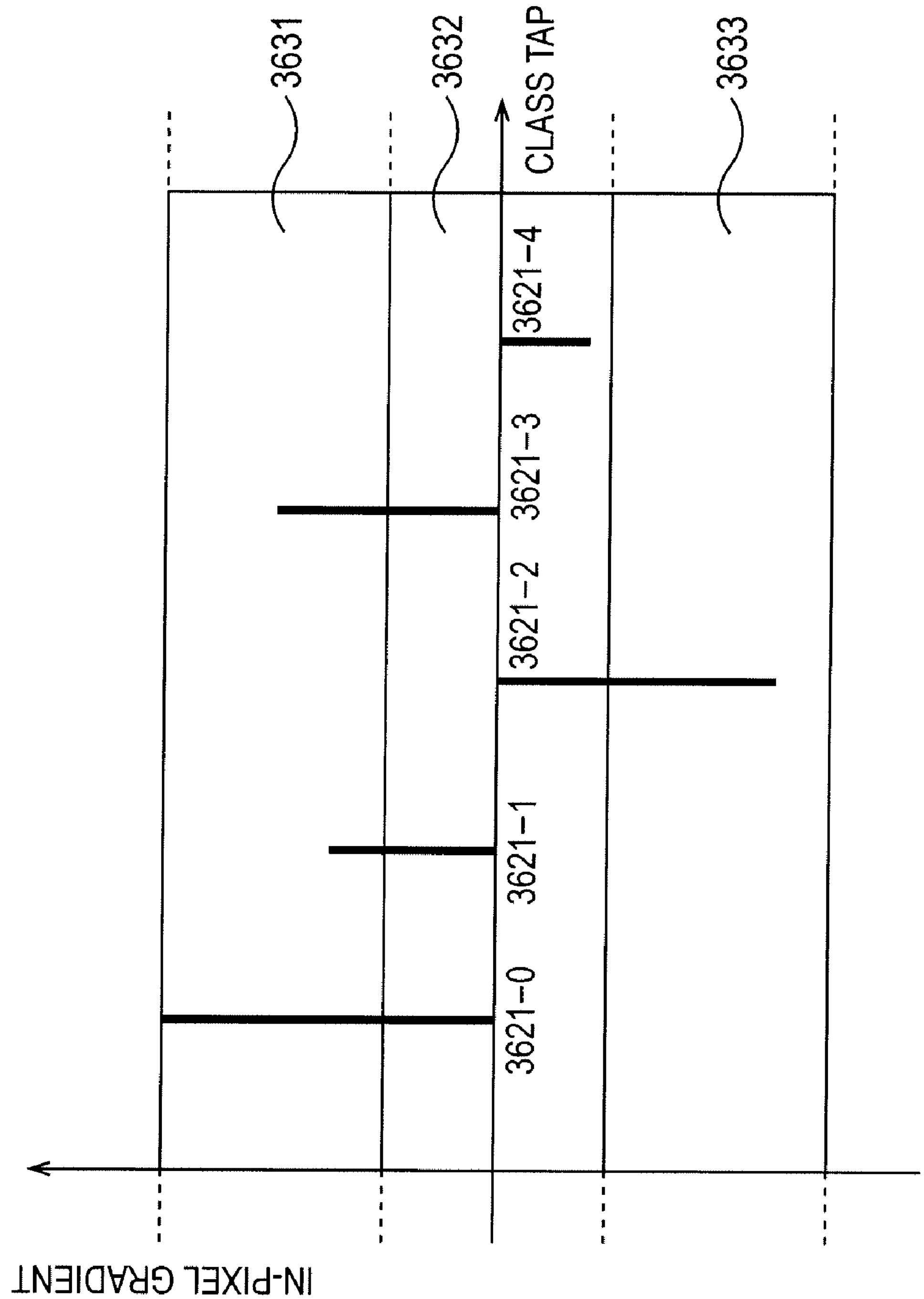

FIG. 309 is a diagram for describing an example of class classification.

Figure 310:
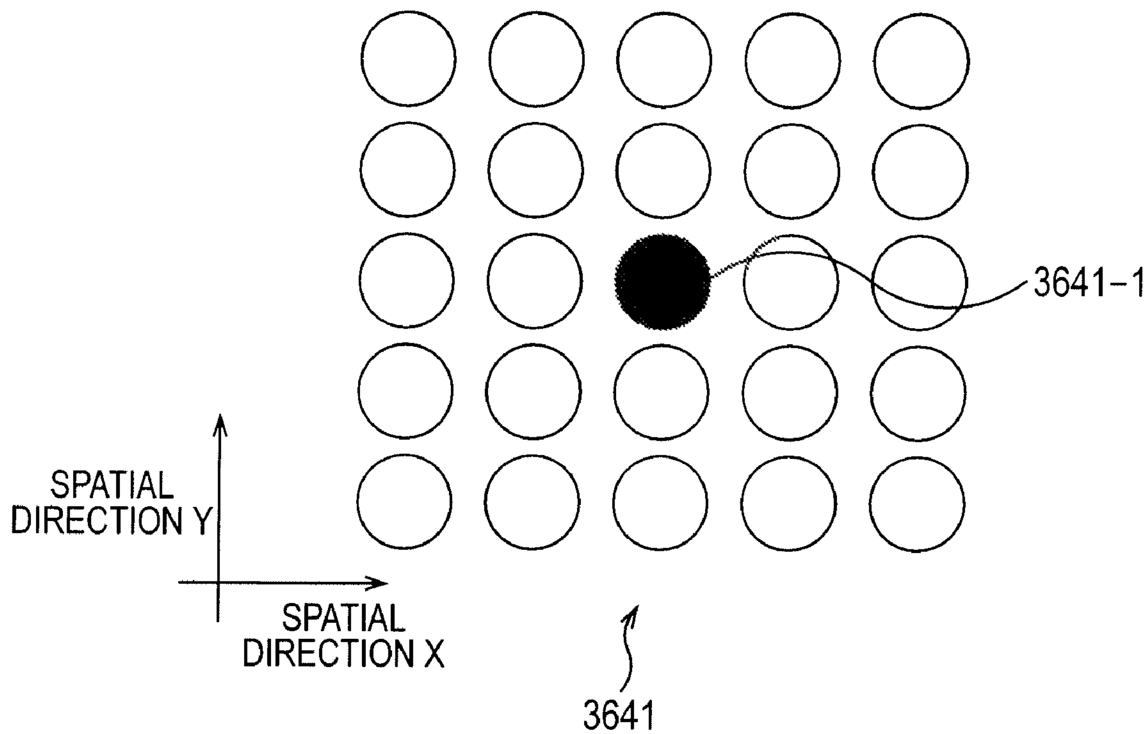

FIG. 310 is a diagram for describing an example of a prediction tap array.

Figure 311:
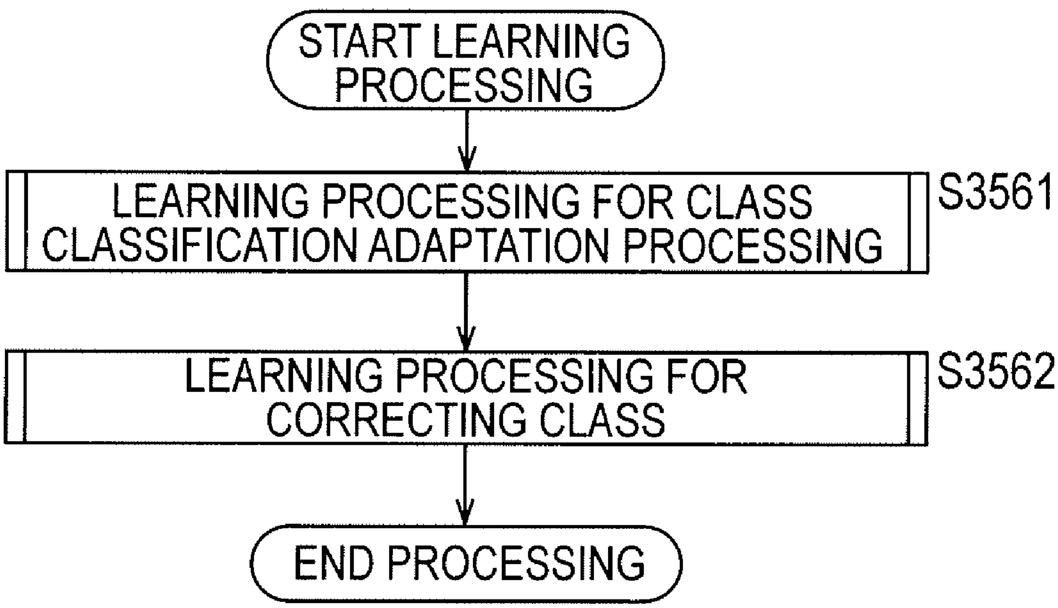

FIG. 311 is a flowchart for describing learning processing of the learning device shown in FIG. 291.

Figure 312:
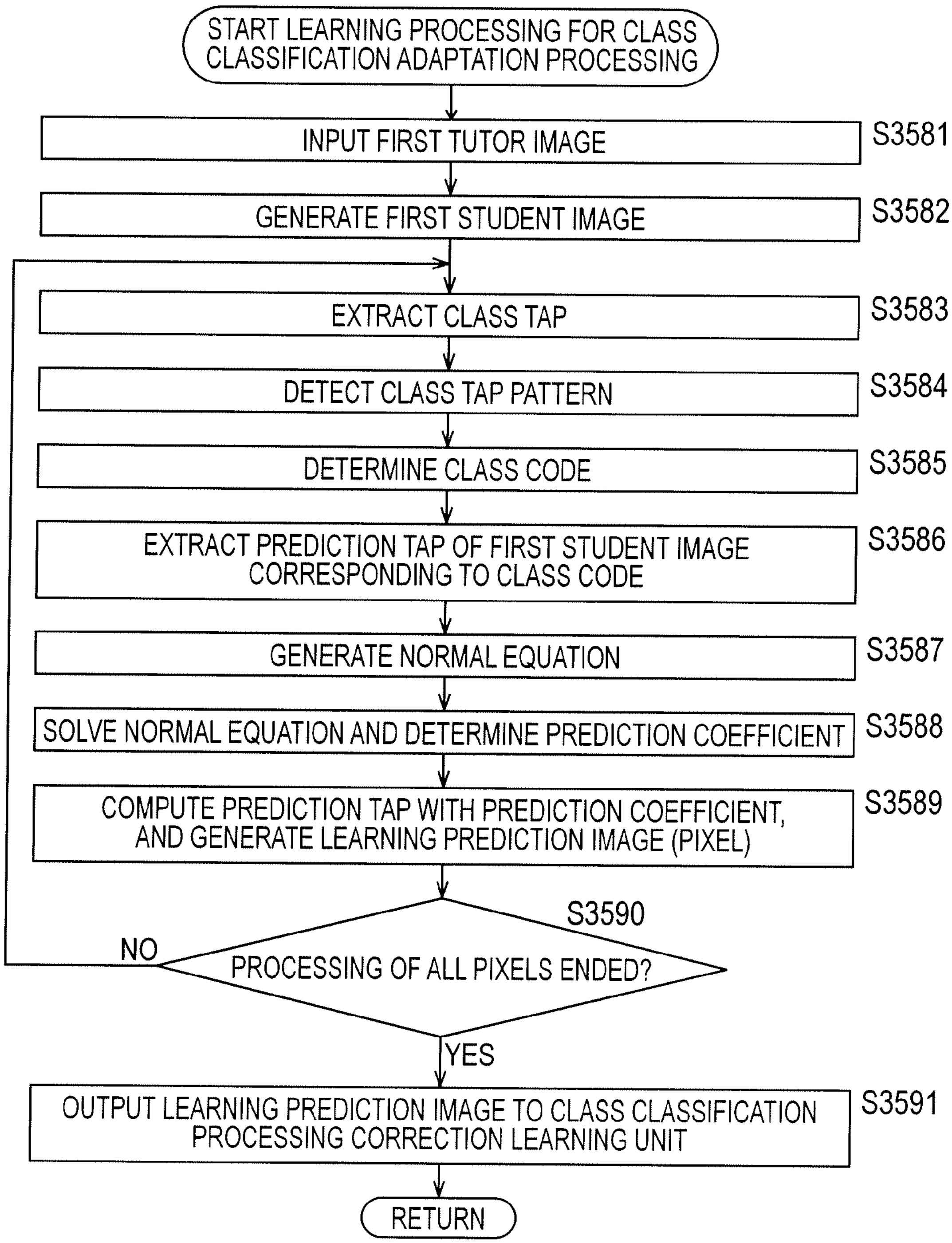

FIG. 312 is a flowchart for describing detailed learning processing for the class classification adaptation processing in the learning processing shown in FIG. 311.

Figure 313:
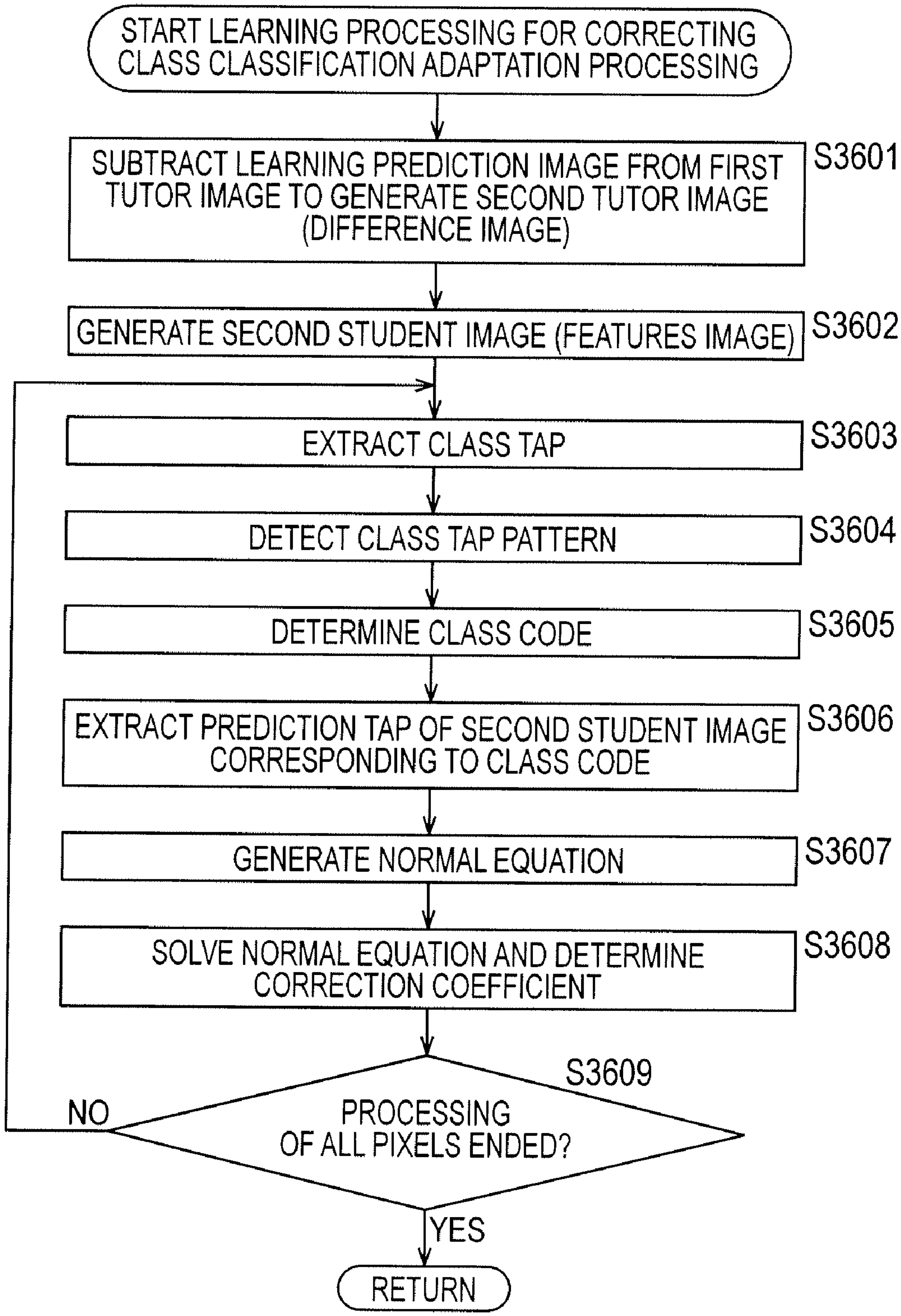

FIG. 313 is a flowchart for describing detailed learning processing for the class classification adaptation processing correction in the learning processing shown in FIG. 311.

Figure 314:
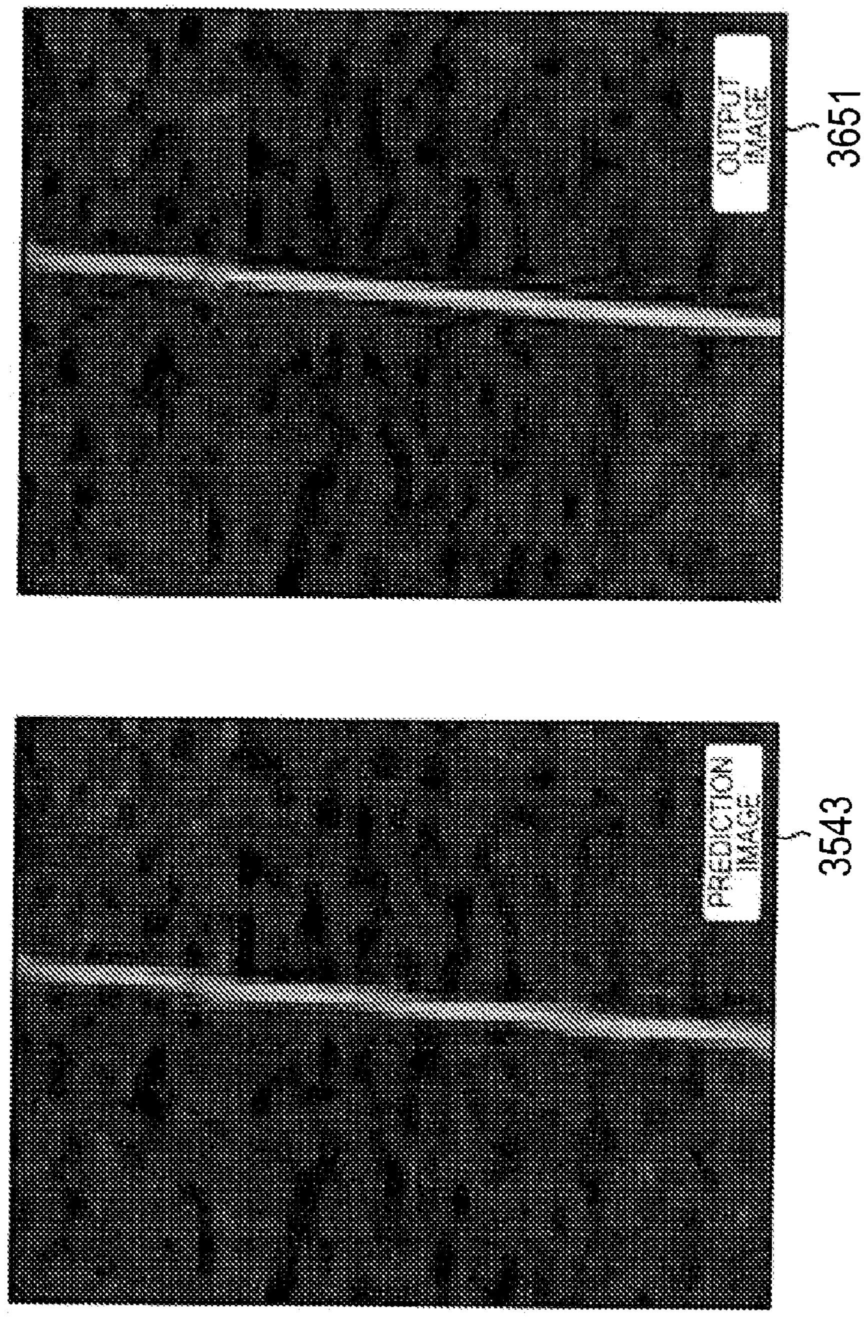

FIG. 314 is a diagram illustrating the prediction image shown in FIG. 293, and an image wherein a correction image is added to the prediction image (the image generated by the image generating unit shown in FIG. 289).

Figure 1:
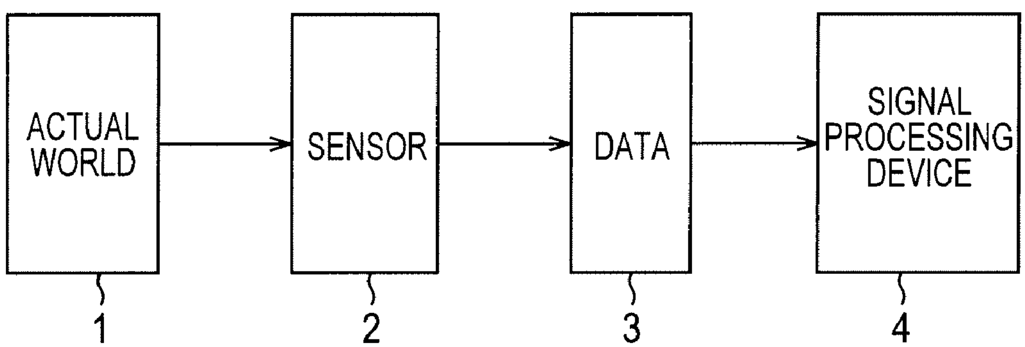
FIG. 1 is a diagram illustrating the principle of the present invention.
Figure 315:
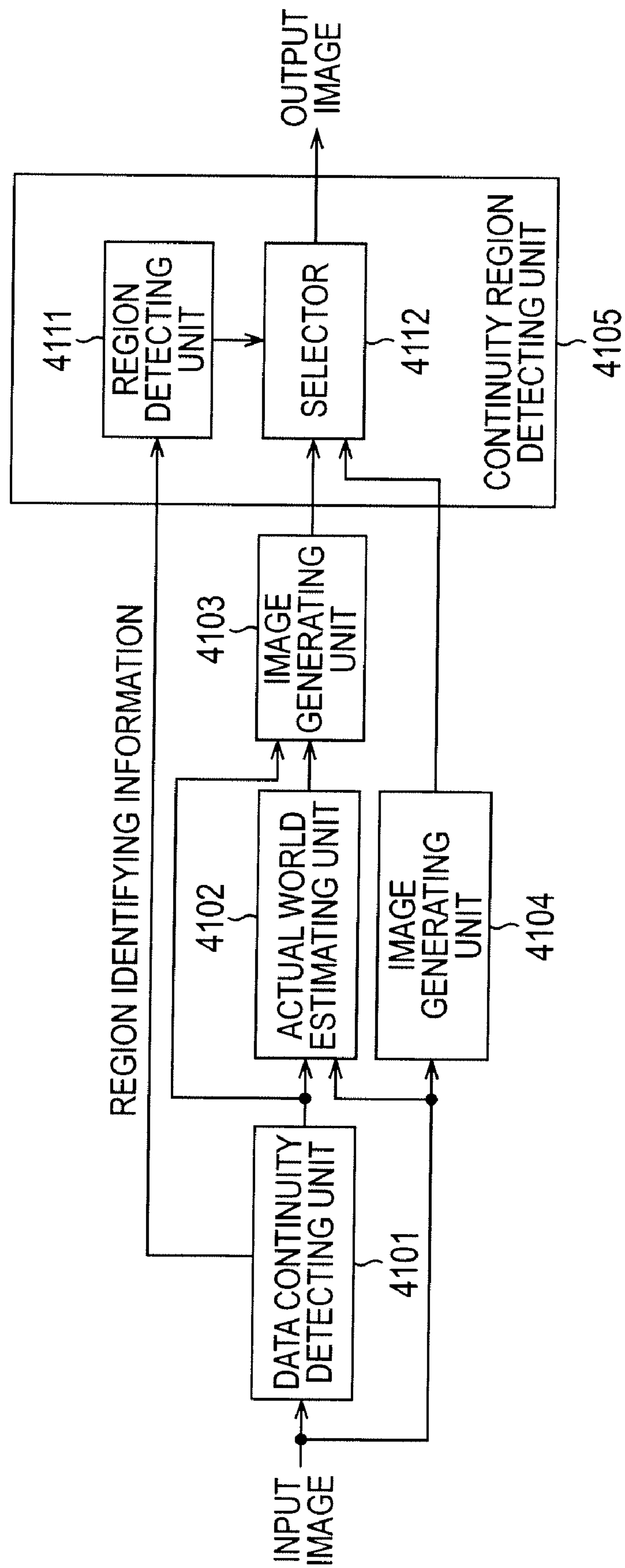

FIG. 315 is a block diagram describing a first configuration example of a signal processing device using a hybrid technique, which is another example of an embodiment of the signal processing device shown in FIG. 1.

Figure 316:
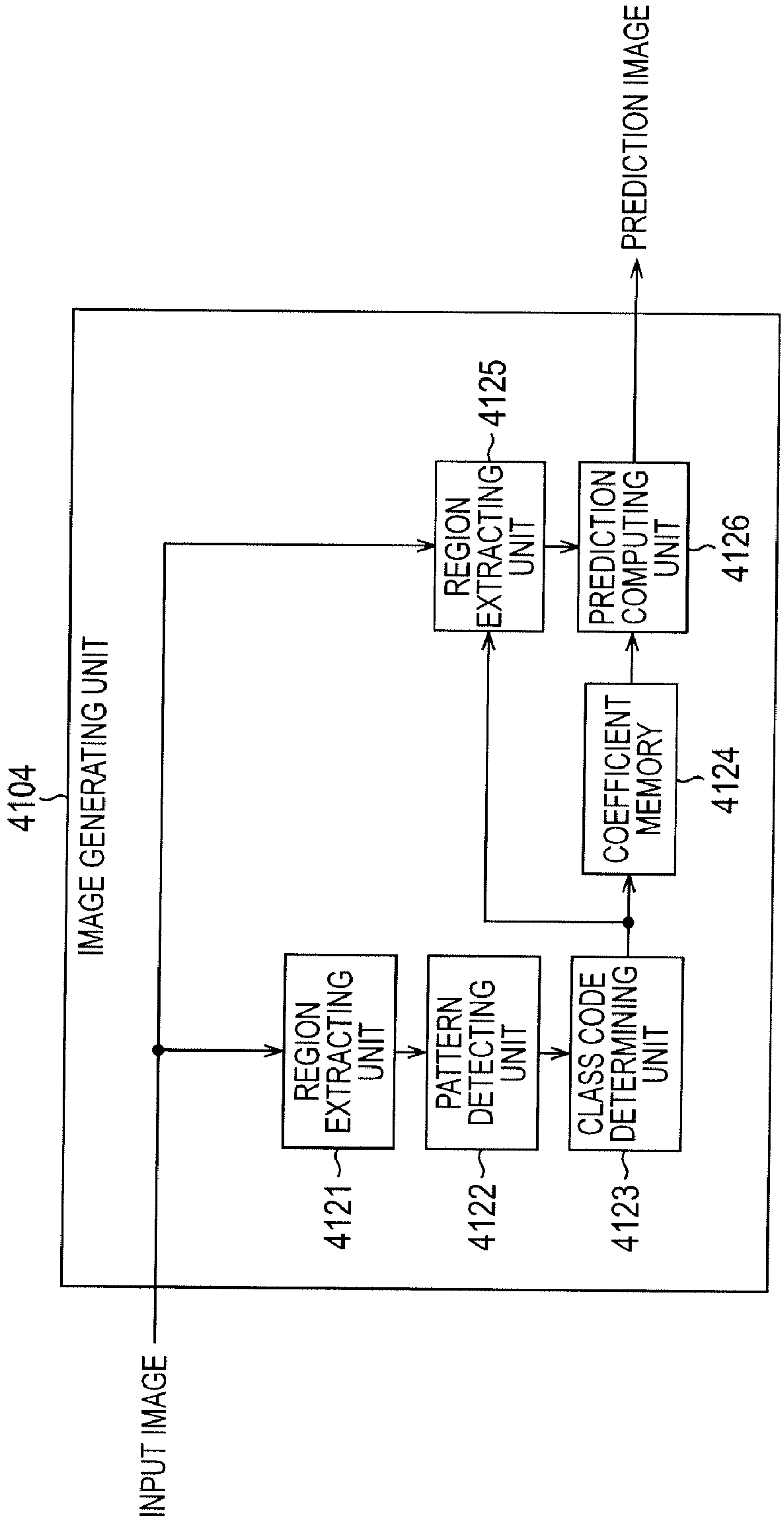

FIG. 316 is a block diagram for describing a configuration example of an image generating unit for executing the class classification adaptation processing of the signal processing device shown in FIG. 315.

Figure 317:
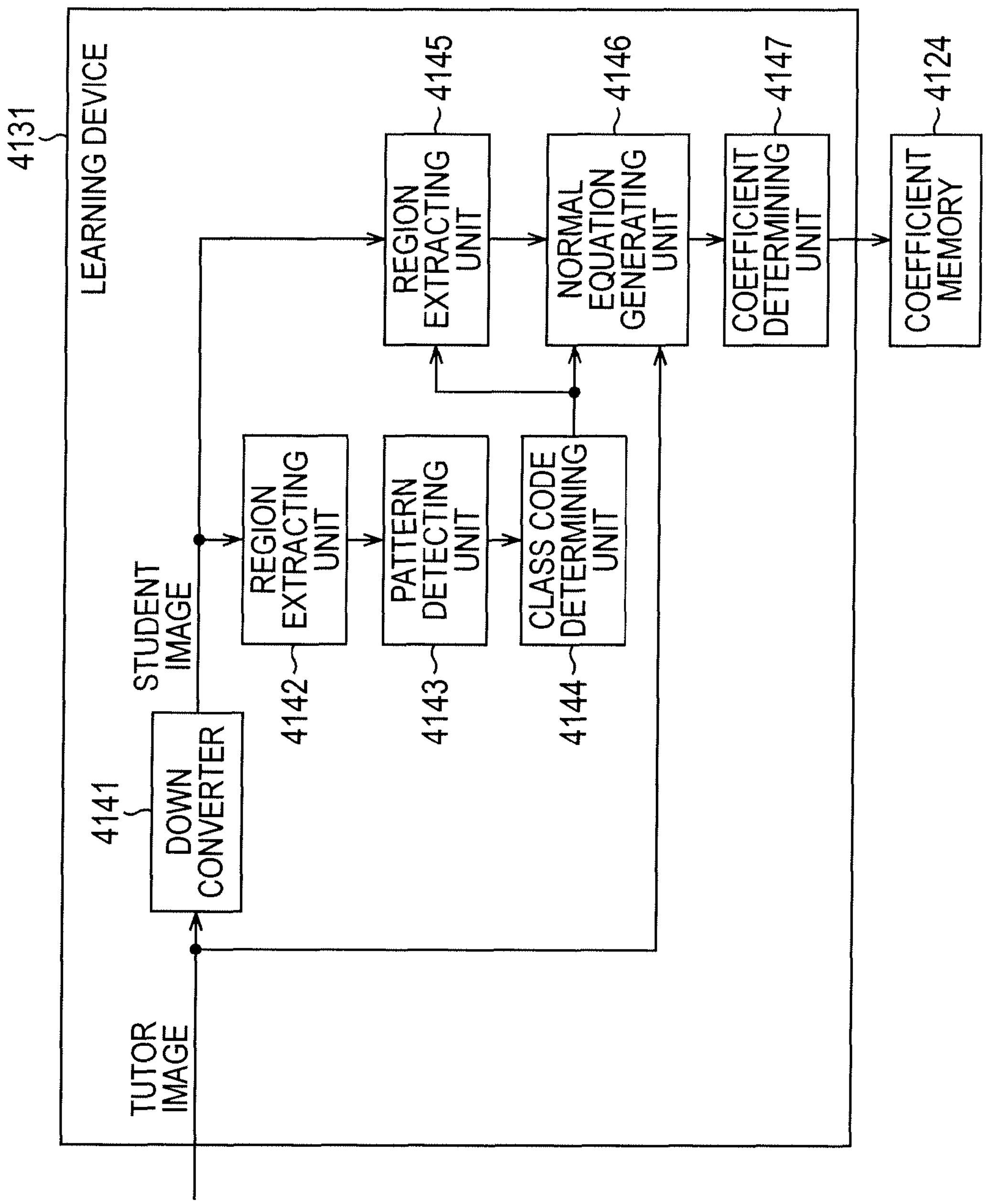

FIG. 317 is a block diagram for describing a configuration example of the learning device as to the image generating unit shown in FIG. 316.

Figure 318:
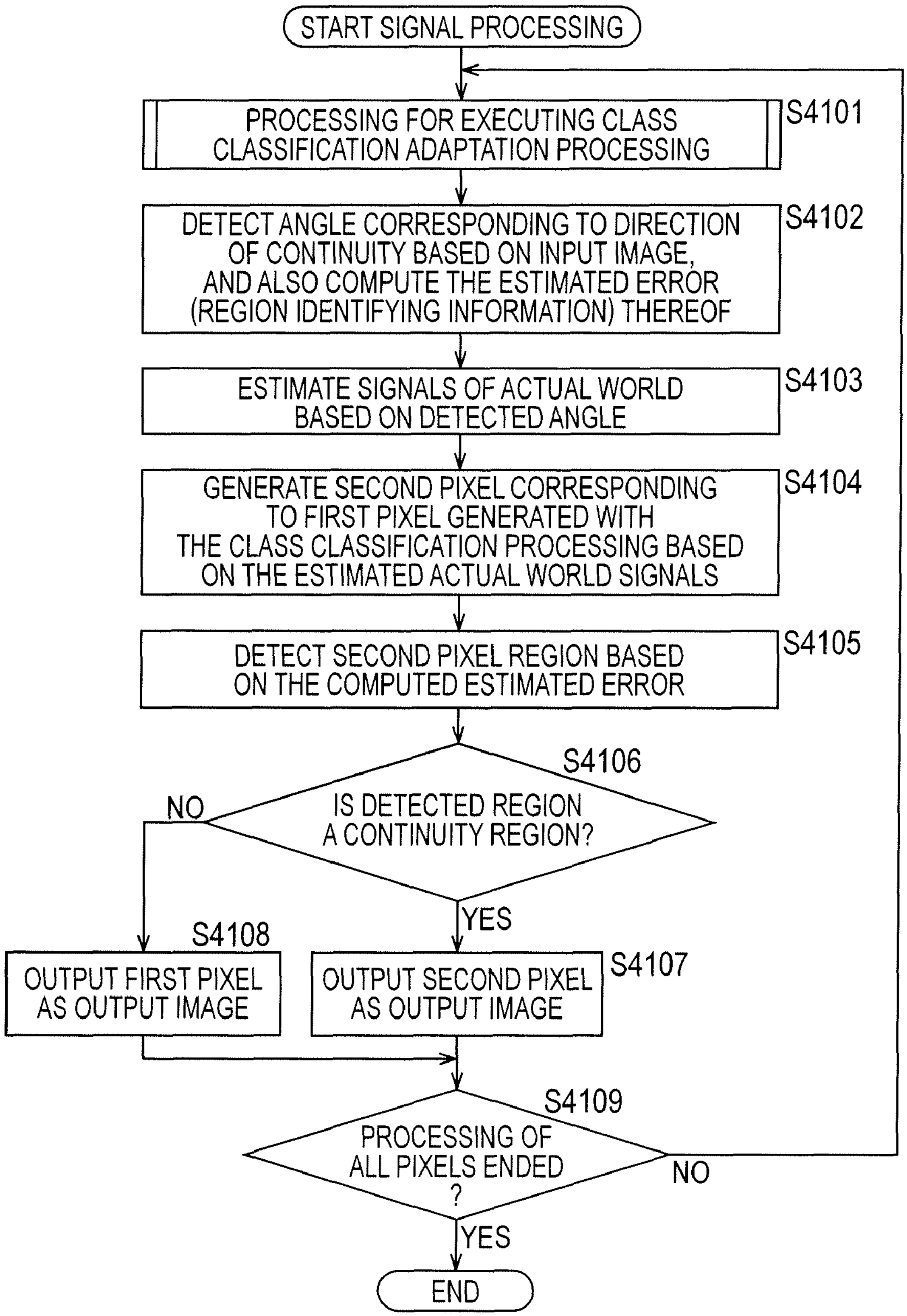

FIG. 318 is a flowchart for describing the processing of signals executed by the signal processing device of the configuration shown in FIG. 315.

Figure 319:
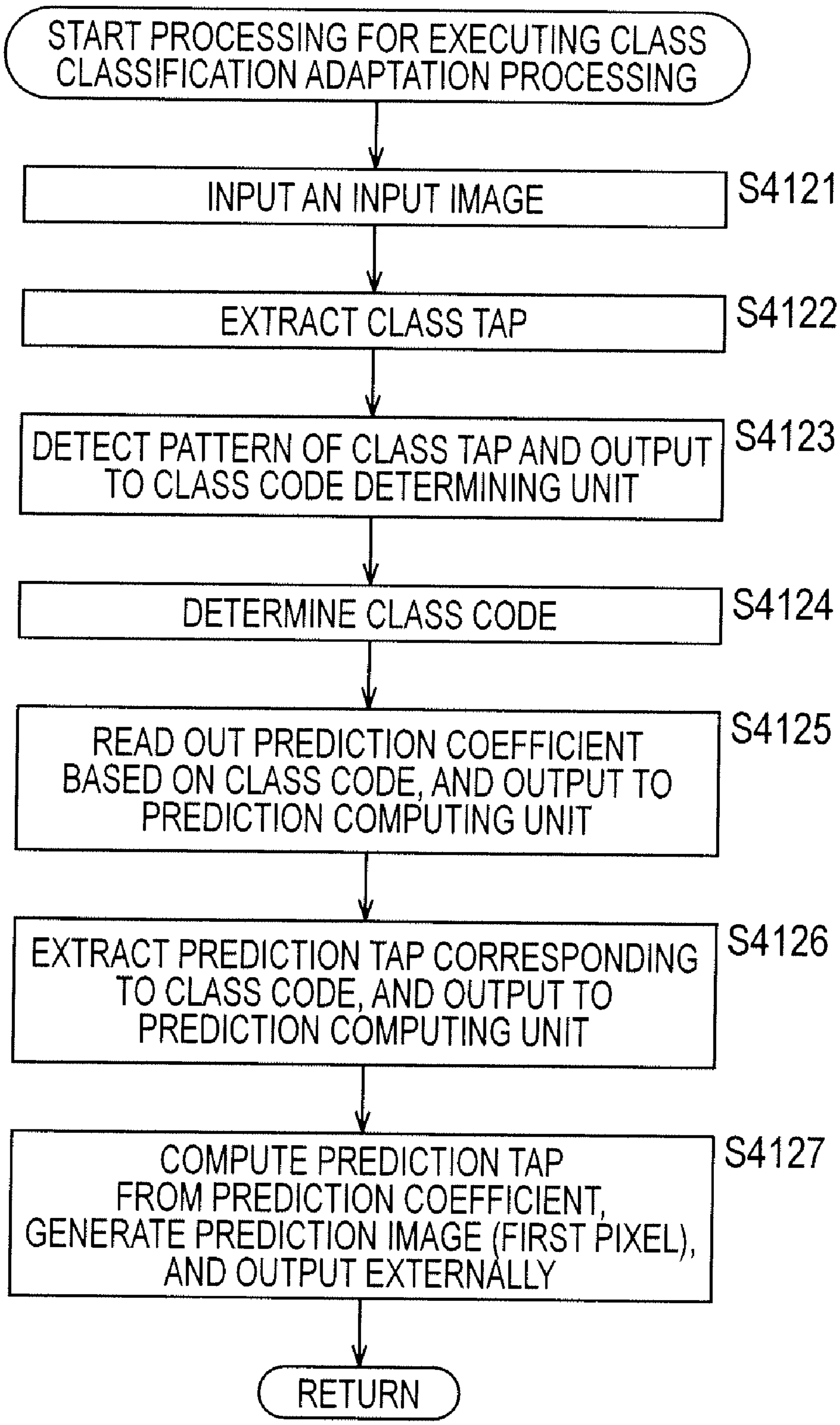

FIG. 319 is a flowchart for describing the details of executing processing of the class classification adaptation processing of the signal processing in FIG. 318.

Figure 320:
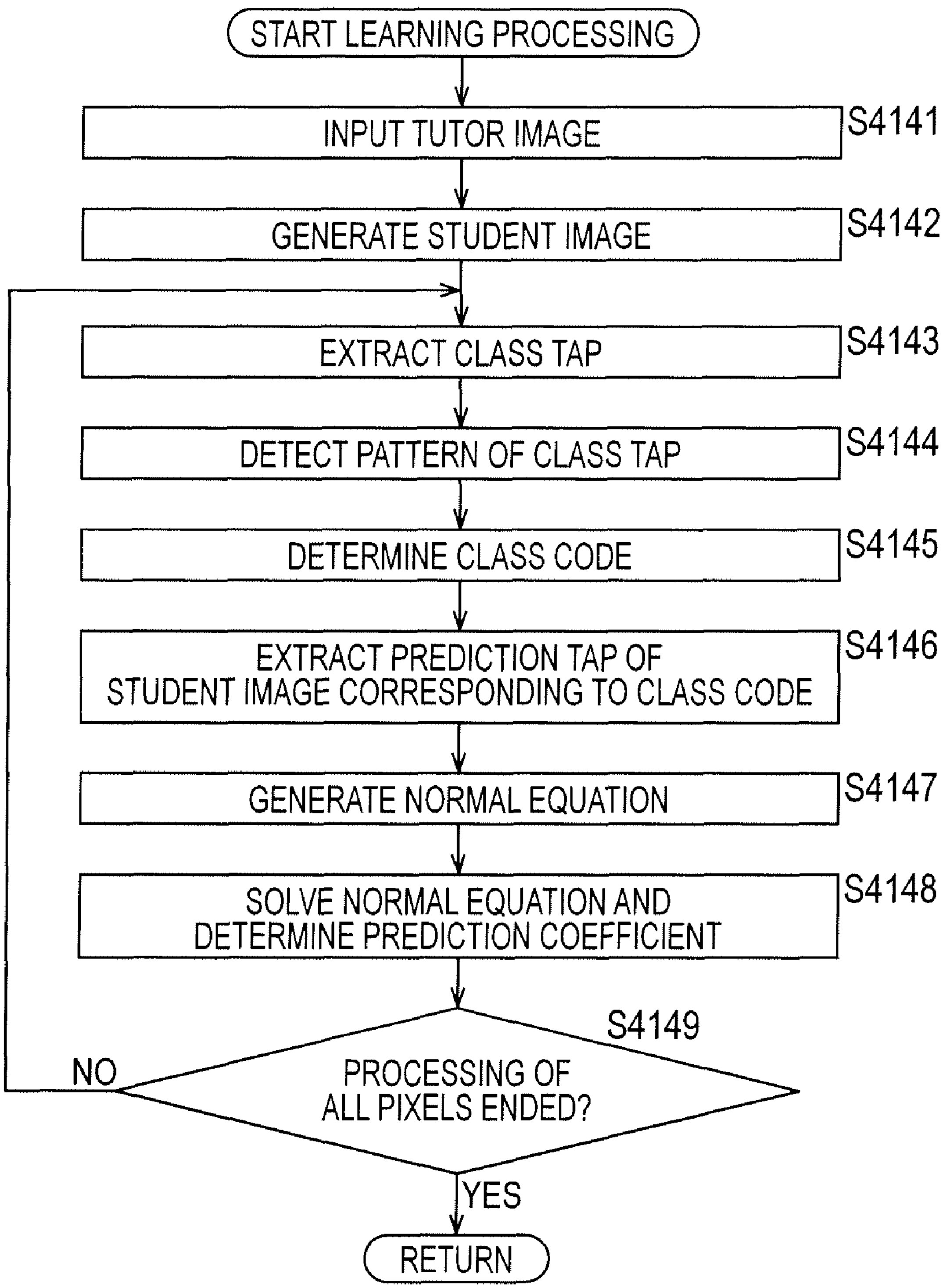

FIG. 320 is a flowchart for describing the learning processing of the learning device shown in FIG. 317.

Figure 321:
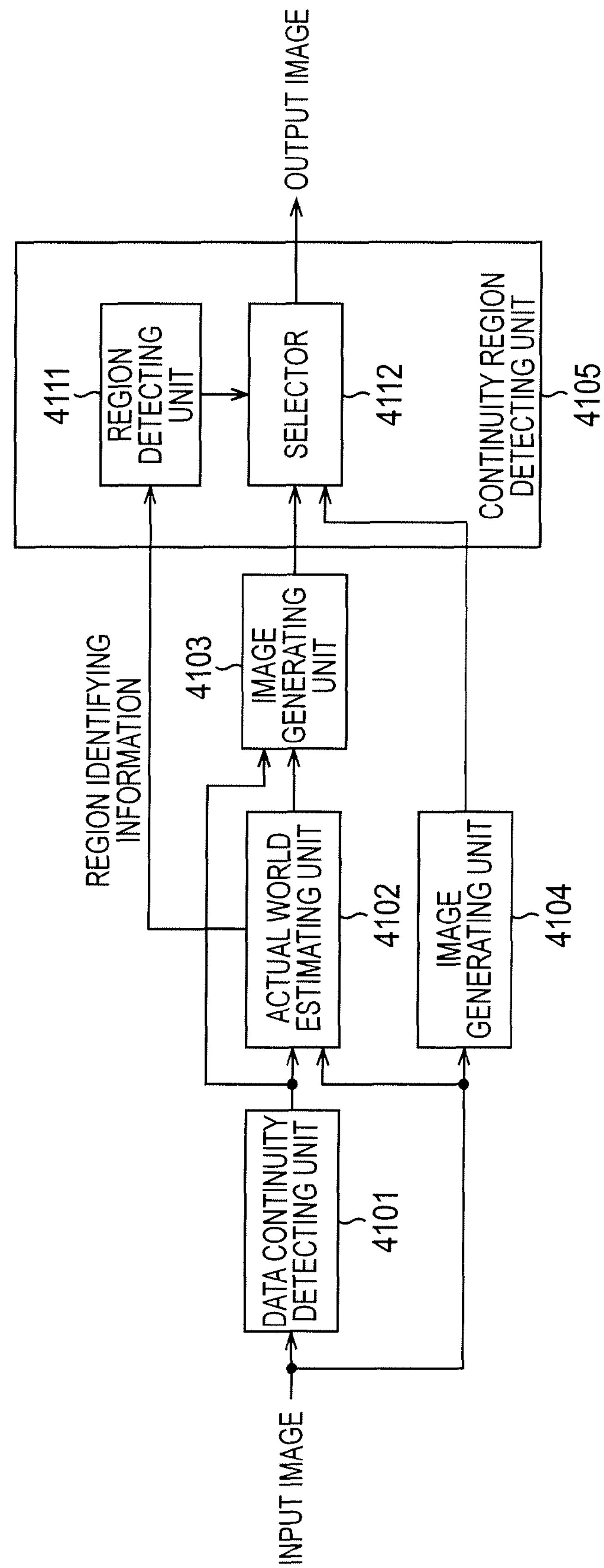

FIG. 321 is a block diagram describing a second configuration example of a signal processing device using a hybrid technique, which is another example of an embodiment of the signal processing device shown in FIG. 1.

Figure 322:
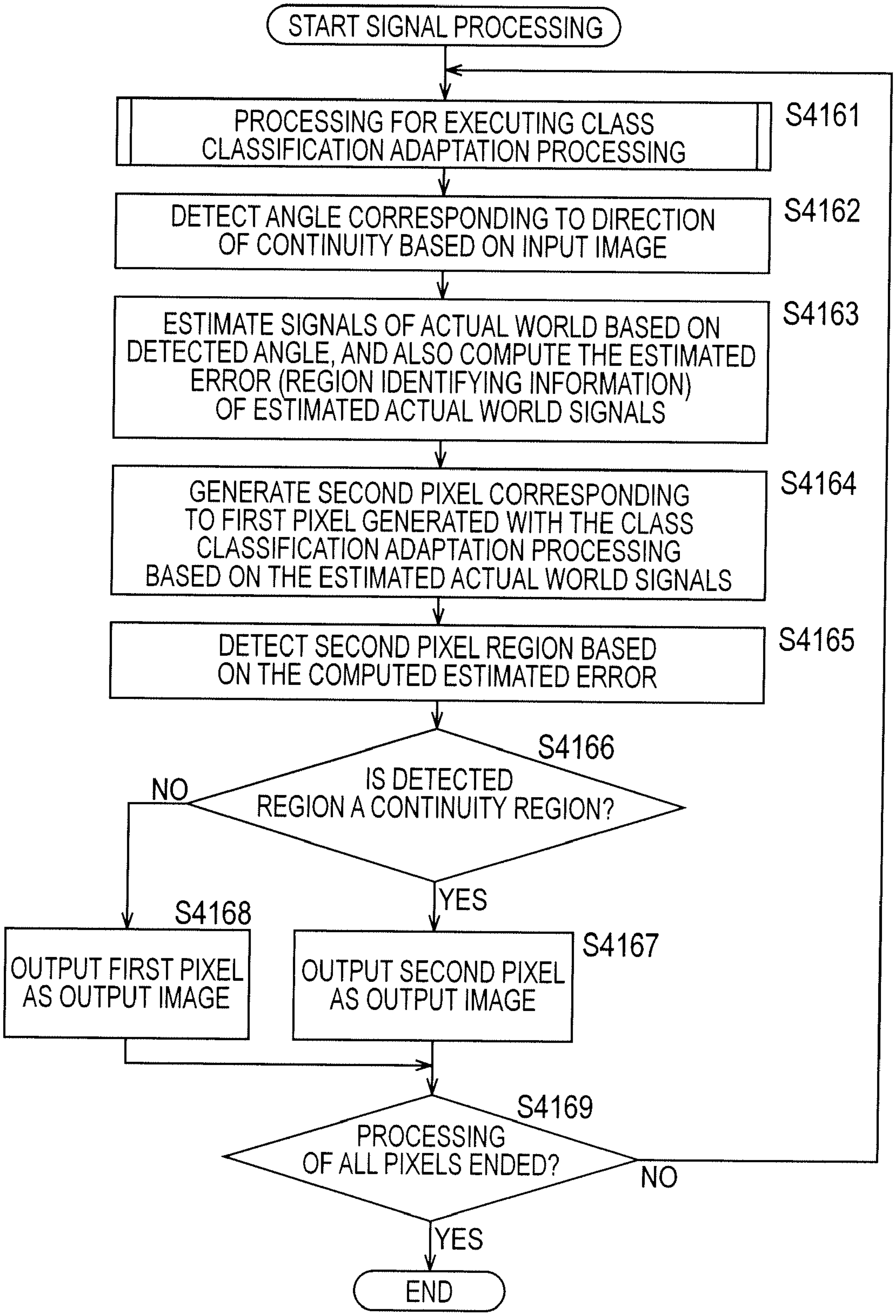

FIG. 322 is a flowchart for describing signal processing which the signal processing device of the configuration shown in FIG. 319 executes.

Figure 323:
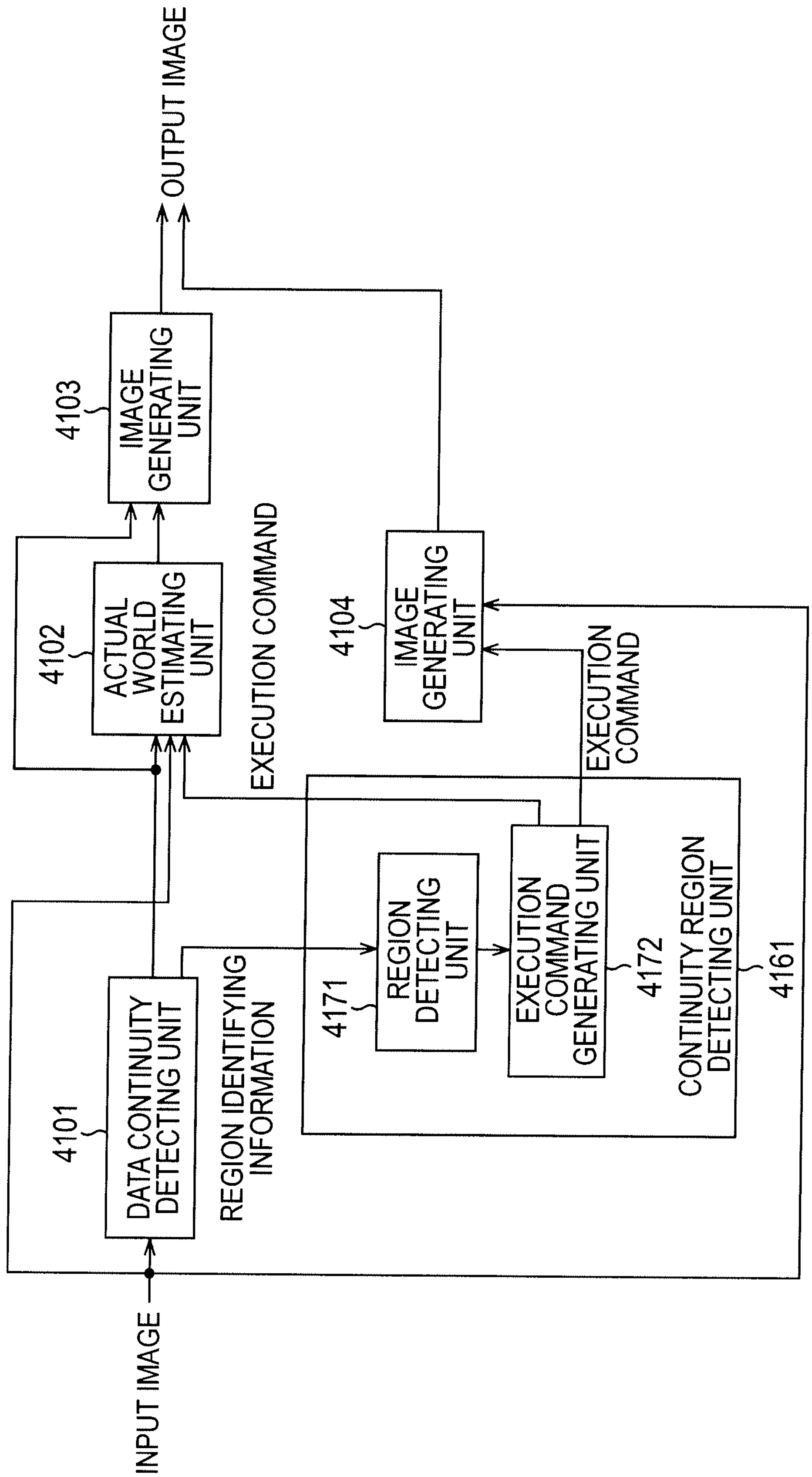

FIG. 323 is a block diagram describing a third configuration example of a signal processing device using a hybrid technique, which is another example of an embodiment of the signal processing device shown in FIG. 1.

Figure 324:
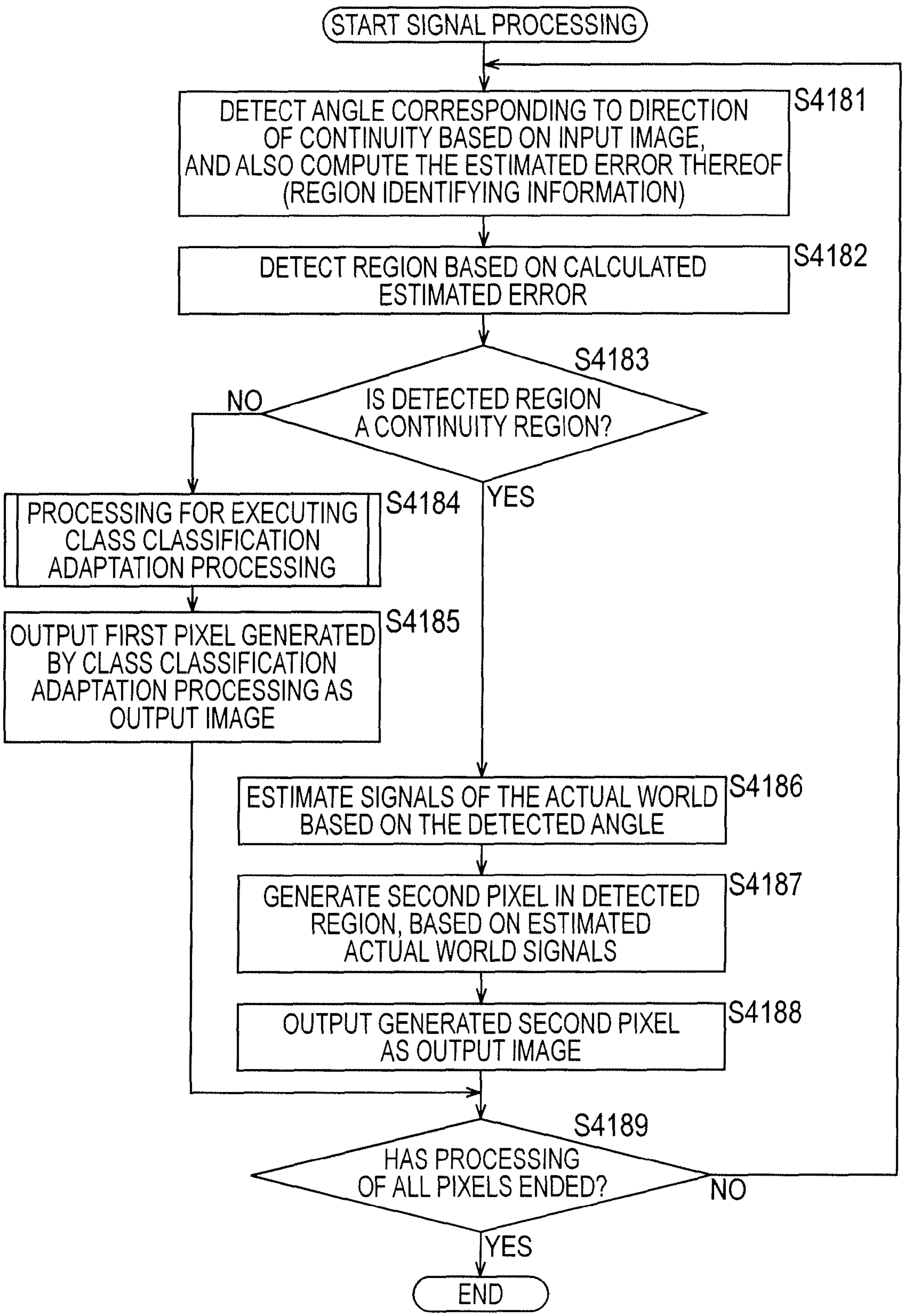

FIG. 324 is a flowchart for describing signal processing which the signal processing device of the configuration shown in FIG. 321 executes.

Figure 325:
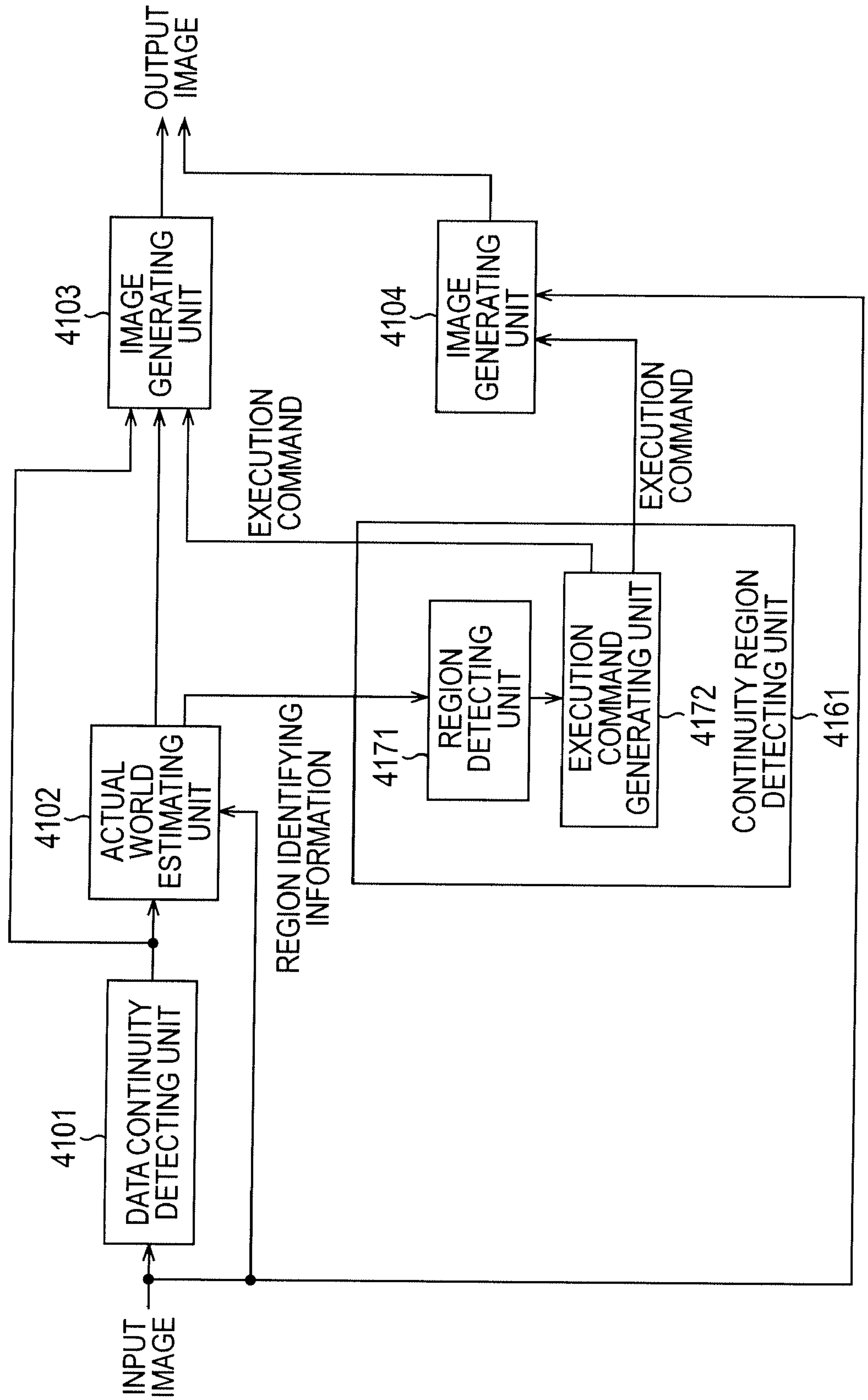

FIG. 325 is a block diagram describing a fourth configuration example of a signal processing device using a hybrid technique, which is another example of an embodiment of the signal processing device shown in FIG. 1.

Figure 326:
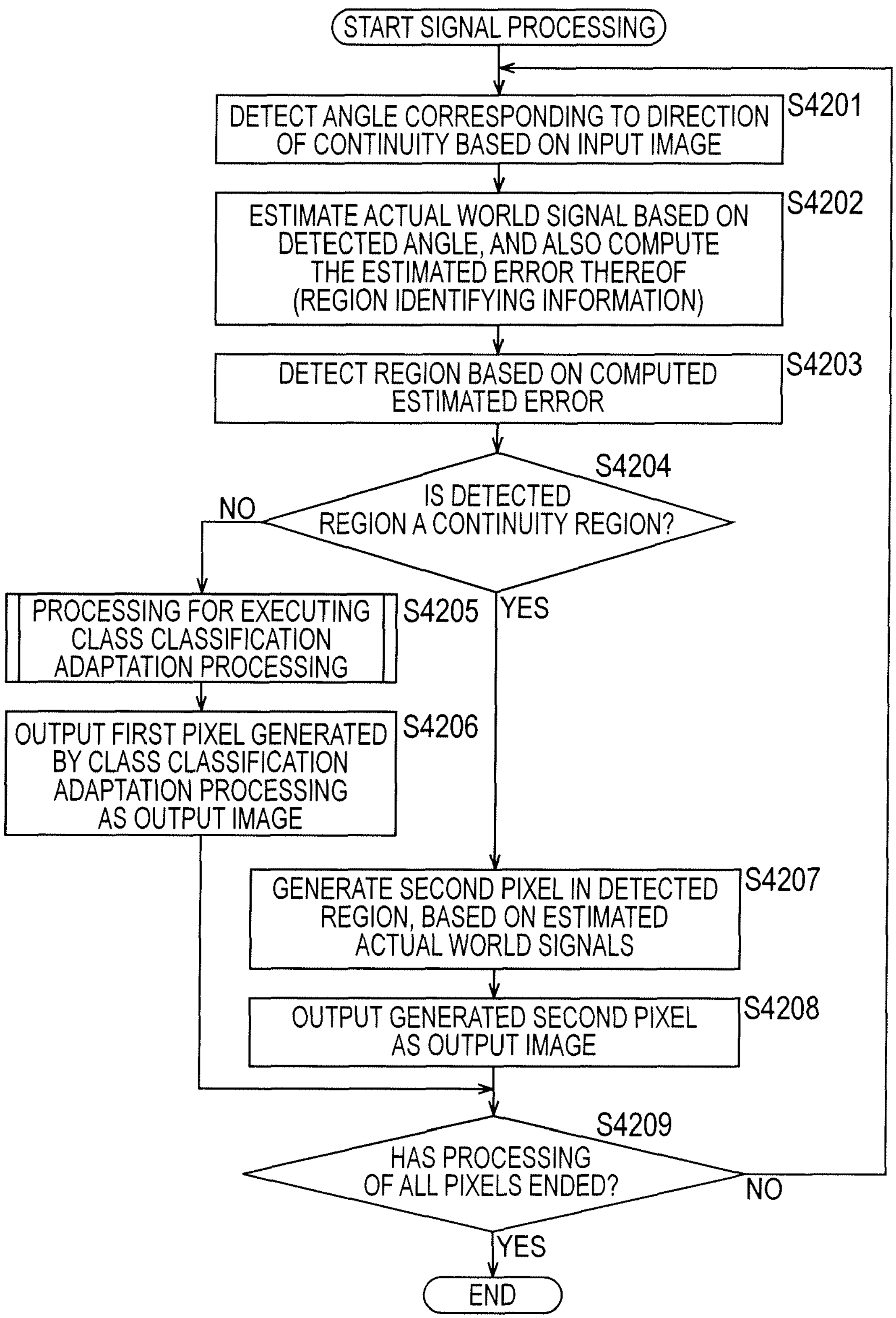

FIG. 326 is a flowchart for describing signal processing which the signal processing device of the configuration shown in FIG. 323 executes.

Figure 327:
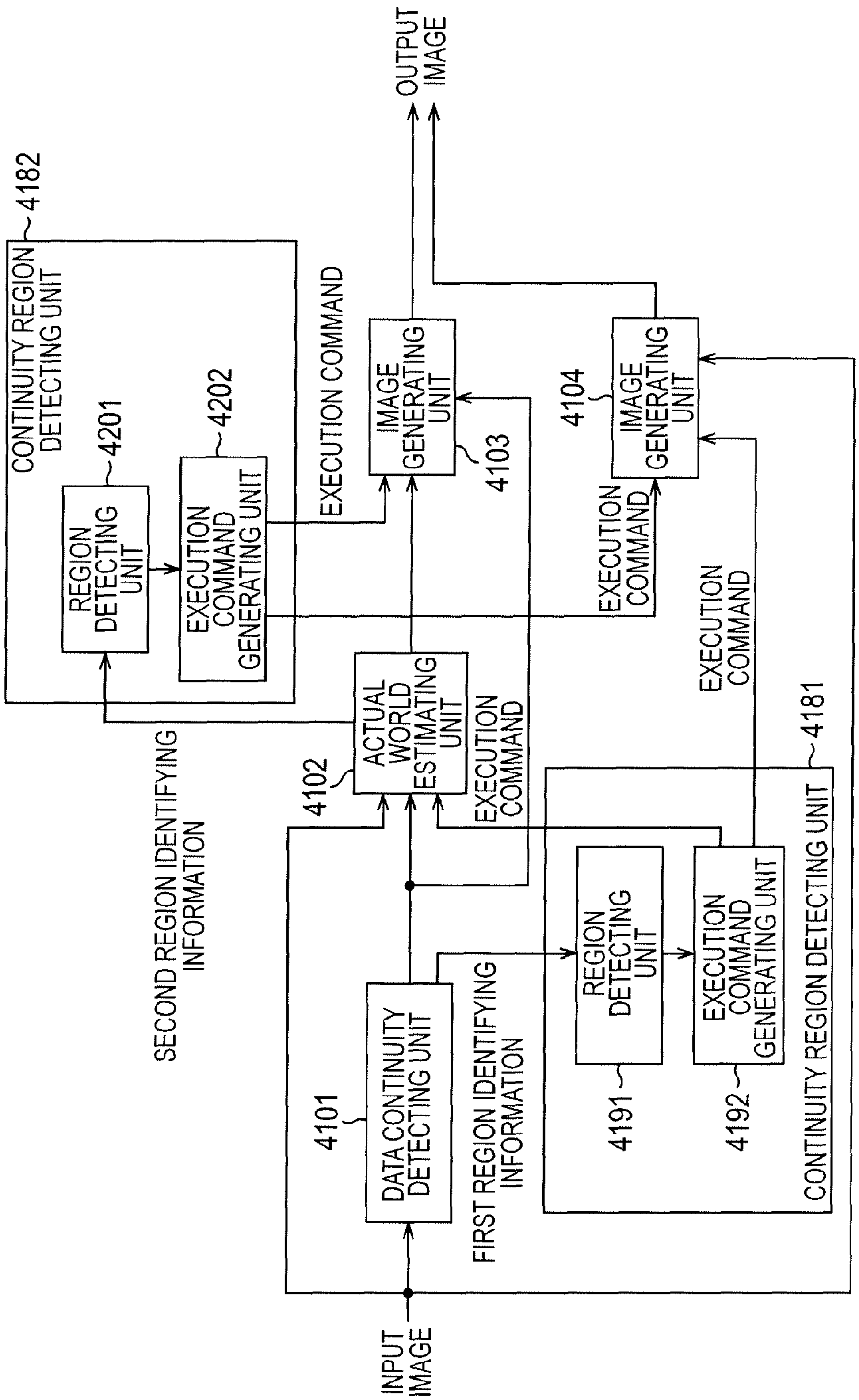

FIG. 327 is a block diagram describing a fifth configuration example of a signal processing device using a hybrid technique, which is another example of an embodiment of the signal processing device shown in FIG. 1.

Figure 328:
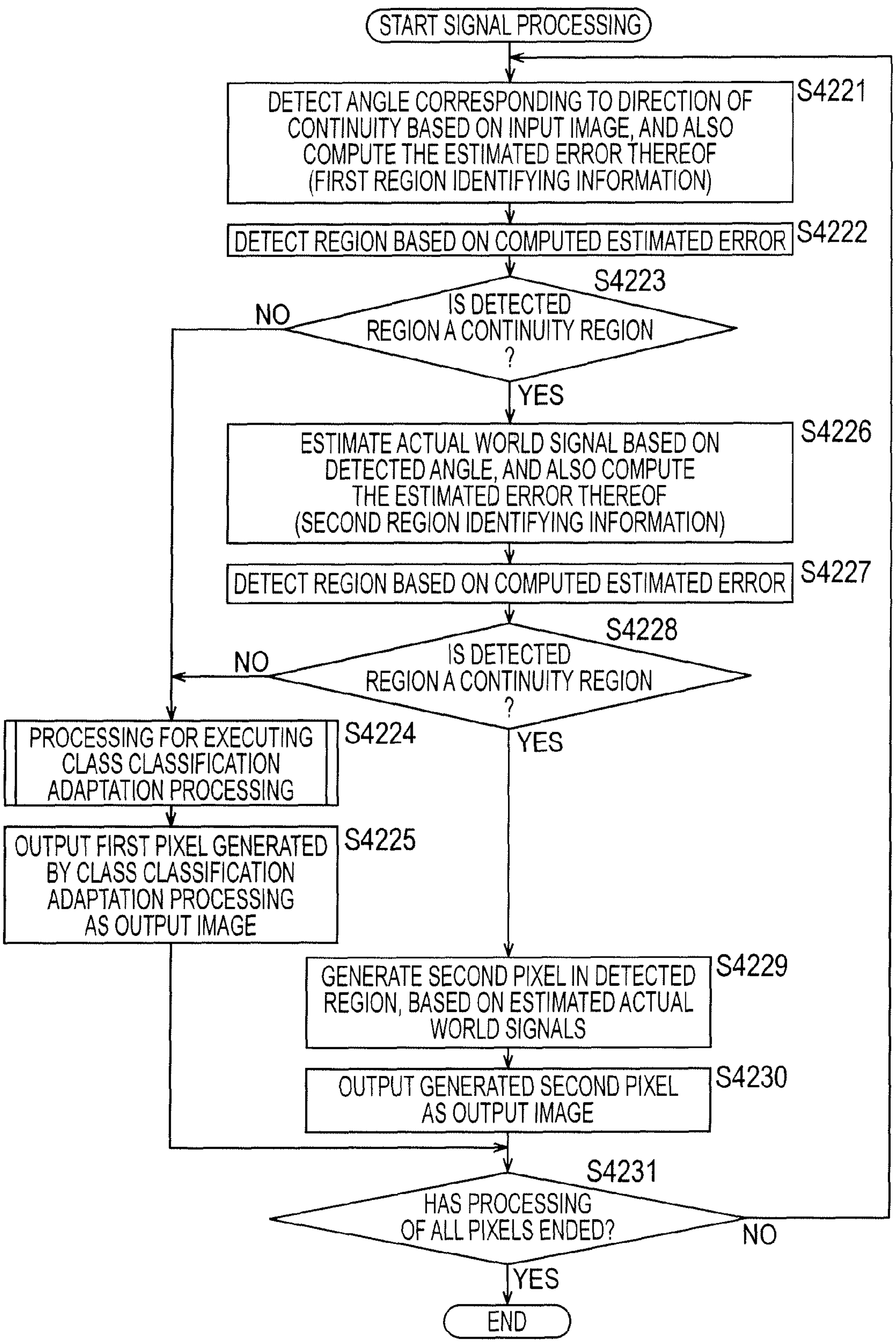

FIG. 328 is a flowchart for describing signal processing which the signal processing device of the configuration shown in FIG. 325 executes.

Figure 329:
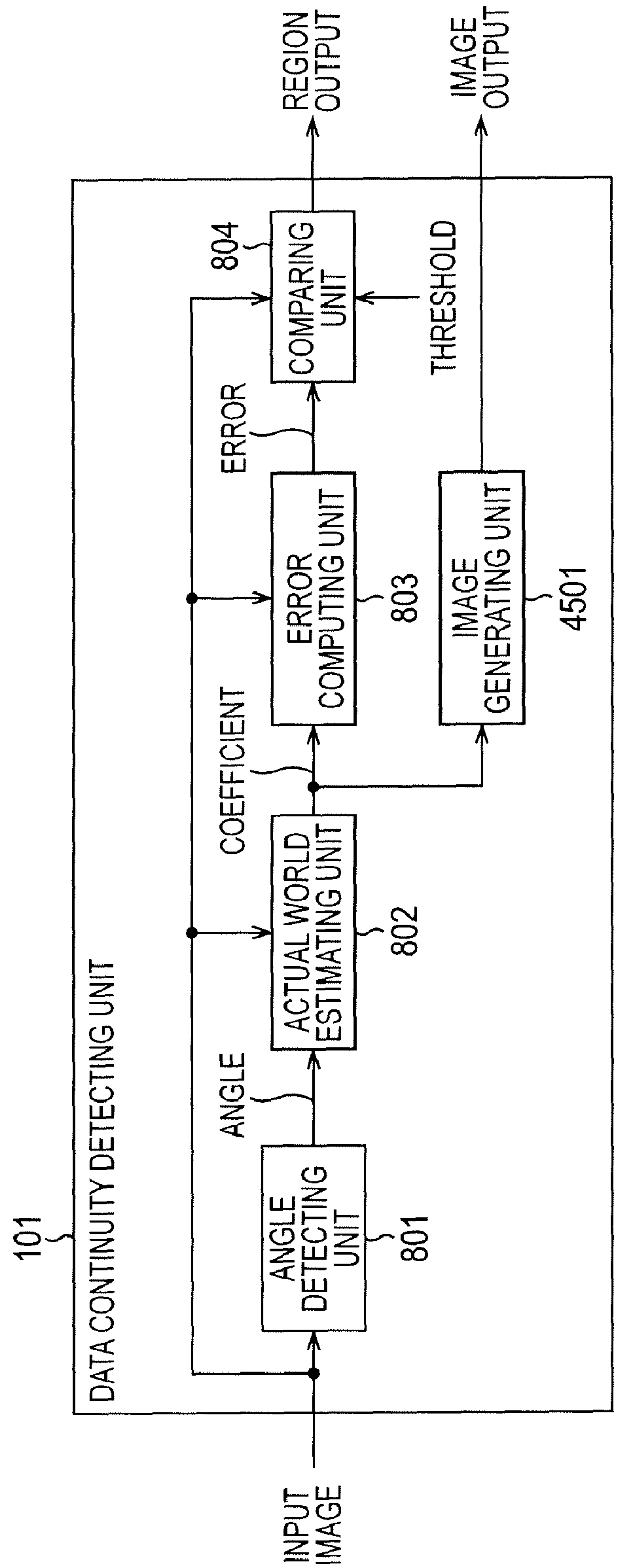

FIG. 329 is a block diagram illustrating the configuration of another embodiment of the data continuity detecting unit.

Figure 330:
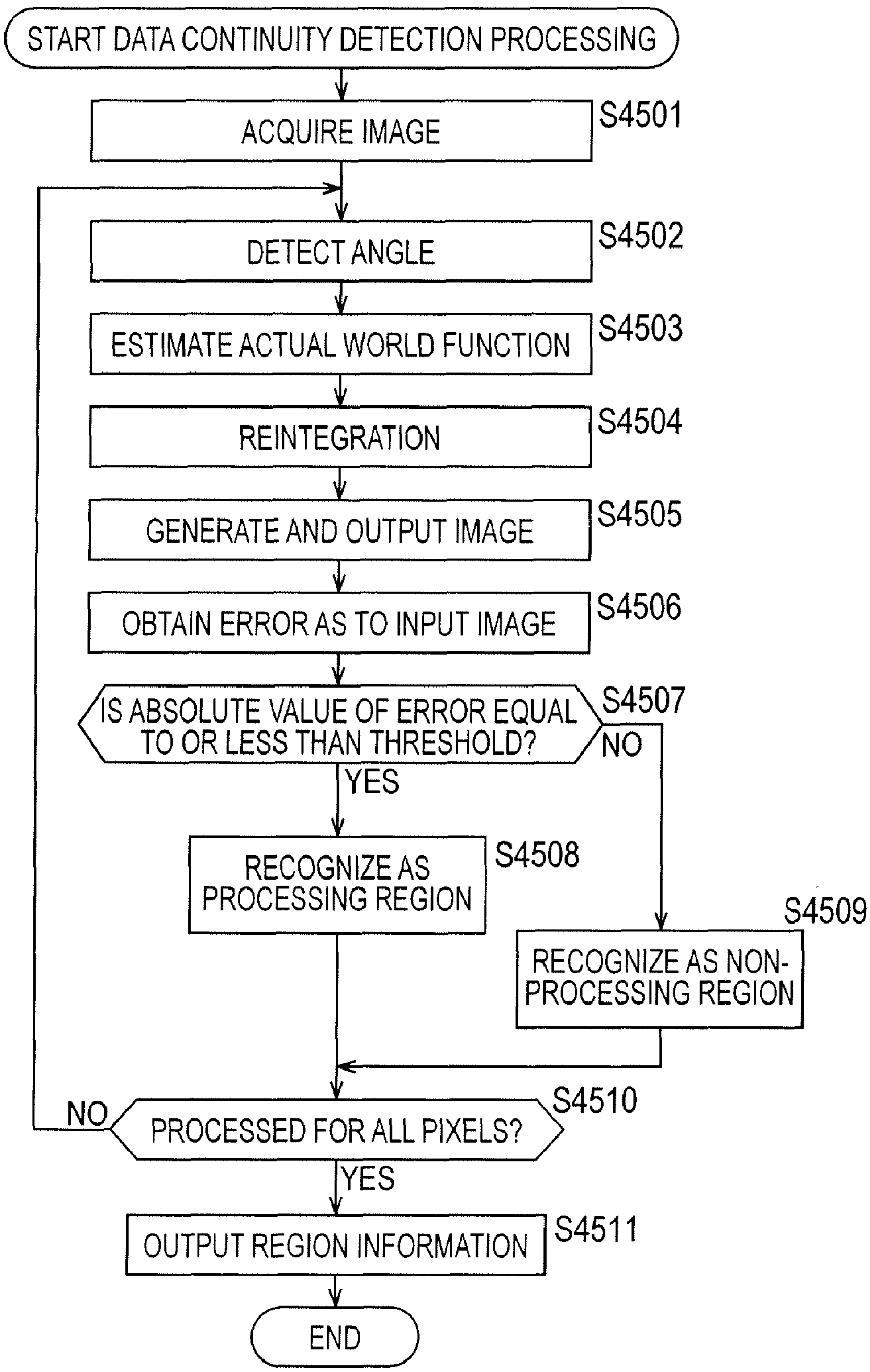

FIG. 330 is a flowchart for describing data continuity detecting processing with the data continuity detecting unit shown in FIG. 329.

Figure 331:
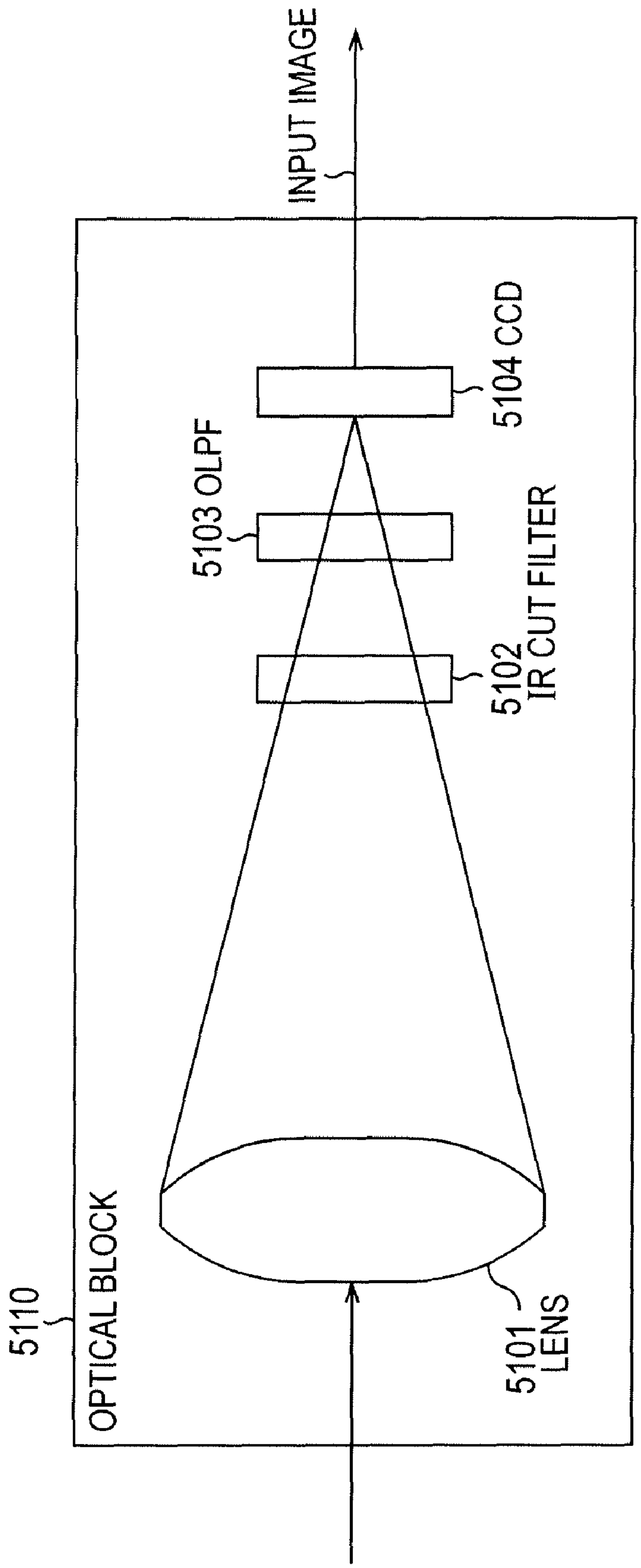

FIG. 331 is a diagram describing the configuration of an optical block.

Figure 332:
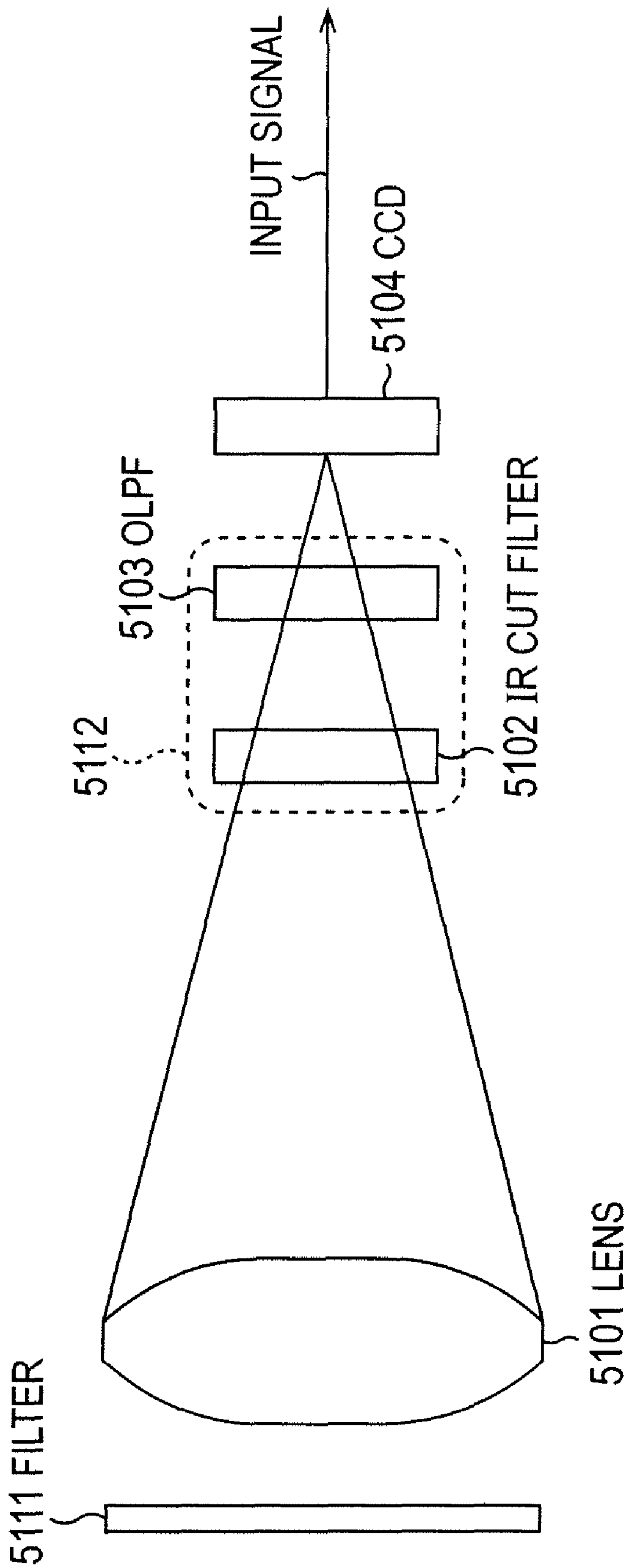

FIG. 332 is a diagram describing the configuration of the optical block.

Figure 333:
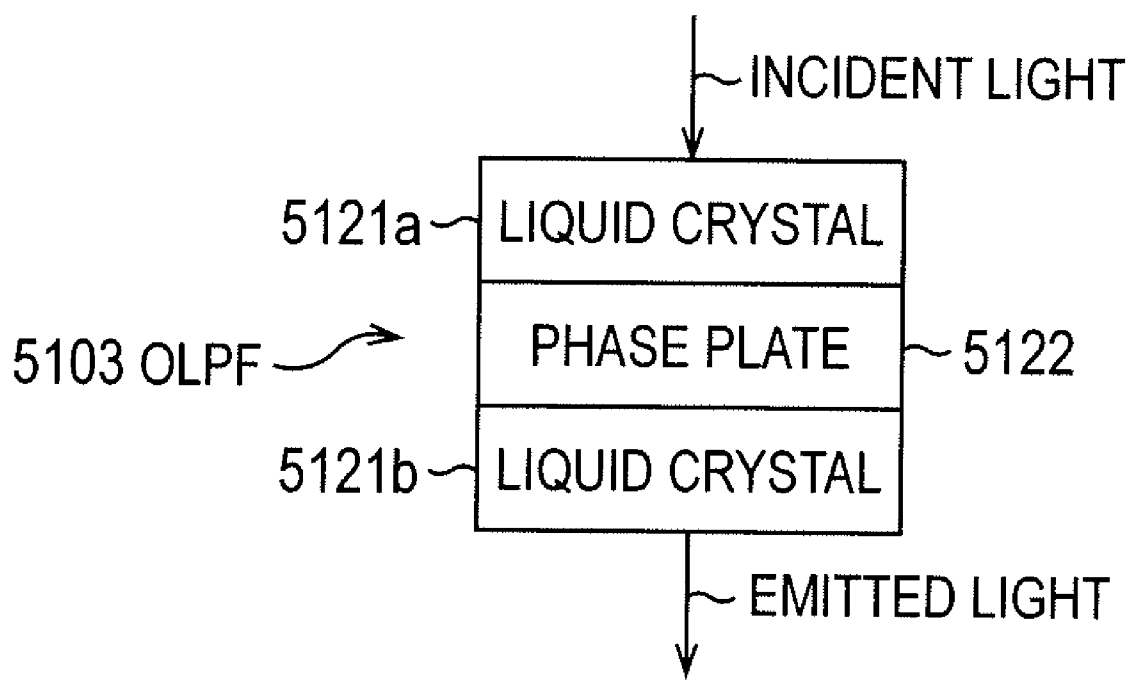

FIG. 333 is a diagram describing the configuration of an OLPF.

Figure 334:
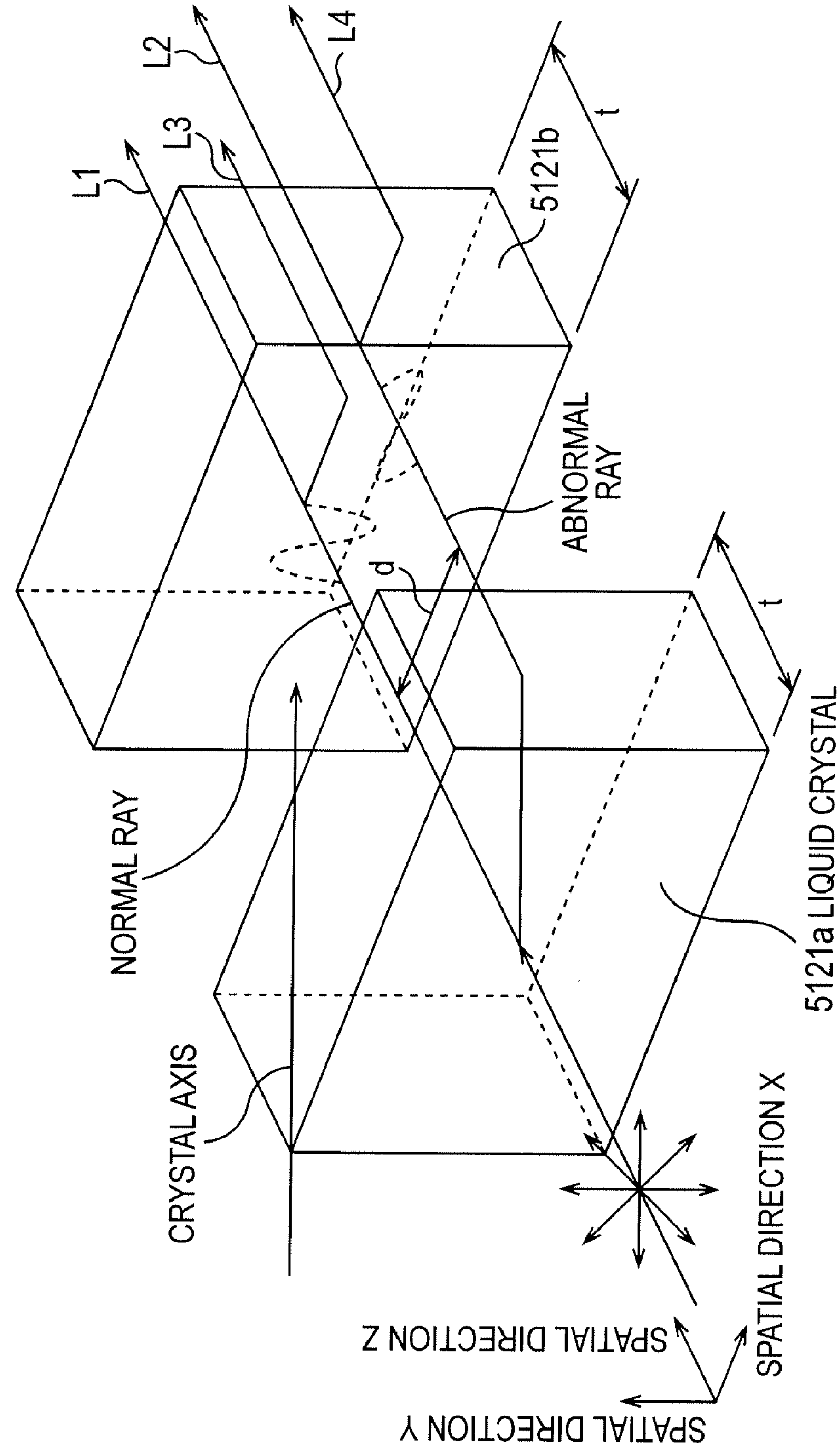

FIG. 334 is a diagram describing the function of the OLPF.

Figure 335:
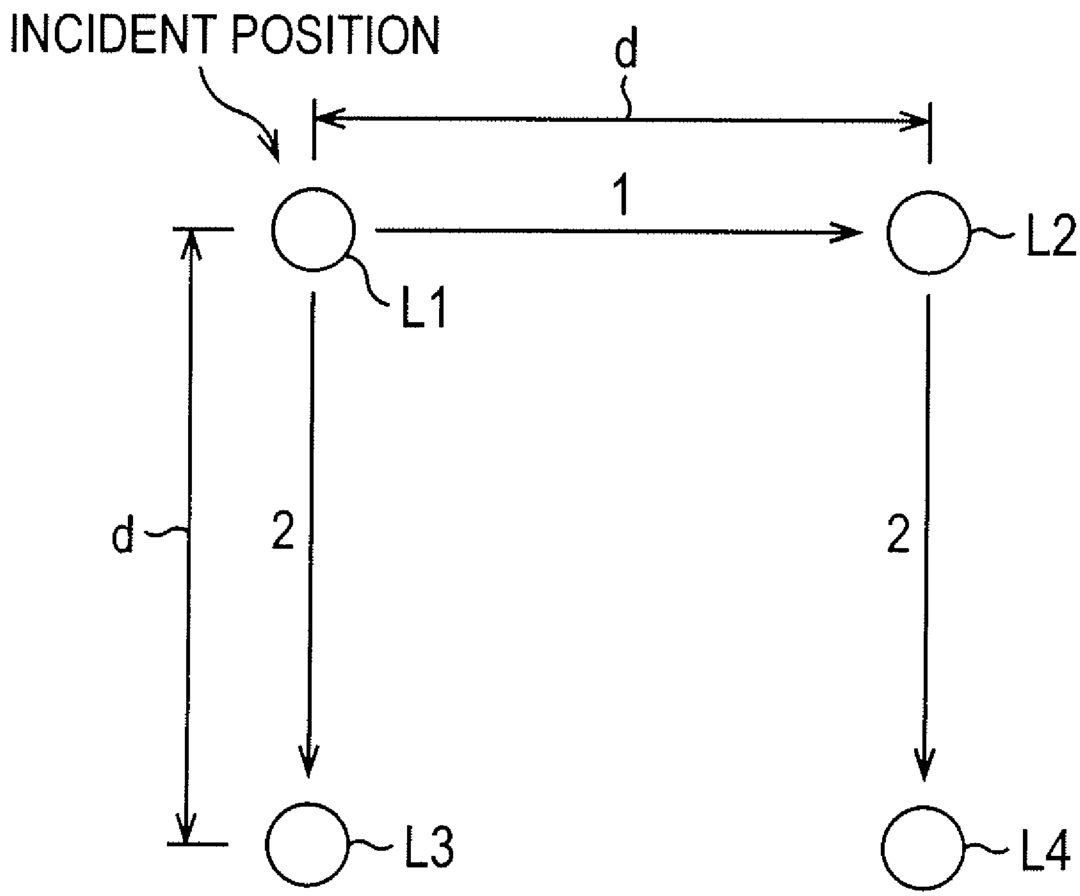

FIG. 335 is a diagram describing the function of the OLPF.

Figure 336:
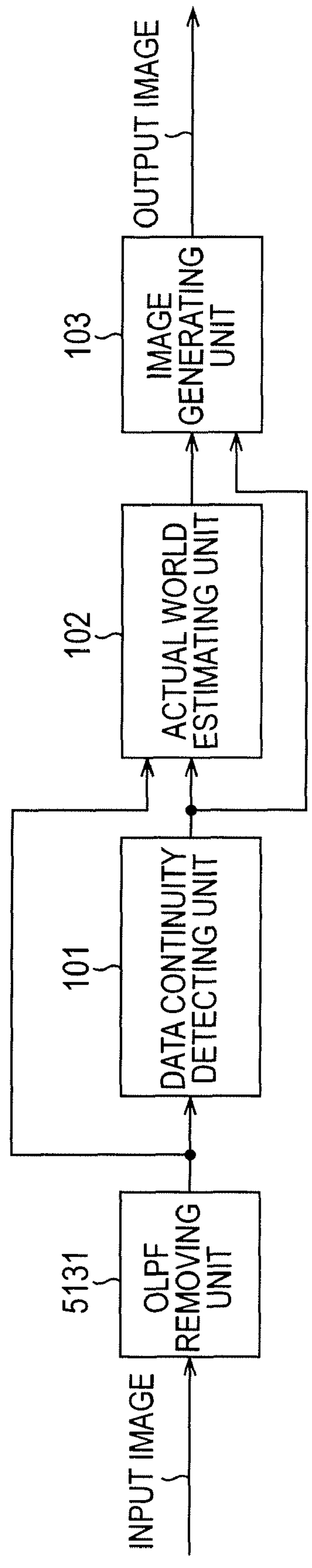

FIG. 336 is a block diagram illustrating the other configuration of the signal processing device according to the present invention.

Figure 337:
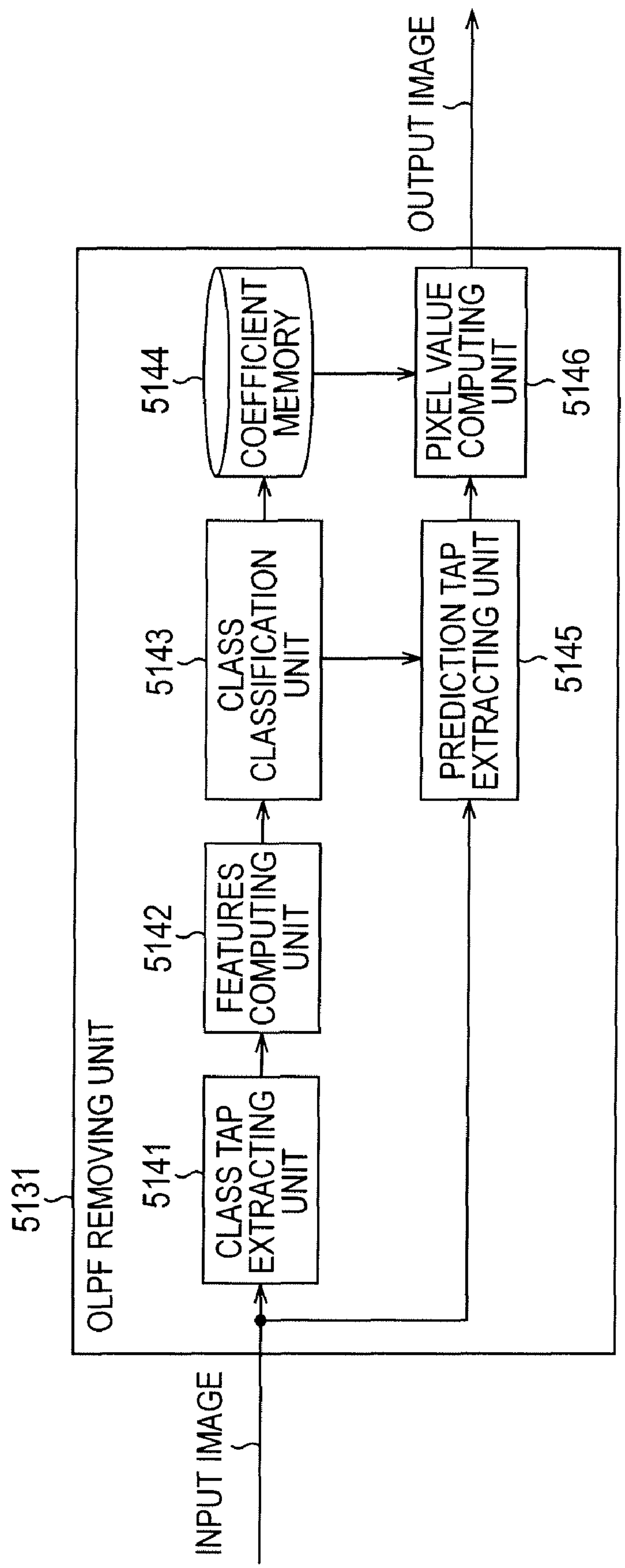

FIG. 337 is a block diagram illustrating the configuration of the OLPF removal unit shown in FIG. 336.

Figure 338:
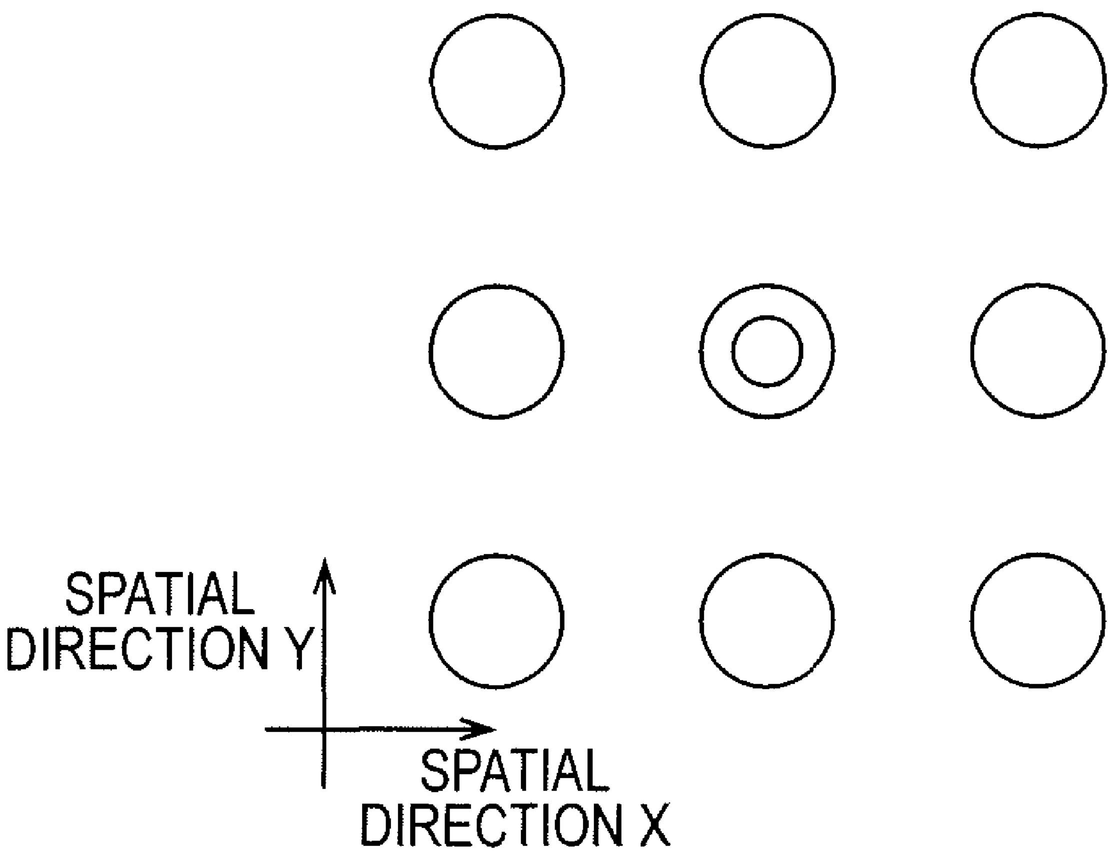

FIG. 338 is a diagram illustrating an example of a class tap.

Figure 339:
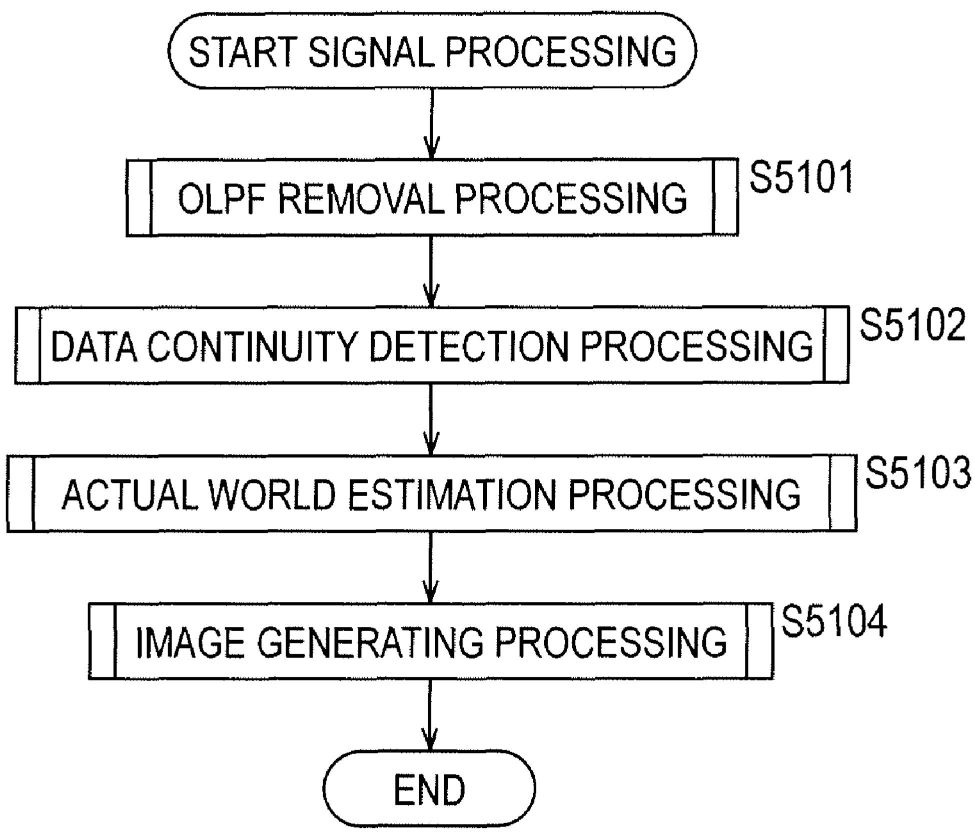

FIG. 339 is a flowchart for describing signal processing with the signal processing device shown in FIG. 336.

Figure 340:
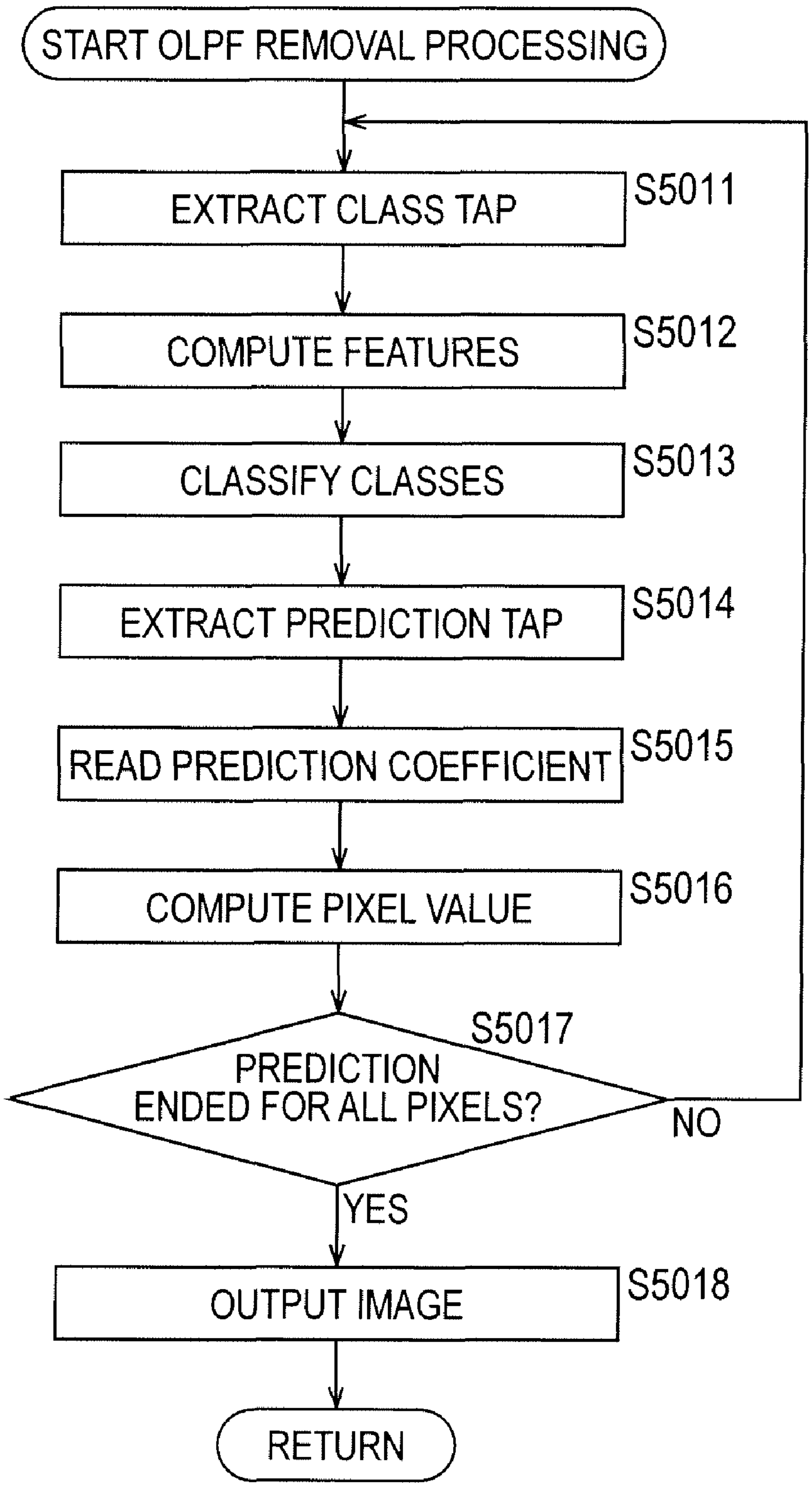

FIG. 340 is a flowchart for describing OLPF removal processing, which is the processing in step S5101 of the flowchart shown in FIG. 339.

Figure 341:
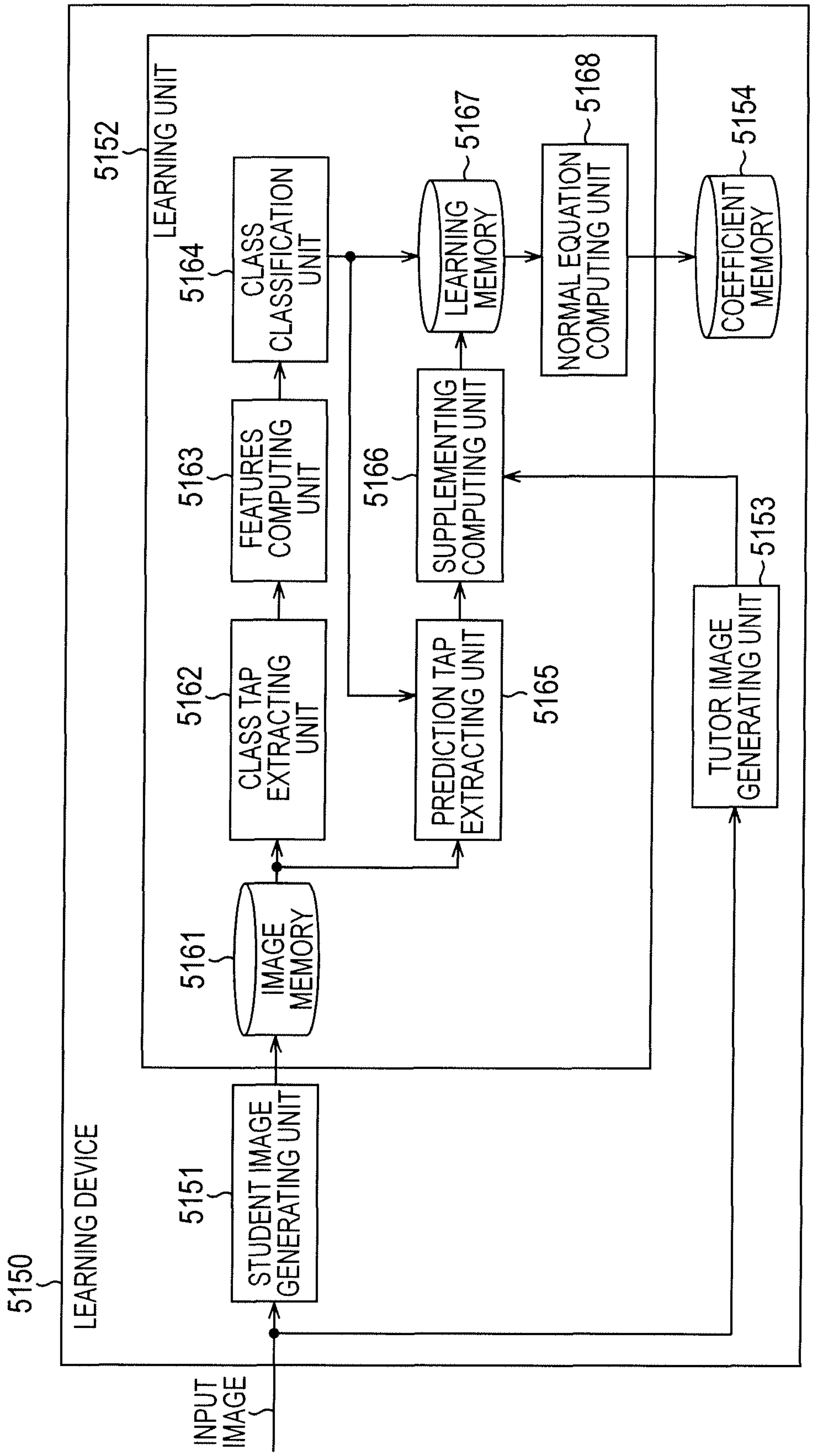

FIG. 341 is a learning device for learning the coefficient of the OLPF removal unit shown in FIG. 337.

Figure 342:
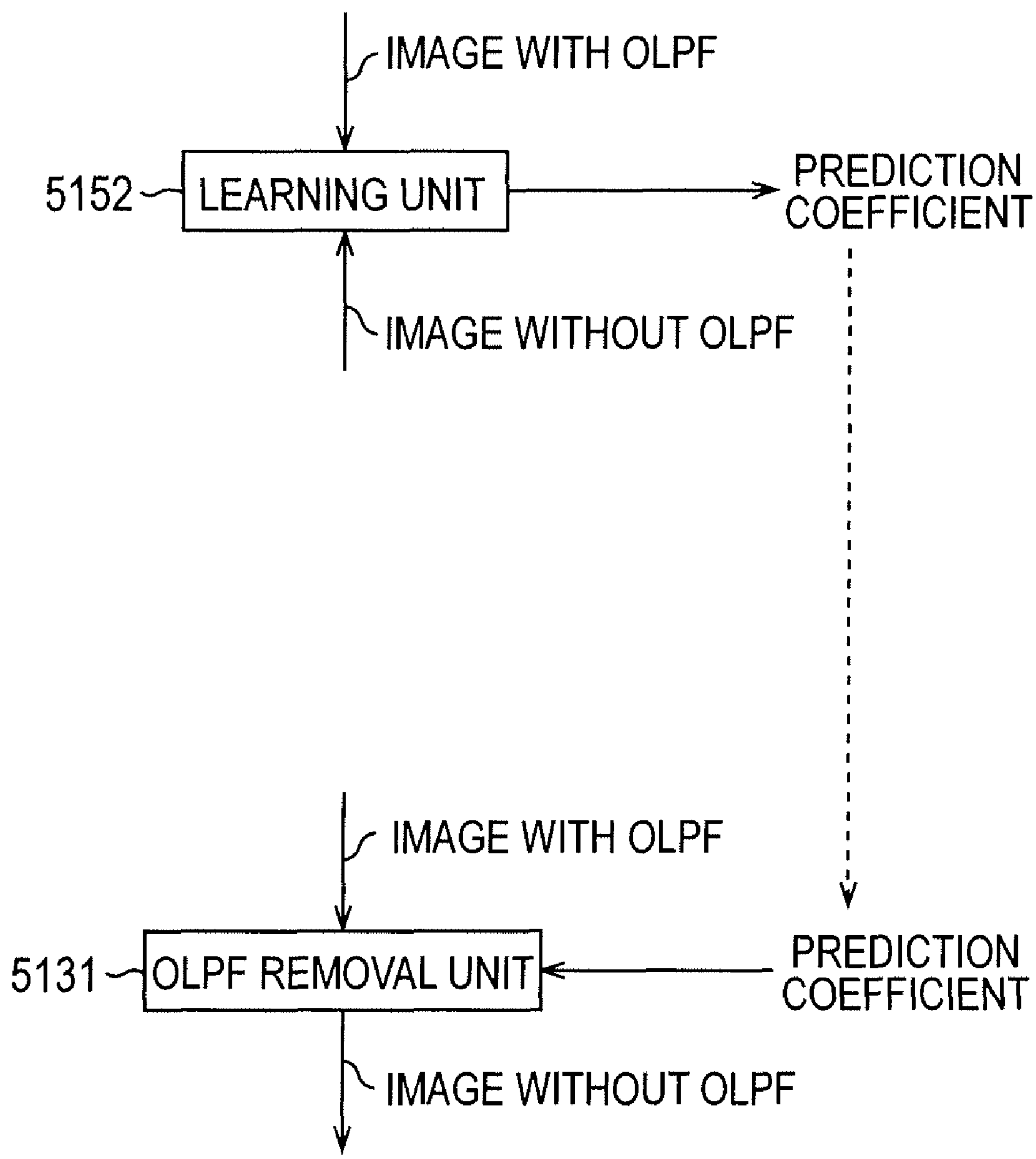

FIG. 342 is a diagram for describing a learning method.

Figure 343:
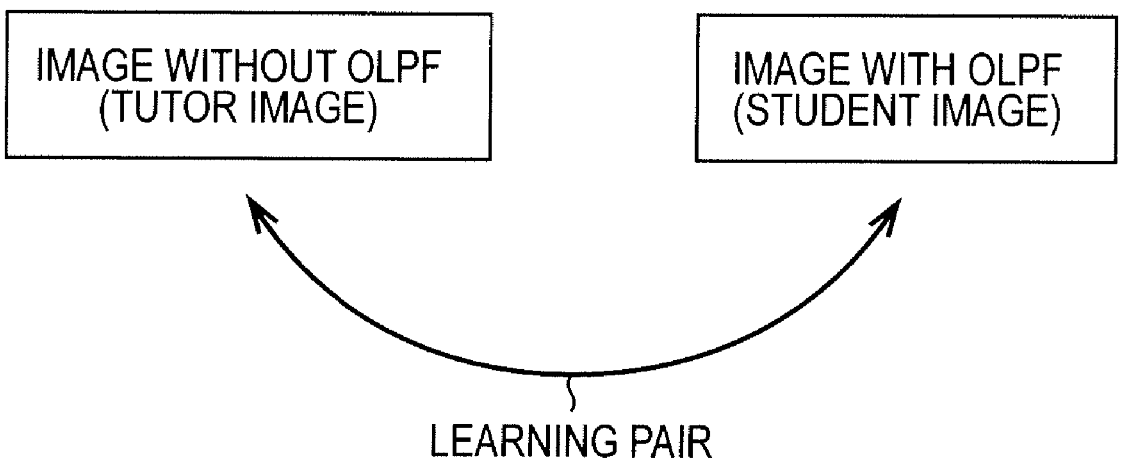

FIG. 343 is a diagram for describing a tutor image and a student image.

Figure 344:
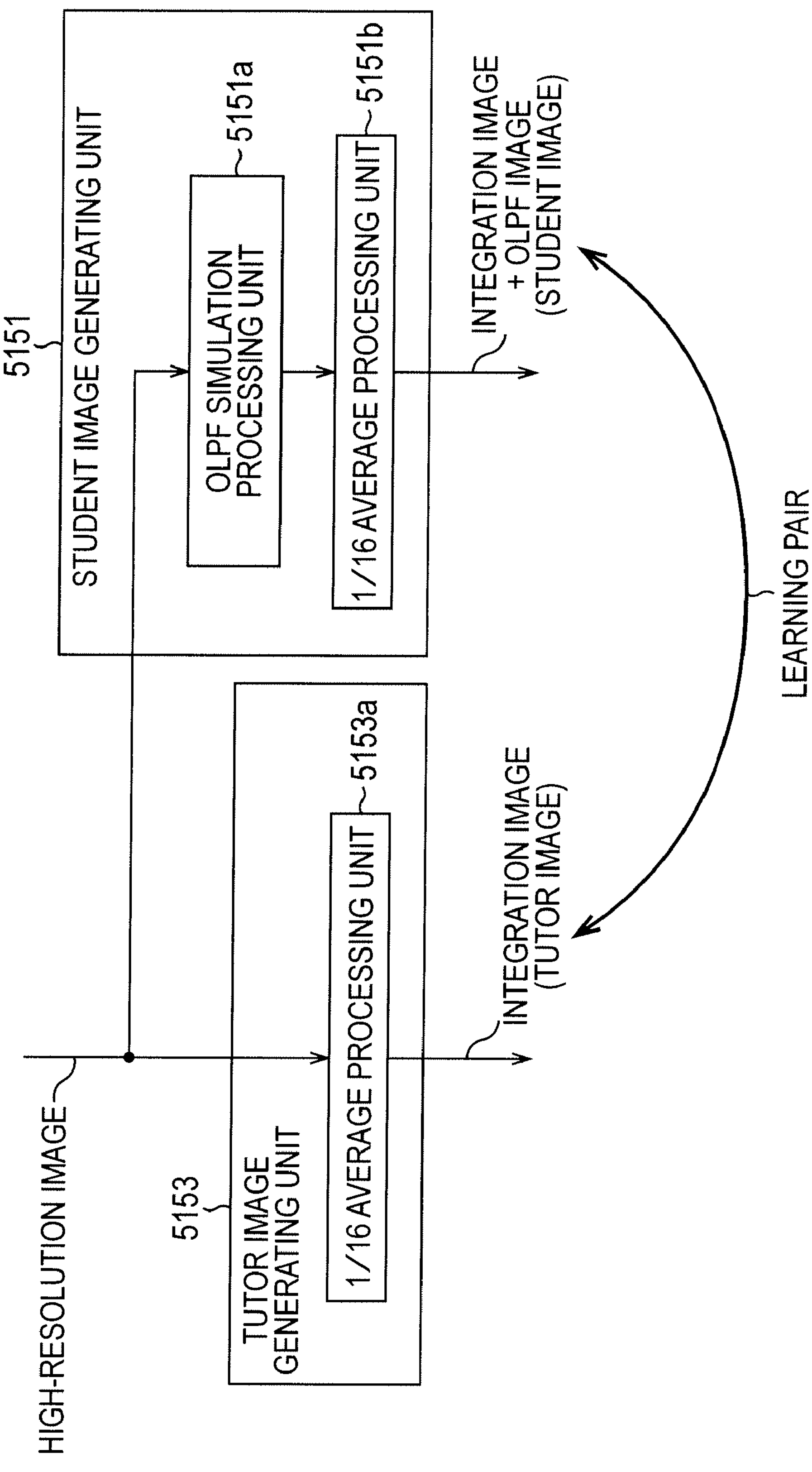

FIG. 344 is a block diagram illustrating the configurations of the tutor image generating unit and student image generating unit of the learning device shown in FIG. 342.

Figure 345:
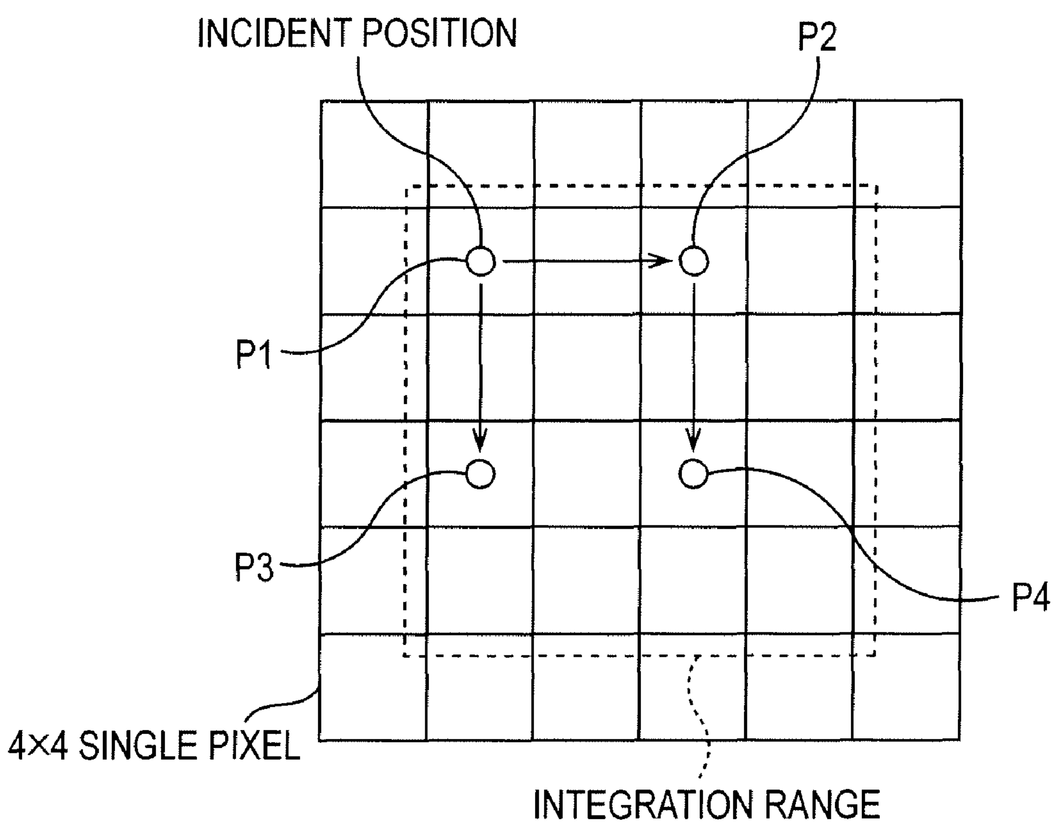

FIG. 345 is a diagram describing a method for generating a student image and a tutor image.

FIG. 346 is a diagram for describing an OLPF simulation method.

Figure 347:
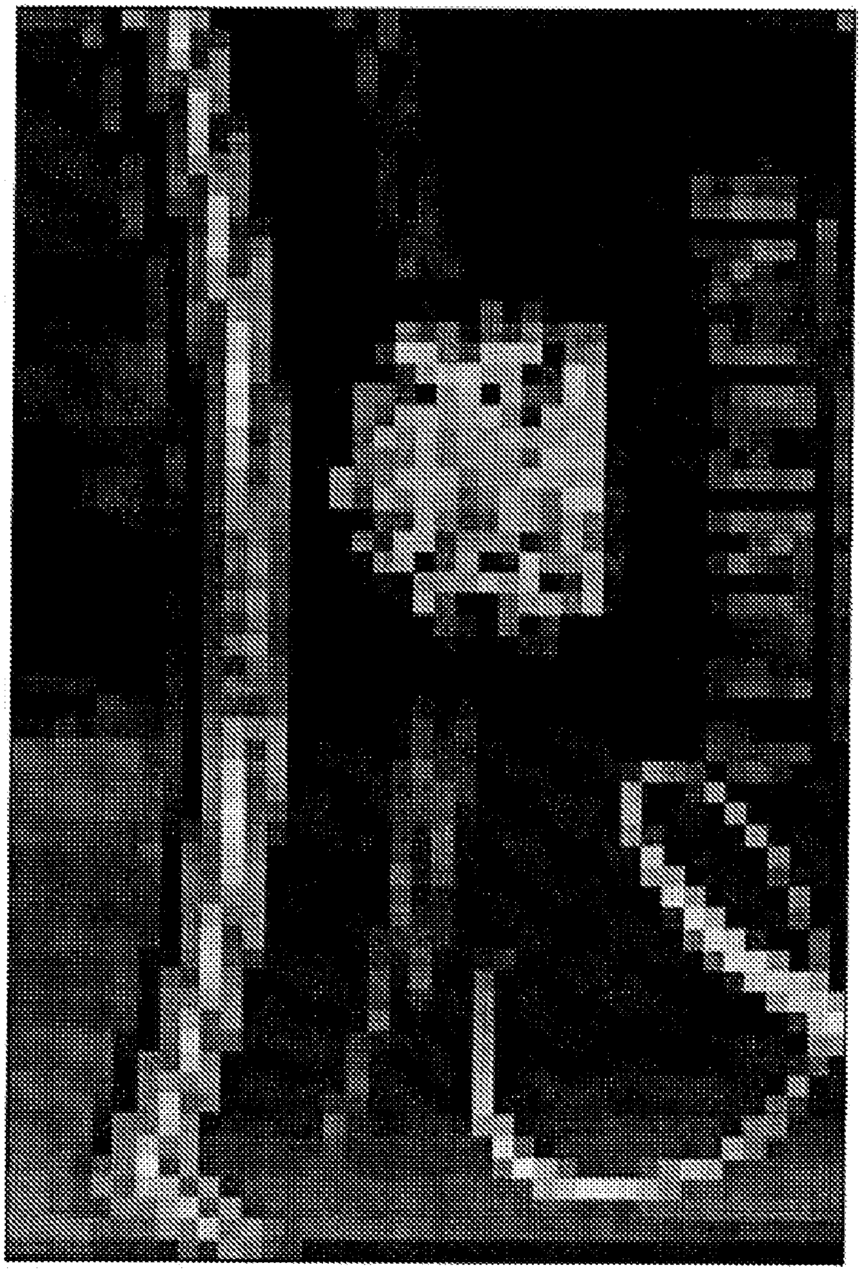

FIG. 347 is a diagram illustrating an example of a tutor image.

Figure 348:
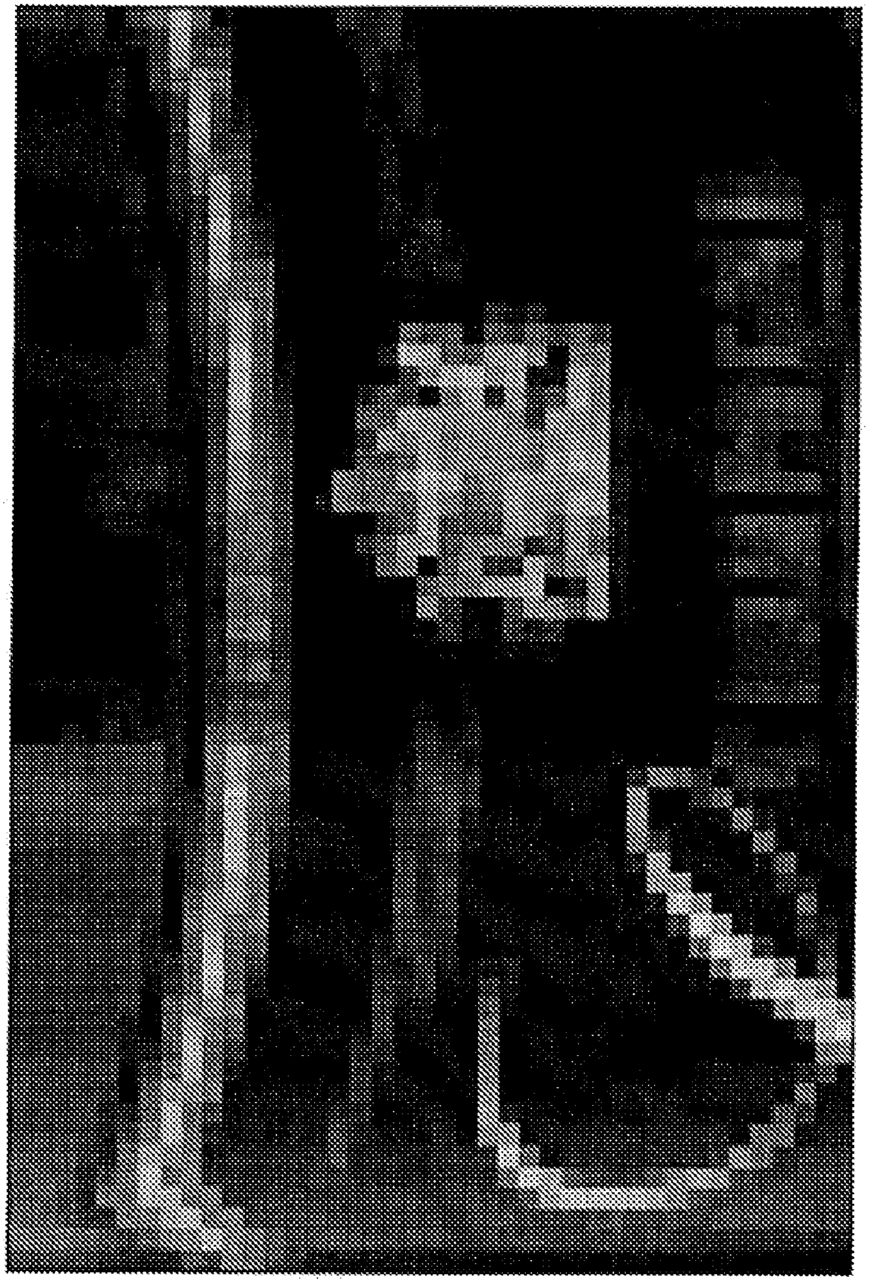

FIG. 348 is a diagram illustrating an example of a student image.

Figure 349:
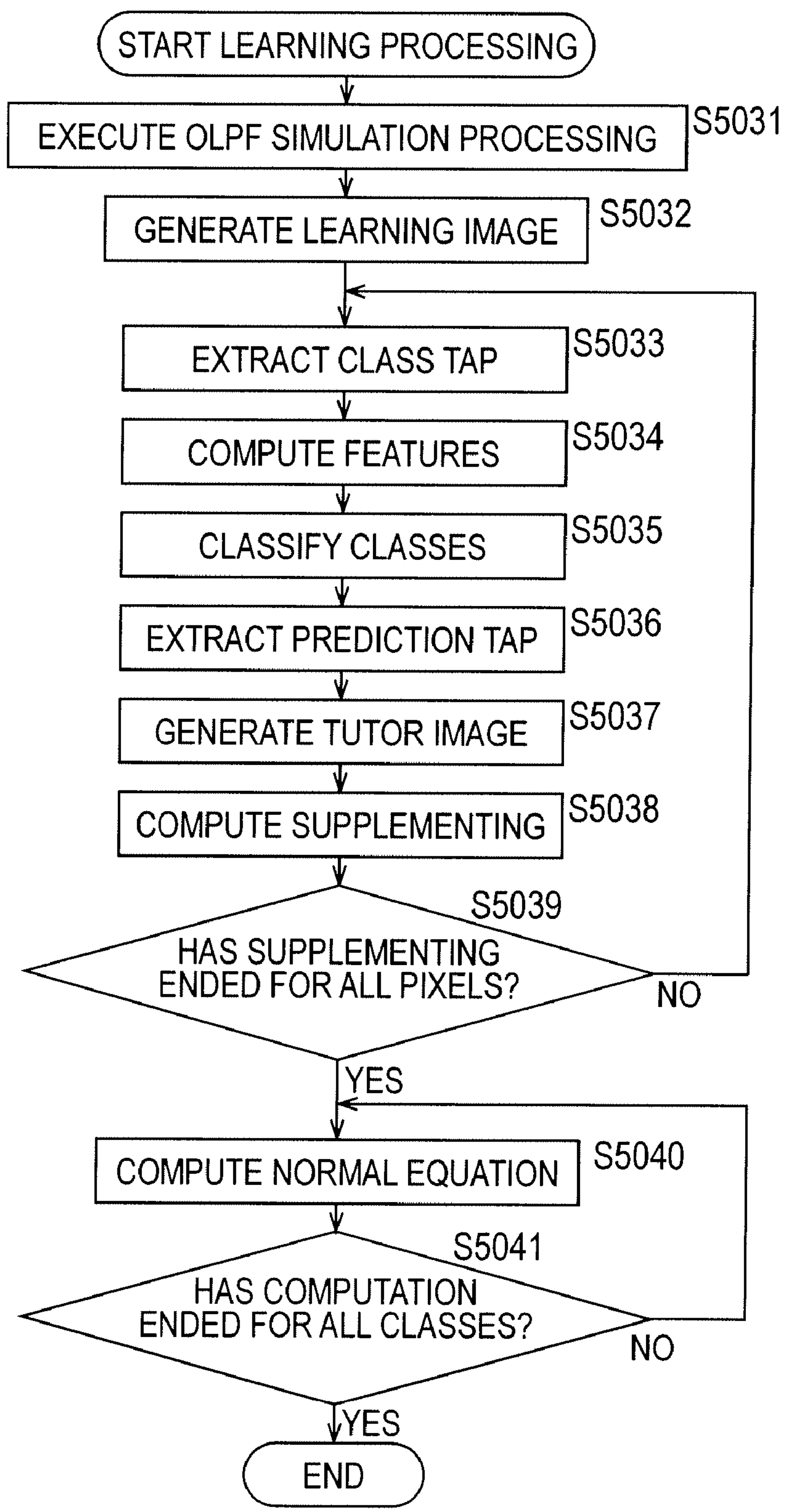

FIG. 349 is a flowchart for describing the processing for learning.

Figure 350:
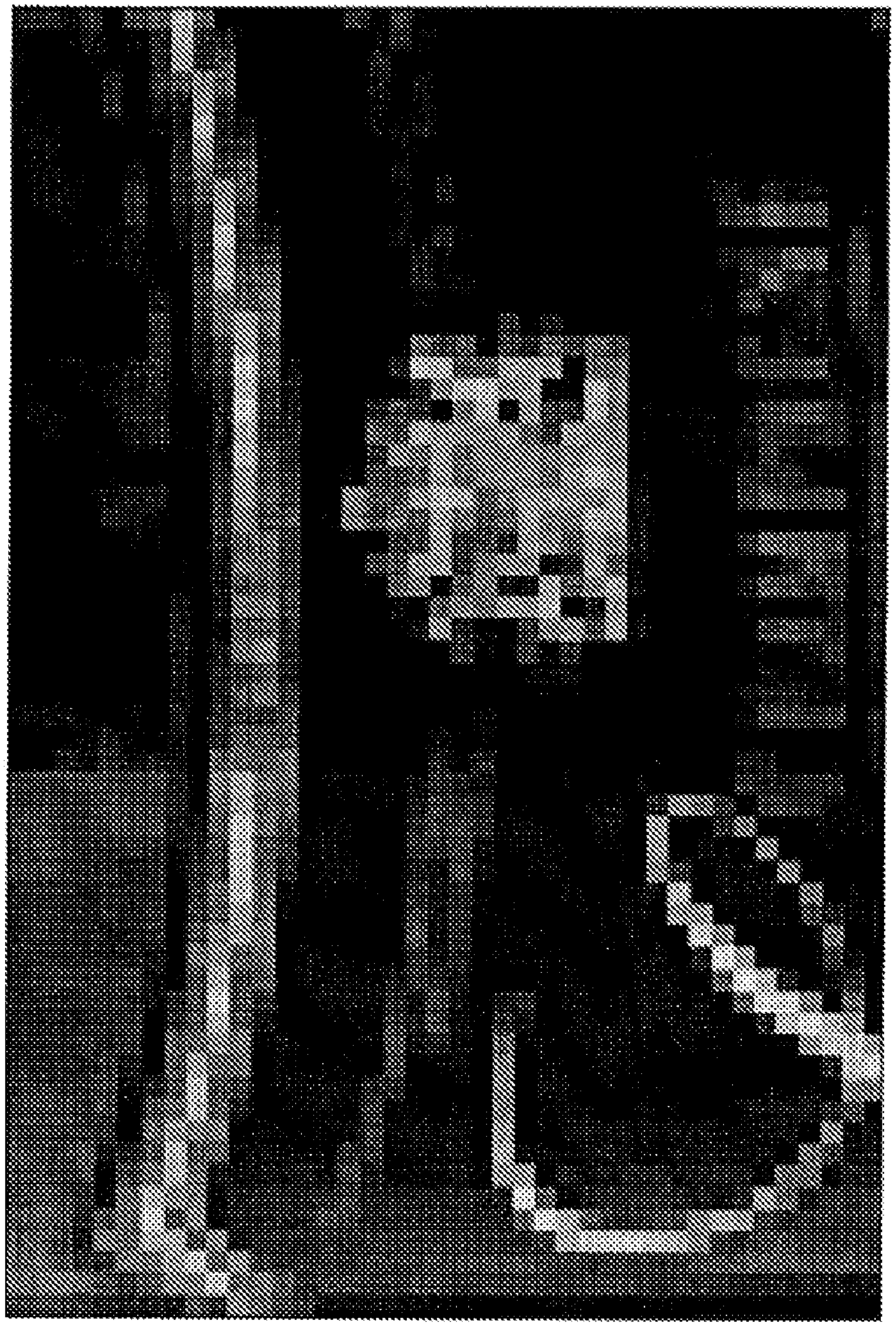

FIG. 350 is a diagram illustrating an image subjected to the OLPF removal processing.

Figure 351:
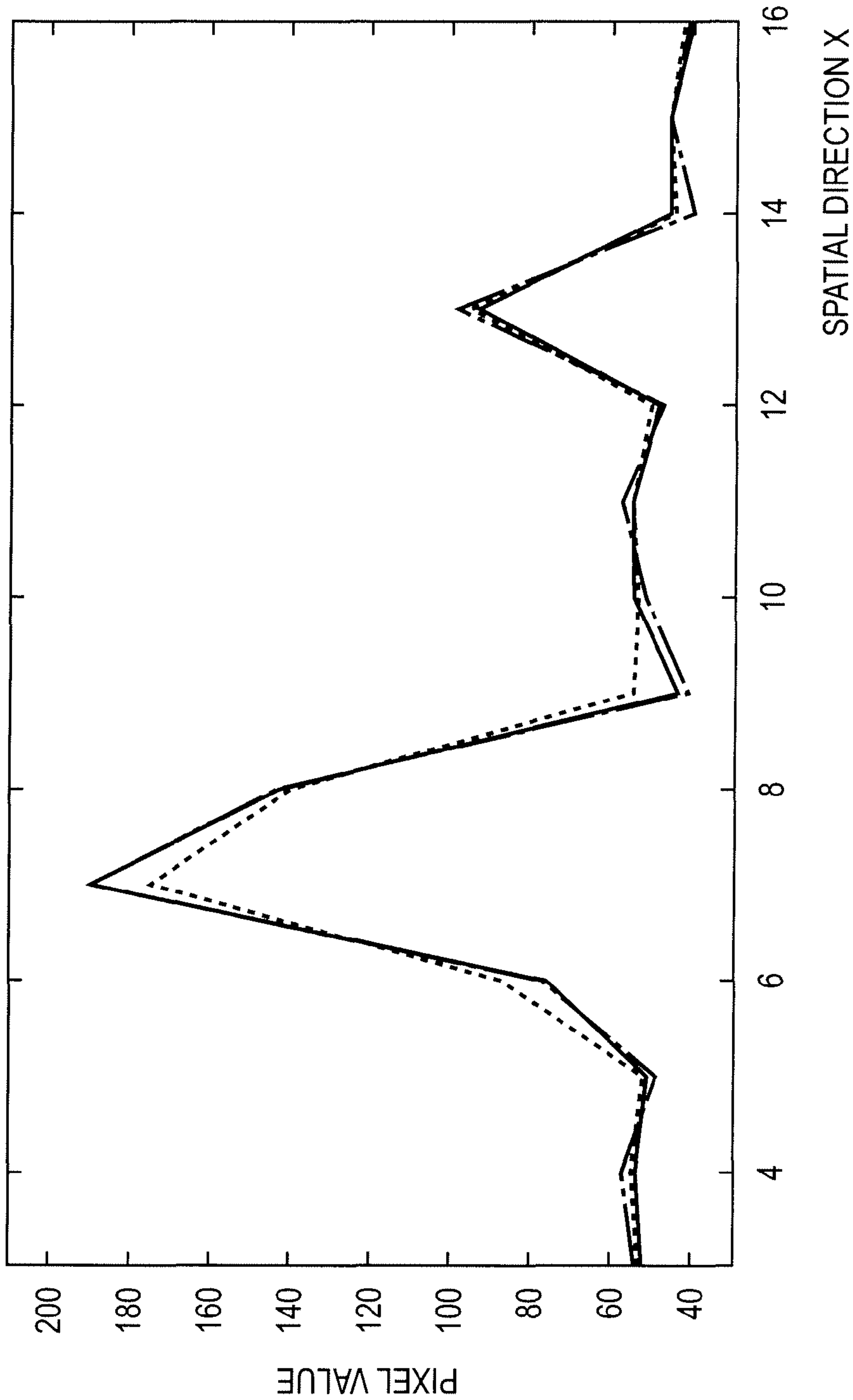

FIG. 351 is a diagram for describing comparison between an image subjected to the OLPF removal processing and an image not subjected to the OLPF removal processing.

Figure 352:
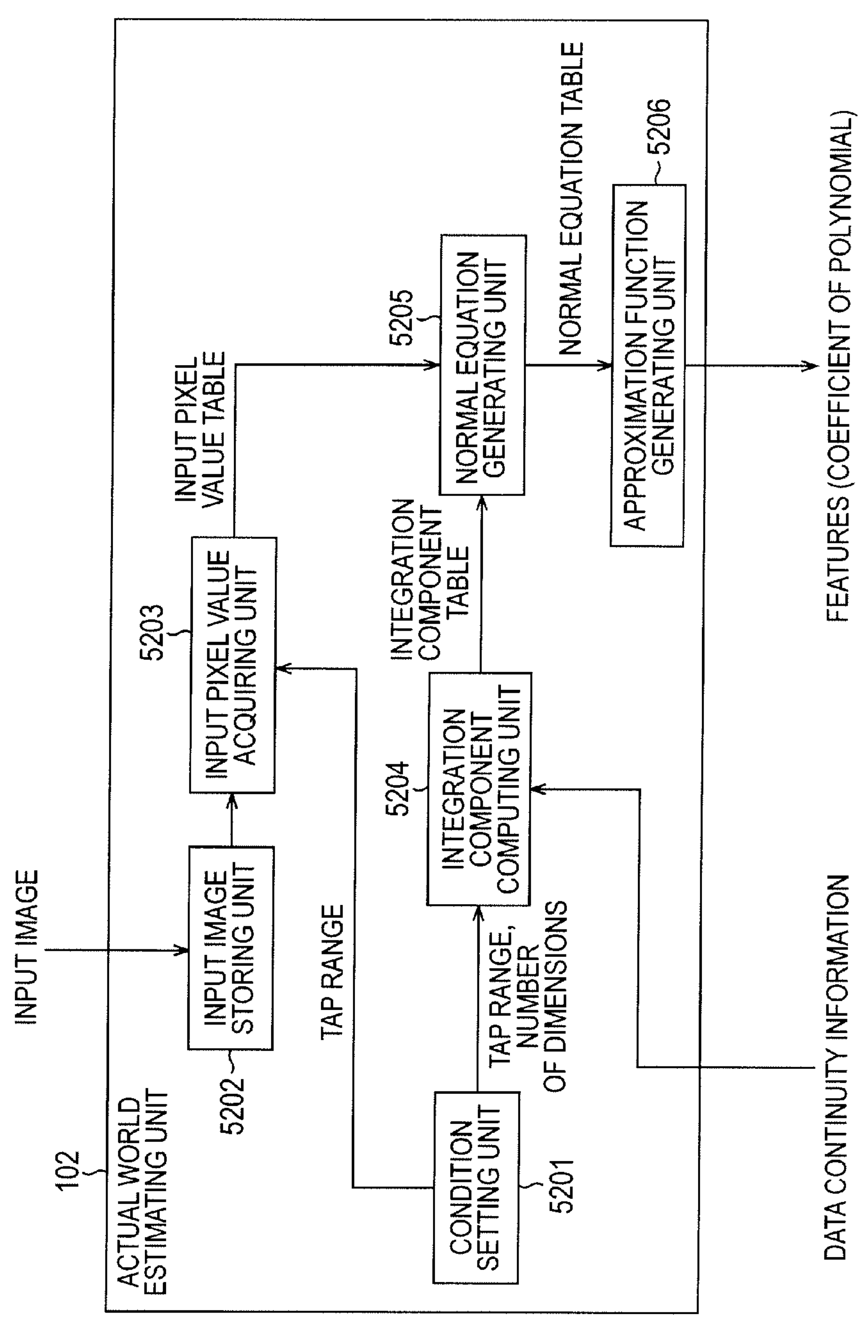

FIG. 352 is a block diagram illustrating the other configuration example of the actual world estimating unit.

Figure 353:
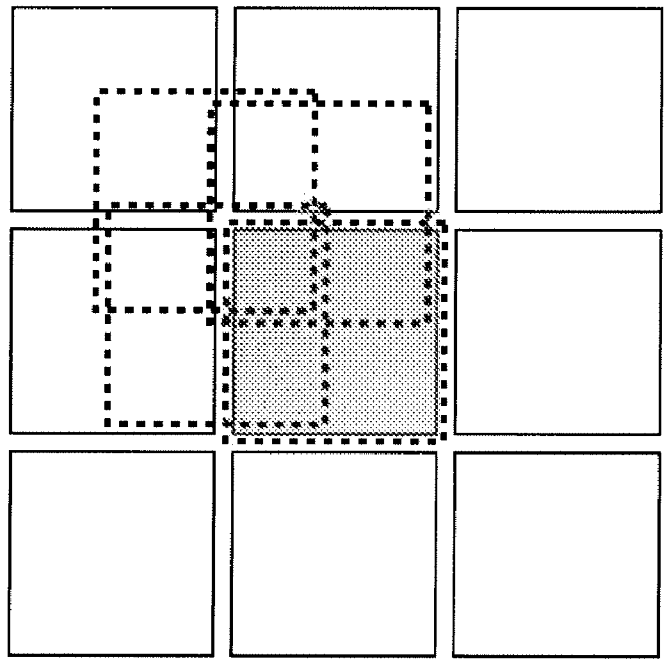

FIG. 353 is a diagram for describing influence by OLPF.

Figure 354:
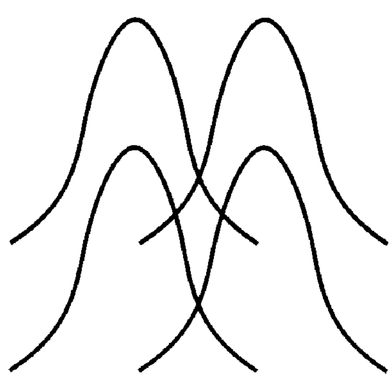

FIG. 354 is a diagram for describing influence by OLPF.

Figure 355:
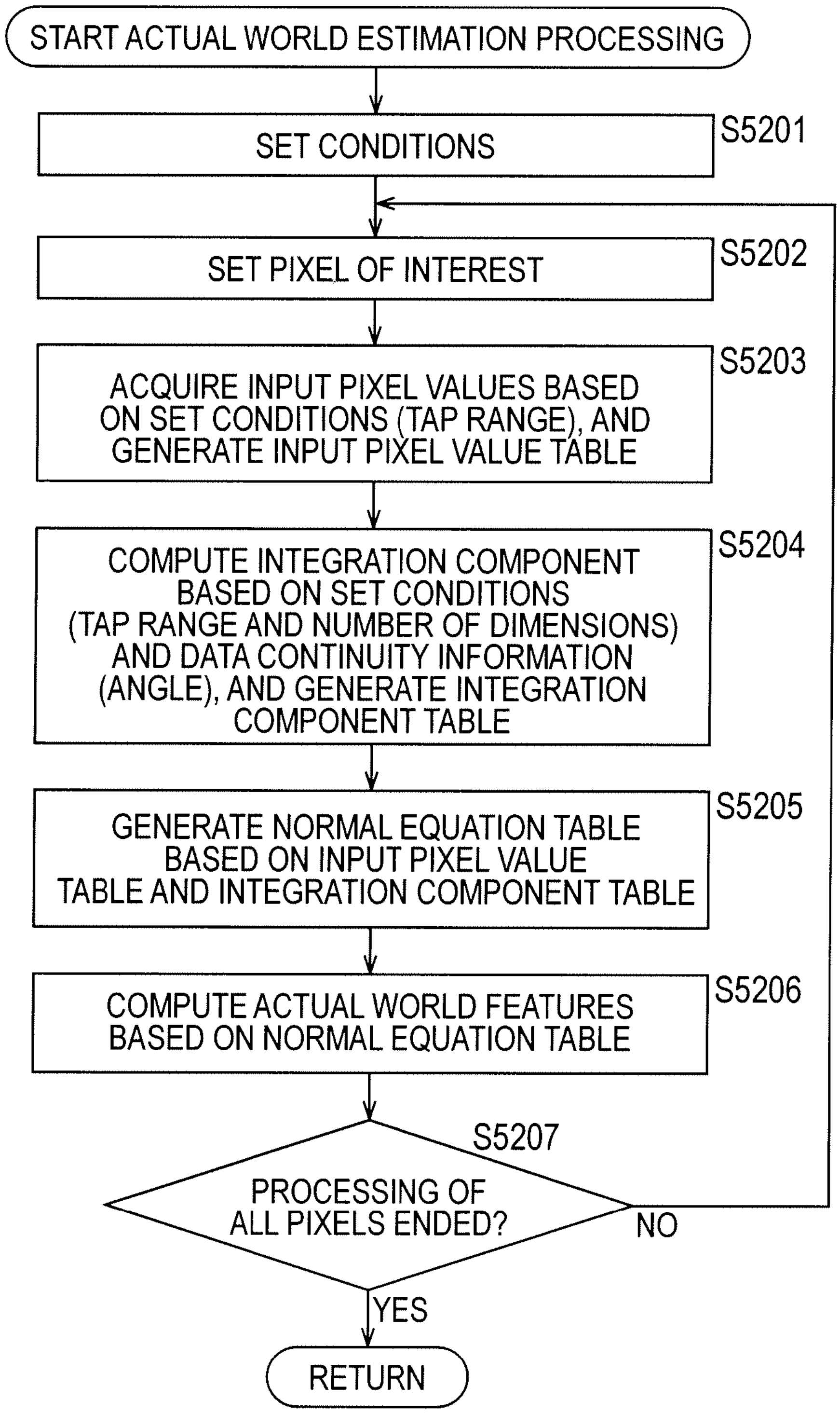

FIG. 355 is a flowchart for describing the processing of actual world estimation with the actual world estimating unit shown in FIG. 352.

Figure 356:
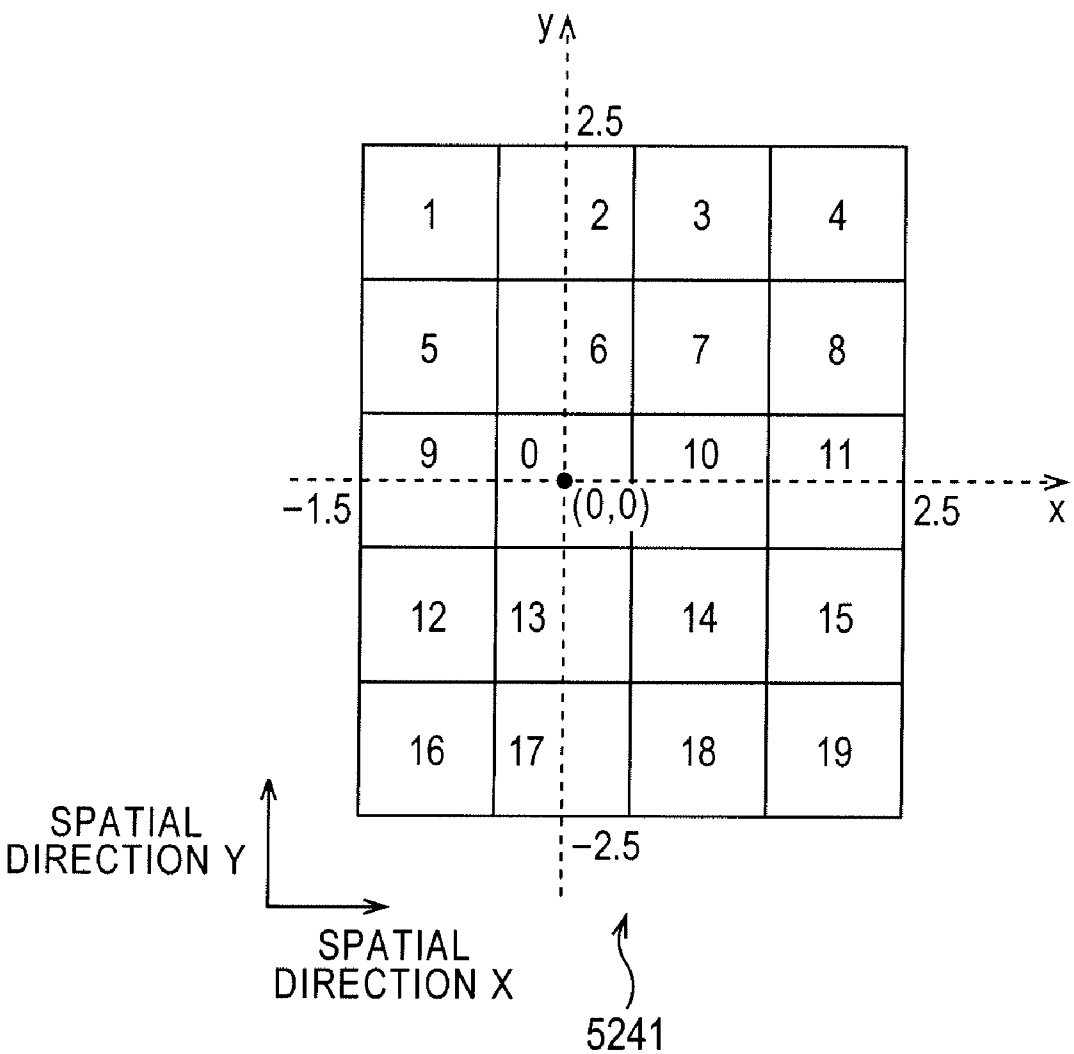

FIG. 356 is a diagram illustrating an example of a tap to be extracted.

Figure 357:
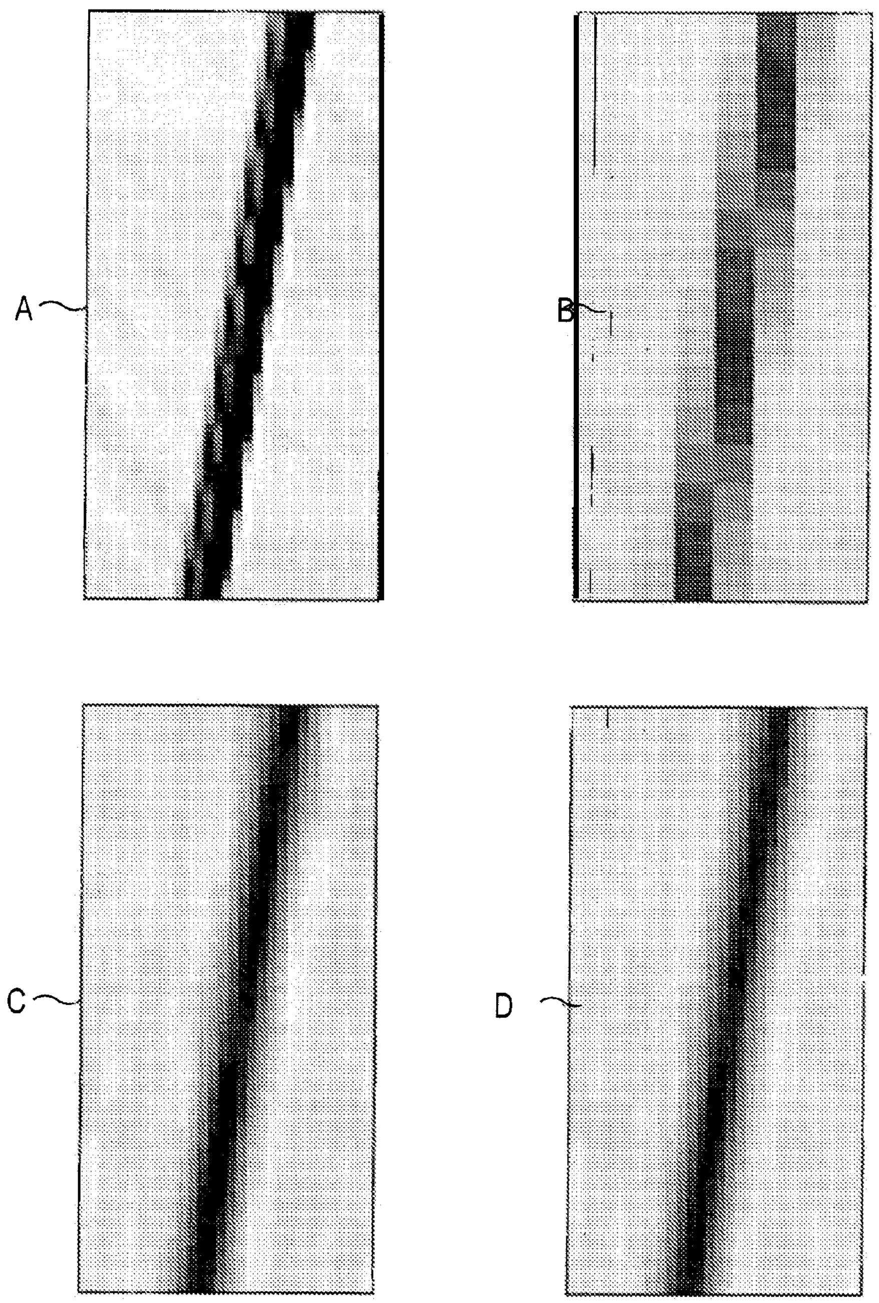

FIG. 357 is a diagram for comparing an image generated from the approximation function of the actual world estimated by the actual world estimating unit shown in FIG. 352 with an image generated with a technique other than that.

Figure 358:
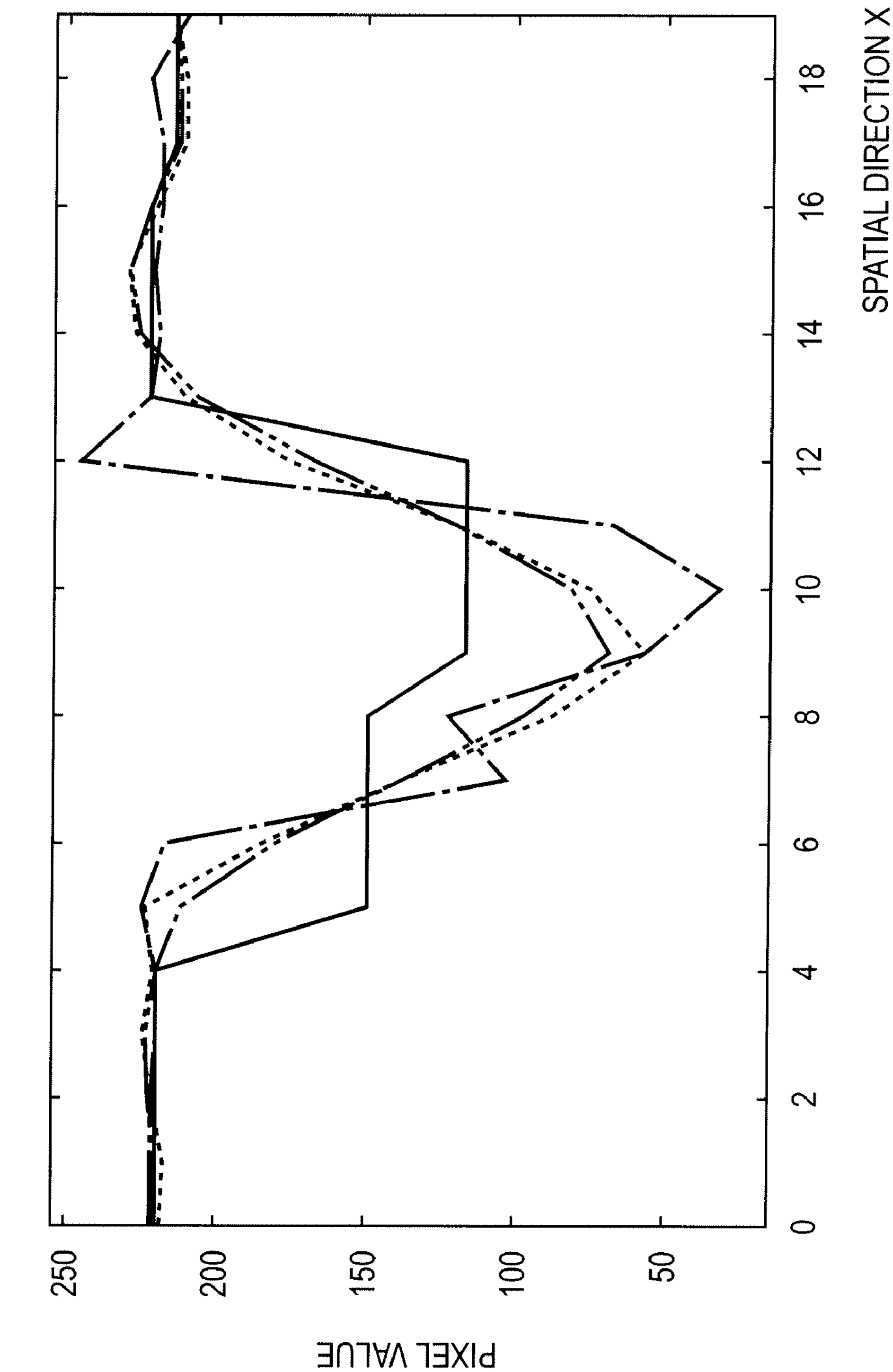

FIG. 358 is a diagram for comparing an image generated from the approximation function of the actual world estimated by the actual world estimating unit shown in FIG. 352 with an image generated with a technique other than that.

Figure 359:
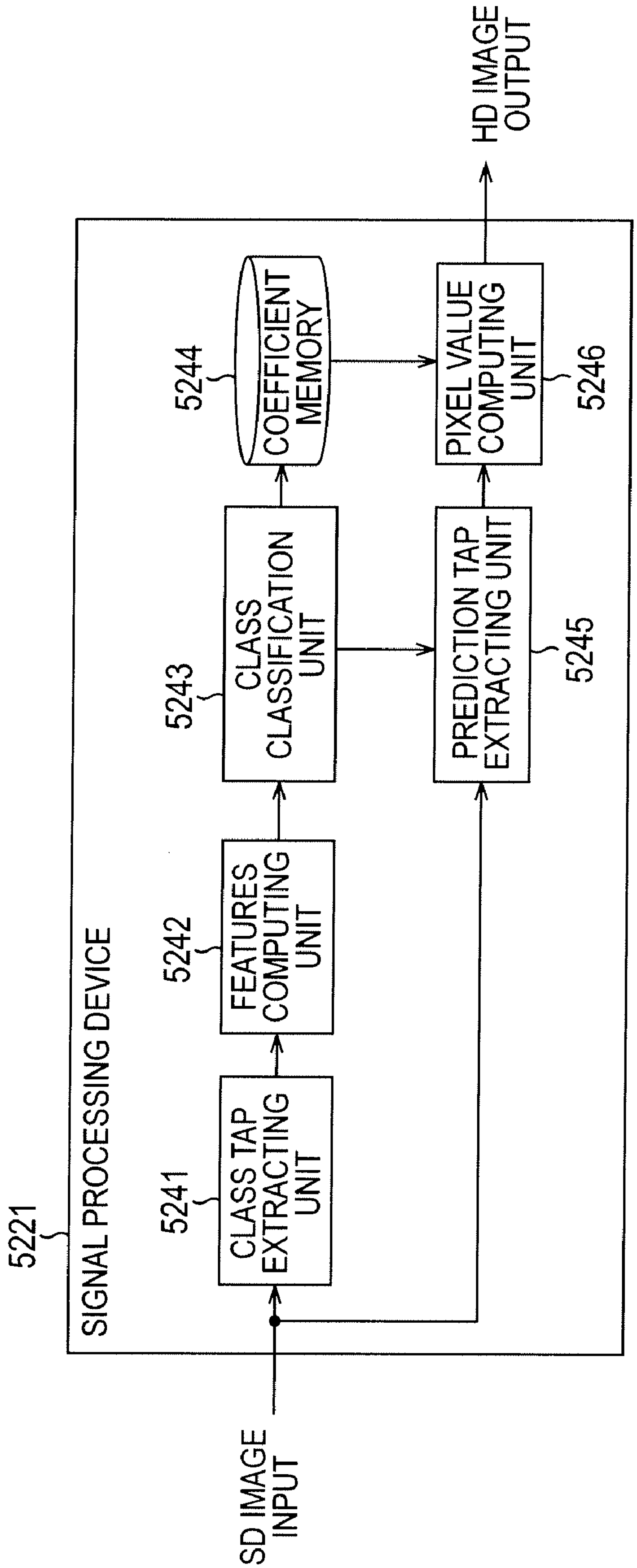

FIG. 359 is a block diagram illustrating the other configuration of the signal processing device.

Figure 360:
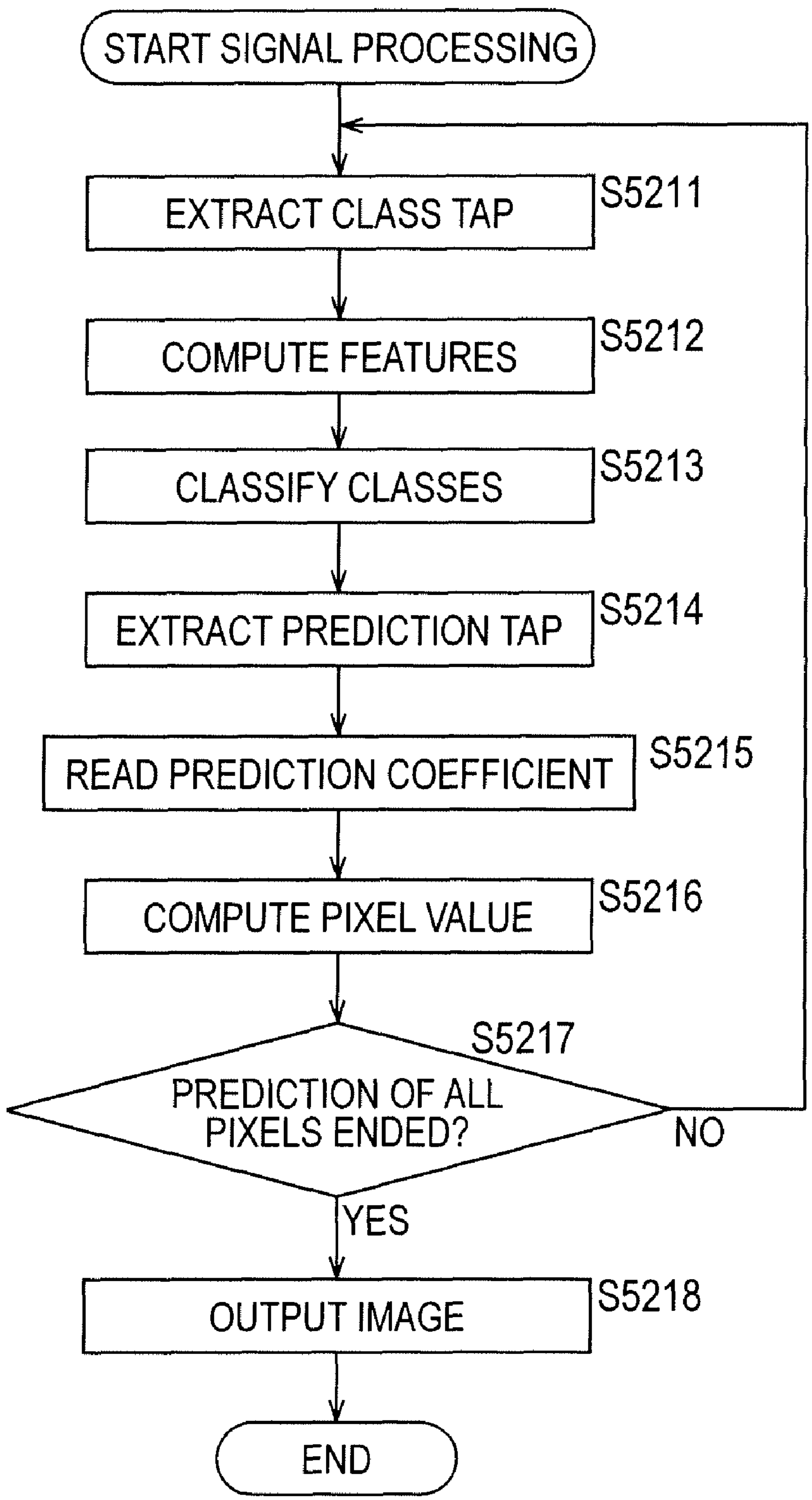

FIG. 360 is a flowchart for describing signal processing with the signal processing device shown in FIG. 359.

Figure 361:
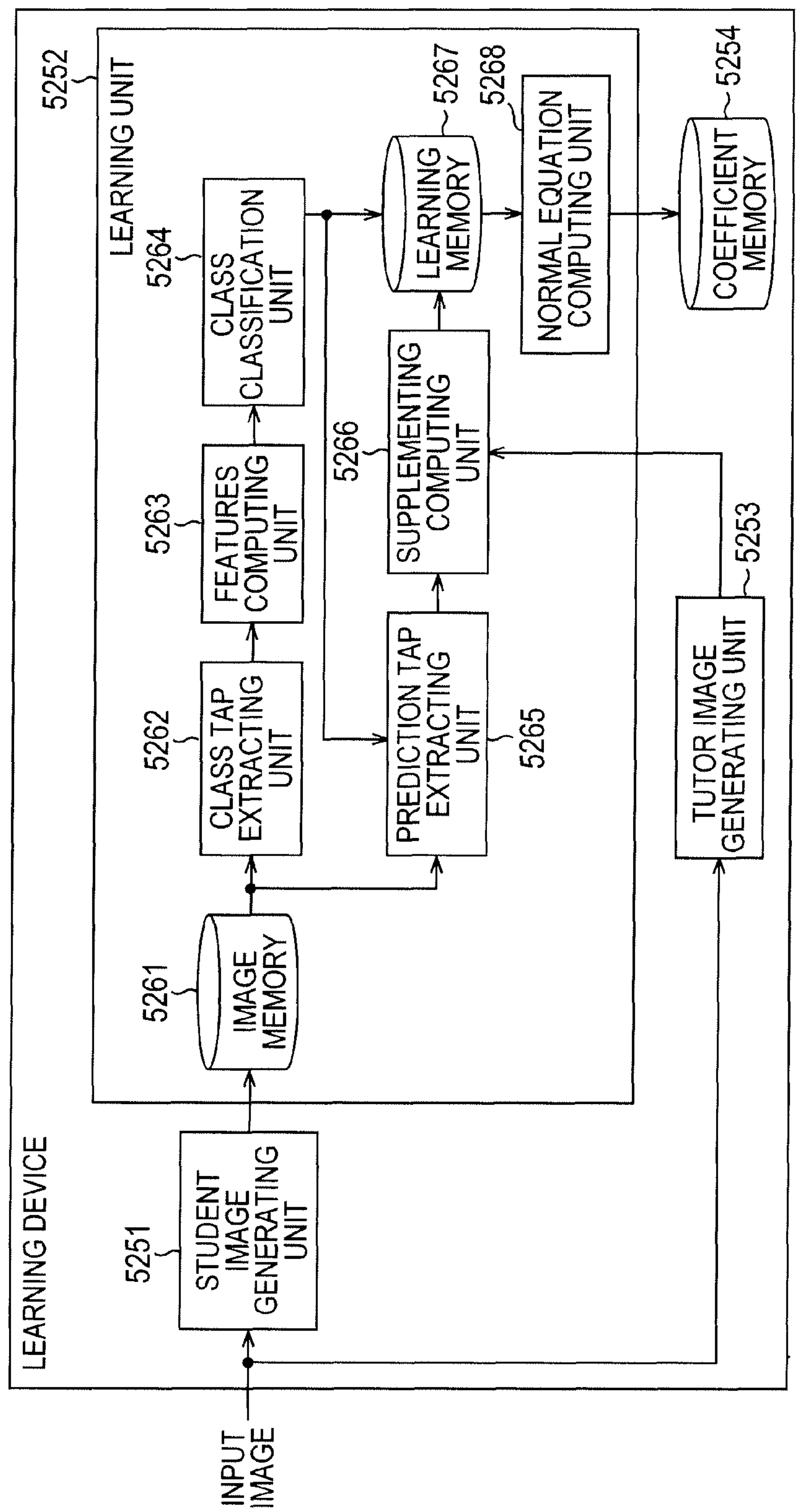

FIG. 361 is a block diagram illustrating the configuration of a learning device for learning the coefficient of the signal processing device shown in FIG. 359.

Figure 362:
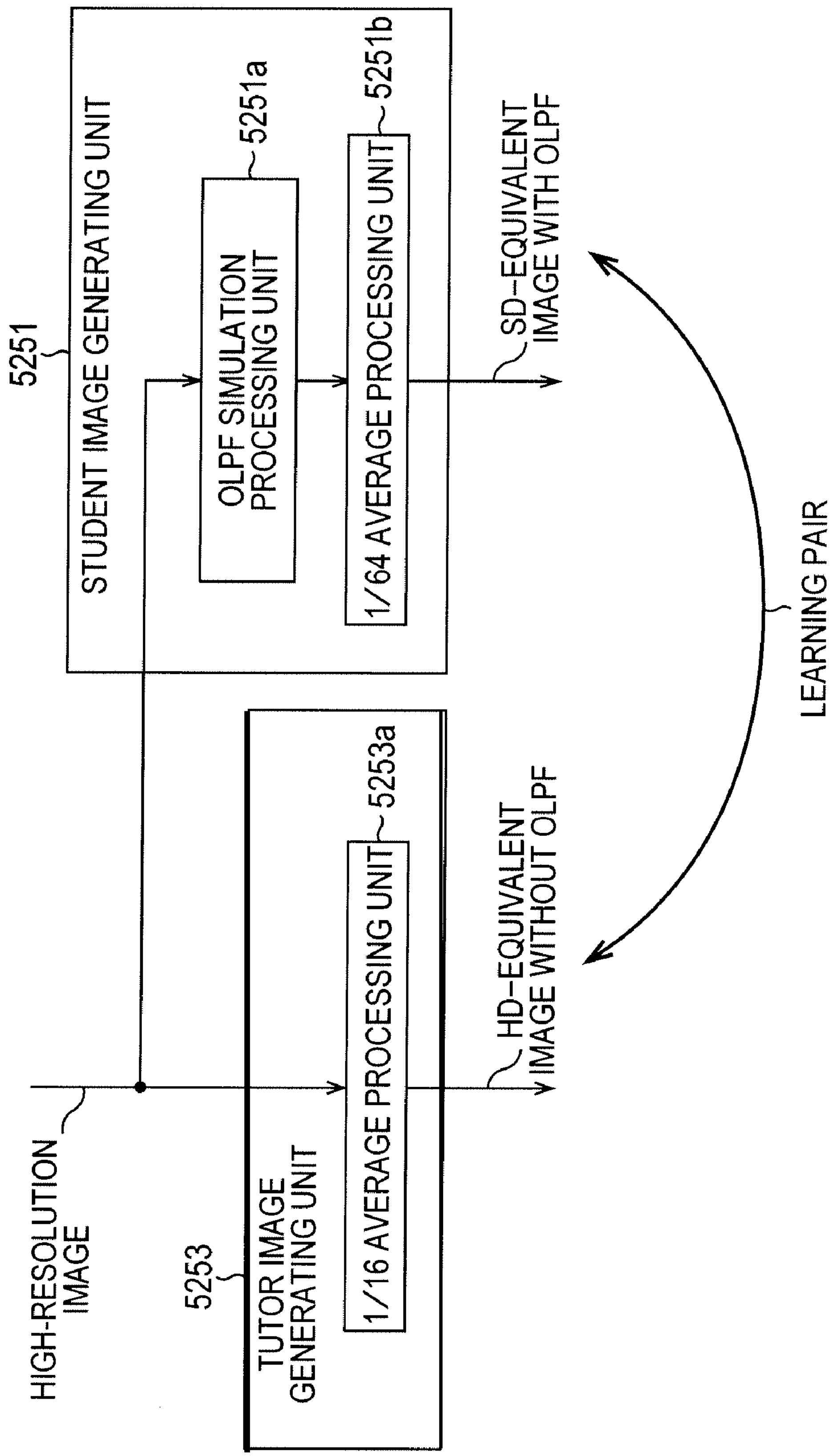

FIG. 362 is a block diagram illustrating the configuration of the tutor image generating unit and student image generating unit shown in FIG. 361.

Figure 363:
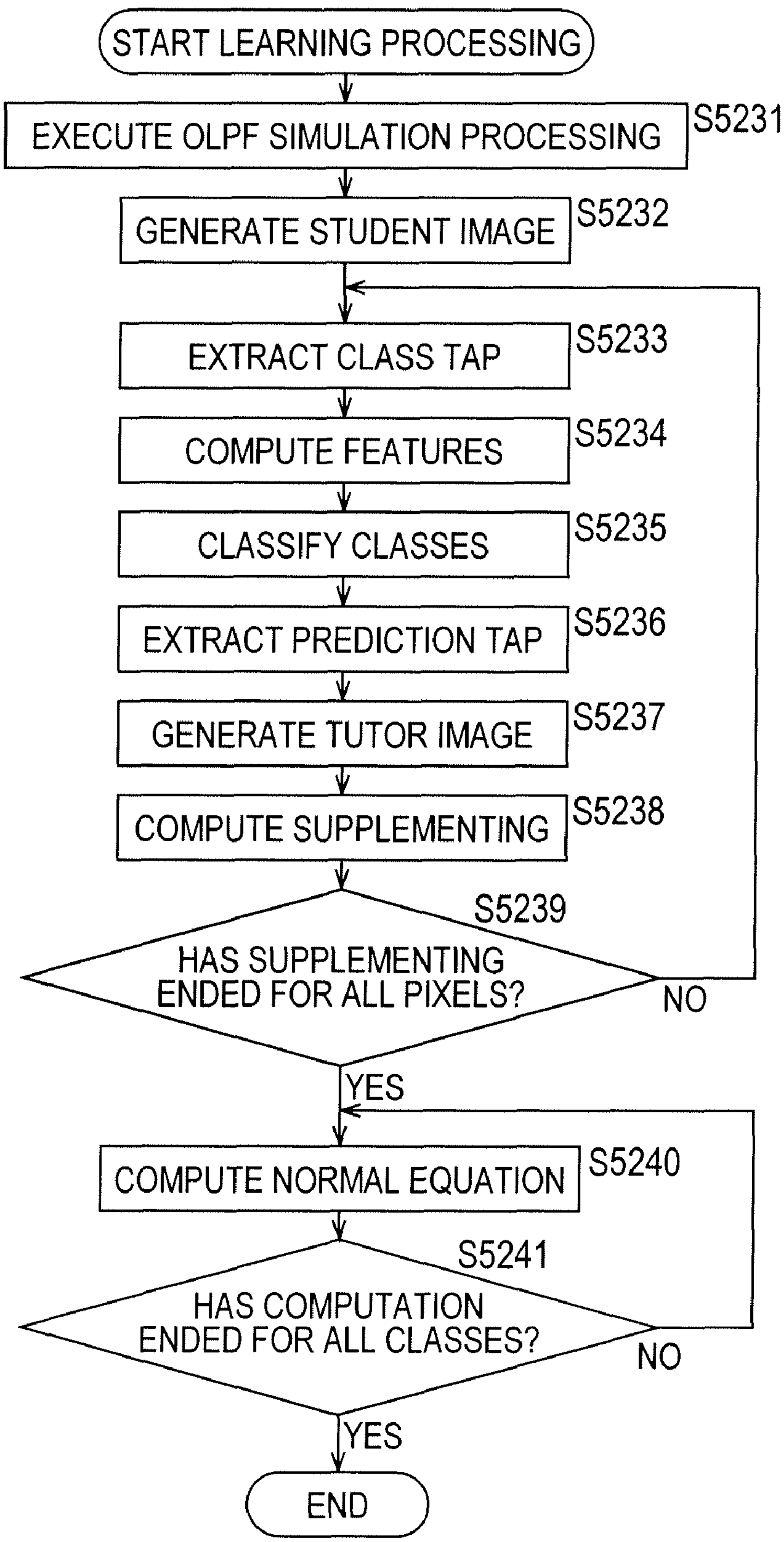

FIG. 363 is a flowchart for describing the processing of learning with the learning device shown in FIG. 361.

Figure 364:
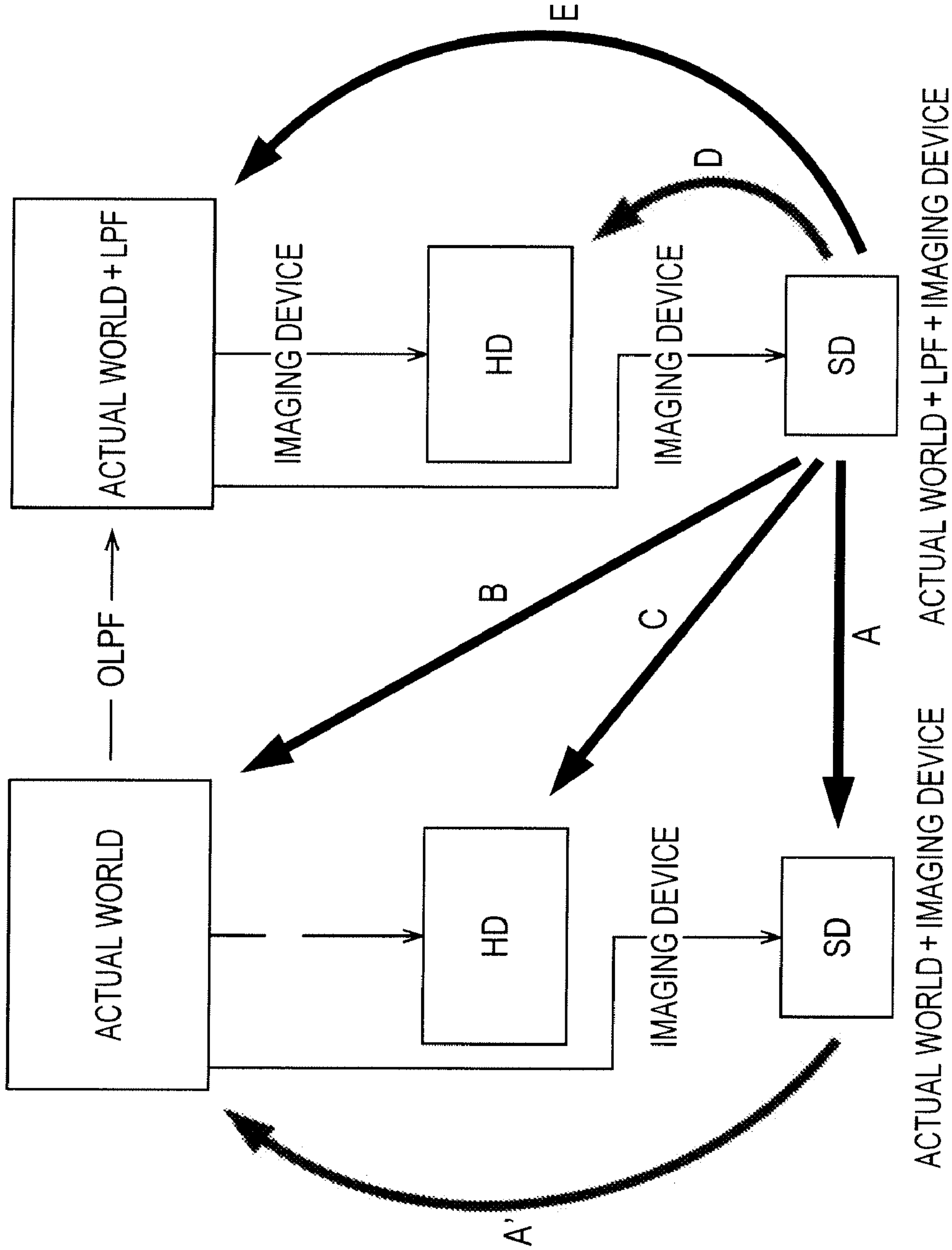

FIG. 364 is a diagram for describing the relationship between various types of image processing.

Figure 365:
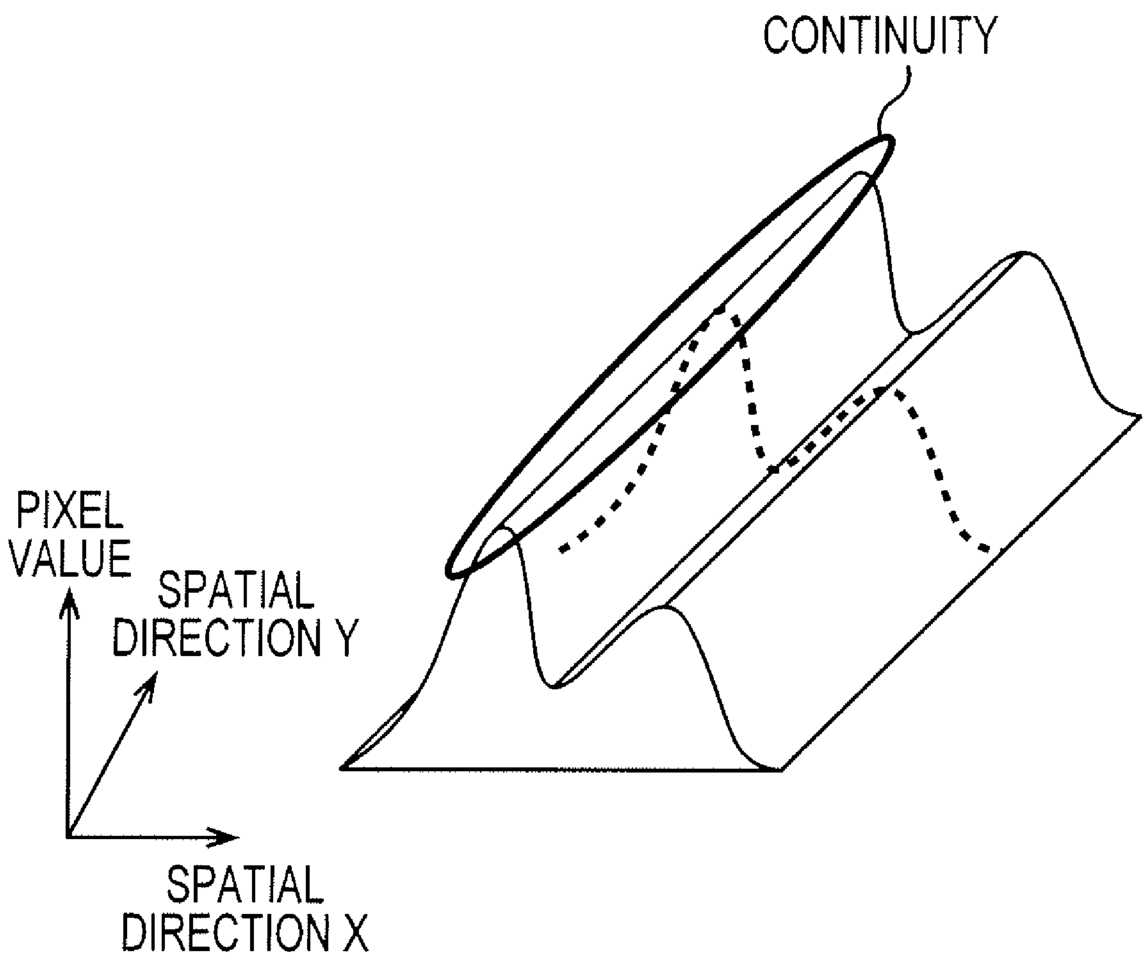

FIG. 365 is a diagram for describing actual world estimation with an approximation function made up of a continuous function.

Figure 366:
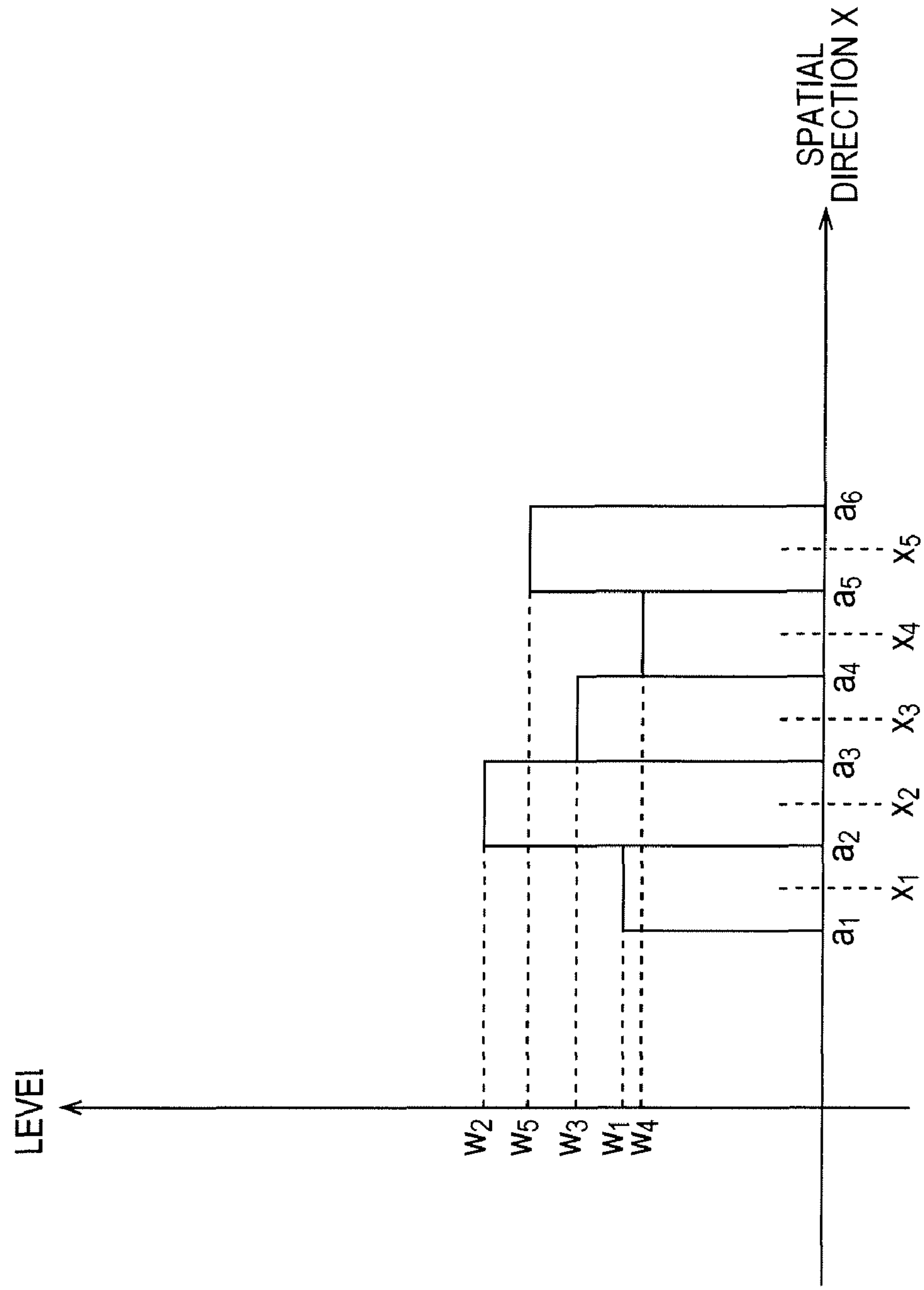

FIG. 366 is a diagram for describing an approximation function made up of a discontinuous function.

Figure 367:
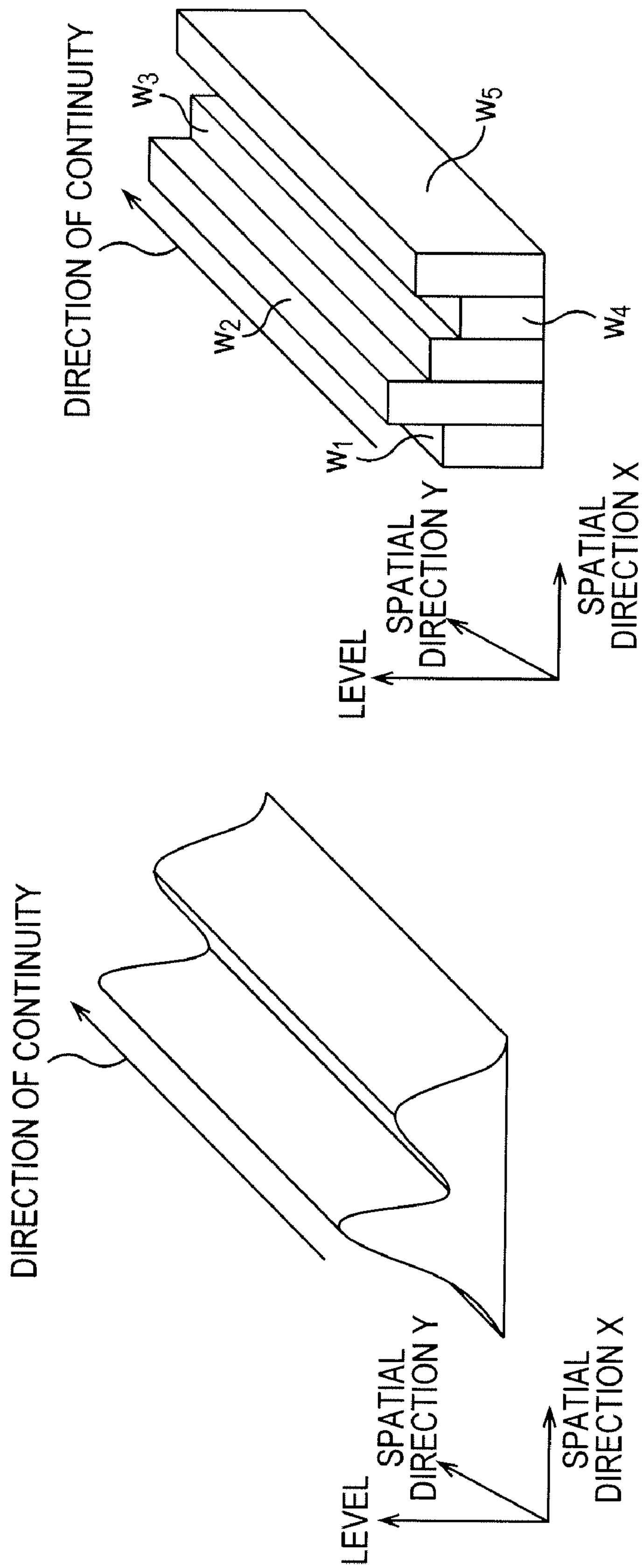

FIG. 367 is a diagram for describing an approximation function made up of a continuous function and a discontinuous function.

Figure 368:
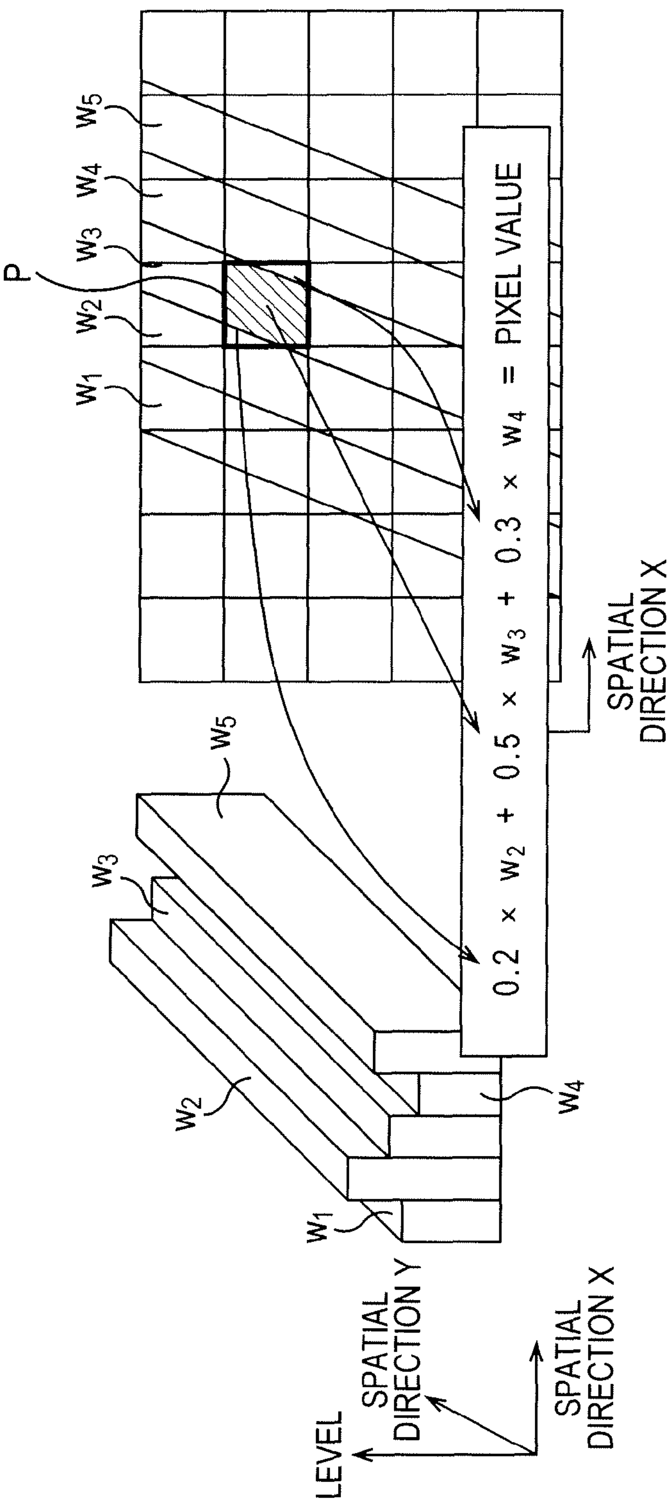

FIG. 368 is a diagram for describing a method for obtaining pixel values using an approximation function made up of a discontinuous function.

Figure 369:
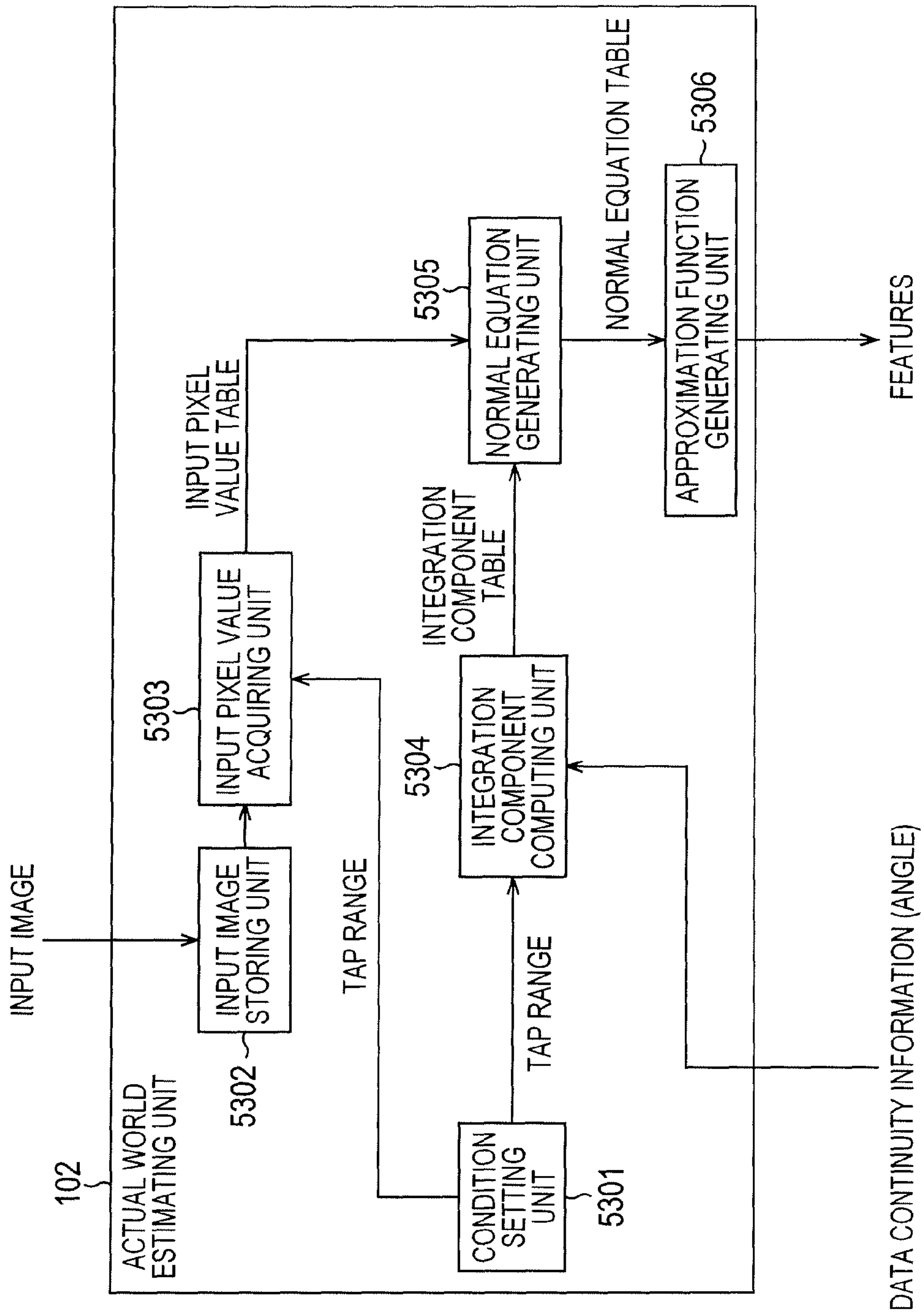

FIG. 369 is a block diagram illustrating the other configuration of the actual world estimating unit.

Figure 370:
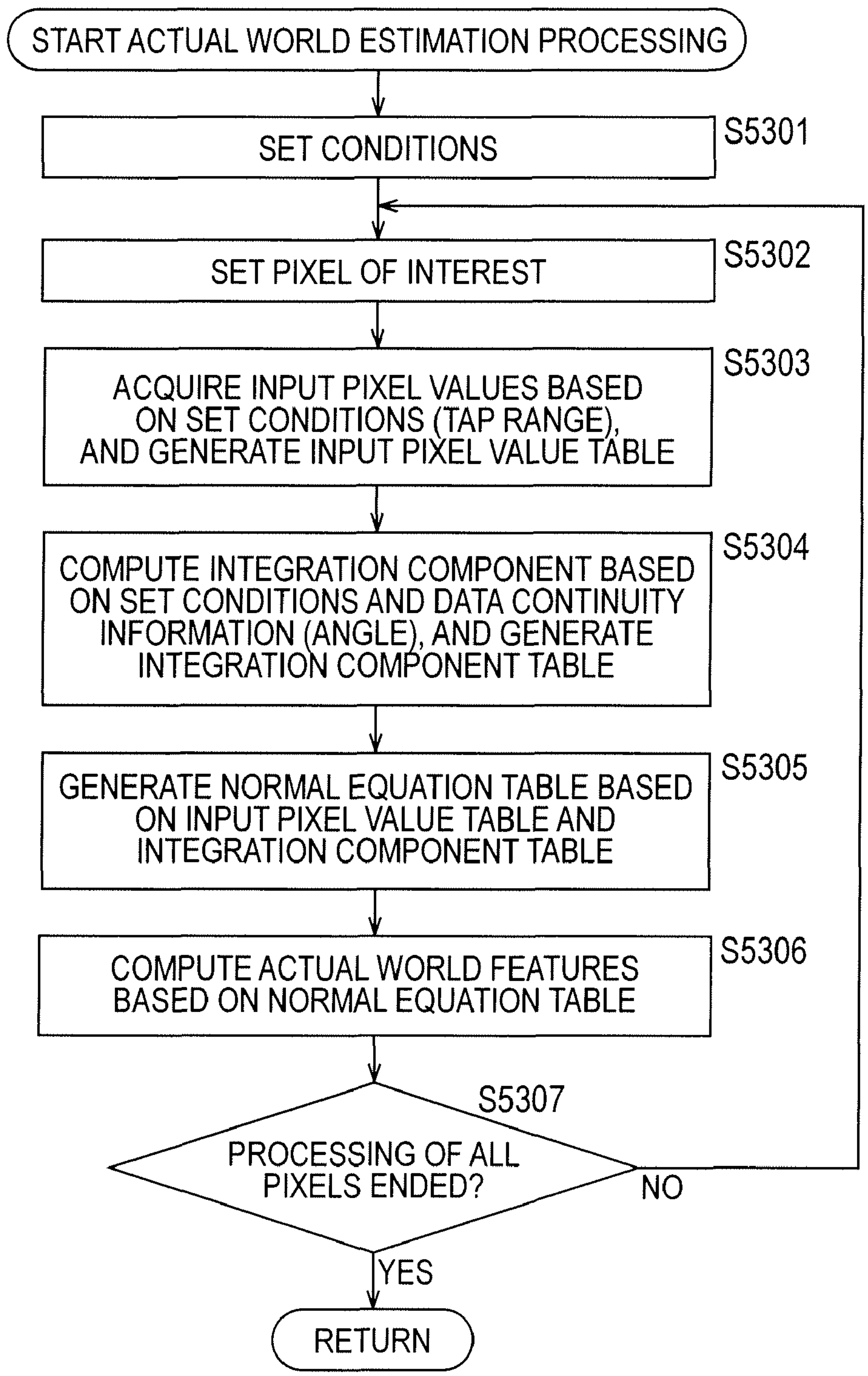

FIG. 370 is a flowchart for describing the processing of actual world estimation with the actual world estimating unit shown in FIG. 369.

Figure 371:
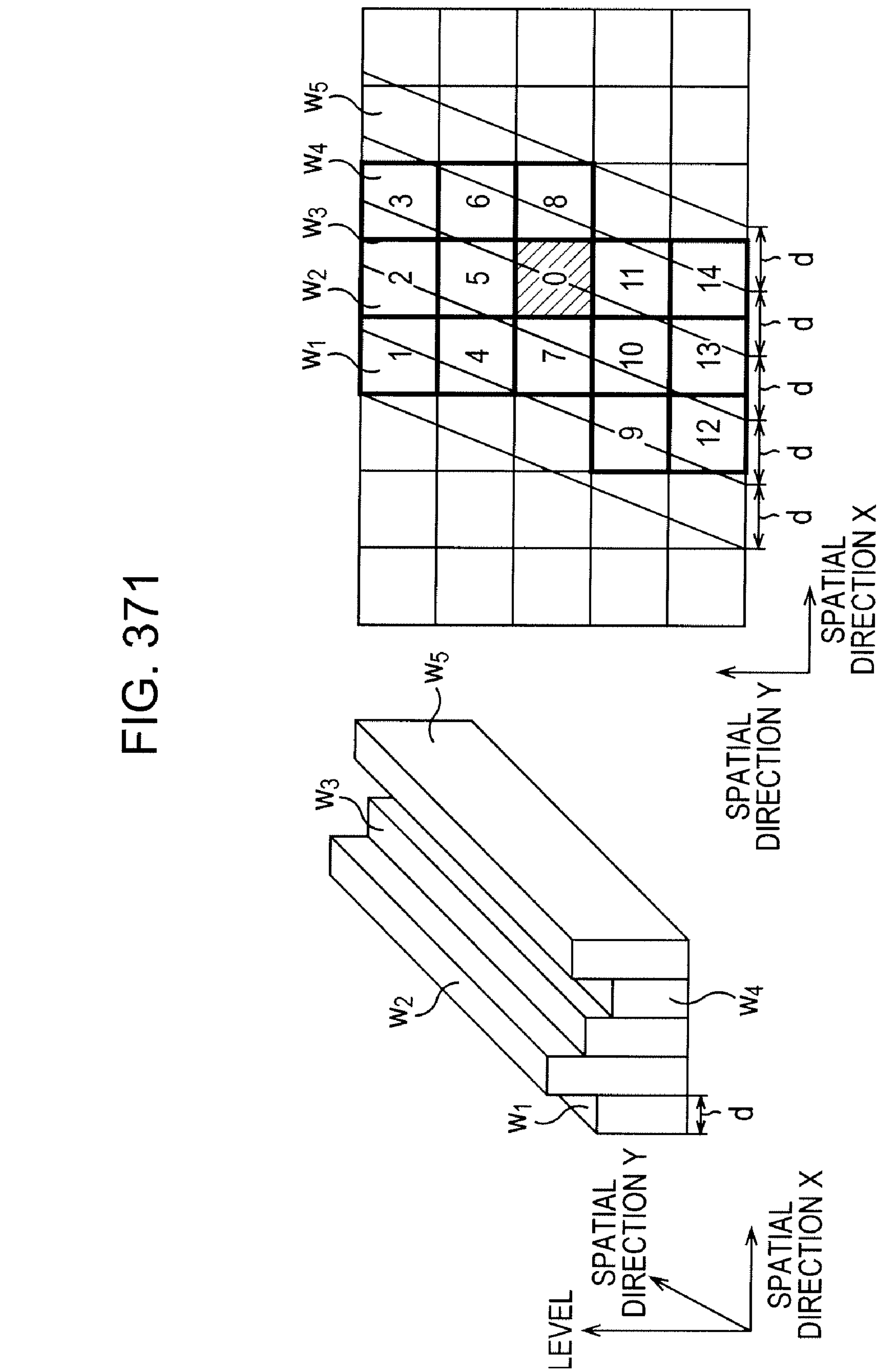

FIG. 371 is a diagram illustrating an example of a tap to be extracted.

Figure 372:
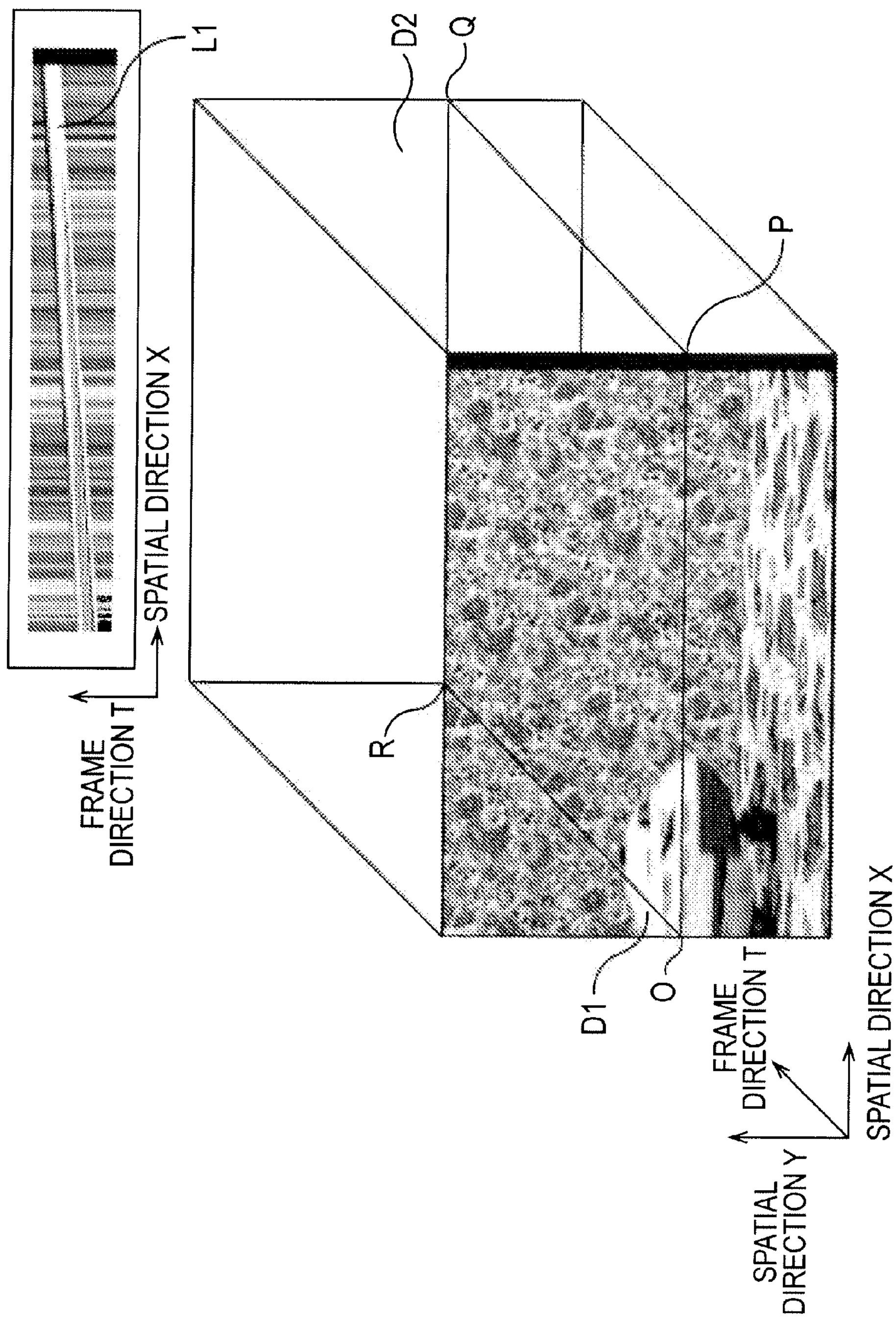

FIG. 372 is a diagram for describing an approximation function made up of a discontinuous function on the X-t plane.

Figure 373:
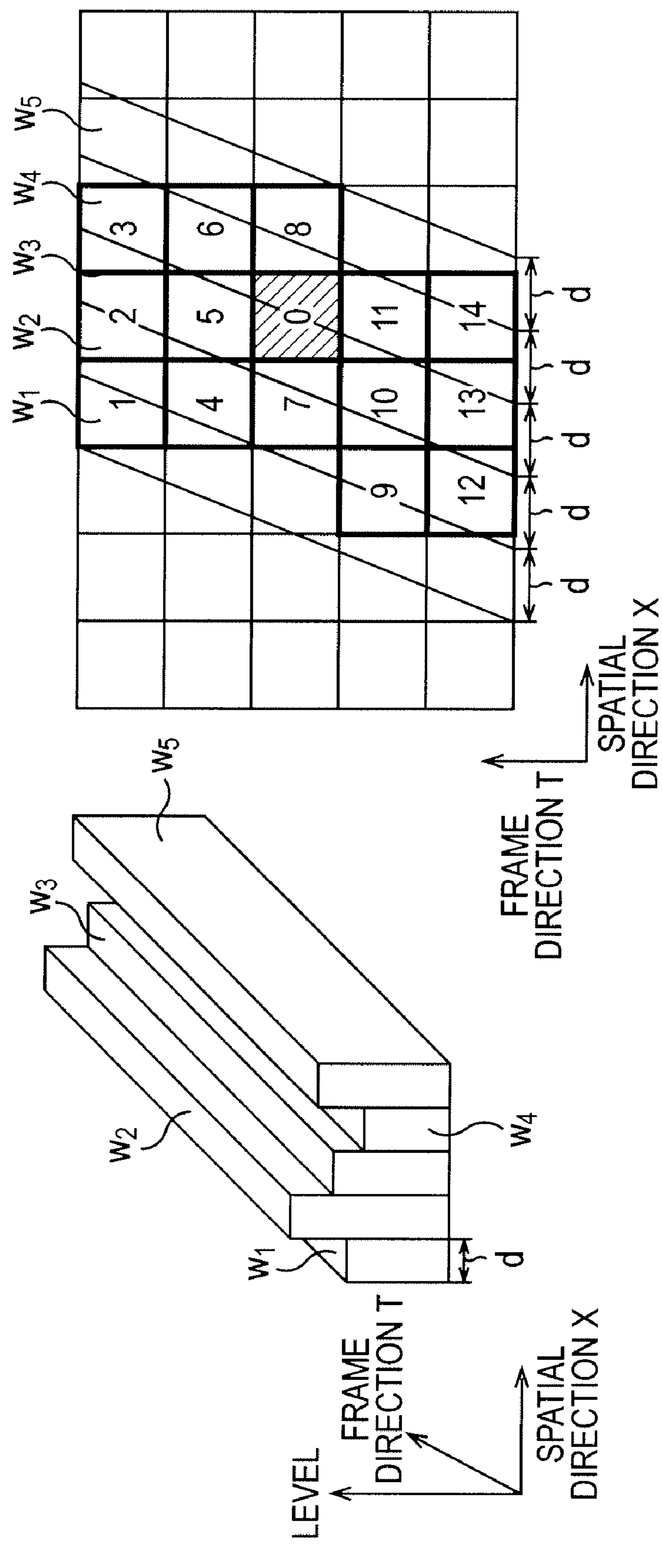

FIG. 373 is a diagram for describing the other example of a tap to be extracted.

Figure 374:
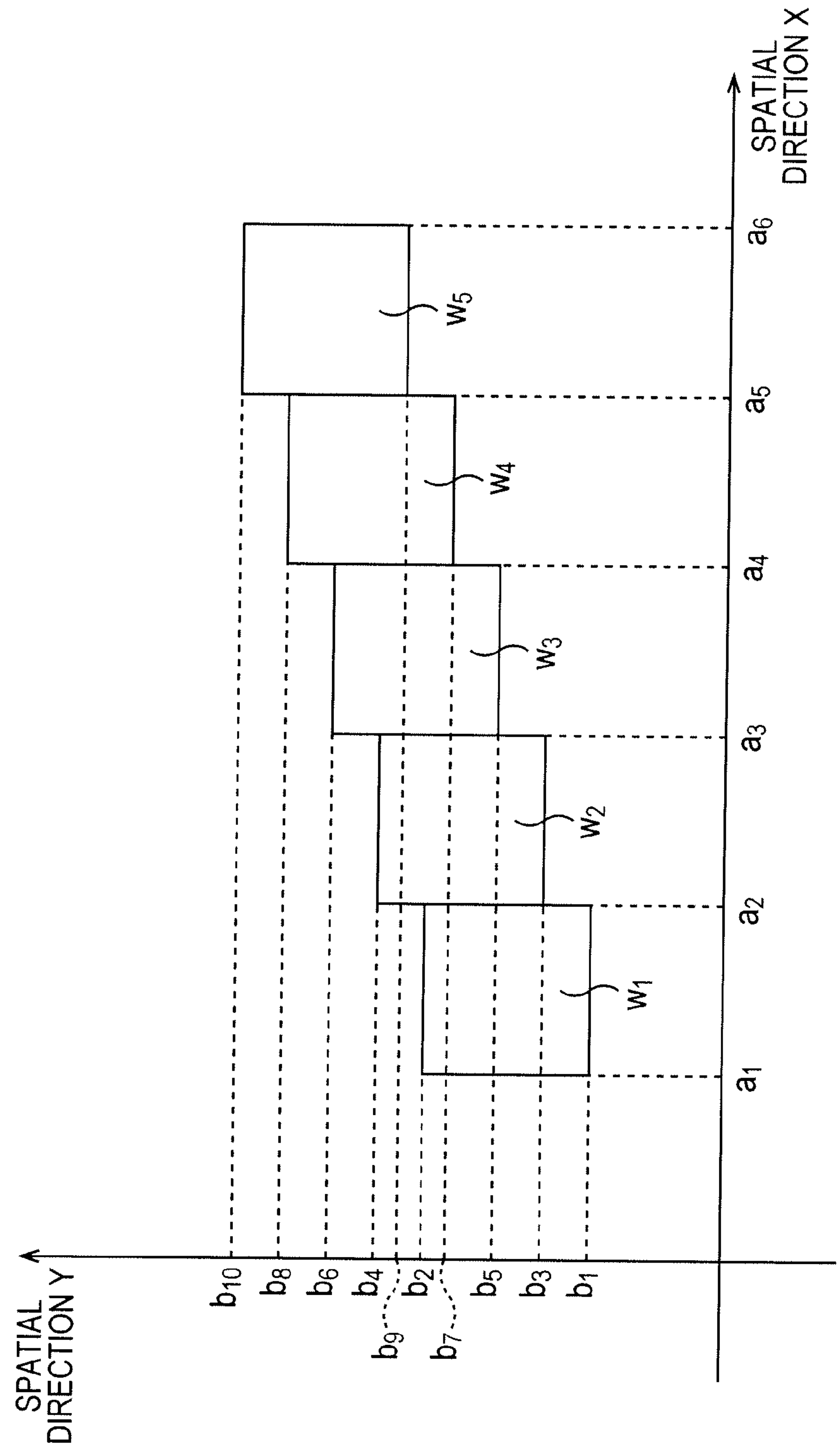

FIG. 374 is a diagram for describing an approximation function made up of a two-dimensional discontinuous function.

Figure 375:
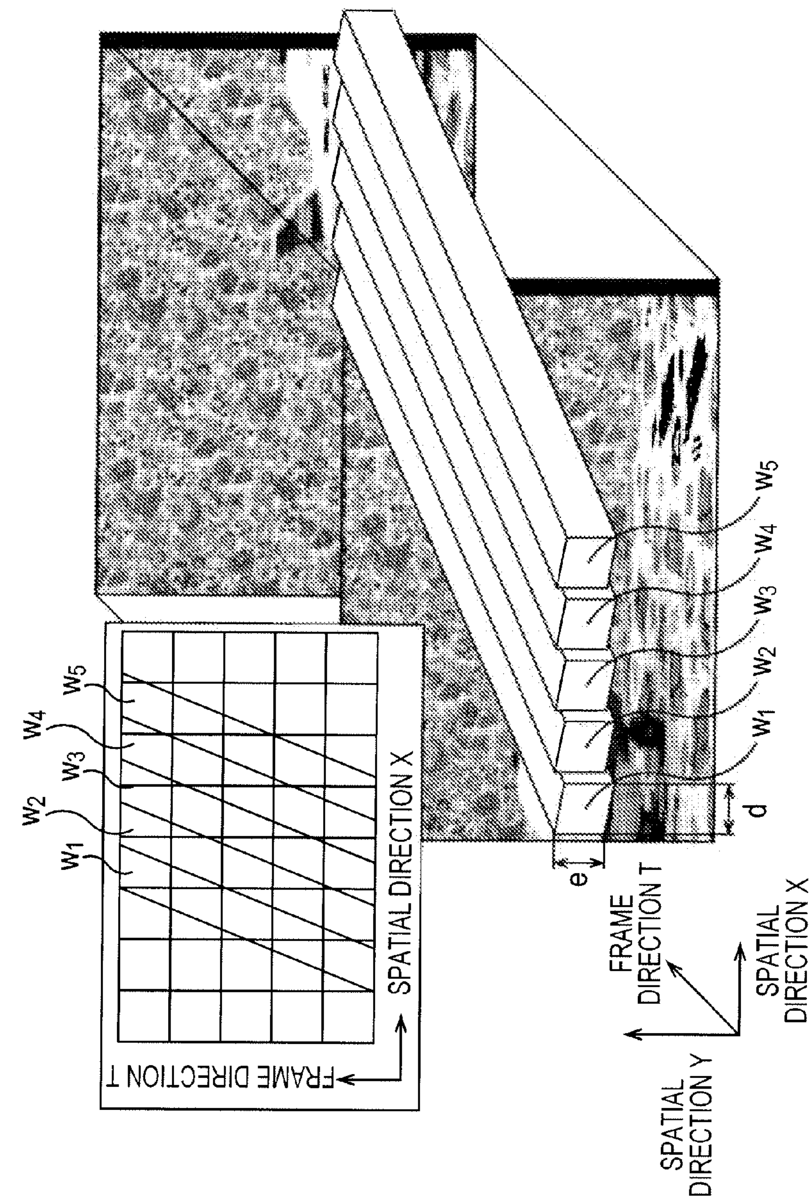

FIG. 375 is a diagram for describing an approximation function made up of a two-dimensional discontinuous function.

Figure 376:
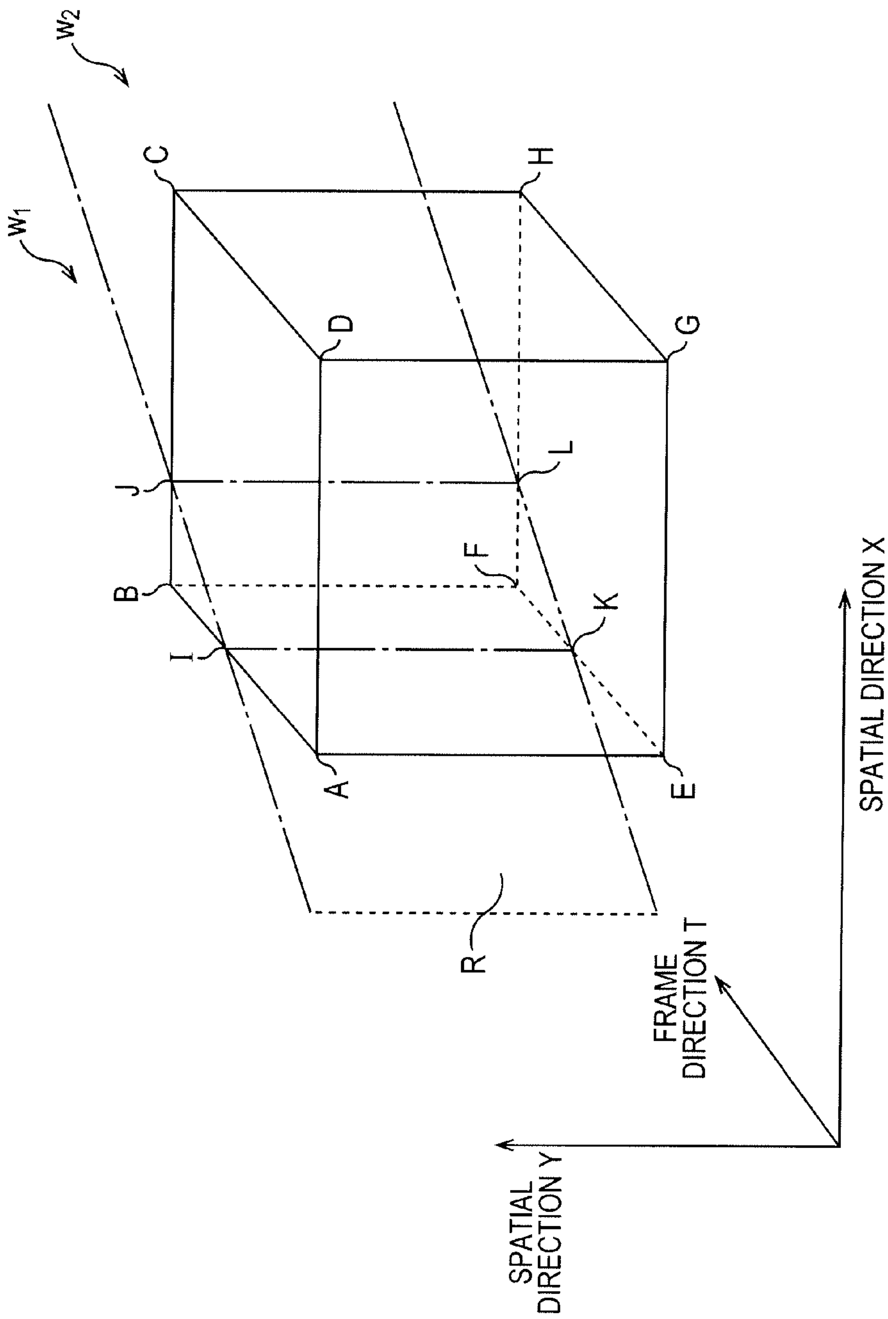

FIG. 376 is a diagram for describing a volume rate for each pixel of interest region.

Figure 377:
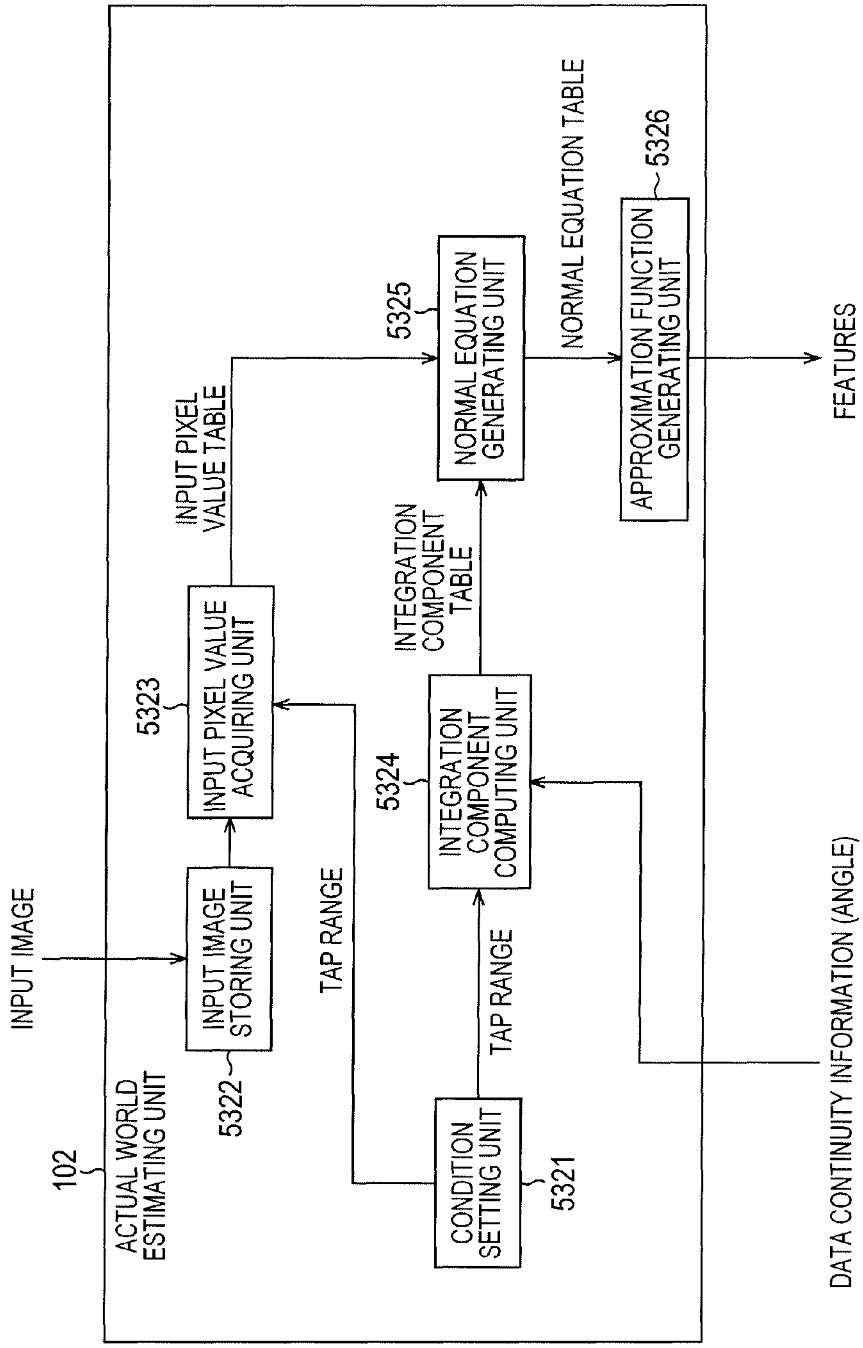

FIG. 377 is a block diagram illustrating the other configuration of the actual world estimating unit.

Figure 378:
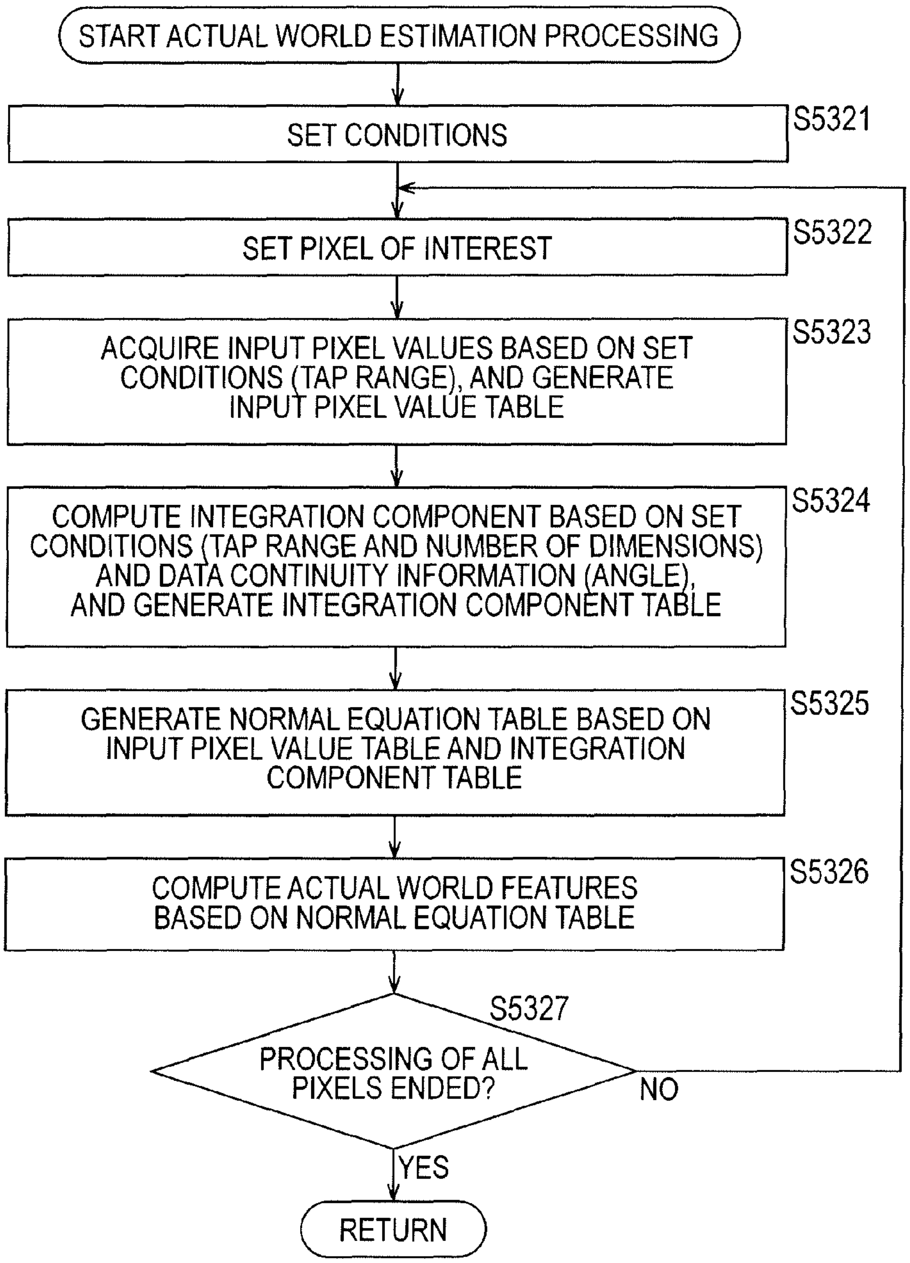

FIG. 378 is a flowchart for describing the processing of actual world estimation with the actual world estimating unit shown in FIG. 377.

Figure 379:
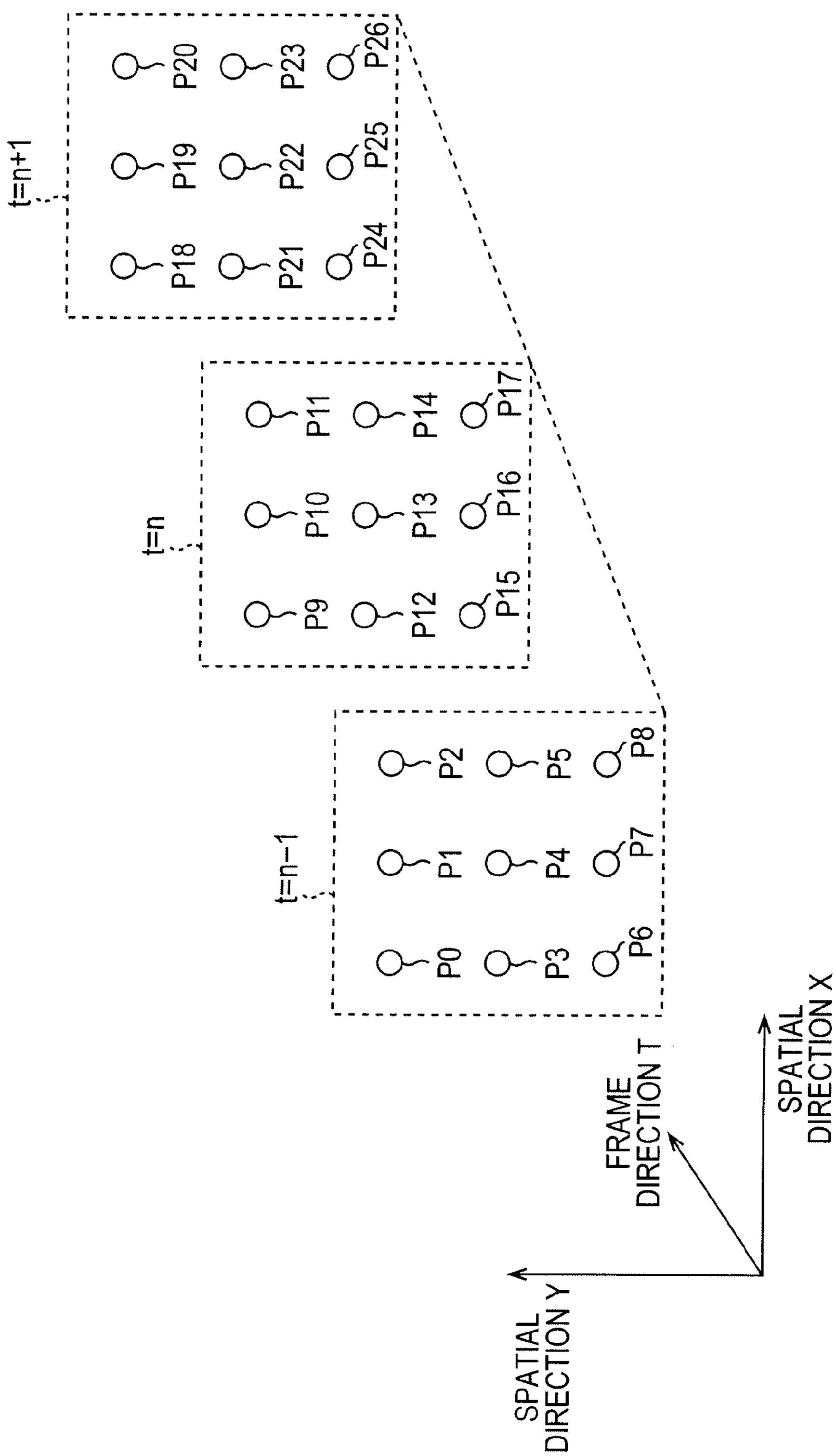

FIG. 379 is a diagram for describing the other example of a tap to be extracted.

Figure 380:
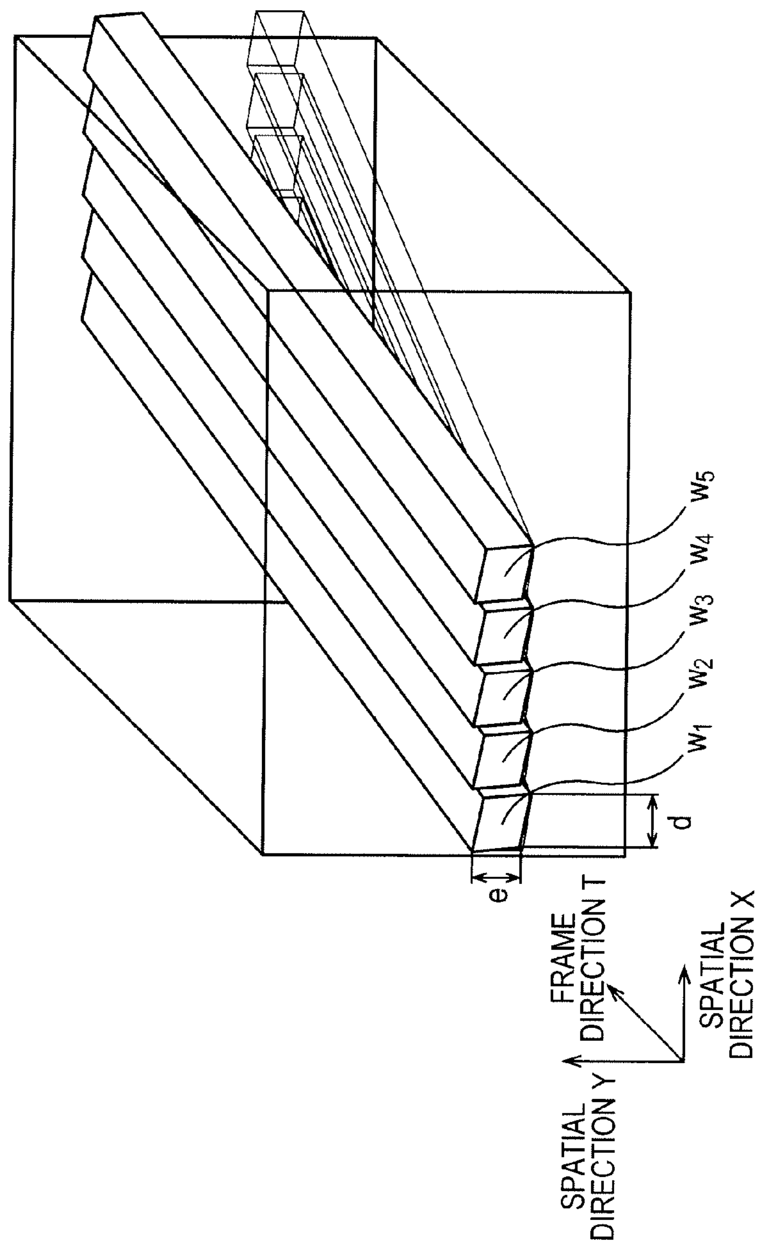

FIG. 380 is a diagram for describing an approximation function made up of a two-dimensional discontinuous function.

Figure 381:
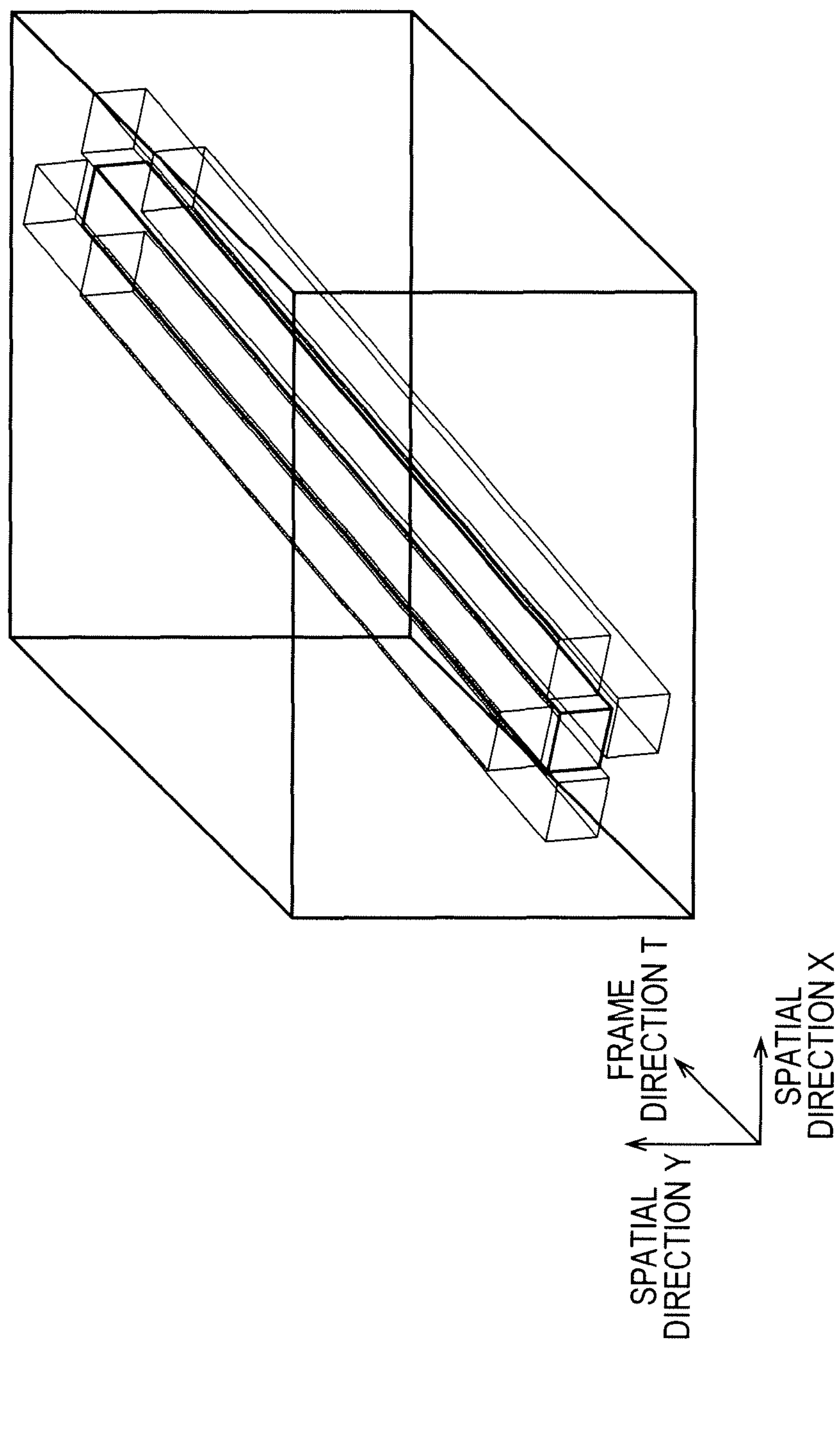

FIG. 381 is a diagram for describing an approximation function made up of a two-dimensional discontinuous function.

Figure 382:
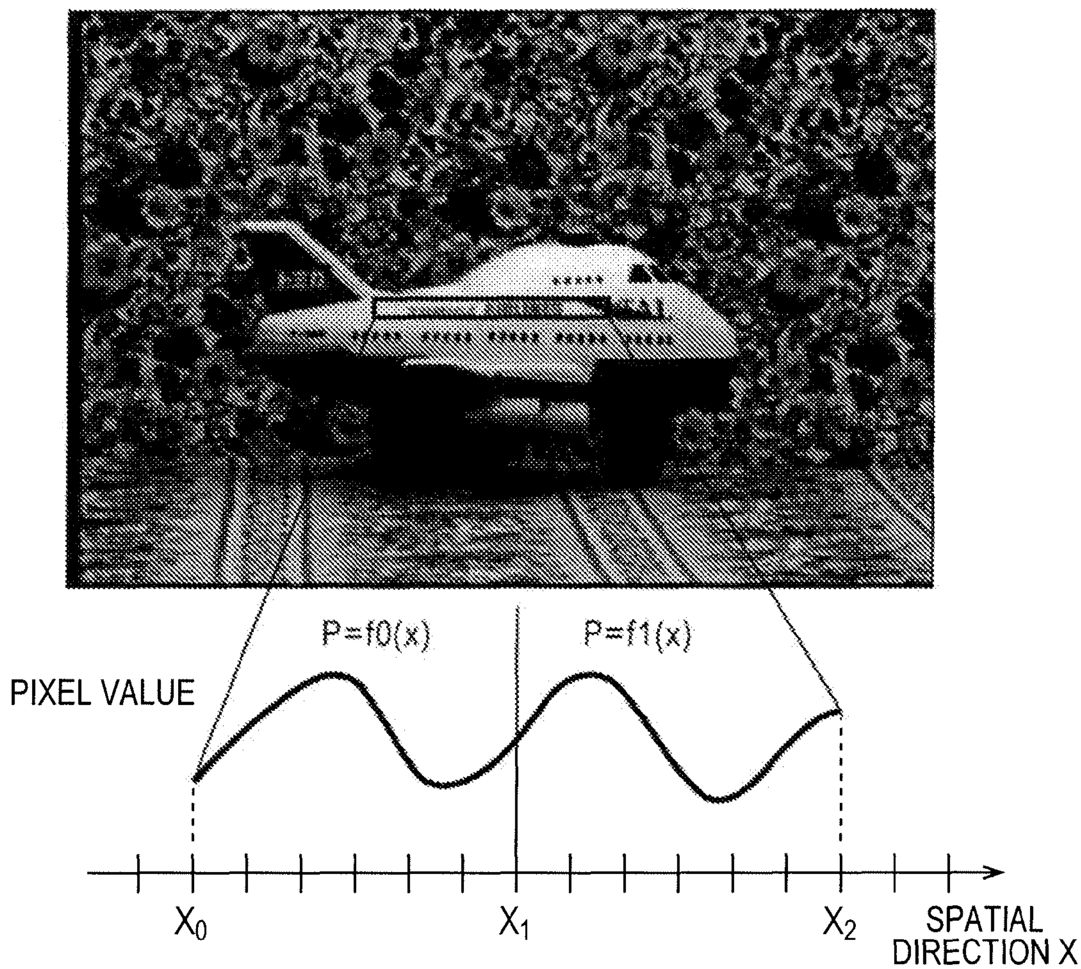

FIG. 382 is a diagram for describing an approximation function made up of a continuous function of a polynomial for each region.

Figure 383:
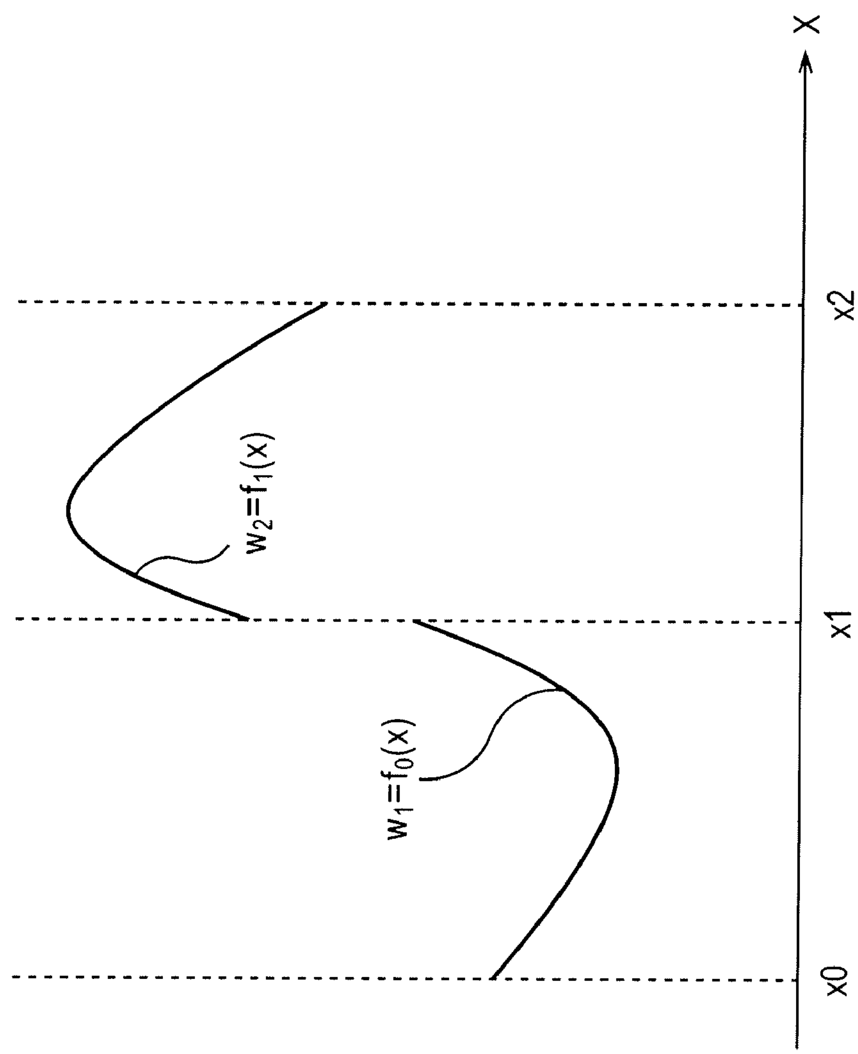

FIG. 383 is a diagram for describing an approximation function made up of a discontinuous function of a polynomial for each region.

Figure 384:
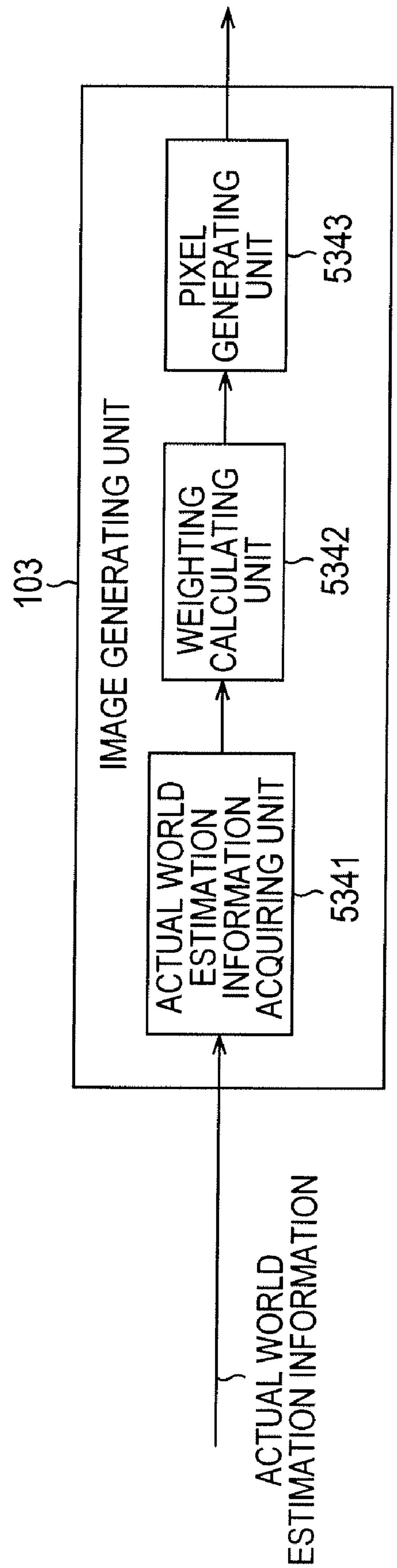

FIG. 384 is a block diagram describing the other configuration of the image generating unit.

Figure 385:
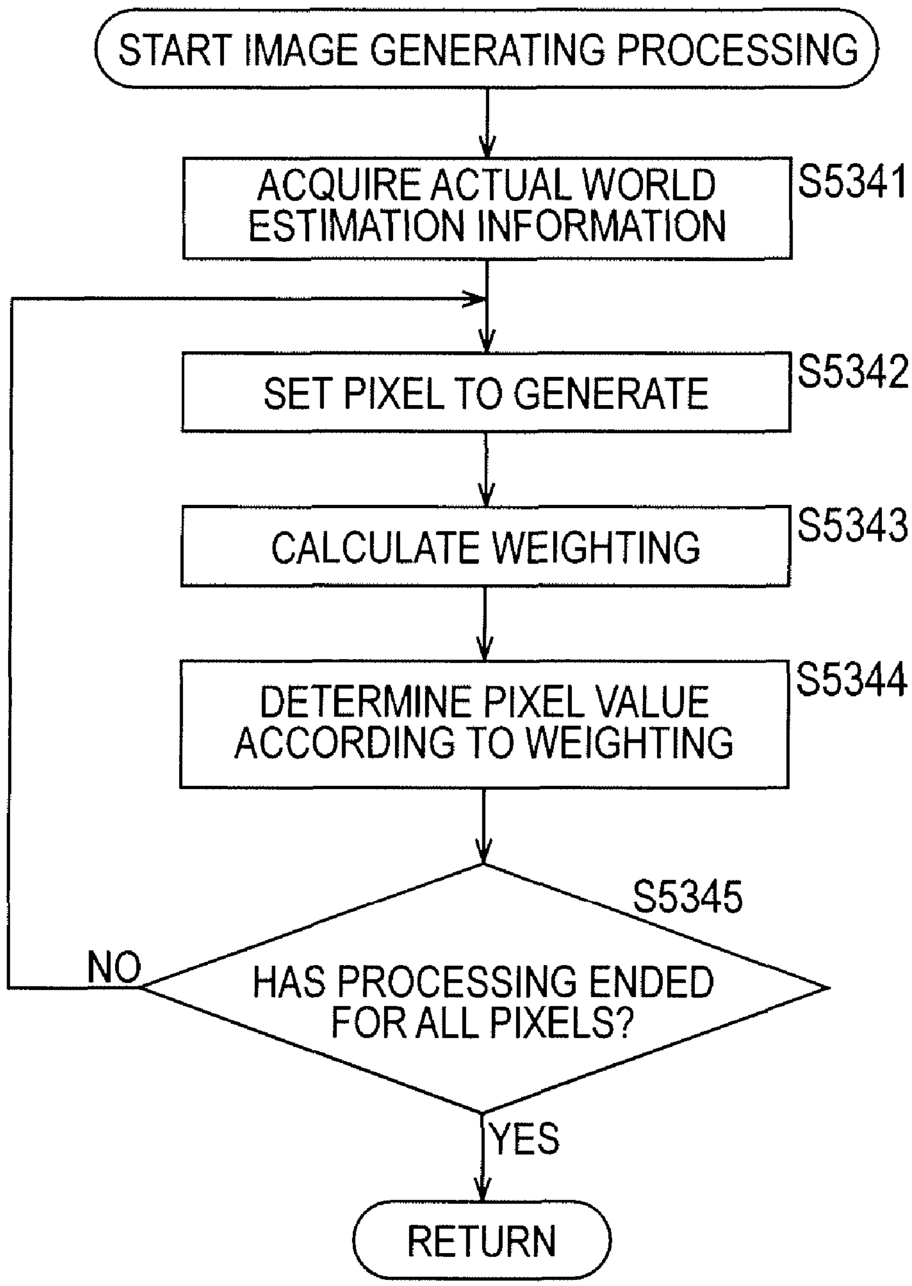

FIG. 385 is a flowchart for describing the image generating processing with the image generating unit shown in FIG. 384.

Figure 386:
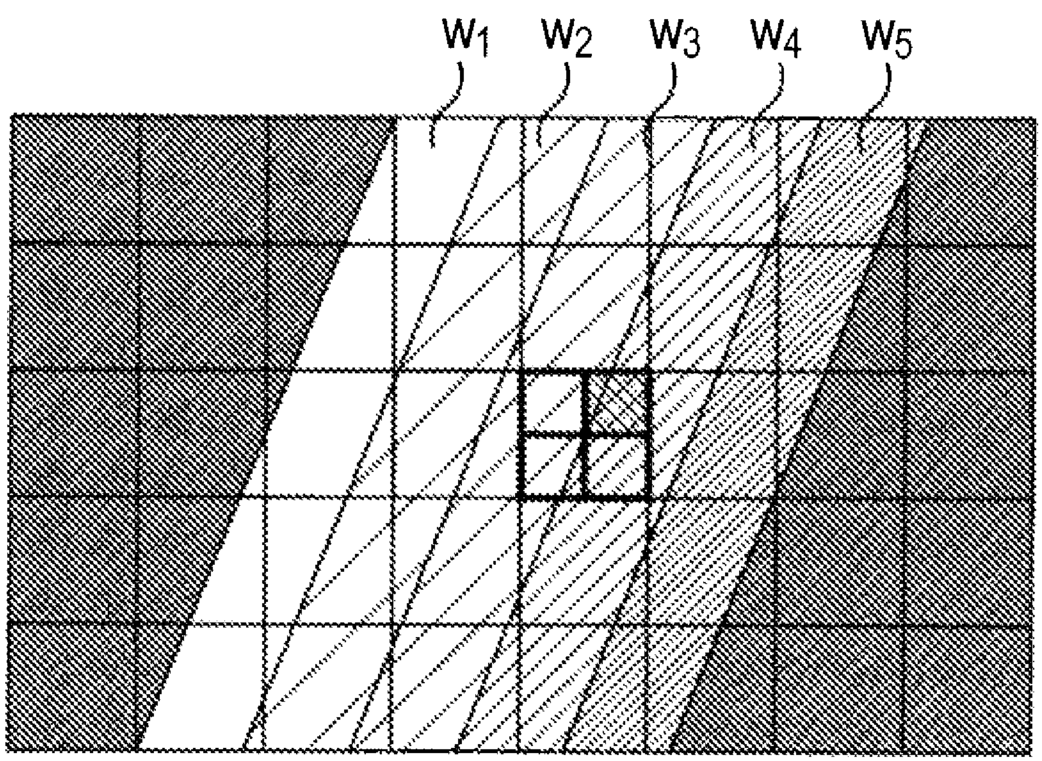

FIG. 386 is a diagram for describing a method for generating a quadruple density pixel.

Figure 387:
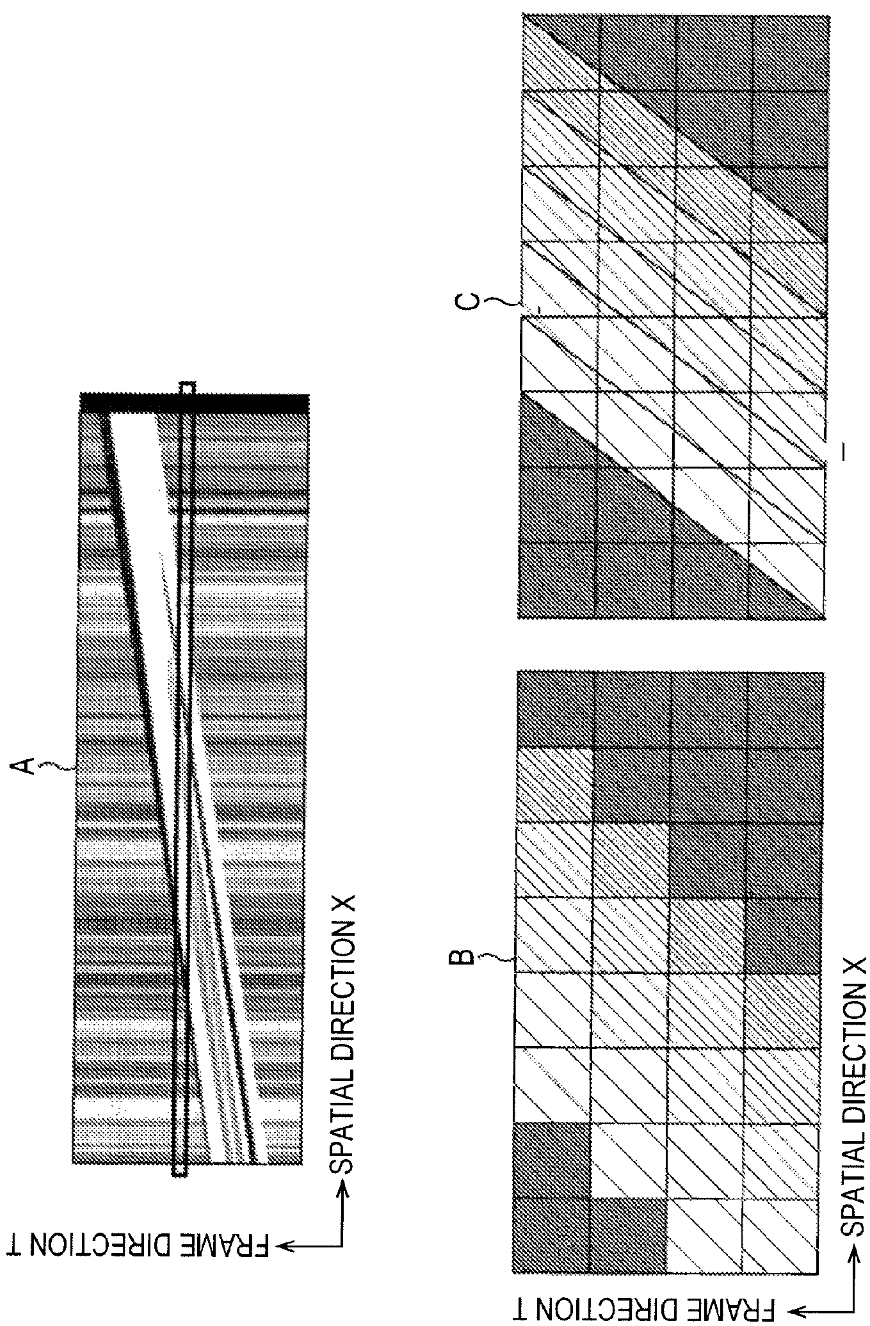

FIG. 387 is a diagram for describing the relationship between the conventional technique and the case of employing an approximation function made up of a discontinuous function.

Figure 388:
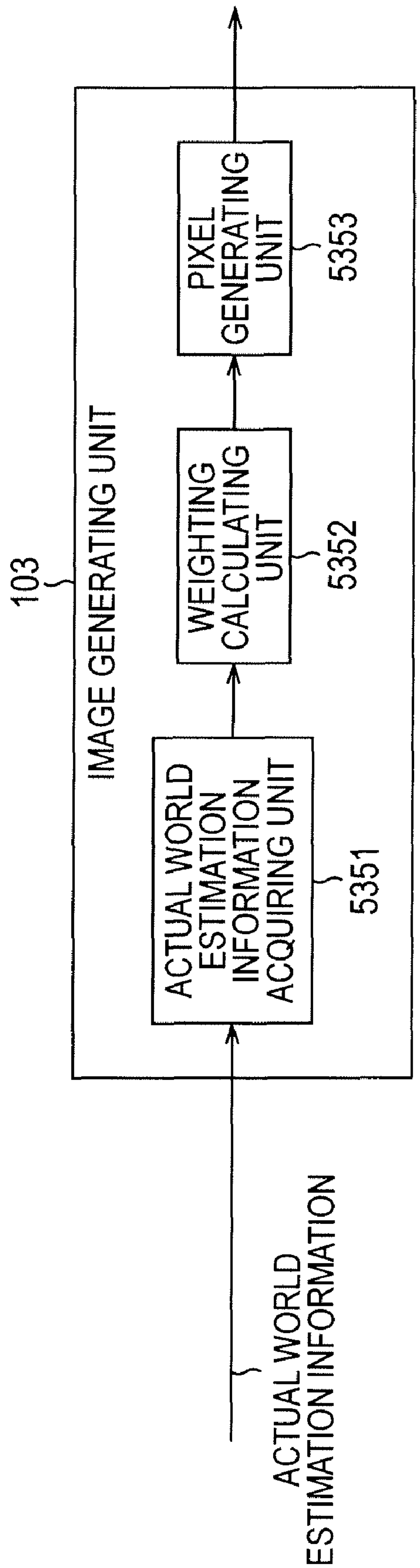

FIG. 388 is a block diagram for describing the other configuration of the image generating unit.

Figure 389:
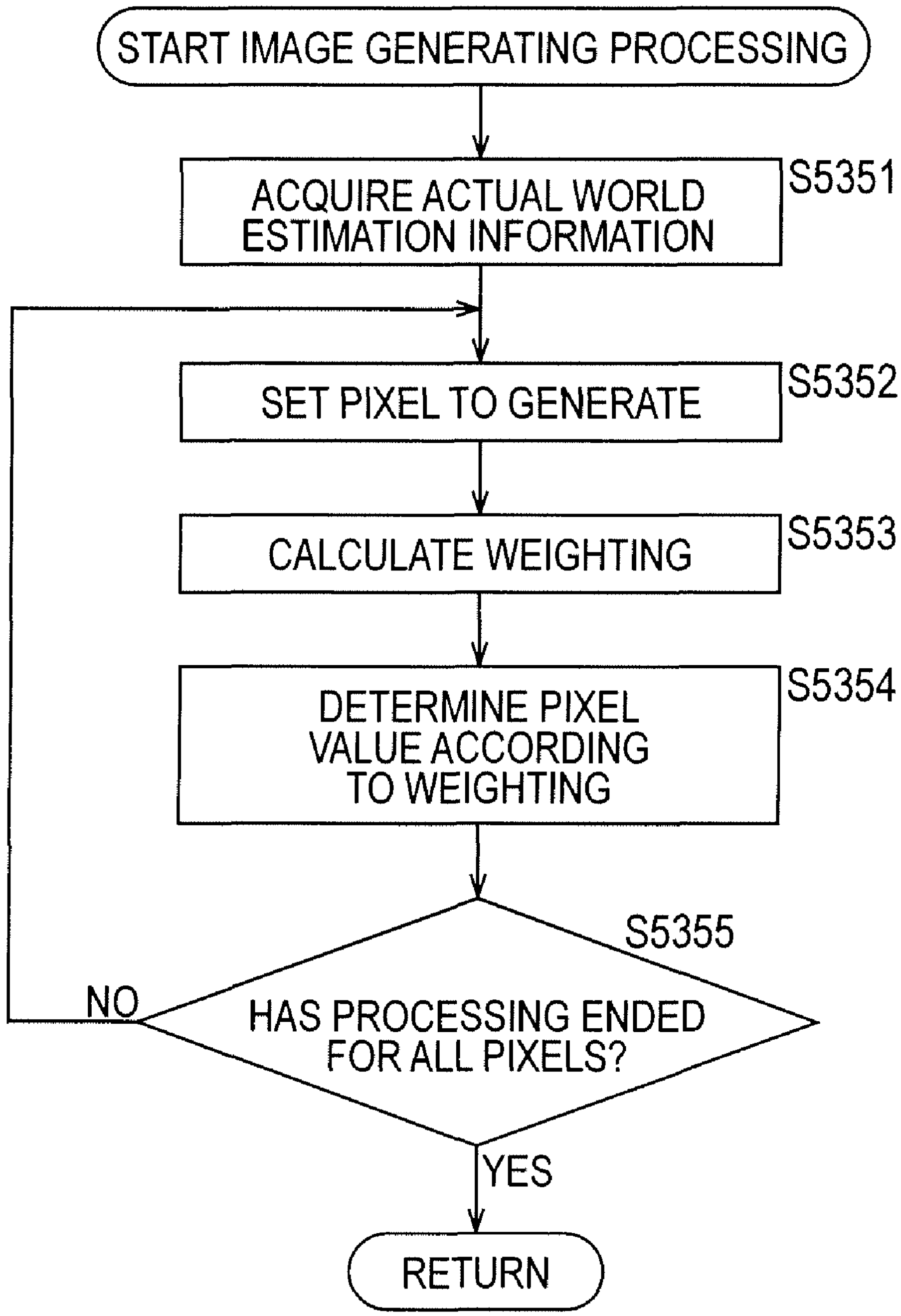

FIG. 389 is a flowchart for describing the image generating processing with the image generating unit shown in FIG. 388.

Figure 390:
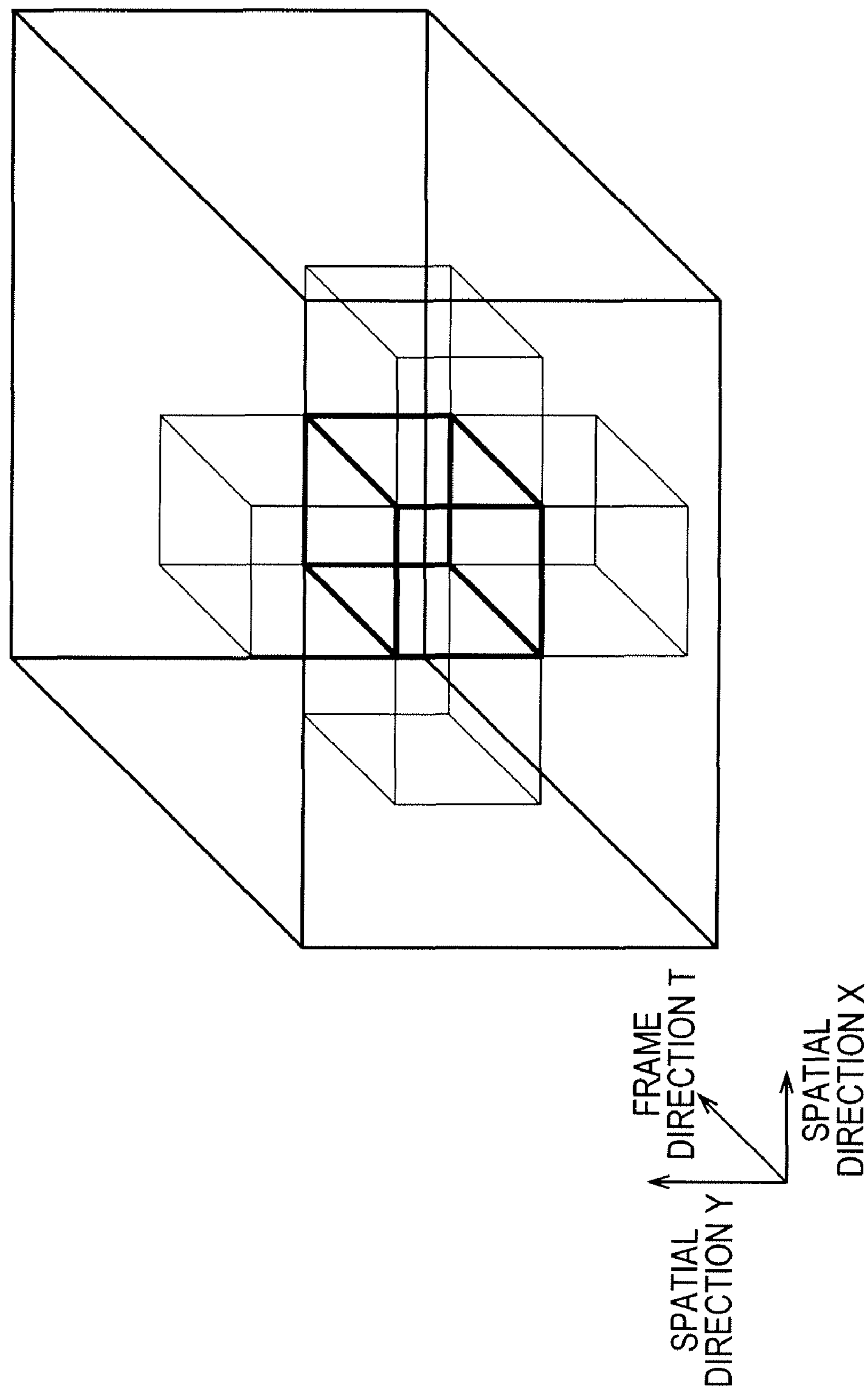

FIG. 390 is a diagram for describing a pixel of interest.

Figure 391:
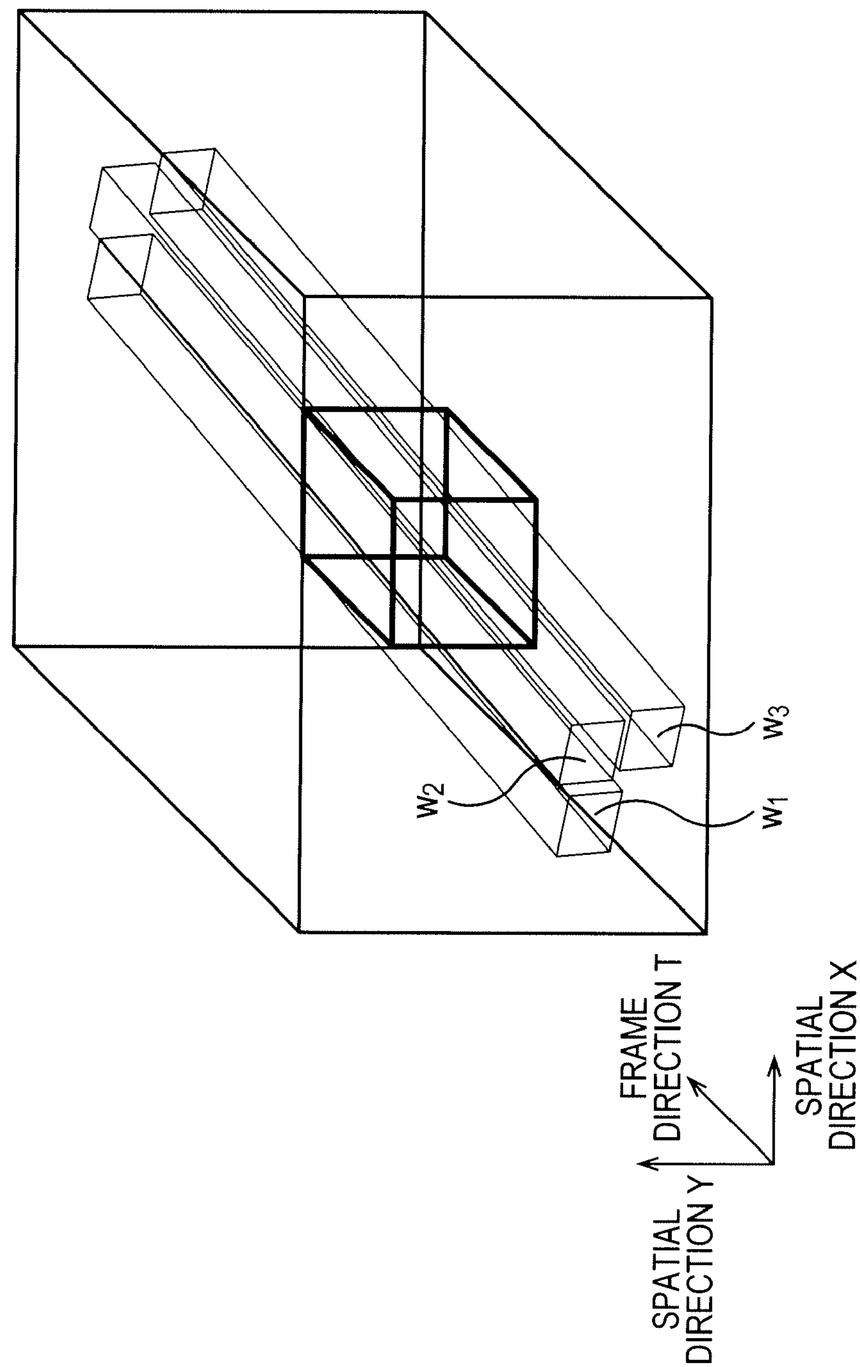

FIG. 391 is a diagram for describing a method for computing the pixel value of a pixel of interest.

Figure 392:
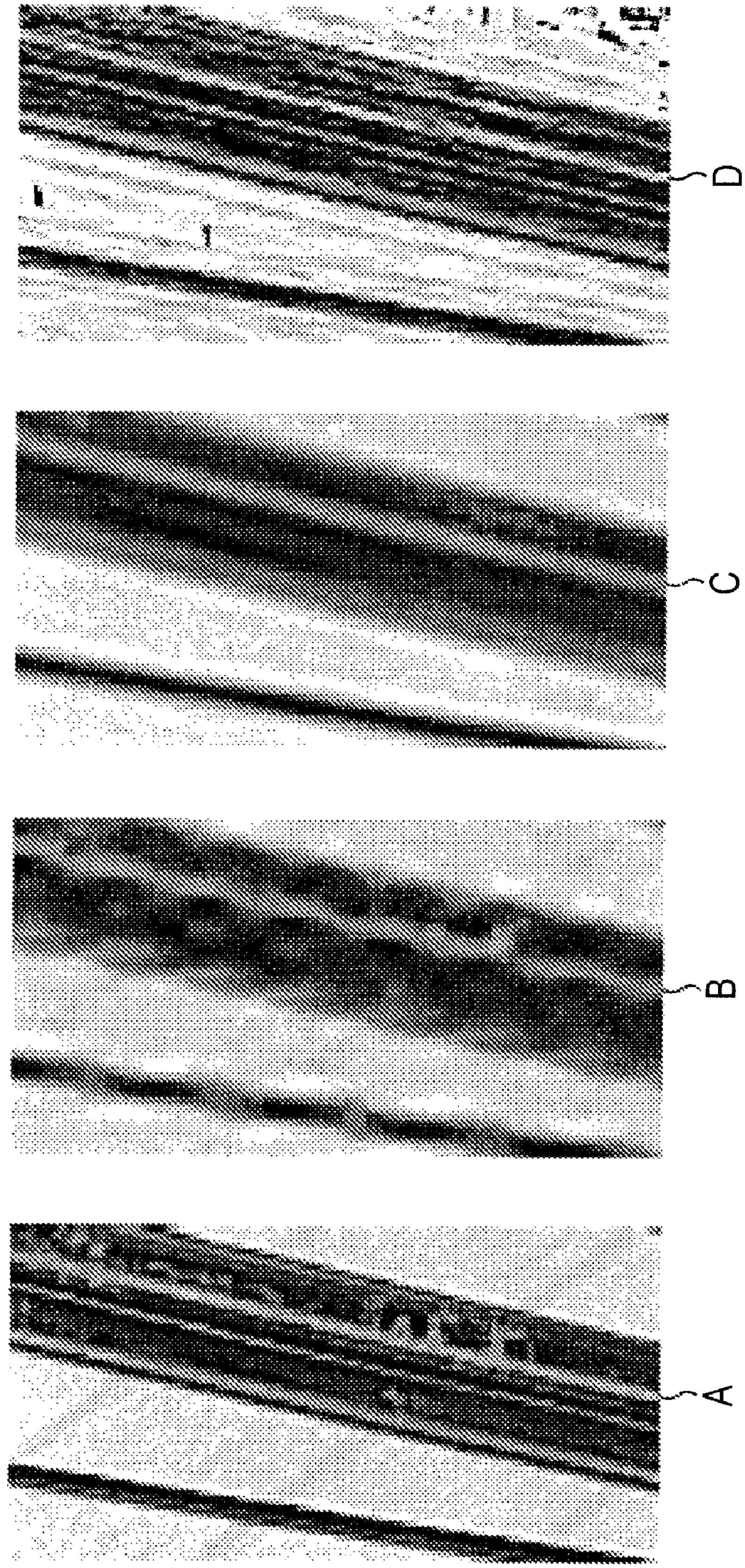

FIG. 392 is a diagram for describing the processing result using an approximation function made up of a discontinuous function in the spatial directions and the other processing results.

Figure 393:
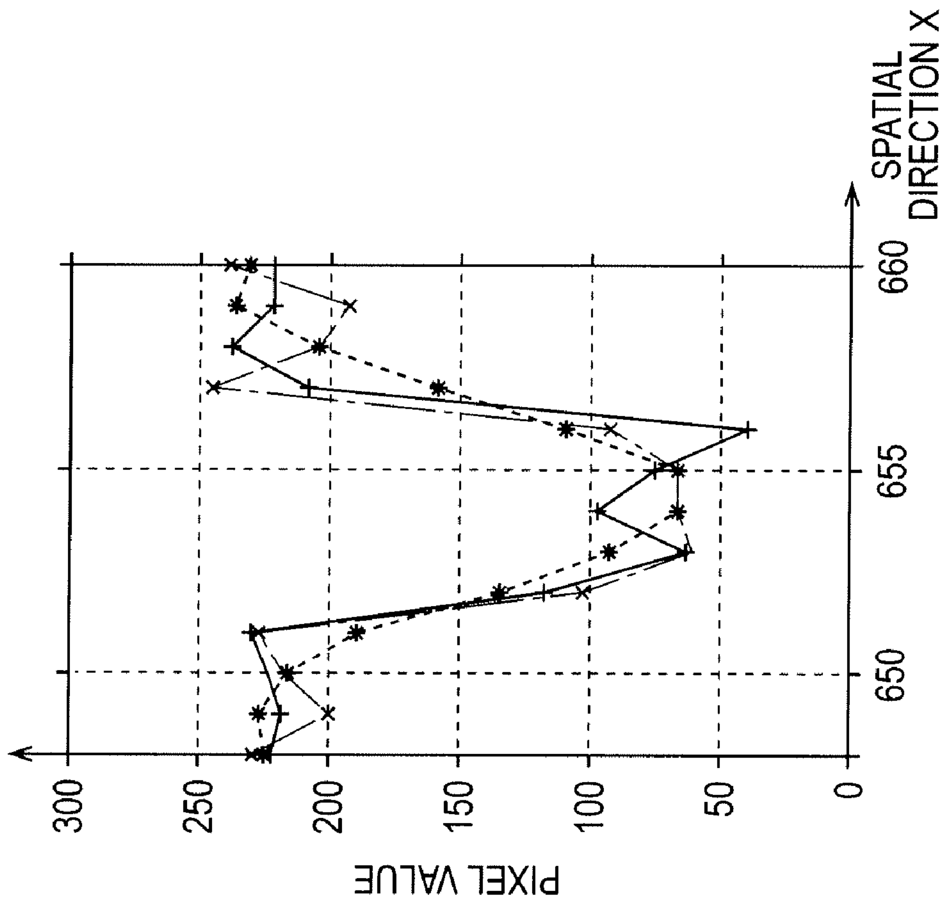

FIG. 393 is a diagram for describing the processing result using an approximation function made up of a discontinuous function and the other processing results.

Figure 394:
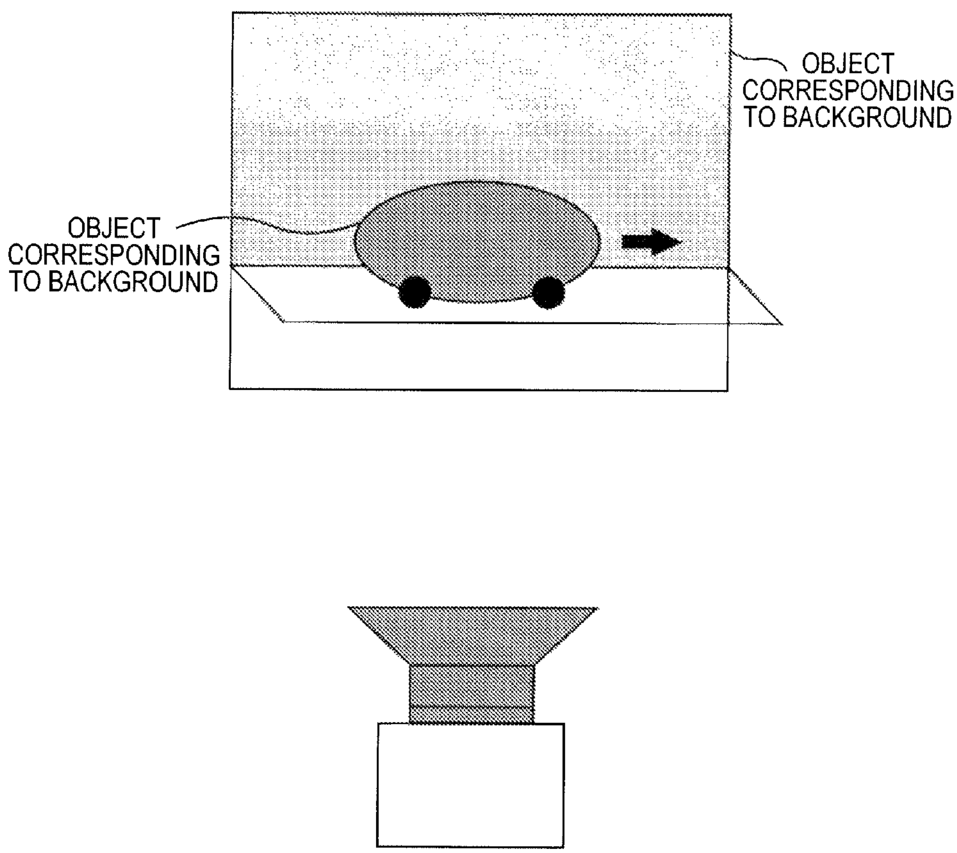

FIG. 394 is a diagram for describing imaging by a sensor.

Figure 395:
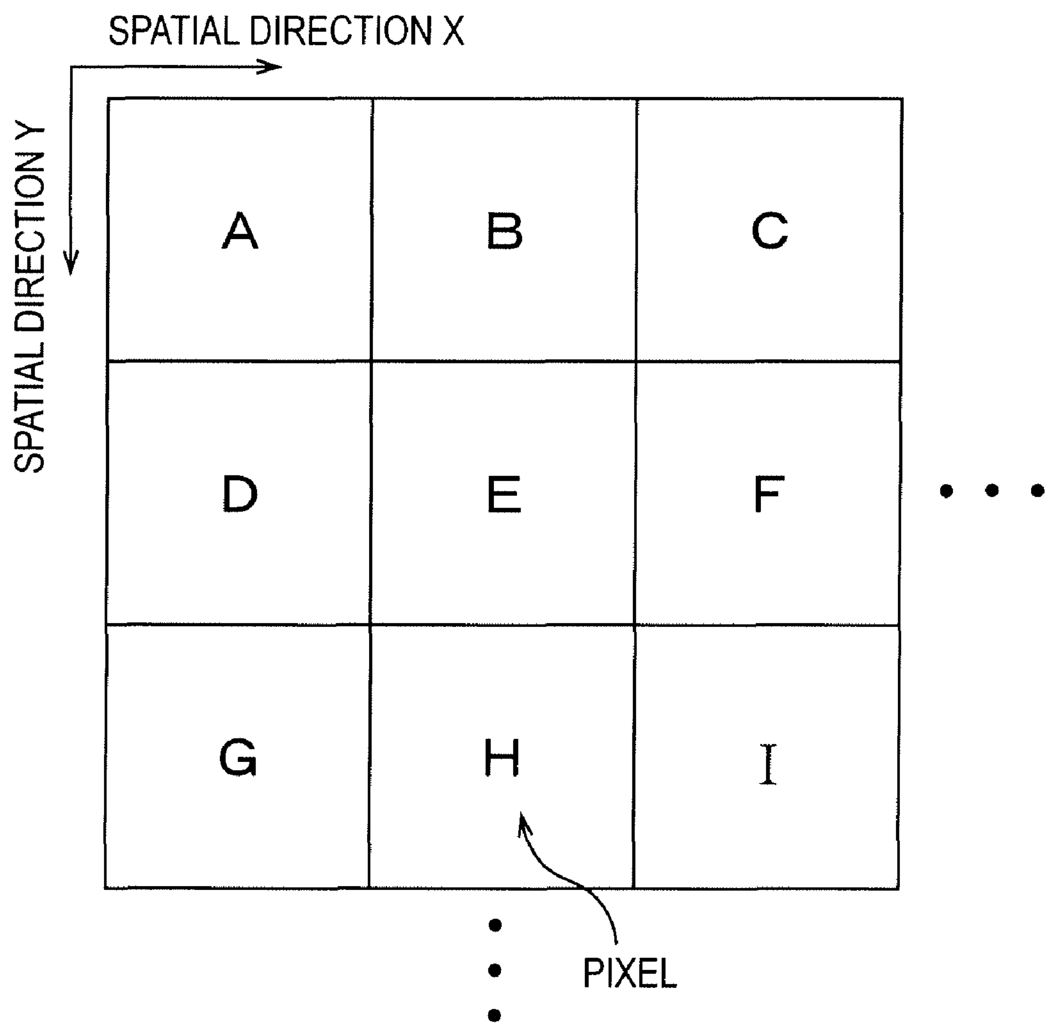

FIG. 395 is a diagram describing the placement of pixels.

Figure 396:
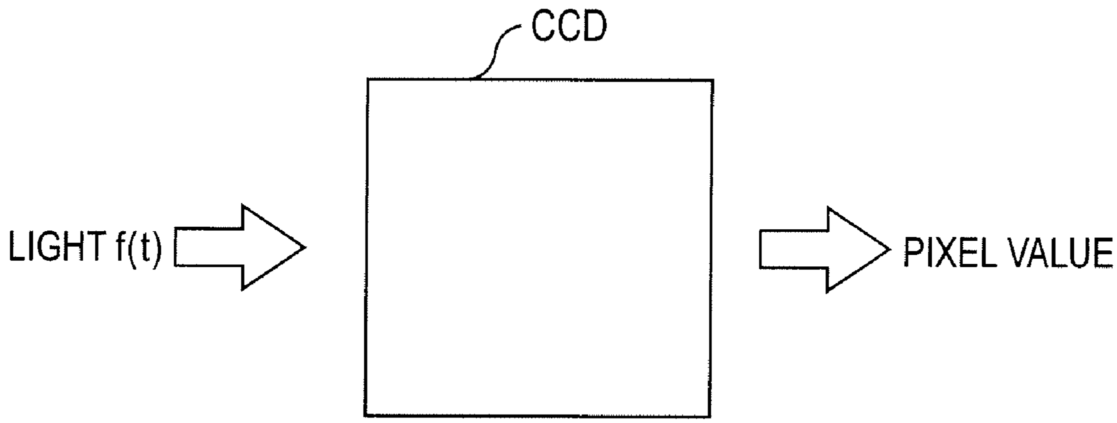

FIG. 396 is a diagram describing operation of detecting devices.

Figure 397:
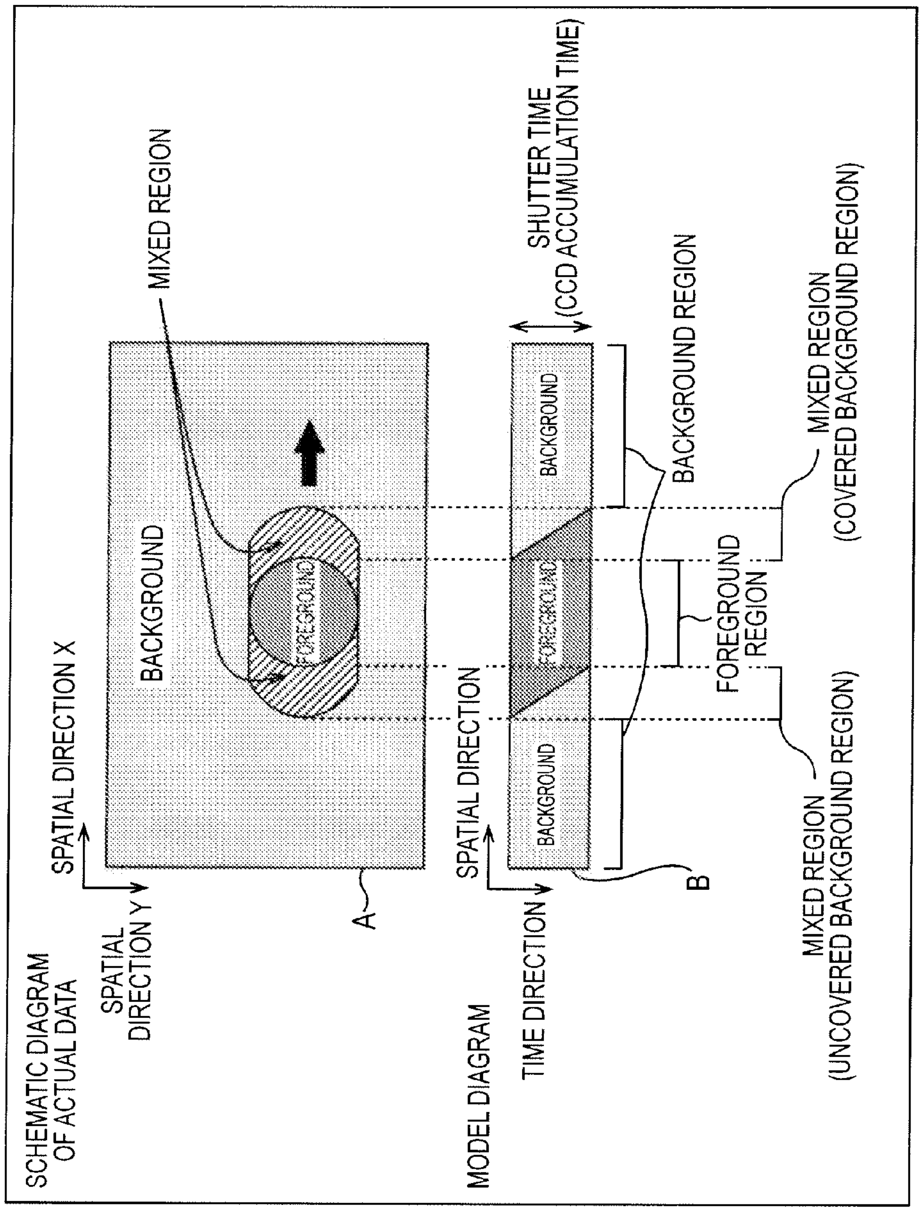

FIG. 397 is a diagram for describing an image obtained by imaging an object corresponding to the moving foreground, and an object corresponding to the still background.

FIG. 398 is a diagram for describing a background region, foreground region, mixed region, covered background region, and uncovered background region.

Figure 399:
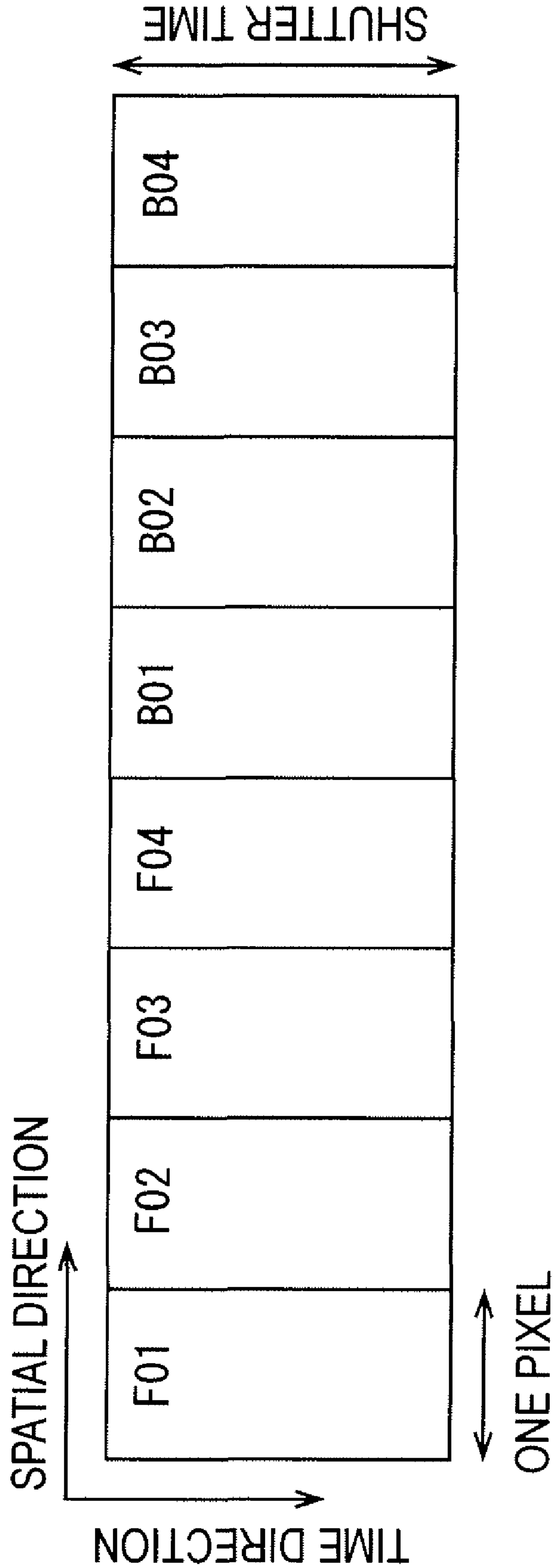

FIG. 399 is a model diagram for expanding in the time direction the pixel values of pixels adjacently arrayed in a row in an image on which an object corresponding to the still foreground, and an object corresponding to the still background are imaged.

Figure 400:
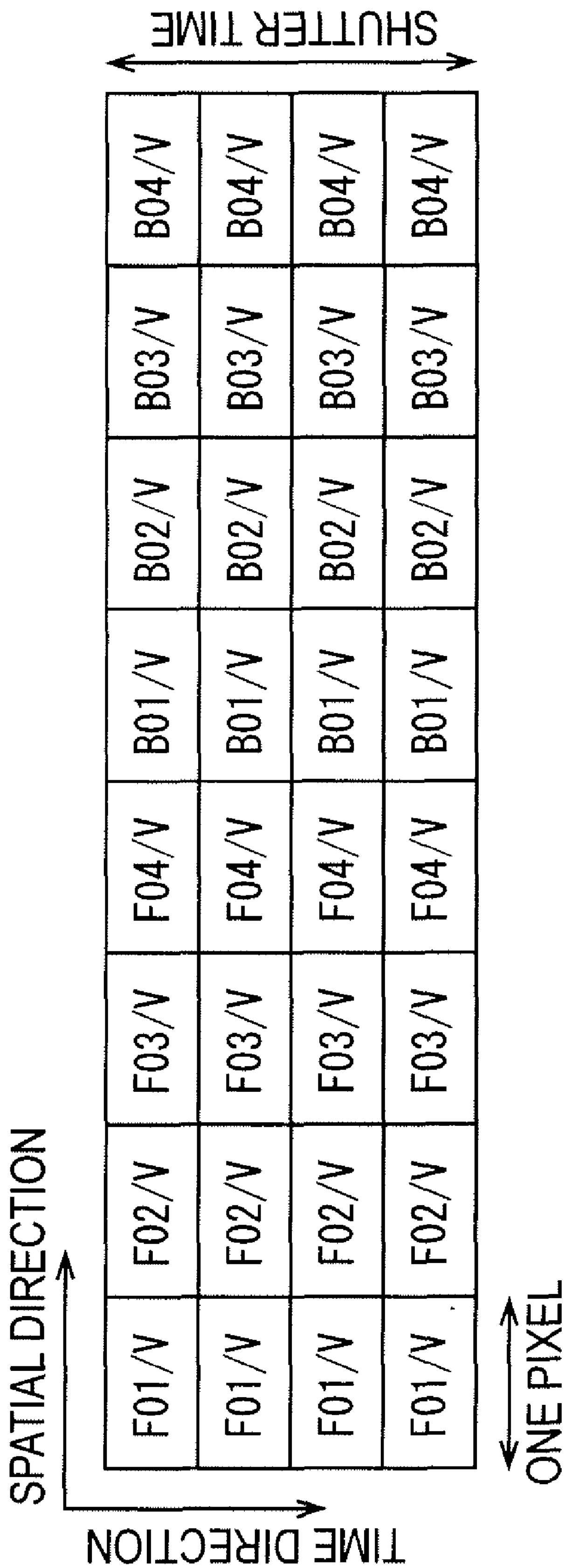

FIG. 400 is a model diagram wherein pixel values are expanded in the time direction, and a period corresponding to shutter time is divided.

Figure 401:
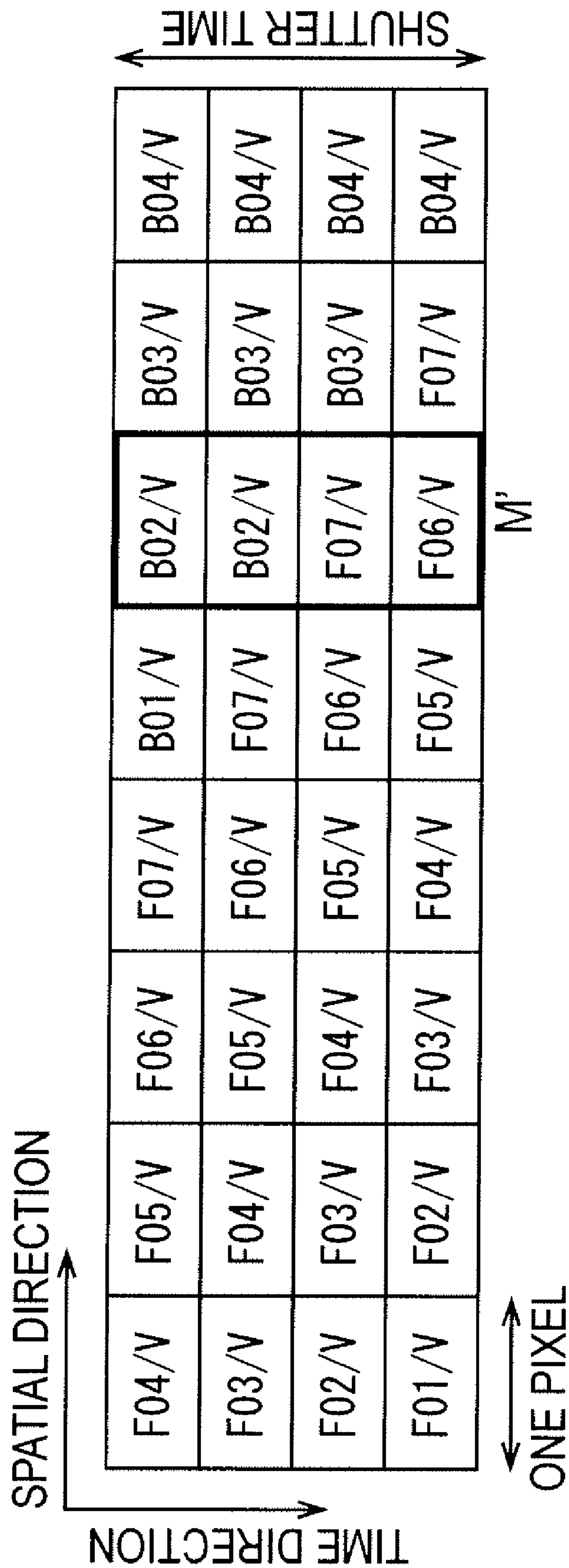

FIG. 401 is a model diagram wherein pixel values are expanded in the time direction, and a period corresponding to shutter time is divided.

Figure 402:
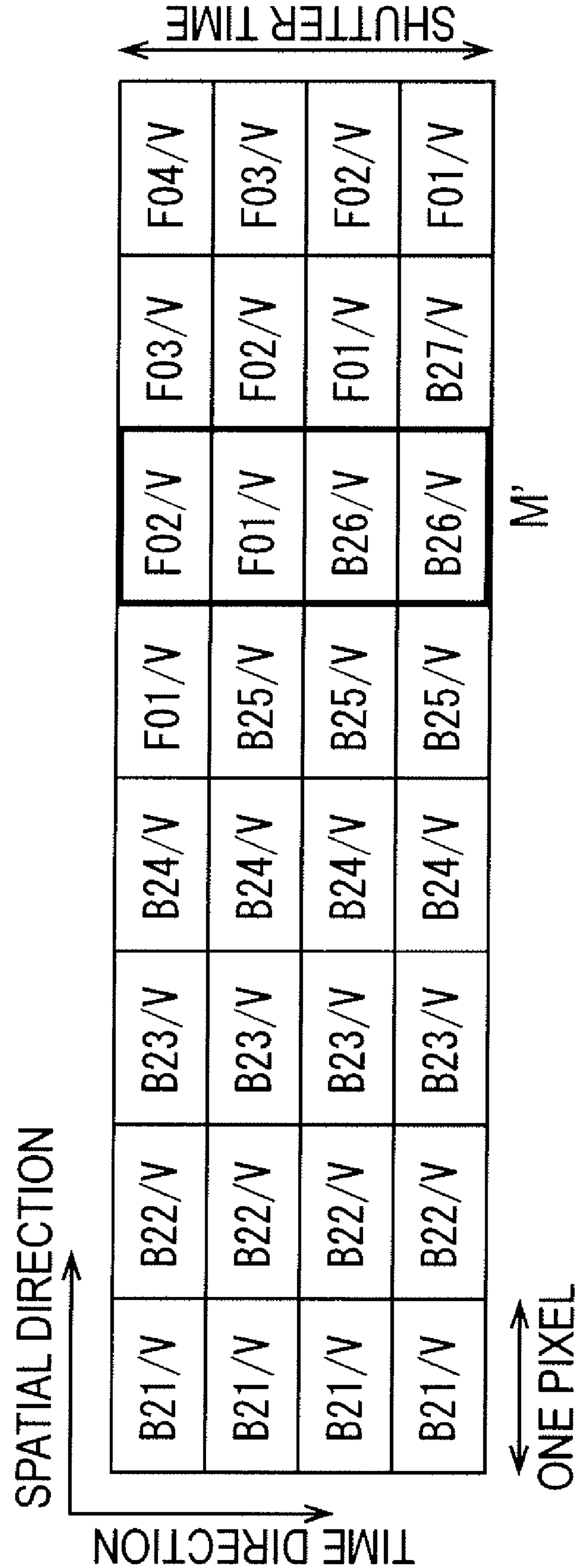

FIG. 402 is a model diagram wherein pixel values are expanded in the time direction, and a period corresponding to shutter time is divided.

Figure 403:
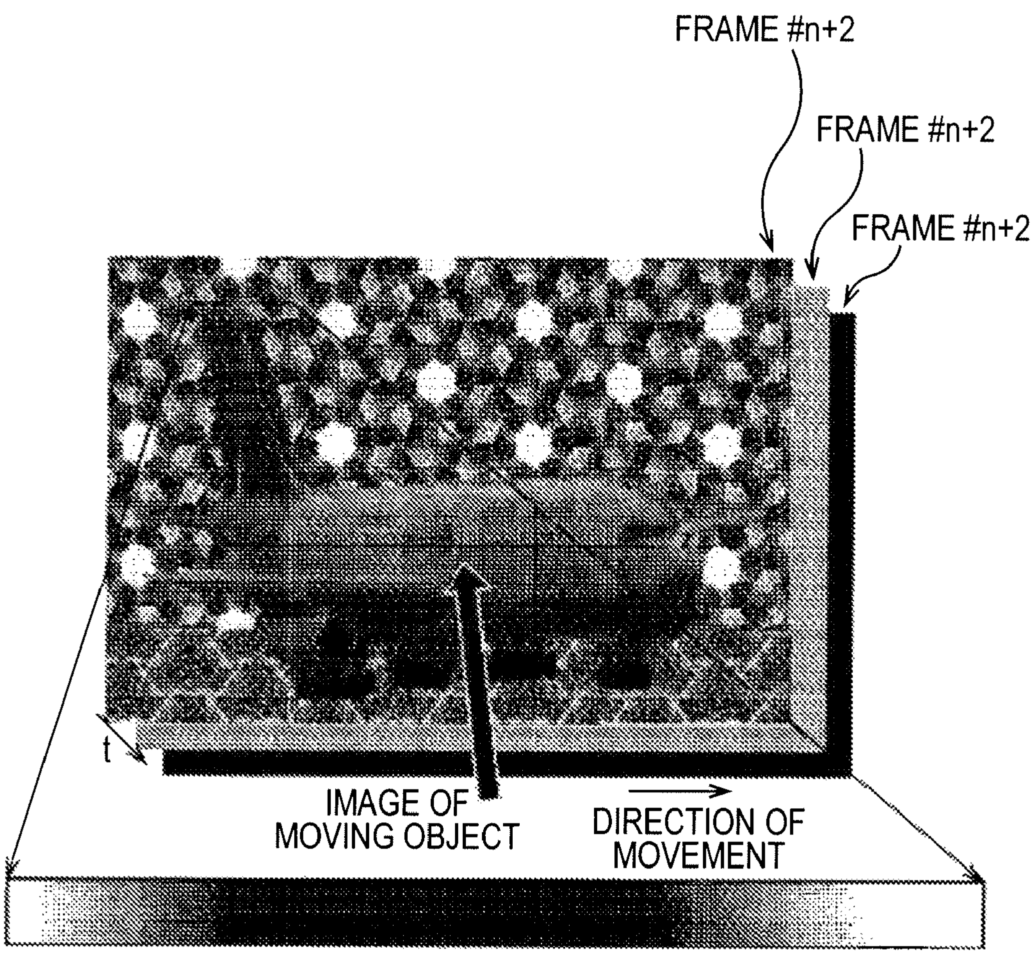

FIG. 403 is a diagram illustrating an example wherein pixels belonged to a foreground region, background region, and mixed region are extracted.

Figure 404:
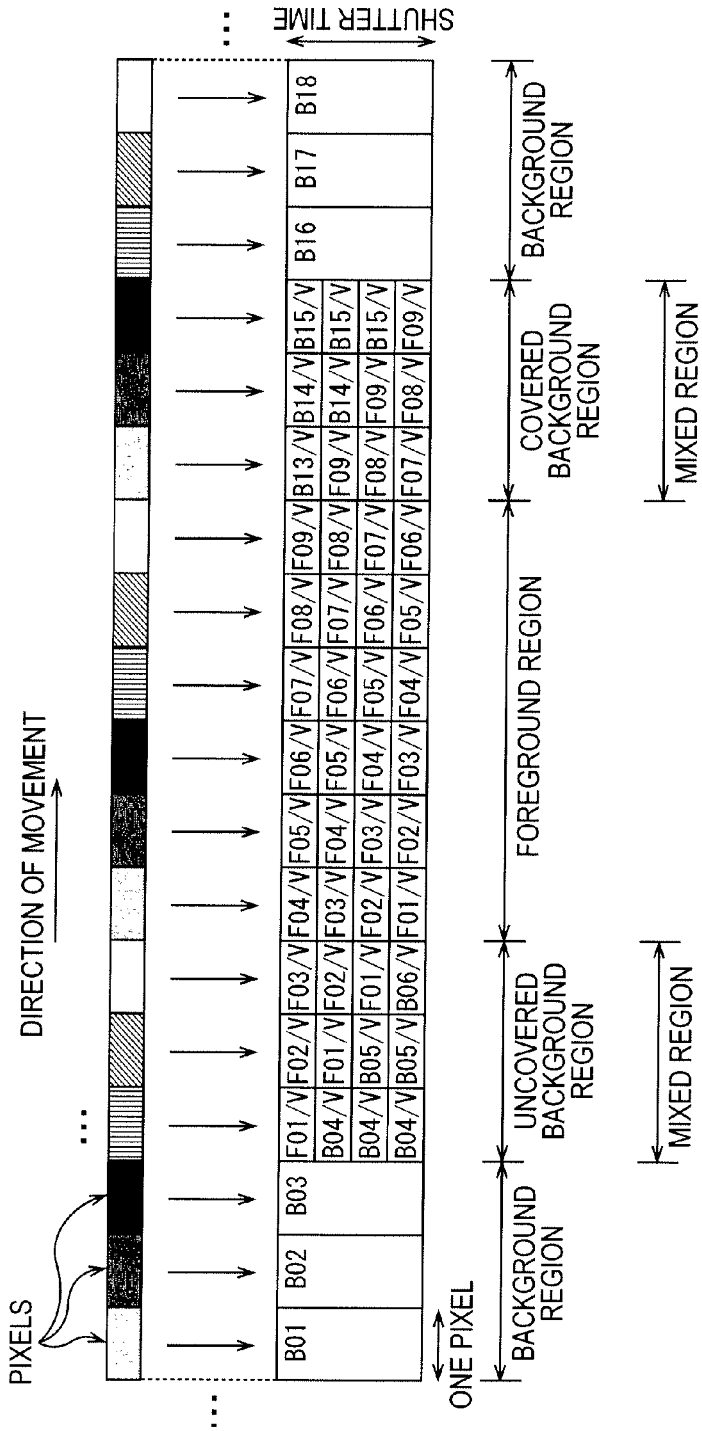

FIG. 404 is a diagram illustrating correspondence with a model wherein pixels and the pixel values thereof are expanded in the time direction.

Figure 405:
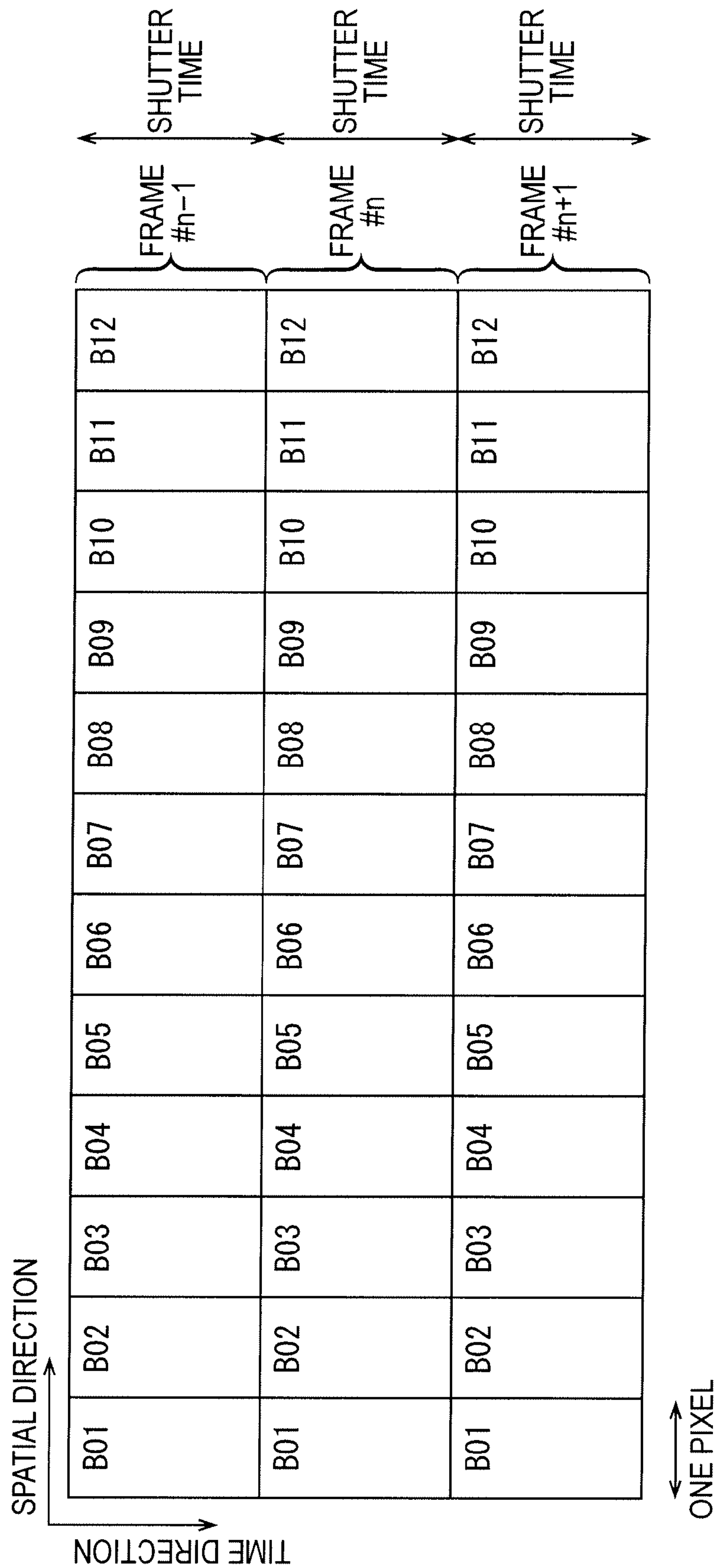

FIG. 405 is a model diagram wherein pixel values are expanded in the time direction, and a period corresponding to shutter time is divided.

Figure 406:
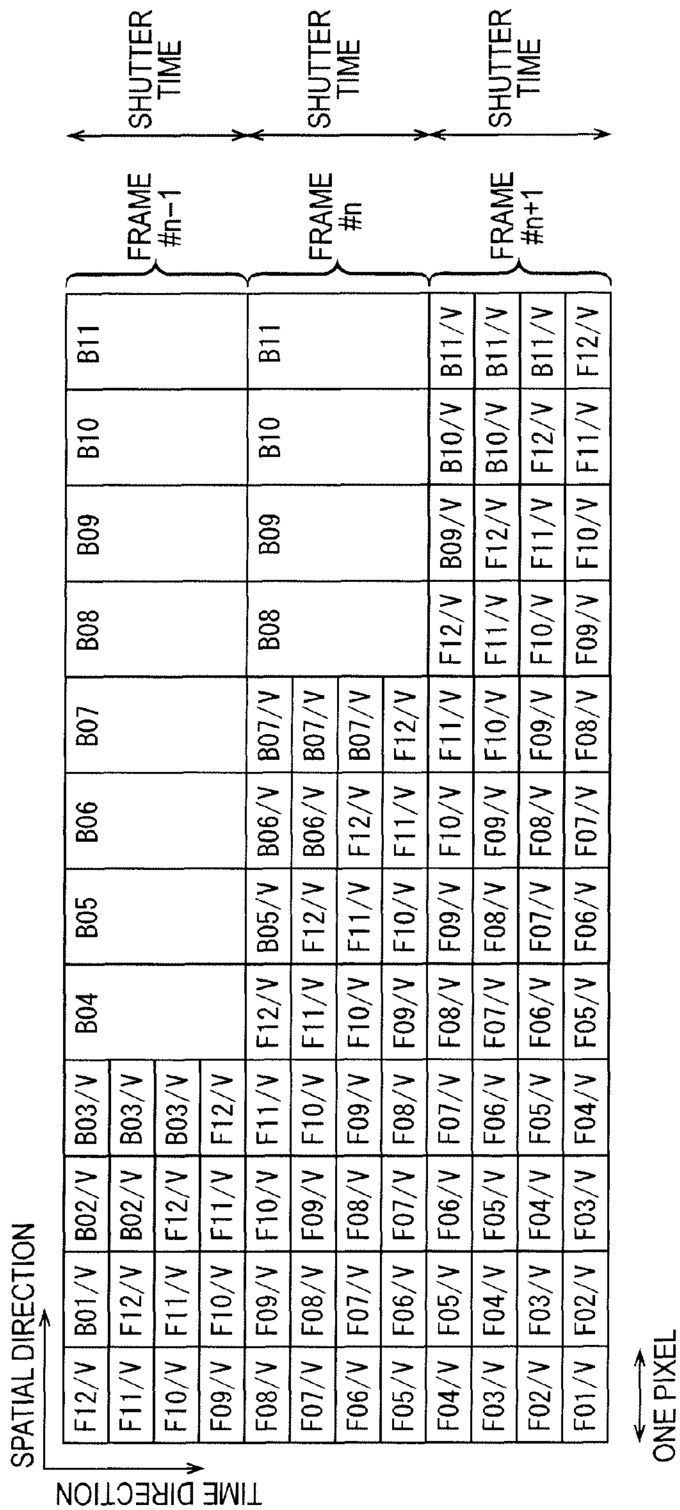

FIG. 406 is a model diagram wherein pixel values are expanded in the time direction, and a period corresponding to shutter time is divided.

Figure 407:
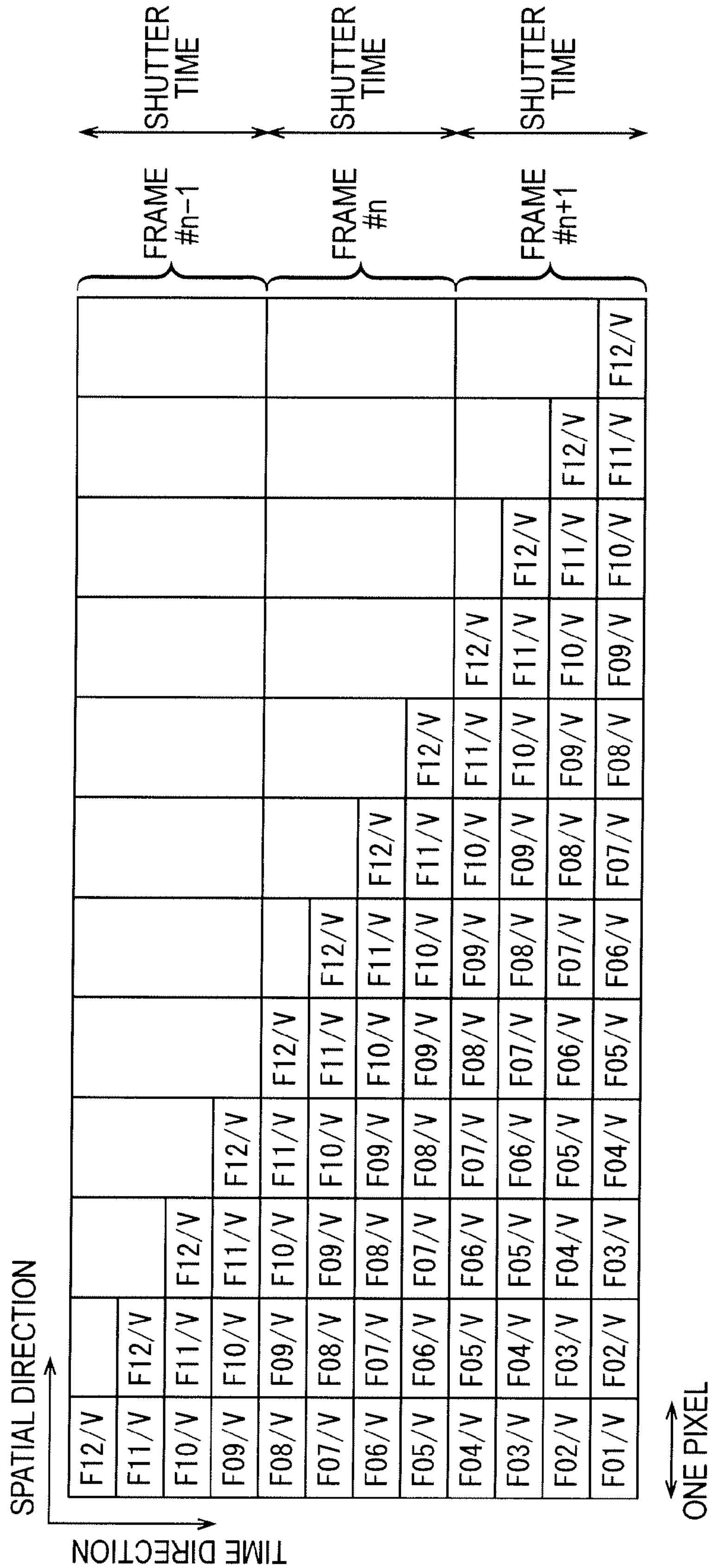

FIG. 407 is a model diagram wherein pixel values are expanded in the time direction, and a period corresponding to shutter time is divided.

Figure 408:
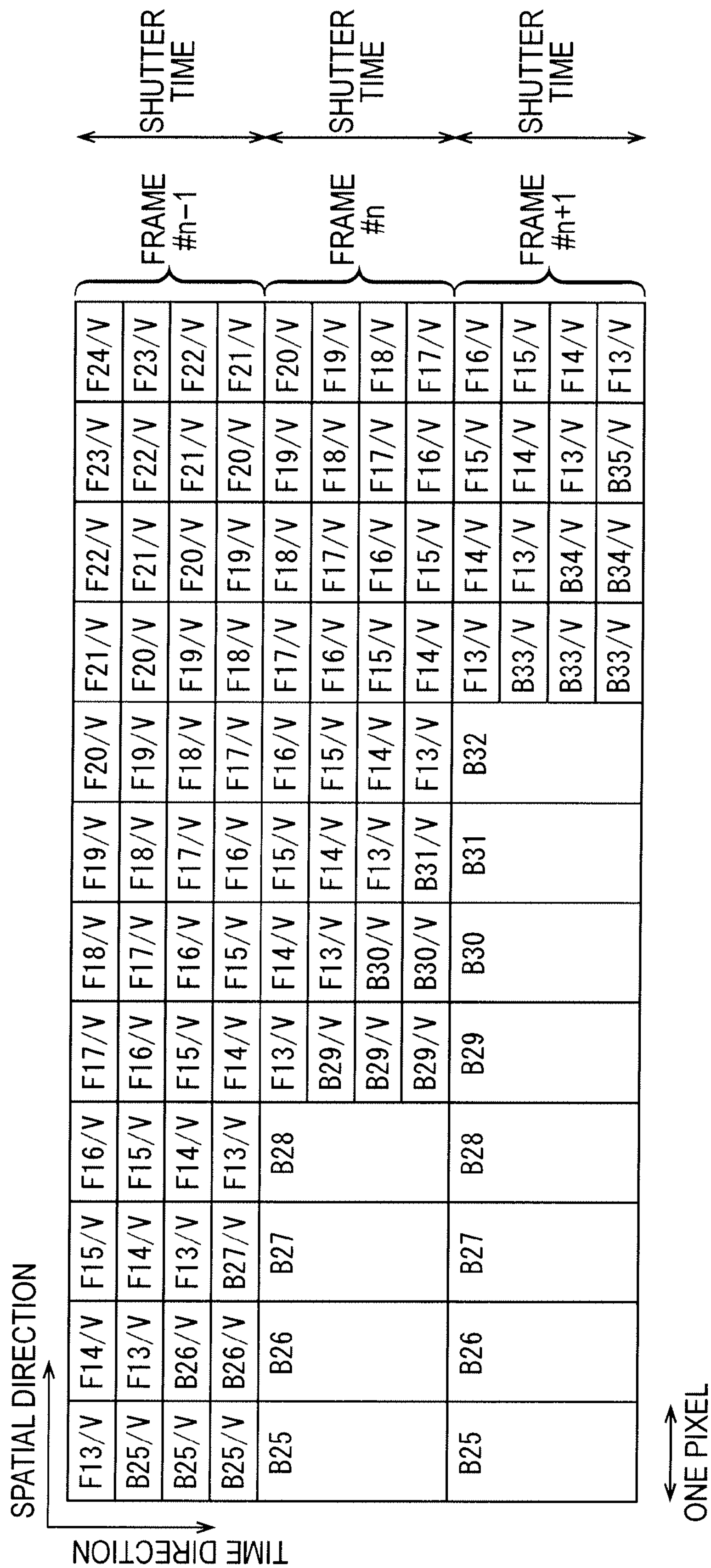

FIG. 408 is a model diagram wherein pixel values are expanded in the time direction, and a period corresponding to shutter time is divided.

Figure 409:
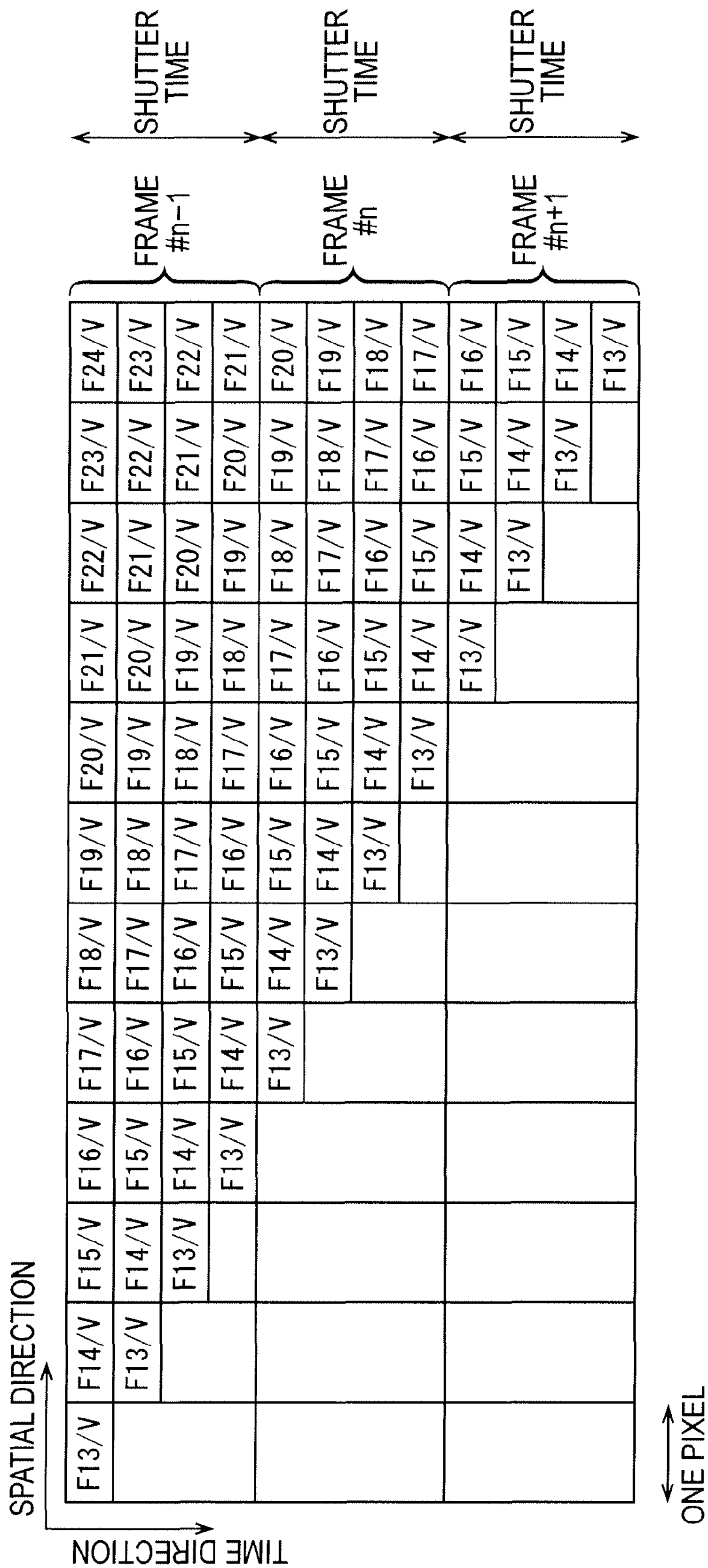

FIG. 409 is a model diagram wherein pixel values are expanded in the time direction, and a period corresponding to shutter time is divided.

Figure 410:
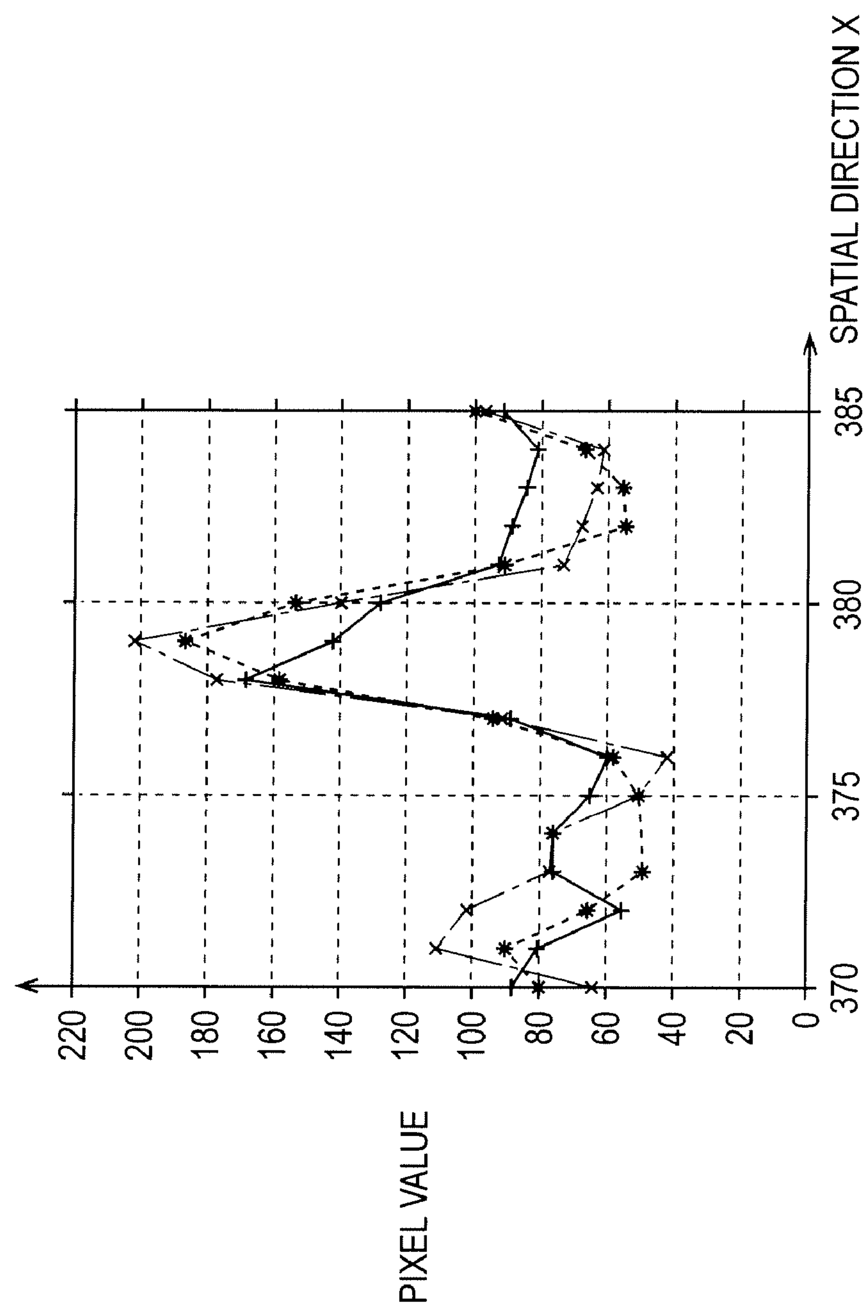

FIG. 410 is a diagram for describing the processing result using an approximation function made up of a discontinuous function in the time-space directions and the other processing results.

Figure 411:
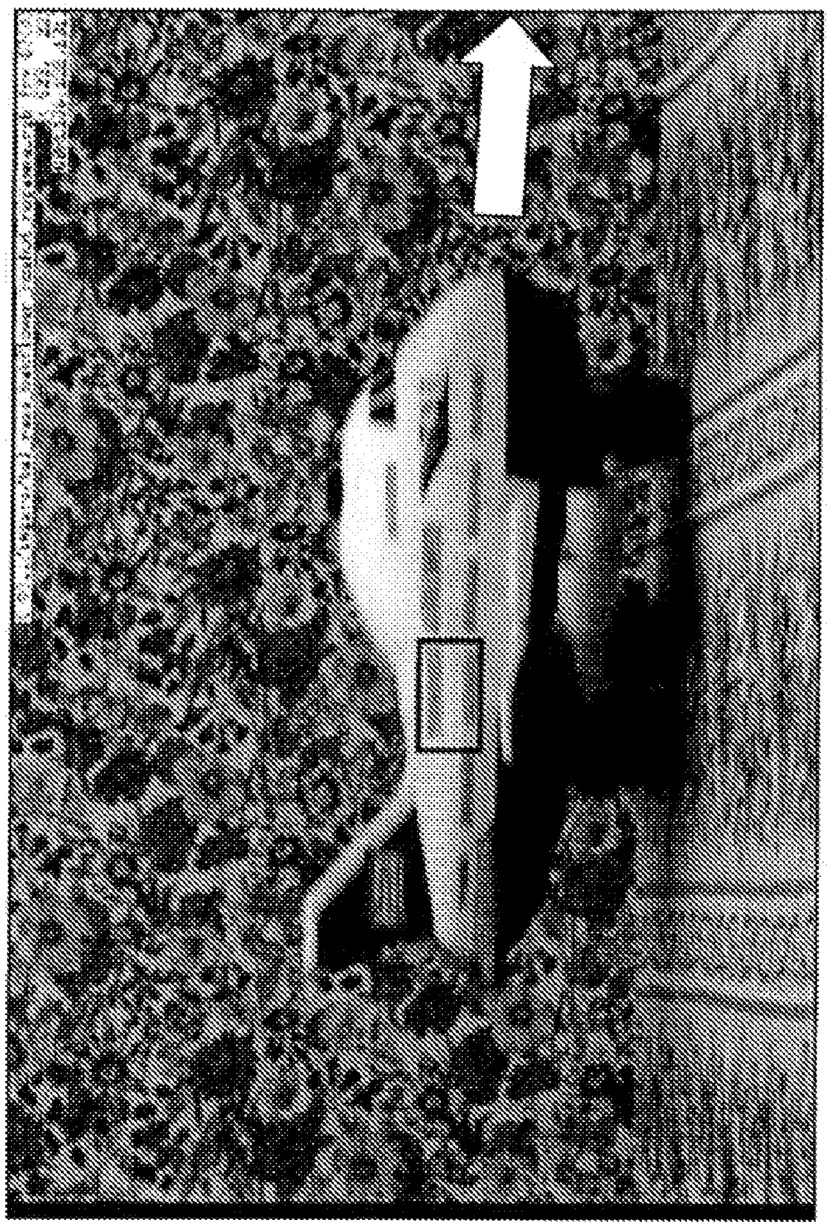

FIG. 411 is a diagram for describing an image including movement blurring in the horizontal direction.

Figure 412:
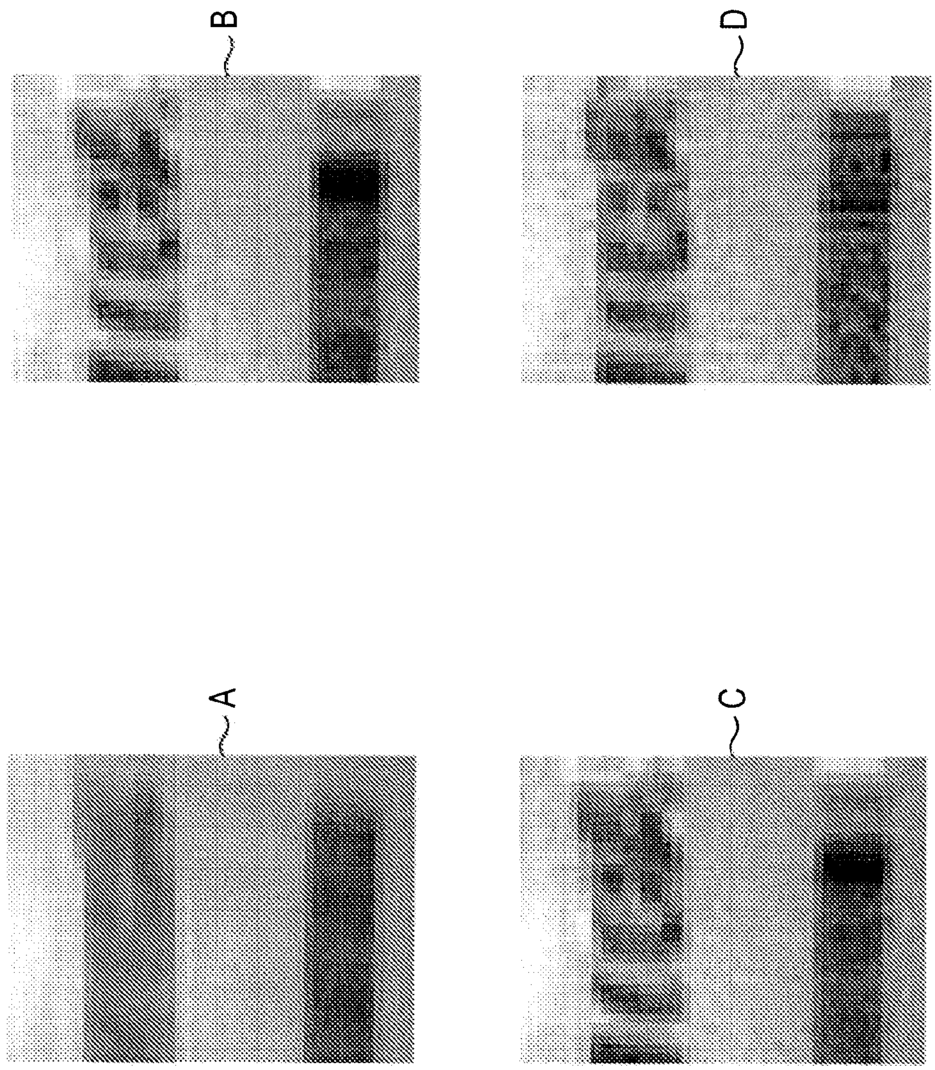

FIG. 412 is a diagram for describing the processing result of the image shown in FIG. 411 using an approximation function made up of a discontinuous function in the time-space directions and the other processing results.

Figure 413:
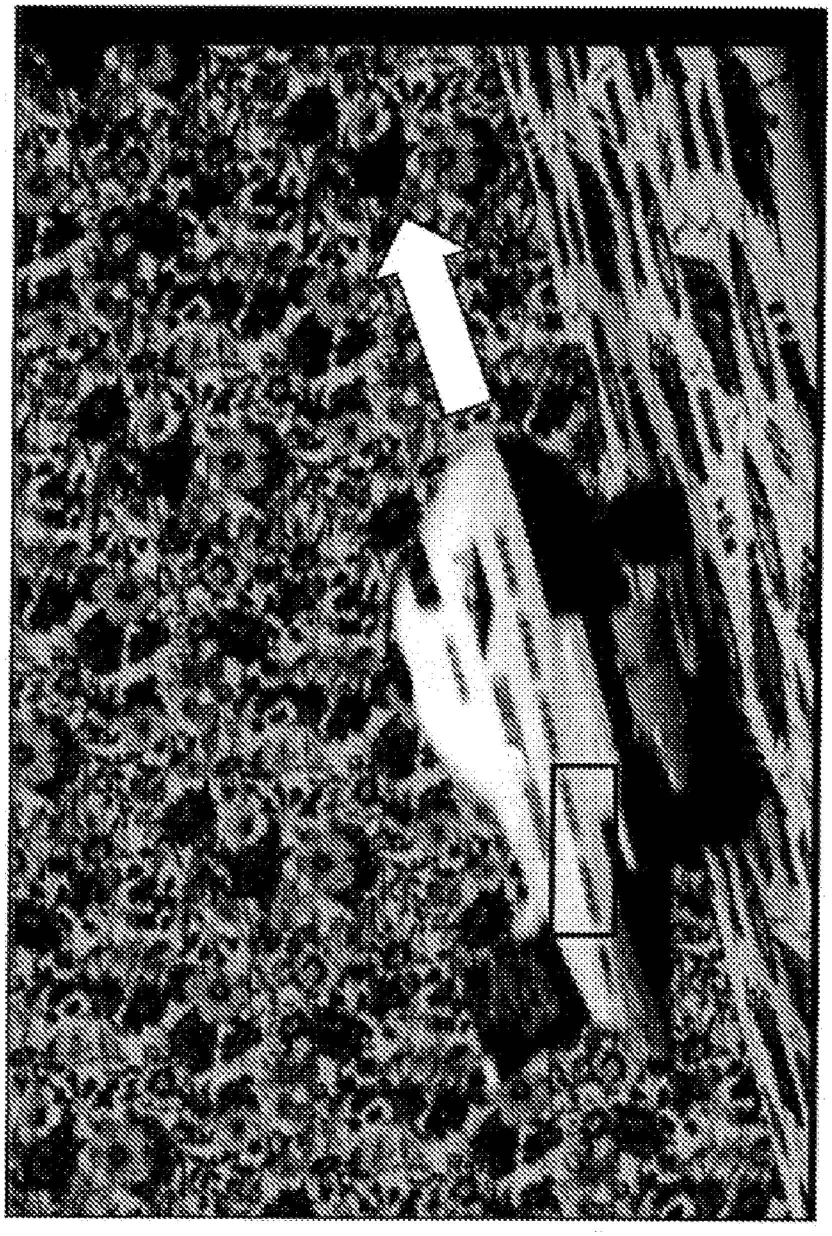

FIG. 413 is a diagram for describing an image including movement blurring in the oblique direction.

Figure 414:
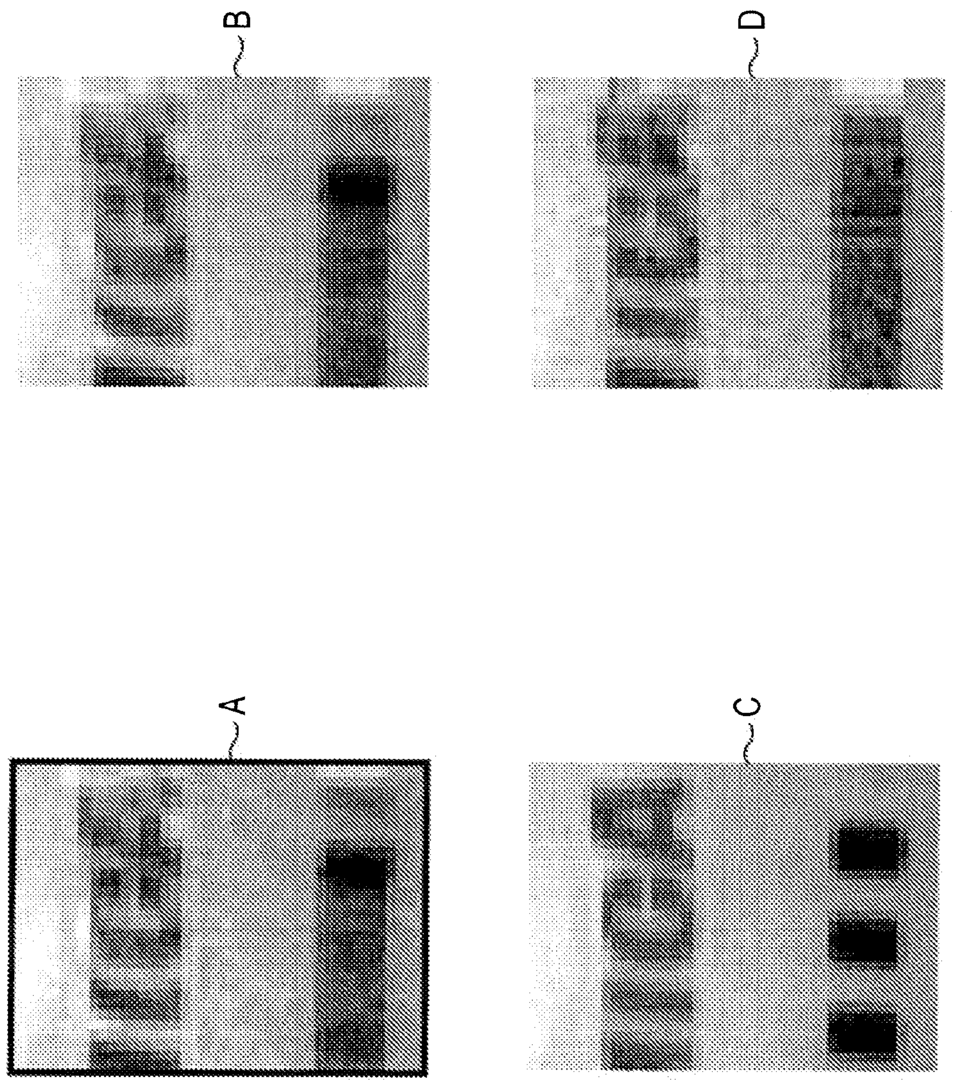

FIG. 414 is a diagram for describing the processing result of the image shown in FIG. 413 using an approximation function made up of a discontinuous function in the time-space directions and the other processing results.

Figure 415:
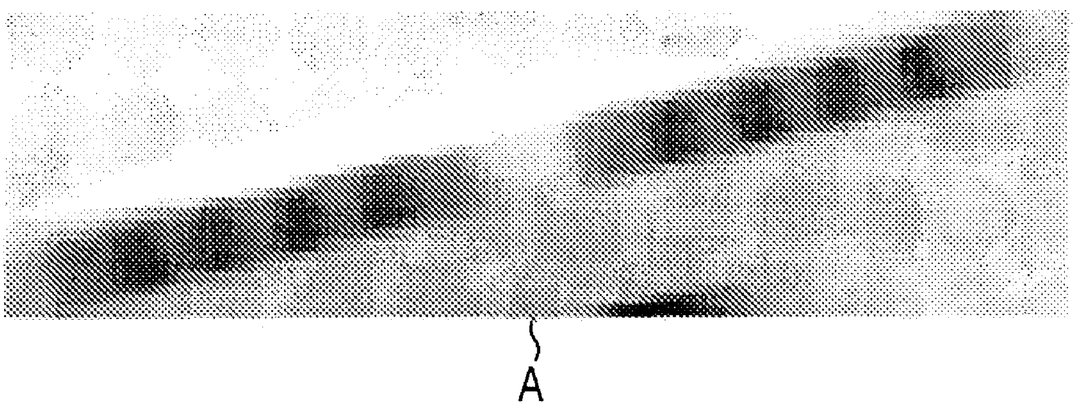
Figure 415:
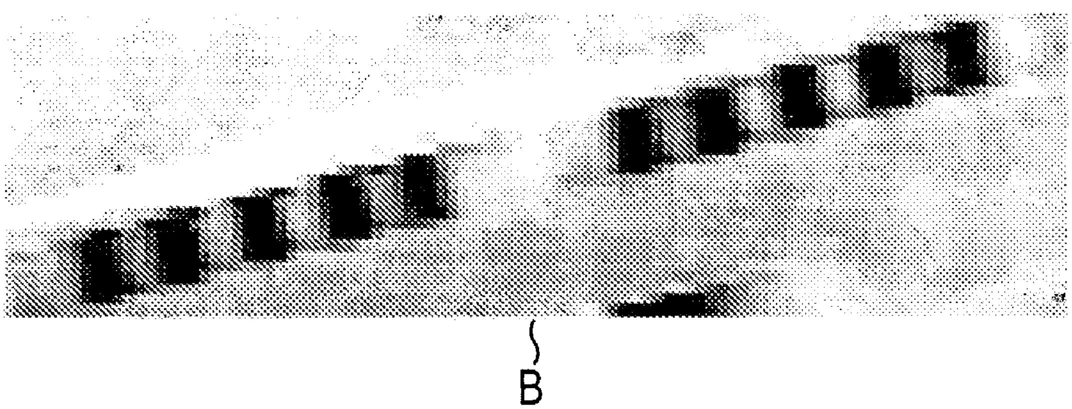

FIG. 415 is a diagram illustrating the processing result of an image including movement blurring in the oblique direction using an approximation function made up of a discontinuous function in the time-space directions.

BEST MODE FOR CARRYING OUT THE INVENTION

FIG. 1 illustrates the principle of the present invention. As shown in the drawing, events (phenomena) in an actual world 1 having dimensions such as space, time, mass, and so forth, are acquired by a sensor 2, and formed into data. Events in the actual world 1 refer to light (images), sound, pressure, temperature, mass, humidity, brightness/darkness, or acts, and so forth. The events in the actual world 1 are distributed in the space-time directions. For example, an image of the actual world 1 is a distribution of the intensity of light of the actual world 1 in the space-time directions.

Taking note of the sensor 2, of the events in the actual world 1 having the dimensions of space, time, and mass, the events in the actual world 1 which the sensor 2 can acquire, are converted into data 3 by the sensor 2. It can be said that information indicating events in the actual world 1 are acquired by the sensor 2.

That is to say, the sensor 2 converts information indicating events in the actual world 1, into data 3. It can be said that signals which are information indicating the events (phenomena) in the actual world 1 having dimensions such as space, time, and mass, are acquired by the sensor 2 and formed into data.

Hereafter, the distribution of events such as light (images), sound, pressure, temperature, mass, humidity, rightness/darkness, or smells, and so forth, in the actual world 1, will be referred to as signals of the actual world 1, which are information indicating events. Also, signals which are information indicating events of the actual world 1 will also be referred to simply as signals of the actual world 1. In the present Specification, signals are to be understood to include phenomena and events, and also include those wherein there is no intent on the transmitting side.

The data 3 (detected signals) output from the sensor 2 is information obtained by projecting the information indicating the events of the actual world 1 on a space-time having a lower dimension than the actual world 1. For example, the data 3 which is image data of a moving image, is information obtained by projecting an image of the three-dimensional space direction and time direction of the actual world 1 on the time-space having the two-dimensional space direction and time direction. Also, in the event that the data 3 is digital data for example, the data 3 is rounded off according to the sampling increments. In the event that the data 3 is analog data, information of the data 3 is either compressed according to the dynamic range, or a part of the information has been deleted by a limiter or the like.

Thus, by projecting the signals shown are information indicating events in the actual world 1 having a predetermined number of dimensions onto data 3 (detection signals), a part of the information indicating events in the actual world 1 is dropped. That is to say, a part of the information indicating events in the actual world 1 is dropped from the data 3 which the sensor 2 outputs.

However, even though a part of the information indicating events in the actual world 1 is dropped due to projection, the data 3 includes useful information for estimating the signals which are information indicating events (phenomena) in the actual world 1.

With the present invention, information having continuity contained in the data 3 is used as useful information for estimating the signals which is information of the actual world 1. Continuity is a concept which is newly defined.

Taking note of the actual world 1, events in the actual world 1 include characteristics which are constant in predetermined dimensional directions. For example, an object (corporeal object) in the actual world 1 either has shape, pattern, or color that is continuous in the space direction or time direction, or has repeated patterns of shape, pattern, or color.

Accordingly, the information indicating the events in actual world 1 includes characteristics constant in a predetermined dimensional direction.

With a more specific example, a linear object such as a string, cord, or rope, has a characteristic which is constant in the length-wise direction, i.e., the spatial direction, that the cross-sectional shape is the same at arbitrary positions in the length-wise direction. The constant characteristic in the spatial direction that the cross-sectional shape is the same at arbitrary positions in the length-wise direction comes from the characteristic that the linear object is long.

Accordingly, an image of the linear object has a characteristic which is constant in the length-wise direction, i.e., the spatial direction, that the cross-sectional shape is the same, at arbitrary positions in the length-wise direction.

Also, a monotone object, which is a corporeal object, having an expanse in the spatial direction, can be said to have a constant characteristic of having the same color in the spatial direction regardless of the part thereof.

In the same way, an image of a monotone object, which is a corporeal object, having an expanse in the spatial direction, can be said to have a constant characteristic of having the same color in the spatial direction regardless of the part thereof.

In this way, events in the actual world 1 (real world) have characteristics which are constant in predetermined dimensional directions, so signals of the actual world 1 have characteristics which are constant in predetermined dimensional directions.

In the present Specification, such characteristics which are constant in predetermined dimensional directions will be called continuity. Continuity of the signals of the actual world 1 (real world) means the characteristics which are constant in predetermined dimensional directions which the signals indicating the events of the actual world 1 (real world) have.

Countless such continuities exist in the actual world 1 (real world).

Next, taking note of the data 3, the data 3 is obtained by signals which is information indicating events of the actual world 1 having predetermined dimensions being projected by the sensor 2, and includes continuity corresponding to the continuity of signals in the real world. It can be said that the data 3 includes continuity wherein the continuity of actual world signals has been projected.

However, as described above, in the data 3 output from the sensor 2, a part of the information of the actual world 1 has been lost, so a part of the continuity contained in the signals of the actual world 1 (real world) is lost.

In other words., the data 3 contains a part of the continuity within the continuity of the signals of the actual world 1 (real world) as data continuity. Data continuity means characteristics which are constant in predetermined dimensional directions, which the data 3 has.

With the present invention, the data continuity which the data 3 has is used as significant data for estimating signals which are information indicating events of the actual world 1.

For example, with the present invention, information indicating an event in the actual world 1 which has been lost is generated by signals processing of the data 3, using data continuity.

Now, with the present invention, of the length (space), time, and mass, which are dimensions of signals serving as information indicating events in the actual world 1, continuity in the spatial direction or time direction, are used.

Returning to FIG. 1, the sensor 2 is formed of, for example, a digital still camera, a video camera, or the like, and takes images of the actual world 1, and outputs the image data which is the obtained data 3, to a signal processing device 4. The sensor 2 may also be a thermography device, a pressure sensor using photo-elasticity, or the like.

The signal processing device 4 is configured of, for example, a personal computer or the like.

Figure 2:
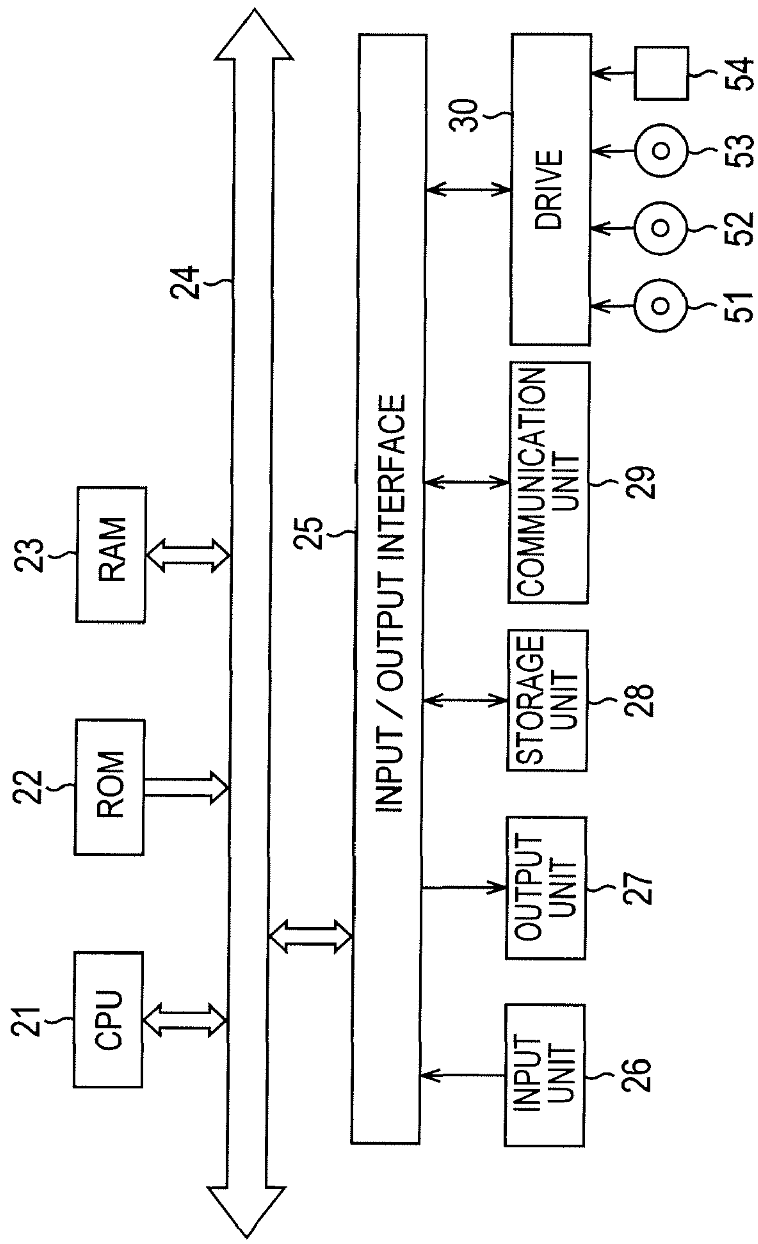
FIG. 2 is a block diagram illustrating an example of a configuration of a signal processing device 4.

The signal processing device 4 is configured as shown in FIG. 2, for example. A CPU (Central Processing Unit) 21 executes various types of processing following programs stored in ROM (Read Only Memory) 22 or the storage unit 28. RAM (Random Access Memory) 23 stores programs to be executed by the CPU 21, data, and so forth, as suitable. The CPU 21, ROM 22, and RAM 23, are mutually connected by a bus 24.

Also connected to the CPU 21 is an input/output interface 25 via the bus 24. An input device 26 made up of a keyboard, mouse, microphone, and so forth, and an output unit 27 made up of a display, speaker, and so forth, are connected to the input/output interface 25. The CPU 21 executes various types of processing corresponding to commands input from the input unit 26. The CPU 21 then outputs images and audio and the like obtained as a result of processing to the output unit 27.

A storage unit 28 connected to the input/output interface 25 is configured of a hard disk for example, and stores the programs and various types of data which the CPU 21 executes. A communication unit 29 communicates with external devices via the Internet and other networks. In the case of this example, the communication unit 29 acts as an acquiring unit for capturing data 3 output from the sensor 2.

Also, an arrangement may be made wherein programs are obtained via the communication unit 29 and stored in the storage unit 28.

A drive 30 connected to the input/output interface 25 drives a magnetic disk 51, optical disk 52, magneto-optical disk 53, or semiconductor memory 54 or the like mounted thereto, and obtains programs and data recorded therein. The obtained programs and data are transferred to the storage unit 28 as necessary and stored.

FIG. 3 is a block diagram illustrating a signal processing device 4.

Note that whether the functions of the signal processing device 4 are realized by hardware or realized by software is irrelevant. That is to say, the block diagrams in the present Specification may be taken to be hardware block diagrams or may be taken to be software function block diagrams.

With the signal processing device 4 shown in FIG. 3, image data which is an example of the data 3 is input, and the continuity of the data is detected from the input image data (input image). Next, the signals of the actual world 1 acquired by the sensor 2 are estimated from the continuity of the data detected. Then, based on the estimated signals of the actual world 1, an image is generated, and the generated image (output image) is output. That is to say, FIG. 3 is a diagram illustrating the configuration of the signal processing device 4 which is an image processing device.

The input image (image data which is an example of the data 3) input to the signal processing device 4 is supplied to a data continuity detecting unit 101 and actual world estimating unit 102.

The data continuity detecting unit 101 detects the continuity of the data from the input image, and supplies data continuity information indicating the detected continuity to the actual world estimating unit 102 and an image generating unit 103. The data continuity information includes, for example, the position of a region of pixels having continuity of data, the direction of a region of pixels having continuity of data (the angle or gradient of the time direction and space direction), or the length of a region of pixels having continuity of data, or the like in the input image. Detailed configuration of the data continuity detecting unit 101 will be described later.

The actual world estimating unit 102 estimates the signals of the actual world 1, based on the input image and the data continuity information supplied from the data continuity detecting unit 101. That is to say, the actual world estimating unit 102 estimates an image which is the signals of the actual world cast into the sensor 2 at the time that the input image was acquired. The actual world estimating unit 102 supplies the actual world estimation information indicating the results of the estimation of the signals of the actual world 1, to the image generating unit 103. The detailed configuration of the actual world estimating unit 102 will be described later.

The image generating unit 103 generates signals further approximating the signals of the actual world 1, based on the actual world estimation information indicating the estimated signals of the actual world 1, supplied from the actual world estimating unit 102, and outputs the generated signals. Or, the image generating unit 103 generates signals further approximating the signals of the actual world 1, based on the data continuity information supplied from the data continuity detecting unit 101, and the actual world estimation information indicating the estimated signals of the actual world 1, supplied from the actual world estimating unit 102, and outputs the generated signals.

That is to say, the image generating unit 103 generates an image further approximating the image of the actual world 1 based on the actual world estimation information, and outputs the generated image as an output image. Or, the image generating unit 103 generates an image further approximating the image of the actual world 1 based on the data continuity information and actual world estimation information, and outputs the generated image as an output image.

For example, the image generating unit 103 generates an image with higher resolution in the spatial direction or time direction in comparison with the input image, by integrating the estimated image of the actual world 1 within a desired range of the spatial direction or time direction, based on the actual world estimation information, and outputs the generated image as an output image. For example, the image generating unit 103 generates an image by extrapolation/interpolation, and outputs the generated image as an output image.

Detailed configuration of the image generating unit 103 will be described later.

Next, the principle of the present invention will be described with reference to FIG. 4 through FIG. 7.

Figure 4:
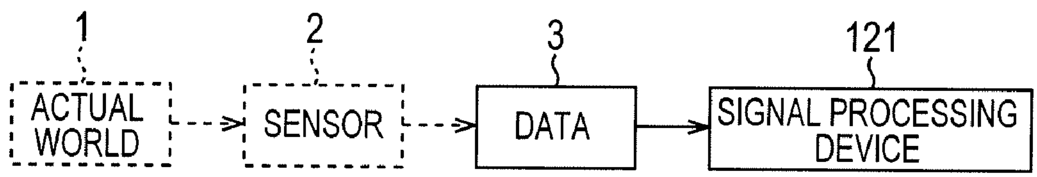
FIG. 4 is a diagram illustrating the principle of processing of a conventional image processing device 121.

FIG. 4 is a diagram describing the principle of processing with a conventional signal processing device 121. The conventional signal processing device 121 takes the data 3 as the reference for processing, and executes processing such as increasing resolution and the like with the data 3 as the object of processing. With the conventional signal processing device 121, the actual world 1 is never taken into consideration, and the data 3 is the ultimate reference, so information exceeding the information contained in the data 3 can not be obtained as output.

Also, with the conventional signal processing device 121, distortion in the data 3 due to the sensor 2 (difference between the signals which are information of the actual world 1, and the data 3) is not taken into consideration whatsoever, so the conventional signal processing device 121 outputs signals still containing the distortion. Further, depending on the processing performed by the signal processing device 121, the distortion due to the sensor 2 present within the data 3 is further amplified, and data containing the amplified distortion is output.

Thus, with conventional signals processing, (the signals of) the actual world 1, from which the data 3 has been obtained, was never taken into consideration. In other words, with the conventional signal processing, the actual world 1 was understood within the framework of the information contained in the data 3, so the limits of the signal processing are determined by the information and distortion contained in the data 3. The present Applicant has separately proposed signal processing taking into consideration the actual world 1, but this did not take into consideration the later-described continuity.

In contrast with this, with the signal processing according to the present invention, processing is executed taking (the signals of) the actual world 1 into consideration in an explicit manner.

Figure 5:
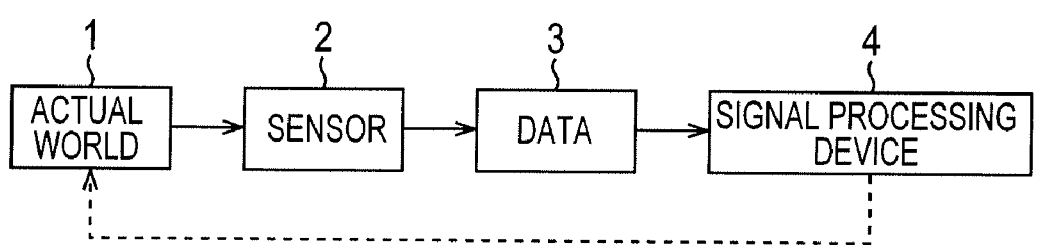
FIG. 5 is a diagram for describing the principle of processing of the image processing device 4.

FIG. 5 is a diagram for describing the principle of the processing at the signal processing device 4 according to the present invention.

This is the same as the conventional arrangement wherein signals, which are information indicating events of the actual world 1, are obtained by the sensor 2, and the sensor 2 outputs data 3 wherein the signals which are information of the actual world 1 are projected.

However, with the present invention, signals, which are information indicating events of the actual world 1, obtained by the sensor 2, are explicitly taken into consideration. That is to say, signal processing is performed conscious of the fact that the data 3 contains distortion due to the sensor 2 (difference between the signals which are information of the actual world 1, and the data 3).

Thus, with the signal processing according to the present invention, the processing results are not restricted due to the information contained in the data 3 and the distortion, and for example, processing results which are more accurate and which have higher precision than conventionally can be obtained with regard to events in the actual world 1. That is to say, with the present invention, processing results which are more accurate and which have higher precision can be obtained with regard to signals, which are information indicating events of the actual world 1, input to the sensor 2.

Figure 6:
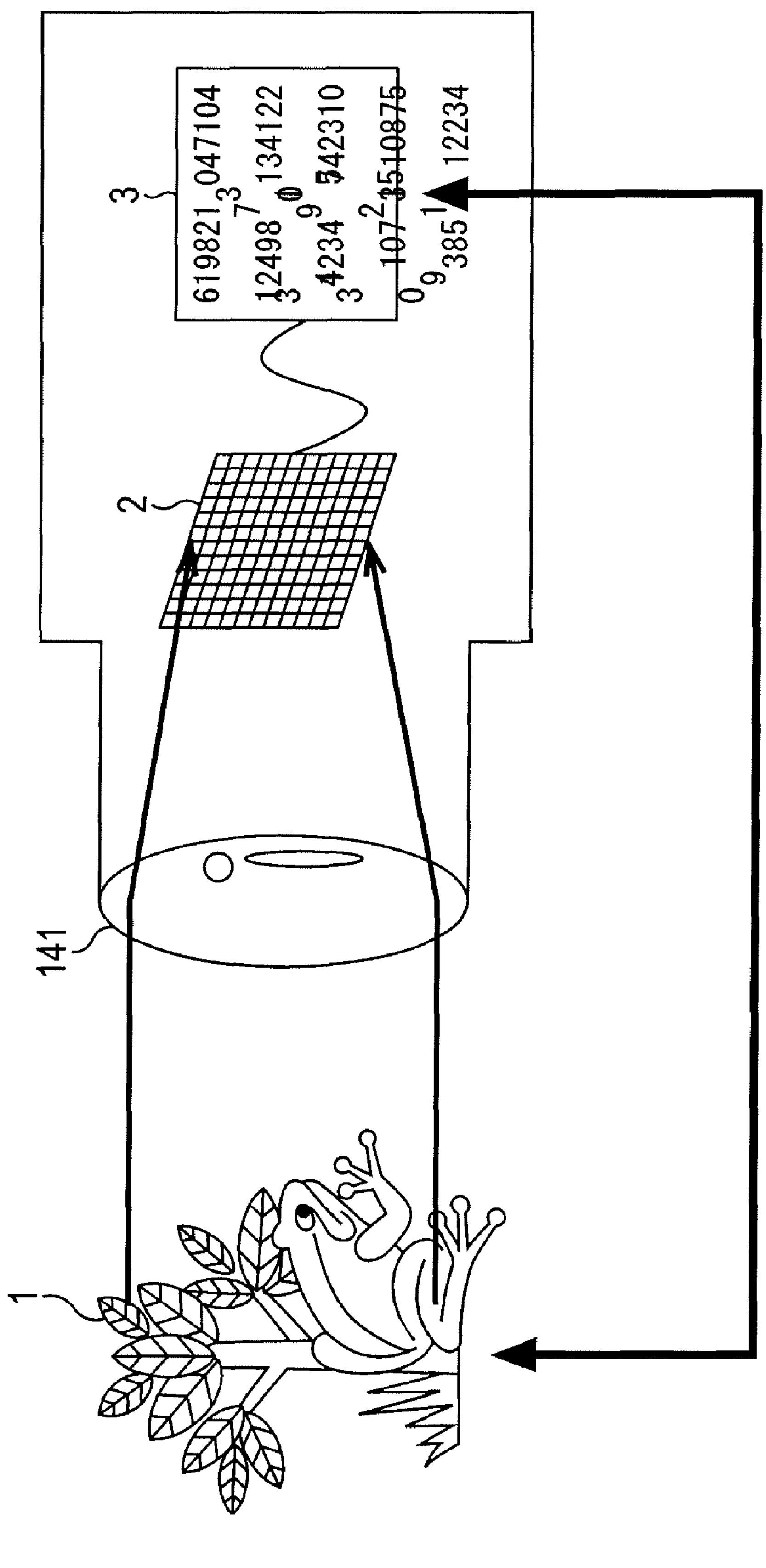
FIG. 6 is a diagram for describing the principle of the present invention in greater detail.
Figure 7:
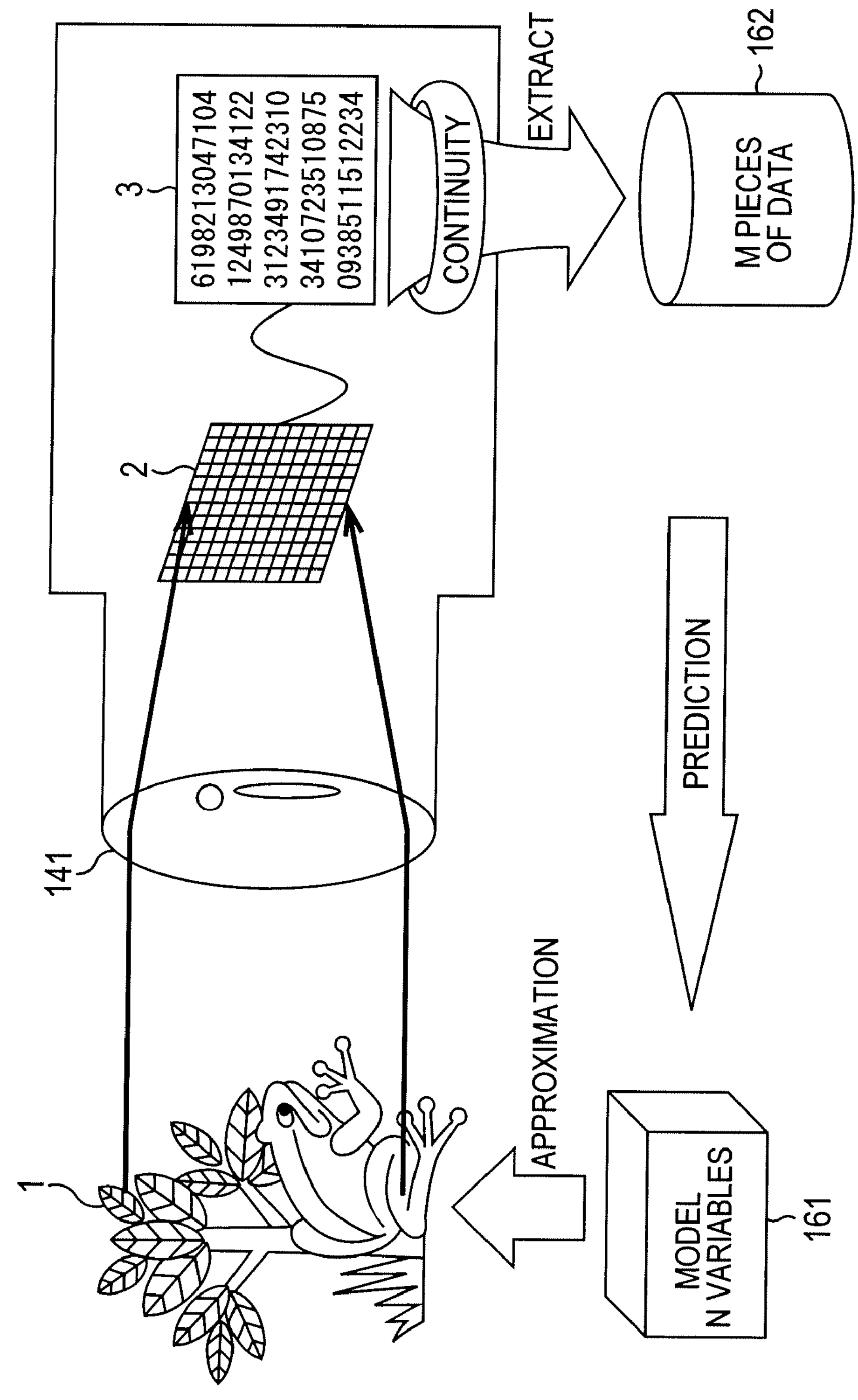
FIG. 7 is a diagram for describing the principle of the present invention in greater detail.

FIG. 6 and FIG. 7 are diagrams for describing the principle of the present invention in greater detail.

As shown in FIG. 6, signals of the actual world, which are an image for example, are image on the photoreception face of a CCD (Charge Coupled Device) which is an example of the sensor 2, by an optical system 141 made up of lenses, an optical LPF (Low Pass Filter), and the like. The CCD, which is an example of the sensor 2, has integration properties, so difference is generated in the data 3 output from the CCD as to the image of the actual world 1. Details of the integration properties of the sensor 2 will be described later.

With the signal processing according to the present invention, the relationship between the image of the actual world 1 obtained by the CCD, and the data 3 taken by the CCD and output, is explicitly taken into consideration. That is to say, the relationship between the data 3 and the signals which is information of the actual world obtained by the sensor 2, is explicitly taken into consideration.

More specifically, as shown in FIG. 7, the signal processing device 4 uses a model 161 to approximate (describe) the actual world 1. The model 161 is represented by, for example, N variables. More accurately, the model 161 approximates (describes) signals of the actual world 1.

In order to predict the model 161, the signal processing device 4 extracts M pieces of data 162 from the data 3. At the time of extracting the M pieces of data 162 from the data 3, the signal processing device 4 uses the continuity of the data contained in the data 3. In other words, the signal processing device 4 extracts data 162 for predicting the model 161, based o the continuity of the data contained in the data 3. Consequently, the model 161 is constrained by the continuity of the data.

That is to say, the model 161 approximates (information (signals) indicating) events of the actual world having continuity (constant characteristics in a predetermined dimensional direction), which generates the data continuity in the data 3.

Now, in the event that the number M of the data 162 is N or more, which is the number of variables of the model, the model 161 represented by the N variables can be predicted, from the M pieces of the data 162.

In this way, the signal processing device 4 can take into consideration the signals which are information of the actual world 1, by predicting the model 161 approximating (describing) the (signals of the) actual world 1.

Next, the integration effects of the sensor 2 will be described.

An image sensor such as a CCD or CMOS (Complementary Metal-Oxide Semiconductor), which is the sensor 2 for taking images, projects signals, which are information of the real world, onto two-dimensional data, at the time of imaging the real world. The pixels of the image sensor each have a predetermined area, as a so-called photoreception face (photoreception region). Incident light to the photoreception face having a predetermined area is integrated in the space direction and time direction for each pixel, and is converted into a single pixel value for each pixel.

The space-time integration of images will be described with reference to FIG. 8 through FIG. 11.

An image sensor images a subject (object) in the real world, and outputs the obtained image data as a result of imagining in increments of single frames. That is to say, the image sensor acquires signals of the actual world 1 which is light reflected off of the subject of the actual world 1, and outputs the data 3.

For example, the image sensor outputs image data of 30 frames per second. In this case, the exposure time of the image sensor can be made to be 1/30 seconds. The exposure time is the time from the image sensor starting conversion of incident light into electric charge, to ending of the conversion of incident light into electric charge. Hereafter, the exposure time will also be called shutter time.

Figure 8:
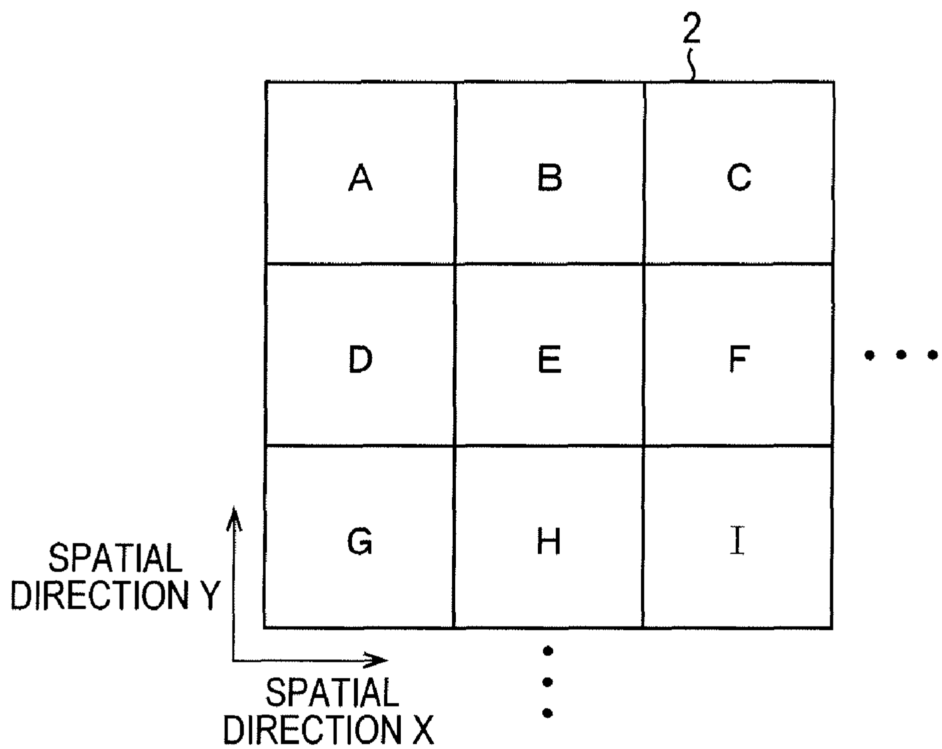
FIG. 8 is a diagram describing an example of the placement of pixels on an image sensor.

FIG. 8 is a diagram describing an example of a pixel array on the image sensor. In FIG. 8, A through I denote individual pixels. The pixels are placed on a plane corresponding to the image displayed by the image data. A single detecting element corresponding to a single pixel is placed on the image sensor. At the time of the image sensor taking images of the actual world 1, the one detecting element outputs one pixel value corresponding to the one pixel making up the image data. For example, the position in the spatial direction X (X coordinate) of the detecting element corresponds to the horizontal position on the image displayed by the image data, and the position in the spatial direction Y (Y coordinate) of the detecting element corresponds to the vertical position on the image displayed by the image data.

Distribution of intensity of light of the actual world 1 has expanse in the three-dimensional spatial directions and the time direction, but the image sensor acquires light of the actual world 1 in two-dimensional spatial directions and the time direction, and generates data 3 representing the distribution of intensity of light in the two-dimensional spatial directions and the time direction.

Figure 9:
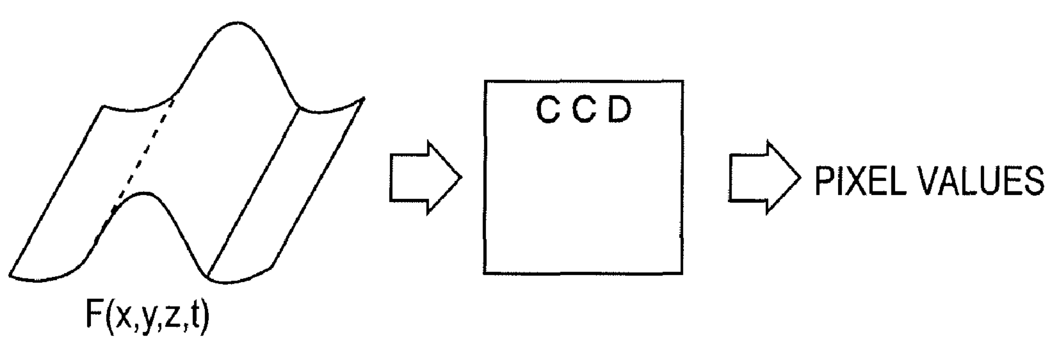
FIG. 9 is a diagram for describing the operations of a detecting device which is a CCD.

As shown in FIG. 9, the detecting device which is a CCD for example, converts light cast onto the photoreception face (photoreception region) (detecting region) into electric charge during a period corresponding to the shutter time, and accumulates the converted charge. The light is information (signals) of the actual world 1 regarding which the intensity is determined by the three-dimensional spatial position and point-in-time. The distribution of intensity of light of the actual world 1 can be represented by a function F(x, y, z, t), wherein position x, y, z, in three-dimensional space, and point-in-time t, are variables.

The amount of charge accumulated in the detecting device which is a CCD is approximately proportionate to the intensity of the light cast onto the entire photoreception face having two-dimensional spatial expanse, and the amount of time that light is cast thereupon. The detecting device adds the charge converted from the light cast onto the entire photoreception face, to the charge already accumulated during a period corresponding to the shutter time. That is to say, the detecting device integrates the light cast onto the entire photoreception face having a two-dimensional spatial expanse, and accumulates a change of an amount corresponding to the integrated light during a period corresponding to the shutter time. The detecting device can also be said to have an integration effect regarding space (photoreception face) and time (shutter time).

The charge accumulated in the detecting device is converted into a voltage value by an unshown circuit, the voltage value is further converted into a pixel value such as digital data or the like, and is output as data 3. Accordingly, the individual pixel values output from the image sensor have a value projected on one-dimensional space, which is the result of integrating the portion of the information (signals) of the actual world 1 having time-space expanse with regard to the time direction of the shutter time and the spatial direction of the photoreception face of the detecting device.

That is to say, the pixel value of one pixel is represented as the integration of F(x, y, t). F(x, y, t) is a function representing the distribution of light intensity on the photoreception face of the detecting device. For example, the pixel value P is represented by Expression (1).

$$P = \int_{t_1}^{t_2} \int_{y_1}^{y_2} \int_{x_1}^{x_2} F(x, y, t)\,dx\,dy\,dt \tag{1}$$

In Expression (1), $x_1$ represents the spatial coordinate at the left-side boundary of the photoreception face of the detecting device (X coordinate). $x_2$ represents the spatial coordinate at the right-side boundary of the photoreception face of the detecting device (X coordinate). In Expression (1), $y_1$ represents the spatial coordinate at the top-side boundary of the photoreception face of the detecting device (Y coordinate). $y_2$ represents the spatial coordinate at the bottom-side boundary of the photoreception face of the detecting device (Y coordinate). Also, $t_1$ represents the point-in-time at which conversion of incident light into an electric charge was started. $t_2$ represents the point-in-time at which conversion of incident light into an electric charge was ended.

Note that actually, the gain of the pixel values of the image data output from the image sensor is corrected for the overall frame.

Each of the pixel values of the image data are integration values of the light cast on the photoreception face of each of the detecting elements of the image sensor, and of the light cast onto the image sensor, waveforms of light of the actual world 1 finer than the photoreception face of the detecting element are hidden in the pixel value as integrated values.

Hereafter, in the present Specification, the waveform of signals represented with a predetermined dimension as a reference may be referred to simply as waveforms.

Thus, the image of the actual world 1 is integrated in the spatial direction and time direction in increments of pixels, so a part of the continuity of the image of the actual world 1 drops out from the image data, so only another part of the continuity of the image of the actual world 1 is left in the image data. Or, there may be cases wherein continuity which has changed from the continuity of the image of the actual world 1 is included in the image data.

Further description will be made regarding the integration effect in the spatial direction for an image taken by an image sensor having integration effects.

Figure 10:
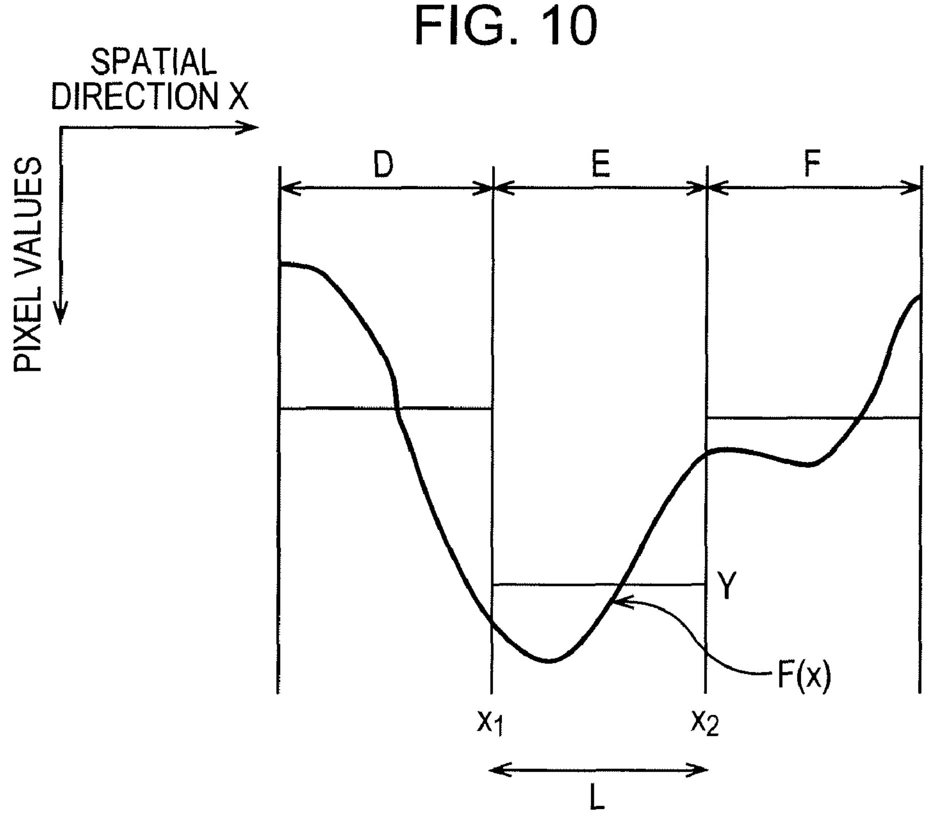
FIG. 10 is a diagram for describing the relationship between light cast into detecting elements corresponding to pixel D through pixel F, and pixel values.

FIG. 10 is a diagram describing the relationship between incident light to the detecting elements corresponding to the pixel D through pixel F, and the pixel values. F(x) in FIG. 10 is an example of a function representing the distribution of light intensity of the actual world 1, having the coordinate x in the spatial direction X in space (on the detecting device) as a variable. In other words, F(x) is an example of a function representing the distribution of light intensity of the actual world 1, with the spatial direction Y and time direction constant. In FIG. 10, L indicates the length in the spatial direction X of the photoreception face of the detecting device corresponding to the pixel D through pixel F.

The pixel value of a single pixel is represented as the integral of F(x). For example, the pixel value P of the pixel E is represented by Expression (2).

$$P = \int_{x_1}^{x_2} F(x)\,dx \tag{2}$$

In the Expression (2), $x_1$ represents the spatial coordinate in the spatial direction X at the left-side boundary of the photoreception face of the detecting device corresponding to the pixel E. $x_2$ represents the spatial coordinate in the spatial direction X at the right-side boundary of the photoreception face of the detecting device corresponding to the pixel E.

In the same way, further description will be made regarding the integration effect in the time direction for an image taken by an image sensor having integration effects.

Figure 11:
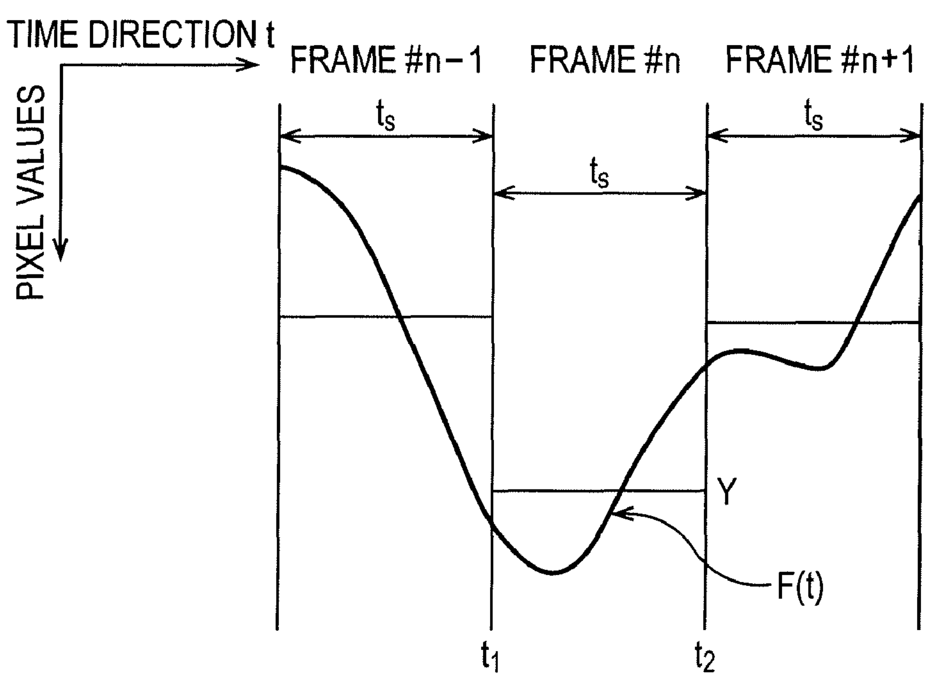
FIG. 11 is a diagram for describing the relationship between the passage of time, light cast into a detecting element corresponding to one pixel, and pixel values.

FIG. 11 is a diagram for describing the relationship between time elapsed, the incident light to a detecting element corresponding to a single pixel, and the pixel value. F(t) in FIG. 11 is a function representing the distribution of light intensity of the actual world 1, having the point-in-time t as a variable. In other words, F(t) is an example of a function representing the distribution of light intensity of the actual world 1, with the spatial direction Y and the spatial direction X constant. $T_s$ represents the shutter time.

The frame #n−1 is a frame which is previous to the frame #n time-wise, and the frame #n+1 is a frame following the frame #n time-wise. That is to say, the frame #n−1, frame #n, and frame #n+1, are displayed in the order of frame #n−1, frame #n, and frame #n+1.

Note that in the example shown in FIG. 11, the shutter time $t_s$ and the frame intervals are the same.

The pixel value of a single pixel is represented as the integral of F(x). For example, the pixel value P of the pixel of frame #n for example, is represented by Expression (3).

$$P = \int_{t_1}^{t_2} F(t)\,dx \tag{3}$$

In the Expression (3), $t_1$ represents the time at which conversion of incident light into an electric charge was started. $t_2$ represents the time at which conversion of incident light into an electric charge was ended.

Hereafter, the integration effect in the spatial direction by the sensor 2 will be referred to simply as spatial integration effect, and the integration effect in the time direction by the sensor 2 also will be referred to simply as time integration effect. Also, space integration effects or time integration effects will be simply called integration effects.

Next, description will be made regarding an example of continuity of data included in the data 3 acquired by the image sensor having integration effects.

Figure 12:
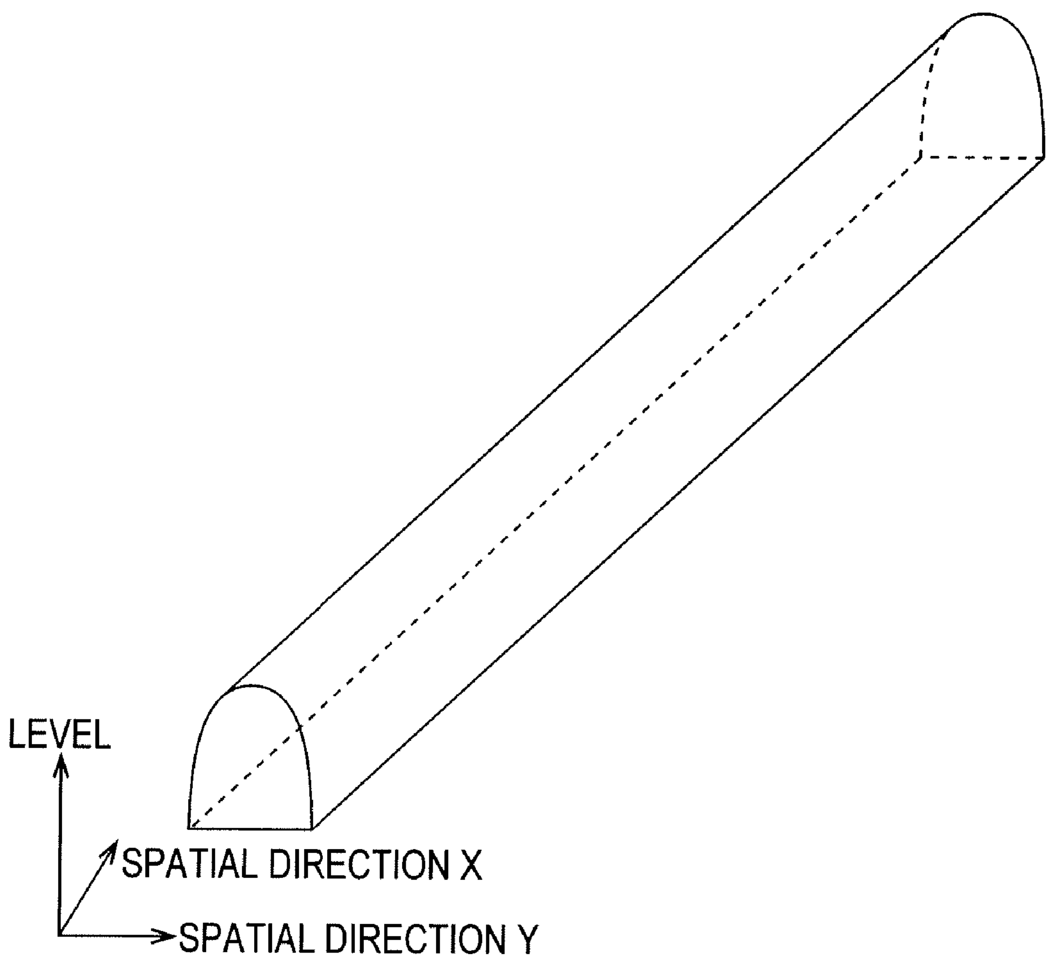
FIG. 12 is a diagram illustrating an example of an image of a linear-shaped object in the actual world 1.

FIG. 12 is a diagram illustrating a linear object of the actual world 1 (e.g., a fine line), i.e., an example of distribution of light intensity. In FIG. 12, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the linear object of the actual world 1 includes predetermined continuity. That is to say, the image shown in FIG. 12 has continuity in that the cross-sectional shape (the change in level as to the change in position in the direction orthogonal to the length direction), at any arbitrary position in the length direction.

Figure 13:
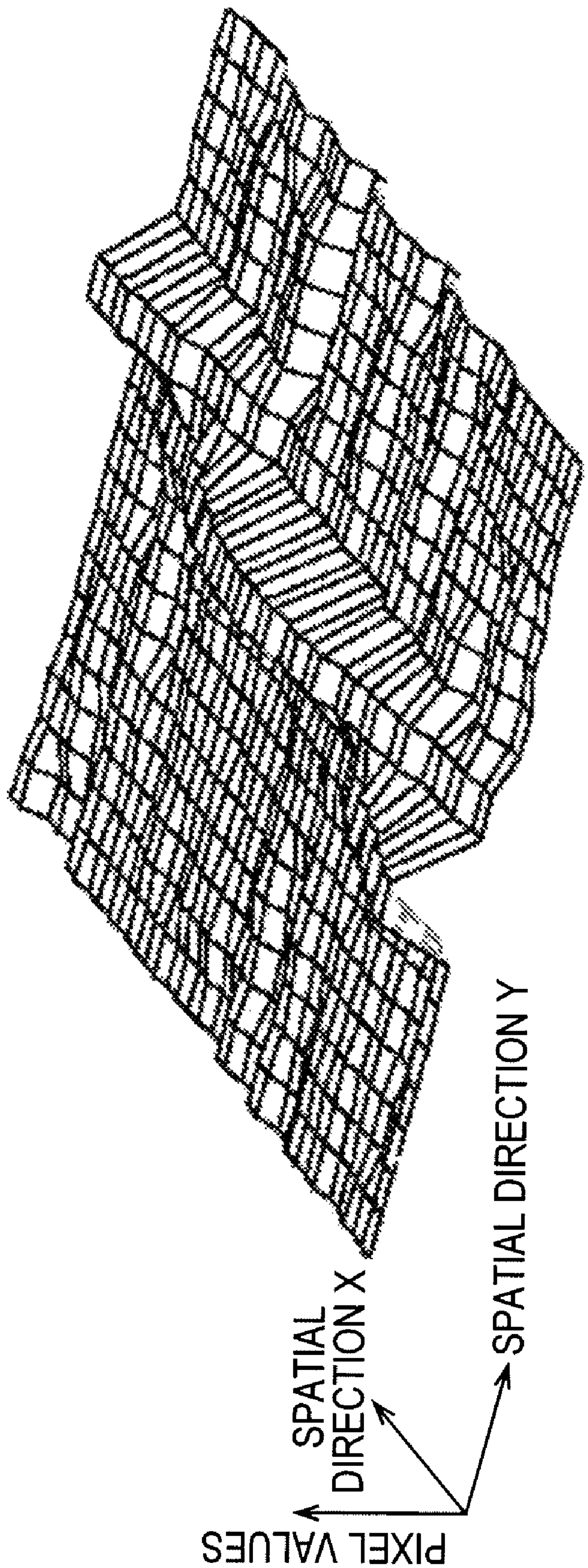
FIG. 13 is a diagram illustrating an example of pixel values of image data obtained by actual image-taking.

FIG. 13 is a diagram illustrating an example of pixel values of image data obtained by actual image-taking, corresponding to the image shown in FIG. 12.

Figure 14:
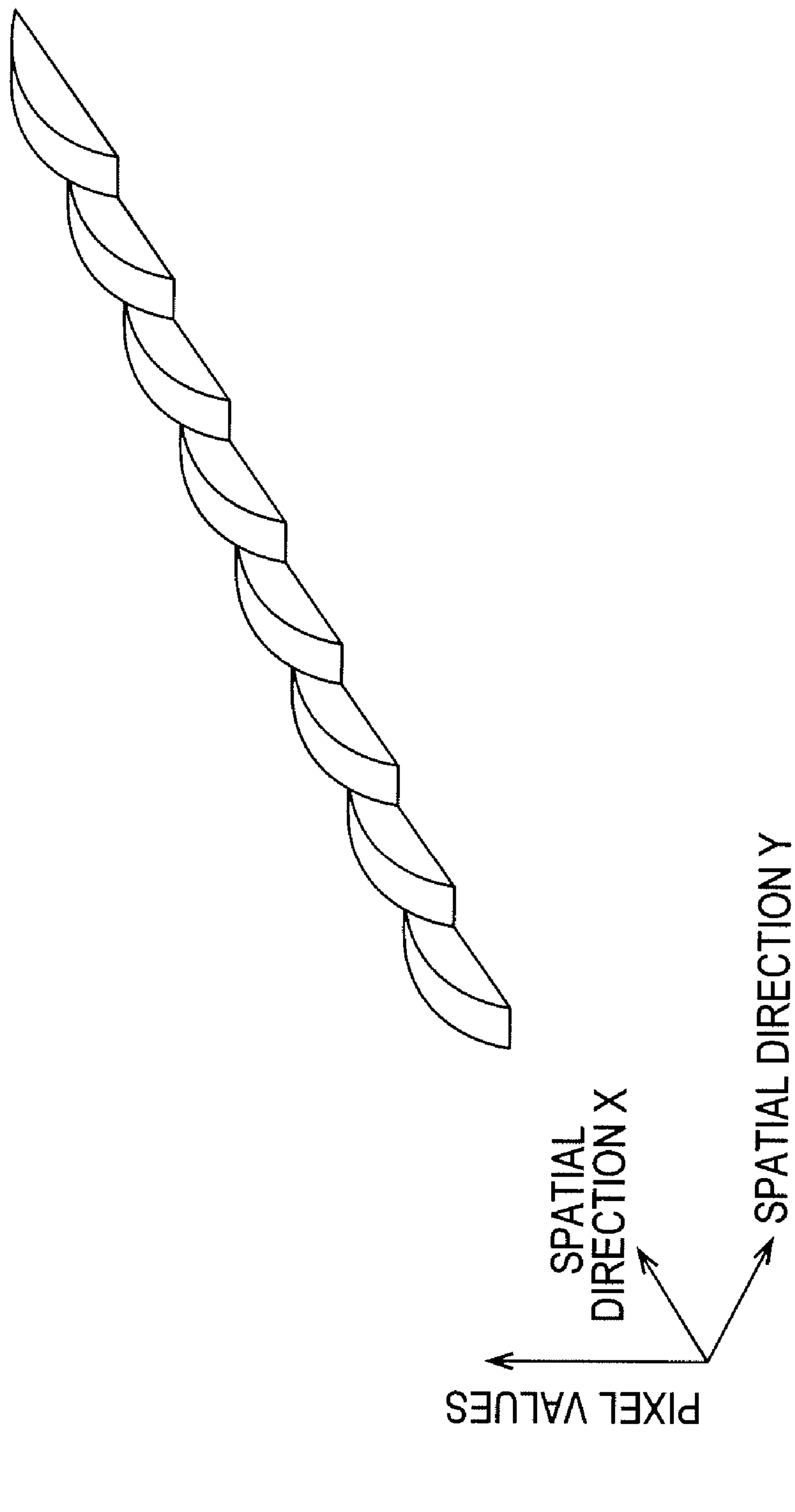
FIG. 14 is a schematic diagram of image data.

FIG. 14 is a model diagram of the image data shown in FIG. 13.

The model diagram shown in FIG. 14 is a model diagram of image data obtained by imaging, with the image sensor, an image of a linear object having a diameter shorter than the length L of the photoreception face of each pixel, and extending in a direction offset from the array of the pixels of the image sensor (the vertical or horizontal array of the pixels). The image cast into the image sensor at the time that the image data shown in FIG. 14 was acquired is an image of the linear object of the actual world 1 shown in FIG. 12.

In FIG. 14, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 14 corresponds to the direction of level in FIG. 12, and the spatial direction X and spatial direction Y in FIG. 14 also are the same as the directions in FIG. 12.

In the event of taking an image of a linear object having a diameter narrower than the length L of the photoreception face of each pixel with the image sensor, the linear object is represented in the image data obtained as a result of the image-taking as multiple arc shapes (half-discs) having a predetermined length which are arrayed in a diagonally-offset fashion, in a model representation, for example. The arc shapes are of approximately the same shape. One arc shape is formed on one row of pixels vertically, or is formed on one row of pixels horizontally. For example, one arc shape shown in FIG. 14 is formed on one row of pixels vertically.

Thus, with the image data taken and obtained by the image sensor for example, the continuity in that the cross-sectional shape in the spatial direction Y at any arbitrary position in the length direction which the linear object image of the actual world 1 had, is lost. Also, it can be said that the continuity, which the linear object image of the actual world 1 had, has changed into continuity in that arc shapes of the same shape formed on one row of pixels vertically or formed on one row of pixels horizontally are arrayed at predetermined intervals.

Figure 15:
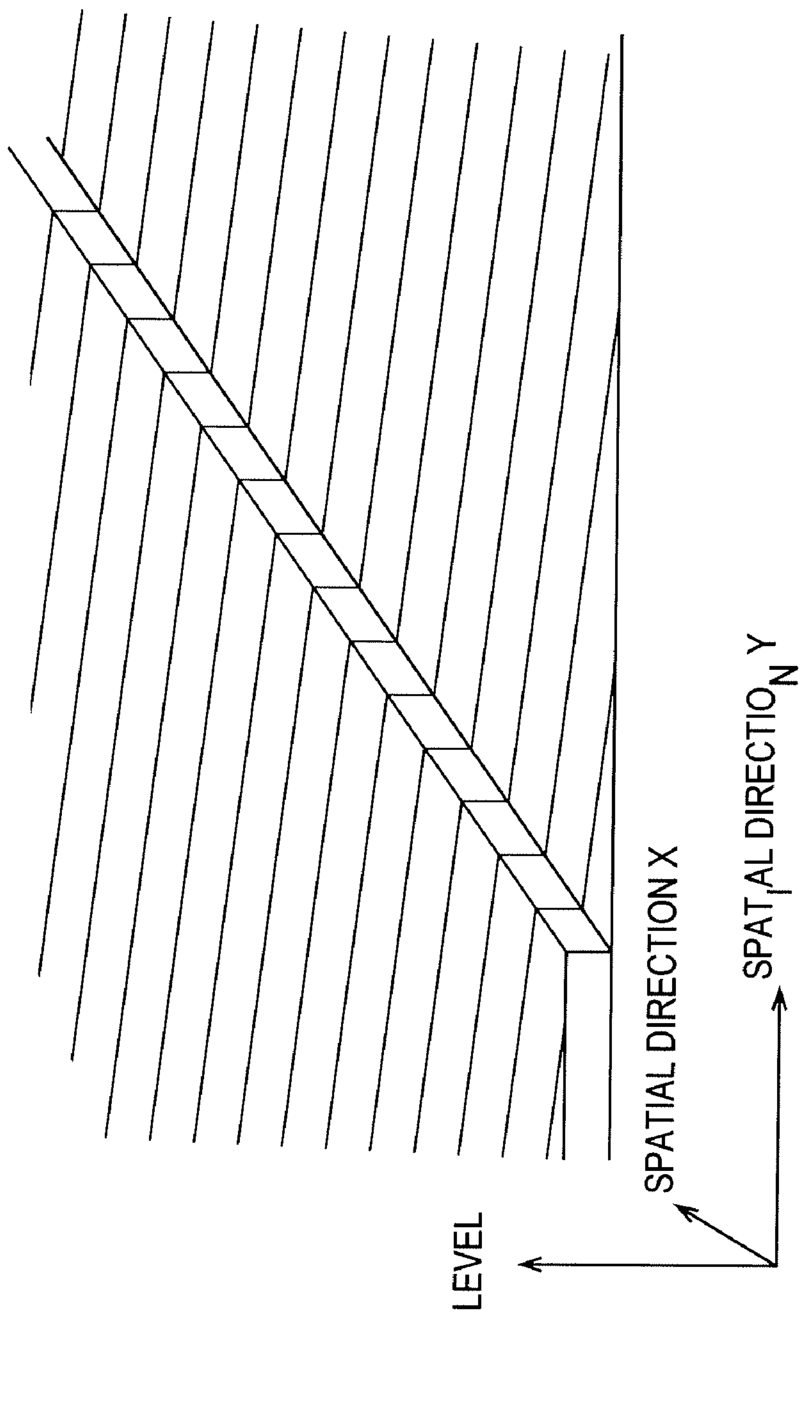
FIG. 15 is a diagram illustrating an example of an image of an actual world 1 having a linear shape of a single color which is a different color from the background.

FIG. 15 is a diagram illustrating an image in the actual world 1 of an object having a straight edge, and is of a monotone color different from that of the background, i.e., an example of distribution of light intensity. In FIG. 15, the position to the upper side of the drawing indicates the intensity (level) of light, the position to the upper right side of the drawing indicates the position in the spatial direction X which is one direction of the spatial directions of the image, and the position to the right side of the drawing indicates the position in the spatial direction Y which is the other direction of the spatial directions of the image.

The image of the object of the actual world 1 which has a straight edge and is of a monotone color different from that of the background, includes predetermined continuity. That is to say, the image shown in FIG. 15 has continuity in that the cross-sectional shape (the change in level as to the change in position in the direction orthogonal to the length direction) is the same at any arbitrary position in the length direction.

Figure 16:
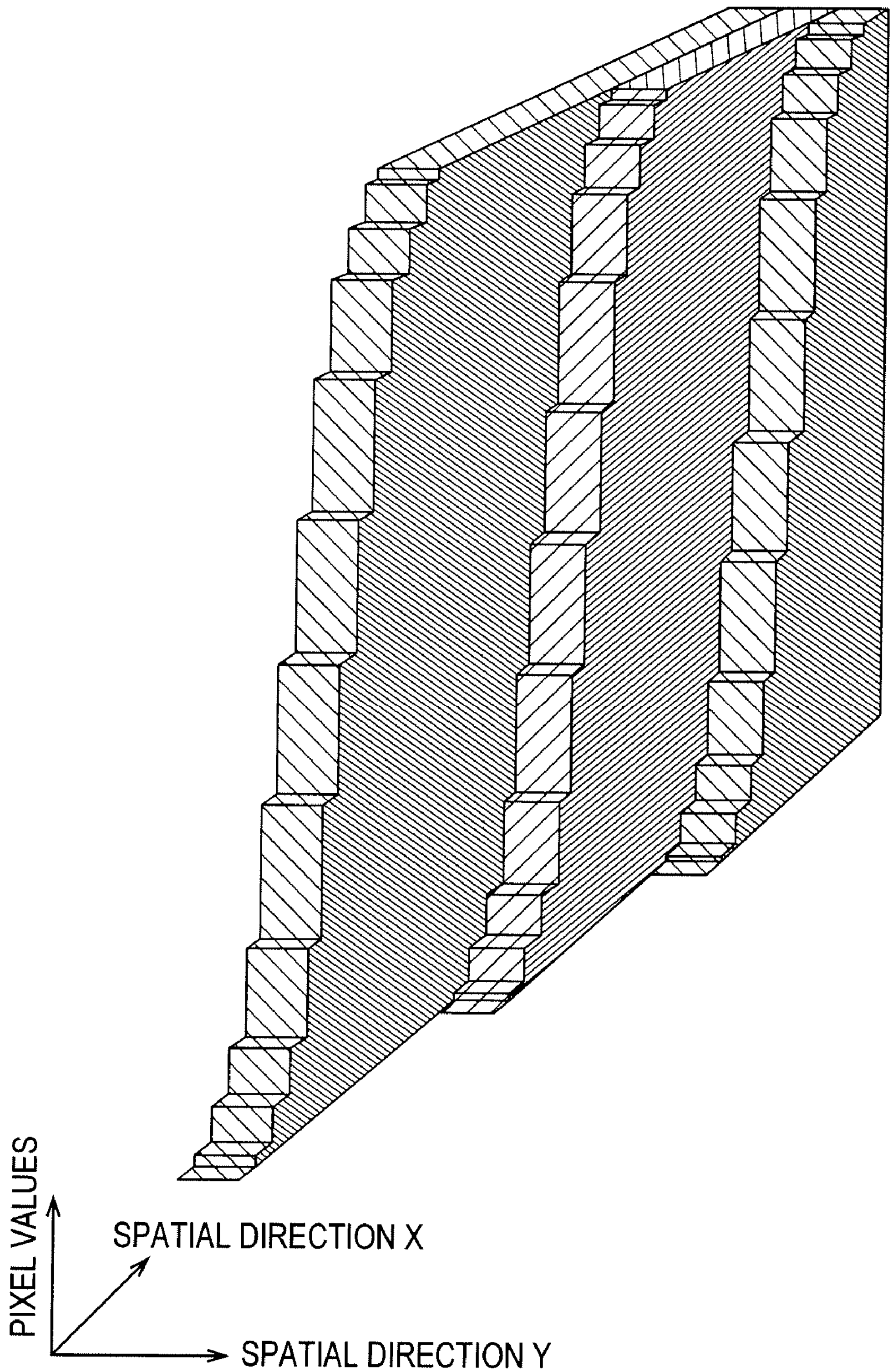
FIG. 16 is a diagram illustrating an example of pixel values of image data obtained by actual image-taking.

FIG. 16 is a diagram illustrating an example of pixel values of the image data obtained by actual image-taking, corresponding to the image shown in FIG. 15. As shown in FIG. 16, the image data is in a stepped shape, since the image data is made up of pixel values in increments of pixels.

Figure 17:
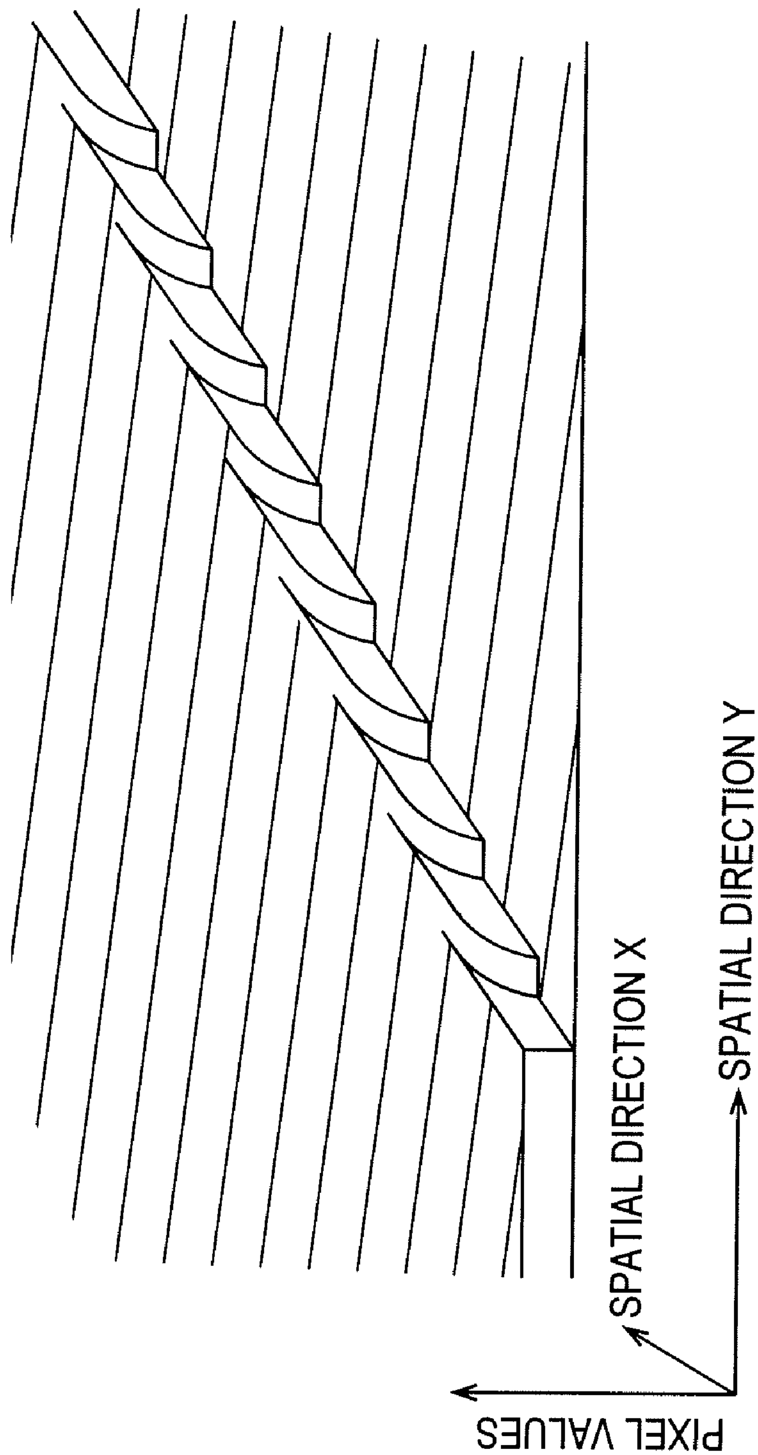
FIG. 17 is a schematic diagram of image data.

FIG. 17 is a model diagram illustrating the image data shown in FIG. 16.

The model diagram shown in FIG. 17 is a model diagram of image data obtained by taking, with the image sensor, an image of the object of the actual world 1 which has a straight edge and is of a monotone color different from that of the background, and extending in a direction offset from the array of the pixels of the image sensor (the vertical or horizontal array of the pixels). The image cast into the image sensor at the time that the image data shown in FIG. 17 was acquired is an image of the object of the actual world 1 which has a straight edge and is of a monotone color different from that of the background, shown in FIG. 15.

In FIG. 17, the position to the upper side of the drawing indicates the pixel value, the position to the upper right side of the drawing indicates the position in the spatial direction X which is one direction of the spatial directions of the image, and the position to the right side of the drawing indicates the position in the spatial direction Y which is the other direction of the spatial directions of the image. The direction indicating the pixel value in FIG. 17 corresponds to the direction of level in FIG. 15, and the spatial direction X and spatial direction Y in FIG. 17 also are the same as the directions in FIG. 15.

In the event of taking an image of an object of the actual world 1 which has a straight edge and is of a monotone color different from that of the background with an image sensor, the straight edge is represented in the image data obtained as a result of the image-taking as multiple pawl shapes having a predetermined length which are arrayed in a diagonally-offset fashion, in a model representation, for example. The pawl shapes are of approximately the same shape. One pawl shape is formed on one row of pixels vertically, or is formed on one row of pixels horizontally. For example, one pawl shape shown in FIG. 17 is formed on one row of pixels vertically.

Thus, the continuity of image of the object of the actual world 1 which has a straight edge and is of a monotone color different from that of the background, in that the cross-sectional shape is the same at any arbitrary position in the length direction of the edge, for example, is lost in the image data obtained by imaging with an image sensor. Also, it can be said that the continuity, which the image of the object of the actual world 1 which has a straight edge and is of a monotone color different from that of the background had, has changed into continuity in that pawl shapes of the same shape formed on one row of pixels vertically or formed on one row of pixels horizontally are arrayed at predetermined intervals.

The data continuity detecting unit 101 detects such data continuity of the data 3 which is an input image, for example. For example, the data continuity detecting unit 101 detects data continuity by detecting regions having a constant characteristic in a predetermined dimensional direction. For example, the data continuity detecting unit 101 detects a region wherein the same arc shapes are arrayed at constant intervals, such as shown in FIG. 14. Also, the data continuity detecting unit 101 detects a region wherein the same pawl shapes are arrayed at constant intervals, such as shown in FIG. 17.

Also, the data continuity detecting unit 101 detects continuity of the data by detecting angle (gradient) in the spatial direction, indicating an array of the same shapes.

Also, for example, the data continuity detecting unit 101 detects continuity of data by detecting angle (movement) in the space direction and time direction, indicating the array of the same shapes in the space direction and the time direction.

Further, for example, the data continuity detecting unit 101 detects continuity in the data by detecting the length of the region having constant characteristics in a predetermined dimensional direction.

Hereafter, the portion of data 3 where the sensor 2 has projected the image of the object of the actual world 1 which has a straight edge and is of a monotone color different from that of the background, will also be called a two-valued edge.

Next, the principle of the present invention will be described in further detail.

Figure 18:
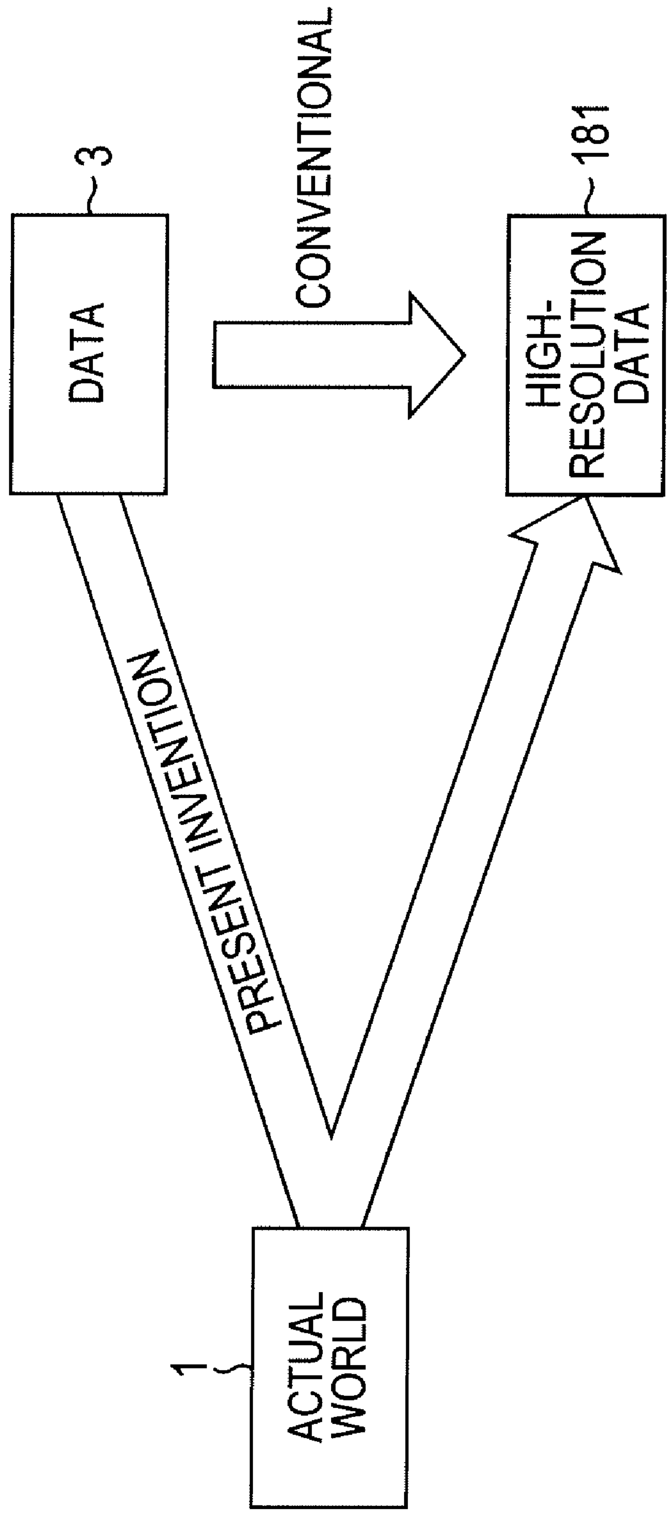
FIG. 18 is a diagram for describing the principle of the present invention.

As shown in FIG. 18, with conventional signal processing, desired high-resolution data 181, for example, is generated from the data 3.

Figure 19:
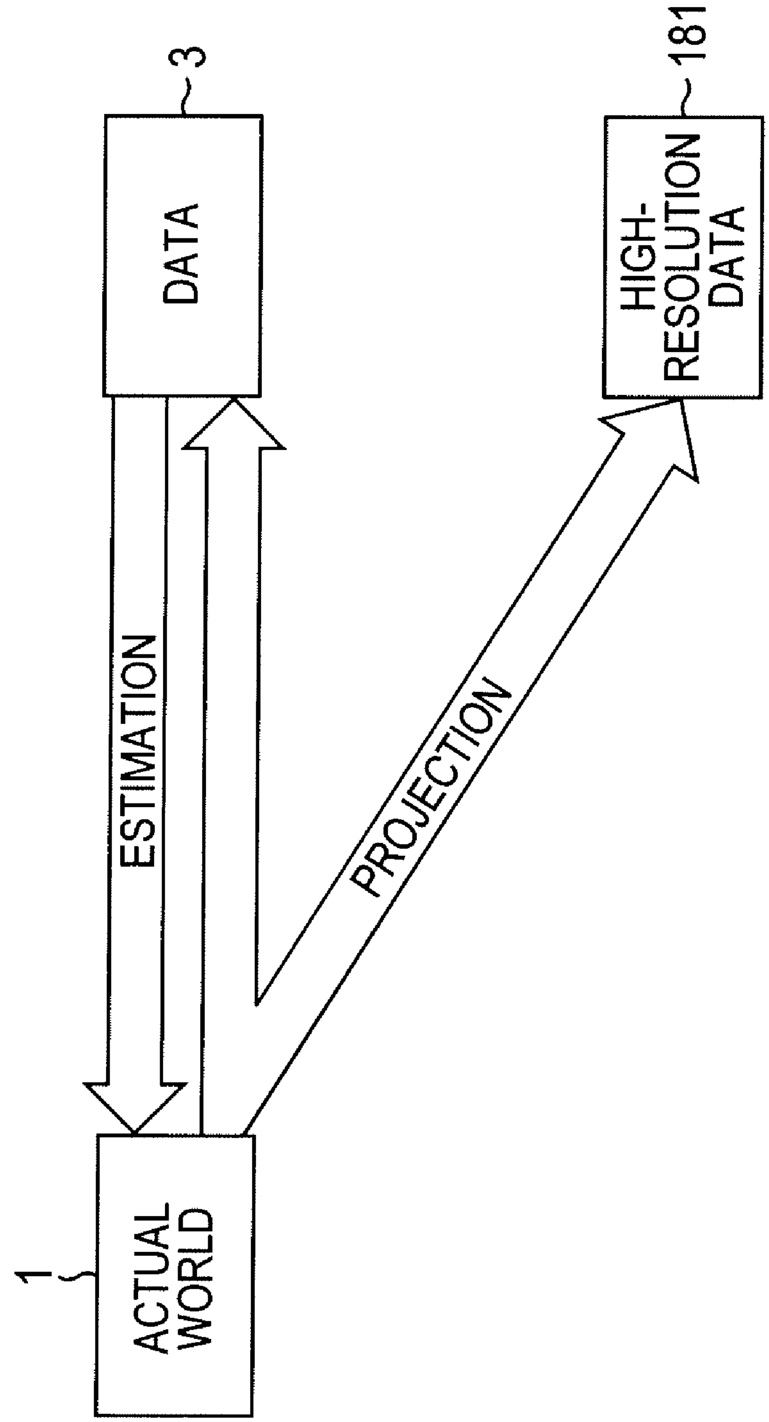
FIG. 19 is a diagram for describing the principle of the present invention.

Conversely, with the signal processing according to the present invention, the actual world 1 is estimated from the data 3, and the high-resolution data 181 is generated based on the estimation results. That is to say, as shown in FIG. 19, the actual world 1 is estimated from the data 3, and the high-resolution data 181 is generated based on the estimated actual world 1, taking into consideration the data 3.

In order to generate the high-resolution data 181 from the actual world 1, there is the need to take into consideration the relationship between the actual world 1 and the data 3. For example, how the actual world 1 is projected on the data 3 by the sensor 2 which is a CCD, is taken into consideration.

The sensor 2 which is a CCD has integration properties as described above. That is to say, one unit of the data 3 (e.g., pixel value) can be calculated by integrating a signal of the actual world 1 with a detection region (e.g., photoreception face) of a detection device (e.g., CCD) of the sensor 2.

Applying this to the high-resolution data 181, the high-resolution data 181 can be obtained by applying processing, wherein a virtual high-resolution sensor projects signals of the actual world 1 to the data 3, to the estimated actual world 1.

Figure 20:
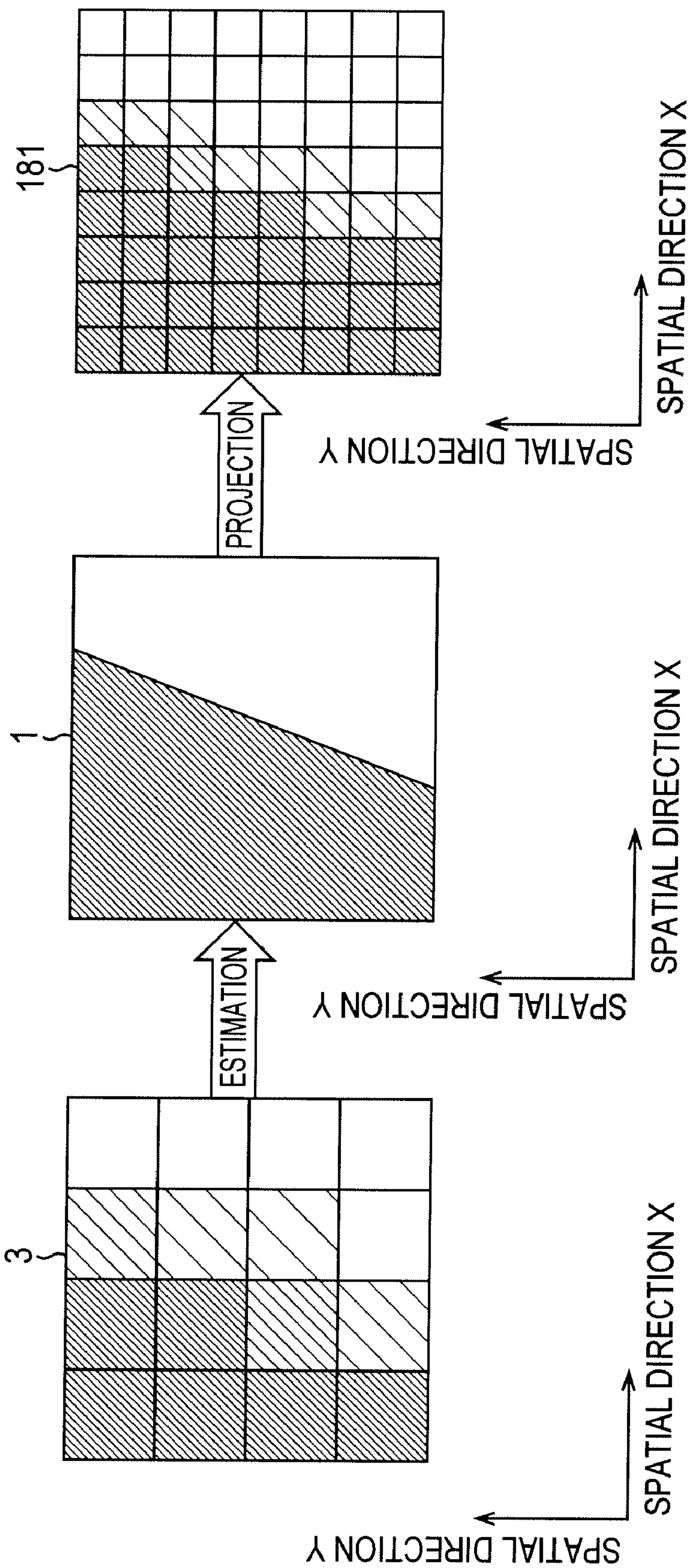
FIG. 20 is a diagram for describing an example of generating high-resolution data 181.

In other words, as shown in FIG. 20, if the signals of the actual world 1 can be estimated from the data 3, one value contained in the high-resolution data 181 can be obtained by integrating signals of the actual world 1 for each detection region of the detecting elements of the virtual high-resolution sensor (in the time-space direction).

For example, in the event that the change in signals of the actual world 1 are smaller than the size of the detection region of the detecting elements of the sensor 2, the data 3 cannot expresses the small changes in the signals of the actual world 1. Accordingly, high-resolution data 181 indicating small change of the signals of the actual world 1 can be obtained by integrating the signals of the actual world 1 estimated from the data 3 with each region (in the time-space direction) that is smaller in comparison with the change in signals of the actual world 1.

That is to say, integrating the signals of the estimated actual world 1 with the detection region with regard to each detecting element of the virtual high-resolution sensor enables the high-resolution data 181 to be obtained.

With the present invention, the image generating unit 103 generates the high-resolution data 181 by integrating the signals of the estimated actual world 1 in the time-space direction regions of the detecting elements of the virtual high-resolution sensor.

Next, with the present invention, in order to estimate the actual world 1 from the data 3, the relationship between the data 3 and the actual world 1, continuity, and a space mixture in the data 3, are used.

Here, a mixture means a value in the data 3 wherein the signals of two objects in the actual world 1 are mixed to yield a single value.

A space mixture means the mixture of the signals of two objects in the spatial direction due to the spatial integration effects of the sensor 2.

The actual world 1 itself is made up of countless events, and accordingly, in order to represent the actual world 1 itself with mathematical expressions, for example, there is the need to have an infinite number of variables. It is impossible to predict all events of the actual world 1 from the data 3.

In the same way, it is impossible to predict all of the signals of the actual world 1 from the data 3.

Figure 21:
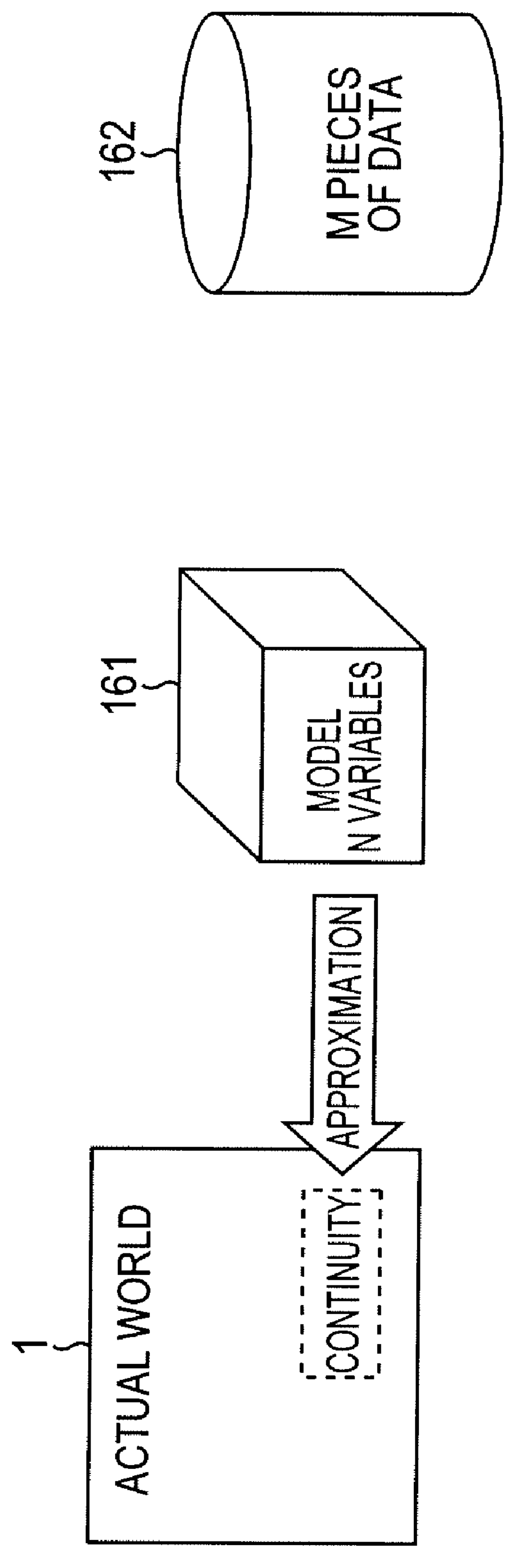
FIG. 21 is a diagram for describing approximation by a model 161.
Figure 22:
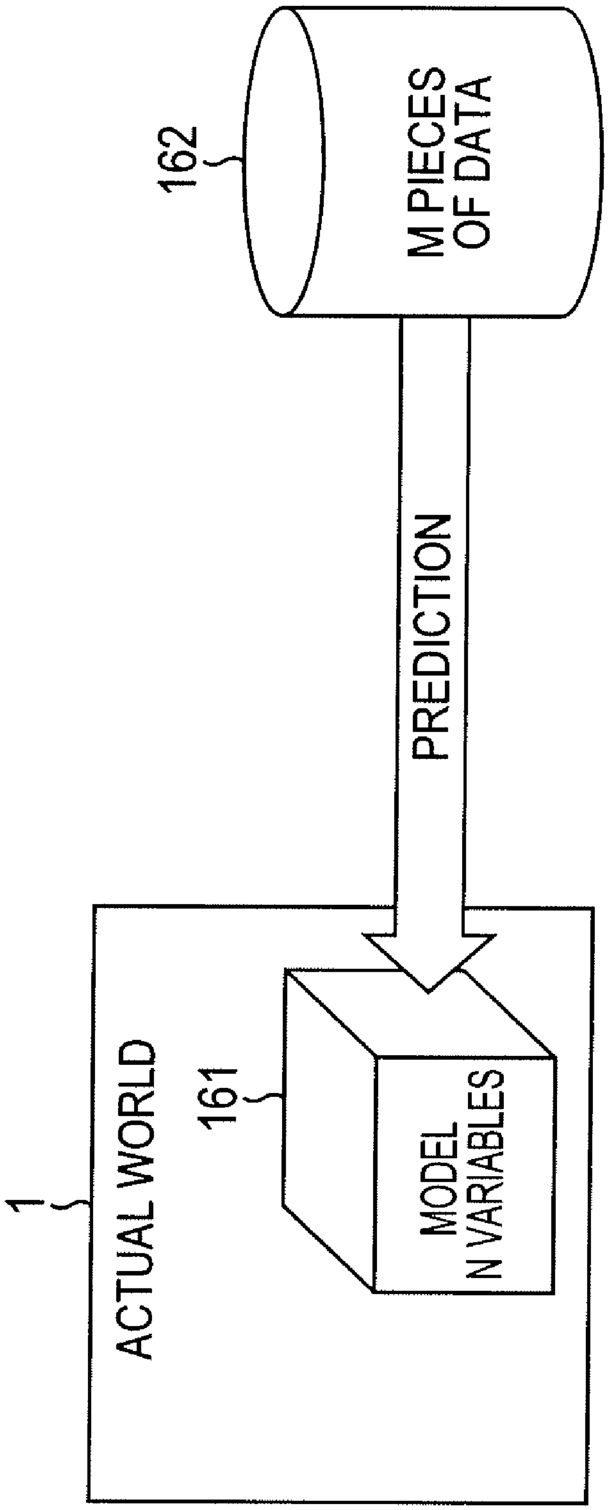
FIG. 22 is a diagram for describing estimation of the model 161 with M pieces of data 162.

Accordingly, as shown in FIG. 21, with the present embodiment, of the signals of the actual world 1, a portion which has continuity and which can be expressed by the function f(x, y, z, t) is taken note of, and the portion of the signals of the actual world 1 which can be represented by the function f(x, y, z, t) and has continuity is approximated with a model 161 represented by N variables. As shown in FIG. 22, the model 161 is predicted from the M pieces of data 162 in the data 3.

In order to enable the model 161 to be predicted from the M pieces of data 162, first, there is the need to represent the model 161 with N variables based on the continuity, and second, to generate an expression using the N variables which indicates the relationship between the model 161 represented by the N variables and the M pieces of data 162 based on the integral properties of the sensor 2. Since the model 161 is represented by the N variables, based on the continuity, it can be said that the expression using the N variables that indicates the relationship between the model 161 represented by the N variables and the M pieces of data 162, describes the relationship between the part of the signals of the actual world 1 having continuity, and the part of the data 3 having data continuity.

In other words, the part of the signals of the actual world 1 having continuity, that is approximated by the model 161 represented by the N variables, generates data continuity in the data 3.

The data continuity detecting unit 101 detects the part of the data 3 where data continuity has been generated by the part of the signals of the actual world 1 having continuity, and the characteristics of the part where data continuity has been generated.

Figure 23:
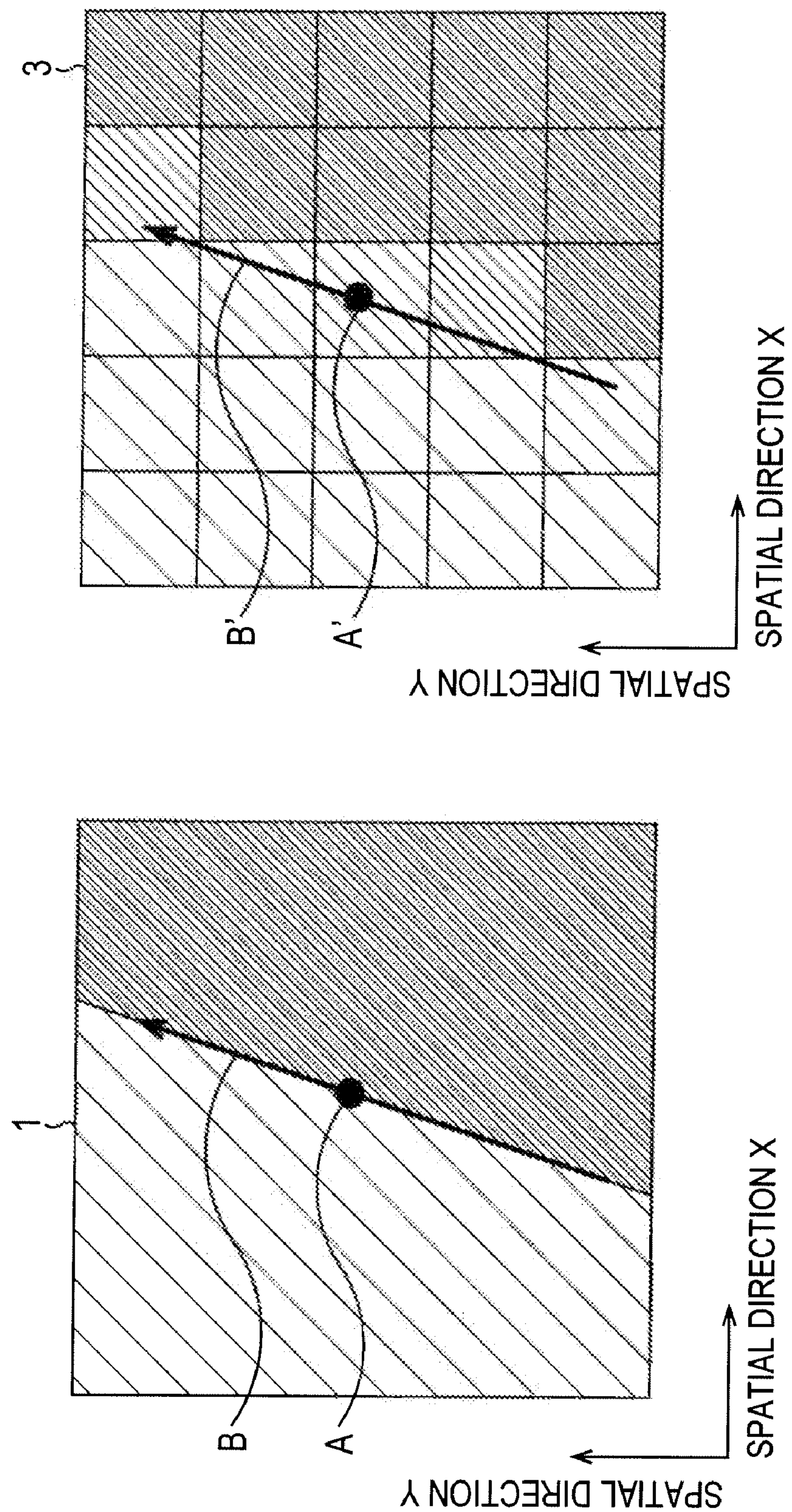
FIG. 23 is a diagram for describing the relationship between signals of the actual world 1 and data 3.

For example, as shown in FIG. 23, in an image of the object of the actual world 1 which has a straight edge and is of a monotone color different from that of the background, the edge at the position of interest indicated by A in FIG. 23, has a gradient. The arrow B in FIG. 23 indicates the gradient of the edge. A predetermined edge gradient can be represented as an angle as to a reference axis or as a direction as to a reference position. For example, a predetermined edge gradient can be represented as the angle between the coordinates axis of the spatial direction X and the edge. For example, the predetermined edge gradient can be represented as the direction indicated by the length of the spatial direction X and the length of the spatial direction Y.

At the time that the image of the object of the actual world 1 which has a straight edge and is of a monotone color different from that of the background is obtained at the sensor 2 and the data 3 is output, pawl shapes corresponding to the edge are arrayed in the data 3 at the position corresponding to the position of interest (A) of the edge in the image of the actual world 1, which is indicated by A' in FIG. 23, and pawl shapes corresponding to the edge are arrayed in the direction corresponding to the gradient of the edge of the image in the actual world 1, in the direction of the gradient indicated by B' in FIG. 23.

The model 161 represented with the N variables approximates such a portion of the signals of the actual world 1 generating data continuity in the data 3.

At the time of formulating an expression using the N variables indicating the relationship between the model 161 represented with the N variables and the M pieces of data 162, the part where data continuity is generated in the data 3 is used.

Figure 24:
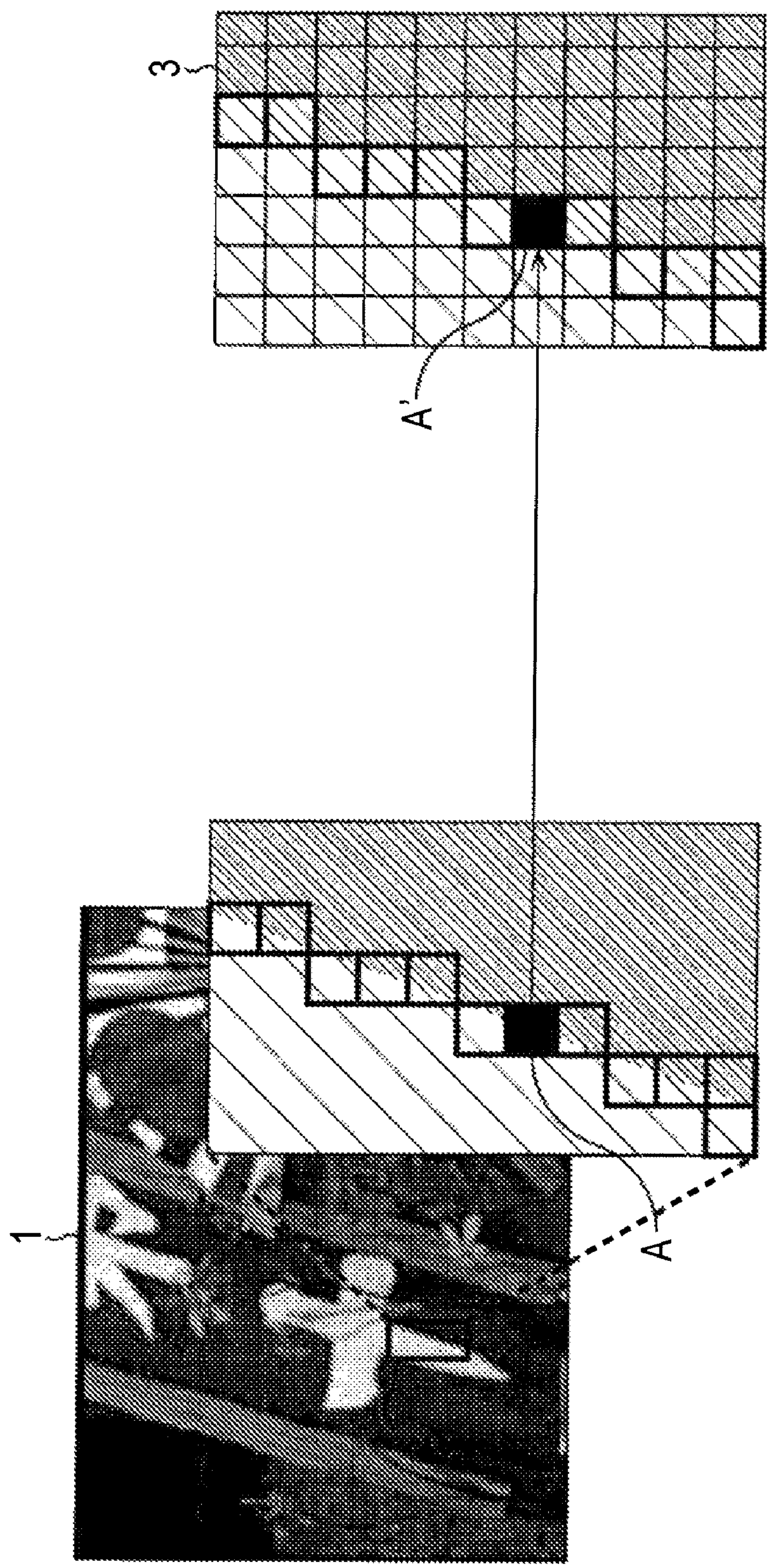
FIG. 24 is a diagram illustrating an example of data 3 of interest at the time of creating an Expression.

In this case, in the data 3 shown in FIG. 24, taking note of the values where data continuity is generated and which belong to a mixed region, an expression is formulated with a value integrating the signals of the actual world 1 as being equal to a value output by the detecting element of the sensor 2. For example, multiple expressions can be formulated regarding the multiple values in the data 3 where data continuity is generated.

In FIG. 24, A denotes the position of interest of the edge, and A' denotes (the position of) the pixel corresponding to the position (A) of interest of the edge in the image of the actual world 1.

Now, a mixed region means a region of data in the data 3 wherein the signals for two objects in the actual world 1 are mixed and become one value. For example, a pixel value wherein, in the image of the object of the actual world 1 which has a straight edge and is of a monotone color different from that of the background in the data 3, the image of the object having the straight edge and the image of the background are integrated, belongs to a mixed region.

Figure 25:
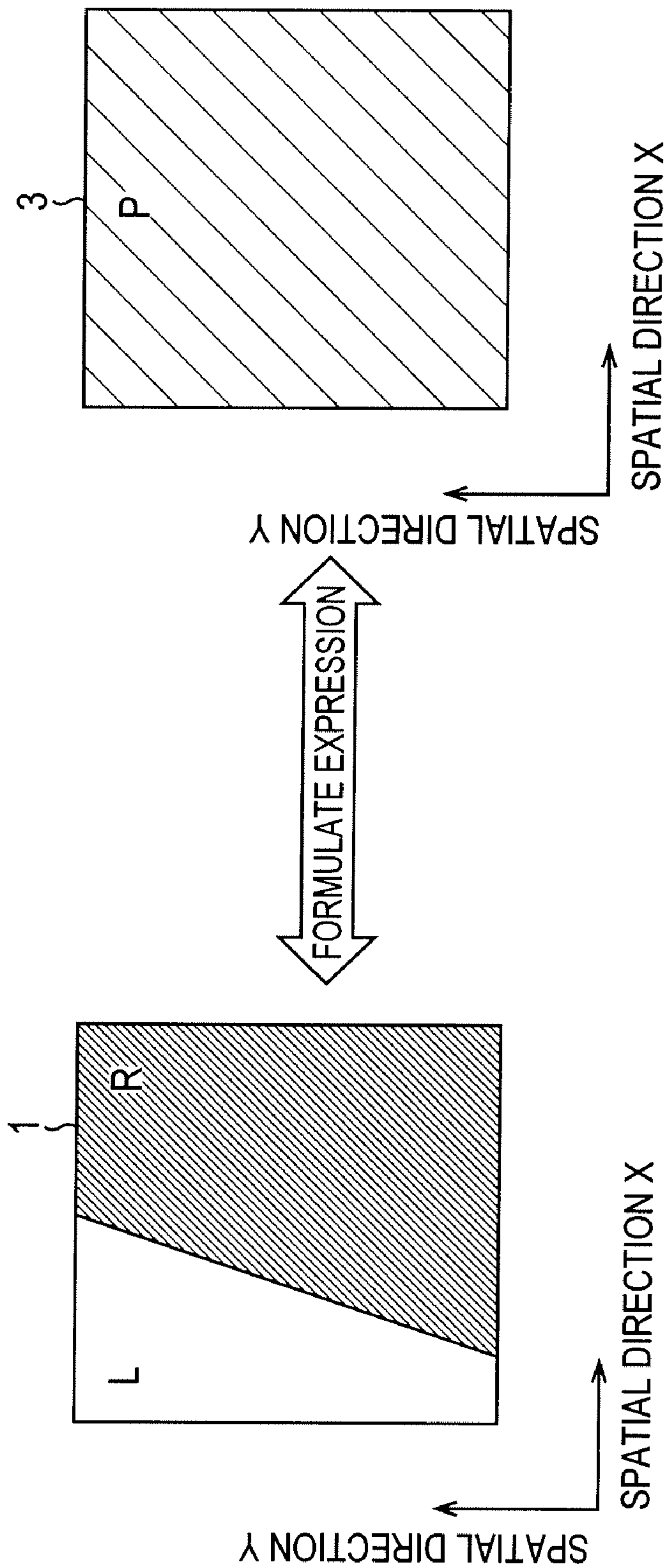
FIG. 25 is a diagram for describing signals for two objects in the actual world, and values belonging to a mixed region at the time of creating an expression.

FIG. 25 is a diagram illustrating signals for two objects in the actual world 1 and values belonging to a mixed region, in a case of formulating an expression.

FIG. 25 illustrates, to the left, signals of the actual world 1 corresponding to two objects in the actual world 1 having a predetermined expansion in the spatial direction X and the spatial direction Y, which are acquired at the detection region of a single detecting element of the sensor 2. FIG. 25 illustrates, to the right, a pixel value P of a single pixel in the data 3 wherein the signals of the actual world 1 illustrated to the left in FIG. 25 have been projected by a single detecting element of the sensor 2. That is to say, illustrates a pixel value P of a single pixel in the data 3 wherein the signals of the actual world 1 corresponding to two objects in the actual world 1 having a predetermined expansion in the spatial direction X and the spatial direction Y which are acquired by a single detecting element of the sensor 2, have been projected.

L in FIG. 25 represents the level of the signal of the actual world 1 which is shown in white in FIG. 25, corresponding to one object in the actual world 1. R in FIG. 25 represents the level of the signal of the actual world 1 which is shown hatched in FIG. 25, corresponding to the other object in the actual world 1.

Here, the mixture ratio α is the ratio of (the area of) the signals corresponding to the two objects cast into the detecting region of the one detecting element of the sensor 2 having a predetermined expansion in the spatial direction X and the spatial direction Y. For example, the mixture ratio α represents the ratio of area of the level L signals cast into the detecting region of the one detecting element of the sensor 2 having a predetermined expansion in the spatial direction X and the spatial direction Y, as to the area of the detecting region of a single detecting element of the sensor 2.

In this case, the relationship between the level L, level R, and the pixel value P, can be represented by Expression (4).

$$\alpha \times L + (1-\alpha) \times R = P \tag{4}$$

Note that there may be cases wherein the level R may be taken as the pixel value of the pixel in the data 3 positioned to the right side of the pixel of interest, and there may be cases wherein the level L may be taken as the pixel value of the pixel in the data 3 positioned to the left side of the pixel of interest.

Also, the time direction can be taken into consideration in the same way as with the spatial direction for the mixture ratio α and the mixed region. For example, in the event that an object in the actual world 1 which is the object of image-taking, is moving as to the sensor 2, the ratio of signals for the two objects cast into the detecting region of the single detecting element of the sensor 2 changes in the time direction. The signals for the two objects regarding which the ratio changes in the time direction, that have been cast into the detecting region of the single detecting element of the sensor 2, are projected into a single value of the data 3 by the detecting element of the sensor 2.

The mixture of signals for two objects in the time direction due to time integration effects of the sensor 2 will be called time mixture.

The data continuity detecting unit 101 detects regions of pixels in the data 3 where signals of the actual world 1 for two objects in the actual world 1, for example, have been projected. The data continuity detecting unit 101 detects gradient in the data 3 corresponding to the gradient of an edge of an image in the actual world 1, for example.

The actual world estimating unit 102 estimates the signals of the actual world by formulating an expression using N variables, representing the relationship between the model 161 represented by the N variables and the M pieces of data 162, based on the region of the pixels having a predetermined mixture ratio α detected by the data continuity detecting unit 101 and the gradient of the region, for example, and solving the formulated expression.

Description will be made further regarding specific estimation of the actual world 1.

Of the signals of the actual world represented by the function F(x, y, z, t)let us consider approximating the signals of the actual world represented by the function F(x, y, t) at the cross-section in the spatial direction Z (the position of the sensor 2), with an approximation function f(x, y, t) determined by a position x in the spatial direction X, a position y in the spatial direction Y. and a point-in-time t.

Now, the detection region of the sensor 2 has an expanse in the spatial direction X and the spatial direction Y. In other words, the approximation function f(x, y, t) is a function approximating the signals of the actual world 1 having an expanse in the spatial direction and time direction, which are acquired with the sensor 2.

Let us say that projection of the signals of the actual world 1 yields a value P(x, y, t) of the data 3. The value P(x, y, t) of the data 3 is a pixel value which the sensor 2 which is an image sensor outputs, for example.

Now, in the event that the projection by the sensor 2 can be formulated, the value obtained by projecting the approximation function f(x, y, t) can be represented as a projection function S(x, y, t).

Obtaining the projection function S(x, y, t) has the following problems.

First, generally, the function F(x, y, z, t) representing the signals of the actual world 1 can be a function with an infinite number of orders.

Second, even if the signals of the actual world could be described as a function, the projection function S(x, y, t) via projection of the sensor 2 generally cannot be determined. That is to say, the action of projection by the sensor 2, in other words, the relationship between the input signals and output signals of the sensor 2, is unknown, so the projection function S(x, y, t) cannot be determined.

With regard to the first problem, let us consider expressing the function f(x, y, t) approximating signals of the actual world 1 with the sum of products of the function $f_i(x, y, t)$ which is a describable function (e.g., a function with a finite number of orders) and variables $w_i$.

Also, with regard to the second problem, formulating projection by the sensor 2 allows us to describe the function $S_i(x, y, t)$ from the description of the function $f_i(x, y, t)$.

That is to say, representing the function f(x, y, t) approximating signals of the actual world 1 with the sum of products of the function $f_i(x, y, t)$ and variables $w_i$, the Expression (5) can be obtained.

$$f(x, y, t) = \sum_{i=1}^{N} w_i f_i(x, y, t) \tag{5}$$

For example, as indicated in Expression (6), the relationship between the data 3 and the signals of the actual world can be formulated as shown in Expression (7) from Expression (5) by formulating the projection of the sensor 2.

$$S_i(x, y, t) = \int\int\int f_i(x, y, t)\,dx\,dy\,dt \tag{6}$$

$$P_j(x_j, y_j, t_j) = \sum_{i=1}^{N} w_i S_i(x_j, y_j, t_j) \tag{7}$$

In Expression (7), j represents the index of the data.

In the event that M data groups (j=1 through M) common with the N variables $w_i$ (i=1 through N) exists in Expression (7), Expression (8) is satisfied, so the model 161 of the actual world can be obtained from data 3.

$$N \leqq M \tag{8}$$

N is the number of variables representing the model 161 approximating the actual world 1. M is the number of pieces of data 162 include in the data 3.

Representing the function f(x, y, t) approximating the actual world 1 with Expression (5) allows the variable portion $w_i$ to be handled independently. At this time, i represents the number of variables. Also, the form of the function represented by $f_i$ can be handed independently, and a desired function can be used for $f_i$.

Accordingly, the number N of the variables $w_i$ can be defined without dependence on the function $f_i$, and the variables $w_i$ can be obtained from the relationship between the number N of the variables $w_i$ and the number of pieces of data M.

That is to say, using the following three allows the actual world 1 to be estimated from the data 3.

First, the N variables are determined. That is to say, Expression (5) is determined. This enables describing the actual world 1 using continuity. For example, the signals of the actual world 1 can be described with a model 161 wherein a cross-section is expressed with a polynomial, and the same cross-sectional shape continues in a constant direction.

Second, for example, projection by the sensor 2 is formulated, describing Expression (7). For example, this is formulated such that the results of integration of the signals of the actual world 2 are data 3.

Third, M pieces of data 162 are collected to satisfy Expression (8). For example, the data 162 is collected from a region having data continuity that has been detected with the data continuity detecting unit 101. For example, data 162 of a region wherein a constant cross-section continues, which is an example of continuity, is collected.

In this way, the relationship between the data 3 and the actual world 1 is described with the Expression (5), and M pieces of data 162 are collected, thereby satisfying Expression (8), and the actual world 1 can be estimated.

More specifically, in the event of N=M, the number of variables N and the number of expressions M are equal, so the variables $w_i$ can be obtained by formulating a simultaneous equation.

Also, in the event that N<M, various solving methods can be applied. For example, the variables $w_i$ can be obtained by least-square.

Now, the solving method by least-square will be described in detail.

First, an Expression (9) for predicting data 3 from the actual world 1 will be shown according to Expression (7).

$$P'_j(x_j, y_j, t_j) = \sum_{i=1}^{N} w_i S_i(x_j, y_j, t_j) \tag{9}$$

In Expression (9), $P'_j(x_j, y_j, t_j)$ is a prediction value.

The sum of squared differences E for the prediction value P' and observed value P is represented by Expression (10).

$$E = \sum_{j=1}^{M} (P_j(x_j, y_j, t_j) - P'_j(x_j, y_j, t_j))^2 \tag{10}$$

The variables $w_i$ are obtained such that the sum of squared differences E is the smallest. Accordingly, the partial differential value of Expression (10) for each variable $w_k$ is 0. That is to say, Expression (11) holds.

$$\frac{\partial E}{\partial w_k} = -2\sum_{j=1}^{M} w_i S_k(x_j, y_j, t_j)\left(P_j(x_j, y_j, t_j) - \sum_{i=1}^{N} w_i S_i(x_j, y_j, t_j)\right) = 0 \tag{11}$$

Expression (11) yields Expression (12).

$$\sum_{j=1}^{M}\left(S_k(x_j, y_j, t_j)\sum_{i=1}^{N} w_i S_i(x_j, y_j, t_j)\right) = \sum_{j=1}^{M} S_k(x_j, y_j, t_j) P_j(x_j, y_j, t_j) \tag{12}$$

When Expression (12) holds with K=1 through N, the solution by least-square is obtained. The normal equation thereof is shown in Expression (13).

$$\begin{pmatrix} \sum_{j=1}^{M} S_1(j)S_1(j) & \sum_{j=1}^{M} S_1(j)S_2(j) & \cdots & \sum_{j=1}^{M} S_1(j)S_N(j) \\ \sum_{j=1}^{M} S_2(j)S_1(j) & \sum_{j=1}^{M} S_2(j)S_2(j) & \cdots & \sum_{j=1}^{M} S_2(j)S_N(j) \\ \vdots & \vdots & \ddots & \vdots \\ \sum_{j=1}^{M} S_N(j)S_1(j) & \sum_{j=1}^{M} S_N(j)S_2(j) & \cdots & \sum_{j=1}^{M} S_N(j)S_N(j) \end{pmatrix} \begin{pmatrix} w_1 \\ w_2 \\ \vdots \\ w_N \end{pmatrix} = \begin{pmatrix} \sum_{j=1}^{M} S_1(j)P_j(j) \\ \sum_{j=1}^{M} S_2(j)P_j(j) \\ \vdots \\ \sum_{j=1}^{M} S_N(j)P_j(j) \end{pmatrix} \tag{13}$$

Note that in Expression (13), $S_i(x_j, y_j, t_j)$ is described as $S_i(j)$.

$$S_{MAT} = \begin{pmatrix} \sum_{j=1}^{M} S_1(j)S_1(j) & \sum_{j=1}^{M} S_1(j)S_2(j) & \cdots & \sum_{j=1}^{M} S_1(j)S_N(j) \\ \sum_{j=1}^{M} S_2(j)S_1(j) & \sum_{j=1}^{M} S_2(j)S_2(j) & \cdots & \sum_{j=1}^{M} S_2(j)S_N(j) \\ \vdots & \vdots & \ddots & \vdots \\ \sum_{j=1}^{M} S_N(j)S_1(j) & \sum_{j=1}^{M} S_N(j)S_2(j) & \cdots & \sum_{j=1}^{M} S_N(j)S_N(j) \end{pmatrix} \tag{14}$$

$$W_{MAT} = \begin{pmatrix} w_1 \\ w_2 \\ \vdots \\ w_N \end{pmatrix} \tag{15}$$

$$P_{MAT} = \begin{pmatrix} \sum_{j=1}^{M} S_1(j)P_j(j) \\ \sum_{j=1}^{M} S_2(j)P_j(j) \\ \vdots \\ \sum_{j=1}^{M} S_N(j)P_j(j) \end{pmatrix} \tag{16}$$

From Expression (14) through Expression (16), Expression (13) can be expressed as $S_{MAT}W_{MAT}=P_{MAT}$.

In Expression (13), $S_i$ represents the projection of the actual world 1. In Expression (13), $P_j$ represents the data 3. In Expression (13), $w_i$ represents variables for describing and obtaining the characteristics of the signals of the actual world 1.

Accordingly, inputting the data 3 into Expression (13) and obtaining $W_{MAT}$ by a matrix solution or the like enables the actual world 1 to be estimated. That is to say, the actual world 1 can be estimated by computing Expression (17).

$$W_{MAT}=S_{MAT}^{-1}P_{MAT} \tag{17}$$

Note that in the event that $S_{MAT}$ is not regular, a transposed matrix of $S_{MAT}$ can be used to obtain $W_{MAT}$.

The actual world estimating unit 102 estimates the actual world 1 by, for example, inputting the data 3 into Expression (13) and obtaining $W_{MAT}$ by a matrix solution or the like.

Now, an even more detailed example will be described. For example, the cross-sectional shape of the signals of the actual world 1, i.e., the change in level as to the change in position, will be described with a polynomial. Let us assume that the cross-sectional shape of the signals of the actual world 1 is constant, and that the cross-section of the signals of the actual world 1 moves at a constant speed. Projection of the signals of the actual world 1 from the sensor 2 to the data 3 is formulated by three-dimensional integration in the time-space direction of the signals of the actual world 1.

The assumption that the cross-section of the signals of the actual world 1 moves at a constant speed yields Expression (18) and Expression (19).

$$\frac{dx}{dt} = v_x \tag{18}$$

$$\frac{dy}{dt} = v_y \tag{19}$$

Here, $v_x$ and $v_y$ are constant.

Using Expression (18) and Expression (19), the cross-sectional shape of the signals of the actual world 1 can be represented as in Expression (20).

$$f(x', y')=f(x+v_x t, y+v_y t) \tag{20}$$

Formulating projection of the signals of the actual world 1 from the sensor 2 to the data 3 by three-dimensional integration in the time-space direction of the signals of the actual world 1 yields Expression (21).

$$\begin{aligned} S(x, y, t) &= \int_{x_s}^{x_e}\int_{y_s}^{y_e}\int_{t_s}^{t_e} f(x', y')\,dx\,dy\,dt \\ &= \int_{x_s}^{x_e}\int_{y_s}^{y_e}\int_{t_s}^{t_e} f(x+v_x t, y+v_y t)\,dx\,dy\,dt \end{aligned} \tag{21}$$

In Expression (21), S(x, y, t) represents an integrated value the region from position $x_s$ to position $x_e$ for the spatial direction X, from position $y_s$ to position $y_e$ for the spatial direction Y, and from point-in-time $t_s$ to point-in-time $t_e$ for the time direction t, i.e., the region represented as a space-time cuboid.

Solving Expression (13) using a desired function f(x', y') whereby Expression (21) can be determined enables the signals of the actual world 1 to be estimated.

In the following, we will use the function indicated in Expression (22) as an example of the function f(x', y').

$$\begin{aligned} f(x', y') &= w_1 x' + w_2 y' + w_3 \\ &= w_1(x+v_x t) + w_2(y+v_x t) + w_3 \end{aligned} \tag{22}$$

Figure 26:
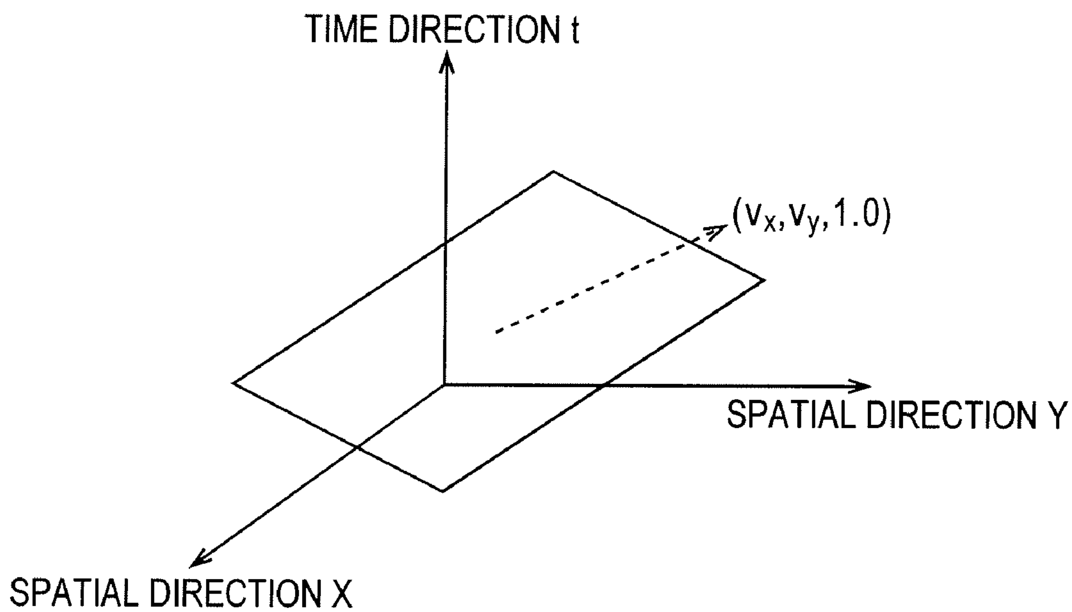
FIG. 26 is a diagram for describing continuity represented by Expression (18), Expression (19), and Expression (22).

That is to say, the signals of the actual world 1 are estimated to include the continuity represented in Expression (18), Expression (19), and Expression (22). This indicates that the cross-section with a constant shape is moving in the space-time direction as shown in FIG. 26.

Substituting Expression (22) into Expression (21) yields Expression (23).

$$\begin{aligned} S(x,y,t) &= \int_{x_s}^{x_e}\int_{y_s}^{y_e}\int_{t_s}^{t_e} f(x+v_x t,\ y+v_y t)\,dx\,dy\,dt \\ &= \text{Volume}\Big(\frac{w_0}{2}(x_e+y_s+v_y(t_e+t_s))+ \\ &\quad \frac{w_1}{2}(y_e+y_s+v_y(t_e+t_s))+w_2\Big) \\ &= w_0S_0(x,y,t)+w_1S_1(x,y,t)+w_2S_2(x,y,t) \end{aligned} \tag{23}$$

wherein $\text{Volume}=(x_e-x_s)(y_e-y_s)(t_e-t_s)$ $S_0(x, y, t)=\text{Volume}/2\times(x_e+x_s+v_x(t_e+t_s))$ $S_1(x, y, t)=\text{Volume}/2\times(y_e+y_s+v_y(t_e+t_s))$ $S_2(x, y, t)=1$ holds.

Figure 27:
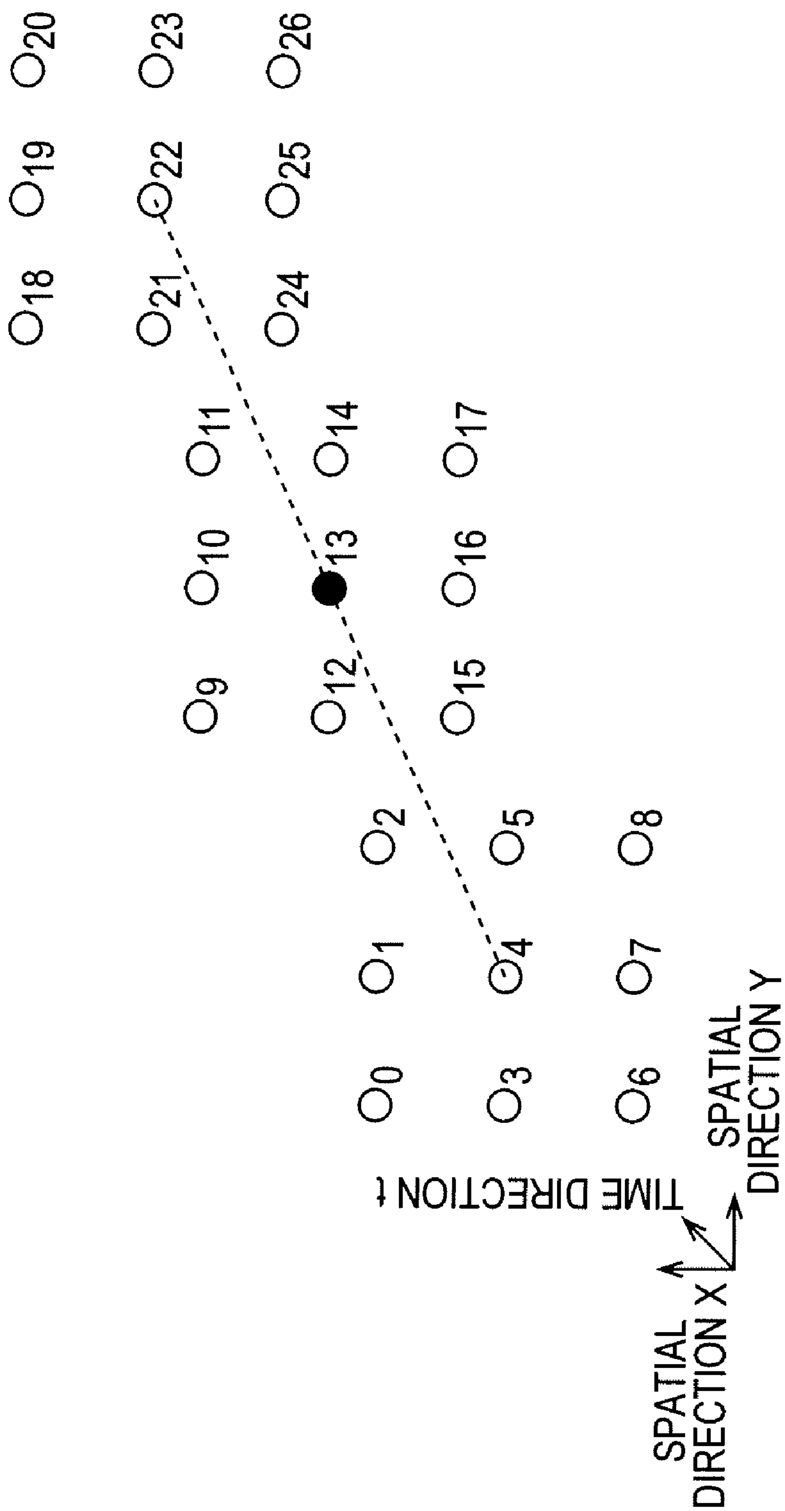
FIG. 27 is a diagram illustrating an example of M pieces of data extracted from data.

FIG. 27 is a diagram illustrating an example of the M pieces of data 162 extracted from the data 3. For example, let us say that 27 pixel values are extracted as the data 162, and that the extracted pixel values are $P_j(x, y, t)$. In this case, j is 0 through 26.

In the example shown in FIG. 27, in the event that the pixel value of the pixel corresponding to the position of interest at the point-in-time t which is n is $P_{13}(x, y, t)$, and the direction of array of the pixel values of the pixels having the continuity of data (e.g., the direction in which the same-shaped pawl shapes detected by the data continuity detecting unit 101 are arrayed) is a direction connecting $P_4(x, y, t)$, $P_{13}(x, y, t)$, and $P_{22}(x, y, t)$, the pixel values $P_9(x, y, t)$ through $P_{17}(x, y, t)$ at the point-in-time t which is n, the pixel values $P_0(x, y, t)$ through $P_8(x, y, t)$ at the point-in-time t which is n−1 which is earlier in time than n, and the pixel values $P_{18}(x, y, t)$ through $P_{26}(x, y, t)$ at the point-in-time t which is n+1 which is later in time than n, are extracted.

Figure 28:
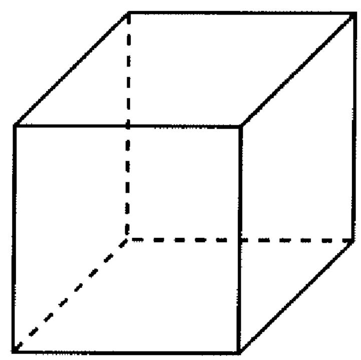
FIG. 28 is a diagram for describing a region where a pixel value, which is data 3, is obtained.
Figure 29:
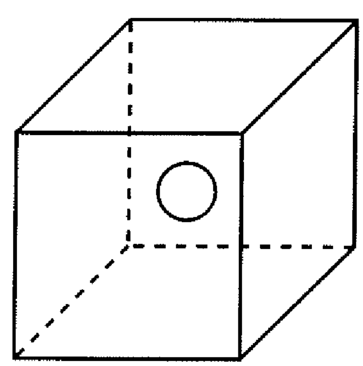
FIG. 29 is a diagram for describing approximation of the position of a pixel in the space-time direction.

Now, the region regarding which the pixel values, which are the data 3 output from the image sensor which is the sensor 2, have been obtained, have a time-direction and two-dimensional spatial direction expansion, as shown in FIG. 28. Now, as shown in FIG. 29, the center of gravity of the cuboid corresponding to the pixel values (the region regarding which the pixel values have been obtained) can be used as the position of the pixel in the space-time direction. The circle in FIG. 29 indicates the center of gravity.

Generating Expression (13) from the 27 pixel values $P_0(x, y, t)$ through $P_{26}(x, y, t)$ and from Expression (23), and obtaining W, enables the actual world 1 to be estimated.

In this way, the actual world estimating unit 102 generates Expression (13) from the 27 pixel values $P_0(x, y, t)$ through $P_{26}(x, y, t)$ and from Expression (23), and obtains W, thereby estimating the signals of the actual world 1.

Note that a Gaussian function, a sigmoid function, or the like, can be used for the function $f_i(x, y, t)$.

An example of processing for generating high-resolution data 181 with even higher resolution, corresponding to the data 3, from the estimated actual world 1 signals, will be described with reference to FIG. 30 through FIG. 34.

Figure 30:
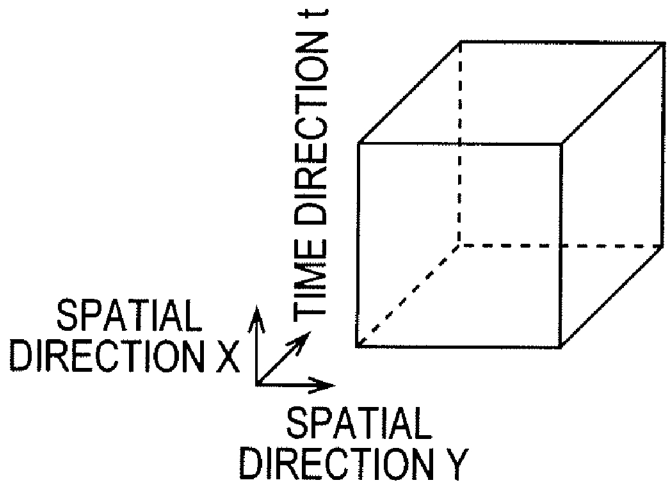
FIG. 30 is a diagram for describing integration of signals of the actual world 1 in the time direction and two-dimensional spatial direction, in the data 3.

As shown in FIG. 30, the data 3 has a value wherein signals of the actual world 1 are integrated in the time direction and two-dimensional spatial directions. For example, a pixel value which is data 3 that has been output from the image sensor which is the sensor 2 has a value wherein the signals of the actual world 1, which is light cast into the detecting device, are integrated by the shutter time which is the detection time in the time direction, and integrated by the photoreception region of the detecting element in the spatial direction.

Figure 31:
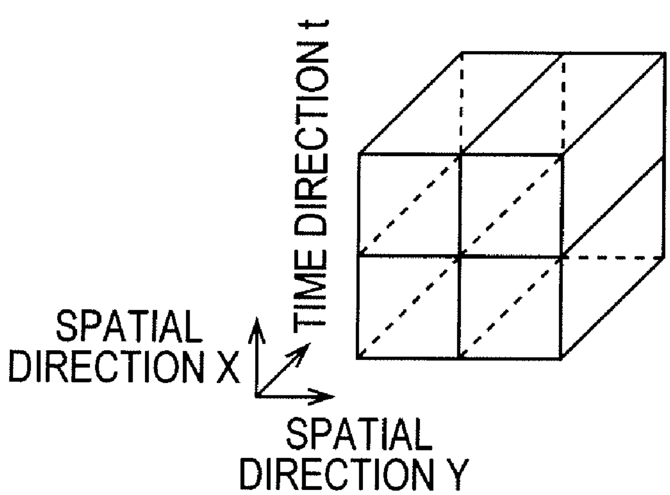
FIG. 31 is a diagram for describing an integration region at the time of generating high-resolution data 181 with higher resolution in the spatial direction.

Conversely, as shown in FIG. 31, the high-resolution data 181 with even higher resolution in the spatial direction is generated by integrating the estimated actual world 1 signals in the time direction by the same time as the detection time of the sensor 2 which has output the data 3, and also integrating in the spatial direction by a region narrower in comparison with the photoreception region of the detecting element of the sensor 2 which has output the data 3.

Note that at the time of generating the high-resolution data 181 with even higher resolution in the spatial direction, the region where the estimated signals of the actual world 1 are integrated can be set completely disengaged from photoreception region of the detecting element of the sensor 2 which has output the data 3. For example, the high-resolution data 181 can be provided with resolution which is that of the data 3 magnified in the spatial direction by an integer, of course, and further, can be provided with resolution which is that of the data 3 magnified in the spatial direction by a rational number such as 5/3 times, for example.

Figure 32:
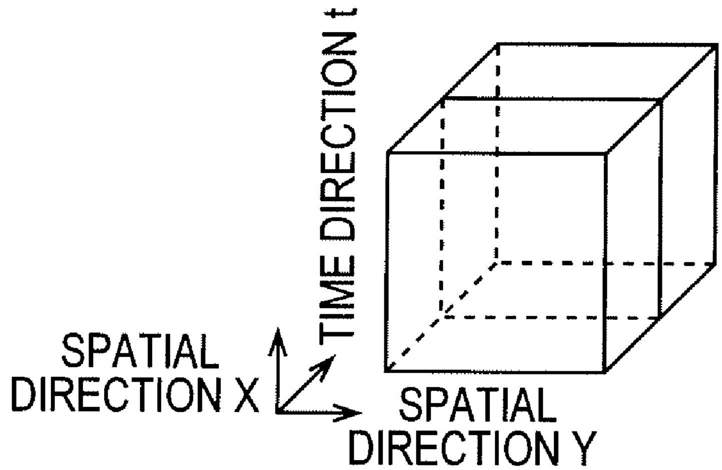
FIG. 32 is a diagram for describing an integration region at the time of generating high-resolution data 181 with higher resolution in the time direction.

Also, as shown in FIG. 32, the high-resolution data 181 with even higher resolution in the time direction is generated by integrating the estimated actual world 1 signals in the spatial direction by the same region as the photoreception region of the detecting element of the sensor 2 which has output the data 3, and also integrating in the time direction by a time shorter than the detection time of the sensor 2 which has output the data 3.

Note that at the time of generating the high-resolution data 181 with even higher resolution in the time direction, the time by which the estimated signals of the actual world 1 are integrated can be set completely disengaged from shutter time of the detecting element of the sensor 2 which has output the data 3. For example, the high-resolution data 181 can be provided with resolution which is that of the data 3 magnified in the time direction by an integer, of course, and further, can be provided with resolution which is that of the data 3 magnified in the time direction by a rational number such as 7/4 times, for example.

Figure 33:
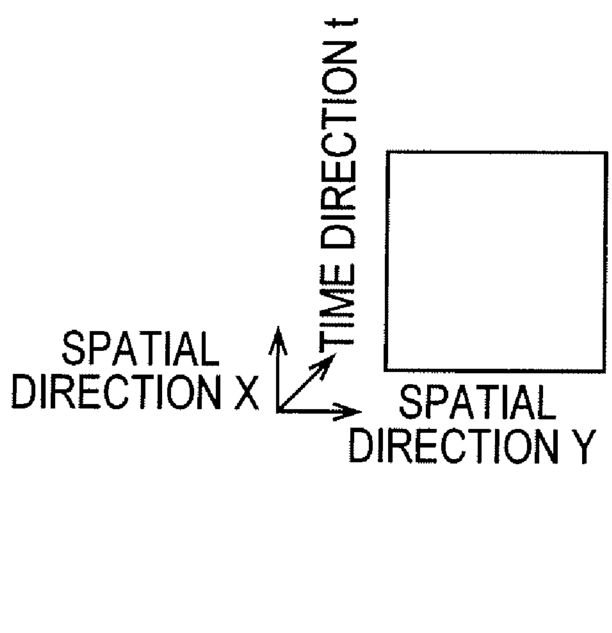
FIG. 33 is a diagram for describing an integration region at the time of generating high-resolution data 181 with blurring due to movement having been removed.

As shown in FIG. 33, high-resolution data 181 with movement blurring removed is generated by integrating the estimated actual world 1 signals only in the spatial direction and not in the time direction.

Figure 34:
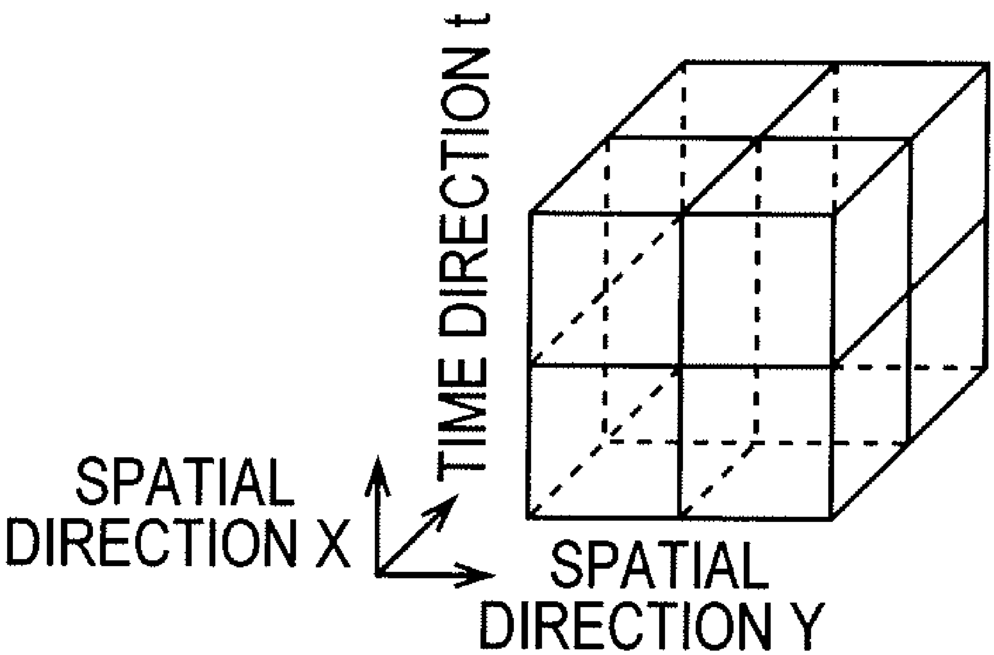
FIG. 34 is a diagram for describing an integration region at the time of generating high-resolution data 181 with higher resolution in the time-space direction.

Further, as shown in FIG. 34, high-resolution data 181 with higher resolution in the time direction and space direction is generated by integrating the estimated actual world 1 signals in the spatial direction by a region narrower in comparison with the photoreception region of the detecting element of the sensor 2 which has output the data 3, and also integrating in the time direction by a time shorter in comparison with the detection time of the sensor 2 which has output the data 3.

In this case, the region and time for integrating the estimated actual world 1 signals can be set completely unrelated to the photoreception region and shutter time of the detecting element of the sensor 2 which has output the data 3.

Thus, the image generating unit 103 generates data with higher resolution in the time direction or the spatial direction, by integrating the estimated actual world 1 signals by a desired space-time region, for example.

Accordingly, data which is more accurate with regard to the signals of the actual world 1, and which has higher resolution in the time direction or the space direction, can be generated by estimating the signals of the actual world 1.

An example of an input image and the results of processing with the signal processing device 4 according to the present invention will be described with reference to FIG. 35 through FIG. 39.

Figure 35:
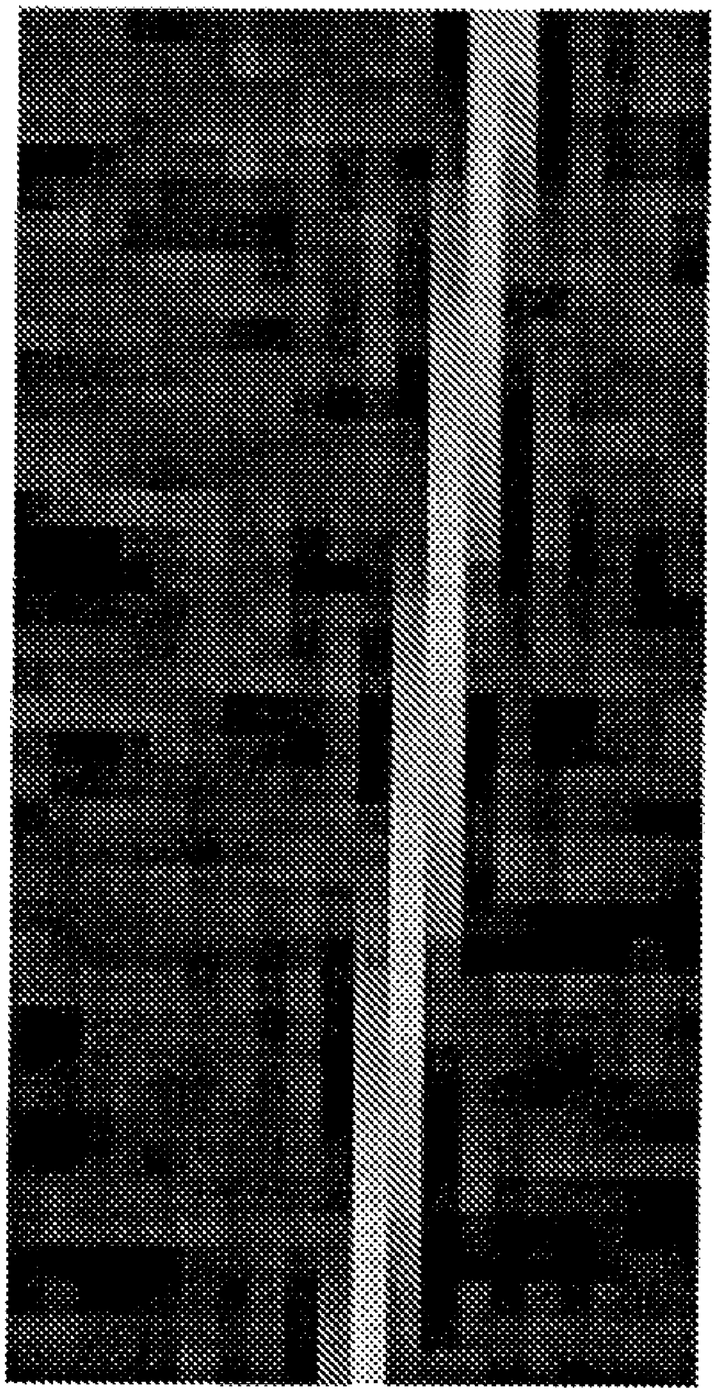
FIG. 35 is a diagram illustrating the original image of the input image.
Figure 36:
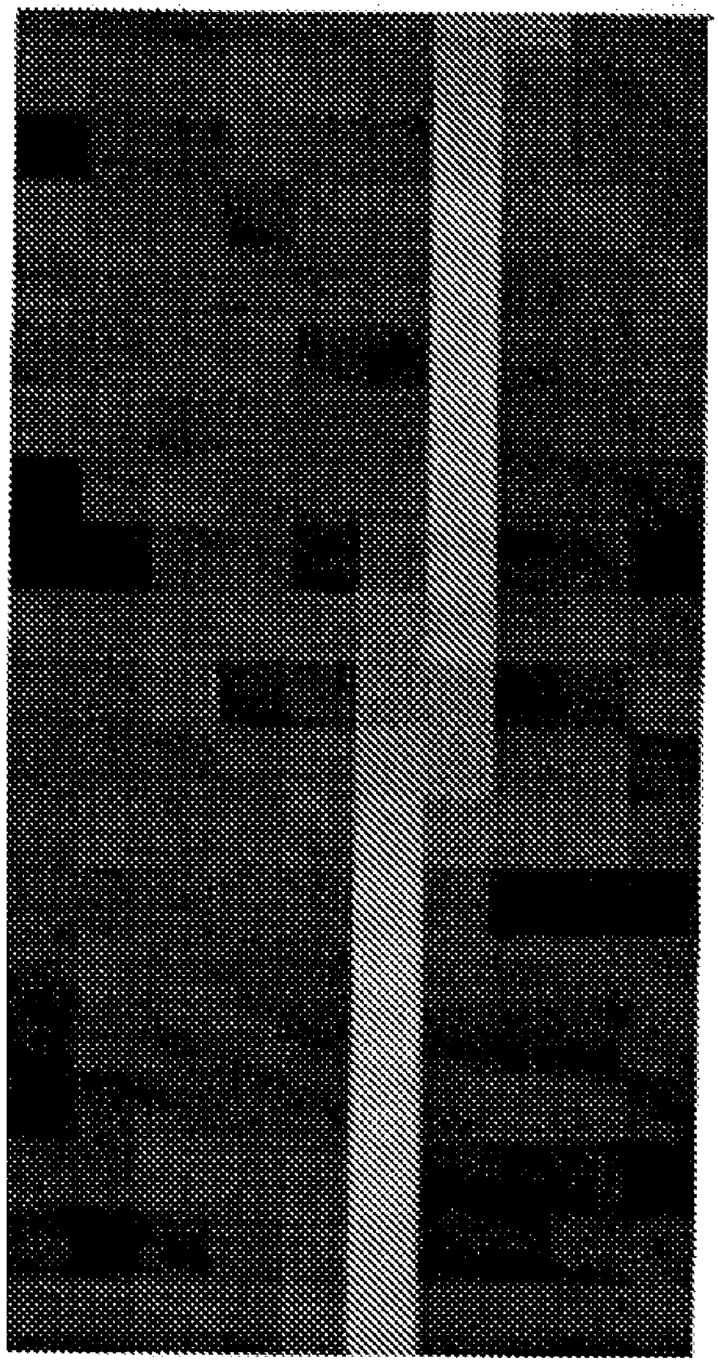
FIG. 36 is a diagram illustrating an example of an input image.

FIG. 35 is a diagram illustrating an original image of an input image. FIG. 36 is a diagram illustrating an example of an input image. The input image shown in FIG. 36 is an image generated by taking the average value of pixel values of pixels belonging to blocks made up of 2 by 2 pixels of the image shown in FIG. 35, as the pixel value of a single pixel. That is to say, the input image is an image obtained by applying spatial direction integration to the image shown in FIG. 35, imitating the integrating properties of the sensor.

The original image shown in FIG. 35 contains an image of a fine line inclined at approximately 5 degrees in the clockwise direction from the vertical direction. In the same way, the input image shown in FIG. 36 contains an image of a fine line inclined at approximately 5 degrees in the clockwise direction from the vertical direction.

Figure 37:
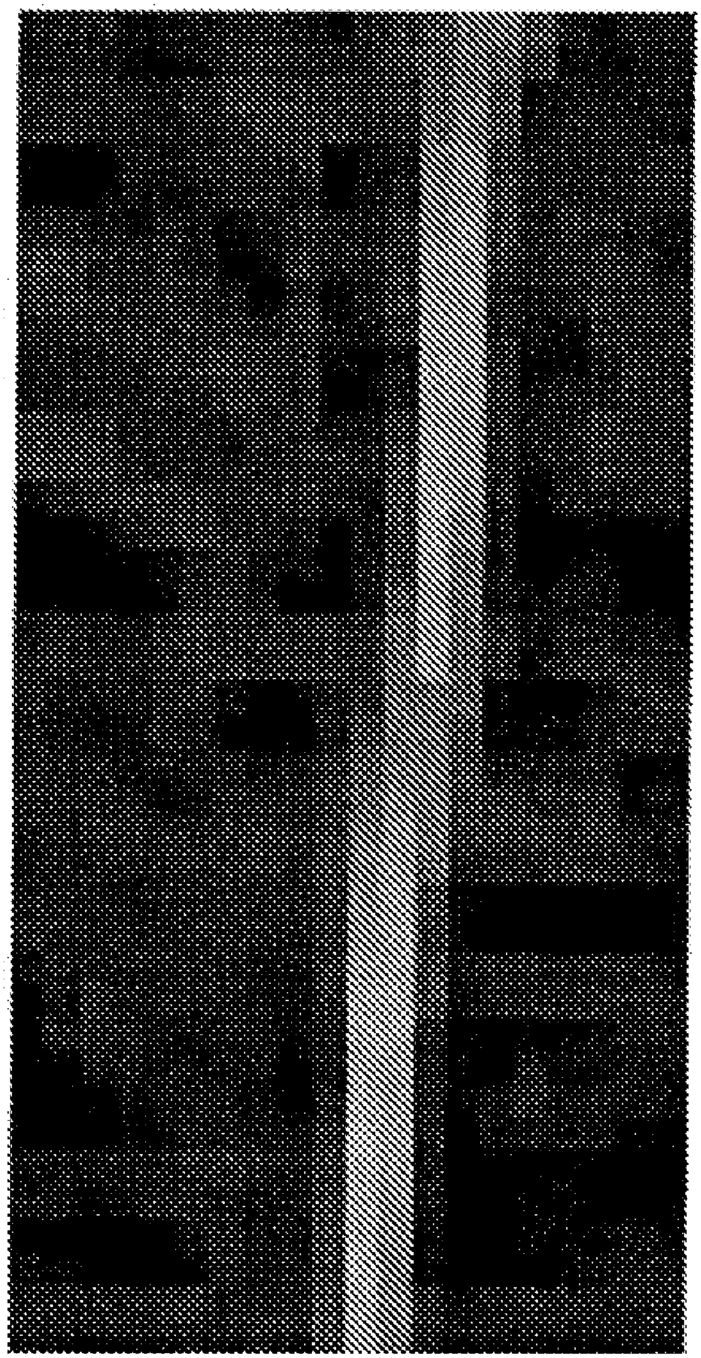
FIG. 37 is a diagram illustrating an image obtained by applying conventional class classification adaptation processing.

FIG. 37 is a diagram illustrating an image obtained by applying conventional class classification adaptation processing to the input image shown in FIG. 36. Now, class classification processing is made up of class classification processing and adaptation processing, wherein the data is classified based on the nature thereof by the class classification adaptation processing, and subjected to adaptation processing for each class. In the adaptation processing, a low-image quality or standard image quality image, for example, is converted into a high image quality image by being subjected to mapping (mapping) using a predetermined tap coefficient.

It can be understood in the image shown in FIG. 37 that the image of the fine line is different to that of the original image in FIG. 35.

Figure 38:
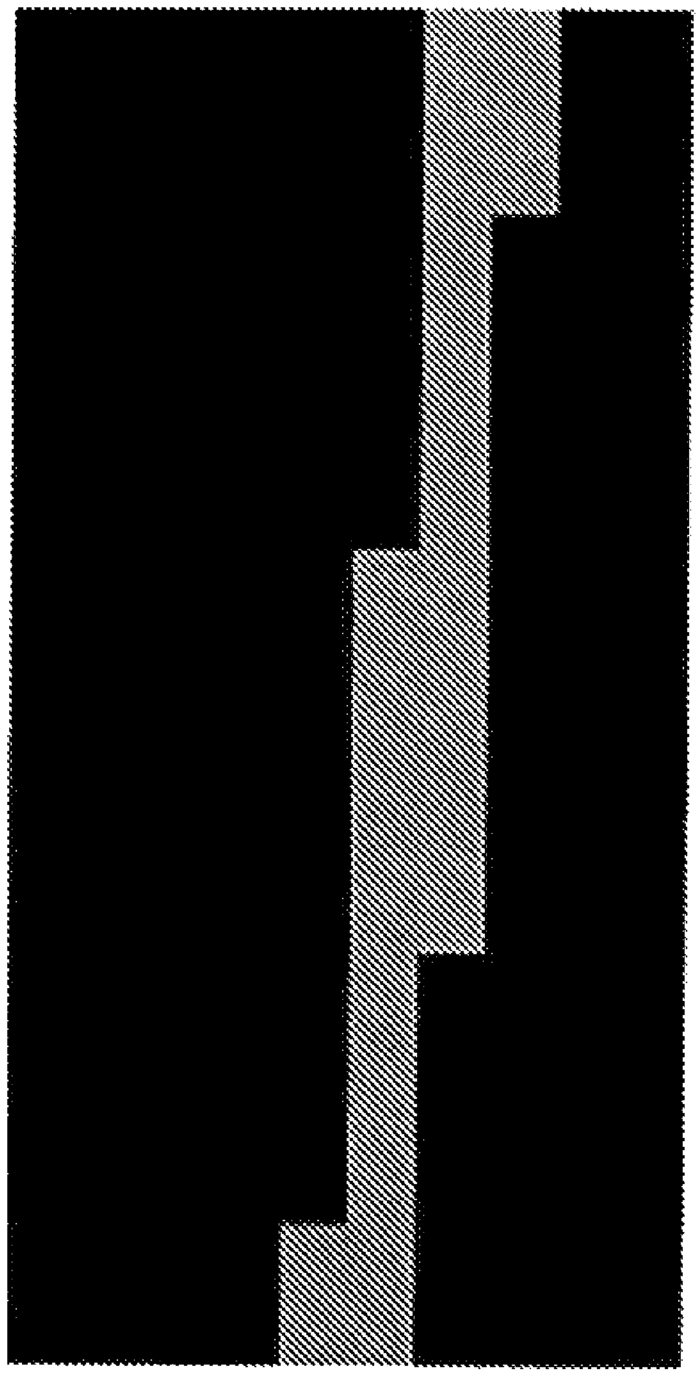
FIG. 38 is a diagram illustrating results of detecting a region with a fine line.

FIG. 38 is a diagram illustrating the results of detecting the fine line regions from the input image shown in the example in FIG. 36, by the data continuity detecting unit 101. In FIG. 38, the white region indicates the fine line region, i.e., the region wherein the arc shapes shown in FIG. 14 are arrayed.

Figure 39:
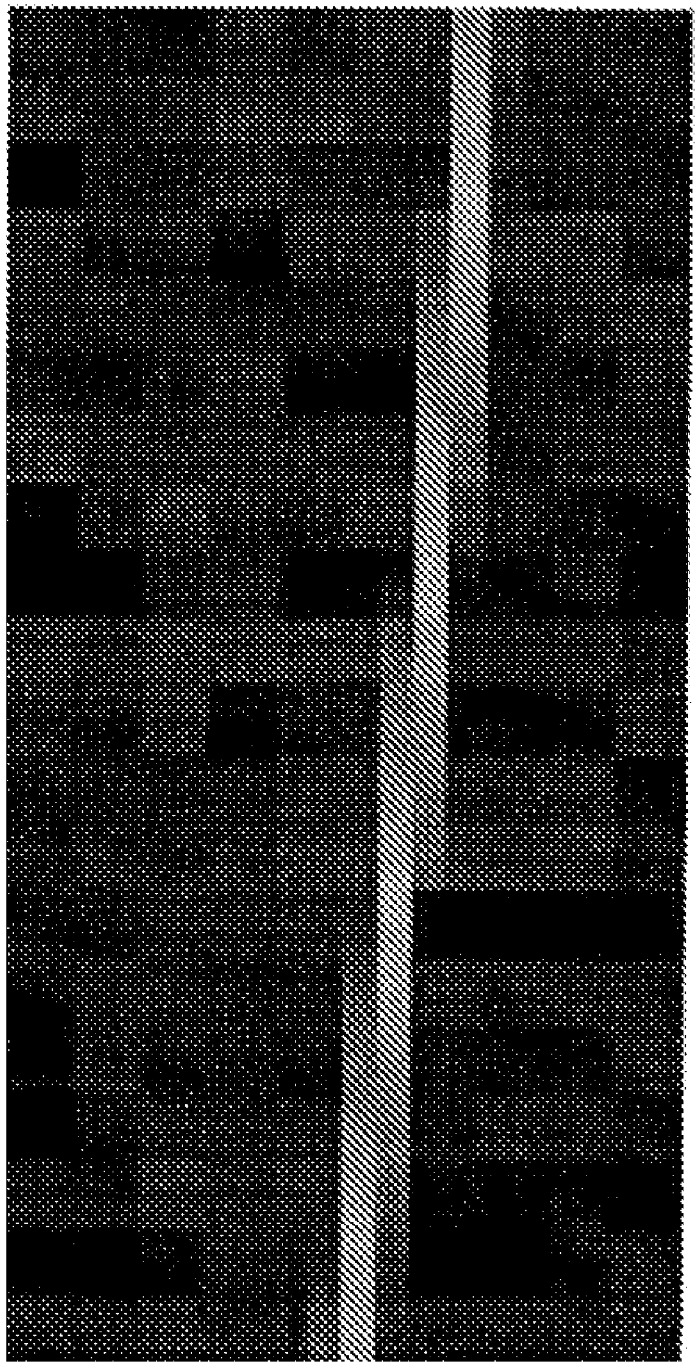
FIG. 39 is a diagram illustrating an example of an output image output from a signal processing device 4.

FIG. 39 is a diagram illustrating an example of the output image output from the signal processing device 4 according to the present invention, with the image shown in FIG. 36 as the input image. As shown in FIG. 39, the signals processing device 4 according to the present invention yields an image closer to the fine line image of the original image shown in FIG. 35.

Figure 40:
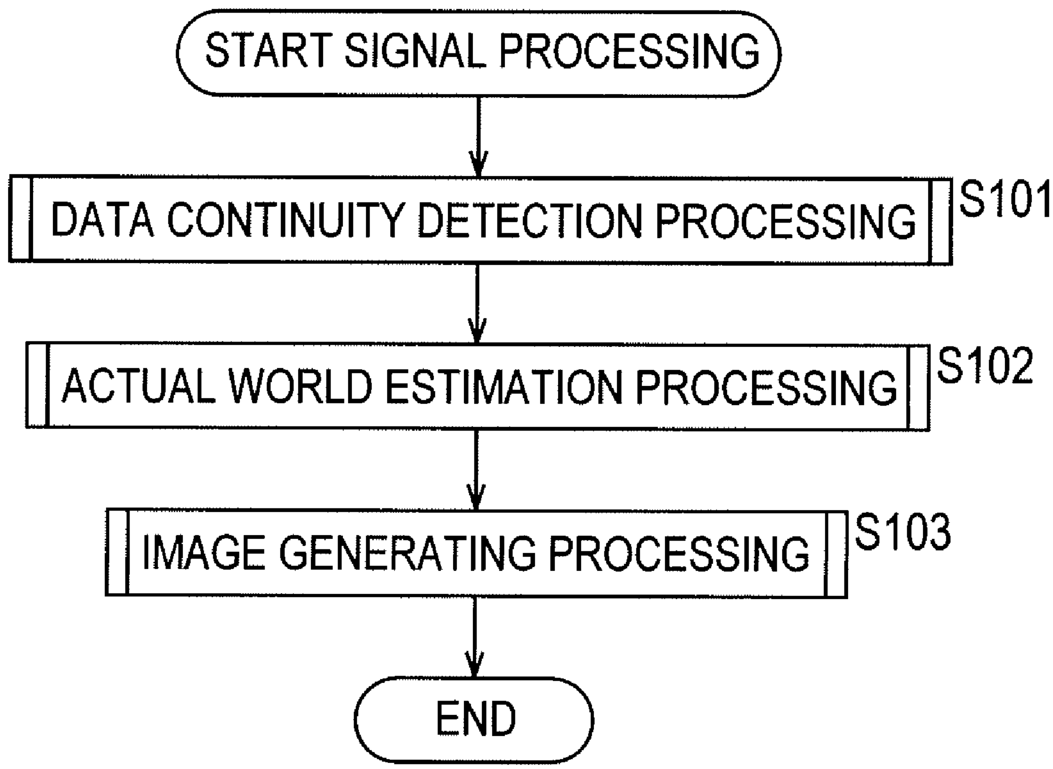
FIG. 40 is a flowchart for describing signal processing with the signal processing device 4.

FIG. 40 is a flowchart for describing the processing of signals with the signal processing device 4 according to the present invention.

In step S101, the data continuity detecting unit 101 executes the processing for detecting continuity. The data continuity detecting unit 101 detects data continuity contained in the input image which is the data 3, and supplies the data continuity information indicating the detected data continuity to the actual world estimating unit 102 and the image generating unit 103.

The data continuity detecting unit 101 detects the continuity of data corresponding to the continuity of the signals of the actual world. In the processing in step S101, the continuity of data detected by the data continuity detecting unit 101 is either part of the continuity of the image of the actual world 1 contained in the data 3, or continuity which has changed from the continuity of the signals of the actual world 1.

The data continuity detecting unit 101 detects the data continuity by detecting a region having a constant characteristic in a predetermined dimensional direction. Also, the data continuity detecting unit 101 detects data continuity by detecting angle (gradient) in the spatial direction indicating the an array of the same shape.

Details of the continuity detecting processing in step S101 will be described later.

Note that the data continuity information can be used as features, indicating the characteristics of the data 3.

In step S102, the actual world estimating unit 102 executes processing for estimating the actual world. That is to say, the actual world estimating unit 102 estimates the signals of the actual world based on the input image and the data continuity information supplied from the data continuity detecting unit 101. In the processing in step S102 for example, the actual world estimating unit 102 estimates the signals of the actual world 1 by predicting a model 161 approximating (describing) the actual world 1. The actual world estimating unit 102 supplies the actual world estimation information indicating the estimated signals of the actual world 1 to the image generating unit 103.

For example, the actual world estimating unit 102 estimates the actual world 1 signals by predicting the width of the linear object. Also, for example, the actual world estimating unit 102 estimates the actual world 1 signals by predicting a level indicating the color of the linear object.

Details of processing for estimating the actual world in step S102 will be described later.

Note that the actual world estimation information can be used as features, indicating the characteristics of the data 3.

In step S103, the image generating unit 103 performs image generating processing, and the processing ends. That is to say, the image generating unit 103 generates an image based on the actual world estimation information, and outputs the generated image. Or, the image generating unit 103 generates an image based on the data continuity information and actual world estimation information, and outputs the generated image.

For example, in the processing in step S103, the image generating unit 103 integrates a function approximating the generated real world light signals in the spatial direction, based on the actual world estimated information, hereby generating an image with higher resolution in the spatial direction in comparison with the input image, and outputs the generated image. For example, the image generating unit 103 integrates a function approximating the generated real world light signals in the time-space direction, based on the actual world estimated information, hereby generating an image with higher resolution in the time direction and the spatial direction in comparison with the input image, and outputs the generated image. The details of the image generating processing in step S103 will be described later.

Thus, the signal processing device 4 according to the present invention detects data continuity from the data 3, and estimates the actual world 1 from the detected data continuity. The signal processing device 4 then generates signals closer approximating the actual world 1 based on the estimated actual world 1.

As described above, in the event of performing the processing for estimating signals of the real world, accurate and highly-precise processing results can be obtained.

Also, in the event that first signals which are real world signals having first dimensions are projected, the continuity of data corresponding to the lost continuity of the real world signals is detected for second signals of second dimensions, having a number of dimensions fewer than the first dimensions, from which a part of the continuity of the signals of the real world has been lost, and the first signals are estimated by estimating the lost real world signals continuity based on the detected data continuity, accurate and highly-precise processing results can be obtained as to the events in the real world.

Next, the details of the configuration of the data continuity detecting unit 101 will be described.

Figure 41:
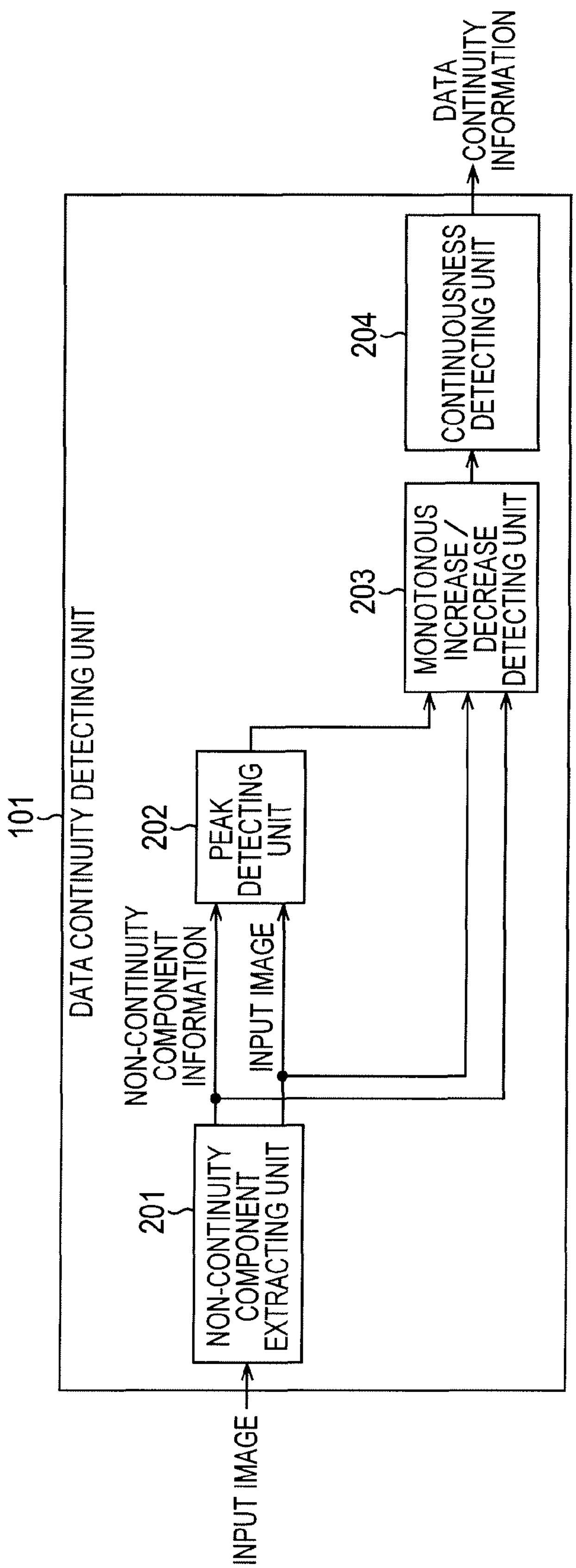
FIG. 41 is a block diagram illustrating the configuration of a data continuity detecting unit.

FIG. 41 is a block diagram illustrating the configuration of the data continuity detecting unit 101.

Upon taking an image of an object which is a fine line, the data continuity detecting unit 101, of which the configuration is shown in FIG. 41, detects the continuity of data contained in the data 3, which is generated from the continuity in that the cross-sectional shape which the object has is the same. That is to say, the data continuity detecting unit 101 of the configuration shown in FIG. 41 detects the continuity of data contained in the data 3, which is generated from the continuity in that the change in level of light as to the change in position in the direction orthogonal to the length-wise direction is the same at an arbitrary position in the length-wise direction, which the image of the actual world 1 which is a fine line, has.

More specifically, the data continuity detecting unit 101 of which configuration is shown in FIG. 41 detects the region where multiple arc shapes (half-disks) having a predetermined length are arrayed in a diagonally-offset adjacent manner, within the data 3 obtained by taking an image of a fine line with the sensor 2 having spatial integration effects.

The data continuity detecting unit 101 extracts the portions of the image data other than the portion of the image data where the image of the fine line having data continuity has been projected (hereafter, the portion of the image data where the image of the fine line having data continuity has been projected will also be called continuity component, and the other portions will be called non-continuity component), from an input image which is the data 3, detects the pixels where the image of the fine line of the actual world 1 has been projected, from the extracted non-continuity component and the input image, and detects the region of the input image made up of pixels where the image of the fine line of the actual world 1 has been projected.

A non-continuity component extracting unit 201 extracts the non-continuity component from the input image, and supplies the non-continuity component information indicating the extracted non-continuity component to a peak detecting unit 202 and a monotonous increase/decrease detecting unit 203 along with the input image.

Figure 42:
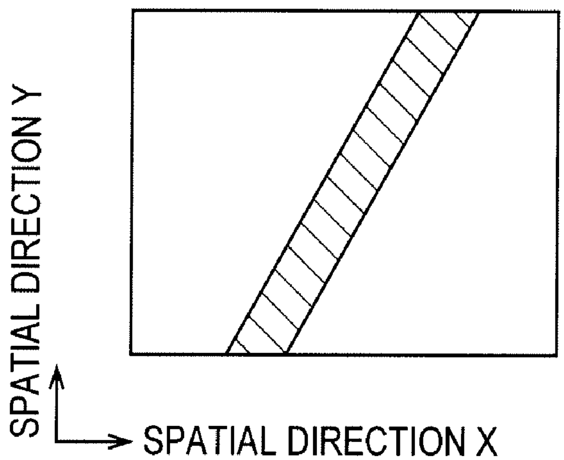
FIG. 42 is a diagram illustrating an image in the actual world 1 with a fine line in front of the background.
Figure 43:
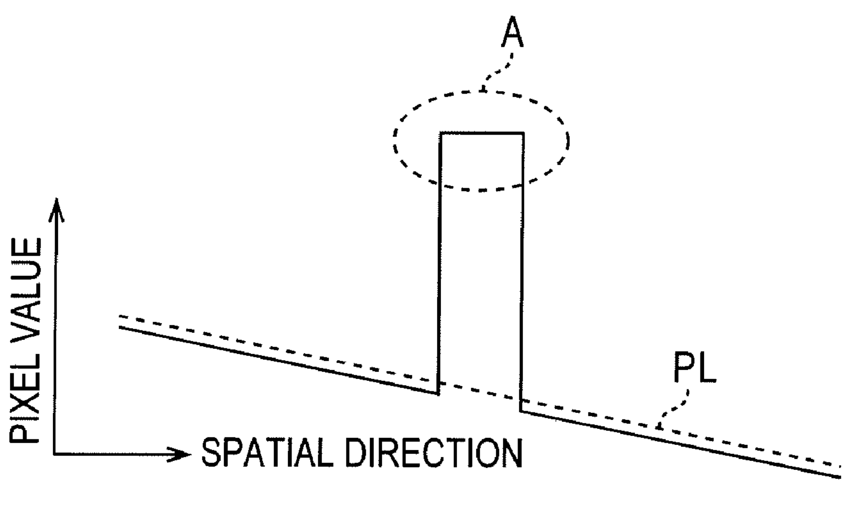
FIG. 43 is a diagram for describing approximation of a background with a plane.

For example, as shown in FIG. 42, in the event that an image of the actual world 1 wherein a fine line exists in front of a background with an approximately constant light level is projected on the data 3, the non-continuity component extracting unit 201 extracts the non-continuity component which is the background, by approximating the background in the input image which is the data 3, on a plane, as shown in FIG. 43. In FIG. 43, the solid line indicates the pixel values of the data 3, and the dotted line illustrates the approximation values indicated by the plane approximating the background. In FIG. 43, A denotes the pixel value of the pixel where the image of the fine line has been projected, and the PL denotes the plane approximating the background.

In this way, the pixel values of the multiple pixels at the portion of the image data having data continuity are discontinuous as to the non-continuity component.

The non-continuity component extracting unit 201 detects the discontinuous portion of the pixel values of the multiple pixels of the image data which is the data 3, where an image which is light signals of the actual world 1 has been projected and a part of the continuity of the image of the actual world 1 has been lost.

Details of the processing for extracting the non-continuity component with the non-continuity component extracting unit 201 will be described later.

The peak detecting unit 202 and the monotonous increase/decrease detecting unit 203 remove the non-continuity component from the input image, based on the non-continuity component information supplied from the non-continuity component extracting unit 201. For example, the peak detecting unit 202 and the monotonous increase/decrease detecting unit 203 remove the non-continuity component from the input image by setting the pixel values of the pixels of the input image where only the background image has been projected, to 0. Also, for example, the peak detecting unit 202 and the monotonous increase/decrease detecting unit 203 remove the non-continuity component from the input image by subtracting values approximated by the plane PL from the pixel values of each pixel of the input image.

Since the background can be removed from the input image, the peak detecting unit 202 through continuousness detecting unit 204 can process only the portion of the image data where the fine line has be projected, thereby further simplifying the processing by the peak detecting unit 202 through the continuousness detecting unit 204.

Note that the non-continuity component extracting unit 201 may supply image data wherein the non-continuity component has been removed form the input image, to the peak detecting unit 202 and the monotonous increase/decrease detecting unit 203.

In the example of processing described below, the image data wherein the non-continuity component has been removed from the input image, i.e., image data made up from only pixel containing the continuity component, is the object.

Now, description will be made regarding the image data upon which the fine line image has been projected, which the peak detecting unit 202 through continuousness detecting unit 204 are to detect.

Figure 44:
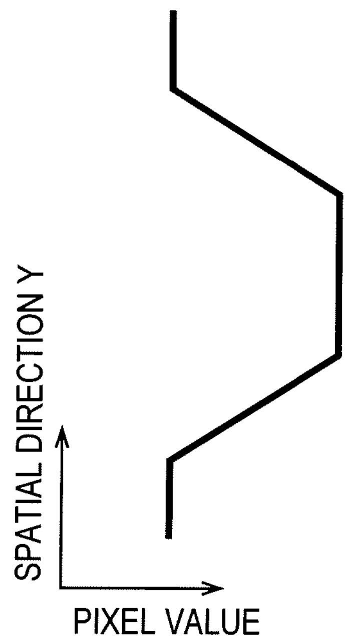
FIG. 44 is a diagram illustrating the cross-sectional shape of image data regarding which the image of a fine line has been projected.
Figure 45:
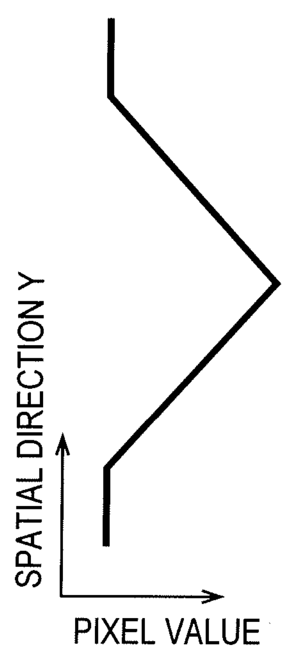
FIG. 45 is a diagram illustrating the cross-sectional shape of image data regarding which the image of a fine line has been projected.
Figure 46:
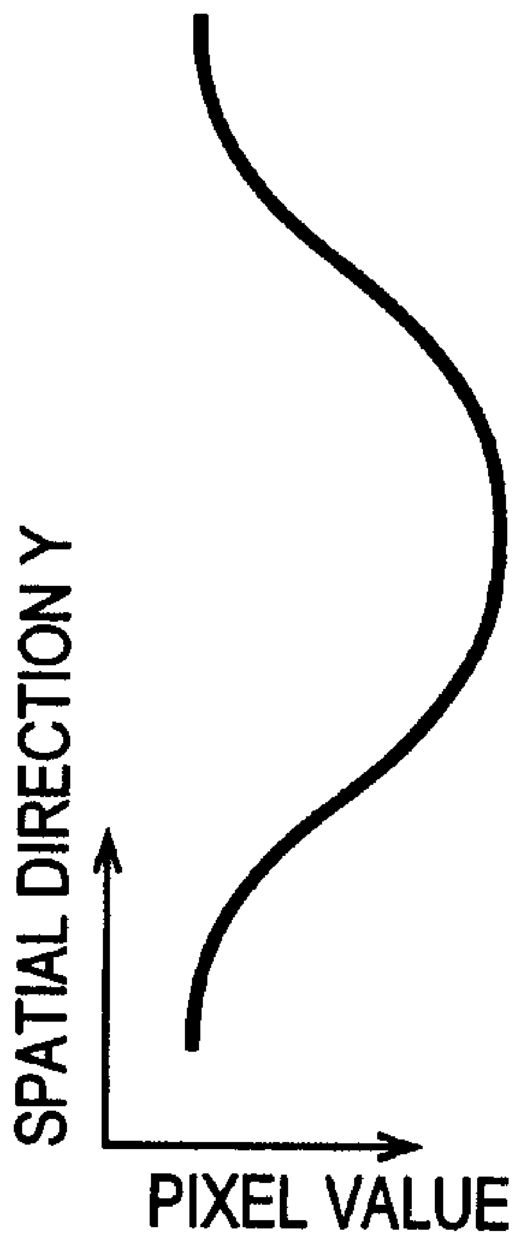
FIG. 46 is a diagram illustrating the cross-sectional shape of image data regarding which the image of a fine line has been projected.

In the event that there is no optical LPF, the cross-dimensional shape in the spatial direction Y (change in the pixel values as to change in the position in the spatial direction) of the image data upon which the fine line image has been projected as shown in FIG. 42 can be thought to be the trapezoid shown in FIG. 44, or the triangle shown in FIG. 45. However, ordinary image sensors have an optical LPF with the image sensor obtaining the image which has passed through the optical LPF and projects the obtained image on the data 3, so in reality, the cross-dimensional shape of the image data with fine lines in the spatial direction Y has a shape resembling Gaussian distribution, as shown in FIG. 46.

The peak detecting unit 202 through continuousness detecting unit 204 detect a region made up of pixels upon which the fine line image has been projected wherein the same cross-sectional shape (change in the pixel values as to change in the position in the spatial direction) is arrayed vertically in the screen at constant intervals, and further, detect a region made up of pixels upon which the fine line image has been projected which is a region having data continuity, by detecting regional connection corresponding to the length-wise direction of the fine line of the actual world 1. That is to say, the peak detecting unit 202 through continuousness detecting unit 204 detect regions wherein arc shapes (half-disc shapes) are formed on a single vertical row of pixels in the input image, and determine whether or not the detected regions are adjacent in the horizontal direction, thereby detecting connection of regions where arc shapes are formed, corresponding to the length-wise direction of the fine line image which is signals of the actual world 1.

Also, the peak detecting unit 202 through continuousness detecting unit 204 detect a region made up of pixels upon which the fine line image has been projected wherein the same cross-sectional shape is arrayed horizontally in the screen at constant intervals, and further, detect a region made up of pixels upon which the fine line image has been projected which is a region having data continuity, by detecting connection of detected regions corresponding to the length-wise direction of the fine line of the actual world 1. That is to say, the peak detecting unit 202 through continuousness detecting unit 204 detect regions wherein arc shapes are formed on a single horizontal row of pixels in the input image, and determine whether or not the detected regions are adjacent in the vertical direction, thereby detecting connection of regions where arc shapes are formed, corresponding to the length-wise direction of the fine line image, which is signals of the actual world 1.

First, description will be made regarding processing for detecting a region of pixels upon which the fine line image has been projected wherein the same arc shape is arrayed vertically in the screen at constant intervals.

The peak detecting unit 202 detects a pixel having a pixel value greater than the surrounding pixels, i.e., a peak, and supplies peak information indicating the position of the peak to the monotonous increase/decrease detecting unit 203. In the event that pixels arrayed in a single vertical row in the screen are the object, the peak detecting unit 202 compares the pixel value of the pixel position upwards in the screen and the pixel value of the pixel position downwards in the screen, and detects the pixel with the greater pixel value as the peak. The peak detecting unit 202 detects one or multiple peaks from a single image, e.g., from the image of a single frame.

A single screen contains frames or fields. This holds true in the following description as well.

For example, the peak detecting unit 202 selects a pixel of interest from pixels of an image of one frame which have not yet been taken as pixels of interest, compares the pixel value of the pixel of interest with the pixel value of the pixel above the pixel of interest, compares the pixel value of the pixel of interest with the pixel value of the pixel below the pixel of interest, detects a pixel of interest which has a greater pixel value than the pixel value of the pixel above and a greater pixel value than the pixel value of the pixel below, and takes the detected pixel of interest as a peak. The peak detecting unit supplies peak information indicating the detected peak to the monotonous increase/decrease detecting unit 203.

There are cases wherein the peak detecting unit 202 does not detect a peak. For example, in the event that the pixel values of all of the pixels of an image are the same value, or in the event that the pixel values decrease in one or two directions, no peak is detected. In this case, no fine line image has been projected on the image data.

The monotonous increase/decrease detecting unit 203 detects a candidate for a region made up of pixels upon which the fine line image has been projected wherein the pixels are vertically arrayed in a single row as to the peak detected by the peak detecting unit 202, based upon the peak information indicating the position of the peak supplied from the peak detecting unit 202, and supplies the region information indicating the detected region to the continuousness detecting unit 204 along with the peak information.

More specifically, the monotonous increase/decrease detecting unit 203 detects a region made up of pixels having pixel values monotonously decreasing with reference to the peak pixel value, as a candidate of a region made up of pixels upon which the image of the fine line has been projected. Monotonous decrease means that the pixel values of pixels which are further distance-wise from the peak are smaller than the pixel values of pixels which are closer to the peak.

Also, the monotonous increase/decrease detecting unit 203 detects a region made up of pixels having pixel values monotonously increasing with reference to the peak pixel value, as a candidate of a region made up of pixels upon which the image of the fine line has been projected. Monotonous increase means that the pixel values of pixels which are further distance-wise from the peak are greater than the pixel values of pixels which are closer to the peak.

In the following, the processing regarding regions of pixels having pixel values monotonously increasing is the same as the processing regarding regions of pixels having pixel values monotonously decreasing, so description thereof will be omitted. Also, with the description regarding processing for detecting a region of pixels upon which the fine line image has been projected wherein the same arc shape is arrayed horizontally in the screen at constant intervals, the processing regarding regions of pixels having pixel values monotonously increasing is the same as the processing regarding regions of pixels having pixel values monotonously decreasing, so description thereof will be omitted.

For example, the monotonous increase/decrease detecting unit 203 detects pixel values of each of the pixels in a vertical row as to a peak, the difference as to the pixel value of the pixel above, and the difference as to the pixel value of the pixel below. The monotonous increase/decrease detecting unit 203 then detects a region wherein the pixel value monotonously decreases by detecting pixels wherein the sign of the difference changes.

Further, the monotonous increase/decrease detecting unit 203 detects, from the region wherein pixel values monotonously decrease, a region made up of pixels having pixel values with the same sign as that of the pixel value of the peak, with the sign of the pixel value of the peak as a reference, as a candidate of a region made up of pixels upon which the image of the fine line has been projected.

For example, the monotonous increase/decrease detecting unit 203 compares the sign of the pixel value of each pixel with the sign of the pixel value of the pixel above and sign of the pixel value of the pixel below, and detects the pixel where the sign of the pixel value changes, thereby detecting a region of pixels having pixel values of the same sign as the peak within the region where pixel values monotonously decrease.

Thus, the monotonous increase/decrease detecting unit 203 detects a region formed of pixels arrayed in a vertical direction wherein the pixel values monotonously decrease as to the peak and have pixels values of the same sign as the peak.

Figure 47:
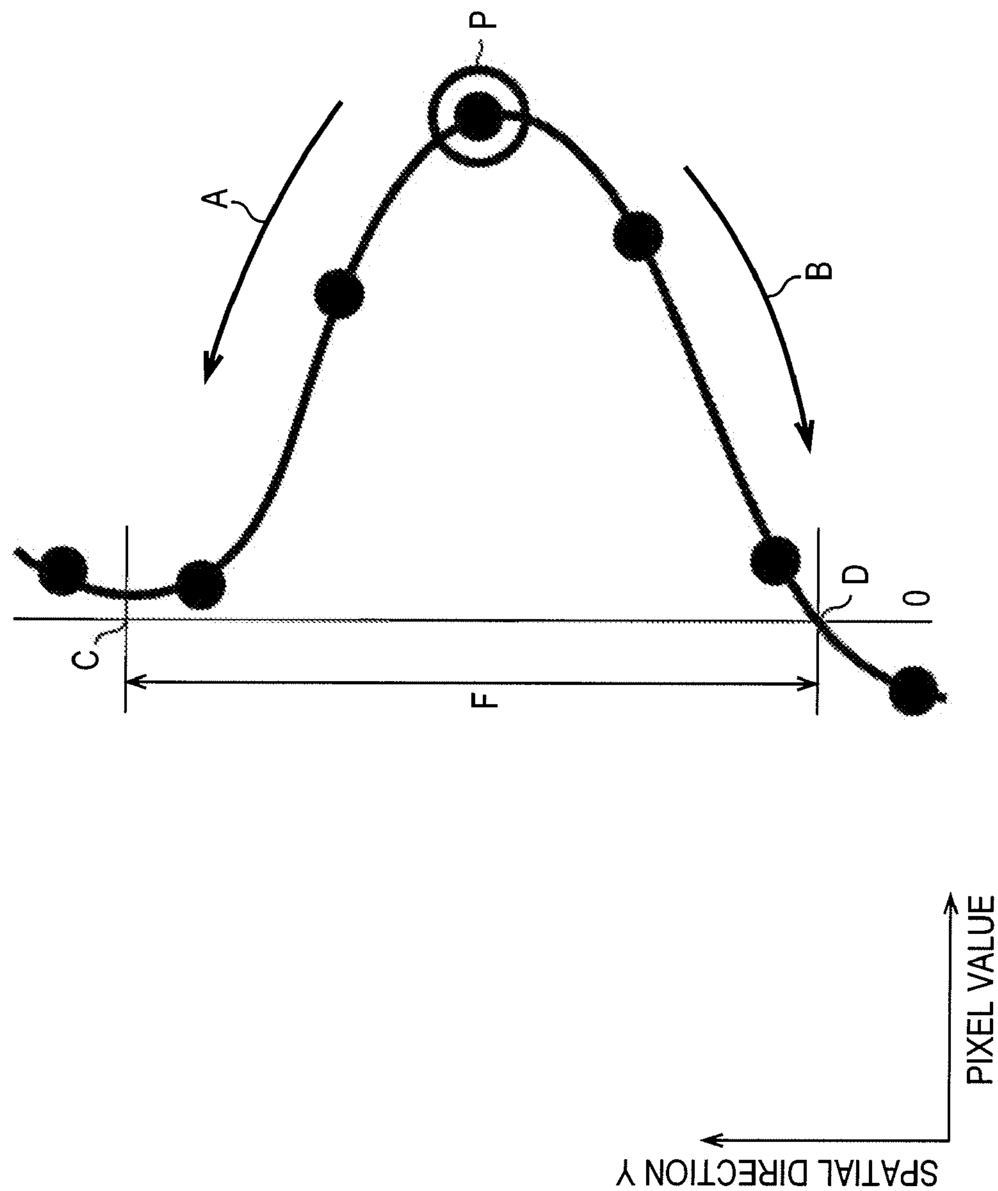
FIG. 47 is a diagram for describing the processing for detecting a peak and detecting of monotonous increase/decrease regions.

FIG. 47 is a diagram describing processing for peak detection and monotonous increase/decrease region detection, for detecting the region of pixels wherein the image of the fine line has been projected, from the pixel values as to a position in the spatial direction Y.

Figure 48:
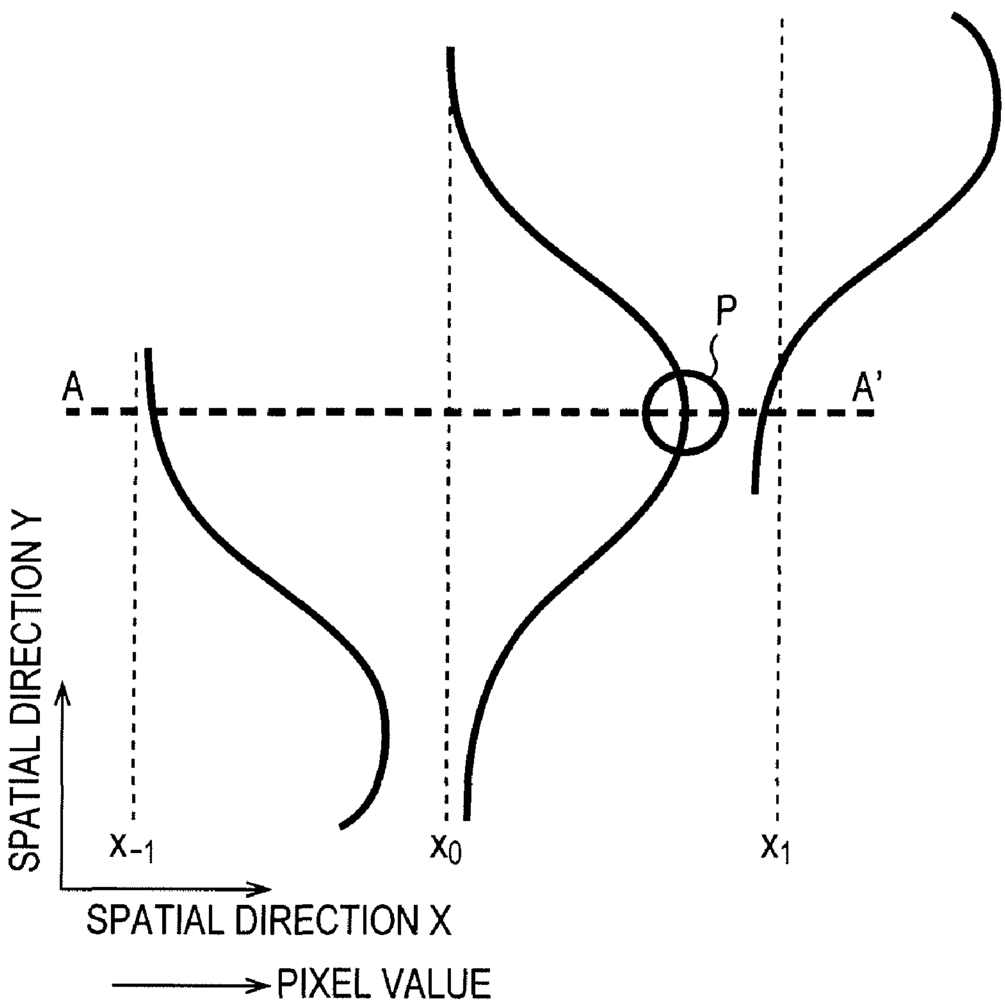
FIG. 48 is a diagram for describing the processing for detecting a fine line region wherein the pixel value of the peak exceeds a threshold, while the pixel value of the adjacent pixel is equal to or below the threshold value.
Figure 49:
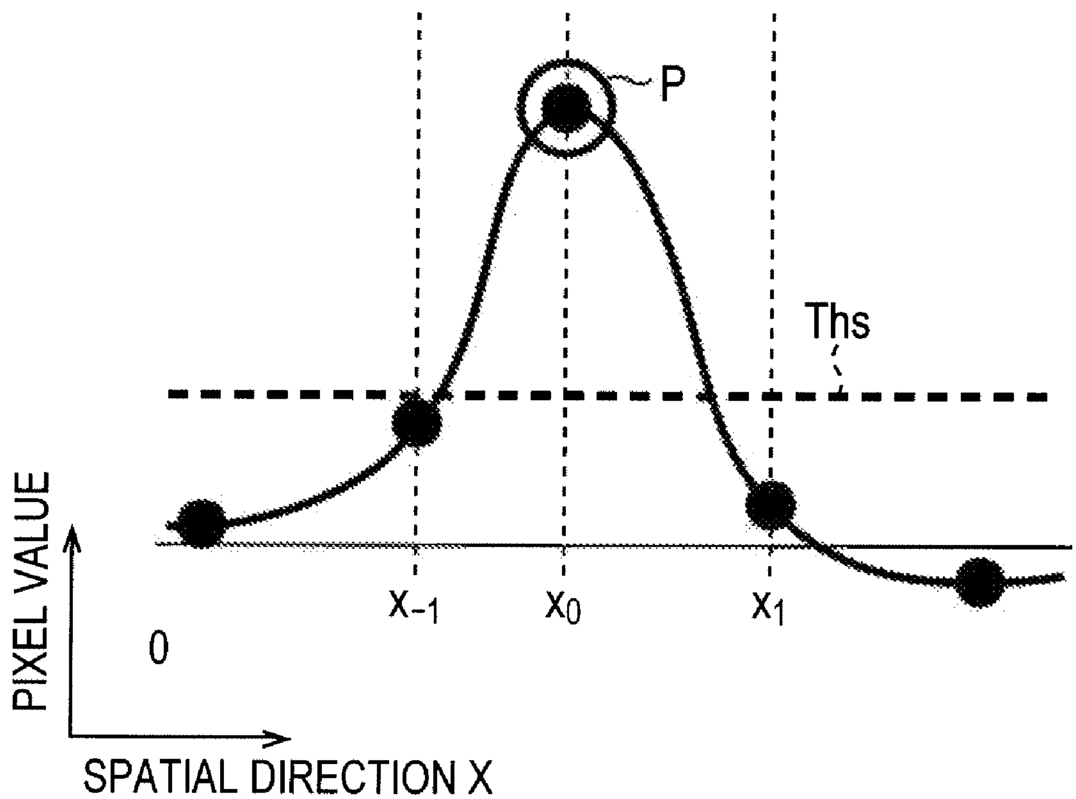
FIG. 49 is a diagram representing the pixel value of pixels arrayed in the direction indicated by dotted line AA' in FIG. 48.

In FIG. 47 through FIG. 49, P represents a peak. In the description of the data continuity detecting unit 101 of which the configuration is shown in FIG. 41, P represents a peak.

The peak detecting unit 202 compares the pixel values of the pixels with the pixel values of the pixels adjacent thereto in the spatial direction Y, and detects the peak P by detecting a pixel having a pixel value greater than the pixel values of the two pixels adjacent in the spatial direction Y.

The region made up of the peak P and the pixels on both sides of the peak P in the spatial direction Y is a monotonous decrease region wherein the pixel values of the pixels on both sides in the spatial direction Y monotonously decrease as to the pixel value of the peak P. In FIG. 47, the arrow denoted A and the arrow denoted by B represent the monotonous decrease regions existing on either side of the peak P.

The monotonous increase/decrease detecting unit 203 obtains the difference between the pixel values of each pixel and the pixel values of the pixels adjacent in the spatial direction Y, and detects pixels where the sign of the difference changes. The monotonous increase/decrease detecting unit 203 takes the boundary between the detected pixel where the sign of the difference changes and the pixel immediately prior thereto (on the peak P side) as the boundary of the fine line region made up of pixels where the image of the fine line has been projected.

In FIG. 47, the boundary of the fine line region which is the boundary between the pixel where the sign of the difference changes and the pixel immediately prior thereto (on the peak P side) is denoted by C.

Further, the monotonous increase/decrease detecting unit 203 compares the sign of the pixel values of each pixel with the pixel values of the pixels adjacent thereto in the spatial direction Y, and detects pixels where the sign of the pixel value changes in the monotonous decrease region. The monotonous increase/decrease detecting unit 203 takes the boundary between the detected pixel where the sign of the pixel value changes and the pixel immediately prior thereto (on the peak P side) as the boundary of the fine line region.

In FIG. 47, the boundary of the fine line region which is the boundary between the pixel where the sign of the pixel value changes and the pixel immediately prior thereto (on the peak P side) is denoted by P.

As shown in FIG. 47, the fine line region F made up of pixels where the image of the fine line has been projected is the region between the fine line region boundary C and the fine line region boundary D.

The monotonous increase/decrease detecting unit 203 obtains a fine line region F which is longer than a predetermined threshold, from fine line regions F made up of such monotonous increase/decrease regions, i.e., a fine line region F having a greater number of pixels than the threshold value. For example, in the event that the threshold value is 3, the monotonous increase/decrease detecting unit 203 detects a fine line region F including 4 or more pixels.

Further, the monotonous increase/decrease detecting unit 203 compares the pixel value of the peak P, the pixel value of the pixel to the right side of the peak P, and the pixel value of the pixel to the left side of the peak P, from the fine line region F thus detected, each with the threshold value, detects a fine pixel region F having the peak P wherein the pixel value of the peak P exceeds the threshold value, and wherein the pixel value of the pixel to the right side of the peak P is the threshold value or lower, and wherein the pixel value of the pixel to the left side of the peak P is the threshold value or lower, and takes the detected fine line region F as a candidate for the region made up of pixels containing the component of the fine line image.

In other words, determination is made that a fine line region F having the peak P, wherein the pixel value of the peak P is the threshold value or lower, or wherein the pixel value of the pixel to the right side of the peak P exceeds the threshold value, or wherein the pixel value of the pixel to the left side of the peak P exceeds the threshold value, does not contain the component of the fine line image, and is eliminated from candidates for the region made up of pixels including the component of the fine line image.

That is, as shown in FIG. 48, the monotonous increase/decrease detecting unit 203 compares the pixel value of the peak P with the threshold value, and also compares the pixel value of the pixel adjacent to the peak P in the spatial direction X (the direction indicated by the dotted line AA') with the threshold value, thereby detecting the fine line region F to which the peak P belongs, wherein the pixel value of the peak P exceeds the threshold value and wherein the pixel values of the pixel adjacent thereto in the spatial direction X are equal to or below the threshold value.

FIG. 49 is a diagram illustrating the pixel values of pixels arrayed in the spatial direction X indicated by the dotted line AA' in FIG. 48. The fine line region F to which the peak P belongs, wherein the pixel value of the peak P exceeds the threshold value $Th_s$ and wherein the pixel values of the pixel adjacent thereto in the spatial direction X are equal to or below the threshold value $Th_s$ contains the fine line component.

Note that an arrangement may be made wherein the monotonous increase/decrease detecting unit 203 compares the difference between the pixel value of the peak P and the pixel value of the background with the threshold value, taking the pixel value of the background as a reference, and also compares the difference between the pixel value of the pixels adjacent to the peak P in the spatial direction and the pixel value of the background with the threshold value, thereby detecting the fine line region F to which the peak P belongs, wherein the difference between the pixel value of the peak P and the pixel value of the background exceeds the threshold value, and wherein the difference between the pixel value of the pixel adjacent in the spatial direction X and the pixel value of the background is equal to or below the threshold value.

The monotonous increase/decrease detecting unit 203 outputs to the continuousness detecting unit 204 monotonous increase/decrease region information indicating a region made up of pixels of which the pixel value monotonously decrease with the peak P as a reference and the sign of the pixel value is the same as that of the peak P, wherein the peak P exceeds the threshold value and wherein the pixel value of the pixel to the right side of the peak P is equal to or below the threshold value and the pixel value of the pixel to the left side of the peak P is equal to or below the threshold value.

In the event of detecting a region of pixels arrayed in a single row in the vertical direction of the screen where the image of the fine line has been projected, pixels belonging to the region indicated by the monotonous increase/decrease region information are arrayed in the vertical direction and include pixels where the image of the fine line has been projected. That is to say, the region indicated by the monotonous increase/decrease region information includes a region formed of pixels arrayed in a single row in the vertical direction of the screen where the image of the fine line has been projected.

In this way, the apex detecting unit 202 and the monotonous increase/decrease detecting unit 203 detects a continuity region made up of pixels where the image of the fine line has been projected, employing the nature that, of the pixels where the image of the fine line has been projected, change in the pixel values in the spatial direction Y approximates Gaussian distribution.

Of the region made up of pixels arrayed in the vertical direction, indicated by the monotonous increase/decrease region information supplied from the monotonous increase/decrease detecting unit 203, the continuousness detecting unit 204 detects regions including pixels adjacent in the horizontal direction, i.e., regions having similar pixel value change and duplicated in the vertical direction, as continuous regions, and outputs the peak information and data continuity information indicating the detected continuous regions. The data continuity information includes monotonous increase/ decrease region information, information indicating the connection of regions, and so forth.

Arc shapes are aligned at constant intervals in an adjacent manner with the pixels where the fine line has been projected, so the detected continuous regions include the pixels where the fine line has been projected.

The detected continuous regions include the pixels where arc shapes are aligned at constant intervals in an adjacent manner to which the fine line has been projected, so the detected continuous regions are taken as a continuity region, and the continuousness detecting unit 204 outputs data continuity information indicating the detected continuous regions.

That is to say, the continuousness detecting unit 204 uses the continuity wherein arc shapes are aligned at constant intervals in an adjacent manner in the data 3 obtained by imaging the fine line, which has been generated due to the continuity of the image of the fine line in the actual world 1, the nature of the continuity being continuing in the length direction, so as to further narrow down the candidates of regions detected with the peak detecting unit 202 and the monotonous increase/decrease detecting unit 203.

Figure 50:
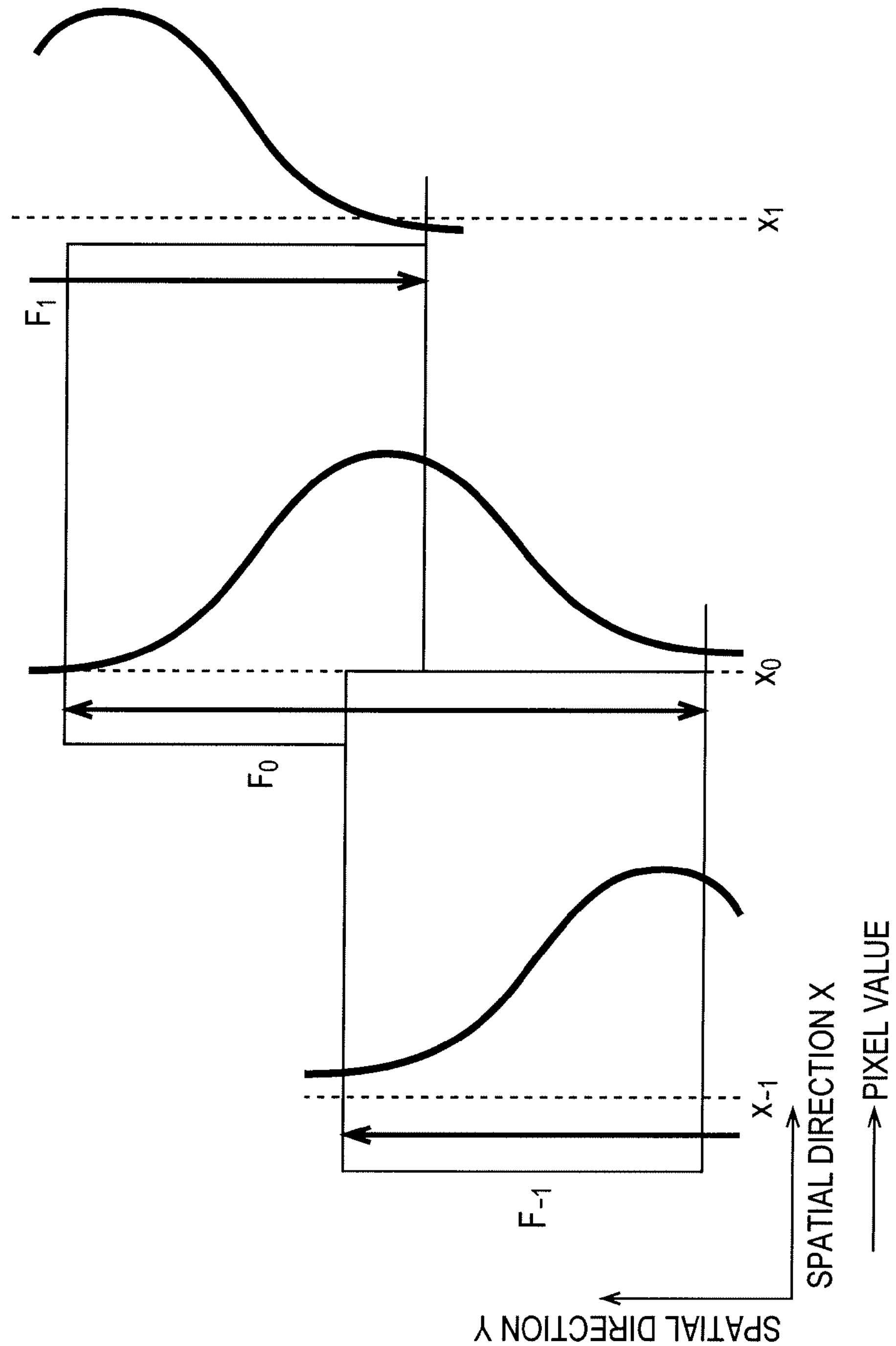
FIG. 50 is a diagram for describing processing for detecting continuity in a monotonous increase/decrease region.

FIG. 50 is a diagram describing the processing for detecting the continuousness of monotonous increase/decrease regions.

As shown in FIG. 50, in the event that a fine line region F formed of pixels aligned in a single row in the vertical direction of the screen includes pixels adjacent in the horizontal direction, the continuousness detecting unit 204 determines that there is continuousness between the two monotonous increase/decrease regions, and in the event that pixels adjacent in the horizontal direction are not included, determines that there is no continuousness between the two fine line regions F. For example, a fine line region $F_{-1}$ made up of pixels aligned in a single row in the vertical direction of the screen is determined to be continuous to a fine line region $F_0$ made up of pixels aligned in a single row in the vertical direction of the screen in the event of containing a pixel adjacent to a pixel of the fine line region $F_0$ in the horizontal direction. The fine line region $F_0$ made up of pixels aligned in a single row in the vertical direction of the screen is determined to be continuous to a fine line region $F_1$ made up of pixels aligned in a single row in the vertical direction of the screen in the event of containing a pixel adjacent to a pixel of the fine line region $F_1$ in the horizontal direction.

In this way, regions made up of pixels aligned in a single row in the vertical direction of the screen where the image of the fine line has been projected are detected by the peak detecting unit 202 through the continuousness detecting unit 204.

As described above, the peak detecting unit 202 through the continuousness detecting unit 204 detect regions made up of pixels aligned in a single row in the vertical direction of the screen where the image of the fine line has been projected, and further detect regions made up of pixels aligned in a single row in the horizontal direction of the screen where the image of the fine line has been projected.

Note that the order of processing does not restrict the present invention, and may be executed in parallel, as a matter of course.

That is to say, the peak detecting unit 202, with regard to of pixels aligned in a single row in the horizontal direction of the screen, detects as a peak a pixel which has a pixel value greater in comparison with the pixel value of the pixel situated to the left side on the screen and the pixel value of the pixel situated to the right side on the screen, and supplies peak information indicating the position of the detected peak to the monotonous increase/decrease detecting unit 203. The peak detecting unit 202 detects one or multiple peaks from one image, for example, one frame image.

For example, the peak detecting unit 202 selects a pixel of interest from pixels in the one frame image which has not yet been taken as a pixel of interest, compares the pixel value of the pixel of interest with the pixel value of the pixel to the left side of the pixel of interest, compares the pixel value of the pixel of interest with the pixel value of the pixel to the right side of the pixel of interest, detects a pixel of interest having a pixel value greater than the pixel value of the pixel to the left side of the pixel of interest and having a pixel value greater than the pixel value of the pixel to the right side of the pixel of interest, and takes the detected pixel of interest as a peak. The peak detecting unit 202 supplies peak information indicating the detected peak to the monotonous increase/decrease detecting unit 203.

There are cases wherein the peak detecting unit 202 does not detect a peak.

The monotonous increase/decrease detecting unit 203 detects candidates for a region made up of pixels aligned in a single row in the horizontal direction as to the peak detected by the peak detecting unit 202 wherein the fine line image has been projected, and supplies the monotonous increase/decrease region information indicating the detected region to the continuousness detecting unit 204 along with the peak information.

More specifically, the monotonous increase/decrease detecting unit 203 detects regions made up of pixels having pixel values monotonously decreasing with the pixel value of the peak as a reference, as candidates of regions made up of pixels where the fine line image has been projected.

For example, the monotonous increase/decrease detecting unit 203 obtains, with regard to each pixel in a single row in the horizontal direction as to the peak, the pixel value of each pixel, the difference as to the pixel value of the pixel to the left side, and the difference as to the pixel value of the pixel to the right side. The monotonous increase/decrease detecting unit 203 then detects the region where the pixel value monotonously decreases by detecting the pixel where the sign of the difference changes.

Further, the monotonous increase/decrease detecting unit 203 detects a region made up of pixels having pixel values with the same sign as the pixel value as the sign of the pixel value of the peak, with reference to the sign of the pixel value of the peak, as a candidate for a region made up of pixels where the fine line image has been projected.

For example, the monotonous increase/decrease detecting unit 203 compares the sign of the pixel value of each pixel with the sign of the pixel value of the pixel to the left side or with the sign of the pixel value of the pixel to the right side, and detects the pixel where the sign of the pixel value changes, thereby detecting a region made up of pixels having pixel values with the same sign as the peak, from the region where the pixel values monotonously decrease.

Thus, the monotonous increase/decrease detecting unit 203 detects a region made up of pixels aligned in the horizontal direction and having pixel values with the same sign as the peak wherein the pixel values monotonously decrease as to the peak.

From a fine line region made up of such a monotonous increase/decrease region, the monotonous increase/decrease detecting unit 203 obtains a fine line region longer than a threshold value set beforehand, i.e., a fine line region having a greater number of pixels than the threshold value.

Further, from the fine line region thus detected, the monotonous increase/decrease detecting unit 203 compares the pixel value of the peak, the pixel value of the pixel above the peak, and the pixel value of the pixel below the peak, each with the threshold value, detects a fine line region to which belongs a peak wherein the pixel value of the peak exceeds the threshold value, the pixel value of the pixel above the peak is within the threshold, and the pixel value of the pixel below the peak is within the threshold, and takes the detected fine line region as a candidate for a region made up of pixels containing the fine line image component.

Another way of saying this is that fine line regions to which belongs a peak wherein the pixel value of the peak is within the threshold value, or the pixel value of the pixel above the peak exceeds the threshold, or the pixel value of the pixel below the peak exceeds the threshold, are determined to not contain the fine line image component, and are eliminated from candidates of the region made up of pixels containing the fine line image component.

Note that the monotonous increase/decrease detecting unit 203 may be arranged to take the background pixel value as a reference, compare the difference between the pixel value of the pixel and the pixel value of the background with the threshold value, and also to compare the difference between the pixel value of the background and the pixel values adjacent to the peak in the vertical direction with the threshold value, and take a detected fine line region wherein the difference between the pixel value of the peak and the pixel value of the background exceeds the threshold value, and the difference between the pixel value of the background and the pixel value of the pixels adjacent in the vertical direction is within the threshold, as a candidate for a region made up of pixels containing the fine line image component.

The monotonous increase/decrease detecting unit 203 supplies to the continuousness detecting unit 204 monotonous increase/decrease region information indicating a region made up of pixels having a pixel value sign which is the same as the peak and monotonously decreasing pixel values as to the peak as a reference, wherein the peak exceeds the threshold value, and the pixel value of the pixel to the right side of the peak is within the threshold, and the pixel value of the pixel to the left side of the peak is within the threshold.

In the event of detecting a region made up of pixels aligned in a single row in the horizontal direction of the screen wherein the image of the fine line has been projected, pixels belonging to the region indicated by the monotonous increase/decrease region information include pixels aligned in the horizontal direction wherein the image of the fine line has been projected. That is to say, the region indicated by the monotonous increase/decrease region information includes a region made up of pixels aligned in a single row in the horizontal direction of the screen wherein the image of the fine line has been projected.

Of the regions made up of pixels aligned in the horizontal direction indicated in the monotonous increase/decrease region information supplied from the monotonous increase/decrease detecting unit 203, the continuousness detecting unit 204 detects regions including pixels adjacent in the vertical direction, i.e., regions having similar pixel value change and which are repeated in the horizontal direction, as continuous regions, and outputs data continuity information indicating the peak information and the detected continuous regions. The data continuity information includes information indicating the connection of the regions.

At the pixels where the fine line has been projected, arc shapes are arrayed at constant intervals in an adjacent manner, so the detected continuous regions include pixels where the fine line has been projected.

The detected continuous regions include pixels where arc shapes are arrayed at constant intervals wherein the fine line has been projected, so the detected continuous regions are taken as a continuity region, and the continuousness detecting unit 204 outputs data continuity information indicating the detected continuous regions.

That is to say, the continuousness detecting unit 204 uses the continuity which is that the arc shapes are arrayed at constant intervals in an adjacent manner in the data 3 obtained by imaging the fine line, generated from the continuity of the image of the fine line in the actual world 1 which is continuation in the length direction, so as to further narrow down the candidates of regions detected by the peak detecting unit 202 and the monotonous increase/decrease detecting unit 203.

Figure 51:
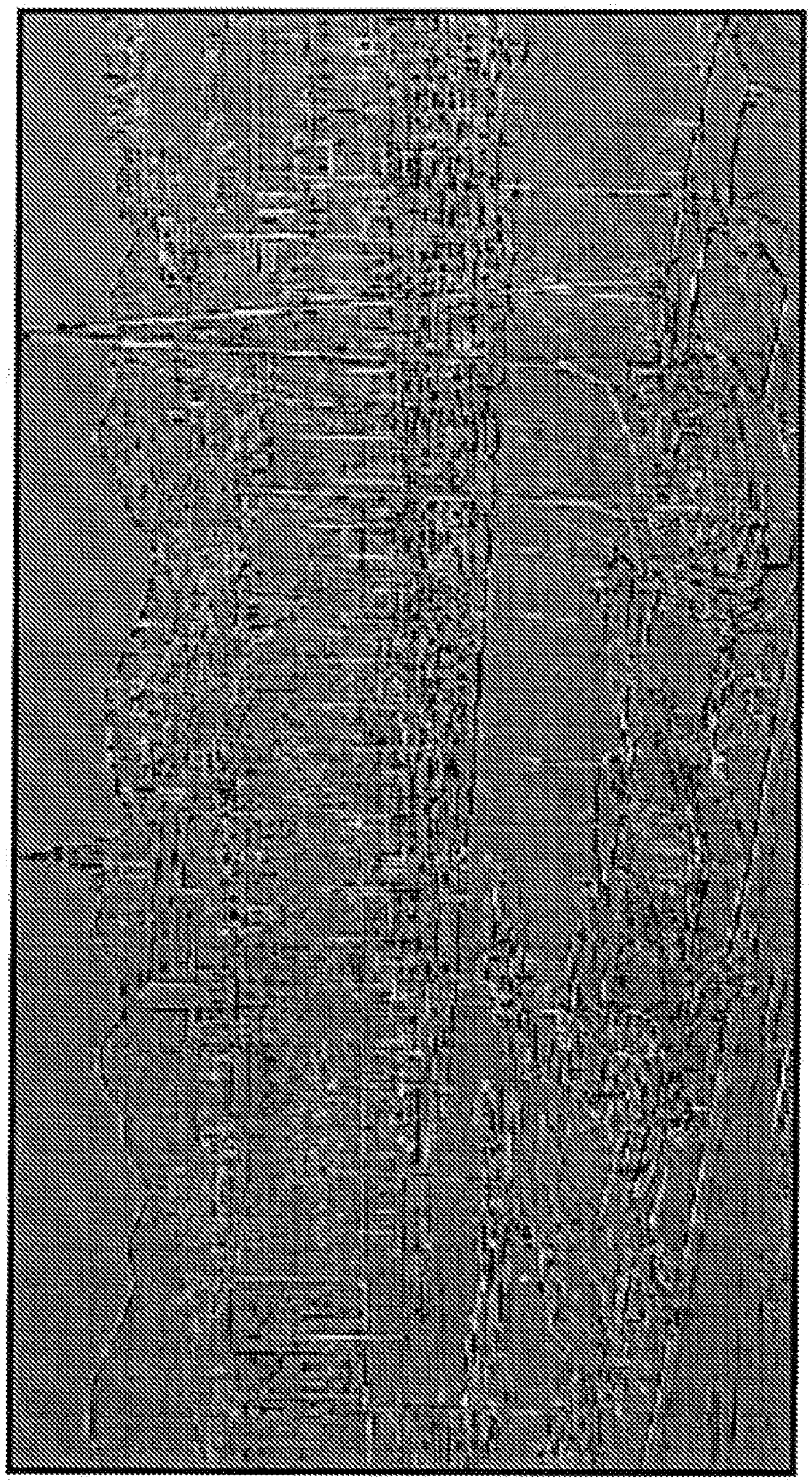
FIG. 51 is a diagram illustrating an example of an image regarding which a continuity component has been extracted by approximation on a plane.
Figure 52:
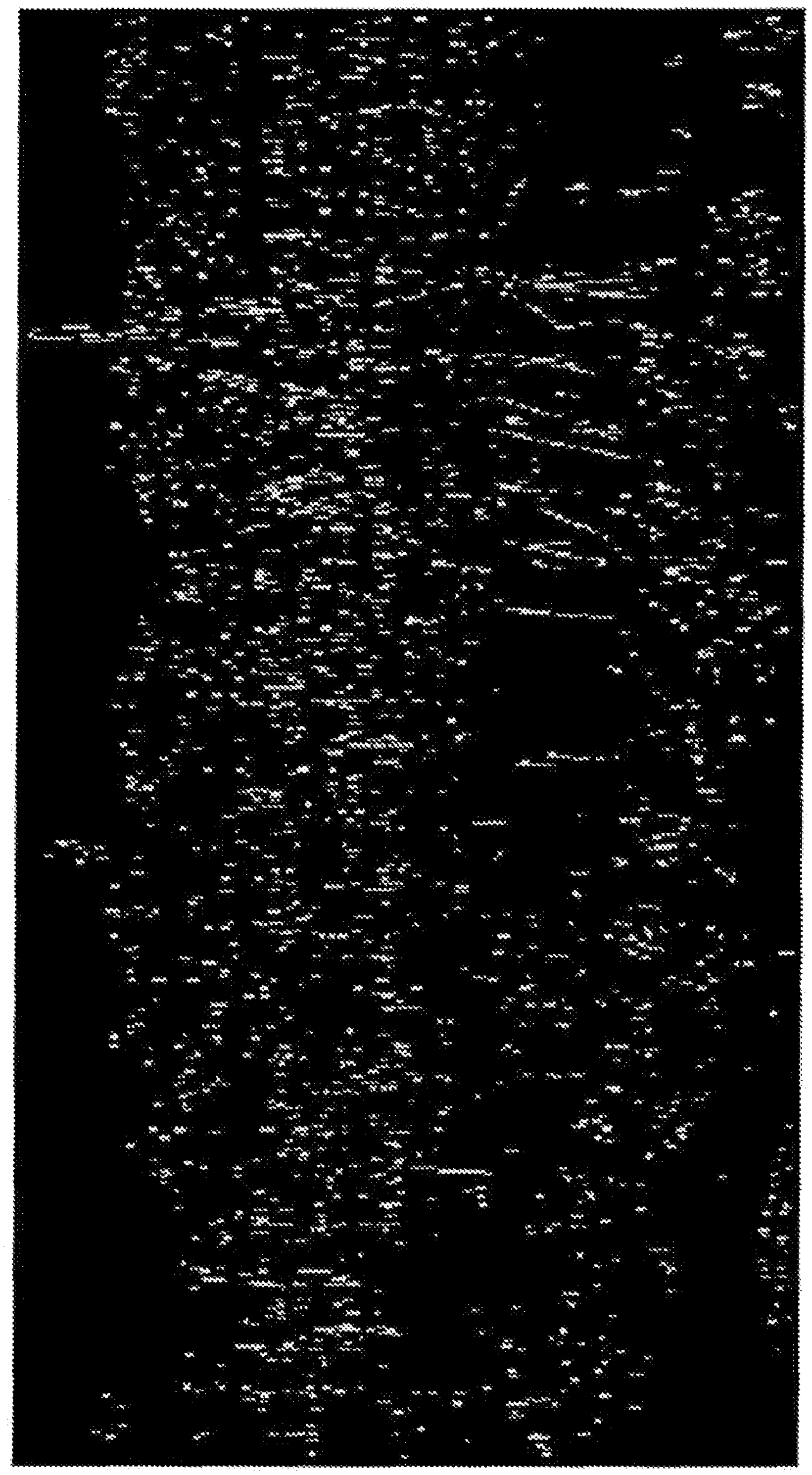
FIG. 52 is a diagram illustrating results of detecting regions with monotonous decrease.

FIG. 51 is a diagram illustrating an example of an image wherein the continuity component has been extracted by planar approximation. FIG. 52 is a diagram illustrating the results of detecting peaks in the image shown in FIG. 51, and detecting monotonously decreasing regions. In FIG. 52, the portions indicated by white are the detected regions.

Figure 53:
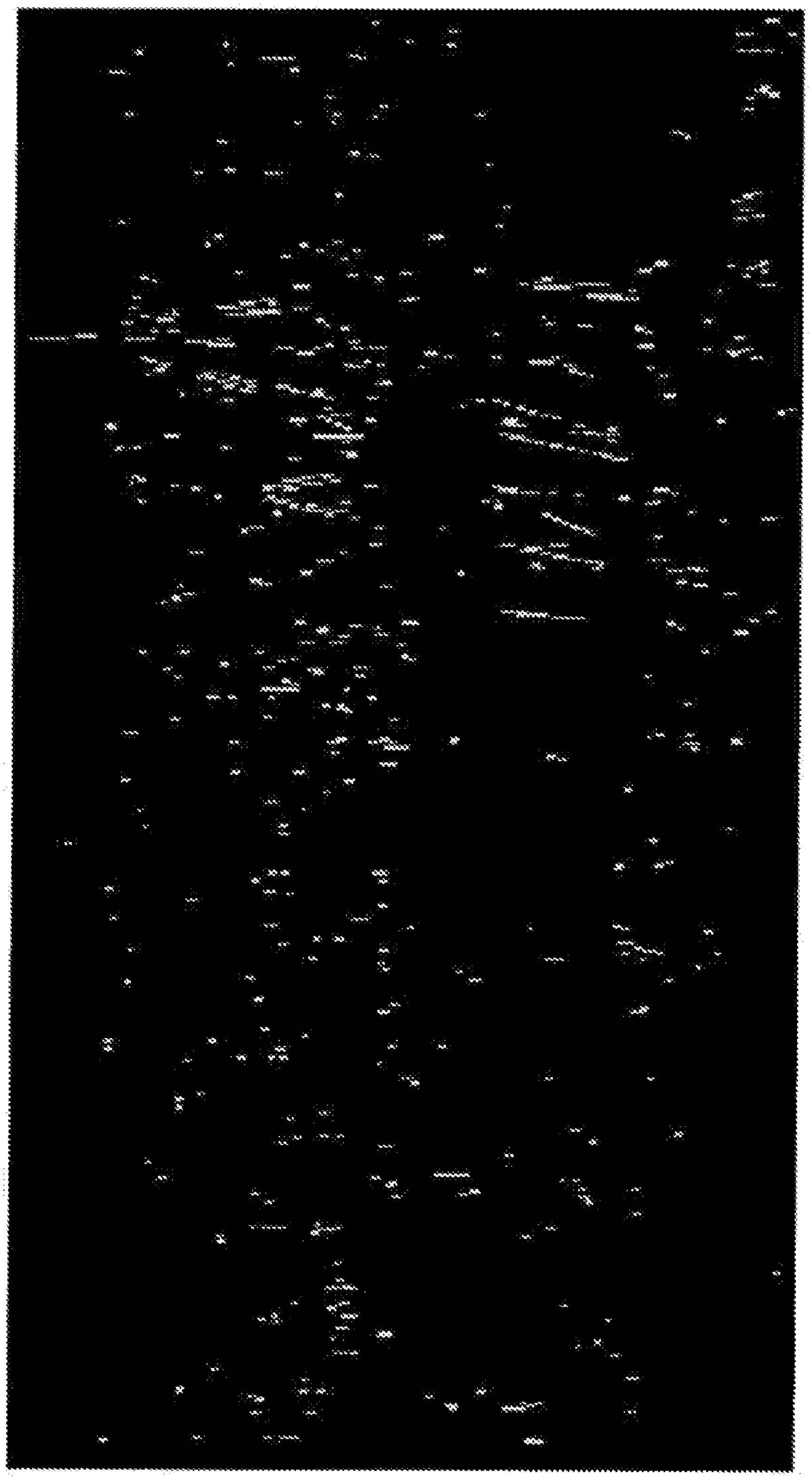
FIG. 53 is a diagram illustrating regions where continuity has been detected.

FIG. 53 is a diagram illustrating regions wherein continuousness has been detected by detecting continuousness of adjacent regions in the image shown in FIG. 52. In FIG. 53, the portions shown in white are regions where continuity has been detected. It can be understood that detection of continuousness further identifies the regions.

Figure 54:
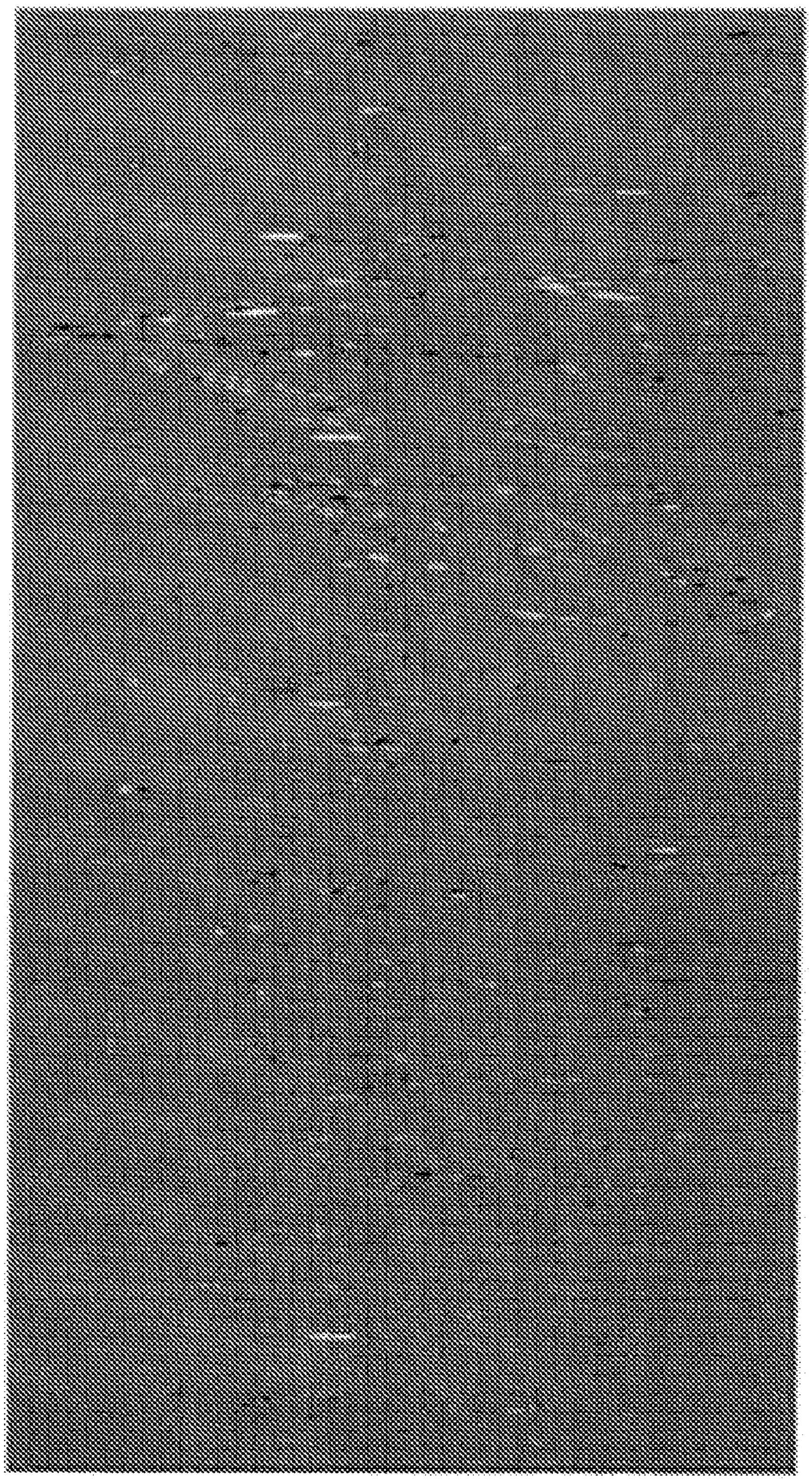
FIG. 54 is a diagram illustrating pixel values at regions where continuity has been detected.

FIG. 54 is a diagram illustrating the pixel values of the regions shown in FIG. 53, i.e., the pixel values of the regions where continuousness has been detected.

Thus, the data continuity detecting unit 101 is capable of detecting continuity contained in the data 3 which is the input image. That is to say, the data continuity detecting unit 101 can detect continuity of data included in the data 3 which has been generated by the actual world 1 image which is a fine line having been projected on the data 3. The data continuity detecting unit 101 detects, from the data 3, regions made up of pixels where the actual world 1 image which is a fine line has been projected.

Figure 55:
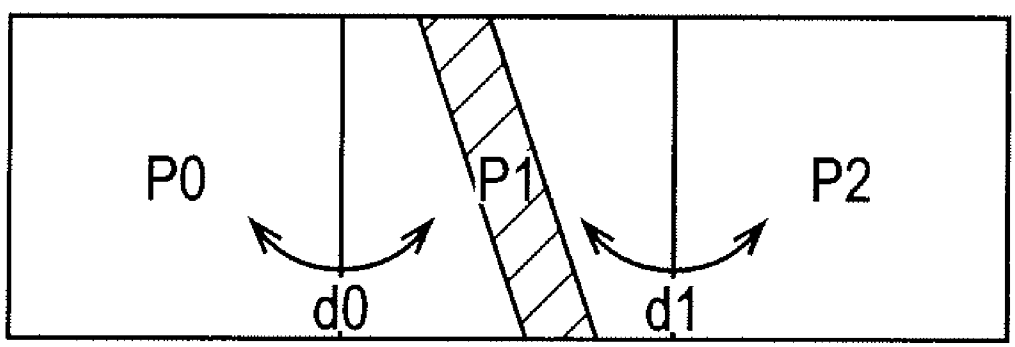
FIG. 55 is a diagram illustrating an example of other processing for detecting regions where an image of a fine line has been projected.

FIG. 55 is a diagram illustrating an example of other processing for detecting regions having continuity, where a fine line image has been projected, with the data continuity detecting unit 101.

As shown in FIG. 55, the data continuity detecting unit 101 calculates the absolute value of difference of pixel values for each pixel and adjacent pixels. The calculated absolute values of difference are placed corresponding to the pixels. For example, in a situation such as shown in FIG. 55 wherein there are pixels aligned which have respective pixel values of P0, P1, and P2, the data continuity detecting unit 101 calculates the difference d0=P0−P1 and the difference d1=P1−P2. Further, the data continuity detecting unit 101 calculates the absolute values of the difference d0 and the difference d1.

In the event that the non-continuity component contained in the pixel values P0, P1, and P2 are identical, only values corresponding to the component of the fine line are set to the difference d0 and the difference d1.

Accordingly, of the absolute values of the differences placed corresponding to the pixels, in the event that adjacent difference values are identical, the data continuity detecting unit 101 determines that the pixel corresponding to the absolute values of the two differences (the pixel between the two absolute values of difference) contains the component of the fine line.

The data continuity detecting unit 101 can also detect fine lines with a simple method such as this.

Figure 56:
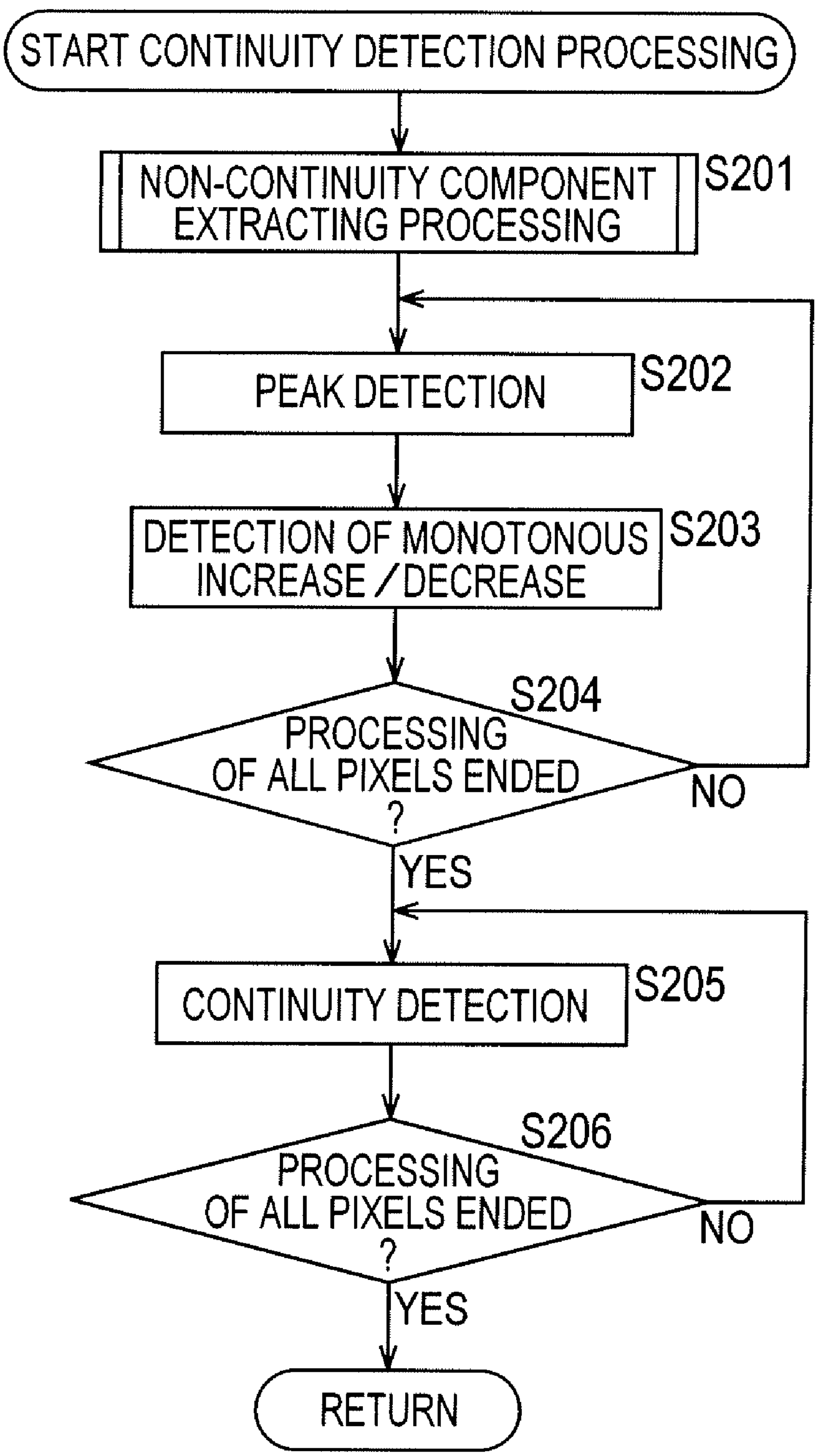
FIG. 56 is a flowchart for describing continuity detection processing.

FIG. 56 is a flowchart for describing continuity detection processing.

In step S201, the non-continuity component extracting unit 201 extracts non-continuity component, which is portions other than the portion where the fine line has been projected, from the input image. The non-continuity component extracting unit 201 supplies non-continuity component information indicating the extracted non-continuity component, along with the input image, to the peak detecting unit 202 and the monotonous increase/decrease detecting unit 203. Details of the processing for extracting the non-continuity component will be described later.

In step S202, the peak detecting unit 202 eliminates the non-continuity component from the input image, based on the non-continuity component information supplied from the non-continuity component extracting unit 201, so as to leave only pixels including the continuity component in the input image. Further, in step S202, the peak detecting unit 202 detects peaks.

That is to say, in the event of executing processing with the vertical direction of the screen as a reference, of the pixels containing the continuity component, the peak detecting unit 202 compares the pixel value of each pixel with the pixel values of the pixels above and below, and detects pixels having a greater pixel value than the pixel value of the pixel above and the pixel value of the pixel below, thereby detecting a peak. Also, in step S202, in the event of executing processing with the horizontal direction of the screen as a reference, of the pixels containing the continuity component, the peak detecting unit 202 compares the pixel value of each pixel with the pixel values of the pixels to the right side and left side, and detects pixels having a greater pixel value than the pixel value of the pixel to the right side and the pixel value of the pixel to the left side, thereby detecting a peak.

The peak detecting unit 202 supplies the peak information indicating the detected peaks to the monotonous increase/decrease detecting unit 203.

In step S203, the monotonous increase/decrease detecting unit 203 eliminates the non-continuity component from the input image, based on the non-continuity component information supplied from the non-continuity component extracting unit 201, so as to leave only pixels including the continuity component in the input image. Further, in step S203, the monotonous increase/decrease detecting unit 203 detects the region made up of pixels having data continuity, by detecting monotonous increase/decrease as to the peak, based on peak information indicating the position of the peak, supplied from the peak detecting unit 202.

In the event of executing processing with the vertical direction of the screen as a reference, the monotonous increase/decrease detecting unit 203 detects monotonous increase/decrease made up of one row of pixels aligned vertically where a single fine line image has been projected, based on the pixel value of the peak and the pixel values of the one row of pixels aligned vertically as to the peak, thereby detecting a region made up of pixels having data continuity. That is to say, in step S203, in the event of executing processing with the vertical direction of the screen as a reference, the monotonous increase/decrease detecting unit 203 obtains, with regard to a peak and a row of pixels aligned vertically as to the peak, the difference between the pixel value of each pixel and the pixel value of a pixel above or below, thereby detecting a pixel where the sign of the difference changes. Also, with regard to a peak and a row of pixels aligned vertically as to the peak, the monotonous increase/decrease detecting unit 203 compares the sign of the pixel value of each pixel with the sign of the pixel value of a pixel above or below, thereby detecting a pixel where the sign of the pixel value changes. Further, the monotonous increase/decrease detecting unit 203 compares pixel value of the peak and the pixel values of the pixels to the right side and to the left side of the peak with a threshold value, and detects a region made up of pixels wherein the pixel value of the peak exceeds the threshold value, and wherein the pixel values of the pixels to the right side and to the left side of the peak are within the threshold.

The monotonous increase/decrease detecting unit 203 takes a region detected in this way as a monotonous increase/decrease region, and supplies monotonous increase/decrease region information indicating the monotonous increase/decrease region to the continuousness detecting unit 204.

In the event of executing processing with the horizontal direction of the screen as a reference, the monotonous increase/decrease detecting unit 203 detects monotonous increase/decrease made up of one row of pixels aligned horizontally where a single fine line image has been projected, based on the pixel value of the peak and the pixel values of the one row of pixels aligned horizontally as to the peak, thereby detecting a region made up of pixels having data continuity. That is to say, in step S203, in the event of executing processing with the horizontal direction of the screen as a reference, the monotonous increase/decrease detecting unit 203 obtains, with regard to a peak and a row of pixels aligned horizontally as to the peak, the difference between the pixel value of each pixel and the pixel value of a pixel to the right side or to the left side, thereby detecting a pixel where the sign of the difference changes. Also, with regard to a peak and a row of pixels aligned horizontally as to the peak, the monotonous increase/decrease detecting unit 203 compares the sign of the pixel value of each pixel with the sign of the pixel value of a pixel to the right side or to the left side, thereby detecting a pixel where the sign of the pixel value changes. Further, the monotonous increase/decrease detecting unit 203 compares pixel value of the peak and the pixel values of the pixels to the upper side and to the lower side of the peak with a threshold value, and detects a region made up of pixels wherein the pixel value of the peak exceeds the threshold value, and wherein the pixel values of the pixels to the upper side and to the lower side of the peak are within the threshold.

The monotonous increase/decrease detecting unit 203 takes a region detected in this way as a monotonous increase/decrease region, and supplies monotonous increase/decrease region information indicating the monotonous increase/decrease region to the continuousness detecting unit 204.

In step S204, the monotonous increase/decrease detecting unit 203 determines whether or not processing of all pixels has ended. For example, the non-continuity component extracting unit 201 detects peaks for all pixels of a single screen (for example, frame, field, or the like) of the input image, and whether or not a monotonous increase/decrease region has been detected is determined.

In the event that determination is made in step S204 that processing of all pixels has not ended, i.e., that there are still pixels which have not been subjected to the processing of peak detection and detection of monotonous increase/decrease region, the flow returns to step S202, a pixel which has not yet been subjected to the processing of peak detection and detection of monotonous increase/decrease region is selected as an object of the processing, and the processing of peak detection and detection of monotonous increase/decrease region are repeated.

In the event that determination is made in step S204 that processing of all pixels has ended, in the event that peaks and monotonous increase/decrease regions have been detected with regard to all pixels, the flow proceeds to step S205, where the continuousness detecting unit 204 detects the continuousness of detected regions, based on the monotonous increase/decrease region information. For example, in the event that monotonous increase/decrease regions made up of one row of pixels aligned in the vertical direction of the screen, indicated by monotonous increase/decrease region information, include pixels adjacent in the horizontal direction, the continuousness detecting unit 204 determines that there is continuousness between the two monotonous increase/decrease regions, and in the event of not including pixels adjacent in the horizontal direction, determines that there is no continuousness between the two monotonous increase/decrease regions. For example, in the event that monotonous increase/decrease regions made up of one row of pixels aligned in the horizontal direction of the screen, indicated by monotonous increase/decrease region information, include pixels adjacent in the vertical direction, the continuousness detecting unit 204 determines that there is continuousness between the two monotonous increase/decrease regions, and in the event of not including pixels adjacent in the vertical direction, determines that there is no continuousness between the two monotonous increase/decrease regions.

The continuousness detecting unit 204 takes the detected continuous regions as continuity regions having data continuity, and outputs data continuity information indicating the peak position and continuity region. The data continuity information contains information indicating the connection of regions. The data continuity information output from the continuousness detecting unit 204 indicates the fine line region, which is the continuity region, made up of pixels where the actual world 1 fine line image has been projected.

In step S206, a continuity direction detecting unit 205 determines whether or not processing of all pixels has ended. That is to say, the continuity direction detecting unit 205 determines whether or not region continuation has been detected with regard to all pixels of a certain frame of the input image.

In the event that determination is made in step S206 that processing of all pixels has not yet ended, i.e., that there are still pixels which have not yet been taken as the object of detection of region continuation, the flow returns to step S205, a pixel which has not yet been subjected to the processing of detection of region continuity is selected, and the processing for detection of region continuity is repeated.

In the event that determination is made in step S206 that processing of all pixels has ended, i.e., that all pixels have been taken as the object of detection of region continuity, the processing ends.

Thus, the continuity contained in the data 3 which is the input image is detected. That is to say, continuity of data included in the data 3 which has been generated by the actual world 1 image which is a fine line having been projected on the data 3 is detected, and a region having data continuity, which is made up of pixels on which the actual world 1 image which is a fine line has been projected, is detected from the data 3.

Now, the data continuity detecting unit 101 shown in FIG. 41 can detect time-directional data continuity, based on the region having data continuity detected form the frame of the data 3.

Figure 57:
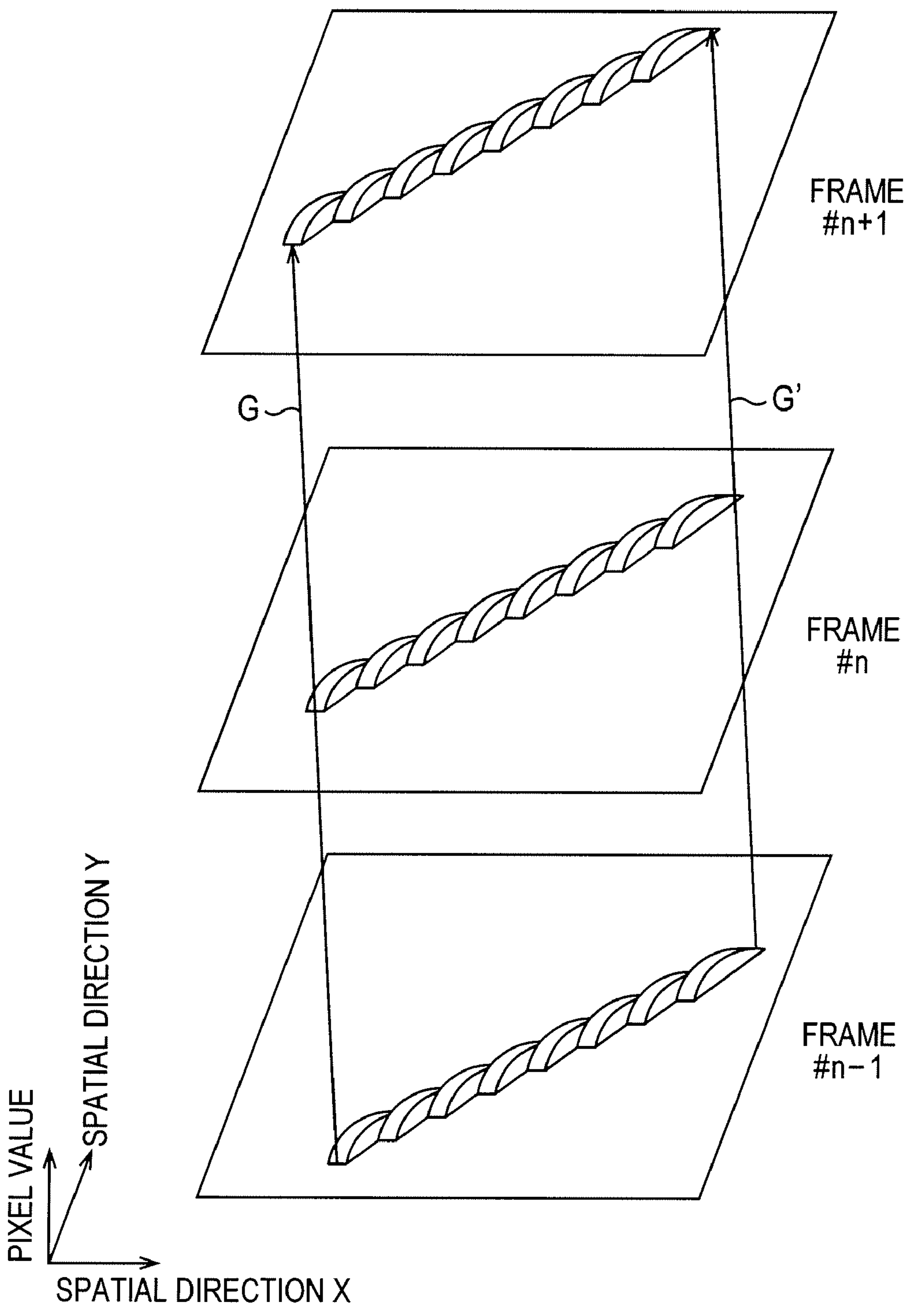
FIG. 57 is a diagram for describing processing for detecting continuity of data in the time direction.

For example, as shown in FIG. 57, the continuousness detecting unit 204 detects time-directional data continuity by connecting the edges of the region having detected data continuity in frame #n, the region having detected data continuity in frame #n−1, and the region having detected data continuity in frame #n+1.

The frame #n−1 is a frame preceding the frame #n time-wise, and the frame #n+1 is a frame following the frame #n time-wise. That is to say, the frame #n−1, the frame #n, and the frame #n+1, are displayed on the order of the frame #n−1, the frame #n, and the frame #n+1.

More specifically, in FIG. 57, G denotes a movement vector obtained by connecting the one edge of the region having detected data continuity in frame #n, the region having detected data continuity in frame #n−1, and the region having detected data continuity in frame #n+1, and G' denotes a movement vector obtained by connecting the other edges of the regions having detected data continuity. The movement vector G and the movement vector G' are an example of data continuity in the time direction.

Further, the data continuity detecting unit 101 of which the configuration is shown in FIG. 41 can output information indicating the length of the region having data continuity as data continuity information.

Figure 58:
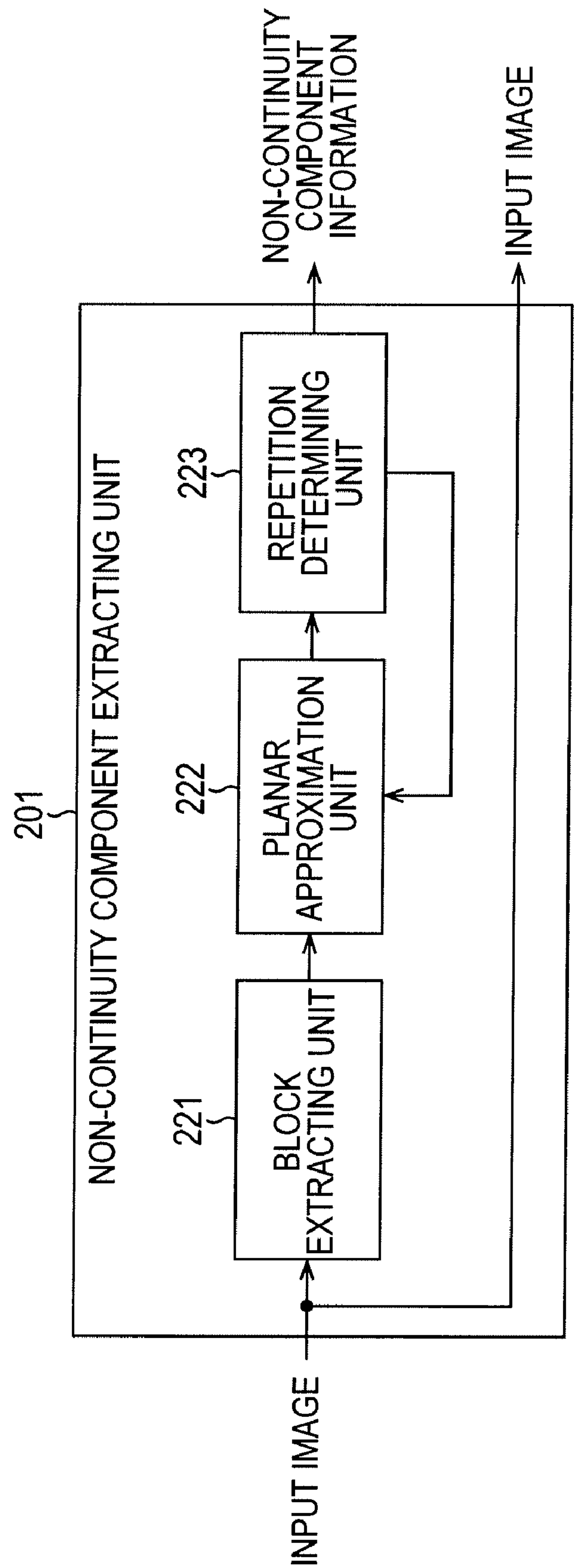
FIG. 58 is a block diagram illustrating the configuration of a non-continuity component extracting unit 201.

FIG. 58 is a block diagram illustrating the configuration of the non-continuity component extracting unit 201 which performs planar approximation of the non-continuity component which is the portion of the image data which does not have data continuity, and extracts the non-continuity component.

The non-continuity component extracting unit 201 of which the configuration is shown in FIG. 58 extracts blocks, which are made up of a predetermined number of pixels, from the input image, performs planar approximation of the blocks, so that the error between the block and a planar value is below a predetermined threshold value, thereby extracting the non-continuity component.

The input image is supplied to a block extracting unit 221, and is also output without change.

The block extracting unit 221 extracts blocks, which are made up of a predetermined number of pixels, from the input image. For example, the block extracting unit 221 extracts a block made up of 7×7 pixels, and supplies this to a planar approximation unit 222. For example, the block extracting unit 221 moves the pixel serving as the center of the block to be extracted in raster scan order, thereby sequentially extracting blocks from the input image.

The planar approximation unit 222 approximates the pixel values of a pixel contained in the block on a predetermined plane. For example, the planar approximation unit 222 approximates the pixel value of a pixel contained in the block on a plane expressed by Expression (24).

$$Z=ax+by+c \tag{24}$$

In Expression (24), x represents the position of the pixel in one direction on the screen (the spatial direction X), and y represents the position of the pixel in the other direction on the screen (the spatial direction Y). z represents the application value represented by the plane. a represents the gradient of the spatial direction X of the plane, and b represents the gradient of the spatial direction Y of the plane. In Expression (24), c represents the offset of the plane (intercept).

For example, the planar approximation unit 222 obtains the gradient a, gradient b, and offset c, by regression processing, thereby approximating the pixel values of the pixels contained in the block on a plane expressed by Expression (24). The planar approximation unit 222 obtains the gradient a, gradient b, and offset c, by regression processing including rejection, thereby approximating the pixel values of the pixels contained in the block on a plane expressed by Expression (24).

For example, the planar approximation unit 222 obtains the plane expressed by Expression (24) wherein the error is least as to the pixel values of the pixels of the block using the least-square method, thereby approximating the pixel values of the pixels contained in the block on the plane.

Note that while the planar approximation unit 222 has been described approximating the block on the plane expressed by Expression (24), this is not restricted to the plane expressed by Expression (24), rather, the block may be approximated on a plane represented with a function with a higher degree of freedom, for example, an n-order (wherein n is an arbitrary integer) polynomial.

A repetition determining unit 223 calculates the error between the approximation value represented by the plane upon which the pixel values of the block have been approximated, and the corresponding pixel values of the pixels of the block. Expression (25) is an expression which shows the error ei which is the difference between the approximation value represented by the plane upon which the pixel values of the block have been approximated, and the corresponding pixel values zi of the pixels of the block.

$$e_i = z_i - \hat{z} = z_i - (\hat{a}x_i + \hat{b}y_i + \hat{c}) \tag{25}$$

In Expression (25), z-hat (A symbol with ^ over z will be described as z-hat. The same description will be used in the present specification hereafter.) represents an approximation value expressed by the plane on which the pixel values of the block are approximated, a-hat represents the gradient of the spatial direction X of the plane on which the pixel values of the block are approximated, b-hat represents the gradient of the spatial direction Y of the plane on which the pixel values of the block are approximated, and c-hat represents the offset (intercept) of the plane on which the pixel values of the block are approximated.

The repetition determining unit 223 rejects the pixel regarding which the error ei between the approximation value and the corresponding pixel values of pixels of the block, shown in Expression (25). Thus, pixels where the fine line has been projected, i.e., pixels having continuity, are rejected. The repetition determining unit 223 supplies rejection information indicating the rejected pixels to the planar approximation unit 222.

Further, the repetition determining unit 223 calculates a standard error, and in the event that the standard error is equal to or greater than threshold value which has been set beforehand for determining ending of approximation, and half or more of the pixels of the pixels of a block have not been rejected, the repetition determining unit 223 causes the planar approximation unit 222 to repeat the processing of planar approximation on the pixels contained in the block, from which the rejected pixels have been eliminated.

Pixels having continuity are rejected, so approximating the pixels from which the rejected pixels have been eliminated on a plane means that the plane approximates the non-continuity component.

At the point that the standard error below the threshold value for determining ending of approximation, or half or more of the pixels of the pixels of a block have been rejected, the repetition determining unit 223 ends planar approximation.

With a block made up of 5×5 pixels, the standard error $e_s$ can be calculated with, for example, Expression (26).

$$\begin{aligned} e_s &= \sum (z_i - \hat{z})/(n-3) \\ &= \sum \{(z_i - (\hat{a}x_i + \hat{b}y_i + \hat{c})\}/(n-3) \end{aligned} \tag{26}$$

Here, n is the number of pixels.

Note that the repetition determining unit 223 is not restricted to standard error, and may be arranged to calculate the sum of the square of errors for all of the pixels contained in the block, and perform the following processing.

Figure 59:
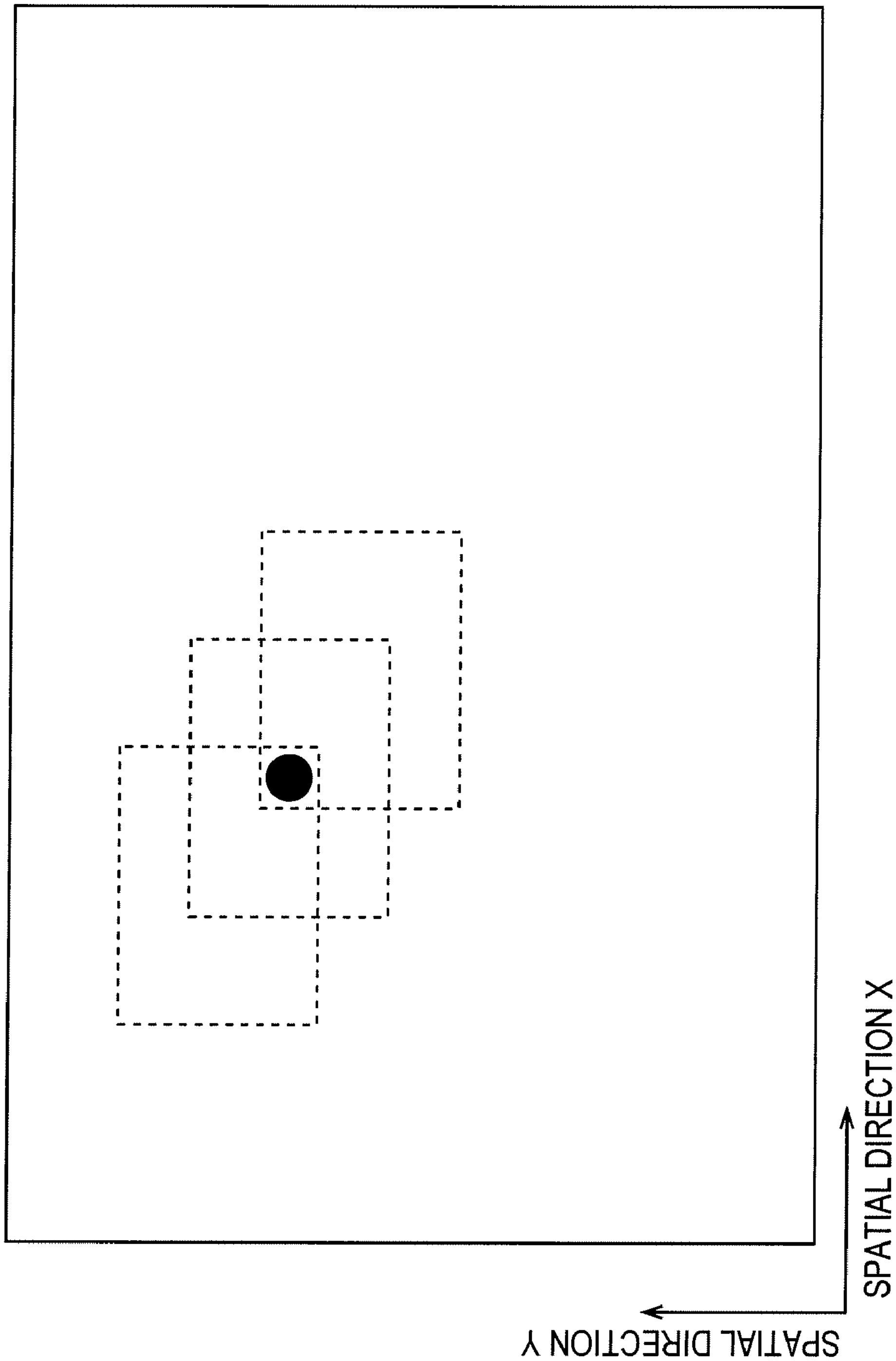
FIG. 59 is a diagram for describing the number of time of rejections.

Now, at the time of planar approximation of blocks shifted one pixel in the raster scan direction, a pixel having continuity, indicated by the black circle in the diagram, i.e., a pixel containing the fine line component, will be rejected multiple times, as shown in FIG. 59.

Upon completing planar approximation, the repetition determining unit 223 outputs information expressing the plane for approximating the pixel values of the block (the gradient and intercept of the plane of Expression 24)) as non-continuity information.

Note that an arrangement may be made wherein the repetition determining unit 223 compares the number of times of rejection per pixel with a preset threshold value, and takes a pixel which has been rejected a number of times equal to or greater than the threshold value as a pixel containing the continuity component, and output the information indicating the pixel including the continuity component as continuity component information. In this case, the peak detecting unit 202 through the continuity direction detecting unit 205 execute their respective processing on pixels containing continuity component, indicated by the continuity component information.

Examples of results of non-continuity component extracting processing will be described with reference to FIG. 60 through FIG. 67.

Figure 60:
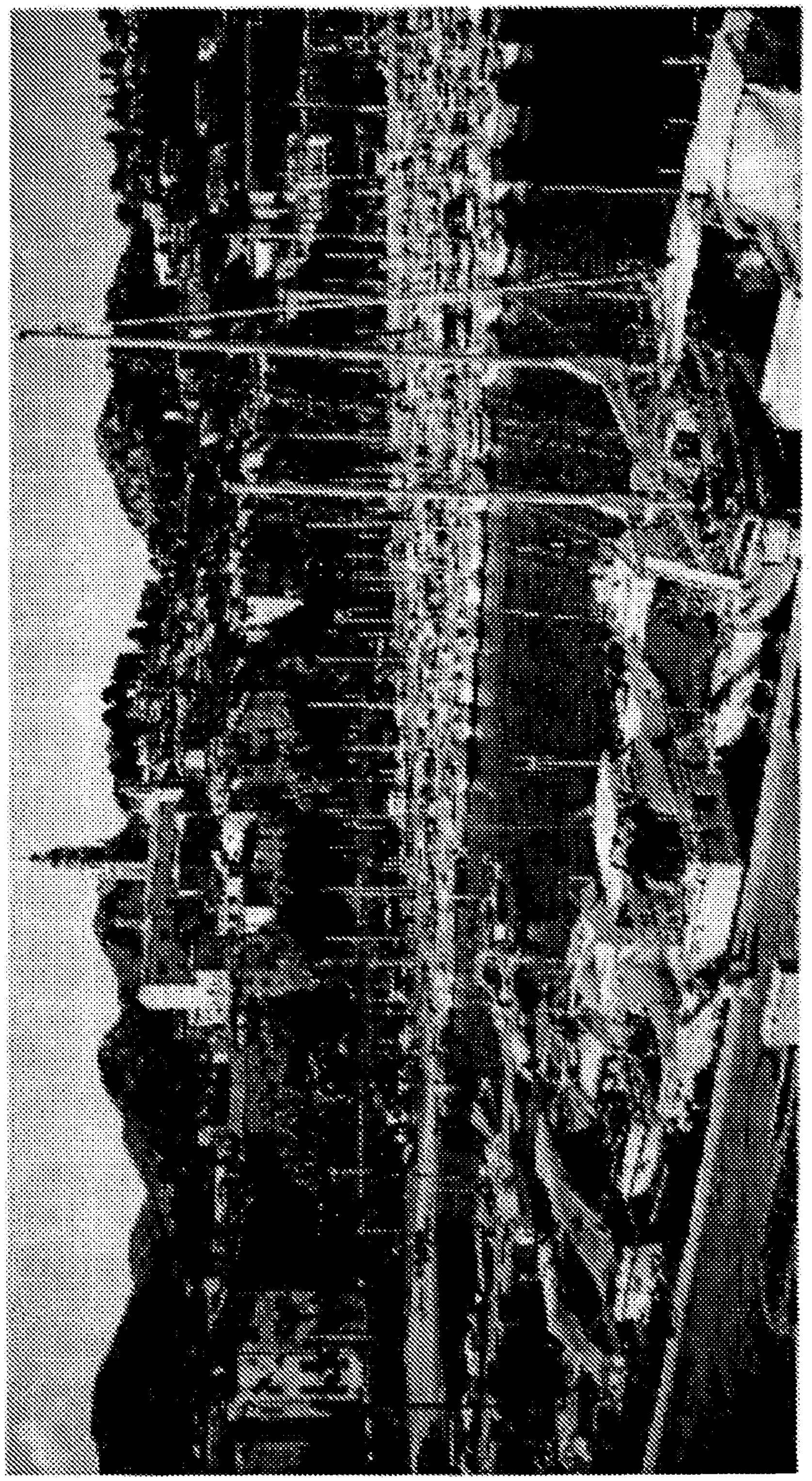
FIG. 60 is a diagram illustrating an example of an input image.

FIG. 60 is a diagram illustrating an example of an input image generated by the average value of the pixel values of 2×2 pixels in an original image containing fine lines having been generated as a pixel value.

Figure 61:
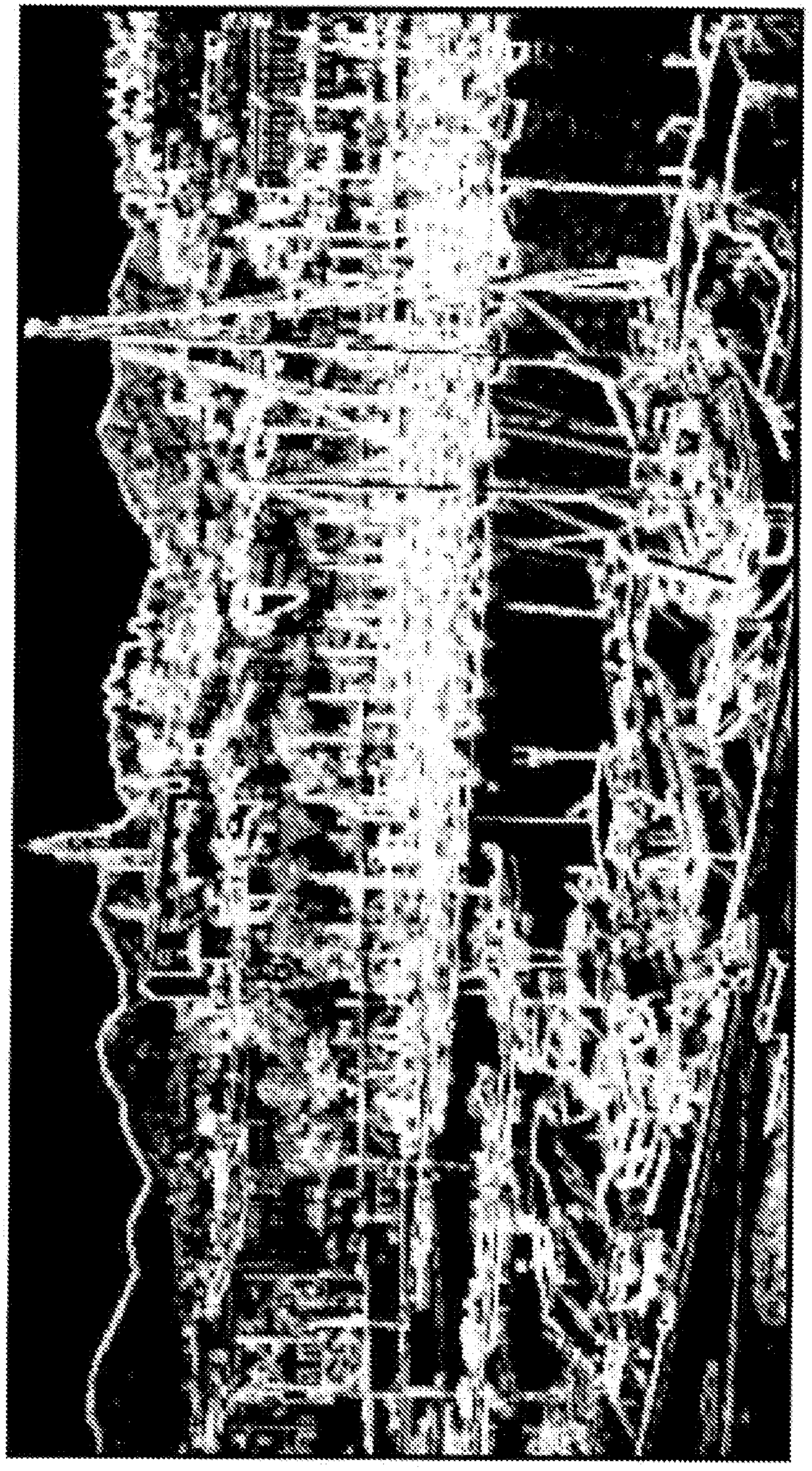
FIG. 61 is a diagram illustrating an image wherein standard error obtained as the result of planar approximation without rejection is taken as pixel values.

FIG. 61 is a diagram illustrating an image from the image shown in FIG. 60 wherein standard error obtained as the result of planar approximation without rejection is taken as the pixel value. In the example shown in FIG. 61, a block made up of 5×5 pixels as to a single pixel of interest was subjected to planar approximation. In FIG. 61, white pixels are pixel values which have greater pixel values, i.e., pixels having greater standard error, and black pixels are pixel values which have smaller pixel values, i.e., pixels having smaller standard error.

From FIG. 61, it can be confirmed that in the event that the standard error obtained as the result of planar approximation without rejection is taken as the pixel value, great values are obtained over a wide area at the perimeter of non-continuity portions.

In the examples shown in FIG. 62 through FIG. 67, a block made up of 7×7 pixels as to a single pixel of interest was subjected to planar approximation. In the event of planar approximation of a block made up of 7×7 pixels, one pixel is repeatedly included in 49 blocks, meaning that a pixel containing the continuity component is rejected as many as 49 times.

Figure 62:
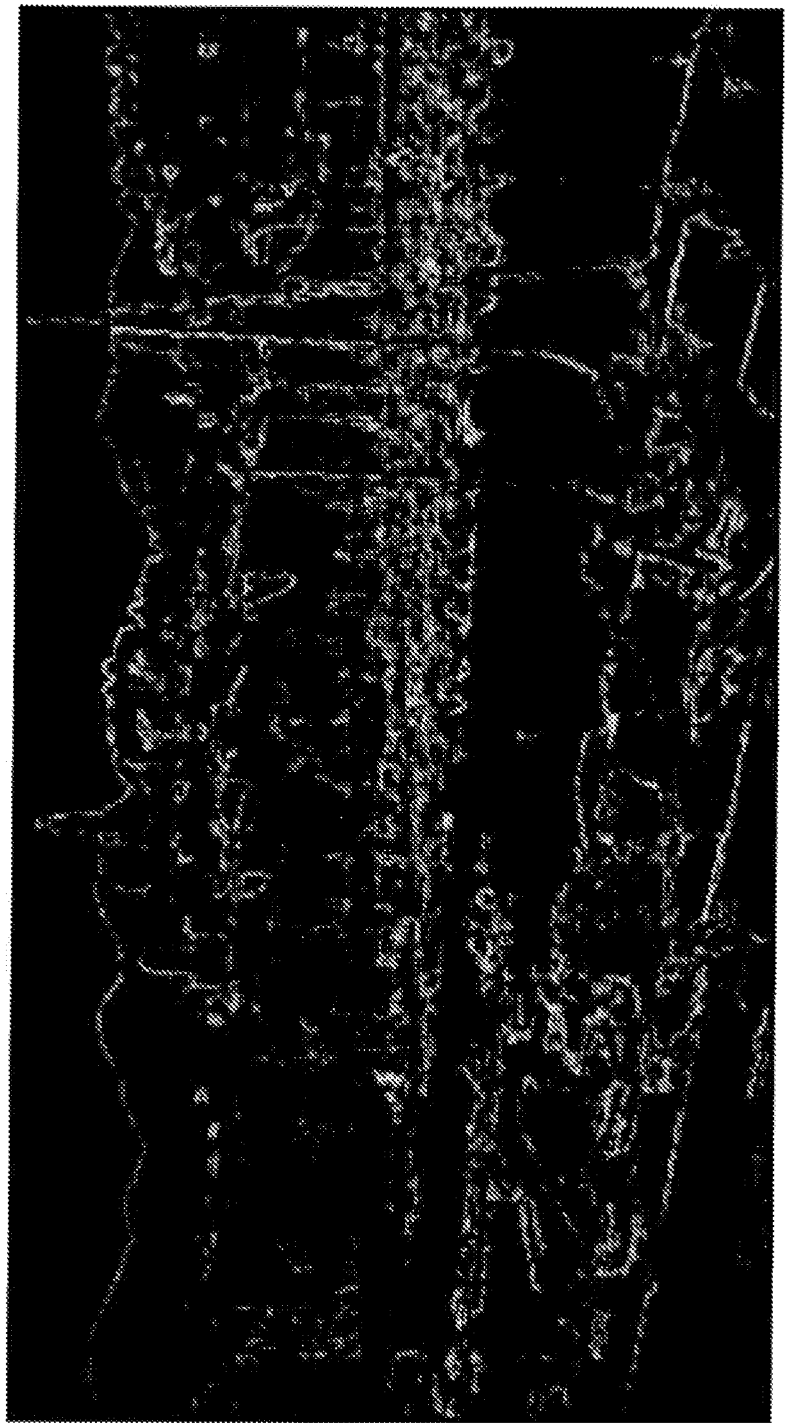
FIG. 62 is a diagram illustrating an image wherein standard error obtained as the result of planar approximation with rejection is taken as pixel values.

FIG. 62 is an image wherein standard error obtained by planar approximation with rejection of the image shown in FIG. 60 is taken as the pixel value.

In FIG. 62, white pixels are pixel values which have greater pixel values, i.e., pixels having greater standard error, and black pixels are pixel values which have smaller pixel values, i.e., pixels having smaller standard error. It can be understood that the standard error is smaller overall in the case of performing rejection, as compared with a case of not performing rejection.

Figure 63:
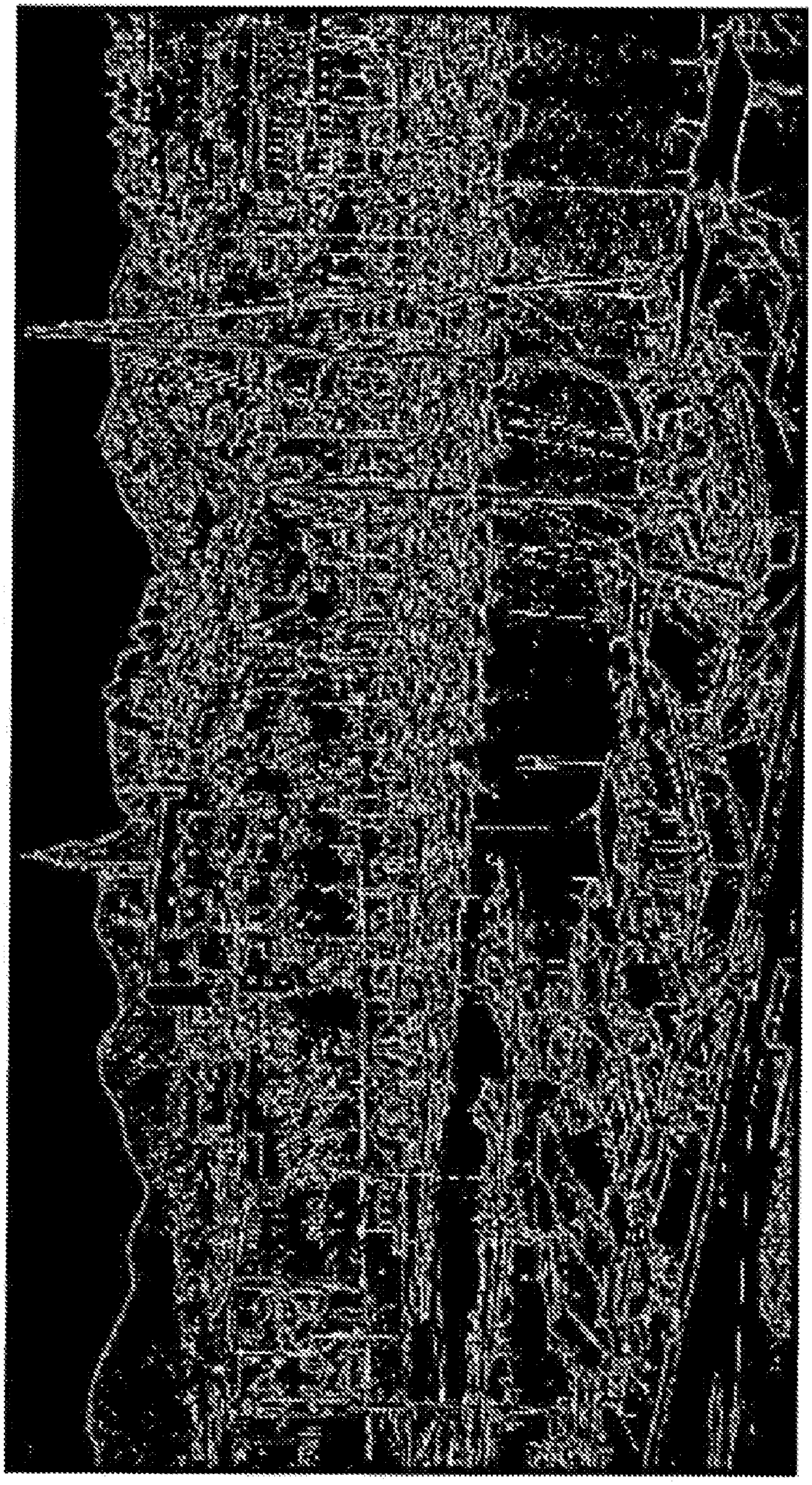
FIG. 63 is a diagram illustrating an image wherein the number of times of rejection is taken as pixel values.

FIG. 63 is an image wherein the number of times of rejection in planar approximation with rejection of the image shown in FIG. 60 is taken as the pixel value. In FIG. 63, white pixels are greater pixel values, i.e., pixels which have been rejected a greater number of times, and black pixels are smaller pixel values, i.e., pixels which have been rejected a fewer times.

From FIG. 63, it can be understood that pixels where the fine line images are projected have been discarded a greater number of times. An image for masking the non-continuity portions of the input image can be generated using the image wherein the number of times of rejection is taken as the pixel value.

Figure 64:
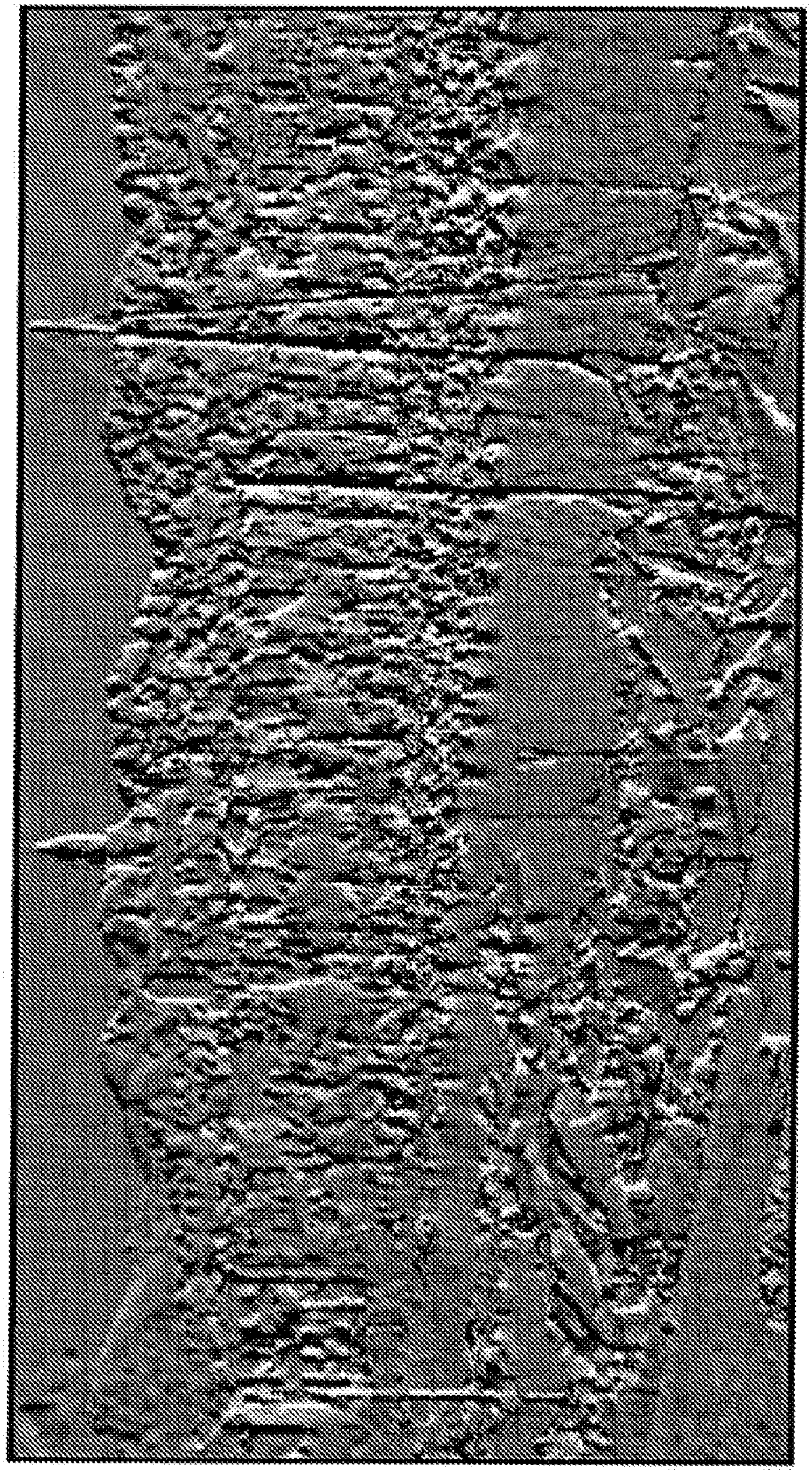
FIG. 64 is a diagram illustrating an image wherein the gradient of the spatial direction X of a plane is taken as pixel values.
Figure 65:
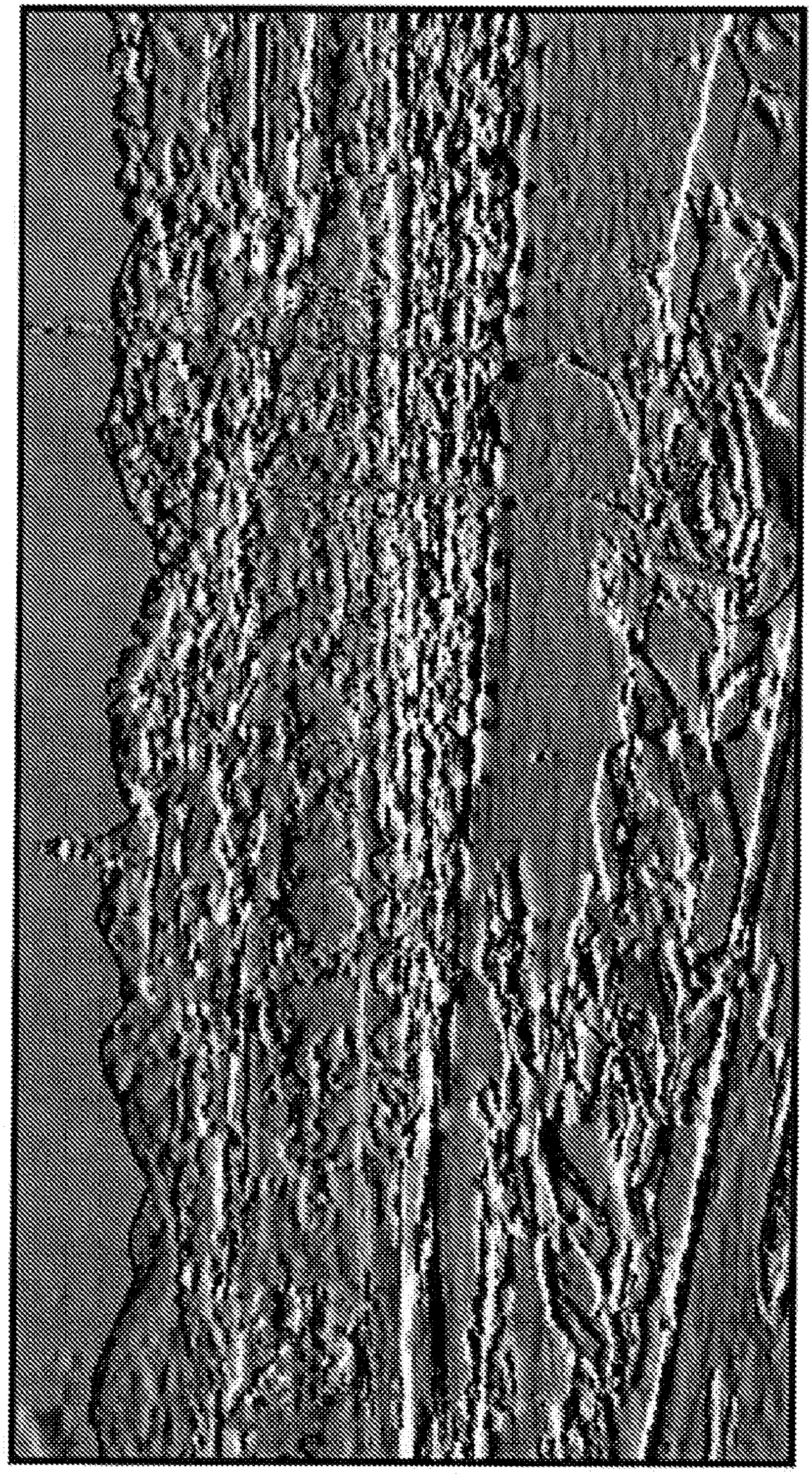
FIG. 65 is a diagram illustrating an image wherein the gradient of the spatial direction Y of a plane is taken as pixel values.

FIG. 64 is a diagram illustrating an image wherein the gradient of the spatial direction X of the plane for approximating the pixel values of the block is taken as the pixel value. FIG. 65 is a diagram illustrating an image wherein the gradient of the spatial direction Y of the plane for approximating the pixel values of the block is taken as the pixel value.

Figure 66:
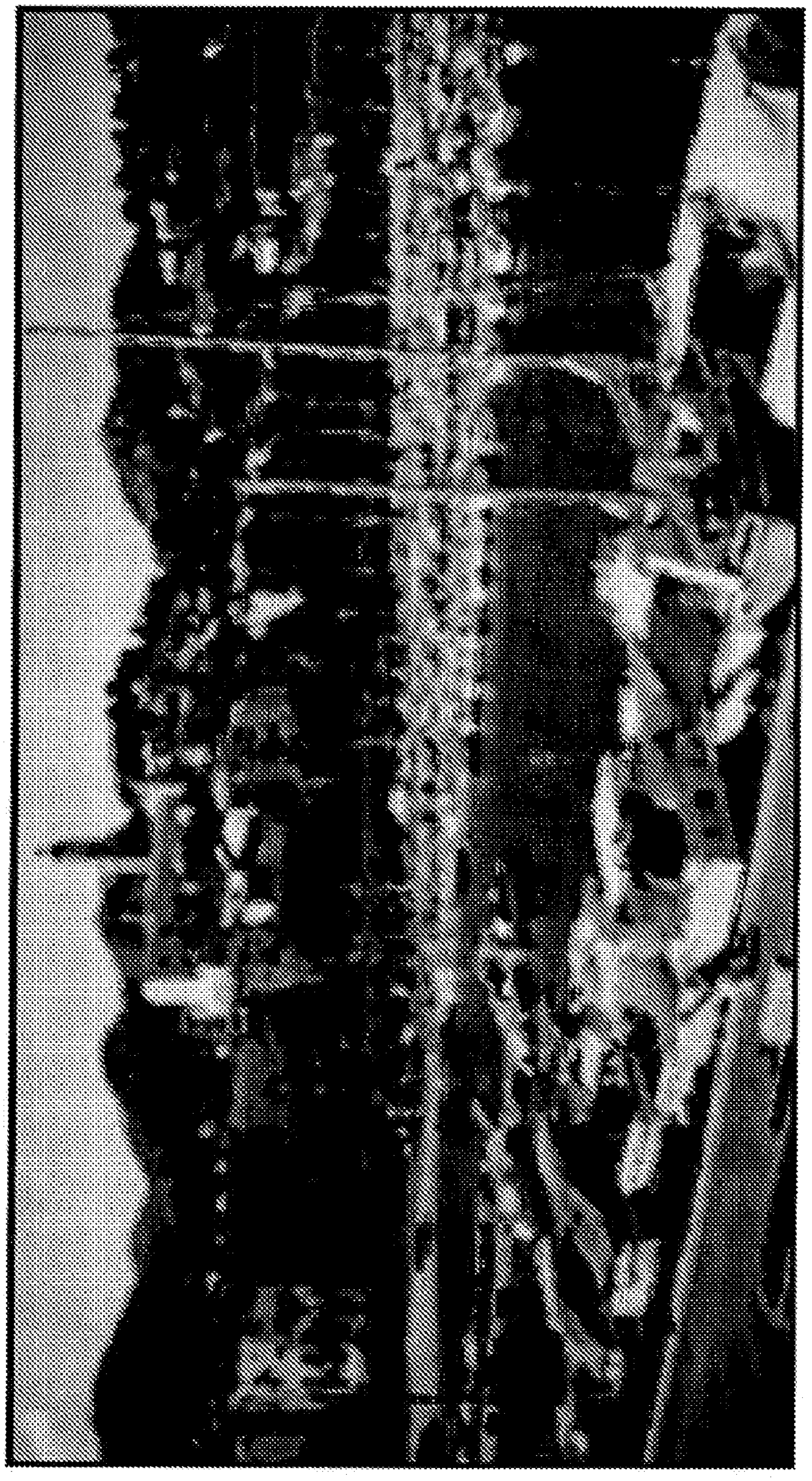
FIG. 66 is a diagram illustrating an image formed of planar approximation values.

FIG. 66 is a diagram illustrating an image formed of approximation values expressed by a plane for approximating the pixel values of the block. It can be understood that the fine lines have disappeared from the image shown in FIG. 66.

Figure 67:
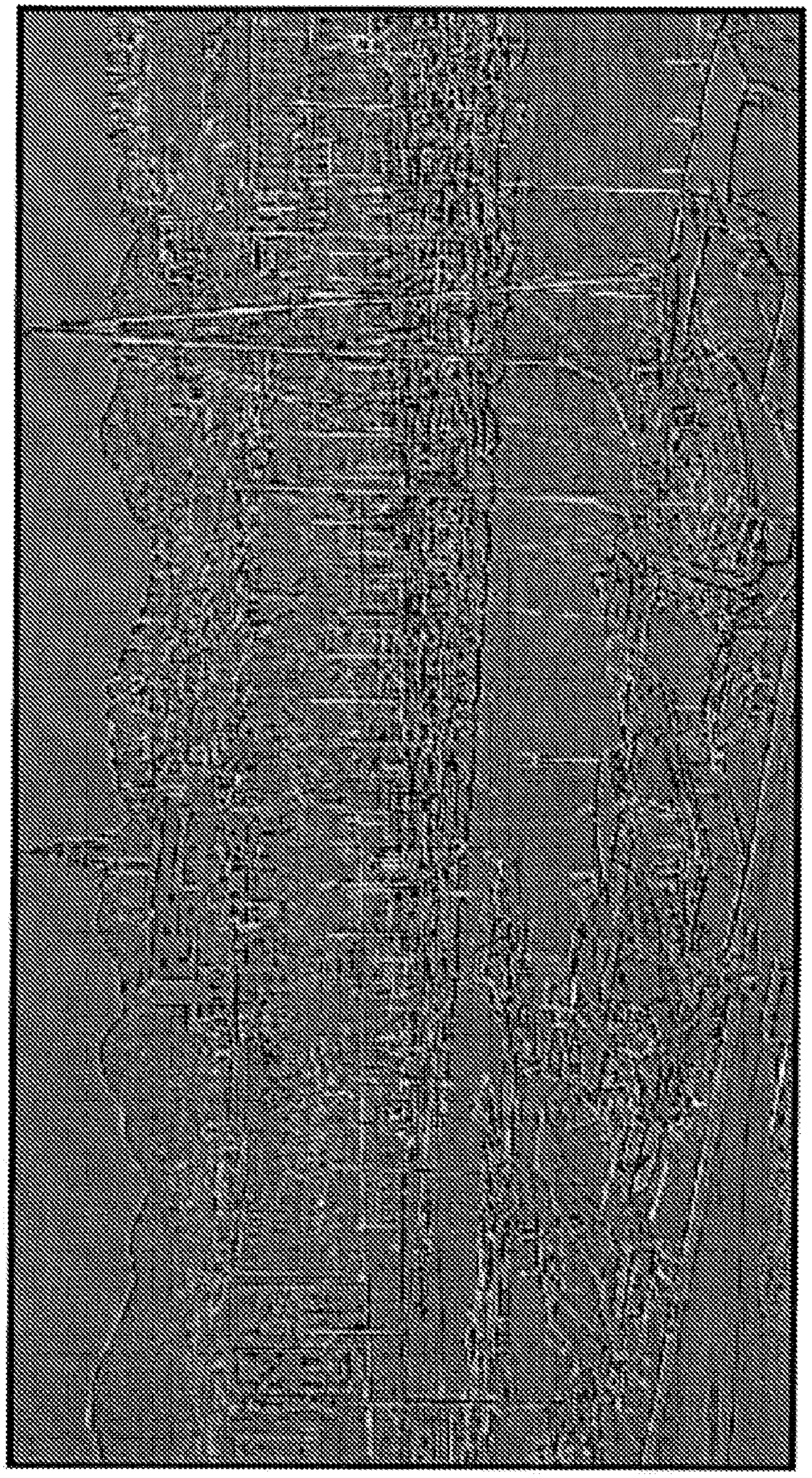
FIG. 67 is a diagram illustrating an image formed of the difference between planar approximation values and pixel values.

FIG. 67 is a diagram illustrating an image made up of the difference between the image shown in FIG. 60 generated by the average value of the block of 2×2 pixels in the original image being taken as the pixel value, and an image made up of approximate values expressed as a plane, shown in FIG. 66. The pixel values of the image shown in FIG. 67 have had the non-continuity component removed, so only the values where the image of the fine line has been projected remain. As can be understood from FIG. 67, with an image made up of the difference between the pixel value of the original image and approximation values expressed by a plane whereby approximation has been performed, the continuity component of the original image is extracted well.

The number of times of rejection, the gradient of the spatial direction X of the plane for approximating the pixel values of the pixel of the block, the gradient of the spatial direction Y of the plane for approximating the pixel values of the pixel of the block, approximation values expressed by the plane approximating the pixel values of the pixels of the block, and the error ei, can be used as features of the input image.

Figure 68:
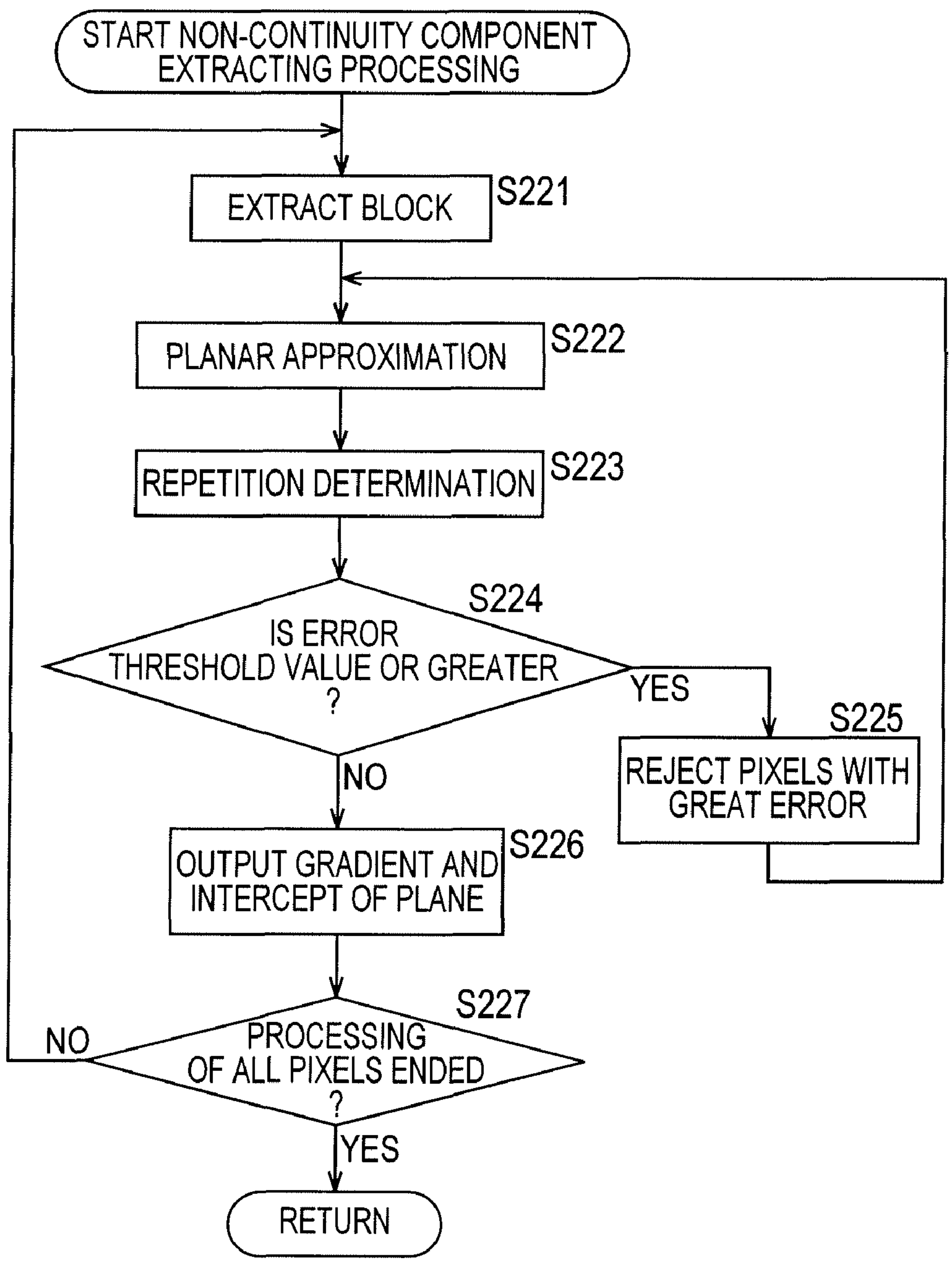
FIG. 68 is a flowchart describing the processing for extracting the non-continuity component.

FIG. 68 is a flowchart for describing the processing of extracting the non-continuity component with the non-continuity component extracting unit 201 of which the configuration is shown in FIG. 58.

In step S221, the block extracting unit 221 extracts a block made up of a predetermined number of pixels from the input image, and supplies the extracted block to the planar approximation unit 222. For example, the block extracting unit 221 selects one pixel of the pixels of the input pixel which have not been selected yet, and extracts a block made up of 7×7 pixels centered on the selected pixel. For example, the block extracting unit 221 can select pixels in raster scan order.

In step S222, the planar approximation unit 222 approximates the extracted block on a plane. The planar approximation unit 222 approximates the pixel values of the pixels of the extracted block on a plane by regression processing, for example. For example, the planar approximation unit 222 approximates the pixel values of the pixels of the extracted block excluding the rejected pixels on a plane, by regression processing. In step S223, the repetition determining unit 223 executes repetition determination. For example, repetition determination is performed by calculating the standard error from the pixel values of the pixels of the block and the planar approximation values, and counting the number of rejected pixels.

In step S224, the repetition determining unit 223 determines whether or not the standard error is equal to or above a threshold value, and in the event that determination is made that the standard error is equal to or above the threshold value, the flow proceeds to step S225.

Note that an arrangement may be made wherein the repetition determining unit 223 determines in step S224 whether or not half or more of the pixels of the block have been rejected, and whether or not the standard error is equal to or above the threshold value, and in the event that determination is made that half or more of the pixels of the block have not been rejected, and the standard error is equal to or above the threshold value, the flow proceeds to step S225.

In step S225, the repetition determining unit 223 calculates the error between the pixel value of each pixel of the block and the approximated planar approximation value, rejects the pixel with the greatest error, and notifies the planar approximation unit 222. The procedure returns to step S222, and the planar approximation processing and repetition determination processing is repeated with regard to the pixels of the block excluding the rejected pixel.

In step S225, in the event that a block which is shifted one pixel in the raster scan direction is extracted in the processing in step S221, the pixel including the fine line component (indicated by the black circle in the drawing) is rejected multiple times, as shown in FIG. 59.

In the event that determination is made in step S224 that the standard error is not equal to or greater than the threshold value, the block has been approximated on the plane, so the flow proceeds to step S226.

Note that an arrangement may be made wherein the repetition determining unit 223 determines in step S224 whether or not half or more of the pixels of the block have been rejected, and whether or not the standard error is equal to or above the threshold value, and in the event that determination is made that half or more of the pixels of the block have been rejected, or the standard error is not equal to or above the threshold value, the flow proceeds to step S225.

In step S226, the repetition determining unit 223 outputs the gradient and intercept of the plane for approximating the pixel values of the pixels of the block as non-continuity component information.

In step S227, the block extracting unit 221 determines whether or not processing of all pixels of one screen of the input image has ended, and in the event that determination is made that there are still pixels which have not yet been taken as the object of processing, the flow returns to step S221, a block is extracted from pixels not yet been subjected to the processing, and the above processing is repeated.

In the event that determination is made in step S227 that processing has ended for all pixels of one screen of the input image, the processing ends.

Thus, the non-continuity component extracting unit 201 of which the configuration is shown in FIG. 58 can extract the non-continuity component from the input image. The non-continuity component extracting unit 201 extracts the non-continuity component from the input image, so the peak detecting unit 202 and monotonous increase/decrease detecting unit 203 can obtain the difference between the input image and the non-continuity component extracted by the non-continuity component extracting unit 201, so as to execute the processing regarding the difference containing the continuity component.

Note that the standard error in the event that rejection is performed, the standard error in the event that rejection is not performed, the number of times of rejection of a pixel, the gradient of the spatial direction X of the plane (a-hat in Expression (24)), the gradient of the spatial direction Y of the plane (b-hat in Expression (24)), the level of planar transposing (c-hat in Expression (24)), and the difference between the pixel values of the input image and the approximation values represented by the plane, calculated in planar approximation processing, can be used as features.

Figure 69:
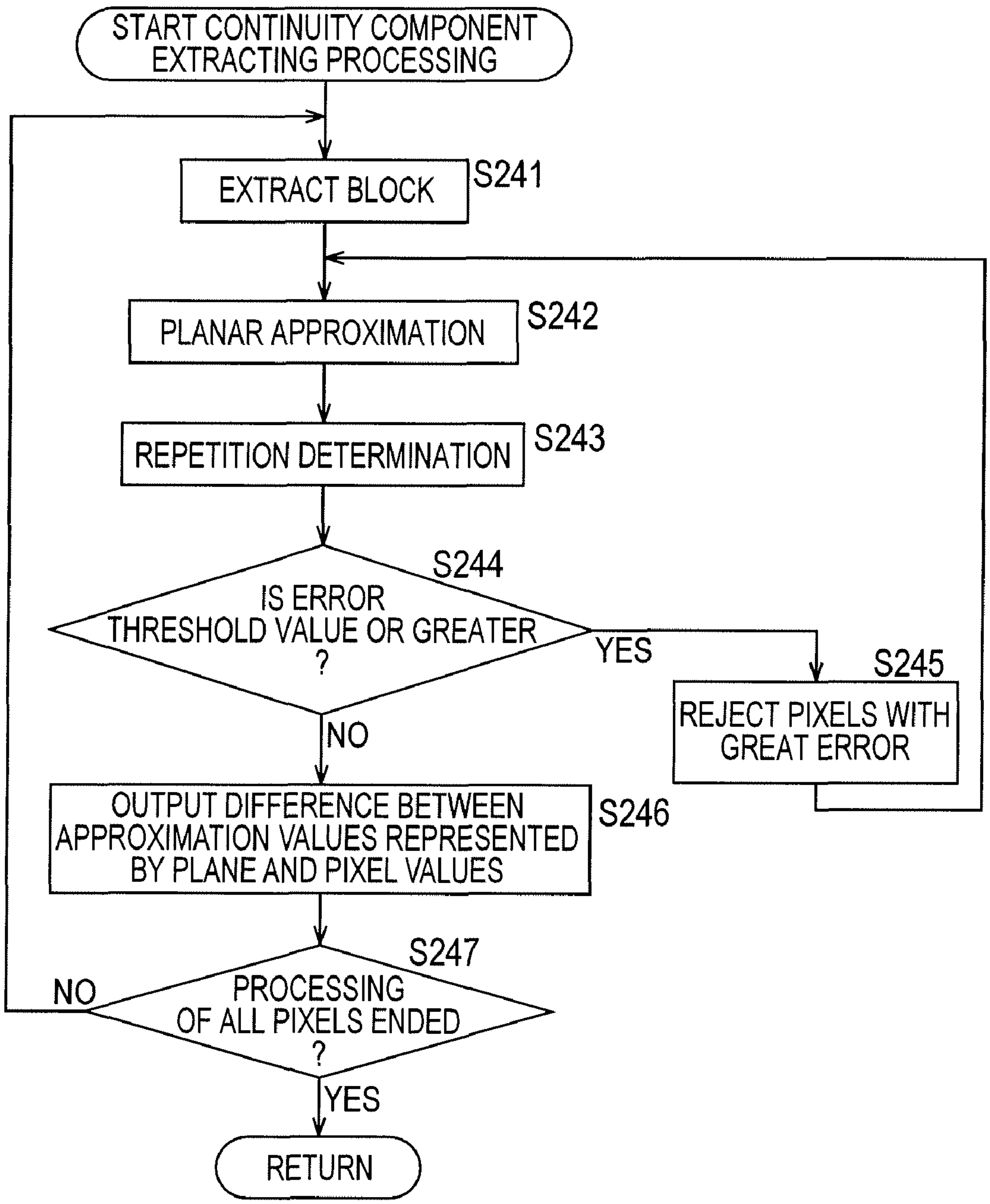
FIG. 69 is a flowchart describing the processing for extracting the continuity component.

FIG. 69 is a flowchart for describing processing for extracting the continuity component with the non-continuity component extracting unit 201 of which the configuration is shown in FIG. 58, instead of the processing for extracting the non-continuity component corresponding to step S201. The processing of step S241 through step S245 is the same as the processing of step S221 through step S225, so description thereof will be omitted.

In step S246, the repetition determining unit 223 outputs the difference between the approximation value represented by the plane and the pixel values of the input image, as the continuity component of the input image. That is to say, the repetition determining unit 223 outputs the difference between the planar approximation values and the true pixel values.

Note that the repetition determining unit 223 may be arranged to output the difference between the approximation value represented by the plane and the pixel values of the input image, regarding pixel values of pixels of which the difference is equal to or greater than a predetermined threshold value, as the continuity component of the input image.

The processing of step S247 is the same as the processing of step S227, and accordingly description thereof will be omitted.

The plane approximates the non-continuity component, so the non-continuity component extracting unit 201 can remove the non-continuity component from the input image by subtracting the approximation value represented by the plane for approximating pixel values, from the pixel values of each pixel in the input image. In this case, the peak detecting unit 202 through the continuousness detecting unit 204 can be made to process only the continuity component of the input image, i.e., the values where the fine line image has been projected, so the processing with the peak detecting unit 202 through the continuousness detecting unit 204 becomes easier.

Figure 70:
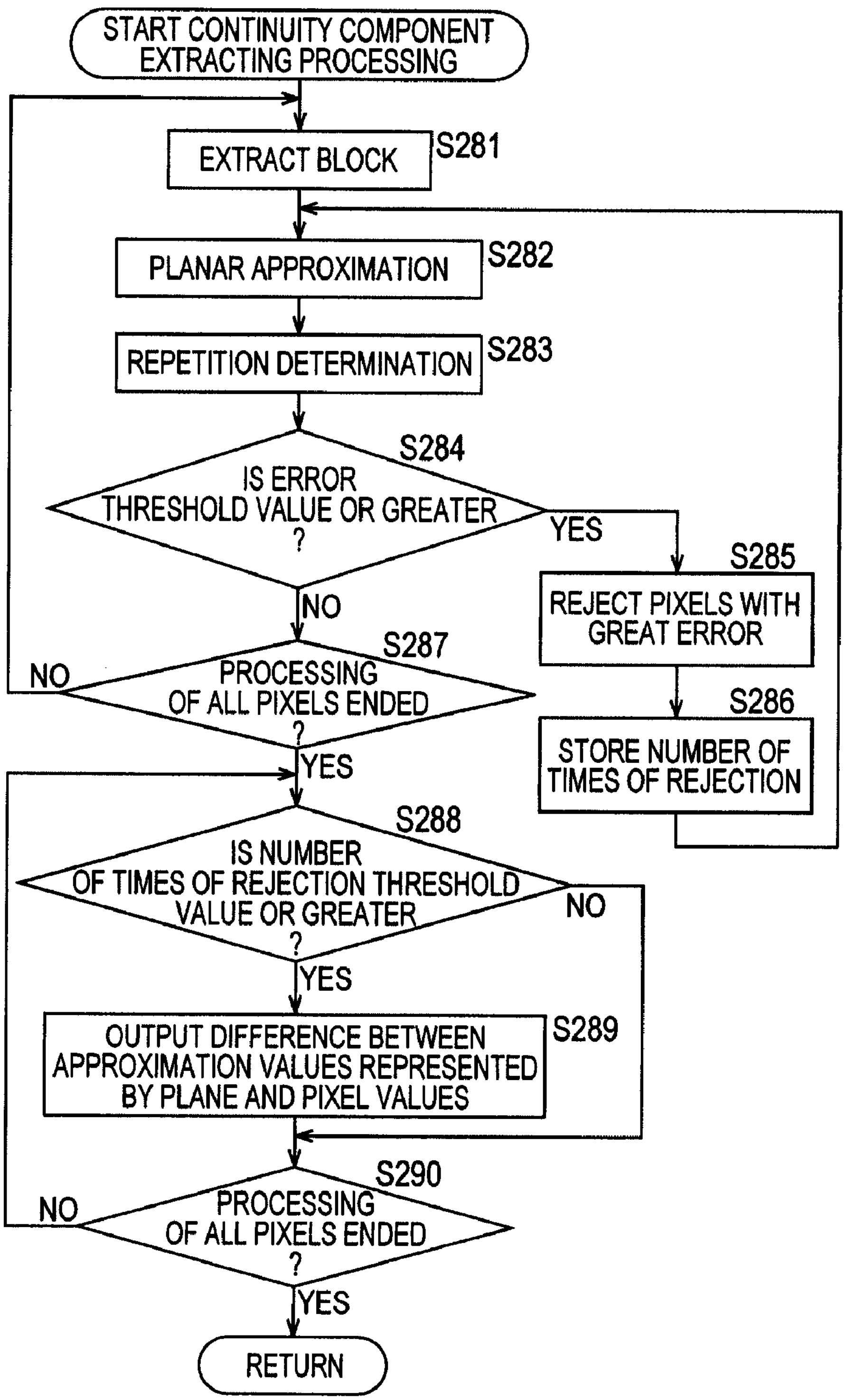
FIG. 70 is a flowchart describing other processing for extracting the continuity component.

FIG. 70 is a flowchart for describing other processing for extracting the continuity component with the non-continuity component extracting unit 201 of which the configuration is shown in FIG. 58, instead of the processing for extracting the non-continuity component corresponding to step S201. The processing of step S261 through step S265 is the same as the processing of step S221 through step S225, so description thereof will be omitted.

In step S266, the repetition determining unit 223 stores the number of times of rejection for each pixel, the flow returns to step S262, and the processing is repeated.

In step S264, in the event that determination is made that the standard error is not equal to or greater than the threshold value, the block has been approximated on the plane, so the flow proceeds to step S267, the repetition determining unit 223 determines whether or not processing of all pixels of one screen of the input image has ended, and in the event that determination is made that there are still pixels which have not yet been taken as the object of processing, the flow returns to step S261, with regard to a pixel which has not yet been subjected to the processing, a block is extracted, and the above processing is repeated.

In the event that determination is made in step S267 that processing has ended for all pixels of one screen of the input image, the flow proceeds to step S268, the repetition determining unit 223 selects a pixel which has not yet been selected, and determines whether or not the number of times of rejection of the selected pixel is equal to or greater than a threshold value. For example, the repetition determining unit 223 determines in step S268 whether or not the number of times of rejection of the selected pixel is equal to or greater than a threshold value stored beforehand.

In the event that determination is made in step S268 that the number of times of rejection of the selected pixel is equal to or greater than the threshold value, the selected pixel contains the continuity component, so the flow proceeds to step S269, where the repetition determining unit 223 outputs the pixel value of the selected pixel (the pixel value in the input image) as the continuity component of the input image, and the flow proceeds to step S270.

In the event that determination is made in step S268 that the number of times of rejection of the selected pixel is not equal to or greater than the threshold value, the selected pixel does not contain the continuity component, so the processing in step S269 is skipped, and the procedure proceeds to step S270. That is to say, the pixel value of a pixel regarding which determination has been made that the number of times of rejection is not equal to or greater than the threshold value is not output.

Note that an arrangement may be made wherein the repetition determining unit 223 outputs a pixel value set to 0 for pixels regarding which determination has been made that the number of times of rejection is not equal to or greater than the threshold value.

In step S270, the repetition determining unit 223 determines whether or not processing of all pixels of one screen of the input image has ended to determine whether or not the number of times of rejection is equal to or greater than the threshold value, and in the event that determination is made that processing has not ended for all pixels, this means that there are still pixels which have not yet been taken as the object of processing, so the flow returns to step S268, a pixel which has not yet been subjected to the processing is selected, and the above processing is repeated.

In the event that determination is made in step S270 that processing has ended for all pixels of one screen of the input image, the processing ends.

Thus, of the pixels of the input image, the non-continuity component extracting unit 201 can output the pixel values of pixels containing the continuity component, as continuity component information. That is to say, of the pixels of the input image, the non-continuity component extracting unit 201 can output the pixel values of pixels containing the component of the fine line image.

Figure 71:
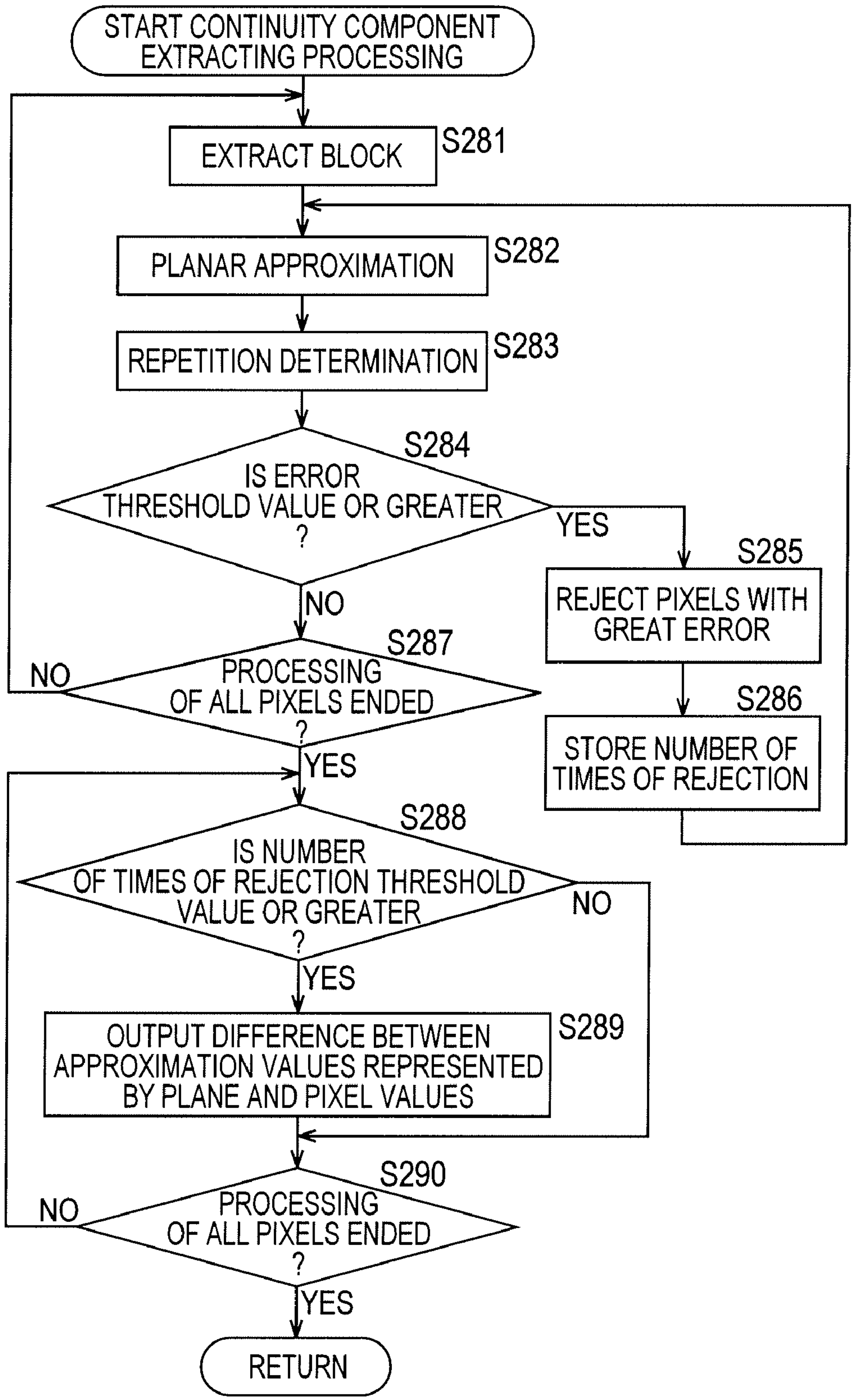
FIG. 71 is a flowchart describing still other processing for extracting the continuity component.

FIG. 71 is a flowchart for describing yet other processing for extracting the continuity component with the non-continuity component extracting unit 201 of which the configuration is shown in FIG. 58, instead of the processing for extracting the non-continuity component corresponding to step S201. The processing of step S281 through step S288 is the same as the processing of step S261 through step S268, so description thereof will be omitted.

In step S289, the repetition determining unit 223 outputs the difference between the approximation value represented by the plane, and the pixel value of a selected pixel, as the continuity component of the input image. That is to say, the repetition determining unit 223 outputs an image wherein the non-continuity component has been removed from the input image, as the continuity information.

The processing of step S290 is the same as the processing of step S270, and accordingly description thereof will be omitted.

Thus, the non-continuity component extracting unit 201 can output an image wherein the non-continuity component has been removed from the input image as the continuity information.

As described above, in a case wherein real world light signals are projected, a non-continuous portion of pixel values of multiple pixels of first image data wherein a part of the continuity of the real world light signals has been lost is detected, data continuity is detected from the detected non-continuous portions, a model (function) is generated for approximating the light signals by estimating the continuity of the real world light signals based on the detected data continuity, and second image data is generated based on the generated function, processing results which are more accurate and have higher precision as to the event in the real world can be obtained.

Figure 72:
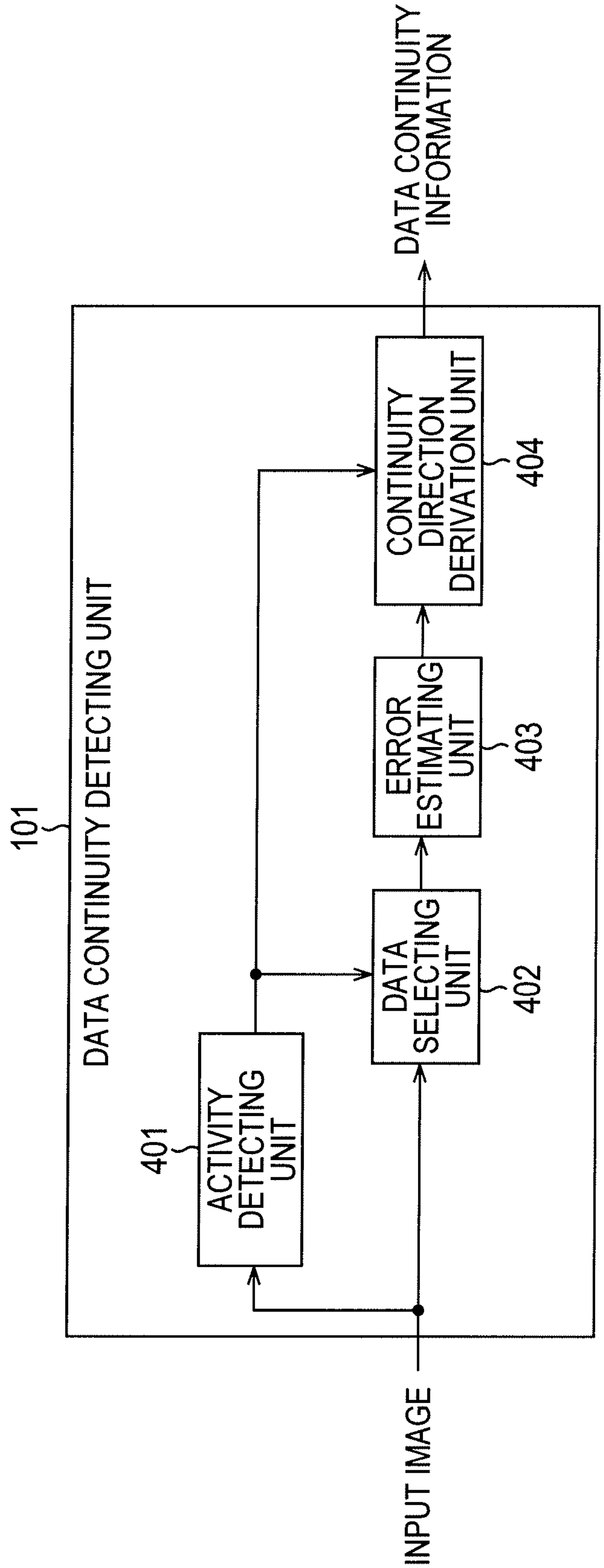
FIG. 72 is a block diagram illustrating another configuration of a data continuity detecting unit 101.

FIG. 72 is a block diagram illustrating another configuration of the data continuity detecting unit 101.

With the data continuity detecting unit 101 of which the configuration is shown in FIG. 72, change in the pixel value of the pixel of interest which is a pixel of interest in the spatial direction of the input image, i.e. activity in the spatial direction of the input image, is detected, multiple sets of pixels made up of a predetermined number of pixels in one row in the vertical direction or one row in the horizontal direction are extracted for each angle based on the pixel of interest and a reference axis according to the detected activity, the correlation of the extracted pixel sets is detected, and the angle of data continuity based on the reference axis in the input image is detected based on the correlation.

The angle of data continuity means an angle assumed by the reference axis, and the direction of a predetermined dimension where constant characteristics repeatedly appear in the data 3. Constant characteristics repeatedly appearing means a case wherein, for example, the change in value as to the change in position in the data 3, i.e., the cross-sectional shape, is the same, and so forth.

The reference axis may be, for example, an axis indicating the spatial direction X (the horizontal direction of the screen), an axis indicating the spatial direction Y (the vertical direction of the screen), and so forth.

The input image is supplied to an activity detecting unit 401 and data selecting unit 402.

The activity detecting unit 401 detects change in the pixel values as to the spatial direction of the input image, i.e., activity in the spatial direction, and supplies the activity information which indicates the detected results to the data selecting unit 402 and a continuity direction derivation unit 404.

For example, the activity detecting unit 401 detects the change of a pixel value as to the horizontal direction of the screen, and the change of a pixel value as to the vertical direction of the screen, and compares the detected change of the pixel value in the horizontal direction and the change of the pixel value in the vertical direction, thereby detecting whether the change of the pixel value in the horizontal direction is greater as compared with the change of the pixel value in the vertical direction, or whether the change of the pixel value in the vertical direction is greater as compared with the change of the pixel value in the horizontal direction.

The activity detecting unit 401 supplies to the data selecting unit 402 and the continuity direction derivation unit 404 activity information, which is the detection results, indicating that the change of the pixel value in the horizontal direction is greater as compared with the change of the pixel value in the vertical direction, or indicating that the change of the pixel value in the vertical direction is greater as compared with the change of the pixel value in the horizontal direction.

Figure 73:
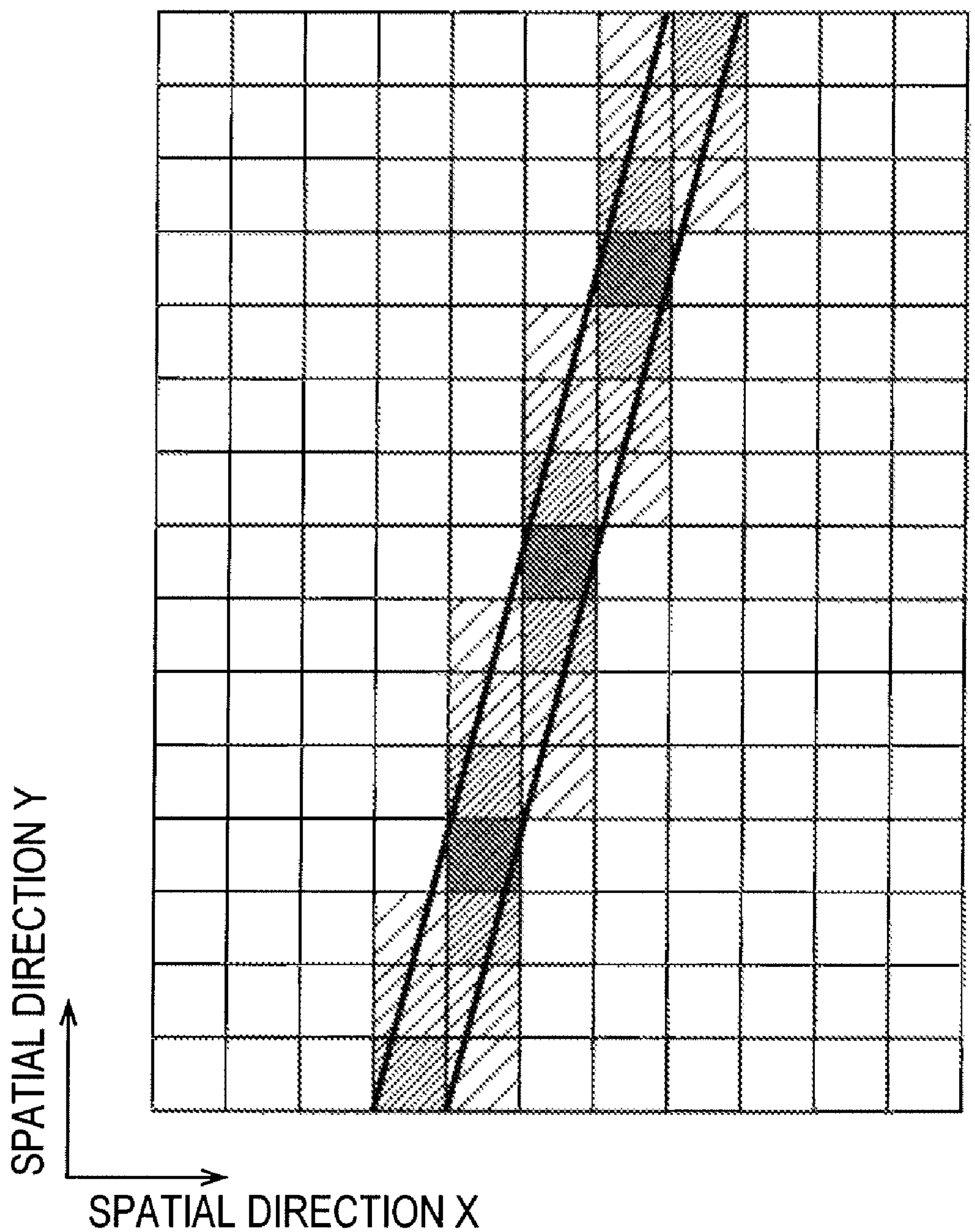
FIG. 73 is a diagram for describing the activity on an input image having data continuity.

In the event that the change of the pixel value in the horizontal direction is greater as compared with the change of the pixel value in the vertical direction, arc shapes (half-disc shapes) or pawl shapes are formed on one row in the vertical direction, as indicated by FIG. 73 for example, and the arc shapes or pawl shapes are formed repetitively more in the vertical direction. That is to say, in the event that the change of the pixel value in the horizontal direction is greater as compared with the change of the pixel value in the vertical direction, with the reference axis as the axis representing the spatial direction X, the angle of the data continuity based on the reference axis in the input image is a value of any from 45 degrees to 90 degrees.

In the event that the change of the pixel value in the vertical direction is greater as compared with the change of the pixel value in the horizontal direction, arc shapes or pawl shapes are formed on one row in the vertical direction, for example, and the arc shapes or pawl shapes are formed repetitively more in the horizontal direction. That is to say, in the event that the change of the pixel value in the vertical direction is greater as compared with the change of the pixel value in the horizontal direction, with the reference axis as the axis representing the spatial direction X, the angle of the data continuity based on the reference axis in the input image is a value of any from 0 degrees to 45 degrees.

Figure 74:
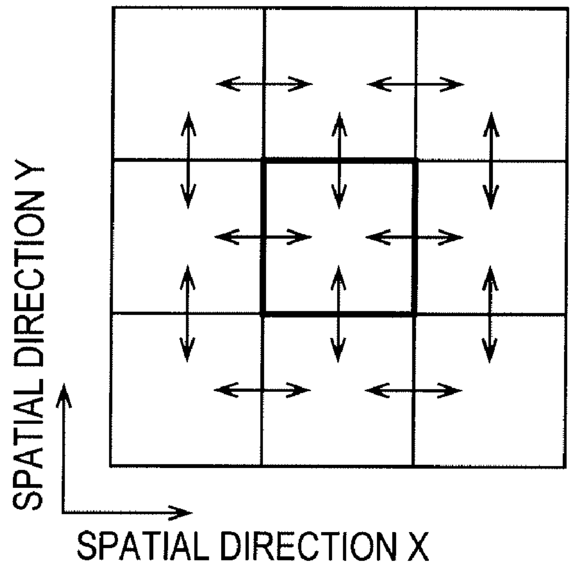
FIG. 74 is a diagram for describing a block for detecting activity.

For example, the activity detecting unit 401 extracts from the input image a block made up of the 9 pixels, 3×3 centered on the pixel of interest, as shown in FIG. 74. The activity detecting unit 401 calculates the sum of differences of the pixels values regarding the pixels vertically adjacent, and the sum of differences of the pixels values regarding the pixels horizontally adjacent. The sum of differences $h_{diff}$ of the pixels values regarding the pixels horizontally adjacent can be obtained with Expression (27).

$$h_{diff}=\Sigma(P_{i+1,j}-P_{i,j}) \tag{27}$$

In the same way, the sum of differences $v_{diff}$ of the pixels values regarding the pixels vertically adjacent can be obtained with Expression (28).

$$v_{diff}=\Sigma(P_{i,j+1}-P_{i,j}) \tag{28}$$

In Expression (27) and Expression (28), P represents the pixel value, i represents the position of the pixel in the horizontal direction, and j represents the position of the pixel in the vertical direction.

An arrangement may be made wherein the activity detecting unit 401 compares the calculated sum of differences $h_{diff}$ of the pixels values regarding the pixels horizontally adjacent with the sum of differences $v_{diff}$ of the pixels values regarding the pixels vertically adjacent, so as to determine the range of the angle of the data continuity based on the reference axis in the input image. That is to say, in this case, the activity detecting unit 401 determines whether a shape indicated by change in the pixel value as to the position in the spatial direction is formed repeatedly in the horizontal direction, or formed repeatedly in the vertical direction.

For example, change in pixel values in the horizontal direction with regard to an arc formed on pixels in one horizontal row is greater than the change of pixel values in the vertical direction, change in pixel values in the vertical direction with regard to an arc formed on pixels in one horizontal row is greater than the change of pixel values in the horizontal direction, and it can be said that the direction of data continuity, i.e., the change in the direction of the predetermined dimension of a constant feature which the input image that is the data 3 has is smaller in comparison with the change in the orthogonal direction too the data continuity. In other words, the difference of the direction orthogonal to the direction of data continuity (hereafter also referred to as non-continuity direction) is greater as compared to the difference in the direction of data continuity.

Figure 75:
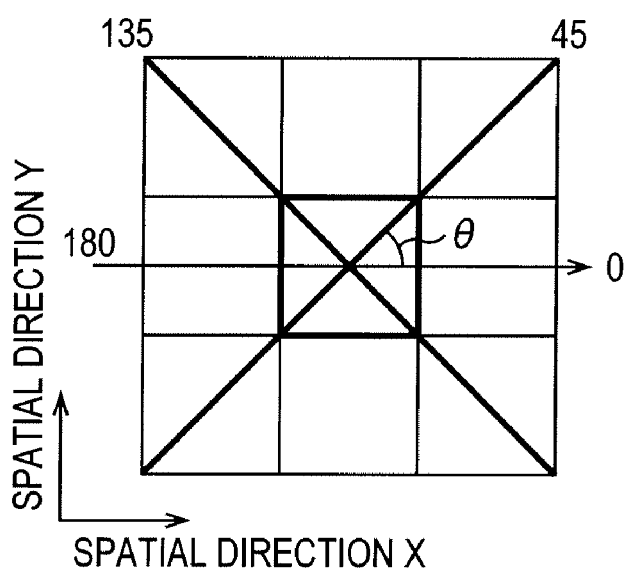
FIG. 75 is a diagram for describing the angle of data continuity as to activity.

For example, as shown in FIG. 75, the activity detecting unit 401 compares the calculated sum of differences $h_{diff}$ of the pixels values regarding the pixels horizontally adjacent with the sum of differences $v_{diff}$ of the pixels values regarding the pixels vertically adjacent, and in the event that the sum of differences $h_{diff}$ of the pixels values regarding the pixels horizontally adjacent is greater, determines that the angle of the data continuity based on the reference axis is a value of any from 45 degrees to 135 degrees, and in the event that the sum of differences $v_{diff}$ of the pixels values regarding the pixels vertically adjacent is greater, determines that the angle of the data continuity based on the reference axis is a value of any from 0 degrees to 45 degrees, or a value of any from 135 degrees to 180 degrees.

For example, the activity detecting unit 401 supplies activity information indicating the determination results to the data selecting unit 402 and the continuity direction derivation unit 404.

Note that the activity detecting unit 401 can detect activity by extracting blocks of arbitrary sizes, such as a block made up of 25 pixels of 5×5, a block made up of 49 pixels of 7×7, and so forth.

The data selecting unit 402 sequentially selects pixels of interest from the pixels of the input image, and extracts multiple sets of pixels made up of a predetermined number of pixels in one row in the vertical direction or one row in the horizontal direction for each angle based on the pixel of interest and the reference axis, based on the activity information supplied from the activity detecting unit 401.

For example, in the event that the activity information indicates that the change in pixel values in the horizontal direction is greater in comparison with the change in pixel values in the vertical direction, this means that the data continuity angle is a value of any from 45 degrees to 135 degrees, so the data selecting unit 402 extracts multiple sets of pixels made up of a predetermined number of pixels in one row in the vertical direction, for each predetermined angle in the range of 45 degrees to 135 degrees, based on the pixel of interest and the reference axis.

In the event that the activity information indicates that the change in pixel values in the vertical direction is greater in comparison with the change in pixel values in the horizontal direction, this means that the data continuity angle is a value of any from 0 degrees to 45 degrees or from 135 degrees to 180 degrees, so the data selecting unit 402 extracts multiple sets of pixels made up of a predetermined number of pixels in one row in the horizontal direction, for each predetermined angle in the range of 0 degrees to 45 degrees or 135 degrees to 180 degrees, based on the pixel of interest and the reference axis.

Also, for example, in the event that the activity information indicates that the angle of data continuity is a value of any from 45 degrees to 135 degrees, the data selecting unit 402 extracts multiple sets of pixels made up of a predetermined number of pixels in one row in the vertical direction, for each predetermined angle in the range of 45 degrees to 135 degrees, based on the pixel of interest and the reference axis.

In the event that the activity information indicates that the angle of data continuity is a value of any from 0 degrees to 45 degrees or from 135 degrees to 180 degrees, the data selecting unit 402 extracts multiple sets of pixels made up of a predetermined number of pixels in one row in the horizontal direction, for each predetermined angle in the range of 0 degrees to 45 degrees or 135 degrees to 180 degrees, based on the pixel of interest and the reference axis.

The data selecting unit 402 supplies the multiple sets made up of the extracted pixels to an error estimating unit 403.

The error estimating unit 403 detects correlation of pixel sets for each angle with regard to the multiple sets of extracted pixels.

For example, with regard to the multiple sets of pixels made up of a predetermined number of pixels in one row in the vertical direction corresponding to one angle, the error estimating unit 403 detects the correlation of the pixels values of the pixels at corresponding positions of the pixel sets. With regard to the multiple sets of pixels made up of a predetermined number of pixels in one row in the horizontal direction corresponding to one angle, the error estimating unit 403 detects the correlation of the pixels values of the pixels at corresponding positions of the sets.

The error estimating unit 403 supplies correlation information indicating the detected correlation to the continuity direction derivation unit 404. The error estimating unit 403 calculates the sum of the pixel values of pixels of a set including the pixel of interest supplied from the data selecting unit 402 as values indicating correlation, and the absolute value of difference of the pixel values of the pixels at corresponding positions in other sets, and supplies the sum of absolute value of difference to the continuity direction derivation unit 404 as correlation information.

Based on the correlation information supplied from the error estimating unit 403, the continuity direction derivation unit 404 detects the data continuity angle based on the reference axis in the input image, corresponding to the lost continuity of the light signals of the actual world 1, and outputs data continuity information indicating an angle. For example, based on the correlation information supplied from the error estimating unit 403, the continuity direction derivation unit 404 detects an angle corresponding to the pixel set with the greatest correlation as the data continuity angle, and outputs data continuity information indicating the angle corresponding to the pixel set with the greatest correlation that has been detected.

The following description will be made regarding detection of data continuity angle in the range of 0 degrees through 90 degrees (the so-called first quadrant).

Figure 76:
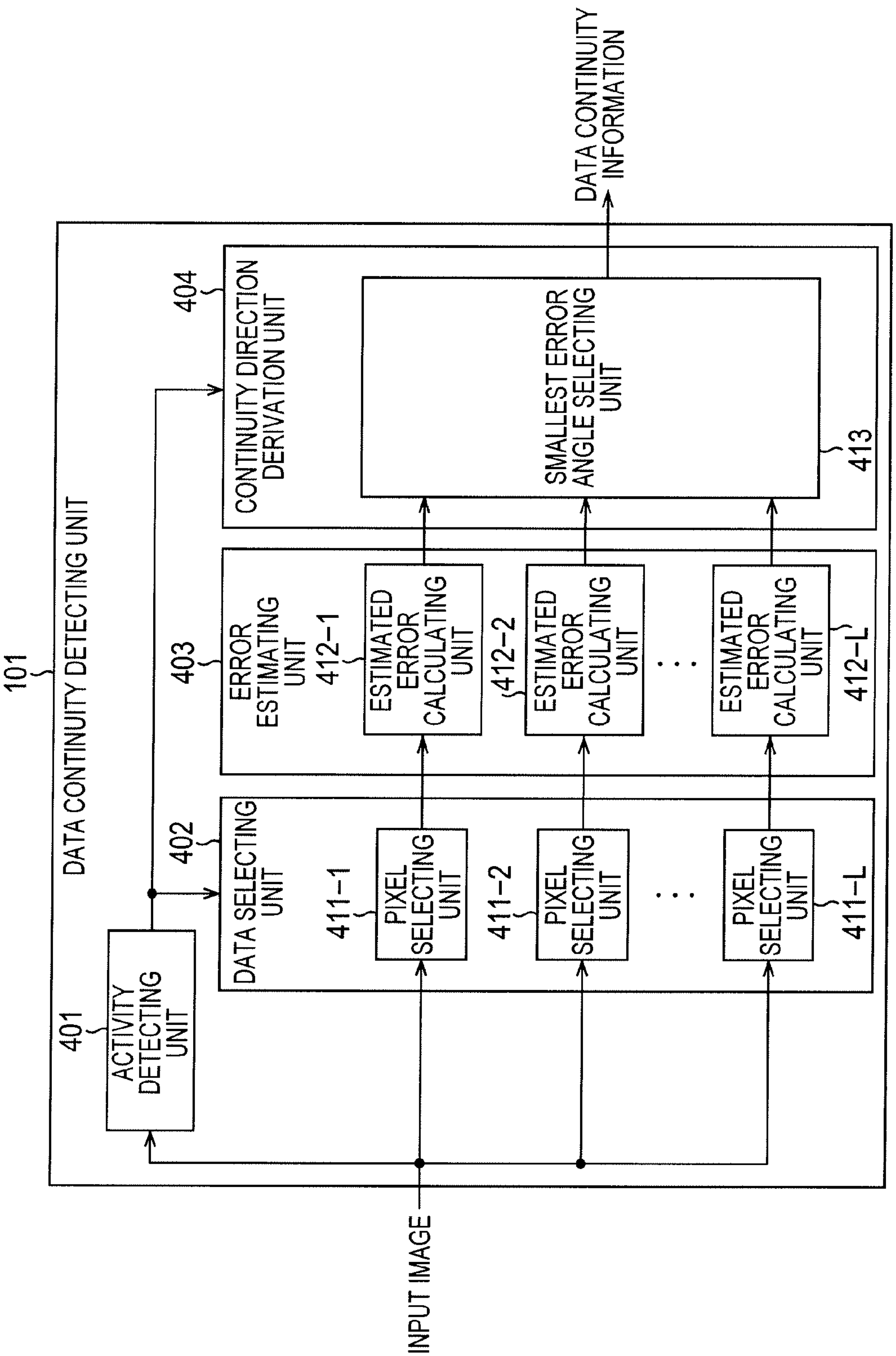
FIG. 76 is a block diagram illustrating a detailed configuration of the data continuity detecting unit 101.

FIG. 76 is a block diagram illustrating a more detailed configuration of the data continuity detecting unit 101 shown in FIG. 72.

The data selecting unit 402 includes pixel selecting unit 411-1 through pixel selecting unit 411-L. The error estimating unit 403 includes estimated error calculating unit 412-1 through estimated error calculating unit 412-L. The continuity direction derivation unit 404 includes a smallest error angle selecting unit 413.

First, description will be made regarding the processing of the pixel selecting unit 411-1 through pixel selecting unit 411-L in the event that the data continuity angle indicated by the activity information is a value of any from 45 degrees to 135 degrees.

The pixel selecting unit 411-1 through pixel selecting unit 411-L set straight lines of mutually differing predetermined angles which pass through the pixel of interest, with the axis indicating the spatial direction X as the reference axis. The pixel selecting unit 411-1 through pixel selecting unit 411-L select, of the pixels belonging to a vertical row of pixels to which the pixel of interest belongs, a predetermined number of pixels above the pixel of interest, and predetermined number of pixels below the pixel of interest, and the pixel of interest, as a set.

Figure 77:
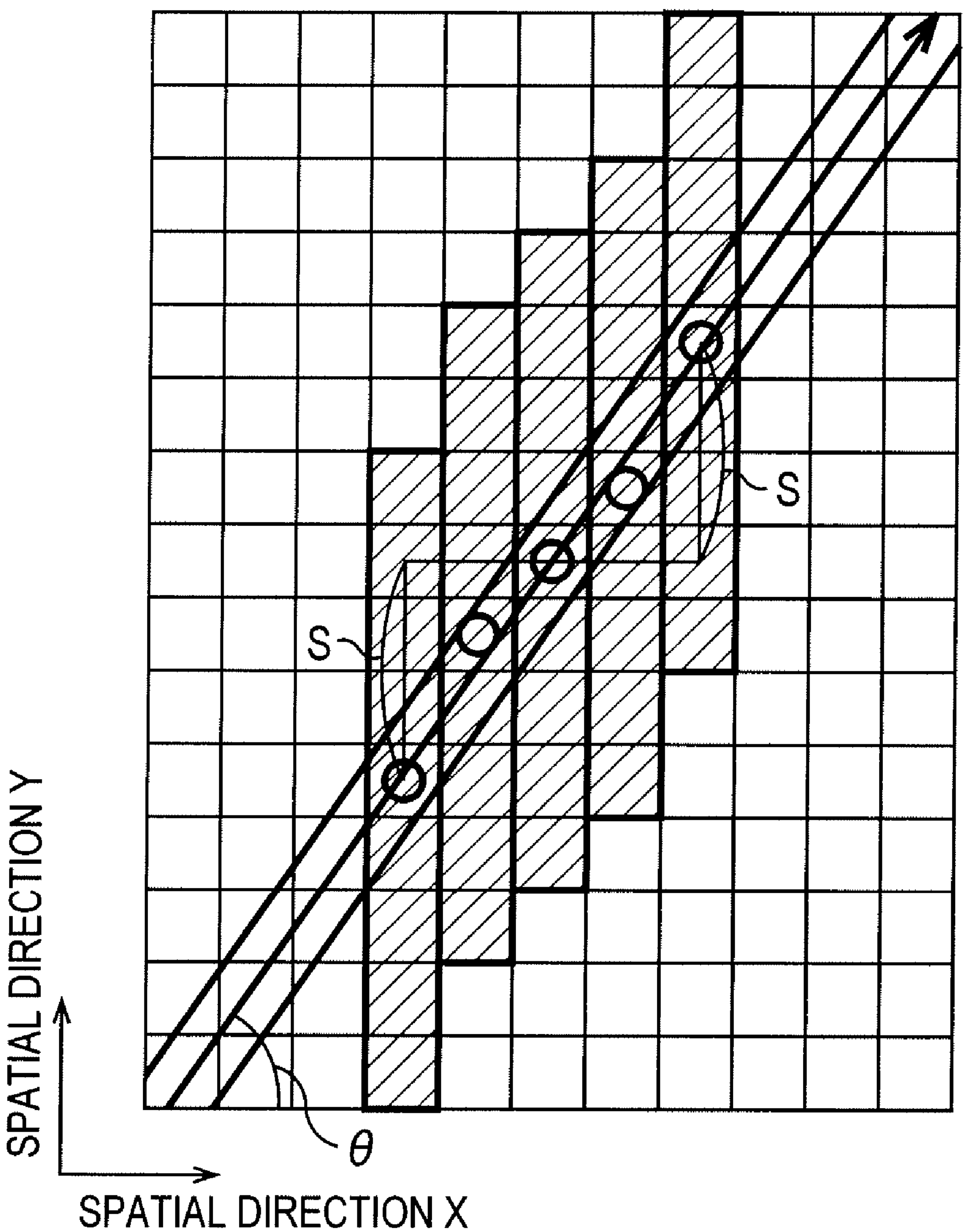
FIG. 77 is a diagram describing a set of pixels.

For example, as shown in FIG. 77, the pixel selecting unit 411-1 through pixel selecting unit 411-L select 9 pixels centered on the pixel of interest, as a set of pixels, from the pixels belonging to a vertical row of pixels to which the pixel of interest belongs.

In FIG. 77, one grid-shaped square (one grid) represents one pixel. In FIG. 77, the circle shown at the center represents the pixel of interest.

The pixel selecting unit 411-1 through pixel selecting unit 411-L select, from pixels belonging to a vertical row of pixels to the left of the vertical row of pixels to which the pixel of interest belongs, a pixel at the position closest to the straight line set for each. In FIG. 77, the circle to the lower left of the pixel of interest represents an example of a selected pixel. The pixel selecting unit 411-1 through pixel selecting unit 411-L then select, from the pixels belonging to the vertical row of pixels to the left of the vertical row of pixels to which the pixel of interest belongs, a predetermined number of pixels above the selected pixel, a predetermined number of pixels below the selected pixel, and the selected pixel, as a set of pixels.

For example, as shown in FIG. 77, the pixel selecting unit 411-1 through pixel selecting unit 411-L select 9 pixels centered on the pixel at the position closest to the straight line, from the pixels belonging to the vertical row of pixels to the left of the vertical row of pixels to which the pixel of interest belongs, as a set of pixels.

The pixel selecting unit 411-1 through pixel selecting unit 411-L select, from pixels belonging to a vertical row of pixels second left from the vertical row of pixels to which the pixel of interest belongs, a pixel at the position closest to the straight line set for each. In FIG. 77, the circle to the far left represents an example of the selected pixel. The pixel selecting unit 411-1 through pixel selecting unit 411-L then select, as a set of pixels, from the pixels belonging to the vertical row of pixels second left from the vertical row of pixels to which the pixel of interest belongs, a predetermined number of pixels above the selected pixel, a predetermined number of pixels below the selected pixel, and the selected pixel.

For example, as shown in FIG. 77, the pixel selecting unit 411-1 through pixel selecting unit 411-L select 9 pixels centered on the pixel at the position closest to the straight line, from the pixels belonging to the vertical row of pixels second left from the vertical row of pixels to which the pixel of interest belongs, as a set of pixels.

The pixel selecting unit 411-1 through pixel selecting unit 411-L select, from pixels belonging to a vertical row of pixels to the right of the vertical row of pixels to which the pixel of interest belongs, a pixel at the position closest to the straight line set for each. In FIG. 77, the circle to the upper right of the pixel of interest represents an example of a selected pixel. The pixel selecting unit 411-1 through pixel selecting unit 411-L then select, from the pixels belonging to the vertical row of pixels to the right of the vertical row of pixels to which the pixel of interest belongs, a predetermined number of pixels above the selected pixel, a predetermined number of pixels below the selected pixel, and the selected pixel, as a set of pixels.

For example, as shown in FIG. 77, the pixel selecting unit 411-1 through pixel selecting unit 411-L select 9 pixels centered on the pixel at the position closest to the straight line, from the pixels belonging to the vertical row of pixels to the right of the vertical row of pixels to which the pixel of interest belongs, as a set of pixels.

The pixel selecting unit 411-1 through pixel selecting unit 411-L select, from pixels belonging to a vertical row of pixels second right from the vertical row of pixels to which the pixel of interest belongs, a pixel at the position closest to the straight line set for each. In FIG. 77, the circle to the far right represents an example of the selected pixel. The pixel selecting unit 411-1 through pixel selecting unit 411-L then select, from the pixels belonging to the vertical row of pixels second right from the vertical row of pixels to which the pixel of interest belongs, a predetermined number of pixels above the selected pixel, a predetermined number of pixels below the selected pixel, and the selected pixel, as a set of pixels.

For example, as shown in FIG. 77, the pixel selecting unit 411-1 through pixel selecting unit 411-L select 9 pixels centered on the pixel at the position closest to the straight line, from the pixels belonging to the vertical row of pixels second right from the vertical row of pixels to which the pixel of interest belongs, as a set of pixels.

Thus, the pixel selecting unit 411-1 through pixel selecting unit 411-L each select five sets of pixels.

The pixel selecting unit 411-1 through pixel selecting unit 411-L select pixel sets for (lines set to) mutually different angles. For example, the pixel selecting unit 411-1 selects sets of pixels regarding 45 degrees, the pixel selecting unit 411-2 selects sets of pixels regarding 47.5 degrees, and the pixel selecting unit 411-3 selects sets of pixels regarding 50 degrees. The pixel selecting unit 411-1 through pixel selecting unit 411-L select sets of pixels regarding angles every 2.5 degrees, from 52.5 degrees through 135 degrees.

Note that the number of pixel sets may be an optional number, such as 3 or 7, for example, and does not restrict the present invention. Also, the number of pixels selected as one set may be an optional number, such as 5 or 13, for example, and does not restrict the present invention.

Note that the pixel selecting unit 411-1 through pixel selecting unit 411-L may be arranged to select pixel sets from pixels within a predetermined range in the vertical direction. For example, the pixel selecting unit 411-1 through pixel selecting unit 411-L can select pixel sets from 121 pixels in the vertical direction (60 pixels upward from the pixel of interest, and 60 pixels downward). In this case, the data continuity detecting unit 101 can detect the angle of data continuity up to 88.09 degrees as to the axis representing the spatial direction X.

The pixel selecting unit 411-1 supplies the selected set of pixels to the estimated error calculating unit 412-1, and the pixel selecting unit 411-2 supplies the selected set of pixels to the estimated error calculating unit 412-2. In the same way, each pixel selecting unit 411-3 through pixel selecting unit 411-L supplies the selected set of pixels to each estimated error calculating unit 412-3 through estimated error calculating unit 412-L.

The estimated error calculating unit 412-1 through estimated error calculating unit 412-L detect the correlation of the pixels values of the pixels at positions in the multiple sets, supplied from each of the pixel selecting unit 411-1 through pixel selecting unit 411-L. For example, the estimated error calculating unit 412-1 through estimated error calculating unit 412-L calculates, as a value indicating the correlation, the sum of absolute values of difference between the pixel values of the pixels of the set containing the pixel of interest, and the pixel values of the pixels at corresponding positions in other sets, supplied from one of the pixel selecting unit 411-1 through pixel selecting unit 411-L.

More specifically, based on the pixel values of the pixels of the set containing the pixel of interest and the pixel values of the pixels of the set made up of pixels belonging to one vertical row of pixels to the left side of the pixel of interest supplied from one of the pixel selecting unit 411-1 through pixel selecting unit 411-L, the estimated error calculating unit 412-1 through estimated error calculating unit 412-L calculates the difference of the pixel values of the topmost pixel, then calculates the difference of the pixel values of the second pixel from the top, and so on to calculate the absolute values of difference of the pixel values in order from the top pixel, and further calculates the sum of absolute values of the calculated differences. Based on the pixel values of the pixels of the set containing the pixel of interest and the pixel values of the pixels of the set made up of pixels belonging to one vertical row of pixels two to the left from the pixel of interest supplied from one of the pixel selecting unit 411-1 through pixel selecting unit 411-L, the estimated error calculating unit 412-1 through estimated error calculating unit 412-L calculates the absolute values of difference of the pixel values in order from the top pixel, and calculates the sum of absolute values of the calculated differences.

Then, based on the pixel values of the pixels of the set containing the pixel of interest and the pixel values of the pixels of the set made up of pixels belonging to one vertical row of pixels to the right side of the pixel of interest supplied from one of the pixel selecting unit 411-1 through pixel selecting unit 411-L, the estimated error calculating unit 412-1 through estimated error calculating unit 412-L calculates the difference of the pixel values of the topmost pixel, then calculates the difference of the pixel values of the second pixel from the top, and so on to calculate the absolute values of difference of the pixel values in order from the top pixel, and further calculates the sum of absolute values of the calculated differences. Based on the pixel values of the pixels of the set containing the pixel of interest and the pixel values of the pixels of the set made up of pixels belonging to one vertical row of pixels two to the right from the pixel of interest supplied from one of the pixel selecting unit 411-1 through pixel selecting unit 411-L, the estimated error calculating unit 412-1 through estimated error calculating unit 412-L calculates the absolute values of difference of the pixel values in order from the top pixel, and calculates the sum of absolute values of the calculated differences.

The estimated error calculating unit 412-1 through estimated error calculating unit 412-L add all of the sums of absolute values of difference of the pixel values thus calculated, thereby calculating the aggregate of absolute values of difference of the pixel values.

The estimated error calculating unit 412-1 through estimated error calculating unit 412-L supply information indicating the detected correlation to the smallest error angle selecting unit 413. For example, the estimated error calculating unit 412-1 through estimated error calculating unit 412-L supply the aggregate of absolute values of difference of the pixel values calculated, to the smallest error angle selecting unit 413.

Note that the estimated error calculating unit 412-1 through estimated error calculating unit 412-L are not restricted to the sum of absolute values of difference of pixel values, and can also calculate other values as correlation values as well, such as the sum of squared differences of pixel values, or correlation coefficients based on pixel values, and so forth.

The smallest error angle selecting unit 413 detects the data continuity angle based on the reference axis in the input image which corresponds to the continuity of the image which is the lost actual world 1 light signals, based on the correlation detected by the estimated error calculating unit 412-1 through estimated error calculating unit 412-L with regard to mutually different angles. That is to say, based on the correlation detected by the estimated error calculating unit 412-1 through estimated error calculating unit 412-L with regard to mutually different angles, the smallest error angle selecting unit 413 selects the greatest correlation, and takes the angle regarding which the selected correlation was detected as the data continuity angle based on the reference axis, thereby detecting the data continuity angle based on the reference axis in the input image.

For example, of the aggregates of absolute values of difference of the pixel values supplied from the estimated error calculating unit 412-1 through estimated error calculating unit 412-L, the smallest error angle selecting unit 413 selects the smallest aggregate. With regard to the pixel set of which the selected aggregate was calculated, the smallest error angle selecting unit 413 makes reference to a pixel belonging to the one vertical row of pixels two to the left from the pixel of interest and at the closest position to the straight line, and to a pixel belonging to the one vertical row of pixels two to the right from the pixel of interest and at the closest position to the straight line.

Figure 78:
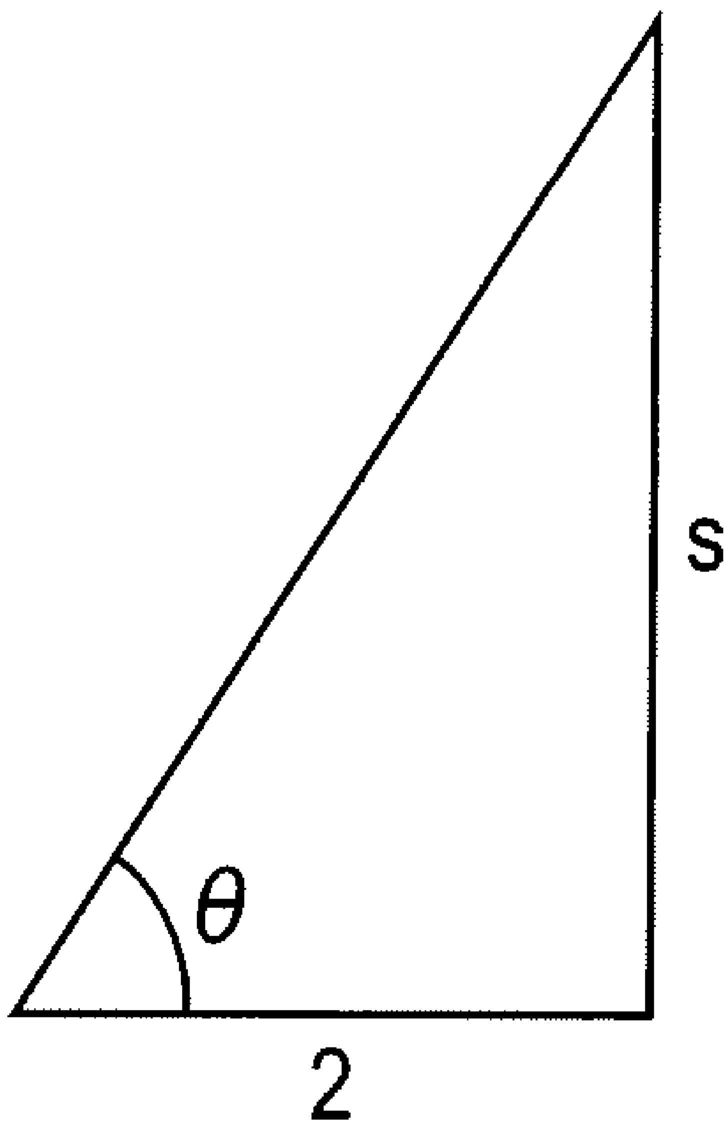
FIG. 78 is a diagram describing the relation between the position of a pixel set and the angle of data continuity.

As shown in FIG. 77, the smallest error angle selecting unit 413 obtains the distance S in the vertical direction of the position of the pixels to reference from the position of the pixel of interest. As shown in FIG. 78, the smallest error angle selecting unit 413 calculates the angle θ of data continuity based on the axis indicating the spatial direction X which is the reference axis in the input image which is image data, that corresponds to the lost actual world 1 light signals continuity, from Expression (29).

$$\theta=\tan^{-1}(s/2) \tag{29}$$

Next, description will be made regarding the processing of the pixel selecting unit 411-1 through pixel selecting unit 411-L in the event that the data continuity angle indicated by the activity information is a value of any from 0 degrees to 45 degrees and 135 degrees to 180 degrees.

The pixel selecting unit 411-1 through pixel selecting unit 411-L set straight lines of predetermined angles which pass through the pixel of interest, with the axis indicating the spatial direction X as the reference axis, and select, of the pixels belonging to a horizontal row of pixels to which the pixel of interest belongs, a predetermined number of pixels to the left of the pixel of interest, and predetermined number of pixels to the right of the pixel of interest, and the pixel of interest, as a pixel set.

The pixel selecting unit 411-1 through pixel selecting unit 411-L select, from pixels belonging to a horizontal row of pixels above the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels above the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels two above the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels two above the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels below the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels below the horizontal row of pixels to which the pixel of interest belongs, a predetermined number of pixels to the left of the selected pixel, a predetermined number of pixels to the right of the selected pixel, and the selected pixel, as a pixel set.

The pixel selecting unit 411-1 through pixel selecting unit 411-L select, from pixels belonging to a horizontal row of pixels two below the horizontal row of pixels to which the pixel of interest belongs, a pixel at the position closest to the straight line set for each. The pixel selecting unit 411-1 through pixel selecting unit 411-L then select, from the pixels belonging to the horizontal row of pixels two below the horizontal row of pixels to which the pixel of interest belongs, a predetermined number of pixels to the left of the selected pixel, a predetermined number of pixels to the right of the selected pixel, and the selected pixel, as a pixel set.

Thus, the pixel selecting unit 411-1 through pixel selecting unit 411-L each select five sets of pixels.

The pixel selecting unit 411-1 through pixel selecting unit 411-L select pixel sets for mutually different angles. For example, the pixel selecting unit 411-1 selects sets of pixels regarding 0 degrees, the pixel selecting unit 411-2 selects sets of pixels regarding 2.5 degrees, and the pixel selecting unit 411-3 selects sets of pixels regarding 5 degrees. The pixel selecting unit 411-1 through pixel selecting unit 411-L select sets of pixels regarding angles every 2.5 degrees, from 7.5 degrees through 45 degrees and from 135 degrees through 180 degrees.

The pixel selecting unit 411-1 supplies the selected set of pixels to the estimated error calculating unit 412-1, and the pixel selecting unit 411-2 supplies the selected set of pixels to the estimated error calculating unit 412-2. In the same way, each pixel selecting unit 411-3 through pixel selecting unit 411-L supplies the selected set of pixels to each estimated error calculating unit 412-3 through estimated error calculating unit 412-L.

The estimated error calculating unit 412-1 through estimated error calculating unit 412-L detect the correlation of the pixels values of the pixels at positions in the multiple sets, supplied from each of the pixel selecting unit 411-1 through pixel selecting unit 411-L. The estimated error calculating unit 412-1 through estimated error calculating unit 412-L supply information indicating the detected correlation to the smallest error angle selecting unit 413.

The smallest error angle selecting unit 413 detects the data continuity angle based on the reference axis in the input image which corresponds to the continuity of the image which is the lost actual world 1 light signals, based on the correlation detected by the estimated error calculating unit 412-1 through estimated error calculating unit 412-L.

Figure 79:
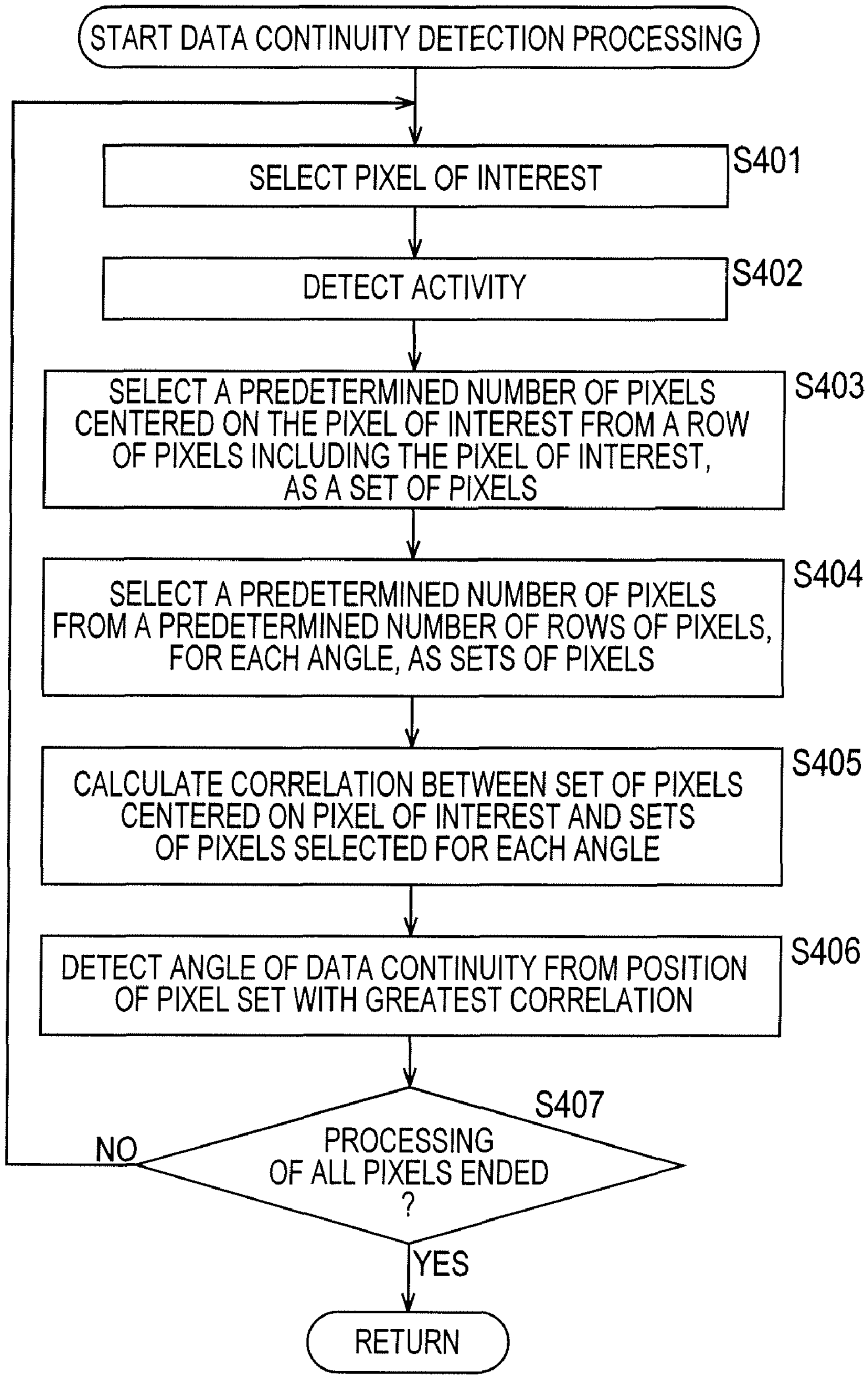
FIG. 79 is a flowchart for describing processing for detecting data continuity.

Next, data continuity detection processing with the data continuity detecting unit 101 of which the configuration is shown in FIG. 72, corresponding to the processing in step S101, will be described with reference to the flowchart in FIG. 79.

In step S401, the activity detecting unit 401 and the data selecting unit 402 select the pixel of interest which is a pixel of interest from the input image. The activity detecting unit 401 and the data selecting unit 402 select the same pixel of interest. For example, the activity detecting unit 401 and the data selecting unit 402 select the pixel of interest from the input image in raster scan order.

In step S402, the activity detecting unit 401 detects activity with regard to the pixel of interest. For example, the activity detecting unit 401 detects activity based on the difference of pixel values of pixels aligned in the vertical direction of a block made up of a predetermined number of pixels centered on the pixel of interest, and the difference of pixel values of pixels aligned in the horizontal direction.

The activity detecting unit 401 detects activity in the spatial direction as to the pixel of interest, and supplies activity information indicating the detected results to the data selecting unit 402 and the continuity direction derivation unit 404.

In step S403, the data selecting unit 402 selects, from a row of pixels including the pixel of interest, a predetermined number of pixels centered on the pixel of interest, as a pixel set. For example, the data selecting unit 402 selects a predetermined number of pixels above or to the left of the pixel of interest, and a predetermined number of pixels below or to the right of the pixel of interest, which are pixels belonging to a vertical or horizontal row of pixels to which the pixel of interest belongs, and also the pixel of interest, as a pixel set.

In step S404, the data selecting unit 402 selects, as a pixel set, a predetermined number of pixels each from a predetermined number of pixel rows for each angle in a predetermined range based on the activity detected by the processing in step S402. For example, the data selecting unit 402 sets straight lines with angles of a predetermined range which pass through the pixel of interest, with the axis indicating the spatial direction X as the reference axis, selects a pixel which is one or two rows away from the pixel of interest in the horizontal direction or vertical direction and which is closest to the straight line, and selects a predetermined number of pixels above or to the left of the selected pixel, and a predetermined number of pixels below or to the right of the selected pixel, and the selected pixel closest to the line, as a pixel set. The data selecting unit 402 selects pixel sets for each angle.

The data selecting unit 402 supplies the selected pixel sets to the error estimating unit 403.

In step S405, the error estimating unit 403 calculates the correlation between the set of pixels centered on the pixel of interest, and the pixel sets selected for each angle. For example, the error estimating unit 403 calculates the sum of absolute values of difference of the pixel values of the pixels of the set including the pixel of interest and the pixel values of the pixels at corresponding positions in other sets, for each angle.

The angle of data continuity may be detected based on the correlation between pixel sets selected for each angle.

The error estimating unit 403 supplies the information indicating the calculated correlation to the continuity direction derivation unit 404.

In step S406, from position of the pixel set having the strongest correlation based on the correlation calculated in the processing in step S405, the continuity direction derivation unit 404 detects the data continuity angle based on the reference axis in the input image which is image data that corresponds to the lost actual world 1 light signal continuity. For example, the continuity direction derivation unit 404 selects the smallest aggregate of the aggregate of absolute values of difference of pixel values, and detects the data continuity angle θ from the position of the pixel set regarding which the selected aggregate has been calculated.

The continuity direction derivation unit 404 outputs data continuity information indicating the angle of the data continuity that has been detected.

In step S407, the data selecting unit 402 determines whether or not processing of all pixels has ended, and in the event that determination is made that processing of all pixels has not ended, the flow returns to step S401, a pixel of interest is selected from pixels not yet taken as the pixel of interest, and the above-described processing is repeated.

In the event that determination is made in step S407 that processing of all pixels has ended, the processing ends.

Thus, the data continuity detecting unit 101 can detect the data continuity angle based on the reference axis in the image data, corresponding to the lost actual world 1 light signal continuity.

Note that an arrangement may be made wherein the data continuity detecting unit 101 of which the configuration is shown in FIG. 72 detects activity in the spatial direction of the input image with regard to the pixel of interest which is a pixel of interest in the frame of interest which is a frame of interest, extracts multiple pixel sets made up of a predetermined number of pixels in one row in the vertical direction or one row in the horizontal direction from the frame of interest and from each of frames before or after time-wise the frame of interest, for each angle and movement vector based on the pixel of interest and the space-directional reference axis, according to the detected activity, detects the correlation of the extracted pixel sets, and detects the data continuity angle in the time direction and spatial direction in the input image, based on this correlation.

Figure 80:
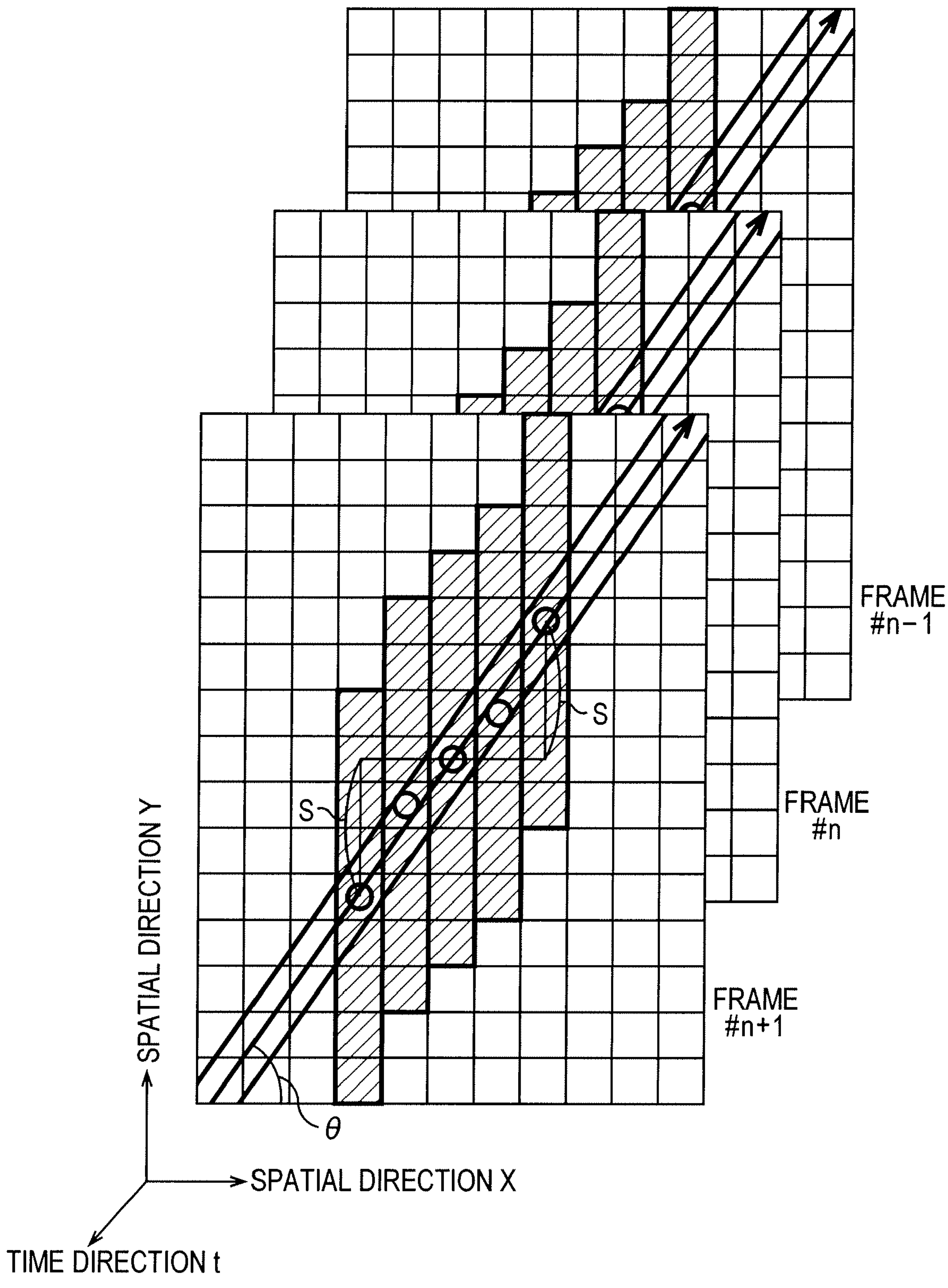
FIG. 80 is a diagram illustrating a set of pixels extracted when detecting the angle of data continuity in the time direction and space direction.

For example, as shown in FIG. 80, the data selecting unit 402 extracts multiple pixel sets made up of a predetermined number of pixels in one row in the vertical direction or one row in the horizontal direction from frame #n which is the frame of interest, frame #n−1, and frame #n+1, for each angle and movement vector based on the pixel of interest and the space-directional reference axis, according to the detected activity.

The frame #n−1 is a frame which is previous to the frame #n time-wise, and the frame #n+1 is a frame following the frame #n time-wise. That is to say, the frame #n−1, frame #n, and frame #n+1, are displayed in the order of frame #n−1, frame #n, and frame #n+1.

The error estimating unit 403 detects the correlation of pixel sets for each single angle and single movement vector, with regard to the multiple sets of the pixels that have been extracted. The continuity direction derivation unit 404 detects the data continuity angle in the temporal direction and spatial direction in the input image which corresponds to the lost actual world 1 light signal continuity, based on the correlation of pixel sets, and outputs the data continuity information indicating the angle.

Figure 81:
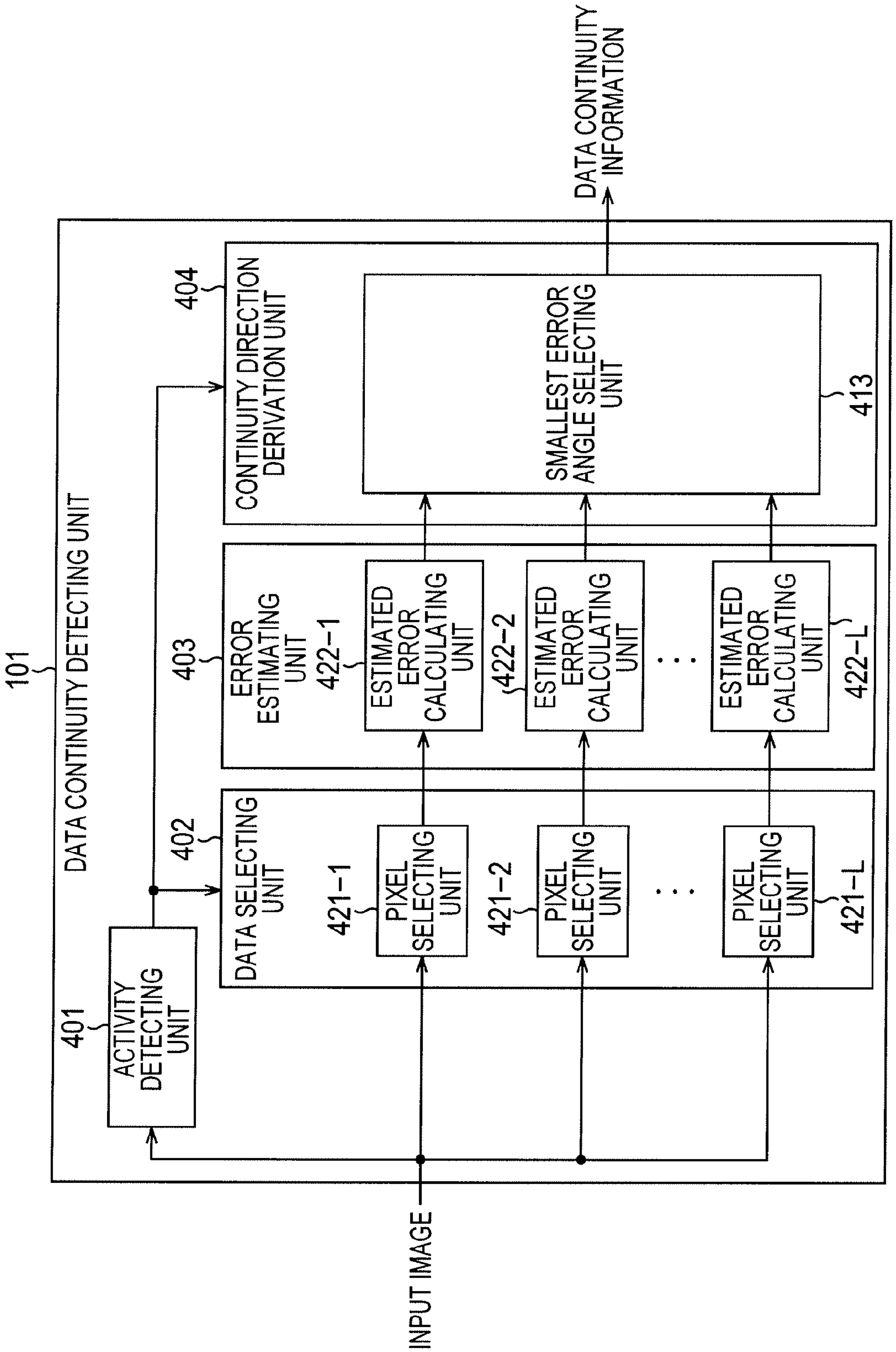
FIG. 81 is a block diagram illustrating another further detailed configuration of the data continuity detecting unit 101.

FIG. 81 is a block diagram illustrating another configuration of the data continuity detecting unit 101 shown in FIG. 72, in further detail. Portions which are the same as the case shown in FIG. 76 are denoted with the same numerals, and description thereof will be omitted.

The data selecting unit 402 includes pixel selecting unit 421-1 through pixel selecting unit 421-L. The error estimating unit 403 includes estimated error calculating unit 422-1 through estimated error calculating unit 422-L.

With the data continuity detecting unit 101 shown in FIG. 81, sets of a number corresponding to the range of the angle are extracted wherein the pixel sets are made up of pixels of a number corresponding to the range of the angle, the correlation of the extracted pixel sets is detected, and the data continuity angle based on the reference axis in the input image is detected based on the detected correlation.

First, the processing of the pixel selecting unit 421-1 through pixel selecting unit 421-L in the event that the angle of the data continuity indicated by activity information is any value 45 degrees to 135 degrees, will be described.

Figure 82:
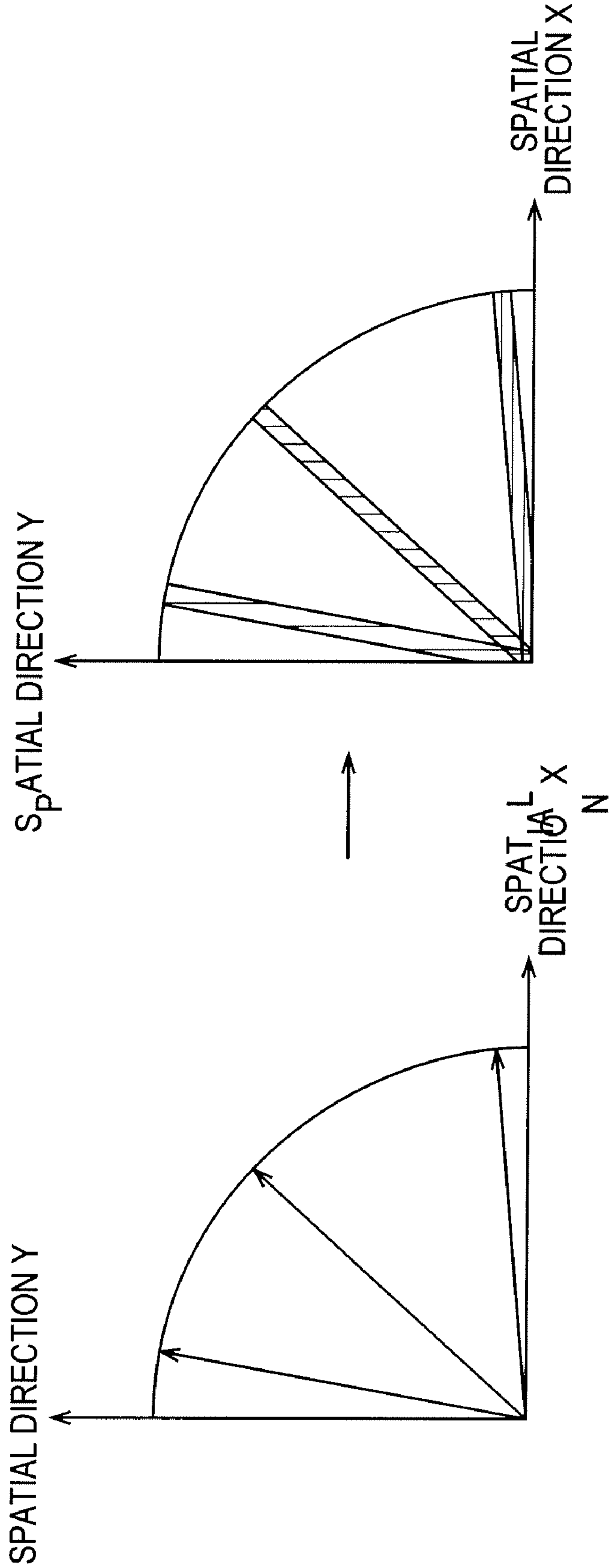
FIG. 82 is a diagram for describing a set of pixels made up of pixels of a number corresponding to the range of angle of set straight lines.

As shown to the left side in FIG. 82, with the data continuity detecting unit 101 shown in FIG. 76, pixel sets of a predetermined number of pixels are extracted regardless of the angle of the set straight line, but with the data continuity detecting unit 101 shown in FIG. 81, pixel sets of a number of pixels corresponding to the range of the angle of the set straight line are extracted, as indicated at the right side of FIG. 82. Also, with the data continuity detecting unit 101 shown in FIG. 81, pixels sets of a number corresponding to the range of the angle of the set straight line are extracted.

The pixel selecting unit 421-1 through pixel selecting unit 421-L set straight lines of mutually differing predetermined angles which pass through the pixel of interest with the axis indicating the spatial direction X as a reference axis, in the range of 45 degrees to 135 degrees.

The pixel selecting unit 421-1 through pixel selecting unit 421-L select, from pixels belonging to one vertical row of pixels to which the pixel of interest belongs, pixels above the pixel of interest and pixels below the pixel of interest of a number corresponding to the range of the angle of the straight line set for each, and the pixel of interest, as a pixel set.

The pixel selecting unit 421-1 through pixel selecting unit 421-L select, from pixels belonging to one vertical line each on the left side and the right side as to the one vertical row of pixels to which the pixel of interest belongs, a predetermined distance away therefrom in the horizontal direction with the pixel as a reference, pixels closest to the straight lines set for each, and selects, from one vertical row of pixels as to the selected pixel, pixels above the selected pixel of a number corresponding to the range of angle of the set straight line, pixels below the selected pixel of a number corresponding to the range of angle of the set straight line, and the selected pixel, as a pixel set.

That is to say, the pixel selecting unit 421-1 through pixel selecting unit 421-L select pixels of a number corresponding to the range of angle of the set straight line as pixel sets. The pixel selecting unit 421-1 through pixel selecting unit 421-L select pixels sets of a number corresponding to the range of angle of the set straight line.

For example, in the event that the image of a fine line, positioned at an angle approximately 45 degrees as to the spatial direction X, and having a width which is approximately the same width as the detection region of a detecting element, has been imaged with the sensor 2, the image of the fine line is projected on the data 3 such that arc shapes are formed on three pixels aligned in one row in the spatial direction Y for the fine-line image. Conversely, in the event that the image of a fine line, positioned at an angle approximately vertical to the spatial direction X, and having a width which is approximately the same width as the detection region of a detecting element, has been imaged with the sensor 2, the image of the fine line is projected on the data 3 such that arc shapes are formed on a great number of pixels aligned in one row in the spatial direction Y for the fine-line image.

With the same number of pixels included in the pixel sets, in the event that the fine line is positioned at an angle approximately 45 degrees to the spatial direction X, the number of pixels on which the fine line image has been projected is smaller in the pixel set, meaning that the resolution is lower. On the other hand, in the event that the fine line is positioned approximately vertical to the spatial direction X, processing is performed on a part of the pixels on which the fine line image has been projected, which may lead to lower accuracy.

Accordingly, to make the number of pixels upon which the fine line image is projected to be approximately equal, the pixel selecting unit 421-1 through pixel selecting unit 421-L selects the pixels and the pixel sets so as to reduce the number of pixels included in each of the pixels sets and increase the number of pixel sets in the event that the straight line set is closer to an angle of 45 degrees as to the spatial direction X, and increase the number of pixels included in each of the pixels sets and reduce the number of pixel sets in the event that the straight line set is closer to being vertical as to the spatial direction X.

Figure 83:
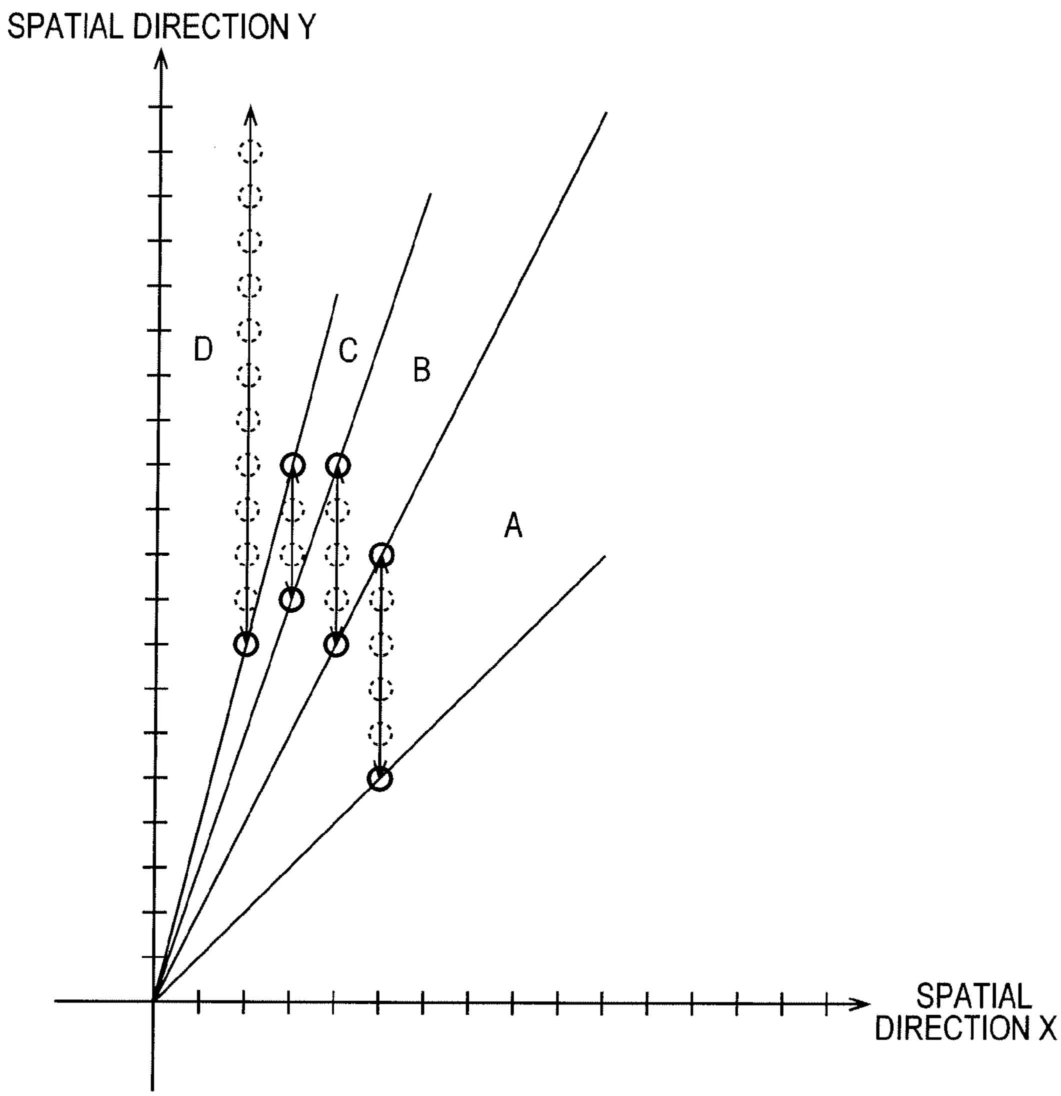
FIG. 83 is a diagram describing the range of angle of the set straight lines.

For example, as shown in FIG. 83 and FIG. 84, in the event that the angle of the set straight line is within the range of 45 degrees or greater but smaller than 63.4 degrees (the range indicated by A in FIG. 83 and FIG. 84), the pixel selecting unit 421-1 through pixel selecting unit 421-L select five pixels centered on the pixel of interest from one vertical row of pixels as to the pixel of interest, as a pixel set, and also select as pixel sets five pixels each from pixels belonging to one row of pixels each on the left side and the right side of the pixel of interest within five pixels therefrom in the horizontal direction.

That is to say, in the event that the angle of the set straight line is within the range of 45 degrees or greater but smaller than 63.4 degrees the pixel selecting unit 421-1 through pixel selecting unit 421-L select 11 pixel sets each made up of five pixels, from the input image. In this case, the pixel selected as the pixel which is at the closest position to the set straight line is at a position five pixels to nine pixels in the vertical direction as to the pixel of interest.

In FIG. 84, the number of rows indicates the number of rows of pixels to the left side or right side of the pixel of interest from which pixels are selected as pixel sets. In FIG. 84, the number of pixels in one row indicates the number of pixels selected as a pixel set from the one row of pixels vertical as to the pixel of interest, or the rows to the left side or the right side of the pixel of interest. In FIG. 84, the selection range of pixels indicates the position of pixels to be selected in the vertical direction, as the pixel at a position closest to the set straight line as to the pixel of interest.

Figure 85:
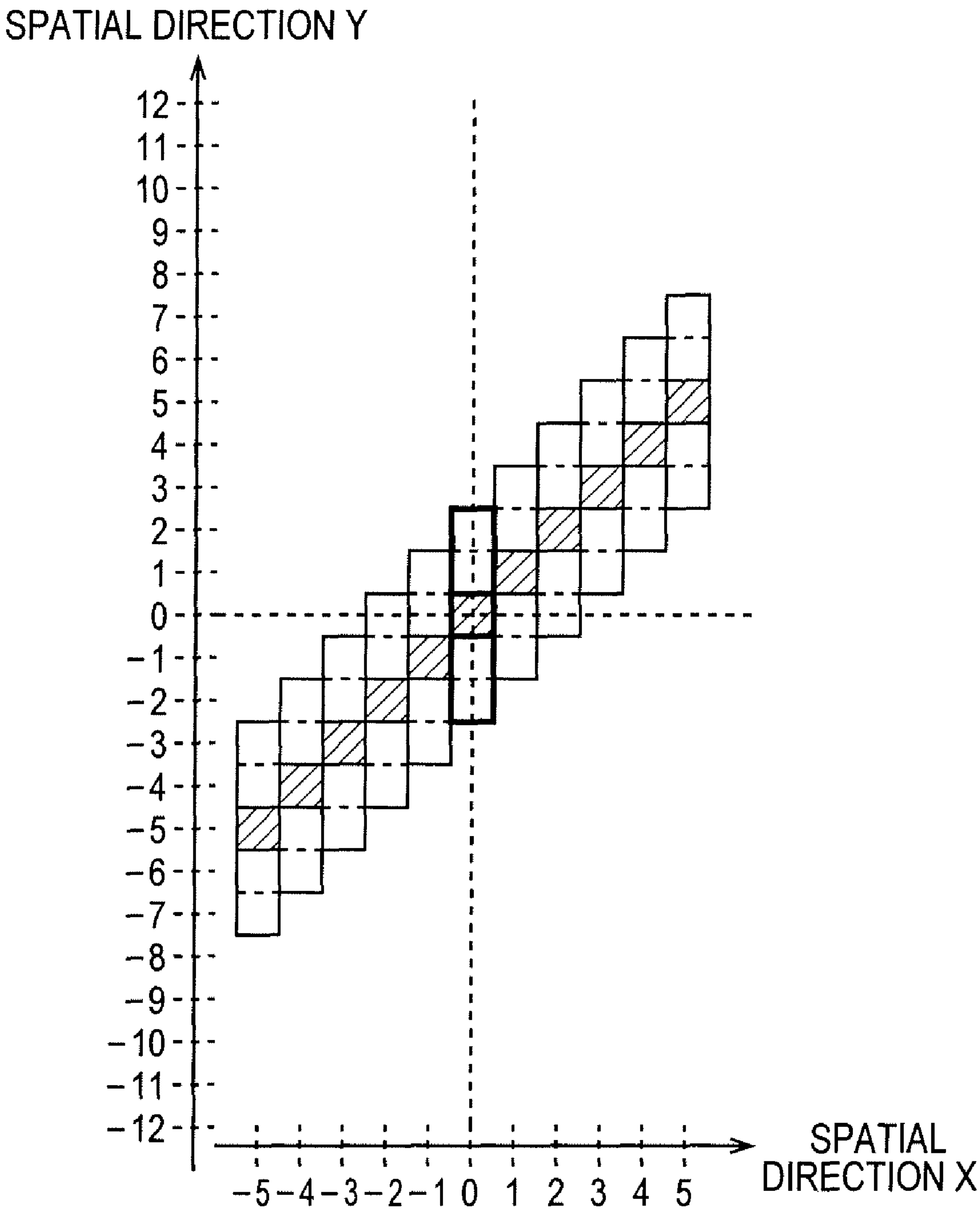
FIG. 85 is a diagram for describing the number of pixel sets and the number of pixels per pixel set.

As shown in FIG. 85, for example, in the event that the angle of the set straight line is 45 degrees, the pixel selecting unit 421-1 selects five pixels centered on the pixel of interest from one vertical row of pixels as to the pixel of interest, as a pixel set, and also selects as pixel sets five pixels each from pixels belonging to one row of pixels each on the left side and the right side of the pixel of interest within five pixels therefrom in the horizontal direction. That is to say, the pixel selecting unit 421-1 selects 11 pixel sets each made up of five pixels, from the input image. In this case, of the pixels selected as the pixels at the closest position to the set straight line the pixel which is at the farthest position from the pixel of interest is at a position five pixels in the vertical direction as to the pixel of interest.

Note that in FIG. 85 through FIG. 92, the squares represented by dotted lines (single grids separated by dotted lines) indicate single pixels, and squares represented by solid lines indicate pixel sets. In FIG. 85 through FIG. 92, the coordinate of the pixel of interest in the spatial direction X is 0, and the coordinate of the pixel of interest in the spatial direction Y is 0.

Also, in FIG. 85 through FIG. 92, the hatched squares indicate the pixel of interest or the pixels at positions closest to the set straight line. In FIG. 85 through FIG. 92, the squares represented by heavy lines indicate the set of pixels selected with the pixel of interest as the center.

Figure 86:
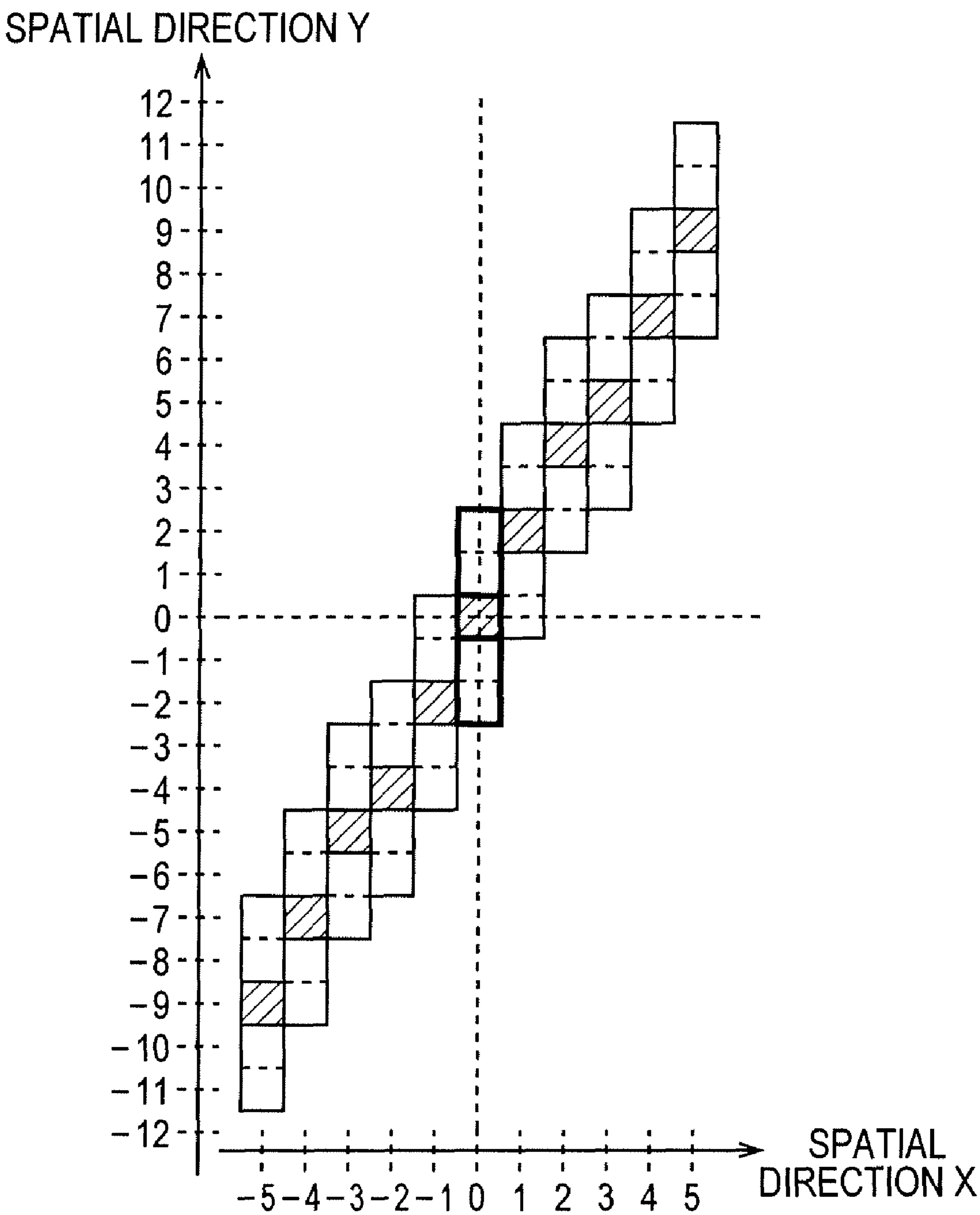
FIG. 86 is a diagram for describing the number of pixel sets and the number of pixels per pixel set.

As shown in FIG. 86, for example, in the event that the angle of the set straight line is 60.9 degrees, the pixel selecting unit 421-2 selects five pixels centered on the pixel of interest from one vertical row of pixels as to the pixel of interest, as a pixel set, and also selects as pixel sets five pixels each from pixels belonging to one vertical row of pixels each on the left side and the right side of the pixel of interest within five pixels therefrom in the horizontal direction. That is to say, the pixel selecting unit 421-2 selects 11 pixel sets each made up of five pixels, from the input image. In this case, of the pixels selected as the pixels at the closest position to the set straight line the pixel which is at the farthest position from the pixel of interest is at a position nine pixels in the vertical direction as to the pixel of interest.

For example, as shown in FIG. 83 and FIG. 84, in the event that the angle of the set straight line is 63.4 degrees or greater but smaller than 71.6 degrees (the range indicated by B in FIG. 83 and FIG. 84), the pixel selecting unit 421-1 through pixel selecting unit 421-L select seven pixels centered on the pixel of interest from one vertical row of pixels as to the pixel of interest, as a pixel set, and also select as pixel sets seven pixels each from pixels belonging to one row of pixels each on the left side and the right side of the pixel of interest within four pixels therefrom in the horizontal direction.

That is to say, in the event that the angle of the set straight line is 63.4 degrees or greater but smaller than 71.6 degrees the pixel selecting unit 421-1 through pixel selecting unit 421-L select nine pixel sets each made up of seven pixels, from the input image. In this case, the pixel selected as the pixel which is at the closest position to the set straight line is at a position eight pixels to 11 pixels in the vertical direction as to the pixel of interest.

Figure 87:
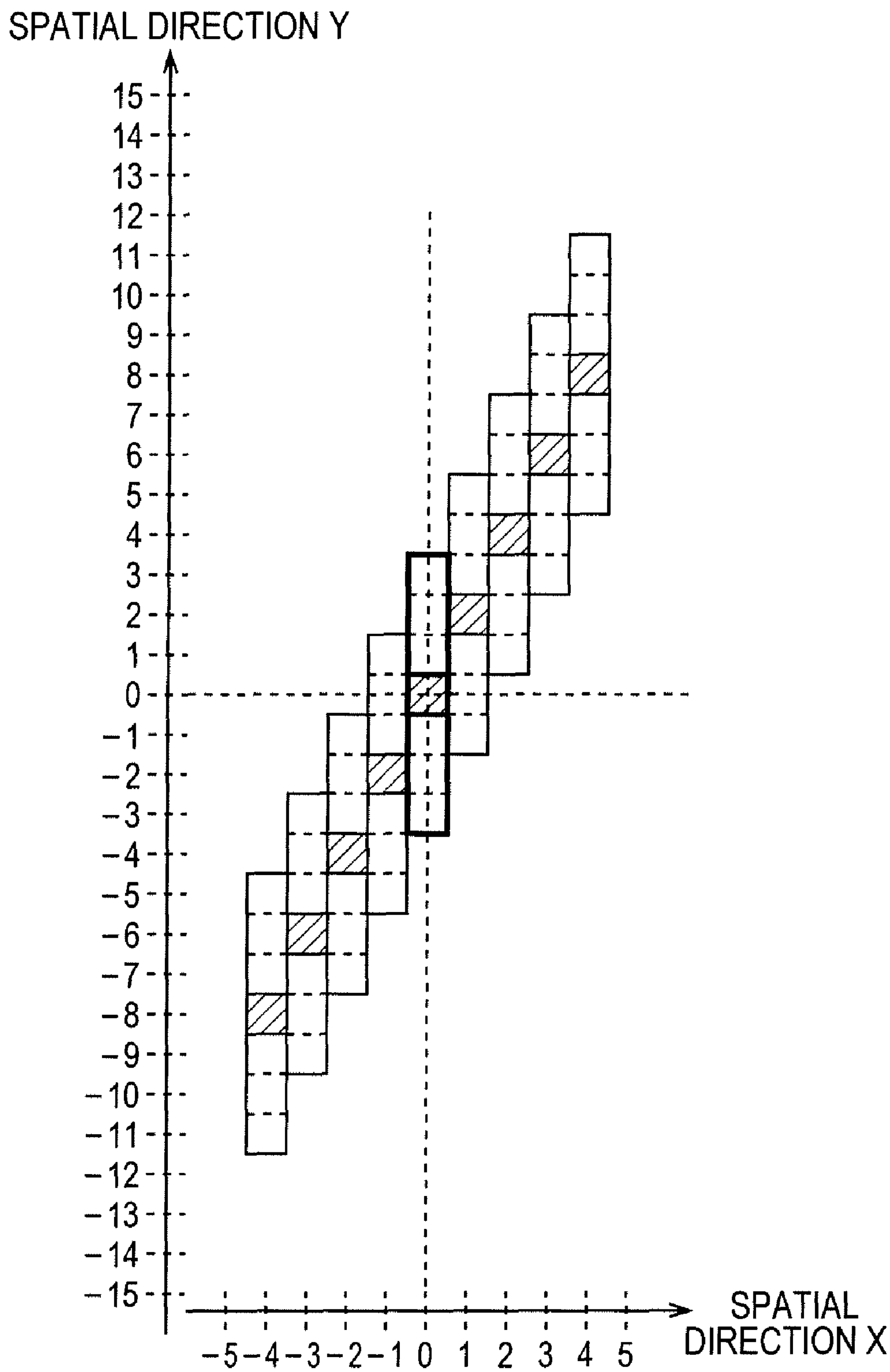
FIG. 87 is a diagram for describing the number of pixel sets and the number of pixels per pixel set.

As shown in FIG. 87, for example, in the event that the angle of the set straight line is 63.4 degrees, the pixel selecting unit 421-3 selects seven pixels centered on the pixel of interest from one vertical row of pixels as to the pixel of interest, as a pixel set, and also selects as pixel sets seven pixels each from pixels belonging to one row of pixels each on the left side and the right side of the pixel of interest within four pixels therefrom in the horizontal direction. That is to say, the pixel selecting unit 421-3 selects nine pixel sets each made up of seven pixels, from the input image. In this case, of the pixels selected as the pixels at the closest position to the set straight line the pixel which is at the farthest position from the pixel of interest is at a position eight pixels in the vertical direction as to the pixel of interest.

Figure 88:
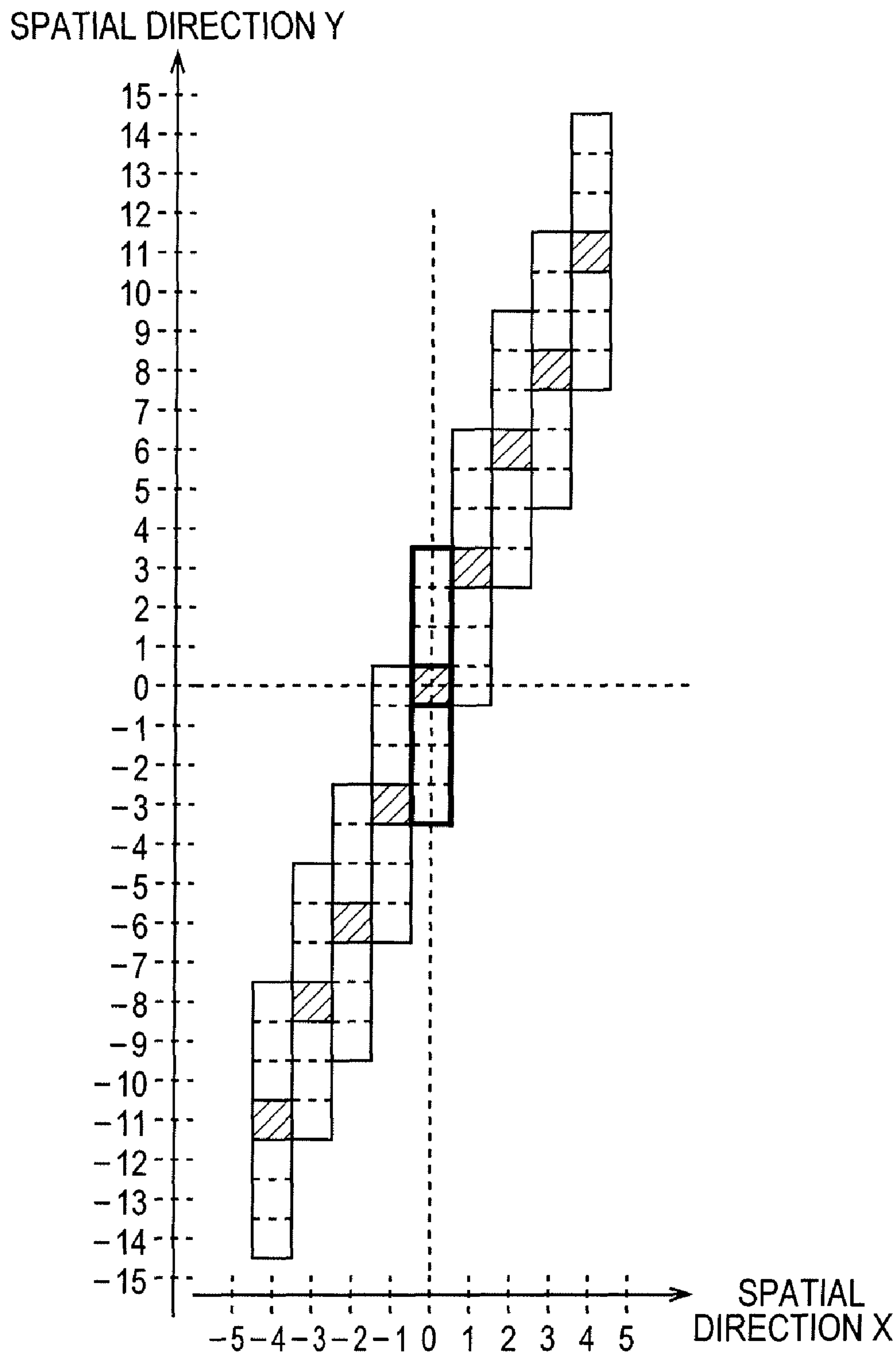
FIG. 88 is a diagram for describing the number of pixel sets and the number of pixels per pixel set.

As shown in FIG. 88, for example, in the event that the angle of the set straight line is 70.0 degrees, the pixel selecting unit 421-4 selects seven pixels centered on the pixel of interest from one vertical row of pixels as to the pixel of interest, as a pixel set, and also selects as pixel sets seven pixels each from pixels belonging to one row of pixels each on the left side and the right side of the pixel of interest within four pixels therefrom in the horizontal direction. That is to say, the pixel selecting unit 421-4 selects nine pixel sets each made up of seven pixels, from the input image. In this case, of the pixels selected as the pixels at the closest position to the set straight line the pixel which is at the farthest position from the pixel of interest is at a position 11 pixels in the vertical direction as to the pixel of interest.

For example, as shown in FIG. 83 and FIG. 84, in the event that the angle of the set straight line is 71.6 degrees or greater but smaller than 76.0 degrees (the range indicated by C in FIG. 83 and FIG. 84), the pixel selecting unit 421-1 through pixel selecting unit 421-L select nine pixels centered on the pixel of interest from one vertical row of pixels as to the pixel of interest, as a pixel set, and also select as pixel sets nine pixels each from pixels belonging to one row of pixels each on the left side and the right side of the pixel of interest within three pixels therefrom in the horizontal direction.

That is to say, in the event that the angle of the set straight line is 71.6 degrees or greater but smaller than 76.0 degrees, the pixel selecting unit 421-1 through pixel selecting unit 421-L select seven pixel sets each made up of nine pixels, from the input image. In this case, the pixel selected as the pixel which is at the closest position to the set straight line is at a position nine pixels to 11 pixels in the vertical direction as to the pixel of interest.

Figure 89:
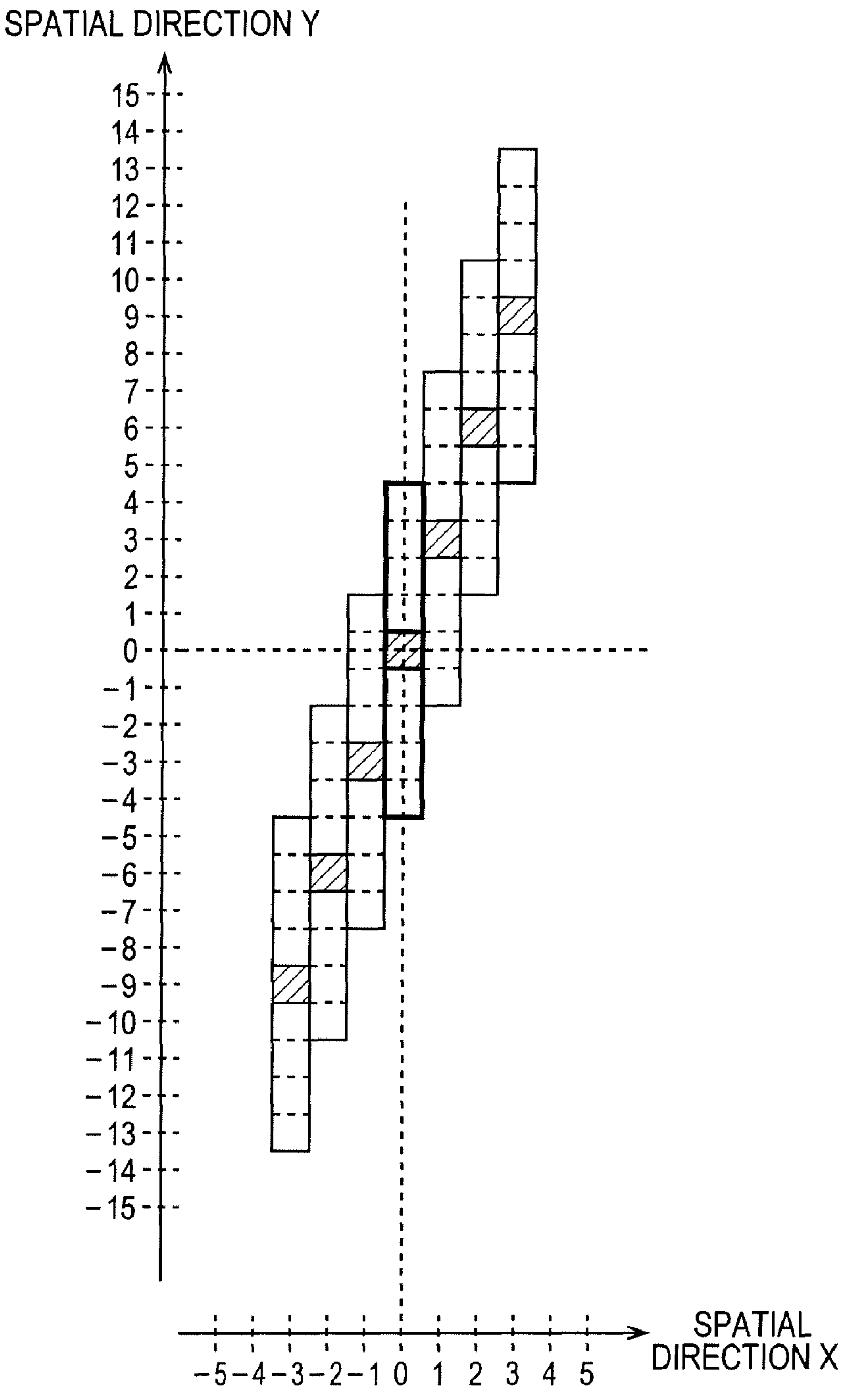
FIG. 89 is a diagram for describing the number of pixel sets and the number of pixels per pixel set.

As shown in FIG. 89, for example, in the event that the angle of the set straight line is 71.6 degrees, the pixel selecting unit 421-5 selects nine pixels centered on the pixel of interest from one vertical row of pixels as to the pixel of interest, as a pixel set, and also selects as pixel sets nine pixels each from pixels belonging to one row of pixels each on the left side and the right side of the pixel of interest within three pixels therefrom in the horizontal direction. That is to say, the pixel selecting unit 421-5 selects seven pixel sets each made up of nine pixels, from the input image. In this case, of the pixels selected as the pixels at the closest position to the set straight line the pixel which is at the farthest position from the pixel of interest is at a position nine pixels in the vertical direction as to the pixel of interest.

Figure 90:
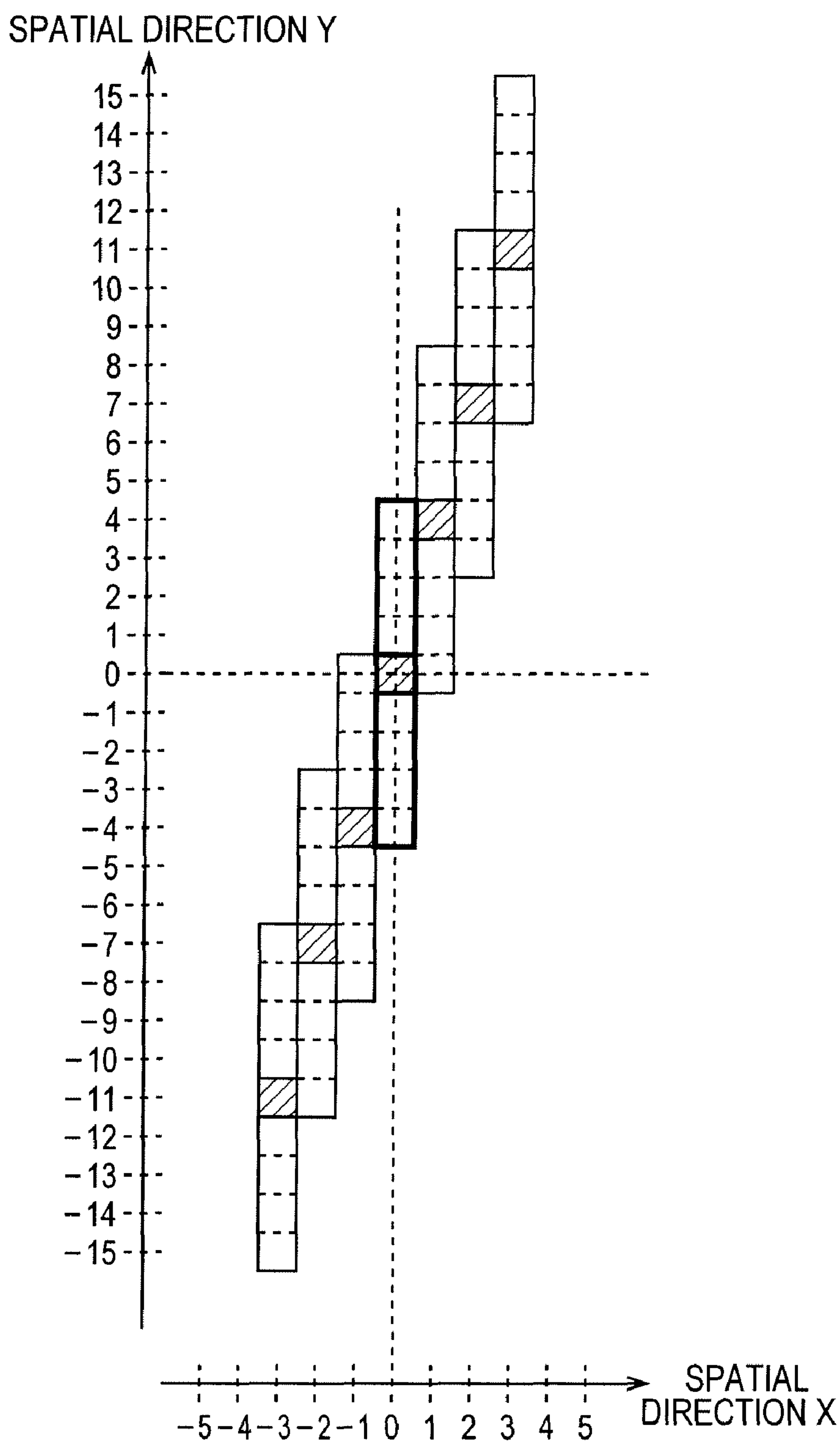
FIG. 90 is a diagram for describing the number of pixel sets and the number of pixels per pixel set.

Also, As shown in FIG. 90, for example, in the event that the angle of the set straight line is 74.7 degrees, the pixel selecting unit 421-6 selects nine pixels centered on the pixel of interest from one vertical row of pixels as to the pixel of interest, as a pixel set, and also selects as pixel sets nine pixels each from pixels belonging to one row of pixels each on the left side and the right side of the pixel of interest within three pixels therefrom in the horizontal direction. That is to say, the pixel selecting unit 421-6 selects seven pixel sets each made up of nine pixels, from the input image. In this case, of the pixels selected as the pixels at the closest position to the set straight line the pixel which is at the farthest position from the pixel of interest is at a position 11 pixels in the vertical direction as to the pixel of interest.

For example, as shown in FIG. 83 and FIG. 84, in the event that the angle of the set straight line is 76.0 degrees or greater but smaller than 87.7 degrees (the range indicated by D in FIG. 83 and FIG. 84), the pixel selecting unit 421-1 through pixel selecting unit 421-L select 11 pixels centered on the pixel of interest from one vertical row of pixels as to the pixel of interest, as a pixel set, and also select as pixel sets 11 pixels each from pixels belonging to one row of pixels each on the left side and the right side of the pixel of interest within two pixels therefrom in the horizontal direction. That is to say, in the event that the angle of the set straight line is 76.0 degrees or greater but smaller than 87.7 degrees, the pixel selecting unit 421-1 through pixel selecting unit 421-L select five pixel sets each made up of 11 pixels, from the input image. In this case, the pixel selected as the pixel which is at the closest position to the set straight line is at a position eight pixels to 50 pixels in the vertical direction as to the pixel of interest.

Figure 91:
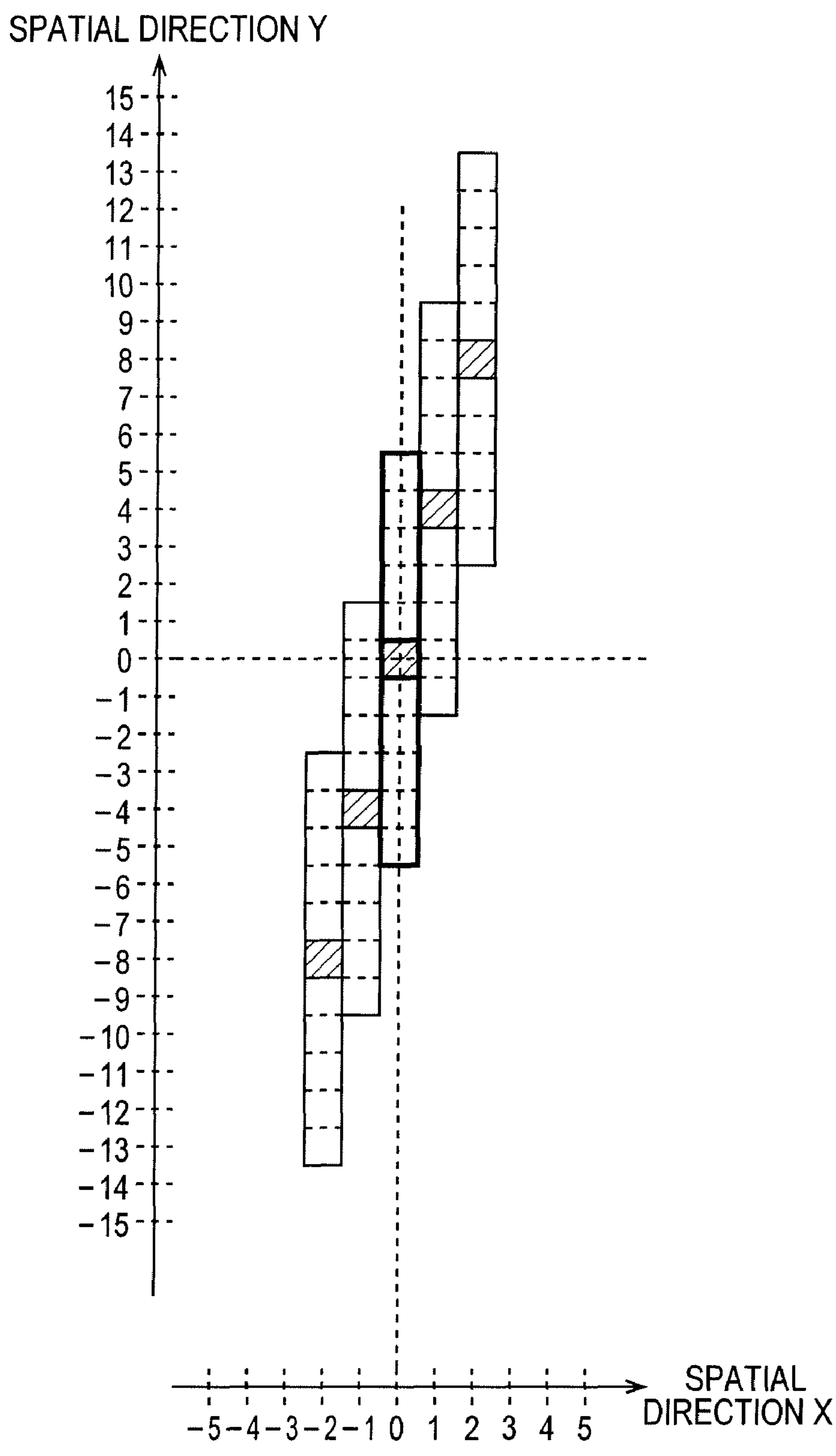
FIG. 91 is a diagram for describing the number of pixel sets and the number of pixels per pixel set.

As shown in FIG. 91, for example, in the event that the angle of the set straight line is 76.0 degrees, the pixel selecting unit 421-7 selects 11 pixels centered on the pixel of interest from one vertical row of pixels as to the pixel of interest, as a pixel set, and also selects as pixel sets 11 pixels each from pixels belonging to one row of pixels each on the left side and the right side of the pixel of interest within two pixels therefrom in the horizontal direction. That is to say, the pixel selecting unit 421-7 selects five pixel sets each made up of 11 pixels, from the input image. In this case, of the pixels selected as the pixels at the closest position to the set straight line the pixel which is at the farthest position from the pixel of interest is at a position eight pixels in the vertical direction as to the pixel of interest.

Figure 92:
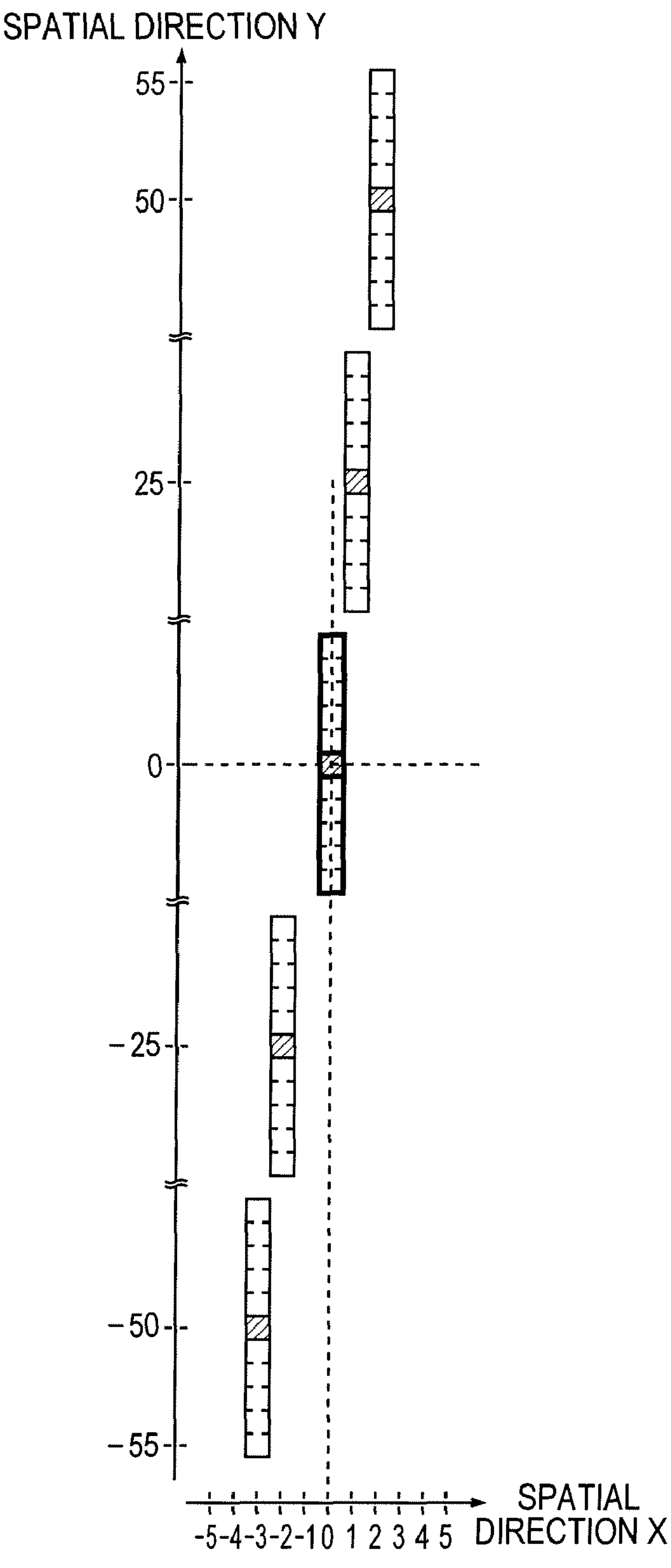
FIG. 92 is a diagram for describing the number of pixel sets and the number of pixels per pixel set.

Also, as shown in FIG. 92, for example, in the event that the angle of the set straight line is 87.7 degrees, the pixel selecting unit 421-8 selects 11 pixels centered on the pixel of interest from one vertical row of pixels as to the pixel of interest, as a pixel set, and also selects as pixel sets 11 pixels each from pixels belonging to one row of pixels each on the left side and the right side of the pixel of interest within two pixels therefrom in the horizontal direction. That is to say, the pixel selecting unit 421-8 selects five pixel sets each made up of 11 pixels, from the input image. In this case, of the pixels selected as the pixels at the closest position to the set straight line the pixel which is at the farthest position from the pixel of interest is at a position 50 pixels in the vertical direction as to the pixel of interest.

Thus, the pixel selecting unit 421-1 through pixel selecting unit 421-L each select a predetermined number of pixels sets corresponding to the range of the angle, made up of a predetermined number of pixels corresponding to the range of the angle.

The pixel selecting unit 421-1 supplies the selected pixel sets to an estimated error calculating unit 422-1, and the pixel selecting unit 421-2 supplies the selected pixel sets to an estimated error calculating unit 422-2. In the same way, the pixel selecting unit 421-3 through pixel selecting unit 421-L supply the selected pixel sets to estimated error calculating unit 422-3 through estimated error calculating unit 422-L.

The estimated error calculating unit 422-1 through estimated error calculating unit 422-L detect the correlation of pixel values of the pixels at corresponding positions in the multiple sets supplied from each of the pixel selecting unit 421-1 through pixel selecting unit 421-L. For example, the estimated error calculating unit 422-1 through estimated error calculating unit 422-L calculate the sum of absolute values of difference between the pixel values of the pixels of the pixel set including the pixel of interest, and of the pixel values of the pixels at corresponding positions in the other multiple sets, supplied from each of the pixel selecting unit 421-1 through pixel selecting unit 421-L, and divides the calculated sum by the number of pixels contained in the pixel sets other than the pixel set containing the pixel of interest. The reason for dividing the calculated sum by the number of pixels contained in sets other than the set containing the pixel of interest is to normalize the value indicating the correlation, since the number of pixels selected differs according to the angle of the straight line that has been set.

The estimated error calculating unit 422-1 through estimated error calculating unit 422-L supply the detected information indicating correlation to the smallest error angle selecting unit 413. For example, the estimated error calculating unit 422-1 through estimated error calculating unit 422-L supply the normalized sum of difference of the pixel values to the smallest error angle selecting unit 413.

Next, the processing of the pixel selecting unit 421-1 through pixel selecting unit 421-L in the event that the angle of the data continuity indicated by activity information is any value 0 degrees to 45 degrees and 135 degrees to 180 degrees, will be described.

The pixel selecting unit 421-1 through pixel selecting unit 421-L set straight lines of mutually differing predetermined angles which pass through the pixel of interest with the axis indicating the spatial direction X as a reference, in the range of 0 degrees to 45 degrees or 135 degrees to 180 degrees.

The pixel selecting unit 421-1 through pixel selecting unit 421-L select, from pixels belonging to one horizontal row of pixels to which the pixel of interest belongs, pixels to the left side of the pixel of interest of a number corresponding to the range of angle of the set line, pixels to the right side of the pixel of interest of a number corresponding to the range of angle of the set line, and the selected pixel, as a pixel set.

The pixel selecting unit 421-1 through pixel selecting unit 421-L select, from pixels belonging to one horizontal line each above and below as to the one horizontal row of pixels to which the pixel of interest belongs, a predetermined distance away therefrom in the vertical direction with the pixel as a reference, pixels closest to the straight lines set for each, and selects, from one horizontal row of pixels as to the selected pixel, pixels to the left side of the selected pixel of a number corresponding to the range of angle of the set line, pixels to the right side of the selected pixel of a number corresponding to the range of angle of the set line, and the selected pixel, as a pixel set.

That is to say, the pixel selecting unit 421-1 through pixel selecting unit 421-L select pixels of a number corresponding to the range of angle of the set line as pixel sets. The pixel selecting unit 421-1 through pixel selecting unit 421-L select pixels sets of a number corresponding to the range of angle of the set line.

The pixel selecting unit 421-1 supplies the selected set of pixels to the estimated error calculating unit 422-1, and the pixel selecting unit 421-2 supplies the selected set of pixels to the estimated error calculating unit 422-2. In the same way, each pixel selecting unit 421-3 through pixel selecting unit 421-L supplies the selected set of pixels to each estimated error calculating unit 422-3 through estimated error calculating unit 422-L.

The estimated error calculating unit 422-1 through estimated error calculating unit 422-L detect the correlation of pixel values of the pixels at corresponding positions in the multiple sets supplied from each of the pixel selecting unit 421-1 through pixel selecting unit 421-L.

The estimated error calculating unit 422-1 through estimated error calculating unit 422-L supply the detected information indicating correlation to the smallest error angle selecting unit 413.

Figure 93:
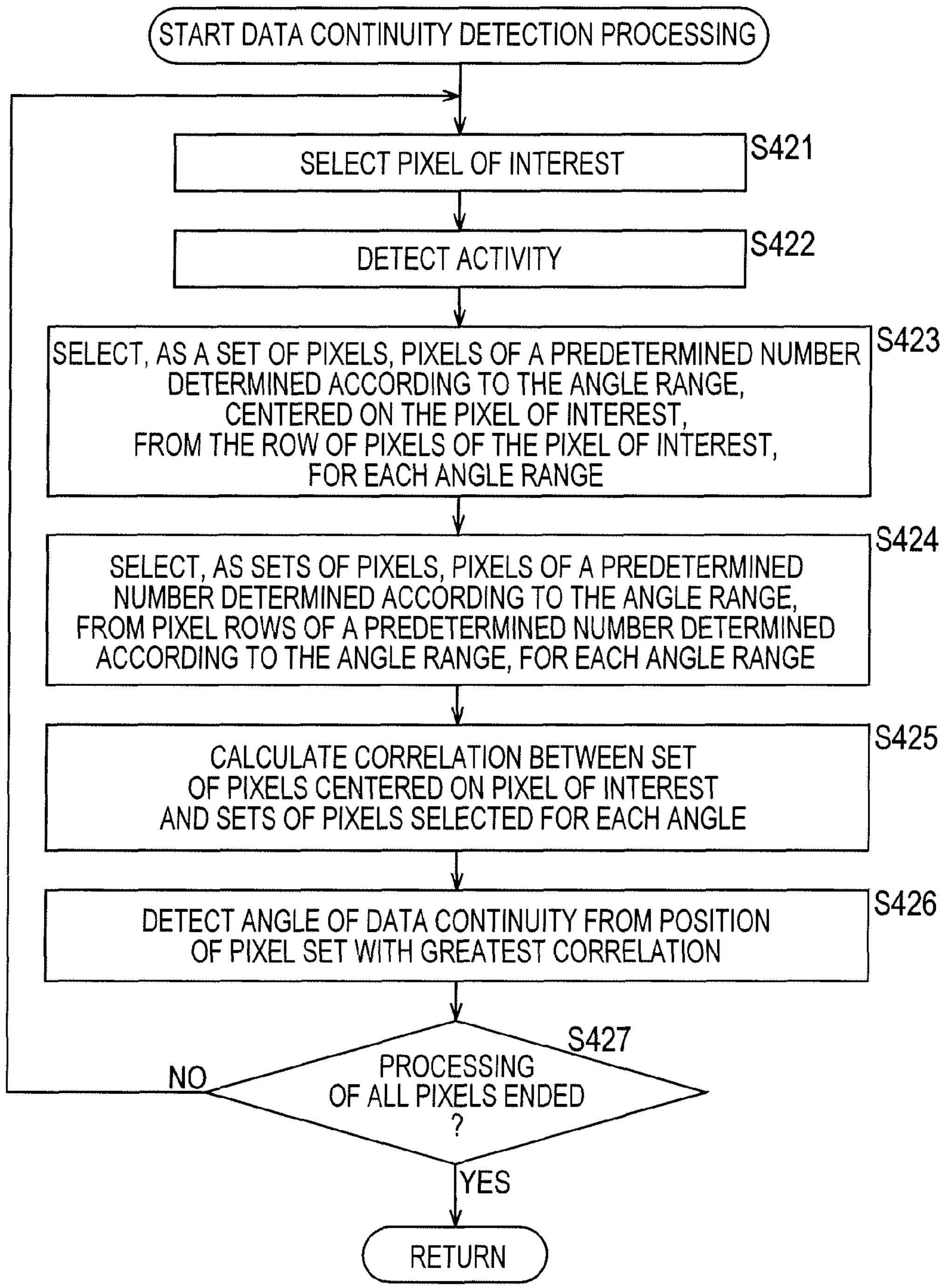
FIG. 93 is a flowchart for describing processing for detecting data continuity.

Next, the processing for data continuity detection with the data continuity detecting unit 101 of which the configuration is shown in FIG. 81, corresponding to the processing in step S101, will be described with reference to the flowchart shown in FIG. 93.

The processing of step S421 and step S422 is the same as the processing of step S401 and step S402, so description thereof will be omitted.

In step S423, the data selecting unit 402 selects, from a row of pixels containing a pixel of interest, a number of pixels predetermined with regard to the range of the angle which are centered on the pixel of interest, as a set of pixels, for each angle of a range corresponding to the activity detected in the processing in step S422. For example, the data selecting unit 402 selects from pixels belonging to one vertical or horizontal row of pixels, pixels of a number determined by the range of angle, for the angle of the straight line to be set, above or to the left of the pixel of interest, below or to the right of the pixel of interest, and the pixel of interest, as a pixel set.

In step S424, the data selecting unit 402 selects, from pixel rows of a number determined according to the range of angle, pixels of a number determined according to the range of angle, as a pixel set, for each predetermined angle range, based on the activity detected in the processing in step S422. For example, the data selecting unit 402 sets a straight line passing through the pixel of interest with an angle of a predetermined range, taking an axis representing the spatial direction X as a reference axis, selects a pixel closest to the straight line while being distanced from the pixel of interest in the horizontal direction or the vertical direction by a predetermined range according to the range of angle of the straight line to be set, and selects pixels of a number corresponding to the range of angle of the straight line to be set from above or to the left side of the selected pixel, pixels of a number corresponding to the range of angle of the straight line to be set from below or to the right side of the selected pixel, and the pixel closest to the selected line, as a pixel set. The data selecting unit 402 selects a set of pixels for each angle.

The data selecting unit 402 supplies the selected pixel sets to the error estimating unit 403.

In step S425, the error estimating unit 403 calculates the correlation between the pixel set centered on the pixel of interest, and the pixel set selected for each angle. For example, the error estimating unit 403 calculates the sum of absolute values of difference between the pixel values of pixels of the set including the pixel of interest and the pixel values of pixels at corresponding positions in the other sets, and divides the sum of absolute values of difference between the pixel values by the number of pixels belonging to the other sets, thereby calculating the correlation.

An arrangement may be made wherein the data continuity angle is detected based on the mutual correlation between the pixel sets selected for each angle.

The error estimating unit 403 supplies the information indicating the calculated correlation to the continuity derivation unit 404.

The processing of step S426 and step S427 is the same as the processing of step S406 and step S407, so description thereof will be omitted.

Thus, the data continuity detecting unit 101 can detect the angle of data continuity based on a reference axis in the image data, corresponding to the lost actual world 1 light signal continuity, more accurately and precisely. With the data continuity detecting unit 101 of which the configuration is shown in FIG. 81, the correlation of a greater number of pixels where the fine line image has been projected can be evaluated particularly in the event that the data continuity angle is around 45 degrees, so the angle of data continuity can be detected with higher precision.

Note that an arrangement may be made with the data continuity detecting unit 101 of which the configuration is shown in FIG. 81 as well, wherein activity in the spatial direction of the input image is detected for a certain pixel of interest which is the pixel of interest in a frame of interest which is the frame of interest, and from sets of pixels of a number determined according to the spatial angle range in one vertical row or one horizontal row, pixels of a number corresponding to the spatial angle range are extracted, from the frame of interest and frames previous to or following the frame of interest time-wise, for each angle and movement vector based on the pixel of interest and the reference axis in the spatial direction, according to the detected activity, the correlation of the extracted pixel sets is detected, and the data continuity angle in the time direction and the spatial direction in the input image is detected based on the correlation.

Figure 94:
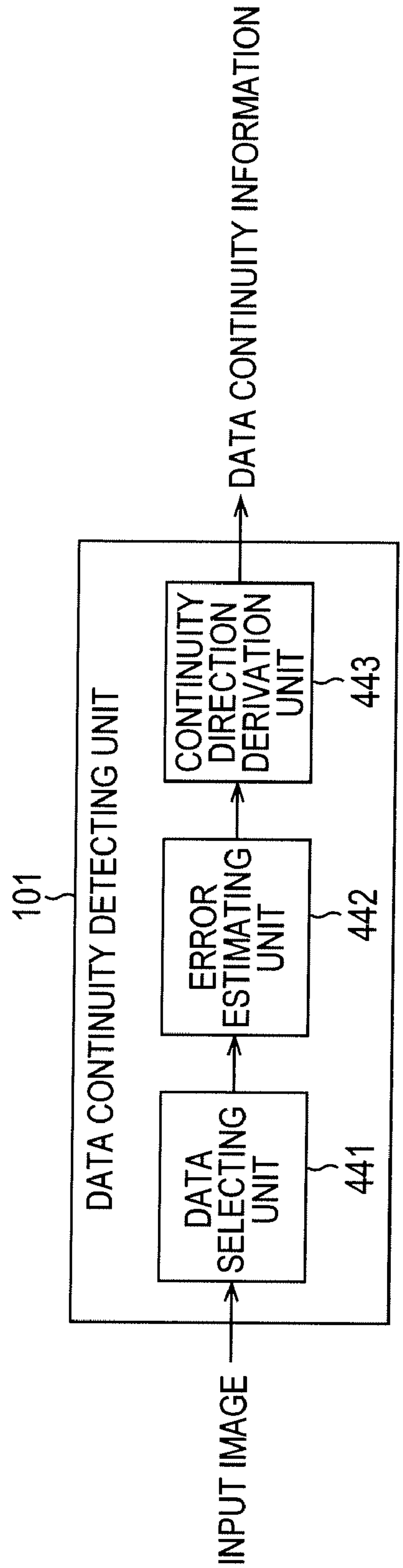
FIG. 94 is a block diagram illustrating still another configuration of the data continuity detecting unit 101.

FIG. 94 is a block diagram illustrating yet another configuration of the data continuity detecting unit 101.

With the data continuity detecting unit 101 of which the configuration is shown in FIG. 94, with regard to a pixel of interest which is the pixel of interest, a block made up of a predetermined number of pixels centered on the pixel of interest, and multiple blocks each made up of a predetermined number of pixels around the pixel of interest, are extracted, the correlation of the block centered on the pixel of interest and the surrounding blocks is detected, and the angle of data continuity in the input image based on a reference axis is detected, based on the correlation.

A data selecting unit 441 sequentially selects the pixel of interest from the pixels of the input image, extracts the block made of the predetermined number of pixels centered on the pixel of interest and the multiple blocks made up of the predetermined number of pixels surrounding the pixel of interest, and supplies the extracted blocks to an error estimating unit 442.

For example, the data selecting unit 441 extracts a block made up of 5×5 pixels centered on the pixel of interest, and two blocks made up of 5×5 pixels from the surroundings of the pixel of interest for each predetermined angle range based on the pixel of interest and the reference axis.

The error estimating unit 442 detects the correlation between the block centered on the pixel of interest and the blocks in the surroundings of the pixel of the interest supplied from the data selecting unit 441, and supplies correlation information indicating the detected correlation to a continuity direction derivation unit 443.

For example, the error estimating unit 442 detects the correlation of pixel values with regard to a block made up of 5×5 pixels centered on the pixel of interest for each angle range, and two blocks made up of 5×5 pixels corresponding to one angle range.

From the position of the block in the surroundings of the pixel of interest with the greatest correlation based on the correlation information supplied from the error estimating unit 442, the continuity direction derivation unit 443 detects the angle of data continuity in the input image based on the reference axis, that corresponds to the lost actual world 1 light signal continuity, and outputs data continuity information indicating this angle. For example, the continuity direction derivation unit 443 detects the range of the angle regarding the two blocks made up of 5×5 pixels from the surroundings of the pixel of interest which have the greatest correlation with the block made up of 5×5 pixels centered on the pixel of interest, as the angle of data continuity, based on the correlation information supplied from the error estimating unit 442, and outputs data continuity information indicating the detected angle.

Figure 95:
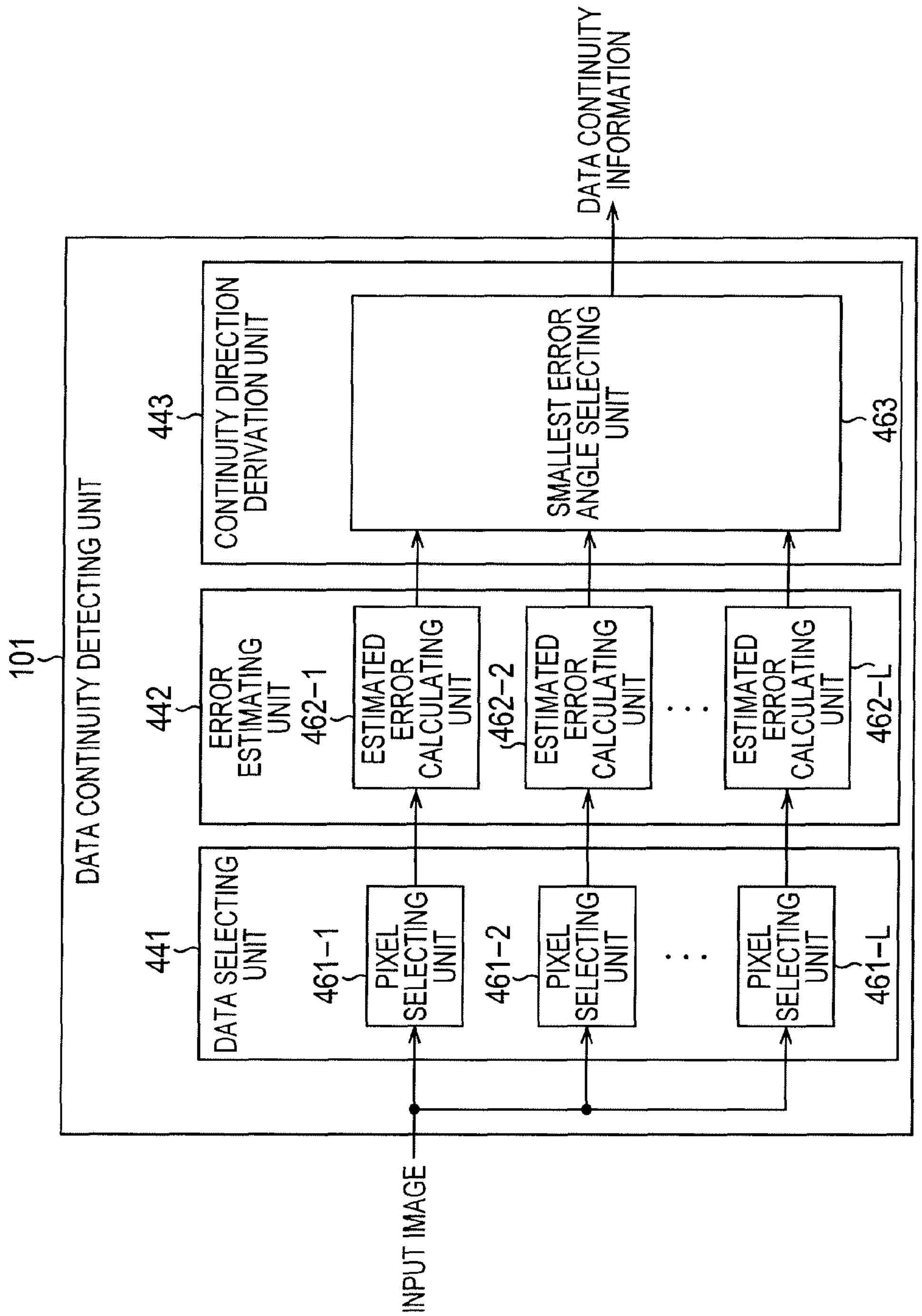
FIG. 95 is a block diagram illustrating a further detailed configuration of the data continuity detecting unit 101.

FIG. 95 is a block diagram illustrating a more detailed configuration of the data continuity detecting unit 101 shown in FIG. 94.

The data selecting unit 441 includes pixel selecting unit 461-1 through pixel selecting unit 461-L. The error estimating unit 442 includes estimated error calculating unit 462-1 through estimated error calculating unit 462-L. The continuity direction derivation unit 443 includes a smallest error angle selecting unit 463.

For example, the data selecting unit 441 has pixel selecting unit 461-1 through pixel selecting unit 461-8. The error estimating unit 442 has estimated error calculating unit 462-1 through estimated error calculating unit 462-8.

Each of the pixel selecting unit 461-1 through pixel selecting unit 461-L extracts a block made up of a predetermined number of pixels centered on the pixel of interest, and two blocks made up of a predetermined number of pixels according to a predetermined angle range based on the pixel of interest and the reference axis.

Figure 96:
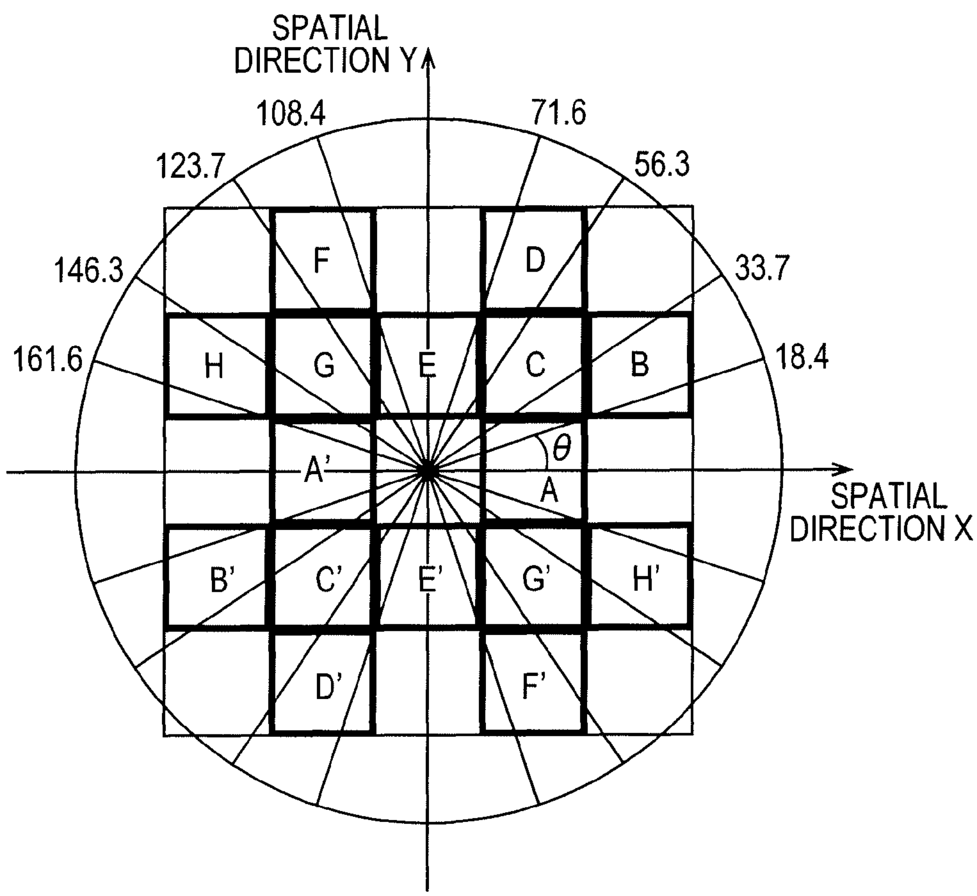
FIG. 96 is a diagram illustrating an example of a block.

FIG. 96 is a diagram for describing an example of a 5×5 pixel block extracted by the pixel selecting unit 461-1 through pixel selecting unit 461-L. The center position in FIG. 96 indicates the position of the pixel of interest.

Note that a 5×5 pixel block is only an example, and the number of pixels contained in a block do not restrict the present invention.

For example, the pixel selecting unit 461-1 extracts a 5×5 pixel block centered on the pixel of interest, and also extracts a 5×5 pixel block (indicated by A in FIG. 96) centered on a pixel at a position shifted five pixels to the right side from the pixel of interest, and extracts a 5×5 pixel block (indicated by A' in FIG. 96) centered on a pixel at a position shifted five pixels to the left side from the pixel of interest, corresponding to 0 degrees to 18.4 degrees and 161.6 degrees to 180.0 degrees. The pixel selecting unit 461-1 supplies the three extracted 5×5 pixel blocks to the estimated error calculating unit 462-1.

The pixel selecting unit 461-2 extracts a 5×5 pixel block centered on the pixel of interest, and also extracts a 5×5 pixel block (indicated by B in FIG. 96) centered on a pixel at a position shifted 10 pixels to the right side from the pixel of interest and five pixels upwards, and extracts a 5×5 pixel block (indicated by B' in FIG. 96) centered on a pixel at a position shifted 10 pixels to the left side from the pixel of interest and five pixels downwards, corresponding to the range of 18.4 degrees through 33.7 degrees. The pixel selecting unit 461-2 supplies the three extracted 5×5 pixel blocks to the estimated error calculating unit 462-2.

The pixel selecting unit 461-3 extracts a 5×5 pixel block centered on the pixel of interest, and also extracts a 5×5 pixel block (indicated by C in FIG. 96) centered on a pixel at a position shifted five pixels to the right side from the pixel of interest and five pixels upwards, and extracts a 5×5 pixel block (indicated by C' in FIG. 96) centered on a pixel at a position shifted five pixels to the left side from the pixel of interest and five pixels downwards, corresponding to the range of 33.7 degrees through 56.3 degrees. The pixel selecting unit 461-3 supplies the three extracted 5×5 pixel blocks to the estimated error calculating unit 462-3.

The pixel selecting unit 461-4 extracts a 5×5 pixel block centered on the pixel of interest, and also extracts a 5×5 pixel block (indicated by D in FIG. 96) centered on a pixel at a position shifted five pixels to the right side from the pixel of interest and 10 pixels upwards, and extracts a 5×5 pixel block (indicated by D' in FIG. 96) centered on a pixel at a position shifted five pixels to the left side from the pixel of interest and 10 pixels downwards, corresponding to the range of 56.3 degrees through 71.6 degrees. The pixel selecting unit 461-4 supplies the three extracted 5×5 pixel blocks to the estimated error calculating unit 462-4.

The pixel selecting unit 461-5 extracts a 5×5 pixel block centered on the pixel of interest, and also extracts a 5×5 pixel block (indicated by E in FIG. 96) centered on a pixel at a position shifted five pixels upwards from the pixel of interest, and extracts a 5×5 pixel block (indicated by E' in FIG. 96) centered on a pixel at a position shifted five pixels downwards from the pixel of interest, corresponding to the range of 71.6 degrees through 108.4 degrees. The pixel selecting unit 461-5 supplies the three extracted 5×5 pixel blocks to the estimated error calculating unit 462-5.

The pixel selecting unit 461-6 extracts a 5×5 pixel block centered on the pixel of interest, and also extracts a 5×5 pixel block (indicated by F in FIG. 96) centered on a pixel at a position shifted five pixels to the left side from the pixel of interest and 10 pixels upwards, and extracts a 5×5 pixel block (indicated by F' in FIG. 96) centered on a pixel at a position shifted five pixels to the right side from the pixel of interest and 10 pixels downwards, corresponding to the range of 108.4 degrees through 123.7 degrees. The pixel selecting unit 461-6 supplies the three extracted 5×5 pixel blocks to the estimated error calculating unit 462-6.

The pixel selecting unit 461-7 extracts a 5×5 pixel block centered on the pixel of interest, and also extracts a 5×5 pixel block (indicated by G in FIG. 96) centered on a pixel at a position shifted five pixels to the left side from the pixel of interest and five pixels upwards, and extracts a 5×5 pixel block (indicated by G' in FIG. 96) centered on a pixel at a position shifted five pixels to the right side from the pixel of interest and five pixels downwards, corresponding to the range of 123.7 degrees through 146.3 degrees. The pixel selecting unit 461-7 supplies the three extracted 5×5 pixel blocks to the estimated error calculating unit 462-7.

The pixel selecting unit 461-8 extracts a 5×5 pixel block centered on the pixel of interest, and also extracts a 5×5 pixel block (indicated by H in FIG. 96) centered on a pixel at a position shifted 10 pixels to the left side from the pixel of interest and five pixels upwards, and extracts a 5×5 pixel block (indicated by H' in FIG. 96) centered on a pixel at a position shifted 10 pixels to the right side from the pixel of interest and five pixels downwards, corresponding to the range of 146.3 degrees through 161.6 degrees. The pixel selecting unit 461-8 supplies the three extracted 5×5 pixel blocks to the estimated error calculating unit 462-8.

Hereafter, a block made up of a predetermined number of pixels centered on the pixel of interest will be called a block of interest.

Hereafter, a block made up of a predetermined number of pixels corresponding to a predetermined range of angle based on the pixel of interest and reference axis will be called a reference block.

In this way, the pixel selecting unit 461-1 through pixel selecting unit 461-8 extract a block of interest and reference blocks from a range of 25×25 pixels, centered on the pixel of interest, for example.

The estimated error calculating unit 462-1 through estimated error calculating unit 462-L detect the correlation between the block of interest and the two reference blocks supplied from the pixel selecting unit 461-1 through pixel selecting unit 461-L, and supplies correlation information indicating the detected correlation to the smallest error angle selecting unit 463.

For example, the estimated error calculating unit 462-1 calculates the absolute value of difference between the pixel values of the pixels contained in the block of interest and the pixel values of the pixels contained in the reference block, with regard to the block of interest made up of 5×5 pixels centered on the pixel of interest, and the 5×5 pixel reference block centered on a pixel at a position shifted five pixels to the right side from the pixel of interest, extracted corresponding to 0 degrees to 18.4 degrees and 161.6 degrees to 180.0 degrees.

Figure 97:
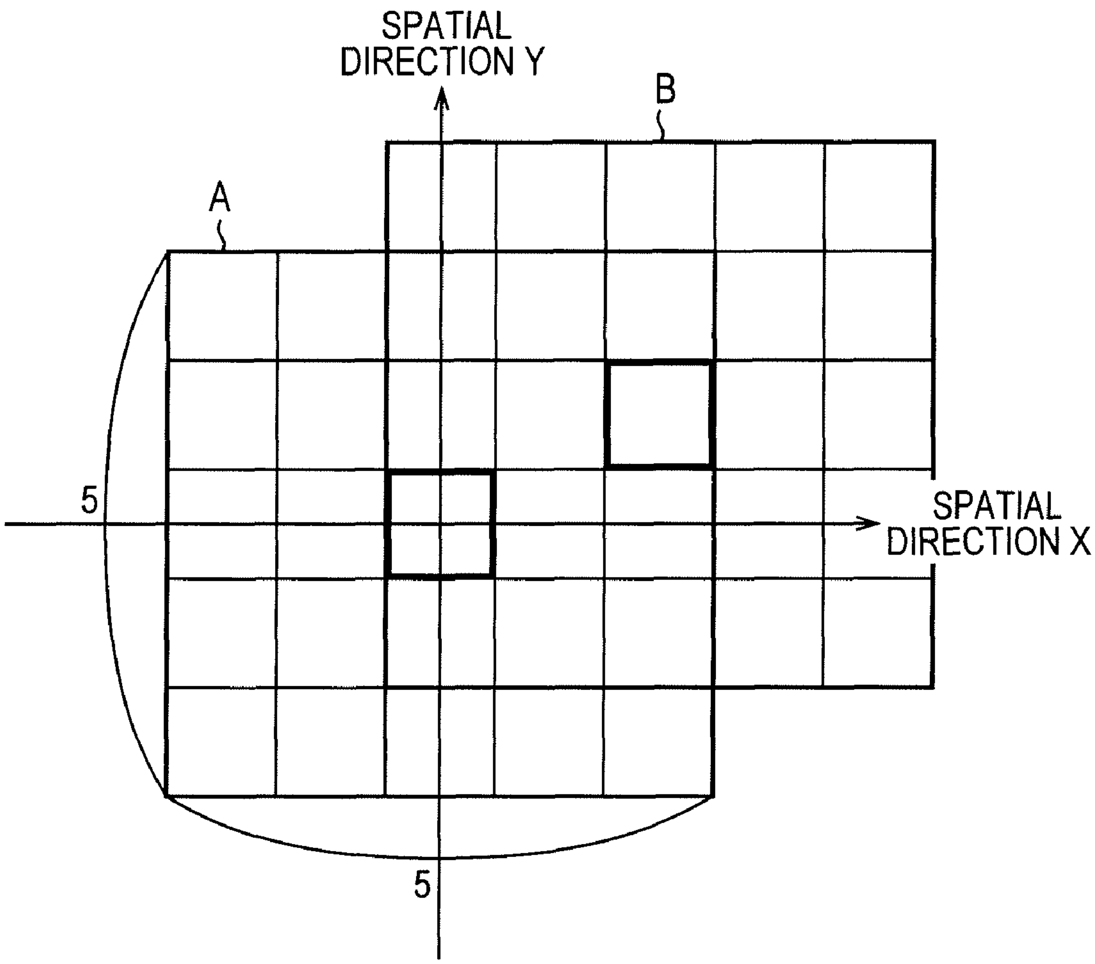
FIG. 97 is a diagram describing the processing for calculating the absolute value of difference of pixel values between a block of interest and a reference block.

In this case, as shown in FIG. 97, in order for the pixel value of the pixel of interest to be used on the calculation of the absolute value of difference of pixel values, with the position where the center pixel of the block of interest and the center pixel of the reference block overlap as a reference, the estimated error calculating unit 462-1 calculates the absolute value of difference of pixel values of pixels at positions overlapping in the event that the position of the block of interest is shifted to any one of two pixels to the left side through two pixels to the right side and any one of two pixels upwards through two pixels downwards as to the reference block. This means that the absolute value of difference of the pixel values of pixels at corresponding positions in 25 types of positions of the block of interest and the reference block. In other words, in a case wherein the absolute values of difference of the pixel values are calculated, the range formed of the block of interest moved relatively and the reference block is 9×9 pixels.

In FIG. 97, the square represent pixels, A represents the reference block, and B represents the block of interest. In FIG. 97, the heavy lines indicate the pixel of interest. That is to say, FIG. 97 is a diagram illustrating a case wherein the block of interest has been shifted two pixels to the right side and one pixel upwards, as to the reference block.

Further, the estimated error calculating unit 462-1 calculates the absolute value of difference between the pixel values of the pixels contained in the block of interest and the pixel values of the pixels contained in the reference block, with regard to the block of interest made up of 5×5 pixels centered on the pixel of interest, and the 5×5 pixel reference block centered on a pixel at a position shifted five pixels to the left side from the pixel of interest, extracted corresponding to 0 degrees to 18.4 degrees and 161.6 degrees to 180.0 degrees.

The estimated error calculating unit 462-1 then obtains the sum of the absolute values of difference that have been calculated, and supplies the sum of the absolute values of difference to the smallest error angle selecting unit 463 as correlation information indicating correlation.

The estimated error calculating unit 462-2 calculates the absolute value of difference between the pixel values with regard to the block of interest made up of 5×5 pixels and the two 5×5 reference pixel blocks extracted corresponding to the range of 18.4 degrees to 33.7 degrees, and further calculates sum of the absolute values of difference that have been calculated. The estimated error calculating unit 462-1 supplies the sum of the absolute values of difference that has been calculated to the smallest error angle selecting unit 463 as correlation information indicating correlation.

In the same way, the estimated error calculating unit 462-3 through estimated error calculating unit 462-8 calculate the absolute value of difference between the pixel values with regard to the block of interest made up of 5×5 pixels and the two 5×5 pixel reference blocks extracted corresponding to the predetermined angle ranges, and further calculate sum of the absolute values of difference that have been calculated. The estimated error calculating unit 462-3 through estimated error calculating unit 462-8 each supply the sum of the absolute values of difference to the smallest error angle selecting unit 463 as correlation information indicating correlation.

The smallest error angle selecting unit 463 detects, as the data continuity angle, the angle corresponding to the two reference blocks at the reference block position where, of the sums of the absolute values of difference of pixel values serving as correlation information supplied from the estimated error calculating unit 462-1 through estimated error calculating unit 462-8, the smallest value indicating the strongest correlation has been obtained, and outputs data continuity information indicating the detected angle.

Now, description will be made regarding the relationship between the position of the reference blocks and the range of angle of data continuity.

In a case of approximating an approximation function f(x) for approximating actual world signals with an n-order one-dimensional polynomial, the approximation function f(x) can be expressed by Expression (30).

$$f(x) = w_0x^n + w_1x^{n-1} + \ldots + w_{n-1}x + w_n = \sum_{i=0}^{n} w_i x^{n-i} \quad (30)$$

In the event that the waveform of the signal of the actual world 1 approximated by the approximation function f(x) has a certain gradient (angle) as to the spatial direction Y, the approximation function (x, y) for approximating actual world 1 signals is expressed by Expression (31) which has been obtained by taking x in Expression (30) as x+γy.

$$f(x, y) = w_0(x+\gamma y)^n + w_1(x+\gamma y)^{n-1} + \ldots + w_{n-1}(x+\gamma y) + w_n = \sum_{i=0}^{n} w_i(x+\gamma y)^{n-i} \quad (31)$$

γ represents the ratio of change in position in the spatial direction X as to the change in position in the spatial direction Y. Hereafter, γ will also be called amount of shift.

Figure 98:
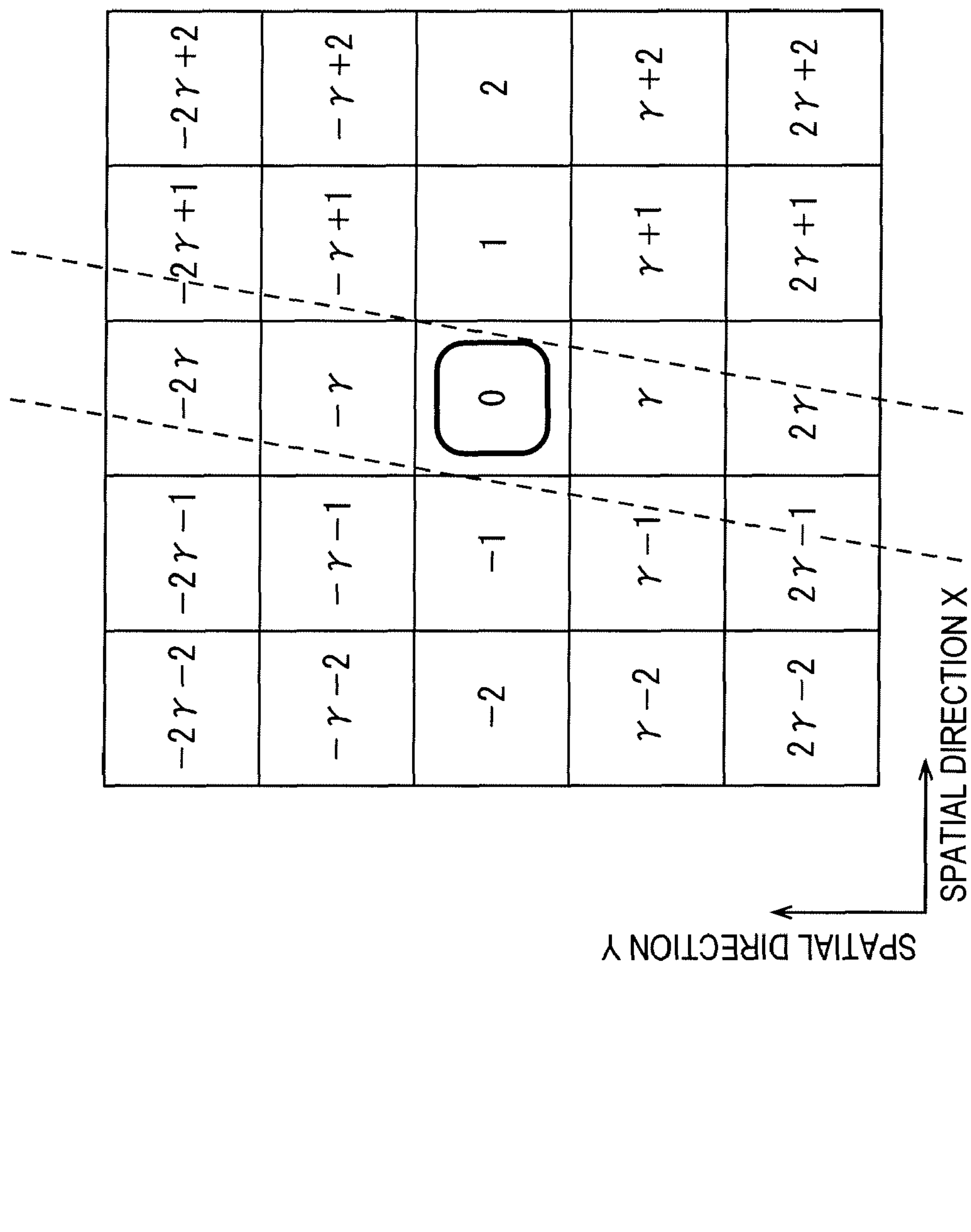
FIG. 98 is a diagram describing the distance in the spatial direction X between the position of a pixel in the proximity of the pixel of interest, and a straight line having an angle $\theta$.
Figure 99:
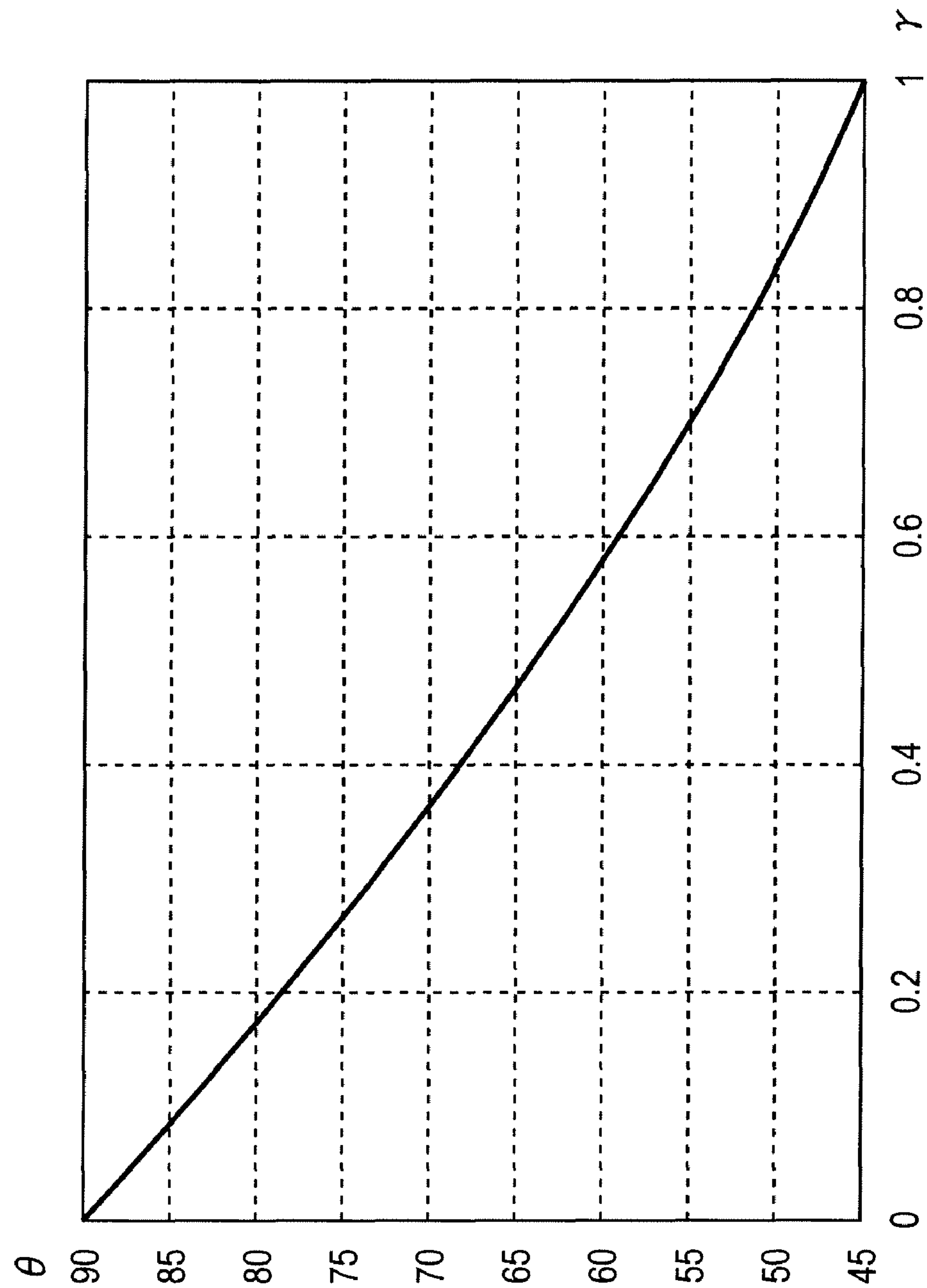
FIG. 99 is a diagram illustrating the relationship between the shift amount $\gamma$ and angle $\theta$.

FIG. 98 is a diagram illustrating the distance to a straight line having an angle θ in the spatial direction X from the position of surrounding pixels of the pixel of interest in a case wherein the distance in the spatial direction X between the position of the pixel of interest and the straight line having the angle θ is 0, i.e., wherein the straight line passes through the pixel of interest. Here, the position of the pixel is the center of the pixel. Also, in the event that the position is to the left side of the straight line, the distance between the position and the straight line is indicated by a negative value, and in the event that the position is to the right side of the straight line, is indicated by a positive value.

For example, the distance in the spatial direction X between the position of the pixel adjacent to the pixel of interest on the right side, i.e., the position where the coordinate x in the spatial direction X increases by 1, and the straight line having the angle θ, is 1, and the distance in the spatial direction X between the position of the pixel adjacent to the pixel of interest on the left side, i.e., the position where the coordinate x in the spatial direction X decreases by 1, and the straight line having the angle θ, is −1. The distance in the spatial direction X between the position of the pixel adjacent to the pixel of interest above, i.e., the position where the coordinate y in the spatial direction Y increases by 1, and the straight line having the angle θ, is −γ, and the distance in the spatial direction X between the position of the pixel adjacent to the pixel of interest below, i.e., the position where the coordinate y in the spatial direction Y decreases by 1, and the straight line having the angle θ, is γ.

In the event that the angle θ exceeds 45 degrees but is smaller than 90 degrees, and the amount of shift γ exceeds 0 but is smaller than 1, the relational expression of γ=1/tan θ holds between the amount of shift γ and the angle θ. FIG, 99 is a diagram illustrating the relationship between the amount of shift γ and the angle θ.

Now, let us take note of the change in distance in the spatial direction X between the position of a pixel nearby the pixel of interest, and the straight line which passes through the pixel of interest and has the angle θ, as to change in the amount of shift γ.

Figure 100:
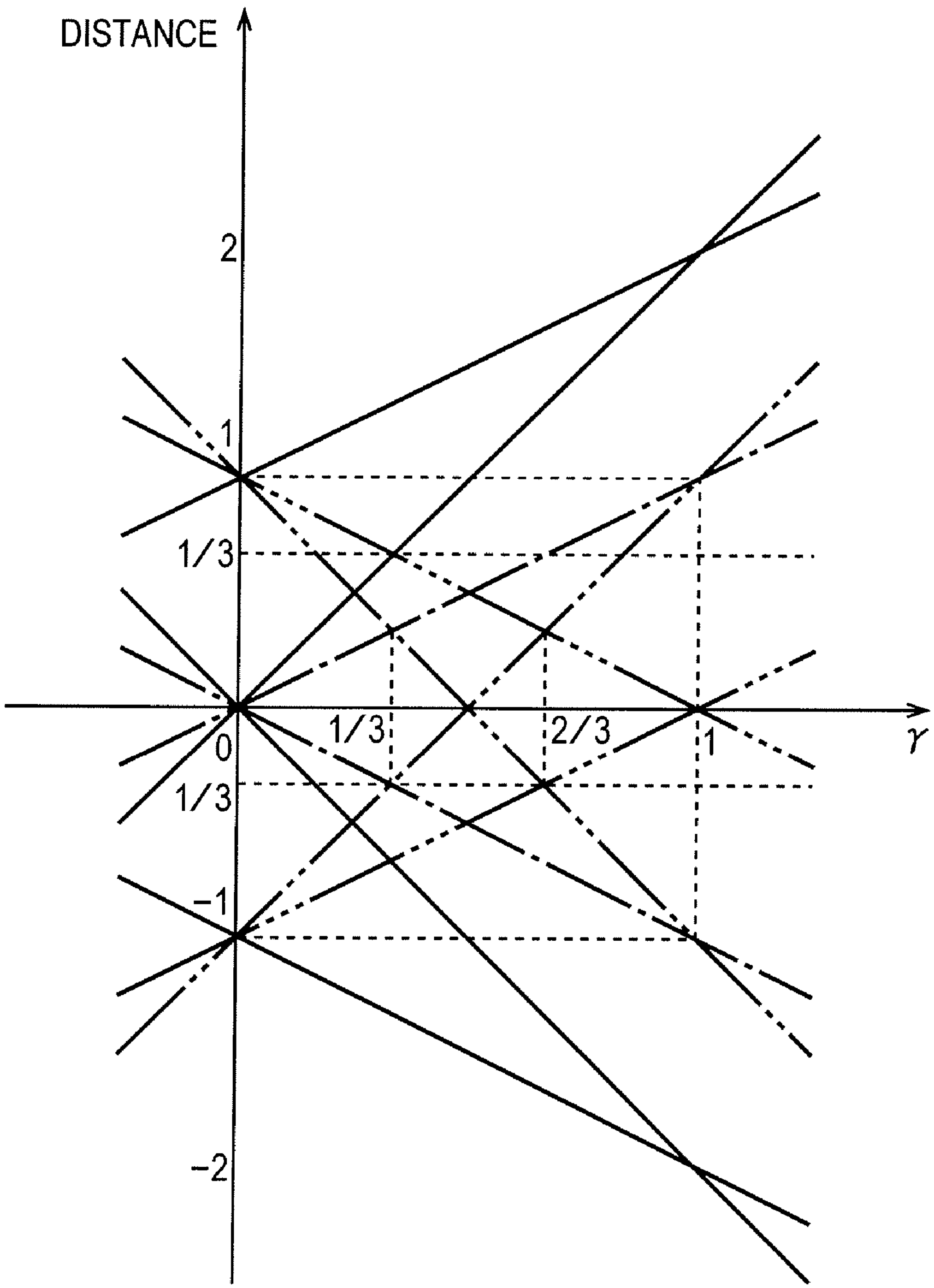
FIG. 100 is a diagram illustrating the distance in the spatial direction X between the position of a pixel in the proximity of the pixel of interest and a straight line which passes through the pixel of interest and has an angle of θ, as to the shift amount γ.

FIG. 100 is a diagram illustrating the distance in the spatial direction X between the position of a pixel nearby the pixel of interest and the straight line which passes through the pixel of interest and has the angle θ, as to the amount of shift γ. In FIG. 100, the single-dot broken line which heads toward the upper right indicates the distance in the spatial direction X between the position of a pixel adjacent to the pixel of interest on the bottom side, and the straight line, as to the amount of shift γ. The single-dot broken line which heads toward the lower left indicates the distance in the spatial direction X between the position of a pixel adjacent to the pixel of interest on the top side, and the straight line, as to the amount of shift γ.

In FIG. 100, the two-dot broken line which heads toward the upper right indicates the distance in the spatial direction X between the position of a pixel two pixels below the pixel of interest and one to the left, and the straight line, as to the amount of shift γ; the two-dot broken line which heads toward the lower left indicates the distance in the spatial direction X between the position of a pixel two pixels above the pixel of interest and one to the right, and the straight line, as to the amount of shift γ.

In FIG. 100, the three-dot broken line which heads toward the upper right indicates the distance in the spatial direction X between the position of a pixel one pixel below the pixel of interest and one to the left, and the straight line, as to the amount of shift γ; the three dot broken line which heads toward the lower left indicates the distance in the spatial direction X between the position of a pixel one pixel above the pixel of interest and one to the right, and the straight line, as to the amount of shift γ.

The pixel with the smallest distance as to the amount of shift γ can be found from FIG. 100.

That is to say, in the event that the amount of shift γ is 0 through ⅓, the distance to the straight line is minimal from a pixel adjacent to the pixel of interest on the top side and from a pixel adjacent to the pixel of interest on the bottom side. That is to say, in the event that the angle θ is 71.6 degrees to 90 degrees, the distance to the straight line is minimal from the pixel adjacent to the pixel of interest on the top side and from the pixel adjacent to the pixel of interest on the bottom side.

In the event that the amount of shift γ is ⅓ through ⅔, the distance to the straight line is minimal from a pixel two pixels above the pixel of interest and one to the right and from a pixel two pixels below the pixel of interest and one to the left. That is to say, in the event that the angle θ is 56.3 degrees to 71.6 degrees, the distance to the straight line is minimal from the pixel two pixels above the pixel of interest and one to the right and from a pixel two pixels below the pixel of interest and one to the left.

In the event that the amount of shift γ is ⅔ through 1, the distance to the straight line is minimal from a pixel one pixel above the pixel of interest and one to the right and from a pixel one pixel below the pixel of interest and one to the left. That is to say, in the event that the angle θ is 45 degrees to 56.3 degrees, the distance to the straight line is minimal from the pixel one pixel above the pixel of interest and one to the right and from a pixel one pixel below the pixel of interest and one to the left.

The relationship between the straight line in a range of angle θ from 0 degrees to 45 degrees and a pixel can also be considered in the same way.

The pixels shown in FIG. 98 can be replaced with the block of interest and reference block, to consider the distance in the spatial direction X between the reference block and the straight line.

FIG. 101 shows the reference blocks wherein the distance to the straight line which passes through the pixel of interest and has an angle θ as to the axis of the spatial direction X is the smallest.

A through H and A' through H' in FIG. 101 represent the reference blocks A through H and A' through H' in FIG. 96.

That is to say, of the distances in the spatial direction X between a straight line having an angle θ which is any of 0 degrees through 18.4 degrees and 161.6 degrees through 180.0 degrees which passes through the pixel of interest with the axis of the spatial direction X as a reference, and each of the reference blocks A through H and A' through H', the distance between the straight line and the reference blocks A and A' is the smallest. Accordingly, following reverse logic, in the event that the correlation between the block of interest and the reference blocks A and A' is the greatest, this means that a certain feature is repeatedly manifested in the direction connecting the block of interest and the reference blocks A and A',so it can be said that the angle of data continuity is within the ranges of 0 degrees through 18.4 degrees and 161.6 degrees through 180.0 degrees.

Of the distances in the spatial direction X between a straight line having an angle θ which is any of 18.4 degrees through 33.7 degrees which passes through the pixel of interest with the axis of the spatial direction X as a reference, and each of the reference blocks A through H and A' through H',the distance between the straight line and the reference blocks B and B' is the smallest. Accordingly, following reverse logic, in the event that the correlation between the block of interest and the reference blocks B and B' is the greatest, this means that a certain feature is repeatedly manifested in the direction connecting the block of interest and the reference blocks B and B', so it can be said that the angle of data continuity is within the range of 18.4 degrees through 33.7 degrees.

Of the distances in the spatial direction X between a straight line having an angle θ which is any of 33.7 degrees through 56.3 degrees which passes through the pixel of interest with the axis of the spatial direction X as a reference, and each of the reference blocks A through H and A' through H', the distance between the straight line and the reference blocks C and C' is the smallest. Accordingly, following reverse logic, in the event that the correlation between the block of interest and the reference blocks C and C' is the greatest, this means that a certain feature is repeatedly manifested in the direction connecting the block of interest and the reference blocks C and C', so it can be said that the angle of data continuity is within the range of 33.7 degrees through 56.3 degrees.

Of the distances in the spatial direction X between a straight line having an angle θ which is any of 56.3 degrees through 71.6 degrees which passes through the pixel of interest with the axis of the spatial direction X as a reference, and each of the reference blocks A through H and A' through H', the distance between the straight line and the reference blocks D and D' is the smallest. Accordingly, following reverse logic, in the event that the correlation between the block of interest and the reference blocks D and D' is the greatest, this means that a certain feature is repeatedly manifested in the direction connecting the block of interest and the reference blocks D and D', so it can be said that the angle of data continuity is within the range of 56.3 degrees through 71.6 degrees.

Of the distances in the spatial direction X between a straight line having an angle θ which is any of 71.6 degrees through 108.4 degrees which passes through the pixel of interest with the axis of the spatial direction X as a reference, and each of the reference blocks A through H and A' through H', the distance between the straight line and the reference blocks E and E' is the smallest. Accordingly, following reverse logic, in the event that the correlation between the block of interest and the reference blocks E and E' is the greatest, this means that a certain feature is repeatedly manifested in the direction connecting the block of interest and the reference blocks E and E', so it can be said that the angle of data continuity is within the range of 71.6 degrees through 108.4 degrees.

Of the distances in the spatial direction X between a straight line having an angle θ which is any of 108.4 degrees through 123.7 degrees which passes through the pixel of interest with the axis of the spatial direction X as a reference, and each of the reference blocks A through H and A' through H', the distance between the straight line and the reference blocks F and F' is the smallest. Accordingly, following reverse logic, in the event that the correlation between the block of interest and the reference blocks F and F' is the greatest, this means that a certain feature is repeatedly manifested in the direction connecting the block of interest and the reference blocks F and F', so it can be said that the angle of data continuity is within the range of 108.4 degrees through 123.7 degrees.

Of the distances in the spatial direction X between a straight line having an angle θ which is any of 123.7 degrees through 146.3 degrees which passes through the pixel of interest with the axis of the spatial direction X as a reference, and each of the reference blocks A through H and A' through H', the distance between the straight line and the reference blocks G and G' is the smallest. Accordingly, following reverse logic, in the event that the correlation between the block of interest and the reference blocks G and G' is the greatest, this means that a certain feature is repeatedly manifested in the direction connecting the block of interest and the reference blocks G and G', so it can be said that the angle of data continuity is within the range of 123.7 degrees through 146.3 degrees.

Of the distances in the spatial direction X between a straight line having an angle θ which is any of 146.3 degrees through 161.6 degrees which passes through the pixel of interest with the axis of the spatial direction X as a reference, and each of the reference blocks A through H and A' through H', the distance between the straight line and the reference blocks H and H' is the smallest. Accordingly, following reverse logic, in the event that the correlation between the block of interest and the reference blocks H and H' is the greatest, this means that a certain feature is repeatedly manifested in the direction connecting the block of interest and the reference blocks H and H', so it can be said that the angle of data continuity is within the range of 146.3 degrees through 161.6 degrees.

Thus, the data continuity detecting unit 101 can detect the data continuity angle based on the correlation between the block of interest and the reference blocks.

Note that with the data continuity detecting unit 101 of which the configuration is shown in FIG. 94, an arrangement may be made wherein the angle range of data continuity is output as data continuity information, or an arrangement may be made wherein a representative value representing the range of angle of the data continuity is output as data continuity information. For example, the median value of the range of angle of the data continuity may serve as a representative value.

Further, with the data continuity detecting unit 101 of which the configuration is shown in FIG. 94, using the correlation between the block of interest and the reference blocks with the greatest correlation allows the angle range of data continuity to be detected to be halved, i.e., for the resolution of the angle of data continuity to be detected to be doubled.

Figure 102:
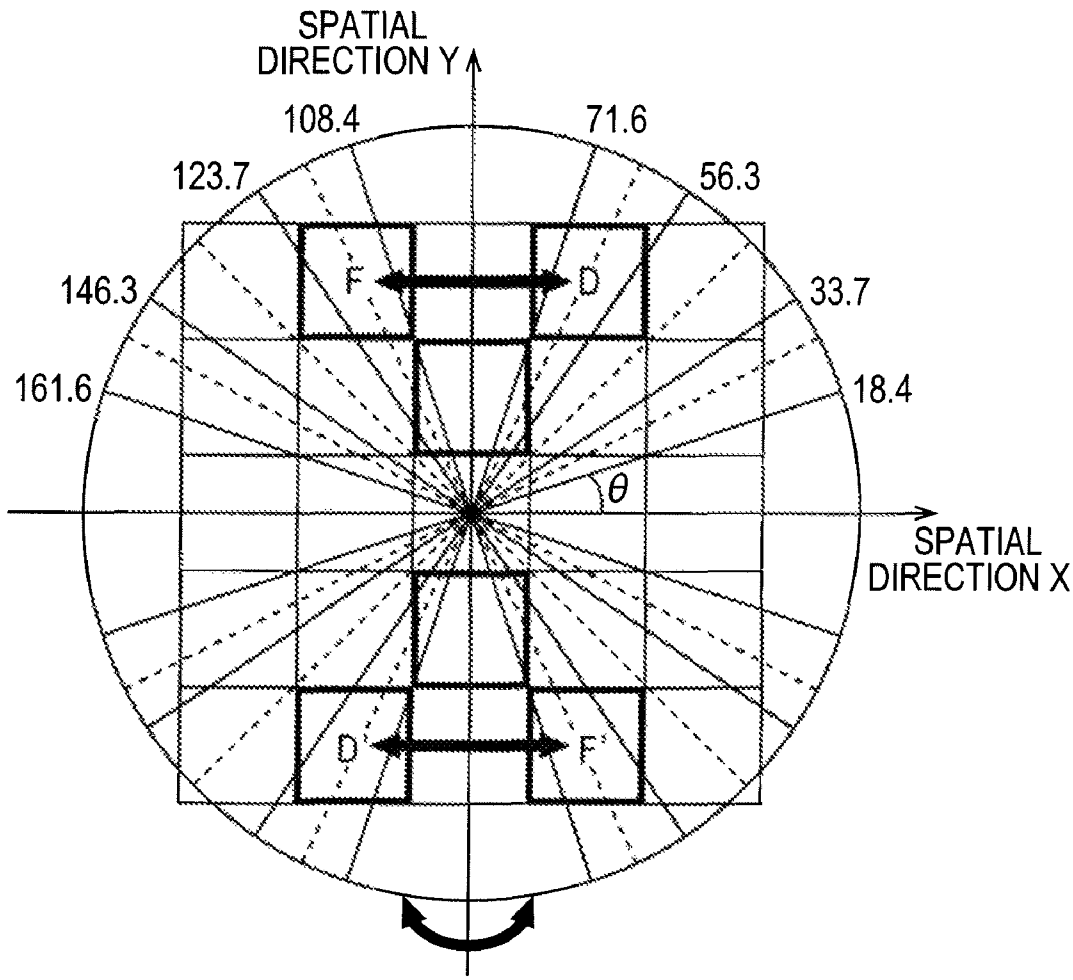
FIG. 102 is a diagram for describing processing for halving the range of angle of continuity of data to be detected.

For example, when the correlation between the block of interest and the reference blocks E and E' is the greatest, the smallest error angle selecting unit 463 compares the correlation of the reference blocks D and D' as to the block of interest with the correlation of the reference blocks F and F' as to the block of interest, as shown in FIG. 102. In the event that the correlation of the reference blocks D and D' as to the block of interest is greater than the correlation of the reference blocks F and F' as to the block of interest, the smallest error angle selecting unit 463 sets the range of 71.6 degrees to 90 degrees for the data continuity angle. Or, in this case, the smallest error angle selecting unit 463 may set 81 degrees for the data continuity angle as a representative value.

In the event that the correlation of the reference blocks F and F' as to the block of interest is greater than the correlation of the reference blocks D and D' as to the block of interest, the smallest error angle selecting unit 463 sets the range of 90 degrees to 108.4 degrees for the data continuity angle. Or, in this case, the smallest error angle selecting unit 463 may set 99 degrees for the data continuity angle as a representative value.

The smallest error angle selecting unit 463 can halve the range of the data continuity angle to be detected for other angle ranges as well, with the same processing.

The technique described with reference to FIG. 102 is also called simplified 16-directional detection.

Thus, the data continuity detecting unit 101 of which the configuration is shown in FIG. 94 can detect the angle of data continuity in narrower ranges, with simple processing.

Figure 103:
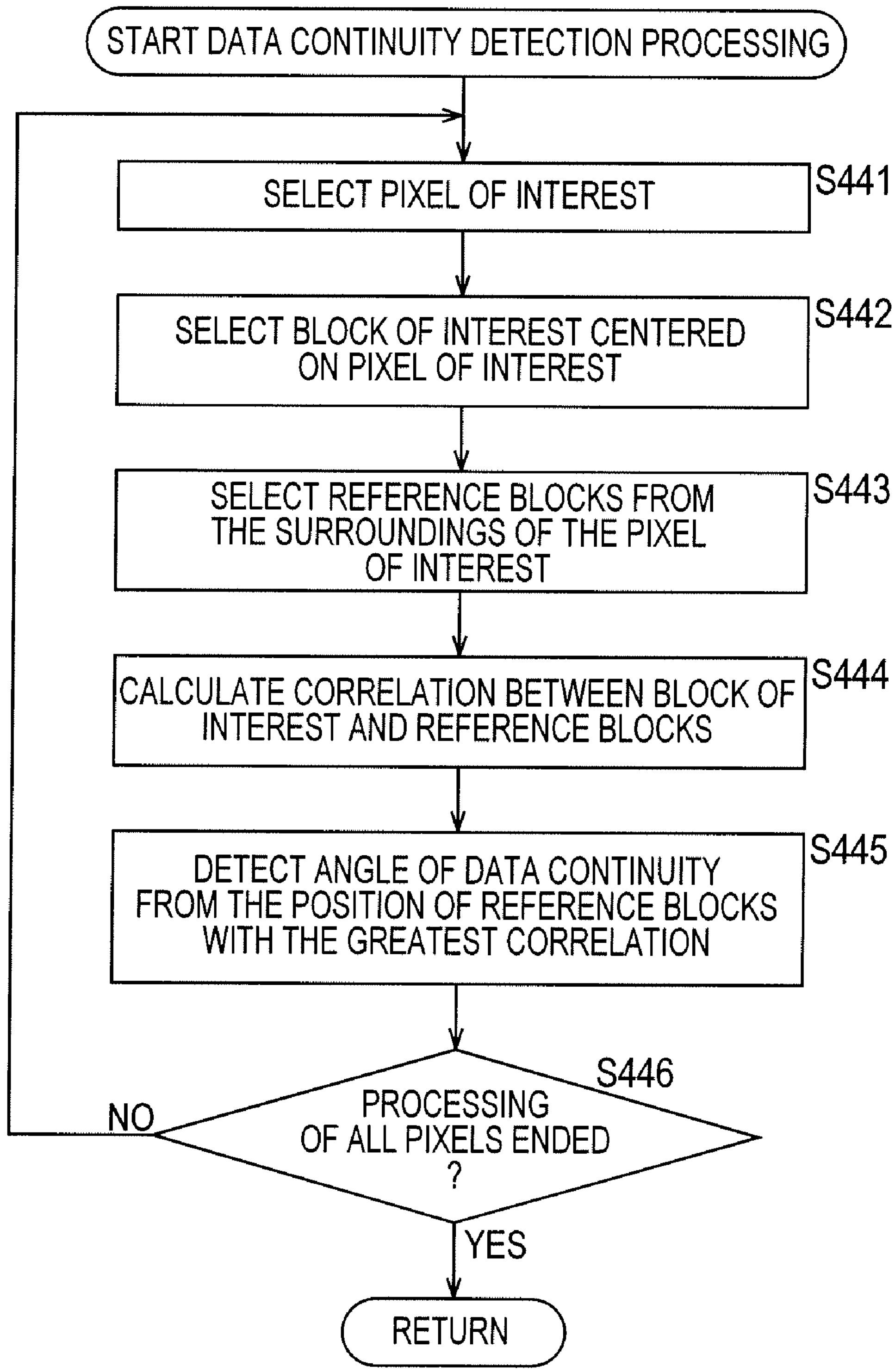
FIG. 103 is a flowchart for describing the processing for detection of data continuity.

Next, the processing for detecting data continuity with the data continuity detecting unit 101 of which the configuration is shown in FIG. 94, corresponding to the processing in step S101, will be described with reference to the flowchart shown in FIG. 103.

In step S441, the data selecting unit 441 selects the pixel of interest which is a pixel of interest from the input image. For example, the data selecting unit 441 selects the pixel of interest in raster scan order from the input image.

In step S442, the data selecting unit 441 selects a block of interest made up of a predetermined number of pixels centered on the pixel of interest. For example, the data selecting unit 441 selects a block of interest made up of 5×5 pixels centered on the pixel of interest.

In step S443, the data selecting unit 441 selects reference blocks made up of a predetermined number of pixels at predetermined positions at the surroundings of the pixel of interest. For example, the data selecting unit 441 selects reference blocks made up of 5×5 pixels centered on pixels at predetermined positions based on the size of the block of interest, for each predetermined angle range based on the pixel of interest and the reference axis.

The data selecting unit 441 supplies the block of interest and the reference blocks to the error estimating unit 442.

In step S444, the error estimating unit 442 calculates the correlation between the block of interest and the reference blocks corresponding to the range of angle, for each predetermined angle range based on the pixel of interest and the reference axis. The error estimating unit 442 supplies the correlation information indicating the calculated correlation to the continuity direction derivation unit 443.

In step S445, the continuity direction derivation unit 443 detects the angle of data continuity in the input image based on the reference axis, corresponding to the image continuity which is the lost actual world 1 light signals, from the position of the reference block which has the greatest correlation as to the block of interest.

The continuity direction derivation unit 443 outputs the data continuity information which indicates the detected data continuity angle.

In step S446, the data selecting unit 441 determines whether or not processing of all pixels has ended, and in the event that determination is made that processing of all pixels has not ended, the flow returns to step S441, a pixel of interest is selected from pixels not yet selected as the pixel of interest, and the above-described processing is repeated.

In step S446, in the event that determination is made that processing of all pixels has ended, the processing ends.

Thus, the data continuity detecting unit 101 of which the configuration is shown in FIG. 94 can detect the data continuity angle in the image data based on the reference axis, corresponding to the lost actual world 1 light signal continuity with easier processing. Also, the data continuity detecting unit 101 of which the configuration is shown in FIG. 94 can detect the angle of data continuity using pixel values of pixels of a relatively narrow range in the input image, so the angle of data continuity can be detected more accurately even in the event that noise and the like is in the input image.

Note that an arrangement may be made with the data continuity detecting unit 101 of which the configuration is shown in FIG. 94, wherein, with regard to a pixel of interest which is the pixel of interest in a frame of interest which is the frame of interest, in addition to extracting a block centered on the pixel of interest and made up of a predetermined number of pixels in the frame of interest, and multiple blocks each made up of a predetermined number of pixels from the surroundings of the pixel of interest, also extracting, from frames previous to or following the frame of interest time-wise, a block centered on a pixel at a position corresponding to the pixel of interest and made up of a predetermined number of pixels, and multiple blocks each made up of a predetermined number of pixels from the surroundings of the pixel centered on the pixel corresponding to the pixel of interest, and detecting the correlation between the block centered on the pixel of interest and blocks in the surroundings thereof space-wise or time-wise, so as to detect the angle of data continuity in the input image in the temporal direction and spatial direction, based on the correlation.

Figure 104:
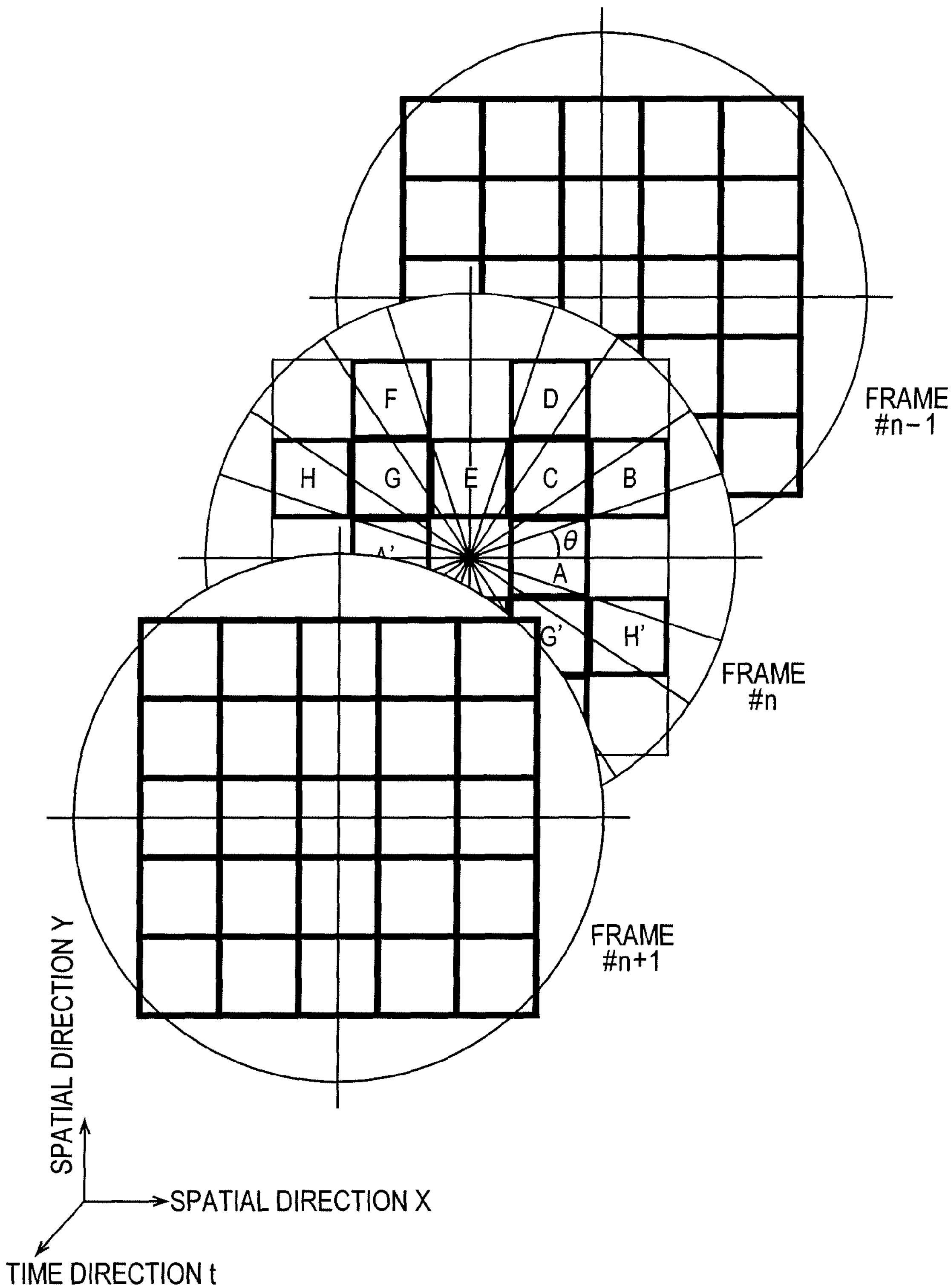
FIG. 104 is a diagram illustrating a block which is extracted at the time of detecting the angle of data continuity in the space direction and time direction.

For example, as shown in FIG. 104, the data selecting unit 441 sequentially selects the pixel of interest from the frame #n which is the frame of interest, and extracts from the frame #n a block centered on the pixel of interest and made up of a predetermined number of pixels and multiple blocks each made up of a predetermined number of pixels from the surroundings of the pixel of interest. Also, the data selecting unit 441 extracts from the frame #n−1 and frame #n+1 a block centered on the pixel at a position corresponding to the position of the pixel of interest and made up of a predetermined number of pixels and multiple blocks each made up of a predetermined number of pixels from the surroundings of a pixel at a position corresponding to the pixel of interest. The data selecting unit 441 supplies the extracted blocks to the error estimating unit 442.

The error estimating unit 442 detects the correlation between the block centered on the pixel of interest and the blocks in the surroundings thereof space-wise or time-wise, supplied from the data selecting unit 441, and supplies correlation information indicated the detected correlation to the continuity direction derivation unit 443. Based on the correlation information from the error estimating unit 442, the continuity direction derivation unit 443 detects the angle of data continuity in the input image in the space direction or time direction, corresponding to the lost actual world 1 light signal continuity, from the position of the block in the surroundings thereof space-wise or time-wise which has the greatest correlation, and outputs the data continuity information which indicates the angle.

Also, the data continuity detecting unit 101 can perform data continuity detection processing based on component signals of the input image.

Figure 105:
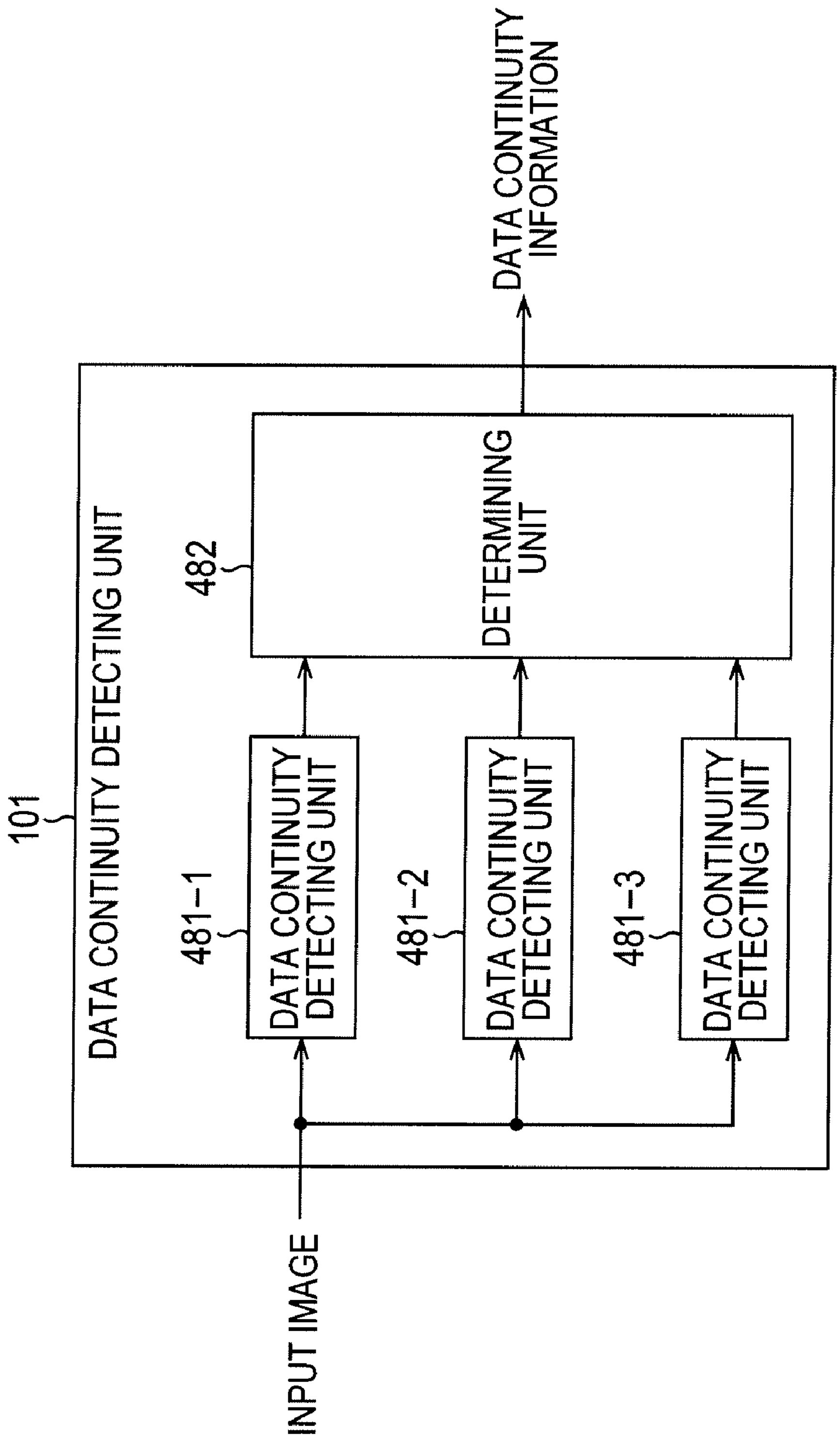
FIG. 105 is a block diagram illustrating the configuration of the data continuity detecting unit 101 which executes processing for detection of data continuity, based on components signals of an input image.

FIG. 105 is a block diagram illustrating the configuration of the data continuity detecting unit 101 for performing data continuity detection processing based on component signals of the input image.

Each of data continuity detecting units 481-1 through 481-3 have the same configuration as the above-described and or later-described data continuity detecting unit 101, and executes the above-described or later-described processing on each component signals of the input image.

The data continuity detecting unit 481-1 detects the data continuity based on the first component signal of the input image, and supplies information indicating the continuity of the data detected from the first component signal to a determining unit 482. For example, the data continuity detecting unit 481-1 detects data continuity based on the brightness signal of the input image, and supplies information indicating the continuity of the data detected from the brightness signal to the determining unit 482.

The data continuity detecting unit 481-2 detects the data continuity based on the second component signal of the input image, and supplies information indicating the continuity of the data detected from the second component signal to the determining unit 482. For example, the data continuity detecting unit 481-2 detects data continuity based on the I signal which is color difference signal of the input image, and supplies information indicating the continuity of the data detected from the I signal to the determining unit 482.

The data continuity detecting unit 481-3 detects the data continuity based on the third component signal of the input image, and supplies information indicating the continuity of the data detected from the third component signal to the determining unit 482. For example, the data continuity detecting unit 481-2 detects data continuity based on the Q signal which is the color difference signal of the input image, and supplies information indicating the continuity of the data detected from the Q signal to the determining unit 482.

The determining unit 482 detects the final data continuity of the input image based on the information indicating data continuity that has been detected from each of the component signals supplied from the data continuity detecting units 481-1 through 481-3, and outputs data continuity information indicating the detected data continuity.

For example, the detecting unit 482 takes as the final data continuity the greatest data continuity of the data continuities detected from each of the component signals supplied from the data continuity detecting units 481-1 through 481-3. Or, for example, the detecting unit 482 takes as the final data continuity the smallest data continuity of the data continuities detected from each of the component signals supplied from the data continuity detecting units 481-1 through 481-3.

Further, for example, the detecting unit 482 takes as the final data continuity the average data continuity of the data continuities detected from each of the component signals supplied from the data continuity detecting units 481-1 through 481-3. The determining unit 482 may be arranged so as to taken as the final data continuity the median (median value) of the data continuities detected from each of the component signals supplied from the data continuity detecting units 481-1 through 481-3.

Also, for example, based on signals externally input, the detecting unit 482 takes as the final data continuity the data continuity specified by the externally input signals of the data continuities detected from each of the component signals supplied from the data continuity detecting units 481-1 through 481-3. The determining unit 482 may be arranged so as to taken as the final data continuity a predetermined data continuity of the data continuities detected from each of the component signals supplied from the data continuity detecting units 481-1 through 481-3.

Moreover, the detecting unit 482 may be arranged so as to determine the final data continuity based on the error obtained in the processing for detecting the data continuity of the component signals supplied from the data continuity detecting units 481-1 through 481-3. The error which can be obtained in the processing for data continuity detection will be described later.

Figure 106:
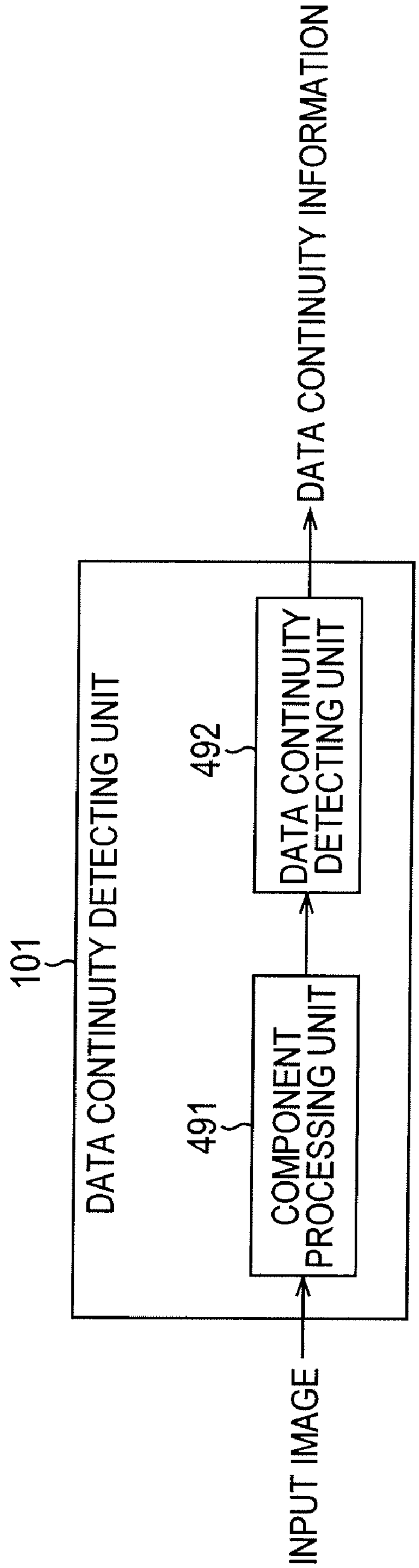
FIG. 106 is a block diagram illustrating the configuration of the data continuity detecting unit 101 which executes processing for detection of data continuity, based on components signals of an input image.

FIG. 106 is a diagram illustrating another configuration of the data continuity detecting unit 101 for performing data continuity detection based on components signals of the input image.

A component processing unit 491 generates one signal based on the component signals of the input image, and supplies this to a data continuity detecting unit 492. For example, the component processing unit 491 adds values of each of the component signals of the input image for a pixel at the same position on the screen, thereby generating a signal made up of the sum of the component signals.

For example, the component processing unit 491 averages the pixel values in each of the component signals of the input image with regard to a pixel at the same position on the screen, thereby generating a signal made up of the average values of the pixel values of the component signals.

The data continuity detecting unit 492 detects the data continuity in the input image, based on the signal input from the component processing unit 491, and outputs data continuity information indicating the detected data continuity.

The data continuity detecting unit 492 has the same configuration as the above-described and or later-described data continuity detecting unit 101, and executes the above-described or later-described processing on the signals supplied from the component processing unit 491.

Thus, the data continuity detecting unit 101 can detect data continuity by detecting the data continuity of the input image based on component signals, so the data continuity can be detected more accurately even in the event that noise and the like is in the input image. For example, the data continuity detecting unit 101 can detect data continuity angle (gradient), mixture ratio, and regions having data continuity more precisely, by detecting data continuity of the input image based on component signals.

Note that the component signals are not restricted to brightness signals and color difference signals, and may be other component signals of other formats, such as RGB signals, YUV signals, and so forth.

As described above, with an arrangement wherein light signals of the real world are projected, the angle as to the reference axis is detected of data continuity corresponding to the continuity of real world light signals that has dropped out from the image data having continuity of real world light signals of which a part has dropped out, and the light signals are estimated by estimating the continuity of the real world light signals that has dropped out based on the detected angle, processing results which are more accurate and more precise can be obtained.

Also, with an arrangement wherein multiple sets are extracted of pixel sets made up of a predetermined number of pixels for each angle based on a pixel of interest which is the pixel of interest and the reference axis in image data obtained by light signals of the real world being projected on multiple detecting elements in which a part of the continuity of the real world light signals has dropped out, the correlation of the pixel values of pixels at corresponding positions in multiple sets which have been extracted for each angle is detected, the angle of data continuity in the image data, based on the reference axis, corresponding to the real world light signal continuity which has dropped out, is detected based on the detected correlation and the light signals are estimated by estimating the continuity of the real world light signals that has dropped out, based on the detected angle of the data continuity as to the reference axis in the image data, processing results which are more accurate and more precise as to the real world events can be obtained.

Figure 107:
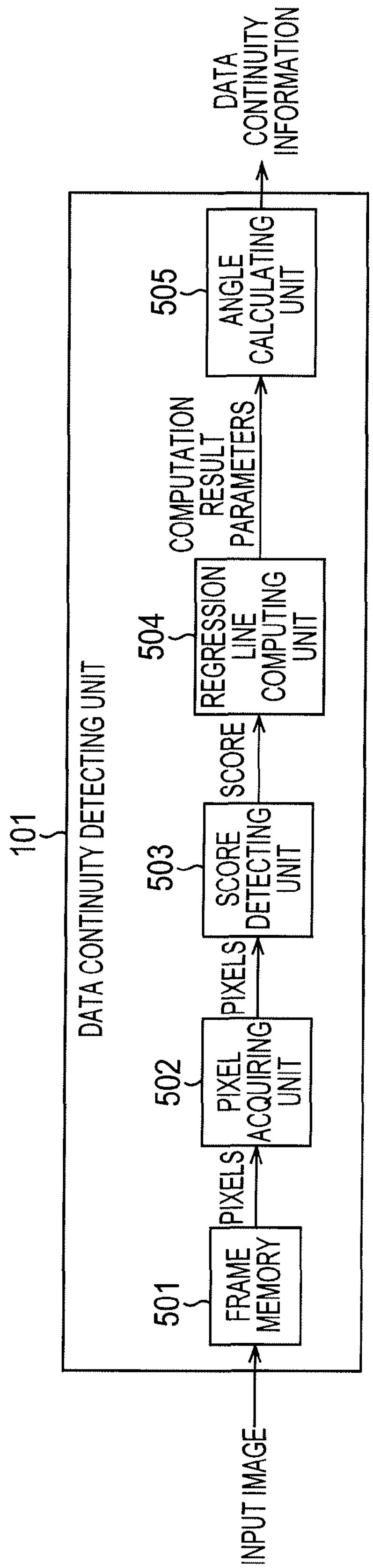
FIG. 107 is a block diagram illustrating still another configuration of the data continuity detecting unit 101.

FIG. 107 is a block diagram illustrating yet another configuration of the data continuity detecting unit 101.

With the data continuity detecting unit 101 shown in FIG. 107, light signals of the real world are projected, a region, corresponding to a pixel of interest which is the pixel of interest in the image data of which a part of the continuity of the real world light signals has dropped out, is selected, and a score based on correlation value is set for pixels wherein the correlation value of the pixel value of the pixel of interest and the pixel value of a pixel belonging to a selected region is equal to or greater than a threshold value, thereby detecting the score of pixels belonging to the region, and a regression line is detected based on the detected score, thereby detecting the data continuity of the image data corresponding to the continuity of the real world light signals which has dropped out.

Frame memory 501 stores input images in increments of frames, and supplies the pixel values of the pixels making up stored frames to a pixel acquiring unit 502. The frame memory 501 can supply pixel values of pixels of frames of an input image which is a moving image to the pixel acquiring unit 502, by storing the current frame of the input image in one page, supplying the pixel values of the pixel of the frame one frame previous (in the past) as to the current frame stored in another page to the pixel acquiring unit 502, and switching pages at the switching point-in-time of the frames of the input image.

The pixel acquiring unit 502 selects the pixel of interest which is a pixel of interest based on the pixel values of the pixels supplied from the frame memory 501, and selects a region made up of a predetermined number of pixels corresponding to the selected pixel of interest. For example, the pixel acquiring unit 502 selects a region made up of 5×5 pixels centered on the pixel of interest.

The size of the region which the pixel acquiring unit 502 selects does not restrict the present invention.

The pixel acquiring unit 502 acquires the pixel values of the pixels of the selected region, and supplies the pixel values of the pixels of the selected region to a score detecting unit 503.

Based on the pixel values of the pixels of the selected region supplied from the pixel acquiring unit 502, the score detecting unit 503 detects the score of pixels belonging to the region, by setting a score based on correlation for pixels wherein the correlation value of the pixel value of the pixel of interest and the pixel value of a pixel belonging to the selected region is equal to or greater than a threshold value. The details of processing for setting score based on correlation at the score detecting unit 503 will be described later.

The score detecting unit 503 supplies the detected score to a regression line computing unit 504.

The regression line computing unit 504 computes a regression line based on the score supplied from the score detecting unit 503. For example, the regression line computing unit 504 computes a regression line based on the score supplied from the score detecting unit 503. Also, for example, the regression line computing unit 504 computes a regression line which is a predetermined curve, based on the score supplied from the score detecting unit 503. The regression line computing unit 504 supplies computation result parameters indicating the computed regression line and the results of computation to an angle calculating unit 505. The computation results which the computation parameters indicate include later-described variation and covariation.

The angle calculating unit 505 detects the continuity of the data of the input image which is image data, corresponding to the continuity of the light signals of the real world that has dropped out, based on the regression line indicated by the computation result parameters supplied from the regression line computing unit 504. For example, based on the regression line indicated by the computation result parameters supplied from the regression line computing unit 504, the angle calculating unit 505 detects the angle of data continuity in the input image based on the reference axis, corresponding to the dropped actual world 1 light signal continuity. The angle calculating unit 505 outputs data continuity information indicating the angle of the data continuity in the input image based on the reference axis.

The angle of the data continuity in the input image based on the reference axis will be described with reference to FIG. 108 through FIG. 110.

Figure 108:
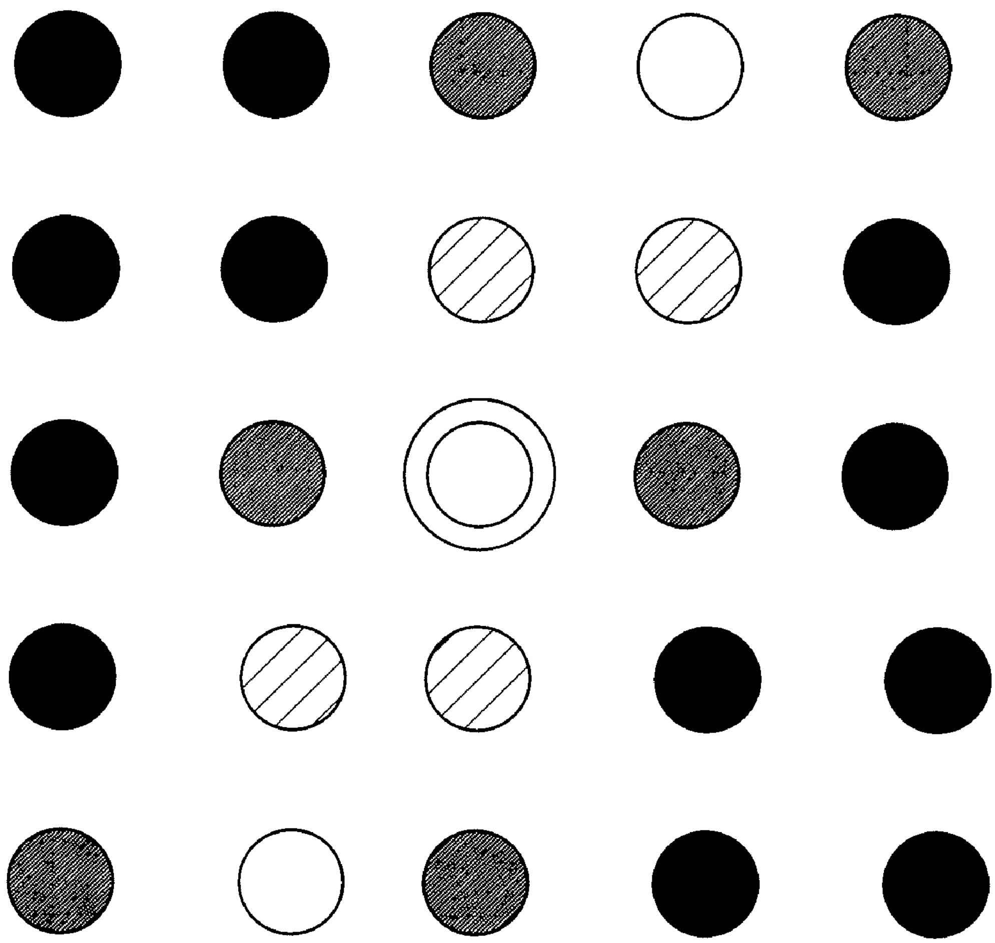
FIG. 108 is a diagram for describing the angle of data continuity with a reference axis as a reference, in the input image.

In FIG. 108, each circle represents a single pixel, and the double circle represents the pixel of interest. The colors of the circles schematically represent the pixel values of the pixels, with the lighter colors indicating greater pixel values. For example, black represents a pixel value of 30, while white indicates a pixel value of 120.

In the event that a person views the image made up of the pixels shown in FIG. 108, the person who sees the image can recognize that a straight line is extending in the diagonally upper right direction.

Upon inputting an input image made up of the pixels shown in FIG. 108, the data continuity detecting unit 101 of which the configuration is shown in FIG. 107 detects that a straight line is extending in the diagonally upper right direction.

Figure 109:
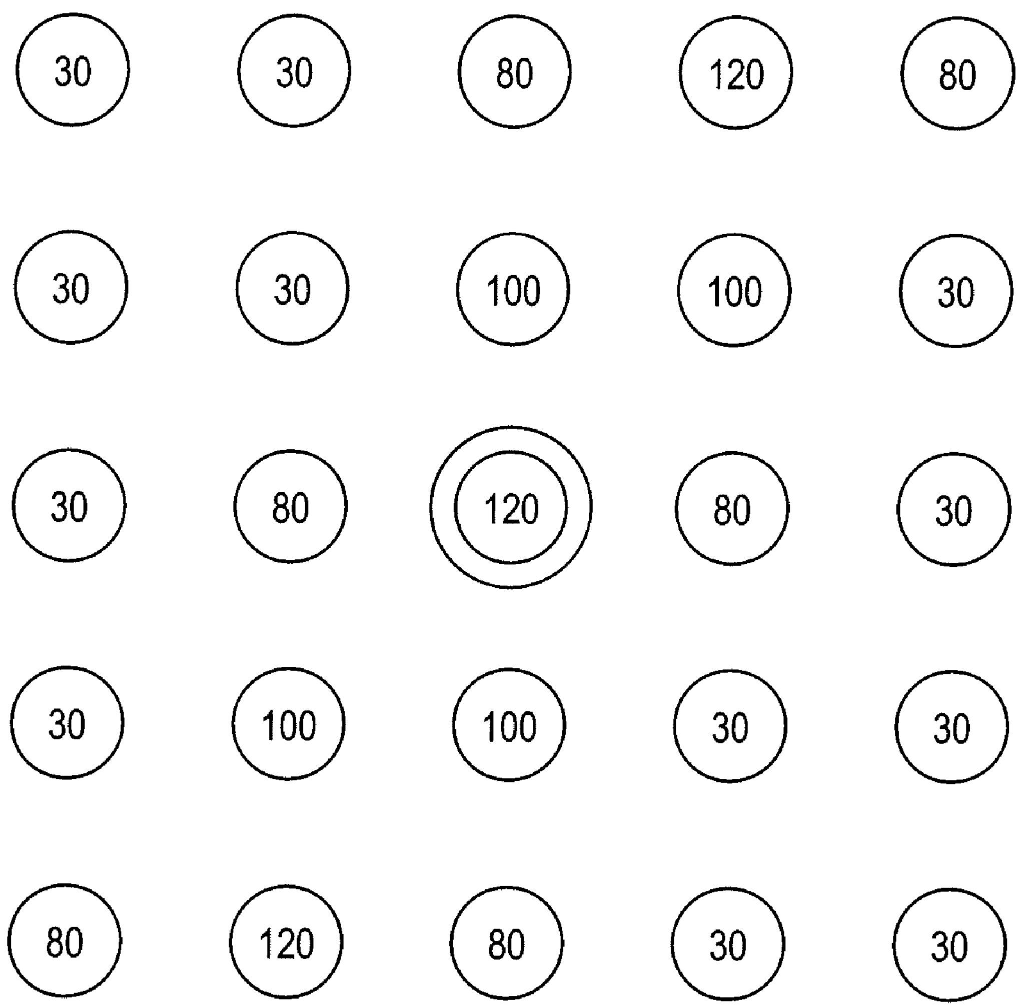
FIG. 109 is a diagram for describing the angle of data continuity with a reference axis as a reference, in the input image.

FIG. 109 is a diagram illustrating the pixel values of the pixels shown in FIG. 108 with numerical values. Each circle represents one pixel, and the numerical values in the circles represent the pixel values.

For example, the pixel value of the pixel of interest is 120, the pixel value of the pixel above the pixel of interest is 100, and the pixel value of the pixel below the pixel of interest is 100. Also, the pixel value of the pixel to the left of the pixel of interest is 80, and the pixel value of the pixel to the right of the pixel of interest is 80. In the same way, the pixel value of the pixel to the lower left of the pixel of interest is 100, and the pixel value of the pixel to the upper right of the pixel of interest is 100. The pixel value of the pixel to the upper left of the pixel of interest is 30, and the pixel value of the pixel to the lower right of the pixel of interest is 30.

Figure 110:
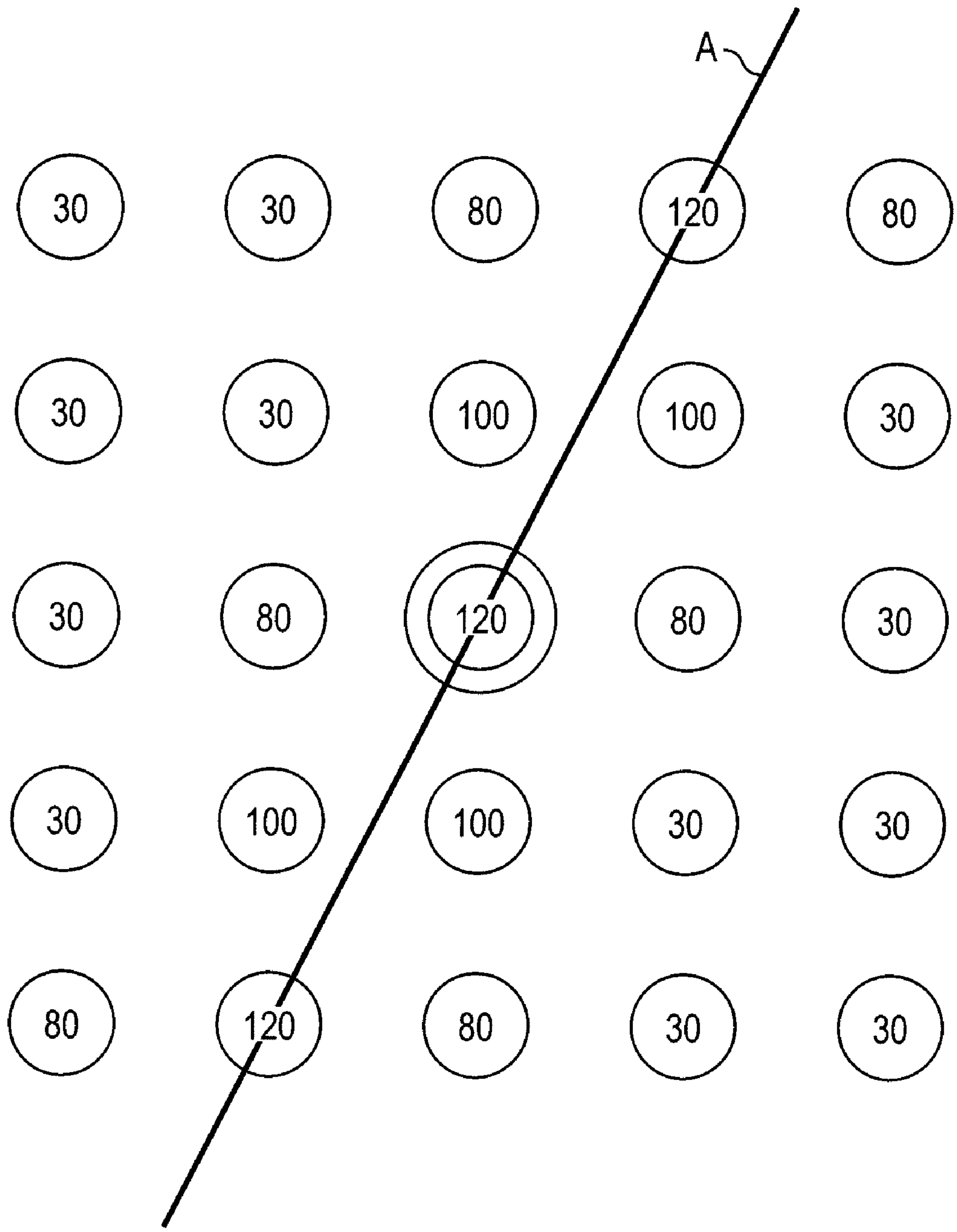
FIG. 110 is a diagram for describing the angle of data continuity with a reference axis as a reference, in the input image.

The data continuity detecting unit 101 of which the configuration is shown in FIG. 107 plots a regression line A as to the input image shown in FIG. 109, as shown in FIG. 110.

Figure 111:
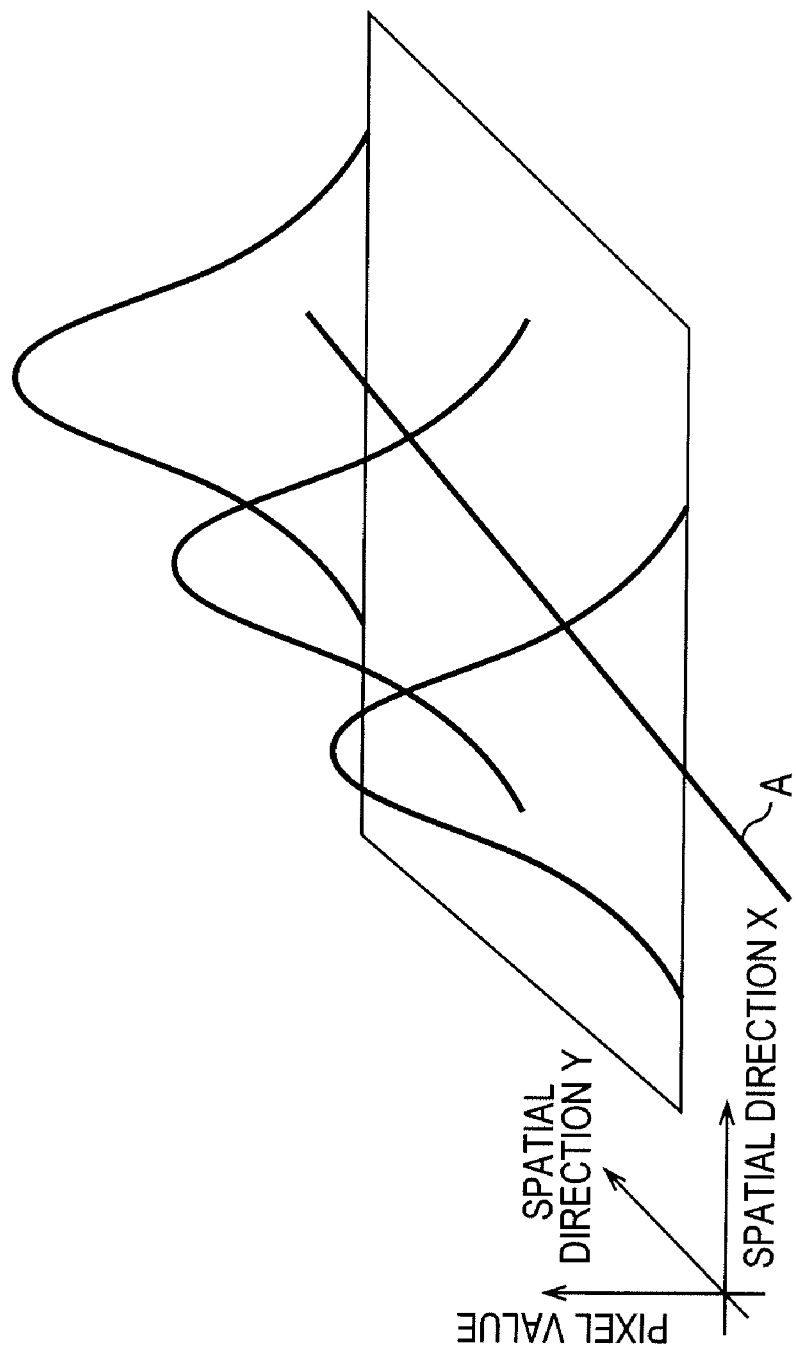
FIG. 111 is a diagram illustrating the relationship between the change in pixel values as to the position of pixels in the spatial direction, and a regression line, in the input image.

FIG. 111 is a diagram illustrating the relation between change in pixel values in the input image as to the position of the pixels in the spatial direction, and the regression line A. The pixel values of pixels in the region having data continuity change in the form of a crest, for example, as shown in FIG. 111.

The data continuity detecting unit 101 of which the configuration is shown in FIG. 107 plots the regression line A by least-square, weighted with the pixel values of the pixels in the region having data continuity. The regression line A obtained by the data continuity detecting unit 101 represents the data continuity in the neighborhood of the pixel of interest.

Figure 112:
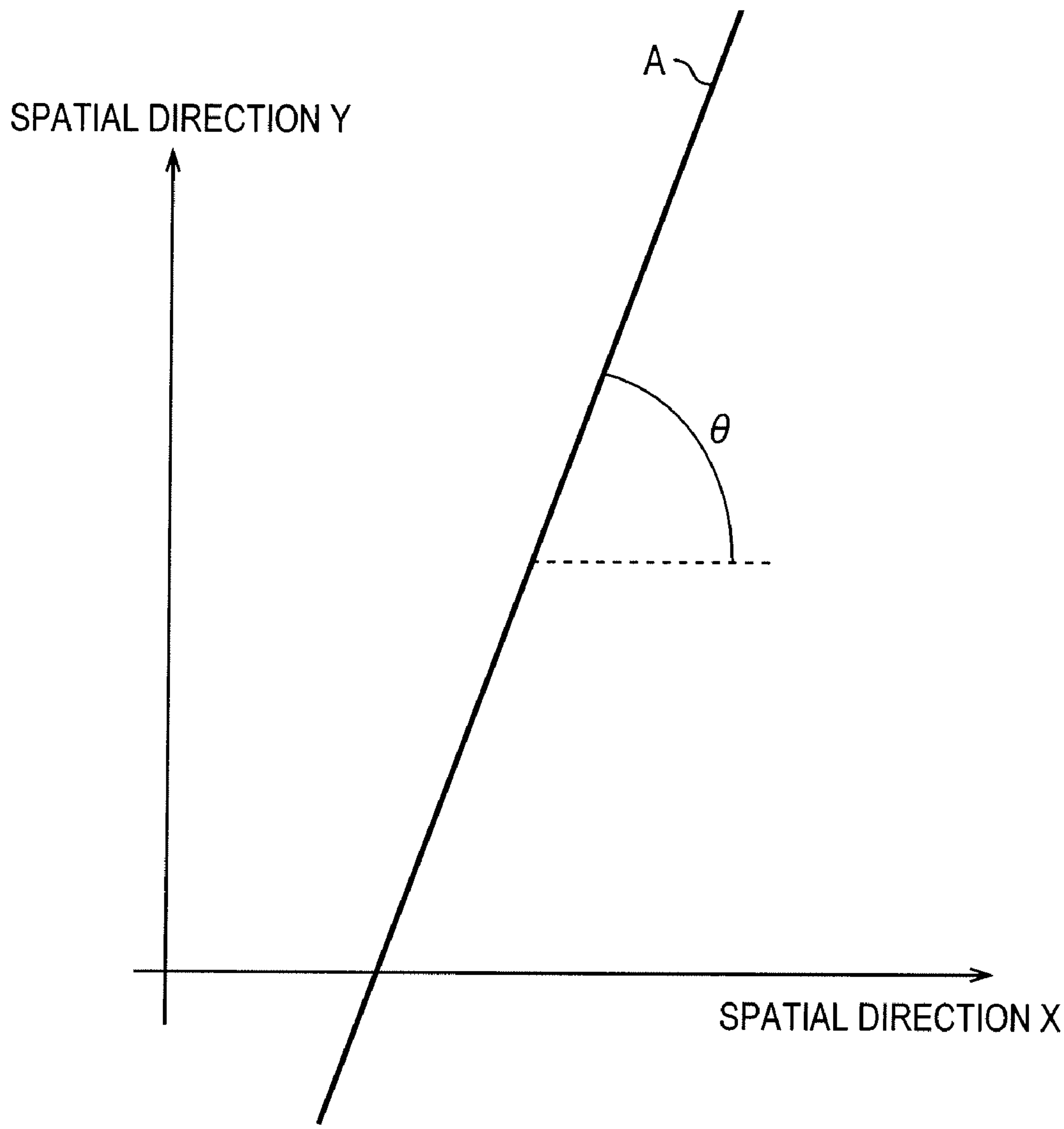
FIG. 112 is a diagram for describing the angle between the regression line A, and an axis indicating the spatial direction X, which is a reference axis, for example.

The angle of data continuity in the input image based on the reference axis is detected by obtaining the angle θ between the regression line A and an axis indicating the spatial direction X which is the reference axis for example, as shown in FIG. 112.

Next, a specific method for calculating the regression line with the data continuity detecting unit 101 of which the configuration is shown in FIG. 107.

From the pixel values of pixels in a region made up of 9 pixels in the spatial direction X and 5 pixels in the spatial direction Y for a total of 45 pixels, centered on the pixel of interest, supplied from the pixel acquiring unit 502, for example, the score detecting unit 503 detects the score corresponding to the coordinates of the pixels belonging to the region.

For example, the score detecting unit 503 detects the score $L_{i,j}$ of the coordinates $(x_i, y_j)$ belonging to the region, by calculating the score with the computation of Expression (32).

$$L_{i,j} = \begin{cases} \exp(0.050(255 - |P_{0,0} - P_{i,j}|) - 1) & (|P_{0,0} - P_{i,j}|) \le Th) \\ 0 & (|P_{0,0} - P_{i,j}|) > Th) \end{cases} \tag{32}$$

In Expression (32), $P_{0,0}$ represents the pixel value of the pixel of interest, and $P_{i,j}$ represents the pixel values of the pixel at the coordinates $(x_i, y_j)$. Th represents a threshold value.

i represents the order of the pixel in the spatial direction X in the region wherein $1 \leqq i \leqq k$. j represents the order of the pixel in the spatial direction Y in the region wherein $1 \leqq j \leqq l$.

k represents the number of pixels in the spatial direction X in the region, and 1 represents the number of pixels in the spatial direction Y in the region. For example, in the event of a region made up of 9 pixels in the spatial direction X and 5 pixels in the spatial direction Y for a total of 45 pixels, K is 9 and 1 is 5.

Figure 113:
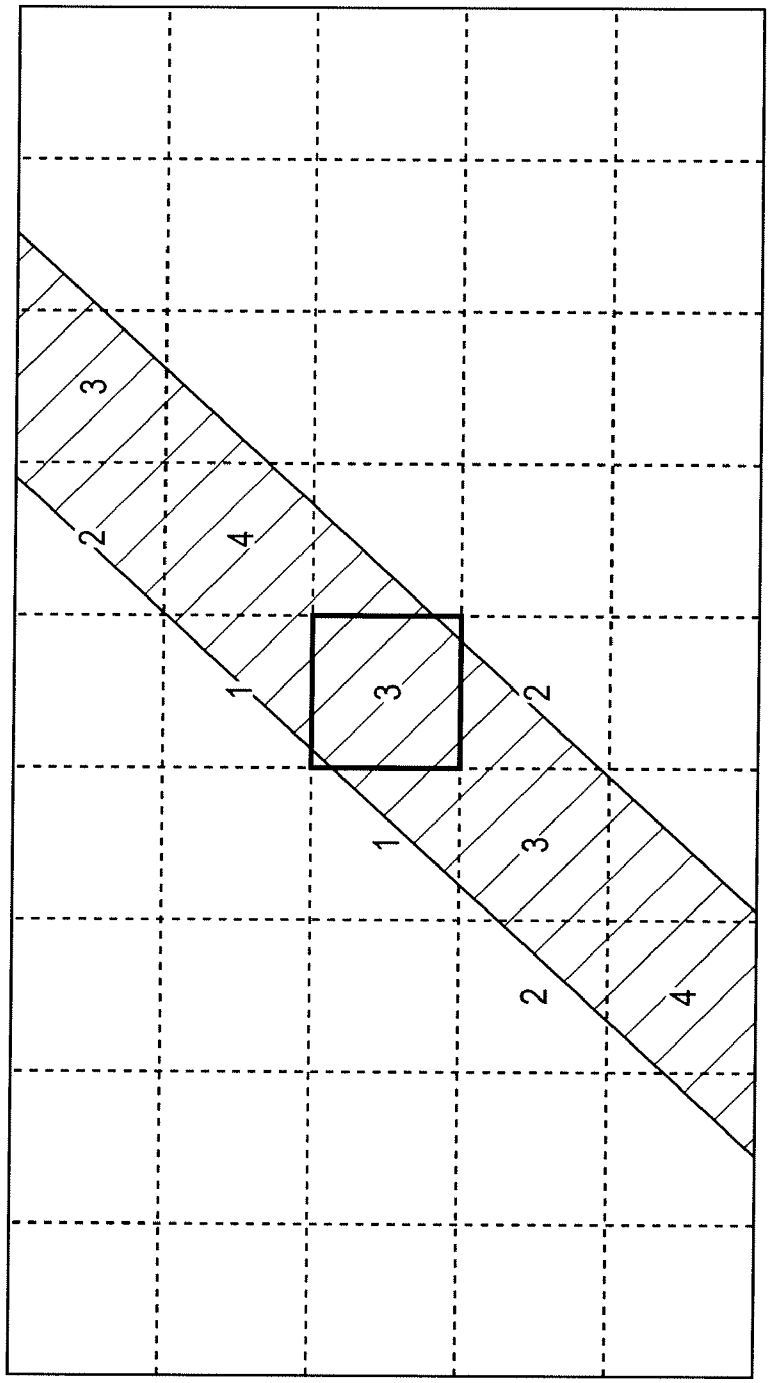
FIG. 113 is a diagram illustrating an example of a region.

FIG. 113 is a diagram illustrating an example of a region acquired by the pixel acquiring unit 502. In FIG. 113, the dotted squares each represent one pixel.

For example, as shown in FIG. 113, in the event that the region is made up of 9 pixels centered on the pixel of interest in the spatial direction X, and is made up of 5 pixels centered on the pixel of interest in the spatial direction Y, with the coordinates (x, y) of the pixel of interest being (0, 0), the coordinates (x, y) of the pixel at the upper left of the region are (−4, 2), the coordinates (x, y) of the pixel at the upper right of the region are (4, 2), the coordinates (x, y) of the pixel at the lower left of the region are (−4, −2), and the coordinates (x, y) of the pixel at the lower right of the region are (4, −2).

The order i of the pixels at the left side of the region in the spatial direction X is 1, and the order i of the pixels at the right side of the region in the spatial direction X is 9. The order j of the pixels at the lower side of the region in the spatial direction Y is 1, and the order j of the pixels at the upper side of the region in the spatial direction Y is 5.

That is to say, with the coordinates $(X_5, y_3)$ of the pixel of interest as (0, 0), the coordinates $(x_1, y_5)$ of the pixel at the upper left of the region are (−4, 2), the coordinates $(x_9, y_5)$ of the pixel at the upper right of the region are (4, 2), the coordinates $(x_1, y_1)$ of the pixel at the lower left of the region are (−4, −2), and the coordinates $(x_9, y_1)$ of the pixel at the lower right of the region are (4, −2).

The score detecting unit 503 calculates the absolute values of difference of the pixel value of the pixel of interest and the pixel values of the pixels belonging to the region as a correlation value with Expression (32), so this is not restricted to a region having data continuity in the input image where a fine line image of the actual world 1 has been projected, rather, score can be detected representing the feature of spatial change of pixel values in the region of the input image having two-valued edge data continuity, wherein an image of an object in the actual world 1 having a straight edge and which is of a monotone color different from that of the background has been projected.

Note that the score detecting unit 503 is not restricted to the absolute values of difference of the pixel values of pixels, and may be arranged to detect the score based on other correlation values such as correlation coefficients and so forth.

Also, the reason that an exponential function is applied in Expression (32) is to exaggerate difference in score as to difference in pixel values, and an arrangement may be made wherein other functions are applied.

The threshold value Th may be an optional value. For example, the threshold value Th may be 30.

Thus, the score detecting unit 503 sets a score to pixels having a correlation value with a pixel value of a pixel belonging to a selected region, based on the correlation value, and thereby detects the score of the pixels belonging to the region.

Also, the score detecting unit 503 performs the computation of Expression (33), thereby calculating the score, whereby the score $L_{i,j}$ of the coordinates $(x_i, y_j)$ belonging to the region is detected.

$$L_{i,j} = \begin{cases} 255 - |P_{0,0} - P_{i,j}| & (|P_{0,0} - P_{i,j}|) \le Th) \\ 0 & (|P_{0,0} - P_{i,j}|) > Th) \end{cases} \tag{33}$$

With the score of the coordinates $(x_i, y_j)$ as $L_{i,j}$ ($1 \leqq i \leqq k$, $1 \leqq j \leqq l$), the sum $q_i$ of the score $L_{i,j}$ of the coordinate $x_i$ in the spatial direction Y is expressed by Expression (34), and the sum $h_j$ of the score $L_{i,j}$ of the coordinate $y_j$ in the spatial direction X is expressed by Expression (35).

$$q_i = \sum_{j=1}^{l} L_{i,j} \tag{34}$$

$$h_j = \sum_{i=1}^{k} L_{i,j} \tag{35}$$

The summation u of the scores is expressed by Expression (36).

$$\begin{aligned} u &= \sum_{i=1}^{k} \sum_{j=1}^{l} L_{i,j} \\ &= \sum_{i=1}^{k} q_i \\ &= \sum_{j=1}^{l} h_j \end{aligned} \tag{36}$$

In the example shown in FIG. 113, the score $L_{5,3}$ of the coordinate of the pixel of interest is 3, the score $L_{5,4}$ of the coordinate of the pixel above the pixel of interest is 1, the score $L_{6,4}$ of the coordinate of the pixel to the upper right of the pixel of interest is 4, the score $L_{6,5}$ of the coordinate of the pixel two pixels above and one pixel to the right of the pixel of interest is 2, and the score $L_{7,5}$ of the coordinate of the pixel two pixels above and two pixels to the right of the pixel of interest is 3. Also, the score $L_{5,2}$ of the coordinate of the pixel below the pixel of interest is 2, the score $L_{4,3}$ of the coordinate of the pixel to the left of the pixel of interest is 1, the score $L_{4,2}$ of the coordinate of the pixel to the lower left of the pixel of interest is 3, the score $L_{3,2}$ of the coordinate of the pixel one pixel below and two pixels to the left of the pixel of interest is 2, and the score $L_{3,1}$ of the coordinate of the pixel two pixels below and two pixels to the left of the pixel of interest is 4. The score of all other pixels in the region shown in FIG. 113 is 0, and description of pixels which have a score of 0 are omitted from FIG. 113.

In the region shown in FIG. 113, the sum $q_1$ of the scores in the spatial direction Y is 0, since all scores L wherein i is 1 are 0, and $q_2$ is 0 since all scores L wherein i is 2 are 0. $q_3$ is 6 since $L_{3,2}$ is 2 and $L_{3,1}$ is 4. In the same way, $q_4$ is 4, $q_5$ is 6, $q_6$ is 6, $q_7$ is 3, $q_8$ is 0, and $q_9$ is 0.

In the region shown in FIG. 113, the sum $h_1$ of the scores in the spatial direction X is 4, since $L_{3,1}$ is 4. $h_2$ is 7 since $L_{3,2}$ is 2, $L_{4,2}$ is 3, and $L_{5,2}$ is 2. In the same way, $h_3$ is 4, $h_4$ is 5, and $h_5$ is 5.

In the region shown in FIG. 113, the summation u of scores is 25.

The sum $T_x$ of the results of multiplying the sum $q_i$ of the scores $L_{i,j}$ in the spatial direction Y by the coordinate $x_i$ is shown in Expression (37).

$$T_x = q_1x_1 + q_2x_2 + \cdots + q_kx_k = \sum_{i=1}^{k} q_ix_i \tag{37}$$

The sum $T_y$ of the results of multiplying the sum $h_j$ of the scores $L_{i,j}$ in the spatial direction X by the coordinate $y_j$ is shown in Expression (38).

$$T_y = h_1y_1 + h_2y_2 + \cdots + h_ly_l = \sum_{j=1}^{l} h_jy_j \tag{38}$$

For example, in the region shown in FIG. 113, $q_1$ is 0 and $x_1$ is −4, so $q_1$ $x_1$ is 0, and $q_2$ is 0 and $x_2$ is −3, so $q_2$ $x_2$ is 0. In the same way, $q_3$ is 6 and $x_3$ is −2, so $q_3$ $x_3$ is −12; $q_4$ is 4 and $x_4$ is −1, so $q_4$ $x_4$ is −4; $q_5$ is 6 and $x_5$ 0so $q_5$ $x_5$ is 0; $q_6$ is 6 and $x_6$ is 1, so $q_6$ $x_6$ is 6; $q_7$ is 3 and $x_7$ is 2, so $q_7$ $x_7$ is 6; $q_8$ is 0 and $x_8$ is 3, so $q_8$ $x_8$ is 0; and $q_9$ is 0 and $x_9$ is 4, so $q_9$ $x_9$ is 0. Accordingly, $T_x$ which is the sum of $q_1x_1$ through $q_9x_9$ is −4.

For example, in the region shown in FIG. 113, $h_1$ is 4 and $y_1$ is −2, so $h_1$ $y_1$ is −8, and $h_2$ is 7 and $Y_2$ is −1, so $h_2$ $Y_2$ is −7. In the same way, $h_3$ is 4 and $y_3$ is 0, so $h_3$ $y_3$ is 0; $h_4$ is 5 and $y_4$ is 1, so $h_4y_4$ is 5; and $h_5$ is 5 and $y_5$ is 2, so $h_5y_5$ is 10. Accordingly, $T_y$ which is the sum of $h_1y_1$ through $h_5y_5$ is 0.

Also, $Q_i$ is defined as follows.

$$Q_i = \sum_{j=1}^{l} L_{i,j}y_j \tag{39}$$

The variation $S_x$ of x is expressed by Expression (40).

$$S_x = \sum_{i=1}^{k} q_ix_i^2 - T_x^2/u \tag{40}$$

The variation $S_y$ of y is expressed by Expression (41).

$$S_y = \sum_{j=1}^{l} h_jy_j^2 - T_y^2/u \tag{41}$$

The covariation $s_{xy}$ is expressed by Expression (42).

$$S_{xy} = \sum_{i=1}^{k}\sum_{j=1}^{l} L_{i,j}x_iy_j - T_xT_y/u = \sum_{i=1}^{k} Q_ix_i - T_xT_y/u \tag{42}$$

Let us consider obtaining the primary regression line shown in Expression (43).

$$y=ax+b \tag{43}$$

The gradient a and intercept b can be obtained as follows by the least-square method.

$$a = \frac{u\sum_{i=1}^{k}\sum_{j=1}^{l} L_{i,j}x_iy_j - T_xT_y}{u\sum_{i=1}^{k} q_ix_i^2 - T_x^2} = \frac{S_{xy}}{S_x} \tag{44}$$

$$b = \frac{T_y\sum_{i=1}^{k} q_ix_i^2 - T_x\sum_{i=1}^{k}\sum_{j=1}^{l} L_{i,j}x_iy_j}{u\sum_{i=1}^{k} q_ix_i^2 - T_x^2} \tag{45}$$

However, it should be noted that the conditions necessary for obtaining a correct regression line is that the scores $L_{i,j}$ are distributed in a Gaussian distribution as to the regression line. To put this the other way around, there is the need for the score detecting unit 503 to convert the pixel values of the pixels of the region into the scores $L_{i,j}$ such that the scores $L_{i,j}$ have a Gaussian distribution.

The regression line computing unit 504 performs the computation of Expression (44) and Expression (45) to obtain the regression line.

The angle calculating unit 505 performs the computation of Expression (46) to convert the gradient a of the regression line to an angle θ as to the axis in the spatial direction X, which is the reference axis.

$$\theta=\tan^{-1}(a) \tag{46}$$

Now, in the case of the regression line computing unit 504 computing a regression line which is a predetermined curve, the angle calculating unit 505 obtains the angle θ of the regression line at the position of the pixel of interest as to the reference axis.

Here, the intercept b is unnecessary for detecting the data continuity for each pixel. Accordingly, let us consider obtaining the primary regression line shown in Expression (47).

$$y=ax \tag{47}$$

In this case, the regression line computing unit 504 can obtain the gradient a by the least-square method as in Expression (48).

$$a=\frac{\sum_{i=1}^{k}\sum_{j=1}^{l}L_{i,j}x_iy_j}{\sum_{i=1}^{k}q_ix_i^2} \tag{48}$$

Figure 114:
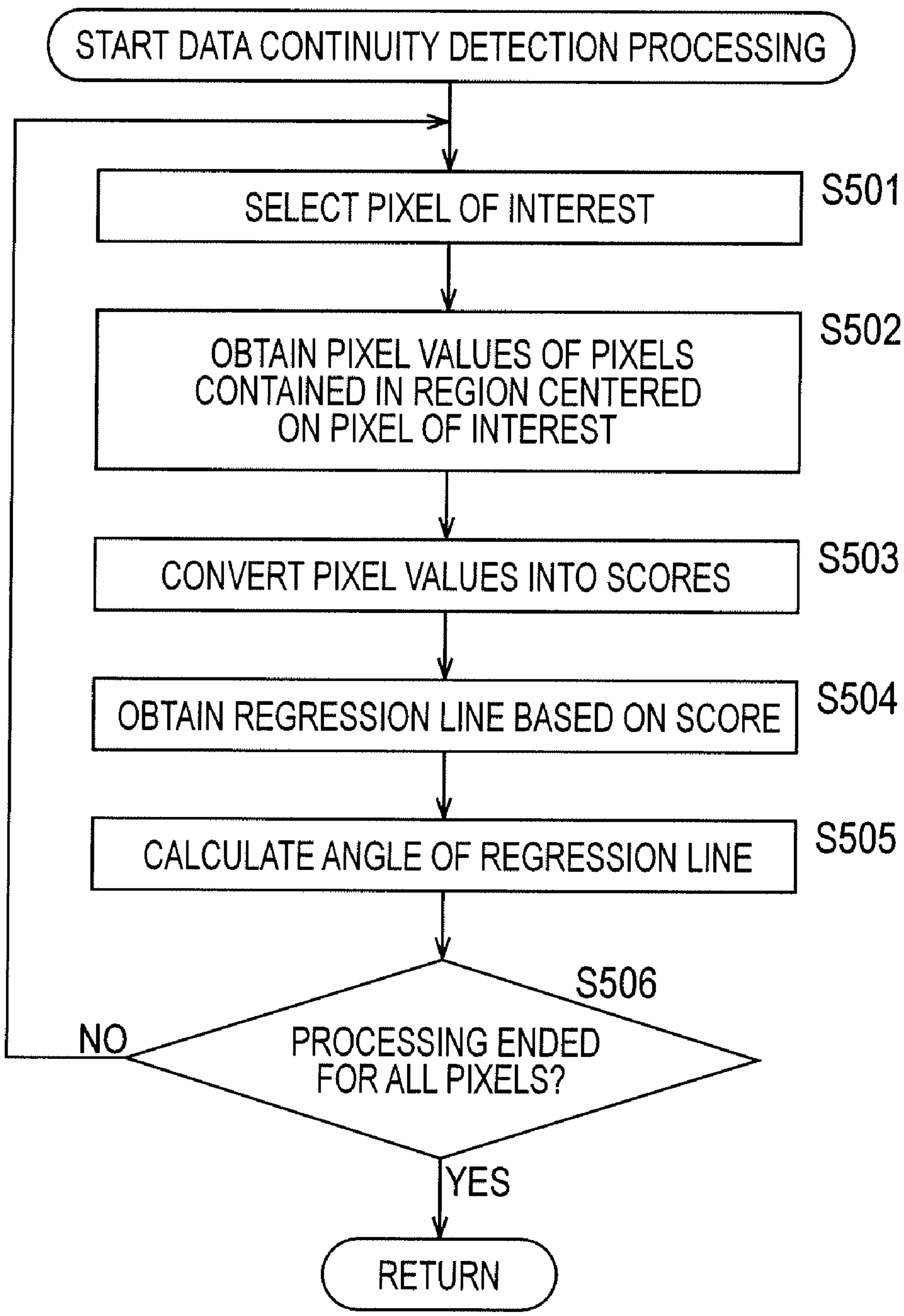
FIG. 114 is a flowchart for describing the processing for detection of data continuity with the data continuity detecting unit 101 of which the configuration is illustrated in FIG. 107.

The processing for detecting data continuity with the data continuity detecting unit 101 of which the configuration is shown in FIG. 107, corresponding to the processing in step S101, will be described with reference to the flowchart shown in FIG. 114.

In step S501, the pixel acquiring unit 502 selects a pixel of interest from pixels which have not yet been taken as the pixel of interest. For example, the pixel acquiring unit 502 selects the pixel of interest in raster scan order. In step S502, the pixel acquiring unit 502 acquires the pixel values of the pixel contained in a region centered on the pixel of interest, and supplies the pixel values of the pixels acquired to the score detecting unit 503. For example, the pixel acquiring unit 502 selects a region made up of 9×5 pixels centered on the pixel of interest, and acquires the pixel values of the pixels contained in the region.

In step S503, the score detecting unit 503 converts the pixel values of the pixels contained in the region into scores, thereby detecting scores. For example, the score detecting unit 503 converts the pixel values into scores $L_{i,j}$ by the computation shown in Expression (32). In this case, the score detecting unit 503 converts the pixel values of the pixels of the region into the scores $L_{i,j}$ such that the scores $L_{i,j}$ have a Gaussian distribution. The score detecting unit 503 supplies the converted scores to the regression line computing unit 504.

In step S504, the regression line computing unit 504 obtains a regression line based on the scores supplied from the score detecting unit 503. For example, the regression line computing unit 504 obtains the regression line based on the scores supplied from the score detecting unit 503. More specifically, the regression line computing unit 504 obtains the regression line by executing the computation shown in Expression (44) and Expression (45). The regression line computing unit 504 supplies computation result parameters indicating the regression line which is the result of computation, to the angle calculating unit 505.

In step S505, the angle calculating unit 505 calculates the angle of the regression line as to the reference axis, thereby detecting the data continuity of the image data, corresponding to the continuity of the light signals of the real world that has dropped out. For example, the angle calculating unit 505 converts the gradient a of the regression line into the angle θ as to the axis of the spatial direction X which is the reference axis, by the computation of Expression (46).

Note that an arrangement may be made wherein the angle calculating unit 505 outputs data continuity information indicating the gradient a.

In step S506, the pixel acquiring unit 502 determines whether or not the processing of all pixels has ended, and in the event that determination is made that the processing of all pixels has not ended, the flow returns to step S501, a pixel of interest is selected from the pixels which have not yet been taken as a pixel of interest, and the above-described processing is repeated.

In the event that determination is made in step S506 that the processing of all pixels has ended, the processing ends.

Thus, the data continuity detecting unit 101 of which the configuration is shown in FIG. 107 can detect the angle of data continuity in the image data based on the reference axis, corresponding to the dropped continuity of the actual world 1 light signals.

Particularly, the data continuity detecting unit 101 of which the configuration is shown in FIG. 107 can obtain angles smaller than pixels, based on the pixel values of pixels in a relatively narrow region.

As described above, in a case wherein light signals of the real world are projected, a region, corresponding to a pixel of interest which is the pixel of interest in the image data of which a part of the continuity of the real world light signals has dropped out, is selected, and a score based on correlation value is set for pixels wherein the correlation value of the pixel value of the pixel of interest and the pixel value of a pixel belonging to a selected region is equal to or greater than a threshold value, thereby detecting the score of pixels belonging to the region, and a regression line is detected based on the detected score, thereby detecting the data continuity of the image data corresponding to the continuity of the real world light signals which has dropped out, and subsequently estimating the light signals by estimating the continuity of the dropped real world light signal based on the detected data of the image data, processing results which are more accurate and more precise as to events in the real world can be obtained.

Note that with the data continuity detecting unit 101 of which the configuration is shown in FIG. 107, an arrangement wherein the pixel values of pixels in a predetermined region of the frame of interest where the pixel of interest belongs and in frames before and after the frame of interest time-wise are converted into scores, and a regression plane is obtained based on the scores, allows the angle of time-directional data continuity to be detected along with the angle of the data continuity in the spatial direction.

Figure 115:
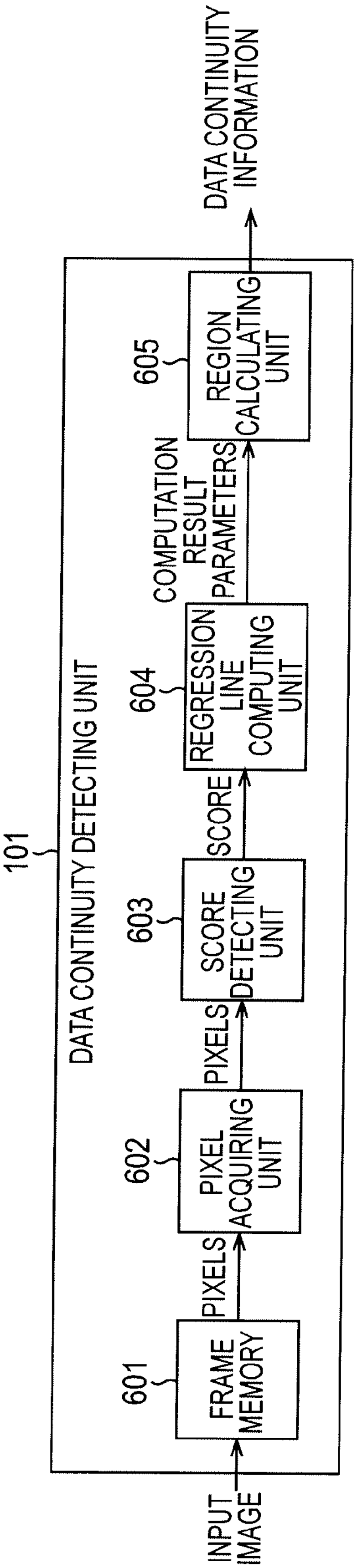
FIG. 115 is a block diagram illustrating still another configuration of the data continuity detecting unit 101.

FIG. 115 is a block diagram illustrating yet another configuration of the data continuity detecting unit 101.

With the data continuity detecting unit 101 shown in FIG. 115, light signals of the real world are projected, a region, corresponding to a pixel of interest which is the pixel of interest in the image data of which a part of the continuity of the real world light signals has dropped out, is selected, and a score based on correlation value is set for pixels wherein the correlation value of the pixel value of the pixel of interest and the pixel value of a pixel belonging to a selected region is equal to or greater than a threshold value, thereby detecting the score of pixels belonging to the region, and a regression line is detected based on the detected score, thereby detecting the data continuity of the image data corresponding to the continuity of the real world light signals which has dropped out.

Frame memory 601 stores input images in increments of frames, and supplies the pixel values of the pixels making up stored frames to a pixel acquiring unit 602. The frame memory 601 can supply pixel values of pixels of frames of an input image which is a moving image to the pixel acquiring unit 602, by storing the current frame of the input image in one page, supplying the pixel values of the pixel of the frame one frame previous (in the past) as to the current frame stored in another page to the pixel acquiring unit 602, and switching pages at the switching point-in-time of the frames of the input image.

The pixel acquiring unit 602 selects the pixel of interest which is a pixel of interest based on the pixel values of the pixels supplied from the frame memory 601, and selects a region made up of a predetermined number of pixels corresponding to the selected pixel of interest. For example, the pixel acquiring unit 602 selects a region made up of 5×5 pixels centered on the pixel of interest.

The size of the region which the pixel acquiring unit 602 selects does not restrict the present invention.

The pixel acquiring unit 602 acquires the pixel values of the pixels of the selected region, and supplies the pixel values of the pixels of the selected region to a score detecting unit 603.

Based on the pixel values of the pixels of the selected region supplied from the pixel acquiring unit 602, the score detecting unit 603 detects the score of pixels belonging to the region, by setting a score based on correlation value for pixels wherein the correlation value of the pixel value of the pixel of interest and the pixel value of a pixel belonging to the selected region is equal to or greater than a threshold value. The details of processing for setting score based on correlation at the score detecting unit 603 will be described later.

The score detecting unit 603 supplies the detected score to a regression line computing unit 604.

The regression line computing unit 604 computes a regression line based on the score supplied from the score detecting unit 603. For example, the regression line computing unit 604 computes a regression line based on the score supplied from the score detecting unit 603. Also, for example, the regression line computing unit 604 computes a regression line which is a predetermined curve, based on the score supplied from the score detecting unit 603. The regression line computing unit 604 supplies computation result parameters indicating the computed regression line and the results of computation to an region calculating unit 605. The computation results which the computation parameters indicate include later-described variation and covariation.

The region calculating unit 605 detects the region having the continuity of the data of the input image which is image data, corresponding to the continuity of the light signals of the real world that has dropped out, based on the regression line indicated by the computation result parameters supplied from the regression line computing unit 604.

Figure 116:
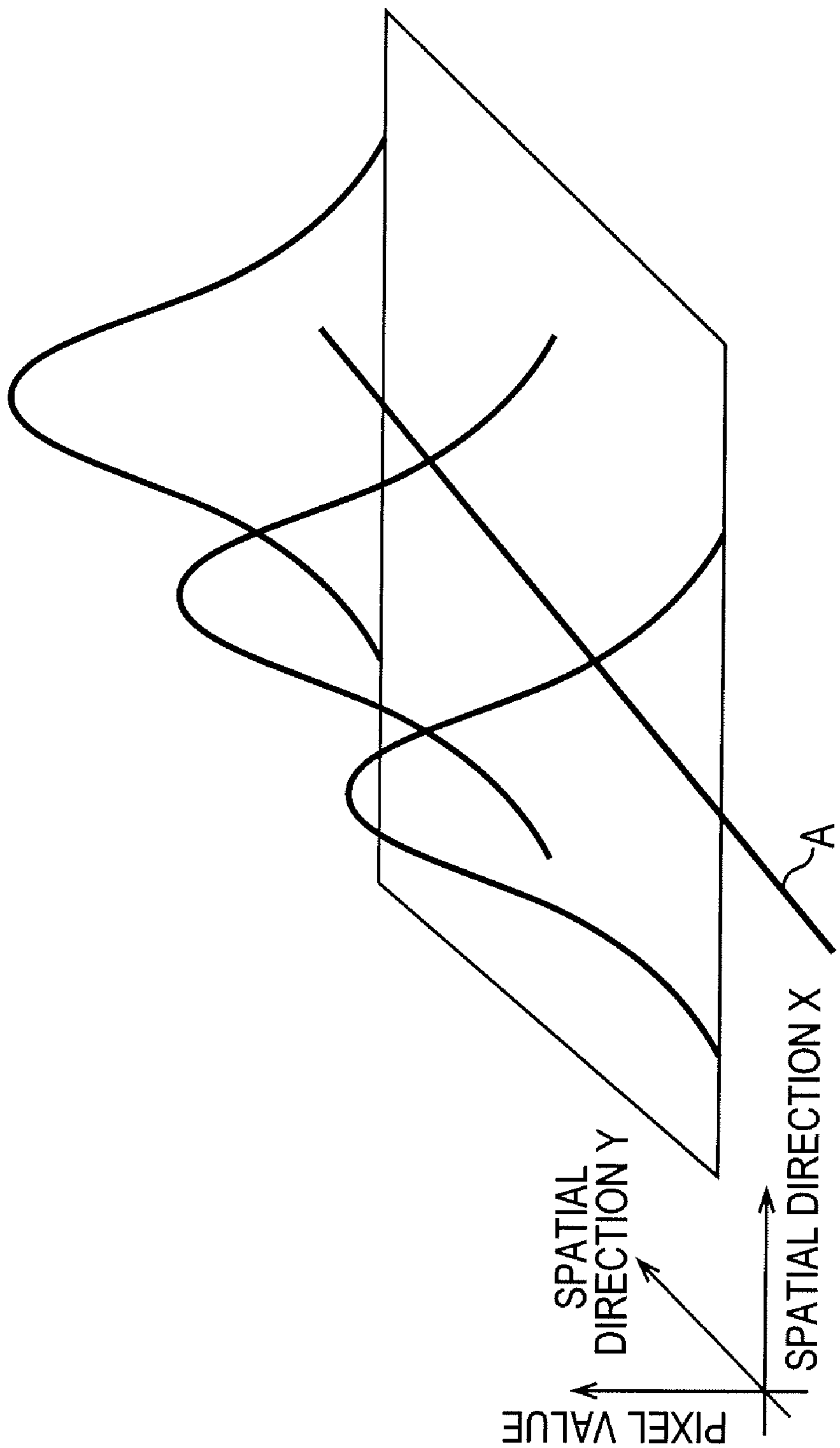
FIG. 116 is a diagram illustrating the relationship between the change in pixel values as to the position of pixels in the spatial direction, and a regression line, in the input image.

FIG. 116 is a diagram illustrating the relation between change in pixel values in the input image as to the position of the pixels in the spatial direction, and the regression line A. The pixel values of pixels in the region having data continuity change in the form of a crest, for example, as shown in FIG. 116.

The data continuity detecting unit 101 of which the configuration is shown in FIG. 115 plots the regression line A by least-square, weighted with the pixel values of the pixels in the region having data continuity. The regression line A obtained by the data continuity detecting unit 101 represents the data continuity in the neighborhood of the pixel of interest.

Figure 117:
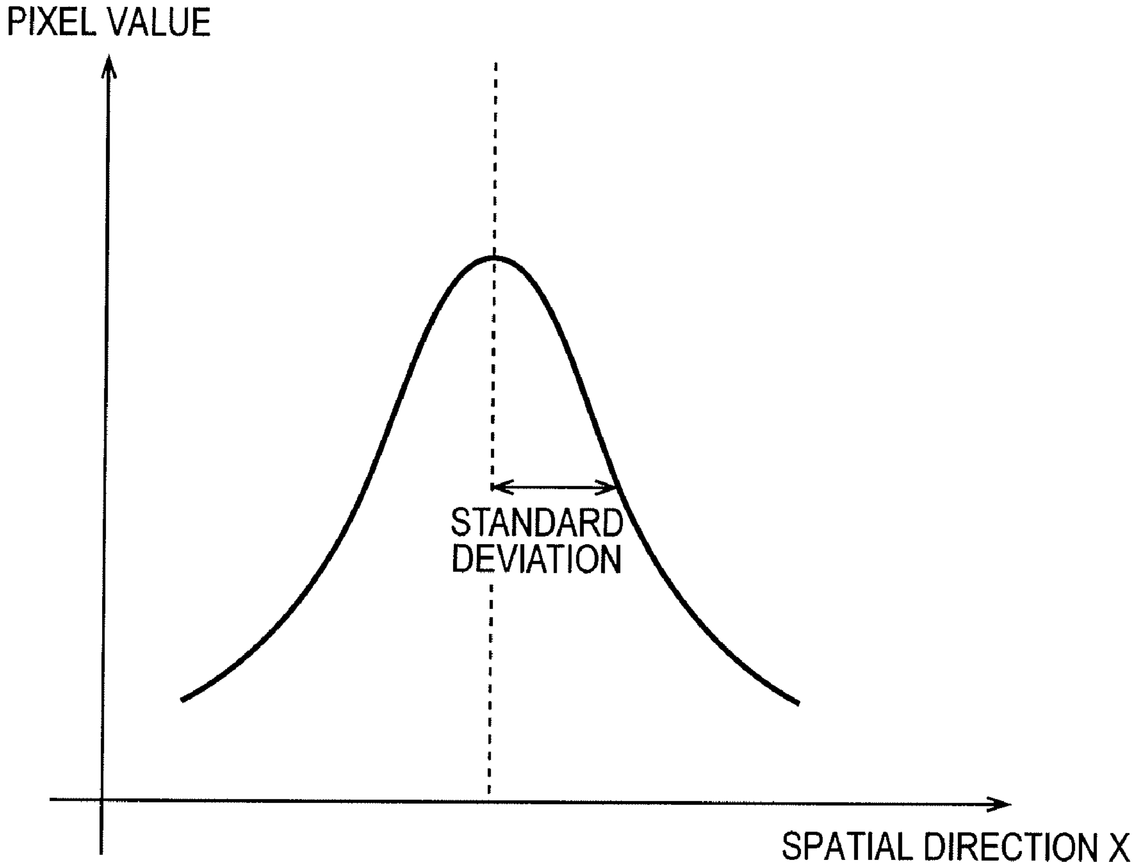
FIG. 117 is a diagram for describing the relationship between standard deviation and a region having data continuity.

Plotting a regression line means approximation assuming a Gaussian function. As shown in FIG. 117, the data continuity detecting unit of which the configuration is illustrated in FIG. 115 can tell the general width of the region in the data 3 where the image of the fine line has been projected, by obtaining standard deviation, for example. Also, the data continuity detecting unit of which the configuration is illustrated in FIG. 115 can tell the general width of the region in the data 3 where the image of the fine line has been projected, based on correlation coefficients.

Next, description will be made regarding a specific method for calculating the regression line with the data continuity detecting unit 101 of which the configuration is shown in FIG. 115.

From the pixel values of pixels in a region made up of 9 pixels in the spatial direction X and 5 pixels in the spatial direction Y for a total of 45 pixels, centered on the pixel of interest, supplied from the pixel acquiring unit 602, for example, the score detecting unit 603 detects the score corresponding to the coordinates of the pixels belonging to the region.

For example, the score detecting unit 603 detects the score $L_{i,j}$ of the coordinates $(x_i, y_j)$ belonging to the region, by calculating the score with the computation of Expression (49).

$$L_{i,j} = \begin{cases} \exp(0.050(255 - |P_{0,0} - P_{i,j}|) - 1) & (|P_{0,0} - P_{i,j}|) \le Th) \\ 0 & (|P_{0,0} - P_{i,j}|) > Th) \end{cases} \tag{49}$$

In Expression (49), $P_{0,0}$ represents the pixel value of the pixel of interest, and $P_{i,j}$ represents the pixel values of the pixel at the coordinates $(x_i, y_j)$ Th represents the threshold value.

i represents the order of the pixel in the spatial direction X in the region wherein $1 \leqq i \leqq k$. j represents the order of the pixel in the spatial direction Y in the region wherein $1 \leqq j \leqq l$.

k represents the number of pixels in the spatial direction X in the region, and l represents the number of pixels in the spatial direction Y in the region. For example, in the event of a region made up of 9 pixels in the spatial direction X and 5 pixels in the spatial direction Y for a total of 45 pixels, K is 9 and l is 5.

Figure 118:
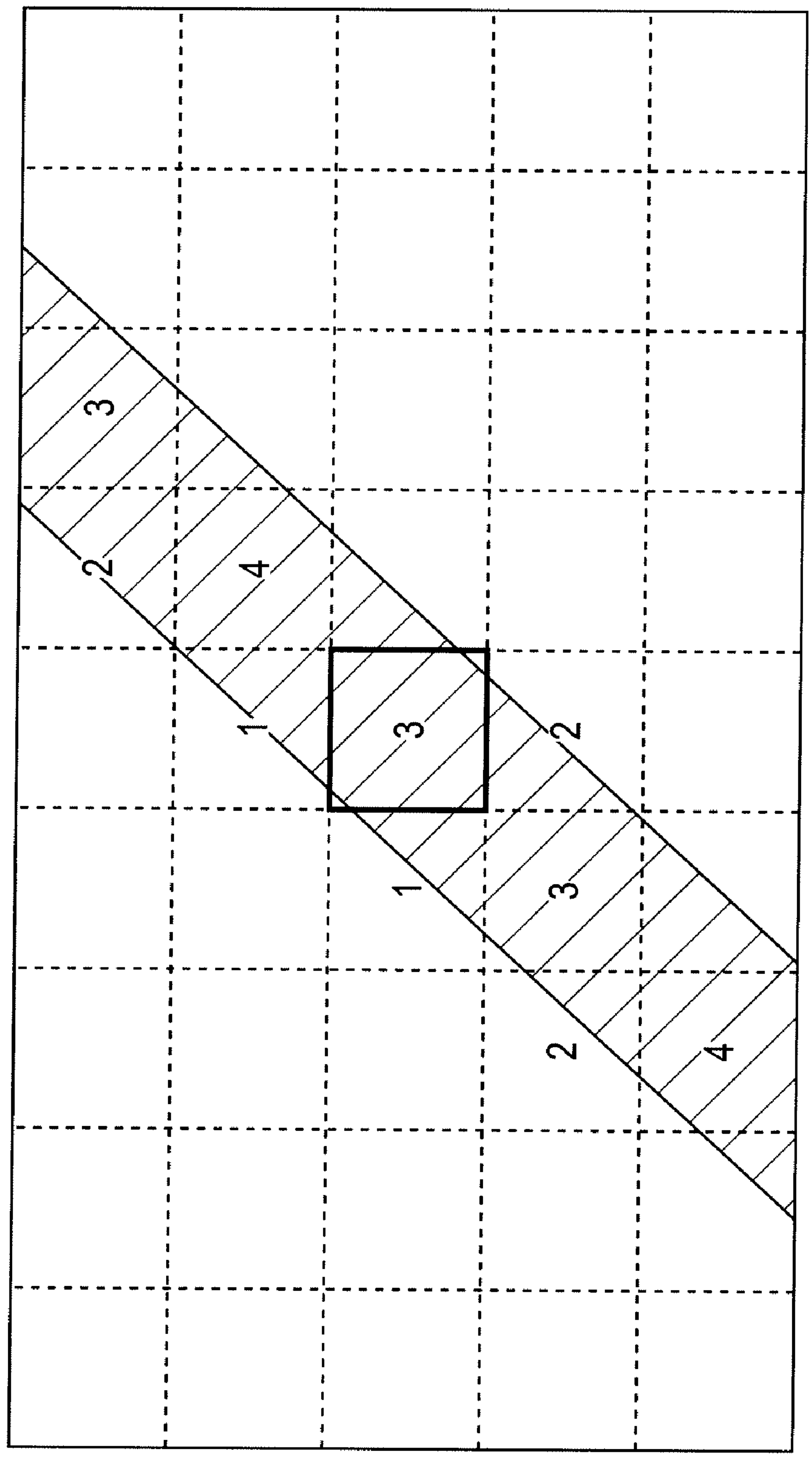
FIG. 118 is a diagram illustrating an example of a region.

FIG. 118 is a diagram illustrating an example of a region acquired by the pixel acquiring unit 602. In FIG. 118, the dotted squares each represent one pixel.

For example, as shown in FIG. 118, in the event that the region is made up of 9 pixels centered on the pixel of interest in the spatial direction X, and is made up of 5 pixels centered on the pixel of interest in the spatial direction Y, with the coordinates (x, y) of the pixel of interest being (0, 0), the coordinates (x, y) of the pixel at the upper left of the region are (−4, 2), the coordinates (x, y) of the pixel at the upper right of the region are (4, 2), the coordinates (x, y) of the pixel at the lower left of the region are (−4, −2), and the coordinates (x, y) of the pixel at the lower right of the region are (4, −2).

The order i of the pixels at the left side of the region in the spatial direction X is 1, and the order i of the pixels at the right side of the region in the spatial direction X is 9. The order j of the pixels at the lower side of the region in the spatial direction Y is 1, and the order j of the pixels at the upper side of the region in the spatial direction Y is 5.

That is to say, with the coordinates $(x_5, y_3)$ of the pixel of interest as (0, 0), the coordinates $(x_1, y_5)$ of the pixel at the upper left of the region are (−4, 2), the coordinates $(x_9, y_5)$ of the pixel at the upper right of the region are (4, 2), the coordinates $(x_1, y_1)$ of the pixel at the lower left of the region are (−4, −2), and the coordinates $(x_9, y_1)$ of the pixel at the lower right of the region are (4, −2).

The score detecting unit 603 calculates the absolute values of difference of the pixel value of the pixel of interest and the pixel values of the pixels belonging to the region as a correlation value with Expression (49), so this is not restricted to a region having data continuity in the input image where a fine line image of the actual world 1 has been projected, rather, score can be detected representing the feature of spatial change of pixel values in the region of the input image having two-valued edge data continuity, wherein an image of an object in the actual world 1 having a straight edge and which is of a monotone color different from that of the background has been projected.

Note that the score detecting unit 603 is not restricted to the absolute values of difference of the pixel values of the pixels, and may be arranged to detect the score based on other correlation values such as correlation coefficients and so forth.

Also, the reason that an exponential function is applied in Expression (49) is to exaggerate difference in score as to difference in pixel values, and an arrangement may be made wherein other functions are applied.

The threshold value Th may be an optional value. For example, the threshold value Th may be 30.

Thus, the score detecting unit 603 sets a score to pixels having a correlation value with a pixel value of a pixel belonging to a selected region equal to or greater than the threshold value, based on the correlation value, and thereby detects the score of the pixels belonging to the region.

Also, the score detecting unit 603 performs the computation of Expression (50) for example, thereby calculating the score, whereby the score $L_{i,j}$ of the coordinates $(x_i, y_j)$ belonging to the region is detected.

$$L_{i,j} = \begin{cases} 255 - |P_{0,0} - P_{i,j}| & (|P_{0,0} - P_{i,j}|) \le Th) \\ 0 & (|P_{0,0} - P_{i,j}|) > Th) \end{cases} \tag{50}$$

With the score of the coordinates $(x_i, y_j)$ as $L_{i,j}$ ($1 \leqq i \leqq k$, $1 \leqq j \leqq l$), the sum $q_i$ of the score $L_{i,j}$ of the coordinate $x_i$ in the spatial direction Y is expressed by Expression (51), and the sum $h_j$ of the score $L_{i,j}$ of the coordinate $y_j$ in the spatial direction X is expressed by Expression (52).

$$q_i = \sum_{j=1}^{l} L_{i,j} \tag{51}$$

$$h_j = \sum_{i=1}^{k} L_{i,j} \tag{52}$$

The summation u of the scores is expressed by Expression (53).

$$\begin{aligned} u &= \sum_{i=1}^{k} \sum_{j=1}^{l} L_{i,j} \\ &= \sum_{i=1}^{k} q_i \\ &= \sum_{j=1}^{l} h_j \end{aligned} \tag{53}$$

In the example shown in FIG. 118, the score $L_{5,3}$ of the coordinate of the pixel of interest is 3, the score $L_{5,4}$ of the coordinate of the pixel above the pixel of interest is 1, the score $L_{6,4}$ of the coordinate of the pixel to the upper right of the pixel of interest is 4, the score $L_{6,5}$ of the coordinate of the pixel two pixels above and one pixel to the right of the pixel of interest is 2, and the score $L_{7,5}$ of the coordinate of the pixel two pixels above and two pixels to the right of the pixel of interest is 3. Also, the score $L_{5,2}$ of the coordinate of the pixel below the pixel of interest is 2, the score $L_{4,3}$ of the coordinate of the pixel to the left of the pixel of interest is 1, the score $L_{4,2}$ of the coordinate of the pixel to the lower left of the pixel of interest is 3, the score $L_{4,2}$ of the coordinate of the pixel one pixel below and two pixels to the left of the pixel of interest is 2, and the score $L_{3,1}$ of the coordinate of the pixel two pixels below and two pixels to the left of the pixel of interest is 4. The score of all other pixels in the region shown in FIG. 118 is 0, and description of pixels which have a score of 0 are omitted from FIG. 118.

In the region shown in FIG. 118, the sum $q_1$ of the scores in the spatial direction Y is 0, since all scores L wherein i is 1 are 0, and $q_2$ is 0 since all scores L wherein i is 2 are 0. $q_3$ is 6 since $L_{3,2}$ is 2 and $L_{3,1}$ is 4. In the same way, $q_4$ is 4, $q_5$ is 6, $q_6$ is 6, $q_7$ is 3, $q_8$ is 0, and $q_9$ is 0.

In the region shown in FIG. 118, the sum $h_1$ of the scores in the spatial direction X is 4, since $L_{3,1}$ is 4. $h_2$ is 7 since $L_{3,2}$ is 2, $L_{4,2}$ is 3, and $L_{5,2}$ is 2. In the same way, $h_3$ is 4, $h_4$ is 5, and $h_5$ is 5.

In the region shown in FIG. 118, the summation u of scores is 25.

The sum $T_x$ of the results of multiplying the sum $q_i$ of the scores $L_{i,j}$ in the spatial direction Y by the coordinate $x_i$ is shown in Expression (54).

$$\begin{aligned} T_x &= q_1 x_1 + q_2 x_2 + \ldots + q_k x_k \\ &= \sum_{i=1}^{k} q_i x_i \end{aligned} \tag{54}$$

The sum $T_y$ of the results of multiplying the sum $h_j$ of the scores $L_{i,j}$ in the spatial direction X by the coordinate $y_j$ is shown in Expression (55).

$$\begin{aligned} T_y &= h_1 y_1 + h_2 y_2 + \ldots + h_l y_l \\ &= \sum_{j=1}^{l} h_j y_j \end{aligned} \tag{55}$$

For example, in the region shown in FIG. 118, $q_1$ is 0 and $x_1$ is −4, so $q_1 x_1$ is 0, and $q_2$ is 0 and $x_2$ is −3, so $q_2 x_2$ is 0. In the same way, $q_3$ is 6 and $x_3$ is −2, so $q_3 x_3$ is −12; $q_4$ is 4 and $x_4$ is −1, so $q_4 x_4$ is −4; $q_5$ is 6 and $x_5$ is 0, so $q_5 x_5$ is 0; $q_6$ is 6 and $x_6$ is 1, so $q_6 x_6$ is 6; $q_7$ is 3 and $x_7$ is 2, so $q_7 x_7$ is 6; $q_8$ is 0 and $x_8$ is 3, so $q_8 x_8$ is 0; and $q_9$ is 0 and $x_9$ is 4, so $q_9 x_9$ is 0. Accordingly, $T_x$ which is the sum of $q_1x_1$ through $q_9x_9$ is −4.

For example, in the region shown in FIG. 118, $h_1$ is 4 and $y_1$ is −2, so $h_1 y_1$ is −8, and $h_2$ is 7 and $Y_2$ is −1, so $h_2 Y_2$ is −7. In the same way, $h_3$ is 4 and $y_3$ is 0, so $h_3 y_3$ is 0; $h_4$ is 5 and $y_4$ is 1, so $h_4y_4$ is 5; and $h_5$ is 5 and $y_5$ is 2, so $h_5y_5$ is 10. Accordingly, $T_y$ which is the sum of $h_1y_1$ through $h_5y_5$ is 0.

Also, $Q_i$ is defined as follows.

$$Q_i = \sum_{j=1}^{l} L_{i,j} y_j \tag{56}$$

The variation $S_x$ of x is expressed by Expression (57).

$$S_x = \sum_{i=1}^{k} q_i x_i^2 - T_x^2/u \tag{57}$$

The variation $S_y$ of y is expressed by Expression (58).

$$S_y = \sum_{j=1}^{l} h_j y_j^2 - T_y^2/u \tag{58}$$

The covariation $s_{xy}$ is expressed by Expression (59).

$$\begin{aligned} S_{xy} &= \sum_{i=1}^{k}\sum_{j=1}^{l} L_{i,j} x_i y_j - T_x T_y/u \\ &= \sum_{i=1}^{k} Q_i x_i - T_x T_y/u \end{aligned} \tag{59}$$

Let us consider obtaining the primary regression line shown in Expression (60).

$$y=ax+b \tag{60}$$

The gradient a and intercept b can be obtained as follows by the least-square method.

$$\begin{aligned} a &= \frac{u\sum_{i=1}^{k}\sum_{j=1}^{l} L_{i,j} x_i y_j - T_x T_y}{u\sum_{i=1}^{k} q_i x_i^2 - T_x^2} \\ &= \frac{S_{xy}}{S_x} \end{aligned} \tag{61}$$

$$b = \frac{T_y\sum_{i=1}^{k} q_i x_i^2 - T_x\sum_{i=1}^{k}\sum_{j=1}^{l} L_{i,j} x_i y_j}{u\sum_{i=1}^{k} q_i x_i^2 - T_x^2} \tag{62}$$

However, it should be noted that the conditions necessary for obtaining a correct regression line is that the scores $L_{i,j}$ are distributed in a Gaussian distribution as to the regression line. To put this the other way around, there is the need for the score detecting unit 603 to convert the pixel values of the pixels of the region into the scores $L_{i,j}$ such that the scores $L_{i,j}$ have a Gaussian distribution.

The regression line computing unit 604 performs the computation of Expression (61) and Expression (62) to obtain the regression line.

Also, the intercept b is unnecessary for detecting the data continuity for each pixel. Accordingly, let us consider obtaining the primary regression line shown in Expression (63).

$$y=ax \tag{63}$$

In this case, the regression line computing unit 604 can obtain the gradient a by the least-square method as in Expression (64).

$$a = \frac{\sum_{i=1}^{k}\sum_{j=1}^{l} L_{i,j} x_i y_j}{\sum_{i=1}^{k} q_i x_i^2} \tag{64}$$

With a first technique for determining the region having data continuity, the estimation error of the regression line shown in Expression (60) is used.

The variation $S_{y \cdot x}$ of y is obtained with the computation shown in Expression (65).

$$\begin{aligned} S_{y \cdot x} &= \sum (y_i - a x_i - b)^2 \\ &= S_y - S_{xy}^2/S_x \\ &= S_y - aS_{xy} \end{aligned} \tag{65}$$

Scattering of the estimation error is obtained by the computation shown in Expression (66) using variation.

$$\begin{aligned} V_{y \cdot x} &= S_{y \cdot x}/(u-2) \\ &= (S_y - aS_{xy})/(u-2) \end{aligned} \tag{66}$$

Accordingly, the following Expression yields the standard deviation.

$$\sqrt{V_{y \cdot x}} = \sqrt{\frac{S_y - aS_{xy}}{u-2}} \tag{67}$$

However, in the case of handling a region where a fine line image has been projected, the standard deviation is an amount worth the width of the fine line, so determination cannot be categorically made that great standard deviation means that a region is not the region with data continuity. However, for example, information indicating detected regions using standard deviation can be utilized to detect regions where there is a great possibility that class classification adaptation processing breakdown will occur, since class classification adaptation processing breakdown occurs at portions of the region having data continuity where the fine line is narrow.

The region calculating unit 605 calculates the standard deviation by the computation shown in Expression (67), and calculates the region of the input image having data continuity, based on the standard deviation, for example. The region calculating unit 605 multiplies the standard deviation by a predetermined coefficient so as to obtain distance, and takes the region within the obtained distance from the regression line as a region having data continuity. For example, the region calculating unit 605 calculates the region within the standard deviation distance from the regression line as a region having data continuity, with the regression line as the center thereof.

With a second technique, the correlation of score is used for detecting a region having data continuity.

The correlation coefficient $r_{xy}$ can be obtained by the computation shown in Expression (68), based on the variation $S_x$ of x, the variation $S_y$ of y, and the covariation $S_{xy}$.

$$r_{xy} = S_{xy} / \sqrt{S_x S_y} \tag{68}$$

Correlation includes positive correlation and negative correlation, so the region calculating unit 605 obtains the absolute value of the correlation coefficient $r_{xy}$, and determines that the closer to 1 the absolute value of the correlation coefficient $r_{xy}$ is, the greater the correlation is. More specifically, the region calculating unit 605 compares the threshold value with the absolute value of the correlation coefficient $r_{xy}$, and detects a region wherein the correlation coefficient $r_{xy}$ is equal to or greater than the threshold value as a region having data continuity.

Figure 119:
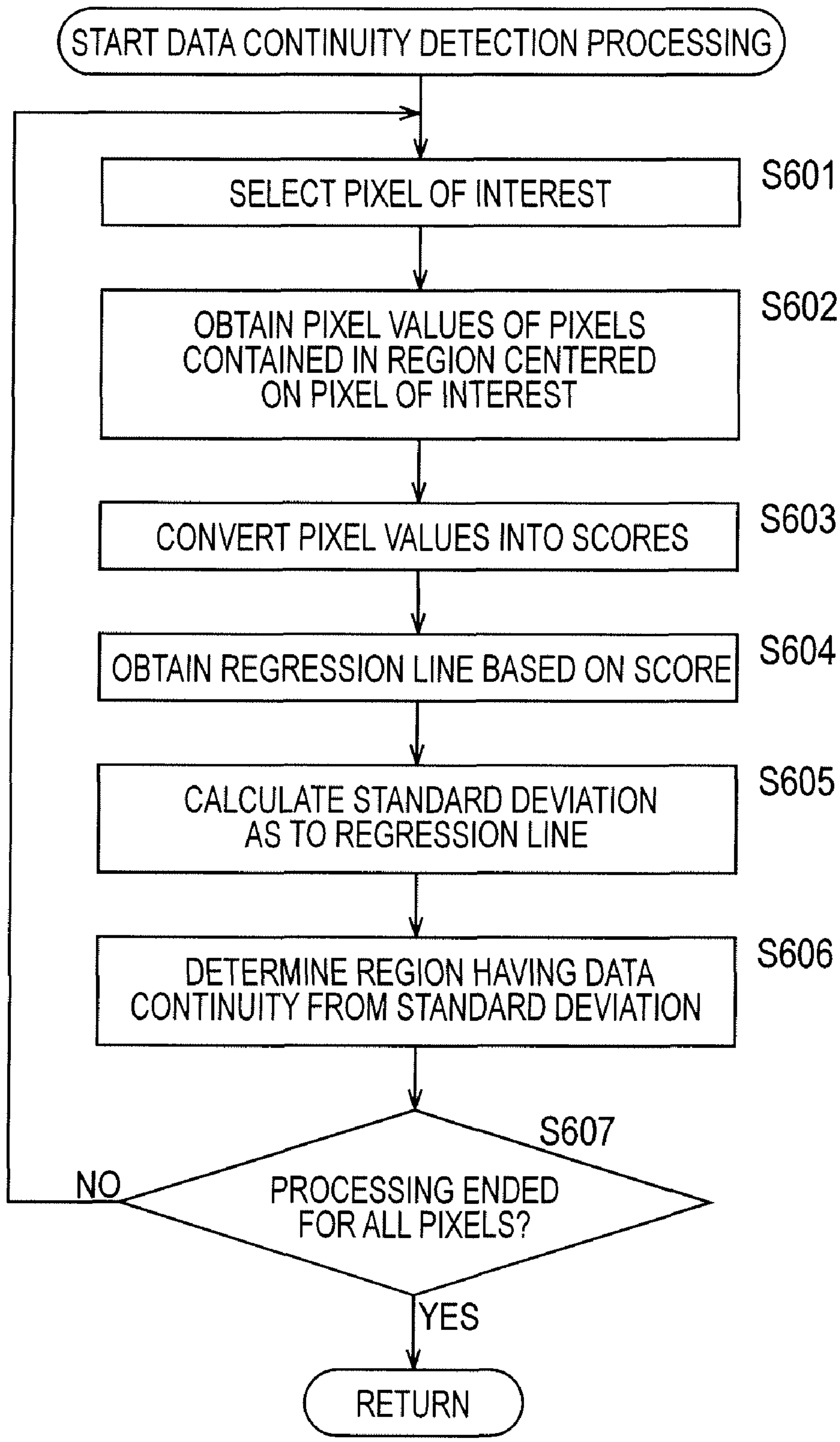
FIG. 119 is a flowchart for describing the processing for detection of data continuity with the data continuity detecting unit 101 of which the configuration is illustrated in FIG. 115.

The processing for detecting data continuity with the data continuity detecting unit 101 of which the configuration is shown in FIG. 115, corresponding to the processing in step S101, will be described with reference to the flowchart shown in FIG. 119.

In step S601, the pixel acquiring unit 602 selects a pixel of interest from pixels which have not yet been taken as the pixel of interest. For example, the pixel acquiring unit 602 selects the pixel of interest in raster scan order. In step S602, the pixel acquiring unit 602 acquires the pixel values of the pixel contained in a region centered on the pixel of interest, and supplies the pixel values of the pixels acquired to the score detecting unit 603. For example, the pixel acquiring unit 602 selects a region made up of 9×5 pixels centered on the pixel of interest, and acquires the pixel values of the pixels contained in the region.

In step S603, the score detecting unit 603 converts the pixel values of the pixels contained in the region into scores, thereby detecting scores. For example, the score detecting unit 603 converts the pixel values into scores $L_{i,j}$ by the computation shown in Expression (49). In this case, the score detecting unit 603 converts the pixel values of the pixels of the region into the scores $L_{i,j}$ such that the scores $L_{i,j}$ have a Gaussian distribution. The score detecting unit 603 supplies the converted scores to the regression line computing unit 604.

In step S604, the regression line computing unit 604 obtains a regression line based on the scores supplied from the score detecting unit 603. For example, the regression line computing unit 604 obtains the regression line based on the scores supplied from the score detecting unit 603. More specifically, the regression line computing unit 604 obtains the regression line by executing the computation shown in Expression (61) and Expression (62). The regression line computing unit 604 supplies computation result parameters indicating the regression line which is the result of computation, to the region calculating unit 605.

In step S605, the region calculating unit 605 calculates the standard deviation regarding the regression line. For example, an arrangement may be made wherein the region calculating unit 605 calculates the standard deviation as to the regression line by the computation of Expression (67).

In step S606, the region calculating unit 605 determines the region of the input image having data continuity, from the standard deviation. For example, the region calculating unit 605 multiplies the standard deviation by a predetermined coefficient to obtain distance, and determines the region within the obtained distance from the regression line to be the region having data continuity.

The region calculating unit 605 outputs data continuity information indicating a region having data continuity.

In step S607, the pixel acquiring unit 602 determines whether or not the processing of all pixels has ended, and in the event that determination is made that the processing of all pixels has not ended, the flow returns to step S601, a pixel of interest is selected from the pixels which have not yet been taken as a pixel of interest, and the above-described processing is repeated.

In the event that determination is made in step S607 that the processing of all pixels has ended, the processing ends.

Figure 120:
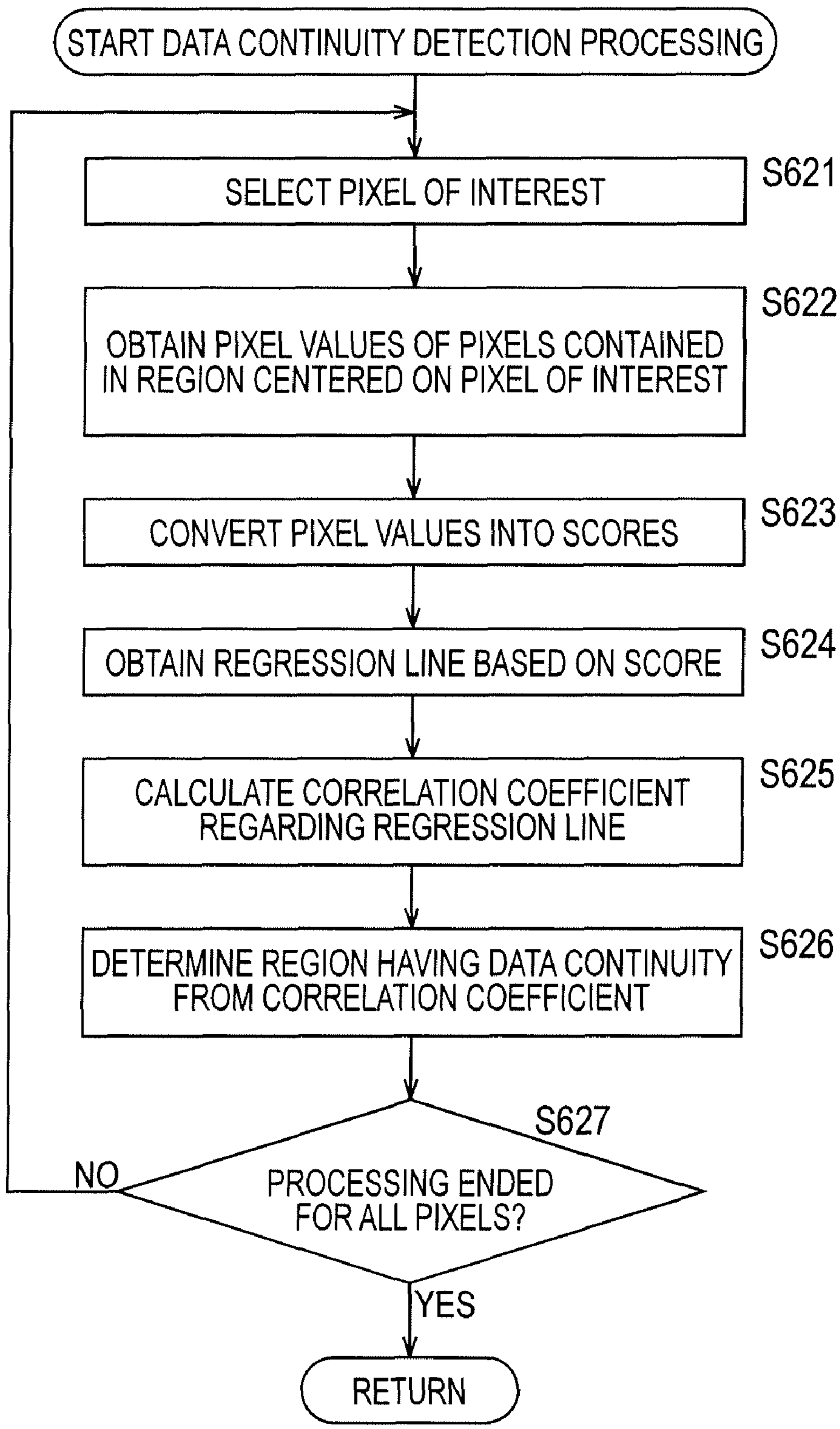

Other processing for detecting data continuity with the data continuity detecting unit 101 of which the configuration is shown in FIG. 115, corresponding to the processing in step S101, will be described with reference to the flowchart shown in FIG. 120. The processing of step S621 through step S624 is the same as the processing of step S601 through step S604, so description thereof will be omitted.

In step S625, the region calculating unit 605 calculates a correlation coefficient regarding the regression line. For example, the region calculating unit 605 calculates the correlation coefficient as to the regression line by the computation of Expression (68).

In step S626, the region calculating unit 605 determines the region of the input image having data continuity, from the correlation coefficient. For example, the region calculating unit 605 compares the absolute value of the correlation coefficient with a threshold value stored beforehand, and determines a region wherein the absolute value of the correlation coefficient is equal to or greater than the threshold value to be the region having data continuity.

The region calculating unit 605 outputs data continuity information indicating a region having data continuity.

The processing of step S627 is the same as the processing of step S607, so description thereof will be omitted.

Thus, the data continuity detecting unit 101 of which the configuration is shown in FIG. 115 can detect the region in the image data having data continuity, corresponding to the dropped actual world 1 light signal continuity.

As described above, in a case wherein light signals of the real world are projected, a region, corresponding to a pixel of interest which is the pixel of interest in the image data of which a part of the continuity of the real world light signals has dropped out, is selected, and a score based on correlation value is set for pixels wherein the correlation value of the pixel value of the pixel of interest and the pixel value of a pixel belonging to a selected region is equal to or greater than a threshold value, thereby detecting the score of pixels belonging to the region, and a regression line is detected based on the detected score, thereby detecting the region having the data continuity of the image data corresponding to the continuity of the real world light signals which has dropped out, and subsequently estimating the light signals by estimating the dropped real world light signal continuity based on the detected data continuity of the image data, processing results which are more accurate and more precise as to events in the real world can be obtained.

Figure 121:
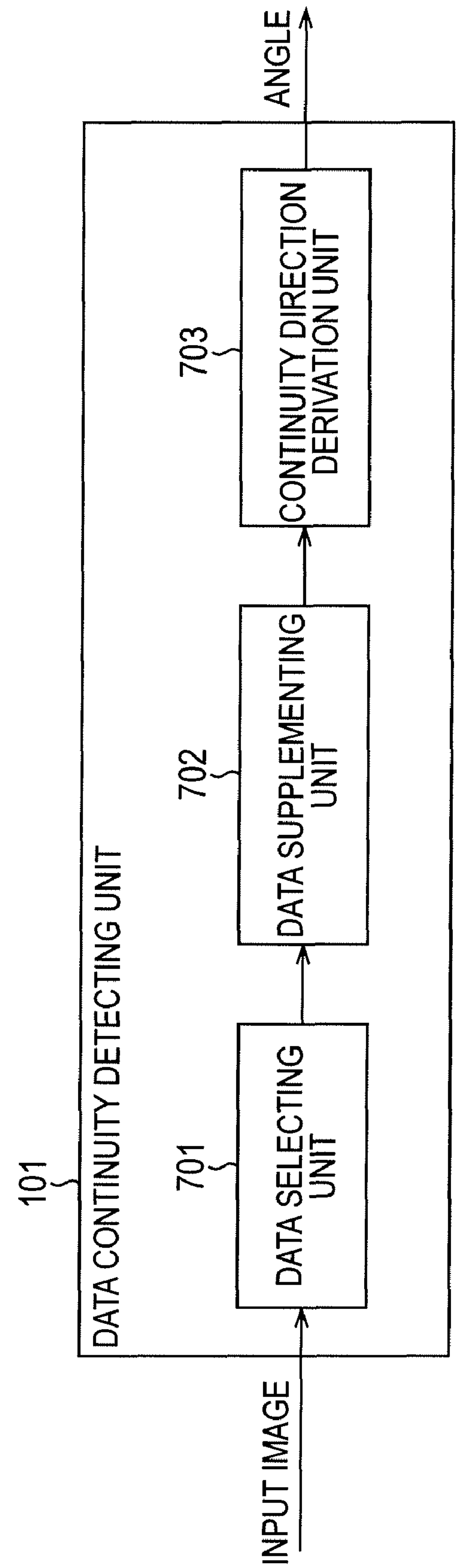

FIG. 121 illustrates the configuration of another form of the data continuity detecting unit 101.

The data continuity detecting unit 101 shown in FIG. 121 comprises a data selecting unit 701, a data supplementing unit 702, and a continuity direction derivation unit 703.

The data selecting unit 701 takes each pixel of the input image as the pixel of interest, selects pixel value data of pixels corresponding to each pixel of interest, and outputs this to the data supplementing unit 702.

The data supplementing unit 702 performs least-square supplementation computation based on the data input from the data selecting unit 701, and outputs the supplementation computation results of the continuity direction derivation unit 703. The supplementation computation by the data supplementing unit 702 is computation regarding the summation item used in the later-described least-square computation, and the computation results thereof can be said to be the feature of the image data for detecting the angle of continuity.

The continuity direction derivation unit 703 computes the continuity direction, i.e., the angle as to the reference axis which the data continuity has (e.g., the gradient or direction of a fine line or two-valued edge) from the supplementation computation results input by the data supplementing unit 702, and outputs this as data continuity information.

Next, the overview of the operations of the data continuity detecting unit 101 in detecting continuity (direction or angle) will be described with reference to FIG. 122. Portions in FIG. 122 and FIG. 123 which correspond with those in FIG. 6 and FIG. 7 are denoted with the same symbols, and description thereof in the following will be omitted as suitable.

Figure 122:
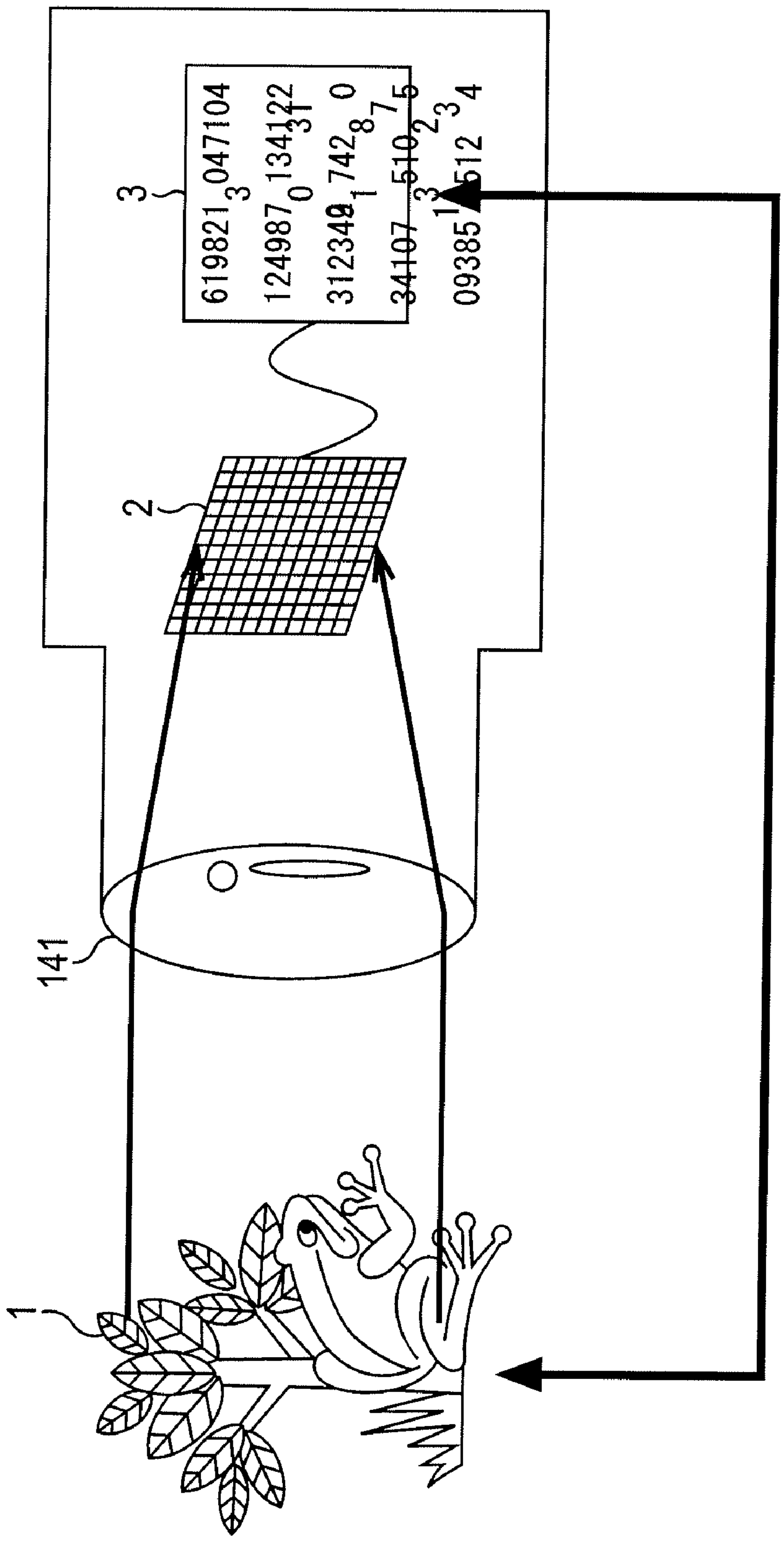

As shown in FIG. 122, signals of the actual world 1 (e.g., an image), are imaged on the photoreception face of a sensor 2 (e.g., a CCD (Charge Coupled Device) or CMOS (Complementary Metal-Oxide Semiconductor)), by an optical system 141 (made up of lenses, an LPF (Low Pass Filter), and the like, for example). The sensor 2 is configured of a device having integration properties, such as a CCD or CMOS, for example. Due to this configuration, the image obtained from the data 3 output from the sensor 2 is an image differing from the image of the actual world 1 (difference as to the image of the actual world 1 occurs).

Figure 123:
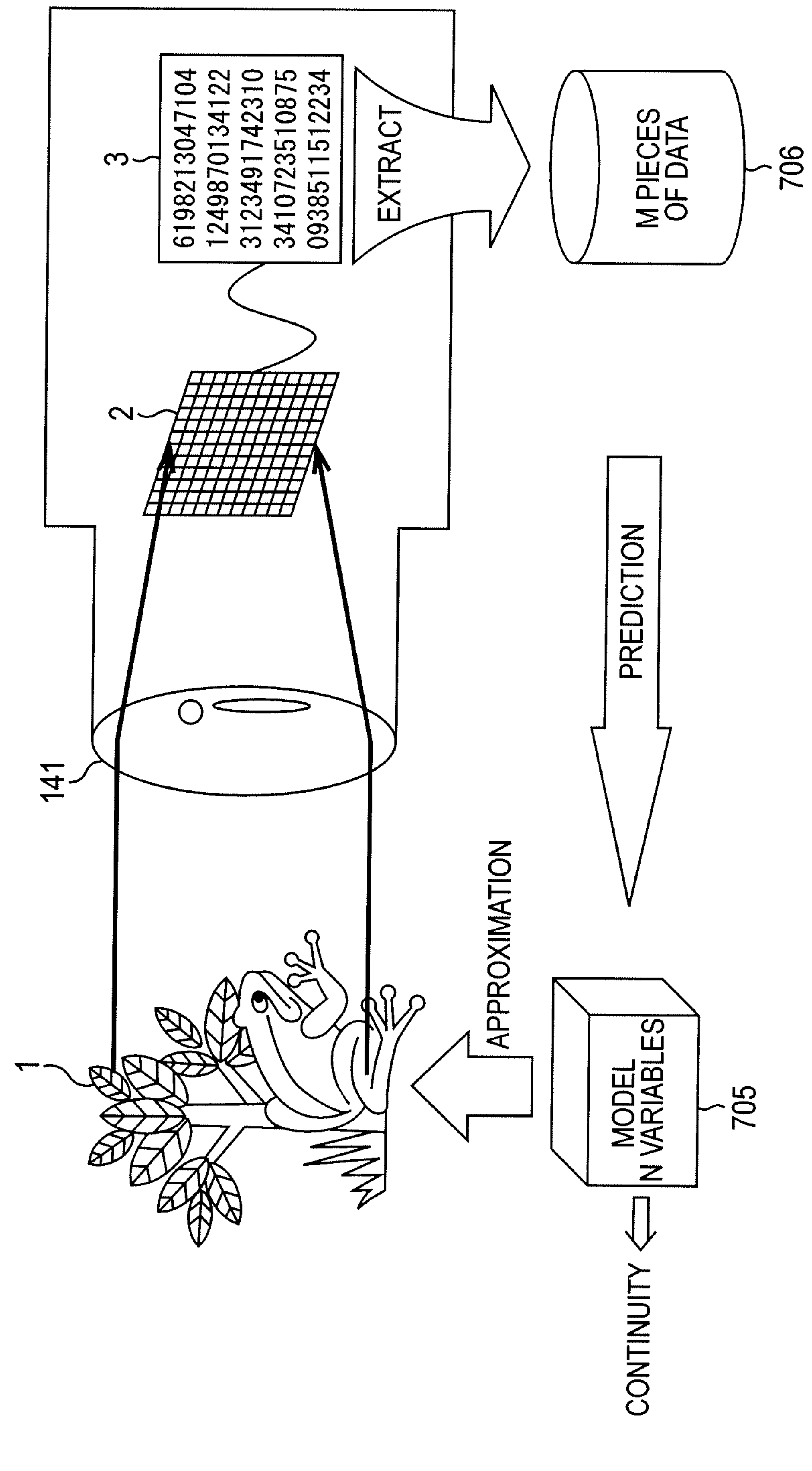

Accordingly, as shown in FIG. 123, the data continuity detecting unit 101 uses a model 705 to describe in an approximate manner the actual world 1 by an approximation expression and extracts the data continuity from the approximation expression. The model 705 is represented by, for example, N variables. More accurately, the model 705 approximates (describes) signals of the actual world 1.

In order to predict the model 705, the data continuity detecting unit 101 extracts M pieces of data 706 from the data 3. Consequently, the model 705 is constrained by the continuity of the data.

That is to say, the model 705 approximates continuity of the (information (signals) indicating) events of the actual world 1 having continuity (constant characteristics in a predetermined dimensional direction), which generates the data continuity in the data 3 when obtained with the sensor 2.

Now, in the event that the number M of the data 706 is N, which is the number N of variables of the model 705, or more, the model 705 represented by the N variables can be predicted from M pieces of data 706.

Further, by predicting the model 705 approximating (describing) the signals of) the actual world 1, the data continuity detecting unit 101 derives the data continuity contained in the signals which are information of the actual world 1 as, for example, fine line or two-valued edge direction (the gradient, or the angle as to an axis in a case wherein a predetermined direction is taken as an axis), and outputs this as data continuity information.

Next, the data continuity detecting unit 101 which outputs the direction (angle) of a fine line from the input image as data continuity information will be described with reference to FIG. 124.

The data selecting unit 701 is configured of a horizontal/vertical determining unit 711, and a data acquiring unit 712. The horizontal/vertical determining unit 711 determines, from the difference in pixel values between the pixel of interest and the surrounding pixels, whether the angle as to the horizontal direction of the fine line in the input image is a fine line closer to the horizontal direction or is a fine line closer to the vertical direction, and outputs the determination results to the data acquiring unit 712 and data supplementing unit 702.

Figure 125:
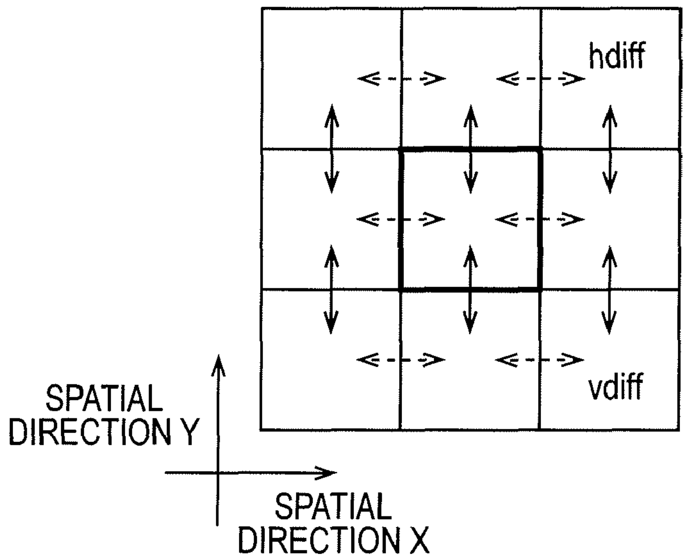

In more detail, for example, in the sense of this technique, other techniques may be used as well. For example, simplified 16-directional detection may be used. As shown in FIG. 125, of the difference between the pixel of interest and the surrounding pixels (difference in pixel values between the pixels), the horizontal/vertical determining unit 711 obtains the difference between the sum of difference (activity) between pixels in the horizontal direction (hdiff) and the sum of difference (activity) between pixels in the vertical direction (vdiff), and determines whether the sum of difference is greater between the pixel of interest and pixels adjacent thereto in the vertical direction, or between the pixel of interest and pixels adjacent thereto in the horizontal direction. Now, in FIG. 125, each grid represents a pixel, and the pixel at the center of the diagram is the pixel of interest. Also, the differences between pixels indicated by the dotted arrows in the diagram are the differences between pixels in the horizontal direction, and the sum thereof is indicated by hdiff. Also, the differences between pixels indicated by the solid arrows in the diagram are the differences between pixels in the vertical direction, and the sum thereof is indicated by vdiff.

Figure 126:
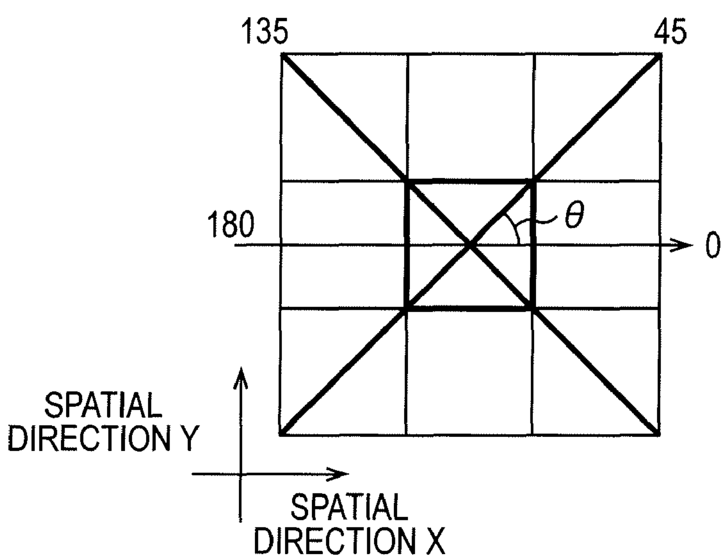

Based on the sum of differences hdiff of the pixel values of the pixels in the horizontal direction, and the sum of differences vdiff of the pixel values of the pixels in the vertical direction, that have been thus obtained, in the event that (hdiff minus vdiff) is positive, this means that the change (activity) of pixel values between pixels is greater in the horizontal direction than the vertical direction, so in a case wherein the angle as to the horizontal direction is represented by θ (0 degrees degrees ≦θ≦180 degrees degrees) as shown in FIG. 126, the horizontal/vertical determining unit 711 determines that the pixels belong to a fine line which is 45 degrees degrees<θ≦135 degrees degrees, i.e., an angle closer to the vertical direction, and conversely, in the event that this is negative, this means that the change (activity) of pixel values between pixels is greater in the vertical direction, so the horizontal/vertical determining unit 711 determines that the pixels belong to a fine line which is 0 degrees degrees≦θ<45 degrees degrees or 135 degrees degrees<θ≦180 degrees degrees, i.e., an angle closer to the horizontal direction (pixels in the direction (angle) in which the fine line extends each are pixels representing the fine line, so change (activity) between those pixels should be smaller).

Also, the horizontal/vertical determining unit 711 has a counter (not shown) for identifying individual pixels of the input image, and can be used whenever suitable or necessary.

Also, while description has been made in FIG. 125 regarding an example of comparing the sum of difference of pixel values between pixels in the vertical direction and horizontal direction in a 3 pixel×3 pixel range centered on the pixel of interest, to determine whether the fine line is closer to the vertical direction or closer to the horizontal direction, but the direction of the fine line can be determined with the same technique using a greater number of pixels, for example, determination may be made based on blocks of 5 pixels×5 pixels centered on the pixel of interest, 7 pixels×7 pixels, and so forth, i.e., a greater number of pixels.

Based on the determination results regarding the direction of the fine line input from the horizontal/vertical determining unit 711, the data acquiring unit 712 reads out (acquires) pixel values in increments of blocks made up of multiple pixels arrayed in the horizontal direction corresponding to the pixel of interest, or in increments of blocks made up of multiple pixels arrayed in the vertical direction, and along with data of difference between pixels adjacent in the direction according to the determination results from the horizontal/vertical determining unit 711 between multiple corresponding pixels for each pixel of interest read out (acquired), maximum value and minimum value data of pixel values of the pixels contained in blocks of a predetermined number of pixels is output to the data supplementing unit 702. Hereafter, a block made up of multiple pixels obtained corresponding to the pixel of interest by the data acquiring unit 712 will be referred to as an acquired block (of the multiple pixels (each represented by a grid) shown in FIG. 139 described later for example, with the pixel indicated by the black square as the pixel of interest, an acquired block is the three pixels above and below, and one pixel to the right and left, for a total of 15 pixels.

The difference supplementing unit 721 of the data supplementing unit 702 detects the difference data input from the data selecting unit 701, executes supplementing processing necessary for solution of the later-described least-square method, based on the determination results of horizontal direction or vertical direction input from the horizontal/vertical determining unit 711 of the data selecting unit 701, and outputs the supplementing results to the continuity direction derivation unit 703. More specifically, of the multiple pixels, the data of difference in the pixel values between the pixel i adjacent in the direction determined by the horizontal/vertical determining unit 711 and the pixel (i+1) is taken as yi, and in the event that the acquired block corresponding to the pixel of interest is made up of n pixels, the difference supplementing unit 721 computes supplementing of $(y1)^2+(y2)^2+(y3)^2+\ldots$ for each horizontal direction or vertical direction, and outputs to the continuity direction derivation unit 703.

Upon obtaining the maximum value and minimum value of pixel values of pixels contained in a block set for each of the pixels contained in the acquired block corresponding to the pixel of interest input from the data selecting unit 701 (hereafter referred to as a dynamic range block (of the pixels in the acquired block indicated in FIG. 139 which will be described later, a dynamic range block of the three pixels above and below the pixel pix12 for a total of 7 pixels, illustrated as the dynamic range block B1 surrounded with a black solid line)), a MaxMin acquiring unit 722 computes (detects) from the difference thereof a dynamic range Dri (the difference between the maximum value and minimum value of pixel values of pixels contained in the dynamic range block corresponding to the i'th pixel in the acquired block), and outputs this to a difference supplementing unit 723.

The difference supplementing unit 723 detects the dynamic range Dri input from the MaxMin acquiring unit 722 and the difference data input from the data selecting unit 701, supplements each horizontal direction or vertical direction input from the horizontal/vertical determining unit 711 of the data selecting unit 701 with a value obtained by multiplying the dynamic range Dri and the difference data yi based on the dynamic range Dri and the difference data which have been detected, and outputs the computation results to the continuity direction derivation unit 703. That is to say, the computation results which the difference supplementing unit 723 outputs is $y1\times Dr1+y2\times Dr2+y3\times Dr3+\ldots$ in each horizontal direction or vertical direction.

The continuity direction computation unit 731 of the continuity direction derivation unit 703 computes the angle (direction) of the fine line based on the supplemented computation results in each horizontal direction or vertical direction input from the data supplementing unit 702, and outputs the computed angle as continuity information.

Now, the method for computing the direction (gradient or angle of the fine line) of the fine line will be described.

Figure 127A:
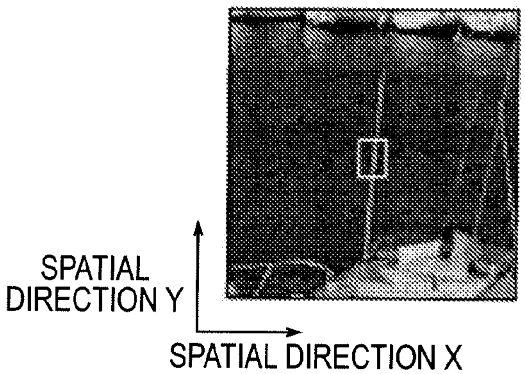
Figure 127B:
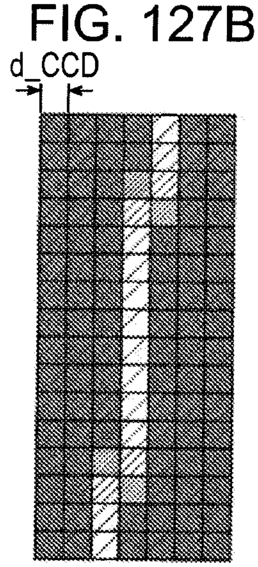
Figure 127C:
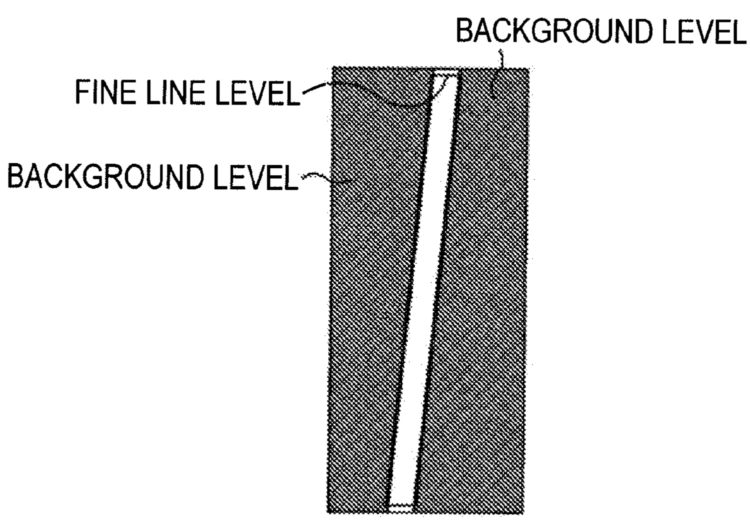

Enlarging the portion surrounded by the white line in an input image such as shown in FIG. 127A shows that the fine line (the white line extending diagonally in the upwards right direction in the drawing) is actually displayed as in FIG. 127B. That is to say, in the real world, the image is such that as shown in FIG. 127C, the two levels of fine-line level (the lighter hatched portion in FIG. 127C) and the background level form boundaries, and no other levels exist. Conversely, the image taken with the sensor 2, i.e., the image imaged in increments of pixels, is an image wherein, as shown in FIG. 127B, there is a repeated array in the fine line direction of blocks which are made up of multiple pixels with the background level and the fine line level spatially mixed due to the integration effects, arrayed in the vertical direction so that the ratio (mixture ratio) thereof changes according to a certain pattern. Note that in FIG. 127B, each square-shaped grid represents one pixel of the CCD, and we will say that the length of each side thereof is d_CCD. Also, the portions of the grids filled in lattice-like are the minimum value of the pixel values, equivalent to the background level, and the other portions filled in hatched have a greater pixel value the less dense the shading is (accordingly, white grids with no shading have the maximum value of the pixel values).

Figure 128A:
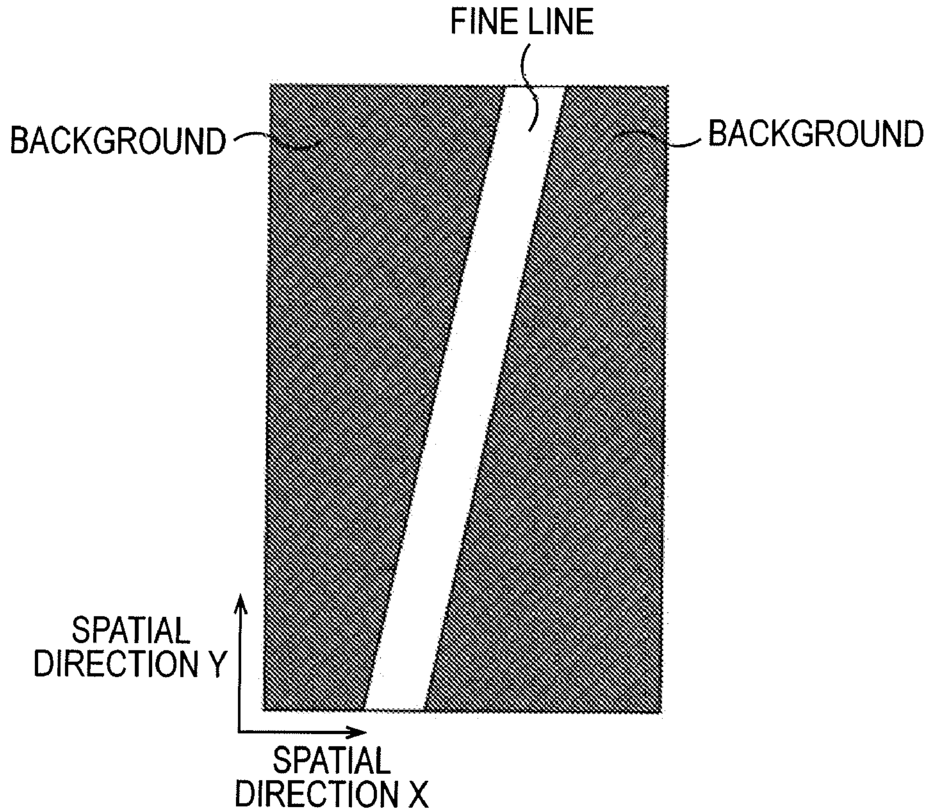
Figure 128B:
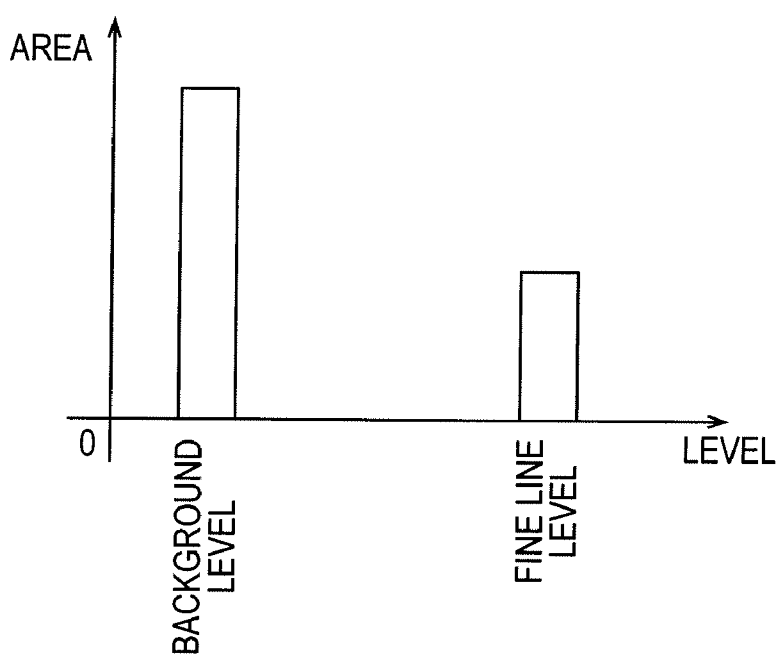

In the event that a fine line exists on the background in the real world as shown in FIG. 128A, the image of the real world can be represented as shown in FIG. 128B with the level as the horizontal axis and the area in the image of the portion corresponding to that level as the vertical axis, which shows that there is a relation in area occupied in the image between the area corresponding to the background in the image and the area of the portion corresponding to the fine line.

In the same way, as shown in FIG. 129A, the image taken with the sensor 2 is an image wherein there is a repeated array in the direction in which the fine line exists of blocks which are made up of pixels with the background level and the fine line level mixed arrayed in the vertical direction in the pixel of the background level, so that the mixture ratio thereof changes according to a certain pattern, and accordingly, a mixed space region made up of pixels occurring as the result of spatially mixing the background and the fine line, of a level partway between the region which is the background level (background region) and the fine line level, as shown in FIG. 129B. Now, while the vertical axis in FIG. 129B is the number of pixels, the area of one pixel is $(d\_CCD)^2$, so it can be said that the relation between the level of pixel values and the number of pixels in FIG. 129B is the same as the relation between the level of pixel values and distribution of area.

The same results are obtained regarding the portion enclosed with the white line in the actual image shown in FIG. 130A (an image 31 pixels×31 pixels), as shown in FIG. 130B. As shown in FIG. 130B, the background portions shown in FIG. 130A (the portions which appear black in FIG. 130A) has distribution of a great number of pixels with low pixel value level (with pixel values around 20), and these portions with little change make up the image of the background region. Conversely, the portion wherein the pixel value level in FIG. 130B is not low, i.e., pixels with pixel value level distribution of around 40 to around 160 are pixels belonging to the spatial mixture region which make up the image of the fine line, and while the number of pixels for each pixel value is not great, these are distributed over a wide range of pixel values.

Now, viewing the levels of each of the background and the fine line in the real world image along the arrow direction (Y-coordinate direction) shown in FIG. 131A for example, change occurs as shown in FIG. 131B. That is to say, the background region from the start of the arrow to the fine line has a relatively low background level, and the fine line region has the fine line level which is a high level, and passing the fine line region and returning to the background region returns to the background level which is a low level. As a result, this forms a pulse-shaped waveform where only the fine line region is high level.

Conversely, in the image taken with the sensor 2, the relationship between the pixel values of the pixels of the spatial direction X=X1 in FIG. 132A corresponding to the arrow in FIG. 131A (the pixels indicated by black dots in FIG. 132A) and the spatial direction Y of these pixels is as shown in FIG. 132B. Note that in FIG. 132A, between the two white lines extending toward the upper right represents the fine line in the image of the real world.

That is to say, as shown in FIG. 132B, the pixel corresponding to the center pixel in FIG. 132A has the highest pixel value, so the pixel values of the pixels increases as the position of the spatial direction Y moves from the lower part of the figure toward the center pixel, and then gradually decreases after passing the center position. As a result, as shown in FIG. 132B, peak-shaped waveforms are formed. Also, the change in pixel values of the pixels corresponding to the spatial directions X=X0 and X2 in FIG. 132A also have the same shape, although the position of the peak in the spatial direction Y is shifted according to the gradient of the fine line.

Even in a case of an image actually taken with the sensor 2 as shown in FIG. 133A for example, the same sort of results are obtained, as shown in FIG. 133B. That is to say, FIG. 133B shows the change in pixel values corresponding to the spatial direction Y for each predetermined spatial direction X (in the figure, X=561, 562, 563) of the pixel values around fine line in the range enclosed by the white lines in the image in FIG. 133A. In this way, the image taken with the actual sensor 2 also has waveforms wherein X=561 peaks at Y=730, X=562 at Y=705, and X=563 at Y =685.

Thus, while the waveform indicating change of level near the fine line in the real world image exhibits a pulse-like waveform, the waveform indicating change of pixel values in the image taken by the sensor 2 exhibits peak-shaped waveforms.

That is to say, in other words, the level of the real world image should be a waveform as shown in FIG. 131B, but distortion occurs in the change in the imaged image due to having been taken by the sensor 2, and accordingly it can be said that this has changed into a waveform which is different from the real world image (wherein information of the real world has dropped out), as shown in FIG. 132B.

Accordingly, a model (equivalent to the model 705 in FIG. 123) for approximately describing the real world from the image data obtained from the sensor 2 is set, in order to obtain continuity information of the real world image from the image taken by the sensor 2. For example, in the case of a fine line, the real world image is set, as shown in FIG. 134. That is to say, parameters are set with the level of the background portion at the left part of the image as B1, the background portion at the right part of the image as B2, the level of the fine line portion as L, the mixture ratio of the fine line as α, the width of the fine line as W, and the angle of the fine line as to the horizontal direction as θ, this is formed into a model, a function approximately expressing the real world is set, an approximation function which approximately expresses the real world is obtained by obtaining the parameters, and the direction (gradient or angle as to the reference axis) of the fine line is obtained from the approximation function.

At this time, the left part and right part of the background region can be approximated as being the same, and accordingly are integrated into B (=B1=B2) as shown in FIG. 135. Also, the width of the fine line is to be one pixel or more. At the time of taking the real world thus set with the sensor 2, the taken image is imaged as shown in FIG. 136A. Note that in FIG. 136A, the space between the two white lines extending towards the upper right represents the fine line on the real world image.

That is to say, pixels existing in a position on the fine line of the real world are of a level closest to the level of the fine line, so the pixel value decreases the further away from the fine line in the vertical direction (direction of the spatial direction Y), and the pixel values of pixels which exist at positions which do not come into contact with the fine line region, i.e., background region pixels, have pixel values of the background value. At this time, the pixel values of the pixels existing at positions straddling the fine line region and the background region have pixel values wherein the pixel value B of the background level and the pixel value L of the fine line level L are mixed with a mixture ratio α.

In the case of taking each of the pixels of the imaged image as the pixel of interest in this way, the data acquiring unit 712 extracts the pixels of an acquired block corresponding to the pixel of interest, extracts a dynamic range block for each of the pixels making up the extracted acquired block, and extracts from the pixels making up the dynamic range block a pixel with a pixel value which is the maximum value and a pixel with a pixel value which is the minimum value. That is to say, as shown in FIG. 136A, in the event of extracting pixels of a dynamic range block (e.g., the 7 pixels of pix1 through 7 surrounded by the black solid line in the drawing) corresponding to a predetermined pixel in the acquired block (the pixel pix4 regarding which a square is described with a black solid line in one grid of the drawing), as shown in FIG. 136A, the image of the real world corresponding to each pixel is as shown in FIG. 136B.

That is to say, as shown in FIG. 136B, with the pixel pix1, the portion taking up generally ⅛ of the area to the left is the background region, and the portion taking up generally ⅞ of the area to the right is the fine line region. With the pixel pix2, generally the entire region is the fine line region. With the pixel pix3, the portion taking up generally ⅞ of the area to the left is the fine line region, and the portion taking up generally ⅛ of the area to the right is the background region. With the pixel pix4, the portion taking up generally ⅔ of the area to the left is the fine line region, and the portion taking up generally ⅓ of the area to the right is the background region. With the pixel pix5, the portion taking up generally ⅓ of the area to the left is the fine line region, and the portion taking up generally ⅔ of the area to the right is the background region. With the pixel pix6, the portion taking up generally ⅛ of the area to the left is the fine line region, and the portion taking up generally ⅞ of the area to the right is the background region. Further, with the pixel pix7, the entire region is the background region.

As a result, the pixel values of the pixels pix1 through 7 of the dynamic range block shown in FIG. 136A and FIG. 136B are pixel values wherein the background level and the fine line level are mixed at a mixture ratio corresponding to the ratio of the fine line region and the background region. That is to say, the mixture ratio of background level: foreground level is generally 1:7 for pixel pixe1, generally 0:1 for pixel pix2, generally 1:7 for pixel pix3, generally 1:2 for pixel pix4, generally 2:1 for pixel pix5, generally 7:1 for pixel pix6, and generally 1:0 for pixel pix7.

Accordingly, of the pixel values of the pixels pixe1 through 7 of the dynamic range block that has been extracted, pixel pix2 is the highest, followed by pixels pixe1 and 3, and then in the order of pixel value, pixels pix4, 5, 6, and 7. Accordingly, with the case shown in FIG. 136B, the maximum value is the pixel value of the pixel pix2, and the minimum value is the pixel value of the pixel pix7.

Also, as shown in FIG. 137A, the direction of the fine line can be said to be the direction in which pixels with maximum pixel values continue, so the direction in which pixels with the maximum value are arrayed is the direction of the fine line.

Now, the gradient $G_{f1}$ indicating the direction of the fine line is the ratio of change in the spatial direction Y (change in distance) as to the unit distance in the spatial direction X, so in the case of an illustration such as in FIG. 137A, the distance of the spatial direction Y as to the distance of one pixel in the spatial direction X in the drawing is the gradient $G_{f1}$.

Change of pixel values in the spatial direction Y of the spatial directions X0 through X2 is such that the peak waveform is repeated at predetermined intervals for each spatial direction X, as shown in FIG. 137B. As described above, the direction of the fine line is the direction in which pixels with maximum value continue in the image taken by the sensor 2, so the interval S in the spatial direction Y where the maximum values in the spatial direction X are is the gradient $G_{f1}$ of the fine line. That is to say, as shown in FIG. 137C, the amount of change in the vertical direction as to the distance of one pixel in the horizontal direction is the gradient $G_{f1}$. Accordingly, with the horizontal direction corresponding to the gradient thereof as the reference axis, and the angle of the fine line thereto expressed as θ, as shown in FIG. 137C, the gradient $G_{f1}$ (corresponding to the angle with the horizontal direction as the reference axis) of the fine line can be expressed in the relation shown in the following Expression (69).

$$\theta=\mathrm{Tan}^{-1}(G_{f1})\ (=\mathrm{Tan}^{-1}(S)) \quad (69)$$

Also, in the case of setting a model such as shown in FIG. 135, and further assuming that the relationship between the pixel values of the pixels in the spatial direction Y is such that the waveform of the peaks shown in FIG. 137B is formed of perfect triangles (an isosceles triangle waveform where the leading edge or trailing edge change linearly), and, as shown in FIG. 138, with the maximum value of pixel values of the pixels existing in the spatial direction Y, in the spatial direction X of a predetermined pixel of interest as Max=L (here, a pixel value corresponding to the level of the fine line in the real world), and the minimum value as Min=B (here, a pixel value corresponding to the level of the background in the real world), the relationship illustrated in the following Expression (70) holds.

$$L-B=G_{f1}\times d\_y \quad (70)$$

Here, d_y indicates the difference in pixel values between pixels in the spatial direction Y.

That is to say, the greater the gradient $G_{f1}$ in the spatial direction is, the closer the fine line is to being vertical, so the waveform of the peaks is a waveform of isosceles triangles with a great base, and conversely, the smaller the gradient S is, the smaller the base of the isosceles triangles of the waveform is. Consequently, the greater the gradient $G_{f1}$ is, the smaller the difference d_y of the pixel values between pixels in the spatial direction Y is, and the smaller the gradient S is, the greater the difference d_y of the pixel values between pixels in the spatial direction Y is.

Accordingly, obtaining the gradient $G_{f1}$ where the above Expression (70) holds allows the angle θ of the fine line as to the reference axis to be obtained. Expression (70) is a single-variable function wherein $G_{f1}$ is the variable, so this could be obtained using one set of difference d_y of the pixel values between pixels (in the vertical direction) around the pixel of interest, and the difference between the maximum value and minimum value (L−B), however, as described above, this uses an approximation expression assuming that the change of pixel values in the spatial direction Y assumes a perfect triangle, so dynamic range blocks are extracted for each of the pixels of the extracted block corresponding to the pixel of interest, and further the dynamic range Dr is obtained from the maximum value and the minimum value thereof, as well as statistically obtaining by the least-square method, using the difference d_y of pixel values between pixels in the spatial direction Y for each of the pixels in the extracted block.

Now, before starting description of statistical processing by the least-square method, first, the extracted block and dynamic range block will be described in detail.

As shown in FIG. 139 for example, the extracted block may be three pixels above and below the pixel of interest (the pixel of the grid where a square is drawn with black solid lines in the drawing) in the spatial direction Y, and one pixel to the right and left in the spatial direction X, for a total of 15 pixels, or the like. Also, in this case, for the difference d_y of pixel values between each of the pixels in the extracted block, with difference corresponding to pixel pix11 being expressed as d_y11 for example, in the case of spatial direction X=X0, differences d_y11 through d_y16 are obtained for the pixel values between the pixels pix11 and pix12, pix12 and pix13, pix13 and pix14, pix15 and pix16, and pix16 and pix17. At this time, the difference of pixel values between pixels is obtained in the same way for spatial direction X=X1 and X2, as well. As a result, there are 18 differences d_y of pixel values between the pixels.

Further, with regard to the pixels of the extracted block, determination has been made for this case based on the determination results of the horizontal/vertical determining unit 711 that the pixels of the dynamic range block are, with regard to pix11 for example, in the vertical direction, so as shown in FIG. 139, the pixel pix11 is taken along with three pixels in both the upwards and downwards direction which is the vertical direction (spatial direction Y) so that the range of the dynamic range block B1 is 7 pixels, the maximum value and minimum value of the pixel values of the pixels in this dynamic range block B1 is obtained, and further, the dynamic range obtained from the maximum value and the minimum value is taken as dynamic range Dr11. In the same way, the dynamic range Dr12 is obtained regarding the pixel pix12 of the extracted block from the 7 pixels of the dynamic range block B2 shown in FIG. 139 in the same way. Thus, the gradient $G_{f1}$ is statistically obtained using the least-square method, based on the combination of the 18 pixel differences d_yi in the extracted block and the corresponding dynamic ranges Dri.

Next, the single-variable least-square solution will be described. Let us assume here that the determination results of the horizontal/vertical determining unit 711 are the vertical direction.

The single-variable least-square solution is for obtaining, for example, the gradient $Gf_1$ of the straight line made up of prediction values Dri_c wherein the distance to all of the actual measurement values indicated by black dots in FIG. 140 is minimal. Thus, the gradient S is obtained from the following technique based on the relationship indicated in the above-described Expression (70).

That is to say, with the difference between the maximum value and the minimum value as the dynamic range Dr, the above Expression (70) can be described as in the following Expression (71).

$$Dr=G_{f1}\times d\_y \quad (71)$$

Thus, the dynamic range Dri_c can be obtained by substituting the difference d_yi between each of the pixels in the extracted block into the above Expression (71). Accordingly, the relation of the following Expression (72) is satisfied for each of the pixels.

$$Dri\_c = G_{fl} \times d\_yi \tag{72}$$

Here, the difference d_yi is the difference in pixel values between pixels in the spatial direction Y for each of the pixels i (for the example, the difference in pixel values between pixels adjacent to a pixel i in the upward direction or the downward direction, and Dri_c is the dynamic range obtained when the Expression (70) holds regarding the pixel i.

As described above, the least-square method as used here is a method for obtaining the gradient $G_{fl}$ wherein the sum of squared differences Q of the dynamic range Dri_c for the pixel i of the extracted block and the dynamic range Dri_r which is the actual measured value of the pixel i, obtained with the method described with reference to FIG. 136A and FIG. 136B, is the smallest for all pixels within the image. Accordingly, the sum of squared differences Q can be obtained by the following Expression (73).

$$\begin{aligned} Q &= \sum_{i=1}^{n} \{Dr_i\_r - Dr_i\_c\}^2 \\ &= \sum_{i=1}^{n} \{Dr_i\_r - G_{fl} \times d\_y_i\}^2 \end{aligned} \tag{73}$$

The sum of squared differences Q shown in Expression (73) is a quadratic function, which assumes a downward-convex curve as shown in FIG. 141 regarding the variable $G_{fl}$ (gradient $G_{fl}$), so $G_{fl}$min where the gradient $G_{fl}$ is the smallest is the solution of the least-square method.

Differentiating the sum of squared differences Q shown in Expression (73) with the variable $G_{fl}$ yields $dQ/dG_{fl}$ shown in the following Expression (74).

$$\frac{\partial Q}{\partial G_{fl}} = \sum_{i=1}^{n} 2(-d\_y_i)(Dr_i\_r - G_{fl} \times d\_y_i) \tag{74}$$

With Expression (74), 0 is the $G_{fl}$min assuming the minimal value of the sum of squared differences Q shown in FIG. 141, so by expanding the Expression wherein Expression (74) is 0 yields the gradient $G_{fl}$ with the following Expression (75).

$$G_{fl} = \frac{\sum_{i=1}^{n} Dr_i\_r \times d\_y_i}{\sum_{i=1}^{n} (d\_y_i)} \tag{75}$$

The above Expression (75) is a so-called single-variable (gradient $G_{fl}$) normal equation.

Thus, substituting the obtained gradient $G_{fl}$ into the above Expression (69) yields the angle θ of the fine line with the horizontal direction as the reference axis, corresponding to the gradient $G_{fl}$ of the fine line.

Now, in the above description, description has been made regarding a case wherein the pixel of interest is a pixel on the fine line which is within a range of angle θ of 45 degrees degrees≦θ<135 degrees degrees with the horizontal direction as the reference axis, but in the event that the pixel of interest is a pixel on the fine line closer to the horizontal direction, within a range of angle θ of 0 degrees degrees≦θ<45 degrees degrees or 135 degrees degrees≦θ<108 degrees degrees with the horizontal direction as the reference axis for example, the difference of pixel values between pixels adjacent to the pixel i in the horizontal direction is d_xi, and in the same way, at the time of obtaining the maximum value or minimum value of pixel values from the multiple pixels corresponding to the pixel i, the pixels of the dynamic range block to be extracted are selected from multiple pixels existing in the horizontal direction as to the pixel i. With the processing in this case, the relationship between the horizontal direction and vertical direction in the above description is simply switched, so description thereof will be omitted.

Also, similar processing can be used to obtain the angle corresponding to the gradient of a two-valued edge.

That is to say, enlarging the portion in an input image such as that enclosed by the white lines as illustrated in FIG. 142A shows that the edge portion in the image (the lower part of the cross-shaped character written in white on a black banner in the figure) (hereafter, an edge portion in an image made up of two value levels will also be called a two-valued edge) is actually displayed as shown in FIG. 142B. That is to say, in the real world, the image has a boundary formed of the two types of levels of a first level (the field level of the banner) and a second level (the level of the character (the hatched portion with low concentration in FIG. 142C)), and no other levels exist. Conversely, with the image taken by the sensor 2, i.e., the image taken in increments of pixels, a portion where first level pixels are arrayed and a portion where second level pixels are arrayed border on a region wherein there is a repeated array in the direction in which the edge exists of blocks which are made up of pixels occurring as the result of spatially mixing the first level and the second level, arrayed in the vertical direction, so that the ratio (mixture ratio) thereof changes according to a certain pattern.

That is to say, as shown in FIG. 143A, with regard to the spatial direction X=X0, X1, and X2, the respective change of pixel values in the spatial direction Y is such that as shown in FIG. 143B, the pixel values are a predetermined minimum value pixel value from the bottom of the figure to near to the two-valued edge (the straight line in FIG. 143A which heads toward the upper right) boundary, but the pixel value gradually increases near the two-valued edge boundary, and at the point $P_E$ in the drawing past the edge the pixel value reaches a predetermined maximum value. More specifically, the change of the spatial direction X=X0 is such that the pixel value gradually increases after passing the point $P_s$ which is the minimum value of the pixel value, and reaches the point P0 where the pixel value is the maximum value, as shown in FIG. 143B. In comparison with this, the change of pixel values of the pixels in the spatial direction X=X1 exhibits a waveform offset in the spatial direction, and accordingly increases to the maximum value of the pixel value via the point P1 in the drawing, with the position where the pixel value gradually increases from the minimum value of pixel values being a direction offset in the positive direction of the spatial direction Y as shown in FIG. 143B. Further, change of pixel values in the spatial direction Y at the spatial direction X=X2 decreases via a point P2 in the drawing which is even further shifted in the positive direction of the spatial direction Y, and goes from the maximum value of the pixel value to the minimum value.

A similar tendency can be observed at the portion enclosed with the white line in the actual image, as well. That is to say, in the portion enclosed with the white line in the actual image in FIG. 144A (a 31 pixel×31 pixel image), the background portion (the portion which appears black in FIG. 144A) has distribution of a great number of pixels with low pixel values (pixel value around 90) as shown in FIG. 144B, and these portions with little change form the image of the background region. Conversely, the portion in FIG. 144B wherein the pixel values are not low, i.e., pixels with pixel values distributed around 100 to 200 are a distribution of pixels belonging to the spatially mixed region between the character region and the background region, and while the number of pixels per pixel value is small, the distribution is over a wide range of pixel values. Further, a great number of pixels of the character region with high pixel values (the portion which appears white in FIG. 144A) are distributed around the pixel value shown as 220.

As a result, the change of pixel values in the spatial direction Y as to the predetermined spatial direction X in the edge image shown in FIG. 145A is as shown in FIG. 145B.

That is, FIG. 145B illustrates the change of pixel values corresponding to the spatial direction Y, for each predetermined spatial direction X (in the drawing, X=658, 659, 660) regarding the pixel values near the edge within the range enclosed by the white lines in the image in FIG. 145A. As can be seen here, in the image taken by the actual sensor 2 as well, with X=658, the pixel value begins to increase around Y=374 (the distribution indicated by black circles in the drawing), and reaches the maximum value around X=382. Also, with X=659, the pixel value begins to increase around Y=378 which is shifted in the positive direction as to the spatial direction Y (the distribution indicated by black triangles in the drawing), and reaches the maximum pixel value around X=386. Further, with X=660, the pixel value begins to increase around Y=382 which is shifted even further in the positive direction as to the spatial direction Y (the distribution indicated by black squares in the drawing), and reaches the maximum value around X=390.

Accordingly, in order to obtain continuity information of the real world image from the image taken by the sensor 2, a model is set to approximately describe the real world from the image data acquired by the sensor 2. For example, in the case of a two-valued edge, a real world image is set, as shown in FIG. 146. That is to say, parameters are set with the background portion level to the left in the figure as V1, the character portion level to the right side in the figure as V2, the mixture ratio between pixels around the two-valued edge as $\alpha$, and the angle of the edge as to the horizontal direction as $\theta$, this is formed into a model, a function which approximately expresses the real world is set, the parameters are obtained so as to obtain a function which approximately expresses the real world, and the direction (gradient, or angle as to the reference axis) of the edge is obtained from the approximation function.

Now, the gradient indicating the direction of the edge is the ratio of change in the spatial direction Y (change in distance) as to the unit distance in the spatial direction X, so in a case such as shown in FIG. 147A, the distance in the spatial direction Y as to the distance of one pixel in the spatial direction X in the drawing is the gradient.

The change in pixel values as to the spatial direction Y for each of the spatial directions X0 through X2 is such that the same waveforms are repeated at predetermined intervals for each of the spatial directions X, as shown in FIG. 147B. As described above, the edge in the image taken by the sensor 2 is the direction in which similar pixel value change (in this case, change in pixel values in a predetermined spatial direction Y, changing from the minimum value to the maximum value) spatially continues, so the intervals S of the position where change of pixel values in the spatial direction Y begins, or the spatial direction Y which is the position where change ends, for each of the spatial directions X, is the gradient $G_{fe}$ of the edge. That is to say, as shown in FIG. 147C, the amount of change in the vertical direction as to the distance of one pixel in the horizontal direction, is the gradient $G_{fe}$.

Now, this relationship is the same as the relationship regarding the gradient $G_{f1}$ of the fine line described above with reference to FIG. 137A through C. Accordingly, the relational expression is the same. That is to say, the relational expression in the case of a two-valued edge is that shown in FIG. 148, with the pixel value of the background region as V1, and the pixel value of the character region as V2, each as the minimum value and the maximum value. Also, with the mixture ratio of pixels near the edge as $\alpha$, and the edge gradient as $G_{fe}$, relational expressions which hold will be the same as the above Expression (69) through Expression (71) (with $G_{f1}$ replaced with $G_{fe}$).

Figure 124:
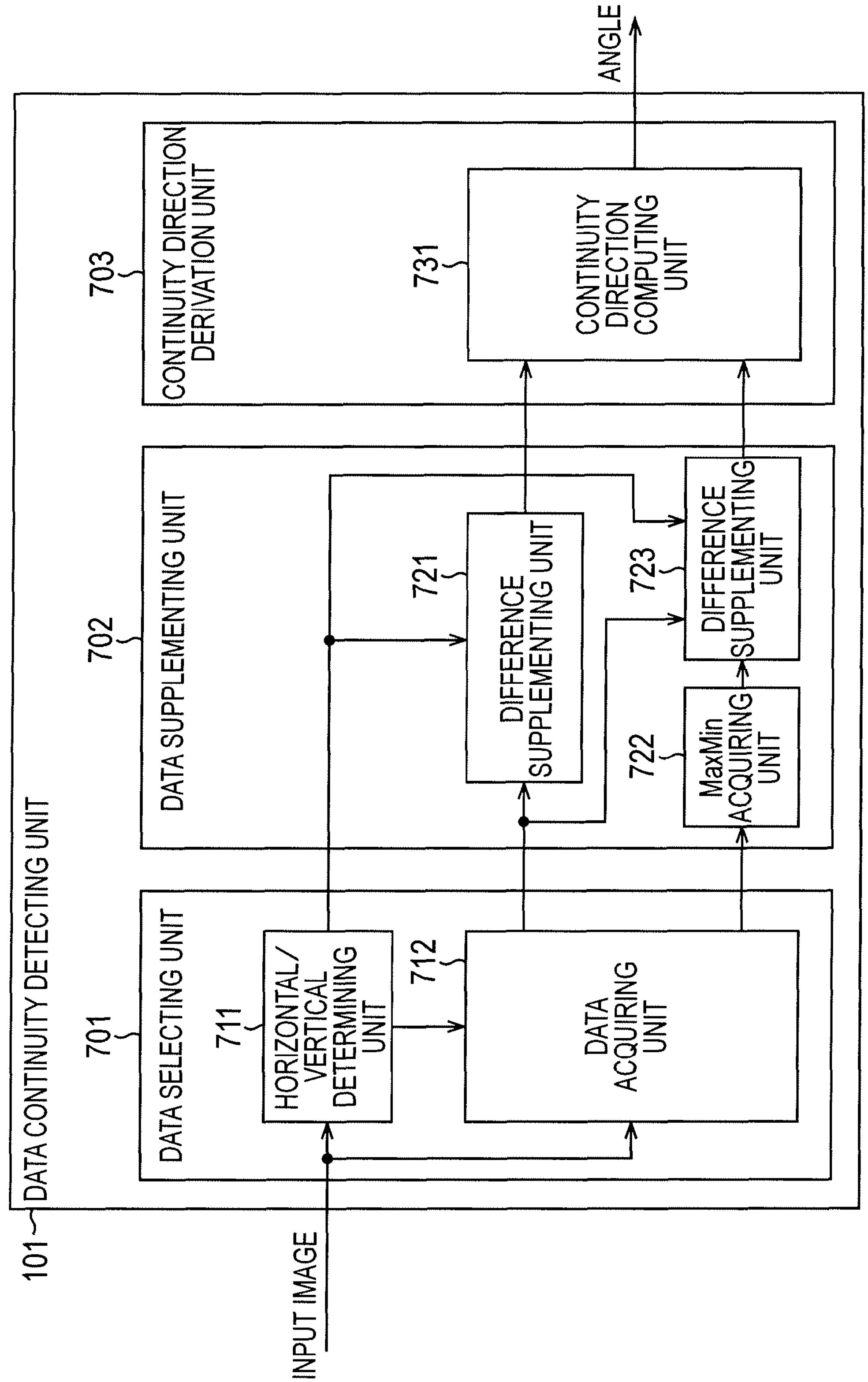

Accordingly, the data continuity detecting unit 101 shown in FIG. 124 can detect the angle corresponding to the gradient of the fine line, and the angle corresponding to the gradient of the edge, as data continuity information with the same processing. Accordingly, in the following, gradient will collectively refer to the gradient of the fine line and the gradient of the two-valued edge, and will be called gradient $G_f$. Also, the gradient $G_{f1}$ in the above Expression (73) through Expression (75) may be $G_{fe}$, and consequently, will be considered to be substitutable with $G_f$.

Next, the processing for detecting data continuity will be described with reference to the flowchart in FIG. 149.

In step S701, the horizontal/vertical determining unit 711 initializes a counter T which identifies each of the pixels of the input image.

In step S702, the horizontal/vertical determining unit 711 performs processing for extracting data necessary in later steps.

Now, the processing for extracting data will be described with reference to the flowchart in FIG. 150.

In step S711, the horizontal/vertical determining unit 711 of the data selecting unit 701 computes, for each pixel of interest T, as described with reference to FIG. 125, the sum of difference (activity) of the pixel values of the pixel values between the pixels in the horizontal direction (hdiff) and the sum of difference (activity) between pixels in the vertical direction (vdiff), with regard to nine pixels adjacent in the horizontal, vertical, and diagonal directions, and further obtains the difference thereof the difference (hdiff minus vdiff); in the event that (hdiff minus vdiff)$\geqq$0, and with the pixel of interest T taking the horizontal direction as the reference axis, determination is made that it is a pixel near a fine line or two-valued edge closer to the vertical direction, wherein the angle $\theta$ as to the reference axis is 45 degrees degrees$\leqq\theta<$135 degrees degrees, and determination results indicating that the extracted block to be used corresponds to the vertical direction are output to the data acquiring unit 712 and the data supplementing unit 702.

On the other hand, in the event that (hdiff minus vdiff)<0, and with the pixel of interest taking the horizontal direction as the reference axis, determination is made by the horizontal/vertical determining unit 711 that it is a pixel near a fine line or edge closer to the horizontal direction, wherein the angle $\theta$ of the fine line or the two-valued edge as to the reference axis is 0 degrees degrees$\leqq\theta<$45 degrees degrees or 135 degrees degrees$\leqq\theta<$180 degrees degrees, and determination results indicating that the extracted block to be used corresponds to the horizontal direction are output to the data acquiring unit 712 and the data supplementing unit 702.

That is, the gradient of the fine line or two-valued edge being closer to the vertical direction means that, as shown in FIG. 131A for example, the portion of the fine line which intersects with the arrow in the drawing is greater, so extracted blocks with an increased number of pixels in the vertical direction are set (vertically long extracted blocks are set). In the same way, with the case of fine lines having a gradient closer to the horizontal direction, extracted blocks with an increased number of pixels in the horizontal direction are set (horizontally long extracted blocks are set). Thus, accurate maximum values and minimum values can be computed without increasing the amount of unnecessary calculations.

In step S712, the data acquiring unit 712 extracts pixels of an extracted block corresponding to the determination results input from the horizontal/vertical determining unit 711 indicating the horizontal direction or the vertical direction for the pixel of interest. That is to say, as shown in FIG. 139 for example, (three pixels in the horizontal direction)×(seven pixels in the vertical direction) for a total of 21 pixels, centered on the pixel of interest, are extracted as the extracted block, and stored.

In step S713, the data acquiring unit 712 extracts the pixels of dynamic range blocks corresponding to the direction corresponding to the determination results of the horizontal/vertical determining unit 711 for each of the pixels in the extracted block, and stores these. That is to say, as described above with reference to FIG. 139, in this case, with regard to the pixel pix11 of the extracted block for example, the determination results of the horizontal/vertical determining unit 711 indicate the vertical direction, so the data acquiring unit 712 extracts the dynamic range block B1 in the vertical direction, and extracts the dynamic range block B2 for the pixel pix12 in the same way. Dynamic range blocks are extracted for the other extracted blocks in the same way.

That is to say, information of pixels necessary for computation of the normal equation regarding a certain pixel of interest T is stored in the data acquiring unit 712 with this data extracting processing (a region to be processed is selected).

Now, let us return to the flowchart in FIG. 149.

In step S703, the data supplementing unit 702 performs processing for supplementing the values necessary for each of the items in the normal equation (Expression (74) here).

Now, the supplementing process to the normal equation will be described with reference to the flowchart in FIG. 24.

In step S721, the difference supplementing unit 721 obtains (detects) the difference of pixel values between the pixels of the extracted block stored in the data acquiring unit 712, according to the determination results of the horizontal/vertical determining unit 711 of the data selecting unit 701, and further raises these to the second power (squares) and supplements. That is to say, in the event that the determination results of the horizontal/vertical determining unit 711 are the vertical direction, the difference supplementing unit 721 obtains the difference of pixel values between pixels adjacent to each of the pixels of the extracted block in the vertical direction, and further squares and supplements these. In the same way, in the event that the determination results of the horizontal/vertical determining unit 711 are the horizontal direction, the difference supplementing unit 721 obtains the difference of pixel values between pixels adjacent to each of the pixels of the extracted block in the horizontal direction, and further squares and supplements these. As a result, the difference supplementing unit 721 generates the sum of squared difference of the items to be the denominator in the above-described Expression (75) and stores.

In step S722, the MaxMin acquiring unit 722 obtains the maximum value and minimum value of the pixel values of the pixels contained in the dynamic range block stored in the data acquiring unit 712, and in step S723, obtains (detects) the dynamic range from the maximum value and minimum value, and outputs this to the difference supplementing unit 723. That is to say, in the case of a 7-pixel dynamic range block made up of pixels pix1 through 7 as illustrated in FIG. 136B, the pixel value of pix2 is detected as the maximum value, the pixel value of pix7 is detected as the minimum value, and the difference of these is obtained as the dynamic range.

In step S724, the difference supplementing unit 723 obtains (detects), from the pixels in the extracted block stored in the data acquiring unit 712, the difference in pixel values between pixel adjacent in the direction corresponding to the determination results of the horizontal/vertical determining unit 711 of the data selecting unit 701, and supplements values multiplied by the dynamic range input from the MaxMin acquiring unit 722. That is to say, the difference supplementing unit 721 generates a sum of items to serve as the numerator in the above-described Expression (75), and stores this.

Now, let us return to description of the flowchart in FIG. 149.

In step S704, the difference supplementing unit 721 determines whether or not the difference in pixel values between pixels (the difference in pixel values between pixels adjacent in the direction corresponding to the determination results of the horizontal/vertical determining unit 711) has been supplemented for all pixels of the extracted block, and in the event that determination is made that, for example, the difference in pixel values between pixels has not been supplemented for all pixels of the extracted block, the flow returns to step S702, and the subsequent processing is repeated. That is to say, the processing of step S702 through S704 is repeated until determination is made that the difference in pixel values between pixels has been supplemented for all pixels of the extracted block.

In the event that determination is made in step S704 that the difference in pixel values between pixels has been supplemented for all pixels of the extracted block, in step S705, the difference supplementing units 721 and 723 output the supplementing results stored therein to the continuity direction derivation unit 703.

In step S706, the continuity direction computation unit 731 solves the normal equation given in the above-described Expression (75), based on: the sum of squared difference in pixel values between pixels adjacent in the direction corresponding to the determination results of the horizontal/vertical determining unit 711, of the pixels in the acquired block input from the difference supplementing unit 721 of the data supplementing unit 702; the difference in pixel values between pixels adjacent in the direction corresponding to the determination results of the horizontal/vertical determining unit 711, of the pixels in the acquired block input from the difference supplementing unit 723; and the sum of products of the dynamic ranges corresponding to the pixels of the obtained block; thereby statistically computing and outputting the angle indicating the direction of continuity (the angle indicating the gradient of the fine line or two-valued edge), which is the data continuity information of the pixel of interest, using the least-square method.

In step S707, the data acquiring unit 712 determines whether or not processing has been performed for all pixels of the input image, and in the event that determination is made that processing has not been performed for all pixels of the input image for example, i.e., that information of the angle of the fine line or two-valued edge has not been output for all pixels of the input image, the counter T is incremented by 1 in step S708, and the process returns to step S702. That is to say, the processing of steps S702 through S708 is repeated until pixels of the input image to be processed are changed and processing is performed for all pixels of the input image. Change of pixel by the counter T may be according to raster scan or the like for example, or may be sequential change according to other rules.

In the event that determination is made in step S707 that processing has been performed for all pixels of the input image, in step S709 the data acquiring unit 712 determines whether or not there is a next input image, and in the event that determination is made that there is a next input image, the processing returns to step S701, and the subsequent processing is repeated.

In the event that determination is made in step S709 that there is no next input image, the processing ends.

According to the above processing, the angle of the fine line or two-valued edge is detected as continuity information and output.

The angle of the fine line or two-valued edge obtained by this statistical processing approximately matches the angle of the fine line or two-valued edge obtained using correlation. That is to say, with regard to the image of the range enclosed by the white lines in the image shown in FIG. 152A, as shown in FIG. 152B, the angle indicating the gradient of the fine line obtained by the method using correlation (the black circles in the figure) and the angle of the fine line obtained by statistical processing with the data continuity detecting unit 101 shown in FIG. 124 (the black triangles in the figure) approximately agree at the spatial direction Y coordinates near the fine line, with regard to change in gradient in the spatial direction Y at predetermined coordinates in the horizontal direction on the fine line. Note that in FIG. 152B, the spatial directions Y=680 through 730 between the black lines in the figure are the coordinates on the fine line.

In the same way, with regard to the image of the range enclosed by the white lines in the image shown in FIG. 153A, as shown in FIG. 153B, the angle indicating the gradient of the two-valued edge obtained by the method using correlation (the black circles in the figure) and the angle of the two-valued edge obtained by statistical processing with the data continuity detecting unit 101 shown in FIG. 124 (the black triangles in the figure) approximately agree at the spatial direction Y coordinates near the fine line, with regard to change in gradient in the spatial direction Y at predetermined coordinates in the horizontal direction on the two-valued edge. Note that in FIG. 153B, the spatial directions Y=(around) 376 through (around) 388 are the coordinates on the fine line.

Consequently, the data continuity detecting unit 101 shown in FIG. 124 can statistically obtain the angle indicating the gradient of the fine line or two-valued edge (the angle with the horizontal direction as the reference axis here) using information around each pixel for obtaining the angle of the fine line or two-valued edge as the data continuity, unlike the method using correlation with blocks made up of predetermined pixels, and accordingly, there is no switching according to predetermined angle ranges as observed with the method using correlation, thus, the angle of the gradients of all fine lines or two-valued edges can be obtained with the same processing, thereby enabling simplification of the processing.

Also, while description has been made above regarding an example of the data continuity detecting unit 101 outputting the angle between the fine line or two-valued edge and a predetermined reference axis as the continuity information, but it is conceivable that depending on the subsequent processing, outputting the angle as such may improve processing efficiency. In such a case, the continuity direction derivation unit 703 and continuity direction computation unit 731 of the data continuity detecting unit 101 may output the gradient $G_f$ of the fine line or two-valued edge obtained by the least-square method as continuity information, without change.

Further, while description has been made above regarding a case wherein the dynamic range Dri_r in Expression (75) is computed having been obtained regarding each of the pixels in the extracted block, but setting the dynamic range block sufficiently great, i.e., setting the dynamic range for a great number of pixels of interest and a great number of pixels therearound, the maximum value and minimum value of pixel values of pixels in the image should be selected at all times for the dynamic range. Accordingly, an arrangement may be made wherein computation is made for the dynamic range Dri_r with the dynamic range Dri_r as a fixed value obtained as the dynamic range from the maximum value and minimum value of pixels in the extracted block or in the image data without computing each pixel of the extracted block.

That is to say, an arrangement may be made to obtain the angle θ (gradient $G_f$) of the fine line by supplementing only the difference in pixel values between the pixels, as in the following Expression (76). Fixing the dynamic range in this way allows the computation processing to be simplified, and processing can be performed at high speed.

$$G_f = \frac{Dr \times \sum_{i=1}^{n} d\_y_i}{\sum_{i=1}^{n} (d\_y_i)^2} \tag{76}$$

Next, description will be made regarding the data continuity detecting unit 101 for detecting the mixture ratio of the pixels as data continuity information with reference to FIG. 154.

Note that with the data continuity detecting unit 101 shown in FIG. 154, portions which correspond to those of the data continuity detecting unit 101 shown in FIG. 124 are denoted with the same symbols, and description thereof will be omitted as appropriate.

With the data continuity detecting unit 101 shown in FIG. 154, what differs from the data continuity detecting unit 101 shown in FIG. 124 is the point that a data supplementing unit 751 and mixture ratio derivation unit 761 are provided instead of the data supplementing unit 702 and continuity direction derivation unit 703.

A MaxMin acquiring unit 752 of the data supplementing unit 751 performs the same processing as the MaxMin acquiring unit 722 in FIG. 124, and the maximum value and minimum value of the pixel values of the pixels in the dynamic range block are obtained, the difference (dynamic range) of the maximum value and minimum value is obtained, and output to supplementing units 753 and 755 as well as outputting the maximum value to a difference computing unit 754.

The supplementing unit 753 squares the value obtained by the MaxMin acquiring unit, performs supplementing for all pixels of the extracted block, obtains the sum thereof, and outputs to the mixture ratio derivation unit 761.

The difference computing unit 754 obtains the difference between each pixel in the acquired block of the data acquiring unit 712 and the maximum value of the corresponding dynamic range block, and outputs this to the supplementing unit 755.

The supplementing unit 755 multiplies the difference between the maximum value and minimum value (dynamic range) of each pixel of the acquired block input from the Max Min acquiring unit 752 with the difference between the pixel value of each of the pixels in the acquired block input from the difference computing unit 754 and the maximum value of the corresponding dynamic range block, obtains the sum thereof, and outputs to the mixture ratio derivation unit 761.

A mixture ratio calculating unit 762 of the mixture ratio derivation unit 761 statistically obtains the mixture ratio of the pixel of interest by the least-square method, based on the values input from the supplementing units 753 and 755 of the data supplementing unit, and outputs this as data continuity information.

Next, the mixture ratio derivation method will be described.

As shown in FIG. 155A, in the event that a fine line exists on the image, the image taken with the sensor 2 is an image such as shown in FIG. 155B. In this image, let us hold in interest the pixel enclosed by the black solid lines on the spatial direction X=X1 in FIG. 155B. Note that the range between the white lines in FIG. 155B indicates the position corresponding to the fine line region in the real world. The pixel value M of this pixel should be an intermediate color between the pixel value B corresponding to the level of the background region, and the pixel value L corresponding to the level of the fine line region, and in further detail, this pixel value $P_s$ should be a mixture of each level according to the area ratio between the background region and fine line region. Accordingly, the pixel value $P_s$ can be expressed by the following Expression (77).

$$P_s=\alpha\times B+(1-\alpha)\times L \tag{77}$$

Here, α is the mixture ratio, and more specifically, indicates the ratio of area which the background region occupies in the pixel of interest. Accordingly, (1−α) can be said to indicate the ratio of area which the fine line region occupies. Now, pixels of the background region can be considered to be the component of an object existing in the background, and thus can be said to be a background object component. Also, pixels of the fine line region can be considered to be the component of an object existing in the foreground as to the background object, and thus can be said to be a foreground object component.

Consequently, the mixture ratio α can be expressed by the following Expression (78) by expanding the Expression (77).

$$\alpha=(P_s-L)/(B-L) \tag{78}$$

Further, in this case, we are assuming that the pixel value exists at a position straddling the first pixel value (pixel value B) region and the second pixel value (pixel value L) region, and accordingly, the pixel value L can be substituted with the maximum value Max of the pixel values, and further, the pixel value B can be substituted with the minimum value of the pixel value. Accordingly, the mixture ratio α can also be expressed by the following Expression (79).

$$\alpha=(P_s-\mathrm{Max})/(\mathrm{Min}-\mathrm{Max}) \tag{79}$$

As a result of the above, the mixture ratio α can be obtained from the dynamic range (equivalent to (Min−Max)) of the dynamic range block regarding the pixel of interest, and the difference between the pixel of interest and the maximum value of pixels within the dynamic range block, but in order to further improve precision, the mixture ratio α will here be statistically obtained by the least-square method.

That is to say, expanding the above Expression (79) yields the following Expression (80).

$$(P_s-\mathrm{Max})=\alpha\times(\mathrm{Min}-\mathrm{Max}) \tag{80}$$

As with the case of the above-described Expression (71), this Expression (80) is a single-variable least-square equation. That is to say, in Expression (71), the gradient $G_f$ was obtained by the least-square method, but here, the mixture ratio a is obtained. Accordingly, the mixture ratio α can be statistically obtained by solving the normal equation shown in the following Expression (81).

$$\alpha=\frac{\sum_{i=1}^{n}((\mathrm{Min}_i-\mathrm{Max}_i)(P_{si}-\mathrm{Max}_i))}{\sum_{i=1}^{n}((\mathrm{Min}_i-\mathrm{Max}_i)(\mathrm{Min}_i-\mathrm{Max}_i))} \tag{81}$$

Here, i is for identifying the pixels of the extracted block. Accordingly, in Expression (81), the number of pixels in the extracted block is n.

Next, the processing for detecting data continuity with the mixture ratio as data continuity will be described with reference to the flowchart in FIG. 156.

In step S731, the horizontal/vertical determining unit 711 initializes the counter U which identifies the pixels of the input image.

In step S732, the horizontal/vertical determining unit 711 performs processing for extracting data necessary for subsequent processing. Note that the processing of step S732 is the same as the processing described with reference to the flowchart in FIG. 150, so description thereof will be omitted.

In step S733, the data supplementing unit 751 performs processing for supplementing values necessary of each of the items for computing the normal equation (Expression (81) here).

Now, the processing for supplementing to the normal equation will be described with reference to the flowchart in FIG. 157.

In step S751, the MaxMin acquiring unit 752 obtains the maximum value and minimum value of the pixels values of the pixels contained in the dynamic range block stored in the data acquiring unit 712, and of these, outputs the minimum value to the difference computing unit 754.

In step S752, the MaxMin acquiring unit 752 obtains the dynamic range from the difference between the maximum value and the minimum value, and outputs this to the difference supplementing units 753 and 755.

In step S753, the supplementing unit 753 squares the dynamic range (Max-Min) input from the MaxMin acquiring unit 752, and supplements. That is to say, the supplementing unit 753 generates by supplementing a value equivalent to the denominator in the above Expression (81).

In step S754, the difference computing unit 754 obtains the difference between the maximum value of the dynamic range block input from the MaxMin acquiring unit 752 and the pixel values of the pixels currently being processed in the extracted block, and outputs to the supplementing unit 755.

In step S755, the supplementing unit 755 multiplies the dynamic range input from the MaxMin acquiring unit 752 with the difference between the pixel values of the pixels currently being processed input from the difference computing unit 754 and the maximum value of the pixels of the dynamic range block, and supplements. That is to say, the supplementing unit 755 generates values equivalent to the numerator item of the above Expression (81).

As described above, the data supplementing unit 751 performs computation of the items of the above Expression (81) by supplementing.

Now, let us return to the description of the flowchart in FIG. 156.

In step S734, the difference supplementing unit 721 determines whether or not supplementing has ended for all pixels of the extracted block, and in the event that determination is made that supplementing has not ended for all pixels of the extracted block for example, the processing returns to step S732, and the subsequent processing is repeated. That is to say, the processing of steps S732 through S734 is repeated until determination is made that supplementing has ended for all pixels of the extracted block.

In step S734, in the event that determination is made that supplementing has ended for all pixels of the extracted block, in step S735 the supplementing units 753 and 755 output the supplementing results stored therein to the mixture ratio derivation unit 761.

In step S736, the mixture ratio calculating unit 762 of the mixture ratio derivation unit 761 statistically computes, by the least-square method, and outputs, the mixture ratio of the pixel of interest which is the data continuity information, by solving the normal equation shown in Expression (81), based on the sum of squares of the dynamic range, and the sum of multiplying the difference between the pixel values of the pixels of the extracted block and the maximum value of the dynamic block by the dynamic range, input from the supplementing units 753 and 755 of the data supplementing unit 751.

In step S737, the data acquiring unit 712 determines whether or not processing has been performed for all pixels in the input image, and in the event that determination is made that, for example, processing has not been performed for all pixels in the input image, i.e., in the event that determination is made that the mixture ratio has not been output for all pixels of the input image, in step S738 the counter U is incremented by 1, and the processing returns to step S732.

That is to say, the processing of steps S732 through S738 is repeated until pixels to be processed within the input image are changed and the mixture ratio is computed for all pixels of the input image. Change of pixel by the counter U may be according to raster scan or the like for example, or may be sequential change according to other rules.

In the event that determination is made in step S737 that processing has been performed for all pixels of the input image, in step S739 the data acquiring unit 712 determines whether or not there is a next input image, and in the event that determination is made that there is a next input image, the processing returns to step S731, and the subsequent processing is repeated.

In the event that determination is made in step S739 that there is no next input image, the processing ends.

Due to the above processing, the mixture ratio of the pixels is detected as continuity information, and output.

FIG. 158B illustrates the change in the mixture ratio on predetermined spatial directions X (=561, 562, 563) with regard to the fine line image within the white lines in the image shown in FIG. 158A, according to the above technique, for example. As shown in FIG. 158B, the change in the mixture ratio in the spatial direction Y which is continuous in the horizontal direction is such that, respectively, in the case of the spatial direction X=563, the mixture ratio starts rising at around the spatial direction Y=660, peaks at around Y=685, and drops to Y=710. Also, in the case of the spatial direction X=562, the mixture ratio starts rising at around the spatial direction Y=680, peaks at around Y=705, and drops to Y=735. Further, in the case of the spatial direction X=561, the mixture ratio starts rising at around the spatial direction Y=705, peaks at around Y=725, and drops to Y=755.

Thus, as shown in FIG. 158B, the change of each of the mixture ratios in the continuous spatial directions X is the same change as the change in pixel values changing according to the mixture ratio (the change in pixel values shown in FIG. 133B), and is cyclically continuous, so it can be understood that the mixture ratio of pixels near the fine line are being accurately represented.

Also, in the same way, FIG. 159B illustrates the change in the mixture ratio on predetermined spatial directions X (=658, 659, 660) with regard to the two-valued edge image within the white lines in the image shown in FIG. 159A. As shown in FIG. 159B, the change in the mixture ratio in the spatial direction Y which is continuous in the horizontal direction is such that, respectively, in the case of the spatial direction X=660, the mixture ratio starts rising at around the spatial direction Y=750, and peaks at around Y=765. Also, in the case of the spatial direction X=659, the mixture ratio starts rising at around the spatial direction Y=760, and peaks at around Y=775. Further, in the case of the spatial direction X=658, the mixture ratio starts rising at around the spatial direction Y=770, and peaks at around Y=785.

Thus, as shown in FIG. 159B, the change of each of the mixture ratios of the two-valued edge is approximately the same as change which is the same change as the change in pixel values changing according to the mixture ratio (the change in pixel values shown in FIG. 145B), and is cyclically continuous, so it can be understood that the mixture ratio of pixel values near the two-valued edge are being accurately represented.

According to the above, the mixture ratio of each pixel can be statistically obtained as data continuity information by the least-square method. Further, the pixel values of each of the pixels can be directly generated based on this mixture ratio.

Also, if we say that the change in mixture ratio has continuity, and further, the change in the mixture ratio is linear, the relationship such as indicated in the following Expression (82) holds.

$$\alpha = m \times y + n \tag{82}$$

Here, m represents the gradient when the mixture ratio α changes as to the spatial direction Y, and also, n is equivalent to the intercept when the mixture ratio α changes linearly.

That is, as shown in FIG. 160, the straight line indicating the mixture ratio is a straight line indicating the boundary between the pixel value B equivalent to the background region level and the level L equivalent to the fine line level, and in this case, the amount in change of the mixture ratio upon progressing a unit distance with regard to the spatial direction Y is the gradient m.

Accordingly, substituting Expression (82) into Expression (77) yields the following Expression (83).

$$M = (m \times y + n) \times B + (1 - (m \times y + n)) \times L \tag{83}$$

Further, expanding this Expression (83) yields the following Expression (84).

$$M - L = (y \times B - y \times L) \times m + (B - L) \times n \tag{84}$$

In Expression (84), the first item m represents the gradient of the mixture ratio in the spatial direction, and the second item is the item representing the intercept of the mixture ratio. Accordingly, an arrangement may be made wherein a normal equation is generated using the least-square of two variables to obtain m and n in Expression (84) described above.

However, the gradient m of the mixture ratio $\alpha$ is the above-described gradient of the fine line or two-valued edge (the above-described gradient $G_f$) itself, so an arrangement may be made wherein the above-described method is used to obtain the gradient $G_f$ of the fine line or two-valued edge beforehand, following which the gradient is used and substituted into Expression (84), thereby making for a single-variable function with regard to the item of the intercept, and obtaining with the single-variable least-square method the same as the technique described above.

While the above example has been described regarding a data continuity detecting unit 101 for detecting the angle (gradient) or mixture ratio of a fine line or two-valued edge in the spatial direction as data continuity information, an arrangement may be made wherein that corresponding to the angle in the spatial direction obtained by replacing one of the spatial-direction axes (spatial directions X and Y), for example, with the time-direction (frame direction) T axis. That is to say, that which corresponds to the angle obtained by replacing one of the spatial-direction axes (spatial directions X and Y) with the time-direction (frame direction) T axis, is a vector of movement of an object (movement vector direction).

More specifically, as shown in FIG. 161A, in the event that an object is moving upwards in the drawing with regard to the spatial direction Y over time, the track of movement of the object is manifested at the portion equivalent to the fine line in the drawing (in comparison with that in FIG. 131A). Accordingly, the gradient at the fine line in the time direction T represents the direction of movement of the object (angle indicating the movement of the object) (is equivalent to the direction of the movement vector) in FIG. 161A. Accordingly, in the real world, in a frame of a predetermined point-in-time indicated by the arrow in FIG. 161A, a pulse-shaped waveform wherein the portion to be the track of the object is the level of (the color of) the object, and other portions are the background level, as shown in FIG. 161B, is obtained.

In this way, in the case of imaging an object with movement with the sensor 2, as shown in FIG. 162A, the distribution of pixel values of each of the pixels of the frames from point-in-time T1 through T3 each assumes a peak-shaped waveform in the spatial direction Y, as shown in FIG. 162B. This relationship can be thought to be the same as the relationship in the spatial directions X and Y, described with reference to FIG. 132A and FIG. 132B. Accordingly, in the event that the object has movement in the frame direction T, the direction of the movement vector of the object can be obtained as data continuity information in the same way as with the information of the gradient of the fine line or the angle (gradient) of the two-valued edge described above. Note that in FIG. 162B, each grid in the frame direction T (time direction T) is the shutter time making up the image of one frame.

Also, in the same way, in the event that there is movement of an object in the spatial direction Y for each frame direction T as shown in FIG. 163A, each pixel value corresponding to the movement of the object as to the spatial direction Y on a frame corresponding to a predetermined point-in-time T1 can be obtained as shown in FIG. 163B. At this time, the pixel value of the pixel enclosed by the black solid lines in FIG. 163B is a pixel value wherein the background level and the object level are mixed in the frame direction at a mixture ratio $\beta$, corresponding to the movement of the object, as shown in FIG. 163C, for example.

This relationship is the same as the relationship described with reference to FIG. 155A, FIG. 155B, and FIG. 155C.

Further, as shown in FIG. 164, the level O of the object and the level B of the background can also be made to be linearly approximated by the mixture ratio $\beta$ in the frame direction (time direction). This relationship is the same relationship as the linear approximation of mixture ratio in the spatial direction, described with reference to FIG. 160.

Accordingly, the mixture ratio $\beta$ in the time (frame) direction can be obtained as data continuity information with the same technique as the case of the mixture ratio $\alpha$ in the spatial direction.

Also, an arrangement may be made wherein the frame direction, or one dimension of the spatial direction, is selected, and the data continuity angle or the movement vector direction is obtained, and in the same way, the mixture ratios $\alpha$ and $\beta$ may be selectively obtained.

According to the above, light signals of the real world are projected, a region, corresponding to a pixel of interest in the image data of which a part of the continuity of the real world light signals has dropped out, is selected, features for detecting the angle as to a reference axis of the image data continuity corresponding to the lost real world light signal continuity are detected in the selected region, the angle is statistically detected based on the detected features, and light signals are estimated by estimating the lost real world light signal continuity based on the detected angle of the continuity of the image data as to the reference axis, so the angle of continuity (direction of movement vector) or (a time-space) mixture ratio can be obtained.

Next, description will be made, with reference to FIG. 165, of a data continuity information detecting unit 101 which outputs, as data continuity information, information of regions where processing using data continuity information should be performed.

An angle detecting unit 801 detects, of the input image, the spatial-direction angle of regions having continuity, i.e., of portions configuring fine lines and two-valued edges having continuity in the image, and outputs the detected angle to an actual world estimating unit 802. Note that this angle detecting unit 801 is the same as the data continuity detecting unit 101 in FIG. 3.

The actual world estimating unit 802 estimates the actual world based on the angle indicating the direction of data continuity input from the angle detecting unit 801, and information of the input image. That is to say, the actual world estimating unit 802 obtains a coefficient of an approximation function which approximately describes the intensity distribution of the actual world light signals, from the input angle and each pixel of the input image, and outputs to an error computing unit 803 the obtained coefficient as estimation results of the actual world. Note that this actual world estimating unit 802 is the same as the actual world estimating unit 102 shown in FIG. 3.

The error computing unit 803 formulates an approximation function indicating the approximately described real world light intensity distribution, based on the coefficient input from the actual world estimating unit 802, and further, integrates the light intensity corresponding to each pixel position based on this approximation function, thereby generating pixel values of each of the pixels from the light intensity distribution estimated from the approximation function, and outputs to a comparing unit 804 with the difference as to the actually-input pixel values as error.

The comparing unit 804 compares the error input from the error computing unit 803 for each pixel, and a threshold value set beforehand, so as to distinguish between processing regions where pixels exist regarding which processing using continuity information is to be performed, and non-processing regions, and outputs region information, distinguishing between processing regions where processing using continuity information is to be performed and non-processing regions, as continuity information.

Next, description will be made regarding continuity detection processing using the data continuity detecting unit 101 in FIG. 165 with reference to the flowchart in FIG. 166.

The angle detecting unit 801 acquires an image input in step S801, and detects an angle indicating the direction of continuity in step S802. More particularly, the angle detecting unit 801 detects a fine line when the horizontal direction is taken as a reference axis, or an angle indicating the direction of continuity having a two-valued edge for example, and outputs this to the actual world estimating unit 802.

In step S803, the actual world estimating unit 802 obtains a coefficient of an approximation function f(x) made up of a polynomial, which approximately describes a function F(x) expressing the real world, based on angular information input from the angle detecting unit 801 and input image information, and outputs this to the error calculation unit 803. That is to say, the approximation function f(x) expressing the real world is shown with a primary polynomial such as the following Expression (85).

$$\begin{aligned} f(x) &= w_0x^n + w_1x^{n-1} + \ldots + w_{n-1}x + w_n \\ &= \sum_{i=0}^{n} w_i x^{n-i} \end{aligned} \tag{85}$$

Here, wi is a coefficient of the polynomial, and the actual world estimating unit 802 obtains this coefficient wi and outputs this to the error calculation unit 803. Further, a gradient from the direction of continuity can be obtained based on an angle input from the angle detecting unit 801 ($G_f = \tan^{-1}\theta$, $G_f$: gradient, θ: angle), so the above Expression (85) can be described with a quadratic polynomial such as shown in the following Expression (86) by substituting a constraint condition of this gradient $G_f$.

$$\begin{aligned} f(x, y) &= w_0(x - \alpha y)^n + w_1(x - \alpha y)^{n-1} + \ldots + \\ &\quad w_{n-1}(x - \alpha y) + w_n \\ &= \sum_{i=0}^{n} w_i (x - \alpha y)^{n-i} \end{aligned} \tag{86}$$

That is to say, the above Expression (86) describes a quadratic function f(x, y) obtained by expressing the width of a shift occurring due to the primary approximation function f(x) described with Expression (85) moving in parallel with the spatial direction Y using a shift amount α (=−dy/$G_f$: dy is the amount of change in the spatial direction Y).

Accordingly, the actual world estimating unit 802 solves each coefficient wi of the above Expression (86) using an input image and angular information in the direction of continuity, and outputs the obtained coefficients wi to the error calculation unit 803.

Here, description will return to the flowchart in FIG. 166.

In step S804, the error calculation unit 803 performs reintegration regarding each pixel based on the coefficients input by the actual world estimating unit 802. More specifically, the error calculation unit 803 subjects the above Expression (86) to integration regarding each pixel such as shown in the following Expression (87) based on the coefficients input from the actual world estimating unit 802.

$$\begin{aligned} S_s &= \int_{y_m}^{y_m+B} \int_{x_m}^{x_m+A} f(x, y)\,dx\,dy \\ &= \int_{y_m}^{y_m+B} \int_{x_m}^{x_m+A} \left( \sum_{i=0}^{n} w_i (x - \alpha y)^{n-i} \right) dx\,dy \\ &= \sum_{i=0}^{n} w_i \int_{y_m}^{y_m+B} \int_{x_m}^{x_m+A} (x - \alpha y)^{n-i}\,dx\,dy \\ &= \sum_{i=0}^{n} w_i \times \frac{1}{(n-i+2)(n-i+1)\alpha} \times \\ &\quad \left[ \begin{array}{l} \{(x_m + A - \alpha(y_m + B))^{n-i+2} - (x_m - \alpha(y_m + B))^{n-i+2}\} - \\ \{(x_m + A - \alpha y_m)^{n-i+2} - (x_m - \alpha y_m)^{n-i+2}\} \end{array} \right] \end{aligned} \tag{87}$$

Here, $S_s$ denotes the integrated result in the spatial direction shown in FIG. 167. Also, the integral range thereof is, as shown in FIG. 167, $x_m$ through $x_{m+B}$ for the spatial direction X, and $Y_m$ through $Y_{m+A}$ for the spatial direction Y. Also, in FIG. 167, let us say that each grid (square) denotes one pixel, and both grid for the spatial direction X and grid for the spatial direction Y is 1.

Accordingly, the error calculation unit 803, as shown in FIG. 168, subjects each pixel to an integral arithmetic operation such as shown in the following Expression (88) with an integral range of $x_m$ through $x_{m+1}$ for the spatial direction X of a curved surface shown in the approximation function f(x, y), and $y_m$ through $y_{m+1}$ for the spatial direction Y (A=B=1), and calculates the pixel value $P_s$ of each pixel obtained by spatially integrating the approximation function expressing the actual world in an approximate manner.

$$\begin{aligned} P_s &= \int_{y_m}^{y_m+1} \int_{x_m}^{x_m+1} f(x, y)\,dx\,dy \\ &= \int_{y_m}^{y_m+1} \int_{x_m}^{x_m+1} \left( \sum_{i=0}^{n} w_i (x - \alpha y)^{n-i} \right) dx\,dy \\ &= \sum_{i=0}^{n} w_i \int_{y_m}^{y_m+1} \int_{x_m}^{x_m+1} (x - \alpha y)^{n-i}\,dx\,dy \\ &= \sum_{i=0}^{n} w_i \times \frac{1}{(n-i+2)(n-i+1)\alpha} \times \\ &\quad \left[ \begin{array}{l} \{(x_m + 1 - \alpha(y_m + 1))^{n-i+2} - (x_m - \alpha(y_m + 1))^{n-i+2}\} - \\ \{(x_m + 1 - \alpha y_m)^{n-i+2} - (x_m - \alpha y_m)^{n-i+2}\} \end{array} \right] \end{aligned} \tag{88}$$

In other words, according to this processing, the error calculation unit 803 serves as, so to speak, a kind of pixel value generating unit, and generates pixel values from the approximation function.

In step S805, the error calculation unit 803 calculates the difference between a pixel value obtained with integration such as shown in the above Expression (88) and a pixel value of the input image, and outputs this to the comparison unit 804 as an error. In other words, the error calculation unit 803 obtains the difference between the pixel value of a pixel corresponding to the integral range ($x_m$ through $x_{m+1}$ for the spatial direction X, and $y_m$ through $y_{n+1}$ for the spatial direction Y) shown in the above FIG. 167 and FIG. 168, and a pixel value obtained with the integrated result in a range corresponding to the pixel as an error, and outputs this to the comparison unit 804.

In step S806, the comparison unit 804 determines regarding whether or not the absolute value of the error between the pixel value obtained with integration input from the error calculation unit 803 and the pixel value of the input image is a predetermined threshold value or less.

In step S806, in the event that determination is made that the error is the predetermined threshold value or less, since the pixel value obtained with integration is a value close to the pixel value of the pixel of the input image, the comparison unit 804 regards the approximation function set for calculating the pixel value of the pixel as a function sufficiently approximated with the light intensity allocation of a light signal in the real world, and recognizes the region of the pixel now processed as a processing region where processing using the approximation function based on continuity information is performed in step S807. In further detail, the comparison unit 804 stores the pixel now processed in unshown memory as the pixel in the subsequent processing regions.

On the other hand, in the event that determination is made that the error is not the threshold value or less in step S806, since the pixel value obtained with integration is a value far from the actual pixel value, the comparison unit 804 regards the approximation function set for calculating the pixel value of the pixel as a function insufficiently approximated with the light intensity allocation of a light signal in the real world, and recognizes the region of the pixel now processed as a non-processing region where processing using the approximation function based on continuity information is not performed at a subsequent stage in step S808. In further detail, the comparison unit 804 stores the region of the pixel now processed in unshown memory as the subsequent non-processing regions.

In step S809, the comparison unit 804 determines regarding whether or not the processing has been performed as to all of the pixels, and in the event that determination is made that the processing has not been performed as to all of the pixels, the processing returns to step S802, wherein the subsequent processing is repeatedly performed. In other words, the processing in steps S802 through S809 is repeatedly performed until determination processing wherein comparison between a pixel value obtained with integration and a pixel value input is performed, and determination is made regarding whether or not the pixel is a processing region, is completed regarding all of the pixels.

In step S809, in the event that determination is made that determination processing wherein comparison between a pixel value obtained with reintegration and a pixel value input is performed, and determination is made regarding whether or not the pixel is a processing region, has been completed regarding all of the pixels, the comparison unit 804, in step S810, outputs region information wherein a processing region where processing based on the continuity information in the spatial direction is performed at subsequent processing, and a non-processing region where processing based on the continuity information in the spatial direction is not performed are identified regarding the input image stored in the unshown memory, as continuity information.

According to the above processing, based on the error between the pixel value obtained by the integrated result in a region corresponding to each pixel using the approximation function f(x) calculated based on the continuity information and the pixel value in the actual input image, evaluation for reliability of expression of the approximation function is performed for each region (for each pixel), and accordingly, a region having a small error, i.e., only a region where a pixel of which the pixel value obtained with integration based on the approximation function is reliable exists is regarded as a processing region, and the regions other than this region are regarded as non-processing regions, and consequently, only a reliable region can be subjected to the processing based on the continuity information in the spatial direction, and the necessary processing alone can be performed, whereby processing speed can be improved, and also the processing can be performed as to the reliable region alone, resulting in preventing image quality due to this processing from deterioration.

Next, description will be made regarding other embodiments regarding the data continuity information detecting unit 101 which outputs region information where a pixel to be processed using data continuity information exists, as data continuity information with reference to FIG. 169.

A movement detecting unit 821 detects, of images input, a region having continuity, i.e., movement having continuity in the frame direction on an image (direction of movement vector: $V_f$), and outputs the detected movement to the actual world estimating unit 822. Note that this movement detecting unit 821 is the same as the data continuity detecting unit 101 in FIG. 3.

The actual world estimating unit 822 estimates the actual world based on the movement of the data continuity input from the movement detecting unit 821, and the input image information. More specifically, the actual world estimating unit 822 obtains coefficients of the approximation function approximately describing the intensity allocation of a light signal in the actual world in the frame direction (time direction) based on the movement input and each pixel of the input image, and outputs the obtained coefficients to the error calculation unit 823 as an estimated result in the actual world. Note that this actual world estimating unit 822 is the same as the actual world estimating unit 102 in FIG. 3.

The error calculation unit 823 makes up an approximation function indicating the intensity allocation of light in the real world in the frame direction, which is approximately described based on the coefficients input from the actual world estimating unit 822, further integrates the intensity of light equivalent to each pixel position for each frame from this approximation function, generates the pixel value of each pixel from the intensity allocation of light estimated by the approximation function, and outputs the difference with the pixel value actually input to the comparison unit 824 as an error.

The comparison unit 824 identifies a processing region where a pixel to be subjected to processing using the continuity information exists, and a non-processing region by comparing the error input from the error calculation unit 823 regarding each pixel with a predetermined threshold value set beforehand, and outputs region information wherein a processing region where processing is performed using this continuity information and a non-processing region are identified, as continuity information.

Next, description will be made regarding continuity detection processing using the data continuity detecting unit 101 in FIG. 169 with reference to the flowchart in FIG. 170.

The movement detecting unit 801 acquires an image input in step S821, and detects movement indicating continuity in step S822. In further detail, the movement detecting unit 801 detects movement of a substance moving within the input image (direction of movement vector: $V_f$) for example, and outputs this to the actual world estimating unit 822.

In step S823, the actual world estimating unit 822 obtains coefficients of a function f(t) made up of a polynomial, which approximately describes a function F(t) in the frame direction, which expresses the real world, based on the movement information input from the movement detecting unit 821 and the information of the input image, and outputs this to the error calculation unit 823. That is to say, the function f(t) expressing the real world is shown as a primary polynomial such as the following Expression (89).

$$f(t) = w_0 t^n + w_1 t^{n-1} + \ldots + w_{n-1} t + w_n = \sum_{i=0}^{n} w_i t^{n-i} \tag{89}$$

Here, wi is coefficients of the polynomial, and the actual world estimating unit 822 obtains these coefficients wi, and outputs these to the error calculation unit 823. Further, movement as continuity can be obtained by the movement input from the movement detecting unit 821 ($V_f = \tan^{-1}\theta v$, $V_f$: gradient in the frame direction of a movement vector, θv: angle in the frame direction of a movement vector), so the above Expression (89) can be described with a quadratic polynomial such as shown in the following Expression (90) by substituting a constraint condition of this gradient.

$$f(t, y) = w_0(t-\alpha y)^n + w_1(t-\alpha y)^{n-1} + \ldots + w_{n-1}(t-\alpha y) + w_n = \sum_{i=0}^{n} w_i (t-\alpha y)^{n-i} \tag{90}$$

That is to say, the above Expression (90) describes a quadratic function f(t, y) obtained by expressing the width of a shift occurring by a primary approximation function f(t), which is described with Expression (89), moving in parallel to the spatial direction Y, as a shift amount αt ($=-dy/V_f$: dy is the amount of change in the spatial direction Y).

Accordingly, the actual world estimating unit 822 solves each coefficient wi of the above Expression (90) using the input image and continuity movement information, and outputs the obtained coefficients wi to the error calculation unit 823.

Now, description will return to the flowchart in FIG. 170.

In step S824, the error calculation unit 823 performs integration regarding each pixel in the frame direction from the coefficients input by the actual world estimating unit 822. That is to say, the error calculation unit 823 integrates the above Expression (90) regarding each pixel from coefficients input by the actual world estimating unit 822 such as shown in the following Expression (91).

$$\begin{aligned} S_t &= \int_{y_m}^{y_m+B} \int_{t_m}^{t_m+A} f(t, y)\,dt\,dy \\ &= \int_{y_m}^{y_m+B} \int_{t_m}^{t_m+A} \left(\sum_{i=0}^{n} w_i (t-\alpha y)^{n-i}\right) dt\,dy \\ &= \sum_{i=0}^{n} w_i \int_{y_m}^{y_m+B} \int_{t_m}^{t_m+A} (t-\alpha y)^{n-i}\,dt\,dy \\ &= \sum_{i=0}^{n} w_i \times \frac{1}{(n-i+2)(n-i+1)\alpha} \times \\ &\quad \left[\begin{array}{c} \{(t_m + A - \alpha(y_m+B))^{n-i+2} - (t_m - \alpha(y_m+B))^{n-i+2}\} - \\ \{(t_m + A - \alpha y_m)^{n-i+2} - (t_m - \alpha y_m)^{n-i+2}\} \end{array}\right] \end{aligned} \tag{91}$$

Here, $S_t$ represents the integrated result in the frame direction shown in FIG. 171. The integral range thereof is, as shown in FIG. 171, $T_m$ through $T_{m+3}$ for the frame direction T, and $y_m$ through $y_{m+A}$ for the spatial direction Y. Also, in FIG. 171, let us say that each grid (square) denotes one pixel, and both for the frame direction T and spatial direction Y are 1. Here, "1 regarding the frame direction T" means that the shutter time for the worth of one frame is 1.

Accordingly, the error calculation unit 823 performs, as shown in FIG. 172, an integral arithmetic operation such as shown in the following Expression (92) regarding each pixel with an integral range of $T_m$ through $T_{m+1}$ for the spatial direction T of a curved surface shown in the approximation function f(t, y), and $y_m$ through $y_{m+1}$ for the spatial direction Y (A=B=1), and calculates the pixel value $P_t$ of each pixel obtained from the function approximately expressing the actual world.

$$\begin{aligned} P_t &= \int_{y_m}^{y_m+1} \int_{t_m}^{t_m+1} f(t, y)\,dt\,dy \\ &= \int_{y_m}^{y_m+1} \int_{t_m}^{t_m+1} \left(\sum_{i=0}^{n} w_i (t-\alpha y)^{n-i}\right) dt\,dy \\ &= \sum_{i=0}^{n} w_i \int_{y_m}^{y_m+1} \int_{t_m}^{t_m+1} (t-\alpha y)^{n-i}\,dt\,dy \\ &= \sum_{i=0}^{n} w_i \times \frac{1}{(n-i+2)(n-i+1)\alpha} \times \\ &\quad \left[\begin{array}{c} \{(t_m + 1 - \alpha(y_m+1))^{n-i+2} - (t_m - \alpha(y_m+1))^{n-i+2}\} - \\ \{(t_m + 1 - \alpha y_m)^{n-i+2} - (t_m - \alpha y_m)^{n-i+2}\} \end{array}\right] \end{aligned} \tag{92}$$

That is to say, according to this processing, the error calculation unit 823 serves as, so to speak, a kind of pixel value generating unit, and generates pixel values from the approximation function.

In step S825, the error calculation unit 803 calculates the difference between a pixel value obtained with integration such as shown in the above Expression (92) and a pixel value of the input image, and outputs this to the comparison unit 824 as an error. That is to say, the error calculation unit 823 obtains the difference between the pixel value of a pixel corresponding to the integral range shown in the above FIG. 171 and FIG. 172 ($T_m$ through $T_{m+1}$ for the spatial direction T, and $y_m$ through $y_{m+1}$ for the spatial direction Y) and a pixel value obtained by the integrated result in a range corresponding to the pixel, as an error, and outputs this to the comparison unit 824.

In step S826, the comparison unit 824 determines regarding whether or not the absolute value of the error between the pixel value obtained with integration and the pixel value of the input image, which are input from the error calculation unit 823, is a predetermined threshold value or less.

In step S826, in the event that determination is made that the error is the predetermined threshold value or less, since the pixel value obtained with integration is a value close to the pixel value of the input image, the comparison unit 824 regards the approximation function set for calculating the pixel value of the pixel as a function sufficiently approximated with the light intensity allocation of a light signal in the real world, and recognizes the region of the pixel now processed as a processing region in step S827. In further detail, the comparison unit 824 stores the pixel now processed in unshown memory as the pixel in the subsequent processing regions.

On the other hand, in the event that determination is made that the error is not the threshold value or less in step S826, since the pixel value obtained with integration is a value far from the actual pixel value, the comparison unit 824 regards the approximation function set for calculating the pixel value of the pixel as a function insufficiently approximated with the light intensity allocation in the real world, and recognizes the region of the pixel now processed as a non-processing region where processing using the approximation function based on continuity information is not performed at a subsequent stage in step S828. In further detail, the comparison unit 824 stores the region of the pixel now processed in unshown memory as the subsequent non-processing regions.

In step S829, the comparison unit 824 determines regarding whether or not the processing has been performed as to all of the pixels, and in the event that determination is made that the processing has not been performed as to all of the pixels, the processing returns to step S822, wherein the subsequent processing is repeatedly performed. In other words, the processing in steps S822 through S829 is repeatedly performed until determination processing wherein comparison between a pixel value obtained with integration and a pixel value input is performed, and determination is made regarding whether or not the pixel is a processing region, is completed regarding all of the pixels.

In step S829, in the event that determination is made that determination processing wherein comparison between a pixel value obtained by reintegration and a pixel value input is performed, and determination is made regarding whether or not the pixel is a processing region, has been completed regarding all of the pixels, the comparison unit 824, in step S830, outputs region information wherein a processing region where processing based on the continuity information in the frame direction is performed at subsequent processing, and a non-processing region where processing based on the continuity information in the frame direction is not performed are identified regarding the input image stored in the unshown memory, as continuity information.

According to the above processing, based on the error between the pixel value obtained by the integrated result in a region corresponding to each pixel using the approximation function f(t) calculated based on the continuity information and the pixel value within the actual input image, evaluation for reliability of expression of the approximation function is performed for each region (for each pixel), and accordingly, a region having a small error, i.e., only a region where a pixel of which the pixel value obtained with integration based on the approximation function is reliable exists is regarded as a processing region, and the regions other than this region are regarded as non-processing regions, and consequently, only a reliable region can be subjected to the processing based on continuity information in the frame direction, and the necessary processing alone can be performed, whereby processing speed can be improved, and also the processing can be performed as to the reliable region alone, resulting in preventing image quality due to this processing from deterioration.

An arrangement may be made wherein the configurations of the data continuity information detecting unit 101 in FIG. 165 and FIG. 169 are combined, any one-dimensional direction of the spatial and temporal directions is selected, and the region information is selectively output.

According to the above configuration, light signals in the real world are projected by the multiple detecting elements of the sensor each having spatio-temporal integration effects, continuity of data in image data made up of multiple pixels having a pixel value projected by the detecting elements of which a part of continuity of the light signals in the real world drops is detected, a function corresponding to the light signals in the real world is approximated on condition that the pixel value of each pixel corresponding to the detected continuity, and corresponding to at least a position in a one-dimensional direction of the spatial and temporal directions of the image data is the pixel value acquired with at least integration effects in the one-dimensional direction, and accordingly, a difference value between a pixel value acquired by estimating the function corresponding to the light signals in the real world, and integrating the estimated function at least in increments of corresponding to each pixel in the primary direction and the pixel value of each pixel is detected, and the function is selectively output according to the difference value, and accordingly, a region alone where a pixel of which the pixel value obtained with integration based on the approximation function is reliable exists can be regarded as a processing region, and the other regions other than this region can be regarded as non-processing regions, the reliable region alone can be subjected to processing based on the continuity information in the frame direction, so the necessary processing alone can be performed, whereby processing speed can be improved, and also the reliable region alone can be subjected to processing, resulting in preventing image quality due to this processing from deterioration.

Next, description will be made regarding a continuity detecting unit 101 wherein angle as continuity can be obtained more accurately and also at higher speed with reference to FIG. 173.

An simple-type angle detecting unit 901 is essentially the same as the continuity detecting unit 101 described with reference to FIG. 95, compares a block corresponding to the pixel of interest with a perimeter pixel block around the pixel of interest to detect an angle range between the pixel of interest and the perimeter pixel wherein the correlation between the block corresponding to the pixel of interest and the perimeter pixel block is strongest, which is so-called block matching, thereby simply detecting regarding which range of 16 directions (e.g., in the case in which an angle of data continuity is taken as θ, 16 ranges of $0 \leqq \theta < 18.4$, $18.4 \leqq \theta < 26.05$, $26.05 \leqq \theta < 33.7$, $33.7 \leqq \theta < 45$, $45 \leqq \theta < 56.3$, $56.3 \leqq \theta < 63.95$, $63.95 \leqq \theta < 71.6$, $71.6 \leqq \theta < 90$, $90 \leqq \theta < 108.4$, $108.4 \leqq \theta < 116.05$, $116.05 \leqq \theta < 123.7$, $123.7 \leqq \theta < 135$, $135 \leqq \theta < 146.3$, $146.3 \leqq \theta < 153.95$, $153.95 \leqq \theta < 161.6$, and $161.6 \leqq \theta < 180$ in FIG. 178 described later) an angle as continuity belongs to, and outputting each median (or a representing value within the range thereof) to a determining unit 902.

The determining unit 902 determines, based on the angle as continuity information simply obtained, which is input from the simple-type angle detecting unit 901, regarding whether the input angle is an angle closer to the vertical direction, or an angle closer to the horizontal direction, or other than those, and controls a switch 903 to connect to any one of terminals 903*a* and 903*b* according to the determination result to supply an input image to a regression-type angle detecting unit 904 or a gradient-type angle detecting unit 905, and also supplies the angle information simply obtained, which is input from the simple-type angle detecting unit 901, to the regression-type angle detecting unit 904 when the switch 903 is connected to the terminal 903*a*.

More particularly, in the event that the determining unit 902 determines that the direction of continuity supplied from the simple-type angle detecting unit 901 is an angle closer to the horizontal direction or the vertical direction (e.g., in the event that the angle θ of the continuity input from the simple-type angle detecting unit 901 is 0≦θ≦18.4, 71.6≦θ≦108.4, or 161.6≦θ≦180), the determining unit 902 controls the switch 903 to connect to the terminal 903*a* to supply the input image to the regression-type angle detecting unit 904, and in the event of other than that, i.e., in the event that the direction of continuity is closer to 45 degrees or 135 degrees, the determining unit 902 controls the switch 903 to connect to the terminal 903*b* to supply the input image to the gradient-type angle detecting unit 905.

The regression-type angle detecting unit 904 has a configuration essentially similar to the continuity detecting unit 101 described with reference to the above FIG. 107, regressively (in the event that the correlation value between the pixel value of the pixel of interest and the pixel value of a pixel belonged to a region corresponding to the pixel of interest is equal to or greater than a threshold value, the score according to the correlation value is set to such a pixel, whereby the score of the pixel belonged to the region is detected, and also the angle of data continuity is obtained by a regression line detected based on the detected score) performs detection of an angle of data continuity, and outputs the detected angle to the actual world estimating unit 102 as data continuity information. However, when the regression-type angle detecting unit 904 detects the angle, the regression-type angle detecting unit 904 restricts a range (scope) corresponding to the pixel of interest, sets a score, and regressively detects an angle, based on the angle supplied from the determining unit 902.

The gradient-type angle detecting unit 905 is essentially similar to the continuity detecting unit 101 described with reference to FIG. 124, detects an angle of data continuity based on the difference between the maximum value and minimum value of the pixel values of the block corresponding to the pixel of interest (the above dynamic range block), i.e., the dynamic range (essentially, based on the gradient between the maximum value and minimum value of the pixels in the dynamic range block), and outputs this angle to the actual world estimating unit 102 as data continuity information.

Next, description will be made regarding the configuration of the simple-type angle detecting unit 901 with reference to FIG. 174, but the simple-type angle detecting unit 901 has essentially the same configuration as that of the data continuity detecting unit 101 described with reference to FIG. 95. Accordingly, a data selecting unit 911, error estimating unit 912, continuity direction derivation unit 913, pixel selecting units 921-1 through 921-L, estimating error calculating units 922-1 through 922-L, and smallest error angle selecting unit 923 of the simple-type angle detecting unit 901 shown in FIG. 174 are similar to the data selecting unit 441, error estimating unit 442, continuity direction derivation unit 443, pixel selecting units 461-1 through 461-L, estimating error calculating units 462-1 through 462-L, and smallest error angle selecting unit 443 of the data continuity detecting unit 101 shown in FIG. 95, so description of each unit is omitted.

Next, description will be made regarding the configuration of the regression-type angle detecting unit 904 with reference to FIG. 175, but the regression-type angle detecting unit 904 has essentially the same configuration as that of the data continuity detecting unit 101 described with reference to FIG. 107. Accordingly, frame memory 931, pixel acquiring unit 932, regression line computing unit 934, and angle calculating unit 935 of the regression-type angle detecting unit 904 shown in FIG. 175 are similar to the frame memory 501, pixel acquiring unit 502, regression line computing unit 504, and angle calculating unit 505 of the data continuity detecting unit 101 shown in FIG. 107, so description thereof will be omitted.

Here, the difference in the regression-type angle detecting unit 904 as to the data continuity detecting unit 101 shown in FIG. 107 is a score detecting unit 933. The score detecting unit 933 has the same function as the score detecting unit 503 shown in FIG. 107, but further includes scope memory 933*a*, detects a score based on angle range information which detects a score corresponding to the pixel of interest stored in the scope memory 933*a* based on the angle of data continuity detected by the simple-type angle detecting unit 901 input from the determining unit 902, and supplies the detected score information to the regression line computing unit 934.

Next, description will be made regarding the configuration of the gradient-type angle detecting unit 905 with reference to FIG. 176, but the gradient-type angle detecting unit 905 has essentially the same configuration as that of the data continuity detecting unit 101 described with reference to FIG. 124. Accordingly, a data selecting unit 941, data supplementing unit 942, continuity direction derivation unit 943, horizontal/vertical determining unit 951, data acquiring unit 952, difference supplementing unit 961, MaxMin acquiring unit 962, difference supplementing unit 963, and continuity direction computation unit 971 shown in FIG. 176 are similar to the data selecting unit 701, data supplementing unit 702, continuity direction derivation unit 703, horizontal/vertical determining unit 711, data acquiring unit 712, difference supplementing unit 721, MaxMin acquiring unit 722, difference supplementing unit 723, and continuity direction computation unit 731 of the data continuity detecting unit 101 shown in FIG. 124, so description thereof will be omitted.

Next, description will be made regarding the processing for detecting data continuity with reference to the flowchart in FIG. 177.

In step S901, the simple-type angle detecting unit 901 executes the simple-type angle detecting processing, and outputs the detected angle information to the determining unit 902. Note that the simple-type angle detecting processing is the same as the processing for detecting data continuity described with reference to the flowchart in FIG. 103, so description thereof will be omitted.

In step S902, the determining unit 902 determines regarding whether an angle of data continuity is closer to the horizontal direction or the vertical direction based on the angle information of data continuity input from the simple-type angle detecting unit 901. More particularly, the determining unit 902 determines that the angle of data continuity is closer to the horizontal direction or the vertical direction in the event that the angle of data continuity, i.e., the angle θ of continuity input from the simple-type angle detecting unit 901 is in a range of 0≦θ≦18.4, 71.6≦θ≦108.4, or 161.6≦θ≦180, for example.

In step S902, in the event that determination is made that the angle of data continuity is the horizontal direction or the vertical direction, the processing proceeds to step S903.

In step S903, the determining unit 902 controls the switch 903 to connect to the terminal 903*a*, and also supplies the angle information of data continuity supplied from the simple-type angle detecting unit 901 to the regression-type angle detecting unit 904. According to this processing, the input image and the angle information of data continuity detected by the simple-type angle detecting unit 901 are supplied to the regression-type angle detecting unit 904.

In step S904, the regression-type angle detecting unit 904 executes the regression-type angle detecting processing, and outputs the detected angle to the actual world estimating unit 102 as data continuity information. Note that description will be made later regarding the regression-type angle detecting processing with reference to FIG. 179.

In step S905, the data selecting unit 911 of the simple-type angle detecting unit 901 determines regarding whether or not the processing has been completed regarding all of the pixels, and in the event that determination is made that the processing has not been completed regarding all of the pixels, the processing returns to step S901, wherein the subsequent processing is repeatedly performed.

On the other hand, in the event that determination is made that the direction of data continuity is not the horizontal direction nor the vertical direction in step S902, the processing proceeds to step S906.

In step S906, the determining unit 902 controls the switch 903 to connect to the terminal 903*b*. According to this processing, an input image is supplied to the gradient-type angle detecting unit 905.

In step S907, the gradient-type angle detecting unit 905 executes the gradient-type angle detecting processing to detect an angle, and outputs the detected angle to the actual world estimating unit 102 as continuity information. Note that the gradient-type angle detecting processing is essentially the same processing as the processing for detecting data continuity described with reference to the flowchart in FIG. 149, so description thereof will be omitted.

That is to say, when determination is made in the processing of step S902 that the angle of data continuity detected by the simple-type angle detecting unit 901 is the angle corresponding to a white region with no slant line ($18.4 \leqq \theta \leqq 71.6$, or $108.4 \leqq \theta \leqq 161.6$) in the event that the pixel of interest is the center in the drawing as shown in FIG. 178, the determining unit 902 controls the switch 903 to connect to the terminal 903*a* in the processing of step S903, whereby the regression-type angle detecting unit 904 obtains a regression straight line using correlation to detect an angle of data continuity from the regression line in the processing of step S904.

Also, when determination is made in the processing of step S902 that the angle of data continuity detected by the simple-type angle detecting unit 901 is the angle corresponding to the region of a slant line portion ($0 \leqq \theta \leqq 18.4$, $71.6 \leqq \theta \leqq 108.4$, or $161.6 \leqq \theta \leqq 180$) in the event that the pixel of interest is the center in the drawing as shown in FIG. 178, the determining unit 902 controls the switch 903 to connect to the terminal 903*b* in the processing of step S906, whereby the gradient-type angle detecting unit 905 detects an angle of data continuity in the processing of step S907.

The regression-type angle detecting unit 904 compares the correlation between a block corresponding to the pixel of interest and a block corresponding to a perimeter pixel, and obtains an angle of data continuity from the angle as to the pixel corresponding to the block having the strongest correlation. Accordingly, in the event that the angle of data continuity is closer to the horizontal direction or the vertical direction, there is a possibility that the pixel belonged to the block having the strongest correlation is far away from the pixel of interest, so that a search region needs to be expanded in order to detect the block of a strong-correlation perimeter pixel accurately, resulting in the threat of vast processing, and further expanding a search region allows the threat of accidentally detecting a block strong-correlated with the block corresponding to the pixel of interest in a position where continuity does not exist actually, and allows the threat of deteriorating the detection accuracy of an angle.

Conversely, with the gradient-type angle detecting unit 905, the closer to the horizontal direction or the vertical direction the angle of data continuity is, the further the distance between the pixels that take the maximum value and minimum value of pixel values within a dynamic range block is apart from each other, resulting in increase of pixels having the same gradient (gradient indicating change in pixel values) within the extracted block, and accordingly, performing statistical processing enables the angle of data continuity to be detected more accurately.

On the other hand, with the gradient-type angle detecting unit 905, the closer to 45 degrees or 135 degrees the angle of data continuity is, the closer the distance between the pixels that take the maximum value and minimum value of pixel values within a dynamic range block is, resulting in decrease of pixels having the same gradient (gradient indicating change in pixel values) within the extracted block, and accordingly, performing statistical processing deteriorates the accuracy of the angle of data continuity.

Conversely, with the regression-type angle detecting unit 904, in the event that the angle of data continuity is around 45 degrees or 135 degrees, a block corresponding to the pixel of interest and a block corresponding to a strong-correlation pixel exist with a short distance, whereby the angle of continuity can be detected more accurately.

Consequently, an angle of data continuity can be detected more accurately in all of ranges by switching the processing based on the angle detected by the simple-type angle detecting unit 901, according to each property of the regression-type angle detecting unit 904 and gradient-type angle detecting unit 905. Further, an angle of data continuity can be detected accurately, so that the actual world can be estimated accurately, and consequently, a more accurate and higher-precision (image) processing result can be obtained as to events in the real world.

Next, the regression-type angle detecting processing, which is the processing of step S904 in the flowchart in FIG. 177, will be described with reference to the flowchart shown in FIG. 179.

Note that the regression-type angle detecting processing using the regression-type angle detecting unit 904 is similar to the processing for detecting data continuity described with reference to the flowchart shown in FIG. 114, the processing of steps S921 through S922 and S924 through S927 in the flowchart shown in FIG. 179 are the same as the processing of steps through S501 through S506 in the flowchart shown in FIG. 114, so description thereof will be omitted.

In step S923, the score detecting unit 933 rejects pixels other than a scope range from the pixels to be processed with reference to the scope memory 933*a*, based on the angle information of data continuity detected by the simple-type angle detecting unit 901 supplied from the determining unit 902.

That is to say, for example, in the event that the range of the angle θ detected by the simple-type angle detecting unit 901 is $45 \leqq \theta \leqq 56.3$, a pixel range corresponding to the slant portion shown in FIG. 180 is stored in the scope memory 933*a* as scope corresponding to the range, and the score detecting unit 933 rejects pixels other than the range corresponding to the scope from the range to be processed.

As for a more detailed example of a scope range corresponding to each angle, for example, in the event that the angle of data continuity detected by the simple-type angle detecting unit 901 is 50 degrees, the image in the scope range and the pixels other than the scope range are defined beforehand, as shown in FIG. 181. Note that FIG. 181 illustrates an example in the case of a range of 31 pixels×31 pixels centered on the pixel of interest, each allocation shown with 0 and 1 indicates a pixel position, and a position surrounded with a circle mark in the center of the drawing is the position of the pixel of interest. Also, the pixels in the position shown with 1 are pixels within a scope range, and the pixels in the position shown with 0 are pixels other than the scope range. Note that the above description is applicable to the following FIG. 182 through FIG. 183.

That is to say, the pixels serving as the scope range are disposed centered on the pixel of interest along around angle 50 degrees with a certain range width, as shown in FIG. 181.

Also, in the same way, in the event that the angle detected by the simple-type angle detecting unit 901 is 60 degrees, the pixels serving as the scope range are disposed centered on the pixel of interest along around angle 60 degrees with a certain range width, as shown in FIG. 182.

Further, in the event that the angle detected by the simple-type angle detecting unit 901 is 67 degrees, the pixels serving as the scope range are disposed centered on the pixel of interest along around angle 67 degrees with a certain range width, as shown in FIG. 183.

Also, in the event that the angle detected by the simple-type angle detecting unit 901 is 81 degrees, the pixels serving as the scope range are disposed centered on the pixel of interest along around angle 81 degrees with a certain range width, as shown in FIG. 184.

As described above, the pixels other than the scope range are rejected from the range to be processed, so that the processing of pixels existing in positions away from continuity of data can be omitted at the processing for converting each pixel value, which is the processing of step S924, into a score, and consequently, the strong-correlated pixels alone along the direction of data continuity, which are to be processed, are processed, thereby improving the processing speed. Further, scores can be obtained using the strong-correlated pixels alone along the direction of data continuity, which are to be processed, whereby an angle of data continuity can be detected more accurately.

Note that the pixels belonged to the scope range are not restricted to the ranges shown in FIG. 181 through FIG. 184, rather, a range having a various width present in a position along the angle detected by the simple-type angle detecting unit 901, which is made up of multiple pixels centered on the pixel of interest, may be employed.

Also, with the data continuity detecting unit 101 described with reference to FIG. 173, the determining unit 902 controls the switch 903 based on the angle information of data continuity detected by the simple-type angle detecting unit 901 to input the input image information to either the regression-type angle detecting unit 904 or the gradient-type angle detecting unit 905, but an arrangement may be made wherein the input image is input to both the regression-type angle detecting unit 904 and the gradient-type angle detecting unit 905, the angle detecting processing is performed on the both units, following which the angle information detected in any one of the processing is output based on the angle information of data continuity detected by the simple-type angle detecting unit 901.

FIG. 185 illustrates the configuration of the data continuity detecting unit 101, which is configured such that the input image is input to both the regression-type angle detecting unit 904 and the gradient-type angle detecting unit 905, the angle detecting processing is performed on the both units, following which the angle information detected in any one of the processing is output based on the angle information of data continuity detected by the simple-type angle detecting unit 901. Note that the same components as the data continuity detecting unit 101 shown in FIG. 173 are denoted with the same reference numerals, so description thereof will be omitted as appropriate.

With the configuration of the data continuity detecting unit 101 shown in FIG. 185, the difference as to the data continuity detecting unit 101 shown in FIG. 173 is in that the switch 903 is deleted, input image data is input to both the regression-type angle detecting unit 904 and the gradient-type angle detecting unit 905, on each output side thereof a switch 982 is provided respectively, the angle information detected with either method is output by switching connection of each terminal 982*a* or 982*b* thereof respectively. Note that the switch 982 shown in FIG. 185 is essentially the same as the switch 903 shown in FIG. 173, so description thereof will be omitted.

Next, description will be made regarding data continuity detection processing using the data continuity detecting unit 101 in FIG. 185 with reference to the flowchart in FIG. 186. Note that the processing of steps S941, S943 through S945, and S947 in the flowchart shown in FIG. 186 is the same as the processing of steps S901, S904, S907, S902, and S905 shown in FIG. 177, so description thereof will be omitted.

In step S942, the determining unit 902 outputs the angle information of data continuity input from the simple-type angle detecting unit 901 to the regression-type angle detecting unit 904.

In step S946, the determining unit 902 controls the switch 982 to connect to the terminal 982*a*.

In step S948, the determining unit 902 controls the switch 982 to connect to the terminal 982*b*.

Note that with the flowchart shown in FIG. 186, the processing order of steps S943 and S944 may be exchanged.

According to the above arrangement, the simple-type angle detecting unit 901 detects an angle corresponding to the reference axis of continuity of image data in image data made up of a plurality of pixels acquired by real world light signals being cast upon a plurality of detecting elements each having spatio-temporal integration effects, of which a part of continuity of the real world light signals have been lost, using the matching processing, and the regression-type angle detecting unit 904 or the gradient-type angle detecting unit 905 detects, based on the image data within a predetermined region corresponding to the detected angle, an angle using the statistical processing, thereby detecting an angle of data continuity more accurately at higher speed.

Next, description will be made regarding estimation of signals in the actual world 1.

FIG. 187 is a block diagram illustrating the configuration of the actual world estimating unit 102.

With the actual world estimating unit 102 of which the configuration is shown in FIG. 187, based on the input image and the data continuity information supplied from the continuity detecting unit 101, the width of a fine line in the image, which is a signal in the actual world 1, is detected, and the level of the fine line (light intensity of the signal in the actual world 1) is estimated.

A line-width detecting unit 2101 detects the width of a fine line based on the data continuity information indicating a continuity region serving as a fine-line region made up of pixels, on which the fine-line image is projected, supplied from the continuity detecting unit 101. The line-width detecting unit 2101 supplies fine-line width information indicating the width of a fine line detected to a signal-level estimating unit 2102 along with the data continuity information.

The signal-level estimating unit 2102 estimates, based on the input image, the fine-line width information indicating the width of a fine line, which is supplied from the line-width detecting unit 2101, and the data continuity information, the level of the fine-line image serving as the signals in the actual world 1, i.e., the level of light intensity, and outputs actual world estimating information indicating the width of a fine line and the level of the fine-line image.

FIG. 188 and FIG. 189 are diagrams for describing processing for detecting the width of a fine line in signals in the actual world 1.

In FIG. 188 and FIG. 189, a region surrounded with a thick line (region made up of four squares) denotes one pixel, a region surrounded with a dashed line denotes a fine-line region made up of pixels on which a fine-line image is projected, and a circle denotes the gravity of a fine-line region. In FIG. 188 and FIG. 189, a hatched line denotes a fine-line image cast in the sensor 2. In other words, it can be said that this hatched line denotes a region where a fine-line image in the actual world 1 is projected on the sensor 2.

In FIG. 188 and FIG. 189, S denotes a gradient to be calculated from the gravity position of a fine-line region, and D is the duplication of fine-line regions. Here, fine-line regions are adjacent to each other, so the gradient S is a distance between the gravities thereof in increments of pixel. Also, the duplication D of fine-line regions denotes the number of pixels adjacent to each other in two fine-line regions.

In FIG. 188 and FIG. 189, W denotes the width of a fine line.

In FIG. 188, the gradient S is 2, and the duplication D is 2.

In FIG. 189, the gradient S is 3, and the duplication D is 1.

The fine-line regions are adjacent to each other, and the distance between the gravities thereof in the direction where the fine-line regions are adjacent to each other is one pixel, so W:D=1: S holds, the fine-line width W can be obtained by the duplication D/gradient S.

For example, as shown in FIG. 188, when the gradient S is 2, and the duplication D is 2, 2/2 is 1, so the fine-line width W is 1. Also, for example, as shown in FIG. 189, when the gradient S is 3, and the duplication D is 1, the fine-line width W is 1/3.

The line-width detecting unit 2101 thus detects the width of a fine-line based on the gradient calculated from the gravity positions of fine-line regions, and duplication of fine-line regions.

FIG. 190 is a diagram for describing the processing for estimating the level of a fine-line signal in signals in the actual world 1.

In FIG. 190, a region surrounded with a thick line (region made up of four squares) denotes one pixel, a region surrounded with a dashed line denotes a fine-line region made up of pixels on which a fine-line image is projected. In FIG. 190, E denotes the length of a fine-line region in increments of a pixel in a fine-line region, and D is duplication of fine-line regions (the number of pixels adjacent to another fine-line region).

The level of a fine-line signal is approximated when the level is constant within processing increments (fine-line region), and the level of an image other than a fine line wherein a fine line is projected on the pixel value of a pixel is approximated when the level is equal to a level corresponding to the pixel value of the adjacent pixel.

With the level of a fine-line signal as C, let us say that with a signal (image) projected on the fine-line region, the level of the left side portion of a portion where the fine-line signal is projected is A in the drawing, and the level of the right side portion of the portion where the fine-line signal is projected is B in the drawing.

At this time, Expression (93) holds.

$$\text{Sum of pixel values of a fine-line region}=(E-D)/2\times A+(E-D)/2\times B+D\times C \qquad (93)$$

The width of a fine line is constant, and the width of a fine-line region is one pixel, so the area of (the portion where the signal is projected of) a fine line in a fine-line region is equal to the duplication D of fine-line regions. The width of a fine-line region is one pixel, so the area of a fine-line region in increments of a pixel in a fine-line region is equal to the length E of a fine-line region.

Of a fine-line region, the area on the left side of a fine line is (E−D)/2. Of a fine-line region, the area on the right side of a fine line is (E−D)2.

The first term of the right side of Expression (93) is the portion of the pixel value where the signal having the same level as that in the signal projected on a pixel adjacent to the left side is projected, and can be represented with Expression (94).

$$A=\sum\alpha_i\times A_i=\sum 1/(E-D)\times(i+0.5)\times A_i \qquad (94)$$

In Expression (94), $A_i$ denotes the pixel value of a pixel adjacent to the left side.

In Expression (94), αi denotes the proportion of the area where the signal having the same level as that in the signal projected on a pixel adjacent to the left side is projected on the pixel of the fine-line region. In other words, $\alpha_i$ denotes the proportion of the same pixel value as that of a pixel adjacent to the left side, which is included in the pixel value of the pixel in the fine-line region.

i represents the position of a pixel adjacent to the left side of the fine-line region.

For example, in FIG. 190, the proportion of the same pixel value as the pixel value $A_0$ of a pixel adjacent to the left side of the fine-line region, which is included in the pixel value of the pixel in the fine-line region, is $\alpha_0$. In FIG. 190, the proportion of the same pixel value as the pixel value $A_1$ of a pixel adjacent to the left side of the fine-line region, which is included in the pixel value of the pixel in the fine-line region, is $\alpha_1$. In FIG. 190, the proportion of the same pixel value as the pixel value $A_2$ of a pixel adjacent to the left side of the fine-line region, which is included in the pixel value of the pixel in the fine-line region, is $\alpha_2$.

The second term of the right side of Expression (93) is the portion of the pixel value where the signal having the same level as that in the signal projected on a pixel adjacent to the right side is projected, and can be represented with Expression (95).

$$B=\sum\beta_j\times B_j=\sum 1/(E-D)\times(j+0.5)\times B_j \qquad (95)$$

In Expression (95), $B_j$ denotes the pixel value of a pixel adjacent to the right side.

In Expression (95), $\beta_j$ denotes the proportion of the area where the signal having the same level as that in the signal projected on a pixel adjacent to the right side is projected on the pixel of the fine-line region. In other words, $\beta_j$ denotes the proportion of the same pixel value as that of a pixel adjacent to the right side, which is included in the pixel value of the pixel in the fine-line region.

j denotes the position of a pixel adjacent to the right side of the fine-line region.

For example, in FIG. 190, the proportion of the same pixel value as the pixel value $B_0$ of a pixel adjacent to the right side of the fine-line region, which is included in the pixel value of the pixel in the fine-line region, is $\beta_0$. In FIG. 190, the proportion of the same pixel value as the pixel value $B_1$ of a pixel adjacent to the right side of the fine-line region, which is included in the pixel value of the pixel in the fine-line region, is $\beta_1$. In FIG. 190, the proportion of the same pixel value as the pixel value $B_2$ of a pixel adjacent to the right side of the fine-line region, which is included in the pixel value of the pixel in the fine-line region, is $\beta_2$.

Thus, the signal level estimating unit 2102 obtains the pixel values of the image including a fine line alone, of the pixel values included in a fine-line region, by calculating the pixel values of the image other than a fine line, of the pixel values included in the fine-line region, based on Expression (94) and Expression (95), and removing the pixel values of the image other than the fine line from the pixel values in the fine-line region based on Expression (93). Subsequently, the signal level estimating unit 2102 obtains the level of the fine-line signal based on the pixel values of the image including the fine line alone and the area of the fine line. More specifically, the signal level estimating unit 2102 calculates the level of the fine line signal by dividing the pixel values of the image including the fine line alone, of the pixel values included in the fine-line region, by the area of the fine line in the fine-line region, i.e., the duplication D of the fine-line regions.

The signal level estimating unit 2102 outputs actual world estimating information indicating the width of a fine line, and the signal level of a fine line, in a signal in the actual world 1.

With the technique of the present invention, the waveform of a fine line is geometrically described instead of pixels, so any resolution can be employed.

Next, description will be made regarding actual world estimating processing corresponding to the processing in step S102 with reference to the flowchart in FIG. 191.

In step S2101, the line-width detecting unit 2101 detects the width of a fine line based on the data continuity information. For example, the line-width detecting unit 2101 estimates the width of a fine line in a signal in the actual world 1 by dividing duplication of fine-line regions by a gradient calculated from the gravity positions in fine-line regions.

In step S2102, the signal level estimating unit 2102 estimates the signal level of a fine line based on the width of a fine line, and the pixel value of a pixel adjacent to a fine-line region, outputs actual world estimating information indicating the width of the fine line and the signal level of the fine line, which are estimated, and the processing ends. For example, the signal level estimating unit 2102 obtains pixel values on which the image including a fine line alone is projected by calculating pixel values on which the image other than the fine line included in a fine-line region is projected, and removing the pixel values on which the image other than the fine line from the fine-line region is projected, and estimates the level of the fine line in a signal in the actual world 1 by calculating the signal level of the fine line based on the obtained pixel values on which the image including the fine line alone is projected, and the area of the fine line.

Thus, the actual world estimating unit 102 can estimate the width and level of a fine line of a signal in the actual world 1.

As described above, a light signal in the real world is projected, continuity of data regarding first image data wherein part of continuity of a light signal in the real world drops, is detected, the waveform of the light signal in the real world is estimated from the continuity of the first image data based on a model representing the waveform of the light signal in the real world corresponding to the continuity of data, and in the event that the estimated light signal is converted into second image data, a more accurate higher-precision processing result can be obtained as to the light signal in the real world.

FIG. 192 is a block diagram illustrating another configuration of the actual world estimating unit 102.

With the actual world estimating unit 102 of which the configuration is illustrated in FIG. 192, a region is detected again based on an input image and the data continuity information supplied from the data continuity detecting unit 101, the width of a fine line in the image serving as a signal in the actual world 1 is detected based on the region detected again, and the light intensity (level) of the signal in the actual world 1 is estimated. For example, with the actual world estimating unit 102 of which the configuration is illustrated in FIG. 192, a continuity region made up of pixels on which a fine-line image is projected is detected again, the width of a fine line in an image serving as a signal in the actual world 1 is detected based on the region detected again, and the light intensity of the signal in the actual world 1 is estimated.

The data continuity information, which is supplied from the data continuity detecting unit 101, input to the actual world estimating unit 102 of which configuration is shown in FIG. 192, includes non-continuity component information indicating non-components other than continuity components on which a fine-line image is projected, of input images serving as the data 3, monotonous increase/decrease region information indicating a monotonous increase/decrease region of continuity regions, information indicating a continuity region, and the like. For example, non-continuity component information included in the data continuity information is made up of the gradient of a plane and intercept which approximate non-continuity components such as a background in an input image.

The data continuity information input to the actual world estimating unit 102 is supplied to a boundary detecting unit 2121. The input image input to the actual world estimating unit 102 is supplied to the boundary detecting unit 2121 and signal level estimating unit 2102.

The boundary detecting unit 2121 generates an image made up of continuity components alone on which a fine-line image is projected from the non-continuity component information included in the data continuity information, and the input image, calculates an allocation ratio indicating a proportion wherein a fine-line image serving as a signal in the actual world 1 is projected, and detects a fine-line region serving as a continuity region again by calculating a regression line indicating the boundary of the fine-line region from the calculated allocation ratio.

FIG. 193 is a block diagram illustrating the configuration of the boundary detecting unit 2121.

An allocation-ratio calculation unit 2131 generates an image made up of continuity components alone on which a fine-line image is projected from the data continuity information, the non-continuity component information included in the data continuity information, and an input image. More specifically, the allocation-ratio calculation unit 2131 detects adjacent monotonous increase/decrease regions of the continuity region from the input image based on the monotonous increase/decrease region information included in the data continuity information, and generates an image made up of continuity components alone on which a fine-line image is projected by subtracting an approximate value to be approximated at a plane indicated with a gradient and intercept included in the continuity component information from the pixel value of a pixel belonged to the detected monotonous increase/decrease region.

Note that the allocation-ratio calculation unit 2131 may generate an image made up of continuity components alone on which a fine-line image is projected by subtracting an approximate value to be approximated at a plane indicated with a gradient and intercept included in the continuity component information from the pixel value of a pixel in the input image.

The allocation-ratio calculation unit 2131 calculates an allocation ratio indicating proportion wherein a fine-line image serving as a signal in the actual world 1 is allocated into two pixels belonged to adjacent monotonous increase/decrease regions within a continuity region based on the generated image made up of the continuity components alone. The allocation-ratio calculation unit 2131 supplies the calculated allocation ratio to a regression-line calculation unit 2132.

Description will be made regarding allocation-ratio calculation processing in the allocation-ratio calculation unit 2131 with reference to FIG. 194 through FIG. 196.

The numeric values in two columns on the left side in FIG. 194 denote the pixel values of pixels vertically arrayed in two columns of an image calculated by subtracting approximate values to be approximated at a plane indicated with a gradient and intercept included in the continuity component information from the pixel values of an input image. Two regions surrounded with a square on the left side in FIG. 194 denote a monotonous increase/decrease region 2141-1 and monotonous increase/decrease region 2141-2, which are two adjacent monotonous increase/decrease regions. In other words, the numeric values shown in the monotonous increase/decrease region 2141-1 and monotonous increase/decrease region 2141-2 denote the pixel values of pixels belonged to a monotonous increase/decrease region serving as a continuity region, which is detected by the data continuity detecting unit 101.

The numeric values in one column on the right side in FIG. 194 denote values obtained by adding the pixel values of the pixels horizontally arrayed, of the pixel values of the pixels in two columns on the left side in FIG. 194. In other words, the numeric values in one column on the right side in FIG. 194 denote values obtained by adding the pixel values on which a fine-line image is projected for each pixel horizontally adjacent regarding the two monotonous increase/decrease regions made up of pixels in one column vertically arrayed.

For example, when belonging to any one of the monotonous increase/decrease region 2141-1 and monotonous increase/decrease region 2141-2, which are made up of the pixels in one column vertically arrayed respectively, and the pixel values of the pixels horizontally adjacent are 2 and 58, the value added is 60. When belonging to any one of the monotonous increase/decrease region 2141-1 and monotonous increase/decrease region 2141-2, which are made up of the pixels in one column vertically arrayed respectively, and the pixel values of the pixels horizontally adjacent are 1 and 65, the value added is 66.

It can be understood that the numeric values in one column on the right side in FIG. 194, i.e., the values obtained by adding the pixel values on which a fine-line image is projected regarding the pixels adjacent in the horizontal direction of the two adjacent monotonous increase/decrease regions made up of the pixels in one column vertically arrayed, are generally constant.

Similarly, the values obtained by adding the pixel values on which a fine-line image is projected regarding the pixels adjacent in the vertical direction of the two adjacent monotonous increase/decrease regions made up of the pixels in one column horizontally arrayed, are generally constant.

The allocation-ratio calculation unit 2131 calculates how a fine-line image is allocated on the pixel values of the pixels in one column by utilizing characteristics that the values obtained by adding the pixel values on which the fine-line image is projected regarding the adjacent pixels of the two adjacent monotonous increase/decrease regions, are generally constant.

The allocation-ratio calculation unit 2131 calculates, as shown in FIG. 195, an allocation ratio regarding each pixel belonged to the two adjacent monotonous increase/decrease regions by dividing the pixel value of each pixel belonged to the two adjacent monotonous increase/decrease regions made up of pixels in one column vertically arrayed by the value obtained by adding the pixel values on which a fine-line image is projected for each pixel horizontally adjacent. However, in the event that the calculated result, i.e., the calculated allocation ratio exceeds 100, the allocation ratio is set to 100.

For example, as shown in FIG. 195, when the pixel values of pixels horizontally adjacent, which are belonged to two adjacent monotonous increase/decrease regions made up of pixels in one column vertically arrayed, are 2 and 58 respectively, the value added is 60, and accordingly, allocation ratios 3.5 and 96.5 are calculated as to the corresponding pixels respectively. When the pixel values of pixels horizontally adjacent, which are belonged to two adjacent monotonous increase/decrease regions made up of pixels in one column vertically arrayed, are 1 and 65 respectively, the value added is 65, and accordingly, allocation ratios 1.5 and 98.5 are calculated as to the corresponding pixels respectively.

In this case, in the event that three monotonous increase/decrease regions are adjacent, regarding which column is first calculated, of two values obtained by adding the pixel values on which a fine-line image is projected for each pixel horizontally adjacent, an allocation ratio is calculated based on a value closer to the pixel value of the peak P, as shown in FIG. 196.

For example, when the pixel value of the peak P is 81, and the pixel value of a pixel of interest belonged to a monotonous increase/decrease region is 79, in the event that the pixel value of a pixel adjacent to the left side is 3, and the pixel value of a pixel adjacent to the right side is −1, the value obtained by adding the pixel value adjacent to the left side is 82, and the value obtained by adding the pixel value adjacent to the right side is 78, and consequently, 82 which is closer to the pixel value 81 of the peak P is selected, so an allocation ratio is calculated based on the pixel adjacent to the left side. Similarly, when the pixel value of the peak P is 81, and the pixel value of a pixel of interest belonged to the monotonous increase/decrease region is 75, in the event that the pixel value of a pixel adjacent to the left side is 0, and the pixel value of a pixel adjacent to the right side is 3, the value obtained by adding the pixel value adjacent to the left side is 75, and the value obtained by adding the pixel value adjacent to the right side is 78, and consequently, 78 which is closer to the pixel value 81 of the peak P is selected, so an allocation ratio is calculated based on the pixel adjacent to the right side.

Thus, the allocation-ratio calculation unit 2131 calculates an allocation ratio regarding a monotonous increase/decrease region made up of pixels in one column vertically arrayed.

With the same processing, the allocation-ratio calculation unit 2131 calculates an allocation ratio regarding a monotonous increase/decrease region made up of pixels in one column horizontally arrayed.

The regression-line calculation unit 2132 assumes that the boundary of a monotonous increase/decrease region is a straight line, and detects the monotonous increase/decrease region within the continuity region again by calculating a regression line indicating the boundary of the monotonous increase/decrease region based on the calculated allocation ratio by the allocation-ratio calculation unit 2131.

Description will be made regarding processing for calculating a regression line indicating the boundary of a monotonous increase/decrease region in the regression-line calculation unit 2132 with reference to FIG. 197 and FIG. 198.

In FIG. 197, a white circle denotes a pixel positioned in the boundary on the upper side of the monotonous increase/decrease region 2141-1 through the monotonous increase/decrease region 2141-5. The regression-line calculation unit 2132 calculates a regression line regarding the boundary on the upper side of the monotonous increase/decrease region 2141-1 through the monotonous increase/decrease region 2141-5 using the regression processing. For example, the regression-line calculation unit 2132 calculates a straight line A wherein the sum of squares of the distances with the pixels positioned in the boundary on the upper side of the monotonous increase/decrease region 2141-1 through the monotonous increase/decrease region 2141-5 becomes the minimum value.

Also, in FIG. 197, a black circle denotes a pixel positioned in the boundary on the lower side of the monotonous increase/decrease region 2141-1 through the monotonous increase/decrease region 2141-5. The regression-line calculation unit 2132 calculates a regression line regarding the boundary on the lower side of the monotonous increase/decrease region 2141-1 through the monotonous 25 increase/decrease region 2141-5 using the regression processing. For example, the regression-line calculation unit 2132 calculates a straight line B wherein the sum of squares of the distances with the pixels positioned in the boundary on the lower side of the monotonous increase/decrease region 2141-1 through the monotonous increase/decrease region 2141-5 becomes the minimum value.

The regression-line calculation unit 2132 detects the monotonous increase/decrease region within the continuity region again by determining the boundary of the monotonous increase/decrease region based on the calculated regression line.

As shown in FIG. 198, the regression-line calculation unit 2132 determines the boundary on the upper side of the monotonous increase/decrease region 2141-1 through the monotonous increase/decrease region 2141-5 based on the calculated straight line A. For example, the regression-line calculation unit 2132 determines the boundary on the upper side from the pixel closest to the calculated straight line A regarding each of the monotonous increase/decrease region 2141-1 through the monotonous increase/decrease region 2141-5. For example, the regression-line calculation unit 2132 determines the boundary on the upper side such that the pixel closest to the calculated straight line A is included in each region regarding each of the monotonous increase/decrease region 2141-1 through the monotonous increase/decrease region 2141-5.

As shown in FIG. 198, the regression-line calculation unit 2132 determines the boundary on the lower side of the monotonous increase/decrease region 2141-1 through the monotonous increase/decrease region 2141-5 based on the calculated straight line B. For example, the regression-line calculation unit 2132 determines the boundary on the lower side from the pixel closest to the calculated straight line B regarding each of the monotonous increase/decrease region 2141-1 through the monotonous increase/decrease region 2141-5. For example, the regression-line calculation unit 2132 determines the boundary on the upper side such that the pixel closest to the calculated straight line B is included in each region regarding each of the monotonous increase/decrease region 2141-1 through the monotonous increase/decrease region 2141-5.

Thus, the regression-line calculation unit 2132 detects a region wherein the pixel value monotonously increases or decreases from the peak again based on a regression line for recurring the boundary of the continuity region detected by the data continuity detecting unit 101. In other words, the regression-line calculation unit 2132 detects a region serving as the monotonous increase/decrease region within the continuity region again by determining the boundary of the monotonous increase/decrease region based on the calculated regression line, and supplies region information indicating the detected region to the line-width detecting unit 2101.

As described above, the boundary detecting unit 2121 calculates an allocation ratio indicating proportion wherein a fine-line image serving as a signal in the actual world 1 is projected on pixels, and detects the monotonous increase/decrease region within the continuity region again by calculating a regression line indicating the boundary of the monotonous increase/decrease region from the calculated allocation ratio. Thus, a more accurate monotonous increase/decrease region can be detected.

The line-width detecting unit 2101 shown in FIG. 192 detects the width of a fine line in the same processing as the case shown in FIG. 187 based on the region information indicating the region detected again, which is supplied from the boundary detecting unit 2121. The line-width detecting unit 2101 supplies fine-line width information indicating the width of a fine line detected to the signal level estimating unit 2102 along with the data continuity information.

The processing of the signal level estimating unit 2102 shown in FIG. 192 is the same processing as the case shown in FIG. 187, so description thereof will be omitted.

FIG. 199 is a flowchart for describing actual world estimating processing using the actual world estimating unit 102 of which configuration is shown in FIG. 192, which corresponds to the processing in step S102.

In step S2121, the boundary detecting unit 2121 executes boundary detecting processing for detecting a region again based on the pixel value of a pixel belonged to the continuity region detected by the data continuity detecting unit 101. The details of the boundary detecting processing will be described later.

The processing in step S2122 and step S2123 is the same as the processing in step S2101 and step S2102, so description thereof will be omitted.

FIG. 200 is a flowchart for describing boundary detecting processing corresponding to the processing in step S2121.

In step S2131, the allocation-ratio calculation unit 2131 calculates an allocation ratio indicating proportion wherein a fine-line image is projected based on the data continuity information indicating a monotonous increase/decrease region and an input image. For example, the allocation-ratio calculation unit 2131 detects adjacent monotonous increase/decrease regions within the continuity region from an input image based on the monotonous increase/decrease region information included in the data continuity information, and generates an image made up of continuity components alone on which a fine-line image is projected by subtracting approximate values to be approximated at a plane indicated with a gradient and intercept included in the continuity component information from the pixel values of the pixels belonged to the detected monotonous increase/decrease region. Subsequently, the allocation-ratio calculation unit 2131 calculates an allocation ratio, by dividing the pixel values of pixels belonged to two monotonous increase/decrease regions made up of pixels in one column by the sum of the pixel values of the adjacent pixels, regarding each pixel belonged to the two adjacent monotonous increase/decrease regions.

The allocation-ratio calculation unit 2131 supplies the calculated allocation ratio to the regression-line calculation unit 2132.

In step S2132, the regression-line calculation unit 2132 detects a region within the continuity region again by calculating a regression line indicating the boundary of a monotonous increase/decrease region based on the allocation ratio indicating proportion wherein a fine-line image is projected. For example, the regression-line calculation unit 2132 assumes that the boundary of a monotonous increase/decrease region is a straight line, and detects the monotonous increase/decrease region within the continuity region again by calculating a regression line indicating the boundary of one end of the monotonous increase/decrease region, and calculating a regression line indicating the boundary of another end of the monotonous increase/decrease region.

The regression-line calculation unit 2132 supplies region information indicating the region detected again within the continuity region to the line-width detecting unit 2101, and the processing ends.

Thus, the actual world estimating unit 102 of which configuration is shown in FIG. 192 detects a region made up of pixels on which a fine-line image is projected again, detects the width of a fine line in the image serving as a signal in the actual world 1 based on the region detected again, and estimates the intensity (level) of light of the signal in the actual world 1. Thus, the width of a fine line can be detected more accurately, and the intensity of light can be estimated more accurately regarding a signal in the actual world 1.

As described above, in the event that a light signal in the real world is projected, a discontinuous portion of the pixel values of multiple pixels in the first image data of witch part of continuity of the light signal in the real world drops is detected, a continuity region having continuity of data is detected from the detected discontinuous portion, a region is detected again based on the pixel values of pixels belonged to the detected continuity region, and the actual world is estimated based on the region detected again, a more accurate and higher-precision processing result can be obtained as to events in the real world.

Next, description will be made regarding the actual world estimating unit 102 for outputting derivative values of the approximation function in the spatial direction for each pixel in a region having continuity as actual world estimating information with reference to FIG. 201.

A reference-pixel extracting unit 2201 determines regarding whether or not each pixel in an input image is a processing region based on the data continuity information (angle as continuity or region information) input from the data continuity detecting unit 101, and in the event of a processing region, extracts reference pixel information necessary for obtaining an approximate function for approximating the pixel values of pixels in the input image (the positions and pixel values of multiple pixels around a pixel of interest necessary for calculation), and outputs this to an approximation-function estimating unit 2202.

The approximation-function estimating unit 2202 estimates, based on the least square method, an approximation function for approximately describing the pixel values of pixels around a pixel of interest based on the reference pixel information input from the reference-pixel extracting unit 2201, and outputs the estimated approximation function to a differential processing unit 2203.

The differential processing unit 2203 obtains a shift amount in the position of a pixel to be generated from a pixel of interest according to the angle of the data continuity information (for example, angle as to a predetermined axis of a fine line or two-valued edge: gradient) based on the approximation function input from the approximation-function estimating unit 2202, calculates a derivative value in the position on the approximation function according to the shift amount (the derivative value of a function for approximating the pixel value of each pixel corresponding to a distance from a line corresponding to continuity along in the one-dimensional direction), and further, adds information regarding the position and pixel value of a pixel of interest, and gradient as continuity to this, and outputs this to the image generating unit 103 as actual world estimating information.

Next, description will be made regarding actual world estimating processing by the actual world estimating unit 102 in FIG. 201 with reference to the flowchart in FIG. 202.

In step S2201, the reference-pixel extracting unit 2201 acquires an angle and region information as the data continuity information from the data continuity detecting unit 101 as well as an input image.

In step S2202, the reference-pixel extracting unit 2201 sets a pixel of interest from unprocessed pixels in the input image.

In step S2203, the reference-pixel extracting unit 2201 determines regarding whether or not the pixel of interest is included in a processing region based on the region information of the data continuity information, and in the event that the pixel of interest is not a pixel in a processing region, the processing proceeds to step S2210, the differential processing unit 2203 is informed that the pixel of interest is in a non-processing region via the approximation-function estimating unit 2202, in response to this, the differential processing unit 2203 sets the derivative value regarding the corresponding pixel of interest to zero, further adds the pixel value of the pixel of interest to this, and outputs this to the image generating unit 103 as actual world estimating information, and also the processing proceeds to step S2211. Also, in the event that determination is made that the pixel of interest is in a processing region, the processing proceeds to step S2204.

In step S2204, the reference-pixel extracting unit 2201 determines regarding whether the direction having data continuity is an angle close to the horizontal direction or angle close to the vertical direction based on the angular information included in the data continuity information. That is to say, in the event that an angle θ having data continuity is $45° > \theta \geqq 0°$, or $180° > \theta \geqq 135°$, the reference-pixel extracting unit 2201 determines that the direction of continuity of the pixel of interest is close to the horizontal direction, and in the event that the angle θ having data continuity is $135° > \theta \geqq 45°$, determines that the direction of continuity of the pixel of interest is close to the vertical direction.

In step S2205, the reference-pixel extracting unit 2201 extracts the positional information and pixel values of reference pixels corresponding to the determined direction from the input image respectively, and outputs these to the approximation-function estimating unit 2202. That is to say, reference pixels become data to be used for calculating a later-described approximation function, so are preferably extracted according to the gradient thereof. Accordingly, corresponding to any determined direction of the horizontal direction and the vertical direction, reference pixels in a long range in the direction thereof are extracted. More specifically, for example, as shown in FIG. 203, in the event that a gradient $G_f$ is close to the vertical direction, determination is made that the direction is the vertical direction. In this case, as shown in FIG. 203 for example, when a pixel (0, 0) in the center of FIG.

203 is taken as a pixel of interest, the reference-pixel extracting unit 2201 extracts each pixel value of pixels (−1, 2), (−1, 1), (−1, 0), (−1, −1), (−1, −2), (0, 2), (0, 1), (0, 0), (0, −1), (0, −2), (1, 2), (1, 1), (1, 0), (1, −1), and (1, −2). Note that in FIG. 203, let us say that both sizes in the horizontal direction and in the vertical direction of each pixel is 1.

In other words, the reference-pixel extracting unit 2201 extracts pixels in a long range in the vertical direction as reference pixels such that the reference pixels are 15 pixels in total of 2 pixels respectively in the vertical (upper/lower) direction×1 pixel respectively in the horizontal (left/right) direction centered on the pixel of interest.

Conversely, in the event that determination is made that the direction is the horizontal direction, the reference-pixel extracting unit 2201 extracts pixels in a long range in the horizontal direction as reference pixels such that the reference pixels are 15 pixels in total of 1 pixel respectively in the vertical (upper/lower) direction×2 pixels respectively in the horizontal (left/right) direction centered on the pixel of interest, and outputs these to the approximation-function estimating unit 2202. Needless to say, the number of reference pixels is not restricted to 15 pixels as described above, so any number of pixels may be employed.

In step S2206, the approximation-function estimating unit 2202 estimates the approximation function f(x) using the least square method based on information of reference pixels input from the reference-pixel extracting unit 2201, and outputs this to the differential processing unit 2203.

That is to say, the approximation function f(x) is a polynomial such as shown in the following Expression (96).

$$f(x) = w_1 x^n + w_2 x^{n-1} + \cdots + w_{n+1} \quad (96)$$

Thus, if each of coefficients $W_1$ through $W_{n+1}$ of the polynomial in Expression (96) can be obtained, the approximation function f(x) for approximating the pixel value of each reference pixel (reference pixel value) can be obtained. However, reference pixel values exceeding the number of coefficients are necessary, so for example, in the case such as shown in FIG. 203, the number of reference pixels is 15 pixels in total, and accordingly, the number of obtainable coefficients in the polynomial is restricted to 15. In this case, let us say that the polynomial is up to 14-dimension, and the approximation function is estimated by obtaining the coefficients $W_1$ through $W_{15}$. Note that in this case, simultaneous equations may be employed by setting the approximation function f(x) made up of a 15-dimensional polynomial.

Accordingly, when 15 reference pixel values shown in FIG. 203 are employed, the approximation-function estimating unit 2202 estimates the approximation function f(x) by solving the following Expression (97) using the least square method.

$$P(-1,-2)=f(-1-Cx(-2))$$

$$P(-1,-1)=f(-1-Cx(-1))$$

$$P(-1,0)=f(-1)\ (=f(-1-Cx(0)))$$

$$P(-1,1)=f(-1-Cx(1))$$

$$P(-1,2)=f(-1-Cx(2))$$

$$P(0,-2)=f(0-Cx(-2))$$

$$P(0,-1)=f(0-Cx(-1))$$

$$P(0,0)=f(0)\ (=f(0-Cx(0)))$$

$$P(0,1)=f(0-Cx(1))$$

$$P(0,2)=f(0-Cx(2))$$

$$P(1,-2)=f(1-Cx(-2))$$

$$P(1,-1)=f(1-Cx(-1))$$

$$P(1,0)=f(1)\ (=f(1-Cx(0)))$$

$$P(1,1)=f(1-Cx(1))$$

$$P(1,2)=f(1-Cx(2)) \quad (97)$$

Note that the number of reference pixels may be changed in accordance with the degree of the polynomial.

Here, Cx (ty) denotes a shift amount, and when the gradient as continuity is denoted with $G_f$, $Cx(ty)=ty/G_f$ is defined. This shift amount Cx (ty) denotes the width of a shift as to the spatial direction X in the position in the spatial direction Y=ty on condition that the approximation function f(x) defined on the position in the spatial direction Y=0 is continuous (has continuity) along the gradient $G_f$. Accordingly, for example, in the event that the approximation function is defined as f (x) on the position in the spatial direction Y=0, this approximation function f(x) must be shifted by Cx (ty) as to the spatial direction X along the gradient $G_f$ in the spatial direction Y=ty, so the function is defined as f (x−Cx(ty)) (=f(x−ty/$G_f$)).

In step S2207, the differential processing unit 2203 obtains a shift amount in the position of a pixel to be generated based on the approximation function f(x) input from the approximation-function estimating unit 2202.

That is to say, in the event that pixels are generated so as to be a double density in the horizontal direction and in the vertical direction respectively (quadruple density in total), the differential processing unit 2203 first obtains a shift amount of Pin (Xin, Yin) in the center position to divide a pixel of interest into two pixels Pa and Pb, which become a double density in the vertical direction, as shown in FIG. 204, to obtain a derivative value at a center position Pin (Xin, Yin) of a pixel of interest. This shift amount becomes Cx(0), so actually becomes zero. Note that in FIG. 204, a pixel Pin of which general gravity position is (Xin, Yin) is a square, and pixels Pa and Pb of which general gravity positions are (Xin, Yin+0.25) and (Xin, Yin−0.25) respectively are rectangles long in the horizontal direction in the drawing.

In step S2208, the differential processing unit 2203 differentiates the approximation function f(x) so as to obtain a primary differential function f(x)' of the approximation function, obtains a derivative value at a position according to the obtained shift amount, and outputs this to the image generating unit 103 as actual world estimating information. That is to say, in this case, the differential processing unit 2203 obtains a derivative value f (Xin)', and adds the position thereof (in this case, a pixel of interest (Xin, Yin)), the pixel value thereof, and the gradient information in the direction of continuity to this, and outputs this.

In step S2209, the differential processing unit 2203 determines regarding whether or not derivative values necessary for generating desired-density pixels are obtained. For example, in this case, the obtained derivative values are only derivative values necessary for a double density (only derivative values to become a double density for the spatial direction Y are obtained), so determination is made that derivative values necessary for generating desired-density pixels are not obtained, and the processing returns to step S2207.

In step S2207, the differential processing unit 2203 obtains a shift amount in the position of a pixel to be generated based on the approximation function f(x) input from the approximation-function estimating unit 2202 again. That is to say, in this case, the differential processing unit 2203 obtains derivative values necessary for further dividing the divided pixels Pa and Pb into 2 pixels respectively. The positions of the pixels Pa and Pb are denoted with black circles in FIG. 204 respectively, so the differential processing unit 2203 obtains a shift amount corresponding to each position. The shift amounts of the pixels Pa and Pb are Cx (0.25) and Cx (−0.25) respectively.

In step S2208, the differential processing unit 2203 subjects the approximation function f(x) to a primary differentiation, obtains a derivative value in the position according to a shift amount corresponding to each of the pixels Pa and Pb, and outputs this to the image generating unit 103 as actual world estimating information.

That is to say, in the event of employing the reference pixels shown in FIG. 203, the differential processing unit 2203, as shown in FIG. 205, obtains a differential function f(x)' regarding the obtained approximation function f(x), obtains derivative values in the positions (Xin−Cx(0.25)) and (Xin−Cx (−0.25)), which are positions shifted by shift amounts Cx (0.25) and Cx (−0.25) for the spatial direction X, as f (Xin−Cx(0.25))' and f (Xin−Cx(−0.25))' respectively, adds the positional information corresponding to the derivative values thereof to this, and outputs this as actual world estimating information. Note that the information of the pixel values is output at the first processing, so this is not added at this processing.

In step S2209, the differential processing unit 2203 determines regarding whether or not derivative values necessary for generating desired-density pixels are obtained again. For example, in this case, derivative values to become a quadruple density have been obtained, so determination is made that derivative values necessary for generating desired-density pixels have been obtained, and the processing proceeds to step S2211.

In step S2211, the reference-pixel extracting unit 2201 determines regarding whether or not all of the pixels have been processed, and in the event that determination is made that all of the pixels have not been processed, the processing returns to step S2202. Also, in step S2211, in the event that determination is made that all of the pixels have been processed, the processing ends.

As described above, in the event that pixels are generated so as to become a quadruple density in the horizontal direction and in the vertical direction regarding the input image, pixels are divided by extrapolation/interpolation using the derivative value of the approximation function in the center position of the pixel to be divided, so in order to generate quadruple-density pixels, information of three derivative values in total is necessary.

That is to say, as shown in FIG. 204, derivative values necessary for generating four pixels P01, P02, P03, and P04 (in FIG. 204, pixels P01, P02, P03, and P04 are squares of which the gravity positions are the positions of four cross marks in the drawing, and the length of each side is 1 for the pixel Pin, so around 0.5 for the pixels P01, P02, P03, and P04) are necessary for one pixel in the end, and accordingly, in order to generate quadruple-density pixels, first, double-density pixels in the horizontal direction or in the vertical direction (in this case, in the vertical direction) are generated (the above first processing in steps S2207 and S2208), and further, the divided two pixels are divided in the direction orthogonal to the initial dividing direction (in this case, in the horizontal direction) (the above second processing in steps S2207 and S2208).

Note that with the above example, description has been made regarding derivative values at the time of calculating quadruple-density pixels as an example, but in the event of calculating pixels having a density more than a quadruple density, many more derivative values necessary for calculating pixel values may be obtained by repeatedly performing the processing in steps S2207 through S2209. Also, with the above example, description has been made regarding an example for obtaining double-density pixel values, but the approximation function f(x) is a continuous function, so necessary derivative values may be obtained even regarding pixel values having a density other than a pluralized density.

According to the above arrangement, an approximation function for approximately expressing the pixel values of pixels near a pixel of interest can be obtained, and derivative values in the positions corresponding to the pixel positions in the spatial direction can be output as actual world estimating information.

With the actual world estimating unit 102 described in FIG. 201, derivative values necessary for generating an image have been output as actual world estimating information, but a derivative value is the same value as a gradient of the approximation function f(x) in a necessary position.

Now, description will be made next regarding the actual world estimating unit 102 wherein gradients alone on the approximation function f(x) necessary for generating pixels are directly obtained without obtaining the approximation function f(x), and output as actual world estimating information, with reference to FIG. 206.

The reference-pixel extracting unit 2211 determines regarding whether or not each pixel of an input image is a processing region based on the data continuity information (angle as continuity, or region information) input from the data continuity detecting unit 101, and in the event of a processing region, extracts information of reference pixels necessary for obtaining gradients from the input image (perimeter multiple pixels arrayed in the vertical direction including a pixel of interest, which are necessary for calculation, or the positions of perimeter multiple pixels arrayed in the horizontal direction including a pixel of interest, and information of each pixel value), and outputs this to a gradient estimating unit 2212.

The gradient estimating unit 2212 generates gradient information of a pixel position necessary for generating a pixel based on the reference pixel information input from the reference-pixel extracting unit 2211, and outputs this to the image generating unit 103 as actual world estimating information. More specifically, the gradient estimating unit 2212 obtains a gradient in the position of a pixel of interest on the approximation function f(x) approximately expressing the actual world using the difference information of the pixel values between pixels, outputs this along with the position information and pixel value of the pixel of interest, and the gradient information in the direction of continuity, as actual world estimating information.

Next, description will be made regarding the actual world estimating processing by the actual world estimating unit 102 in FIG. 206 with reference to the flowchart in FIG. 207.

In step S2221, the reference-pixel extracting unit 2211 acquires an angle and region information as the data continuity information from the data continuity detecting unit 101 along with an input image.

In step S2222, the reference-pixel extracting unit 2211 sets a pixel of interest from unprocessed pixels in the input image.

In step S2223, the reference-pixel extracting unit 2211 determines regarding whether or not the pixel of interest is in a processing region based on the region information of the data continuity information, and in the event that determination is made that the pixel of interest is not a pixel in the processing region, the processing proceeds to step S2228, wherein the gradient estimating unit 2212 is informed that the pixel of interest is in a non-processing region, in response to this, the gradient estimating unit 2212 sets the gradient for the corresponding pixel of interest to zero, and further adds the pixel value of the pixel of interest to this, and outputs this as actual world estimating information to the image generating unit 103, and also the processing proceeds to step S2229. Also, in the event that determination is made that the pixel of interest is in a processing region, the processing proceeds to step S2224.

In step S2224, the reference-pixel extracting unit 2211 determines regarding whether the direction having data continuity is an angle close to the horizontal direction or angle close to the vertical direction based on the angular information included in the data continuity information. That is to say, in the event that an angle θ having data continuity is 45°>θ≧0°, or 180°>θ≧135°, the reference-pixel extracting unit 2211 determines that the direction of continuity of the pixel of interest is close to the horizontal direction, and in the event that the angle θ having data continuity is 135°>θ≧45°, determines that the direction of continuity of the pixel of interest is close to the vertical direction.

In step S2225, the reference-pixel extracting unit 2211 extracts the positional information and pixel values of reference pixels corresponding to the determined direction from the input image respectively, and outputs these to the gradient estimating unit 2212. That is to say, reference pixels become data to be used for calculating a later-described gradient, so are preferably extracted according to a gradient indicating the direction of continuity. Accordingly, corresponding to any determined direction of the horizontal direction and the vertical direction, reference pixels in a long range in the direction thereof are extracted. More specifically, for example, in the event that determination is made that a gradient is close to the vertical direction, as shown in FIG. 208, when a pixel (0, 0) in the center of FIG. 208 is taken as a pixel of interest, the reference-pixel extracting unit 2211 extracts each pixel value of pixels (0, 2), (0, 1), (0, 0), (0, −1), and (0, −2). Note that in FIG. 208, let us say that both sizes in the horizontal direction and in the vertical direction of each pixel is 1.

In other words, the reference-pixel extracting unit 2211 extracts pixels in a long range in the vertical direction as reference pixels such that the reference pixels are 5 pixels in total of 2 pixels respectively in the vertical (upper/lower) direction centered on the pixel of interest.

Conversely, in the event that determination is made that the direction is the horizontal direction, the reference-pixel extracting unit 2211 extracts pixels in a long range in the horizontal direction as reference pixels such that the reference pixels are 5 pixels in total of 2 pixels respectively in the horizontal (left/right) direction centered on the pixel of interest, and outputs these to the approximation-function estimating unit 2202. Needless to say, the number of reference pixels is not restricted to 5 pixels as described above, so any number of pixels may be employed.

In step S2226, the gradient estimating unit 2212 calculates a shift amount of each pixel value based on the reference pixel information input from the reference-pixel extracting unit 2211, and the gradient $G_f$ in the direction of continuity. That is to say, in the event that the approximation function f(x) corresponding to the spatial direction Y=0 is taken as a basis, the approximation functions corresponding to the spatial directions Y=−2, −1, 1, and 2 are continuous along the gradient $G_f$ as continuity as shown in FIG. 208, so the respective approximation functions are described as f (x−Cx(2)), f (x−Cx(1)), f(x−Cx(−1)), and f (x−Cx(−2)), and are represented as functions shifted by each shift amount in the spatial direction X for each of the spatial directions Y=−2, −1, 1, and 2.

Accordingly, the gradient estimating unit 2212 obtains shift amounts Cx (−2) through Cx (2) of these. For example, in the event that reference pixels are extracted such as shown in FIG. 208, with regard to the shift amounts thereof, the reference pixel (0, 2) in the drawing becomes Cx (2)=2/$G_f$, the reference pixel (0, 1) becomes Cx (1)=1/$G_f$, the reference pixel (0, 0) becomes Cx (0)=0, the reference pixel (0, −1) becomes Cx (−1)=−1/$G_f$, and the reference pixel (0, −2) becomes Cx (−2)=−2/$G_f$.

In step S2227, the gradient estimating unit 2212 calculates (estimates) a gradient on the approximation function f(x) in the position of the pixel of interest. For example, as shown in FIG. 208, in the event that the direction of continuity regarding the pixel of interest is an angle close to the vertical direction, the pixel values between the pixels adjacent in the horizontal direction exhibit great differences, but change between the pixels in the vertical direction is small and similar, and accordingly, the gradient estimating unit 2212 substitutes the difference between the pixels in the vertical direction for the difference between the pixels in the horizontal direction, and obtains a gradient on the approximation function f(x) in the position of the pixel of interest, by seizing change between the pixels in the vertical direction as change in the spatial direction X according to a shift amount.

That is to say, if we assume that the approximation function f(x) approximately describing the real world exists, the relations between the above shift amounts and the pixel values of the respective reference pixels is such as shown in FIG. 209. Here, the pixel values of the respective pixels in FIG. 208 are represented as P (0, 2), P (0, 1), P (0, 0), P (0, −1), and P (0, −2) from the top. As a result, with regard to the pixel value P and shift amount Cx near the pixel of interest (0, 0), 5 pairs of relations (P, Cx)=((P (0, 2), −Cx(2)), (P (0, 1), −Cx(1)), (P (0, −1)), −Cx (−1)), (P (0, −2), −Cx (−2)), and (P (0, 0), 0) are obtained.

Now, with the pixel value P, shift amount Cx, and gradient Kx (gradient on the approximation function f(x)), the relation such as the following Expression (98) holds.

$$P = Kx \times Cx \tag{98}$$

The above Expression (98) is a one-variable function regarding the variable Kx, so the gradient estimating unit 2212 obtains the gradient Kx (gradient) using the least square method of one variable.

That is to say, the gradient estimating unit 2212 obtains the gradient of the pixel of interest by solving a normal equation such as shown in the following Expression (99), adds the pixel value of the pixel of interest, and the gradient information in the direction of continuity to this, and outputs this to the image generating unit 103 as actual world estimating information.

$$K_x = \frac{\sum_{i=1}^{m}(C_{xi} - P_i)}{\sum_{i=1}^{m}(C_{xi})^2} \tag{99}$$

Here, i denotes a number for identifying each pair of the pixel value P and shift amount C of the above reference pixel, 1 through m. Also, m denotes the number of the reference pixels including the pixel of interest.

In step S2229, the reference-pixel extracting unit 2211 determines regarding whether or not all of the pixels have been processed, and in the event that determination is made that all of the pixels have not been processed, the processing returns to step S2222. Also, in the event that determination is made that all of the pixels have been processed in step S2229, the processing ends.

Note that the gradient to be output as actual world estimating information by the above processing is employed at the time of calculating desired pixel values to be obtained finally through extrapolation/interpolation. Also, with the above example, description has been made regarding the gradient at the time of calculating double-density pixels as an example, but in the event of calculating pixels having a density more than a double density, gradients in many more positions necessary for calculating the pixel values may be obtained.

For example, as shown in FIG. 204, in the event that pixels having a quadruple density in the spatial directions in total of a double density in the horizontal direction and also a double density in the vertical direction are generated, the gradient Kx of the approximation function f(x) corresponding to the respective positions Pin, Pa, and Pb in FIG. 204 should be obtained, as described above.

Also, with the above example, an example for obtaining double-density pixels has been described, but the approximation function f(x) is a continuous function, so it is possible to obtain a necessary gradient even regarding the pixel value of a pixel in a position other than a pluralized density.

According to the above arrangements, it is possible to generate and output gradients on the approximation function necessary for generating pixels in the spatial direction as actual world estimating information by using the pixel values of pixels near a pixel of interest without obtaining the approximation function approximately representing the actual world.

Next, description will be made regarding the actual world estimating unit 102, which outputs derivative values on the approximation function in the frame direction (temporal direction) for each pixel in a region having continuity as actual world estimating information, with reference to FIG. 210.

The reference-pixel extracting unit 2231 determines regarding whether or not each pixel in an input image is in a processing region based on the data continuity information (movement as continuity (movement vector), and region information) input from the data continuity detecting unit 101, and in the event that each pixel is in a processing region, extracts reference pixel information necessary for obtaining an approximation function approximating the pixel values of the pixels in the input image (multiple pixel positions around a pixel of interest necessary for calculation, and the pixel values thereof), and outputs this to the approximation-function estimating unit 2202.

The approximation-function estimating unit 2232 estimates an approximation function, which approximately describes the pixel value of each pixel around the pixel of interest based on the reference pixel information in the frame direction input from the reference-pixel extracting unit 2231, based on the least square method, and outputs the estimated function to the differential processing unit 2233.

The differential processing unit 2233 obtains a shift amount in the frame direction in the position of a pixel to be generated from the pixel of interest according to the movement of the data continuity information based on the approximation function in the frame direction input from the approximation-function estimating unit 2232, calculates a derivative value in a position on the approximation function in the frame direction according to the shift amount thereof (derivative value of the function approximating the pixel value of each pixel corresponding to a distance along in the primary direction from a line corresponding to continuity), further adds the position and pixel value of the pixel of interest, and information regarding movement as continuity to this, and outputs this to the image generating unit 103 as actual world estimating information.

Next, description will be made regarding the actual world estimating processing by the actual world estimating unit 102 in FIG. 210 with reference to the flowchart in FIG. 211.

In step S2241, the reference-pixel extracting unit 2231 acquires the movement and region information as the data continuity information from the data continuity detecting unit 101 along with an input image.

In step S2242, the reference-pixel extracting unit 2231 sets a pixel of interest from unprocessed pixels in the input image.

In step S2243, the reference-pixel extracting unit 2231 determines regarding whether or not the pixel of interest is included in a processing region based on the region information of the data continuity information, and in the event that the pixel of interest is not a pixel in a processing region, the processing proceeds to step S2250, the differential processing unit 2233 is informed that the pixel of interest is in a non-processing region via the approximation-function estimating unit 2232, in response to this, the differential processing unit 2233 sets the derivative value regarding the corresponding pixel of interest to zero, further adds the pixel value of the pixel of interest to this, and outputs this to the image generating unit 103 as actual world estimating information, and also the processing proceeds to step S2251. Also, in the event that determination is made that the pixel of interest is in a processing region, the processing proceeds to step S2244.

In step S2244, the reference-pixel extracting unit 2231 determines regarding whether the direction having data continuity is movement close to the spatial direction or movement close to the frame direction based on movement information included in the data continuity information. That is to say, as shown in FIG. 212, if we say that an angle indicating the spatial and temporal directions within a surface made up of the frame direction T, which is taken as a reference axis, and the spatial direction Y, is taken as θv, in the event that an angle θv having data continuity is $45° > \theta v \geqq 0°$, or $180° > \theta v \geqq 135°$, the reference-pixel extracting unit 2201 determines that the movement as continuity of the pixel of interest is close to the frame direction (temporal direction), and in the event that the angle θ having data continuity is $135° > \theta \geqq 45°$, determines that the direction of continuity of the pixel of interest is close to the spatial direction.

In step S2245, the reference-pixel extracting unit 2201 extracts the positional information and pixel values of reference pixels corresponding to the determined direction from the input image respectively, and outputs these to the approximation-function estimating unit 2232. That is to say, reference pixels become data to be used for calculating a later-described approximation function, so are preferably extracted according to the angle thereof. Accordingly, corresponding to any determined direction of the frame direction and the spatial direction, reference pixels in a long range in the direction thereof are extracted. More specifically, for example, as shown in FIG. 212, in the event that a movement direction $V_f$ is close to the spatial direction, determination is made that the direction is the spatial direction. In this case, as shown in FIG. 212 for example, when a pixel (t, y)=(0, 0) in the center of FIG. 212 is taken as a pixel of interest, the reference-pixel extracting unit 2231 extracts each pixel value of pixels (t, y)=(−1, 2), (−1, 1), (−1, 0), (−1, −1), (−1, −2), (0, 2), (0, 1), (0, 0), (0, −1), (0, −2), (1, 2), (1, 1), (1, 0), (1, −1), and (1, −2). Note that in FIG. 212, let us say that both sizes in the frame direction and in the spatial direction of each pixel is 1.

In other words, the reference-pixel extracting unit 2231 extracts pixels in a long range in the spatial direction as to the frame direction as reference pixels such that the reference pixels are 15 pixels in total of 2 pixels respectively in the spatial direction (upper/lower direction in the drawing) ×1 frame respectively in the frame direction (left/right direction in the drawing) centered on the pixel of interest.

Conversely, in the event that determination is made that the direction is the frame direction, the reference-pixel extracting unit 2231 extracts pixels in a long range in the frame direction as reference pixels such that the reference pixels are 15 pixels in total of 1 pixel respectively in the spatial direction (upper/lower direction in the drawing) ×2 frames respectively in the frame direction (left/right direction in the drawing) centered on the pixel of interest, and outputs these to the approximation-function estimating unit 2232. Needless to say, the number of reference pixels is not restricted to 15 pixels as described above, so any number of pixels may be employed.

In step S2246, the approximation-function estimating unit 2232 estimates the approximation function f(t) using the least square method based on information of reference pixels input from the reference-pixel extracting unit 2231, and outputs this to the differential processing unit 2233.

That is to say, the approximation function f(t) is a polynomial such as shown in the following Expression (100).

$$f(t) = W_1 t^n + W_2 t^{n-1} + \cdots + W_{n-1} \tag{100}$$

Thus, if each of coefficients $W_1$ through $W_{n+1}$ of the polynomial in Expression (100) can be obtained, the approximation function f(t) in the frame direction for approximating the pixel value of each reference pixel can be obtained. However, reference pixel values exceeding the number of coefficients are necessary, so for example, in the case such as shown in FIG. 212, the number of reference pixels is 15 pixels in total, and accordingly, the number of obtainable coefficients in the polynomial is restricted to 15. In this case, let us say that the polynomial is up to 14-dimension, and the approximation function is estimated by obtaining the coefficients $W_1$ through $W_{15}$. Note that in this case, simultaneous equations may be employed by setting the approximation function f(t) made up of a 15-dimensional polynomial.

Accordingly, when 15 reference pixel values shown in FIG. 212 are employed, the approximation-function estimating unit 2232 estimates the approximation function f(t) by solving the following Expression (101) using the least square method.

$$P(-1,-2)=f(-1-Ct(-2))$$
$$P(-1,-1)=f(-1-Ct(-1))$$
$$P(-1,0)=f(-1)\ (=f(-1-Ct(0)))$$
$$P(-1,1)=f(-1-Ct(1))$$
$$P(-1,2)=f(-1-Ct(2))$$
$$P(0,-2)=f(0-Ct(-2))$$
$$P(0,-1)=f(0-Ct(-1))$$
$$P(0,0)=f(0)\ (=f(0-Ct(0)))$$
$$P(0,1)=f(0-Ct(1))$$
$$P(0,2)=f(0-Ct(2))$$
$$P(1,-2)=f(1-Ct(-2))$$
$$P(1,-1)=f(1-Ct(-1))$$
$$P(1,0)=f(1)\ (=f(1-Ct(0)))$$
$$P(1,1)=f(1-Ct(1))$$
$$P(1,2)=f(1-Ct(2)) \tag{101}$$

Note that the number of reference pixels may be changed in accordance with the degree of the polynomial.

Here, Ct(ty) denotes a shift amount, which is the same as the above Cx(ty), and when the gradient as continuity is denoted with $V_f$, Ct(ty)=ty/$V_f$ is defined. This shift amount Ct(ty) denotes the width of a shift as to the frame direction T in the position in the spatial direction Y=ty on condition that the approximation function f(t) defined on the position in the spatial direction Y=0 is continuous (has continuity) along the gradient $V_f$. Accordingly, for example, in the event that the approximation function is defined as f (t) on the position in the spatial direction Y=0, this approximation function f(t) must be shifted by Ct (ty) as to the frame direction (temporal direction) T in the spatial direction Y=ty, so the function is defined as f (t−Ct (ty)) (=f(t−ty/$V_f$).

In step S2247, the differential processing unit 2233 obtains a shift amount in the position of a pixel to be generated based on the approximation function f(t) input from the approximation-function estimating unit 2232.

That is to say, in the event that pixels are generated so as to be a double density in the frame direction and in the spatial direction respectively (quadruple density in total), the differential processing unit 2233 first obtains, for example, a shift amount of later-described Pin (Tin, Yin) in the center position to be divided into later-described two pixels Pat and Pbt, which become a double density in the spatial direction, as shown in FIG. 213, to obtain a derivative value at a center position Pin (Tin, Yin) of a pixel of interest. This shift amount becomes Ct(0), so actually becomes zero. Note that in FIG. 213, a pixel Pin of which general gravity position is (Tin, Yin) is a square, and pixels Pat and Pbt of which general gravity positions are (Tin, Yin+0.25) and (Tin, Yin−0.25) respectively are rectangles long in the horizontal direction in the drawing. Also, the length in the frame direction T of the pixel of interest Pin is 1, which corresponds to the shutter time for one frame.

In step S2248, the differential processing unit 2233 differentiates the approximation function f(t) so as to obtain a primary differential function f(t)' of the approximation function, obtains a derivative value at a position according to the obtained shift amount, and outputs this to the image generating unit 103 as actual world estimating information. That is to say, in this case, the differential processing unit 2233 obtains a derivative value f (Tin)', and adds the position thereof (in this case, a pixel of interest (Tin, Yin)), the pixel value thereof, and the movement information in the direction of continuity to this, and outputs this.

In step S2249, the differential processing unit 2233 determines regarding whether or not derivative values necessary for generating desired-density pixels are obtained. For example, in this case, the obtained derivative values are only derivative values necessary for a double density in the spatial direction (derivative values to become a double density for the frame direction are not obtained), so determination is made that derivative values necessary for generating desired-density pixels are not obtained, and the processing returns to step S2247.

In step S2247, the differential processing unit 2203 obtains a shift amount in the position of a pixel to be generated based on the approximation function f(t) input from the approximation-function estimating unit 2202 again. That is to say, in this case, the differential processing unit 2203 obtains derivative values necessary for further dividing the divided pixels Pat and Pbt into 2 pixels respectively. The positions of the pixels Pat and Pbt are denoted with black circles in FIG. 213 respectively, so the differential processing unit 2233 obtains a shift amount corresponding to each position. The shift amounts of the pixels Pat and Pbt are Ct (0.25) and Ct (−0.25) respectively.

In step S2248, the differential processing unit 2233 differentiates the approximation function f(t), obtains a derivative value in the position according to a shift amount corresponding to each of the pixels Pat and Pbt, and outputs this to the image generating unit 103 as actual world estimating information.

That is to say, in the event of employing the reference pixels shown in FIG. 212, the differential processing unit 2233, as shown in FIG. 214, obtains a differential function f(t)' regarding the obtained approximation function f(t), obtains derivative values in the positions (Tin−Ct (0.25)) and (Tin−Ct (−0.25)), which are positions shifted by shift amounts Ct(0.25) and Ct (−0.25) for the spatial direction T, as f(Tin−Ct (0.25))' and f(Tin−Ct (−0.25))' respectively, adds the positional information corresponding to the derivative values thereof to this, and outputs this as actual world estimating information. Note that the information of the pixel values is output at the first processing, so this is not added at this processing.

In step S2249, the differential processing unit 2233 determines regarding whether or not derivative values necessary for generating desired-density pixels are obtained again. For example, in this case, derivative values to become a double density in the spatial direction Y and in the frame direction T respectively (quadruple density in total) are obtained, so determination is made that derivative values necessary for generating desired-density pixels are obtained, and the processing proceeds to step S2251.

In step S2251, the reference-pixel extracting unit 2231 determines regarding whether or not all of the pixels have been processed, and in the event that determination is made that all of the pixels have not been processed, the processing returns to step S2242. Also, in step S2251, in the event that determination is made that all of the pixels have been processed, the processing ends.

As described above, in the event that pixels are generated so as to become a quadruple density in the frame direction (temporal direction) and in the spatial direction regarding the input image, pixels are divided by extrapolation/interpolation using the derivative value of the approximation function in the center position of the pixel to be divided, so in order to generate quadruple-density pixels, information of three derivative values in total is necessary.

That is to say, as shown in FIG. 213, derivative values necessary for generating four pixels P01*t*, P02*t*, P03*t*, and P04*t* (in FIG. 213, pixels P01*t*, P02*t*, P03*t*, and P04*t* are squares of which the gravity positions are the positions of four cross marks in the drawing, and the length of each side is 1 for the pixel Pin, so around 0.5 for the pixels P01*t*, P02*t*, P03*t*, and P04*t*) are necessary for one pixel in the end, and accordingly, in order to generate quadruple-density pixels, first, double-density pixels in the frame direction or in the spatial direction are generated (the above first processing in steps S2247 and S2248), and further, the divided two pixels are divided in the direction orthogonal to the initial dividing direction (in this case, in the frame direction) (the above second processing in steps S2247 and S2248).

Note that with the above example, description has been made regarding derivative values at the time of calculating quadruple-density pixels as an example, but in the event of calculating pixels having a density more than a quadruple density, many more derivative values necessary for calculating pixel values may be obtained by repeatedly performing the processing in steps S2247 through S2249. Also, with the above example, description has been made regarding an example for obtaining double-density pixel values, but the approximation function f(t) is a continuous function, so derivative values may be obtained even regarding pixel values having a density other than a pluralized density.

According to the above arrangement, an approximation function for approximately expressing the pixel value of each pixel near a pixel of interest can be obtained, and derivative values in the positions necessary for generating pixels can be output as actual world estimating information.

With the actual world estimating unit 102 described in FIG. 210, derivative values necessary for generating an image have been output as actual world estimating information, but a derivative value is the same value as a gradient of the approximation function f(t) in a necessary position.

Now, description will be made next regarding the actual world estimating unit 102 wherein gradients alone in the frame direction on the approximation function necessary for generating pixels are directly obtained without obtaining the approximation function, and output as actual world estimating information, with reference to FIG. 215.

A reference-pixel extracting unit 2251 determines regarding whether or not each pixel of an input image is a processing region based on the data continuity information (movement as continuity, or region information) input from the data continuity detecting unit 101, and in the event of a processing region, extracts information of reference pixels necessary for obtaining gradients from the input image (perimeter multiple pixels arrayed in the spatial direction including a pixel of interest, which are necessary for calculation, or the positions of perimeter multiple pixels arrayed in the frame direction including a pixel of interest, and information of each pixel value), and outputs this to a gradient estimating unit 2252.

The gradient estimating unit 2252 generates gradient information of a pixel position necessary for generating a pixel based on the reference pixel information input from the reference-pixel extracting unit 2251, and outputs this to the image generating unit 103 as actual world estimating information. In further detail the gradient estimating unit 2252 obtains a gradient in the frame direction in the position of a pixel of interest on the approximation function approximately expressing the pixel value of each reference pixel using the difference information of the pixel values between pixels, outputs this along with the position information and pixel value of the pixel of interest, and the movement information in the direction of continuity, as actual world estimating information.

Next, description will be made regarding the actual world estimating processing by the actual world estimating unit 102 in FIG. 215 with reference to the flowchart in FIG. 216.

In step S2261, the reference-pixel extracting unit 2251 acquires movement and region information as the data continuity information from the data continuity detecting unit 101 along with an input image.

In step S2262, the reference-pixel extracting unit 2251 sets a pixel of interest from unprocessed pixels in the input image.

In step S2263, the reference-pixel extracting unit 2251 determines regarding whether or not the pixel of interest is in a processing region based on the region information of the data continuity information, and in the event that determination is made that the pixel of interest is not a pixel in a processing region, the processing proceeds to step S2268, wherein the gradient estimating unit 2252 is informed that the pixel of interest is in a non-processing region, in response to this, the gradient estimating unit 2252 sets the gradient for the corresponding pixel of interest to zero, and further adds the pixel value of the pixel of interest to this, and outputs this as actual world estimating information to the image generating unit 103, and also the processing proceeds to step S2269. Also, in the event that determination is made that the pixel of interest is in a processing region, the processing proceeds to step S2264.

In step S2264, the reference-pixel extracting unit 2211 determines regarding whether movement as data continuity is movement close to the frame direction or movement close to the spatial direction based on the movement information included in the data continuity information. That is to say, if we say that an angle indicating the spatial and temporal directions within a surface made up of the frame direction T, which is taken as a reference axis, and the spatial direction Y, is taken as θv, in the event that an angle θv of movement as data continuity is 45°>θv≧0°, or 180°>θv≧135°, the reference-pixel extracting unit 2251 determines that the movement as continuity of the pixel of interest is close to the frame direction, and in the event that the angle θv having data continuity is 135°>θv≧45°, determines that the movement as continuity of the pixel of interest is close to the spatial direction.

In step S2265, the reference-pixel extracting unit 2251 extracts the positional information and pixel values of reference pixels corresponding to the determined direction from the input image respectively, and outputs these to the gradient estimating unit 2252. That is to say, reference pixels become data to be used for calculating a later-described gradient, so are preferably extracted according to movement as continuity. Accordingly, corresponding to any determined direction of the frame direction and the spatial direction, reference pixels in a long range in the direction thereof are extracted. More specifically, for example, in the event that determination is made that movement is close to the spatial direction, as shown in FIG. 217, when a pixel (t, y)=(0, 0) in the center of FIG. 217 is taken as a pixel of interest, the reference-pixel extracting unit 2251 extracts each pixel value of pixels (t, y)=(0, 2), (0, 1), (0, 0), (0, −1), and (0, −2). Note that in FIG. 217, let us say that both sizes in the frame direction and in the spatial direction of each pixel is 1.

In other words, the reference-pixel extracting unit 2251 extracts pixels in a long range in the spatial direction as reference pixels such that the reference pixels are 5 pixels in total of 2 pixels respectively in the spatial direction (upper/lower direction in the drawing) centered on the pixel of interest.

Conversely, in the event that determination is made that the direction is the frame direction, the reference-pixel extracting unit 2251 extracts pixels in a long range in the horizontal direction as reference pixels such that the reference pixels are 5 pixels in total of 2 pixels respectively in the frame direction (left/right direction in the drawing) centered on the pixel of interest, and outputs these to the approximation-function estimating unit 2252. Needless to say, the number of reference pixels is not restricted to 5 pixels as described above, so any number of pixels may be employed.

In step S2266, the gradient estimating unit 2252 calculates a shift amount of each pixel value based on the reference pixel information input from the reference-pixel extracting unit 2251, and the movement $V_f$ in the direction of continuity. That is to say, in the event that the approximation function f(t) corresponding to the spatial direction Y=0 is taken as a basis, the approximation functions corresponding to the spatial directions Y=−2, −1, 1, and 2 are continuous along the gradient $V_f$ as continuity as shown in FIG. 217, so the respective approximation functions are described as f (t−Ct(2)), f (t−Ct (1)), f (t−Ct(−1)), and f (t−Ct(−2)), and are represented as functions shifted by each shift amount in the frame direction T for each of the spatial directions Y=−2, −1, 1, and 2.

Accordingly, the gradient estimating unit 2252 obtains shift amounts Ct (−2) through Ct (2) of these. For example, in the event that reference pixels are extracted such as shown in FIG. 217, with regard to the shift amounts thereof, the reference pixel (0, 2) in the drawing becomes Ct (2)=2/$V_f$, the reference pixel (0, 1) becomes Ct (1)=1/$V_f$, the reference pixel (0, 0) becomes Ct (0)=0, the reference pixel (0, −1) becomes Ct (−1)=−1/$V_f$, and the reference pixel (0, −2) becomes Ct (−2)=−2/$V_f$. The gradient estimating unit 2252 obtains these shift amounts Ct(−2) through Ct (2).

In step S2267, the gradient estimating unit 2252 calculates (estimates) a gradient in the frame direction of the pixel of interest. For example, as shown in FIG. 217, in the event that the direction of continuity regarding the pixel of interest is an angle close to the spatial direction, the pixel values between the pixels adjacent in the frame direction exhibit great differences, but change between the pixels in the spatial direction is small and similar, and accordingly, the gradient estimating unit 2252 substitutes the difference between the pixels in the frame direction for the difference between the pixels in the spatial direction, and obtains a gradient at the pixel of interest, by seizing change between the pixels in the spatial direction as change in the frame direction T according to a shift amount.

That is to say, if we assume that the approximation function f(t) approximately describing the real world exists, the relations between the above shift amounts and the pixel values of the respective reference pixels is such as shown in FIG. 218. Here, the pixel values of the respective pixels in FIG. 218 are represented as P (0, 2), P (0, 1), P (0, 0), P (0, −1), and P (0, −2) from the top. As a result, with regard to the pixel value P and shift amount Ct near the pixel of interest (0, 0), 5 pairs of relations (P, Ct)=((P(0, 2), −Ct (2)), (P (0, 1), −Ct (1)), (P (0, −1)), −Ct(−1)), (P (0, −2), −Ct (−2)), and (P (0, 0), 0) are obtained.

Now, with the pixel value P, shift amount Ct, and gradient Kt (gradient on the approximation function f(t)), the relation such as the following Expression (102) holds.

$$P = Kt \times Ct \tag{102}$$

The above Expression (102) is a one-variable function regarding the variable Kt, so the gradient estimating unit 2212 obtains the variable Kt (gradient) using the least square method of one variable.

That is to say, the gradient estimating unit 2252 obtains the gradient of the pixel of interest by solving a normal equation such as shown in the following Expression (103), adds the pixel value of the pixel of interest, and the gradient information in the direction of continuity to this, and outputs this to the image generating unit 103 as actual world estimating information.

$$K_t = \frac{\sum_{i=1}^{m}(C_{ti} - P_i)}{\sum_{i=1}^{m}(C_{ti})^2} \tag{103}$$

Here, i denotes a number for identifying each pair of the pixel value P and shift amount Ct of the above reference pixel, 1 through m. Also, m denotes the number of the reference pixels including the pixel of interest.

In step S2269, the reference-pixel extracting unit 2251 determines regarding whether or not all of the pixels have been processed, and in the event that determination is made that all of the pixels have not been processed, the processing returns to step S2262. Also, in the event that determination is made that all of the pixels have been processed in step S2269, the processing ends.

Note that the gradient in the frame direction to be output as actual world estimating information by the above processing is employed at the time of calculating desired pixel values to be obtained finally through extrapolation/interpolation. Also, with the above example, description has been made regarding the gradient at the time of calculating double-density pixels as an example, but in the event of calculating pixels having a density more than a double density, gradients in many more positions necessary for calculating the pixel values may be obtained.

For example, as shown in FIG. 204, in the event that pixels having a quadruple density in the temporal and spatial directions in total of a double density in the horizontal direction and also a double density in the frame direction are generated, the gradient Kt of the approximation function f(t) corresponding to the respective positions Pin, Pat, and Pbt in FIG. 204 should be obtained, as described above.

Also, with the above example, an example for obtaining double-density pixel values has been described, but the approximation function f(t) is a continuous function, so it is possible to obtain a necessary gradient even regarding the pixel value of a pixel in a position other than a pluralized density.

Needless to say, there is no restriction regarding the sequence of processing for obtaining gradients on the approximation function as to the frame direction or the spatial direction or derivative values. Further, with the above example in the spatial direction, description has been made using the relation between the spatial direction Y and frame direction T, but the relation between the spatial direction X and frame direction T may be employed instead of this. Further, a gradient (in any one-dimensional direction) or a derivative value may be selectively obtained from any two-dimensional relation of the temporal and spatial directions.

According to the above arrangements, it is possible to generate and output gradients on the approximation function in the frame direction (temporal direction) of positions necessary for generating pixels as actual world estimating information by using the pixel values of pixels near a pixel of interest without obtaining the approximation function in the frame direction approximately representing the actual world.

Next, description will be made regarding another embodiment example of the actual world estimating unit 102 (FIG. 3) with reference to FIG. 219 through FIG. 249.

FIG. 219 is a diagram for describing the principle of this embodiment example.

As shown in FIG. 219, a signal (light intensity allocation) in the actual world 1, which is an image cast on the sensor 2, is represented with a predetermined function F. Note that hereafter, with the description of this embodiment example, the signal serving as an image in the actual world 1 is particularly referred to as a light signal, and the function F is particularly referred to as a light signal function F.

With this embodiment example, in the event that the light signal in the actual world 1 represented with the light signal function F has predetermined continuity, the actual world estimating unit 102 estimates the light signal function F by approximating the light signal function F with a predetermined function f using an input image (image data including continuity of data corresponding to continuity) from the sensor 2, and data continuity information (data continuity information corresponding to continuity of the input image data) from the data continuity detecting unit 101. Note that with the description of this embodiment example, the function f is particularly referred to as an approximation function f, hereafter.

In other words, with this embodiment example, the actual world estimating unit 102 approximates (describes) the image (light signal in the actual world 1) represented with the light signal function F using a model 161 (FIG. 7) represented with the approximation function f. Accordingly, hereafter, this embodiment example is referred to as a function approximating method.

Now, description will be made regarding the background wherein the present applicant has invented the function approximating method, prior to entering the specific description of the function approximating method.

FIG. 220 is a diagram for describing integration effects in the case in which the sensor 2 is treated as a CCD.

As shown in FIG. 220, multiple detecting elements 2-1 are disposed on the plane of the sensor 2.

With the example in FIG. 220, a direction in parallel with a predetermined side of the detecting elements 2-1 is taken as the X direction, which is one direction in the spatial direction, and the a direction orthogonal to the X direction is taken as the Y direction, which is another direction in the spatial direction. Also, the direction perpendicular to the X-Y plane is taken as the direction t serving as the temporal direction.

Also, with the example in FIG. 220, the spatial shape of each detecting element 2-1 of the sensor 2 is represented with a square of which one side is 1 in length. The shutter time (exposure time) of the sensor 2 is represented with 1.

Further, with the example in FIG. 220, the center of one detecting element 2-1 of the sensor 2 is taken as the origin (position x=0 in the X direction, and position y=0 in the Y direction) in the spatial direction (X direction and Y direction), and the intermediate point-in-time of the exposure time is taken as the origin (position t=0 in the t direction) in the temporal direction (t direction).

In this case, the detecting element 2-1 of which the center is in the origin (x=0, y=0) in the spatial direction subjects the light signal function F(x, y, t) to integration with a range between −0.5 and 0.5 in the X direction, range between −0.5 and 0.5 in the Y direction, and range between −0.5 and 0.5 in the t direction, and outputs the integral value thereof as a pixel value P.

That is to say, the pixel value P output from the detecting element 2-1 of which the center is in the origin in the spatial direction is represented with the following Expression (104).

$$P = \int_{-0.5}^{+0.5}\int_{-0.5}^{+0.5}\int_{-0.5}^{+0.5} F(x, y, t)\,dx\,dy\,dt \tag{104}$$

The other detecting elements 2-1 also output the pixel value P shown in Expression (104) by taking the center thereof as the origin in the spatial direction in the same way.

FIG. 221 is a diagram for describing a specific example of the integration effects of the sensor 2.

In FIG. 221, the X direction and Y direction represent the X direction and Y direction of the sensor 2 (FIG. 220).

A portion 2301 of the light signal in the actual world 1 (hereafter, such a portion is referred to as a region) represents an example of a region having predetermined continuity.

Note that the region 2301 is a portion of the continuous light signal (continuous region). On the other hand, in FIG. 221, the region 2301 is shown as divided into 20 small regions (square regions) in reality. This is because of representing that the size of the region 2301 is equivalent to the size wherein the four detecting elements (pixels) of the sensor 2 in the X direction, and also the five detecting elements (pixels) of the sensor 2 in the Y direction are arrayed. That is to say, each of the 20 small regions (virtual regions) within the region 2301 is equivalent to one pixel.

Also, a white portion within the region 2301 represents a light signal corresponding to a fine line. Accordingly, the region 2301 has continuity in the direction wherein a fine line continues. Hereafter, the region 2301 is referred to as the fine-line-including actual world region 2301.

In this case, when the fine-line-including actual world region 2301 (a portion of a light signal in the actual world 1) is detected by the sensor 2, region 2302 (hereafter, this is referred to as a fine-line-including data region 2302) of the input image (pixel values) is output from the sensor 2 by integration effects.

Note that each pixel of the fine-line-including data region 2302 is represented as an image in the drawing, but is data representing a predetermined value in reality. That is to say, the fine-line-including actual world region 2301 is changed (distorted) to the fine-line-including data region 2302, which is divided into 20 pixels (20 pixels in total of 4 pixels in the X direction and also 5 pixels in the Y direction) each having a predetermined pixel value by the integration effects of the sensor 2.

FIG. 222 is a diagram for describing another specific example (example different from FIG. 221) of the integration effects of the sensor 2.

In FIG. 222, the X direction and Y direction represent the X direction and Y direction of the sensor 2 (FIG. 220).

A portion (region) 2303 of the light signal in the actual world 1 represents another example (example different from the fine-line-including actual region 2301 in FIG. 221) of a region having predetermined continuity.

Note that the region 2303 is a region having the same size as the fine-line-including actual world region 2301. That is to say, the region 2303 is also a portion of the continuous light signal in the actual world 1 (continuous region) as with the fine-line-including actual world region 2301 in reality, but is shown as divided into 20 small regions (square regions) equivalent to one pixel of the sensor 2 in FIG. 222.

Also, the region 2303 includes a first portion edge having predetermined first light intensity (value), and a second portion edge having predetermined second light intensity (value). Accordingly, the region 2303 has continuity in the direction wherein the edges continue. Hereafter, the region 2303 is referred to as the two-valued-edge-including actual world region 2303.

In this case, when the two-valued-edge-including actual world region 2303 (a portion of the light signal in the actual world 1) is detected by the sensor 2, a region 2304 (hereafter, referred to as two-valued-edge-including data region 2304) of the input image (pixel value) is output from the sensor 2 by integration effects.

Note that each pixel value of the two-valued-edge-including data region 2304 is represented as an image in the drawing as with the fine-line-including data region 2302, but is data representing a predetermined value in reality. That is to say, the two-valued-edge-including actual world region 2303 is changed (distorted) to the two-valued-edge-including data region 2304, which is divided into 20 pixels (20 pixels in total of 4 pixels in the X direction and also 5 pixels in the Y direction) each having a predetermined pixel value by the integration effects of the sensor 2.

Conventional image processing devices have regarded image data output from the sensor 2 such as the fine-line-including data region 2302, two-valued-edge-including data region 2304, and the like as the origin (basis), and also have subjected the image data to the subsequent image processing. That is to say, regardless of that the image data output from the sensor 2 had been changed (distorted) to data different from the light signal in the actual world 1 by integration effects, the conventional image processing devices have performed image processing on assumption that the data different from the light signal in the actual world 1 is correct.

As a result, the conventional image processing devices have provided a problem wherein based on the waveform (image data) of which the details in the actual world is distorted at the stage wherein the image data is output from the sensor 2, it is very difficult to restore the original details from the waveform.

Accordingly, with the function approximating method, in order to solve this problem, as described above (as shown in FIG. 219), the actual world estimating unit 102 estimates the light signal function F by approximating the light signal function F(light signal in the actual world 1) with the approximation function f based on the image data (input image) such as the fine-line-including data region 2302, and two-valued-edge-including data region 2304 output from the sensor 2.

Thus, at a later stage than the actual world estimating unit 102 (in this case, the image generating unit 103 in FIG. 3), the processing can be performed by taking the image data wherein integration effects are taken into consideration, i.e., image data that can be represented with the approximation function f as the origin.

Hereafter, description will be made independently regarding three specific methods (first through third function approximating methods), of such a function approximating method with reference to the drawings.

First, description will be made regarding the first function approximating method with reference to FIG. 223 through FIG. 237.

FIG. 223 is a diagram representing the fine-line-including actual world region 2301 shown in FIG. 221 described above again.

In FIG. 223, the X direction and Y direction represent the X direction and Y direction of the sensor 2 (FIG. 220).

The first function approximating method is a method for approximating a one-dimensional waveform (hereafter, such a waveform is referred to as an X cross-sectional waveform F(x)) wherein the light signal function F(x, y, t) corresponding to the fine-line-including actual world region 2301 such as shown in FIG. 223 is projected in the X direction (direction of an arrow 2311 in the drawing), with the approximation function f(x) serving as an n-dimensional (n is an arbitrary integer) polynomial. Accordingly, hereafter, the first function approximating method is particularly referred to as a one-dimensional polynomial approximating method.

Note that with the one-dimensional polynomial approximating method, the X cross-sectional waveform F(x), which is to be approximated, is not restricted to a waveform corresponding to the fine-line-including actual world region 2301 in FIG. 223, of course. That is to say, as described later, with the one-dimensional polynomial approximating method, any waveform can be approximated as long as the X cross-sectional waveform F(x) corresponds to the light signals in the actual world 1 having continuity.

Also, the direction of the projection of the light signal function F(x, y, t) is not restricted to the X direction, or rather the Y direction or t direction may be employed. That is to say, with the one-dimensional polynomial approximating method, a function F(y) wherein the light signal function F(x, y, t) is projected in the Y direction may be approximated with a predetermined approximation function f(y), or a function F(t) wherein the light signal function F(x, y, t) is projected in the t direction may be approximated with a predetermined approximation f (t).

More specifically, the one-dimensional polynomial approximating method is a method for approximating, for example, the X cross-sectional waveform F(x) with the approximation function f(x) serving as an n-dimensional polynomial such as shown in the following Expression (105).

$$f(x) = w_0 + w_1 x + w_2 x + \cdots + w_n x^n = \sum_{i=0}^{n} w_i x^i \quad (105)$$

That is to say, with the one-dimensional polynomial approximating method, the actual world estimating unit 102 estimates the X cross-sectional waveform F(x) by calculating the coefficient (features) $w_i$ of x^i in Expression (105).

This calculation method of the features $w_i$ is not restricted to a particular method, for example, the following first through third methods may be employed.

That is to say, the first method is a method that has been employed so far.

On the other hand, the second method is a method that has been newly invented by the present applicant, which is a method that considers continuity in the spatial direction as to the first method.

However, as described later, with the first and second methods, the integration effects of the sensor 2 are not taken into consideration. Accordingly, an approximation function f(x) obtained by substituting the features wi calculated by the first method or the second method for the above Expression (105) is an approximation function regarding an input image, but strictly speaking, cannot be referred to as the approximation function of the X cross-sectional waveform F(x).

Consequently, the present applicant has invented the third method that calculates the features $w_i$ further in light of the integration effects of the sensor 2 as to the second method. An approximation function f(x) obtained by substituting the features $w_i$ calculated with this third method for the above Expression (105) can be referred to as the approximation function of the X cross-sectional waveform F(x) in that the integration effects of the sensor 2 are taken into consideration.

Thus, strictly speaking, the first method and the second method cannot be referred to as the one-dimensional polynomial approximating method, and the third method alone can be referred to as the one-dimensional polynomial approximating method.

In other words, as shown in FIG. 224, the second method is an embodiment of the actual world estimating unit 102 according to the present invention, which is different from the one-dimensional polynomial approximating method. That is to say, FIG. 224 is a diagram for describing the principle of the embodiment corresponding to the second method.

As shown in FIG. 224, with the embodiment corresponding to the second method, in the event that the light signal in the actual world 1 represented with the light signal function F has predetermined continuity, the actual world estimating unit 102 does not approximate the X cross-sectional waveform F(x) with an input image (image data including continuity of data corresponding to continuity) from the sensor 2, and data continuity information (data continuity information corresponding to continuity of input image data) from the data continuity detecting unit 101, but approximates the input image from the sensor 2 with a predetermined approximation function $f_2$ (x).

Thus, it is hard to say that the second method is a method having the same level as the third method in that approximation of the input image alone is performed without considering the integral effects of the sensor 2. However, the second method is a method superior to the conventional first method in that the second method takes continuity in the spatial direction into consideration.

Hereafter, description will be made independently regarding the details of the first method, second method, and third method in this order.

Note that hereafter, in the event that the respective approximation functions f (x) generated by the first method, second method, and third method are distinguished from that of the other method, they are particularly referred to as approximation function $f_1$ (x), approximation function $f_2$ (x), and approximation function $f_3$ (x) respectively.

First, description will be made regarding the details of the first method.

With the first method, on condition that the approximation function $f_1$ (x) shown in the above Expression (105) holds within the fine-line-including actual world region 2301 in FIG. 225, the following prediction equation (106) is defined.

$$P(x, y) = f_1(x) + e \quad (106)$$

In Expression (106), x represents a pixel position relative as to the X direction from a pixel of interest. y represents a pixel position relative as to the Y direction from the pixel of interest. e represents a margin of error. Specifically, for example, as shown in FIG. 225, let us say that the pixel of interest is the second pixel in the X direction from the left, and also the third pixel in the Y direction from the bottom in the drawing, of the fine-line-including data region 2302 (data of which the fine-line-including actual world region 2301 (FIG. 223) is detected by the sensor 2, and output). Also, let us say that the center of the pixel of interest is the origin (0, 0), and a coordinates system (hereafter, referred to as a pixel-of-interest coordinates system) of which axes are an x axis and y axis respectively in parallel with the X direction and Y direction of the sensor 2 (FIG. 220) is set. In this case, the coordinates value (x, y) of the pixel-of-interest coordinates system represents a relative pixel position.

Also, in Expression (106), P (x, y) represents a pixel value in the relative pixel positions (x, y). Specifically, in this case, the P (x, y) within the fine-line-including data region 2302 is such as shown in FIG. 226.

FIG. 226 represents this pixel value P (x, y) in a graphic manner.

In FIG. 226, the respective vertical axes of the graphs represent pixel values, and the horizontal axes represent a relative position x in the X direction from the pixel of interest. Also, in the drawing, the dashed line in the first graph from the top represents an input pixel value P(x, −2), the broken triple-dashed line in the second graph from the top represents an input pixel value P(x, −1), the solid line in the third graph from the top represents an input pixel value P (x, 0), the broken line in the fourth graph from the top represents an input pixel value P (x, 1), and the broken double-dashed line in the fifth graph from the top (the first from the bottom) represents an input pixel value P (x, 2) respectively.

Upon the 20 input pixel values P (x, −2), P (x, −1), P (x, 0), P (x, 1), and P (x, 2) (however, x is any one integer value of −1 through 2) shown in FIG. 226 being substituted for the above Expression (106) respectively, 20 equations as shown in the following Expression (107) are generated. Note that each $e_k$ (k is any one of integer values 1 through 20) represents a margin of error.

$$
\begin{aligned}
P(-1,-2) &= f_1(-1)+e_1 \qquad (107)\\
P(0,-2) &= f_1(0)+e_2\\
P(1,-2) &= f_1(1)+e_3\\
P(2,-2) &= f_1(2)+e_4\\
P(-1,-1) &= f_1(-1)+e_5\\
P(0,-1) &= f_1(0)+e_6\\
P(1,-1) &= f_1(1)+e_7\\
P(2,-1) &= f_1(2)+e_8\\
P(-1,0) &= f_1(-1)+e_9\\
P(0,0) &= f_1(0)+e_{10}\\
P(1,0) &= f_1(1)+e_{11}\\
P(2,0) &= f_1(2)+e_{12}\\
P(-1,1) &= f_1(-1)+e_{13}\\
P(0,1) &= f_1(0)+e_{14}\\
P(1,1) &= f_1(1)+e_{15}\\
P(2,1) &= f_1(2)+e_{16}\\
P(-1,2) &= f_1(-1)+e_{17}\\
P(0,2) &= f_1(0)+e_{18}\\
P(1,2) &= f_1(1)+e_{19}\\
P(2,2) &= f_1(2)+e_{20}
\end{aligned}
$$

Expression (107) is made up of 20 equations, so in the event that the number of the features $w_i$ of the approximation function $f_1$ (x) is less than 20, i.e., in the event that the approximation function $f_1$ (x) is a polynomial having the number of dimensions less than 19, the features $w_i$ can be calculated using the least square method, for example. Note that the specific solution of the least square method will be described later.

For example, if we say that the number of dimensions of the approximation function $f_1$ (x) is five, the approximation function $f_1$(x) calculated with the least square method using Expression (107) (the approximation function $f_1$(x) generated by the calculated features $w_i$) becomes a curve shown in FIG. 227.

Note that in FIG. 227, the vertical axis represents pixel values, and the horizontal axis represents a relative position x from the pixel of interest.

That is to say, for example, if we supplement the respective 20 pixel values P (x, y) (the respective input pixel values P (x, −2), P (x, −1), P (x, 0), P (x, 1), and P (x, 2) shown in FIG. 226) making up the fine-line-including data region 2302 in FIG. 225 along the x axis without any modification (if we regard a relative position y in the Y direction as constant, and overlay the five graphs shown in FIG. 226), multiple lines (dashed line, broken triple-dashed line, solid line, broken line, and broken double-dashed line) in parallel with the x axis, such as shown in FIG. 227, are distributed.

However, in FIG. 227, the dashed line represents the input pixel value P(x, −2), the broken triple-dashed line represents the input pixel value P (x, −1), the solid line represents the input pixel value P (x, 0), the broken line represents the input pixel value P (x, 1), and the broken double-dashed line represents the input pixel value P (x, 2) respectively. Also, in the event of the same pixel value, lines more than 2 lines are overlaid in reality, but in FIG. 227, the lines are drawn so as to distinguish each line, and so as not to overlay each line.

The respective 20 input pixel values (P (x, −2), P (x, −1), P (x, 0), P (x, 1), and P (x, 2)) thus distributed, and a regression curve (the approximation function $f_1$ (x) obtained by substituting the features $w_i$ calculated with the least square method for the above Expression (104)) so as to minimize the error of the value $f_1$ (x) become a curve (approximation function $f_1$ (x)) shown in FIG. 227.

Thus, the approximation function $f_1$ (x) represents nothing but a curve connecting in the X direction the means of the pixel values (pixel values having the same relative position x in the X direction from the pixel of interest) P (x, −2), P (x, −1), P (x, 0), P (x, 1), and P (x, 2) in the Y direction. That is to say, the approximation function $f_1$ (x) is generated without considering continuity in the spatial direction included in the light signal.

For example, in this case, the fine-line-including actual world region 2301 (FIG. 223) is regarded as a subject to be approximated. This fine-line-including actual world region 2301 has continuity in the spatial direction, which is represented with a gradient $G_F$, such as shown in FIG. 228. Note that in FIG. 228, the X direction and Y direction represent the X direction and Y direction of the sensor 2 (FIG. 220).

Accordingly, the data continuity detecting unit 101 (FIG. 219) can output an angle θ (angle θ generated between the direction of data continuity represented with a gradient $G_f$ corresponding to the gradient $G_F$, and the X direction) such as shown in FIG. 228 as data continuity information corresponding to the gradient $G_F$ as continuity in the spatial direction.

However, with the first method, the data continuity information output from the data continuity detecting unit 101 is not employed at all.

In other words, such as shown in FIG. 228, the direction of continuity in the spatial direction of the fine-line-including actual world region 2301 is a general angle θ direction. However, the first method is a method for calculating the features $w_i$ of the approximation function $f_1$(x) on assumption that the direction of continuity in the spatial direction of the fine-line-including actual world region 2301 is the Y direction (i.e., on assumption that the angle θ is 90°).

Consequently, the approximation function $f_1$ (x) becomes a function of which the waveform gets dull, and the detail decreases than the original pixel value. In other words, though not shown in the drawing, with the approximation function $f_1$ (x) generated with the first method, the waveform thereof becomes a waveform different from the actual X cross-sectional waveform F(x).

To this end, the present applicant has invented the second method for calculating the features $w_i$ by further taking continuity in the spatial direction into consideration (utilizing the angle θ) as to the first method.

That is to say, the second method is a method for calculating the features $w_i$ of the approximation function $f_2$ (x) on assumption that the direction of continuity of the fine-line-including actual world region 2301 is a general angle θ direction.

Specifically, for example, the gradient $G_f$ representing continuity of data corresponding to continuity in the spatial direction is represented with the following Expression (108).

$$G_f = \tan\theta = \frac{dy}{dx} \tag{108}$$

Note that in Expression (108), dx represents the amount of fine movement in the X direction such as shown in FIG. 228, dy represents the amount of fine movement in the Y direction as to the dx such as shown in FIG. 228.

In this case, if we define the shift amount $C_x$ (y) as shown in the following Expression (109), with the second method, an equation corresponding to Expression (106) employed in the first method becomes such as the following Expression (110).

$$C_x(y) = \frac{y}{G_f} \tag{109}$$

$$P(x, y) = f_2(x - C_x(y)) + e \tag{110}$$

That is to say, Expression (106) employed in the first method represents that the position x in the X direction of the pixel center position (x, y) is the same value regarding the pixel value P (x, y) of any pixel positioned in the same position. In other words, Expression (106) represents that pixels having the same pixel value continue in the Y direction (exhibits continuity in the Y direction).

On the other hand, Expression (110) employed in the second method represents that the pixel value P (x, y) of a pixel of which the center position is (x, y) is not identical to the pixel value (approximate equivalent to $f_2(x)$) of a pixel positioned in a place distant from the pixel of interest (a pixel of which the center position is the origin (0, 0)) in the X direction by x, and is the same value as the pixel value (approximate equivalent to $f_2(x+C_x(y))$) of a pixel positioned in a place further distant from the pixel thereof in the X direction by the shift amount $C_x$ (y) (pixel positioned in a place distant from the pixel of interest in the X direction by x+$C_x$ (y)). In other words, Expression (110) represents that pixels having the same pixel value continue in the angle θ direction corresponding to the shift amount $C_x$ (y) (exhibits continuity in the general angle θ direction).

Thus, the shift amount $C_x$ (y) is the amount of correction considering continuity (in this case, continuity represented with the gradient $G_F$ in FIG. 228 (strictly speaking, continuity of data represented with the gradient $G_f$)) in the spatial direction, and Expression (110) is obtained by correcting Expression (106) with the shift amount $C_x$ (y).

In this case, upon the 20 pixel values P(x, y) (however, x is any one integer value of −1 through 2, and y is any one integer value of −2 through 2) of the fine-line-including data region shown in FIG. 225 being substituted for the above Expression (110) respectively, 20 equations as shown in the following Expression (111) are generated.

$$\begin{aligned}
P(-1, -2) &= f_2(-1 - C_x(-2)) + e_1 \\
P(0, -2) &= f_2(0 - C_x(-2)) + e_2 \\
P(1, -2) &= f_2(1 - C_x(-2)) + e_3 \\
P(2, -2) &= f_2(2 - C_x(-2)) + e_4 \\
P(-1, -1) &= f_2(-1 - C_x(-1)) + e_5 \\
P(0, -1) &= f_2(0 - C_x(-1)) + e_6 \\
P(1, -1) &= f_2(1 - C_x(-1)) + e_7 \\
P(2, -1) &= f_2(2 - C_x(-1)) + e_8 \\
P(-1, 0) &= f_2(-1) + e_9 \\
P(0, 0) &= f_2(0) + e_{10} \\
P(1, 0) &= f_2(1) + e_{11} \\
P(2, 0) &= f_2(2) + e_{12} \\
P(-1, 1) &= f_2(-1 - C_x(1)) + e_{13} \\
P(0, 1) &= f_2(0 - C_x(1)) + e_{14} \\
P(1, 1) &= f_2(1 - C_x(1)) + e_{15} \\
P(2, 1) &= f_2(2 - C_x(1)) + e_{16} \\
P(-1, 2) &= f_2(-1 - C_x(2)) + e_{17} \\
P(0, 2) &= f_2(0 - C_x(2)) + e_{18} \\
P(1, 2) &= f_2(1 - C_x(2)) + e_{19} \\
P(2, 2) &= f_2(2 - C_x(2)) + e_{20}
\end{aligned} \tag{111}$$

Expression (111) is made up of 20 equations, as with the above Expression (107). Accordingly, with the second method, as with the first method, in the event that the number of the features $w_i$ of the approximation function $f_2(x)$ is less than 20, i.e., the approximation function $f_2(x)$ is a polynomial having the number of dimensions less than 19, the features $w_i$ can be calculated with the least square method, for example. Note that the specific solution regarding the least square method will be described later.

For example, if we say that the number of dimensions of the approximation function $f_2(x)$ is five as with the first method, with the second method, the features $w_i$ are calculated as follows.

That is to say, FIG. 229 represents the pixel value P(x, y) shown in the left side of Expression (111) in a graphic manner. The respective five graphs shown in FIG. 229 are basically the same as shown in FIG. 226.

As shown in FIG. 229, the maximal pixel values (pixel values corresponding to fine lines) are continuous in the direction of continuity of data represented with the gradient $G_f$.

Consequently, with the second method, if we supplement the respective input pixel values P (x, −2), P (x, −1), P (x, 0), P (x, 1), and P (x, 2) shown in FIG. 229, for example, along the x axis, we supplement the pixel values after the pixel values are changed in the states shown in FIG. 230 instead of supplementing the pixel values without any modification as with the first method (let us assume that y is constant, and the five graphs are overlaid in the states shown in FIG. 229).

That is to say, FIG. 230 represents a state wherein the respective input pixel values P (x, −2), P (x, −1), P (x, 0), P (x, 1), and P (x, 2) shown in FIG. 229 are shifted by the shift amount $C_x$ (y) shown in the above Expression (109). In other words, FIG. 230 represents a state wherein the five graphs shown in FIG. 229 are moved as if the gradient $G_F$ representing the actual direction of continuity of data were regarded as a gradient $G_F'$ (in the drawing, a straight line made up of a dashed line were regarded as a straight line made up of a solid line).

In the states in FIG. 230, if we supplement the respective input pixel values P (x, −2), P (x, −1), P (x, 0), P (x, 1), and P (x, 2), for example, along the x axis (in the states shown in FIG. 230, if we overlay the five graphs), multiple lines (dashed line, broken triple-dashed line, solid line, broken line, and broken double-dashed line) in parallel with the x axis, such as shown in FIG. 231, are distributed.

Note that in FIG. 231, the vertical axis represents pixel values, and the horizontal axis represents a relative position x from the pixel of interest. Also, the dashed line represents the input pixel value P (x, −2), the broken triple-dashed line represents the input pixel value P (x, −1), the solid line represents the input pixel value P (x, 0), the broken line represents the input pixel value P (x, 1), and the broken double-dashed line represents the input pixel value P(x, 2) respectively. Further, in the event of the same pixel value, lines more than 2 lines are overlaid in reality, but in FIG. 231, the lines are drawn so as to distinguish each line, and so as not to overlay each line.

The respective 20 input pixel values P(x, y) (however, x is any one integer value of −1 through 2, and y is any one integer value of −2 through 2) thus distributed, and a regression curve (the approximation function $f_2$ (x) obtained by substituting the features $w_i$ calculated with the least square method for the above Expression (104)) to minimize the error of the value $f_2(x+Cx(y))$ become a curve $f_2$ (x) shown in the solid line in FIG. 231.

Thus, the approximation function $f_2$ (x) generated with the second method represents a curve connecting in the X direction the means of the input pixel values P (x, y) in the angle θ direction (i.e., direction of continuity in the general spatial direction) output from the data continuity detecting unit 101 (FIG. 219).

On the other hand, as described above, the approximation function $f_1$ (x) generated with the first method represents nothing but a curve connecting in the X direction the means of the input pixel values P (x, y) in the Y direction (i.e., the direction different from the continuity in the spatial direction).

Accordingly, as shown in FIG. 231, the approximation function $f_2$ (x) generated with the second method becomes a function wherein the degree of dullness of the waveform thereof decreases, and also the degree of decrease of the detail as to the original pixel value decreases less than the approximation function $f_1$ (x) generated with the first method. In other words, though not shown in the drawing, with the approximation function $f_2$ (x) generated with the second method, the waveform thereof becomes a waveform closer to the actual X cross-sectional waveform F(x) than the approximation function $f_1$ (x) generated with the first method.

However, as described above, the approximation function $f_2$ (x) is a function considering continuity in the spatial direction, but is nothing but a function generated wherein the input image (input pixel value) is regarded as the origin (basis). That is to say, as shown in FIG. 224 described above, the approximation function $f_2$ (x) is nothing but a function that approximated the input image different from the X cross-sectional waveform F(x), and it is hard to say that the approximation function $f_2$ (x) is a function that approximated the X cross-sectional waveform F(x). In other words, the second method is a method for calculating the features $w_i$ on assumption that the above Expression (110) holds, but does not take the relation in Expression (104) described above into consideration (does not consider the integration effects of the sensor 2).

Consequently, the present applicant has invented the third method that calculates the features $w_i$ of the approximation function $f_3$ (x) by further taking the integration effects of the sensor 2 into consideration as to the second method.

That is to say the third method is a method that introduces the concept of a spatial mixed region.

Description will be made regarding a spatial mixed region with reference to FIG. 232 prior to description of the third method.

In FIG. 232, a portion 2321 (hereafter, referred to as a region 2321) of a light signal in the actual world 1 represents a region having the same area as one detecting element (pixel) of the sensor 2.

Upon the sensor 2 detecting the region 2321, the sensor 2 outputs a value (one pixel value) 2322 obtained by the region 2321 being subjected to integration in the temporal and spatial directions (X direction, Y direction, and t direction). Note that the pixel value 2322 is represented as an image in the drawing, but is actually data representing a predetermined value.

The region 2321 in the actual world 1 is clearly classified into a light signal (white region in the drawing) corresponding to the foreground (the above fine line, for example), and a light signal (black region in the drawing) corresponding to the background.

On the other hand, the pixel value 2322 is a value obtained by the light signal in the actual world 1 corresponding to the foreground and the light signal in the actual world 1 corresponding to the background being subjected to integration. In other words, the pixel value 2322 is a value corresponding to a level wherein the light corresponding to the foreground and the light corresponding to the background are spatially mixed.

Thus, in the event that a portion corresponding to one pixel (detecting element of the sensor 2) of the light signals in the actual world 1 is not a portion where the light signals having the same level are spatially uniformly distributed, but a portion where the light signals having a different level such as a foreground and background are distributed, upon the region thereof being detected by the sensor 2, the region becomes one pixel value as if the different light levels were spatially mixed by the integration effects of the sensor 2 (integrated in the spatial direction). Thus, a region made up of pixels in which an image (light signals in the actual world 1) corresponding to a foreground, and an image (light signals in the actual world 1) corresponding to a background are subjected to spatial integration is, here, referred to as a spatial mixed region.

Accordingly, with the third method, the actual world estimating unit 102 (FIG. 219) estimates the X cross-sectional waveform F(x) representing the original region 2321 in the actual world 1 (of the light signals in the actual world 1, the portion 2321 corresponding to one pixel of the sensor 2) by approximating the X cross-sectional waveform F(x) with the approximation function $f_3$ (x) serving as a one-dimensional polynomial such as shown in FIG. 233.

That is to say, FIG. 233 represents an example of the approximation function $f_3$ (x) corresponding to the pixel value 2322 serving as a spatial mixed region (FIG. 232), i.e., the approximation function $f_3(x)$ that approximates the X cross-sectional waveform F(x) corresponding to the solid line within the region 2331 in the actual world 1 (FIG. 232). In FIG. 233, the axis in the horizontal direction in the drawing represents an axis in parallel with the side from the upper left end $x_s$ to lower right end $x_e$ of the pixel corresponding to the pixel value 2322 (FIG. 232), which is taken as the x axis. The axis in the vertical direction in the drawing is taken as an axis representing pixel values.

In FIG. 233, the following Expression (112) is defined on condition that the result obtained by subjecting the approximation function $f_3$ (x) to integration in a range (pixel width) from the $x_s$ to the $x_e$ is generally identical with the pixel values P (x, y) output from the sensor 2 (dependent on a margin of error e alone).

$$\begin{aligned} P &= \int_{x_s}^{x_e} f_3(x)\,dx + e \\ &= \int_{x_s}^{x_e} (w_0 w_1 x + w_2 x^2 + \ldots + w_n x^n)\,dx + e \\ &= w_0(x_e - x_s) + \ldots + w_{n-1}\frac{x_e^n - x_s^n}{n} + w_n\frac{x_e^{n+1} - x_s^{n+1}}{n+1} + e \end{aligned} \quad (112)$$

In this case, the features $w_i$ of the approximation function $f_3$ (x) are calculated from the 20 pixel values P (x, y) (however, x is any one integer value of −1 through 2, and y is any one integer value of −2 through 2) of the fine-line-including data region 2302 shown in FIG. 228, so the pixel value P in Expression (112) becomes the pixel values P(x, y).

Also, as with the second method, it is necessary to take continuity in the spatial direction into consideration, and accordingly, each of the start position $x_s$ and end position $x_e$ in the integral range in Expression (112) is dependent upon the shift amount $C_x(y)$. That is to say, each of the start position $x_s$ and end position $x_e$ of the integral range in Expression (112) is represented such as the following Expression (113).

$$\begin{aligned} x_s &= x - C_x(y) - 0.5 \\ x_e &= x - C_x(y) + 0.5 \end{aligned} \quad (113)$$

In this case, upon each pixel value of the fine-line-including data region 2302 shown in FIG. 228, i.e., each of the input pixel values P (x, −2), P (x, −1), P (x, 0), P(x, 1), and P (x, 2) (however, x is any one integer value of −1 through 2) shown in FIG. 229 being substituted for the above Expression (112) (the integral range is the above Expression (113)), 20 equations shown in the following Expression (114) are generated.

$$\begin{aligned} P(-1,-2) &= \int_{-1-C_x(-2)-0.5}^{-1-C_x(-2)+0.5} f_3(x)\,dx + e_1, \\ P(0,-2) &= \int_{0-C_x(-2)-0.5}^{0-C_x(-2)+0.5} f_3(x)\,dx + e_2, \\ P(1,-2) &= \int_{1-C_x(-2)-0.5}^{1-C_x(-2)+0.5} f_3(x)\,dx + e_3, \\ P(2,-2) &= \int_{2-C_x(-2)-0.5}^{2-C_x(-2)+0.5} f_3(x)\,dx + e_4, \\ P(-1,-1) &= \int_{-1-C_x(-1)-0.5}^{-1-C_x(-1)+0.5} f_3(x)\,dx + e_5, \\ P(0,-1) &= \int_{0-C_x(-1)-0.5}^{0-C_x(-1)+0.5} f_3(x)\,dx + e_6, \\ P(1,-1) &= \int_{1-C_x(-1)-0.5}^{1-C_x(-1)+0.5} f_3(x)\,dx + e_7, \end{aligned} \quad (114)$$

-continued $$\begin{aligned} P(2,-1) &= \int_{2-C_x(-1)-0.5}^{2-C_x(-1)+0.5} f_3(x)\,dx + e_8, \\ P(-1,0) &= \int_{-1-0.5}^{-1+0.5} f_3(x)\,dx + e_9, \\ P(0,0) &= \int_{0-0.5}^{0+0.5} f_3(x)\,dx + e_{10}, \\ P(1,0) &= \int_{1-0.5}^{1+0.5} f_3(x)\,dx + e_{11}, \\ P(2,0) &= \int_{2-C_x-0.5}^{2+0.5} f_3(x)\,dx + e_{12}, \\ P(-1,1) &= \int_{-1-C_x(1)-0.5}^{-1-C_x(1)+0.5} f_3(x)\,dx + e_{13}, \\ P(0,1) &= \int_{0-C_x(1)-0.5}^{0-C_x(1)+0.5} f_3(x)\,dx + e_{14}, \\ P(1,1) &= \int_{1-C_x(1)-0.5}^{1-C_x(1)+0.5} f_3(x)\,dx + e_{15}, \\ P(2,1) &= \int_{2-C_x(1)-0.5}^{2-C_x(1)+0.5} f_3(x)\,dx + e_{16}, \\ P(-1,2) &= \int_{-1-C_x(2)-0.5}^{-1-C_x(2)+0.5} f_3(x)\,dx + e_{17}, \\ P(0,2) &= \int_{0-C_x(2)-0.5}^{0-C_x(2)+0.5} f_3(x)\,dx + e_{18}, \\ P(1,2) &= \int_{1-C_x(2)-0.5}^{1-C_x(2)+0.5} f_3(x)\,dx + e_{19}, \\ P(2,2) &= \int_{2-C_x(2)-0.5}^{2-C_x(2)+0.5} f_3(x)\,dx + e_{20} \end{aligned}$$

Expression (114) is made up of 20 equations as with the above Expression (111). Accordingly, with the third method as with the second method, in the event that the number of the features $w_i$ of the approximation function $f_3$ (x) is less than 20, i.e., in the event that the approximation function $f_3(x)$ is a polynomial having the number of dimensions less than 19, for example, the features $w_i$ may be calculated with the least square method. Note that the specific solution of the least square method will be described later.

For example, if we say that the number of dimensions of the approximation function $f_3$ (x) is five, the approximation function $f_3$ (x) calculated with the least square method using Expression (114) (the approximation function $f_3$ (x) generated with the calculated features $w_i$) becomes a curve shown with the solid line in FIG. 234.

Note that in FIG. 234, the vertical axis represents pixel values, and the horizontal axis represents a relative position x from the pixel of interest.

As shown in FIG. 234, in the event that the approximation function $f_3$ (x) (a curve shown with a solid line in the drawing) generated with the third method is compared with the approximation function $f_2$ (x) (a curve shown with a dashed line in the drawing) generated with the second method, a pixel value at x=0 becomes great, and also the gradient of the curve creates a steep waveform. This is because details increase more than the input pixels, resulting in being unrelated to the resolution of the input pixels. That is to say, we can say that the approximation function $f_3$ (x) approximates the X cross-sectional waveform F(x). Accordingly, though not shown in the drawing, the approximation function $f_3$ (x) becomes a waveform closer to the X cross-sectional waveform F(x) than the approximation function $f_2$ (x).

FIG. 235 represents an configuration example of the actual world estimating unit 102 employing such a one-dimensional polynomial approximating method.

In FIG. 235, the actual world estimating unit 102 estimates the X cross-sectional waveform F(x) by calculating the features $w_i$ using the above third method (least square method), and generating the approximation function f(x) of the above Expression (105) using the calculated features $w_i$.

As shown in FIG. 235, the actual world estimating unit 102 includes a conditions setting unit 2331, input image storage unit 2332, input pixel value acquiring unit 2333, integral component calculation unit 2334, normal equation generating unit 2335, and approximation function generating unit 2336.

The conditions setting unit 2331 sets a pixel range (hereafter, referred to as a tap range) used for estimating the X cross-sectional waveform F(x) corresponding to a pixel of interest, and the number of dimensions n of the approximation function f(x).

The input image storage unit 2332 temporarily stores an input image (pixel values) from the sensor 2.

The input pixel acquiring unit 2333 acquires, of the input images stored in the input image storage unit 2332, an input image region corresponding to the tap range set by the conditions setting unit 2231, and supplies this to the normal equation generating unit 2335 as an input pixel value table. That is to say, the input pixel value table is a table in which the respective pixel values of pixels included in the input image region are described. Note that a specific example of the input pixel value table will be described later.

Now, the actual world estimating unit 102 calculates the features $w_i$ of the approximation function f(x) with the least square method using the above Expression (112) and Expression (113) here, but the above Expression (112) can be represented such as the following Expression (115).

$$P(x, y) = \sum_{i=0}^{n} w_i \times \frac{(x - C_x(y) + 0.5)^{i+1} - (x - C_x(y) - 0.5)^{i+1}}{i+1} + e = \sum_{i=0}^{n} w_i \times S_i(x_s, x_e) + e \tag{115}$$

In Expression (115), $S_i(x_s, x_e)$ represents the integral components of the i-dimensional term. That is to say, the integral components $S_i(x_s, x_e)$ are shown in the following Expression (116).

$$S_i(x_s, x_e) = \frac{x_e^{i+1} - x_s^{i+1}}{i+1} \tag{116}$$

The integral component calculation unit 2334 calculates the integral components $S_i(x_s, x_e)$.

Specifically, the integral components $S_i(x_s, x_e)$ (however, the value $x_s$ and value $x_e$ are values shown in the above Expression (112)) shown in Expression (116) may be calculated as long as the relative pixel positions (x, y), shift amount $C_x$ (y), and i of the i-dimensional terms are known. Also, of these, the relative pixel positions (x, y) are determined by the pixel of interest and the tap range, the shift amount $C_x$ (y) is determined by the angle θ (by the above Expression (107) and Expression (109)), and the range of i is determined by the number of dimensions n, respectively.

Accordingly, the integral component calculation unit 2334 calculates the integral components $S_i(x_s, x_e)$ based on the tap range and the number of dimensions set by the conditions setting unit 2331, and the angle θ of the data continuity information output from the data continuity detecting unit 101, and supplies the calculated results to the normal equation generating unit 2335 as an integral component table.

The normal equation generating unit 2335 generates the above Expression (112), i.e., a normal equation in the case of obtaining the features $w_i$ of the right side of Expression (115) with the least square method using the input pixel value table supplied from the input pixel value acquiring unit 2333, and the integral component table supplied from the integral component calculation unit 2334, and supplies this to the approximation function generating unit 2336 as a normal equation table. Note that a specific example of a normal equation will be described later.

The approximation function generating unit 2336 calculates the respective features $w_i$ of the above Expression (115) (i.e., the respective coefficients $w_i$ of the approximation function f(x) serving as a one-dimensional polynomial) by solving a normal equation included in the normal equation table supplied from the normal equation generating unit 2335 using the matrix solution, and outputs these to the image generating unit 103.

Next, description will be made regarding the actual world estimating processing (processing in step S102 in FIG. 40) of the actual world estimating unit 102 (FIG. 235) which employs the one-dimensional polynomial approximating method with reference to the flowchart in FIG. 236.

For example, let us say that an input image, which is a one-frame input image output from the sensor 2, including the fine-line-including data region 2302 in FIG. 221 described above has been already stored in the input image storage unit 2332. Also, let us say that the data continuity detecting unit 101 has subjected, at the continuity detection processing in step S101 (FIG. 40), the fine-line-including data region 2302 to the processing thereof, and has already output the angle θ as data continuity information.

In this case, the conditions setting unit 2331 sets conditions (a tap range and the number of dimensions) in step S2301 in FIG. 236.

For example, let us say that a tap range 2351 shown in FIG. 237 is set, and 5 dimensions are set as the number of dimensions.

That is to say, FIG. 237 is a diagram for describing an example of a tap range. In FIG. 237, the X direction and Y direction are the X direction and Y direction of the sensor 2 (FIG. 220) respectively. Also, the tap range 2351 represents a pixel group made up of 20 pixels in total (20 squares in the drawing) of 4 pixels in the X direction, and also 5 pixels in the Y direction.

Further, as shown in FIG. 237, let us say that a pixel of interest is set at the second pixel from the left and also the third pixel from the bottom in the drawing, of the tap range 2351. Also, let us say that each pixel is denoted with a number l such as shown in FIG. 237 (l is any integer value of 0 through 19) according to the relative pixel positions (x, y) from the pixel of interest (a coordinate value of a pixel-of-interest coordinates system wherein the center (0, 0) of the pixel of interest is taken as the origin).

Now, description will return to FIG. 236, wherein in step S2302, the conditions setting unit 2331 sets a pixel of interest.

In step S2303, the input pixel value acquiring unit 2333 acquires an input pixel value based on the condition (tap range) set by the conditions setting unit 2331, and generates an input pixel value table. That is to say, in this case, the input pixel value acquiring unit 2333 acquires the fine-line-including data region 2302 (FIG. 225), and generates a table made up of 20 input pixel values P (l) as an input pixel value table.

Note that in this case, the relation between the input pixel values P (l) and the above input pixel values P (x, y) is a relation shown in the following Expression (117). However, in Expression (117), the left side represents the input pixel values P (l), and the right side represents the input pixel values P (x, y).

$$
\begin{aligned}
P(0) &= P(0, 0) \\
P(1) &= P(-1, 2) \\
P(2) &= P(0, 2) \\
P(3) &= P(1, 2) \\
P(4) &= P(2, 2) \\
P(5) &= P(-1, 1) \\
P(6) &= P(0, 1) \\
P(7) &= P(1, 1) \\
P(8) &= P(2, 1) \\
P(9) &= P(-1, 0) \\
P(10) &= P(1, 0) \\
P(11) &= P(2, 0) \\
P(12) &= P(-1, -1) \\
P(13) &= P(0, -1) \\
P(14) &= P(1, -1) \\
P(15) &= P(2, -1) \\
P(16) &= P(-1, -2) \\
P(17) &= P(0, -2) \\
P(18) &= P(1, -2) \\
P(19) &= P(2, -2)
\end{aligned}
\tag{117}
$$

In step S2304, the integral component calculation unit 2334 calculates integral components based on the conditions (a tap range and the number of dimensions) set by the conditions setting unit 2331, and the data continuity information (angle θ) supplied from the data continuity detecting unit 101, and generates an integral component table.

In this case, as described above, the input pixel values are not P (x, y) but P (l), and are acquired as the value of a pixel number l, so the integral component calculation unit 2334 calculates the above integral components $S_i(x_s, x_e)$ in Expression (116) as a function of l such as the integral components $S_i(l)$ shown in the left side of the following Expression (118).

$$S_i(l)=S_i(x_s, x_e) \tag{118}$$

Specifically, in this case, the integral components $S_i$ (l) shown in the following Expression (119) are calculated.

$$
\begin{aligned}
S_i(0) &= S_i(-0.5, 0.5) \\
S_i(1) &= S_i(-1.5 - C_x(2), -0.5 - C_x(2)) \\
S_i(2) &= S_i(-0.5 - C_x(2), 0.5 - C_x(2)) \\
S_i(3) &= S_i(0.5 - C_x(2), 1.5 - C_x(2))
\end{aligned}
\tag{119}
$$

-continued $$
\begin{aligned}
S_i(4) &= S_i(1.5 - C_x(2), 2.5 - C_x(2)) \\
S_i(5) &= S_i(-1.5 - C_x(1), -0.5 - C_x(1)) \\
S_i(6) &= S_i(-0.5 - C_x(1), 0.5 - C_x(1)) \\
S_i(7) &= S_i(0.5 - C_x(1), 1.5 - C_x(1)) \\
S_i(8) &= S_i(1.5 - C_x(1), 2.5 - C_x(1)) \\
S_i(9) &= S_i(-1.5, -0.5) \\
S_i(10) &= S_i(0.5, 1.5) \\
S_i(11) &= S_i(1.5, 2.5) \\
S_i(12) &= S_i(-1.5 - C_x(-1), -0.5 - C_x(-1)) \\
S_i(13) &= S_i(-0.5 - C_x(-1), 0.5 - C_x(-1)) \\
S_i(14) &= S_i(0.5 - C_x(-1), 1.5 - C_x(-1)) \\
S_i(15) &= S_i(1.5 - C_x(-1), 2.5 - C_x(-1)) \\
S_i(16) &= S_i(-1.5 - C_x(-2), -0.5 - C_x(-2)) \\
S_i(17) &= S_i(-0.5 - C_x(-2), 0.5 - C_x(-2)) \\
S_i(18) &= S_i(0.5 - C_x(-2), 1.5 - C_x(-2)) \\
S_i(19) &= S_i(1.5 - C_x(-2), 2.5 - C_x(-2))
\end{aligned}
$$

Note that in Expression (119), the left side represents the integral components $S_i$ (l), and the right side represents the integral components $S_i$ ($x_s$, $x_e$). That is to say, in this case, i is 0 through 5, and accordingly, the 120 $S_i$ (l) in total of the 20 $S_0$ (l), 20 $S_1$ (l), 20 $S_2$ (l) 20 $S_3$ (l), 20 $S_4$ (l), and 20 $S_5$ (l) are calculated.

More specifically, first the integral component calculation unit 2334 calculates each of the shift amounts $C_x$ (−2), $C_x$ (−1), $C_x$ (1), and $C_x$ (2) using the angle θ supplied from the data continuity detecting unit 101. Next, the integral component calculation unit 2334 calculates each of the 20 integral components $S_i$ ($x_s$, $x_e$) shown in the right side of Expression (118) regarding each of i=0 through 5 using the calculated shift amounts $C_x$(−2), $C_x$(−1), $C_x$(1), and $C_x$ (2). That is to say, the 120 integral components $S_i$ ($x_s$, $x_e$) are calculated. Note that with this calculation of the integral components $S_i$ ($x_s$, $x_e$), the above Expression (116) is used. Subsequently, the integral component calculation unit 2334 converts each of the calculated 120 integral components $S_i$ ($x_s$, $x_e$) into the corresponding integral components $S_i$ (l) in accordance with Expression (119), and generates an integral component table including the converted 120 integral components $S_i$ (l).

Note that the sequence of the processing in step S2303 and the processing in step S2304 is not restricted to the example in FIG. 236, the processing in step S2304 may be executed first, or the processing in step S2303 and the processing in step S2304 may be executed simultaneously.

Next, in step S2305, the normal equation generating unit 2335 generates a normal equation table based on the input pixel value table generated by the input pixel value acquiring unit 2333 at the processing in step S2303, and the integral component table generated by the integral component calculation unit 2334 at the processing in step S2304.

Specifically, in this case, the features $w_i$ of the following Expression (120) corresponding to the above Expression (115) are calculated using the least square method. A normal equation corresponding to this is represented as the following Expression (121).

$$P(l) = \sum_{l=0}^{n} w_i \times S_i(l) + e \tag{120}$$

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \tag{121}$$

Note that in Expression (121), L represents the maximum value of the pixel number l in the tap range. n represents the number of dimensions of the approximation function f(x) serving as a polynomial. Specifically, in this case, n=5, and L=19.

If we define each matrix of the normal equation shown in Expression (121) as the following Expressions (122) through (124), the normal equation is represented as the following Expression (125).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \tag{122}$$

$$W_{MAT} = \begin{pmatrix} w_0 \\ w_1 \\ \vdots \\ w_n \end{pmatrix} \tag{123}$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \tag{124}$$

$$S_{MAT}W_{MAT} = P_{MAT} \tag{125}$$

As shown in Expression (123), the respective components of the matrix $W_{MAT}$ are the features $w_i$ to be obtained. Accordingly, in Expression (125), if the matrix $S_{MAT}$ of the left side and the matrix $P_{MAT}$ of the right side are determined, the matrix $W_{MAT}$ (i.e., features $w_i$) may by be calculated with the matrix solution.

Specifically, as shown in Expression (122), the respective components of the matrix $S_{MAT}$ may be calculated as long as the above integral components $S_i$ (l) are known. The integral components $S_i$ (l) are included in the integral component table supplied from the integral component calculation unit 2334, so the normal equation generating unit 2335 can calculate each component of the matrix $S_{MAT}$ using the integral component table.

Also, as shown in Expression (124), the respective components of the matrix $P_{MAT}$ may be calculated as long as the integral components $S_i$ (l) and the input pixel values P(l) are known. The integral components $S_i$ (l) is the same as those included in the respective components of the matrix $S_{MAT}$, also the input pixel values P(l) are included in the input pixel value table supplied from the input pixel value acquiring unit 2333, so the normal equation generating unit 2335 can calculate each component of the matrix $P_{MAT}$ using the integral component table and input pixel value table.

Thus, the normal equation generating unit 2335 calculates each component of the matrix $S_{MAT}$ and matrix $P_{MAT}$, and outputs the calculated results (each component of the matrix $S_{MAT}$ and matrix $P_{MAT}$) to the approximation function generating unit 2336 as a normal equation table.

Upon the normal equation table being output from the normal equation generating unit 2335, in step S2306, the approximation function generating unit 2336 calculates the features $w_i$ (i.e., the coefficients $w_i$ of the approximation function f(x) serving as a one-dimensional polynomial) serving as the respective components of the matrix $W_{MAT}$ in the above Expression (125) based on the normal equation table.

Specifically, the normal equation in the above Expression (125) can be transformed as the following Expression (126).

$$W_{MAT} = S_{MAT}^{-1}P_{MAT} \tag{126}$$

In Expression (126), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2335. Accordingly, the approximation function generating unit 2336 calculates the matrix $W_{MAT}$ by calculating the matrix in the right side of Expression (126) using the normal equation table, and outputs the calculated results (features $w_i$) to the image generating unit 103.

In step S2307, the approximation function generating unit 2336 determines regarding whether or not the processing of all the pixels has been completed.

In step S2307, in the event that determination is made that the processing of all the pixels has not been completed, the processing returns to step S2303, wherein the subsequent processing is repeatedly performed. That is to say, the pixels that have not become a pixel of interest are sequentially taken as a pixel of interest, and the processing in step S2302 through S2307 is repeatedly performed.

In the event that the processing of all the pixels has been completed (in step S2307, in the event that determination is made that the processing of all the pixels has been completed), the estimating processing of the actual world 1 ends.

Note that the waveform of the approximation function f(x) generated with the coefficients (features) $w_i$ thus calculated becomes a waveform such as the approximation function f3 (x) in FIG. 234 described above.

Thus, with the one-dimensional polynomial approximating method, the features of the approximation function f(x) serving as a one-dimensional polynomial are calculated on assumption that a waveform having the same form as the one-dimensional X cross-sectional waveform F(x) is continuous in the direction of continuity. Accordingly, with the one-dimensional polynomial approximating method, the features of the approximation function f(x) can be calculated with less amount of calculation processing than other function approximating methods.

In other words, with the one-dimensional polynomial approximating method, for example, the multiple detecting elements of the sensor (for example, detecting elements 2-1 of the sensor 2 in FIG. 220) each having time-space integration effects project the light signals in the actual world 1 (for example, an 1 portion 2301 of the light signal in the actual world 1 in FIG. 221), and the data continuity detecting unit 101 in FIG. 219 (FIG. 3) detects continuity of data (for example, continuity of data represented with $G_f$ in FIG. 228) in image data (for example, image data (input image region) 2302 in FIG. 221) made up of multiple pixels having a pixel value (for example, input pixel values P(x, y) shown in the respective graphs in FIG. 226) projected by the detecting elements 2-1, which drop part of continuity (for example, continuity represented with the gradient $G_F$ in FIG. 228) of the light signal in the actual world 1.

For example, the actual world estimating unit 102 in FIG. 219 (FIG. 3) estimates the light signal function F by approximating the light signal function F representing the light signal in the actual world 1 (specifically, X cross-sectional waveform F(x)) with a predetermined approximation function f(specifically, for example, the approximation function $f_3$ (x) in FIG. 234) on condition that the pixel value (for example, input pixel value P serving as the left side of the above Expression (112)) of a pixel corresponding to a position in the one-dimensional direction (for example, arrow 2311 in FIG. 223, i.e., X direction) of the time-space directions of image data corresponding to continuity of data detected by the data continuity detecting unit 101 is the pixel value (for example, as shown in the right side of Expression (112), the value obtained by the approximation function $f_3$ (x) being integrated in the X direction) acquired by integration effects in the one-dimensional direction.

Speaking in detail, for example, the actual world estimating unit 102 estimates the light signal function F by approximating the light signal function F with the approximation function f on condition that the pixel value of a pixel corresponding to a distance (for example, shift amounts $C_x$ (y) in FIG. 230) along in the one-dimensional direction (for example, X direction) from a line corresponding to continuity of data (for example, a line (dashed line) corresponding to the gradient $G_f$ in FIG. 230) detected by the continuity detecting hand unit 101 is the pixel value (for example, a value obtained by the approximation function $f_3$ (x) being integrated in the X direction such as shown in the right side of Expression (112) with an integral range such as shown in Expression (112)) acquired by integration effects in the one-dimensional direction.

Accordingly, with the one-dimensional polynomial approximating method, the features of the approximation function f(x) can be calculated with less amount of calculation processing than other function approximating methods.

Next, description will be made regarding the second function approximating method with reference to FIG. 238 through FIG. 244.

That is to say, the second function approximating method is a method wherein the light signal in the actual world 1 having continuity in the spatial direction represented with the gradient $G_F$ such as shown in FIG. 238 for example is regarded as a waveform F(x, y) on the X-Y plane (on the plane level in the X direction serving as one direction of the spatial directions, and in the Y direction orthogonal to the X direction), and the waveform F(x, y) is approximated with the approximation function f(x, y) serving as a two-dimensional polynomial, thereby estimating the waveform F(x, y). Accordingly, hereafter, the second function approximating method is referred to as a two-dimensional polynomial approximating method.

Note that in FIG. 238, the horizontal direction represents the X direction serving as one direction of the spatial directions, the upper right direction represents the Y direction serving as the other direction of the spatial directions, and the vertical direction represents the level of light respectively. $G_F$ represents the gradient as continuity in the spatial direction.

Also, with description of the two-dimensional polynomial approximating method, let us say that the sensor 2 is a CCD made up of the multiple detecting elements 2-1 disposed on the plane thereof, such as shown in FIG. 239.

With the example in FIG. 239, the direction in parallel with a predetermined side of the detecting elements 2-1 is taken as the X direction serving as one direction of the spatial directions, and the direction orthogonal to the X direction is taken as the Y direction serving as the other direction of the spatial directions. The direction orthogonal to the X-Y plane is taken as the t direction serving as the temporal direction.

Also, with the example in FIG. 239, the spatial shape of the respective detecting elements 2-1 of the sensor 2 is taken as a square of which one side is 1 in length. The shutter time (exposure time) of the sensor 2 is taken as 1.

Further, with the example in FIG. 239, the center of one certain detecting element 2-1 of the sensor 2 is taken as the origin (the position in the X direction is x=0, and the position in the Y direction is y=0) in the spatial directions (X direction and Y direction), and also the intermediate point-in-time of the exposure time is taken as the origin (the position in the t direction is t=0) in the temporal direction (t direction).

In this case, the detecting element 2-1 of which the center is in the origin (x=0, y=0) in the spatial directions subjects the light signal function F(x, y, t) to integration with a range of −0.5 through 0.5 in the X direction, with a range of −0.5 through 0.5 in the Y direction, and with a range of −0.5 through 0.5 in the t direction, and outputs the integral value as the pixel value P.

That is to say, the pixel value P output from the detecting element 2-1 of which the center is in the origin in the spatial directions is represented with the following Expression (127).

$$P = \int_{-0.5}^{+0.5} \int_{-0.5}^{+0.5} \int_{-0.5}^{+0.5} F(x, y, t)\,dx\,dy\,dt \tag{127}$$

Similarly, the other detecting elements 2-1 output the pixel value P shown in Expression (127) by taking the center of the detecting element 2-1 to be processed as the origin in the spatial directions.

Incidentally, as described above, the two-dimensional polynomial approximating method is a method wherein the light signal in the actual world 1 is handled as a waveform F(x, y) such as shown in FIG. 238 for example, and the two-dimensional waveform F(x, y) is approximated with the approximation function f(x, y) serving as a two-dimensional polynomial.

First, description will be made regarding a method representing such the approximation function f(x, y) with a two-dimensional polynomial.

As described above, the light signal in the actual world 1 is represented with the light signal function F(x, y, t) of which variables are the position on the three-dimensional space x, y, and z, and point-in-time t. This light signal function F(x, y, t), i.e., a one-dimensional waveform projected in the X direction at an arbitrary position y in the Y direction is referred to as an X cross-sectional waveform F(x), here.

When paying attention to this X cross-sectional waveform F(x), in the event that the signal in the actual world 1 has continuity in a certain direction in the spatial directions, it can be conceived that a waveform having the same form as the X cross-sectional waveform F(x) continues in the continuity direction. For example, with the example in FIG. 238, a waveform having the same form as the X cross-sectional waveform F(x) continues in the direction of the gradient $G_F$. In other words, it can be said that the waveform F(x, y) is formed by a waveform having the same form as the X cross-sectional waveform F(x) continuing in the direction of the gradient $G_F$.

Accordingly, the approximation function f(x, y) can be represented with a two-dimensional polynomial by considering that the waveform of the approximation function f(x, y) approximating the waveform F(x, y) is formed by a waveform having the same form as the approximation function f(x) approximating the X cross-sectional F(x) continuing.

Description will be made in more detail regarding the representing method of the approximation function f(x, y).

For example, let us say that the light signal in the actual world 1 such as shown in FIG. 238 described above, i.e., a light signal having continuity in the spatial direction represented with the gradient $G_F$ is detected by the sensor 2 (FIG. 239), and output as an input image (pixel value).

Further, let us say that as shown in FIG. 240, the data continuity detecting unit 101 (FIG. 3) subjects an input image region 2401 made up of 20 pixels (in the drawing, 20 squares represented with dashed line) in total of 4 pixels in the X direction and also 5 pixels in the Y direction, of this input image, to the processing thereof, and outputs an angle θ (angle θ generated between the direction of data continuity represented with the gradient $G_f$ corresponding to the gradient $G_F$, and the X direction) as one of the data continuity information.

Note that with the input image region 2401, the horizontal direction in the drawing represents the X direction serving as one direction in the spatial directions, and the vertical direction in the drawing represents the Y direction serving as the other direction of the spatial directions.

Also, in FIG. 240, an (x, y) coordinates system is set such that a pixel in the second pixel from the left, and also the third pixel from the bottom is taken as a pixel of interest, and the center of the pixel of interest is taken as the origin (0, 0). A relative distance (hereafter, referred to as a cross-sectional direction distance) in the X direction as to the straight line (straight line having the gradient $G_f$ representing the direction of data continuity) having an angle θ passing through the origin (0, 0) is described as x'.

Further, in FIG. 240, the graph on the right side is a function wherein an X cross-sectional waveform F(x') is approximated, which represents an approximation function f(x') serving as an n-dimensional (n is an arbitrary integer) polynomial. Of the axes in the graph on the right side, the axis in the horizontal direction in the drawing represents a cross-sectional direction distance, and the axis in the vertical direction in the drawing represents pixel values.

In this case, the approximation function f(x') shown in FIG. 240 is an n-dimensional polynomial, so is represented as the following Expression (128).

$$f(x') = w_0 + w_1 x' + w_2 x' + \dots + w_n x'^n = \sum_{i=0}^{n} w_i x'^i \tag{128}$$

Also, since the angle θ is determined, the straight line having angle θ passing through the origin (0, 0) is uniquely determined, and a position $x_1$ in the X direction of the straight line at an arbitrary position y in the Y direction is represented as the following Expression (129). However, in Expression (129), s represents cot θ.

$$x_1 = s \times y \tag{129}$$

That is to say, as shown in FIG. 240, a point on the straight line corresponding to continuity of data represented with the gradient $G_f$ is represented with a coordinate value $(x_1, y)$.

The cross-sectional direction distance x' is represented as the following Expression (130) using Expression (129).

$$x' = x - x_1 = x - s \times y \tag{130}$$

Accordingly, the approximation function f(x, y) at an arbitrary position (x, y) within the input image region 2401 is represented as the following Expression (131) using Expression (128) and Expression (130).

$$f(x, y) = \sum_{i=0}^{n} w_i (x - s \times y)^i \tag{131}$$

Note that in Expression (131), $w_i$ represents coefficients of the approximation function f(x, y). Note that the coefficients $w_i$ of the approximation function f including the approximation function f(x, y) can be evaluated as the features of the approximation function f. Accordingly, the coefficients $w_i$ of the approximation function f are also referred to as the features $w_i$ of the approximation function f.

Thus, the approximation function f(x, y) having a two-dimensional waveform can be represented as the polynomial of Expression (131) as long as the angle θ is known.

Accordingly, if the actual world estimating unit 102 can calculate the features $w_i$ of Expression (131), the actual world estimating unit 102 can estimate the waveform F(x, y) such as shown in FIG. 238.

Consequently, hereafter, description will be made regarding a method for calculating the features $w_i$ of Expression (131).

That is to say, upon the approximation function f(x, y) represented with Expression (131) being subjected to integration with an integral range (integral range in the spatial direction) corresponding to a pixel (the detecting element 2-1 of the sensor 2 (FIG. 239)), the integral value becomes the estimated value regarding the pixel value of the pixel. It is the following Expression (132) that this is represented with an equation. Note that with the two-dimensional polynomial approximating method, the temporal direction t is regarded as a constant value, so Expression (132) is taken as an equation of which variables are the positions x and y in the spatial directions (X direction and Y direction).

$$P(x, y) = \int_{y-0.5}^{y+0.5}\int_{x-0.5}^{x+0.5}\sum_{i=0}^{n} w_i (x - s\times y)^i + e \quad (132)$$

In Expression (132), P (x, y) represents the pixel value of a pixel of which the center position is in a position (x, y) (relative position (x, y) from the pixel of interest) of an input image from the sensor 2. Also, e represents a margin of error.

Thus, with the two-dimensional polynomial approximating method, the relation between the input pixel value P (x, y) and the approximation function f(x, y) serving as a two-dimensional polynomial can be represented with Expression (132), and accordingly, the actual world estimating unit 102 can estimate the two-dimensional function F(x, y) (waveform F(x, y) wherein the light signal in the actual world 1 having continuity in the spatial direction represented with the gradient $G_F$ (FIG. 238) is represented focusing attention on the spatial direction) by calculating the features $w_i$ with, for example, the least square method or the like using Expression (132) (by generating the approximation function f(x, y) by substituting the calculated features $w_i$ for Expression (130)).

FIG. 241 represents a configuration example of the actual world estimating unit 102 employing such a two-dimensional polynomial approximating method.

As shown in FIG. 241, the actual world estimating unit 102 includes a conditions setting unit 2421, input image storage unit 2422, input pixel value acquiring unit 2423, integral component calculation unit 2424, normal equation generating unit 2425, and approximation function generating unit 2426.

The conditions setting unit 2421 sets a pixel range (tap range) used for estimating the function F(x, y) corresponding to a pixel of interest, and the number of dimensions n of the approximation function f(x, y).

The input image storage unit 2422 temporarily stores an input image (pixel values) from the sensor 2.

The input pixel value acquiring unit 2423 acquires, of the input images stored in the input image storage unit 2422, an input image region corresponding to the tap range set by the conditions setting unit 2421, and supplies this to the normal equation generating unit 2425 as an input pixel value table. That is to say, the input pixel value table is a table in which the respective pixel values of pixels included in the input image region are described. Note that a specific example of the input pixel value table will be described later.

Incidentally, as described above, the actual world estimating unit 102 employing the two-dimensional approximating method calculates the features $w_i$ of the approximation function f(x, y) represented with the above Expression (131) by solving the above Expression (132) using the least square method.

Expression (132) can be represented as the following Expression (137) by using the following Expression (136) obtained by the following Expressions (133) through (135).

$$\int x^i\,dx = \frac{x^{i+1}}{i+1} \quad (133)$$

$$\int (x - s\times y)^i\,dx = \frac{(x - s\times y)^{i+1}}{(i+1)} \quad (134)$$

$$\int (x - s\times y)^i\,dy = \frac{(x - s\times y)^{i+1}}{s(i+1)} \quad (135)$$

-continued $$\begin{aligned}
&\int_{y-0.5}^{y+0.5}\int_{x-0.5}^{x+0.5}(x - s\times y)^i\,dx\,dy = \int_{y-0.5}^{y+0.5}\left[\frac{(x - s\times y)^{i+1}}{(i+1)}\right]_{x-0.5}^{x+0.5}dy = \\
&\int_{y-0.5}^{y+0.5}\frac{(x + 0.5 - s\times y)^{i+1} - (x - 0.5 - s\times y)^{i+1}}{i+1}\,dy = \\
&\left[\frac{(x + 0.5 - s\times y)^{i+2}}{s(i+1)(i+2)}\right]_{y-0.5}^{y+0.5} - \left[\frac{(x - 0.5 - s\times y)^{i+2}}{s(i+1)(i+2)}\right]_{y-0.5}^{y+0.5} = \\
&\frac{(x + 0.5 - s\times y + 0.5s)^{i+2} - (x + 0.5 - s\times y - 0.5s)^{i+2} - (x - 0.5 - s\times y + 0.5s)^{i+2} + (x - 0.5 - s\times y - 0.5s)^{i+2}}{s(i+1)(i+2)}
\end{aligned} \quad (136)$$

$$\begin{aligned}
P(x, y) &= \sum_{i=0}^{n}\frac{w_i}{s(i+1)(i+2)}\{(x + 0.5 - s\times y + 0.5s)^{i+2} - \\
&\quad (x + 0.5 - s\times y - 0.5s)^{i+2} - (x - 0.5 - s\times y - 0.5s)^{i+2} + \\
&\quad (x - 0.5 - s\times y - 0.5s)^{i+2}\} + e \\
&= \sum_{i=0}^{n} w_i s_i(x - 0.5, x + 0.5, y - 0.5, y + 0.5) + e
\end{aligned} \quad (137)$$

In Expression (137), $S_i$ (x−0.5, x+0.5, y−0.5, y+0.5) represents the integral components of i-dimensional terms. That is to say, the integral components $S_i$ (x−0.5, x+0.5, y−0.5, y+0.5) are as shown in the following Expression (138).

$$s_i(x - 0.5, x + 0.5, y - 0.5, y + 0.5) = \frac{(x + 0.5 - s\times y + 0.5s)^{i+2} - (x + 0.5 - s\times y - 0.5s)^{i+2} - (x - 0.5 - s\times y + 0.5s)^{i+2} + (x - 0.5 - s\times y - 0.5s)^{i+2}}{s(i+1)(i+2)} \quad (138)$$

The integral component calculation unit 2424 calculates the integral components $S_i$ (x−0.5, x+0.5, y−0.5, y+0.5).

Specifically, the integral components $S_i$ (x−0.5, x+0.5, y−0.5, y+0.5) shown in Expression (138) can be calculated as long as the relative pixel positions (x, y), the variable s and i of i-dimensional terms in the above Expression (131) are known. Of these, the relative pixel positions (x, y) are determined with a pixel of interest, and a tap range, the variable s is cot θ, which is determined with the angle θ, and the range of i is determined with the number of dimensions n respectively.

Accordingly, the integral component calculation unit 2424 calculates the integral components $S_i$ (x−0.5, x+0.5, y−0.5, y+0.5) based on the tap range and the number of dimensions set by the conditions setting unit 2421, and the angle θ of the data continuity information output from the data continuity detecting unit 101, and supplies the calculated results to the normal equation generating unit 2425 as an integral component table.

The normal equation generating unit 2425 generates a normal equation in the case of obtaining the above Expression (132), i.e., Expression (137) by the least square method using the input pixel value table supplied from the input pixel value acquiring unit 2423, and the integral component table supplied from the integral component calculation unit 2424, and outputs this to the approximation function generating unit 2426 as a normal equation table. Note that a specific example of a normal equation will be described later.

The approximation function generating unit 2426 calculates the respective features $w_i$ of the above Expression (132) (i.e., the coefficients $w_i$ of the approximation function f(x, y)

serving as a two-dimensional polynomial) by solving the normal equation included in the normal equation table supplied from the normal equation generating unit 2425 using the matrix solution, and output these to the image generating unit 103.

Next, description will be made regarding the actual world estimating processing (processing in step S102 in FIG. 40) to which the two-dimensional polynomial approximating method is applied, with reference to the flowchart in FIG. 242.

For example, let us say that the light signal in the actual world 1 having continuity in the spatial direction represented with the gradient $G_F$ has been detected by the sensor 2 (FIG. 239), and has been stored in the input image storage unit 2422 as an input image corresponding to one frame. Also, let us say that the data continuity detecting unit 101 has subjected the region 2401 shown in FIG. 240 described above of the input image to processing in the continuity detecting processing in step S101 (FIG. 40), and has output the angle θ as data continuity information.

In this case, in step S2401, the conditions setting unit 2421 sets conditions (a tap range and the number of dimensions).

For example, let us say that a tap range 2441 shown in FIG. 243 has been set, and also 5 has been set as the number of dimensions.

FIG. 243 is a diagram for describing an example of a tap range. In FIG. 243, the X direction and Y direction represent the X direction and Y direction of the sensor 2 (FIG. 239). Also, the tap range 2441 represents a pixel group made up of 20 pixels (20 squares in the drawing) in total of 4 pixels in the X direction and also 5 pixels in the Y direction.

Further, as shown in FIG. 243, let us say that a pixel of interest has been set to a pixel, which is the second pixel from the left and also the third pixel from the bottom in the drawing, of the tap range 2441. Also, let us say that each pixel is denoted with a number 1 such as shown in FIG. 243 (l is any integer value of 0 through 19) according to the relative pixel positions (x, y) from the pixel of interest (a coordinate value of a pixel-of-interest coordinates system wherein the center (0, 0) of the pixel of interest is taken as the origin).

Now, description will return to FIG. 242, wherein in step S2402, the conditions setting unit 2421 sets a pixel of interest.

In step S2403, the input pixel value acquiring unit 2423 acquires an input pixel value based on the condition (tap range) set by the conditions setting unit 2421, and generates an input pixel value table. That is to say, in this case, the input pixel value acquiring unit 2423 acquires the input image region 2401 (FIG. 240), generates a table made up of 20 input pixel values P (l) as an input pixel value table.

Note that in this case, the relation between the input pixel values P (l) and the above input pixel values P (x, y) is a relation shown in the following Expression (139). However, in Expression (139), the left side represents the input pixel values P (l), and the right side represents the input pixel values P (x, y).

$$
\begin{aligned}
P(0) &= P(0, 0) \qquad (139)\\
P(1) &= P(-1, 2)\\
P(2) &= P(0, 2)\\
P(3) &= P(1, 2)\\
P(4) &= P(2, 2)\\
P(5) &= P(-1, 1)
\end{aligned}
$$

-continued $$
\begin{aligned}
P(6) &= P(0, 1)\\
P(7) &= P(1, 1)\\
P(8) &= P(2, 1)\\
P(9) &= P(-1, 0)\\
P(10) &= P(1, 0)\\
P(11) &= P(2, 0)\\
P(12) &= P(-1, -1)\\
P(13) &= P(0, -1)\\
P(14) &= P(1, -1)\\
P(15) &= P(2, -1)\\
P(16) &= P(-1, -2)\\
P(17) &= P(0, -2)\\
P(18) &= P(1, -2)\\
P(19) &= P(2, -2)
\end{aligned}
$$

In step S2404, the integral component calculation unit 2424 calculates integral components based on the conditions (a tap range and the number of dimensions) set by the conditions setting unit 2421, and the data continuity information (angle θ) supplied from the data continuity detecting unit 101, and generates an integral component table.

In this case, as described above, the input pixel values are not P (x, y) but P (l), and are acquired as the value of a pixel number l, so the integral component calculation unit 2424 calculates the integral components $S_i$ (x−0.5, x+0.5, y−0.5, y+0.5) in the above Expression (138) as a function of l such as the integral components $S_i(l)$ shown in the left side of the following Expression (140).

$$S_i(l)=S_i(x-0.5, x+0.5, y-0.5, y+0.5) \qquad (140)$$

Specifically, in this case, the integral components $S_i(l)$ shown in the following Expression (141) are calculated.

$$
\begin{aligned}
S_i(0) &= S_i(-0.5, 0.5, -0.5, 0.5) \qquad (141)\\
S_i(1) &= S_i(-1.5, -0.5, 1.5, 2.5)\\
S_i(2) &= S_i(-0.5, 0.5, 1.5, 2.5)\\
S_i(3) &= S_i(0.5, 1.5, 1.5, 2.5)\\
S_i(4) &= S_i(1.5, 2.5, 1.5, 2.5)\\
S_i(5) &= S_i(-1.5, -0.5, 0.5, 1.5)\\
S_i(6) &= S_i(-0.5, 0.5, 0.5, 1.5)\\
S_i(7) &= S_i(0.5, 1.5, 0.5, 1.5)\\
S_i(8) &= S_i(1.5, 2.5, 0.5, 1.5)\\
S_i(9) &= S_i(-1.5, -0.5, -0.5, 0.5)\\
S_i(10) &= S_i(0.5, 1.5, -0.5, 0.5)\\
S_i(11) &= S_i(1.5, 2.5, -0.5, 0.5)\\
S_i(12) &= S_i(-1.5, -0.5, -1.5, -0.5)\\
S_i(13) &= S_i(-0.5, 0.5, -1.5, -0.5)\\
S_i(14) &= S_i(0.5, 1.5, -1.5, -0.5)
\end{aligned}
$$

-continued $$S_i(15) = S_i(1.5, 2.5, -1.5, -0.5)$$

$$S_i(16) = S_i(-1.5, -0.5, -2.5, -1.5)$$

$$S_i(17) = S_i(-0.5, 0.5, -2.5, -1.5)$$

$$S_i(18) = S_i(0.5, 1.5, -2.5, 1.5)$$

$$S_i(19) = S_i(1.5, 2.5, -2.5, -1.5)$$

Note that in Expression (141), the left side represents the integral components $S_i$ (l), and the right side represents the integral components $S_i$ (x−0.5, x+0.5, y−0.5, y+0.5). That is to say, in this case, i is 0 through 5, and accordingly, the 120 $S_i$ (l) in total of the 20 $S_0$ (l), 20 $S_1$ (l), 20 $S_2$ (l), 20 $S_3$ (l), 20 $S_4$ (l), and 20 $S_5$ (l) are calculated.

More specifically, first the integral component calculation unit 2424 calculates cot θ corresponding to the angle θ supplied from the data continuity detecting unit 101, and takes the calculated result as a variable s. Next, the integral component calculation unit 2424 calculates each of the 20 integral components $S_i$ (x−0.5, x+0.5, y−0.5, y +0.5) shown in the right side of Expression (140) regarding each of i=0 through 5 using the calculated variable s. That is to say, the 120 integral components $S_i$ (x−0.5, x+0.5, y−0.5, y+0.5) are calculated. Note that with this calculation of the integral components $S_i$ (x−0.5, x+0.5, y−0.5, y+0.5), the above Expression (138) is used. Subsequently, the integral component calculation unit 2424 converts each of the calculated 120 integral components $S_i$ (x−0.5, x+0.5, y−0.5, y+0.5) into the corresponding integral components $S_i$(l) in accordance with Expression (141), and generates an integral component table including the converted 120 integral components $S_i$ (l).

Note that the sequence of the processing in step S2403 and the processing in step S2404 is not restricted to the example in FIG. 242, the processing in step S2404 may be executed first, or the processing in step S2403 and the processing in step S2404 may be executed simultaneously.

Next, in step S2405, the normal equation generating unit 2425 generates a normal equation table based on the input pixel value table generated by the input pixel value acquiring unit 2423 at the processing in step S2403, and the integral component table generated by the integral component calculation unit 2424 at the processing in step S2404.

Specifically, in this case, the features $w_i$ are calculated with the least square method using the above Expression (137) (however, in Expression (136), the $S_i$(l) into which the integral components $S_i$ (x−0.5, x+0.5, y−0.5, y+0.5) are converted using Expression (140) is used), so a normal equation corresponding to this is represented as the following Expression (142).

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \tag{142}$$

-continued $$\begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix}$$

Note that in Expression (142), L represents the maximum value of the pixel number l in the tap range. n represents the number of dimensions of the approximation function f(x) serving as a polynomial. Specifically, in this case, n=5, and L=19.

If we define each matrix of the normal equation shown in Expression (142) as the following Expressions (143) through (145), the normal equation is represented as the following Expression (146).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \tag{143}$$

$$W_{MAT} = \begin{pmatrix} w_0 \\ w_1 \\ \vdots \\ w_n \end{pmatrix} \tag{144}$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \tag{145}$$

$$S_{MAT}W_{MAT} = P_{MAT} \tag{146}$$

As shown in Expression (144), the respective components of the matrix $W_{MAT}$ are the features $w_i$ to be obtained. Accordingly, in Expression (146), if the matrix $S_{MAT}$ of the left side and the matrix $P_{MAT}$ of the right side are determined, the matrix $W_{MAT}$ may be calculated with the matrix solution.

Specifically, as shown in Expression (143), the respective components of the matrix $S_{MAT}$ may be calculated with the above integral components $S_i$ (l). That is to say, the integral components $S_i$ (l) are included in the integral component table supplied from the integral component calculation unit 2424, so the normal equation generating unit 2425 can calculate each component of the matrix $S_{MAT}$ using the integral component table.

Also, as shown in Expression (145), the respective components of the matrix $P_{MAT}$ may be calculated with the integral components $S_i$ (l) and the input pixel values P(l) That is to say, the integral components $S_i$ (l) is the same as those included in the respective components of the matrix $S_{MAT}$, also the input pixel values P(l) are included in the input pixel value table supplied from the input pixel value acquiring unit 2423, so the normal equation generating unit 2425 can calculate each component of the matrix $P_{MAT}$ using the integral component table and input pixel value table.

Thus, the normal equation generating unit 2425 calculates each component of the matrix $S_{MAT}$ and matrix $P_{MAT}$, and outputs the calculated results (each component of the matrix $S_{MAT}$ and matrix $P_{MAT}$) to the approximation function generating unit 2426 as a normal equation table.

Upon the normal equation table being output from the normal equation generating unit 2425, in step S2406, the approximation function generating unit 2426 calculates the features $w_i$ (i.e., the coefficients $w_i$ of the approximation function f(x, y) serving as a two-dimensional polynomial) serving as the respective components of the matrix $W_{MAT}$ in the above Expression (146) based on the normal equation table.

Specifically, the normal equation in the above Expression (146) can be transformed as the following Expression (147).

$$W_{MAT} = S_{MAT}^{-1} P_{MAT} \tag{147}$$

In Expression (147), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2425. Accordingly, the approximation function generating unit 2426 calculates the matrix $W_{MAT}$ by calculating the matrix in the right side of Expression (147) using the normal equation table, and outputs the calculated results (features $w_i$) to the image generating unit 103.

In step S2407, the approximation function generating unit 2426 determines regarding whether or not the processing of all the pixels has been completed.

In step S2407, in the event that determination is made that the processing of all the pixels has not been completed, the processing returns to step S2402, wherein the subsequent processing is repeatedly performed. That is to say, the pixels that have not become a pixel of interest are sequentially taken as a pixel of interest, and the processing in step S2402 through S2407 is repeatedly performed.

In the event that the processing of all the pixels has been completed (in step S2407, in the event that determination is made that the processing of all the pixels has been completed), the estimating processing of the actual world 1 ends.

As description of the two-dimensional polynomial approximating method, an example for calculating the coefficients (features) $w_i$ of the approximation function f(x, y) corresponding to the spatial directions (X direction and Y direction) has been employed, but the two-dimensional polynomial approximating method can be applied to the temporal and spatial directions (X direction and t direction, or Y direction and t direction) as well.

That is to say, the above example is an example in the case of the light signal in the actual world 1 having continuity in the spatial direction represented with the gradient $G_F$ (FIG. 238), and accordingly, the equation including two-dimensional integration in the spatial directions (X direction and Y direction), such as shown in the above Expression (132). However, the concept regarding two-dimensional integration can be applied not only to the spatial direction but also to the temporal and spatial directions (X direction and t direction, or Y direction and t direction).

In other words, with the two-dimensional polynomial approximating method, even in the case in which the light signal function F(x, y, t), which needs to be estimated, has not only continuity in the spatial direction but also continuity in the temporal and spatial directions (however, X direction and t direction, or Y direction and t direction), this can be approximated with a two-dimensional polynomial.

Specifically, for example, in the event that there is an object moving horizontally in the X direction at uniform velocity, the direction of movement of the object is represented with like a gradient $V_F$ in the X-t plane such as shown in FIG. 244. In other words, it can be said that the gradient $V_F$ represents the direction of continuity in the temporal and spatial directions in the X-t plane. Accordingly, the data continuity detecting unit 101 can output movement θ such as shown in FIG. 244 (strictly speaking, though not shown in the drawing, movement θ is an angle generated by the direction of data continuity represented with the gradient $V_f$ corresponding to the gradient $V_F$ and the X direction in the spatial direction) as data continuity information corresponding to the gradient $V_F$ representing continuity in the temporal and spatial directions in the X-t plane as well as the above angle θ (data continuity information corresponding to continuity in the spatial directions represented with the gradient $G_F$ in the X-Y plane).

Accordingly, the actual world estimating unit 102 employing the two-dimensional polynomial approximating method can calculate the coefficients (features) $w_i$ of an approximation function f(x, t) in the same method as the above method by employing the movement θ instead of the angle θ. However, in this case, the equation to be employed is not the above Expression (132) but the following Expression (148).

$$P(x, t) = \int_{t-0.5}^{t+0.5} \int_{x-0.5}^{x+0.5} \sum_{i=0}^{n} w_i (x - s \times t)^i \, dx \, dt + e \tag{148}$$

Note that in Expression (148), s is cot θ (however, θ is movement).

Also, an approximation function f(y, t) focusing attention on the spatial direction Y instead of the spatial direction X can be handled in the same way as the above approximation function f(x, t).

Thus, with the two-dimensional polynomial approximating method, for example, the multiple detecting elements of the sensor (for example, detecting elements 2-1 of the sensor 2 in FIG. 239) each having time-space integration effects project the light signals in the actual world 1 (FIG. 219), and the data continuity detecting unit 101 in FIG. 219 (FIG. 3) detects continuity of data (for example, continuity of data represented with $G_f$ in FIG. 240) in image data (for example, input image in FIG. 219) made up of multiple pixels having a pixel value projected by the detecting elements 2-1, which drop part of continuity (for example, continuity represented with the gradient $G_F$ in FIG. 238) of the light signal in the actual world 1.

For example, the actual world estimating unit 102 in FIG. 219 (FIG. 3) (FIG. 241 for configuration) estimates the light signal function F by approximating the light signal function F representing the light signal in the actual world 1 (specifically, function F(x, y) in FIG. 238) with an approximation function f (for example, approximation function f(x, y) shown in Expression (131)) serving as a polynomial on condition that the pixel value (for example, input pixel value P (x, y)

serving as the left side of the above Expression (131)) of a pixel corresponding to a position at least in the two-dimensional direction (for example, spatial direction X and spatial direction Y in FIG. 238 and FIG. 239) of the time-space directions of image data corresponding to continuity of data detected by the data continuity detecting unit 101 is the pixel value (for example, as shown in the right side of Expression (132), the value obtained by the approximation function f(x, y) shown in the above Expression (131) being integrated in the X direction and Y direction) acquired by integration effects in the two-dimensional direction.

Speaking in detail, for example, the actual world estimating unit 102 estimates a first function representing the light signals in the real world by approximating the first function with a second function serving as a polynomial on condition that the pixel value of a pixel corresponding to a distance (for example, cross-sectional direction distance x' in FIG. 240) along in the two-dimensional direction from a line corresponding to continuity of data (for example, a line (arrow) corresponding to the gradient $G_f$ in FIG. 240) detected by the continuity detecting unit 101 is the pixel value acquired by integration effects at least in the two-dimensional direction.

Thus, the two-dimensional polynomial approximating method takes not one-dimensional but two-dimensional integration effects into consideration, so can estimate the light signals in the actual world 1 more accurately than the one-dimensional polynomial approximating method.

Next, description will be made regarding the third function approximating method with reference to FIG. 245 through FIG. 249.

That is to say, the third function approximating method is a method for estimating the light signal function F(x, y, t) by approximating the light signal function F(x, y, t) with the approximation function f(x, y, t) focusing attention on that the light signal in the actual world 1 having continuity in a predetermined direction of the temporal and spatial directions is represented with the light signal function F(x, y, t), for example. Accordingly, hereafter, the third function approximating method is referred to as a three-dimensional function approximating method.

Also, with description of the three-dimensional function approximating method, let us say that the sensor 2 is a CCD made up of the multiple detecting elements 2-1 disposed on the plane thereof, such as shown in FIG. 245.

With the example in FIG. 245, the direction in parallel with a predetermined side of the detecting elements 2-1 is taken as the X direction serving as one direction of the spatial directions, and the direction orthogonal to the X direction is taken as the Y direction serving as the other direction of the spatial directions. The direction orthogonal to the X-Y plane is taken as the t direction serving as the temporal direction.

Also, with the example in FIG. 245, the spatial shape of the respective detecting elements 2-1 of the sensor 2 is taken as a square of which one side is 1 in length. The shutter time (exposure time) of the sensor 2 is taken as 1.

Further, with the example in FIG. 245, the center of one certain detecting element 2-1 of the sensor 2 is taken as the origin (the position in the X direction is x=0, and the position in the Y direction is y=0) in the spatial directions (X direction and Y direction), and also the intermediate point-in-time of the exposure time is taken as the origin (the position in the t direction is t=0) in the temporal direction (t direction).

In this case, the detecting element 2-1 of which the center is in the origin (x=0, y=0) in the spatial directions subjects the light signal function F(x, y, t) to integration with a range of −0.5 through 0.5 in the X direction, with a range of −0.5 through 0.5 in the Y direction, and with a range of −0.5 through 0.5 in the t direction, and outputs the integral value as the pixel value P.

That is to say, the pixel value P output from the detecting element 2-1 of which the center is in the origin in the spatial directions is represented with the following Expression (149).

$$P=\int_{-0.5}^{+0.5}\int_{-0.5}^{+0.5}\int_{-0.5}^{+0.5}F(x,y,t)\,dx\,dy\,dt \tag{149}$$

Similarly, the other detecting elements 2-1 output the pixel value P shown in Expression (149) by taking the center of the detecting element 2-1 to be processed as the origin in the spatial directions.

Incidentally, as described above, with the three-dimensional function approximating method, the light signal function F(x, y, t) is approximated to the three-dimensional approximation function f(x, y, t).

Specifically, for example, the approximation function f(x, y, t) is taken as a function having N variables (features), a relational expression between the input pixel values P(x, y, t) corresponding to Expression (149) and the approximation function f(x, y, t) is defined. Thus, in the event that M input pixel values P (x, y, t) more than N are acquired, N variables (features) can be calculated from the defined relational expression. That is to say, the actual world estimating unit 102 can estimate the light signal function F(x, y, t) by acquiring M input pixel values P(x, y, t), and calculating N variables (features).

In this case, the actual world estimating unit 102 extracts (acquires) M input images P (x, y, t), of the entire input image by using continuity of data included in an input image (input pixel values) from the sensor 2 as a constraint (i.e., using data continuity information as to an input image to be output from the data continuity detecting unit 101). As a result, the prediction function f(x, y, t) is constrained by continuity of data.

For example, as shown in FIG. 246, in the event that the light signal function F(x, y, t) corresponding to an input image has continuity in the spatial direction represented with the gradient $G_F$, the data continuity detecting unit 101 results in outputting the angle θ (the angle θ generated between the direction of continuity of data represented with the gradient $G_f$ (not shown) corresponding to the gradient $G_F$, and the X direction) as data continuity information as to the input image.

In this case, let us say that a one-dimensional waveform wherein the light signal function F(x, y, t) is projected in the X direction (such a waveform is referred to as an X cross-sectional waveform here) has the same form even in the event of projection in any position in the Y direction.

That is to say, let us say that there is an X cross-sectional waveform having the same form, which is a two-dimensional (spatial directional) waveform continuous in the direction of continuity (angle θ direction as to the X direction), and a three-dimensional waveform wherein such a two-dimensional waveform continues in the temporal direction t, is approximated with the approximation function f(x, y, t).

In other words, an X cross-sectional waveform, which is shifted by a position y in the Y direction from the center of the pixel of interest, becomes a waveform wherein the X cross-sectional waveform passing through the center of the pixel of interest is moved (shifted) by a predetermined amount (amount varies according to the angle θ) in the X direction. Note that hereafter, such an amount is referred to as a shift amount.

This shift amount can be calculated as follows.

That is to say, the gradient $V_f$ (for example, gradient $V_f$ representing the direction of data continuity corresponding to the gradient $V_F$ in FIG. 246) and angle θ are represented as the following Expression (150).

$$G_f = \tan\theta = \frac{dy}{dx} \quad (150)$$

Note that in Expression (150), dx represents the amount of fine movement in the X direction, and dy represents the amount of fine movement in the Y direction as to the dx.

Accordingly, if the shift amount as to the X direction is described as $C_x$ (y), this is represented as the following Expression (151).

$$C_x(y) = \frac{y}{G_f} \quad (151)$$

If the shift amount $C_x$ (y) is thus defined, a relational expression between the input pixel values P (x, y, t) corresponding to Expression (149) and the approximation function f(x, y, t) is represented as the following Expression (152).

$$P(x, y, t) = \int_{t_s}^{t_e}\int_{y_s}^{y_e}\int_{x_s}^{x_e} f(x, y, t)\,dx\,dy\,dt + e \quad (152)$$

In Expression (152), e represents a margin of error. $t_s$ represents an integration start position in the t direction, and $t_e$ represents an integration end position in the t direction. In the same way, $Y_s$ represents an integration start position in the Y direction, and $Y_e$ represents an integration end position in the Y direction. Also, $x_s$ represents an integration start position in the X direction, and $x_e$ represents an integration end position in the X direction. However, the respective specific integral ranges are as shown in the following Expression (153).

$$\begin{aligned} t_s &= t - 0.5 \\ t_e &= t + 0.5 \\ y_s &= y - 0.5 \\ y_e &= y + 0.5 \\ x_s &= x - C_x(y) - 0.5 \\ x_e &= x - C_x(y) + 0.5 \end{aligned} \quad (153)$$

As shown in Expression (153), it can be represented that an X cross-sectional waveform having the same form continues in the direction of continuity (angle θ direction as to the X direction) by shifting an integral range in the X direction as to a pixel positioned distant from the pixel of interest by (x, y) in the spatial direction by the shift amount $C_x$ (Y).

Thus, with the three-dimensional function approximating method, the relation between the pixel values P (x, y, t) and the three-dimensional approximation function f(x, y, t) can be represented with Expression (152) (Expression (153) for the integral range), and accordingly, the light signal function F(x, y, t) (for example, a light signal having continuity in the spatial direction represented with the gradient $V_F$ such as shown in FIG. 246) can be estimated by calculating the N features of the approximation function f(x, y, t), for example, with the least square method using Expression (152) and Expression (153).

Note that in the event that a light signal represented with the light signal function F(x, y, t) has continuity in the spatial direction represented with the gradient $V_F$ such as shown in FIG. 246, the light signal function F(x, y, t) may be approximated as follows.

That is to say, let us say that a one-dimensional waveform wherein the light signal function F(x, y, t) is projected in the Y direction (hereafter, such a waveform is referred to as a Y cross-sectional waveform) has the same form even in the event of projection in any position in the X direction.

In other words, let us say that there is a two-dimensional (spatial directional) waveform wherein a Y cross-sectional waveform having the same form continues in the direction of continuity (angle θ direction as to in the X direction), and a three-dimensional waveform wherein such a two-dimensional waveform continues in the temporal direction t is approximated with the approximation function f(x, y, t).

Accordingly, the Y cross-sectional waveform, which is shifted by x in the X direction from the center of the pixel of interest, becomes a waveform wherein the Y cross-sectional waveform passing through the center of the pixel of interest is moved by a predetermined shift amount (shift amount changing according to the angle θ) in the Y direction.

This shift amount can be calculated as follows.

That is to say, the gradient $G_F$ is represented as the above Expression (150), so if the shift amount as to the Y direction is described as $C_y$ (x), this is represented as the following Expression (154).

$$C_y(x) = G_f \times x \quad (154)$$

If the shift amount $C_x$ (y) is thus defined, a relational expression between the input pixel values P (x, y, t) corresponding to Expression (149) and the approximation function f(x, y, t) is represented as the above Expression (152), as with when the shift amount $C_x$ (y) is defined.

However, in this case, the respective specific integral ranges are as shown in the following Expression (155).

$$\begin{aligned} t_s &= t - 0.5 \\ t_e &= t + 0.5 \\ y_s &= y - C_y(x) - 0.5 \\ y_e &= y - C_y(x) + 0.5 \\ x_s &= x - 0.5 \\ x_e &= x + 0.5 \end{aligned} \quad (155)$$

As shown in Expression (155) (and the above Expression (152)), it can be represented that a Y cross-sectional waveform having the same form continues in the direction of continuity (angle θ direction as to the X direction) by shifting an integral range in the Y direction as to a pixel positioned distant from the pixel of interest by (x, y), by the shift amount $C_x$ (y).

Thus, with the three-dimensional function approximating method, the integral range of the right side of the above Expression (152) can be set to not only Expression (153) but also Expression (155), and accordingly, the light signal function F(x, y, t) (light signal in the actual world 1 having continuity in the spatial direction represented with the gradient $G_F$) can be estimated by calculating the n features of the approximation function f(x, y, t) with, for example, the least square method or the like using Expression (152) in which Expression (155) is employed as an integral range.

Thus, Expression (153) and Expression (155), which represent an integral range, represent essentially the same with only a difference regarding whether perimeter pixels are shifted in the X direction (in the case of Expression (153)) or shifted in the Y direction (in the case of Expression (155)) in response to the direction of continuity.

However, in response to the direction of continuity (gradient $G_F$), there is a difference regarding whether the light signal function F(x, y, t) is regarded as a group of X cross-sectional waveforms, or is regarded as a group of Y cross-sectional waveforms. That is to say, in the event that the direction of continuity is close to the Y direction, the light signal function F(x, y, t) is preferably regarded as a group of X cross-sectional waveforms. On the other hand, in the event that the direction of continuity is close to the X direction, the light signal function F(x, y, t) is preferably regarded as a group of Y cross-sectional waveforms.

Accordingly, it is preferable that the actual world estimating unit 102 prepares both Expression (153) and Expression (155) as an integral range, and selects any one of Expression (153) and Expression (155) as the integral range of the right side of the appropriate Expression (152) in response to the direction of continuity.

Description has been made regarding the three-dimensional function method in the case in which the light signal function F(x, y, t) has continuity (for example, continuity in the spatial direction represented with the gradient $G_F$ in FIG. 246) in the spatial directions (X direction and Y direction), but the three-dimensional function method can be applied to the case in which the light signal function F(x, y, t) has continuity (continuity represented with the gradient $V_F$) in the temporal and spatial directions (X direction, Y direction, and t direction), as shown in FIG. 247.

That is to say, in FIG. 247, a light signal function corresponding to a frame #N−1 is taken as F (x, y, #N−1), a light signal function corresponding to a frame #N is taken as F (x, y, #N), and a light signal function corresponding to a frame #N+1 is taken as F (x, y, #N+1).

Note that in FIG. 247, the horizontal direction is taken as the X direction serving as one direction of the spatial directions, the upper right diagonal direction is taken as the Y direction serving as the other direction of the spatial directions, and also the vertical direction is taken as the t direction serving as the temporal direction in the drawing.

Also, the frame #N−1 is a frame temporally prior to the frame #N, the frame #N+1 is a frame temporally following the frame #N. That is to say, the frame #N−1, frame #N, and frame #N+1 are displayed in the sequence of the frame #N−1, frame #N, and frame #N+1.

With the example in FIG. 247, a cross-sectional light level along the direction shown with the gradient $V_F$ (upper right inner direction from lower left near side in the drawing) is regarded as generally constant. Accordingly, with the example in FIG. 247, it can be said that the light signal function F(x, y, t) has continuity in the temporal and spatial directions represented with the gradient $V_F$.

In this case, in the event that a function C (x, y, t) representing continuity in the temporal and spatial directions is defined, and also the integral range of the above Expression (152) is defined with the defined function C (x, y, t), N features of the approximation function f(x, y, t) can be calculated as with the above Expression (153) and Expression (155).

The function C (x, y, t) is not restricted to a particular function as long as this is a function representing the direction of continuity. However, hereafter, let us say that linear continuity is employed, and $C_x$ (t) and $C_y$ (t) corresponding to the shift amount $C_x$(y) (Expression (151)) and shift amount $C_y$ (x) (Expression (153)), which are functions representing continuity in the spatial direction described above, are defined as a function C(x, y, t) corresponding thereto as follows.

That is to say, if the gradient as continuity of data in the temporal and spatial directions corresponding to the gradient $G_f$ representing continuity of data in the above spatial direction is taken as $V_f$, and if this gradient $V_f$ is divided into the gradient in the X direction (hereafter, referred to as $V_{fx}$) and the gradient in the Y direction (hereafter, referred to as $V_{fy}$), the gradient $V_{fx}$ is represented with the following Expression (156), and the gradient $V_{fy}$ is represented with the following Expression (157), respectively.

$$V_{fx} = \frac{dx}{dt} \tag{156}$$

$$V_{fy} = \frac{dy}{dt} \tag{157}$$

In this case, the function $C_x$ (t) is represented as the following Expression (158) using the gradient $V_{fx}$ shown in Expression (156).

$$C_x(t) = V_{fx} \times t \tag{158}$$

Similarly, the function $C_y$ (t) is represented as the following Expression (159) using the gradient $V_{fy}$ shown in Expression (157).

$$C_y(t) = V_{fy} \times t \tag{159}$$

Thus, upon the function $C_x$ (t) and function $C_y$ (t), which represent continuity 2511 in the temporal and spatial directions, being defined, the integral range of Expression (152) is represented as the following Expression (160).

$$\begin{aligned} t_s &= t - 0.5 \\ t_e &= t + 0.5 \\ y_s &= y - C_y(t) - 0.5 \\ y_e &= y - C_y(t) + 0.5 \\ x_s &= x - C_x(t) - 0.5 \\ x_e &= x - C_x(t) + 0.5 \end{aligned} \tag{160}$$

Thus, with the three-dimensional function approximating method, the relation between the pixel values P (x, y, t) and the three-dimensional approximation function f(x, y, t) can be represented with Expression (152), and accordingly, the light signal function F(x, y, t) (light signal in the actual world 1 having continuity in a predetermined direction of the temporal and spatial directions) can be estimated by calculating the n+1 features of the approximation function f(x, y, t) with, for example, the least square method or the like using Expression (160) as the integral range of the right side of Expression (152).

FIG. 248 represents a configuration example of the actual world estimating unit 102 employing such a three-dimensional function approximating method.

Note that the approximation function f(x, y, t) (in reality, the features (coefficients) thereof) calculated by the actual world estimating unit 102 employing the three-dimensional function approximating method is not restricted to a particular function, but an n (n=N−1)-dimensional polynomial is employed in the following description.

As shown in FIG. 248, the actual world estimating unit 102 includes a conditions setting unit 2521, input image storage unit 2522, input pixel value acquiring unit 2523, integral component calculation unit 2524, normal equation generating unit 2525, and approximation function generating unit 2526.

The conditions setting unit 2521 sets a pixel range (tap range) used for estimating the light signal function F(x, y, t) corresponding to a pixel of interest, and the number of dimensions n of the approximation function f(x, y, t).

The input image storage unit 2522 temporarily stores an input image (pixel values) from the sensor 2.

The input pixel acquiring unit 2523 acquires, of the input images stored in the input image storage unit 2522, an input image region corresponding to the tap range set by the conditions setting unit 2521, and supplies this to the normal equation generating unit 2525 as an input pixel value table. That is to say, the input pixel value table is a table in which the respective pixel values of pixels included in the input image region are described.

Incidentally, as described above, the actual world estimating unit 102 employing the three-dimensional function approximating method calculates the N features (in this case, coefficient of each dimension) of the approximation function f(x, y) with the least square method using the above Expression (152) (however, Expression (153), Expression (156), or Expression (160) for the integral range).

The right side of Expression (152) can be represented as the following Expression (161) by calculating the integration thereof.

$$P(x, y, t) = \sum_{i=0}^{n} w_i S_i(x_s, x_e, y_s, y_e, t_s, t_e) + e \tag{161}$$

In Expression (161), $w_i$ represents the coefficients (features) of the i-dimensional term, and also $S_i$ $(x_s, x_e, y_s, y_e, t_s, t_e)$ represents the integral components of the i-dimensional term. However, $x_s$ represents an integral range start position in the X direction, $x_e$ represents an integral range end position in the X direction, $y_s$ represents an integral range start position in the Y direction, $y_e$ represents an integral range end position in the Y direction, $t_s$ represents an integral range start position in the t direction, $t_e$ represents an integral range end position in the t direction, respectively.

The integral component calculation unit 2524 calculates the integral components $S_i$ $(x_s, x_e, y_s, y_e, t_s, t_e)$.

That is to say, the integral component calculation unit 2524 calculates the integral components $S_i$ $(x_s, x_e, y_s, y_e, t_s, t_e)$ based on the tap range and the number of dimensions set by the conditions setting unit 2521, and the angle or movement (as the integral range, angle in the case of using the above Expression (153) or Expression (156), and movement in the case of using the above Expression (160)) of the data continuity information output from the data continuity detecting unit 101, and supplies the calculated results to the normal equation generating unit 2525 as an integral component table.

The normal equation generating unit 2525 generates a normal equation in the case of obtaining the above Expression (161) with the least square method using the input pixel value table supplied from the input pixel value acquiring unit 2523, and the integral component table supplied from the integral component calculation unit 2524, and outputs this to the approximation function generating unit 2526 as a normal equation table. An example of a normal equation will be described later.

The approximation function generating unit 2526 calculates the respective features $w_i$ (in this case, the coefficients $w_i$ of the approximation function f(x, y) serving as a three-dimensional polynomial) by solving the normal equation included in the normal equation table supplied from the normal equation generating unit 2525 with the matrix solution, and output these to the image generating unit 103.

Next, description will be made regarding the actual world estimating processing (processing in step S102 in FIG. 40) to which the three-dimensional function approximating method is applied, with reference to the flowchart in FIG. 249.

First, in step S2501, the conditions setting unit 2521 sets conditions (a tap range and the number of dimensions).

For example, let us say that a tap range made up of L pixels has been set. Also, let us say that a predetermined number l (l is any one of integer values θ through L−1) is appended to each of the pixels.

Next, in step S2502, the conditions setting unit 2521 sets a pixel of interest.

In step S2503, the input pixel value acquiring unit 2523 acquires an input pixel value based on the condition (tap range) set by the conditions setting unit 2521, and generates an input pixel value table. In this case, a table made up of L input pixel values P (x, y, t) is generated. Here, let us say that each of the L input pixel values P (x, y, t) is described as P (l) serving as a function of the number l of the pixel thereof. That is to say, the input pixel value table becomes a table including L P (l).

In step S2504, the integral component calculation unit 2524 calculates integral components based on the conditions (a tap range and the number of dimensions) set by the conditions setting unit 2521, and the data continuity information (angle or movement) supplied from the data continuity detecting unit 101, and generates an integral component table.

However, in this case, as described above, the input pixel values are not P (x, y, t) but P (l), and are acquired as the value of a pixel number l, so the integral component calculation unit 2524 results in calculating the integral components $S_i$ $(x_s, x_e, y_s, y_e, t_s, t_e)$ in the above Expression (161) as a function of l such as the integral components $S_i$ (l). That is to say, the integral component table becomes a table including L×i $S_i$(l).

Note that the sequence of the processing in step S2503 and the processing in step S2504 is not restricted to the example in FIG. 249, so the processing in step S2504 may be executed first, or the processing in step S2503 and the processing in step S2504 may be executed simultaneously.

Next, in step S2505, the normal equation generating unit 2525 generates a normal equation table based on the input pixel value table generated by the input pixel value acquiring unit 2523 at the processing in step S2503, and the integral component table generated by the integral component calculation unit 2524 at the processing in step S2504.

Specifically, in this case, the features $w_i$ of the following Expression (162) corresponding to the above Expression (161) are calculated using the least square method. A normal equation corresponding to this is represented as the following Expression (163).

$$P(l) = \sum_{i=0}^{n} w_i S_i(l) + e \tag{162}$$

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \tag{163}$$

If we define each matrix of the normal equation shown in Expression (163) as the following Expressions (164) through (166), the normal equation is represented as the following Expression (167).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \tag{164}$$

$$W_{MAT} = \begin{pmatrix} w_0 \\ w_1 \\ \vdots \\ w_N \end{pmatrix} \tag{165}$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \tag{166}$$

$$S_{MAT} W_{MAT} = P_{MAT} \tag{167}$$

As shown in Expression (165), the respective components of the matrix $W_{MAT}$ are the features $w_i$ to be obtained. Accordingly, in Expression (167), if the matrix $S_{MAT}$ of the left side and the matrix $P_{MAT}$ of the right side are determined, the matrix $W_{MAT}$ (i.e., features $w_i$) may by be calculated with the matrix solution.

Specifically, as shown in Expression (164), the respective components of the matrix $S_{MAT}$ may be calculated as long as the above integral components $S_i$ (l) are known. The integral components $S_i$ (l) are included in the integral component table supplied from the integral component calculation unit 2524, so the normal equation generating unit 2525 can calculate each component of the matrix $S_{MAT}$ using the integral component table.

Also, as shown in Expression (166), the respective components of the matrix $P_{MAT}$ may be calculated as long as the integral components $S_i$ (l) and the input pixel values P (l) are known. The integral components $S_i$ (l) is the same as those included in the respective components of the matrix $S_{MAT}$, also the input pixel values P(l) are included in the input pixel value table supplied from the input pixel value acquiring unit 2523, so the normal equation generating unit 2525 can calculate each component of the matrix $P_{MAT}$ using the integral component table and input pixel value table.

Thus, the normal equation generating unit 2525 calculates each component of the matrix $S_{MAT}$ and matrix $P_{MAT}$, and outputs the calculated results (each component of the matrix $S_{MAT}$ and matrix $P_{MAT}$) to the approximation function generating unit 2526 as a normal equation table.

Upon the normal equation table being output from the normal equation generating unit 2526, in step S2506, the approximation function generating unit 2526 calculates the features $w_i$ (i.e., the coefficients $w_i$ of the approximation function f(x, y, t)) serving as the respective components of the matrix $W_{MAT}$ in the above Expression (167) based on the normal equation table.

Specifically, the normal equation in the above Expression (167) can be transformed as the following Expression (168).

$$W_{MAT} = S_{MAT}^{-1} P_{MAT} \tag{168}$$

In Expression (168), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 2525. Accordingly, the approximation function generating unit 2526 calculates the matrix $W_{MAT}$ by calculating the matrix in the right side of Expression (168) using the normal equation table, and outputs the calculated results (features $w_i$) to the image generating unit 103.

In step S2507, the approximation function generating unit 2526 determines regarding whether or not the processing of all the pixels has been completed.

In step S2507, in the event that determination is made that the processing of all the pixels has not been completed, the processing returns to step S2502, wherein the subsequent processing is repeatedly performed. That is to say, the pixels that have not become a pixel of interest are sequentially taken as a pixel of interest, and the processing in step S2502 through S2507 is repeatedly performed.

In the event that the processing of all the pixels has been completed (in step S5407, in the event that determination is made that the processing of all the pixels has been completed), the estimating processing of the actual world 1 ends.

As described above, the three-dimensional function approximating method takes three-dimensional integration effects in the temporal and spatial directions into consideration instead of one-dimensional or two-dimensional integration effects, and accordingly, can estimate the light signals in the actual world 1 more accurately than the one-dimensional polynomial approximating method and two-dimensional polynomial approximating method.

In other words, with the three-dimensional function approximating method, for example, the actual world estimating unit 102 in FIG. 219 (FIG. 3) (for example, FIG. 248 for configuration) estimates the light signal function F by approximating the light signal function F representing the light signal in the actual world (specifically, for example, the light signal function F(x, y, t) in FIG. 246 and FIG. 247) with a predetermined approximation function f(specifically, for example, the approximation function f(x, y, t) in the right side of Expression (152)), on condition that the multiple detecting elements of the sensor (for example, detecting elements 2-1 of the sensor 2 in FIG. 245) each having time-space integration effects project the light signals in the actual world 1, of the input image made up of multiple pixels having a pixel value projected by the detecting elements, which drop part of continuity (for example, continuity represented with the gradient $G_F$ in FIG. 246, or represented with the gradient $V_F$ in FIG. 247) of the light signal in the actual world 1, the above pixel value (for example, input pixel values P (x, y, z) in the left side of Expression (153)) of the above pixel corresponding to at least a position in the one-dimensional direction (for example, three-dimensional directions of the spatial direction X, spatial direction Y, and temporal direction t in FIG. 247) of the time-space directions is a pixel value (for example, a value obtained by the approximation function f(x, y, t) being integrated in three dimensions of the X direction, Y direction, and t direction, such as shown in the right side of the above Expression (153)) acquired by at least integration effects in the one-dimensional direction.

Further, for example, in the event that the data continuity detecting unit 101 in FIG. 219 (FIG. 3) detects continuity of input image data, the actual world estimating unit 102 estimates the light signal function F by approximating the light signal function F with the approximation function f on condition that the pixel value of a pixel corresponding to at least a position in the one-dimensional direction of the time-space directions of the image data corresponding to continuity of data detected by the data continuity detecting unit 101 is the pixel value acquired by at least integration effects in the one-dimensional direction.

Speaking in detail, for example, the actual world estimating unit 102 estimates the light signal function by approximating the light signal function F with the approximation function f on condition that the pixel value of a pixel corresponding to a distance (for example, shift amounts $C_x$ (y) in the above Expression (151)) along at least in the one-dimensional direction from a line corresponding to continuity of data detected by the continuity detecting unit 101 is the pixel value (for example, a value obtained by the approximation function f(x, y, t) being integrated in three dimensions of the X direction, Y direction, and t direction, such as shown in the right side of Expression (152) with an integral range such as shown in the above Expression (153)) acquired by at least integration effects in the one-dimensional direction.

Accordingly, the three-dimensional function approximating method can estimate the light signals in the actual world 1 more accurately.

Next, description will be made regarding another example of an extracting method for extracting the data 162 in the case of the actual world estimating unit 102 approximating the actual world 1 signals having continuity with the model 161, with reference to FIG. 250 through FIG. 259.

With the following example, the pixel value of each pixel to which weight according to the level of importance of each pixel is added is extracted, the extracted value is used as the data 162 (FIG. 7), and the actual world 1 signals are approximated with the model 161 (FIG. 7).

Specifically, for example, let us say that an input image 2701 such as shown in FIG. 250 is input to the actual world estimating unit 102 (FIG. 3) as an input image from the sensor 2 (FIG. 1).

In FIG. 250, the horizontal axis in the drawing represents the X-direction which is one spatial direction, and the vertical direction in the drawing represents the Y-direction which is another spatial direction.

Also, the input image 2701 is made up of pixel values (expressed with the hatched line in the drawing, but actually, data having one value) of 7×16 pixels (square in the drawing) each having pixel widths (vertical width and horizontal width) $L_c$.

A pixel of interest is taken as a pixel having a pixel value 2701-1 (hereafter, the pixel having the pixel value 2701-1 is referred to as a pixel of interest 2701-1), and the direction of data continuity in the pixel of interest 2701-1 is expressed with a gradient $G_f$.

FIG. 251 illustrates the difference between the level of the actual world 1 light signals at the center of the pixel of interest 2701-1 and the level of the actual world 1 light signals in a cross-sectional direction distance x' (hereafter, referred to as difference of levels). That is to say, the axis in the horizontal direction in the drawing represents the cross-sectional direction distance x', and the axis in the vertical direction in the drawing represents difference of levels. Note that the numeric values in the axis in the horizontal direction are appended with the pixel widths $L_c$ as 1 in length.

Now, description will be made regarding the cross-sectional direction distance x' with reference to FIG. 252 and FIG. 253.

FIG. 252 illustrates a 5×5 pixel block centered on the pixel of interest 2701-1, of the input image 2701 shown in FIG. 250. In FIG. 252 as well, as with FIG. 250, the horizontal axis in the drawing represents the X-direction which is one spatial direction, and the vertical direction in the drawing represents the Y-direction which is another spatial direction.

At this time, for example, if we say that the center of the pixel of interest 2701-1 is taken as the origin (0, 0) in the spatial directions, and a straight line, which passes through the origin, in parallel with the direction of data continuity (with the example shown in FIG. 252, the direction of data continuity represented with the gradient $G_f$) is drawn, the relative distance in the X direction as to the straight line is referred to as the cross-sectional direction distance x'. With the example shown in FIG. 252, the cross-sectional direction distance x' in the center point of the pixel 2701-2 two pixels apart from the pixel of interest 2701-1 in the Y direction is illustrated.

FIG. 253 is a figure representing the cross-sectional direction distance of each pixel within the block shown in FIG. 252 of the input image 2701 shown in FIG. 250. That is to say, in FIG. 253, the value marked within each pixel in the input image 2701 (square region of 5×5=25 pixels in the drawing) represents the cross-sectional direction distance at the corresponding pixel. For example, the cross-sectional direction distance $X_n$' at the pixel 2701-2 is −2β.

Note that, as described above, each pixel widths $L_c$ are defined with the pixel width of 1 in both the X-direction and the Y-direction. Furthermore, the X-direction is defined with the positive direction matching the right direction in the drawing. Also, β represents the cross-sectional direction distance at the pixel 2701-3 adjacent to the pixel of interest 2701-1 in the Y-direction (adjacent thereto downward in the drawing). In the event that the data continuity detecting unit 101 supplies the angle θ (the angle θ between the direction of data continuity represented with the gradient $G_f$ and the X-direction) as shown in FIG. 253 as the data continuity information, and accordingly, this value β can be obtained with ease using the following Expression (169).

$$\beta = \frac{1}{\tan\theta} \tag{169}$$

Now, description will return to FIG. 251. It is difficult to draw actual difference of levels, so with the example shown in FIG. 251, a higher-resolution image (not shown) than the input image 2701, corresponding to the input image 2701 shown in FIG. 250, is created beforehand. Of the pixels in the high-resolution image, the difference between the pixel value of the pixel (the pixel of the high-resolution image) positioned on the general center of the pixel of interest 2701-1 of the input image 2701 and each pixel (the pixel of the high-resolution image) positioned on the straight line, which is a straight line in parallel with the spatial direction X, passing through the center of the pixel of interest 2701-1 of the input image 2701 is plotted as difference of levels.

In FIG. 251, as shown with the difference of levels plotted, the region (hereafter, such a region is referred to as a continuity region in the description of weighting) having data continuity represented with the gradient $G_f$ exists in a range between around −0.5 and around 1.5 of the cross-sectional direction distance x'.

Accordingly, the smaller cross-sectional direction distance x' a pixel (the pixel of the input image 2701) has, the higher probability of including the continuity region is. That is to say, we can say that the pixel value of the pixel (the pixel of the input image 2701) of which the cross-sectional direction distance x' is small is high in the level of importance as the data 162 in the event that the actual world estimating unit 102 approximates the actual world 1 signals having continuity with the model 161.

Conversely, the greater cross-sectional direction distance x' a pixel (the pixel of the input image 2701) has, the lower probability of including the continuity region is. That is to say, we can say that the pixel value of the pixel (the pixel of the input image 2701) of which the cross-sectional direction distance x' is great is low in the level of importance as the data 162 in the event that the actual world estimating unit 102 approximates the actual world 1 signals having continuity with the model 161.

The above relationship of level of importance can be adapted to all of the input images from the sensor 2 (FIG. 1) as well as the input image 2701.

To this end, in the event of approximating the actual world 1 signals having continuity with the model 161, the actual world estimating unit 102 subjects the pixel value of each pixel (the pixel of the input image from the sensor 2) to weighting according to the cross-sectional direction distance x' thereof to extract the weighted pixel value, and the extracted value (weighted pixel value) can be employed as the data 162. That is to say, in the event that the pixel value of the input image is extracted as the data 162, the pixel value is extracted such that the greater the cross-sectional direction distance x' thereof is, the smaller the weight thereof is, as shown in FIG. 251.

Further, as shown in FIG. 254, in the event of approximating the actual world 1 signals having continuity with the model 161, the actual world estimating unit 102 subjects the pixel value of each pixel (the pixel of the input image from the sensor 2, the pixel of the input image 2701 in the example shown in FIG. 254) to weighting according to the spatial correlation thereof (i.e., according to the distance of the direction of continuity represented with the gradient $G_f$ from the pixel of interest 2701-1) to extract the weighted pixel value, and the extracted value (weighted pixel value) can be employed as the data 162. That is to say, in the event that the pixel value of the input image is extracted as the data 162, the pixel value is extracted such that the smaller the spatial correlation thereof is (the greater the distance of the direction of continuity represented with the gradient $G_f$), the smaller the weight thereof is, as shown in FIG. 254. Note that FIG. 254 illustrates the same input image 2701 as that shown in FIG. 250.

With the above two types of weighting (weighting shown in FIG. 251 and weighting shown in FIG. 254), either one may be employed, or both may be employed simultaneously. Note that in the event that both are employed simultaneously, a finally employed weight calculating method is not restricted to any particular one. For example, as final weight, the product of both weight may be employed, or the weight corrected according to the distance of direction of data continuity represented with the gradient $G_f$ as to the weight determined by the weighting shown in FIG. 251 may be employed (e.g., each time the distance of direction of data continuity increases by 1, the weight decreases by a predetermined value).

The actual world estimating unit 102 extracts the pixel value of each pixel using the weight thus determined, and employs the weighted pixel value as the data 162, thereby enabling the model 161 closer to the actual world 1 signal to be generated.

Specifically, for example, the actual world estimating unit 102 can estimate the actual world 1 signals by computing the features of an approximation function serving as the model 161 (i.e., each component of the matrix $W_{MAT}$) using an normal equation represented with $S_{MAT}W_{MAT}=P_{MAT}$ (i.e., the least square method) as well, as described above.

In this case, of the input image, if we say that the weight corresponding to each pixel having a pixel number l (l is any integer number of 1 through M) is written as $v_l$, the actual world estimating unit 102 can use the matrix shown in the following Expression (170) as the matrix $S_{MAT}$, and also use the matrix shown in the following Expression (171) as the matrix $P_{MAT}$.

$$S_{MAT} = \begin{pmatrix} \sum_{j=1}^{M} v_j S_1(j)S_1(j) & \sum_{j=1}^{M} v_j S_1(j)S_2(j) & \cdots & \sum_{j=1}^{M} v_j S_1(j)S_N(j) \\ \sum_{j=1}^{M} v_j S_2(j)S_1(j) & \sum_{j=1}^{M} v_j S_2(j)S_1(j) & \cdots & \sum_{j=1}^{M} v_j S_2(j)S_N(j) \\ \vdots & \vdots & \ddots & \vdots \\ \sum_{j=1}^{M} v_j S_N(j)S_1(j) & \sum_{j=1}^{M} v_j S_N(j)S_1(j) & \cdots & \sum_{j=1}^{M} v_j S_N(j)S_N(j) \end{pmatrix} \tag{170}$$

-continued $$P_{MAT} = \begin{pmatrix} \sum_{j=1}^{M} v_j S_1(j) P_j(j) \\ \sum_{j=1}^{M} v_j S_2(j) P_j(j) \\ \vdots \\ \sum_{j=1}^{M} v_j S_N(j) P_j(j) \end{pmatrix} \quad (171)$$

Thus, the actual world estimating unit 102, which employs the least square method such as the above function approximation technique (FIG. 219), can compute the features of the approximation function closer to the actual world 1 signals by using the matrices including weight (i.e., the above Expression (170) and above Expression (171)) as compared to the case of using the matrix shown in the above Expression (13) as the matrix $S_{MAT}$, and also using the matrix shown in the above Expression (15) as the matrix $P_{MAT}$.

That is to say, the actual world estimating unit 102, which employs the least square method, can compute the features of the approximation function closer to the actual world 1 signals by further executing the above weighting processing (as a matrix used in a normal equation, such as shown in Expression (170) and Expression (171), simply by using the matrices including the weight $v_l$) without changing the configuration thereof.

Specifically, for example, FIG. 255 illustrates an example of an image generated by the actual world estimating unit 102 generating an approximation function using the matrices not including the weight $v_l$ (e.g., the above Expression (13) and Expression (15)) as matrices in a normal equation (computing the features of an approximation function), and the image generating unit 103 (FIG. 3) reintegrating the approximation function.

On the other hand, FIG. 256 illustrates an example of an image (image corresponding to FIG. 255) generated by the actual world estimating unit 102 generating an approximation function using the matrices including the weight $v_l$ (e.g., the above Expression (170) and Expression (171)) as matrices in a normal equation (computing the features of an approximation function), and the image generating unit 103 reintegrating the approximation function.

When comparing the image shown in FIG. 255 with the image shown in FIG. 256, for example, both an image region 2711 shown in FIG. 255 and an image region 2712 shown in FIG. 256 express a part of the tip of a fork (the same portion).

In the image region 2711 shown in FIG. 255, discontinuous multiple lines are displayed so as to be overlaid, but in the image region 2712 shown in FIG. 256, approximately one continuous line is displayed.

When considering that the tip of the fork is actually formed continuously (one continuous line as viewed from the eyes of a human), we can say that the image region 2712 shown in FIG. 256 reproduces the actual world 1 signals, i.e., the image of the tip of the fork truer than the image region 2711 shown in FIG. 255.

Also, FIG. 257 illustrates another example of an image (image different from FIG. 255) generated by the actual world estimating unit 102 generating an approximation function using the matrices not including the weight $v_l$ (e.g., the above Expression (13) and Expression (15)) as matrices in a normal equation (computing the features of an approximation function), and the image generating unit 103 reintegrating the approximation function.

Conversely, FIG. 258 illustrates another example of an image (image corresponding to FIG. 257, but an example different from the image shown in FIG. 256) generated by the actual world estimating unit 102 generating an approximation function using the matrices including the weight $v_l$ (e.g., the above Expression (170) and Expression (171)) as matrices in a normal equation (computing the features of an approximation function), and the image generating unit 103 reintegrating the approximation function.

When comparing the image shown in FIG. 257 with the image shown in FIG. 258, for example, both an image region 2713 shown in FIG. 257 and an image region 2714 shown in FIG. 258 express a part of a beam (the same portion).

In the image region 2713 shown in FIG. 257, discontinuous multiple lines are displayed so as to be overlaid, but in the image region 2714 shown in FIG. 258, approximately one continuous line is displayed.

When considering that the beam is actually formed continuously (one continuous line as viewed from the eyes of a human), we can say that the image region 2714 shown in FIG. 258 reproduces the actual world 1 signals, i.e., the image of the beam, truer than the image region 2713 shown in FIG. 257.

According to the above arrangement, continuity of data in image data made up of multiple pixels having a pixel value on which the real world light signals are projected by the multiple detecting elements of the sensor each having spatio-temporal integration effects, of which a part of continuity of the real world light signals has been dropped, is detected, weight is added to each pixel within the image data according to at least a distance in the one-dimensional direction of the time-space directions from a pixel of interest within the image data, corresponding to the detected continuity of data, assuming that the pixel values weighted of the pixels corresponding to positions in at least one dimensional direction are pixel values acquired by the integration effects in at least one dimensional direction, a first function representing the real world light signals is approximated with a second function serving as a polynomial, thereby estimating the first function, and accordingly, the image can be expressed in a truer manner.

Next, description will be made regarding an embodiment of the image generating unit 103 (FIG. 3) with reference to FIG. 259 through FIG. 280.

FIG. 259 is a diagram for describing the principle of the present embodiment.

As shown in FIG. 259, the present embodiment is based on condition that the actual world estimating unit 102 employs a function approximating method. That is to say, let us say that the signals in the actual world 1 (distribution of light intensity) serving as an image cast in the sensor 2 are represented with a predetermined function F, it is an assumption for the actual world estimating unit 102 to estimate the function F by approximating the function F with a predetermined function f using the input image (pixel value P) output from the sensor 2 and the data continuity information output from the data continuity detecting unit 101.

Note that hereafter, with description of the present embodiment, the signals in the actual world 1 serving as an image are particularly referred to as light signals, and the function F is particularly referred to as a light signal function F. Also, the function f is particularly referred to as an approximation function f.

With the present embodiment, the image generating unit 103 integrates the approximation function f with a predetermined time-space region using the data continuity information output from the data continuity detecting unit 101, and the actual world estimating information (in the example in FIG. 259, the features of the approximation function f) output from the actual world estimating unit 102 based on such an assumption, and outputs the integral value as an output pixel value M (output image). Note that with the present embodiment, an input pixel value is described as P, and an output pixel value is described as M in order to distinguish an input image pixel from an output image pixel.

In other words, upon the light signal function F being integrated once, the light signal function F becomes an input pixel value P, the light signal function F is estimated from the input pixel value P(approximated with the approximation function f), the estimated light signal function F(i.e., approximation function f) is integrated again, and an output pixel value M is generated. Accordingly, hereafter, integration of the approximation function f executed by the image generating unit 103 is referred to as reintegration. Also, the present embodiment is referred to as a reintegration method.

Note that as described later, with the reintegration method, the integral range of the approximation function f in the event that the output pixel value M is generated is not restricted to the integral range of the light signal function F in the event that the input pixel value P is generated (i.e., the vertical width and horizontal width of the detecting element of the sensor 2 for the spatial direction, the exposure time of the sensor 2 for the temporal direction), an arbitrary integral range may be employed.

For example, in the event that the output pixel value M is generated, varying the integral range in the spatial direction of the integral range of the approximation function f enables the pixel pitch of an output image according to the integral range thereof to be varied. That is to say, creation of spatial resolution is available.

In the same way, for example, in the event that the output pixel value M is generated, varying the integral range in the temporal direction of the integral range of the approximation function f enables creation of temporal resolution.

Hereafter, description will be made individually regarding three specific methods of such a reintegration method with reference to the drawings.

That is to say, three specific methods are reintegration methods corresponding to three specific methods of the function approximating method (the above three specific examples of the embodiment of the actual world estimating unit 102) respectively.

Specifically, the first method is a reintegration method corresponding to the above one-dimensional polynomial approximating method (one method of the function approximating method). Accordingly, with the first method, one-dimensional reintegration is performed, so hereafter, such a reintegration method is referred to as a one-dimensional reintegration method.

The second method is a reintegration method corresponding to the above two-dimensional polynomial approximating method (one method of the function approximating method). Accordingly, with the second method, two-dimensional reintegration is performed, so hereafter, such a reintegration method is referred to as a two-dimensional reintegration method.

The third method is a reintegration method corresponding to the above three-dimensional function approximating method (one method of the function approximating method). Accordingly, with the third method, three-dimensional reintegration is performed, so hereafter, such a reintegration method is referred to as a three-dimensional reintegration method.

Hereafter, description will be made regarding each details of the one-dimensional reintegration method, two-dimensional reintegration method, and three-dimensional reintegration method in this order.

First, the one-dimensional reintegration method will be described.

With the one-dimensional reintegration method, it is an assumption that the approximation function f(x) is generated using the one-dimensional polynomial approximating method.

That is to say, it is an assumption that a one-dimensional waveform (with description of the reintegration method, a waveform projected in the X direction of such a waveform is referred to as an X cross-sectional waveform F(x)) wherein the light signal function F(x, y, t) of which variables are positions x, y, and z on the three-dimensional space, and a point-in-time t is projected in a predetermined direction (for example, X direction) of the X direction, Y direction, and z direction serving as the spatial direction, and t direction serving as the temporal direction, is approximated with the approximation function f(x) serving as an n-dimensional (n is an arbitrary integer) polynomial.

In this case, with the one-dimensional reintegration method, the output pixel value M is calculated such as the following Expression (172).

$$M = G_e \times \int_{x_s}^{x_e} f(x)dx \tag{172}$$

Note that in Expression (172), $x_s$ represents an integration start position, $x_e$ represents an integration end position. Also, $G_e$ represents a predetermined gain.

Specifically, for example, let us say that the actual world estimating unit 102 has already generated the approximation function f(x) (the approximation function f(x) of the X cross-sectional waveform F(x)) such as shown in FIG. 260 with a pixel 3101 (pixel 3101 corresponding to a predetermined detecting element of the sensor 2) such as shown in FIG. 260 as a pixel of interest.

Note that with the example in FIG. 260, the pixel value (input pixel value) of the pixel 3101 is taken as P, and the shape of the pixel 3101 is taken as a square of which one side is 1 in length. Also, of the spatial directions, the direction in parallel with one side of the pixel 3101 (horizontal direction in the drawing) is taken as the X direction, and the direction orthogonal to the X direction (vertical direction in the drawing) is taken as the Y direction.

Also, on the lower side in FIG. 260, the coordinates system (hereafter, referred to as a pixel-of-interest coordinates system) in the spatial directions (X direction and Y direction) of which the origin is taken as the center of the pixel 3101, and the pixel 3101 in the coordinates system are shown.

Further, on the upward direction in FIG. 260, a graph representing the approximation function f(x) at y=0 (y is a coordinate value in the Y direction in the pixel-of-interest coordinates system shown on the lower side in the drawing) is shown. In this graph, the axis in parallel with the horizontal direction in the drawing is the same axis as the x axis in the X direction in the pixel-of-interest coordinates system shown on the lower side in the drawing (the origin is also the same), and also the axis in parallel with the vertical direction in the drawing is taken as an axis representing pixel values.

In this case, the relation of the following Expression (173) holds between the approximation function f(x) and the pixel value P of the pixel 3101.

$$P = \int_{-0.5}^{0.5} f(x)dx + e \tag{173}$$

Also, as shown in FIG. 260, let us say that the pixel 3101 has continuity of data in the spatial direction represented with the gradient $G_f$. Further, let us say that the data continuity detecting unit 101 (FIG. 259) has already output the angle θ such as shown in FIG. 260 as data continuity information corresponding to continuity of data represented with the gradient $G_f$.

In this case, for example, with the one-dimensional reintegration method, as shown in FIG. 261, four pixels 3111 through 3114 can be newly created in a range of −0.5 through 0.5 in the X direction, and also in a range of −0.5 through 0.5 in the Y direction (in the range where the pixel 3101 in FIG. 260 is positioned).

Note that on the lower side in FIG. 261, the same pixel-of-interest coordinates system as that in FIG. 260, and the pixels 3111 through 3114 in the pixel-of-interest coordinates system thereof are shown. Also, on the upper side in FIG. 261, the same graph (graph representing the approximation function f(x) at y=0) as that in FIG. 260 is shown.

Specifically, as shown in FIG. 261, with the one-dimensional reintegration method, calculation of the pixel value M(1) of the pixel 3111 using the following Expression (174), calculation of the pixel value M (2) of the pixel 3112 using the following Expression (175), calculation of the pixel value M (3) of the pixel 3113 using the following Expression (176), and calculation of the pixel value M (4) of the pixel 3114 using the following Expression (177) are available respectively.

$$M(1) = 2 \times \int_{x_{s1}}^{x_{e1}} f(x)dx \tag{174}$$

$$M(2) = 2 \times \int_{x_{s2}}^{x_{e2}} f(x)dx \tag{175}$$

$$M(3) = 2 \times \int_{x_{s3}}^{x_{e3}} f(x)dx \tag{176}$$

$$M(4) = 2 \times \int_{x_{s4}}^{x_{e4}} f(x)dx \tag{177}$$

Note that $x_{s1}$ in Expression (174), $x_{s2}$ in Expression (175), $x_{s3}$ in Expression (176), and $x_{s4}$ in Expression (177) each represent the integration start position of the corresponding expression. Also, $x_{e1}$ in Expression (174), $x_{e2}$ in Expression (175), $x_{e3}$ in Expression (176), and $x_{e4}$ in Expression (177) each represent the integration end position of the corresponding expression.

The integral range in the right side of each of Expression (174) through Expression (177) becomes the pixel width (length in the X direction) of each of the pixel 3111 through pixel 3114. That is to say, each of $x_{e1}-x_{s1}$, $x_{e2}-x_{s2}$, $x_{e3}-x_{s3}$, and $x_{e4}-x_{s4}$ becomes 0.5.

However, in this case, it can be conceived that a one-dimensional waveform having the same form as that in the approximation function f(x) at y=0 continues not in the Y direction but in the direction of data continuity represented with the gradient $G_f$ (i.e., angle θ direction) (in fact, a waveform having the same form as the X cross-sectional waveform F(x) at y=0 continues in the direction of continuity). That is to say, in the case in which a pixel value f (0) in the origin (0, 0) in the pixel-of-interest coordinates system in FIG. 261 (center of the pixel 3101 in FIG. 260) is taken as a pixel value f1, the direction where the pixel value f1 continues is not the Y direction but the direction of data continuity represented with the gradient $G_f$ (angle θ direction).

In other words, in the case of conceiving the waveform of the approximation function f(x) in a predetermined position y in the Y direction (however, y is a numeric value other than zero), the position corresponding to the pixel value f1 is not a position (0, y) but a position ($C_x$ (y), y) obtained by moving in the X direction from the position (0, y) by a predetermined amount (here, let us say that such an amount is also referred to as a shift amount. Also, a shift amount is an amount depending on the position y in the Y direction, so let us say that this shift amount is described as $C_x$ (y))

Accordingly, as the integral range of the right side of each of the above Expression (174) through Expression (177), the integral range needs to be set in light of the position y in the Y direction where the center of the pixel value M(l) to be obtained (however, l is any integer value of 1 through 4) exists, i.e., the shift amount $C_x$ (Y).

Specifically, for example, the position y in the Y direction where the centers of the pixel 3111 and pixel 3112 exist is not y=0 but y=0.25.

Accordingly, the waveform of the approximation function f(x) at y=0.25 is equivalent to a waveform obtained by moving the waveform of the approximation function f(x) at y=0 by the shift amount $C_x$ (0.25) in the X direction.

In other words, in the above Expression (174), if we say that the pixel value M (1) as to the pixel 3111 is obtained by integrating the approximation function f(x) at y=0 with a predetermined integral range (from the start position $x_{s1}$ to the end position $x_{e1}$), the integral range thereof becomes not a range from the start position $x_{s1}=-0.5$ to the end position $x_{e1}=0$ (a range itself where the pixel 3111 occupies in the X direction) but the range shown in FIG. 261, i.e., from the start position $x_{s1}=-0.5+C_x(0.25)$ to the end position $x_{e1}=0+C_x(0.25)$ (a range where the pixel 3111 occupies in the X direction in the event that the pixel 3111 is tentatively moved by the shift amount $C_x(0.25)$).

Similarly, in the above Expression (175), if we say that the pixel value M(2) as to the pixel 3112 is obtained by integrating the approximation function f(x) at y=0 with a predetermined integral range (from the start position $x_{s2}$ to the end position $x_{e2}$), the integral range thereof becomes not a range from the start position $x_{s2}=0$ to the end position $x_{e2}=0.5$ (a range itself where the pixel 3112 occupies in the X direction) but the range shown in FIG. 261, i.e., from the start position $x_{s2}=0+C_x(0.25)$ to the end position $x_{e1}=0.5+C_x(0.25)$ (a range where the pixel 3112 occupies in the X direction in the event that the pixel 3112 is tentatively moved by the shift amount $C_x$ (0.25)).

Also, for example, the position y in the Y direction where the centers of the pixel 3113 and pixel 3114 exist is not y=0 but y=−0.25.

Accordingly, the waveform of the approximation function f(x) at y=−0.25 is equivalent to a waveform obtained by moving the waveform of the approximation function f(x) at y=0 by the shift amount $C_x$ (−0.25) in the X direction.

In other words, in the above Expression (176), if we say that the pixel value M(3) as to the pixel 3113 is obtained by integrating the approximation function f(x) at y=0 with a predetermined integral range (from the start position $x_{s3}$ to the end position $x_{e3}$), the integral range thereof becomes not a range from the start position $x_{s3}$=−0.5 to the end position $x_{e3}$=0 (a range itself where the pixel 3113 occupies in the X direction) but the range shown in FIG. 261, i.e., from the start position $x_{s3}$=−0.5+$C_x$ (−0.25) to the end position $x_{e3}$=0+$C_x$ (−0.25) (a range where the pixel 3113 occupies in the X direction in the event that the pixel 3113 is tentatively moved by the shift amount $C_x$(−0.25)).

Similarly, in the above Expression (177), if we say that the pixel value M(4) as to the pixel 3114 is obtained by integrating the approximation function f(x) at y=0 with a predetermined integral range (from the start position $x_{s4}$ to the end position $x_{e4}$), the integral range thereof becomes not a range from the start position $x_{s4}$=0 to the end position $x_{e4}$=0.5 (a range itself where the pixel 3114 occupies in the X direction) but the range shown in FIG. 261, i.e., from the start position $x_{s4}$=0+$C_x$ (−0.25) to the end position $x_{e1}$=0.5+$C_x$(−0.25) (a range where the pixel 3114 occupies in the X direction in the event that the pixel 3114 is tentatively moved by the shift amount $C_x$ (−0.25)).

Accordingly, the image generating unit 102 (FIG. 259) calculates the above Expression (174) through Expression (177) by substituting the corresponding integral range of the above integral ranges for each of these expressions, and outputs the calculated results of these as the output pixel values M (1) through M (4).

Thus, the image generating unit 102 can create four pixels having higher spatial resolution than that of the output pixel 3101, i.e., the pixel 3111 through pixel 3114 (FIG. 261) by employing the one-dimensional reintegration method as a pixel at the output pixel 3101 (FIG. 260) from the sensor 2 (FIG. 259). Further, though not shown in the drawing, as described above, the image generating unit 102 can create a pixel having an arbitrary powered spatial resolution as to the output pixel 3101 without deterioration by appropriately changing an integral range, in addition to the pixel 3111 through pixel 3114.

FIG. 262 represents a configuration example of the image generating unit 103 employing such a one-dimensional reintegration method.

As shown in FIG. 262, the image generating unit 103 shown in this example includes a conditions setting unit 3121, features storage unit 3122, integral component calculation unit 3123, and output pixel value calculation unit 3124.

The conditions setting unit 3121 sets the number of dimensions n of the approximation function f(x) based on the actual world estimating information (the features of the approximation function f(x) in the example in FIG. 262) supplied from the actual world estimating unit 102.

The conditions setting unit 3121 also sets an integral range in the case of reintegrating the approximation function f(x) (in the case of calculating an output pixel value). Note that an integral range set by the conditions setting unit 3121 does not need to be the width of a pixel. For example, the approximation function f(x) is integrated in the spatial direction (X direction), and accordingly, a specific integral range can be determined as long as the relative size (power of spatial resolution) of an output pixel (pixel to be calculated by the image generating unit 103) as to the spatial size of each pixel of an input image from the sensor 2 (FIG. 259) is known. Accordingly, the conditions setting unit 3121 can set, for example, a spatial resolution power as an integral range.

The features storage unit 3122 temporally stores the features of the approximation function f(x) sequentially supplied from the actual world estimating unit 102. Subsequently, upon the features storage unit 3122 storing all of the features of the approximation function f(x), the features storage unit 3122 generates a features table including all of the features of the approximation function f(x), and supplies this to the output pixel value calculation unit 3124.

Incidentally, as described above, the image generating unit 103 calculates the output pixel value M using the above Expression (172), but the approximation function f(x) included in the right side of the above Expression (172) is represented as the following Expression (178) specifically.

$$f(x) = \sum_{i=0}^{n} w_i \times x^i dx \tag{178}$$

Note that in Expression (178), $w_i$ represents the features of the approximation function f(x) supplied from the actual world estimating unit 102.

Accordingly, upon the approximation function f(x) of Expression (178) being substituted for the approximation function f(x) of the right side of the above Expression (172) so as to expand (calculate) the right side of Expression (172), the output pixel value M is represented as the following Expression (179).

$$\begin{aligned} M &= G_e \times \sum_{i=0}^{n} w_i \times \frac{x_e^{i+1} - x_s^{i+1}}{i+1} \\ &= \sum_{i=0}^{n} w_i \times k_i(x_s, x_e) \end{aligned} \tag{179}$$

In Expression (179), $K_i$ ($x_s$, $x_e$) represent the integral components of the i-dimensional term. That is to say, the integral components $K_i$ ($x_s$, $x_e$) are such as shown in the following Expression (180).

$$k_i(x_s, x_e) = G_e \times \frac{x_e^{i+1} - x_s^{i+1}}{i+1} \tag{180}$$

The integral component calculation unit 3123 calculates the integral components $K_i$($x_s$, $x_e$).

Specifically, as shown in Expression (180), the components $K_i$ ($x_s$, $x_e$) can be calculated as long as the start position $x_s$ and end position $x_e$ of an integral range, gain $G_e$, and i of the i-dimensional term are known.

Of these, the gain $G_e$ is determined with the spatial resolution power (integral range) set by the conditions setting unit 3121.

The range of i is determined with the number of dimensions n set by the conditions setting unit 3121.

Also, each of the start position Xs and end position $x_e$ of an integral range is determined with the center pixel position (x, y) and pixel width of an output pixel to be generated from now, and the shift amount $C_x$(y) representing the direction of data continuity. Note that (x, y) represents the relative position from the center position of a pixel of interest when the actual world estimating unit 102 generates the approximation function f(x).

Further, each of the center pixel position (x, y) and pixel width of an output pixel to be generated from now is determined with the spatial resolution power (integral range) set by the conditions setting unit 3121.

Also, with the shift amount $C_x$(y), and the angle θ supplied from the data continuity detecting unit 101, the relation such as the following Expression (181) and Expression (182) holds, and accordingly, the shift amount $C_x(y)$ is determined with the angle θ.

$$G_f = \tan\theta = \frac{dy}{dx} \tag{181}$$

$$C_x(y) = \frac{y}{G_f} \tag{182}$$

Note that in Expression (181), $G_f$ represents a gradient representing the direction of data continuity, θ represents an angle (angle generated between the X direction serving as one direction of the spatial directions and the direction of data continuity represented with a gradient $G_f$) of one of the data continuity information output from the data continuity detecting unit 101 (FIG. 259). Also, dx represents the amount of fine movement in the X direction, and dy represents the amount of fine movement in the Y direction (spatial direction perpendicular to the X direction) as to the dx.

Accordingly, the integral component calculation unit 3123 calculates the integral components $K_i(x_s, x_e)$ based on the number of dimensions and spatial resolution power (integral range) set by the conditions setting unit 3121, and the angle θ of the data continuity information output from the data continuity detecting unit 101, and supplies the calculated results to the output pixel value calculation unit 3124 as an integral component table.

The output pixel value calculation unit 3124 calculates the right side of the above Expression (179) using the features table supplied from the features storage unit 3122 and the integral component table supplied from the integral component calculation unit 3123, and outputs the calculation result as an output pixel value M.

Next, description will be made regarding image generating processing (processing in step S103 in FIG. 40) by the image generating unit 103 (FIG. 262) employing the one-dimensional reintegration method with reference to the flowchart in FIG. 263.

For example, now, let us say that the actual world estimating unit 102 has already generated the approximation function f(x) such as shown in FIG. 260 while taking the pixel 3101 such as shown in FIG. 260 described above as a pixel of interest at the processing in step S102 in FIG. 40 described above.

Also, let us say that the data continuity detecting unit 101 has already output the angle θ such as shown in FIG. 260 as data continuity information at the processing in step S101 in FIG. 40 described above.

In this case, the conditions setting unit 3121 sets conditions (the number of dimensions and an integral range) at step S3101 in FIG. 263.

For example, now, let us say that 5 has been set as the number of dimensions, and also a spatial quadruple density (spatial resolution power to cause the pitch width of a pixel to become half power in the upper/lower/left/right sides) has been set as an integral range.

That is to say, in this case, consequently, it has been set that the four pixel 3111 through pixel 3114 are created newly in a range of −0.5 through 0.5 in the X direction, and also a range of −0.5 through 0.5 in the Y direction (in the range of the pixel 3101 in FIG. 260), such as shown in FIG. 261.

In step S3102, the features storage unit 3122 acquires the features of the approximation function f(x) supplied from the actual world estimating unit 102, and generates a features table. In this case, coefficients $w_0$ through $w_5$ of the approximation function f(x) serving as a five-dimensional polynomial are supplied from the actual world estimating unit 102, and accordingly, $(w_0, w_1, w_2, w_3, w_4, w_5)$ is generated as a features table.

In step S3103, the integral component calculation unit 3123 calculates integral components based on the conditions (the number of dimensions and integral range) set by the conditions setting unit 3121, and the data continuity information (angle θ) supplied from the data continuity detecting unit 101, and generates an integral component table.

Specifically, for example, if we say that the respective pixels 3111 through 3114, which are to be generated from now, are appended with numbers (hereafter, such a number is referred to as a mode number) 1 through 4, the integral component calculation unit 3123 calculates the integral components $K_i(x_s, x_e)$ of the above Expression (180) as a function of l (however, l represents a mode number) such as integral components $K_i(l)$ shown in the left side of the following Expression (183).

$$K_i(l) = K_i(x_s, x_e) \tag{183}$$

Specifically, in this case, the integral components $K_i(l)$ shown in the following Expression (184) are calculated.

$$\begin{aligned} k_i(1) &= k_i(-0.5 - C_x(-0.25),\ 0 - C_x(-0.25)) \\ k_i(2) &= k_i(0 - C_x(-0.25),\ 0.5 - C_x(-0.25)) \\ k_i(3) &= k_i(-0.5 - C_x(0.25),\ 0 - C_x(0.25)) \\ k_i(4) &= k_i(0 - C_x(0.25),\ 0.5 - C_x(0.25)) \end{aligned} \tag{184}$$

Note that in Expression (184), the left side represents the integral components $K_i(l)$, and the right side represents the integral components $K_i(x_s, x_e)$. That is to say, in this case, l is any one of 1 through 4, and also i is any one of 0 through 5, and accordingly, $24K_i(l)$ in total of $6K_i(1)$, $6K_i(2)$, $6K_i(3)$, and $6K_i(4)$ are calculated.

More specifically, first, the integral component calculation unit 3123 calculates each of the shift amounts $C_x(-0.25)$ and $C_x(0.25)$ from the above Expression (181) and Expression (182) using the angle θ supplied from the data continuity detecting unit 101.

Next, the integral component calculation unit 3123 calculates the integral components $K_i(x_s, x_e)$ of each right side of the four expressions in Expression (184) regarding i=0 through 5 using the calculated shift amounts $C_x(-0.25)$ and $C_x(0.25)$. Note that with this calculation of the integral components $K_i(x_s, x_e)$, the above Expression (180) is employed.

Subsequently, the integral component calculation unit 3123 converts each of the 24 integral components $K_i(x_s, x_e)$ calculated into the corresponding integral components $K_i(l)$ in accordance with Expression (184), and generates an integral component table including the 24 integral components $K_i(l)$ converted (i.e., $6K_i(1)$, $6K_i(2)$, $6K_i(3)$, and $6K_i(4)$).

Note that the sequence of the processing in step S3102 and the processing in step S3103 is not restricted to the example in FIG. 263, the processing in step S3103 may be executed first, or the processing in step S3102 and the processing in step S3103 may be executed simultaneously.

Next, in step S3104, the output pixel value calculation unit 3124 calculates the output pixel values M(1) through M(4) respectively based on the features table generated by the features storage unit 3122 at the processing in step S3102, and the integral component table generated by the integral component calculation unit 3123 at the processing in step S3103.

Specifically, in this case, the output pixel value calculation unit 3124 calculates each of the pixel value M(1) of the pixel 3111 (pixel of mode number 1), the pixel value M(2) of the pixel 3112 (pixel of mode number 2), the pixel value M(3) of the pixel 3113 (pixel of mode number 3), and the pixel value M(4) of the pixel 3114 (pixel of mode number 4) by calculating the right sides of the following Expression (185) through Expression (188) corresponding to the above Expression (179).

$$M(1) = \sum_{i=0}^{5} w_i k_i(1) \tag{185}$$

$$M(2) = \sum_{i=0}^{5} w_i k_i(2) \tag{186}$$

$$M(3) = \sum_{i=0}^{5} w_i k_i(3) \tag{187}$$

$$M(4) = \sum_{i=0}^{5} w_i k_i(4) \tag{188}$$

In step S3105, the output pixel value calculation unit 3124 determines regarding whether or not the processing of all the pixels has been completed.

In step S3105, in the event that determination is made that the processing of all the pixels has not been completed, the processing returns to step S3102, wherein the subsequent processing is repeatedly performed. That is to say, the pixels that have not become a pixel of interest are sequentially taken as a pixel of interest, and the processing in step S3102 through S3104 is repeatedly performed.

In the event that the processing of all the pixels has been completed (in step S3105, in the event that determination is made that the processing of all the pixels has been completed), the output pixel value calculation unit 3124 outputs the image in step S3106. Then, the image generating processing ends.

Next, description will be made regarding the differences between the output image obtained by employing the one-dimensional reintegration method and the output image obtained by employing another method (conventional classification adaptive processing) regarding a predetermined input image with reference to FIG. 264 through FIG. 271.

FIG. 264 is a diagram illustrating the original image of the input image, and FIG. 265 illustrates image data corresponding to the original image in FIG. 264. In FIG. 265, the axis in the vertical direction in the drawing represents pixel values, and the axis in the lower right direction in the drawing represents the X direction serving as one direction of the spatial directions of the image, and the axis in the upper right direction in the drawing represents the Y direction serving as the other direction of the spatial directions of the image. Note that the respective axes in later-described FIG. 267, FIG. 269, and FIG. 271 corresponds to the axes in FIG. 265.

FIG. 266 is a diagram illustrating an example of an input image. The input image illustrated in FIG. 266 is an image generated by taking the mean of the pixel values of the pixels belonged to a block made up of 2×2 pixels shown in FIG. 264 as the pixel value of one pixel. That is to say, the input image is an image obtained by integrating the image shown in FIG. 264 in the spatial direction, which imitates the integration property of a sensor. Also, FIG. 267 illustrates image data corresponding to the input image in FIG. 266.

The original image illustrated in FIG. 264 includes a fine-line image inclined almost 5° clockwise from the vertical direction. Similarly, the input image illustrated in FIG. 266 includes a fine-line image inclined almost 5° clockwise from the vertical direction.

FIG. 268 is a diagram illustrating an image (hereafter, the image illustrated in FIG. 268 is referred to as a conventional image) obtained by subjecting the input image illustrated in FIG. 266 to conventional classification adaptive processing. Also, FIG. 269 illustrates image data corresponding to the conventional image.

Note that the classification adaptive processing is made up of classification processing and adaptive processing, data is classified based on the property thereof by the class classification processing, and is subjected to the adaptive processing for each class. With the adaptive processing, for example, a low-quality or standard-quality image is subjected to mapping using a predetermined tap coefficient so as to be converted into a high-quality image.

FIG. 270 is a diagram illustrating an image (hereafter, the image illustrated in FIG. 270 is referred to as an image according to the present invention) obtained by applying the one-dimensional reintegration method to which the present invention is applied, to the input image illustrated in FIG. 266. Also, FIG. 271 illustrates image data corresponding to the image according to the present invention.

It can be understood that upon the conventional image in FIG. 268 being compared with the image according to the present invention in FIG. 270, a fine-line image is different from that in the original image in FIG. 264 in the conventional image, but on the other hand, the fine-line image is almost the same as that in the original image in FIG. 264 in the image according to the present invention.

This difference is caused by a difference wherein the conventional class classification adaptation processing is a method for performing processing on the basis (origin) of the input image in FIG. 266, but on the other hand, the one-dimensional reintegration method according to the present invention is a method for estimating the original image in FIG. 264 (generating the approximation function f(x) corresponding to the original image) in light of continuity of a fine line, and performing processing (performing reintegration so as to calculate pixel values) on the basis (origin) of the original image estimated.

Thus, with the one-dimensional reintegration method, an output image (pixel values) is generated by integrating the approximation function f(x) in an arbitrary range on the basis (origin) of the approximation function f(x) (the approximation function f(x) of the X cross-sectional waveform F(x) in the actual world) serving as the one-dimensional polynomial generated with the one-dimensional polynomial approximating method.

Accordingly, with the one-dimensional reintegration method, it becomes possible to output an image more similar to the original image (the light signal in the actual world 1 which is to be cast in the sensor 2) in comparison with the conventional other methods.

In other words, the one-dimensional reintegration method is based on condition that the data continuity detecting unit 101 in FIG. 259 detects continuity of data in an input image made up of multiple pixels having a pixel value on which the light signals in the actual world 1 are projected by the multiple detecting elements of the sensor 2 each having spatio-temporal integration effects, and projected by the detecting elements of which a part of continuity of the light signals in the actual world 1 drops, and in response to the detected continuity of data, the actual world estimating unit 102 estimates the light signal function F by approximating the light signal function F (specifically, X cross-sectional waveform F(x)) representing the light signals in the actual world 1 with a predetermined approximation function f(x) on assumption that the pixel value of a pixel corresponding to a position in the one-dimensional direction of the time-space directions of the input image is the pixel value acquired by integration effects in the one-dimensional direction thereof.

Speaking in detail, for example, the one-dimensional reintegration method is based on condition that the X cross-sectional waveform F(x) is approximated with the approximation function f(x) on assumption that the pixel value of each pixel corresponding to a distance along in the one-dimensional direction from a line corresponding to the detected continuity of data is the pixel value obtained by the integration effects in the one-dimensional direction thereof.

With the one-dimensional reintegration method, for example, the image generating unit 103 in FIG. 259 (FIG. 3) generates a pixel value M corresponding to a pixel having a desired size by integrating the X cross-sectional waveform F(x) estimated by the actual world estimating unit 102, i.e., the approximation function f(x) in desired increments in the one-dimensional direction based on such an assumption, and outputs this as an output image.

Accordingly, with the one-dimensional reintegration method, it becomes possible to output an image more similar to the original image (the light signal in the actual world 1 which is to be cast in the sensor 2) in comparison with the conventional other methods.

Also, with the one-dimensional reintegration method, as described above, the integral range is arbitrary, and accordingly, it becomes possible to create resolution (temporal resolution or spatial resolution) different from the resolution of an input image by varying the integral range. That is to say, it becomes possible to generate an image having arbitrary powered resolution as well as an integer value as to the resolution of the input image.

Further, the one-dimensional reintegration method enables calculation of an output image (pixel values) with less calculation processing amount than other reintegration methods.

Next, description will be made regarding a two-dimensional reintegration method with reference to FIG. 272 through FIG. 278.

The two-dimensional reintegration method is based on condition that the approximation function f(x, y) has been generated with the two-dimensional polynomial approximating method.

That is to say, for example, it is an assumption that the image function F(x, y, t) representing the light signal in the actual world 1 (FIG. 259) having continuity in the spatial direction represented with the gradient GF has been approximated with a waveform projected in the spatial directions (X direction and Y direction), i.e., the waveform F(x, y) on the X-Y plane has been approximated with the approximation function f(x, y) serving as a n-dimensional (n is an arbitrary integer) polynomial, such as shown in FIG. 272.

In FIG. 272, the horizontal direction represents the X direction serving as one direction in the spatial directions, the upper right direction represents the Y direction serving as the other direction in the spatial directions, and the vertical direction represents light levels, respectively in the drawing. $G_F$ represents gradient as continuity in the spatial directions.

Note that with the example in FIG. 272, the direction of continuity is taken as the spatial directions (X direction and Y direction), so the projection function of a light signal to be approximated is taken as the function F(x, y), but as described later, the function F(x, t) or function F(y, t) may be a target of approximation according to the direction of continuity.

In the case of the example in FIG. 272, with the two-dimensional reintegration method, the output pixel value M is calculated as the following Expression (189).

$$M = G_e \times \int_{y_s}^{y_e} \int_{x_s}^{x_e} f(x, y) dx dy \tag{189}$$

Note that in Expression (189), $y_s$ represents an integration start position in the Y direction, and $y_e$ represents an integration end position in the Y direction. Similarly, $x_s$ represents an integration start position in the X direction, and xe represents an integration end position in the X direction. Also, $G_e$ represents a predetermined gain.

In Expression (189), an integral range can be set arbitrarily, and accordingly, with the two-dimensional reintegration method, it becomes possible to create pixels having an arbitrary powered spatial resolution as to the original pixels (the pixels of an input image from the sensor 2 (FIG. 259)) without deterioration by appropriately changing this integral range.

FIG. 273 represents a configuration example of the image generating unit 103 employing the two-dimensional reintegration method.

As shown in FIG. 273, the image generating unit 103 in this example includes a conditions setting unit 3201, features storage unit 3202, integral component calculation unit 3203, and output pixel value calculation unit 3204.

The conditions setting unit 3201 sets the number of dimensions n of the approximation function f(x, y) based on the actual world estimating information (with the example in FIG. 273, the features of the approximation function f(x, y)) supplied from the actual world estimating unit 102.

The conditions setting unit 3201 also sets an integral range in the case of reintegrating the approximation function f(x, y) (in the case of calculating an output pixel value). Note that an integral range set by the conditions setting unit 3201 does not need to be the vertical width or the horizontal width of a pixel. For example, the approximation function f(x, y) is integrated in the spatial directions (X direction and Y direction), and accordingly, a specific integral range can be determined as long as the relative size (power of spatial resolution) of an output pixel (pixel to be generated from now by the image generating unit 103) as to the spatial size of each pixel of an input image from the sensor 2 is known. Accordingly, the conditions setting unit 3201 can set, for example, a spatial resolution power as an integral range.

The features storage unit 3202 temporally stores the features of the approximation function f(x, y) sequentially supplied from the actual world estimating unit 102. Subsequently, upon the features storage unit 3202 storing all of the features of the approximation function f(x, y), the features storage unit 3202 generates a features table including all of the features of the approximation function f(x, y), and supplies this to the output pixel value calculation unit 3204.

Now, description will be made regarding the details of the approximation function f(x, y).

For example, now, let us say that the light signals (light signals represented with the wave F(x, y)) in the actual world 1 (FIG. 259) having continuity in the spatial directions represented with the gradient $G_F$ shown in FIG. 272 described above have been detected by the sensor 2 (FIG. 259), and have been output as an input image (pixel values).

Further, for example, let us say that the data continuity detecting unit 101 (FIG. 3) has subjected a region 3221 of an input image made up of 20 pixels in total (20 squares represented with a dashed line in the drawing) of 4 pixels in the X direction and also 5 pixels in the Y direction of this input image to the processing thereof, and has output an angle θ (angle θ generated between the direction of data continuity represented with the gradient $G_f$ corresponding to the gradient $G_F$ and the X direction) as one of data continuity information, as shown in FIG. 274.

Note that as viewed from the actual world estimating unit 102, the data continuity detecting unit 101 should simply output the angle θ at a pixel of interest, and accordingly, the processing region of the data continuity detecting unit 101 is not restricted to the above region 3221 in the input image.

Also, with the region 3221 in the input image, the horizontal direction in the drawing represents the X direction serving as one direction of the spatial directions, and the vertical direction in the drawing represents the Y direction serving the other direction of the spatial directions.

Further, in FIG. 274, a pixel, which is the second pixel from the left, and also the third pixel from the bottom, is taken as a pixel of interest, and an (x, y) coordinates system is set so as to take the center of the pixel of interest as the origin (0, 0). A relative distance (hereafter, referred to as a cross-sectional direction distance) in the X direction as to a straight line (straight line of the gradient $G_f$ representing the direction of data continuity) having an angle θ passing through the origin (0, 0) is taken as x'.

Further, in FIG. 274, the graph on the right side represents the approximation function f(x') serving as a n-dimensional (n is an arbitrary integer) polynomial, which is a function approximating a one-dimensional waveform (hereafter, referred to as an X cross-sectional waveform F(x')) wherein the image function F(x, y, t) of which variables are positions x, y, and z on the three-dimensional space, and point-in-time t is projected in the X direction at an arbitrary position y in the Y direction. Of the axes in the graph on the right side, the axis in the horizontal direction in the drawing represents a cross-sectional direction distance, and the axis in the vertical direction in the drawing represents pixel values.

In this case, the approximation function f(x') shown in FIG. 274 is a n-dimensional polynomial, so is represented as the following Expression (190).

$$f(x') = w_0 + w_1 x' + w_2 x' + \dots + w_n x'^n = \sum_{i=0}^{n} w_i x'^i \tag{190}$$

Also, since the angle θ is determined, the straight line having angle θ passing through the origin (0, 0) is uniquely determined, and a position $x_1$ in the X direction of the straight line at an arbitrary position y in the Y direction is represented as the following Expression (191). However, in Expression (191), s represents cot θ.

$$x_1 = s \times y \tag{191}$$

That is to say, as shown in FIG. 274, a point on the straight line corresponding to continuity of data represented with the gradient $G_f$ is represented with a coordinate value ($x_1$, y).

The cross-sectional direction distance x' is represented as the following Expression (192) using Expression (191).

$$x' = x - x_1 = x - s \times y \tag{192}$$

Accordingly, the approximation function f(x, y) at an arbitrary position (x, y) within the input image region 3221 is represented as the following Expression (193) using Expression (190) and Expression (192).

$$f(x, y) = \sum_{i=0}^{n} w_i (x - s \times y) \tag{193}$$

Note that in Expression (193), $w_i$ represents the features of the approximation function f(x, y).

Now, description will return to FIG. 273, wherein the features $w_i$ included in Expression (193) are supplied from the actual world estimating unit 102, and stored in the features storage unit 3202. Upon the features storage unit 3202 storing all of the features $w_i$ represented with Expression (193), the features storage unit 3202 generates a features table including all of the features $w_i$, and supplies this to the output pixel value calculation unit 3204.

Also, upon the right side of the above Expression (189) being expanded (calculated) by substituting the approximation function f(x, y) of Expression (193) for the approximation function f(x, y) in the right side of Expression (189), the output pixel value M is represented as the following Expression (194).

$$\begin{aligned} M &= G_e \times \sum_{i=0}^{n} w_i \times \frac{\left\{ \begin{array}{l} (x_e - s \times y_e)^{i+2} - (x_e - s \times y_s)^{i+2} - \\ (x_s - s \times y_e)^{i+2} + (x_s - s \times y_s)^{i+2} \end{array} \right\}}{s(i+1)(i+2)} \\ &= \sum_{i=0}^{n} w_i \times k_i(x_s, x_e, y_s, y_e) \end{aligned} \tag{194}$$

In Expression (194), $K_i(x_s, x_e, y_s, y_e)$ represent the integral components of the i-dimensional term. That is to say, the integral components $K_i(x_s, x_e, y_s, y_e)$ are such as shown in the following Expression (195).

$$k_i(x_s, x_e, y_s, y_e) = G_e \times \frac{\left\{ \begin{array}{l} (x_e - s \times y_e)^{i+2} - (x_e - s \times y_s)^{i+2} - \\ (x_s - s \times y_e)^{i+2} + (x_s - s \times y_s)^{i+2} \end{array} \right\}}{s(i+1)(i+2)} \tag{195}$$

The integral component calculation unit 3203 calculates the integral components $K_i(x_s, x_e, y_s, y_e)$.

Specifically, as shown in Expression (194) and Expression (195), the integral components $K_i(x_s, x_e, y_s, y_e)$ can be calculated as long as the start position Xs in the X direction and end position $x_e$ in the X direction of an integral range, the start position $y_s$ in the Y direction and end position $y_e$ in the Y direction of an integral range, variable s, gain $G_e$, and i of the i-dimensional term are known.

Of these, the gain $G_e$ is determined with the spatial resolution power (integral range) set by the conditions setting unit 3201.

The range of i is determined with the number of dimensions n set by the conditions setting unit 3201.

A variable s is, as described above, cot θ, so is determined with the angle θ output from the data continuity detecting unit 101.

Also, each of the start position $x_s$ in the X direction and end position $x_e$ in the X direction of an integral range, and the start position $y_s$ in the Y direction and end position $y_e$ in the Y direction of an integral range is determined with the center pixel position (x, y) and pixel width of an output pixel to be generated from now. Note that (x, y) represents a relative position from the center position of the pixel of interest when the actual world estimating unit 102 generates the approximation function f(x).

Further, each of the center pixel position (x, y) and pixel width of an output pixel to be generated from now is determined with the spatial resolution power (integral range) set by the conditions setting unit 3201.

Accordingly, the integral component calculation unit 3203 calculates $K_i(x_s, x_e, y_s, y_e)$ based on the number of dimensions and the spatial resolution power (integral range) set by the conditions setting unit 3201, and the angle θ of the data continuity information output from the data continuity detecting unit 101, and supplies the calculated result to the output pixel value calculation unit 3204 as an integral component table.

The output pixel value calculation unit 3204 calculates the right side of the above Expression (194) using the features table supplied from the features storage unit 3202, and the integral component table supplied from the integral component calculation unit 3203, and outputs the calculated result to the outside as the output pixel value M.

Next, description will be made regarding image generating processing (processing in step S103 in FIG. 40) by the image generating unit 103 (FIG. 274) employing the two-dimensional reintegration method with reference to the flowchart in FIG. 275.

For example, let us say that the light signals represented with the function F(x, y) shown in FIG. 272 have been cast in the sensor 2 so as to become an input image, and the actual world estimating unit 102 has already generated the approximation function f(x, y) for approximating the function F(x, y) with one pixel 3231 such as shown in FIG. 276 as a pixel of interest at the processing in step S102 in FIG. 40 described above.

Note that in FIG. 276, the pixel value (input pixel value) of the pixel 3231 is taken as P, and the shape of the pixel 3231 is taken as a square of which one side is 1 in length. Also, of the spatial directions, the direction in parallel with one side of the pixel 3231 is taken as the X direction, and the direction orthogonal to the X direction is taken as the Y direction. Further, a coordinates system (hereafter, referred to as a pixel-of-interest coordinates system) in the spatial directions (X direction and Y direction) of which the origin is the center of the pixel 3231 is set.

Also, let us say that in FIG. 276, the data continuity detecting unit 101, which takes the pixel 3231 as a pixel of interest, has already output the angle θ as data continuity information corresponding to continuity of data represented with the gradient $G_f$ at the processing in step S101 in FIG. 40 described above.

Description will return to FIG. 275, and in this case, the conditions setting unit 3201 sets conditions (the number of dimensions and an integral range) at step S3201.

For example, now, let us say that 5 has been set as the number of dimensions, and also spatial quadruple density (spatial resolution power to cause the pitch width of a pixel to become half power in the upper/lower/left/right sides) has been set as an integral range.

That is to say, in this case, it has been set that the four pixel 3241 through pixel 3244 are created newly in a range of −0.5 through 0.5 in the X direction, and also a range of −0.5 through 0.5 in the Y direction (in the range of the pixel 3231 in FIG. 276), such as shown in FIG. 277. Note that in FIG. 277 as well, the same pixel-of-interest coordinates system as that in FIG. 276 is shown.

Also, in FIG. 277, M(1) represents the pixel value of the pixel 3241 to be generated from now, M(2) represents the pixel value of the pixel 3242 to be generated from now, M(3) represents the pixel value of the pixel 3243 to be generated from now, and M(4) represents the pixel value of the pixel 3244 to be generated from now.

Description will return to FIG. 275, in step S3202, the features storage unit 3202 acquires the features of the approximation function f(x, y) supplied from the actual world estimating unit 102, and generates a features table. In this case, the coefficients $w_0$ through $w_5$ of the approximation function f(x) serving as a 5-dimensional polynomial are supplied from the actual world estimating unit 102, and accordingly, $(w_0, w_1, w_2, w_3, w_4, w_5)$ is generated as a features table.

In step S3203, the integral component calculation unit 3203 calculates integral components based on the conditions (the number of dimensions and an integral range) set by the conditions setting unit 3201, and the data continuity information (angle θ) supplied from the data continuity detecting unit 101, and generates an integral component table.

Specifically, for example, let us say that numbers (hereafter, such a number is referred to as a mode number) 1 through 4 are respectively appended to the pixel 3241 through pixel 3244 to be generated from now, the integral component calculation unit 3203 calculates the integral components $K_i(x_s, x_e, y_s, y_e)$ of the above Expression (194) as a function of l (however, l represents a mode number) such as the integral components $K_i(l)$ shown in the left side of the following Expression (196).

$$K_i(l)=K_i(x_s, x_e, y_s, y_e) \tag{196}$$

Specifically, in this case, the integral components $K_i(l)$ shown in the following Expression (197) are calculated.

$$\begin{aligned} k_i(1) &= k_i(-0.5, 0, 0, 0.5) \\ k_i(2) &= k_i(0, 0.5, 0, 0.5) \\ k_i(3) &= k_i(-0.5, 0, -0.5, 0) \\ k_i(4) &= k_i(0, 0.5, -0.5, 0) \end{aligned} \tag{197}$$

Note that in Expression (197), the left side represents the integral components $K_i(l)$, and the right side represents the integral components $K_i(x_s, x_e, y_s, y_e)$. That is to say, in this case, l is any one of 1 thorough 4, and also i is any one of 0 through 5, and accordingly, $24K_i(l)$ in total of $6K_i(1)$, $6K_i(2)$, $6K_i(3)$, and $6K_i(4)$ are calculated.

More specifically, first, the integral component calculation unit 3203 calculates the variable s (s=cot θ) of the above Expression (191) using the angle θ supplied from the data continuity detecting unit 101.

Next, the integral component calculation unit 3203 calculates the integral components $K_i(x_s, x_e, y_s, y_e)$ of each right side of the four expressions in Expression (197) regarding i=0 through 5 using the calculated variable s. Note that with this calculation of the integral components $K_i(x_s, x_e, y_s, y_e)$, the above Expression (194) is employed.

Subsequently, the integral component calculation unit 3203 converts each of the 24 integral components $K_i(x_s, x_e, y_s, y_e)$ calculated into the corresponding integral components $K_i(1)$ in accordance with Expression (197), and generates an integral component table including the 24 integral components $K_i(1)$ converted (i.e., $6K_i(1)$, $6K_i(2)$, $6K_i(3)$, and $6K_i(4)$).

Note that the sequence of the processing in step S3202 and the processing in step S3203 is not restricted to the example in FIG. 275, the processing in step S3203 may be executed first, or the processing in step S3202 and the processing in step S3203 may be executed simultaneously.

Next, in step S3204, the output pixel value calculation unit 3204 calculates the output pixel values M(1) through M(4) respectively based on the features table generated by the features storage unit 3202 at the processing in step S3202, and the integral component table generated by the integral component calculation unit 3203 at the processing in step S3203.

Specifically, in this case, the output pixel value calculation unit 3204 calculates each of the pixel value M(1) of the pixel 3241 (pixel of mode number 1), the pixel value M(2) of the pixel 3242 (pixel of mode number 2), the pixel value M(3) of the pixel 3243 (pixel of mode number 3), and the pixel value M(4) of the pixel 3244 (pixel of mode number 4) shown in FIG. 254 by calculating the right sides of the following Expression (198) through Expression (201) corresponding to the above Expression (194).

$$M(1) = \sum_{i=0}^{n} w_i \times k_i(1) \tag{198}$$

$$M(2) = \sum_{i=0}^{n} w_i \times k_i(2) \tag{199}$$

$$M(3) = \sum_{i=0}^{n} w_i \times k_i(3) \tag{200}$$

$$M(4) = \sum_{i=0}^{n} w_i \times k_i(4) \tag{201}$$

However, in this case, each n of Expression (198) through Expression (201) becomes 5.

In step S3205, the output pixel value calculation unit 3204 determines regarding whether or not the processing of all the pixels has been completed.

In step S3205, in the event that determination is made that the processing of all the pixels has not been completed, the processing returns to step S3202, wherein the subsequent processing is repeatedly performed. That is to say, the pixels that have not become a pixel of interest are sequentially taken as a pixel of interest, and the processing in step S3202 through S3204 is repeatedly performed.

In the event that the processing of all the pixels has been completed (in step S3205, in the event that determination is made that the processing of all the pixels has been completed), the output pixel value calculation unit 3204 outputs the image in step S3206. Then, the image generating processing ends.

Thus, four pixels having higher spatial resolution than the input pixel 3231, i.e., the pixel 3241 through pixel 3244 (FIG. 277) can be created by employing the two-dimensional reintegration method as a pixel at the pixel 3231 of the input image (FIG. 276) from the sensor 2 (FIG. 259). Further, though not shown in the drawing, as described above, the image generating unit 103 can create a pixel having an arbitrary powered spatial resolution as to the input pixel 3231 without deterioration by appropriately changing an integral range, in addition to the pixel 3241 through pixel 3244.

As described above, as description of the two-dimensional reintegration method, an example for subjecting the approximation function f(x, y) as to the spatial directions (X direction and Y direction) to two-dimensional integration has been employed, but the two-dimensional reintegration method can be applied to the time-space directions (X direction and t direction, or Y direction and t direction).

That is to say, the above example is an example in the case in which the light signals in the actual world 1 (FIG. 259) have continuity in the spatial directions represented with the gradient GF such as shown in FIG. 272, and accordingly, an expression including two-dimensional integration in the spatial directions (X direction and Y direction) such as shown in the above Expression (189) has been employed. However, the concept regarding two-dimensional integration can be applied not only to the spatial direction but also the time-space directions (X direction and t direction, or Y direction and t direction).

In other words, with the two-dimensional polynomial approximating method serving as an assumption of the two-dimensional reintegration method, it is possible to perform approximation using a two-dimensional polynomial even in the case in which the image function F(x, y, t) representing the light signals has continuity in the time-space directions (however, X direction and t direction, or Y direction and t direction) as well as continuity in the spatial directions.

Specifically, for example, in the event that there is an object moving horizontally in the X direction at uniform velocity, the direction of movement of the object is represented with like a gradient $V_F$ in the X-t plane such as shown in FIG. 278. In other words, it can be said that the gradient $V_F$ represents the direction of continuity in the time-space directions in the X-t plane. Accordingly, the data continuity detecting unit 101 (FIG. 259) can output movement θ such as shown in FIG. 278 (strictly speaking, though not shown in the drawing, movement θ is an angle generated by the direction of data continuity represented with the gradient $V_f$ corresponding to the gradient $V_F$ and the X direction in the spatial direction) as data continuity information corresponding to the gradient $V_F$ representing continuity in the time-space directions in the X-t plane as well as the above angle θ (data continuity information corresponding to the gradient $G_F$ representing continuity in the spatial directions in the X-Y plane).

Also, the actual world estimating unit 102 (FIG. 259) employing the two-dimensional polynomial approximating method can calculate the coefficients (features) $w_i$ of an approximation function f(x, t) with the same method as the above method by employing the movement θ instead of the angle θ. However, in this case, the equation to be employed is not the above Expression (193) but the following Expression (202).

$$f(x, y) = \sum_{i=0}^{n} w_i (x - s \times t) \tag{202}$$

Note that in Expression (202), s is cot θ (however, θ is movement).

Accordingly, the image generating unit 103 (FIG. 259) employing the two-dimensional reintegration method can calculate the pixel value M by substituting the f(x, t) of the above Expression (202) for the right side of the following Expression (203), and calculating this.

$$M = G_e \times \int_{t_s}^{t_e} \int_{x_s}^{x_e} f(x, t) dx dt \tag{203}$$

Note that in Expression (203), $t_s$ represents an integration start position in the t direction, and $t_e$ represents an integration end position in the t direction. Similarly, $x_s$ represents an integration start position in the X direction, and $x_e$ represents an integration end position in the X direction. $G_e$ represents a predetermined gain.

Alternately, an approximation function f(y, t) focusing attention on the spatial direction Y instead of the spatial direction X can be handled as the same way as the above approximation function f(x, t).

Incidentally, in Expression (202), it becomes possible to obtain data not integrated in the temporal direction, i.e., data without movement blurring by regarding the t direction as constant, i.e., by performing integration while ignoring integration in the t direction. In other words, this method may be regarded as one of two-dimensional reintegration methods in that reintegration is performed on condition that one certain dimension of two-dimensional polynomials is constant, or in fact, may be regarded as one of one-dimensional reintegration methods in that one-dimensional reintegration in the X direction is performed.

Also, in Expression (203), an integral range may be set arbitrarily, and accordingly, with the two-dimensional reintegration method, it becomes possible to create a pixel having an arbitrary powered resolution as to the original pixel (pixel of an input image from the sensor 2 (FIG. 259)) without deterioration by appropriately changing this integral range.

That is to say, with the two-dimensional reintegration method, it becomes possible to create temporal resolution by appropriately changing an integral range in the temporal direction t. Also, it becomes possible to create spatial resolution by appropriately changing an integral range in the spatial direction X (or spatial direction Y). Further, it becomes possible to create both temporal resolution and spatial resolution by appropriately changing each integral range in the temporal direction and in the spatial direction X.

Note that as described above, creation of any one of temporal resolution and spatial resolution may be performed even with the one-dimensional reintegration method, but creation of both temporal resolution and spatial resolution cannot be performed with the one-dimensional reintegration method in theory, which becomes possible only by performing two-dimensional or more reintegration. That is to say, creation of both temporal resolution and spatial resolution becomes possible only by employing the two-dimensional reintegration method and a later-described three-dimensional reintegration method.

Also, the two-dimensional reintegration method takes not one-dimensional but two-dimensional integration effects into consideration, and accordingly, an image more similar to the light signal in the actual world 1 (FIG. 259) may be created.

In other words, with the two-dimensional reintegration method, for example, the data continuity detecting unit 101 in FIG. 259 (FIG. 3) detects continuity (e.g., continuity of data represented with the gradient $G_f$ in FIG. 274) of data in an input image made up of multiple pixels having a pixel value on which the light signals in the actual world 1 are projected by the multiple detecting elements of the sensor 2 each having spatio-temporal integration effects, and projected by the detecting elements of which a part of continuity (e.g., continuity represented with the gradient $G_F$ in FIG. 272) of the light signals in the actual world 1 drops.

Subsequently, for example, in response to the continuity of data detected by the data continuity detecting unit 101, the actual world estimating unit 102 in FIG. 259 (FIG. 3) estimates the light signal function F by approximating the light signal function F(specifically, function F(x, y) in FIG. 272) representing the light signals in the actual world 1 with an approximation function f(x, y), which is a polynomial, on assumption that the pixel value of a pixel corresponding to at least a position in the two-dimensional direction (e.g., spatial direction X and spatial direction Y in FIG. 272) of the time-space directions of the image data is the pixel value acquired by at least integration effects in the two-dimensional direction, which is an assumption.

Speaking in detail, for example, the actual world estimating unit 102 estimates a first function representing the light signals in the real world by approximating the first function with a second function serving as a polynomial on condition that the pixel value of a pixel corresponding to at least a distance (for example, cross-sectional direction distance x' in FIG. 274) along in the two-dimensional direction from a line corresponding to continuity of data (for example, a line (arrow) corresponding to the gradient $G_f$ in FIG. 274) detected by the continuity detecting unit 101 is the pixel value acquired by at least integration effects in the two-dimensional direction, which is an assumption.

With the two-dimensional reintegration method, based on such an assumption, for example, the image generating unit 103 (FIG. 273 for configuration) in FIG. 259 (FIG. 3) generates a pixel value corresponding to a pixel (for example, output image (pixel value M) in FIG. 259. Specifically, for example, the pixel 3241 through pixel 3244 in FIG. 277) having a desired size by integrating the function F(x, y) estimated by the actual world estimating unit 102, i.e., the approximation function f(x, y) in at least desired increments in the two-dimensional direction (e.g., by calculating the right side of the above Expression (186)).

Accordingly, the two-dimensional reintegration method enables not only any one of temporal resolution and spatial resolution but also both temporal resolution and spatial resolution to be created. Also, with the two-dimensional reintegration method, an image more similar to the light signal in the actual world 1 (FIG. 259) than that in the one-dimensional reintegration method may be generated.

Next, description will be made regarding a three-dimensional reintegration method with reference to FIG. 279 and FIG. 280.

With the three-dimensional reintegration method, the approximation function f(x, y, t) has been created using the three-dimensional function approximating method, which is an assumption.

In this case, with the three-dimensional reintegration method, the output pixel value M is calculated as the following Expression (204).

$$M = G_e \times \int_{t_s}^{t_e} \int_{y_s}^{y_e} \int_{x_s}^{x_e} f(x, y, t) dx dy dt \tag{204}$$

Note that in Expression (204), $t_s$ represents an integration start position in the t direction, and $t_e$ represents an integration end position in the t direction. Similarly, $y_s$ represents an integration start position in the Y direction, and $y_e$ represents an integration end position in the Y direction. Also, $x_s$ represents an integration start position in the X direction, and $x_e$ represents an integration end position in the X direction. $G_e$ represents a predetermined gain.

Also, in Expression (204), an integral range may be set arbitrarily, and accordingly, with the three-dimensional reintegration method, it becomes possible to create a pixel having an arbitrary powered time-space resolution as to the original pixel (pixel of an input image from the sensor 2 (FIG. 259)) without deterioration by appropriately changing this integral range. That is to say, upon the integral range in the spatial direction being reduced, a pixel pitch can be reduced without restraint. On the other hand, upon the integral range in the spatial direction being enlarged, a pixel pitch can be enlarged without restraint. Also, upon the integral range in the temporal direction being reduced, temporal resolution can be created based on an actual waveform.

FIG. 279 represents a configuration example of the image generating unit 103 employing the three-dimensional reintegration method.

As shown in FIG. 279, this example of the image generating unit 103 includes a conditions setting unit 3301, features storage unit 3302, integral component calculation unit 3303, and output pixel value calculation unit 3304.

The conditions setting unit 3301 sets the number of dimensions n of the approximation function f(x, y, t) based on the actual world estimating information (with the example in FIG. 279, features of the approximation function f(x, y, t)) supplied from the actual world estimating unit 102.

The conditions setting unit 3301 sets an integral range in the case of reintegrating the approximation function f(x, y, t) (in the case of calculating output pixel values). Note that an integral range set by the conditions setting unit 3301 needs not to be the width (vertical width and horizontal width) of a pixel or shutter time itself. For example, it becomes possible to determine a specific integral range in the spatial direction as long as the relative size (spatial resolution power) of an output pixel (pixel to be generated from now by the image generating unit 103) as to the spatial size of each pixel of an input image from the sensor 2 (FIG. 259) is known. Similarly, it becomes possible to determine a specific integral range in the temporal direction as long as the relative time (temporal resolution power) of an output pixel as to the shutter time of the sensor 2 (FIG. 259) is known. Accordingly, the conditions setting unit 3301 can set, for example, a spatial resolution power and temporal resolution power as an integral range.

The features storage unit 3302 temporally stores the features of the approximation function f(x, y, t) sequentially supplied from the actual world estimating unit 102. Subsequently, upon the features storage unit 3302 storing all of the features of the approximation function f(x, y, t), the features storage unit 3302 generates a features table including all of the features of the approximation function f(x, y, t), and supplies this to the output pixel value calculation unit 3304.

Incidentally, upon the right side of the approximation function f(x, y) of the right side of the above Expression (204) being expanded (calculated), the output pixel value M is represented as the following Expression (205).

$$M = \sum_{i=0}^{n} w_i \times k_i(x_s, x_e, y_s, y_e, t_s, t_e) \tag{205}$$

In Expression (205), $K_i(x_s, x_e, y_s, y_e, t_s, t_e)$ represents the integral components of the i-dimensional term. However, $x_s$ represents an integration range start position in the X direction, $x_e$ represents an integration range end position in the X direction, $y_s$ represents an integration range start position in the Y direction, $y_e$ represents an integration range end position in the Y direction, $t_s$ represents an integration range start position in the t direction, and $t_e$ represents an integration range end position in the t direction, respectively.

The integral component calculation unit 3303 calculates the integral components $K_i(x_s, x_e, y_s, y_e, t_s, t_e)$.

Specifically, the integral component calculation unit 3303 calculates the integral components $K_i(x_s, x_e, y_s, y_e, t_s, t_e)$ based on the number of dimensions and the integral range (spatial resolution power or temporal resolution power) set by the conditions setting unit 3301, and the angle θ or movement θ of the data continuity information output from the data continuity detecting unit 101, and supplies the calculated results to the output pixel value calculation unit 3304 as an integral component table.

The output pixel value calculation unit 3304 calculates the right side of the above Expression (205) using the features table supplied from the features storage unit 3302, and the integral component table supplied from the integral component calculation unit 3303, and outputs the calculated result to the outside as the output pixel value M.

Next, description will be made regarding image generating processing (processing in step S103 in FIG. 40) by the image generating unit 103 (FIG. 279) employing the three-dimensional reintegration method with reference to the flowchart in FIG. 280.

For example, let us say that the actual world estimating unit 102 (FIG. 259) has already generated an approximation function f(x, y, t) for approximating the light signals in the actual world 1 (FIG. 259) with a predetermined pixel of an input image as a pixel of interest at the processing in step S102 in FIG. 40 described above.

Also, let us say that the data continuity detecting unit 101 (FIG. 259) has already output the angle θ or movement θ as data continuity information with the same pixel as the actual world estimating unit 102 as a pixel of interest.

In this case, the conditions setting unit 3301 sets conditions (the number of dimensions and an integral range) at step S3301 in FIG. 280.

In step S3302, the features storage unit 3302 acquires the features $w_i$ of the approximation function f(x, y, t) supplied from the actual world estimating unit 102, and generates a features table.

In step S3303, the integral component calculation unit 3303 calculates integral components based on the conditions (the number of dimensions and an integral range) set by the conditions setting unit 3301, and the data continuity information (angle θ or movement θ) supplied from the data continuity detecting unit 101, and generates an integral component table.

Note that the sequence of the processing in step S3302 and the processing in step S3303 is not restricted to the example in FIG. 280, the processing in step S3303 may be executed first, or the processing in step S3302 and the processing in step S3303 may be executed simultaneously.

Next, in step S3304, the output pixel value calculation unit 3304 calculates each output pixel value based on the features table generated by the features storage unit 3302 at the processing in step S3302, and the integral component table generated by the integral component calculation unit 3303 at the processing in step S3303.

In step S3305, the output pixel value calculation unit 3304 determines regarding whether or not the processing of all the pixels has been completed.

In step S3305, in the event that determination is made that the processing of all the pixels has not been completed, the processing returns to step S3302, wherein the subsequent processing is repeatedly performed. That is to say, the pixels that have not become a pixel of interest are sequentially taken as a pixel of interest, and the processing in step S3302 through S3304 is repeatedly performed.

In the event that the processing of all the pixels has been completed (in step S3305, in the event that determination is made that the processing of all the pixels has been completed), the output pixel value calculation unit 3304 outputs the image in step S3306. Then, the image generating processing ends.

Thus, in the above Expression (204), an integral range may be set arbitrarily, and accordingly, with the three-dimensional reintegration method, it becomes possible to create a pixel having an arbitrary powered resolution as to the original pixel (pixel of an input image from the sensor 2 (FIG. 259)) without deterioration by appropriately changing this integral range.

That is to say, with the three-dimensional reintegration method, appropriately changing an integral range in the temporal direction enables temporal resolution to be created. Also, appropriately changing an integral range in the spatial direction enables spatial resolution to be created. Further, appropriately changing each integral range in the temporal direction and in the spatial direction enables both temporal resolution and spatial resolution to be created.

Specifically, with the three-dimensional reintegration method, approximation is not necessary when degenerating three dimension to two dimension or one dimension, thereby enabling high-precision processing. Also, movement in an oblique direction may be processed without degenerating to two dimension. Further, no degenerating to two dimension enables process at each dimension. For example, with the two-dimensional reintegration method, in the event of degenerating in the spatial directions (X direction and Y direction), process in the t direction serving as the temporal direction cannot be performed. On the other hand, with the thee-dimensional reintegration method, any process in the time-space directions may be performed.

Note that as described above, creation of any one of temporal resolution and spatial resolution may be performed even with the one-dimensional reintegration method, but creation of both temporal resolution and spatial resolution cannot be performed with the one-dimensional reintegration method in theory, which becomes possible only by performing two-dimensional or more reintegration. That is to say, creation of both temporal resolution and spatial resolution becomes possible only by employing the above two-dimensional reintegration method and the three-dimensional reintegration method.

Also, the three-dimensional reintegration method takes not one-dimensional and two-dimensional but three-dimensional integration effects into consideration, and accordingly, an image more similar to the light signal in the actual world 1 (FIG. 259) may be created.

In other words, with the three-dimensional reintegration method, for example, the actual world estimating unit 102 in FIG. 259 (FIG. 3) estimates the light signal function F representing the light signals in the actual world by approximating the light signal function F with a predetermined approximation function f on condition that, the pixel value of a pixel corresponding to at least a position in the one-dimensional direction of the time-space directions, of an input image made up of multiple pixels having a pixel value on which the light signals in the actual world 1 are projected by the multiple detecting elements of the sensor 2 each having spatio-temporal integration effects, and projected by the detecting elements of which a part of continuity of the light signals in the actual world 1 drops, is a pixel value acquired by at least integration effects in the one-dimensional direction, which is an assumption.

Further, for example, in the event that the data continuity detecting unit 101 in FIG. 259 (FIG. 3) detects continuity of data of an input image, the actual world estimating unit 102 estimates the light signal function F by approximating the light signal function F with the approximation function f on condition that the pixel value of a pixel corresponding to at least a position in the one-dimensional direction in the time-space directions of the image data, corresponding to continuity of data detected by the data continuity detecting unit 101 is the pixel value acquired by at least integration effects in the one-dimensional direction, which is an assumption.

Speaking in detail, for example, the actual world estimating unit 102 estimates the light signal function by approximating the light signal function F with an approximation function on condition that the pixel value of a pixel corresponding to at least a distance along in the one-dimensional direction from a line corresponding to continuity of data detected by the continuity detecting nit 101 is the pixel value acquired by at least integration effects in the one-dimensional direction, which is an assumption.

With the three-dimensional reintegration method, for example, the image generating unit 103 (configuration is FIG. 279) in FIG. 259 (FIG. 3) generates a pixel value corresponding to a pixel having a desired size by integrating the light signal function F estimated by the actual world estimating unit 102, i.e., the approximation function f in at least desired increments in the one-dimensional direction (e.g., by calculating the right side of the above Expression (201)).

Accordingly, with the three-dimensional reintegration method, an image more similar to the light signal in the actual world 1 (FIG. 259) than that in conventional image generating methods, or the above one-dimensional or two-dimensional reintegration method may be generated.

Next, description will be made regarding the image generating unit 103 which newly generates pixels based on the derivative value or gradient of each pixel in the event that the actual world estimating information input from the actual world estimating unit 102 is information of the derivative value or gradient of each pixel on the approximation function f(x) approximately representing each pixel value of reference pixels with reference to FIG. 281.

Note that the term "derivative value" mentioned here, following the approximation function f(x) approximately representing each pixel value of reference pixels being obtained, means a value obtained at a predetermined position using a one-dimensional differential equation f(x)' obtained from the approximation function f(x) thereof (one-dimensional differential equation f(t)' obtained from an approximation function f(t) in the event that the approximation function is in the frame direction). Also, the term "gradient" mentioned here means the gradient of a predetermined position on the approximation function f(x) directly obtained from the pixel values of perimeter pixels at the predetermined position without obtaining the above approximation function f(x) (or f(t)). However, derivative values mean the gradient at a predetermined position on the approximation function f(x), and accordingly, either case means the gradient at a predetermined position on the approximation function f(x). Accordingly, with regard to derivative values and a gradient serving as the actual world estimating information input from the actual world estimating unit 102, they are unified and referred to as the gradient on the approximation function f(x) (or f(t)), with description of the image generating unit 103 in FIG. 281 and FIG. 285.

A gradient acquiring unit 3401 acquires the gradient information of each pixel, the pixel value of the corresponding pixel, and the gradient in the direction of continuity regarding the approximation function f(x) approximately representing the pixel values of the reference pixels input from the actual world estimating unit 102, and outputs these to an extrapolation/interpolation unit 3402.

The extrapolation/interpolation unit 3402 generates certain-powered higher-density pixels than an input image using extrapolation/interpolation based on the gradient of each pixel on the approximation function f(x), the pixel value of the corresponding pixel, and the gradient in the direction of continuity, which are input from the gradient acquiring unit 3401, and outputs the pixels as an output image.

Next, description will be made regarding image generating processing by the image generating unit 103 in FIG. 281 with reference to the flowchart in FIG. 282.

In step S3401, the gradient acquiring unit 3401 acquires information regarding the gradient (derivative value) on the approximation function f(x), position, and pixel value of each pixel, and the gradient in the direction of continuity, which is input from the actual world estimating unit 102, as actual world estimating information.

At this time, for example, in the event of generating an image made up of pixels having double density in the spatial direction X and spatial direction Y (quadruple in total) as to an input image, information regarding as to a pixel Pin such as shown in FIG. 283, gradients f(Xin)' (gradient in the center position of the pixel Pin), f(Xin−Cx(−0.25))' (gradient of the center position of a pixel Pa when generating a pixel of double density in the Y direction from the pixel Pin), and f(Xin−Cx (0.25))' (gradient of the center position of a pixel Pb when generating a pixel of double density in the Y direction from the pixel Pin), the position and pixel value of the pixel Pin, and a gradient $G_f$ in the direction of continuity is input from the actual world estimating unit 102.

In step S3402, the gradient acquiring unit 3401 selects information of the corresponding pixel of interest, of the actual world estimating information input, and outputs this to the extrapolation/interpolation unit 3402.

In step S3403, the extrapolation/interpolation unit 3402 obtains a shift amount from the position information of the input pixels, and the gradient $G_f$ in the direction of continuity.

Here, a shift amount Cx(ty) is defined as Cx(ty)=ty/$G_f$ when the gradient as continuity is represented with $G_f$. This shift amount Cx(ty) represents a shift width as to the spatial direction X at a position in the spatial direction Y=ty of the approximation function f(x), which is defined on the position in the spatial direction Y=0. Accordingly, for example, in the event that an approximation function on the position in the spatial direction Y=0 is defined as f(x), in the spatial direction Y=ty this approximation function f(x) becomes a function shifted by the Cx(ty) as to the spatial direction X, so that this approximation function is defined as f(x−Cx(ty))(=f(x−ty/$G_f$).

For example, in the event of the pixel Pin such as shown in FIG. 283, when one pixel (one pixel size in the drawing is 1 both in the horizontal direction and in the vertical direction) in the drawing is divided into two pixels in the vertical direction (when generating a double-density pixel in the vertical direction), the extrapolation/interpolation unit 3402 obtains the shift amounts of the pixels Pa and Pb, which are to be obtained. That is to say, in this case, the pixels Pa and Pb are shifted by −0.25 and 0.25 as to the spatial direction Y respectively as viewed from the pixel Pin, so that the shift amounts of the pixels Pa and Pb become Cx(−0.25) and Cx(0.25) respectively. Note that in FIG. 283, the pixel Pin is a square of which general gravity position is (Xin, Yin), and the pixels Pa and Pb are rectangles long in the horizontal direction in the drawing of which general gravity positions are (Xin, Yin+0.25) and (Xin, Yin−0.25) respectively.

In step S3404, the extrapolation/interpolation unit 3402 obtains the pixel values of the pixels Pa and Pb using extrapolation/interpolation through the following Expression (206) and Expression (207) based on the shift amount Cx obtained at the processing in step S3403, the gradient f(Xin)' on the pixel of interest on the approximation function f(x) of the pixel Pin acquired as the actual world estimating information, and the pixel value of the pixel Pin.

$$Pa=Pin-f(Xin)'\times Cx(0.25) \quad (206)$$

$$Pb=Pin-f(Xin)'\times Cx(-0.25) \quad (207)$$

In the above Expression (206) and Expression (207), Pa, Pb, and Pin represent the pixel values of the pixels Pa, Pb, and Pin respectively.

That is to say, as shown in FIG. 284, the amount of change of the pixel value is set by multiplying the gradient f(Xin)' in the pixel of interest Pin by the movement distance in the X direction, i.e., shift amount, and the pixel value of a pixel to be newly generated is set on the basis of the pixel value of the pixel of interest.

In step S3405, the extrapolation/interpolation unit 3402 determines regarding whether or not pixels having predetermined resolution have been obtained. For example, in the event that predetermined resolution is pixels having double density in the vertical direction as to the pixels in an input image, the extrapolation/interpolation unit 3402 determines that pixels having predetermined resolution have been obtained by the above processing, but for example, in the event that pixels having quadruple density (double in the horizontal direction×double in the vertical direction) as to the pixels in the input image have been desired, pixels having predetermined resolution have not been obtained by the above processing. Consequently, in the event that a quadruple-density image is a desired image, the extrapolation/interpolation unit 3402 determines that pixels having predetermined resolution have not been obtained, and the processing returns to step S3403.

In step S3403, the extrapolation/interpolation unit 3402 obtains the shift amounts of pixels P01, P02, P03, and P04 (pixel having quadruple density as to the pixel of interest Pin), which are to be obtained, from the center position of a pixel, which is to be generated, at the second processing respectively. That is to say, in this case, the pixels P01 and P02 are pixels to be obtained from the pixel Pa, so that each shift amount from the pixel Pa is obtained respectively. Here, the pixels P01 and P02 are shifted by −0.25 and 0.25 as to the spatial direction X respectively as viewed from the pixel Pa, and accordingly, each value itself becomes the shift amount thereof (since the pixels are shifted as to the spatial direction X). Similarly, the pixels P03 and P04 are shifted by −0.25 and 0.25 respectively as to the spatial direction X as viewed from the pixel Pb, and accordingly, each value itself becomes the shift amount thereof. Note that in FIG. 283, the pixels P01, P02, P03, and P04 are squares of which gravity positions are four cross-marked positions in the drawing, and the length of each side is 1 for the pixel Pin, and accordingly, around 5 for the pixels P01, P02, P03, and P04 respectively.

In step S3404, the extrapolation/interpolation unit 3402 obtains the pixel values of the pixels P01, P02, P03, and P04 using extrapolation/interpolation through the following Expression (208) through Expression (211) based on the shift amount Cx obtained at the processing in step S3403, the gradients f(Xin−Cx(−0.25))' and f(Xin−Cx(0.25))' at a predetermined position on the approximation function f(x) of the pixels Pa and Pb acquired as actual world estimating information, and the pixel values of the pixels Pa and Pb obtained at the above processing, and stores these in unshown memory.

$$P01=Pa+f(Xin-Cx(0.25))'\times(-0.25) \quad (208)$$

$$P02=Pa+f(Xin-Cx(0.25))'\times(0.25) \quad (209)$$

$$P03=Pb+f(Xin-Cx(-0.25))'\times(-0.25) \quad (210)$$

$$P04=Pb+f(Xin-Cx(-0.25))'\times(0.25) \quad (211)$$

In the above Expression (208) through Expression (211), P01 through P04 represent the pixel values of the pixels P01 through P04 respectively.

In step S3405, the extrapolation/interpolation unit 3402 determines regarding whether or not pixels having predetermined resolution have been obtained, and in this case, the desired quadruple-density pixels have been obtained, and accordingly, the extrapolation/interpolation unit 3402 determines that the pixels having predetermined resolution have been obtained, and the processing proceeds to step S3406.

In step S3406, the gradient acquiring unit 3401 determines regarding whether or not the processing of all pixels has been completed, and in the event that determination is made that the processing of all pixels has not been completed, the processing returns to step S3402, wherein the subsequent processing is repeatedly performed.

In step S3406, in the event that the gradient acquiring unit 3401 determines that the processing of all pixels has been completed, the extrapolation/interpolation unit 3402 outputs an image made up of the generated pixels, which are stored in unshown memory, in step S3407.

That is to say, as shown in FIG. 284, the pixel values of new pixels are obtained using extrapolation/interpolation according to a distance apart in the spatial direction X from the pixel of interest of which gradient is obtained using the gradient f(x)' on the approximation function f(x).

Note that with the above example, description has been made regarding the gradient (derivative value) at the time of calculating a quadruple-density pixel as an example, but in the event that gradient information at many more positions can be obtained as the actual world estimating information, pixels having more density in the spatial directions than that in the above example may be calculated using the same method as the above example.

Also, with regard to the above example, description has been made regarding an example for obtaining double-density pixel values, but the approximation function f(x) is a continuous function, and accordingly, in the event that necessary gradient (derivative value) information can be obtained even regarding pixel values having density other than double density, an image made up of further high-density pixels may be generated.

According to the above description, based on the gradient (or derivative value) f(x)' information of the approximation function f(x) approximating the pixel value of each pixel of an input image supplied as the actual world estimating information in the spatial direction, the pixels of an higher resolution image than the input image may be generated.

Next, description will be made with reference to FIG. 285 regarding the image generating unit 103 for generating new pixel values so as to output an image based upon the derivative values or gradient information for each pixel in a case that the actual world estimation information input from the actual world estimating unit 102 is derivative values or gradient information for these pixels, obtained from f(t) that is a function in the frame direction (time direction) representing approximate pixel values of the reference pixels.

An gradient acquisition unit 3411 acquires the gradient information obtained from an approximate function f(t) which represents approximate pixel values of the reference pixels, the corresponding pixel value, and movement as continuity, for each pixel position, which are input from the actual world estimating unit 102, and outputs the information thus obtained to an extrapolation unit 3412.

The extrapolation unit 3412 generates a high-density pixel of a predetermined order higher than that of the input image using extrapolation based upon the gradient which is obtained from the approximate function f(t), the corresponding pixel value, and movement as continuity, for each pixel, which are input from the gradient acquisition unit 3411, and outputs the image thus generated as an output image.

Next, description will be made regarding image generating processing by the image generating unit 103 shown in FIG. 285, with reference to the flowchart shown in FIG. 286.

In Step S3421, the gradient acquisition unit 3411 acquires information regarding the gradient (derivative value) which is obtained from the approximate function f(t), the position, the pixel value, and movement as continuity, for each pixel, which are input from the actual world estimating unit 102, as actual world estimation information.

For example, in a case of generating an image from the input image with double pixel density in both the spatial direction and the frame direction (i.e., a total of quadruple pixel density), the input information regarding the pixel Pin shown in FIG. 287, received from the actual world estimating unit 102 includes: the gradient f(Tin)' (the gradient at the center of the pixel Pin), f(Tin−Ct(0.25))' (the gradient at the center of the pixel Pat generated in a step for generating pixels in the Y direction from the pixel Pin with double pixel density), f(Tin−Ct(−0.25))' (the gradient at the center of the pixel Pbt generated in a step for generating pixels in the Y direction from the pixel Pin with double pixel density), the position of the pixel Pin, the pixel value, and movement as continuity (motion vector).

In Step S3422, the gradient acquisition unit 3411 selects the information regarding the pixel of interest, from the input actual world estimation information, and outputs the information thus acquired, to the extrapolation unit 3412.

In Step S3423, the extrapolation unit 3412 calculates the shift amount based upon the position information thus input, regarding the pixel and the gradient of continuity direction.

Here, with movement as continuity (gradient on the plane having the frame direction and the spatial direction) as $V_f$, the shift amount Ct(ty) is obtained by the equation $Ct(ty)=ty/V_f$. The shift amount Ct(ty) represents the shift of the approximate function f(t) in the frame direction T, calculated at the position of Y=ty in the spatial direction. Note that the approximate function f(t) is defined at the position Y=0 in the spatial direction. Accordingly, in a case that the approximate function f(t) is defined at the position Y=0 in the spatial direction, for example, the approximate function f(t) is shifted at Y=ty in the spatial direction by Ct(ty) in the spatial direction T, and accordingly, the approximate function at Y=ty is defined as $f(t-Ct(ty))(=f(t-ty/V_f))$.

For example, let us consider the pixel Pin as shown in FIG. 287. In a case that the one pixel in the drawing (let us say that the pixel is formed with a pixel size of (1, 1) both in the frame direction and the spatial direction) is divided into two in the spatial direction (in a case of generating an image with double pixel density in the spatial direction), the extrapolation unit 3412 calculates the shift amounts for obtaining the pixels Pat and Pbt. That is to say, the pixels Pat and Pbt are shifted along the spatial direction Y from the pixel Pin by 0.25 and −0.25, respectively. Accordingly, the shift amounts for obtaining the pixel values of the pixels Pat and Pbt are Ct(−0.25) and Ct(0.25), respectively. Note that in FIG. 287, the pixel Pin is formed in the shape of a square with the center of gravity at around (Xin, Yin). On the other hand, the pixels Pat and Pbt are formed in the shape of a rectangle having long sides in the horizontal direction in the drawing with the centers of gravity of around (Xin, Yin+0.25) and (Xin, Yin−0.25), respectively.

In Step S3424, the extrapolation unit 3412 calculates the pixel values of the pixels Pat and Pbt with the following Expressions (212) and (213) using extrapolation based upon the shift amount obtained in Step S3423, the gradient f(Tin)' at the pixel of interest, which is obtained from the approximate function f(t) for providing the pixel value of the pixel Pin and has been acquired as the actual world estimation information, and the pixel value of the pixel Pin.

$$pat=Pin-f(Tin)'\times Ct(0.25) \tag{212}$$

$$pbt=Pin-f(Xin)'\times Ct(-0.25) \tag{213}$$

In the above Expressions (212) and (213), Pat, Pbt, and Pin represent the pixel values of the pixel Pat, Pbt, and Pin, respectively.

That is to say, as shown in FIG. 288, the change in the pixel value is calculated by multiplying the gradient f(Xin)' at the pixel of interest Pin by the distance in the X direction, i.e., the shift amount. Then, the value of a new pixel, which is to be generated, is determined using the change thus calculated with the pixel value of the pixel of interest as a base.

In Step S3425, the extrapolation unit 3412 determines whether or not the pixels thus generated provide requested resolution. For example, in a case that the user has requested resolution of double pixel density in the spatial direction as compared with the input image, the extrapolation unit 3412 determines that requested resolution image has been obtained. However, in a case that the user has requested resolution of quadruple pixel density (double pixel density in both the frame direction and the spatial direction), the above processing does not provide the requested pixel density. Accordingly, in a case that the user has requested resolution of quadruple pixel density, the extrapolation unit 3412 determines that requested resolution image has not been obtained, and the flow returns to Step S3423.

In Step S3423 for the second processing, the extrapolation unit 3412 calculates the shift amounts from the pixels as bases for obtaining the centers of the pixels P01*t*, P02*t*, P03*t*, and P04*t* (quadruple pixel density as compared with the pixel of interest Pin). That is to say, in this case, the pixels P01*t* and P02*t* are obtained from the pixel Pat, and accordingly, the shift amounts from the pixel Pat are calculated for obtaining these pixels. Here, the pixels P01*t* and P02*t* are shifted from the pixel Pat in the frame direction T by −0.25 and 0.25, respectively, and accordingly, the distances therebetween without any conversion are employed as the shift amounts. In the same way, the pixels P03*t* and P04*t* are shifted from the pixel Pbt in the frame direction T by −0.25 and 0.25, respectively, and accordingly, the distances therebetween without any conversion are employed as the shift amounts. Note that in FIG. 287, each of the pixels P01*t*, P02*t*, P03*t*, and P04*t* is formed in the shape of a square having the center of gravity denoted by a corresponding one of the four cross marks in the drawing, and the length of each side of each of these pixels P01*t*, P02*t*, P03*t*, and P04*t* is approximately 0.5, since the length of each side of the pixel Pin is 1.

In Step S3424, the extrapolation unit 3412 calculates the pixel values of the pixels P01*t*, P02*t*, P03*t*, and P04*t*, with the following Expressions (214) through (217) using extrapolation based upon the shift amount Ct obtained in Step S3423, f(Tin−Ct(0.25))' and f(Tin−Ct(−0.25))' which are the gradients of the approximate function f(t) at the corresponding positions of Pat and Pbt and acquired as the actual world estimation information, and the pixel values of the pixels Pat and Pbt obtained in the above processing. The pixel values of the pixels P01*t*, P02*t*, P03*t*, and P04*t* thus obtained are stored in unshown memory.

$$P01t=Pat+f(Tin-Ct(0.25))'\times(-0.25) \tag{214}$$

$$P02t=Pat+f(Tin-Ct(0.25))'\times(0.25) \tag{215}$$

$$P03t=Pbt+f(Tin-Ct(-0.25))'\times(-0.25) \tag{216}$$

$$P04t=Pbt+f(Tin-Ct(-0.25))'\times(0.25) \tag{217}$$

In the above Expressions (208) through (211), P01*t* through P04*t* represent the pixel values of the pixels P01*t* through P04*t*, respectively.

In Step S3425, the extrapolation unit 3412 determines whether or not the pixel density for achieving the requested resolution has been obtained. In this stage, the requested quadruple pixel density is obtained. Accordingly, the extrapolation unit 3412 determines that the pixel density for requested resolution has been obtained, following which the flow proceeds to Step S3426.

In Step S3426, the gradient acquisition unit 3411 determines whether or not processing has been performed for all the pixels. In a case that the gradient acquisition unit 3411 determines that processing has not been performed for all the pixels, the flow returns to Step S3422, and subsequent processing is repeated.

In Step S3426, the gradient acquisition unit 3411 determines that processing has been performed for all the pixels, the extrapolation unit 3412 outputs an image formed of generated pixels stored in the unshown memory in Step S3427.

That is to say, as shown in FIG. 288, the gradient of the pixel of interest is obtained using the gradient f(t)' of the approximate function f(t), and the pixel values of new pixels are calculated corresponding to the number of frames positioned along the frame direction T from the pixel of interest.

While description has been made in the above example regarding an example of the gradient (derivative value) at the time of computing a quadruple-density pixel, the same technique can be used to further compute pixels in the frame direction as well, if gradient information at a greater number of positions can be obtained as actual world estimation information.

While description has been made regarding an arrangement for obtaining a double pixel-density image, an arrangement may be made wherein much higher pixel-density image is obtained based upon the information regarding the necessary gradient information (derivative values) using the nature of the approximate function f(t) as a continuous function.

The above-described processing enables creation of a higher resolution pixel image than the input image in the frame direction based upon the information regarding f(t)' which is supplied as the actual world estimation information, and is the gradient (or derivative value) of the approximate function f(t) which provides an approximate value of the pixel value of each pixel of the input image.

With the present embodiment described above, data continuity is detected from the image data formed of multiple pixels having the pixel values obtained by projecting the optical signals in the real world by actions of multiple detecting elements; a part of continuity of the optical signals in the real world being lost due to the projection with the multiple detecting elements each of which has time-space integration effects. Then, the gradients at the multiple pixels shifted from the pixel of interest in the image data in one dimensional direction of the time-space directions are employed as a function corresponding to the optical signals in the real world. Subsequently, the line is calculated for each of the aforementioned multiple pixels shifted from the center of the pixel of interest in the predetermined direction, with the center matching that of the corresponding pixel and with the gradient at the pixel thus employed. Then, the values at both ends of the line thus obtained within the pixel of interest are employed as the pixel values of a higher pixel-density image than the input image formed of the pixel of interest. This enables creation of high-resolution image in the time-space directions than the input image.

Next, description will be made regarding another arrangement of the image generating unit 103 (see FIG. 3) according to the present embodiment with reference to FIG. 289 through FIG. 314.

FIG. 289 shows an example of a configuration of the image generating unit 103 according to the present embodiment.

The image generating unit 103 shown in FIG. 289 includes a class classification adaptation unit 3501 for executing conventional class classification adaptation processing, a class classification adaptation correction unit 3502 for performing correction of the results of the class classification adaptation processing (detailed description will be made later), and addition unit 3503 for making the sum of an image output from the class classification adaptation unit 3501 and an image output from the class classification adaptation processing correction unit 3502, and outputting the summed image as an output image to external circuits.

Note that the image output from the class classification adaptation processing unit 3501 will be referred to as "predicted image" hereafter. On the other hand, the image output from the class classification adaptation processing correction unit 3502 will be referred to as "correction image" or "subtraction predicted image". Note that description will be made later regarding the concept behind the "predicted image" and "subtraction predicted image".

Also, in the present embodiment, let us say that the class classification adaptation processing is processing for improving the spatial resolution of the input image, for example. That is to say, the class classification adaptation processing is processing for converting the input image with standard resolution into the predicted image with high resolution.

Note that the image with the standard resolution will be referred to as "SD (Standard Definition) image" hereafter as appropriate. Also, the pixels forming the SD image will be referred to as "SD pixels" as appropriate.

On the other hand, the high-resolution image will be referred to as "HD (High Definition) image" hereafter as appropriate. Also, the pixels forming the HD image will be referred to as "HD pixels" as appropriate.

Next, description will be made below regarding a specific example of the class classification adaptation processing according to the present embodiment.

First, the features are obtained for each of the SD pixels including the pixel of interest and the pixels therearound (such SD pixels will be referred to as "class tap" hereafter) for calculating the HD pixels of the predicted image (HD image) corresponding to the pixel of interest (SD pixel) of the input image (SD image). Then, the class of the class tap is selected from classes prepared beforehand, based upon the features thus obtained (the class code of the class tap is determined).

Then, product-sum calculation is performed using the coefficients forming a coefficient set selected from multiple coefficient sets prepared beforehand (each coefficient set corresponds to a certain class code) based upon the class code thus determined, and the SD pixels including the pixel of interest and the pixels therearound (Such SD pixels will be referred to as "prediction tap" hereafter. Note that the class tap may also be employed as the prediction tap.), so as to obtain HD pixels of a predicted image (HD image) corresponding to the pixel of interest (SD pixel) of the input image (SD image).

Accordingly, with the arrangement according to the present embodiment, the input image (SD image) is subjected to conventional class classification adaptation processing at the class classification adaptation processing unit 3501 so as to generate the predicted image (HD image). Furthermore, the predicted image thus obtained is corrected at the addition unit 3503 using the correction image output from the class classification adaptation processing correction unit 3502 (by making the sum of the predicted image and the correction image), thereby obtaining the output image (HD image).

That is to say, the arrangement according to the present embodiment can be said to be an arrangement of the image generating unit 103 of the image processing device (FIG. 3) for performing processing based upon the continuity, from the perspective of the continuity. On the other hand, the arrangement according to the present embodiment can also be said to be an arrangement of the image processing device further including the data continuity detecting unit 101, the actual world estimating unit 102, the class classification adaptation correction unit 3502, and the addition unit 3503, for performing correction of the class classification adaptation processing, as compared with a conventional image processing device formed of the sensor 2 and the class classification adaptation processing unit 3501, from the perspective of class classification adaptation processing.

Accordingly, such an arrangement according to the present embodiment will be referred to as "class classification processing correction means" hereafter, as opposed to reintegration means described above.

Detailed description will be made regarding the image generating unit 103 using the class classification processing correction means.

In FIG. 289, upon input of signals in the actual world 1 (distribution of the light intensity) to the sensor 2, the input image is output from the sensor 2. The input image is input to the class classification adaptation processing unit 3501 of the image generating unit 103, as well as to the data continuity detecting unit 101.

The class classification adaptation processing unit 3501 performs conventional class classification adaptation processing for the input image so as to generate the predicted image, and output the predicted image to the addition unit 3503.

As described above, with the class classification adaptation processing unit 3501, the input image (image data) input from the sensor 2 is employed as a target image which is to be subjected to processing, as well as a reference image. That is to say, although the input image from the sensor 2 is different (distorted) from the signals of the actual world 1 due to the integration effects described above, the class classification adaptation processing unit 3501 performs the processing using the input image different from the signals of the actual world 1, as a correct reference image.

As a result, in a case that the HD image is generated using the class classification adaptation processing based upon the input image (SD image) in which original details have been lost in the input stage where the input image has been output from the sensor 2, such an HD image may have a problem that original details cannot be reproduced completely.

In order to solve the aforementioned problem, with the class classification processing correction means, the class classification adaptation processing correction unit 3502 of the image generating unit 103 employs the information (actual world estimation information) for estimating the original image (signals of the actual world 1 having original continuity) which is to be input to the sensor 2, as a target image to be subjected to processing as well as a reference image, instead of the input image from the sensor 2, so as to create a correction image for correcting the predicted image output from the class classification adaptation processing unit 3501.

The actual world estimation information is created by actions of the data continuity detecting unit 101 and the actual world estimating unit 102.

That is to say, the data continuity detecting unit 101 detects the continuity of the data (the data continuity corresponding to the continuity contained in signals of the actual world 1, which are input to the sensor 2) contained in the input image output from the sensor 2, and outputs the detection results as the data continuity information, to the actual world estimating unit 102.

Note that while FIG. 289 shows an arrangement wherein the angle is employed as the data continuity information, the data continuity information is not restricted to the angle, rather various kinds information may be employed as the data continuity information.

The actual world estimating unit 102 creates the actual estimation information based upon the angle (data continuity information) thus input, and outputs the actual world estimation information thus created, to the class classification adaptation correction unit 3502 of the image generating unit 103.

Note that while FIG. 289 shows an arrangement wherein the features-amount image (detailed description thereof will be made later) is employed as the actual world estimation information, the actual world estimation information is not restricted to the features-amount image, various information may be employed as described above.

The class classification adaptation processing correction unit 3502 creates a correction image based upon the features-amount image (actual world estimation information) thus input, and outputs the correction image to the addition unit 3503.

The addition unit 3503 makes the sum of the predicted image output from the class classification adaptation processing unit 3501 and the correction image output from the class classification adaptation processing correction unit 3502, and outputs the summed image (HD image) as an output image, to external circuits.

The output image thus output is similar to the signals (image) of the actual world 1 with higher precision than the predicted image. That is to say, the class classification adaptation processing correction means enable the user to solve the aforementioned problem.

Furthermore, with the signal processing device (image processing device) 4 having a configuration as shown in FIG. 289, such processing can be applied for the entire area of one frame. That is to say, while a signal processing device using a hybrid technique described later (e.g., an arrangement described later with reference to FIG. 315) or the like has need of identifying the pixel region for generating the output image, the signal processing device 4 shown in FIG. 289 has the advantage that there is no need of identifying such pixel region.

Next, description will be made in detail regarding the class classification adaptation processing unit 3510 of the image generating device 103.

FIG. 290 shows a configuration example of the class classification adaptation processing unit 3501.

In FIG. 290, the input image (SD image) input from the sensor 2 is supplied to a region extracting unit 3511 and a region extracting unit 3515. The region extracting unit 3511 extracts a class tap (the SD pixels existing at predetermined positions, which includes the pixel of interest (SD pixel)), and outputs the class tap to a pattern detecting unit 3512. The pattern detecting unit 3512 detects the pattern of the input image based upon the class tap thus input.

A class-code determining unit 3513 determines the class code based upon the pattern detected by the pattern detecting unit 3512, and outputs the class code to a coefficient memory 3514 and a region extracting unit 3515. The coefficient memory 3514 stores the coefficients for each class code prepared beforehand by learning, reads out the coefficients corresponding to the class code input from the class code determining unit 3513, and outputs the coefficients to a prediction computing unit 3516.

Note that description will be made later regarding the learning processing for obtaining the coefficients stored in the coefficient memory 3514, with reference to a block diagram of a class classification adaptation processing learning unit shown in FIG. 292.

Also, the coefficients stored in the coefficient memory 3514 are used for creating a prediction image (HD image) as described later. Accordingly, the coefficients stored in the coefficient memory 3514 will be referred to as "prediction coefficients" in order to distinguishing the aforementioned coefficients from other kinds of coefficients.

The region extracting unit 3515 extracts a prediction tap (SD pixels which exist at predetermined positions including the pixel of interest) necessary for predicting and creating a prediction image (HD image) from the input image (SD image) input from the sensor 2 based upon the class code input from the class code determining unit 3513, and outputs the prediction tap to the prediction computing unit 3516.

The prediction computing unit 3516 executes product-sum computation using the prediction tap input from the region extracting unit 3515 and the prediction coefficients input from the coefficient memory 3514, creates the HD pixels of the prediction image (HD image) corresponding to the pixel of interest (SD pixel) of the input image (SD image), and outputs the HD pixels to the addition unit 3503.

More specifically, the coefficient memory 3514 outputs the prediction coefficients corresponding to the class code supplied from the class code determining unit 3513 to the prediction computing unit 3516. The prediction computing unit 3516 executes the product-sum computation represented by the following Expression (218) using the prediction tap which is supplied from the region extracting unit 3515 and is extracted from the pixel values of predetermined pixels of the input image, and the prediction coefficients supplied from the coefficient memory 3514, thereby obtaining (predicting and estimating) the HD pixels of the prediction image (HD image).

$$q' = \sum_{i=0}^{n} d_i \times c_i \tag{218}$$

In Expression (218), q' represents the HD pixel of the prediction image (HD image). Each of $c_i$ (i represents an integer of 1 through n) represents the corresponding prediction tap (SD pixel). Furthermore, each of $d_i$ represents the corresponding prediction coefficient.

As described above, the class classification adaptation processing unit 3501 predicts and estimates the corresponding HD image based upon the SD image (input image), and accordingly, in this case, the HD image output from the class classification adaptation processing unit 3501 is referred to as "prediction image".

FIG. 291 shows a learning device (calculating device for obtaining the prediction coefficients) for determining the prediction coefficients ($d_i$ in Expression (215)) stored in the coefficient memory 3514 of the class classification adaptation processing unit 3501.

Note that with the class classification adaptation processing correction technique, coefficient memory (correction coefficient memory 3554 which will be described later with reference to FIG. 299) is included in the class classification adaptation processing correction unit 3502, in addition to the coefficient memory 3514. Accordingly, as shown in FIG. 291, a learning device 3504 according to the class classification adaptation processing technique includes a learning unit 3561 (which will be referred to as "class classification adaptation processing correction learning unit 3561" hereafter) for determining the coefficients stored in the correction coefficient memory 3554 of the class classification adaptation processing correction unit 3502 as well as a learning unit 3521 (which will be referred to as "class classification adaptation processing learning unit 3521" hereafter) for determining the prediction coefficients ($d_i$ in Expression (215)) stored in the coefficient memory 3514 of the class classification adaptation processing unit 3501.

Accordingly, while the tutor image used in the class classification adaptation processing learning unit 3521 will be referred to as "first tutor image" hereafter, the tutor image used in the class classification adaptation processing correction learning unit 3561 will be referred to as "second tutor image" hereafter. In the same way, while the student image used in the class classification adaptation processing learning unit 3521 will be referred to as "first student image" hereafter, the student image used in the class classification adaptation processing correction learning unit 3561 will be referred to as "second student image" hereafter.

Note that description will be made later regarding the class classification adaptation processing correction learning unit 3561.

FIG. 292 shows a detailed configuration example of the class classification adaptation processing learning unit 3521.

In FIG. 292, a certain image is input to the class classification adaptation processing correction learning unit 3561 (FIG. 291), as well as to a down-converter unit 3531 and a normal equation generating unit 3536 as a first tutor image (HD image).

The down-converter unit 3531 generates a first student image (SD image) with a lower resolution than the first tutor image based upon the input first tutor image (HD image) (converts the first tutor image into a first student image with a lower resolution.), and outputs the first student image to region extracting units 3532 and 3535, and the class classification adaptation processing correction learning unit 3561 (FIG. 291).

As described above, the class classification adaptation processing learning unit 3521 includes the down-converter unit 3531, and accordingly, the first tutor image (HD image) has no need of having a higher resolution than the input image from the aforementioned sensor 2 (FIG. 289). The reason is that in this case, the first tutor image subjected to down-converting processing (the processing for reducing the resolution of the image) is employed as the first student image, i.e., the SD image. That is to say, the first tutor image corresponding to the first student image is employed as an HD image. Accordingly, the input image from the sensor 2 may be employed as the first tutor image without any conversion.

The region extracting unit 3532 extracts the class tap (SD pixels) necessary for class classification from the first student image (SD image) thus supplied, and outputs the class tap to a pattern detecting unit 3533. The pattern detecting unit 3533 detects the pattern of the class tap thus input, and outputs the detection results to a class code determining unit 3534. The class code determining unit 3534 determines the class code corresponding to the input pattern, and outputs the class code to the region extracting unit 3535 and the normal equation generating unit 3536.

The region extracting unit 3535 extracts the prediction tap (SD pixels) from the first student image (SD image) input from the down-converter unit 3531 based upon the class code input from the class code determining unit 3534, and outputs the prediction tap to the normal equation generating unit 3536 and a prediction computing unit 3558.

Note that the region extracting unit 3532, the pattern detecting unit 3533, the class-code determining unit 3534, and the region extracting unit 3535 have generally the same configurations and functions as those of the region extracting unit 3511, the pattern detecting unit 3512, the class-code determining unit 3513, and the region extracting unit 3515, of the class classification adaptation processing unit 3501 shown in FIG. 290.

The normal equation generating unit 3536 generates normal equations based upon the prediction tap (SD pixels) of the first student image (SD image) input from the region extracting unit 3535, and the HD pixels of the first tutor image (HD image), for each class code of all class codes input form the class code determining unit 3545, and supplies the normal equations to a coefficient determining unit 3537. Upon reception of the normal equations corresponding to a certain class code from the normal equation generating unit 3537, the coefficient determining unit 3537 computes the prediction coefficients using the normal equations. Then, the coefficient determining unit 3537 supplies the computed prediction coefficients to a prediction computing unit 3538, as well as storing the prediction coefficients in the coefficient memory 3514 in association with the class code.

Detailed description will be made regarding the normal equation generating unit 3536 and the coefficient determining unit 3537.

In the aforementioned Expression (218), each of the prediction coefficients $d_i$ is undetermined coefficients before learning processing. The learning processing is performed by inputting HD pixels of the multiple tutor images (HD image) for each class code. Let us say that there are m HD pixels corresponding to a certain class code. With each of the m HD pixels as $q_k$ (k represents an integer of 1 through m), the following Expression (219) is introduced from the Expression (218).

$$q_k = \sum_{i=0}^{n} d_i \times c_{ik} + e_k \qquad (219)$$

That is to say, the Expression (219) indicates that the HD pixel $q_k$ can be predicted and estimated by computing the right side of the Expression (219). Note that in Expression (219), $e_k$ represents error. That is to say, the HD pixel $q_k'$ which is a prediction image (HD image) which is the results of computing the right side, does not completely match the actual HD pixel $q_k$, and includes a certain error $e_k$.

Accordingly, in Expression (219), the prediction coefficients $d_i$ which exhibit the minimum of the sum of the squares of errors $e_k$ should be obtained by the learning processing, for example.

Specifically, the number of the HD pixels $q_k$ prepared for the learning processing should be greater than n (i.e., m>n). In this case, the prediction coefficients $d_i$ are determined as a unique solution using the least square method.

That is to say, the normal equations for obtaining the prediction coefficients $d_i$ in the right side of the Expression (219) using the least square method are represented by the following Expression (220).

$$\begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \begin{bmatrix} d_1 \\ d_2 \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (220)$$

Accordingly, the normal equations represented by the Expression (220) are created and solved, thereby determining the prediction coefficients $d_i$ as a unique solution.

Specifically, let us say that the matrices in the Expression (220) representing the normal equations are defined as the following Expressions (221) through (223). In this case, the normal equations are represented by the following Expression (224).

$$C_{MAT} = \begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \quad (221)$$

$$D_{MAT} = \begin{bmatrix} d_1 \\ d_2 \\ \vdots \\ d_n \end{bmatrix} \quad (222)$$

$$Q_{MAT} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (223)$$

$$C_{MAT} D_{MAT} = Q_{MAT} \quad (224)$$

As shown in Expression (222), each component of the matrix $D_{MAT}$ is the prediction coefficient $d_i$ which is to be obtained. With the present embodiment, the matrix $C_{MAT}$ in the left side and the matrix $Q_{MAT}$ in the right side in Expression (224) are determined, thereby obtaining the matrix $D_{MAT}$ (i.e., the prediction coefficients $d_i$) using matrix computation.

More specifically, as shown in Expression (221), each component of the matrix $C_{MAT}$ can be computed since the prediction tap $c_{ik}$ is known. With the present embodiment, the prediction tap $c_{ik}$ is extracted by the region extracting unit 3535. The normal equation generating unit 3536 computes each component of the matrix $C_{MAT}$ using the prediction tap $c_{ik}$ supplied from the region extracting unit 3535.

Also, with the present embodiment, the prediction tap $C_{ik}$ and the HD pixel $q_k$ are known. Accordingly, each component of the matrix $Q_{MAT}$ can be computed as shown in Expression (223). Note that the prediction tap $C_{ik}$ is the same as in the matrix $C_{MAT}$. Also, employed as the HD pixel $q_k$ is the HD pixel of the first tutor image corresponding to the pixel of interest (SD pixel of the first student image) included in the prediction tap $c_{ik}$. Accordingly, the normal equation generating unit 3536 computes each component of the matrix $Q_{MAT}$ based upon the prediction tap $c_{ik}$ supplied from the region extracting unit 3535 and the first tutor image.

As described above, the normal equation generating unit 3536 computes each component of the matrix $C_{MAT}$ and the matrix $Q_{MAT}$, and supplies the computation results in association with the class code to the coefficient determining unit 3537.

The coefficient determining unit 3537 computes the prediction coefficient $d_i$ serving as each component of the matrix $D_{MAT}$ in the above Expression (224) based upon the normal equation corresponding to the supplied certain class code.

Specifically, the above Expression (224) can be transformed into the following Expression (225)

$$D_{MAT} = C_{MAT}^{-1} Q_{MAT} \quad (225)$$

In Expression (225), each component of the matrix $D_{MAT}$ in the left side is the prediction coefficient $d_i$ which is to be obtained. On the other hand, each component of the matrix $C_{MAT}$ and the matrix $Q_{MAT}$ is supplied from the normal equation generating unit 3536. With the present embodiment, upon reception of each component of the matrix $C_{MAT}$ and the matrix $Q_{MAT}$ corresponding to the current class code from the normal equation generating unit 3536, the coefficient determining unit 3537 executes the matrix computation represented by the right side of Expression (225), thereby computing the matrix $D_{MAT}$. Then, the coefficient determining unit 3537 supplies the computation results (prediction coefficient $d_i$) to the prediction computation unit 3538, as well as storing the computation results in the coefficient memory 3514 in association with the class code.

The prediction computation unit 3538 executes product-sum computation using the prediction tap input from the region extracting unit 3535 and the prediction coefficients determined by the coefficient determining unit 3537, thereby generating the HD pixel of the prediction image (predicted image as the first tutor image) corresponding to the pixel of interest (SD pixel) of the first student image (SD image). The HD pixels thus generated are output as a learning-prediction image to the class classification adaptation processing correction learning unit 3561 (FIG. 291).

More specifically, with the prediction computation unit 3538, the prediction tap extracted from the pixel values around a certain pixel position in the first student image supplied from the region extracting unit 3535 is employed as $c_i$ (i represents an integer of 1 through n). Furthermore, each of the prediction coefficients supplied from the coefficient determining unit 3537 is employed as $d_i$. The prediction computation unit 3538 executes product-sum computation represented by the above Expression (218) using the $c_i$ and $d_i$ thus employed, thereby obtaining the HD pixel q' of the learning-prediction image (HD image) (i.e., thereby predicting and estimating the first tutor image).

Now, description will be made with reference to FIG. 293 through FIG. 298 regarding a problem of the conventional class classification adaptation processing (class classification adaptation processing unit 3501) described above, i.e., a problem that original details cannot be reproduced completely in a case that the HD image (predicted image of signals in the actual world 1) is generated by the class classification adaptation processing unit 3501 shown in FIG. 289 based upon the input image (SD image) in which original details have been lost in the input stage where the input image has been output from the sensor 2.

FIG. 293 shows an example of processing results of the class classification adaptation unit 3501.

In FIG. 293, an HD image 3541 has a fine line with a gradient of around 5° clockwise as to the vertical direction in the drawing. On the other hand, an SD image 3542 is generated from the HD image 3541 such that the average of each block of 2×2 pixels (HD pixels) of the HD image 3541 is employed as the corresponding single pixel (SD pixel) thereof. That is to say, the SD image 3542 is "down-converted" (reduced-resolution) image of the HD image 3541.

In other words, the HD image 3541 can be assumed to be an image (signals in the actual world 1 (FIG. 289)) which is to be output from the sensor 2 (FIG. 289) in this simulation. In this case, the SD image 3542 can be assumed to be an image corresponding to the HD image 3541, obtained from the sensor 2 having certain integration properties in the spatial direction in this simulation. That is to say, the SD image 3542 can be assumed to be an image input from the sensor 2 in this simulation.

In this simulation, the SD image 3542 is input to the class classification adaptation processing unit 3501 (FIG. 289). The predicted image output from the class classification adaptation processing unit 3501 is a predicted image 3543. That is to say, the predicted image 3543 is an HD image (image with the same resolution as with the original HD image 3541) generated by conventional class classification adaptation processing. Note that the prediction coefficients (prediction coefficients stored in the coefficient memory 3514 (FIG. 290)) used for prediction computation by the class classification adaptation processing unit 3501 are obtained with learning/computation processing performed by the class classification adaptation processing learning unit 3561 (FIG. 292) with the HD image 3541 as the first tutor image and with the SD image 3542 as the first student image.

Making a comparison between the HD image 3541, the SD image 3542, and the predicted image 3543, it has been confirmed that the predicted image 3543 is more similar to the HD image 3541 than the SD image 3542.

The comparison results indicate that the class classification adaptation processing 3501 generates the predicted image 3543 with reproduced original details using conventional class classification adaptation processing based upon the SD image 3542 in which the original details in the HD image 3541 have been lost.

However, making a comparison between the predicted image 3543 and the HD image 3541, it cannot be said definitely that the predicted image 3543 is a complete reproduced image of the HD image 3541.

In order to investigate the cause of such insufficient reproduction of the predicted image 3543 as to the HD image 3541, the present applicant formed a summed image by making the sum of the HD image 3541 and the inverse image of the predicted image 3534 using the addition unit 3546, i.e., a subtraction image 3544 obtained by subtracting the predicted image 3543 from the HD image 3541 (In a case of large difference in pixel values therebetween, the pixel of the subtraction image is formed with a density close to white. On the other hand, in a case of small difference in pixel values therebetween, the pixel of the subtraction image is formed with a density close to black.).

In the same way, the present applicant formed a summed image by making the sum of the HD image 3541 and the inverse image of the SD image 3542 using the addition unit 3547, i.e., a subtraction image 3545 obtained by subtracting the SD image 3542 from the HD image 3541 (In a case of large difference in pixel values therebetween, the pixel of the subtraction image is formed with a density close to white. On the other hand, in a case of small difference in pixel values therebetween, the pixel of the subtraction image is formed with a density close to black.).

Then, making a comparison between the subtraction image 3544 and the subtraction image 3545, the present applicant obtained investigation results as follows.

That is to say, the region which exhibits great difference in the pixel value between the HD image 3541 and the SD image 3542 (i.e., the region formed with a density close to white, in the subtraction image 3545) generally matches the region which exhibits great difference in the pixel value between the HD image 3541 and the predicted image 3543 (i.e., the region formed with a density close to white, in the subtraction image 3544).

In other words, the region in the predicted image 3543, exhibiting insufficient reproduction results as to the HD image 3541 generally matches the region which exhibits great difference in the pixel value between the HD image 3541 and the SD image 3542 (i.e., the region formed with a density close to white, in the subtraction image 3545).

Then, in order to solve the cause of the investigation results, the present applicant further made investigation as follows.

That is to say, first, the present applicant investigated reproduction results in the region which exhibits small difference in the pixel value between the HD image 3541 and the predicted image 3543 (i.e., the region formed with a density close to black, in the subtraction image 3544). With the aforementioned region, information obtained for this investigation are: the actual values of the HD image 3541; the actual pixel values of the SD image 3542; and the actual waveform corresponding to the HD image 3541 (signals in the actual world 1). The investigation results are shown in FIG. 294 and FIG. 295.

FIG. 294 shows an example of the investigation-target region. Note that in FIG. 294, the horizontal direction is represented by the X direction which is one spatial direction, and the vertical direction is represented by the Y direction which is another spatial direction.

That is to say, the present applicant investigated reproduction results of a region 3544-1 in the subtraction image 3544 shown in FIG. 294, which is an example of a region which exhibits small difference in the pixel value between the HD image 3541 and the predicted image 3543.

FIG. 295 is a chart which shows: the actual pixel values of the HD image 3541; the actual pixel values of the SD image 3542, corresponding to the four pixels from the left side of a series of six HD pixels in the X direction within the region 3544-1 shown in FIG. 294; and the actual waveform (signals in the actual world 1).

In FIG. 295, the vertical axis represents the pixel value, and the horizontal axis represents the x-axis parallel with the spatial direction X. Note that the X axis is defined with the origin as the position of the left end of the third HD pixel form the left side of the six HD pixels within the subtraction image 3544 in the drawing. Each coordinate value is defined with the origin thus obtained as the base. Note that the X-axis coordinate values are defined with the pixel width of an HD pixel of the subtraction image 3544 as 0.5. That is to say, the subtraction image 3544 is an HD image, and accordingly, each pixel of the HD image is plotted in the chart with the pixel width $L_t$ of 0.5 (which will be referred to as "HD-pixel width $L_t$" hereafter). On the other hand, in this case, each pixel of the SD image 3542 is plotted with the pixel width (which will be referred to as "SD-pixel width $L_s$" hereafter) which is twice the HD-pixel width $L_t$, i.e., with the SD-pixel width $L_s$ of 1.

Also, in FIG. 295, the solid line represents the pixel values of the HD image 3541, the dotted line represents the pixel values of the SD image 3542, and the broken line represents the signal waveform of the actual world 1 along the X-direction. Note that it is difficult to plot the actual waveform of the actual world 1 in reality. Accordingly, the broken line shown in FIG. 295 represents an approximate function f(x) which approximates the waveform along the X-direction using the aforementioned linear polynomial approximation technique (the actual estimating unit 102 according to the first embodiment shown in FIG. 289).

Then, the present applicant investigated reproduction results in the region which exhibits large difference in the pixel value between the HD image 3541 and the predicted image 3543 (i.e., the region formed with a density close to white, in the subtraction image 3544) in the same way as in the aforementioned investigation with regard to the region which exhibits small difference in the pixel value therebetween. With the aforementioned region, information obtained for this investigation are: the actual values of the HD image 3541; the actual pixel values of the SD image 3542; and the actual waveform corresponding to the HD image 3541 (signals in the actual world 1), in the same way. The investigation results are shown in FIG. 296 and FIG. 297.

FIG. 296 shows an example of the investigation-target region. Note that in FIG. 296, the horizontal direction is represented by the X direction which is a spatial direction, and the vertical direction is represented by the Y direction which is another spatial direction.

That is to say, the present applicant investigated reproduction results of a region 3544-2 in the subtraction image 3544 shown in FIG. 296, which is an example of a region which exhibits large difference in the pixel value between the HD image 3541 and the predicted image 3543.

FIG. 297 is a chart which shows: the actual pixel values of the HD image 3541; the actual pixel values of the SD image 3542, corresponding to the four pixels from the left side of a series of six HD pixels in the X direction within the region 3544-2 shown in FIG. 296; and the actual waveform (signals in the actual world 1).

In FIG. 297, the vertical axis represents the pixel value, and the horizontal axis represents the x-axis parallel with the spatial direction X. Note that the X axis is defined with the origin as the position of the left end of the third HD pixel form the left side of the six HD pixels within the subtraction image 3544 in the drawing. Each coordinate value is defined with the origin thus obtained as the base. Note that the X-axis coordinate values are defined with the SD-pixel width $L_s$ of 1.

In FIG. 297, the solid line represents the pixel values of the HD image 3541, the dotted line represents the pixel values of the SD image 3542, and the broken line represents the signal waveform of the actual world 1 along the X-direction. Note that the broken line shown in FIG. 297 represents an approximate function f(x) which approximates the waveform along the X-direction, in the same way as with the broken line shown in FIG. 295.

Making a comparison between the charts shown in FIG. 295 and FIG. 297, it is clear that each region in the drawing includes the line object from the waveforms of the approximate functions f(x) shown in the drawings.

However, there is the difference therebetween as follows. That is to say, while the line object extends over the region of x of around 0 to 1 in FIG. 295, the line object extends over the region of x of around −0.5 to 0.5 in FIG. 297. That is to say, in FIG. 295, the most part of the line object is included within the single SD pixel positioned at the region of x of 0 to 1 in the SD image 3542. On the other hand, in FIG. 297, a part of the line object is included within the single SD pixel positioned at the region of x of 0 to 1 in the SD image 3542 (the edge of the line object adjacent to the background is also included therewithin).

Accordingly, in a case shown in FIG. 295, there is the small difference in the pixel value between the two HD pixels (represented by the solid line) extending the region of x of 0 to 1.0 in the HD image 3541. The pixel value of the corresponding SD pixel (represented by the dotted line in the drawing) is the average of the pixel values of the two HD pixels. As a result, it can be easily understood that there is the small difference in the pixel value between the SD pixel of the SD image 3542 and the two HD pixels of the HD image 3541.

In such a state (the state shown in FIG. 295), let us consider reproduction processing for generating two HD pixels (the pixels of the predicted image 3543) which extend over the region of x of 0 to 1.0 with the single SD pixel extending the region of x of 0 to 1.0 as the pixel of interest using the conventional class classification adaptation processing. In this case, the generated HD pixels of the predicted image 3543 approximate the HD pixels of the HD image 3541 with sufficiently high precision as shown in FIG. 294. That is to say, in the region 3544-1, there is the small difference in the pixel value of the HD pixel between the predicted image 3543 and the HD image 3541, and accordingly, the subtraction image is formed with a density close to black as shown in FIG. 294.

On the other hand, in a case shown in FIG. 297, there is the large difference in the pixel value between the two HD pixels (represented by the solid line) extending the region of x of 0 to 1.0 in the HD image 3541. The pixel value of the corresponding SD pixel (represented by the dotted line in the drawing) is the average of the pixel values of the two HD pixels. As a result, it can be easily understood that there is the large difference in the pixel value between the SD pixel of the SD image 3541 and the two HD pixels of the HD image 3541, as compared with the corresponding difference shown in FIG. 295.

In such a state (the state shown in FIG. 297), let us consider reproduction processing for generating two HD pixels (the pixels of the predicted image 3543) which extend over the region of x of 0 to 1.0 with the single SD pixel extending the region of x of 0 to 1.0 as the pixel of interest using the conventional class classification adaptation processing. In this case, the generated HD pixels of the predicted image 3543 approximate the HD pixels of the HD image 3541 with poor precision as shown in FIG. 296. That is to say, in the region 3544-2, there is the large difference in the pixel value of the HD pixel between the predicted image 3543 and the HD image 3541, and accordingly, the subtraction image is formed with a density close to white as shown in FIG. 296.

Making a comparison between the approximate functions f(x) (represented by the broken line shown in the drawings)

for the signals in the actual world 1 shown in FIG. 295 and FIG. 297, it can be understood as follows. That is to say, while the change in the approximate function f(x) is small over the region of x of 0 to 1 in FIG. 295, the change in the approximate function f(x) is large over the region of x of 0 to 1 in FIG. 297.

Accordingly, there is an SD pixel in the SD image 3542 as shown in FIG. 295, which extends over the range of x of 0 to 1.0, over which the change in the approximate function f(x) is small (i.e., the change in signals in the actual world 1 is small).

From this perspective, the investigation results described above can also be said as follows. That is to say, in a case of reproduction of the HD pixels based upon the SD pixels which extends over the region over which the change in the approximate function f(x) is small (i.e., the change in signals in the actual world 1 is small), such as the SD pixel extending over the region of x of 0 to 1.0 shown in FIG. 295, using the conventional class classification adaptation processing, the generated HD pixels approximate the signals in the actual world 1 (in this case, the image of the line object) with sufficiently high precision.

On the other hand, there is another SD pixel in the SD image 3542 as shown in FIG. 297, which extends over the range of x of 0 to 1.0, over which the change in the approximate function f(x) is large (i.e., the change in signals in the actual world 1 is large).

From this perspective, the investigation results described above can also be said as follows. That is to say, in a case of reproduction of the HD pixels based upon the SD pixels which extends over the region over which the change in the approximate function f(x) is large (i.e., the change in signals in the actual world 1 is large), such as the SD pixel extending over the region of x of 0 to 1.0 shown in FIG. 297, using the conventional class classification adaptation processing, the generated HD pixels approximate the signals in the actual world 1 (in this case, the image of the line object) with poor precision.

The conclusion of the investigation results described above is that in a case as shown in FIG. 298, it is difficult to reproduce the details extending over the region corresponding to a single pixel using the conventional signal processing based upon the relation between pixels (e.g., the class classification adaptation processing).

That is to say, FIG. 298 is a diagram for describing the investigation results obtained by the present applicant.

In FIG. 298, the horizontal direction in the drawing represents the X-direction which is a direction (spatial direction) along which the detecting elements of the sensor 2 (FIG. 289) are arrayed. On the other hand, the vertical direction in the drawing represents the light-amount level or the pixel value. The dotted line represents the X cross-sectional waveform F(x) of the signal in the actual world 1 (FIG. 289). The solid line represents the pixel value P output from the sensor 2 in a case the sensor 2 receives a signal (image) in the actual world 1 represented as described above. Also, the width (length in the X-direction) of a detecting element of the sensor 2 is represented by $L_c$. The change in the X cross-sectional waveform F(x) as to the pixel width $L_c$ of the sensor 2, which is the width $L_c$ of the detecting element of the sensor 2, is represented by ΔP.

Here, the aforementioned SD image 3542 (FIG. 293) is an image for simulating the image (FIG. 289) input from the sensor 2. With this simulation, evaluation can be made with the SD-pixel width $L_s$ of the SD image 3542 (FIG. 295 and FIG. 297) as the pixel width (width of the detecting element) $L_c$ of the sensor 2.

While description has been made regarding investigation for the signal in the actual world 1 (approximate function f(x)) which reflects the fine line, there are various types of change in the signal level in the actual world 1.

Accordingly, the reproduction results under the conditions shown in FIG. 298 can be estimated based upon the investigation results. The reproduction results thus estimated are as follows.

That is to say, such as shown in FIG. 298, in a case of reproducing HD pixels (e.g., pixels of the predicted image output from the class classification adaptation processing unit 3501 in FIG. 289) using the conventional class classification adaptation processing with an SD pixel (output pixel from the sensor 2), over which the change ΔP in signals in the actual world 1 (the change in the X cross-sectional waveform F(x)) is large, as the pixel of interest, the generated HD pixels approximate the signals in the actual world 1 (X cross-sectional waveform F(x) in a case shown in FIG. 298) with poor precision.

Specifically, with the conventional methods such as the class classification adaptation processing, image processing is performed based upon the relation between multiple pixels output from the sensor 2.

That is to say, as shown in FIG. 298, let us consider a signal which exhibits rapid change ΔP in the X cross-sectional waveform F(x), i.e., rapid change in the signal in the actual world 1, over the region corresponding to a single pixel. Such a signal is integrated (strictly, time-spatial integration), and only a single pixel value P is output (the signal over the single pixel is represented by the uniform pixel value P).

With the conventional methods, image processing is performed with the pixel value P as both the reference and the target. In other words, with the conventional methods, image processing is performed without giving consideration to the change in the signal in the actual world 1 (X cross-sectional waveform F(x)) over a single pixel, i.e., without giving consideration to the details extending over a single pixel.

Any image processing (even class classification adaptation processing) has difficulty in reproducing change in the signal in the actual world 1 over a single pixel with high precision as long as the image processing is performed in increments of pixels. In particular, great change ΔP in the signal in the actual world 1 leads to marked difficulty therein.

In other words, the problem of the aforementioned class classification adaptation processing, i.e., in FIG. 289, the cause of insufficient reproduction of the original details using the class classification adaptation processing, which often occurs in a case of employing the input image (SD image) in which the details have been lost in the stage where the image has been output from the sensor 2, is as follows. The cause is that the class classification adaptation processing is performed in increment of pixels (a single pixel has a single pixel value) without giving consideration to change in signals in the actual world 1 over a single pixel.

Note that all the conventional image processing methods including the class classification adaptation processing have the same problem, the cause of the problem is completely the same.

As described above, the conventional image processing methods have the same problem and the same cause of the problem.

On the other hand, the combination of the data continuity detecting unit 101 and the actual world estimating unit 102 (FIG. 3) allows estimation of the signals in the actual world 1 based upon the input image from the sensor 2 (i.e., the image in which the change in the signal in the actual world 1 has been lost) using the continuity of the signals in the actual world 1. That is to say, the actual world estimating unit 102 has a function for outputting the actual world estimation information which allows estimation of the signal in the actual world 1.

Accordingly, the change in the signals in the actual world 1 over a single pixel can be estimated based upon the actual world estimation information.

In this specification, the present applicant has proposed a class classification adaptation processing correction method as shown in FIG. 289, for example, based upon the mechanism in which the predicted image (which represents the image in the actual world 1, predicted without giving consideration to the change in the signal in the actual world 1 over a single pixel) generated by the conventional class classification adaptation processing is corrected using a predetermined correction image (which represents the estimated error of the predicted image due to change in the signal in the actual world 1 over a single pixel) generated based on the actual world estimation information, thereby solving the aforementioned problem.

That is to say, in FIG. 289, the data continuity detecting unit 101 and the actual world estimating unit 102 generate the actual world estimation information. Then, the class classification adaptation processing correction unit 3502 generates a correction image having a predetermined format based upon the actual world estimation information thus generated. Subsequently, the addition unit 3503 corrects the predicted image output from the class classification adaptation processing unit 3501 using the correction image output from the class classification adaptation processing correction unit 3502 (Specifically, makes the sum of the predicted image and the correction image, and outputs the summed image as an output image).

Note that detailed description has been made regarding the class classification adaptation processing unit 3501 included in the image generating unit 103 for performing class classification adaptation processing correction method. Also, the type of the addition unit 3503 is not restricted in particular as long as the addition unit 3503 has a function of making the sum of the predicted image and the correction image. Examples employed as the addition unit 3503 include various types of adders, addition programs, and so forth.

Accordingly, detailed description will be made below regarding the class classification adaptation processing correction unit 3502 which has not been described.

First description will be made regarding the mechanism of the class classification adaptation processing correction unit 3502.

As described above, in FIG. 293, let us assume the HD image 3541 as the original image (signals in the actual world 1) which is to be input to the sensor 2 (FIG. 289). Furthermore, let us assume the SD image 3542 as the input image from the sensor 2. In this case, the predicted image 3543 can be assumed as the predicted image (image obtained by predicting the original image (HD image 3541)) output from the class classification adaptation processing unit 3501.

On the other hand, the image obtained by subtracting the predicted image 3543 from the HD image 3541 is the subtraction image 3544.

Accordingly, the HD image 3541 is reproduced by actions of: the class classification adaptation processing correction unit 3502 having a function of creating the subtraction image 3544 and outputting the subtraction image 3544 as a correction image; and the addition unit 3503 having a function of making the sum of the predicted image 3543 output from the class classification adaptation processing unit 3501 and the subtraction image 3544 (correction image) output from the class classification adaptation processing correction unit 3502.

That is to say, the class classification adaptation processing correction unit 3502 suitably predicts the subtraction image (with the same resolution as with the predicted image output from the class classification adaptation processing unit 3501), which is the difference between the image which represents the signals in the actual world 1 (original image which is to be input to the sensor 2) and the predicted image output from the class classification adaptation processing unit 3501, and outputs the subtraction image thus predicted (which will be referred to as "subtraction predicted image" hereafter) as a correction image, thereby almost completely reproducing the signals in the actual world 1 (original image).

On the other hand, as described above, there is a relation between: the difference (error) between the signals in the actual world 1 (the original image which is to be input to the sensor 2) and the predicted image output from the class classification adaptation processing unit 3501; and the change in the signals in the actual world 1 over a single pixel of the input image. Also, the actual world estimating unit 102 has a function of estimating the signals in the actual world 1, thereby allowing estimation of the features for each pixel, representing the change in the signal in the actual world 1 over a single pixel of the input image.

With such a configuration, the class classification adaptation processing correction unit 3502 receives the features for each pixel of the input image, and creates the subtraction predicted image based thereupon (predicts the subtraction image).

Specifically, for example, the class classification adaptation processing correction unit 3502 receives an image (which will be referred to as "feature-amount image" hereafter) from the actual world estimating unit 102, as the actual world estimation information in which the features is represented by each pixel value.

Note that the feature-amount image has the same resolution as with the input image from the sensor 2. On the other hand, the correction image (subtraction predicted image) has the same resolution as with the predicted image output from the class classification adaptation processing unit 3501.

With such a configuration, the class classification adaptation processing correction unit 3502 predicts and computes the subtraction image based upon the feature-amount image using the conventional class classification adaptation processing with the feature-amount image as an SD image and with the correction image (subtraction predicted image) as an HD image, thereby obtaining suitable subtraction predicted image as a result of the prediction computation.

The above is the arrangement of the class classification adaptation processing correction unit 3502.

FIG. 299 shows a configuration example of the class classification adaptation processing correction unit 3502 which works on the mechanism.

In FIG. 299, the feature-amount image (SD image) input from the actual world estimating unit 102 is supplied to region extracting units 3551 and 3555. The region extracting unit 3551 extracts a class tap (a set of SD pixels positioned at a predetermined region including the pixel of interest) necessary for class classification from the supplied feature-amount image, and outputs the extracted class tap to a pattern detecting unit 3552. The pattern detecting unit 3552 detects the pattern of the feature-amount image based upon the class tap thus input.

A class code determining unit 3553 determines the class code based upon the pattern detected by the pattern detecting unit 3552, and outputs the determined class code to correction coefficient memory 3554 and the region extracting unit 3555. The correction coefficient memory 3554 stores the coefficients for each class code, obtained by learning. The correction coefficient memory 3554 reads out the coefficients corresponding to the class code input from the class code determining unit 3553, and outputs the class code to a correction computing unit 3556.

Note that description will be made later with reference to the block diagram of the class classification adaptation processing correction learning unit shown in FIG. 300 regarding the learning processing for calculating the coefficients stored in the correction coefficient memory 3554.

On the other hand, the coefficients, i.e., prediction coefficients, stored in the correction coefficient memory 3554 are used for predicting the subtraction image (for generating the subtraction predicted image which is an HD image) as described later. However, the term, "prediction coefficients" used in the above description has indicated the coefficients stored in the coefficient memory 3514 (FIG. 290) of the class classification adaptation processing unit 3501. Accordingly, the prediction coefficients stored in the correction coefficient memory 3554 will be refereed to as "correction coefficients" hereafter in order to distinguish the coefficients from the prediction coefficients stored in the coefficient memory 3514.

The region extracting unit 3555 extracts a prediction tap (a set of the SD pixels positioned at a predetermined region including the pixel of interest) from the feature-amount image (SD image) input from the actual world estimating unit 102 based upon the class code input from the class code determining unit 3553, necessary for predicting the subtraction image (HD image) (i.e., for generating subtraction predicted image which is an HD image) corresponding to a class code, and outputs the extracted class tap to the correction computing unit 3556. The correction computing unit 3556 executes product-sum computation using the prediction tap input from the region extracting unit 3555 and the correction coefficients input from the correction coefficient memory 3554, thereby generating HD pixels of the subtraction predicted image (HD image) corresponding to the pixel of interest (SD pixel) of the feature-amount image (SD image).

More specifically, the correction coefficient memory 3554 outputs the correction coefficients corresponding to the class code supplied from the class code determining unit 3553 to the correction computing unit 3556. The correction computing unit 3556 executes product-sum computation represented by the following Expression (226) using the prediction tap (SD pixels) extracted from the pixel values at a predetermined position at a pixel in the input image supplied from the region extracting unit 3555 and the correction coefficients supplied from the correction coefficient memory 3554, thereby obtaining HD pixels of the subtraction predicted image (HD image) (i.e., predicting and estimating the subtraction image).

$$u' = \sum_{i=0}^{n} g_i \times a_i \tag{226}$$

In Expression (226), u' represents the HD pixel of the subtraction predicted image (HD image). Each of $a_i$ (i represents an integer of 1 through n) represents the corresponding prediction tap (SD pixels). On the other hand, each of $g_i$ represents the corresponding correction coefficient.

Accordingly, while the class classification adaptation processing unit 3501 shown in FIG. 289 outputs the HD pixel q' represented by the above Expression (218), the class classification adaptation processing correction unit 3502 outputs the HD pixel u' of the subtraction predicted image represented by Expression (226). Then, the addition unit 3503 makes the sum of the HD pixel q' of the predicted image and the HD pixel u' of the subtraction predicted image (which will be represented by "o'" hereafter), and outputs the sum to external circuits, as an HD pixel of the output image.

That is to say, the HD pixel o' of the output image output from the image generating unit 103 in the final stage is represented by the following Expression (227).

$$o' = q' + u' = \sum_{i=0}^{n} d_i \times c_i + \sum_{i=0}^{n} g_i \times a_i \tag{227}$$

FIG. 300 shows a detailed configuration example of the learning unit for determining the correction coefficients ($g_i$ used in the above Expression (222)) stored in the correction coefficient memory 3554 of the class classification adaptation processing correction unit 3502, i.e., the class classification adaptation processing correction learning unit 3561 of the learning device 3504 shown in FIG. 291 described above.

In FIG. 291 as described above, upon completion of leaning processing, the class classification adaptation processing learning unit 3521 outputs learning predicted image obtained by predicting the first tutor image based upon the first student image using the prediction coefficients calculated by learning, as well as outputting the first tutor image (HD image) and the first student image (SD image) used for learning processing to the class classification adaptation processing correction learning unit 3561.

Returning to FIG. 300, of these images, the first student image is input to a data continuity detecting unit 3572.

On the other hand, of these images, the first tutor image and the learning predicted image are input to an addition unit 3571. Note that the learning predicted image is inverted before input to the addition unit 3571.

The addition unit 3571 makes the sum of the input first tutor image and the inverted input learning predicted image, i.e., generates a subtraction image between the first tutor image and the learning predicted image, and outputs the generated subtraction image to a normal equation generating unit 3578 as a tutor image used in the class classification adaptation processing correction learning unit 3561 (which will be referred to as "second tutor image" for distinguish this image from the first tutor image).

The data continuity detecting unit 3572 detects the continuity of the data contained in the input first student image, and outputs the detection results to an actual world estimating unit 3573 as data continuity information.

The actual world estimating unit 3573 generates a feature-amount image based upon the data continuity information thus input, and outputs the generated image to region extracting units 3574 and 3577 as a student image used in the class classification adaptation processing correction learning unit 3561 (the student image will be referred to as "second student image" for distinguishing this student image from the first student image described above).

The region extracting unit 3574 extracts SD pixels (class tap) necessary for class classification from the second student image (SD image) thus supplied, and outputs the extracted class tap to a pattern detecting unit 3575. The pattern detecting unit 3575 detects the pattern of the input class tap, and outputs the detection results to a class code determining unit 3576. The class code determining unit 3576 determines the class code corresponding to the input pattern, and outputs the determined class code to the region extracting unit 3577 and the normal equation generating unit 3578.

The region extracting unit 3577 extracts the prediction tap (SD pixels) from the second student image (SD image) input from the actual world estimating unit 3573 based upon the class code input from the class code determining unit 3576, and outputs the extracted prediction tap to the normal equation generating unit 3578.

Note that the aforementioned region extracting unit 3574, the pattern detecting unit 3575, the class code determining unit 3576, and the region extracting unit 3577, have generally the same configurations and functions as with the region extracting unit 3551, the pattern detecting unit 3552, the class code determining unit 3553, and the region extracting unit 3555 of the class classification adaptation processing correction unit 3502 shown in FIG. 299, respectively. Also, the aforementioned data continuity detecting unit 3572 and the actual world estimating unit 3773 have generally the same configurations and functions as with the data continuity detecting unit 101 and the actual world estimating unit 102 shown in FIG. 289, respectively.

The normal equation generating unit 3578 generates a normal equation based upon the prediction tap (SD pixels) of the second student image (SD image) input from the region extracting unit 3577 and the HD pixels of the second tutor image (HD image), for each of the class codes input from the class code determining unit 3576, and supplies the normal equation to a correction coefficient determining unit 3579. Upon reception of the normal equation for the corresponding class code from the normal equation generating unit 3578, the correction coefficient determining unit 3579 computes the correction coefficients using the normal equation, which and are stored in the correction coefficient memory 3554 in association with the class code.

Now, detailed description will be made regarding the normal equation generating unit 3578 and the correction coefficient determining unit 3579.

In the above Expression (226), all the correction coefficients $g_i$ are undetermined before learning. With the present embodiment, learning is performed by inputting multiple HD pixels of the tutor image (HD image) for each class code. Let us say that there are m HD pixels corresponding to a certain class code, and each of the m HD pixels are represented by $u_k$ (k is an integer of 1 through m). In this case, the following Expression (228) is introduced from the above Expression (226).

$$u_k = \sum_{i=0}^{n} g_i \times a_{ik} + e_k \tag{228}$$

That is to say, the Expression (228) indicates that the HD pixels corresponding to a certain class code can be predicted and estimated by computing the right side of this Expression. Note that in Expression (228), $e_k$ represents error. That is to say, the HD pixel $U_k$' of the subtraction predicted image (HD image) which is computation results of the right side of this Expression does not exactly matches the HD pixel $u_k$ of the actual subtraction image, but contains a certain error $e_k$.

With Expression (228), the correction coefficients $a_i$ are obtained by learning such that the sum of squares of the errors $e_k$ exhibits the minimum, for example.

With the present embodiment, the m (m>n) HD pixels $u_k$ are prepared for learning processing. In this case, the correction coefficients $a_i$ can be calculated as a unique solution using the least square method.

That is to say, the normal equation for calculating the correction coefficients $a_i$ in the right side of the Expression (228) using the least square method is represented by the following Expression (229).

$$\begin{bmatrix} \sum_{k=1}^{m} a_{1k} \times a_{1k} & \sum_{k=1}^{m} a_{1k} \times a_{2k} & \cdots & \sum_{k=1}^{m} a_{1k} \times a_{nk} \\ \sum_{k=1}^{m} a_{2k} \times a_{1k} & \sum_{k=1}^{m} a_{2k} \times a_{2k} & \cdots & \sum_{k=1}^{m} a_{2k} \times a_{nk} \\ \vdots & \vdots & \ddots & \vdots \\ \sum_{k=1}^{m} a_{nk} \times a_{1k} & \sum_{k=1}^{m} a_{nk} \times a_{2k} & \cdots & \sum_{k=1}^{m} a_{nk} \times a_{nk} \end{bmatrix} \begin{bmatrix} g_1 \\ g_2 \\ \vdots \\ g_n \end{bmatrix} = \begin{bmatrix} \sum_{k=1}^{m} a_{1k} \times u_k \\ \sum_{k=1}^{m} a_{2k} \times u_k \\ \vdots \\ \sum_{k=1}^{m} a_{nk} \times u_k \end{bmatrix} \tag{229}$$

With the matrix in the Expression (229) as the following Expressions (230) through (232), the normal equation is represented by the following Expression (233).

$$A_{MAT} = \begin{bmatrix} \sum_{k=1}^{m} a_{1k} \times a_{1k} & \sum_{k=1}^{m} a_{1k} \times a_{2k} & \cdots & \sum_{k=1}^{m} a_{1k} \times a_{nk} \\ \sum_{k=1}^{m} a_{2k} \times a_{1k} & \sum_{k=1}^{m} a_{2k} \times a_{2k} & \cdots & \sum_{k=1}^{m} a_{2k} \times a_{nk} \\ \vdots & \vdots & \ddots & \vdots \\ \sum_{k=1}^{m} a_{nk} \times a_{1k} & \sum_{k=1}^{m} a_{nk} \times a_{2k} & \cdots & \sum_{k=1}^{m} a_{nk} \times a_{nk} \end{bmatrix} \tag{230}$$

$$G_{MAT} = \begin{bmatrix} g_1 \\ g_2 \\ \vdots \\ g_n \end{bmatrix} \tag{231}$$

$$U_{MAT} = \begin{bmatrix} \sum_{k=1}^{m} a_{1k} \times u_k \\ \sum_{k=1}^{m} a_{2k} \times u_k \\ \vdots \\ \sum_{k=1}^{m} a_{nk} \times u_k \end{bmatrix} \tag{232}$$

$$A_{MAT} G_{MAT} = U_{MAT} \tag{233}$$

As shown in Expression (231), each component of the matrix $G_{MAT}$ is the correction coefficient $g_i$ which is to be obtained. With the present embodiment, in Expression (233), the matrix $A_{MAT}$ in the left side thereof and the matrix $U_{MAT}$ in the right side thereof are prepared, thereby calculating the matrix $G_{MAT}$ (i.e., the correction coefficients $g_i$) using the matrix solution method.

Specifically, with the present embodiment, each prediction tap $a_{ik}$ is known, and accordingly, each component of the matrix $A_{MAT}$ represented by Expression (230) can be obtained. Each prediction tap $a_{ik}$ is extracted by the region extracting unit 3577, and the normal equation generating unit 3578 computes each component of the matrix $A_{MAT}$ using the prediction tap $a_{ik}$ supplied from the region extracting unit 3577.

On the other hand, with the present embodiment, the prediction tap $a_{ik}$ and the HD pixel $u_k$ of the subtraction image are prepared, and accordingly, each component of the matrix $U_{MAT}$ represented by Expression (232) can be calculated. Note that the prediction tap $a_{ik}$ is the same as that of the matrix $A_{MAT}$. On the other hand, the HD pixel $u_k$ of the subtraction image matches the corresponding HD pixel of the second tutor image output from the addition unit 3571. With the present embodiment, the normal equation generating unit 3578 computes each component of the matrix $U_{MAT}$ using the prediction tap $a_{ik}$ supplied from the region extracting unit 3577 and the second tutor image (the subtraction image between the first tutor image and the learning predicted image).

As described above, the normal equation generating unit 3578 computes each component of the matrix $A_{MAT}$ and the matrix $U_{MAT}$ for each class code, and supplies the computation results to the correction coefficient determining unit 3579 in association with the class code.

The correction coefficient determining unit 3579 computes the correction coefficients $g_i$ each of which is the component of the matrix $G_{MAT}$ represented by the above Expression (233) based upon the normal equation corresponding to the supplied class code.

Specifically, the normal equation represented by the above Expression (233) can be transformed into the following Expression (234).

$$G_{MAT} = A_{MAT}^{-1} U_{MAT} \tag{234}$$

In Expression (234), each component of the matrix $G_{MAT}$ in the left side thereof is the correction coefficient $g_i$ which is to be obtained. Note that each component of the matrix $A_{MAT}$ and each component of the matrix $U_{MAT}$ are supplied from the normal equation generating unit 3578. With the present embodiment, upon reception of the components of the matrix $A_{MAT}$ in association with a certain class code and the components of the matrix $U_{MAT}$ from the normal equation generating unit 3578, the correction coefficient determining unit 3579 computes the matrix $G_{MAT}$ by executing matrix computation represented by the right side of Expression (234), and stores the computation results (correction coefficients $g_i$) in the correction coefficient memory 3554 in association with the class code.

The above is the detailed description regarding the class classification adaptation processing correction unit 3502 and the class classification adaptation processing correction learning unit 3561 which is a learning unit and a sub-unit of the class classification adaptation processing correction unit 3502.

Note that the type of the feature-amount image employed in the present invention is not restricted in particular as long as the correction image (subtraction predicted image) is generated based thereupon by actions of the class classification adaptation processing correction unit 3502. In other words, the pixel value of each pixel in the feature-amount image, i.e., the features, employed in the present invention is not restricted in particular as long as the features represents the change in the signal in the actual world 1 (FIG. 289) over a single pixel (pixel of the sensor 2 (FIG. 289)).

For example, "intra-pixel gradient" can be employed as the features.

Note that the "intra-pixel gradient" is a new term defined here. Description will be made below regarding the intra-pixel gradient.

As described above, the signal in the actual world 1, which is an image in FIG. 289, is represented by the function F(x, y, t) with the positions x, y, and z in the three-dimensional space and time t as variables.

Now, let us say that the signal in the actual world 1 which is an image has continuity in a certain spatial direction. In this case, let us consider a one-dimensional waveform (the waveform obtained by projecting the function F along the X direction will be referred to as "X cross-sectional waveform F(x)") obtained by projecting the function F(x, y, t) along a certain direction (e.g., X-direction) selected from the spatial directions of the X-direction, Y-direction, and Z-direction. In this case, it can be understood that waveforms similar to the aforementioned one-dimensional waveform F(x) can be obtained therearound along the direction of the continuity.

Based upon the fact described above, with the present embodiment, the actual world estimating unit 102 approximates the X cross-sectional waveform F(x) using a n'th (n represents a certain integer) polynomial approximate function f(x) based upon the data continuity information (e.g., angle) which reflects the continuity of the signal in the actual world 1, which is output form the data continuity detecting unit 101, for example.

FIG. 301 shows $f_4(x)$ (which is a fifth polynomial function) represented by the following Expression (235), and $f_5(x)$ (which is a first polynomial function) represented by the following Expression (236), for example of such a polynomial approximate function f(x).

$$f_4(x) = w_0 + w_1 x + w_2 x^2 + w_3 x^3 + w_4 x^4 + w_5 x^5 \tag{235}$$

$$f_5(x) = w_0' + w_1' x \tag{236}$$

Note that each of $W_0$ through $W_5$ in Expression (235) and $W_0'$ and $W_1'$ in Expression (236) represents the coefficient of the corresponding order of the function computed by the actual world estimating unit 102.

On the other hand, in FIG. 301, the x-axis in the horizontal direction in the drawing is defined with the left end of the pixel of interest as the origin (x=0), and represents the relative position from the pixel of interest along the spatial direction x. Note that the x-axis is defined with the width $L_c$ of the detecting element of the sensor 2 as 1. On the other hand, the axis in the vertical direction in the drawing represents the pixel value.

As shown in FIG. 301, the one-dimensional approximate function $f_5(x)$ (approximate function $f_5(x)$ represented by Expression (232)) approximates the X cross-sectional waveform F(x) around the pixel of interest using collinear approximation. In this specification, the gradient of the linear approximate function will be referred to as "intra-pixel gradient". That is to say, the intra-pixel gradient is represented by the coefficient $w_1'$ of x in Expression (236).

The rapid intra-pixel gradient reflects great change in the X cross-sectional waveform F(x) around the pixel of the interest. On the other hand, the gradual gradient reflects small change in the X cross-sectional waveform F(x) around the pixel of interest.

As described above, the intra-pixel gradient suitably reflects change in the signal in the actual world 1 over a single pixel (pixel of the sensor 2). Accordingly, the intra-pixel gradient may be employed as the features.

For example, FIG. 302 shows the actual feature-amount image generated with the intra-pixel gradient as the features.

That is to say, the image on the left side in FIG. 302 is the same as the SD image 3542 shown in FIG. 293 described above. On the other hand, the image on the right side in FIG. 302 is a feature-amount image 3591 generated as follows. That is to say, the intra-pixel gradient is obtained for each pixel of the SD image 3542 on the left side in the drawing. Then, the image on the right side in the drawing is generated with the value corresponding to the intra-pixel gradient as the pixel value. Note that the feature-amount image 3591 has the nature as follows. That is to say, in a case of the intra-pixel gradient of zero (the linear approximate function is parallel with the X-direction), the image is generated with a density corresponding to black. On the other hand, in a case of the intra-pixel gradient of 90° (the linear approximate function is parallel with the Y-direction), the image is generated with a density corresponding to white.

The region 3542-1 in the SD image 3542 corresponds to the region 3544-1 (which has been used in the above description with reference to FIG. 295, as an example of the region in which change in the signal in the actual world 1 is small over a single pixel) in the subtraction image 3544 shown in FIG. 294 described above. The region of the feature-amount image 3591 corresponding to the region 3542-1 in the SD image 3542 is the region 3591-1.

On the other hand, the region 3542-2 in the SD image 3542 corresponds to the region 3544-2 (which has been used in the above description with reference to FIG. 297, as an example of the region in which change in the signal in the actual world 1 is large over a single pixel) in the subtraction image 3544 shown in FIG. 296 described above. The region of the feature-amount image 3591 corresponding to the region 3542-2 in the SD image 3542 is the region 3591-2.

Making a comparison between the region 3542-1 of the SD image 3542 and the region 3591-1 of the feature-amount image 3591, it can be understood that the region in which change in the signal in the actual world 1 is small corresponds to the region of the feature-amount image 3591 having a density close to black (corresponding to the region having a gradual intra-pixel gradient).

On the other hand, making a comparison between the region 3542-2 of the SD image 3542 and the region 3591-2 of the feature-amount image 3591, it can be understood that the region in which change in the signal in the actual world 1 is large corresponds to the region of the feature-amount image 3591 having a density close to white (corresponding to the region having a rapid intra-pixel gradient).

As described above, the feature-amount image generated with the value corresponding to the intra-pixel gradient as the pixel value suitably reflects the degree of change in the signal in the actual world 1 for each pixel.

Next, description will be made regarding a specific computing method for the intra-pixel gradient.

That is to say, with the intra-pixel gradient around the pixel of interest as "grad", the intra-pixel gradient grad is represented by the following Expression (237).

$$grad = \frac{P_n - P_c}{x_n'} \quad (237)$$

In Expression (237), $P_n$ represents the pixel value of the pixel of interest. Also, $P_c$ represents the pixel value of the center pixel.

Specifically, as shown in FIG. 303, let us consider a region 3601 (which will be referred to as "continuity region 3601" hereafter) of 5×5 pixels (square region of 5×5=25 pixels in the drawing) in the input image from the sensor 2, having a certain data continuity. In a case of the continuity region 3601, the center pixel is the pixel 3602 positioned at the center of the continuity region 3601. Accordingly, $P_c$ is the pixel value of the center pixel 3602. Also, in a case that the pixel 3603 is the pixel of interest, $P_n$ is the pixel value of the pixel of interest 3603.

Also, in Expression (237), $x_n'$ represents the cross-sectional direction distance at the center of the pixel of interest. Note that with the center of the center pixel (pixel 3602 in a case shown in FIG. 303) as the origin (0, 0) in the spatial directions, "the cross-sectional direction distance" is defined as the relative distance along the X-direction between the center pixel of interest and the line (the line 3604 in a case shown in FIG. 303) which is parallel with the data-continuity direction, and which passes through the origin.

FIG. 304 is a diagram which shows the cross-sectional direction distance for each pixel within the continuity region 3601 in FIG. 303. That is to say, in FIG. 304, the value marked within each pixel in the continuity region 3601 (square region of 5×5=25 pixels in the drawing) represents the cross-sectional direction distance at the corresponding pixel. For example, the cross-sectional direction distance $X_n'$ at the pixel of interest 3603 is −2β.

Note that the X-axis and the Y-axis are defined with the pixel width of 1 in both the X-direction and the Y-direction. Furthermore, the X-direction is defined with the positive direction matching the right direction in the drawing. Also, in this case, β represents the cross-sectional direction distance at the pixel 3605 adjacent to the center pixel 3602 in the Y-direction (adjacent thereto downward in the drawing). With the present embodiment, the data continuity detecting unit 101 supplies the angle θ (the angle θ between the direction of the line 3604 and the X-direction) as shown in FIG. 304 as the data continuity information, and accordingly, the value β can be obtained with ease using the following Expression (238).

$$\beta = \frac{1}{\tan\theta} \quad (238)$$

As described above, the intra-pixel gradient can be obtained with simple computation based upon the two input pixel values of the center pixel (e.g., pixel 3602 in FIG. 304) and the pixel of interest (e.g., pixel 3603 in FIG. 304) and the angle θ. With the present embodiment, the actual world estimating unit 102 generates a feature-amount image with the value corresponding to the intra-pixel gradient as the pixel value, thereby greatly reducing the processing amount.

Note that with an arrangement which requires higher-precision intra-pixel gradient, the actual-world estimating unit 102 should compute the intra-pixel gradient using the pixels around and including the pixel of interest with the least square method. Specifically, let us say that m (m represents an integer of 2 or more) pixels around and including the pixel of interest are represented by index number i (i represents an integer of 1 through m). The actual world estimating unit 102 substitutes the input pixel values $P_i$ and the corresponding cross-sectional direction distance $x_i'$ into the right side of the following Expression (239), thereby computing the intra-pixel gradient grad at the pixel of interest. That is to say, Expression (239) is the same expression as the above expression for obtaining one variable with the least square method.

$$grad = \frac{\sum_{i=1}^{m} x_i'^2 \times P_i}{\sum_{i=1}^{m} (x_i')^2} \tag{239}$$

Next, description will be made with reference to FIG. 305 regarding processing (processing in Step S103 shown in FIG. 40) for generating an image performed by the image generating unit 103 (FIG. 289) using the class classification adaptation processing correction method.

In FIG. 289, upon reception of the signal in the actual world 1 which is an image, the sensor 2 outputs the input image. The input image is input to the class classification adaptation processing unit 3501 of the image generating unit 103 as well as being input to the data continuity detecting unit 101.

Then, in Step S3501 shown in FIG. 305, the class classification adaptation processing unit 3501 performs class classification adaptation processing for the input image (SD image) so as to generate the predicted image (HD image), and outputs the generated predicted image to the addition unit 3503.

Note that such processing in Step S3501 performed by the class classification adaptation processing unit 3501 will be referred to as “input image class classification adaptation processing” hereafter. Detailed description will be made later with reference to the flowchart shown in FIG. 306 regarding the “input image class classification adaptation processing” in this case.

The data continuity detecting unit 101 detects the data continuity contained in the input image at almost the same time as with the processing in Step S3501, and outputs the detection results (angle in this case) to the actual world estimating unit 102 as data continuity information (processing in Step S101 shown in FIG. 40).

The actual world estimating unit 102 generates the actual world estimation information (the feature-amount image which is an SD image in this case) based upon the input angle (data continuity information), and supplies the actual world estimation information to the class classification adaptation processing correction unit 3502 (processing in Step S102 shown in FIG. 40).

Then, in Step S3502, the class classification adaptation processing correction unit 3502 performs class classification adaptation processing for the feature-amount image (SD image) thus supplied, so as to generate the subtraction predicted image (HD image) (i.e., so as to predict and compute the subtraction image (HD image) between the actual image (signal in the actual world 1) and the predicted image output from the class classification adaptation processing unit 3501), and outputs the subtraction predicted image to the addition unit 3503 as a correction image.

Note that such processing in Step S3502 performed by the class classification adaptation processing correction unit 3502 will be referred to as “class classification adaptation processing correction processing” hereafter. Detailed description will be made later with reference to the flowchart shown in FIG. 307 regarding the “class classification adaptation processing correction processing” in this case.

Then, in Step S3503, the addition unit 3503 makes the sum of: the pixel of interest (HD pixel) of the predicted image (HD image) generated with the processing shown in Step S3501 by the class classification adaptation processing unit 3501; and the corresponding pixel (HD pixel) of the correction image (HD image) generated with the processing shown in Step S3502 by the class classification adaptation processing correction unit 3502, thereby generating the pixel (HD pixel) of the output image (HD pixel).

In Step S3504, the addition unit 3503 determines whether or not the processing has been performed for all the pixels.

In the event that determination has been made that the processing has not been performed for all the pixels in Step S3504, the processing returns to Step S3501, and the subsequent processing is repeated. That is to say, the processing in Steps S3501 through S3503 is repeated for each of the remaining pixels which have not been taken as a pixel of interest so as to be taken as a pixel of interest in order.

Upon completion of the processing for all the pixels (in the event that determination has been made that processing has been performed for all the pixels in Step S3504), the addition unit 3504 outputs the output image (HD image) to external circuits in Step S3505, whereby processing for generating an image ends.

Next, detailed description will be made with reference to the drawings regarding the “input image class classification adaptation processing (the processing in Step S3501)”, and the “class classification adaptation correction processing (the processing in Step S3502)”, step by step in that order.

First, detailed description will be made with reference to the flowchart shown in FIG. 306 regarding the “input image class classification adaptation processing” executed by the class classification adaptation processing unit 3501 (FIG. 290).

Upon input of the input image (SD image) to the class classification adaptation processing unit 3501, the region extracting units 3511 and 3515 each receive the input image in Step S3521.

In Step S3522, the region extracting unit 3511 extracts the pixel of interest (SD pixel) from the input image and (one or more) pixels (SD pixels) at predetermined relative positions away from the pixel of interest as a class tap, and supplies the extracted class tap to the pattern detecting unit 3512.

In Step S3523, the pattern detecting unit 3512 detects the pattern of the class tap thus supplied, and supplies the detected pattern to the class code determining unit 3513.

In Step S3524, the class code determining unit 3513 determines the class code suited to the pattern of the class tap thus supplied, from the multiple class codes prepared beforehand, and supplies the determined class code to the coefficient memory 3514 and the region extracting unit 3515.

In Step S3525, the coefficient memory 3514 selects the prediction coefficients (set) corresponding to the supplied class code, which are to be used in the subsequent processing, from the multiple prediction coefficients (set) determined beforehand with learning processing, and supplies the selected prediction coefficients to the prediction computing unit 3516.

Note that description will be made later regarding the learning processing with reference to the flowchart shown in FIG. 311.

In Step S3526, the region extracting unit 3515 extracts the pixel of interest (SD pixel) from the input image and (one or more) pixels (SD pixels) at predetermined relative positions (which may be set to the same positions as with the class tap) away from the pixel of interest as a prediction tap, and supplies the extracted prediction tap to the prediction computing unit 3516.

In Step S3527, the prediction computing unit 3516 performs computation processing for the prediction tap supplied from the region extracting unit 3515 using the prediction coefficients supplied from the coefficient memory 3514 so as to generate the predicted image (HD image), and outputs the generated predicted image to the addition unit 3503.

Specifically, the prediction computing unit 3516 performs computation processing as follows. That is to say, with each pixel of the prediction tap supplied from the region extracting unit 3515 as $c_i$ (i represents an integer of 1 through n), and with each of the prediction coefficients supplied from the coefficient memory 3514 as $d_i$, the prediction computing unit 3516 performs computation represented by the right side of the above Expression (218), thereby calculating the HD pixel q' corresponding to the pixel of interest (SD pixel). Then, the prediction computing unit 3516 outputs the calculated HD pixel q' to the addition unit 3503 as a pixel forming the predicted image (HD image), whereby the input image class classification adaptation processing ends.

Next, detailed description will be made with reference to the flowchart shown in FIG. 307 regarding the "class classification adaptation processing correction processing" executed by the class classification adaptation processing correction unit 3502 (FIG. 299).

Upon input of the feature-amount image (SD image) to the class classification adaptation processing correction unit 3502 as the actual world estimation information from the actual world estimating unit 102, the region extracting units 3551 and 3555 each receive the feature-amount image in Step S3541.

In Step S3542, the region extracting unit 3551 extracts the pixel of interest (SD pixel) and (one or more) pixels (SD pixels) at predetermined relative positions away from the pixel of interest from the feature amount image as a class tap, and supplies the extracted class tap to the pattern detecting unit 3552.

Specifically, in this case, let us say that the region extracting unit 3551 extracts a class tap (a set of pixels) 3621 shown in FIG. 308, for example. That is to say, FIG. 308 shows an example of the layout of the class tap.

In FIG. 308, the horizontal axis in the drawing represents the X-direction which is one spatial direction, and the vertical direction in the drawing represents the Y-direction which is another spatial direction. Note that the pixel of interest is represented by the pixel 3621-2.

In this case, with the example shown in FIG. 308, the pixels extracted as the class tap are a total of five pixels of: the pixel of interest 3621-1; the pixels 3621-0 and 3621-4 which are adjacent to the pixel of interest 3621-2 along the Y-direction; and the pixels 3621-1 and 3621-3 which are adjacent to the pixel of interest 3621-2 along the X-direction, which make up a pixel set 3621.

It is needless to say that the layout of the class tap employed in the present embodiment is not restricted to the example shown in FIG. 308, rather, various kinds of layouts may be employed as long as it includes the pixel of interest 3624-2.

Returning to FIG. 307, in Step S3543, the pattern detecting unit 3552 detects the pattern of the class tap thus supplied, and supplies the detected pattern to the class code determining unit 3553.

Specifically, in this case, the pattern detecting unit 3552 detects the class which belongs the pixel value, i.e., the value of features (e.g., intra-pixel gradient), for each of the five pixels 3621-0 through 3621-4 forming the class tap shown in FIG. 308, and outputs the detection results in the form of a single data set as a pattern, for example.

Now, let us say that a pattern shown in FIG. 309 is detected, for example. That is to say, FIG. 309 shows an example of the pattern of the class tap.

In FIG. 309, the horizontal axis in the drawing represents the class taps, and the vertical axis in the drawing represents the intra-pixel gradient. On the other hand, let us say that the classes prepared beforehand are a total of three classes of class 3631, class 3632, and class 3633.

In this case, FIG. 309 shows a pattern in which the class tap 3621-0 belongs the class 3631, the class tap 3621-1 belongs the class 3631, the class tap 3621-2 belongs the class 3633, the class tap 3621-3 belongs the class 3631, and the class tap 3621-4 belongs the class 3632.

As described above, each of the five class taps 3621-0 through 3621-4 belongs to one of the three classes 3631 through 3633. Accordingly, in this case, there are a total of 273 (=3^5) patterns including the pattern shown in FIG. 309.

Returning to FIG. 307, in Step S3544, the class code determining unit 3553 determines the class code corresponding to the pattern of the class tap thus supplied, from multiple class code prepared beforehand, and supplies the determined class code to the correction coefficient memory 3554 and the region extracting unit 3555. In this case, there are 273 patterns, and accordingly, there are 273 (or more) class codes prepared beforehand.

In step S3545, the correction coefficient memory 3554 selects the correction coefficients (set), which are to be used in the subsequent processing, corresponding to the class code thus supplied, from the multiple sets of the correction coefficient set determined beforehand with the learning processing, and supplies the selected correction coefficients to the correction computing unit 3556. Note that each of the correction-coefficient sets prepared beforehand is stored in the correction coefficient memory 3554 in association with one of the class codes prepared beforehand. Accordingly, in this case, the number of the correction-coefficient sets matches the number of the class codes prepared beforehand (i.e., 273 or more).

Note that description will be made later regarding the learning processing with reference to the flowchart shown in FIG. 311.

In Step S3546, the region extracting unit 3555 extracts the pixel of interest (SD pixel) from the input image and the pixels (SD pixels) at predetermined relative positions (One or more positions determined independent of those of the class taps. However, the positions of the prediction tap may match those of the class tap) away from the pixel of interest, which are used as class taps, and supplies the extracted prediction taps to the correction computing unit 3556.

Specifically, in this case, let us say that the prediction tap (set) 3641 shown in FIG. 310 is extracted. That is to say, FIG. 310 shows an example of the layout of the prediction tap.

In FIG. 310, the horizontal axis in the drawing represents the X-direction which is one spatial direction, and the vertical direction in the drawing represents the Y-direction which is another spatial direction. Note that the pixel of interest is represented by the pixel 3641-1. That is, the pixel 3641-1 is a pixel corresponding to the class tap 3621-2 (FIG. 308).

In this case, with the example shown in FIG. 310, the pixels extracted as the prediction tap (group) are 5×5 pixels 3041 (a set of pixels formed of a total of 25 pixels) with the pixel of interest 3641-1 as the center.

It is needless to say that the layout of the prediction tap employed in the present embodiment is not restricted to the example shown in FIG. 310, rather, various kinds of layouts including the pixel of interest 3641-1 may be employed.

Returning to FIG. 307, in Step S3547, the correction computing unit 3556 performs computation for the prediction taps supplied from the region extracting unit 3555 using the prediction coefficients supplied from the correction coefficient memory 3554, thereby generating subtraction predicted image (HD image). Then, the correction computing unit 3556 outputs the subtraction predicted image to the addition unit 3503 as a correction image.

More specifically, with each of the class taps supplied from the region extracting unit 3555 as $a_i$ (i represents an integer of 1 through n), and with each of the correction coefficients supplied from the correction coefficient memory 3554 as $g_i$, the correction computing unit 3556 performs computation represented by the right side of the above Expression (226), thereby calculating the HD pixel u' corresponding to the pixel of interest (SD pixel). Then, the correction computing unit 3556 outputs the calculated HD pixel to the addition unit 3503 as a pixel of the correction image (HD image), whereby the class classification adaptation correction processing ends.

Next, description will be made with reference to the flowchart shown in FIG. 311 regarding the learning processing performed by the learning device (FIG. 291), i.e., the learning processing for generating the prediction coefficients used in the class classification adaptation processing unit 3501 (FIG. 290), and the learning processing for generating the correction coefficients used in the class classification adaptation processing correction unit 3502 (FIG. 299).

In Step S3561, the class classification adaptation processing learning unit 3521 generates the prediction coefficients used in the class classification adaptation processing unit 3501.

That is to say, the class classification adaptation processing learning unit 3521 receives a certain image as a first tutor image (HD image), and generates a student image (SD image) with a reduced resolution based upon the first tutor image.

Then, the class classification adaptation processing learning unit 3521 generates the prediction coefficients which allows suitable prediction of the first tutor image (HD image) based upon the first student image (SD image) using the class classification adaptation processing, and stores the generated prediction coefficients in the coefficient memory 3514 (FIG. 290) of the class classification adaptation processing unit 3501.

Note that such processing shown in Step S3561 executed by the class classification adaptation processing learning unit 3521 will be referred to as "class classification processing learning processing" hereafter. Detailed description will be made later regarding the "class classification adaptation processing learning unit" in this case, with reference to the flowchart shown in FIG. 312.

Upon generation of the prediction coefficients used in the class classification adaptation processing unit 3501, the class classification adaptation processing correction learning unit 3561 generates the correction coefficients used in the class classification adaptation processing correction unit 3502 in Step S3562.

That is to say, the class classification adaptation processing correction learning unit 3561 receives the first tutor image, the first student image, and the learning predicted image (the image obtained by predicting the first tutor image using the prediction coefficients generated by the class classification adaptation processing learning unit 3521), from the class classification adaptation processing learning unit 3521.

Next, the class classification adaptation processing correction learning unit 3561 generates the subtraction image between the first tutor image and the learning predicted image, which is used as the second tutor image, as well as generating the feature-amount image based upon the first student image, which is used as the second student image.

Then, the class classification adaptation processing correction learning unit 3561 generates prediction coefficients which allow suitable prediction of the second tutor image (HD image) based upon the second student image (SD image) using the class classification adaptation processing, and stores the generated prediction coefficients in the correction coefficient memory 3554 of the class classification adaptation processing correction unit 3502 as the correction coefficients, whereby the learning processing ends.

Note that such processing shown in Step S3562 executed by the class classification adaptation processing correction learning unit 3561 will be referred to as "class classification adaptation processing correction learning processing" hereafter. Detailed description will be made later regarding the "class classification adaptation processing correction learning processing" in this case, with reference to the flowchart shown in FIG. 313.

Next, description will be made regarding "class classification adaptation processing learning processing (processing in Step S3561)" and "class classification adaptation processing correction learning processing (processing in Step S3562)" in this case, step by step in that order, with reference to the drawings.

First, detailed description will be made with reference to the flowchart shown in FIG. 312 regarding the "class classification adaptation processing learning processing" executed by the class classification adaptation processing learning unit 3521 (FIG. 292).

In Step S3581, the down-converter unit 3531 and the normal equation generating unit 3536 each receive a certain image as the first tutor image (HD image). Note that the first tutor image is also input to the class classification adaptation processing correction learning unit 3561, as described above.

In Step S3582, the down-converter unit 3531 performs "down-converting" processing (image conversion into a reduced-resolution image) for the input first tutor image, thereby generating the first student image (SD image). Then, the down-converter unit 3531 supplies the generated first student image to the class classification adaptation processing correction learning unit 3561, as well as to the region extracting units 3532 and 3535.

In Step S3583, the region extracting unit 3532 extracts the class taps from the first student image thus supplied, and outputs the extracted class taps to the pattern detecting unit 3533. While strictly, there is the difference (such difference will be referred to simply as "difference in input/output" hereafter) in the input/output of information to/from a block between the processing shown in Step S3583 and the aforementioned processing shown in Step S3522 (FIG. 306), the processing shown in Step S3583 is generally the same as that shown in Step S3522 described above.

In Step S3584, the pattern detecting unit 3533 detects the pattern from the supplied class taps for determining the class code, and supplies the detected pattern to the class code determining unit 3534. Note that the processing shown in Step S3584 is generally the same as that shown in Step S3523 (FIG. 306) described above, except for input/output.

In Step S3585, the class code determining unit 3534 determines the class code based upon the pattern of the class taps thus supplied, and supplies the determined class code to the region extracting unit 3535 and the normal equation generating unit 3536. Note that the processing shown in Step S3585 is generally the same as that shown in Step S3524 (FIG. 306) described above, except for input/output.

In Step S3586, the region extracting unit 3535 extracts the prediction taps from the first student image corresponding to the supplied class code, and supplies the extracted prediction taps to the normal equation generating unit 3536 and the prediction computing unit 3538. Note that the processing shown in Step S3586 is generally the same as that shown in Step S3526 (FIG. 306) described above, except for input/output.

In Step S3587, the normal equation generating unit 3536 generates a normal equation represented by the above Expression (220) (i.e., Expression (221)) based upon the prediction taps (SD pixels) supplied from the region extracting unit 3535 and the corresponding HD pixels of the HD pixels of the first tutor image (HD image), and supplies the generated normal equation to the coefficient determining unit 3537 along with the class code supplied from the class code determining unit 3534.

In Step S3588, the coefficient determining unit 3537 solves the normal equation thus supplied, thereby determining the prediction coefficients. That is to say, the coefficient determining unit 3537 computes the right side of the above Expression (225), thereby calculating the prediction coefficients. Then, the coefficient determining unit 3537 supplies the determined prediction coefficients to the prediction computing unit 3538, as well as storing the prediction coefficients in the coefficient memory 3514 in association with the class code thus supplied.

In Step S3589, the prediction computing unit 3538 performs computation for the prediction taps supplied from the region extracting unit 3535 using the prediction coefficient supplied from the coefficient determining unit 3537, thereby generating the learning predicted image (HD pixels).

Specifically, with each of the prediction taps supplied from the region extracting unit 3535 as $c_i$ (i represents an integer of 1 through n), and with each of the prediction coefficients supplied from the coefficient determining unit 3537 as $d_i$, the prediction computing unit 3538 computes the right side of the above Expression (218), thereby calculating an HD pixel q' which is employed as a pixel of the learning predicted image, and which predicts the corresponding HD pixel q of the first tutor image.

In Step S3590, determination has been made whether or not such processing has been performed for all the pixels. In the event that determination has been made that the processing has not been performed for all the pixels, the flow returns to Step S3583. That is to say, the processing in Step S3533 through 3590 is repeated until completion of the processing for all the pixels.

Then, in Step S3590, in the event that determination has been made that the processing is performed for all the pixels, the prediction computing unit 3538 outputs the learning predicted image (HD image formed of the HD pixels q' each of which has been generated for each processing in Step S3589) to the class classification adaptation processing correction learning unit 3561, whereby the class classification adaptation processing learning processing ends.

As described above, in this example, following completion of the processing for all the pixels, the learning predicted image which is an HD image that predicts the first tutor image is input to the class classification adaptation processing correction learning unit 3561. That is to say, all the HD pixels (predicted pixels) forming an image is output at the same time.

However, the present invention is not restricted to the aforementioned arrangement in which all the pixels forming an image are output at the same. Rather, an arrangement may be made in which the generated HD pixel is output to the class classification adaptation processing correction learning unit 3561 each time that the HD pixel (predicted pixel) is generated by the processing in Step S3589. With such an arrangement, the processing in Step S3591 is omitted.

Next, detailed description will be made with reference to the flowchart shown in FIG. 313 regarding "class classification adaptation processing correction learning processing" executed by the class classification adaptation processing correction learning unit 3561 (FIG. 300).

Upon reception of the first tutor image (HD image) and the learning predicted image (HD image) from the class classification adaptation processing learning unit 3521, in Step S3601, the addition unit 3571 subtracts the learning predicted image from the first tutor image, thereby generating the subtraction image (HD image). Then, the addition unit 3571 supplies the generated subtraction image to the normal equation generating unit 3578 as the second tutor image.

Upon reception of the first student image (SD image) from the class classification adaptation processing learning unit 3521, in Step S3602, the data continuity detecting unit 3572 and the actual world estimating unit 3573 generate the feature-amount image based upon the input first student image (SD image), and supply the generated feature-amount image to the region extracting units 3574 and 3577 as the second student image.

That is to say, the data continuity detecting unit 3572 detects the data continuity contained in the first student image, and outputs the detection results (angle, in this case) to the actual world estimating unit 3573 as data continuity information. Note that the processing shown in Step S3602 performed by the data continuity detecting unit 3572 is generally the same as that shown in Step S101 shown in FIG. 40 described above, except for input/output.

The actual world estimating unit 3573 generates the actual world estimation information (feature-amount image which is an SD image, in this case) based upon the angle (data continuity information) thus input, and supplies the generated actual world estimation information to the region extracting unit 3574 and 3577 as the second student image. Note that the processing shown in Step S3602 performed by the actual world estimating unit 3573 is generally the same as that shown in Step S102 shown in FIG. 40 described above, except for input/output.

Note that the present invention is not restricted to an arrangement in which the processing in Step S3601 and the processing in Step S3602 are performed in that order shown in FIG. 313. That is to say, an arrangement may be made in which the processing in Step S3602 is performed upstream the processing in Step S3601. Furthermore, the processing in Step S3601 and the processing in Step S3602 may be performed at the same time.

In Step S3603, the region extracting unit 3574 extracts the class taps from the second student image (feature-amount image) thus supplied, and outputs the extracted class taps to the pattern detecting unit 3575. Note that the processing shown in Step S3603 is generally the same as that shown in Step S3542 (FIG. 307) described above, except for input/output. That is to say, in this case, a set of pixels 3621 having a layout shown in FIG. 308 is extracted as class taps.

In Step S3604, the pattern detecting unit 3575 detects the pattern from the class taps thus supplied for determining the class code, and supplies the detected pattern to the class code determining unit 3576. Note that the processing shown in Step S3604 is generally the same as that shown in Step S3543 (FIG. 307) described above, except for input/output. That is to say, in this case, the pattern detecting unit 3575 detects at least 273 patterns at the time of completion of the learning processing.

In Step S3605, the class code determining unit 3576 determines the class code based upon the pattern of the class taps thus supplied, and supplies the class code to the region extracting unit 3577 and the normal equation generating unit 3578. Note that the processing shown in Step S3605 is generally the same as that shown in Step S3544 (FIG. 307) described above, except for input/output. That is to say, in this case, the class code determining unit 3576 determines at least 273 class codes at the time of completion of the learning processing.

In Step S3606, the region extracting unit 3577 extracts the prediction taps corresponding to the class code thus supplied, from the second student image (feature-amount image), and supplies the extracted prediction taps to the normal equation generating unit 3578. Note that the processing shown in Step S3606 is generally the same as that shown in Step S3546 (FIG. 307) described above, except for input/output. That is to say, in this case, a set of pixels 354 having a layout shown in FIG. 310 is extracted as prediction taps.

In step S3607, the normal equation generating unit 3578 generates a normal equation represented by the above Expression (229) (i.e., Expression (230)) based upon the prediction taps (SD pixels) supplied from the region extracting unit 3577 and the second tutor image (subtraction image between the first tutor image and the learning predicted image, which is an HD image), and supplies the generated normal equation to the correction coefficient determining unit 3579 along with the class code supplied from the class code determining unit 3576.

In Step S3608, the correction coefficient determining unit 3579 determines the correction coefficients by solving the normal equation thus supplied, i.e., calculates the correction coefficients by computing the right side of the above Expression (234), and stores the calculated correction coefficients associated with the supplied class code in the correction coefficient memory 3554.

In Step S3609, determination is made whether or not such processing has been performed for all the pixels. In the event that determination has been made that the processing has not been performed for all the pixels, the flow returns to Step S3603. That is to say, the processing in Step S3603 through 3609 is repeated until completion of the processing for all the pixels.

On the other hand, in Step S3609, in the event that determination has been made that the processing has been performed for all the pixels, the class classification adaptation processing correction learning processing ends.

As described above, with the class classification adaptation correction processing method, the summed image is generated by making the sum of the predicted image output from the class classification adaptation processing unit 3501 and the correction image (subtraction predicted image) output from the class classification adaptation processing correction unit 3502, and the summed image thus generated is output.

For example, let us say that the HD image 3541 shown in FIG. 293 described above is converted to a reduced-resolution image, i.e., the SD image 3542 with a reduced resolution is obtained, and the SD image 3542 thus obtained is employed as an input image. In this case, the class classification adaptation processing unit 3501 outputs the predicted image 3543 shown in FIG. 314. Then, the summed image is generated by making the sum of the predicted image 3543 and the correction image (not shown) output from the class classification adaptation processing correction unit 3502 (e.g., the predicted image 3543 is corrected using the correction image), thereby generating the output image 3651 shown in FIG. 294.

Making a comparison between the output image 3651, the predicted image 3543, and the HD image 3541 (FIG. 293) which is an original image, it has been confirmed that the output image 3651 is more similar to the HD image 3541 than the predicted image 3543.

As described above, the class classification adaptation processing correction method enables output of an image more similar to the original image (the signal in the actual world 1 which is to be input to the sensor 2), in comparison with other techniques including class classification adaptation processing.

In other words, with the class classification adaptation processing correction method, for example, the data continuity detecting unit 101 shown in FIG. 289 detects the data continuity contained in the input image (FIG. 289) formed of multiple pixels having the pixel values obtained by projecting the light signals in the actual world 1 shown in FIG. 289 by actions of multiple detecting elements of a sensor (e.g., the sensor 2 shown in FIG. 289), in which a part of the continuity as the light signals in the actual world has been lost due to the projection of the light signals in the actual world 1 to the pixel values by actions of the multiple detecting elements each of which has the nature of time-spatial integration effects.

For example, the actual world estimating unit 102 shown in FIG. 289 detects the actual world feature contained in the light-signal function F(x) (FIG. 298) which represents the light signals of the actual world 1 (e.g., the features corresponding to the pixel of the feature-amount image shown in FIG. 289), corresponding to the detected data continuity, thereby estimating the light signals in the actual world 1.

Specifically, for example, making an assumption that the pixel value which represents the distance (e.g., the cross-sectional direction distance Xn' shown in FIG. 303) from the line (e.g., the line 3604 in FIG. 303), which represents the data continuity thus supplied, along at least one dimensional direction represents the at least one-dimensional integration effects which have affected the corresponding pixel, the actual world estimating unit 102 approximates the light-signal function F(x) with the approximate function $f_5(x)$ shown in FIG. 301, for example, and detects the intra-pixel gradient (e.g., grad in the above Expression (234), and the coefficient w1' of x in Expression (233)) which is the gradient of the approximate function $f_5(x)$ around the corresponding pixel (e.g., the pixel 3603 in FIG. 303) as the actual-world features, thereby estimating the light signals in the actual world 1.

Then, for example, the image generating unit 103 shown in FIG. 289 predicts and generates an output image (FIG. 289) with higher quality than the input image based upon the actual world features detected by the actual world estimating means.

Specifically, at the image generating unit 103, for example, the class classification adaptation processing unit 3501 shown in FIG. 289 predicts the pixel value of the pixel of interest (e.g., the pixel of the predicted image shown in FIG. 289, and q' in the above Expression (224)) based upon the pixel values of multiple pixels around the pixel of interest in the input image in which a part of continuity as the light signal in the actual world has been lost.

On the other hand, for example, the class classification adaptation processing correction unit 3502 shown in FIG. 289 predicts the correction term (e.g., the pixel of the correction image (subtraction predicted image) shown in FIG. 289, and u' in Expression (227)) based upon the feature-amount image (actual world estimation information) supplied from the actual world estimating unit 102 shown in FIG. 289 for correcting the pixel value of the pixel of interest of the predicted image predicted by the class classification adaptation processing unit 3501.

Then, for example, the addition unit 3503 shown in FIG. 289 corrects the pixel value of the pixel of interest of the predicted image predicted by the class classification adaptation processing unit 3501 using the correction term predicted by the class classification adaptation processing unit 3501 (e.g., computation represented by Expression (224)).

Also, examples of components provided for the class classification adaptation processing correction method include: the class classification adaptation processing learning unit 3521 shown in FIG. 291 for determining the prediction coefficients by learning, stored in the coefficient memory 3514 shown in FIG. 290; and the learning device 3504 shown in FIG. 291 including the class classification adaptation processing correction learning unit 3561 shown in FIG. 291 for determining the correction coefficients by learning, stored in the correction coefficient memory 3554 shown in FIG. 299.

Specifically, for example, the class classification adaptation processing learning unit 3521 shown in FIG. 292 includes: the down-converter unit 3531 for performing down-converting processing for the learning image data; the coefficient determining unit 3537 for generating the prediction coefficients by learning the relation between the first tutor image and the first student image with the learning image data as the first tutor image and with the learning image data subjected to down-converting processing by the down-converter unit 3531 as the first student image; and the region extracting unit 3532 through the normal equation generating unit 3536.

The class classification adaptation processing learning unit 3521 further comprises a prediction computing unit 3538 for generating a learning prediction image as image data for predicting a first tutor image from a first student image, using a prediction coefficient generated (determined) by the coefficient determining unit 3537, for example.

On the other hand, for example, the class classification adaptation processing correction learning unit 3561 shown in FIG. 300 includes: the data continuity detecting unit 3572 and the actual world estimating unit 3573 for detecting the data continuity in the first student image, detecting the actual-world features corresponding to each pixel of the first student image based upon the data continuity thus detected, and generating the feature-amount image (specifically, the feature-amount image 3591 shown in FIG. 302, for example) with the value corresponding to the detected actual-world feature as the pixel value, which is employed as the second student image (e.g., the second student image in FIG. 300); the addition unit 3571 for generating the image data (subtraction image) between the first student image and the learning predicted image, which is used as the second tutor image; the correction coefficient determining unit 3579 for generating the correction coefficients by learning the relation between the second tutor image and the second student image; and the region extracting unit 3574 through the normal equation generating unit 3578.

Thus, the class classification adaptation processing correction method enables output of an image more similar to the original image (the signal in the actual world 1 which is to be input to the sensor 2) as compared with other conventional methods including the class classification adaptation processing.

Note that the difference between the class classification adaptation processing and the simple interpolation processing is as follows. That is to say, the class classification adaptation processing enables reproduction of the components contained in the HD image, which have been lost in the SD image, unlike the simple interpolation. That is to say, as long as referring to only the above Expressions (218) and (226), the class classification adaptation processing looks like the same as the interpolation processing using a so-called interpolation filter. However, with the class classification adaptation processing, the prediction coefficients $d_i$ and the correction coefficients $g_i$ corresponding to the coefficients of the interpolation filter are obtained by learning based upon the tutor data and the student data (the first tutor image and the first student image, or the second tutor image and the second student image), thereby reproducing the components contained in the HD image. Accordingly, the class classification adaptation processing described above can be said as the processing having a function of improving the image quality (improving the resolution).

While description has been made regarding an arrangement having a function for improving the spatial resolution, the class classification adaptation processing employs various kinds of coefficients obtained by performing learning with suitable kinds of the tutor data and the student data, thereby enabling various kinds of processing for improving S/N (Signal to Noise Ratio), improving blurring, and so forth.

That is to say, with the class classification adaptation processing, the coefficients can be obtained with an image having a high S/N as the tutor data and with the image having a reduced S/N (or reduced resolution) generated based upon the tutor data as the student data, for example, thereby improving S/N (or improving blurring).

While description has been made regarding the image processing device having a configuration shown in FIG. 3*s* an arrangement according to the present invention, an arrangement according to the present invention is not restricted to the arrangement shown in FIG. 3, rather, various modification may be made. That is to say, an arrangement of the signal processing device 4 shown in FIG. 1 is not restricted to the arrangement shown in FIG. 3, rather, various modification may be made.

For example, the signal processing device having such a configuration shown in FIG. 3 performs signal processing based upon the data continuity contained in the signal in the actual world 1 serving as an image. Thus, the signal processing device having such a configuration shown in FIG. 3 can perform signal processing with high precision for the region where continuity is available for the signal in the actual world 1, as compared with the signal processing performed by other signal processing devices, thereby outputting image data more similar to the signal in the actual world 1, as a result.

However, the signal processing device having such a configuration shown in FIG. 3 executes signal processing based upon continuity, and accordingly, cannot execute signal processing with the same precision for the region where clear continuity of the signal in the actual world 1 is unavailable as processing for the region where continuity is present, leading to output image data containing an error as to the signal in the actual world 1.

Accordingly, an arrangement may be made further including another device (or program) for performing signal processing which does not employ continuity, in addition to the configuration of the signal processing device shown in FIG. 3. With such an arrangement, the signal processing device having the configuration shown in FIG. 3 executes signal processing for the region where continuity is available for the signal in the actual world 1. On the other hand, the additional device (or program or the like) executes the signal processing for the region where clear continuity is unavailable for the signal in the actual world 1. Note that such an arrangement will be referred to as "hybrid method" hereafter.

Description will be made below with reference to FIG. 315 through FIG. 328 regarding five specific hybrid method (which will be referred to as "first hybrid method" through "fifth hybrid method" hereafter).

Note that each function of the signal processing device employing such a hybrid method may be realized by either of hardware and software. That is to say, the block diagrams shown in FIG. 315 through FIG. 317, FIG. 321, FIG. 323, FIG. 325, and FIG. 327, may be regarded to be either of hardware block diagrams or as software block diagrams.

FIG. 315 shows a configuration example of a signal processing device to which the first hybrid method is applied.

With the signal processing device shown in FIG. 315, upon reception of the image data which an example of the data 3 (FIG. 1), image processing as described later is performed based upon the input image data (input image) so as to generate an image, and the generated image (output image) is output. That is to say, FIG. 315 is a diagram which shows a configuration of the image processing device 4 (FIG. 1) which is an image processing device.

The input image (image data which is an example of the data 3) input to the image processing device 4 is supplied to a data continuity detecting unit 4101, an actual world estimating unit 4102, and an image generating unit 4104.

The data continuity detecting unit 4101 detects the data continuity from the input image, and supplies data continuity information which indicates the detected continuity to the actual world estimating unit 4102 and the image generating unit 4103.

As described above, the data continuity detecting unit 4101 has basically the same configuration and functions as with the data continuity detecting unit 101 shown in FIG. 3. Accordingly, the data continuity detecting unit 4101 may have various kinds of configurations described above.

Note that the data continuity detecting unit 4101 further has a function for generating information for specifying the region of a pixel of interest (which will be referred to as "region specifying information" hereafter), and supplies the generated information to a region detecting unit 4111.

The region specifying information used here is not restricted in particular, rather, an arrangement may be made in which new information is generated after the time that the data continuity information has been generated, or an arrangement may be made in which such information is generated as accompanying information of the data continuity information at the same time.

Specifically, an estimation error may be employed as the region specifying information, for example. That is to say, for example, the estimation error is obtained as accompanying information at the time of the data continuity detecting unit 4101 computing the angle employed as the data continuity information using the least square method. The estimation error may be employed as the region specifying information.

The actual world estimating unit 4102 estimates the signal in the actual world 1 (FIG. 1) based upon the input image and the data continuity information supplied from the data continuity detecting unit 4101. That is to say, the actual world estimating unit 4102 estimates the image which is the signal in the actual world 1, and which is to be input to the sensor 2 (FIG. 1) in the stage where the input image has been acquired. The actual world estimating unit 4102 supplies the actual world estimating information to the image generating unit 4103 for indicating the estimation results of the signal in the actual world 1.

As described above, the actual world estimating unit 4102 has basically the same configuration and functions as with the actual world estimating unit 102 shown in FIG. 3. Accordingly, the actual world estimating unit 4102 may have various kinds of configurations as described above.

The image generating unit 4103 generates a signal similar to the signal in the actual world 1 based upon the actual world estimation information indicating the estimated signal in the actual world 1 supplied from the actual world estimating unit 4102, and supplies the generated signal to a selector 4112. Alternatively, the image generating unit 4103 generates a signal closer to the signal of the actual world 1 based upon: the data continuity information for indicating the estimated signal in the actual world 1 supplied from the data continuity detecting unit 4101; and the actual world estimation information supplied from the actual world estimating unit 4102, and supplies the generated signal to the selector 4112.

That is to say, the image generating unit 4103 generates an image similar to the image of the actual world 1 based upon the actual world estimation information, and supplies the generated image to the selector 4112. Alternatively, the image generating unit 4103 generates an image more similar to the image of the actual world 1 based upon the data continuity information and the actual world estimation information, and supplies the generated image to the selector 4112.

As described above, the image generating unit 4103 has basically the same configuration and functions as with the image generating unit 103 shown in FIG. 3. Accordingly, the image generating unit 4103 may have various kinds of configurations as described above.

The image generating unit 4104 performs predetermined image processing for the input image so as to generate an image, and supplies the generated image to the selector 4112.

Note that the image processing executed by the image generating unit 4104 is not restricted in particular as long as employing the image processing other than those employed in the data continuity detecting unit 4101, the actual world estimating unit 4102, and the image generating unit 4103.

For example, the image generating unit 4104 can perform conventional class classification adaptation processing. FIG. 316 shows an configuration example of the image generating unit 4104 for executing the class classification adaptation processing. Note that detailed description with reference to FIG. 316 will be made later, i.e., detailed description will be made later regarding the image generating unit 4104 for executing the class classification processing. Also, description will be made later regarding the class classification adaptation processing at the same time as with description with reference to FIG. 316.

A continuity region detecting unit 4105 includes a region detecting unit 4111 and a selector 4112.

The region detecting unit 4111 detects whether the image (pixel of interest) supplied to the selector 4112 belongs to the continuity region or non-continuity region based upon the region specifying information supplied from the data continuity detecting unit 4101, and supplies the detection results to the selector 4112.

Note that the region detection processing executed by the region detecting unit 4111 is not restricted in particular. For example, the aforementioned estimation error may be supplied as the region specifying information. In this case, an arrangement may be made in which in a case that the estimation error thus supplied is smaller than a predetermined threshold, the region detecting unit 4111 determines that the pixel of interest of the input image belongs to the continuity region, and in a case that the estimation error thus supplied is greater than the predetermined threshold, determination is made that the pixel of interest of the input image belongs to the non-continuity region.

The selector 4112 selects one of the image supplied from the image generating unit 4103 and the image supplied from the image generating unit 4104 based upon the detection results supplied from the region detecting unit 4111, and externally outputs the selected image as an output image.

That is to say, in a case that the region detecting unit 4111 has determined that the pixel of interest belongs to the continuity region, the selector 4112 selects the image supplied from the image generating unit 4103 (pixel corresponding to the pixel of interest of the input image, generated by the image generating unit 4103) as an output image.

On the other hand, in a case that the region detecting unit 4111 has determined that the pixel of interest belongs to the non-continuity region, the selector 4112 selects the image supplied from the image generating unit 4104 (pixel corresponding to the pixel of interest of the input image, generated by the image generating unit 4104) as an output image.

Note that the selector 4112 may output an output image in increments of a pixel (i.e., may output an output image for each selected pixel), or an arrangement may be made in which the pixels subjected to the processing are stored until completion of the processing for all the pixels, and all the pixels are output at the same time (with the entire output image at once) when the processing of all the pixels is completed.

Next, detailed description will be made regarding the image generating unit 4104 for executing the class classification adaptation processing which is an example of image processing with reference to FIG. 316.

In FIG. 316, let us say that the class classification adaptation processing executed by the image generating unit 4104 is processing for improving the spatial resolution of an input image, for example. That is to say, let us say that the class classification adaptation processing is processing for converting an input image with a standard resolution into a predicted image which is an image with a high resolution.

Note that the image having a standard resolution will be referred to as "SD (Standard Definition) image" hereafter as appropriate, and the pixel making up the SD image will be referred to as "SD pixel" as appropriate.

On the other hand, the image having a high resolution will be referred to as "HD (High Definition) image" hereafter as appropriate, and the pixel making up the HD image will be referred to as "HD pixel" as appropriate.

Specifically, the class classification adaptation processing executed by the image generating unit 4104 is as follows.

That is to say, in order to obtain the HD pixel of the predicted image (HD image) corresponding to the pixel of interest (SD pixel) of the input image (SD image), first, the features is obtained for the SD pixels formed of the pixel of interest and the pixels therearound (Such SD pixels will be also referred to as "class taps" hereafter), and the class is identified for each class tap based upon the features thereof by selecting one from the classes prepared beforehand in association with the features (i.e., the class code of the class-tap set is identified).

Then, product-sum is computed using: the coefficients of the one selected from the multiple coefficient sets prepared beforehand (each coefficient set corresponds to a certain class code) based upon the identified class code; and the SD pixels formed of the pixel of interest and the SD pixels therearound (Such SD pixels of the input image will be also referred to as "prediction taps" hereafter. Note that the prediction taps may match the class taps), thereby obtaining the HD pixel of the predicted image (HD image) corresponding to the pixel of interest (SD pixel) of the input image (SD image).

More specifically, in FIG. 1, upon input of the signal in the actual world 1 (light-intensity distribution) to the sensor 2, the sensor 2 outputs an input image.

In FIG. 316, the input image (SD image) is supplied to region extracting units 4121 and 4125 of the image generating unit 4104. The region extracting unit 4125 extracts class taps (SD pixels positioned at a predetermined region including the pixel of interest (SD pixel)) necessary for class classification, from the input image thus supplied, and outputs the extracted class taps to a pattern detecting unit 4122. The pattern detecting unit 4122 detects the pattern of the input image based upon the class taps thus input.

The class code determining unit 4123 determines the class code based upon the pattern detected by the pattern detecting unit 4122, and outputs the determined class code to coefficient memory 4124 and the region extracting unit 4125. The coefficient memory 4124 stores the coefficients for each class code obtained by learning. The coefficient memory 4124 reads out the coefficients corresponding to the class code input from the class code determining unit 4123, and outputs the coefficients thus read, to a prediction computing unit 4126.

Note that description will be made later regarding the learning processing for obtaining the coefficients stored in the coefficient memory 4124 with reference to the block diagram of the learning device shown in FIG. 317.

Note that the coefficients stored in the coefficient memory 4124 are used for generating the predicted image (HD image) as described later. Accordingly, the coefficients stored in the coefficient memory 4124 will be referred to as "prediction coefficients" hereafter.

The region extracting unit 4125 extracts the prediction taps (SD pixels positioned at a predetermined region including the pixel of interest) necessary for predicting and generating the predicted image (HD image), from the input image (SD image) input from the sensor 2 based upon the class code input from the class code determining unit 4123 in response to the class code, and outputs the extracted prediction taps to the prediction computing unit 4126.

The prediction computing unit 4126 executes product-sum computation using the prediction taps input from the region extracting unit 4125 and the prediction coefficients input from the coefficient memory 4124, thereby generating the HD pixel of the predicted image (HD image) corresponding to the pixel of interest (SD pixel) of the input image (SD image). Then, the prediction computing unit 4126 outputs the generated HD pixel to the selector 4112.

More specifically, the coefficient memory 4124 outputs the prediction coefficients corresponding to the class code supplied from the class code determining unit 4123 to the prediction computing unit 4126. The prediction computing unit 4126 executes product-sum computation represented by the following Expression (240) using: the prediction taps extracted from the pixel value in a predetermined pixel region of the input image supplied from the region extracting unit 4125; and the prediction coefficients supplied from the coefficient memory 4124, thereby obtaining (i.e., predicting and estimating) the HD pixel corresponding to the predicted image (HD image).

$$q' = \sum_{i=0}^{n} d_i \times c_i \tag{240}$$

In Expression (240), q' represents the HD pixel of the predicted image (HD image). Each of $c_i$ (i represents an integer of 1 through n) represents the corresponding prediction tap (SD pixel). On the other hand, each of $d_i$ represents the corresponding prediction coefficient.

As described above, the image generating unit 4104 predicts and estimates the corresponding HD image based upon the SD image (input image), and accordingly, in this case, the HD image output from the image generating unit 4104 is referred to as a "predicted image".

FIG. 317 shows a learning device (device for calculating the prediction coefficients) for determining such prediction coefficients ($d_i$ in Expression (237)) stored in the coefficient memory 4124 of the image generating unit 4104.

In FIG. 317, a certain image is input to a down-converter unit 4141 and a normal equation generating unit 4146 as a tutor image (HD image).

The down-converter unit 4146 generates a student image (SD image) with a lower resolution than the input tutor image (HD image) based upon the tutor image thus input (i.e., performs down-converting processing for the tutor image, thereby obtaining a student image), and outputs the generated student image to region extracting units 4142 and 4145.

As described above, a learning device 4131 includes the down-converter unit 4141, and accordingly, there is no need to prepare a higher-resolution image as the tutor image (HD image), corresponding to the input image from the sensor 2 (FIG. 1). The reason is that the student image (with a reduced resolution) obtained by performing the down-converting processing for the tutor image may be employed as an SD image. In this case, the tutor image corresponding to the student image may be employed as an HD image. Accordingly, the input image from the sensor 2 may be employed as the tutor image without any conversion.

The region extracting unit 4142 extracts the class taps (SD pixels) necessary for class classification, from the student image (SD image) supplied from the down-converter unit 4141, and outputs the extracted class taps to a pattern detecting unit 4143. The pattern detecting unit 4143 detects the pattern of the class taps thus input, and outputs the detection results to a class code determining unit 4144. The class code determining unit 4144 determines the class code corresponding to the input pattern, and outputs the determined class code to the region extracting unit 4145 and the normal equation generating unit 4146, respectively.

The region extracting unit 4145 extracts the prediction taps (SD pixels) from the student image (SD image) input from the down-converter unit 4141, based upon the class code input from the class code determining unit 4144, and outputs the extracted prediction taps to the normal equation generating unit 4146.

Note that the aforementioned region extracting unit 4142, the pattern detecting unit 4143, the class code determining unit 4144, and the region extracting unit 4145, have basically the same configurations and functions as with the region extracting unit 4121, the pattern detecting unit 4122, the class code determining unit 4123, and the region extracting unit 4125, of the image generating unit 4104 shown in FIG. 316, respectively.

The normal equation generating unit 4146 generates a normal equation for each of all the class codes input from the class code determining unit 4144 based upon the prediction taps (SD pixels) of the student image (SD image) input from the region extracting unit 4145 and the HD pixels of the tutor image (HD image) for each class code, and supplies the generated normal equation to a coefficient determining unit 4147.

Upon reception of the normal equation corresponding to a certain class code from the normal equation generating unit 4146, the coefficient determining unit 4147 computes the prediction coefficients using the normal equation, and stores the computed prediction coefficients in the coefficient memory 4142 in association with the class code.

Now, detailed description will be made regarding the normal equation generating unit 4146 and the coefficient determining unit 4147.

In the above Expression (240), each of the prediction coefficients $d_i$ is undetermined before learning. The learning processing is performed by inputting the multiple HD pixels of the tutor image (HD image) for each class code. Let us say that there are m HD pixels corresponding to a certain class code. In this case, with the m HD pixels as $q_k$ (k represents an integer of 1 through m), the following Expression (241) is introduced from the Expression (240).

$$q_k = \sum_{i=0}^{n} d_i \times c_{ik} + e_k \tag{241}$$

That is to say, the Expression (241) indicates that a certain HD pixel $q_k$ can be predicted and estimated by executing computation represented by the right side thereof. Note that in Expression (241), $e_k$ represents an error. That is to say, the HD pixel $q_k'$ of the predicted image (HD image) obtained as computation results by computing the right side does not exactly match the actual HD pixel $q_k$, but contains a certain error $e_k$.

With the present embodiment, the prediction coefficients $d_i$ are obtained by learning processing such that the sum of squares of the errors $e_k$ shown in Expression (241) exhibits the minimum, thereby obtaining the optimum prediction coefficients $d_i$ for predicting the actual HD pixel $q_k$.

Specifically, with the present embodiment, the optimum prediction coefficients $d_i$ are determined as a unique solution by learning processing using the least square method based upon the m HD pixels $q_k$ (wherein m is an integer greater than n) collected by learning, for example.

That is to say, the normal equation for obtaining the prediction coefficients $d_i$ in the right side of Expression (241) using the least square method is represented by the following Expression (242).

$$\begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \begin{bmatrix} d_1 \\ d_2 \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \tag{242}$$

That is to say, with the present embodiment, the normal equation represented by Expression (242) is generated and solved, thereby determining the prediction coefficients $d_i$ as a unique solution.

Specifically, with the component matrices forming the normal equation represented by Expression (242) defined as the matrices represented by Expressions (243) through (245), the normal equation is represented by the following Expression (246).

$$C_{MAT} = \begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \tag{243}$$

$$D_{MAT} = \begin{bmatrix} d_1 \\ d_2 \\ \vdots \\ d_n \end{bmatrix} \tag{244}$$

$$Q_{MAT} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \tag{245}$$

$$C_{MAT} D_{MAT} = Q_{MAT} \tag{246}$$

As can be understood from Expression (244), each component of the matrix $D_{MAT}$ is the prediction coefficient $d_i$ which is to be obtained. With the present embodiment, in the event that the matrix $C_{MAT}$, which is the left side of Expression (246), and the matrix $Q_{MAT}$, which is the right side thereof, are determined, the matrix $D_{MAT}$ (i.e., prediction coefficient $d_i$) can be calculated with the matrix solution method.

More specifically, as can be understood from Expression (243), each component of the matrix $C_{MAT}$ can be calculated as long as the prediction taps $c_{ik}$ are known. The prediction taps $c_{ik}$ are extracted by the region extracting unit 4145. With the present embodiment, the normal equation generating unit 4146 can compute each component of the matrix $C_{MAT}$ using the prediction tap $c_{ik}$ supplied from the region extracting unit 4145.

On the other hand, as can be understood from Expression (245), each component of the matrix $Q_{MAT}$ can be calculated as long as the prediction taps $c_{ik}$ and the HD pixels $q_k$ are known. Note that the prediction taps $C_{ik}$ are the same as those used in the matrix $C_{MAT}$, and the HD pixel $q_k$ is the HD pixel of the tutor image corresponding to the pixel of interest (SD pixel of the student image) included in the prediction taps $c_{ik}$. With the present embodiment, the normal equation generating unit 4146 can compute each component of the matrix $Q_{MAT}$ using the prediction taps $c_{ik}$ supplied from the region extracting unit 4145 and the tutor image.

As described above, the normal equation generating unit 4146 computes each component of the matrix $C_{MAT}$ and each component of the matrix $Q_{MAT}$ for each class code, and supplies the computation results to the coefficient determining unit 4147 in association with the class code.

The coefficient determining unit 4147 computes the prediction coefficients $d_i$ each of which is the component of the matrix $D_{MAT}$ represented by the above Expression (246) based upon the normal equation corresponding to a certain class code supplied.

Specifically, the normal equation represented by the above Expression (246) is transformed as represented by the following Expression (247).

$$D_{MAT} C_{MAT}^{-1} Q_{MAT} \tag{247}$$

In Expression (247), each component of the matrix $D_{MAT}$ on the left side thereof is the prediction coefficient $d_i$ which is to be obtained. Note that each component of the matrix $C_{MAT}$ and each component of the matrix $Q_{MAT}$ are supplied from the normal equation generating unit 4146. With the present embodiment, upon reception of each component of the matrix $C_{MAT}$ and each component of the matrix $Q_{MAT}$ corresponding to a certain class code from the normal equation generating unit 4146, the coefficient determining unit 4147 computes matrix computation represented by the right side of Expression (247) so as to calculate the Matrix $D_{MAT}$, and stores the computation results (prediction coefficients $d_i$) in the coefficient memory 4124 in association with the class code.

Note that as described above, the difference between the class classification adaptation processing and the simple interpolation processing is as follows. That is to say, the class classification adaptation processing enables reproduction of the component signals contained in the HD image, which have been lost in the SD image, unlike the simple interpolation, for example. That is to say, as long as referring to only the above Expression (240), the class classification adaptation processing looks like the same as the interpolation processing using a so-called interpolation filter. However, with the class classification adaptation processing, the prediction coefficients $d_i$ corresponding to the coefficients of the interpolation filter are obtained by learning based upon the tutor data and the student data, thereby reproducing the components contained in the HD image. Accordingly, the class classification adaptation processing described above can be said as the processing having a function of improving the image quality (improving the resolution).

While description has been made regarding an arrangement having a function for improving the spatial resolution, the class classification adaptation processing employs various kinds of coefficients obtained by performing learning with suitable kinds of the tutor data and the student data, thereby enabling various kinds of processing for improving S/N (Signal to Noise Ratio), improving blurring, and so forth.

That is to say, with the class classification adaptation processing, the coefficients can obtained with image data having a high S/N as the tutor data and with the image having a reduced S/N (or reduced resolution) generated based upon the tutor image as the student image, for example, thereby improving S/N (or improving blurring).

The above is description regarding the configurations of the image generating unit 4104 and the learning device 4131 thereof for executing the class classification adaptation processing.

Note that while the image generating unit 4104 may have a configuration for executing image processing other than the class classification adaptation processing as described above, description will be made regarding the image generating unit 4104 having the same configuration as shown in FIG. 316 described above for convenience of description. That is to say, let us say that the image generating unit 4104 executes the class classification adaptation processing so as to generate an image with higher spatial resolution than the input image, and supplies the generated image to the selector 4112.

Next, description will be made regarding signal processing performed by the signal processing device (FIG. 315) employing the first hybrid method with reference to FIG. 318.

Let us say that with the present embodiment, the data continuity detecting unit 4101 computes angle (angle between: the continuity direction (which is one spatial direction) around the pixel of interest of the image, which represents the signal in the actual world 1 (FIG. 1); and X-direction which is another spatial direction (the direction parallel with a certain side of the detecting element of the sensor 2), using the least square method, and outputs the computed angle as data continuity information.

Also, the data continuity detecting unit 4101 outputs the estimation error (error of the computation using the least square method) calculated as accompanying computation results at the time of computation of the angle, which is used as the region specifying information.

In FIG. 1, upon input of the signal, which is an image, in the actual world 1 to the sensor 2, the input image is output from the sensor 2.

As shown in FIG. 315, the input image is input to the image generating unit 4104, as well as to the data continuity detecting unit 4101, and the actual world estimating unit 4102.

Then, in Step S4101 shown in FIG. 318, the image generating unit 4104 executes the aforementioned class classification adaptation processing with a certain SD pixel of the input image (SD image) as the pixel of interest, thereby generating the HD pixel (HD pixel corresponding to the pixel of interest) of the predicted image (HD image). Then, the image generating unit 4104 supplies the generated HD pixel to the selector 4112.

Note that in order to distinguish between the pixel output from the image generating unit 4104 and the pixel output from the image generating unit 4103, the pixel output from the image generating unit 4104 will be referred to as a "first pixel", and the pixel output from the image generating unit 4103 will be referred to as a "second pixel", hereafter.

Also, such processing executed by the image generating unit 4104 (the processing in Step S4101, in this case) will be referred to as "execution of the class classification adaptation processing" hereafter. Detailed description will be made later regarding an example of the "execution of class classification adaptation processing" with reference to the flowchart shown in FIG. 319.

On the other hand, in Step S4102, the data continuity detecting unit 4101 detects the angle corresponding to the continuity direction, and computes the estimation error thereof. The detected angle is supplied to the actual world estimating unit 4102 and the image generating unit 4103 as the data continuity information respectively. On the other hand, the computed estimation error is supplied to the region detecting unit 4111 as the region specifying information.

In Step S4103, the actual world estimating unit 4102 estimates the signal in the actual world 1 based upon the angle detected by the data continuity detecting unit 4101 and the input image.

Note that the estimation processing executed by the actual world estimating unit 4102 is not restricted in particular as described above, rather, various kinds of techniques may be employed as described above. Let us say that the actual world estimating unit 4102 approximates the function F (which will be referred to as "light-signal function F" hereafter) which represents the signal in the actual world 1, using a predetermined function f (which will be referred to as "approximate function f" hereafter), thereby estimating the signal (light-signal function F) in the actual world 1.

Also, let us say that the actual world estimating unit 4102 supplies the features (coefficients) of the approximate function f to the image generating unit 4103 as the actual world estimation information, for example.

In Step S4104, the image generating unit 4103 generates the second pixel (HD pixel) based upon the signal in the actual world 1 estimated by the actual world estimating unit 4102, corresponding to the first pixel (HD pixel) generated with the class classification adaptation processing performed by the image generating unit 4104, and supplies the generated second pixel to the selector 4112.

With such a configuration, the features (coefficients) of the approximate function f is supplied from the actual world estimating unit 4102. Then, the image generating unit 4103 calculates the integration of the approximate function f over a predetermined integration range based upon the features of the approximate function f thus supplied, thereby generating the second pixel (HD pixel), for example.

Note that the integration range is determined so as to generate the second pixel with the same size (same resolution) as with the first pixel (HD pixel) output from the image generating unit 4104. That is to say, the integration range is determined to be a range along the spatial direction with the same width as that of the second pixel which is to be generated.

Note that the order of steps according to the present invention is not restricted to an arrangement shown in FIG. 318 in which the "execution of class classification adaptation processing" in Step S4101 and a series of processing in Step S4102 through Step S4104 are executed in that order, rather, an arrangement may be made in which the series of processing in Step S4102 through Step S4104 is executed prior to the "execution of class classification adaptation processing" in Step S4101. Also, an arrangement may be made in which the "execution of class classification adaptation processing" in Step S4101 and a series of processing in Step S4102 through Step S4104 are executed at the same time.

In Step S4105, the region detecting unit 4111 detects the region of the second pixel (HD pixel) generated with the processing in Step S4104 performed by the image generating unit 4103 based upon the estimation error (region specifying information) computed with the processing in Step S4102 performed by the data continuity detecting unit 4101.

Here, the second pixel is an HD pixel corresponding to the SD pixel of the input image, which has been used as the pixel of interest by the data continuity detecting unit 4101. Accordingly, the type (continuity region or non-continuity region) of the region is the same between the pixel of interest (SD pixel of the input image) and the second pixel (HD pixel).

Note that the region specifying information output from the data continuity detecting unit 4101 is the estimation error calculated at the time of calculation of the angle around the pixel of interest using the least square method.

With such a configuration, the region detecting unit 4111 makes comparison between the estimation error with regard to the pixel of interest (SD pixel of the input image) supplied from the data continuity detecting unit 4101 and a predetermined threshold. As a result of comparison, in the event that the estimation error is less than the threshold, the region detecting unit 4111 detects that the second pixel belongs to the continuity region. On the other hand, in the event that the estimation error is equal to or greater than the threshold, the region detecting unit 4111 detects that the second pixel belongs to the non-continuity region. Then, the detection results are supplied to the selector 4112.

Upon reception of the detection results from the region detecting unit 4111, the selector 4112 determines whether or not the detected region belongs to the continuity region in Step S4106.

In Step S4106, in the event that determination has been made that the detected region belongs to the continuity region, the selector 4112 externally outputs the second pixel supplied from the image generating unit 4103 as an output image in Step S4107.

On the other hand, in Step S4106, in the event that determination has been made that the detected region does not belong to the continuity region (i.e., belongs to the non-continuity region), the selector 4112 externally outputs the first pixel supplied from the image generating unit 4104 as an output image in Step S4108.

Subsequently, in Step S4109, determination is made whether or not the processing has been performed for all the pixels. In the event that determination has been made that the processing has not been performed for all the pixels, the processing returns to Step S4101. That is to say, the processing in Step S4101 through S4109 is repeated until completion of the processing for all the pixels.

On the other hand, in Step S4109, in the event that determination has been made that the processing has been performed for all the pixels, the processing ends.

As described above, with an arrangement shown in the flowchart in FIG. 318, the output image selected from the first pixel and the second pixel is output in increments as an output image of a pixel each time that the first pixel (HD pixel) and the second pixel (HD pixel) are generated.

However, as described above, the present invention is not restricted to such an arrangement in which the output data is output in increments of a pixel, rather, an arrangement may be made in which the output data is output in the form of an image, i.e., the pixels forming the image are output at the same time as an output image, each time that the processing has been made for all the pixels. Note that with such an arrangement, each of Step S4107 and Step S4108 further includes additional processing for temporarily storing the pixels (first pixels or second pixels) in the selector 4112 instead of outputting the pixel each time that the pixel is generated, and outputting all the pixels at the same time after the processing in Step S4109.

Next, the details of the "processing for executing class classification processing" which the image generating unit 4104 of which the configuration is shown in FIG. 316 executes will be described with reference to the flowchart in FIG. 319 (e.g., processing in step S4101 in FIG. 318 described above).

Upon an input image (SD image) being input to the image generating unit 4104 from the sensor 2, in step S4121 the region extracting unit 4121 and region extracting unit 4125 each input the input image.

In step S4122, the region extracting unit 4121 extracts from the input image a pixel of interest (SD pixel) and pixels (SD pixels) at positions each at relative positions as to the pixel of interest set beforehand (one or more positions), as a class tap, and supplies this to the pattern detecting unit 4122.

In step S4123, the pattern detecting unit 4122 detects the pattern of the supplied class tap, and supplies this to the class code determining unit 4123.

In step S4124, the class code determining unit 4123 determines a class code from multiple class codes set beforehand, which matches the pattern of the class tap that has been supplied, and supplies this to each of the coefficient memory 4124 and region extracting unit 4125.

In step S4125, the coefficient memory 4124 reads out a prediction coefficient (group) to be used, from multiple prediction coefficients (groups) determined by learning processing beforehand, based on the class code that has been supplied, and supplies this to the prediction computing unit 4126.

Note that learning processing will be described later with reference to the flowchart in FIG. 320.

In step S4126, the region extracting unit 4125 extracts, as a prediction tap, from the input image corresponding to the class code supplied thereto a pixel of interest (SD pixel) and pixels (SD pixels) at positions each at relative positions as to the pixel of interest set beforehand (One or more positions, being positions set independently from the position of the class tap. However, may be the same position as the class tap), and supplies this to the prediction computing unit 4126.

In step S4127, the prediction computing unit 4126 computes the prediction tap supplied from the region extracting unit 4125, using the prediction coefficient supplied from the coefficient memory 4124, and generates a prediction image (first pixel) which is externally (in the example in FIG. 315, the selector 4112) output.

Specifically, the prediction computing unit 4126 takes each prediction tap supplied from the region extracting unit 4125 as $c_i$ (wherein i is an integer from 1 to n) and also each prediction coefficient supplied from the coefficient memory 4124 as $d_i$, and computes the right side of the above-described Expression (240) so as to calculate an HD pixel q' at the pixel of interest (SD pixel), and externally outputs this as a predetermined pixel (a first pixel) of the prediction image (HD image). After this, the processing ends.

Next, the learning processing (processing for generating prediction coefficients to be used by the image generating unit 4104 by learning) which the learning device 4131 (FIG. 317) performs with regard to the image generating unit 4104, will be described with reference to the flowchart in FIG. 320.

In step S4141, each of the down converter unit 4141 and normal equation generating unit 4146 inputs a predetermined image supplied thereto as a tutor image (HD image).

In step S4142, the down converter unit 4141 performs down conversion (reduction in resolution) of the input tutor image and generates a student image (SD image), which is supplied to each of the region extracting unit 4142 and region extracting unit 4145.

In step S4143, the region extracting unit 4142 extracts class taps from the student image supplied thereto, and outputs to the patter detecting unit 4143. Note that the processing in step S4143 is basically the same processing as step S4122 (FIG. 319) described above.

In step S4144, the pattern detecting unit 4143 detects patterns for determining the class code form the class tap supplied thereto, and supplies this to the class code determining unit 4144. Note that the processing in step S4144 is basically the same processing as step S4123 (FIG. 319) described above.

In step S4145, the class code determining unit 4144 determines the class code based on the pattern of the class tap supplied thereto, and supplies this to each of the region extracting unit 4145 and the normal equation generating unit 4146. Note that the processing in step S4145 is basically the same processing as step S4124 (FIG. 319) described above.

In step S4146, the region extracting unit 4145 extracts a prediction tap from the student image corresponding to the class code supplied thereto, and supplies this to the normal equation generating unit 4146. Note that the processing in step S4146 is basically the same processing as step S4126 (FIG. 319) described above.

In step S4147, the normal equation generating unit 4146 generates a normal equation expressed as the above-described Expression (242) (i.e., Expression (243)) from the prediction tap (SD pixels) supplied from the region extracting unit 4145 and a predetermined HD pixel from the tutor image (HD image), and correlates the generated normal equation with the class code supplied from the class code determining unit 4144, and supplies this to the coefficient determining unit 4147.

In step S4148, the coefficient determining unit 4147 solves the supplied normal equation and determines the prediction coefficient, i.e., calculates the prediction coefficient by computing the right side of the above-described Expression (247), and stores this in the coefficient memory 4124 in a manner correlated with the class code supplied thereto.

Subsequently, in step S4149, determination is made regarding whether or not processing has been performed for all pixels, and in the event that determination is made that processing has not been performed for all pixels, the processing returns to step S4143. That is to say, the processing of steps S4143 through S4149 is repeated until processing of all pixels ends.

Then, upon determination being made in step S4149 that processing has been performed for all pixels, the processing ends.

Next, second third hybrid method will be described with reference to FIG. 321 and FIG. 322.

FIG. 321 illustrates a configuration example of a signal processing device to which the second hybrid method has been applied.

In FIG. 321, the portions which corresponding to the signal processing device to which the first hybrid method has been applied (FIG. 315) are denoted with corresponding symbols.

In the configuration example in FIG. 315 (the first hybrid method), region identifying information is output from the data continuity detecting unit 4101 and input to the region detecting unit 4111, but with the configuration example shown in FIG. 321 (second hybrid method), the region identifying information is output from the actual world estimating unit 4102 and input to the region detecting unit 4111.

This region identifying information is not restricted in particular, and may be information newly generated following the actual world estimating unit 4102 estimating signals of the actual world 1 (FIG. 1), or may be information generated accessory to a case of signals of the actual world 1 being estimated.

Specifically, for example, estimation error may be used as region identifying information.

Now, description will be made regarding estimation error.

As described above, the estimated error output from the data continuity detecting unit 4101 (region identifying information in FIG. 315) is the estimation error calculated in an accessorial manner while carrying out least-square computation in the event that the continuity detecting information output from the data continuity detecting unit 4101 is the angle, and the angle is computed by the least-square method, for example.

Conversely, the estimation error (region identifying information in FIG. 321) output from the actual world estimating unit 4102 is, for example, mapping error.

That is to say, the actual world 1 signals are estimated by the actual world estimating unit 4102, so pixels of an arbitrary magnitude can be generated (pixel values can be calculated) from the estimated actual world 1 signals. Here, in this way, generating a new pixel is called mapping.

Accordingly, following estimating the actual world 1 signals, the actual world estimating unit 4102 generates (maps) a new pixel from the estimated actual world 1 signals, at the position where the pixel of interest of the input image (the pixel used as the pixel of interest in the case of the actual world 1 being estimated) was situated. That is to say, the actual world estimating unit 4102 performs prediction computation of the pixel value of the pixel of interest in the input image, from the estimated actual world 1 signals.

The actual world estimating unit 4102 then computes the difference between the pixel value of the newly-mapped pixel (the pixel value of the pixel of interest of the input image that has been predicted) and the pixel value of the pixel of interest of the actual input image. This difference is called mapping error.

By computing the mapping error (estimation error), the actual world estimating unit 4102 can thus supply the computed mapping error (estimation error) to the region detecting unit 4111 as region identifying information.

While the processing for region detection which the region detecting unit 4111 performs is not particularly restricted, as described above, in the event of the actual world estimating unit 4102 supplying the above-described mapping error (estimation error) to the region detecting unit 4111 as region identifying information for example, the pixel of interest of the input image is detected as being a continuity region in the event that the supplied mapping error (estimation error) is smaller than a predetermined threshold value, and on the other hand, the pixel of interest of the input image is detected as being a non-continuity region in the event that the supplied mapping error (estimation error) is equal to or greater than a predetermined threshold value.

Other configurations are basically the same as shown in FIG. 315. That is to say, the signal processing device to which the second hybrid method is applied (FIG. 321) is also provided with the data continuity detecting unit 4101, actual world estimating unit 4102, image generating unit 4103, image generating unit 4104, and continuity region detecting unit 4105 (region detecting unit 4111 and selector 4112), which have basically the same configurations and functions as those of the signal processing device (FIG. 315) to which the first hybrid method is applied.

FIG. 322 is a flowchart describing the processing of the signal processing device of the configuration shown in FIG. 321 (signal processing of the second hybrid method).

The signal processing of the second hybrid method is similar to the signal processing of the first hybrid method (the processing shown in the flowchart in FIG. 318). Accordingly, here, explanation of processing described with regard to the first hybrid method will be omitted as suitable, and description will proceed around the processing according to the second hybrid method which differs from the processing according to the first hybrid method with reference to the flowchart in FIG. 322.

Note that here, as with the case of the first hybrid method, let us say that the data continuity detecting unit 4101 uses the least-square method to compute an angle (an angle between the direction of continuity (spatial direction) at the pixel of interest of the actual world 1 (FIG. 1) signals and the X direction which is one direction in the spatial direction (a direction parallel to a predetermined one side of the detecting elements of the sensor 2 (FIG. 1)), and outputs the computed angle as data continuity information.

However, while the data continuity detecting unit 4101 supplies the region identifying information (e.g., estimated error) to the region detecting unit 4111 in the first hybrid method as described above, with the second hybrid method, the actual world estimating unit 4102 supplies the region identifying information (e.g., estimation error (mapping error)) to the region detecting unit 4111.

Accordingly, with the second hybrid method, the processing of step S4162 is executed as the processing of the data continuity detecting unit 4101. This processing is equivalent to the processing in step S4102 in FIG. 318, in the first hybrid method. That is to say, the data continuity detecting unit 4101 detects an angle corresponding to the direction of continuity, based on the input image, and supplies the detected angle as data continuity information to each of the actual world estimating unit 4102 and image generating unit 4103.

Also, in the second hybrid method, the processing of step S4163 is executed as the processing of the actual world estimating unit 4102. This processing is equivalent to the processing in step S4103 in FIG. 318, in the first hybrid method. That is to say, the actual world estimating unit 4102 estimates the actual world 1 (FIG. 1) signals based on the angle detected by the data continuity detecting unit 4101 at the processing in step S4162, and computes the estimated error of the estimated actual world 1 signals, i.e., mapping error, and supplies this as region identifying information to the region detecting unit 4111.

Other processing is basically the same as the processing of the first hybrid method (the corresponding processing of the processing shown in the flowchart in FIG. 318), so description thereof will be omitted.

Next, a third hybrid method will be described with reference to FIG. 323 and FIG. 324.

FIG. 323 illustrates a configuration example of a signal processing device to which the third hybrid method has been applied.

In FIG. 323, the portions which corresponding to the signal processing device to which the first hybrid method has been applied (FIG. 315) are denoted with corresponding symbols.

In the configuration example in FIG. 315 (the first hybrid method), the continuity region detecting unit 4105 is disposed downstream from the image generating unit 4103 and the image generating unit 4104, but with the configuration example shown in FIG. 323 (third hybrid method), the continuity region detecting unit 4161 corresponding thereto is disposed downstream from a data continuity detecting unit 4101 and upstream from an actual world estimating unit 4102 and image generating unit 4104.

Due to such difference in the layout positions, there is somewhat of a difference between the continuity region detecting unit 4105 in the first hybrid method and the continuity region detecting unit 4161 in the third hybrid method. The continuity detecting unit 4161 will be described mainly around this difference.

The continuity region detecting unit 4161 comprises a region detecting unit 4171 and execution command generating unit 4172. Of these, the region detecting unit 4171 has basically the same configuration and functions as the region detecting unit 4111 (FIG. 315) of the continuity region detecting unit 4105. On the other hand, the functions of the execution command generating unit 4172 are somewhat different to those of the selector 4112 (FIG. 315) of the continuity region detecting unit 4105.

That is to say, as described above, the selector 4112 according to the fist hybrid technique selects one of an image from the image generating unit 4103 and an image from the image generating unit 4104, based on the detection results form the region detecting unit 4111, and outputs the selected image as the output image. In this way, the selector 4112 inputs an image from the image generating unit 4103 and an image from the image generating unit 4104, in addition to the detection results form the region detecting unit 4111, and outputs an output image.

On the other hand, the execution command generating unit 4172 according to the third hybrid method selects whether the image generating unit 4103 or the image generating unit 4104 is to execute processing for generating a new pixel at the pixel of interest of the input image (the pixel which the data continuity detecting unit 4101 has taken as the pixel of interest), based on the detection results of the region detecting unit 4171.

That is to say, in the event that the region detecting unit 4171 supplies detection results to the execution command generating unit 4172 to the effects that the pixel of interest of the input image is a continuity region, the execution command generating unit 4172 selects the image generating unit 4103, and supplies the actual world estimating unit 4102 with a command to start the processing (hereafter, such a command will be referred to as an execution command). The actual world estimating unit 4102 then starts the processing thereof, generates actual world estimation information, and supplies this to the image generating unit 4103. The image generating unit 4103 generates a new image based on the supplied actual world estimation information (data continuity information additionally supplied from the data continuity detecting unit 4101 as necessary), and externally outputs this as an output image.

Conversely, in the event that the region detecting unit 4171 supplies detection results to the execution command generating unit 4172 to the effects that the pixel of interest of the input image is a non-continuity region, the execution command generating unit 4172 selects the image generating unit 4104, and supplies the image generating unit 4104 with an execution command. The image generating unit 4104 then starts the processing, subjects the input image to predetermined image processing (class classification adaptation processing in this case), generates a new image, and externally outputs this as an output image.

Thus, the execution command generating unit 4172 according to the third hybrid method inputs the detection results to the region detecting unit 4171 and outputs execution commands. That is to say, the execution command generating unit 4172 does not input or output images.

Note that the configuration other than the continuity region detecting unit 4161 is basically the same as that in FIG. 315. That is to say, the signal processing device to which the second hybrid method is applied (the signal processing device in FIG. 323) also is provided with the data continuity detecting unit 4101, actual world estimating unit 4102, image generating unit 4103, and image generating unit 4104, having basically the same configurations and functions as the signal processing device to which the first hybrid method is applied (FIG. 315).

However, with the third hybrid method, the actual world estimating unit 4102 and the image generating unit 4104 do not each execute the processing thereof unless an execution command is input from the execution command generating unit 4172.

Now, with the example shown in FIG. 323, the output unit of the image is in units of pixels. Accordingly, though not shown, an image synthesizing unit may be further provided downstream of the image generating unit 4103 and image generating unit 4104 for example, in order to make the output unit to be the entire image of one frame (in order to output all pixels at once).

This image synthesizing unit adds (synthesizes) the pixel values output from the image generating unit 4103 and the image generating unit 4104, and takes the added value as the pixel value of the corresponding pixel. In this case, the one of the image generating unit 4103 and the image generating unit 4104 which has not been supplied with an execution command does not execute the processing thereof, and constantly supplies a predetermined constant value (e.g., 0) to the image synthesizing unit.

The image synthesizing unit repeatedly executes such processing for all pixels, and upon ending processing for all pixels, externally outputs all pixels at once (as one frame of image data).

Next, the signal processing of the signal processing device to which the third hybrid method has been applied (FIG. 323) will be described with reference to the flowchart in FIG. 324.

Note that here, as with the case of the first hybrid method, let us say that the data continuity detecting unit 4101 uses the least-square method to compute an angle (an angle between the direction of continuity (spatial direction) at the position of interest of the actual world 1 (FIG. 1) signals and the X direction which is one direction in the spatial direction (a direction parallel to a predetermined one side of the detecting elements of the sensor 2 (FIG. 1)), and outputs the computed angle as data continuity information.

Let us also say that the data continuity detecting unit 4101 outputs the estimated error calculated (error of least-square) along with calculation of the angle as the region identifying information.

In FIG. 1, upon the signals of the actual world 1 being cast into the sensor 2, the sensor 2 outputs an input image.

In FIG. 323, this input image is input to the image generating unit 4104, and is also input to the data continuity detecting unit 4101 and the actual world estimating unit 4102.

Now, in step S4181 in FIG. 324, the data continuity detecting unit 4101 detects the angle corresponding to the direction of the continuity based on the input image, and also computes the estimated error thereof. The detected angle is supplied to is supplied to each of the actual world estimating unit 4102 and the image generating unit 4103, as data continuity information. Also, the computed estimated error is supplied to the region detecting unit 4171 as region identifying information.

Note that the processing of step S4181 is basically the same as the processing of step S4102 (FIG. 318) described above.

Also, as described above, at this point (unless an execution command is supplied from the execution command generating unit 4172), neither the actual world estimating unit 4102 nor the image generating unit 4103 execute the processing thereof.

In step S4182, the region detecting unit 4171 detects the region of the pixel of interest (the pixel to be taken as the pixel of interest in the case of the data continuity detecting unit 4101 detecting the angle) in the input image, based on the estimated error computed by the data continuity detecting unit 4101 (the supplied region identifying information), and supplies the detection results thereof to the execution command generating unit 4172. Note that the processing in step S4182 is basically the same as the processing of step S4105 (FIG. 318) described above.

Upon the detection results of the region detecting unit 4171 being supplied to the execution command generating unit 4172, in step S4183 the execution command generating unit 4172 determines whether or not the detected region is a continuity region. Note that the processing of step S4183 is basically the same as the processing of step S4106 (FIG. 318) described above.

In step S4183, in the event that determination is made that the detected region is not a continuity region, the execution command generating unit 4172 supplies an execution command to the image generating unit 4104. the image generating unit 4104 then executes "processing for executing class classification adaptation processing" in step S4184, generates a first pixel (HD pixel at the pixel of interest (SD pixel of the input image)), and in step S4185 externally outputs the first pixel generated by the class classification adaptation processing, as an output image.

Note that the processing of step S4184 is basically the same as the processing of step S4101 (FIG. 318) described above. That is to say, the flowchart in FIG. 319 is a flowchart for describing the details of processing in step S4184.

Conversely, in step S4183, in the event that determination is made that the detected region is a continuity region, the execution command generating unit 4172 supplies an execution command to the actual world estimating unit 4102. In step S4186, the actual world estimating unit 4102 then estimates the actual world 1 signals based on the angle detected by the data continuity detecting unit 4101 and the input image. Note that the processing of step S4186 is basically the same as the processing of step S4103 (FIG. 318) described above.

In step S4187, the image generating unit 4103 generates a second pixel (HD pixel) in the detected region (i.e., the pixel of interest (SD pixel) in the input image), based on the actual world 1 signals estimated by the actual world estimating unit 4102, and outputs the second pixel as an output image in step S4188. Note that the processing of step S4187 is basically the same as the processing of step S4104 (FIG. 318) described above.

Upon a first pixel or a second pixel being output as an output image (following processing of step S4185 or step S4188), in step S4189 determination is made regarding whether or not processing has ended for all pixels, and in the event that processing of all pixels has not ended yet, the processing returns to step S4181. That is to say, the processing of steps S4181 through S4189 is repeated until the processing of all pixels is ended.

Then, in step S4189, in the event that determination is made that processing of all pixels has ended, the processing ends.

In this way, in the example of the flowchart in FIG. 324, each time a first pixel (HD pixel) and second pixel (HD pixel) are generated, the first pixel or second pixel are output in pixel increment as an output image.

However, as described above, an arrangement wherein an image synthesizing unit (not shown) is further provided at the furthest downstream portion of the signal processing device having the configuration shown in FIG. 323 (downstream of the image generating unit 4103 and the image generating unit 4104) enables all pixels to be output at once as an output image following processing of all pixels having ended. In this case, the pixel (first pixel or second pixel) is output not externally but to the image synthesizing unit in the processing of step S4185 and step S4188. Then, before the processing in step S4189, processing is added wherein the image synthesizing unit synthesizes the pixel values of the pixels supplied from the image generating unit 4103 and the pixel values of the pixels supplied from the image generating unit 4104, and following the processing of step S4189 for generating pixels of the output image, processing is added wherein the image synthesizing unit outputs all pixels.

Next, a fourth hybrid method will be described with reference to FIG. 325 and FIG. 326.

FIG. 325 illustrates a configuration example of a signal processing device to which the fourth hybrid method has been applied.

In FIG. 325, the portions which corresponding to the signal processing device to which the third hybrid method has been applied (FIG. 323) are denoted with corresponding symbols.

In the configuration example in FIG. 323 (the third hybrid method), the region identifying information is input from the data continuity detecting unit 4101 to the region detecting unit 4171, but with the configuration example shown in FIG. 325 (fourth hybrid method), region identifying information is output from the actual world estimating unit 4102 and input to the region detecting unit 4171.

Other configurations are basically the same as that in FIG. 323. That is to say, the signal processing device to which the fourth hybrid method is applied (the signal processing device in FIG. 325) also is provided with the data continuity detecting unit 4101, actual world estimating unit 4102, image generating unit 4103, image generating unit 4104, and continuity region detecting unit 4161 (region detecting unit 4171 and execution command generating unit 4172) having basically the same configurations and functions as the signal processing device to which the third hybrid method is applied (FIG. 323).

Also, as with the third hybrid method, an arrangement may be made wherein an image synthesizing unit is disposed downstream from the image generating unit 4103 and image generating unit 4104, for example, to output all pixels at once, though not shown in the drawings.

FIG. 326 is a flowchart for describing the signal processing of the signal processing device of the configuration shown in FIG. 325 (signal processing according to the fourth hybrid method).

The signal processing according to the fourth hybrid method is similar to the signal processing according to the third hybrid method (the processing shown in the flowchart in FIG. 324). Accordingly, here, explanation of processing described with regard to the third hybrid method will be omitted as suitable, and description will proceed around the processing according to the fourth hybrid method which differs from the processing according to the third hybrid method, with reference to the flowchart in FIG. 326.

Note that here, as with the case of the third hybrid method, let us say that the data continuity detecting unit 4101 uses the least-square method to compute an angle (an angle between the direction of continuity (spatial direction) at the pixel of interest of the actual world 1 (FIG. 1) signals and the X direction which is one direction in the spatial direction (a direction parallel to a predetermined one side of the detecting elements of the sensor 2 (FIG. 1)), and outputs the computed angle as data continuity information.

However, while the data continuity detecting unit 4101 supplies the region identifying information (e.g., estimated error) to the region detecting unit 4171 in the third hybrid method as described above, with the fourth hybrid method, the actual world estimating unit 4102 supplies the region identifying information (e.g., estimation error (mapping error)) to the region detecting unit 4171.

Accordingly, with the fourth hybrid method, the processing of step S4201 is executed as the processing of the data continuity detecting unit 4101. This processing is equivalent to the processing in step S4181 in FIG. 324, in the third hybrid method. That is to say, the data continuity detecting unit 4101 detects an angle corresponding to the direction of continuity, based on the input image, and supplies the detected angle as data continuity information to each of the actual world estimating unit 4102 and image generating unit 4103.

Also, in the fourth hybrid method, the processing of step S4202 is executed as the processing of the actual world estimating unit 4102 in step S4202. This processing is equivalent to the processing in step S4182 in FIG. 318, in the third hybrid method. That is to say, the actual world estimating unit 4102 estimates the actual world 1 (FIG. 1) signals based on the angle detected by the data continuity detecting unit 4101, and computes the estimated error of the estimated actual world 1 signals, i.e., mapping error, and supplies this as region identifying information to the region detecting unit 4171.

Other processing is basically the same as the processing of the third hybrid method (the corresponding processing of the processing shown in FIG. 324), so description thereof will be omitted.

Next, a fifth hybrid method will be described with reference to FIG. 327 and FIG. 328.

FIG. 327 illustrates a configuration example of a signal processing device to which the fifth hybrid method has been applied.

In FIG. 327, the portions which corresponding to the signal processing devices to which the third and fourth hybrid methods have been applied (FIG. 323 and FIG. 325) are denoted with corresponding symbols.

In the configuration example shown in FIG. 323 (third hybrid method), one continuity region detecting unit 4161 is disposed downstream of the data continuity detecting unit 4101 and upstream of the actual world estimating unit 4102 and image generating unit 4104.

Also, in the configuration example shown in FIG. 325 (fourth hybrid method), one continuity region detecting unit 4161 is disposed downstream of the actual world estimating unit 4102 and upstream of the image generating unit 4103 and image generating unit 4104.

Conversely, with the configuration example shown in FIG. 327 (fifth hybrid method), the continuity region detecting until 4181 is disposed downstream form the data continuity detecting unit 4101 but upstream from the actual world estimating unit 4102 and the image generating unit 4101, as with the third hybrid method. Further, as with the fourth hybrid method, a continuity region detecting unit 4182 is disposed downstream from the actual world estimating unit 4102 but upstream from the image generating unit 4103 and the image generating unit 4104.

The continuity region detecting unit 4181 and continuity region detecting unit 4182 both basically have basically the same configurations and functions as the continuity region detecting unit 4161 (FIG. 323 or FIG. 325). That is to say, both the region detecting unit 4191 and region detecting unit 4201 have basically the same configuration and functions as the region detecting unit 4171.

Restated, the fifth hybrid method is a combination of the third hybrid method and the fourth hybrid method.

That is to say, with the third hybrid method and the fourth hybrid method, whether the pixel of interest of an input image is a continuity region or a non-continuity region is determined based on one region identifying information (in the case of the third hybrid method, the region identifying information from the data continuity detecting unit 4101, and in the case of the fourth hybrid method, the region identifying information from the actual world estimating unit 4102). Accordingly, the third hybrid method and the fourth hybrid method could detect a region to be a continuity region even though it should be a non-continuity region.

Accordingly, with the fifth hybrid method, following detection of whether the pixel of interest of an input image is a continuity region or a non-continuity region, based on region identifying information from the data continuity detecting unit 4101 (this will be called first region identifying information in the description of the fifth hybrid method), further detection is made regarding whether the pixel of interest of an input image is a continuity region or a non-continuity region, based on region identifying information from the actual world estimating unit 4102 (this will be called second region identifying information in the description of the fifth hybrid method).

In this way, with the fifth hybrid method, processing for region detection is performed twice, so precision of detection of the continuity region improves over that of the third hybrid method and the fourth hybrid method. Further, with the first hybrid method and the second hybrid method as well, only one continuity region detecting unit 4105 (FIG. 315 or FIG. 321) is provided, as with the case of the third hybrid method and the fourth hybrid method. Accordingly, the detection precision of the continuity region improves in comparison with the first hybrid method and the second hybrid method as well. Consequently, output of image data closer to signals of the actual world 1 (FIG. 1) than any of the first through fourth hybrid methods can be realized.

However, it remains unchanged that even the first through fourth hybrid methods use both the image generating unit 4104 which performs conventional image processing, and devices or programs and the like for generating image using data continuity, to which the present invention is applied (i.e., the data continuity detecting unit 4101, actual world estimating unit 4102, and image generating unit 4103).

Accordingly, the first through fourth hybrid methods are capable of outputting image data closer to signals of the actual world 1 (FIG. 1) than any of conventional signal processing devices or the signal processing according to the present invention with the configuration shown in FIG. 3.

On the other hand, from the perspective of processing speed, region detection processing is required only once with the first through fourth hybrid methods, and accordingly these are superior to the fifth hybrid methods which performs region detection processing twice.

Accordingly, the user (or manufacture) or the like can selectively use a hybrid method which meets the quality of the output image required, and the required processing time (the time until the output image is output).

Note that other configurations in FIG. 327 are basically the same as those in FIG. 323 or FIG. 325. That is to say, the signal processing device to which the fifth hybrid method has been applied (FIG. 327) is provided with the data continuity detecting unit 4101, actual world estimating unit 4102, image generating unit 4103, and image generating unit 4104, having basically the same configurations and functions as with the signal processing devices to which the third or fourth hybrid methods have been applied (FIG. 323 or FIG. 325).

However, with the fifth hybrid method, the actual world estimating unit 4102 does not execute the processing thereof unless an execution command is input from the execution command generating unit 4192, the image generating unit 4103 does not unless an execution command is input from the execution command generating unit 4202, and the image generating unit 4104 does not unless an execution command is input from the execution command generating unit 4192 or the execution command generating unit 4202.

Also, in the fifth hybrid method as well, as with the third or fourth hybrid methods, an arrangement may be made wherein an image synthesizing unit is disposed downstream from the image generating unit 4103 and image generating unit 4104 to output all pixels at once, for example, though not shown in the drawings.

Next, the signal processing of the signal processing device to which the fifth hybrid method has been applied (FIG. 327) will be described with reference to the flowchart in FIG. 328.

Note that here, as with the case of the third and fourth hybrid methods, let us say that the data continuity detecting unit 4101 uses the least-square method to compute an angle (an angle between the direction of continuity (spatial direction) at the position of interest of the actual world 1 (FIG. 1) signals and the X direction which is one direction in the spatial direction (a direction parallel to a predetermined one side of the detecting elements of the sensor 2 (FIG. 1)), and outputs the computed angle as data continuity information.

Let us also say here that the data continuity detecting unit 4101 outputs the estimated error calculated (error of least-square) along with calculation of the angle as first region identifying information, as with the case of the third hybrid method.

Let us further say that the actual world estimating unit 4102 outputs mapping error (estimation error) as second region identifying information, as with the case of the fourth hybrid method.

In FIG. 1, upon the signals of the actual world 1 being cast into the sensor 2, the sensor 2 outputs an input image.

In FIG. 327, this input image is input to the image generating unit 4104, and is also input to the data continuity detecting unit 4101, actual world estimating unit 4102, image generating unit 4103, and image generating unit 4104.

Now, in step S4221 in FIG. 328, the data continuity detecting unit 4101 detects the angle corresponding to the direction of the continuity based on the input image, and also computes the estimated error thereof. The detected angle is supplied to is supplied to each of the actual world estimating unit 4102 and the image generating unit 4103, as data continuity information. Also, the computed estimated error is supplied to the region detecting unit 4191 as first region identifying information.

Note that the processing of step S4221 is basically the same as the processing of step S4181 (FIG. 324) described above.

Also, as described above, at the current point, unless an execution command is supplied from the execution command generating unit 4192), neither the actual world estimating unit 4102 nor the image generating unit 4104 perform the processing thereof.

In step S4222, the region detecting unit 4191 detects the region of the pixel of interest (the pixel to be taken as the pixel of interest in the case of the data continuity detecting unit 4101 detecting the angle) in the input image, based on the estimated error computed by the data continuity detecting unit 4101 (the supplied first region identifying information), and supplies the detection results thereof to the execution command generating unit 4192. Note that the processing in step S4222 is basically the same as the processing of step S4182 (FIG. 324) described above.

Upon the detection results of the region detecting unit 4181 being supplied to the execution command generating unit 4192, in step S4223 the execution command generating unit 4192 determines whether or not the detected region is a continuity region. Note that the processing of step S4223 is basically the same as the processing of step S4183 (FIG. 324) described above.

In step S4223, in the event that determination is made that the detected region is not a continuity region (is a non-continuity region), the execution command generating unit 4192 supplies an execution command to the image generating unit 4104. The image generating unit 4104 then executes "processing for executing class classification adaptation processing" in step S4224, generates a first pixel (HD pixel at the pixel of interest (SD pixel of the input image)), and in step S4225 externally outputs the first pixel generated by the class classification adaptation processing, as an output image.

Note that the processing of step S4224 is basically the same as the processing of step S4184 (FIG. 324) described above. That is to say, the flowchart in FIG. 319 is also a flowchart for describing the details of processing in step S4186. Also, the processing of step S4225 is basically the same as the processing of step S4185 (FIG. 324) described above.

Conversely, in step S4223, in the event that determination is made that the detected region is a continuity region, the execution command generating unit 4192 supplies an execution command to the actual world estimating unit 4102. In step S4226, the actual world estimating unit 4102 then estimates the actual world 1 signals based on the angle detected by the data continuity detecting unit 4101 and the input image in the processing of step S4221, and also computes the estimation error (mapping error) thereof. The estimated actual world 1 signals are supplied to the image generating unit 4103 as actual world estimation information. Also, the computed estimation error is supplied to the region detecting unit 4201 as second region identifying information.

Note that the processing of step S4226 is basically the same as the processing of step S4202 (FIG. 326) described above.

Also, as described above, at this point (unless an execution command is supplied from the execution command generating unit 4192 or the execution command generating unit 4202), neither the image generating unit 4103 nor the image generating unit 4104 execute the processing thereof.

In step S4227, the region detecting unit 4201 detects the region of the pixel of interest (the pixel to be taken as the pixel of interest in the case of the data continuity detecting unit 4101 detecting the angle) in the input image, based on the estimated error computed by the data continuity detecting unit 4101 (the supplied second region identifying information), and supplies the detection results thereof to the execution command generating unit 4202. Note that the processing in step S4227 is basically the same as the processing of step S4203 (FIG. 326) described above.

Upon the detection results of the region detecting unit 4201 being supplied to the execution command generating unit 4202, in step S4228 the execution command generating unit 4202 determines whether or not the detected region is a continuity region. Note that the processing of step S4228 is basically the same as the processing of step S4204 (FIG. 326) described above.

In step S4228, in the event that determination is made that the detected region is not a continuity region (is a non-continuity region), the execution command generating unit 4202 supplies an execution command to the image generating unit 4104. The image generating unit 4104 then executes "processing for executing class classification adaptation processing" in step S4224, generates a first pixel (HD pixel at the pixel of interest (SD pixel of the input image)), and in step S4225 externally outputs the first pixel generated by the class classification adaptation processing, as an output image.

Note that the processing of step S4224 here is basically the same as the processing of step S4205 (FIG. 326) described above. Also, the processing of step S4225 here is basically the same as the processing of step S4206 (FIG. 326) described above.

Conversely, in step S4228, in the event that determination is made that the detected region is a continuity region, the execution command generating unit 4202 supplies an execution command to the image generating unit 4103. In step S4229, the image generating unit 4103 then generates a second pixel (HD pixel) in the region detected by the region detecting unit 4201 (i.e., the pixel of interest (SD pixel) in the input image), based on the actual world 1 signals estimated by the actual world estimating unit 4102 (and data continuity signals from the data continuity detecting unit 4101 as necessary). Then, in step S4230, the image generating unit 4103 externally outputs the generated second pixel as an output image.

Note that the processing of steps S4229 and S4230 is each basically the same as the processing of each of steps S4207 and S4208 (FIG. 326) described above.

Upon a first pixel or a second pixel being output as an output image (following processing of step S4225 or step S4230), in step S4231 determination is made regarding whether or not processing has ended for all pixels, and in the event that processing of all pixels has not ended yet, the processing returns to step S4221. That is to say, the processing of steps S4221 through S4231 is repeated until the processing of all pixels is ended.

Then, in step S4231, in the event that determination is made that processing of all pixels has ended, the processing ends.

The hybrid method has been described so far as an example of an embodiment of the signal processing device 4 (FIG. 1) according to the present invention, with reference to FIG. 315 through FIG. 328.

As described above, with the hybrid method, another device (or program or the like) which performs signal processing without using continuity is further added to the signal processing device according to the present invention having the configuration shown in FIG. 3.

In other words, with the hybrid method, the signal processing device (or program or the like) according to the present invention having the configuration shown in FIG. 3 is added to a conventional signal processing device (or program or the like).

That is to say, with the hybrid method, the continuity region detecting unit 4105 shown in FIG. 315 or FIG. 321 for example, detects data regions having data continuity of image data (e.g., the continuity region described in step S4106 in FIG. 318 or step S4166 in FIG. 322) within image data wherein light signals of the actual world 1 have been projected and a part of the continuity of the light signals of the actual world 1 has been lost (e.g., the input image in FIG. 315 or FIG. 321).

Also, the actual world estimating unit 4102 shown in FIG. 315 and FIG. 321 estimates the light signals by estimating the lost continuity of the light signals of the actual world 1, based on the data continuity of the image data of which a part of the continuity of the light signals of the actual world 1 has been lost.

Further, the data continuity detecting unit 4101 shown in FIG. 315 and FIG. 321 detects the angle of the data continuity of the image data as to a reference axis (for example, the angle described in step S4102 in FIG. 318 and step S4162 in FIG. 322), within image data wherein light signals of the actual world 1 have been projected and a part of the continuity of the light signals of the actual world 1 has been lost. In this case, for example, the continuity region detecting unit 4105 shown in FIG. 315 and FIG. 321 detects regions in the image data having data continuity based on the angle, and the actual world estimating unit 4102 estimates the light signals by estimating the continuity of the light signals of the actual world 1 that has been lost, with regard to that region.

However, in FIG. 315, the continuity region detecting unit 4105 detects regions of the input image having data continuity based on the error between a model having continuity following the angle, and the input image (that is, estimation error which is the region identifying information in the drawing, computed by the processing in step S4102 of FIG. 318).

Conversely, in FIG. 321, the continuity region detecting unit 4105 is disposed downstream from the actual world estimating unit 4102, and selectively outputs (e.g., the selector 4112 in FIG. 321 executes the processing of steps S4166 through S4168 in FIG. 322) an actual world model estimated by the actual world estimating unit 4102, based on error between an actual world model representing light signals of the actual world 1 corresponding to the input image computed by the actual world estimating unit 4102 and the input image (i.e., estimation error (mapping error) of actual world signals computed by the processing in step S4163 in FIG. 318, which is region identifying information in the drawing, for example), i.e., outputs an image output from the image generating unit 4103.

While the above description has been made with the example of FIG. 315 and FIG. 321, the same is true for FIG. 323, FIG. 325, and FIG. 327.

Accordingly, with the hybrid method, a device (or program or the like) corresponding to the signal processing device of the configuration shown in FIG. 3 executes signal processing for portions of the actual world 1 signals where continuity exists (regions of the image data having data continuity), and a conventional signal processing device (or program or the like) can execute signal processing for portions of the actual world 1 signals where there is no clear continuity. As a result, output of image data closer to signals of the actual world (FIG. 1) than either of conventional signal processing devices and the signal processing according to the present invention of the configuration shown in FIG. 3 can be realized.

Next, an example of directly generating an image from the data continuity detecting unit 101 will be described with reference to FIG. 329 and FIG. 330.

The data continuity detecting unit 101 shown in FIG. 329 is the data continuity detecting unit 101 shown in FIG. 165 with an image generating unit 4501 added thereto. The image generating unit 4501 acquires as actual world estimation information a coefficient of the actual world approximation function f(x) output from the actual world estimating unit 802, and generates and outputs an image by reintegration of each pixel based on this coefficient.

Next, the data continuity detection processing in FIG. 329 will be described with reference to the flowchart shown in FIG. 330. Note that the processing in steps S4501 through S4504 and steps S4506 through S4511 of the flowchart in FIG. 330 is the same as the processing in steps S801 through S810 in FIG. 166, so description thereof will be omitted.

In step S4504, the image generating unit 4501 reintegrates each of the pixels based on the coefficient input form the actual world estimating unit 802, and generates and outputs an image.

Due to the above processing, the data continuity detecting unit 101 can output not only region information built also an image used for the region determination (made up of pixels generated based on the actual world estimation information).

Thus, with the data continuity detecting unit 101 shown in FIG. 329, the image generating unit 4501 is provided. That is to say, the data continuity detecting unit 101 in FIG. 329 can generate output images based on the data continuity of the input image. Accordingly, a device having the configuration shown in FIG. 329 can be interpreted to be another embodiment of the signal processing device (image processing device) 4 shown in FIG. 1, rather than being interpreted as an embodiment of the data continuity detecting unit 101.

Further, with the signal processing device to which the above-described hybrid method is applied, a device having the configuration shown in FIG. 329 (i.e., a signal processing device having the same functions and configuration as the data continuity detecting unit 101 in FIG. 329) can be applied as the signal processing unit for subjecting the portions of the signals of the actual world 1 where continuity exists, to signal processing.

Specifically, for example, with the signal processing device shown in FIG. 315 to which the first hybrid method is applied, the signal processing unit for subjecting the portions of the signals of the actual world 1 where continuity exists, to signal processing, is the data continuity detecting unit 4101, actual world estimating unit 4102, and image generating unit 4103. While not shown in the drawings, the signal processing device (image processing device) of the configuration shown in FIG. 329 may be applied instead of these data continuity detecting unit 4101, actual world estimating unit 4102, and image generating unit 4103. In this case, the comparing unit 804 in FIG. 329 supplies the output thereof as region identifying information to the region detecting unit 4111, and the image generating unit 4501 supplies the output image (second pixels) to the selector 4112.

With the above description, an example wherein the actual world is estimated by processing image data acquired by the sensor 2 employing integration effects when processing an image, thereby performing image processing adapted to meet the actual world has been described.

However, light signals, which are cast upon the sensor 2, are actually cast via an optical system made up of a lens or the like provided immediately prior to the sensor 2. Accordingly, it is necessary to consider influence due to the optical system when processing the image by estimating the actual world from the image acquired by the sensor 2.

FIG. 331 is a diagram illustrating an example of the configuration of an optical system (optical block 5110) provided at the previous stage of the sensor 2.

An actual world light signal is cast upon an IR cut filter 5102 via a lens 5101 of the optical block 5110. The IR cut filter removes light components in an infrared region, of light frequency components, which can be received by a CCD 5104 (corresponding to the sensor 2). According to this processing, unnecessary light, which cannot be recognized by the human eyes, is removed. Further, the light signal is cast upon an OLPF (Optical Low Pass Filter) 5103 following passing through the IR cut filter 5102.

The OLPF 5103 subjects a high-frequency light signal, which changes in a range of the pixel area or less of the CCD 5104, to smoothing to reduce the irregularities of the amount of light being cast upon within the area of one pixel of the CCD 5104.

Accordingly, in order to consider the influence due to the optical block 5110, it is necessary to consider the influence due to the processing performed by the IR cut filter 5102 and the OLPF 5103 respectively. Incidentally, this IR cut filter 5102 and the OLPF 5103 make up an integral-type filter 5112 as shown in FIG. 332, and accordingly, mounting and detaching thereof is sometimes performed in an integral manner. Also, the influence due to the IR cut filter 5102 can be suppressed by providing a filter 5111 which passes through short-wave light alone for example, as shown in FIG. 332.

Now, description will be made regarding image processing, which takes the influence due to the OLPF 5103 into consideration.

The OLPF 5103 is, as shown in FIG. 333, provided with two liquid crystals 5121*a* and 5121*b*, and a phase plate 5122 such as sandwiched by the two liquid crystals 5121*a* and 5121*b*.

The liquid crystal plates 5121*a* and 5121*b*, as shown in FIG. 334, each of which thickness is t, are set with a crystal axis having a predetermined angle as to the approach direction of light. Upon light with this angle being cast upon the liquid crystal plate 5121*a* in the z direction, the incident light is decomposed into a normal ray in the same direction as the incident light and an abnormal ray with a predetermined angle as to the incident light respectively, and are emitted to the crystal 5121*b* of the subsequent stage with a certain interval d (in the x direction). At this time, the liquid crystal plate 5121*a* extracts two types of light having a different-angle waveform, which are mutually different 90 degrees, and emits these two types of light as a normal ray (e.g., waveform in the y direction) L1 and an abnormal ray L2 (e.g., waveform in the x direction).

The phase plate 5122 (not shown in FIG. 334) allows each of the waveform of a normal ray and abnormal ray to pass through, and also generates light having a waveform perpendicular to the waveform thereof to emit this to the liquid crystal plate 5121*b*. That is to say, in this case, the phase plate 5122 allows the waveform of the incident normal ray to pass through and also generates a waveform in the x direction since the incident normal ray has a waveform in the y direction, and on the other hand, with regard to an abnormal ray, the phase plate 5122 allows the incident abnormal ray itself to pass through and also generates a waveform in the y direction different from the waveform thereof 90 degrees since the incident abnormal ray has a waveform in the x direction when being cast thereupon, and emits both rays to the crystal plate 5121*b*.

The crystal plate 5121*b* decomposes each of the incident normal ray L1 and abnormal ray L2 into normal rays and abnormal rays (L1 and L3, and L2 and L4) at the incident positions, output these such that the mutual distance becomes d. As a result, as shown in FIG. 335, for example, the light L1 cast from the backside of a paper is decomposed into light L1 and L2 by the liquid crystal 5121*a* respectively, and further, decomposed into L1 and L3, and L2 and L4 by the liquid crystal 5121*b* respectively. Note that at this time, light energy is decomposed into a half at one time decomposition, and accordingly, the OLPF 5103 outputs the incident light while dispersing the incident light into positions apart by a distance d (referred to as OLPF amount-of-movement d as well) with a proportion of 25% in the horizontal direction and in the vertical direction. As a result, light for the worth of different four pixels, which are superimposed by 25% respectively, is received at each pixel of the CCD 5104, and converted into pixel values, thereby generating image data.

This OLPF amount-of-movement d is obtained with the following Expression (248).

$$d=t\times(n_e^2-n_o^2)/(2\times n_e\times n_o) \tag{248}$$

Note that the OLPF 5103 is not restricted to dispersing the incident light into four pixels as described above, rather, may disperse the incident light into the number of pixels other than that using a greater number of crystals.

Thus, the incident light cast upon the sensor 2 is changed from that in the actual world by the optical block 5110. Now, description will be made regarding the processing of image data, which takes the properties of the above optical block 5110 into consideration (particularly takes the properties of the OLPF 5103 into consideration, here).

FIG. 336 is a block diagram illustrating the configuration of a signal processing device, which is configured so as to process image data taking the properties of the above optical block 5110 into consideration. Note that the components having the same configurations as those described with reference to FIG. 3 are appended with the same reference numerals, and the description thereof is omitted as appropriate.

An OLPF removing unit 5131, which particularly takes the properties of the OLPF 5103, of the above optical block 5110 included in the input image into consideration, converts (estimates) the input image into an image which is to be cast upon the optical block 5110, and outputs the converted image to the data continuity detecting unit 102 and the actual world estimating unit 102.

Next, description will be made regarding the configuration of the OLPF removing unit 5131 shown in FIG. 336 with reference to FIG. 337.

A class tap extracting unit 5141 extracts the pixel values of multiple pixels (e.g., nine pixels in total, which are adjacent to the horizontal direction, vertical direction, or upper/lower/left/right oblique direction, including the pixel of interest, such as shown in FIG. 338. Note that in FIG. 338, the pixel of interest is represented with a double circle, and the other pixels are represented with a circle) in positions corresponding to the pixels of the input image data as class taps, and outputs these to the features computing unit 5142.

The features computing unit 5142 computes features based on the pixel values of a class tap input from the class tap extracting unit 5141, and outputs the result to a class classification unit 5143. For example, examples of the features include the sum of the pixel values of the pixels of a class tap, and the sum of difference between adjacent pixels.

The class classification unit 5143 determines the class (class code) of each pixel based on features input from the features computing unit 5142, extracts the determined class information to a prediction tap extracting unit 5145, and also controls coefficient memory 5144 to supply the prediction coefficient corresponding to the determined class to a pixel value computing unit 5146. This class is, in the event that features are the sum of adjacent pixels for example, set according to a range of the value to become the sum thereof. For example, a class code is set such that class 1 in the event that the sum thereof is 0 through 10, and class 2 in the event that the sum thereof is 11 through 20.

The prediction coefficient for each class code based on features, which is stored in the coefficient memory 5144, is computed by learning processing using a later-described learning device 5150 beforehand with reference to FIG. 341, and stored.

The prediction tap extracting unit 5145 extracts the pixel values of multiple pixels serving as a prediction tap (sometimes identical to a class tap) corresponding to the pixel of interest in the input image based on the class information input from the class classification unit 5143, and outputs the extracted pixel values to the pixel value computing unit 5146. Prediction taps are set for each class, for example, the pixel of interest alone in the case of class 1, 3 pixels×3 pixels centered on the pixel of interest in the case of class 2, and 5 pixels×5 pixels centered on the pixel of interest in the case of class 3.

The pixel value computing unit 5146 computes the pixel values based on the pixel values of the pixels serving as a prediction tap input from the prediction tap extracting unit 5145, and the prediction coefficient value supplied from the coefficient memory 5144, generates an output image based on the computed pixel values, and outputs this. The pixel value computing unit 5146 obtains (predicts and estimates) the pixels of a predicted image by executing a product arithmetic operation shown in the following Expression (249), for example.

$$q' = \sum_{i=0}^{n} d_i \times c_i \tag{249}$$

In Expression (249), q' represents the pixel of the predicted image (an image predicted from a student image). Each of $c_i$ (i represents an integer value of 1 through n) represents the corresponding prediction tap. On the other hand, each of $d_i$ represents the corresponding prediction coefficient.

As described above, the OLPF removing unit 5131 predicts and estimates an image obtained by removing the influence due to the OLPF as to the input image from the input image.

Next, description will be made regarding signal processing by the signal processing device described with reference to FIG. 336, with reference to the flowchart in FIG. 339. Note that the processing of steps S5102 through S5104 in the flowchart shown in FIG. 339 is the same as the processing described with reference to the flowchart in FIG. 40, so description thereof will be omitted.

In step S5101, the OLPF removing unit 5131 executes the processing for removing OLPF.

Now, the processing for removing OLPF will be described with reference to the flowchart in FIG. 340.

In step S5011, the class tap extracting unit 5141 extracts a class tap regarding each pixel of the input image, and outputs the pixel values of the pixels of the extracted class tap to the features computing unit 5142.

In step S5012, the features computing unit 5142 computes predetermined features based on the pixel values of the pixels of the class tap input from the class tap extracting unit 5141, and outputs these to the class classification unit 5143.

In step S5013, the class classification unit 5143 classifies a class based on the features input from the features computing unit 5142, and output the classified class code to the prediction tap extracting unit 5145.

In step S5014, the prediction tap extracting unit 5145 extracts the pixel values of multiple pixels serving as a prediction tap from the input image based on the class code information input from the class classification unit 5143, and outputs the extracted pixel values to the pixel value computing unit 5146.

In step S5015, the class classification unit 5143 controls the coefficient memory 5144 to read out the corresponding prediction coefficient according to the classified class (class code) to the pixel value computing unit 5146.

In step S5016, the pixel value computing unit 5146 computes pixel values based on the pixel values of the pixels serving as a prediction tap input from the prediction tap extracting unit 5145, and the prediction coefficient supplied from the coefficient memory 5144.

In step S5017, the pixel value extracting unit 5146 determines regarding whether or not the pixel values regarding all of the pixels have been computed, and in the event that determination is made that the pixel values regarding all of the pixels have not been computed, the processing returns to step S5011. That is to say, the processing of steps S5011 through S5017 is repeated until determination is made that the pixel values regarding all of the pixels have been computed.

In step S5017, in the event that determination is made that the pixel values regarding all of the pixels have been computed, the pixel value computing unit 5146 outputs the computed image.

According to the above arrangement, it becomes possible to remove the influence as to the image generated by the OLPF 5103 generated by the optical block 5110.

Next, description will be made regarding the learning device 5150 which learns prediction coefficients to be stored in the coefficient memory 5144 shown in FIG. 337 beforehand with reference to FIG. 341.

The learning device 5150 generates a student image and a tutor image, which are made up of an image with the standard resolution, using a high-resolution image serving as an input image, and executes learning processing. Note that images with the standard resolution will be referred to as "SD (Standard Definition) image" hereafter as appropriate. Also, pixels forming the SD image will be referred to as "SD pixels" as appropriate. Alternately, on the other hand, high-resolution images will be referred to as "HD (High Definition) image" hereafter as appropriate. Also, pixels forming the HD image will be referred to as "HD pixels" as appropriate.

Further, a class tap extracting unit 5162, features computing unit 5163, and prediction tap extracting unit 5165 of a learning unit 5152 are the same as the class tap extracting unit 5141, features computing unit 5142, and prediction tap extracting unit 5145 of the OLPF removing unit 5131 shown in FIG. 337, so description thereof will be omitted.

A student image generating unit 5151 converts an HD image serving as an input image into an SD image taking the OLPF 5103 into consideration, generates a student image optically influenced by the OLPF 5103, and outputs this to image memory 5161 of the learning unit 5152.

The image memory 5161 at the learning unit 5152 temporarily stores the student image made up of the SD image, and then outputs this to the class tap extracting unit 5162, and the prediction tap extracting unit 5165.

The class classification unit 5164 outputs the classified result (class code described above) of a class for each pixel input from the features extracting unit 5163 to the prediction tap extracting unit 5165, and learning memory 5167.

A supplementing computing unit 5166 generates the summation term of each term necessary for generating a later-described normal equation from the pixel values of the pixels of a prediction tap input from the prediction tap extracting unit 5165 and the pixel values of the pixels of an image input from a tutor image generating unit 5153 with supplement, and outputs this to the learning memory 5167.

The learning memory 5167 stores a class code supplied from the class classification unit 5164 and the supplemented result input from the supplementing computing unit 5166, which are correlated with each other, and supplies these to a normal equation computing unit 5168 as appropriate.

The normal equation computing unit 5168 generates a normal equation based on the class codes stored in the learning memory 5167 and the supplemented result, and also computes the normal equation to obtain each prediction coefficient, and then stores each obtained prediction coefficient, which is correlated with the corresponding class code in the coefficient memory 5154. Note that the prediction coefficient stored in this coefficient memory 5154 is to be stored in the coefficient memory of the OLPF removing unit 5131 shown in FIG. 337.

Description will be made more in detail regarding the normal equation computing unit 5168.

In the above Expression (249), each of the prediction coefficients $d_i$ is undetermined before learning. The learning processing is performed by inputting the multiple pixels of the tutor image for each class code. If we say that there are m pixels of the tutor image corresponding to a certain class code, and each of the m pixels of the tutor image is described as $q_k$ (k represents an integer value of 1 through m), the following Expression (250) is introduced from the Expression (249).

$$q_k = \sum_{i=0}^{n} d_i \times c_{ik} + e_k \tag{250}$$

That is to say, the Expression (250) indicates that the pixel $q_k$ of a certain tutor image can be predicted and estimated by computing the right side thereof. Note that in Expression (250), $e_k$ represents an error. That is to say, the pixel $q_k'$ of the predicted image (image obtained by performing prediction computation from a student image) serving as computation results obtained by computing the right side does not exactly match the actual pixel $q_k$ of the tutor image, but contains a certain error $e_k$.

Accordingly, in Expression (250), the prediction coefficients $d_i$ which exhibit the minimum of the sum of the squares of errors $e_k$ should be obtained by the learning processing, for example.

Specifically, the number of the pixels $q_k$ of the tutor image prepared for the learning processing should be greater than n (i.e., m>n). In this case, the prediction coefficients $d_i$ are determined as a unique solution using the least square method.

That is to say, the normal equations for obtaining the prediction coefficients $d_i$ in the right side of the Expression (250) using the least square method are represented by the following Expression (251).

$$\begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \begin{bmatrix} d_1 \\ d_2 \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \tag{251}$$

Accordingly, the normal equations represented by the Expression (251) are created and solved, thereby determining the prediction coefficients $d_i$ as a unique solution.

Specifically, let us say that the matrices in the Expression (251) representing the normal equations are defined as the following Expressions (252) through (254). In this case, the normal equations are represented by the following Expression (255).

$$C_{MAT} = \begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & \ddots & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \tag{252}$$

$$D_{MAT} = \begin{bmatrix} d_1 \\ d_2 \\ \vdots \\ d_n \end{bmatrix} \tag{253}$$

-continued $$Q_{MAT} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \tag{254}$$

$$C_{MAT} D_{MAT} = Q_{MAT} \tag{255}$$

As shown in Expression (253), each component of the matrix $D_{MAT}$ is the prediction coefficient $d_i$ which is to be obtained. Accordingly, in Expression (255), in the event that the matrix $C_{MAT}$ in the left side and the matrix $Q_{MAT}$ in the right side are determined, the matrix $D_{MAT}$ (i.e., the prediction coefficients $d_i$) can be obtained using matrix computation.

More specifically, as shown in Expression (252), each component of the matrix $C_{MAT}$ can be computed as long as the prediction tap $c_{ik}$ is known. With the present embodiment, the prediction tap $c_{ik}$ is extracted by the prediction tap extracting unit 5165, whereby the supplementing computing unit 5166 can supplement each component of the matrix $C_{MAT}$ using the prediction tap $c_{ik}$ supplied from the prediction tap extracting unit 5165.

Also, with the present embodiment, each component of the matrix $Q_{MAT}$ can be computed as shown in Expression (254) as long as the prediction tap $C_{ik}$ and the pixel $q_k$ of the tutor image are known. Note that the prediction tap $C_{ik}$ is the same as that included in each component of the matrix $C_{MAT}$, and the pixel $q_k$ of the tutor image is the SD pixel of the tutor image corresponding to the pixel of interest (SD pixel of the student image). Accordingly, the supplementing computing unit 5166 can supplement each component of the matrix $Q_{MAT}$ based upon the prediction tap $c_{ik}$ supplied from the prediction tap extracting unit 5165 and the tutor image.

Thus, the supplementing computing unit 5166 computes each component of the matrix $C_{MAT}$ and the matrix $Q_{MAT}$, correlates the computed result with the corresponding class code, and stores this in the learning memory 5167.

The normal equation computing unit 5168 generates a normal equation corresponding to the class codes stored in the learning memory 5167, and computes the prediction coefficient $d_i$ serving as each component of the matrix $D_{MAT}$ in the above Expression (255).

Specifically, the above Expression (255) can be transformed into the following Expression (256).

$$D_{MAT} = C_{MAT}^{-1} Q_{MAT} \tag{256}$$

In Expression (256), each component of the matrix $D_{MAT}$ in the left side is the prediction coefficient $d_i$ which is to be obtained. On the other hand, each component of the matrix $C_{MAT}$ and the matrix $Q_{MAT}$ is supplied from the learning memory 5167. With the present embodiment, upon reception of each component of the matrix $C_{MAT}$ and the matrix $Q_{MAT}$ corresponding to a certain class code stored in the learning memory 5167, the normal equation computing unit 5168 executes the matrix computation represented by the right side of Expression (255), thereby computing the matrix $D_{MAT}$. Then, the normal equation computing unit 5168 stores the computation results (prediction coefficient $d_i$) in the coefficient memory 5154 in association with the class code.

Next, description will be made regarding a student image and tutor image employed for learning based on the relationship between the OLPF removing unit 5131 and learning unit 5131 in FIG. 337 described above.

As shown in FIG. 342, the learning unit 5152 obtains a prediction coefficient by learning using an image subjected to filter processing by the OLPF 5103 (hereafter, referred to as image with OLPF) and an image not subjected to filter processing (hereafter, referred to as image without OLPF).

The OLPF removing unit 5131 converts an image with OLPF into an image from which the influence of the filtering processing by the OLPF 5103 is removed (hereafter, referred to as OLPF-removed image) using the prediction coefficient obtained by learning with the learning unit 5152 (processing described with reference to the flowchart shown in FIG. 339).

That is to say, as shown in FIG. 343, the learning processing performed at the learning unit 5152 is executed using a learning pair made up of a tutor image serving as an image with OLPF, and a student image serving as an image without OLPF.

Accordingly, a learning pair is made up by generating an image in the case of receiving the incident light at the sensor 2 in a state wherein the OLPF is provided, and an image in the case of receiving the incident light at the sensor 2 in a state wherein the OLPF is nor provided, but it is actually extremely difficult to use each image by accurately positioning each image in increments of pixels.

In order to solve this problem, the learning device 5110 generates an image with OLPF and an image without OLPF using a high-resolution image serving as an input image by means of simulation.

Now, description will be made regarding a method for generating a tutor image using a tutor image generating unit 5153 in the learning device 5110, and a method for generating a student image using a student image generating unit 5151.

FIG. 344 is a block diagram illustrating the detailed configuration of the tutor image generating unit 5153 and the student image generating unit 5151 of the learning device 5110.

A 1/16 average processing unit 5153*a* of the tutor image generating unit 5153 obtains the average pixel value of pixel values of 16 pixels in total of 4 pixels×4 pixels in the entire range of a high-resolution image serving as an input image, replaces all of the pixel values of the 16 pixels with the obtained average pixel value to generate and output a tutor image. According to this processing, the number of pixels of the HD image becomes 1/16 pixels (1/4 pixels each in the horizontal direction and in the vertical direction) in appearance.

That is to say, this 1/16 average processing unit 5153*a* regards each pixel of the HD image serving as an input image as the light cast upon the sensor 2, and regards the range of 4 pixels×4 pixels of the HD image as one pixel of the SD image, thereby generating a kind of spatial integration effects, and virtually generating an image (image without OLPF), which is to be generated at the sensor 2, with no influence due to the OLPF 5103.

An OLPF simulation processing unit 5151*a* of the student image generating unit 5151 disperses the pixel values of the pixels of the HD image which is input in increments of 25%, and superimposes these, as described with reference to FIG. 334 and FIG. 335, thereby simulating operation caused due to the OLPF 5103 when viewing each pixel of the HD image as light.

A 1/16 average processing unit 5135*b* is the same as the 1/16 average processing unit 5153*a* of the tutor image generating unit 5153, replaces all of the pixel values of the 16 pixels with the average pixel value of the 16 pixels in total of 4 pixels×4 pixels, and generates a student image made up of an SD image.

More particularly, all of the pixels are subjected to the processing wherein the OLPF simulation processing unit 5151*a* disperses a value obtained by dividing the pixel value of a pixel P1 at the incident position into pixels P1 through P4 respectively for example as shown in FIG. 345, and then pixel values are obtained by superimposing the values dispersed respectively. According to this processing, for example, the pixel P4 shown in FIG. 345 becomes the average pixel value of the pixels P1 through P4.

In FIG. 345, each grid corresponds to one pixel of an HD image. Also, 4 pixels×4 pixels surrounded by a dotted line correspond to one pixel of an SD image.

That is to say, in FIG. 345, the distance between the pixels P1 and P2, the distance between the pixels P1 and P3, and the distance between the pixels P2 and P4 are equivalent to an amount-of-movement d by the OLPF 5103 shown in FIG. 335.

The reason why the distance between the pixels P1 and P2, the distance between the pixels P1 and P3, and the distance between the pixels P2 and P4, become 2 pixels, is that the OLPF amount-of-movement d by the OLPF 5103 is actually 3.35 μm, but on the other hand, the pixel pitch of the CCD 5104 (the widths between pixels in the horizontal direction and in the vertical direction) is actually 6.45 μm, and the relative ratio thereof is 1.93, as shown in FIG. 346. That is to say, the OLPF amount-of-movement is set to 2 pixels such as surrounded with the dotted line in the drawing to set the pixel pitch to 4 pixels, and consequently, the relative ratio thereof becomes 2.0, and accordingly, an event occurred by the OLPF 5103, which is to be cast upon the sensor 2, can be simulated in a state similar to an actual measured value of 1.93.

Similarly, as shown in FIG. 346, an arrangement may be made wherein the OLPF amount-of-movement is set to 4 pixels, and the pixel pitch is set to 8 pixels, i.e., the other OLPF amount-of-movement and pixel pitch may be employed as long as the OLPF amount-of-movement and pixel pitch are set while keeping this proportion. Further, even if the OLPF amount-of-movement is set to 6 pixels, and the pixel pitch is set to 11 pixels, the relative ratio thereof can keep 1.83, the processing simulation with this proportion may be performed.

In the event that the tutor image generating unit 5153 generates an image such as shown in FIG. 347, the student image generating unit 5151 generates an image such as shown in FIG. 348. Both images are displayed in a mosaic pattern since 4 pixels×4 pixels of the HD image are essentially displayed as a single pixel of the SD image, but with the tutor image shown in FIG. 347, the edge portion shown in a white color is displayed more clearly than that in the student image shown in FIG. 348, and accordingly, an image caused by the influence of the OLPF 5103 is generated upon the student image.

Next, description will be made regarding the learning processing with reference to the flowchart shown in FIG. 349.

In step S5031, the OLPF simulation processing unit 5151*a* of the student image generating unit 5151, as described with reference to FIG. 345, disperses the pixel values of the pixels of the HD image which is input into four pixels in increments of 25%, generates pixel values by superimposing the pixel values dispersed at each pixel position, simulates the operation caused by the OLPF 5103, and outputs the processed results to the 1/16 average processing unit 5151*b*.

In step S5032, the 1/16 average processing unit 5151*b* obtains an average pixel value in increments of 16 pixels in total of 4 pixels×4 pixels regarding the image subjected to the OLPF simulation processing input from the OLPF simulation processing unit 5151*a*, further replaces the pixel values of the 16 pixels with the average value thereof in order, generates a student image, which becomes an SD image in appearance, and outputs this to the image memory 5161 of the learning unit 5152.

In step S5033, the class tap extracting unit 5162 extracts the pixel value of a pixel serving as the class tap of a pixel of interest from the image data stored in the image memory 5161, and outputs the extracted pixel value of the pixel to the features computing unit 5163.

In step S5034, the features extracting unit 5163 computes the features corresponding to the pixel of interest using the pixel value information of the pixel of the class tap input from the class tap extracting unit 5162, and outputs the computed features to the class classification unit 5164.

In step S5035, the class classification unit 5164 classifies the class corresponding to the pixel to become a pixel of interest to determine a class code based on the features input, outputs this to the prediction tap extracting unit 5165, and also stores this to the learning memory.

In step S5036, the prediction tap extracting unit 5165 extracts the pixel value information of the pixel of the prediction tap corresponding to the pixel of interest of the image data stored in the image memory 5161 based on the class code input from the class classification unit 5164, and outputs this to the supplementing computing unit 5166.

In step S5037, the 1/16 average processing unit 5153*a* of the tutor image generating unit 5153 obtains an average pixel value in increments of 16 pixels in total of 4 pixels×4 pixels regarding an HD image serving as an input image, replaces the pixel values of the 16 pixels with the obtained average pixel value, thereby generating an image without OLPF (SD image in appearance), which is not influenced due to the OLPF 5103, to output this to the supplementing computing unit 5166.

In step S5038, the supplementing computing unit 5166 supplements a value to become the summation of each term of a normal equation based on the pixel values of the pixels of the tutor image input from the tutor image generating unit 5153, outputs the supplemented result to the learning memory 5167, and stores this in association with the corresponding class code.

In step S5039, the normal equation computing unit 5168 determines regarding whether or not the supplementing processing regarding all the pixels of the input image has been completed, and in the event that determination is made that the supplementing processing regarding all the pixels of the input image has not been completed, the processing returns to step S5032, wherein the subsequent processing is repeated. In other words, the processing of steps S5032 through S5039 is repeated until the supplementing processing regarding all the pixels of the input image has been completed.

In the event that determination is made that the supplementing processing regarding all the pixels of the input image has been completed in step S5039, the normal equation computing unit 5168 computes a normal equation while correlated with the corresponding class code based on the supplemented results stored in the learning memory 5167, obtains a prediction coefficient thereof to output this to the coefficient memory 5154.

In step S5041, the normal equation computing unit 5168 determines regarding whether or not the computation for obtaining prediction coefficients as to all of the classes has been completed, and in the event that determination is made that the computation for obtaining prediction coefficients as to all of the classes has not been completed, the processing returns to step S5040. In other words, the processing of step S5040 is repeated until the computation for obtaining prediction coefficients as to all of the classes has been completed.

In step S5041, in the event that determination is made that the computation for obtaining prediction coefficients as to all of the classes has been completed, the processing thereof ends.

According to the above learning processing, the OLPF removing unit 5131 can generate an image similar to an actual world image of which the OLPF processing effects are removed from the input image subjected to the filtering processing by the OLPF 5103 by using the prediction coefficients stored in the coefficient memory 5154, such as copying the prediction coefficients into the coefficient memory 5144, or the like.

For example, by employing thus obtained prediction coefficients, in the event that an image subjected to the filtering processing by the OLPF 5103 (image obtained by simulating the processing by the OLPF 5103) such as shown in FIG. 348 is input, the OLPF removing unit 5131 generates an image such as shown in FIG. 350 using the OLPF removing processing described with reference to the flowchart shown in FIG. 340.

It can be understood that the image thus processed, which is shown in FIG. 350, is generally the same image as the input image not subjected to the filtering processing by the OLPF 5103 such as shown in FIG. 347.

Also, as shown in FIG. 351, it can be understood that an image of which the effects by the OLPF are removed exhibits a value closer to an image not subjected to the effects by the OLPF than an image subjected to the filtering processing by the OLPF even in comparison of change in the pixels in the x direction at the certain same position in the y direction of the images in FIG. 347, FIG. 348, and FIG. 350.

Note that in FIG. 351, a solid line represents change in the pixel values corresponding to the image (image without OLPF) shown in FIG. 347, a dotted line represents the image (image with OLPF) shown in FIG. 348, and a single-dot broken line represents the image (OLPF removed image) shown in FIG. 350.

According to the above arrangement, image data wherein the real world light signals are cast upon multiple pixels each having spatial integration effects via the optical low pass filter is acquired, the light signals cast upon the optical low pass filter are estimated so as to take that the light signals are dispersed and integrated in at least one-dimensional direction of the spatial directions by the optical low pass filter into consideration, and accordingly, it becomes possible to obtain more accurate and higher-precision processed results as to events in the real world taking the real world wherein the data is acquired into consideration.

With the above examples, description has been made regarding examples wherein the influence of the filtering processing by the OLPF 5103 is removed at the previous stage of the data continuity detecting unit 101, but the actual world may be estimated using the actual world estimating unit 102 taking the influence by the OLPF 5103 into consideration. Accordingly, in this case, the configuration of the signal processing device becomes the configuration described with reference to FIG. 3.

FIG. 352 is a block diagram illustrating the configuration of the actual world estimating unit 102 so as to estimate the actual world taking the influence by the OLPF 5103 into consideration.

As shown in FIG. 352, the actual world estimating unit 102 includes a condition setting unit 5201, input image storing unit 5202, input pixel value acquiring unit 5203, integration component computing unit 5204, normal equation generating unit 5205, and approximation function generating unit 5206.

The condition setting unit 5201 sets a pixel range (tap range) used for estimating the function F(x, y) corresponding to a pixel of interest, and the number of dimensions n of the approximation function f(x, y), g(x, y).

The input image storing unit 5202 temporarily stores an input image (pixel values) from the sensor 2.

The input pixel value acquiring unit 5203 acquires, of the input images stored in the input image storing unit 5202, an input image region corresponding to the tap range set by the condition setting unit 5201, and supplies this to the normal equation generating unit 5205 as an input pixel value table. That is to say, the input pixel value table is a table in which the respective pixel values of pixels included in the input image region are described. Note that a specific example of the input pixel value table will be described later.

Incidentally, as described with reference to FIG. 344 and FIG. 345, the OLPF 5103 disperses the incident light into four points with the OLPF amount-of-movement d. Accordingly, with the pixels on the image, the pixel values thereof are generated by each 25% of the pixel values at the four points including the own pixel position being superimposed. Note that FIG. 353 illustrates that the ranges surrounded with a dotted line represent different four pixel points, and 25% of each is superimposed.

As described above, the incident light is dispersed into four points such as shown in FIG. 354 by the OLPF 5103, an approximation function g(x, y) indicating the dispersed light distribution immediately prior to the sensor 2 becomes a relational expression such as shown in the following Expression (257) using the approximation function f(x, y) which approximates the actual world. Note that FIG. 354 illustrates curves having a convex shape on the top thereof represent the approximation function f(x, y), and the approximation function wherein these curves are dispersed into four curves, and then superimposed is g(x, y).

$$g(x, y)=f(x, y)+f(x-d, y)+f(x, y-d)+f(x-d, y-d) \tag{257}$$

Also, the approximation function f(x, y) of the actual world is represented with the following Expression (258).

$$f(x, y) = \sum_{i=0}^{n} w_i \times (x - s \times y)^i \tag{258}$$

Here, $w_i$ represents the coefficients of the approximation function, and s(=cot θ: θ is continuity angle) represents a gradient as continuity.

Accordingly, the approximation function g(x, y) indicating the light distribution immediately prior to the sensor 2 is represented with the following Expression (259).

$$g(x, y) = \sum_{i=0}^{n} w_i \times (x - s \times y)^i + \sum_{i=0}^{n} w_i \times (x - d - s \times y)^i + \tag{259}$$

-continued $$\sum_{i=0}^{n} w_i \times (x - s \times (y - d))^i + \sum_{i=0}^{n} w_i \times (x - d - s \times (y - d))^i$$

The actual world estimating unit 102 computes the features $w_i$ of the approximation function f(x, y), as described above.

Expression (259) can be expressed as in the following Expression (260).

$$\begin{aligned}
P &= \int_{y-0.5}^{y+0.5} \int_{x-0.5}^{x+0.5} g(x, y) dx dy \\
&= \int_{y-0.5}^{y+0.5} \int_{x-0.5}^{x+0.5} \left\{ \sum_{i=0}^{n} w_i \times (x - s \times y)^i + \right. \\
&\quad \sum_{i=0}^{n} w_i \times (x - d - s \times y)^i + \sum_{i=0}^{n} w_i \times (x - s \times (y - d))^i + \\
&\quad \left. \sum_{i=0}^{n} w_i \times (x - d - s \times (y - d))^i \right\} dx dy \\
&= \int_{y-0.5}^{y+0.5} \int_{x-0.5}^{x+0.5} \sum_{i=0}^{n} w_i \times (x - s \times y)^i dx dy + \\
&\quad \int_{y-0.5}^{y+0.5} \int_{x-0.5}^{x+0.5} \sum_{i=0}^{n} w_i \times (x - d - s \times y)^i dx dy + \\
&\quad \int_{y-0.5}^{y+0.5} \int_{x-0.5}^{x+0.5} \sum_{i=0}^{n} w_i \times (x - s \times (y - d))^i dx dy + \\
&\quad \int_{y-0.5}^{y+0.5} \int_{x-0.5}^{x+0.5} \sum_{i=0}^{n} w_i \times (x - d - s \times (y - d))^i dx dy \\
&= \sum_{i=0}^{n} \frac{w_i}{s(i+1)(i+2)} \left\{ \begin{array}{l} (x + 0.5 - s \times y + 0.5)^{i+2} - \\ (x + 0.5 - s \times y - 0.5)^{i+2} - \\ (x - 0.5 - s \times y + 0.5)^{i+2} + \\ (x - 0.5 - s \times y - 0.5)^{i+2} \end{array} \right\} + \\
&\quad \sum_{i=0}^{n} \frac{w_i}{s(i+1)(i+2)} \left\{ \begin{array}{l} (x + 0.5 - d - s \times y + 0.5)^{i+2} - \\ (x + 0.5 - d - s \times y - 0.5)^{i+2} - \\ (x - 0.5 - d - s \times y + 0.5)^{i+2} + \\ (x - 0.5 - d - s \times y - 0.5)^{i+2} \end{array} \right\} + \\
&\quad \sum_{i=0}^{n} \frac{w_i}{s(i+1)(i+2)} \left\{ \begin{array}{l} (x + 0.5 - s \times (y + 0.5 - d))^{i+2} - \\ (x + 0.5 - s \times (y - 0.5 - d))^{i+2} - \\ (x - 0.5 - s \times (y + 0.5 - d))^{i+2} + \\ (x - 0.5 - s \times (y - 0.5 - d))^{i+2} \end{array} \right\} + \\
&\quad \sum_{i=0}^{n} \frac{w_i}{s(i+1)(i+2)} \left\{ \begin{array}{l} (x + 0.5 - d - s \times (y + 0.5 - d))^{i+2} - \\ (x + 0.5 - d - s \times (y - 0.5 - d))^{i+2} - \\ (x - 0.5 - d - s \times (y + 0.5 - d))^{i+2} + \\ (x - 0.5 - d - s \times (y - 0.5 - d))^{i+2} \end{array} \right\}
\end{aligned} \tag{260}$$

-continued $$= \sum_{i=0}^{n} \frac{w_i}{s(i+1)(i+2)} \left\{ \begin{array}{l} (x+0.5-s\times y+0.5)^{i+2} - \\ (x+0.5-s\times y-0.5)^{i+2} - \\ (x-0.5-s\times y+0.5)^{i+2} + \\ (x-0.5-s\times y-0.5)^{i+2} + \\ (x+0.5-d-s\times y+0.5)^{i+2} - \\ (x+0.5-d-s\times y-0.5)^{i+2} - \\ (x-0.5-d-s\times y+0.5)^{i+2} + \\ (x-0.5-d-s\times y-0.5)^{i+2} \\ (x+0.5-s\times(y+0.5-d))^{i+2} - \\ (x+0.5-s\times(y-0.5-d))^{i+2} - \\ (x-0.5-s\times(y+0.5-d))^{i+2} + \\ (x-0.5-s\times(y-0.5-d))^{i+2} + \\ (x+0.5-d-s\times(y+0.5-d))^{i+2} - \\ (x+0.5-d-s\times(y-0.5-d))^{i+2} - \\ (x-0.5-d-s\times(y+0.5-d))^{i+2} + \\ (x-0.5-d-s\times(y-0.5-d))^{i+2} \end{array} \right\}$$

$$= \sum_{i=0}^{n} w_i \times S_i(x-0.5,\ x+0.5,\ y-0.5,\ y+0.5) + e$$

In Expression (260), $S_i$(x−0.5, x+0.5, y−0.5, y+0.5) represents the integral components of i-dimensional terms. That is to say, the integral components $S_i$(x−0.5, x+0.5, y−0.5, y+0.5) are as shown in the following Expression (261).

$$s_i(x-0.5,\ x+0.5,\ y-0.5,\ y+0.5) = \frac{(x+0.5-s\times y+0.5s)^{i+2} - (x+0.5-s\times y-0.5s)^{i+2} - (x-0.5-s\times y+0.5s)^{i+2} + (x-0.5-s\times y-0.5s)^{i+2}}{s(i+1)(i+2)} \tag{261}$$

The integration component calculation unit 5204 computes the integral components $S_i$(x−0.5, x+0.5, y−0.5, y+0.5).

Specifically, the integral components $S_i$(x−0.5, x+0.5, y−0.5, y+0.5) shown in Expression (261) can be computed as long as the relative pixel positions (x, y), the gradient s and i of i-dimensional terms are known. Of these, the relative pixel positions (x, y) are determined with a pixel of interest, and a tap range, the variable s is cot θ, which is determined with the angle θ, and the range of i is determined with the number of dimensions n respectively.

Accordingly, the integration component computing unit 5204 computes the integral components $S_i$(x−0.5, x+0.5, y−0.5, y+0.5) based on the tap range and the number of dimensions set by the condition setting unit 5201, and the angle θ of the data continuity information output from the data continuity detecting unit 101, and supplies the calculated results to the normal equation generating unit 5205 as an integration component table.

The normal equation generating unit 5205 generates a normal equation in the case of obtaining the above Expression (260) by the least square method using the input pixel value table supplied from the input pixel value acquiring unit 5203, and the integration component table supplied from the integration component computing unit 5206, and outputs this to the approximation function generating unit 5206 as a normal equation table. Note that a specific example of a normal equation will be described later.

The approximation function generating unit 5206 computes the respective features $w_i$ of the above Expression (259) (i.e., the coefficients $w_i$ of the approximation function f(x, y) serving as a two-dimensional polynomial) by solving the normal equation included in the normal equation table supplied from the normal equation generating unit 5205 using the matrix solution, and output these to the image generating unit 103.

Next, description will be made regarding the actual world estimating processing (processing in step S102 in FIG. 40), which takes the influence by the OLPF 5103 into consideration, with reference to the flowchart in FIG. 355.

For example, let us say that the light signal in the actual world 1 having continuity in the spatial direction represented with the gradient $G_F$ has been detected by the sensor 2, and has been stored in the input image storing unit 5202 as an input image corresponding to one frame. Also, let us say that the data continuity detecting unit 101 has output the angle θ as data continuity information, of the input image.

In this case, in step S5201, the condition setting unit 5201 sets conditions (a tap range and the number of dimensions).

For example, let us say that a tap range 5241 shown in FIG. 356 has been set, and also 5 has been set as the number of dimensions.

FIG. 356 is a diagram for describing an example of a tap range. In FIG. 356, the X direction and Y direction represent the X direction and Y direction of the sensor 2. Also, the tap range 5241 represents a pixel group made up of 20 pixels (20 squares in the drawing) in total of 4 pixels in the X direction and also 5 pixels in the Y direction.

Further, as shown in FIG. 356, let us say that a pixel of interest has been set to a pixel, which is the second pixel from the left and also the third pixel from the bottom in the drawing, of the tap range 5241. Also, let us say that each pixel is denoted with a number l such as shown in FIG. 356 (l is any integer value of 0 through 19) according to the relative pixel positions (x, y) from the pixel of interest (a coordinate value of a pixel-of-interest coordinates system wherein the center (0, 0) of the pixel of interest is taken as the origin).

Now, description will return to FIG. 355, wherein in step S5202, the condition setting unit 5201 sets a pixel of interest.

In step S5203, the input pixel value acquiring unit 5203 acquires an input pixel value based on the condition (tap range) set by the condition setting unit 5201, and generates an input pixel value table. That is to say, in this case, the input pixel value acquiring unit 5203 generates a table made up of 20 input pixel values P(l) as an input pixel value table.

Note that in this case, the relation between the input pixel values P(l) and the above input pixel values P(x, y) is a relation shown in the following Expression (262). However, in Expression (262), the left side represents the input pixel values P(l), and the right side represents the input pixel values P(x, y).

$$\begin{aligned} P(0) &= P(0,0) \\ P(1) &= P(-1,2) \\ P(2) &= P(0,2) \\ P(3) &= P(1,2) \\ P(4) &= P(2,2) \\ P(5) &= P(-1,1) \\ P(6) &= P(0,1) \end{aligned} \tag{262}$$

-continued $$P(7) = P(1, 1)$$
$$P(8) = P(2, 1)$$
$$P(9) = P(-1, 0)$$
$$P(10) = P(1, 0)$$
$$P(11) = P(2, 0)$$
$$P(12) = P(-1, -1)$$
$$P(13) = P(0, -1)$$
$$P(14) = P(1, -1)$$
$$P(15) = P(2, -1)$$
$$P(16) = P(-1, -2)$$
$$P(17) = P(0, -2)$$
$$P(18) = P(1, -2)$$
$$P(19) = P(2, -2)$$

In step S5204, the integration component computing unit 5204 computes integral components based on the conditions (a tap range and the number of dimensions) set by the condition setting unit 5201, and the data continuity information (angle θ) supplied from the data continuity detecting unit 101, and generates an integration component table.

In this case, as described above, the input pixel values are not P(x, y) but P(l), and are acquired as the value of a pixel number l, so the integration component computing unit 5204 computes the integral components $S_i$(x−0.5, x+0.5, y−0.5, y+0.5) in the above Expression (261) as a function of l such as the integral components $S_i$(l) shown in the left side of the following Expression (263).

$$S_i(l)=S_i(x-0.5,\ x+0.5,\ y-0.5,\ y+0.5) \tag{263}$$

Specifically, in this case, the integral components $S_i$(l) shown in the following Expression (264) are computed.

$$S_i(0) = S_i(-0.5, 0.5, -0.5, 0.5) \tag{264}$$
$$S_i(1) = S_i(-1.5, -0.5, 1.5, 2.5)$$
$$S_i(2) = S_i(-0.5, 0.5, 1.5, 2.5)$$
$$S_i(3) = S_i(0.5, 1.5, 1.5, 2.5)$$
$$S_i(4) = S_i(1.5, 2.5, 1.5, 2.5)$$
$$S_i(5) = S_i(-1.5, -0.5, 0.5, 1.5)$$
$$S_i(6) = S_i(-0.5, 0.5, 0.5, 1.5)$$
$$S_i(7) = S_i(0.5, 1.5, 0.5, 1.5)$$
$$S_i(8) = S_i(1.5, 2.5, 0.5, 1.5)$$
$$S_i(9) = S_i(-1.5, -0.5, -0.5, 0.5)$$
$$S_i(10) = S_i(0.5, 1.5, -0.5, 0.5)$$
$$S_i(11) = S_i(1.5, 2.5, -0.5, 0.5)$$
$$S_i(12) = S_i(-1.5, -0.5, -1.5, -0.5)$$
$$S_i(13) = S_i(-0.5, 0.5, -1.5, -0.5)$$
$$S_i(14) = S_i(0.5, 1.5, -1.5, -0.5)$$
$$S_i(15) = S_i(1.5, 2.5, -1.5, -0.5)$$

-continued $$S_i(16) = S_i(-1.5, -0.5, -2.5, -1.5)$$
$$S_i(17) = S_i(-0.5, 0.5, -2.5, -1.5)$$
$$S_i(18) = S_i(0.5, 1.5, -2.5, -1.5)$$
$$S_i(19) = S_i(1.5, 2.5, -2.5, -1.5)$$

Note that in Expression (264), the left side represents the integral components $S_i$(l), and the right side represents the integral components $S_i$(x−0.5, x+0.5, y−0.5, y+0.5). That is to say, in this case, i is 0 through 5, and accordingly, the 120 $S_i$(l) in total of the 20 $S_0$(l), 20 $S_1$(l), 20 $S_2$(l), 20 $S_3$(l), 20 $S_4$(l), and 20 $S_5$(l) are computed.

More specifically, first the integration component computing unit 5204 calculates cot θ corresponding to the angle θ supplied from the data continuity detecting unit 101, and takes the computed result as a variable s. Next, the integration component computing unit 5204 computes each of the 20 integral components $S_i$(x−0.5, x+0.5, y−0.5, y+0.5) shown in the right side of Expression (264) regarding each of i=0 through 5 using the computed variable s. That is to say, the 120 integral components $S_i$(x−0.5, x+0.5, y−0.5, y+0.5) are computed. Note that with this calculation of the integral components $S_i$(x−0.5, x+0.5, y−0.5, y+0.5), the above Expression (261) is used. Subsequently, the integration component computing unit 5204 converts each of the computed 120 integral components $S_i$(x−0.5, x+0.5, y−0.5, y+0.5) into the corresponding integral components $S_i$(l) in accordance with Expression (264), and generates an integration component table including the converted 120 integral components $S_i$(l).

Note that the sequence of the processing in step S5203 and the processing in step S5204 is not restricted to the example in FIG. 355, the processing in step S5204 may be executed first, or the processing in step S5203 and the processing in step S5204 may be executed simultaneously.

Next, in step S5205, the normal equation generating unit 5205 generates a normal equation table based on the input pixel value table generated by the input pixel value acquiring unit 5203 at the processing in step S5203, and the integration component table generated by the integration component computing unit 5204 at the processing in step S5204.

Specifically, in this case, the features $w_i$ are calculated with the least square method using the above Expression (260) (however, in Expression (258), the $S_i$(l) into which the integral components $S_i$(x−0.5, x+0.5, y−0.5, y+0.5) are converted using Expression (262) is used), so a normal equation corresponding to this is represented as the following Expression (265).

$$\begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \begin{pmatrix} w_0 \\ w_1 \\ \vdots \\ w_n \end{pmatrix} = \tag{265}$$

-continued $$\begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix}$$

Note that in Expression (265), L represents the maximum value of the pixel number l in the tap range. n represents the number of dimensions of the approximation function f(x) serving as a polynomial. Specifically, in this case, n=5, and L=19.

If we define each matrix of the normal equation shown in Expression (265) as the following Expressions (266) through (268), the normal equation is represented as in the following Expression (269).

$$S_{MAT} = \begin{pmatrix} \sum_{l=0}^{L} S_0(l)S_0(l) & \sum_{l=0}^{L} S_0(l)S_1(l) & \cdots & \sum_{l=0}^{L} S_0(l)S_n(l) \\ \sum_{l=0}^{L} S_1(l)S_0(l) & \sum_{l=0}^{L} S_1(l)S_1(l) & \cdots & \sum_{l=0}^{L} S_1(l)S_n(l) \\ \vdots & \vdots & \ddots & \vdots \\ \sum_{l=0}^{L} S_n(l)S_0(l) & \sum_{l=0}^{L} S_n(l)S_1(l) & \cdots & \sum_{l=0}^{L} S_n(l)S_n(l) \end{pmatrix} \quad (266)$$

$$W_{MAT} = \begin{pmatrix} w_0 \\ w_1 \\ \vdots \\ w_n \end{pmatrix} \quad (267)$$

$$P_{MAT} = \begin{pmatrix} \sum_{l=0}^{L} S_0(l)P(l) \\ \sum_{l=0}^{L} S_1(l)P(l) \\ \vdots \\ \sum_{l=0}^{L} S_n(l)P(l) \end{pmatrix} \quad (268)$$

$$S_{MAT}W_{MAT} = P_{MAT} \quad (269)$$

As shown in Expression (267), the respective components of the matrix $W_{MAT}$ are the features $w_i$ to be obtained. Accordingly, in Expression (269), if the matrix $S_{MAT}$ of the left side and the matrix $P_{MAT}$ of the right side are determined, the matrix $W_{MAT}$ may be calculated with the matrix solution.

Specifically, as shown in Expression (266), the respective components of the matrix $S_{MAT}$ may be calculated with the above integral components $S_i(l)$. That is to say, the integral components $S_i(l)$ are included in the integration component table supplied from the integration component computing unit 5204, so the normal equation generating unit 5205 can calculate each component of the matrix $S_{MAT}$ using the integration component table.

Also, as shown in Expression (268), the respective components of the matrix $P_{MAT}$ may be calculated with the integral components $S_i(l)$ and the input pixel values P(l) That is to say, the integral components $S_i(l)$ is the same as those included in the respective components of the matrix $S_{MAT}$, also the input pixel values P(l) are included in the input pixel value table supplied from the input pixel value acquiring unit 5203, so the normal equation generating unit 5205 can calculate each component of the matrix $P_{MAT}$ using the integration component table and input pixel value table.

Thus, the normal equation generating unit 5205 calculates each component of the matrix $S_{MAT}$ and matrix $P_{MAT}$, and outputs the calculated results (each component of the matrix $S_{MAT}$ and matrix $P_{MAT}$) to the approximation function generating unit 5206 as a normal equation table.

Upon the normal equation table being output from the normal equation generating unit 5205, in step S5206, the approximation function generating unit 5206 calculates the features $w_i$ (i.e., the coefficients $w_i$ of the approximation function f(x, y) serving as a two-dimensional polynomial) serving as the respective components of the matrix $W_{MAT}$ in the above Expression (269) based on the normal equation table.

Specifically, the normal equation in the above Expression (269) can be transformed as the following Expression (270).

$$W_{MAT} = S_{MAT}^{-1}P_{MAT} \quad (270)$$

In Expression (270), the respective components of the matrix $W_{MAT}$ in the left side are the features $w_i$ to be obtained. The respective components regarding the matrix $S_{MAT}$ and matrix $P_{MAT}$ are included in the normal equation table supplied from the normal equation generating unit 5205. Accordingly, the approximation function generating unit 5206 calculates the matrix $W_{MAT}$ by calculating the matrix in the right side of Expression (270) using the normal equation table, and outputs the calculated results (features $w_i$) to the image generating unit 103.

In step S5207, the approximation function generating unit 5206 determines regarding whether or not the processing of all the pixels has been completed.

In step S5207, in the event that determination is made that the processing of all the pixels has not been completed, the processing returns to step S5202, wherein the subsequent processing is repeatedly performed. That is to say, the pixels that have not become a pixel of interest are sequentially taken as a pixel of interest, and the processing in step S5202 through S5207 is repeatedly performed.

In the event that the processing of all the pixels has been completed (in step S5207, in the event that determination is made that the processing of all the pixels has been completed), the estimating processing of the actual world 1 ends.

A in FIG. 357 illustrates a high-precision input image (image of a bicycle spoke), B in FIG. 357 is an image obtained by the image of A in FIG. 357 being subjected to the processing by the OLPF 5103, C in FIG. 357 is an image of which pixels are generated using an approximation function of the actual world estimated from the image of B in FIG. 357 using the processing described with reference to the flowchart shown in the above FIG. 355, and D in FIG. 357 is an image generated by the image of B in FIG. 357 being generated by the conventional class classification adaptation processing.

It can be understood that the image of C in FIG. 357 displays the edge strongly, so that the outline of the spoke is clearly displayed, as compared to the image of D in FIG. 357.

Also, FIG. 358 is a diagram illustrating change in the pixel value in the horizontal direction at a certain position in the vertical direction of the images of A through D in FIG. 357. In FIG. 358, a single-dot broken line corresponds to the image of A in FIG. 357, a solid line corresponds to the image of B in FIG. 357, a dotted line corresponds to the image of C in FIG. 357, and a double-dot broken line corresponds to the image of D in FIG. 357. As shown in FIG. 358, with around the spatial direction X=10 wherein the image of the spoke is displayed, it can be understood that the dotted line serving as an image which is processed by the actual world estimating unit 102 shown in FIG. 352 taking the influence by the OLPF 5103 into consideration can obtain a value similar to the input image, as compared to the image, which is shown with a double-dot broken line, generated by the conventional class classification adaptation processing.

Particularly, a portion of which the pixel value is small is a reflected portion of the edge portion of the spoke, but with regard to this portion, expressiveness is improved by the processing in which the OLPF is taken into consideration.

According to the actual world estimating unit 102 shown in FIG. 352, it becomes possible to obtain the approximation function f(x) in the actual world in which the influence by the OLPF 5103 is taken into consideration, and further, it becomes possible to generate pixels in which the influence by the OLPF 5103 is taken into consideration from the approximation function f(x) in the actual world in which the influence by the OLPF 5103 is taken into consideration.

As described above, as the description of the two-dimensional polynomial approximating technique, an example wherein the coefficients (features) $w_i$ of the approximation function f(x, y) as to the spatial directions (X direction and Y direction) are computed has been employed, but it is needless to say that the one-dimensional polynomial approximating technique wherein any one-dimensional direction alone of the spatial directions (X direction or Y direction) is applied, may be employed as well.

According to the above arrangement, a function corresponding to the real world light signals is estimated by estimating multiple actual world functions assuming that the pixel value of the pixel of interest corresponding to a position in at least one-dimensional direction of the spatial directions of the image data acquired by the real world light signals being cast upon multiple pixels each having spatio-temporal integration effects via the optical low pass filter, of which part of continuity of the real world light signals is dropped, is the pixel value acquired by the integration in at least one dimensional direction of the multiple actual world functions corresponding to the optical low pass filter, thereby enabling the actual world to be estimated in a truer manner.

With the above arrangement, the signal processing device shown in FIG. 336 has executed the signal processing so as to remove the influence by the OLPF 5103 from the image input from the sensor 2, the actual world estimating unit 102 shown in FIG. 352 has generated an actual world approximation function taking the influence by the OLPF 5103 into consideration, and consequently, the processing taking the influence by the OLPF 5103 into consideration has been performed with the signal processing, but for example, an arrangement may be made wherein an HD image without OLPF is taken as a tutor image, and an SD image with OLPF is taken as a student image, a prediction coefficient is set by learning, and an image is generated with the class classification adaptation processing.

FIG. 359 is a block diagram illustrating the configuration of a signal processing device 5221 configured such that an HD image without OLPF is taken as a tutor image, and an SD image with OLPF is taken as a student image, a prediction coefficient is set by learning, and an image is generated with the class classification adaptation processing.

Note that the signal processing device 5221 shown in FIG. 359 is essentially the same configuration as the OLPF removing unit 5131 shown in FIG. 337, a class tap extracting unit 5241, features computing unit 5242, class classification unit 5243, coefficient memory 5244, prediction tap extracting unit 5245, and pixel value computing unit 5246 of the signal processing unit 5221 are the same as the class tap extracting unit 5141, features computing unit 5142, class classification unit 5143, coefficient memory 5144, prediction tap extracting unit 5145, and pixel value computing unit 5146 of the signal processing unit 5141 of the OLPF removing unit 5131, so description thereof will be omitted. However, the prediction coefficients stored in the coefficient memory 5244 are obtained by learning, which are different from those in the coefficient memory 5144. Description will be made later regarding the learning of the prediction coefficients stored in the coefficient memory 5244 with reference to the learning device shown in FIG. 361.

Next, description will be made regarding the signal processing by the signal processing device 5221 shown in FIG. 359 with reference to the flowchart shown in FIG. 360, but this processing is essentially the same as that in the flowchart shown in FIG. 340, so description thereof will be omitted.

According to the above arrangement, first image data acquired by the real world light signals being cast upon multiple pixels each having spatio-temporal integration effects via the optical low pass filter is acquired, the multiple pixels corresponding to the pixel of interest within second image data are extracted from the first image data, learning is made beforehand so as to predict second image data acquired by the light signals, which are to be cast upon the optical low pass filter, being cast directly, based on the first image data, and the pixel value of the pixel of interest within the second image data is predicted based on the extracted multiple pixels and the prediction, thereby enabling an image which is faithful as to the actual world to be generated.

Next, description will be made regarding a learning device, which learns (the signal processing device shown in FIG. 359 described above serves as predicting means for predicting a pixel value using a prediction coefficient, and accordingly, to learn prediction coefficients means to learn the prediction means) prediction coefficients to be stored in the coefficient memory 5244 of the signal processing device shown in FIG. 359 with reference to FIG. 361. Note that the learning unit 5252 shown in FIG. 361 is essentially the same as the learning unit 5152 shown in FIG. 341, image memory 5261, a class tap extracting unit 5262, features extracting unit 5263, class classification unit 5264, prediction tap extracting unit 5265, supplementing computing unit 5266, learning memory 5267, normal equation computing unit 5268, and coefficient memory 5254 of the learning unit 5252 are the same as the image memory 5161, class tap extracting unit 5162, features extracting unit 5163, class classification unit 5164, prediction tap extracting unit 5165, supplementing computing unit 5166, learning memory 5167, normal equation computing unit 5168, and coefficient memory 5154 of the learning unit 5152, so description thereof will be omitted.

Also, as shown in FIG. 362, a 1/16 average processing unit 5253*a* of a tutor image generating unit 5253, and an OLPF simulation processing unit 5251*a* of a student image generating unit 5251 are the same as the 1/16 average processing unit 5153*a* of the tutor image generating unit 5153, and the OLPF simulation processing unit 5151*a* of a student image generating unit 5251 shown in FIG. 344, so description thereof will be omitted as well.

The 1/64 average processing unit 5251*b* of the student image generating unit 5251 regards each pixel of the HD image, which was subjected to processing by the OLPF 5103 with the OLPF simulation, serving as an input image as the light cast upon the sensor 2, and regards the range of 8 pixels×8 pixels of the HD image as a single pixel of the SD image, thereby generating a kind of spatial integration effects, and virtually generating an image (SD image without OLPF), which is to be generated at the sensor 2, with no influence due to the OLPF 5103.

Next, description will be made regarding the learning processing by the learning device shown in FIG. 361 with reference to the flowchart shown in FIG. 363.

Note that the processing of step S5231 and the processing of steps S5233 through S5241 are the same as the processing of step S5031 and the processing of steps S5033 through S5041, which have been described with reference to the flowchart shown in FIG. 349, so description thereof will be omitted.

In step S5232, the 1/64 average processing unit 5251*b* obtains an average pixel value in increments of 64 pixels in total of 8 pixels×8 pixels regarding the image subjected to the OLPF simulation processing input from the OLPF simulation processing unit 5251*a*, further replaces the pixel values of the 64 pixels with the average pixel value thereof in order, generates a student image, which becomes an SD image in appearance, and outputs this to the image memory 5261 of the learning unit 5252.

According to the above processing, prediction coefficients in the case of taking an HD image without OLPF as a tutor image, and taking an SD image with OLPF as a student image are to be stored in the coefficient memory 5254. Further, copying the prediction coefficients stored in this coefficient memory 5254 into the coefficient memory 5244 of the signal processing device 5221, or the like enables the signal processing shown in FIG. 360 to be executed, and further, enables an SD image with OLPF to be converted into an HD image without OLPF.

Summarizing the above processing, an actual world image is subjected to the OLPF processing, and further, an SD image (actual world+LPF+imaging device in the drawing) picked up by the imaging device (sensor 2) is converted into an SD image (actual world+imaging device in the drawing) from which the processing by the OLPF is removed by the OLPF removing unit 5131 shown in FIG. 337, such as shown in the arrow A in FIG. 364, and further, the actual world prior to the processing by the OLPF is estimated by the continuity detecting unit 101 and the actual world estimating unit 102, such as shown in the arrow A' in FIG. 364.

Also, the actual world estimating unit 102 shown in FIG. 352 estimates the actual world prior to the processing by the OLPF from an SD image (actual world+LPF+imaging device in the drawing), such as shown in the arrow B in FIG. 364.

Further, the signal processing device 5221 shown in FIG. 359 generates an HD image wherein the actual world is picked up by the imaging device in a state without the influence by the OLPF from an SD image (actual world+LPF+imaging device in the drawing), such as shown in the arrow C in FIG. 364.

Also, the conventional class classification adaptation processing generates an HD image wherein the actual world is picked up by the imaging device in a state via the OLPF from an SD image (actual world+LPF+imaging device in the drawing), such as shown in the arrow D in FIG. 364.

Further, the signal processing device shown in FIG. 3 estimates the actual world influenced by the OLPF from an SD image (actual world+LPF+imaging device in the drawing), such as shown in the arrow E in FIG. 364.

According to the above arrangement, image data corresponding to the light signals when the light signals corresponding to the second image data passes through the optical low pass filter is computed, this is output as first image data, the multiple pixels corresponding to the pixel of interest within the second image data are extracted from the first image data, and learning is made so as to predict the pixel value of the pixel of interest from the pixel values of the extracted multiple pixels, thereby enabling an image faithful as to the actual world to be generated.

Also, with the above arrangement, the approximation function f(x), which approximates the actual world, has been handled as a continuous function, but for example, the approximation function f(x) may be set discontinuously for each region.

That is to say, the above arrangement has been made wherein the function (approximation function) of the curve (curve shown with a dotted line in the drawing) serving as a one-dimensional cross-section indicating actual world light intensity distribution is approximated with a polynomial, such as shown in FIG. 365, and the actual world is estimated utilizing that this curve continuously exists in the continuity direction.

However, this curve serving as a cross-section need not always to be a continuous function such as a polynomial, for example, this may be a discontinuous function, which varies for each region, such as shown in FIG. 366. That is to say, in the case of FIG. 366, when a region is $a_1 \leqq x < a_2$, the approximation function $f(x)=w_1$, when a region is $a_2 \leqq x < a_3$, the approximation function $f(x)=w_2$, when a region is $a_3 \leqq x < a_4$, the approximation function $f(x)=w_3$, when a region is $a_4 \leqq x < a_5$, the approximation function $f(x)=W_4$, and further, when a region is $a_5 \leqq x < a_6$, the approximation function $f(x)=W_5$, thus the different approximation function f(x) is set for each region. Also, it can be conceived that $w_i$ is essentially a level of the light intensity for each region.

Thus, the discontinuous function such as shown in FIG. 366 is defined as in the following Expression (271) serving as a general expression.

$$f(x)=w_i(a_i \leqq x < a_{i+1}) \tag{271}$$

Here, i represents the number of regions which are set.

Thus, a cross-sectional distribution (corresponding to a cross-sectional curve) such as shown in FIG. 366 is set as a constant for each region. Note that the cross-sectional distribution of pixel values shown in FIG. 366 is extremely different from the distribution of the curve shown with a dotted line in FIG. 365 regarding the shape thereof, but actually, it becomes possible to set a level which can approximate the cross-sectional distribution of a discontinuous function with the cross-sectional curve of a continuous function geometrically by reducing the width of a range (in this case, $a_i \leqq x < a_{i+1}$) wherein each function f(x) is set, to a minute width.

Accordingly, a pixel value P can be obtained with the following Expression (272) by employing the approximation function f(x) made up of an actual world discontinuous function, which is defined as in Expression (271).

$$P = \int_{x_s}^{x_e} f(x)\,dx \tag{272}$$

Here, $X_e$ and $X_s$ represent an integral range in the X direction, wherein $X_s$ represents an integration start position, and $X_e$ represents an integration end position respectively.

However, it is actually difficult to directly obtain a function, which approximates the actual world, such as shown in the above Expression (271).

We can assume that the cross-sectional distribution of pixel values such as shown in FIG. 366 continuously exists as to the continuity direction, so that the distribution of the light intensity in the space becomes like that shown in FIG. 367. The left portion of FIG. 367 corresponds to the distribution of pixel values in the case in which the approximation function f(x) made up of a continuous function continuously exists in the continuity direction, and the right portion of FIG. 367, which is the same distribution corresponding to the left portion, corresponds to the distribution of pixel values in the case in which the approximation function f(x) made up of a discontinuous function continuously exists in the continuity direction.

That is to say, a state in which the cross-sectional shape shown in FIG. 366 continues in the continuity direction is provided, so in the event of employing the approximation function f(x) made up of a discontinuous function, each level $w_i$ distributes in a band shape in the continuity direction.

In order to determine the level of each region using the approximation function f(x) defined by a discontinuous function such as shown in the right portion of FIG. 367, it is necessary to obtain the sum of products between the weight according to the proportion of the area for each region occupied in a range wherein each level (each function) is set, of the total area of the pixels, and the level thereof, generate a normal equation using the pixel value of the corresponding pixel, and obtain the pixel value of each region using the least square method.

That is to say, as shown in FIG. 368, in the event that a discontinuous function distributes such as shown in the left portion of FIG. 368, in the case of obtaining the pixel value of the pixel of interest (note that FIG. 368 is a top view illustrating a pixel array when taking the paper space as an X-Y plane, and each grid corresponds to a pixel) shown in a grid surrounded with a thick line in FIG. 368, a triangular (triangle of which the bottom side is up) range present above the hatched portion of the pixel of interest is a range set by $f(x)=W_2$, the hatched portion is a range set by $f(x)=W_3$, and the triangular (triangle of which the bottom side is down) range present below the hatched portion is a range set by $f(x)=W_4$.

In the event that the area of the pixel of interest is 1, if we say that the proportion occupied by the range by $f(x)=W_2$ is 0.2, the proportion occupied by the range by $f(x)=W_3$ is 0.5, and the proportion occupied by the range by $f(x)=W_4$ is 0.3, the pixel value P of the pixel of interest is represented with the sum of products of the pixel value and proportion for each range, so is obtained by computation shown in the following Expression (273).

$$P=0.2\times W_2+0.5\times W_3+0.3\times W_4 \quad (273)$$

Accordingly, the levels of pixel values can be obtained by generating a relational expression as to pixels regarding each pixel using the relationship shown in Expression (273), for example, in order to obtain the levels $w_1$, through $W_5$, if Expression (273) indicating the relationship with the pixel values of at least five pixels including all of the levels can be obtained, it becomes possible to obtain $w_1$, through $W_5$ indicating the levels of the pixel values using the least square method (simultaneous equations in the event that the number of relational expressions are the same as the number of unknowns).

Thus, it becomes possible to obtain the approximation function f(x) made up of a discontinuous function by employing the two-dimensional relationship with continuity.

Also, since the angle θ as continuity is determined by the continuity detecting unit 101, the straight line having the angle θ passing through the origin (0, 0) is uniquely determined, and a position $x_1$ in the X direction of the straight line at an arbitrary position y in the Y direction is represented as the following Expression (274). However, in Expression (274), s represents a gradient as continuity, which is represented with cot θ (=s) when the gradient as continuity is represented with the angle θ.

$$x_1=s\times y \quad (274)$$

That is to say, a point on the straight line corresponding to continuity of data is represented with a coordinate value ($x_1$, y).

According to Expression (274), a cross-sectional direction distance x' (distance shifted in the X direction along the straight line wherein continuity exists) is represented as in the following Expression (275).

$$x'=x-x_1=x-s\times y \quad (275)$$

Accordingly, the approximation function f(x, y) at an arbitrary position (x, y) is represented as the following Expression (276) using Expression (271) and Expression (275).

$$f(x,y)=w_i(a_i\leqq(x-s\times y)<a_{i+1}) \quad (276)$$

Note that in Expression (276), it can be said that $w_i$ is features indicating the light intensity level in each region. Hereafter, $w_i$ is also referred to as features.

Accordingly, the actual world estimating unit 102 can estimate a waveform F(x, y) by estimating the approximation function f(x, y) made up of a discontinuous function as long as the features $w_i$ for each region of Expression (276) can be computed.

Consequently, hereafter, description will be made regarding a method for computing the features $w_i$ of Expression (276).

That is to say, upon the approximation function f(x, y) represented with Expression (276) being integrated with an integral range (integral range in the spatial direction) corresponding to a pixel (the detecting element of the sensor 2), the integral value becomes the estimated value regarding the pixel value of the pixel. It is the following Expression (277) that this is represented with an equation. Note that with the two-dimensional polynomial approximating method employing a discontinuous function, the frame direction T is regarded as a constant value, so Expression (277) is taken as an equation of which variables are the positions x and y in the spatial directions (X direction and Y direction).

$$P(x,y)=\int_{y_s}^{y_e}\int_{x_s}^{x_e} f(x,y)\,dx\,dy \quad (277)$$

In Expression (277), P(x, y) represents the pixel value of a pixel of which the center position is in a position (x, y) (relative position (x, y) from the pixel of interest) of an input image from the sensor 2.

Thus, with the two-dimensional approximating method, the relationship between the input pixel value P(x, y) and the two-dimensional approximation function f(x, y) can be represented with Expression (277), and accordingly, the actual world estimating unit 102 can estimate the two-dimensional function F(x, y) (waveform F(x, y) wherein the light signal in the actual world 1 having continuity in the spatial directions) by computing the features $w_i$ with, for example, by the least square method or the like using Expression (277).

Now, description will be made regarding the configuration of the actual world estimating unit 102, which sets the approximation function f(x) using a discontinuous function as described above, and estimates the actual world, with reference to FIG. 369.

As shown in FIG. 369, the actual world estimating unit 102 includes a condition setting unit 5301, input image storing unit 5302, input pixel value acquiring unit 5303, integration component computing unit 5304, normal equation generating unit 5305, and approximation function generating unit 5306.

The condition setting unit 5301 sets a pixel range (tap range) used for estimating the function F(x, y) corresponding to a pixel of interest, and a range (e.g., width of $a_i \leqq x < a_{i+1}$, the number of i) of the approximation function f(x, y).

The input image storing unit 5302 temporarily stores an input image (pixel values) from the sensor 2.

The input pixel value acquiring unit 5303 acquires, of the input images stored in the input image storing unit 5302, an input image region corresponding to the tap range set by the condition setting unit 5301, and supplies this to the normal equation generating unit 5305 as an input pixel value table. That is to say, the input pixel value table is a table in which the respective pixel values of pixels included in the input image region are described. Note that a specific example of the input pixel value table will be described later.

Incidentally, as described above, the actual world estimating unit 102 employing the two-dimensional approximating method computes the features $w_i$ of the approximation function f(x, y) represented with the above Expression (276) by solving the above Expression (277) using the least square method.

Expression (277) can be represented as in the following Expression (278).

$$f(x, y) = \sum_{i=0}^{n} w_i T_i(x_s, x_e, y_s, y_e) \tag{278}$$

In Expression (278), $T_i(x_s, x_e, y_s, y_e)$ represents the integration results of a region serving as features $w_i$ (region serving as the light level $w_i$), of regions serving as integral ranges, i.e., represents an area. Hereafter, $T_i(x_s, x_e, y_s, y_e)$ is referred to as integral components.

The integration component computing unit 5304 computes the integral components $T_i(x_s, x_e, y_s, y_e)$ (=(x−0.5, x+0.5, y−0.5, y+0.5): in the case of obtaining a region for the worth of a single pixel).

Specifically, the integral components $T_i(x_s, x_e, y_s, y_e)$ shown in Expression (278) are for obtaining the area of certain features $w_i$, of the pixels to be obtained, as described with reference to FIG. 368. Accordingly, the integration component computing unit 5304 may obtain $T_i(x_s, x_e, y_s, y_e)$ by obtaining an area occupied for each features $w_i$ geometrically based on the width d for each features and the angle θ information of data continuity, or by performing multiple division and integration according to the Simpson's rule, rather, a method for obtaining an area is not restricted to those, for example, an area may be obtained by the Monte Carlo Method.

As described in FIG. 368, the features wi can be computed as long as the width of $a_i \leqq (x - s \times y) < a_{i1}$, a variable s indicating the gradient of continuity, and the relative pixel positions (x, y) are known. Of these, the relative pixel positions (x, y) are determined with a pixel of interest, and a tap range, the variable s is cot θ, which is determined with the angle θ, and the width of $a_i \leqq (x - s \times y) < a_{i+1}$ is set beforehand, and accordingly, each value becomes a known value.

Accordingly, the integration component computing unit 5304 computes the integral components $T_i$(x−0.5, x+0.5, y−0.5, y+0.5) based on the tap range and the width set by the condition setting unit 5301, and the angle θ of the data continuity information output from the data continuity detecting unit 101, and supplies the computed results to the normal equation generating unit 5305 as an integration component table.

The normal equation generating unit 5305 generates a normal equation in the case of obtaining the above Expression (277), i.e., Expression (278) by the least square method using the input pixel value table supplied from the input pixel value acquiring unit 5303, and the integration component table supplied from the integration component computing unit 5304, and outputs this to the approximation function generating unit 5306 as a normal equation table. Note that a specific example of a normal equation will be described later.

The approximation function generating unit 5306 computes the respective features wi of the above Expression (278) by solving the normal equation included in the normal equation table supplied from the normal equation generating unit 5305 using the matrix solution, and output these to the image generating unit 103.

Next, description will be made regarding the actual world estimating processing (processing in step S102 in FIG. 40) to which the two-dimensional approximating method employing a discontinuous function is applied, with reference to the flowchart in FIG. 370.

For example, let us say that the light signal in the actual world 1 having continuity in the spatial direction represented with the gradient GF has been detected by the sensor 2, and has been stored in the input image storing unit 5302 as an input image corresponding to one frame. Also, let us say that the data continuity detecting unit 101 has output the angle θ in the continuity detecting processing in step S101 (FIG. 406) as data continuity information of the input image.

In this case, in step S5301, the condition setting unit 5301 sets conditions (a tap range, the width of $a_i \leqq x < a_{i+1}$ (the width of the same features), and the number of i).

For example, let us say that a tap range shown in FIG. 371 has been set, and also d has been set as the width.

FIG. 371 is a diagram for describing an example of a tap range. In FIG. 371, the X direction and Y direction represent the X direction and Y direction of the sensor 2. Also, the tap range represents a pixel group made up of 15 pixels (15 grids surrounded with a thick line on the right portion in the drawing) in total of the right portion in FIG. 371.

Further, as shown in FIG. 371, let us say that a pixel of interest has been set to a pixel of the hatched portion in the drawing, of the tap range. Also, let us say that each pixel is denoted with a number l such as shown in FIG. 371 (1 is any integer value of 0 through 14) according to the relative pixel positions (x, y) from the pixel of interest (a coordinate value of a pixel-of-interest coordinates system wherein the center (0, 0) of the pixel of interest is taken as the origin).

Now, description will return to FIG. 370, wherein in step S5302, the condition setting unit 5301 sets a pixel of interest.

In step S5303, the input pixel value acquiring unit 5303 acquires an input pixel value based on the condition (tap range) set by the condition setting unit 5301, and generates an input pixel value table. That is to say, in this case, the input pixel value acquiring unit 5303 acquires the pixel values of the pixels of the input image region (pixels appended with numbers 0 through 14 in FIG. 371), generates a table made up of 15 input pixel values P(l) as an input pixel value table.

In step S5304, the integration component computing unit 5304 computes integral components based on the conditions (a tap range, width, the number of i) set by the condition setting unit 5301, and the data continuity information (angle θ) supplied from the data continuity detecting unit 101, and generates an integration component table.

In this case, the integration component computing unit 5304 computes the integral components $T_i(x_s, x_e, y_s, y_e)$ ($=T_i(x-0.5, x+0.5, y-0.5, y+0.5)$: in the case of expressing one pixel size as 1×1) in the above Expression (278) as a function of l such as the integral components $T_i$ (l) shown in the left side of the following Expression (279).

$$T_i(l)=T_i(x-0.5,\ x+0.5,\ y-0.5,\ y+0.5) \tag{279}$$

That is to say, in this case, if we say that i is 0 through 5, the 90 $T_i(l)$ in total of the 15 $T_0(l)$, 15 $T_1(l)$, 15 $T_2(l)$, 15 $T_3(l)$, 15 $T_4(l)$, and 15 $T_5(l)$ are computed, and an integration component table including these is generated.

Note that the sequence of the processing in step S5303 and the processing in step S5304 is not restricted to the example in FIG. 370, the processing in step S5304 may be executed first, or the processing in step S5303 and the processing in step S5304 may be executed simultaneously.

Next, in step S5305, the normal equation generating unit 5305 generates a normal equation table based on the input pixel value table generated by the input pixel value acquiring unit 5303 at the processing in step S5303, and the integration component table generated by the integration component computing unit 5304 at the processing in step S5304.

Specifically, in this case, the features $w_i$ are computed with the least square method using the above Expression (278), so a normal equation corresponding thereto is represented as in the following Expression (280).

$$\begin{pmatrix} \sum_{l=0}^{L} v_l T_0(l)T_0(l) & \sum_{l=0}^{L} v_l T_0(l)T_1(l) & \cdots & \sum_{l=0}^{L} v_l T_0(l)T_n(l) \\ \sum_{l=0}^{L} v_l T_1(l)T_0(l) & \sum_{l=0}^{L} v_l T_1(l)T_1(l) & \cdots & \sum_{l=0}^{L} v_l T_1(l)T_n(l) \\ \vdots & \vdots & \ddots & \vdots \\ \sum_{l=0}^{L} v_l T_n(l)T_0(l) & \sum_{l=0}^{L} v_l T_n(l)T_1(l) & \cdots & \sum_{l=0}^{L} v_l T_n(l)T_n(l) \end{pmatrix} \begin{pmatrix} w_0 \\ w_1 \\ \vdots \\ w_n \end{pmatrix} = \begin{pmatrix} \sum_{l=1}^{L} v_l T_0(l)P(l) \\ \sum_{l=1}^{L} v_l T_1(l)P(l) \\ \vdots \\ \sum_{l=1}^{L} v_l T_n(l)P(l) \end{pmatrix} \tag{280}$$

Note that in Expression (280), L represents the maximum value of the pixel number l in the tap range. n represents the number of i of the features $w_i$ which defines the approximation function f(x). Specifically, in this case, L=15.

If we define each matrix of the normal equation shown in Expression (280) as the following Expressions (281) through (283), the normal equation is represented as in the following Expression (284).

$$T_{MAT} = \begin{pmatrix} \sum_{l=1}^{L} v_l T_0(l)T_0(l) & \sum_{l=1}^{L} v_l T_0(l)T_1(l) & \cdots & \sum_{l=1}^{L} v_l T_0(l)T_n(l) \\ \sum_{l=1}^{L} v_l T_1(l)T_0(l) & \sum_{l=1}^{L} v_l T_1(l)T_1(l) & \cdots & \sum_{l=1}^{L} v_l T_1(l)T_n(l) \\ \vdots & \vdots & \ddots & \vdots \\ \sum_{l=1}^{L} v_l T_n(l)T_0(l) & \sum_{l=1}^{L} v_l T_n(l)T_1(l) & \cdots & \sum_{l=1}^{L} v_l T_n(l)T_n(l) \end{pmatrix} \tag{281}$$

$$W_{MAT} = \begin{pmatrix} w_0 \\ w_1 \\ \vdots \\ w_n \end{pmatrix} \tag{282}$$

$$P_{MAT} = \begin{pmatrix} \sum_{l=1}^{L} v_l T_0(l)P(l) \\ \sum_{l=1}^{L} v_l T_1(l)P(l) \\ \vdots \\ \sum_{l=1}^{L} v_l T_n(l)P(l) \end{pmatrix} \tag{283}$$

$$T_{MAT} \times W_{MAT} = P_{MAT} \tag{284}$$

As shown in Expression (282), the respective components of the matrix $W_{MAT}$ are the features $w_i$ to be obtained. Accordingly, in Expression (284), if the matrix $T_{MAT}$ of the left side and the matrix $P_{MAT}$ of the right side are determined, the matrix $W_{MAT}$ may be computed with the matrix solution.

Specifically, as shown in Expression (281), the respective components of the matrix $T_{MAT}$ may be calculated with the above integral components $T_i(l)$. That is to say, the integral components $T_i(l)$ are included in the integration component table supplied from the integration component computing unit 5304, so the normal equation generating unit 5305 can calculate each component of the matrix $T_{MAT}$ using the integration component table.

Also, as shown in Expression (283), the respective components of the matrix $P_{MAT}$ may be computed with the integral components $T_i(l)$ and the input pixel values P(l) That is to say, the integral components $T_i(l)$ is the same as those included in the respective components of the matrix $T_{MAT}$, also the input pixel values P(l) are included in the input pixel value table supplied from the input pixel value acquiring unit 5303, so the normal equation generating unit 5305 can calculate each component of the matrix $P_{MAT}$ using the integration component table and input pixel value table.

Thus, the normal equation generating unit 5305 computes each component of the matrix $T_{MAT}$ and matrix $P_{MAT}$, and outputs the computed results (each component of the matrix $T_{MAT}$ and matrix $P_{MAT}$) to the approximation function generating unit 5306 as a normal equation table.

Upon the normal equation table being output from the normal equation generating unit 5305, in step S5306, the approximation function generating unit 5306 computes the features $w_i$ (i.e., the levels $w_i$, which are defined for each region, of the two-dimensional approximation function f(x, y) made up of a discontinuous function) serving as the respective components of the matrix $W_{MAT}$ in the above Expression (284) based on the normal equation table.

Specifically, the normal equation in the above Expression (284) can be transformed as the following Expression (285).

$$W_{MAT} = T_{MAT}^{-1} P_{MAT} \tag{285}$$

In Expression (285), the respective components of the matrix $W_{MAT}$ in the left side are the features $w_i$ to be obtained. The respective components regarding the matrix $T_{MAT}$ and matrix $P_{MAT}$ are included in the normal equation table supplied from the normal equation generating unit 5305. Accordingly, the approximation function generating unit 5306 computes the matrix $W_{MAT}$ by computing the matrix in the right side of Expression (285) using the normal equation table, and outputs the computed results (features $w_i$) to the image generating unit 103.

In step S5307, the approximation function generating unit 5306 determines regarding whether or not the processing of all the pixels has been completed.

In step S5307, in the event that determination is made that the processing of all the pixels has not been completed, the processing returns to step S5302, wherein the subsequent processing is repeatedly performed. That is to say, the pixels that have not become a pixel of interest are sequentially taken as a pixel of interest, and the processing in step S5302 through S5307 is repeatedly performed.

In the event that the processing of all the pixels has been completed (in step S5307, in the event that determination is made that the processing of all the pixels has been completed), the estimating processing of the actual world 1 ends.

As description of the two-dimensional approximating method employing a discontinuous function, an example for calculating the features $w_i$ of the approximation function f(x, y) corresponding to the spatial directions (X direction and Y direction) has been employed, but the two-dimensional approximating method employing a discontinuous function can be applied to the temporal and spatial directions (X direction and T direction, or Y direction and T direction) as well.

That is to say, the above example is an example in the case of the light signal in the actual world 1 having continuity in the spatial direction, and accordingly, the equation including two-dimensional integration in the spatial directions (X direction and Y direction), such as shown in the above Expression (277). However, the concept regarding two-dimensional integration can be applied not only to the spatial direction but also to the time-space directions (X direction and T direction, or Y direction and T direction).

In other words, with the two-dimensional approximating method employing a discontinuous function, even in the case in which the light signal function F(x, y, t), which needs to be estimated, has not only continuity in the spatial direction but also continuity in the time-space directions (however, X direction and T direction, or Y direction and T direction), this can be approximated with a two-dimensional discontinuous function.

Specifically, for example, in the event that an object (toy plane in the drawing) Dl (image in the bottom frame in the drawing) such as shown in FIG. 372 moves horizontally in the X direction at uniform velocity to an object D2 (image in the middle frame in the drawing), movement of the object is represented with like a track L1 in the X-T plane such as shown in the upper portion of FIG. 372. Note that the upper portion of FIG. 372 illustrates change in the pixel value on the surface wherein OPQR in the drawing are taken as apexes.

In other words, it can be said that the track L1 represents the direction of continuity in the time-space directions in the X-T plane. Accordingly, the data continuity detecting unit 101 can output a traced angle such as shown in FIG. 372 (strictly speaking, though not shown in the drawing, an angle between the direction of data continuity serving as a tack (the above movement) when the object moves from D1 to D2 and the X direction in the spatial direction) as data continuity information corresponding to the gradient (angle as continuity) representing continuity in the time-space directions in the X-T plane as well as the above angle θ (data continuity information corresponding to continuity in the spatial directions represented with a certain gradient (angle) in the X-Y plane).

Accordingly, the actual world estimating unit 102 employing the approximation technique using the two-dimensional discontinuous function can compute the features $w_i$ of an approximation function f(x, t) in the same method as the above method by employing the movement θ instead of the angle θ. However, in this case, the equation to be employed is not the above Expression (277) but the following Expression (286).

$$P(x, t) = \int_{t_s}^{t_e} \int_{x_s}^{x_e} f(x, t) dx dt \tag{286}$$

In the event of the processing on the X-T plane, the relationship between each pixel and the discontinuous function shown in the right portion of FIG. 371 becomes like that shown in FIG. 373. That is to say, in FIG. 373, the cross-sectional shape in the spatial direction X (cross-sectional shape with the discontinuous function) continues in a certain continuity direction as to the frame direction T. Consequently, in the event that the levels are five types of levels $w_1$ through $W_5$, the band, which becomes the same level as shown in the left portion of FIG. 371, is distributed in the continuity direction.

Accordingly, in this case, a pixel value can be obtained by employing a pixel present on the X-T plane such as shown in the right portion of FIG. 373. Note that in the right portion of FIG. 373, each grid represents a pixel, and the X direction represents the width of a pixel, but with regard to the frame direction, each grid increment is equivalent to one frame.

Also, an approximation function f(y, t) focusing attention on the spatial direction Y instead of the spatial direction X can be handled in the same way as the above approximation function f(x, t).

Description has been made regarding a method for setting a two-dimensional approximation function made up of a discontinuous function, and estimating the actual world so far, but further, a three-dimensional approximation function made up of a discontinuous function enables the actual world to be estimated as well.

For example, let us consider a two-dimensional discontinuous function, which is different for each region, such as shown in FIG. 374. That is to say, in the case of FIG. 374, when a region is $a_1 \leqq x < a_2$, and also $b_1 \leqq y < b_2$, the approximation function is $f(x, y) = w_1$, when a region is $a_2 \leqq x < a_3$, and also $b_3 \leqq y < b_4$, the approximation function is $f(x, y) = w_2$, when a region is $a_3 \leqq x < a_4$, and also $b_5 \leqq y < b_6$, the approximation function is $f(x, y) = W_3$, when a region is $a_4 \leqq x < a_5$, and also $b_7 \leqq y < b_8$, the approximation function is $f(x, y) = W_4$, and further, when a region is $a_3 \leqq x < a_4$, and also $b_9 \leqq y < b_{10}$, the approximation function is $f(x, y) = W_5$, thus the different approximation function f(x, y) is set for each region. Also, it can be conceived that $w_i$ is essentially a level of the light intensity for each region.

Thus, the discontinuous function such as shown in FIG. 374 is defined as the following Expression (287) serving as a general equation.

$$f(x, y)=wi(a_j \leqq x<a_{j+1} \ \& \ b_{2k-1} \leqq y<b_{2k}) \quad (287)$$

Note that j and k are arbitrary integers, but i is a sequential number for identifying a region, which can be expressed by a combination of j and k.

Thus, a cross-sectional distribution (corresponding to a cross-sectional curve) such as shown in FIG. 374 is set as a constant for each region.

Accordingly, a pixel value P(x, y) can be obtained with the following Expression (288) by employing the approximation function f(x, y) made up of a discontinuous function in the actual world, which is defined as in Expression (287).

$$P(x, y)=\int_{y_s}^{y_e}\int_{x_s}^{x_e} f(x, y)dxdy \quad (288)$$

Here, $x_e$ and $x_s$ represent an integral range in the X direction, wherein $x_s$ represents an integration start position in the X direction, and $x_e$ represents an integration end position in the X direction respectively. Similarly, $y_e$ and $y_s$ represent an integral range in the Y direction, wherein $y_s$ represents an integration start position in the Y direction, and $y_e$ represents an integration end position in the Y direction respectively.

However, it is difficult to directly obtain a function which approximates the actual world, such as shown in the above Expression (287), in actual practice.

We can assume that the cross-sectional distribution of pixel values such as shown in FIG. 374 continuously exists as to the continuity direction in the frame direction, so that the distribution of the light intensity in the space becomes like that shown in FIG. 375. The left portion of FIG. 375 illustrates the distribution of pixel values on the X-T plane in the case in which the approximation function f(x, y) made up of a discontinuous function continuously exists in the continuity direction of the frame direction and the X direction, and the right portion of FIG. 374 illustrates a distribution wherein the cross-section of the light intensity level on the X-Y plane continues in the frame direction.

That is to say, a state in which the cross-sectional shape shown in FIG. 374 continues in the continuity direction is provided, so the region of each level $w_i$ distributes in a rod shape in the continuity direction such as shown in the right portion of FIG. 375.

In order to determine the pixel value of each three-dimensional region using the approximation function f(x, y) defined by a discontinuous function such as shown in the right portion of FIG. 375, with the above two-dimensions, a proportion according to a volume is employed for computation, as with the method employing an area. That is to say, of the total volume (three-dimensional volumes made up of the X direction, Y direction, and T direction) of each pixel, the sum of products of weight according to the proportion of volumes occupied by a range wherein each level is set, and the level thereof is obtained, the pixel value of the corresponding pixel is employed, thereby obtaining the pixel value of each region with the least square method.

That is to say, as shown in FIG. 376, let us say that the level of one region is f(x, y)=$w_1$, and the level of the other region is f(x, y)=$w_2$, with a boundary R as a boundary. Also, let us say that a cube made up of ABCDEFGH in the drawing in the XYT space represents a pixel of interest. Further, let us say that the cross-section with the boundary R in the pixel of interest is a rectangle made up of IJKL.

Also, let us say that of the volume of the pixel P, the proportion occupied by a portion serving as a triangle pole made up of IBJ-KFL is represented with M1, and the proportion occupied by the volumes of the portions other than that (pentangular pole made up of ADCJI-EGHLK) is represented with M2. Note that the term "volume" here means represents the magnitude of an occupied region on the XYt space.

At this time, the pixel value P of the pixel of interest is represented with the sum of products of the pixel value of each range and the proportion, and accordingly, can be obtained by the computation shown in the following Expression (289).

$$P=M1\times w_1+M2\times w_2 \quad (289)$$

Accordingly, the levels of pixel values can be obtained by generating an expression indicating the relationship as to pixel values regarding each pixel using the relationship shown in Expression (289), for example, in order to obtain $w_1$ through $w_2$ as coefficients indicating pixel values, if Expression (289) indicating the relationship with the pixel values of at least two pixels including each coefficient can be obtained, it becomes possible to obtain $w_1$ through $w_2$ indicating the levels of the pixel values using the least square method (simultaneous equations in the event that the number of relational expressions are the same as the number of unknowns).

Thus, it becomes possible to obtain the approximation function f(x, y) made up of a discontinuous function by employing the three-dimensional relationship with continuity.

For example, velocities $v_x$ and $v_y$ (essentially, the gradients of the X-T plane and Y-T plane) on the X-T plane and in an Y-T plane shape can be obtained based on the movement θ which is equivalent to the angle θ as continuity in an X-Y planar shape output from the continuity detecting unit 101, and accordingly, a position $x_1$ in the X direction and a position $y_1$ in the X direction of the straight line of continuity at an arbitrary position (x, y) in the X direction and Y direction are represented as in the following Expression (290).

$$x_1=v_x\times t,\ y_1=v_y\times t \quad (290)$$

That is to say, a point on the straight line corresponding to continuity of data is represented with a coordinate value ($x_1$, $y_1$).

According to Expression (290), cross-sectional direction distances x' and y' (shifted distances in the X direction and Y direction along the straight line where continuity exists) are represented as in the following Expression (291).

$$x'=x-x_1=x-v_x\times t\ y'=y-y_1=y-v_y\times t \quad (291)$$

Accordingly, the approximation function f(x, y) at an arbitrary position (x, y) in the input image is represented as in the following Expression (292) according to Expression (287) and Expression (291).

$$f(x, y, t)=w_i(a_j \leqq (x-v_x\times t)<a_{j+1} \ \& \ b_{2k-1} \leqq (y-v_y\times t)<b_{2k}) \quad (292)$$

Accordingly, if the actual world estimating unit 102 can compute the features $w_i$ for each region of Expression (292), the actual world estimating unit 102 can estimate a waveform F(x, y, t) by estimating an approximation function f(x, y, t) made up of a discontinuous function.

Consequently, hereafter, description will be made regarding a method for computing the features $w_i$ of Expression (292).

That is to say, upon the approximation function f(x, y, t) represented with Expression (292) being subjected to integration with an integral range (integral range in the spatial direction) corresponding to a pixel (the detecting element of the sensor 2), the integral value becomes the estimated value regarding the pixel value of the pixel. It is the following Expression (293) that this is represented with an equation.

$$P(x, y, t) = \int_{x_s}^{x_e} \int_{y_s}^{y_e} \int_{t_s}^{t_e} f(x, y, t) dx dy dt \quad (293)$$

In Expression (293), P(x, y, t) represents the pixel value of a pixel of which the center position is in a position (x, y, t) (relative position (x, y, t) from the pixel of interest) of an input image from the sensor 2.

Thus, with the three-dimensional approximating method, the relationship between the input pixel value P(x, y, t) and the three-dimensional approximation function f(x, y, t) made up of a discontinuous function can be represented with Expression (293), and accordingly, the actual world estimating unit 102 can estimate the three-dimensional function F(x, y, t) (waveform F(x, y, t) wherein the light signal in the actual world 1 having continuity in the spatial direction is represented focusing attention on the time-space directions) by computing the features $w_i$ with, for example, the least square method or the like using Expression (293).

Next, description will be made regarding the configuration of the actual world estimating unit 102, which sets the three-dimensional approximation function f(x, y, t) made up of a discontinuous function as described above, and estimates the actual world, with reference to FIG. 377.

As shown in FIG. 377, the actual world estimating unit 102 includes a condition setting unit 5321, input image storing unit 5322, input pixel value acquiring unit 5323, integration component computing unit 5304, normal equation generating unit 5325, and approximation function generating unit 5326.

The condition setting unit 5321 sets a pixel range (tap range) used for estimating the function F(x, y, t) corresponding to a pixel of interest, and the range (e.g., width of $a_j \leqq (x-v_x \times t) < a_{j+1}$ & $b_{2k-1} \leqq (y-v_y \times t) < b_{2k}$, the number of i) of the approximation function f(x, y, t).

The input image storing unit 5322 temporarily stores an input image (pixel values) from the sensor 2.

The input pixel value acquiring unit 5323 acquires, of the input images stored in the input image storage unit 5322, an input image region corresponding to the tap range set by the condition setting unit 5321, and supplies this to the normal equation generating unit 5325 as an input pixel value table. That is to say, the input pixel value table is a table in which the respective pixel values of pixels included in the input image region are described. Note that a specific example of the input pixel value table will be described later.

Incidentally, as described above, the actual world estimating unit 102 employing the three-dimensional approximating method computes the features $w_i$ of the approximation function f(x, y, t) represented with the above Expression (292) by solving the above Expression (293) using the least square method.

Expression (293) can be represented as in the following Expression (294).

$$P(x, y, t) = \sum_{i=0}^{n} w_i T_i(x_s, x_e, y_s, y_e, t_s, t_e) \quad (294)$$

In Expression (294), $T_i(x_s, x_e, y_s, y_e, t_s, t_e)$ represents, of the regions serving as an integral range, the integration result of the region serving as the features $w_i$ (region serving as the light levels $w_i$), i.e., volumes. Hereafter, $T_i(x_s, x_e, y_s, y_e, t_s, t_e)$ is referred to as integral components. Note that this Expression (294) corresponds to the integral components $T_i(x_s, x_e, y_s, y_e)$ in a two-dimensional arithmetic operation.

The integration component computing unit 5324 computes the integral components $T_i(x_s, x_e, y_s, y_e, t_s, t_e)$ (=(x−0.5, x+0.5, y−0.5, y+0.5, t−0.5, t+0.5): in the case of acquiring one pixel worth region).

Specifically, the integral components $T_i(x_s, x_e, y_s, y_e, t_s, t_e)$ shown in Expression (294) are for obtaining the volumes of the predetermined features $w_i$, of the pixels to be obtained, as described with reference to FIG. 376. Accordingly, the integration component computing unit 5324 may obtain $T_i(x_s, x_e, y_s, y_e, t_s, t_e)$ by obtaining volumes occupied for each features $w_i$ geometrically based on the widths d and e for each features and the continuity direction information (e.g., the angle θ as to a certain axis of continuity), or by performing multiple division and integration according to the Simpson's rule, rather, a method for obtaining volumes is not restricted to those, for example, volumes may be obtained by the Monte Carlo Method.

As described in FIG. 376, the features $w_i$ can be computed as long as the width of $a_j \leqq (x-v_x \times t) < a_{j+1}$ & $b_{2k-1} \leqq (y-v_y \times t) < b_{2k}$, and the continuity direction information (e.g., the velocities $v_x$ and $v_y$, or the angle θ as to a certain axis of continuity), and the relative pixel positions (x, y, t) are known. Of these, the relative pixel positions (x, y, t) are determined with a pixel of interest, and a tap range, the continuity information is determined with the information detected by the continuity detecting unit 101, and the width of $a_j \leqq (x-v_x \times t) < a_{j+1}$ & $b_{2k-1} \leqq (y-v_y \times t) < b_{2k}$ is set beforehand, and accordingly, each value becomes a known value.

Accordingly, the integration component computing unit 5324 computes the integral components $T_i$(x−0.5, x+0.5, y−0.5, y+0.5, t−0.5, t+0.5) based on the tap range and the width set by the condition setting unit 5321, and the data continuity information output from the data continuity detecting unit 101, and supplies the computed results to the normal equation generating unit 5325 as an integration component table.

The normal equation generating unit 5325 generates a normal equation in the case of obtaining the above Expression (293), i.e., Expression (294) by the least square method using the input pixel value table supplied from the input pixel value acquiring unit 5323, and the integration component table supplied from the integration component computing unit 5324, and outputs this to the approximation function generating unit 5326 as a normal equation table.

The approximation function generating unit 5326 computes the respective features $w_i$ of the above Expression (294) by solving the normal equation included in the normal equation table supplied from the normal equation generating unit 5325 using the matrix solution, and output these to the image generating unit 103.

Next, description will be made regarding the actual world estimating processing (processing in step S102 in FIG. 40) to which the three-dimensional approximating method employing a discontinuous function is applied, with reference to the flowchart in FIG. 378.

For example, let us say that the light signal in the actual world 1 having continuity in the time-space directions represented with the velocities $V_x$ and $V_y$ as to the X-t plane and Y-t plane has been detected by the sensor 2, and has been stored in the input image storing unit 5322 as an input image corresponding to one frame. Also, let us say that the data continuity detecting unit 101 has obtained the velocities $V_x$ and $V_y$ as the data continuity information of the input image in the continuity detecting processing in step S101 (FIG. 406).

In this case, in step S5321, the condition setting unit 5321 sets conditions (a tap range, the width of $a_j \leqq (x-v_x \times t) < a_{j+1}$ & $b_{2k-1} \leqq (y-v_y \times t) < b_{2k}$ (the same features (the widths d and e of regions which becomes the same approximation function)), and the number of i).

For example, let us say that the tap range shown in FIG. 379 has been set, and also width in the horizontal direction×width in the vertical direction=d×e has been set as widths.

The set tap range is assumed to be that shown in FIG. 379, for example. In FIG. 379, the X direction and Y direction represent the X direction and Y direction of the sensor 2. Also, t represents a frame number, and the tap range represents a pixel group made up of 27 pixels in total of pixels P0 through P26 serving as 9 pixels per frame×3 frames as shown in the right portion of FIG. 379.

Further, as shown in FIG. 379, a pixel of interest is assumed to be set to the pixel P13 on the center portion in the frame number t=n in the drawing. Also, let us say that each pixel is denoted with a number l such as shown in FIG. 379 (l is any integer value of P0 through P26) according to the relative pixel positions (x, y, t) from the pixel of interest (a coordinate value of a pixel-of-interest coordinates system wherein the center (0, 0, 0) of the pixel of interest is taken as the origin).

Now, description will return to FIG. 378, wherein in step S5322, the condition setting unit 5321 sets a pixel of interest.

In step S5323, the input pixel value acquiring unit 5323 acquires an input pixel value based on the condition (tap range) set by the condition setting unit 5321, and generates an input pixel value table. That is to say, in this case, the input pixel value acquiring unit 5323 acquires the pixel values of the pixels in the input image region (pixels denoted with the numbers P0 through P26 in FIG. 379), and generates a table made up of 27 input pixel values P(l) as an input pixel value table.

In step S5324, the integration component computing unit 5324 computes integral components based on the conditions (a tap range, width, and the number of i) set by the condition setting unit 5321, and the data continuity information supplied from the data continuity detecting unit 101, and generates an integration component table.

In this case, the integration component computing unit 5324 computes the integral components $T_i(x_s, x_e, y_s, y_e, t_s, t_e)$ $(=T_i(x-0.5, x+0.5, y-0.5, y+0.5, t-0.5, t+0.5)$: in the case of expressing one pixel size as X direction×Y direction×frame direction t=1×1×1) in the above Expression (294) as a function of l such as the integral components $T_i(l)$ shown in the left side of the following Expression (295).

$$T_i(l)=T_i(x-0.5,\ x+0.5,\ y-0.5,\ y+0.5,\ t-0.5,\ t+0.5) \qquad (295)$$

That is to say, in this case, if i is assumed to be 0 through 5, the 162 $T_i(l)$ in total of the 27 $T_0(l)$, 27 $T_1(l)$, 27 $T_2(l)$, 27 $T_3(l)$, 27 $T_4(l)$, and 27 $T_5(l)$ are computed, and an integration component table including these is generated.

Note that the sequence of the processing in step S5323 and the processing in step S5324 is not restricted to the example in FIG. 378, the processing in step S5324 may be executed first, or the processing in step S5323 and the processing in step S5324 may be executed simultaneously.

Next, in step S5325, the normal equation generating unit 5325 generates a normal equation table based on the input pixel value table generated by the input pixel value acquiring unit 5323 at the processing in step S5323, and the integration component table generated by the integration component computing unit 5324 at the processing in step S5324.

Specifically, in this case, the features $w_i$ are computed with the least square method using the above Expression (295), so a normal equation corresponding to this is represented as in the following Expression (296).

$$\begin{pmatrix} \sum_{l=1}^{L} v_l T_0(l) T_0(l) & \sum_{l=1}^{L} v_l T_0(l) T_1(l) & \cdots & \sum_{l=1}^{L} v_l T_0(l) T_n(l) \\ \sum_{l=1}^{L} v_l T_1(l) T_0(l) & \sum_{l=1}^{L} v_l T_1(l) T_1(l) & \cdots & \sum_{l=1}^{L} v_l T_1(l) T_n(l) \\ \vdots & \vdots & \ddots & \vdots \\ \sum_{l=1}^{L} v_l T_n(l) T_0(l) & \sum_{l=1}^{L} v_l T_n(l) T_1(l) & \cdots & \sum_{l=1}^{L} v_l T_n(l) T_n(l) \end{pmatrix} \begin{pmatrix} w_0 \\ w_1 \\ \vdots \\ w_n \end{pmatrix} = \begin{pmatrix} \sum_{l=1}^{L} v_l T_0(l) P(l) \\ \sum_{l=1}^{L} v_l T_1(l) P(l) \\ \vdots \\ \sum_{l=1}^{L} v_l T_n(l) P(l) \end{pmatrix} \qquad (296)$$

Note that in Expression (296), L represents the maximum value of the pixel number l in the tap range. n represents the number of i of the features $w_i$ which defines the approximation function f(x). $v_1$ represents weight. Specifically, in this case, L=27.

This normal equation is the same format as the above Expression (280), and employs the same technique as that in the above two-dimensional method, so the description regarding the solutions of the subsequent normal equations is omitted.

In step S5327, the approximation function generating unit 5326 determines regarding whether or not the processing of all the pixels has been completed.

In step S5327, in the event that determination is made that the processing of all the pixels has not been completed, the processing returns to step S5322, wherein the subsequent processing is repeatedly performed. That is to say, the pixels that have not become a pixel of interest are sequentially taken as a pixel of interest, and the processing in step S5322 through S5327 is repeatedly performed.

In the event that the processing of all the pixels has been completed (in step S5327, in the event that determination is made that the processing of all the pixels has been completed), the estimating processing of the actual world 1 ends.

As a result, for example, as shown in FIG. 380, the levels (discontinuous functions) $w_1$ through $W_5$ serving as the respective features are set for each rod-shaped region drawn with a thick line in the direction of continuity (the velocity in the X direction is $v_x$, and the velocity in the Y direction is $v_y$), and the approximation function of the actual world is estimated. In this case, with each rod-shaped region, the cross-sectional size thereof as to the X-Y plane is d×e.

Also, the rod-shaped regions drawn with a fine line indicate the case in which the velocity in the Y direction is $v_y$=0. That is to say, in the event of simply moving in the horizontal direction, the rod-shaped regions to which the respective levels wi are set keep the parallel relationship as to the X-t plane. This can be applied to the case in which the velocity in the X direction is $v_x=0$. That is to say, in this case, each rod-shaped region keeps the parallel relationship as to the Y-t plane.

Further, in the event that there is no change in the temporal direction but continuity on the X-Y plane, the rod-shaped region for each function keeps a position in parallel to the X-Y plane. In other words, in the event that there is no change in the temporal direction but continuity on the X-Y plane, there is a fine line or two-valued edge.

Also, description has been made regarding the case in which each region to which a function is discontinuously set is disposed in the two-dimensional space (rod-shaped regions are disposed so as to make up a plane) so far, but as shown in FIG. 381, each region may be disposed within the three-dimensional space of XYT in a stereoscopic manner, for example.

Also, with the above examples, description has been made regarding the case in which the constant features $w_i$ are set as a discontinuous function for each region, but the sameness may be realized even in the event of employing a non-constant continuous function. That is to say, for example, as shown in FIG. 382, when a function as to the X direction is employed, an arrangement may be made wherein the features $w_1$ is set to $w_1=f_0(x)$ with the region of $X\mathbf{0} \leqq X < X\mathbf{1}$ in the image, and the features $w_2$ is set to $w_2=f_1(x)$ with the region of $X\mathbf{1} \leqq X < X\mathbf{2}$ in the image. Even an continuous function may be set as a different function for each region. In this case, a polynomial approximation function or a function other than that may be employed as a function to be set.

Further, in the event that constant features $w_i$ are set for each region as a discontinuous function, a function, which cannot be continued at all at each region, may be set. That is to say, for example, as shown in FIG. 383, when a function as to the X direction is employed, an arrangement may be made wherein the features $w_1$ is set to $w_1=f_0(x)$ with the region of $X\mathbf{0} \leqq X < X\mathbf{1}$ in the image, and the features $w_2$ is set to $w_2=f_1(x)$ with the region of $X\mathbf{1} \leqq X < X\mathbf{2}$ in the image, whereby the same processing can be performed even if the respective functions (e.g., $f_0(x)$ and $f_1(x)$) are discontinuous. In this case, a polynomial approximation function or a function other than that may be employed as a function to be set.

Thus, the actual world estimating unit 102 shown in FIG. 377 can set an approximation function of the actual world by setting a function discontinuously for each rod-shaped region in the direction of continuity (angle or movement (the direction of velocity which can be obtained from movement)) in the event of setting each pixel value with a discontinuous function.

Next, description will be made regarding the image generating unit 103, which generates an image based on the actual world estimation information estimated by the actual world estimating unit 102 shown in the above FIG. 369.

The image generating unit 103 shown in FIG. 384 comprises an actual world estimation information acquiring unit 5341, weighting calculating unit 5342, and pixel generating unit 5343.

The actual world estimation information acquiring unit 5341 acquires features serving as the actual world estimation information output from the actual world estimating unit 102 shown in FIG. 369, i.e., a function (approximation function f(x) made up of a discontinuous function), which sets a pixel value set for each region divided in the direction of continuity, and outputs this to the weighting calculating unit 5342.

The weighting calculating unit 5342 calculates the area ratio of each region included in the pixel to be generated as weight based on the information of the regions divided in the direction of continuity, which is the actual world estimation information input from the actual world estimation information acquiring unit 5341, outputs the calculated results to the pixel generating unit 5343 as well as the information of functions set for each region, which is input from the actual world estimation information acquiring unit 5341.

The pixel generating unit 5343 obtains a level based on the information of weight calculated based on the area ratio for each region included in the pixel to be generated, which is input from the weighting calculating unit, and the function (approximation function f(x) made up of a discontinuous function) of the level set for each region, obtains the sum of products of the level and weight obtained for each pixel to be generated, and outputs this as the pixel value of the pixel.

Next, description will be made regarding the image generating processing by the image generating unit 103 shown in FIG. 384 with reference to the flowchart shown in FIG. 385.

In step S5341, the actual world estimation information acquiring unit 5341 acquires the actual world estimation information (approximation function f(x) made up of a discontinuous function) input from the actual world estimating unit 102 shown in FIG. 369, and outputs this to the weighting calculating unit 5342.

The weighting calculating unit 5342 sets a pixel to be generated in step S5342, obtains the area ratio as to the pixel to be generated for each set region included in the pixel to be generated based on the input actual world estimation information in step S5343, calculates this as weight for each region, and outputs this to the pixel generating unit 5343 as well as the function, which sets a level for each region input from the actual world estimation information acquiring unit 5341.

Description will be made regarding the case in which features are set, as shown in FIG. 386, for example. Let us say that the pixels of the input image are illustrated with fine-line grids, and a pixel to be generated is illustrated with thick-line grids. That is to say, in this case, a quadruple-density pixel is generated. Also, let us say that five regions set in a band shape having a slope up to right as to a pixel array illustrated with $w_1$ through $w_5$ are regions set in the direction of continuity, and the level of each region is $w_1$ through $w_5$.

In the event that the pixel painted in a hatched shape shown in FIG. 386 is assumed to be a pixel of interest to be generated, the pixel of interest extends over the regions $w_3$ and $w_4$, and accordingly, when the areas occupied by each region within the pixel of interest are $m_1$ and $m_2$ respectively, as for the weight to be generated, when the area of a pixel to be generated is m, the weight of the region $w_3$ becomes $m_1/m$, and the weight of the region $w_4$ becomes $m_2/m$ respectively. Thus, the weighting calculating unit 5342 outputs the information of weight obtained for each region, and the information of a function, which sets the level of each region, to the pixel generating unit 5343.

In step S5344, the pixel generating unit 5343 determines a pixel value based on the weight for each region which the pixel of interest extends over, input from the weighting calculating unit 5342, and the level for each region, and generates a pixel.

That is to say, in the event of the pixel of interest described with reference to FIG. 386, the pixel generating unit 5343 acquires the information that the region $W_3$ is $m_1/m$, and the region $w_4$ is $m_2/m$ as each weight information. Further, the pixel generating unit 5343 obtains the sum of products with the level for each region acquired at the same time to determine a pixel value, and generates a pixel.

That is to say, for example, in the event that the approximation function, which determines the levels of the regions $w_3$ and $w_4$, are $w_3$ and $w_4$ (both are constants), a pixel value such as shown in the following Expression (297) is determined by obtaining the sum of products with weight.

$$P=w_3 \times m_1/m+w_4 \times m_2/m \quad (297)$$

In step S5345, the actual world estimation information acquiring unit 5341 determines regarding whether or not the processing has been completed as to all of the pixels of the image to be generated, and in the event that determination is made that the processing has not been completed as to all of the pixels, the processing returns to step S5342, wherein the subsequent processing is repeatedly performed. In other words, the processing in steps S5342 through S5345 is repeatedly performed until determination is made that the processing has been completed as to all of the pixels.

In step S5345, in the event that determination is made that the processing has been completed as to all of the pixels, the processing thereof ends.

That is to say, for example, in the event that an object moves in the horizontal direction, temporally in the right direction, it has been known that as for actual change in a pixel value in the X-T space in the actual world, regions indicating the same pixel value level continue in the direction of continuity, as shown in A of FIG. 387. Consequently, upon a higher density pixel being generated using the model such as shown in B of FIG. 387, the shape of the pixel cannot express actual linear movement having a slope up to the right, and accordingly, for example, when attempting to generate an enlarged image, an accurate pixel value cannot be reflected upon the pixel generation of the enlarged image around a boundary where a pixel value changes due to change in a pixel value disposed geometrically in a staircase pattern.

Conversely, with the model in estimation of an approximation function of the actual world by the actual world estimating unit 102 shown in FIG. 369, as shown in C of FIG. 387, a model, which is faithful regarding actual movement, is generated in the direction of continuity, and accordingly, change in a pixel level or less can be accurately expressed, thereby enabling a high-density pixel used for an enlarged image to be accurately generated, for example.

According to the above processing, a pixel can be generated taking a light intensity distribution in a region of a pixel level or less into consideration, and it becomes possible to generate a higher density pixel, thereby enabling an enlarge image to be generated photographically, for example.

Next, description will be made regarding the image generating unit 103, which generates an image based on the actual world estimation information estimated by the actual world estimating unit 102 shown in the above FIG. 377, with reference to FIG. 388.

The image generating unit 103 shown in FIG. 388 comprises an actual world estimation information acquiring unit 5351, weighting calculating unit 5352, and pixel generating unit 5353.

The actual world estimation information acquiring unit 5351 acquires features serving as the actual world estimation information output from the actual world estimating unit 102 shown in FIG. 377, i.e., a function (approximation function f(x) made up of a discontinuous function), which sets a pixel value set for each region divided in the direction of continuity, and outputs this to the weighting calculating unit 5352.

The weighting calculating unit 5352 calculates the volume ratio of each region included in the pixel to be generated as weight based on the information of the regions divided in the direction of continuity, which is the actual world estimation information input from the actual world estimation information acquiring unit 5351, and outputs the calculated results to the pixel generating unit 5353 as well as the information of functions set for each region, which is input from the actual world estimation information acquiring unit 5351.

The pixel generating unit 5353 obtains a level based on the information of weight calculated based on the volume ratio for each region included in the pixel to be generated, which is input from the weighting calculating unit, and the function (approximation function f(x) made up of a discontinuous function) of the level set for each region, obtains the sum of products of the level and weight obtained for each pixel to be generated, and outputs this as the pixel value of the pixel thereof.

Next, description will be made regarding the image generating processing by the image generating unit 103 shown in FIG. 388 with reference to the flowchart shown in FIG. 389.

In step S5351, the actual world estimation information acquiring unit 5351 acquires the actual world estimation information (approximation function f(x) made up of a discontinuous function) input from the actual world estimating unit 102 shown in FIG. 377, and outputs this to the weighting calculating unit 5352.

The weighting calculating unit 5342 sets a pixel to be generated in step S5352, obtains the volume ratio as to the pixel to be generated for each set region included in the pixel to be generated based on the input actual world estimation information in step S5353, calculates this as weight for each region, and outputs this to the pixel generating unit 5353 as well as the function, which sets a level for each region input from the actual world estimation information acquiring unit 5351.

For example, as shown in FIG. 390, let us say that a pixel of interest is set as a pixel to be generated within the three-dimensional space of the X direction, Y direction, and frame direction T. Note that in FIG. 390, a cube expressed with a thick line is the pixel of interest. Also, cubes drawn with a fine line represent pixels adjacent to the pixel of interest.

Description will be made regarding the case in which features are set, as shown in FIG. 391, for example. Let us say that three regions set in a rod shape illustrated with $w_1$ through $w_3$ are regions set in the direction of continuity, and the level of each region is $w_1$ through $w_3$.

As shown in FIG. 391, the pixel of interest extends over the regions $w_3$ through $w_4$, and accordingly, when the volume occupied by each region within the pixel of interest are $M_1$ through $M_3$ respectively, as for the weight to be generated, when the volume of a pixel to be generated is M, the weight of the region $w_1$ becomes $M_1/M$, the weight of the region $w_2$ becomes $M_2/M$, and the weight of the region $m_3$ becomes $M_3/M$ respectively. Thus, the weighting calculating unit 5342 outputs the information of weight obtained for each region, and the information of a function, which sets the level of each region, to the pixel generating unit 5353.

In step S5354, the pixel generating unit 5353 determines a pixel value based on the weight for each region which the pixel of interest extends over, input from the weighting calculating unit 5342, and the level for each region, and generates a pixel.

That is to say, in the event of the pixel of interest described with reference to FIG. 391, the pixel generating unit 5353 acquires the information that the region $w_1$ is $M_1/M$, the region $w_2$ is $M_2/M$, and the region $w_3$ is $M_3/M$ as each weight information. Further, the pixel generating unit 5353 obtains the sum of products with the level for each region acquired at the same time to determine a pixel value, and generates a pixel.

That is to say, for example, in the event that the approximation function, which determines the levels of the regions $w_1$ through $w_3$, are $w_1$ through $w_3$ (all is a constant), a pixel value such as shown in the following Expression (298) is determined by obtaining the sum of products with weight.

$$P=w_1\times M_1/M+w_2\times M_2/M+w_3\times M_3/M \quad (298)$$

In step S5355, the actual world estimation information acquiring unit 5351 determines regarding whether or not the processing has been completed as to all of the pixels of the image to be generated, and in the event that determination is made that the processing has not been completed as to all of the pixels, the processing returns to step S5352, wherein the subsequent processing is repeatedly performed. In other words, the processing in steps S5352 through S5355 is repeatedly performed until determination is made that the processing has been completed as to all of the pixels.

In step S5355, in the event that determination is made that the processing has been completed as to all of the pixels, the processing thereof ends.

A through D of FIG. 392 illustrate the processing results in the case of generating a 16-powered density (quadruple density in the horizontal direction and in the vertical direction respectively) pixel as to the original image. A of FIG. 392 illustrates the original image, B of FIG. 392 illustrates the processing result by the conventional class classification adaptation processing, C of FIG. 392 illustrates the processing result by the approximation function of the actual world made up of the above polynomial, and further, D of FIG. 392 illustrates the processing result by the approximation function of the actual world made up of a discontinuous function respectively.

With the processing result by the approximation function of the actual world made up of a discontinuous function, it can be understood that a clear image with little blurring similar to the original image is generated.

Also, FIG. 393 illustrates, with the high density original image, a comparison between the processing result by the approximation function in the actual world made up of the above polynomial and the approximation function in the actual world made up of a discontinuous function after average pixel values of 4 pixels in the horizontal direction×4 pixels in the vertical direction are obtained, and further the space resolution is reduced to 1/16 with the pixel values of the 16 pixels thereof serving as the obtained average pixel values. Note that in FIG. 393, a solid line represents the original image, a dotted line represents the processing result by the approximation function in the actual world made up of a polynomial, a single-dot broken line represents the processing result by the approximation function in the actual world made up of a discontinuous function. Also, the horizontal axis in the drawing represents coordinate positions in the X direction, and the vertical axis represents pixel values.

It can be understood that the processing result by the approximation function in the actual world made up of a discontinuous function is more identical to the original image at x=651 through 655, and reproduces a pixel value accurately in generation of a 16-powered density pixel as compared to the processing result by the approximation function in the actual world made up of a polynomial.

According to the above processing, a pixel can be generated taking a light intensity distribution in a region of the pixel level or less into consideration, and a higher density pixel can be accurately generated, thereby enabling an enlarged image to be generated clearly, for example.

Further, as described above, according to the method for setting an approximation function in the actual world made up of a discontinuous function, even if movement blurring occurs in an image, this can be removed.

Now, description will be made regarding an input image and movement blurring with reference to FIG. 394 through FIG. 409.

FIG. 394 is a diagram for describing imaging by the sensor 2. The sensor 2 comprises, for example, a CCD video camera including a CCD (Charge-Coupled Device) area sensor serving as a solid-state imaging device, and the like. An object corresponding to the foreground in the real world moves between an object corresponding to the background in the real world and the sensor, e.g., horizontally from the left side to the right side in the drawing.

The sensor 2 takes an image of an object corresponding to the foreground as well as an object corresponding to the background. The sensor 2 outputs the taken image in increments of one frame. For example, the sensor 2 outputs an image of 30 frames per second. In this case, the exposure time of the sensor 2 can be made to be 1/30 seconds. The exposure time is the time from the sensor 2 starting conversion of input light into electric charge, to ending of the conversion of input light into electric charge. Hereafter, the exposure time will also be called shutter time.

FIG. 395 is a diagram describing placement of a pixel. In FIG. 395, A through I denote individual pixels. The pixels are placed on a plane corresponding to an image. A single detecting element corresponding to a single pixel is placed on the sensor 2. At the time of the sensor 2 taking an image, the one detecting element outputs one pixel value corresponding to the one pixel making up the image. For example, the position in the X direction X of the detecting element corresponds to the horizontal position on the image, and the position in the Y direction of the detecting element corresponds to the vertical position on the image.

As shown in FIG. 396, the detecting device which is a CCD for example, converts input light into electric charge during a period corresponding to the shutter time, and accumulates the converted charge. The amount of charge is approximately proportionate to the intensity of input light, and the amount of time that light is input. That is to say, the detecting device integrates the light to be input, and accumulates a change of an amount corresponding to the integrated light during a period corresponding to the shutter time.

The charge accumulated in the detecting device is converted into a voltage value by an unshown circuit, the voltage value is further converted into a pixel value such as digital data or the like, and is output. Accordingly, the individual pixel values output from the sensor 2 have a value projected on one-dimensional space, which is the result of integrating the portion having time-space expanse of an object corresponding to the foreground or background with regard to the time direction of the shutter time.

FIG. 397 is a diagram for describing an image obtained by taking an object corresponding to the moving foreground and an object corresponding to the background. A in FIG. 397 illustrates an image obtained by taking an object accompanying movement, and an object corresponding to the still background. With the example shown in A in FIG. 397, the object corresponding to the foreground moves horizontally from the left to the right as to the screen.

B in FIG. 397 is a model diagram wherein a pixel value corresponding to a single line of the image shown in A in FIG. 397 is extended in the time direction. The horizontal direction of B in FIG. 397 corresponds to the spatial direction X of A in FIG. 397.

With the pixels in the background region, the pixel values thereof comprise the background components alone, i.e., only the components of the image corresponding to the background object. With the pixels in the foreground region, the pixel values thereof comprise the foreground components alone, i.e., only the components of the image corresponding to the foreground object.

With the pixels in the mixed region, the pixel values thereof comprise the foreground components and the background components. The mixed region can also be referred to as a strain region since the pixel values thereof comprise the foreground components and the background components. The mixed region is further classified into a covered background region and an uncovered background region.

The covered background region is a mixed region in a position corresponding to the front end portion in the direction of movement of the foreground object as to the foreground region, i.e., a region of which the background components are covered up by the foreground according to elapsed time.

On the other hand, the uncovered background region is a mixed region in a position corresponding to the rear end portion in the direction of movement of the foreground object as to the foreground region, i.e., a region of which the background components emerge according to elapsed time.

FIG. 398 is a diagram for describing the background region, foreground region, mixed region, covered background region, and uncovered background region, as described above. In the event of correlating those with the image shown in FIG. 397, the background region is a still portion, the foreground region is a movement portion, the covered background region of the mixed region is a portion, which is changed from the background to the foreground, and the uncovered background region of the mixed region is a portion, which is changed from the foreground to the background.

FIG. 399 is a model diagram wherein the pixel values of the pixels arrayed adjacently in a row in the image obtained by taking an object corresponding to the still foreground, and an object corresponding to the still background. For example, pixels arrayed on one line of the screen can be selected as pixels arrayed adjacently in a row.

The pixel values F01 through F04 shown in FIG. 399 are the pixel values of the pixels corresponding to the still foreground object. The pixel values B01 through B04 shown in FIG. 399 are the pixel values of the pixels corresponding to the still background object.

The vertical direction in FIG. 399 corresponds to time, wherein time elapses from top down in the drawing. The upper side position of a rectangle in FIG. 399 corresponds to a point-in-time for the sensor 2 starting conversion of the input light to electric charge, and the lower side position of a rectangle in FIG. 399 corresponds to a point-in-time for the sensor 2 completing conversion of the input light to electric charge. That is to say, the distance from the upper side to the lower side of a rectangle corresponds to shutter time.

Description will be made below regarding the case in which shutter time and a frame interval are the same as an example.

The horizontal direction in FIG. 399 corresponds to the spatial direction X described in FIG. 397. More specifically, with the example shown in FIG. 399, the distance from the left side of the rectangle denoted with "F01" to the right side of the rectangle denoted with "B04" in FIG. 399 is octuple a pixel pitch, i.e., corresponds to the interval of consecutive eight pixels.

In the event that the foreground object and background object are still, the light to be input to the sensor 2 does not change during a period corresponding to the shutter time.

Now, the period corresponding to the shutter time is divided into two or more periods having the same length. The number of virtual division is set corresponding to amount-of-movement v within the shutter time of an object corresponding to the foreground. For example, as shown in FIG. 400, the number of virtual division is set to four corresponding to the amount-of-movement v, which is four, so that the period corresponding to the shutter time is divided into four.

The top line in FIG. 400 corresponds to the first period following the shutter opening. The second line from the top in the drawing corresponds to the second period following the shutter opening. The third line from the top in the drawing corresponds to the third period following the shutter opening. The fourth line from the top in the drawing corresponds to the fourth period following the shutter opening.

Hereafter, the shutter time divided corresponding to the amount-of-movement v is also referred to as shutter time/v.

When the object corresponding to the foreground is still, the light to be input to the sensor 2 does not change, so that the foreground component F01/v is equal to a value obtained by dividing the pixel value F01 by the number of virtual division. Similarly, when the object corresponding to the foreground is still, the foreground component F02/v is equal to a value obtained by dividing the pixel value F02 by the number of virtual division, the foreground component F03/v is equal to a value obtained by dividing the pixel value F03 by the number of virtual division, and the foreground component F04/v is equal to a value obtained by dividing the pixel value F04 by the number of virtual division.

When the object corresponding to the background is still, the light to be input to the sensor 2 does not change, so that the background component B01/v is equal to a value obtained by dividing the pixel value B01 by the number of virtual division. Similarly, when the object corresponding to the background is still, the background component B02/v is equal to a value obtained by dividing the pixel value B02 by the number of virtual division, the background component B03/v is equal to a value obtained by dividing the pixel value B03 by the number of virtual division, and the background component B04/v is equal to a value obtained by dividing the pixel value B04 by the number of virtual division.

That is to say, in the event that the object corresponding to the foreground is still, the light corresponding to the foreground object, which is input to the sensor 2, does not change during the period corresponding to the shutter time, so that the foreground component F01/v corresponding to the first shutter time/v following the shutter opening, the foreground component F01/v corresponding to the second shutter time/v following the shutter opening, the foreground component F01/v corresponding to the third shutter time/v following the shutter opening, and the foreground component F01/v corresponding to the fourth shutter time/v following the shutter opening, become the same value. The F02/v through F04/v have the same relationship as the F01/v.

In the event that the object corresponding to the background is still, the light corresponding to the background object, which is input to the sensor 2, does not change during the period corresponding to the shutter time, so that the background component B01/v corresponding to the first shutter time/v following the shutter opening, the background component B01/v corresponding to the second shutter time/v following the shutter opening, the background component B01/v corresponding to the third shutter time/v following the shutter opening, and the background component B01/v corresponding to the fourth shutter time/v following the shutter opening, become the same value. The B02/v through B04/v have the same relationship as the B01/v.

Next, description will be made regarding the case in which an object corresponding the foreground moves, and an object corresponding to the background is still.

FIG. 401 is a model diagram wherein the pixel values of the pixels on one line including a covered background region are extended in the time direction, in the event that an object corresponding to the foreground moves to the right side in the drawing. In FIG. 401, the foreground amount-of-movement v is four. We can assume that one frame is a short period, so the object corresponding to the foreground is a stiffness member, and moves at constant velocity. In FIG. 401, the image of an object corresponding to the foreground moves so as to be displayed with a shift of four pixels on the right side in the next frame on the basis of a certain frame.

In FIG. 401, the pixel on the leftmost side through the fourth pixel from the left belong to a foreground region. In FIG. 401, the fifth pixel from the left through the seventh pixel from the left belong to a mixed region serving as a covered background region. In FIG. 401, the pixel on the rightmost side belongs to a background region.

The object corresponding to the foreground moves as time elapses so as to cover up the object corresponding to the background, so that the components included in the pixel values of the pixels belonged to the covered background region are switched to the foreground components from the background components at a certain point of time during the period corresponding to the shutter time.

For example, a pixel value M appended with a thick-line frame in FIG. 401 is represented with Expression (299).

$$M=B02/v+B02/v+F07/v+F06/v \quad (299)$$

For example, the fifth pixel from the left includes background components corresponding to one shutter time/v, and includes foreground components corresponding to three sets of shutter time/v, and accordingly, the mixed ratio α of the fifth pixel from the left is 1/4. The sixth pixel from the left includes background components corresponding to two sets of shutter time/v, and includes foreground components corresponding to two sets of shutter time/v, and accordingly, the mixed ratio α of the sixth pixel from the left is 1/2. The seventh pixel from the left includes background components corresponding to three sets of shutter time/v, and includes foreground components corresponding to one shutter time/v, and accordingly, the mixed ratio α of the seventh pixel from the left is 3/4.

We can assume that the object corresponding to the foreground is a stiffness member, and the foreground image moves at constant velocity so as to be displayed with a shift of four pixels on the right side in the next frame, so that, for example, the foreground component F07/v of the first shutter time/v following the shutter opening of the fourth pixel from the left in FIG. 401 is equal to the foreground component corresponding to the second shutter time/v following the shutter opening of the fifth pixel from the left in FIG. 401. Similarly, the foreground component F07/v is equal to the foreground component corresponding to the third shutter time/v following the shutter opening of the sixth pixel from the left in FIG. 401, and the foreground component corresponding to the fourth shutter time/v following the shutter opening of the seventh pixel from the left in FIG. 401 respectively.

We can assume that the object corresponding to the foreground is a stiffness member, and the foreground image moves at constant velocity so as to be displayed with a shift of four pixels on the right side in the next frame, so that, for example, the foreground component F06/v of the first shutter time/v following the shutter opening of the third pixel from the left in FIG. 401 is equal to the foreground component corresponding to the second shutter time/v following the shutter opening of the fourth pixel from the left in FIG. 401. Similarly, the foreground component F06/v is equal to the foreground component corresponding to the third shutter time/v following the shutter opening of the fifth pixel from the left in FIG. 401, and the foreground component corresponding to the fourth shutter time/v following the shutter opening of the sixth pixel from the left in FIG. 401 respectively.

We can assume that the object corresponding to the foreground is a stiffness member, and the foreground image moves at constant velocity so as to be displayed with a shift of four pixels on the right side in the next frame, so that, for example, the foreground component F05/v of the first shutter time/v following the shutter opening of the second pixel from the left in FIG. 401 is equal to the foreground component corresponding to the second shutter time/v following the shutter opening of the third pixel from the left in FIG. 401. Similarly, the foreground component F05/v is equal to the foreground component corresponding to the third shutter time/v following the shutter opening of the fourth pixel from the left in FIG. 401, and the foreground component corresponding to the fourth shutter time/v following the shutter opening of the fifth pixel from the left in FIG. 401 respectively.

We can assume that the object corresponding to the foreground is a stiffness member, and the foreground image moves at constant velocity so as to be displayed with a shift of four pixels on the right side in the next frame, so that, for example, the foreground component F04/v of the first shutter time/v following the shutter opening of the pixel on the leftmost side in FIG. 401 is equal to the foreground component corresponding to the second shutter time/v following the shutter opening of the second pixel from the left in FIG. 401. Similarly, the foreground component F04/v is equal to the foreground component corresponding to the third shutter time/v following the shutter opening of the third pixel from the left in FIG. 401, and the foreground component corresponding to the fourth shutter time/v following the shutter opening of the fourth pixel from the left in FIG. 401 respectively.

The state of the foreground region corresponding to such a moving object is movement blurring. Also, the foreground region corresponding to a moving object thus includes movement blurring, so can be referred to as a strain region.

FIG. 402 is a model diagram wherein the pixel values of the pixels on one line including an uncovered background region are extended in the time direction, in the event that the foreground moves to the right side in the drawing. In FIG. 402, the foreground amount-of-movement v is four. We can assume that one frame is a short period, so the object corresponding to the foreground is a stiffness member, and moves at constant velocity. In FIG. 402, the image of an object corresponding to the foreground moves with a shift of four pixels on the right side in the next frame on the basis of a certain frame.

In FIG. 402, the pixel on the leftmost side through the fourth pixel from the left belong to a background region. In FIG. 402, the fifth pixel from the left through the seventh pixel from the left belong to a mixed region serving as an uncovered background region. In FIG. 402, the pixel on the rightmost side belongs to a foreground region.

The object corresponding to the foreground, which has covered up the object corresponding to the background, moves as time elapses so as to be removed from front of the object corresponding to the background, so that the components included in the pixel values of the pixels belonged to the uncovered background region are switched to the background components from the foreground components at a certain point of time during the period corresponding to the shutter time.

For example, a pixel value M' appended with a thick-line frame in FIG. 402 is represented with Expression (300).

$$M'=F02/v+F01/v+B26/v+B26/v \quad (300)$$

For example, the fifth pixel from the left includes background components corresponding to three sets of shutter time/v, and includes foreground components corresponding to one shutter time/v, and accordingly, the mixed ratio α of the fifth pixel from the left is 3/4. The sixth pixel from the left includes background components corresponding to two sets of shutter time/v, and includes foreground components corresponding to two sets of shutter time/v, and accordingly, the mixed ratio α of the sixth pixel from the left is 1/2. The seventh pixel from the left includes background components corresponding to one shutter time/v, and includes foreground components corresponding to three sets of shutter time/v, and accordingly, the mixed ratio α of the seventh pixel from the left is 1/4.

If Expression (299) and Expression (300) are more generalized, the pixel value M is represented with Expression (301).

$$M = \alpha \times B + \sum_i Fi/v \quad (301)$$

Here, α represents the mixed ratio. B represents a background pixel value, and Fi/v represents a foreground component.

We can assume that the object corresponding to the foreground is a stiffness member, and moves at constant velocity, and also the amount-of-movement v is four, and accordingly, for example, the foreground component F01/v of the first shutter time/v following the shutter opening of the fifth pixel from the left in FIG. 402 is equal to the foreground component corresponding to the second shutter time/v following the shutter opening of the sixth pixel from the left in FIG. 402. Similarly, the F01/v is equal to the foreground component corresponding to the third shutter time/v following the shutter opening of the seventh pixel from the left in FIG. 402, and the foreground component corresponding to the fourth shutter time/v following the shutter opening of the eighth pixel from the left in FIG. 402 respectively.

We can assume that the object corresponding to the foreground is a stiffness member, and moves at constant velocity, and also the number of virtual division is four, so that, for example, the foreground component F02/v of the first shutter time/v following the shutter opening of the sixth pixel from the left in FIG. 402 is equal to the foreground component corresponding to the second shutter time/v following the shutter opening of the seventh pixel from the left in FIG. 402. Similarly, the foreground component F02/v is equal to the foreground component corresponding to the third shutter time/v following the shutter opening of the eighth pixel from the left in FIG. 402.

We can assume that the object corresponding to the foreground is a stiffness member, and moves at constant velocity, and also the amount-of-movement v is four, so that, for example, the foreground component F03/v of the first shutter time/v following the shutter opening of the seventh pixel from the left in FIG. 402 is equal to the foreground component corresponding to the second shutter time/v following the shutter opening of the eighth pixel from the left in FIG. 402.

With description in FIG. 400 through FIG. 402, description has been made on condition that the number of virtual division is four, but the number of virtual division corresponds to an amount-of-movement v. The amount-of-movement v generally corresponds to the movement speed of an object corresponding to the foreground. For example, when an object corresponding to the foreground is moving so as to be displayed with a shift of four pixels on the right side in the next frame on the basis of a certain frame, the amount-of-movement v is set to four. The number of virtual division corresponds to the amount-of-movement v, and is set to four. Similarly, for example, when an object corresponding to the foreground is moving so as to be displayed with a shift of six pixels on the left side in the next frame on the basis of a certain frame, the amount-of-movement v is set to six. The number of virtual is set to six.

FIG. 403 and FIG. 404 illustrate the relationship between the above foreground region, background region, and mixed region made up of a covered background region or uncovered background region, and the foreground components and background components corresponding to the divided shutter time.

FIG. 403 illustrates an example wherein the pixels in the foreground region, background region, and mixed region are extracted from an image including the foreground corresponding to an object moving in front of the still background. With the example shown in FIG. 403, an object corresponding to the foreground is moving horizontally as to a screen.

A frame$^{\#n+1}$ is the subsequent frame of a frame$^{\#n}$, and a frame$^{\#n+2}$ is the subsequent frame of the frame$^{\#n+1}$.

FIG. 404 illustrates a model wherein the pixels in the foreground region, background region, and mixed region, which are extracted from any one of the frame$^{\#n}$ through frame$^{\#n+2}$, are extracted, the amount-of-movement is set to four, and the pixel values of the extracted pixels are extended in the time direction.

The pixel values in the foreground region comprise four different foreground components corresponding to the period of the shutter time/v since the object corresponding to the foreground moves. For example, the pixel positioned on the leftmost side of the pixels in the foreground region shown in FIG. 404 comprise F01/v, F02/v, F03/v, and F04/v. That is to say, the pixels in the foreground region include movement blurring.

The object corresponding to the background is still, so the light corresponding to the background, which is input to the sensor 2, does not change in the period corresponding to the shutter time. In this case, the pixel values in the background region do not include movement blurring.

The pixel values of the pixels belonged to the mixed region made up of the covered background region or uncovered background region comprise foreground components and background components.

Next, description will be made regarding a model wherein when an image corresponding to an object is moving, the pixel values of the pixels, which are pixels adjacently arrayed in one row in multiple frames, on the same position on the frames are extended in the time direction. For example, when an image corresponding to an object is moving horizontally as to a screen, the pixels arrayed on one line of a screen can be selected as pixels adjacently arrayed in one row.

FIG. 405 is a model diagram wherein the pixel values of the pixels, which are pixels adjacently arrayed in one row of three frames of an image obtained by taking an object corresponding to the still background, on the same positions on the frames are extended in the time direction. A frame$^{\#n}$ is the subsequent frame of a frame$^{\#n-1}$, and a frame$^{\#n+1}$ is the subsequent frame of the frame$^{\#n}$. The other frames are referred in the same way.

The pixel values B01 through B12 shown in FIG. 405 are the pixel values of the pixels corresponding to the object of the still background. The object corresponding to the background is still, so the pixel values of the corresponding pixels do not change in the frame$^{\#n-1}$ through frame$^{\#n+1}$. For example, the pixel in the frame$^{\#n}$ and the pixel in the frame$^{\#n+1}$, which correspond to the position of the pixel having a pixel value B05 in the frame$^{\#n-1}$, each have the pixel value B05.

FIG. 406 is a model diagram wherein the pixel values of the pixels, which are pixels adjacently arrayed in one row of three frames of an image obtained by taking an object corresponding to the foreground moving to the right side in the drawing as well as an object corresponding to the still background, on the same positions on the frames are extended in the time direction. The model shown in FIG. 406 includes a covered background region.

In FIG. 406, we can assume that the object corresponding to the foreground is a stiffness member, and moves at constant velocity, and the image of the foreground moves so as to be displayed with a shift of four pixels on the right side in the next frame, and accordingly, the amount-of-movement v of the foreground is four, and the number of virtual division is four.

For example, the foreground component of the first shutter time/v following the shutter opening of the pixel on the leftmost side on the frame$^{\#n-1}$ in FIG. 406 becomes F12/v, and the foreground component of the second shutter time/v following the shutter opening of the second pixel from the left in FIG. 406 becomes F12/v as well. The foreground component of the third shutter time/v following the shutter opening of the third pixel from the left in FIG. 406, and the foreground component of the fourth shutter time/v following the shutter opening of the fourth pixel from the left in FIG. 406 become F12/v.

The foreground component of the second shutter time/v following the shutter opening of the pixel on the leftmost side on the frame$^{\#n-1}$ in FIG. 406 becomes F11/v, and the foreground component of the third shutter time/v following the shutter opening of the second pixel from the left in FIG. 406 becomes F11/v as well. The foreground component of the fourth shutter time/v following the shutter opening of the third pixel from the left in FIG. 406 becomes F11/v as well.

The foreground component of the third shutter time/v following the shutter opening of the pixel on the leftmost side on the frame$^{\#n-1}$ in FIG. 406 becomes F10/v, and the foreground component of the fourth shutter time/v following the shutter opening of the second pixel from the left in FIG. 406 becomes F10/v as well. The foreground component of the fourth shutter time/v following the shutter opening of the pixel on the leftmost side on the frame$^{\#n-1}$ in FIG. 406 becomes F09/v.

The object corresponding the background is still, so the background component of the first shutter time/v following the shutter opening of the second pixel from the left on the frame$^{\#n-1}$ in FIG. 406 becomes B01/v. The background components of the first through third shutter time/v following the shutter opening of the fourth pixel from the left on the frame$^{\#n-1}$ in FIG. 406 become B03/v.

With the frame$^{\#n-1}$ in FIG. 406, the pixels on the leftmost side belong to the foreground region, and the second through fourth pixels from the left belong to the mixed region serving as a covered background region.

The fifth through twelfth pixels from the left on the frame$^{\#n-1}$ in FIG. 406 belong to the background region, and the pixel values thereof become B04 through B11 respectively.

The first through fifth pixels from the left on the frame$^{\#n}$ in FIG. 406 belong to the foreground region. The foreground components of the shutter time/v in the foreground region on the frame$^{™n}$ are any one of F05/v through F12/v.

We can assume that the object corresponding to the foreground is a stiffness member, and moves at constant velocity, and the image of the foreground moves so as to be displayed with a shift of four pixels on the right side in the next frame, and accordingly, the foreground component of the first shutter time/v following the shutter opening of the fifth pixel from the left on the frame$^{\#n}$ in FIG. 406 becomes F12/v, the foreground component of the second shutter time/v following the shutter opening of the sixth pixel from the left in FIG. 406 becomes F12/v as well. The foreground component of the third shutter time/v following the shutter opening of the seventh pixel from the left in FIG. 406, and the foreground component of the fourth shutter time/v following the shutter opening of the eighth pixel from the left in FIG. 406 become F12/v.

The foreground component of the second shutter time/v following the shutter opening of the fifth pixel from the left on the frame$^{\#n}$ in FIG. 406 becomes F11/v, and the foreground component of the third shutter time/v following the shutter opening of the sixth pixel from the left in FIG. 406 becomes F11/v as well. The foreground component of the fourth shutter time/v following the shutter opening of the seventh pixel from the left in FIG. 406 becomes F11/v.

The foreground component of the third shutter time/v following the shutter opening of the fifth pixel from the left on the frame$^{\#n}$ in FIG. 406 becomes F10/v, and the foreground component of the fourth shutter time/v following the shutter opening of the sixth pixel from the left in FIG. 406 becomes F10/v as well. The foreground component of the fourth shutter time/v following the shutter opening of the fifth pixel from the left on the frame$^{\#n}$ in FIG. 406 becomes F09/v.

The object corresponding the background is still, so the background component of the first shutter time/v following the shutter opening of the sixth pixel from the left on the frame$^{\#n}$ in FIG. 406 becomes B05/v. The background components of the first through second shutter time/v following the shutter opening of the seventh pixel from the left on the frame$^{\#n}$ in FIG. 406 become B06/v. The background components of the first through third shutter time/v following the shutter opening of the eighth pixel from the left on the fram$^{\#n}$ in FIG. 406 become B07/v.

With the fram$^{\#n}$ in FIG. 406, the sixth through eighth pixels from the left belong to the mixed region serving as a covered background region.

The ninth through twelfth pixels from the left on the frame$^{\#n}$ in FIG. 406 belong to the background region, and the pixel values thereof become B08 through B11 respectively.

The ninth through twelfth pixels from the left on the frame$^{\#n+1}$ in FIG. 406 belong to the foreground region. With the foreground region of the frame$^{\#n+1}$, the foreground components are any one of F01/v through F12/v.

We can assume that the object corresponding to the foreground is a stiffness member, and moves at constant velocity, and the image of the foreground moves so as to be displayed with a shift of four pixels on the right side in the next frame, and accordingly, the foreground component of the first shutter time/v following the shutter opening of the ninth pixel from the left on the frame$^{\#n+1}$ in FIG. 406 becomes F12/v, the foreground component of the second shutter time/v following the shutter opening of the tenth pixel from the left in FIG. 406 becomes F12/v as well. The foreground component of the third shutter time/v following the shutter opening of the eleventh pixel from the left in FIG. 406, and the foreground component of the fourth shutter time/v following the shutter opening of the twelfth pixel from the left in FIG. 406 become F12/v.

The foreground component of the second shutter time/v following the shutter opening of the ninth pixel from the left on the frame$^{\#n+1}$ in FIG. 406 becomes F11/v, and the foreground component of the third shutter time/v following the shutter opening of the tenth pixel from the left in FIG. 406 becomes F11/v as well. The foreground component of the fourth shutter time/v following the shutter opening of the eleventh pixel from the left in FIG. 406 becomes F11/v.

The foreground component of the third shutter time/v following the shutter opening of the ninth pixel from the left on the frame$^{\#n+1}$ in FIG. 406 becomes F10/v, and the foreground component of the fourth shutter time/v following the shutter opening of the tenth pixel from the left in FIG. 406 becomes F10/v as well. The foreground component of the fourth shutter time/v following the shutter opening of the ninth pixel from the left on the frame$^{\#n+1}$ in FIG. 406 becomes F09/v.

The object corresponding the background is still, so the background component of the first shutter time/v following the shutter opening of the tenth pixel from the left on the frame$^{\#n+1}$ in FIG. 406 becomes B09/v. The background components of the first through second shutter time/v following the shutter opening of the eleventh pixel from the left on the frame$^{\#n+1}$ in FIG. 406 become B10/v. The background components of the first through third shutter time/v following the shutter opening of the twelfth pixel from the left on the frame$^{\#n+1}$ in FIG. 406 become B11/v.

With the frame$^{\#n+1}$ in FIG. 406, the tenth through twelfth pixels from the left correspond to the mixed region serving as a covered background region.

FIG. 407 is a model diagram of an image wherein the foreground components are extracted from the pixel values shown in FIG. 406.

FIG. 408 is a model diagram wherein the pixel values of the pixels, which are pixels adjacently arrayed in one row of three frames of an image obtained by taking the foreground corresponding to an object moving to the right side in the drawing as well as the still background, on the same positions on the frames are extended in the time direction. In FIG. 408 an uncovered background region is included.

In FIG. 408, we can assume that the object corresponding to the foreground is a stiffness member, and moves at constant velocity. The object corresponding to the foreground moves so as to be displayed with a shift of four pixels on the right side in the next frame, and accordingly, the amount-of-movement v is four.

For example, the foreground component of the first shutter time/v following the shutter opening of the pixel on the leftmost side on the frame$^{\#n-1}$ in FIG. 408 becomes F13/v, and the foreground component of the second shutter time/v following the shutter opening of the second pixel from the left in FIG. 408 becomes F13/v as well. The foreground component of the third shutter time/v following the shutter opening of the third pixel from the left in FIG. 408, and the foreground component of the fourth shutter time/v following the shutter opening of the fourth pixel from the left in FIG. 408 become F13/v.

The foreground component of the first shutter time/v following the shutter opening of the second pixel from the left on the frame$^{\#n-1}$ in FIG. 408 becomes F14/v, and the foreground component of the second shutter time/v following the shutter opening of the third pixel from the left in FIG. 408 becomes F14/v as well. The foreground component of the first shutter time/v following the shutter opening of the third pixel from the left in FIG. 408 becomes F15/v.

The object corresponding the background is still, so the background components of the second through fourth shutter time/v following the shutter opening of the pixel on the leftmost side on the frame$^{\#n-1}$ in FIG. 408 become B25/v. The background components of the third through fourth shutter time/v following the shutter opening of the second pixel from the left on the frame$^{\#n-1}$ in FIG. 408 become B26/v. The background components of the fourth shutter time/v following the shutter opening of the third pixel from the left on the frame$^{\#n-1}$ in FIG. 408 becomes B27/v.

With the frame$^{\#n-1}$ in FIG. 408, the leftmost pixel through the third pixel belong to the mixed region serving as an uncovered background region.

The fourth through twelfth pixels from the left on the frame$^{\#n-1}$ in FIG. 408 belong to the foreground region. The foreground components of the frame are any one of F13/v through F24/v.

The leftmost pixel through fourth pixel from the left on the frame$^{\#n}$ in FIG. 408 belong to the background region, and the pixel values thereof are B25 through B28 respectively.

We can assume that the object corresponding to the foreground is a stiffness member, and moves at constant velocity, and the image of the foreground moves so as to be displayed with a shift of four pixels on the right side in the next frame, and accordingly, the foreground component of the first shutter time/v following the shutter opening of the fifth pixel from the left on the frame$^{\#n}$ in FIG. 408 becomes F13/v, the foreground component of the second shutter time/v following the shutter opening of the sixth pixel from the left in FIG. 408 becomes F13/v as well. The foreground component of the third shutter time/v following the shutter opening of the seventh pixel from the left in FIG. 408, and the foreground component of the fourth shutter time/v following the shutter opening of the eighth pixel from the left in FIG. 408 become F13/v.

The foreground component of the first shutter time/v following the shutter opening of the sixth pixel from the left on the frame$^{\#n}$ in FIG. 408 becomes F14/v, and the foreground component of the second shutter time/v following the shutter opening of the seventh pixel from the left in FIG. 408 becomes F14/v as well. The foreground component of the first shutter time/v following the shutter opening of the eighth pixel from the left in FIG. 408 becomes F15/v.

The object corresponding the background is still, so the background components of the second through fourth shutter time/v following the shutter opening of the fifth pixel from the left on the frame$^{\#n}$ in FIG. 408 become B29/v. The background components of the third through fourth shutter time/v following the shutter opening of the sixth pixel from the left on the frame$^{\#n}$ in FIG. 408 become B30/v. The background components of the fourth shutter time/v following the shutter opening of the seventh pixel from the left on the frame$^{\#n}$ in FIG. 408 becomes B31/v.

With the frame$^{\#n}$ in FIG. 408, the fifth through seventh pixels from the left belong to the mixed region serving as an uncovered background region.

The eighth through twelfth pixels from the left on the frame$^{\#n}$ in FIG. 408 belong to the foreground region. The values corresponding to the period of the shutter time/v in the foreground region on the frame$^{\#n}$ are any one of F13/v through F20/v.

The leftmost pixel through eighth pixel from the left on the frame$^{\#n+1}$ in FIG. 408 belong to the background region, and the pixel values thereof are B25 through B32 respectively.

We can assume that the object corresponding to the foreground is a stiffness member, and moves at constant velocity, and the image of the foreground moves so as to be displayed with a shift of four pixels on the right side in the next frame, and accordingly, the foreground component of the first shutter time/v following the shutter opening of the ninth pixel from the left on the frame$^{\#n+1}$ in FIG. 408 becomes F13/v, and the foreground component of the second shutter time/v following the shutter opening of the tenth pixel from the left in FIG. 408 becomes F13/v as well. The foreground component of the third shutter time/v following the shutter opening of the eleventh pixel from the left in FIG. 408, and the foreground component of the fourth shutter time/v following the shutter opening of the twelfth pixel from the left in FIG. 408 become F13/v.

The foreground component of the first shutter time/v following the shutter opening of the tenth pixel from the left on the frame$^{\#n+1}$ in FIG. 408 becomes F14/v, and the foreground component of the second shutter time/v following the shutter opening of the eleventh pixel from the left in FIG. 408 becomes F14/v as well. The foreground component of the first shutter time/v following the shutter opening of the twelfth pixel from the left in FIG. 408 becomes F15/v.

The object corresponding the background is still, so the background components of the second through fourth shutter time/v following the shutter opening of the ninth pixel from the left on the frame$^{\#n+1}$ in FIG. 408 become B33/v. The background components of the third through fourth shutter time/v following the shutter opening of the tenth pixel from the left on the frame$^{\#n+1}$ in FIG. 408 become B34/v. The background components of the fourth shutter time/v following the shutter opening of the eleventh pixel from the left on the frame$^{\#n+1}$ in FIG. 408 becomes B35/v.

With the frame$^{\#n+1}$ in FIG. 408, the ninth through eleventh pixels from the left belong to the mixed region serving as an uncovered background region.

The twelfth pixel from the left on the frame$^{\#n+1}$ in FIG. 408 belongs to the foreground region. The foreground components of the shutter time/v in the foreground region on the frame$^{\#n-1}$ are any one of F13/v through F16/v.

FIG. 409 is a model diagram of an image wherein the foreground components are extracted from the pixel values shown in FIG. 408.

Description has been made so far regarding the input image and movement blurring so far, and change in the components within a pixel has been described with the number of virtual division, but each component has the same configuration as the band-shaped regions shown with the levels $w_1$ through $w_5$ positioned in the right portion of FIG. 373 by setting the number of virtual division to infinite, for example.

That is to say, it can be said that to set the levels as a discontinuous function on the X-T plane (the same even on the X-Y plane) for each region in the direction of continuity is to set change in the components within the shutter time as a linear region instead of the number of virtual division.

On this account, the mechanism for generating the above movement blurring can be estimated by estimating the actual world using an approximation function made up of a discontinuous function for each region in the direction of continuity.

Accordingly, movement blurring may be essentially removed by utilizing this property, i.e., by generating a pixel within one shutter time (one pixel or less in the frame direction).

FIG. 410 is the comparison between the processing result in the case of removing movement blurring by the class classification adaptation processing, and the processing result in the case of removing movement blurring using an approximation function in the actual world obtained by setting a discontinuous function for each region in the direction of continuity. Note that in FIG. 410, a dotted line illustrates change in the pixel value in an input image (image wherein movement blurring exists), a solid line illustrates the processing result in the case of removing movement blurring by the class classification adaptation processing, and a single-dot broken line illustrates the processing result in the case of removing movement blurring using an approximation function in the actual world obtained by setting a discontinuous function for each region in the direction of continuity. Further, the horizontal axis represents coordinates in the X direction of the input image, and the vertical axis represents pixel values.

It can be understood that with the processing result in the case of removing movement blurring using an approximation function in the actual world made up of a discontinuous function for each region, change in the pixel value on the edge portion centered on around x=379, 376 is intensive, movement blurring is removed, so that the contrast of the image becomes clear, as compared to the processing result in the case of removing movement blurring by the class classification adaptation processing.

Also, when movement blurring occurs on an image at the time of a airplane-shaped object serving as a toy moving in the horizontal direction as shown in FIG. 411, the comparison between the processing result in the case of removing the movement blurring from the image using an approximation function in the actual world obtained by setting a discontinuous function for each region in the direction of continuity (image of which the movement blurring generated with the actual world estimating unit 102 shown in FIG. 369 and the image generating unit 103 shown in FIG. 384 was removed), and the processing result in the case of removing the movement blurring from the image using the other method is shown in A through D in FIG. 412.

That is to say, A in FIG. 412 is the image itself (image prior to the blurring removal processing) wherein the movement blurring of the black-frame portion in FIG. 411 occurs, B in FIG. 412 is an image following the movement blurring being removed from the image wherein the movement blurring shown in A in FIG. 412 occurred using an approximation function in the actual world made up of a discontinuous function set for each region, C in FIG. 412 is an image taken in a state wherein a subject serving as an input image is still, and D in FIG. 412 is an image as the processing result of removing the movement blurring using the other method.

It can be understood that the image (image shown in B in FIG. 412) of which the movement blurring was removed using the approximation function in the actual world made up of a discontinuous function set for each region is a more clear image on the adjacent portion of “C” and “A” in the drawing, also the regions where characters exist are displayed more clearly, as compared to the image (image shown in D in FIG. 412) as the processing result of removing the movement blurring using the other method. According to this, it can be understood that fine portions are clearly displayed by the processing for removing the movement blurring using the approximation function in the actual world made up of a discontinuous function set for each region.

Further, when movement blurring occurs on an image at the time of a airplane-shaped object serving as a toy moving in an oblique direction (oblique right rising direction) as shown in FIG. 413, the comparison between the processing result in the case of removing the movement blurring from the image using an approximation function in the actual world obtained by setting a discontinuous function for each region in the direction of continuity (image of which the movement blurring generated with the actual world estimating unit 102 shown in FIG. 377 and the image generating unit 103 shown in FIG. 388 was removed), and the processing result in the case of removing the movement blurring from the image using the other method is shown in A through D in FIG. 414.

That is to say, A in FIG. 414 is the image prior to the blurring removal processing wherein the movement blurring of the black-frame portion in FIG. 413 occurs, B in FIG. 414 is an image following the movement blurring being removed from the image wherein the movement blurring shown in A in FIG. 414 occurred using an approximation function in the actual world made up a discontinuous function set for each region, C in FIG. 414 is an image wherein a subject of the input image was taken in a still state, D in FIG. 414 is an image as the processing result of removing the movement blurring using the other method. Note that the image processed is around a position appended with a rectangular mark of a thick line in the drawing of FIG. 413.

As described with reference to FIG. 412, it can be understood that the image of which the movement blurring was removed using the approximation function in the actual world made up of a discontinuous function set for each region is a more clear image on the adjacent portion of "C" and "A" in the drawing, also the regions where characters exist are displayed more clearly, as compared to the image as the processing result of removing the movement blurring using the other method. According to this, it can be understood that fine portions are clearly displayed by the processing for removing the movement blurring using the approximation function in the actual world made up of a discontinuous function set for each region.

Further, in the event of removing the movement blurring using the approximation function in the actual world made up of a discontinuous function set for each region, upon the upper original image being input in an oblique direction wherein movement blurring occurred in the right rising direction shown in A in FIG. 415, the image such as shown in B in FIG. 415 is output. That is to say, in the event of the image wherein the pinstriped movement blurring occurred in the center portion of the original image, the pinstriped portion becomes a clear image by removing the movement blurring using the approximation function in the actual world made up of a discontinuous function set for each region.

That is to say, as shown in A through D of FIG. 412 and A and B of FIG. 415, the actual world estimating unit shown in FIG. 377 and the image generating unit 103 shown in FIG. 388 set an approximation function which estimates the actual world for each three-dimensional rod-shaped region such as shown in FIG. 391 as a discontinuous function respectively, and accordingly, it becomes possible to remove movement blurring which occurs due to movement not only in the horizontal direction and vertical direction but also in a oblique direction serving as a combination of those.

According to the above arrangement, the real world light signals are projected on multiple pixels each having time-space integration effects, continuity of the image data is detected, of which part of continuity of the actual world light signals has been lost, the image data is approximated with a discontinuous function assuming that the pixel values of the pixels corresponding to a position in at least one-dimensional direction of the time-space directions of the image data, corresponding to the continuity of the image data detected by the image data continuity detecting means, thereby estimating the function corresponding to the actual world light signals, and accordingly, it becomes possible to generate high density pixels used for an enlarged image, and new frame pixels, and a more clear image can be generated in either case.

Note that the sensor 2 may be a sensor such as a solid-state imaging device, for example, a BBD (Bucket Brigade Device), CID (Charge Injection Device), or CPD (Charge Priming Device) or the like.

Thus, the image processing device according to the present invention may be provided with input means for inputting image data made up of multiple pixels acquired by the actual world light signals being cast upon the multiple detecting elements each having spatial integration effects via the optical low pass filter, of which part of continuity of the actual world light signals has been lost, and actual world estimating means for estimating the light signals to be cast upon the optical low pass filter considering that the light signals are dispersed and integrated in at least one-dimensional direction of the spatial directions by the optical low pass filter.

The actual world estimating means may be provided, which generates a function which approximates the real world light signals by estimating multiple actual world functions assuming that the pixel value of a pixel of interest corresponding to a position in at least one-dimensional direction of the spatial directions of image data is a pixel value acquired by integration in at least one-dimensional direction of the multiple actual world functions corresponding to the multiple light signals dispersed in the spatial direction by the optical low pass filter.

Image data continuity detecting means, which detect continuity of image data, may be further provided, and based on the continuity detected by the image data continuity detecting means, the actual world estimating means may generate a function which approximates the real world light signals by estimating multiple actual world functions assuming that the pixel value of a pixel of interest corresponding to a position in at least one-dimensional direction of the spatial directions of image data is a pixel value acquired by integration in at least one-dimensional direction of the multiple actual world functions corresponding to the optical low pass filter.

Pixel value generating means may be further provided, which generates a pixel value corresponding to the pixel having a desired size by integrating the actual world function estimated by the actual world estimating means with a desired increment in at least one-dimensional direction.

Also, computing means for computing image data corresponding to the light signal when the light signal corresponding to second image data passes through the optical low pass filter to output the computed result as first image data, first tap extracting means for extracting the multiple pixels corresponding to the pixel of interest within the second image data from the first image data, and learning means for learning prediction means for predicting the pixel value of the pixel of interest from the pixel values of the multiple pixels extracted by the first tap extracting means may be provided to the learning device, which learns prediction means for predicting the second image data from the first image data.

Second tap extracting means for extracting the multiple pixels corresponding to the pixel of interest within the second image data from the first image data, and features detecting means for detecting features corresponding to the pixel of interest based on the pixel values of the multiple pixels extracted by the second tap extracting means may be further provided to the learning device. The learning means may be configured so as to learn the prediction means for predicting the pixel value of the pixel of interest from the pixel values of the multiple pixels extracted by the first tap extracting means for each features detected by the features detecting means.

The computing means may be configured so as to compute the first image data from the second image data based on the relationship between phase shift amount, which disperses the light signal of the optical low pass filter to be processed, and the pixel-to-pixel distance of the imaging device.

Input means for inputting the first image data acquired by the real world light signals being cast upon the multiple detecting elements each having spatial integration effects via the optical low pass filter, first tap extracting means for extracting the multiple pixels corresponding to the pixel of interest within the second image data from the first image data, storing means for storing the prediction means learned beforehand to predict the second image data to be acquired by the light signals, which are cast upon the optical low pass filter from the first image data, and prediction computing means for predicting the pixel value of the pixel of interest within the second image data based on the multiple pixels extracted by the first tap extracting means and the prediction means may be provided to the image processing device, which predicts the second image data from the first image data.

Second tap extracting means for extracting the multiple pixels corresponding to the pixel of interest within the second image data from the first image data, features detecting means for detecting the features corresponding to the pixel of interest based on the pixel values of the multiple pixels extracted by the second tap extracting means may be further provided to the image processing device. The prediction means may be learned beforehand so as to predict the pixel value of the pixel of interest from the pixel values of the multiple pixels extracted by the first tap extracting means for each features detected by the features detecting means.

The prediction means may be learned beforehand so as to predict the second image data to be acquired by the light signals, which are cast upon the optical low pass filter from the first image data computed from the second image data based on the relationship between phase shift amount, which disperses the light signal of the optical low pass filter to be processed, and the pixel-to-pixel distance of the imaging device, being cast directly.

The image processing device according to the present invention may be further provided with image data continuity detecting means for detecting continuity of image data made up of multiple pixels acquired by the real world light signals being cast upon the multiple detecting elements each having time-space integration effects, of which part of the continuity of the actual world light signals has been lost, and actual world estimating means for estimating the real world light signals by approximating the image data with a discontinuous function assuming that the pixel values of the pixels corresponding to a position in at least one-dimensional direction of the time-space directions of the image data are pixel values acquired by integration in at least one-dimensional direction, corresponding to the continuity of the image data detected by the image data continuity detecting means.

The actual world estimating means may be configured so as to generate discontinuous functions divided with a certain increment in at least one-dimensional direction as a function, which approximates the real world light signal.

The level of within a certain increment of each discontinuous function divided with a certain increment may be configured so as to be a constant value.

The level of within a certain increment of each discontinuous function divided with a certain increment may be configured so as to be approximated with a polynomial.

The storage medium storing the program for carrying out the signal processing according to the present invention is not restricted to packaged media which is distributed separately from the computer so as to provide the user with the program, such as a magnetic disk 51 (including flexible disks, optical disk 52 (including CD-ROM (Compact Disk-Read Only Memory), DVD Digital Versatile Disk), magneto-optical disk 53 (including MD (Mini-Disk) (Registered Trademark)), semiconductor memory 54, and so forth, as shown in FIG. 2, in which the program has been recorded; but also is configured of ROM 22 in which the program has been recorded, or a hard disk or the like included in the storage unit 28, these being provided to the user in a state of having been built into the computer beforehand.

Note that the program for executing the series of processing described above may be installed to the computer via cable or wireless communication media, such as a Local Area Network, the Internet, digital satellite broadcasting, and so forth, via interfaces such as routers, modems, and so forth, as necessary.

It should be noted that in the present specification, the steps describing the program recorded in the recording medium include processing of being carried out in time-sequence following the described order, as a matter of course, but this is not restricted to time-sequence processing, and processing of being executed in parallel or individually is included as well.

INDUSTRIAL APPLICABILITY

According to the present invention, processing results which are accurate and highly precise can be obtained, as described above.

Also, according to the present invention, processing results which are more accurate and which have higher precision as to events of the real world can be obtained.

The invention claimed is:

1. A learning device for teaching a predictor configured to predict second image data from first image data, said learning device comprising:

a computer configured to compute image data corresponding to light signals when the light signals corresponding to said second image data pass through an optical low-pass filter, and to output said computed image data as said first image data;

a first tap extractor configured to extract a plurality of pixels corresponding to pixels of interest within said second image data from said first image data; and a learning unit configured to teach a predictor configured to predict pixel values of said pixels of interest from the pixel values of said plurality of pixels extracted by said first tap extractor.

2. The learning device according to claim 1, further comprising:

a second tap extractor configured to extract a plurality of pixels corresponding to pixels of interest within said second image data from said first image data; and a feature detector configured to detect features corresponding to said pixels of interest, based on the pixel values of said plurality of pixels extracted by said second tap extractor;

wherein said learning unit is configured to teach the predictor which is configured to predict the pixel values of said pixels of interest from the pixel values of said plurality of pixels extracted by said first tap extractor for each feature detected by said feature detector.

3. The learning device according to claim 1, wherein said computer is configured to compute said first image data from said second image data, based on a relation between a phase-shift amount scattering the light signals of said optical low-pass filter serving as an object thereof, and an inter-pixel distance of an image-capturing device.

4. An image processing device for predicting second image data from first image data, said image processing device comprising:

an input configured to input first image data acquired by real world light signals being cast upon a plurality of detecting elements, each having spatial integration effects, via an optical low-pass filter;

a first tap extractor configured to extract a plurality of pixels corresponding to pixels of interest within said second image data from said first image data;

a recorder configured to record a predicting unit taught beforehand so as to predict said second image data acquired by the light signals which are directly cast in said optical low-pass filter from said first image data; and a predicting computer configured to predict pixel values of said pixels of interest within said second image data, based on said plurality of pixels extracted by said first tap extractor and said predicting unit.

5. The image processing device according to claim 4, further comprising:

a second tap extractor configured to extract a plurality of pixels corresponding to pixels of interest within said second image data from said first image data; and a feature detector configured to detect features corresponding to said pixels of interest, based on the pixel values of said plurality of pixels extracted by said second tap extractor;

wherein said predicting unit is configured to perform learning beforehand so as to predict the pixel values of said pixels of interest from said plurality of pixels extracted by said first tap extractor, for each feature detected by said feature detector.

6. The image processing device according to claim 4, wherein said predicting unit is configured to perform learning in advance so as to predict said second image data acquired by the light signals which are directly cast in said optical low-pass filter from said first image data which is computed from said second image data, based on a relation between a phase-shift amount scattering the light signals of said optical low-pass filter serving as an object thereof, and an inter-pixel distance of an image-capturing device.

7. A learning method for teaching a predicting unit, to predict second image data from first image data, said method comprising:

computing image data corresponding to light signals when light signals corresponding to said second image data pass through an optical low-pass filter, and outputting said computed image data as said first image data;

extracting a plurality of pixels corresponding to pixels of interest within said second image data from said first image data; and teaching a predicting unit which predicts pixel values of said pixels of interest from the pixel values of said plurality of pixels extracted by said extracting.

8. An image processing method for predicting second image data from first image data, said method comprising:

inputting first image data acquired by real world light signals being cast upon a plurality of detecting elements, each having spatial integration effects, via an optical low-pass filter;

extracting a plurality of pixels corresponding to pixels of interest within said second image data from said first image data;

recording a predicting unit taught beforehand so as to predict said second image data acquired by the light signals which are directly cast in said optical low-pass filter from said first image data; and predicting pixel values of said pixels of interest within said second image data, based on said plurality of pixels extracted by said extracting and said predicting unit.

* * * * *